US010491536B2

(12) United States Patent
Shear et al.

(10) Patent No.: US 10,491,536 B2
(45) **Date of Patent: *Nov. 26, 2019**

(54) METHODS AND SYSTEMS FOR ENABLING IDENTIFICATION AND/OR EVALUATION OF RESOURCES FOR PURPOSEFUL COMPUTING

(71) Applicant: Advanced Elemental Technologies, Inc., Atherton, CA (US)

(72) Inventors: Victor Henry Shear, Atherton, CA (US); Peter Robert Williams, Belmont, CA (US); Jaisook Rho, Palo Alto, CA (US); Timothy St. John Redmond, San Mateo, CA (US); James Jay Horning, Palo Alto, CA (US)

(73) Assignee: Advanced Elemental Technologies, Inc., Atherton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,350

(22) Filed: Jun. 9, 2018

(65) Prior Publication Data

US 2018/0367466 A1 Dec. 20, 2018

Related U.S. Application Data

(63) Continuation of application No. 13/815,934, filed on Mar. 15, 2013, now Pat. No. 10,075,384.

(51) Int. Cl.

*H04L 12/911* (2013.01)
*H04L 29/06* (2006.01)

(Continued)

(52) U.S. Cl.

CPC .............. *H04L 47/70* (2013.01); *H04L 63/10* (2013.01); *G06F 9/5072* (2013.01); (Continued)

(58) Field of Classification Search

CPC .......... G06F 21/45; G06F 21/31; G06F 21/32; G06F 17/20; G06F 9/5072; G06F 16/245; (Continued)

(56) References Cited

U.S. PATENT DOCUMENTS 5,794,050 A 8/1998 Dahlgren et al.
5,892,900 A 4/1999 Ginter et al.
(Continued)

FOREIGN PATENT DOCUMENTS

CN 1526232 A 9/2004
CN 1535433 A 10/2004
(Continued)

OTHER PUBLICATIONS

"About the Open Directory Project," *AOL Inc.*, 2012, retrieved on Jun. 14, 2013 from www.dmoz.org/docs/en/about.html, 2 pages.
(Continued)

*Primary Examiner* — Jungwon Chang
(74) *Attorney, Agent, or Firm* — Finnegan Henderson Farabow Garrett & Dunner LLP

(57) ABSTRACT

Systems and methods for purposeful computing that, among other things, facilitate identification and evaluation of resources based, at least in part, on the use of purpose expressions.

36 Claims, 165 Drawing Sheets

(51) Int. Cl.

| | |
|---|---|
| *G06F 17/20* | (2006.01) |
| *G06F 9/50* | (2006.01) |
| *G06F 16/245* | (2019.01) |
| *G06F 16/338* | (2019.01) |
| *G06F 16/951* | (2019.01) |
| *G06F 16/332* | (2019.01) |
| *G06F 16/2457* | (2019.01) |

(52) U.S. Cl.
CPC ...... *G06F 16/245* (2019.01); *G06F 16/24575* (2019.01); *G06F 16/338* (2019.01); *G06F 16/3329* (2019.01); *G06F 16/951* (2019.01); *G06F 17/20* (2013.01)

(58) Field of Classification Search
CPC .. G06F 16/338; G06F 16/951; G06F 16/3329; G06F 16/24575; H04L 63/08; H04L 63/0861; H04L 47/70; H04L 47/822; H04L 67/10; H04L 63/10
USPC .................................................. 709/224, 226
See application file for complete search history.

(56) References Cited

U.S. PATENT DOCUMENTS

| | | | |
|---|---|---|---|
| 5,893,057 | A | 4/1999 | Fujimoto et al. |
| 5,933,502 | A | 8/1999 | Aucsmith et al. |
| 6,185,683 | B1 | 2/2001 | Ginter et al. |
| 6,353,824 | B1 | 3/2002 | Boguraev et al. |
| 6,675,159 | B1 | 1/2004 | Lin et al. |
| 7,082,463 | B1 | 7/2006 | Bradley et al. |
| 7,281,043 | B1 * | 10/2007 | Davie .................. H04L 47/125 370/395.4 |
| 7,313,533 | B2 | 12/2007 | Chang et al. |
| 7,433,838 | B2 | 10/2008 | Welsh et al. |
| 7,467,206 | B2 | 12/2008 | Moore et al. |
| 7,603,350 | B1 | 10/2009 | Guha |
| 7,673,040 | B2 | 3/2010 | Gilbert et al. |
| 7,702,687 | B2 | 4/2010 | Govindarajan et al. |
| 7,734,609 | B2 | 6/2010 | Manfredi et al. |
| 7,761,399 | B2 | 7/2010 | Evans |
| 8,010,459 | B2 | 8/2011 | Buyukkokten et al. |
| 8,010,460 | B2 | 8/2011 | Work et al. |
| 8,150,842 | B2 | 4/2012 | Brougher et al. |
| 8,370,319 | B1 | 2/2013 | Krynski et al. |
| 8,374,973 | B2 | 2/2013 | Herbrich et al. |
| 8,380,902 | B2 | 2/2013 | Howard |
| 8,548,207 | B2 | 10/2013 | Langley et al. |
| 9,202,105 | B1 | 12/2015 | Wang et al. |
| 9,721,086 | B2 * | 8/2017 | Shear ..................... G06F 21/45 |
| 9,904,579 | B2 | 2/2018 | Shear et al. |
| 10,075,384 | B2 * | 9/2018 | Shear ..................... H04L 47/70 |
| 2002/0046041 | A1 | 4/2002 | Lang |
| 2002/0056043 | A1 | 5/2002 | Glass |
| 2002/0087496 | A1 | 7/2002 | Stirpe et al. |
| 2002/0093529 | A1 | 7/2002 | Daoud et al. |
| 2002/0129268 | A1 | 9/2002 | Ito et al. |
| 2003/0014692 | A1 | 1/2003 | James et al. |
| 2003/0037033 | A1 | 2/2003 | Nyman et al. |
| 2003/0069640 | A1 | 4/2003 | Ferreira et al. |
| 2003/0169640 | A1 | 9/2003 | Koenig |
| 2004/0029564 | A1 | 2/2004 | Hodge |
| 2005/0267871 | A1 | 12/2005 | Marchisio et al. |
| 2006/0057550 | A1 | 3/2006 | Sahashi |
| 2007/0185718 | A1 | 8/2007 | Di Mambro et al. |
| 2008/0040428 | A1 | 2/2008 | Wei et al. |
| 2008/0086458 | A1 | 4/2008 | Robinson et al. |
| 2008/0109244 | A1 | 5/2008 | Gupta |
| 2008/0109245 | A1 | 5/2008 | Gupta |
| 2009/0307581 | A1 | 12/2009 | Jaepel et al. |
| 2010/0070448 | A1 | 3/2010 | Omoigui |
| 2010/0242044 | A1 | 9/2010 | Osborne et al. |
| 2011/0043652 | A1 | 2/2011 | King |
| 2011/0082801 | A1 | 4/2011 | Baghdasaryan et al. |
| 2011/0093703 | A1 | 4/2011 | Etchegoyen |
| 2011/0125894 | A1 * | 5/2011 | Anderson ............ H04L 9/3213 709/224 |
| 2011/0161309 | A1 | 6/2011 | Lung |
| 2011/0307435 | A1 | 12/2011 | Overell et al. |
| 2012/0005480 | A1 | 1/2012 | Batke et al. |
| 2012/0022382 | A1 | 1/2012 | Daisuke et al. |
| 2012/0030228 | A1 | 2/2012 | Naidu et al. |
| 2012/0216276 | A1 | 8/2012 | Regnault et al. |
| 2012/0303358 | A1 | 11/2012 | Ducatel et al. |
| 2013/0036459 | A1 | 2/2013 | Liberman et al. |
| 2013/0073735 | A1 | 3/2013 | Behrendt et al. |
| 2013/0110872 | A1 | 5/2013 | Barga et al. |
| 2013/0117668 | A1 | 5/2013 | Joseph et al. |
| 2013/0132866 | A1 | 5/2013 | Shafique |
| 2013/0166332 | A1 | 6/2013 | Hammad |
| 2013/0238425 | A1 | 9/2013 | Saldanha et al. |
| 2013/0238599 | A1 | 9/2013 | Burris |
| 2013/0305336 | A1 | 11/2013 | Konertz et al. |
| 2013/0306276 | A1 | 11/2013 | Duchesneau |
| 2014/0023246 | A1 | 1/2014 | Bolding et al. |
| 2014/0189804 | A1 | 7/2014 | Lehmann et al. |
| 2014/0214330 | A1 | 7/2014 | Iyer et al. |
| 2016/0071111 | A1 | 3/2016 | Wang et al. |

FOREIGN PATENT DOCUMENTS

| | | | |
|---|---|---|---|
| CN | 103001945 | A | 3/2013 |
| CN | 103019717 | A | 4/2013 |
| JP | 06-203145 | A | 7/1994 |
| WO | WO 2009/002686 | A1 | 12/2008 |
| WO | WO 2011/073734 | A1 | 6/2011 |

OTHER PUBLICATIONS

"RDF Primer," *W3C Recommendation*, F. Manola et al, eds., Feb. 10, 2004, www.w3.org/TR/2004/REC-rdf-primer-20040210/, 109 pages.

"WordNet 3.0 Reference Manual," from *WordNet: A lexical database for English*, Princeton University, retrieved on Jun. 14, 2013 from wordnet.princeton.edu/wordnet/documentation/, 114 pages.

Adler et al., "Reputation Systems for Open Collaboration," *Communications of the ACM*, Aug. 2011, pp. 81-87.

Agrawal et al., "Activity Context Aware Digital Workspaces and Consumer Playspaces: Manifesto and Architecture," *Activity Context Representation: Techniques and Languages*, AAAI Technical Report WS—Dec. 5, 2012, 16 pages.

Azzedin et al, "Towards Trust-Aware Resource Management in Grid Computing Systems," *Proceedings of the 2nd IEEE/ACM International Symposium on Cluster Computing and the Grid*, Jul. 2002, 6 pages.

Begoli et al., "Design Principles for Effective Knowledge Discovery from Big Data," *Joint Working Conference on Software Architecture & 6th European Conference on Software Architecture*, Feb. 2012, pp. 215-218.

Bock et al., "OWL 2 Web Ontology Language Structural Specification and Functional-Style Syntax (2nd Editon)," *W3C Recommendation*, B. Motik et al., eds., Dec. 11, 2012, www.w3.org/TR/2012/REC-ow12-syntax-20121211/, 63 pages.

Büttcher et al., *Information Retrieval: Implementing and Evaluating Search Engines*, 2010, The MIT Press, Cambridge, MA, ISBN: 978-0-262-02651-2.

Ceran et al., "A Semantic Triplet Based Story Classifier," *IEEE/ACM International Conference on Advances in Social Networks Analysis and Mining* (*ASONAM*), 2012, pp. 573-580.

Coyle, "Identifiers: Unique, Persistent, Global," *The Journal of Academic Librarianship*, Jul. 2006, 32(4):428-431.

Downey et al., "Understanding the Relationship between Searchers' Queries and Information Goals," *Proceedings of the 17th Conference on Information and Knowledge Management* (*CIKM*), Oct. 26-30, 2008, pp. 449-458.

Dyson, "The Future of Internet Search," Project Syndicate, Aug. 19, 2010, 3 pages.

(56) References Cited

OTHER PUBLICATIONS

Etzioni et al., "Open Information Extraction from the Web," *Communications of the ACM*, Dec. 2008, 51(12):68-74.
Fagin et al., *Reasoning about Knowledge*, 1995, The MIT Press, Cambridge, MA, ISBN: 978-0-262-56200-3.
FID IS WP3, "D3.18: Demonstration of a new approach for preserving identity and privacy in mobile transactions using Id-token with Trusted Computing," R. Husseiki et al, eds., Jun. 30, 2009, www.fidis.net/resources/deliverables/hightechid/, 18 pages.
FIDIS WP12, "D12.1: Integrated Workshop on Emerging Aml Technologies," M. Gasson, ed., May 21, 2007, www.fidis.net/resources/deliverables/hightechid/, 17 pages.
FIDIS WP12, "D12.10: Normality Mining: Results from a Tracking Study," M. Gasson et al., eds., Jun. 30, 2009, www.fidis.net/resources/deliverables/hightechid/, 41 pages.
FIDIS WP12, "D12.2: Study on Emerging Aml Technologies," M. Gasson et al., eds., Oct. 1, 2007, www.fidis.net/resources/deliverables/hightechid/, 85 pages.
FIDIS WP12, "D12.3: A Holistic Privacy Framework for RFID Applications," S. Fischer-Hilbner et al, eds., Apr. 30, 2008, www.fidis.net/resources/deliverables/hightechid/, 99 pages.
FIDIS WP12, "D12.4: Integrated Workshop on Emerging Aml Technologies," M. Gasson, ed., Apr. 30, 2008, www.fidis.net/resources/deliverables/hightechid/, 13 pages.
FIDIS WP12, "D12.5: Use cases and scenarios of emerging technologies," M. Gasson, ed., Sep. 25, 2008, www.fidis.net/resources/deliverables/hightechid/, 45 pages.
FIDIS WP12, "D12.6: A Study on ICT Implants," E. Kosta et al., eds., Sep. 30, 2008, www.fidis.net/resources/deliverables/hightechid/, 80 pages.
FIDIS WP12, "D12.7: Identity-related Crime in Europe—Big Problem or Big Hype?" N. van der Meulen et al., eds., Jun. 9, 2008, www.fidis.net/resources/deliverables/hightechid/, p. 86.
FIDIS WP2, "D2.1: Inventory of topics and clusters," T. Nabeth et al, eds., Sep. 21, 2005, www.fidis.net/resources/deliverables/identity-ofidentity/, .
FIDIS WP2, "D2.12: Time for Synthesis Identity [R]Evolution (Booklet)," D. Jaquet-Chiffelle et al., eds., May 4, 2009, www.fidis.net/resources/deliverables/identity-of-identity/, 11 pages.
FIDIS WP2, "D2.13: Virtual Persons and Identities," D. Jaquet-Chiffelle et al., eds., Mar. 24, 2008, www.fidis.net/resources/deliverables/identity-ofidentity/, 53 pages.
FIDIS WP2, "D2.2: Set of use cases and scenarios," T. Nabeth etal., eds., May 26, 2006, www.fidis.net/resources/deliverables/identity-of-identity/, 91 pages.
FIDIS WP2, "D2.3: Models," T. Nabeth et al., eds., Oct. 6, 2005, www.fidis.net/resources/deliverables/identity-of-identity/, 74 pages.
FIDIS WP2, "D2.6: Identity in a Networked World Use Cases and Scenarios," D. Jaquet-Chiffelle et al., eds., Aug. 28, 2006 www.fidis.net/resources/deliverables/identity-of-identity/,• 24 pages.
FIDIS WP3 "D3.3: Study on Mobile Identity Management," G. MUiier et al., eds., May 9, 2005, www.fidis.net/resources/deliverables/hightechid/, 90 pages.
FIDIS WP3, "D3.1: Structured Overview on Prototypes and Concepts of Identity Management Systems," M. Bauer et al, eds., Sep. 15, 2005, www.fidis.net/resources/deliverables/hightechid/, 81 pages.
FIDIS WP3, "D3.10: Biometrics in identity management," E. Kindt et al, eds., Dec. 28, 2007, www.fidis.net/resources/deliverables/hightechid/, 130 pages.
FIDIS WP3, "D3.11: Report on the Maintenance of the IMS Database," M. Meints, ed., Apr. 24, 2007, www.fidis.net/resources/deliverables/hightechid/, 41 pages.
FIDIS WP3, "D3.13: Study on Usability of IMS," J. S. Pettersson et al, eds., Aug. 14, 2009, www.fidis.net/resources/deliverables/hightechid/, 144 pages.
FIDIS WP3, "D3.14: Model implementation for a user controlled biometric authentication," L. Millier et al., eds., Aug. 6, 2009, www.fidis.net/resources/deliverables/hightechid/, 58 pages.
FIDIS WP3, "D3.15: Report on the Maintenance of the IMS Database," M. Meints, ed., May 14, 2008, www.fidis.net/resources/deliverables/hightechid/, 12 pages.
FIDIS WP3, "D3.15a: Report on the Maintenance of the IMS Database," H. Zwingelberg, ed., May 8, 2009, www.fidis.net/resources/deliverables/hightechid/, 17 pages.
FIDIS WP3, "D3.16: Biometrics: PET or PIT?" A. Sprokkereef et al., eds., Aug. 20, 2009, www.fidis.net/resources/deliverables/hightechid/, 68 pages.
FIDIS WP3, "D3.17: Identity Management Systems—recent developments," M. Meints et al., eds., Aug. 10, 2009, www.fidis.net/resources/deliverables/hightechid/, 65 pages.
FIDIS WP3, "D3.2: A study on PKI and biometrics," M. Gasson et al., eds., May 4, 2005, www.fidis.net/resources/deliverables/hightechid/, 138 pages.
FIDIS WP3, "D3.5: Workshop on ID-Documents," M. Meints, ed., Sep. 5, 2005, htto://www.fidis.net/resources/deliverables/hightechid/, 20 pages.
FIDIS WP3, "D3.6: Study on ID Documents," M. Meints et al., eds., Dec. 20, 2006, www.fidis.net/resources/deliverables/hightechid/, 160 pages.
FIDIS WP3, "D3.7: A Structured Collection on Information and Literature on Technological and Usability Aspects of Radio Frequency Identification (RFID)," M. Meints, ed., Jun. 4, 2007, www.fidis.net/resources/deliverables/hightechid/, 58 pages.
FIDIS WP3, "D3.8: Study on protocols with respect to identity and identification an insight on network protocols and privacy-aware communication," M. Hansen et al, eds., May 14, 2008, www.fidis.net/resources/deliverables/hightechid/, 121 pages.
FIDIS WP3, "D3.9: Study on the Impact of Trusted Computing on Identity and Identity Management," A. Alkassar et al, eds., May 13, 2008, www.fidis.net/resources/deliverables/hightechid/, 81 pages.
FIDIS WP3, Poetzsch et al., "D3.12: Federated Identity Management—what's in it for the citizen/customer?" R. Leenes, ed., Jun. 10, 2009, www.fidis.net/resources/deliverables/hightechid/, 76 pages.
FIDIS WP4, "D4.1: Structured account of approaches on interoperability," J. Backhouse, ed., Jul. 12, 2005, www.fidis.net/resources/deliverables/interoperability/, 77 pages.
FIDIS WP4, "D4.11: eHealth identity management in several types of welfare states in Europe," S. Els et al, eds., Mar. 31, 2008, www.fidis.net/resources/deliverables/interoperability/, 48 pages.
FIDIS WP4, "D4.12: A qualitative comparative analysis of citizens' perception of eIDs and interoperability," R. Halperin et al., eds., Jun. 28, 2009, www.fidis.net/resources/deliverables/interoperability/, 49 pages.
FIDIS WP4, "D4.2: Set of requirements for interoperability of Identity Management Systems," J. Backhouse et al., eds., Dec. 20, 2005, www.fidis.net/resources/deliverables/interoperability/, 157 pages.
FIDIS WP4, "D4.4: Survey on Citizen's trust in ID systems and authorities," J. Backhouse et al., eds., Feb. 8, 2007, www.fidis.net/resources/deliverables/interoperability/, 93 pages.
FIDIS WP4, "D4.5: A Survey on Citizen's trust in ID systems and Authorities," J. Backhouse et al., eds., Apr. 17, 2007, www.fidis.net/resources/deliverables/interoperability/, 27 pages.
FIDIS WP4, "D4.6: Draft best practice guidelines," J. Backhouse et al., eds., Oct. 2006, www.fidis.net/resources/deliverables/interoperability/, 34 pages.
FIDIS WP4, "D4.7: Review and classification for a FIDIS identity management model," J. Backhouse et al., eds., Apr. 26, 2007, www.fidis.net/resources/deliverables/interoperability/, 27 pages.
FIDIS WP4, "D4.8: Creating the method to incorporate FIDIS research for generic application," J. Backhouse et al., Apr. 2007, www.fidis.net/resources/deliverables/interoperability/, 29 pages.
FIDIS WP4, "D4.9: An application of the management method to interoperability within e-Health," J. Backhouse et al., eds., Nov. 26, 2007, www.fidis.net/resources/deliverables/interoperability/, 29 pages.
FIDIS WPI 7, "D17.1: Modelling New Forms of Identities: Applicability of the Model Based on Virtual Persons," D. Jaquet-Chiffelle et al., eds., Sep. 30, 2008, ttp://www.fidis.net/resources/fidis-deliverables/identity-of-identity, 67 pages.
FIDIS WPI 7, "D17.4: Trust and Identification in the Light of Virtual Persons," D. Jaquet-Chiffelle et al., eds., Jun. 25, 2009, www.fidis.net/resources/deliverables/identity-of-identity/, 103 pages.

(56) References Cited

OTHER PUBLICATIONS

FIDO Alliance, "Specifications Overview," [online]. Retrieved from: https://fidoalliance.org/specifications/overview/, Sep. 30, 2016.
Ge et al., "Concept Similarity Matching Based on Semantic Distance" *Proceedings of the 4th International Conference on Semantics, Knowledge and Grid*, May 2008, pp. 380-383.
Giannakopoulou, "Prototype Theory: an evaluation," *Ecloga*, Jan. 2003, 8 pages.
Gruber, "Toward principles for the design of ontologies used for knowledge sharing," *Int. J. Human-Computer Studies*, 1995(5-6):907-928.
Guarino, "Semantic Matching: Formal Ontological Distinctions for Information Organization, Extraction, and Integration," *Summer School on Information Extraction*, Jul. 14-19, 1997, Frascati, Italy, 32 pages.
Gulati et al., "Cloud-Scale Resource Management: Challenges and Techniques," *Proceedings of the 3rd USENIX conference on Hot topics in cloud computing*, 2011, 6 pages.
Halpern, *Reasoning about Uncertainty*, 2003, The MIT Press, Cambridge, MA, ISBN: 978-0-262-58259-9.
Houben et al., "A Situated Model and Architecture for Distributed Activity-Based Computing," *Proceedings of the 2nd International Workshop on Model-based Interactive Ubiquitous Systems*, 2012, 5 pages.
Ingwersen et al., *The Turn: Integration of Information Seeking and Retrieval in Context*, 20 I 0, Springer, Dordrecht, The Netherlands, ISBN: 978-90-481-6981-8.
International Search Report and Written Opinion from PCT/US2015/049222; dated Dec. 22, 2015; 9 pages.
International Search Report and Written Opinion in PCT Application PCT/US2014/026912 dated Sep. 19, 2014; 6 pages.
Jain et al, "Ontology Alignment for Linked Open Data," *Proceedings of the 9th International Conference on the Semantic Web*, 2010, 16 pages.
Kiorgaard, "RDA/ONIX Framework for Resource Categorization, Version 1.0," *as submitted to the Joint Steering Committee for Revision of AACR*, Aug. 3, 2006, 23 pages.
Koutrouli et al., "Credibility Enhanced Reputation Mechanism for Distributed e-Communities," *19th International Euromicro Conference on Parallel, Distributed and Network-Based Processing*, 2011, pp. 627-634.
Kraut et al., *Building Successful Online Communities: Evidence-Based Social Design*, 2011, The MIT Press, Cambridge, MA, ISBN: 978-0-262-01657-5.
Liu et al., "A Constraint Language Approach to Grid Resource Selection," 2003, Department of Computer Science, University of Chicago, 14 pages.
Mayee et al., "Automatic Extraction and Incorporation of Purpose Data into PurposeNet," *Technical Report, International Institute of Information Technology*, Jul. 2010, 6:154-158.
Maheswaran et al., "Toward a Quality of Service Aware Public Computing Utility," *1st IEEE NCA Workshop on Adaptive Grid Computing*, 2004, pp. 376-379.
Marshall et al., "Making Large-Scale Information Resources Serve Communities of Practice," *Journal of Management Information Systems*, Special Section: Navigation in information-intensive environments, 1995, 11(5):65-86.
Mayee, "PurposeNet," *PowerPoint presentation*, 2010, Hyerabad, India, 59 pages.
Morville et al., *Search Patterns*, 2010, O'Reilly Media, Inc., Sebastopol, CA, ISBN: 978-0-596-80227-1.
Muniswamy-Reddy, et al., "Provenance for the Cloud," *Proceedings of the 8th USENIX Conference on File and Storage Technologies*, 2010, pp. 1-14.
Najar et al., "Bringing Context to Intentional Services for Service Discovery," *International Journal on Advances in Intelligent Systems*, 2012, 5(1-2): 159-174.
Najar et al., "Context-Aware Intentional Service Framework for service adaptation," 4th International Conference on Research Challenges in Information Science (RCIS), Jan. 2010, 10 pages.
Najar et al., "The influence of context on intentional service," *35th IEEE Annual Computer Software and Applications Conference Workshops (COMPSACW)* May 2011, pp. 470-475.
Najar et al., "Towards Semantic Modeling of Intentional Pervasive Information Systems," *Proceedings of the 6th International Workshop on Enhanced Web Services Technologies*, Sep. 14, 2011, pp. 30-34.
Ngoc et al., "Context Knowledge Discovery in Ubiquitous Computing," *OTM Workshops*, R. Meersman et al., eds., 2005, LNCS 3762, pp. 33-34.
Parra et al., "Chapter 7: Recommender Systems: Sources of Knowledge and Evaluation Metrics," *Advanced Techniques in Web Intelligence-2*, J.D. Velasquez et al, eds., 2013, Springer-Verlag, Berlin, Germany, SCI 452: 149-175.
Pearl, *Causality: Models, Reasoning, and Inference* (2nd Edition), 2000, Cambridge University Press, New York, NY, ISBN: 0-521-77362-8.
Ranganathan, "Philosophy of Library Classification," *Sarada Ranganathan Endowment for Library Science (SRELS)* Digital Library of Information Science & Technology, University of Arizona, 1989, 12 pages.
Ranganathan, *Colon Classification* (6th Edition), 1960, Ess Ess Publications, New Delhi, India, ISBN: 81-7000-423-3.
Ricci et al. (eds.), *Recommender Systems Handbook*, 2011, Springer Science+Business Media, LLC, New York, NY, ISBN: 978-0-387-85819-7.
Sangal et al, "PurposeNet: A Knowledgebase Organized Around Purpose," *The 20th International Conference on Conceptual Structures*, Jan. 2013, 20 pages.
Santini et al., "Similarity Matching," *Second Asian Conference on Computer Vision*, 1995, pp. 571-580.
Sowa, *Knowledge Representation*, 2000, Brooks/Cole, Pacific Grove, CA, ISBN: 0-534-94965-7.
Srivastava et al., "Knowledge Acquisition through Crowd Sourcing PurposeNet," *Language Technologies Research Center, International Institute of Information Technology*, Feb. 7, 2013, Hyderabad, India, 1 page.
Strohmaier et al., "Acquiring Explicit User Goals From Search Query Logs," *IEEE/ACM International Conference on Web Intelligence and Intelligent Agent Technology (WI-IAT)* Jan. 2008, 3:602-605.
Strohmaier et al., "Intentional Query Suggestion: Making User Goals More Explicit During Search," *WSCD '09*, Feb. 9, 2009, 7 pages.
Strohmaier et al., "Studying Databases of Intentions: Do Search Query Logs Capture Knowledge about Common Human Goals?" *Proceedings of the 5th International Conference on Knowledge Capture*, Sep. 1-4, 2009, pp. 89-96.
Strohmaier, "A Few Thoughts on Engineering Social Machines," *Proceedings of the 22nd International Conference on World Wide Web Companion*, May 13-17, 2013, pp. 919-920.
Strohmaier, "Purpose Tagging: Capturing User Intent to Assist Goal-Oriented Social Search," *Proceedings of the 2008 ACM Workshop on Search in Social Media*, Oct. 30, 2008, pp. 35-42.
Swearingen et al., "Interaction Design for Recommender Systems," *Designing Interactive Systems*, 2002, 10 pages.
Tang, et al., "Expertise Matching via Constraint-based Optimization," *Proceedings of the 2010 IEEE/WIC/ACM International Conference on Web Intelligence and Intelligent Agent Technology*, vol. 1, 2010, pp. 34-41.
Taylor et al., *The Organization of Information* (3rd Edition), 2009, Libraries Unlimited, Westport, CT, ISBN: 978-1-59158-700-2.
Touzi, "Toward a Discovering Knowledge Comprehensible and Exploitable by the End-user," *2nd International Conference on Advances in Databases, Knowledge, and Data Applications*, Feb. 2010, pp. 126-134.
Tran et al., "Ontology-based Interpretation of Keywords for Semantic Search," *The Semantic Web Lecture Notes, Computer Science*, 2007, 4825:523-536.
Van Dijck, *The Culture of Connectivity: A Critical History of Social Media*, 2013, Oxford University Press, New York, NY, ISBN: 978-0-19-997078-0.

(56) References Cited

OTHER PUBLICATIONS

Virtanen, "Git for Computer Scientists," [online]. Retrieved from: eagain.net/articles/git-for-computer-scientists/, Sep. 30, 2016, 10 pages.
Xue et al., "A New Trust Model based on Social Characteristic and Reputation Mechanism for the Semantic Web," *Proceedings of the 1st International Workshop on Knowledge Discovery and Data Mining*, Jul. 2008, pp. 414-417.
Yan et al., "Efficient Event-based Resource Discovery," *Proceedings of the 3rd ACM International Conference on Distributed Event-Based Systems*, Jul. 6-9, 2009, 12 pages.
Zhu et al.. "Intuitive Topic Discovery by Incorporatinq Word-Pair's Connection into LOA," *IEEE/WIC/ACM International Conferences on Web Intelligence and Intelligent Agent Technology* (*WI-IAT*), Jul. 2012, pp. 303-310.
Zins, "Classification Schemes of Information Science: Twenty-Eight Scholars Map the Field," *Journal of the American Society for Information Science and Technology*, Mar. 2007, 58(5):645-672.
Zubiaga et al., "Tags vs Shelves: From Social Tagging to Social Classification," *Proceedings of the 22nd ACM Conference on Hypertext and Hypermedia*, Jun. 6-9, 2011, pp. 93-102.
Wang et al., "A New Trust Model based on Social Characteristic and Reputation Mechanism for the Semantic Web," *Proceedings of the 1st International Workshop on Knowledge Discovery and Data Mining*, Jul. 2008, pp. 414-417.
Office Action dated Feb. 24, 2016, for U.S. Appl. No. 13/815,934, filed Mar. 15, 2013.
Office Action dated Aug. 24, 2017, for U.S. Appl. No. 13/815,934, filed Mar. 15, 2013.
Notice of Allowance dated Mar. 13, 2018, for U.S. Appl. No. 13/815,934, filed Mar. 15, 2013.
Office Action dated Jul. 7, 2015, for U.S. Appl. No. 13/928,301, filed Jun. 26, 2013.
Notice of Allowance dated Feb. 26, 2016, for U.S. Appl. No. 13/928,301, filed Jun. 26, 2013.
Office Action dated Nov. 3, 2016, for U.S. Appl. No. 15/163,407, filed May 24, 2016.
Notice of Allowance dated May 18, 2017, for U.S. Appl. No. 15/163,407, filed May 24, 2016.
Office Action dated Mar. 28, 2018, for U.S. Appl. No. 15/674,429, filed Aug. 10, 2017.
Final Office Action dated Oct. 26, 2018, for U.S. Appl. No. 15/674,429, filed Aug. 10, 2017.
Office Action dated Dec. 23, 2015, for U.S. Appl. No. 14/776,180, filed Sep. 14, 2015.
Office Action dated Jul. 19, 2016, for U.S. Appl. No. 14/776,180, filed Sep. 14, 2015.
Office Action dated Feb. 22, 2017, for U.S. Appl. No. 14/776,180, filed Sep. 14, 2015.
Notice of Allowance dated Sep. 14, 2017, for U.S. Appl. No. 14/776,180, filed Sep. 14, 2015.
First Chinese Office Action (and English translation) dated Jul. 14, 2017, for Chinese Patent Application No. 201480027724.3.
Patent Examination Report No. 1 dated Jul. 1, 2016, for Australian Patent Application No. 2014236646.
Notice of Acceptance dated Jul. 6, 2017, issued in Australian Patent Application No. 2014236646.
Notice of Reasons for Rejection (and English translation) dated Oct. 11, 2016, for Japanese Patent Application No. 2016-502277.
Final Notice of Reasons for Rejection (and English translation) dated Jun. 6, 2017, for Japanese Patent Application No. 2016-502277.
European Official Communication dated Apr. 20, 2017, issued in European Patent Application No. 14768205.8 (5 pages).
Office Action dated Oct. 2, 2018, for U.S. Appl. No. 15/839,335, filed Dec. 12, 2017.
Office Action dated Feb. 26, 2016, for U.S. Appl. No. 14/485,707, filed Sep. 13, 2014.
Office Action dated Nov. 1, 2016, for U.S. Appl. No. 14/485,707, filed Sep. 13, 2014.
Notice of Allowance dated Mar. 23, 2017, for U.S. Appl. No. 14/485,707, filed Sep. 13, 2014.
Patent Examination Report No. 1 dated Oct. 11, 2017, for Australian Patent Application No. 2015315175.
Supplementary European Search Report dated Apr. 4, 2018, issued in European Patent Application No. 15839850.3 (7 pages).
Notice of Allowance dated Jan. 11, 2018, for U.S. Appl. No. 15/628,228, filed Jun. 20, 2017.
First Chinese Office Action and English Translation dated Jul. 15, 2019 , for Chinese Patent Application No. 201580061903.3.

* cited by examiner

An Example of Dimension Embodiments

| Costs | Difficulty |
|---|---|
| Budget | Sophistication |
| Cost | Material Complexity |
| Transaction History | Interpretation or Functional Complexity |

| Quantities | Qualities | |
|---|---|---|
| Duration Time | Integrity | Location |
| Size | Reliability | Absolute Time |
| Popularity | Role | "offensiveness" |
| | Other REPute Related | |
| | Risks | |

Figure 2a

Illustrative example of Construct showing example of simplified Participant Resource Illustrative example of simple Resource as a Construct comprising Resource Element, associated Specifications and PERCos Resource Interface (which may also be a Construct)

Illustrative Example of Construct Types including comprising Resources

NOTE- All Arrows are indicative and illustrative only

Illustrative example of Foundation Construct Template comprising example Resource Roles, Resource Manager Resource and Specifications sets Simplified Example of Reservation Service Simplified Example of Resource Component with multiple interfaces (e.g., disk/storage system)

Simplified example of shared Cloud Resource showing separate i-Elements and multiple Resource Interfaces for common Cloud Resource Simplified example of shared Cloud Resource showing separate i-Elements and single Resource interface controlling Resource Interactions Example Abstract Evaluation Machine/Engine Simplified example of creation of Resource from i-Set, creation of Designator (i-Element) for Resource and discovery of Resource Designator by other Resource services Operating elements and/or data flow, PERCos and Non PERCos Differing Degrees of Domain of Expertise Expert E may have expertise E1, E2, E3, E4, E5 in Group Theory, Algebra, Physics, and Chemistry, respectively, where E1 > E2 > E3 > E4 >= E5.

Simplified example implementation of CDF showing potential Control Specifications An Example of Coherence Components

| Component Name | Description |
|---|---|
| Coherence manager Service | Instance of Coherence manager and associated specifications, Monitor, History and Arbitration to form operational Coherence management capability/functionality |
| Coherence manager | Responsible for local and/or distributed management of Coherence Services, including where relevant network Coherence |
| Coherence Monitor | Instance of PERCos Monitoring services within Coherence Management Service function responsible for monitoring activity of PERCos resources and processes comprising operations within Coherence dynamic fabric |
| Coherence Arbitrator | Instance of PERCos Arbitration and/or Evaluation services responsible for arbitrating specifications and other operational aspects as determined by Coherence manager. |
| Coherence History | Instance of PERCos History services that provides History service functionality/ capability to Coherence manager instance. History store may be instantiated and managed through, for example, PERCos PIMS. |
| Coherence operational specifications | Operational specifications for operations and experience under the jurisdiction of Coherence manager(s) |

Figure 112a

Native PERCos: a version of PERCos runs directly on the underlying hardware platform.
Hosted PERCos: a version of PERCos runs on top of a resident Operating System (e.g., Windows 7).

Native PERCos: a version of PERCos runs directly on the underlying hardware platform.
Hosted PERCos: a version of PERCos runs on top of a resident Operating System (e.g., Windows 7).

Example of PERCos Human-Computational Domain - Machine Interactions

An Example of a User Selecting Purpose Facets

User selects Facets.

| **purpose Facet** |
|---|
| Core: |
| verb |
| category |
| auxiliary: |
| expertise |
| Size |
| Time |
| Location |
| ... |
| [\| ] |

User selects the purpose Facet *verb*.

| **purpose Facet** | **verb** |
|---|---|
| ***verb*** | Drink |
| category | Learn |
| expertise | Buy |
| Size | Plan |
| ... | ... |
| [\| ] | [ ] |

User selects the purpose Facet *category*.

| **purpose Facet** | **verb** | **category** |
|---|---|---|
| ***verb*** | Drink | Sport |
| ***category*** | ***Learn*** | Music |
| expertise | Buy | Food |
| Size | Plan | Wine |
| ... | ... | Weather |
| | | Travel |
| | | ... |
| [ ] | [ ] | [\| ] |

Figure 140a

An Example of a User Selecting Purpose Facets

User selects the *verb* Facet *Learn*.

| purpose Facet | verb | Learn | | category |
|---|---|---|---|---|
| | | **Facets** | **Superclasses** | |
| **verb** | Drink | Textbook | Activity | Sport |
| **category** | ***Learn*** | Article | Personal | Music |
| expertise | Buy | Lecture | ... | Food |
| Size | Plan | Tour | | Wine |
| ... | ... | Practice | | Weather |
| | | ... | | Travel |
| | | | | ... |
| [ ] | [ ] | [\| ] | [ ] | [ ] |
| **purpose class apps:** *Wikipedia, Encyclopedia Britannica* > | | | | |

User selects the *category* Facet *Wine*.

| purpose Facet | Verb | Learn | | category | Wine | |
|---|---|---|---|---|---|---|
| | | **Facets** | **Superclasses** | | **Facets** | **Superclasses** |
| ***verb*** | Drink | Textbook | Activity | Sport | Color | Beverage |
| ***category*** | ***Learn*** | Article | Personal | Music | Sweetness | Alcohol |
| expertise | Buy | Lecture | ... | Food | Country | Fermented |
| Size | Plan | Tour | | ***Wine*** | Fruit | Intoxicant |
| ... | ... | Practice | | Weather | Acidity | ... |
| | | ... | | Travel | Fruitiness | |
| | | | | ... | Fizziness | |
| | | | | | ... | |
| [ ] | [ ] | [ ] | [ ] | [ ] | [\| ] | [ ] |
| **purpose class apps:** *All About Wine, Wines of the World, Wine for Dummies* > | | | | | | |

Figure 140b

An Example of a User Selecting Purpose Facets

User selects the *Wine* Facet *Fruit*. A menu pops up with the divisions of the *Fruit* Facet, and user selects *Plum*.

| **purpose** | **Verb** | **Learn** | | **category** | **Wine** | | |
|---|---|---|---|---|---|---|---|
| **Facet** | | **Facets** | **Super-classes** | | **Facets** | | **Super-classes** |
| ***verb*** | Drink | Textbook | Activity | Sport | Color | | Beverage |
| ***category*** | ***Learn*** | Article | Personal | Music | Sweetness | | Alcohol |
| expertise | Buy | Lecture | ... | Food | Country | | Fermented |
| Size | Plan | Tour | | ***Wine*** | ***Fruit*** | **Divisions** | Intoxicant |
| ... | ... | Practice | | Weather | Acidity | Grape | ... |
| | | ... | | Travel | Fruitiness | ***Plum*** | |
| | | | | ... | Fizziness | Cherry | |
| | | | | | ... | Other | |
| [ ] | [ ] | [ ] | [ ] | [ ] | [ ] | [\| ] | [ ] |
| **purpose class apps:** *Plum Brandies of Slovakia, Plum Wine Cocktails.* | | | | | | | |

Figure 140c

WP: way points
D PC: Declared Purpose Class
PCA: Purpose Class Applications
D CPE: Descriptive Contextual
Purpose Expression
R: Resource Example of PERCos Human-Computational Domain - Machine Interactions Illustrative example of Master Dimension pull down menu
for example illustrative interface User Master Dimension Faceting List

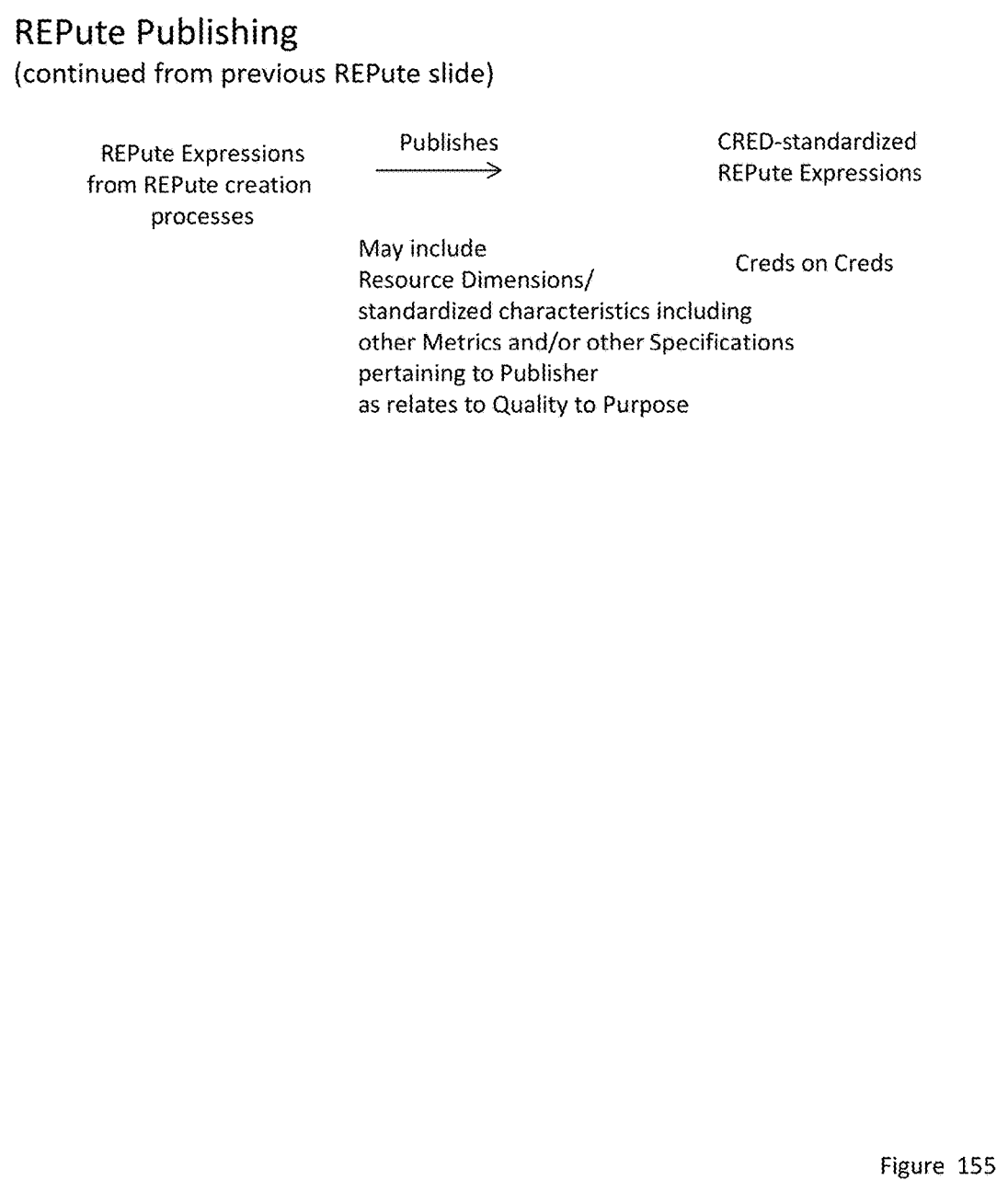

REPute Publishing
(continued from previous REPute slide)

REPute Expressions from REPute creation processes

Publishes →

CRED-standardized REPute Expressions

May include
Resource Dimensions/
standardized characteristics including
other Metrics and/or other Specifications
pertaining to Publisher
as relates to Quality to Purpose Creds on Creds

Figure 155

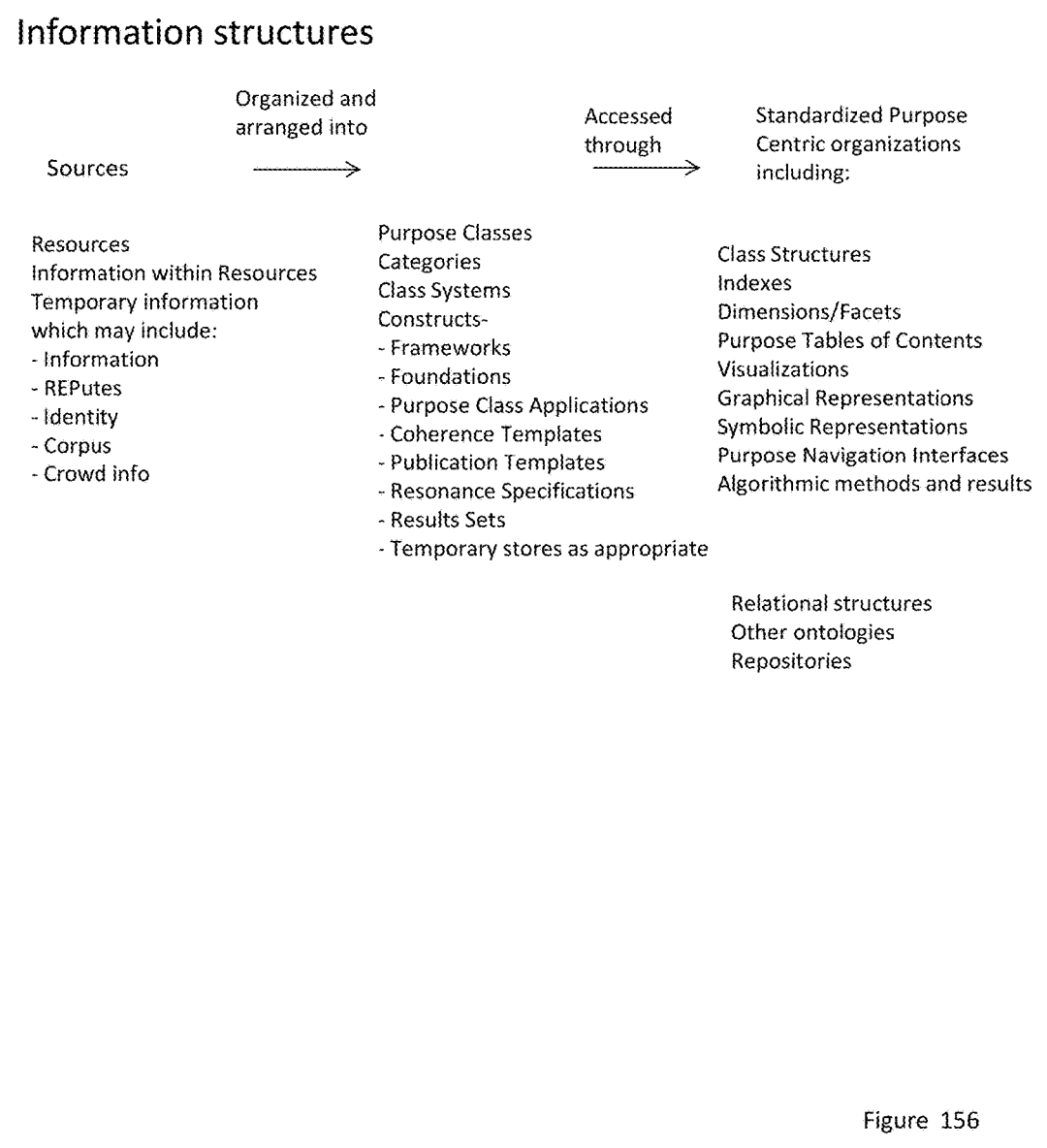

Information structures

Sources → Organized and arranged into → Accessed through → Standardized Purpose Centric organizations including:

Resources
Information within Resources
Temporary information
which may include:
- Information
- REPutes
- Identity
- Corpus
- Crowd info Purpose Classes
Categories
Class Systems
Constructs-
- Frameworks
- Foundations
- Purpose Class Applications
- Coherence Templates
- Publication Templates
- Resonance Specifications
- Results Sets
- Temporary stores as appropriate Class Structures
Indexes
Dimensions/Facets
Purpose Tables of Contents
Visualizations
Graphical Representations
Symbolic Representations
Purpose Navigation Interfaces
Algorithmic methods and results Relational structures
Other ontologies
Repositories

Figure 156

METHODS AND SYSTEMS FOR ENABLING IDENTIFICATION AND/OR EVALUATION OF RESOURCES FOR PURPOSEFUL COMPUTING

RELATED APPLICATION

This application is a continuation of U.S. application Ser. No. 13/815,934, filed Mar. 15, 2013, titled PURPOSEFUL COMPUTING, now U.S. Pat. No. 10,075,384, which is incorporated herein by reference in its entirety.

BACKGROUND

Field of the Invention

Aspects of the disclosure relate in general to computing architecture. Aspects include an apparatus, a method and system configured to facilitate user purpose in a computing architecture.

Description of the Related Art

Computing has become deeply embedded in the fabric of modern society. It has become one of the most ubiquitous types of human resources, along with water, food, energy, housing, and other people. It interfaces in profoundly diverse ways with the pantheon of other human resources types—it has become one of the two major doorways for human functioning, the other being direct physical interaction with tools, people, and/or the like.

Computing tools allow us to do many things that were unavailable—even unimaginable—not so many years ago, so much so that in recent years computing has become a binding foundation for the human community. It is used for administrating and operating a large portion of human infrastructure, for entertainment, socializing, communicating, sharing knowledge, and sharing between parties such as group members, friends, colleagues, community, and other affinity activities.

Most modern computer arrangements function as ubiquitous portals in a giant peer-to-peer Internet cloud. In the aggregate, along with the information they store and the real-time activities and the services they provide, today's computing arrangements can access and/or participate in a vast conglomeration of processing, storage, information, "experience," and communication resource opportunities. The reason we use these computer arrangements is to employ tools as means towards whatever ends we, individually and collectively, choose to pursue at any given moment—that is we use computing arrangements to fulfill or otherwise satisfy our purposes. Fulfilling our purposes requires exploiting resources, and modern computing arrangements offer resource opportunities corresponding to a large portion of humanity's knowledge and expertise, as well as a virtually boundless variety of commercial, communication, entertainment, and interpersonal resources and resource combinatorial possibilities.

Altogether, modern computing, through both intranets and the Internet cloud, presents a huge, and from a human perspective, an unimaginably large, distributed array of candidate resources, relationships, and experience possibilities. This vast array, given its size, diversity, and global distribution, presents daunting challenges to fully, or even modestly, exploit, and no computing technology set provides reasonable ways for individuals or groups to see into the expanse of resource possibilities as they relate to anything other than their own highly specific areas of real expertise, except as to resources that may be materially, publicly promoted. Even experts, when operating in areas where their knowledge is incomplete, frequently have difficulty marshaling suitable best possible resource sets (set is at least one unit), particularly where the impetus for using resources is the pursuit, the acquisition of information and understanding. Since, the very nature of computing's exploding web of resource opportunities is unprecedented and involves vast, unharnessed arrays of resources, much of this massive variety and population of items, locations, and potential combinations lies within a vast information fog.

SUMMARY

Embodiments include a system, device, method and computer-readable medium to facilitate user purpose in a computing architecture.

FIG. **2*a*** is an example of Dimension Embodiments.

Figure 3:
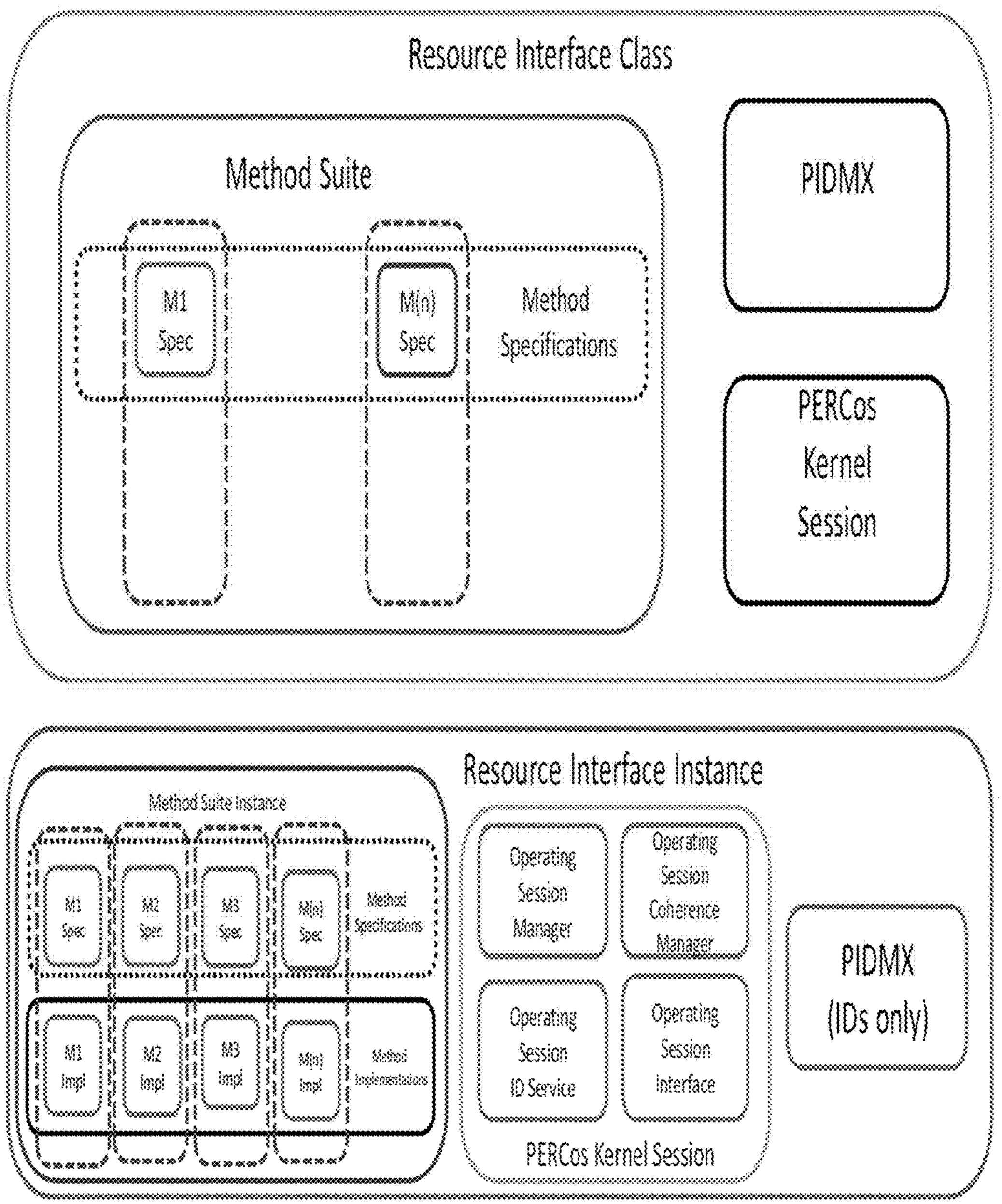

FIG. 3 is an illustrative example of resource interface.

Figure 4:
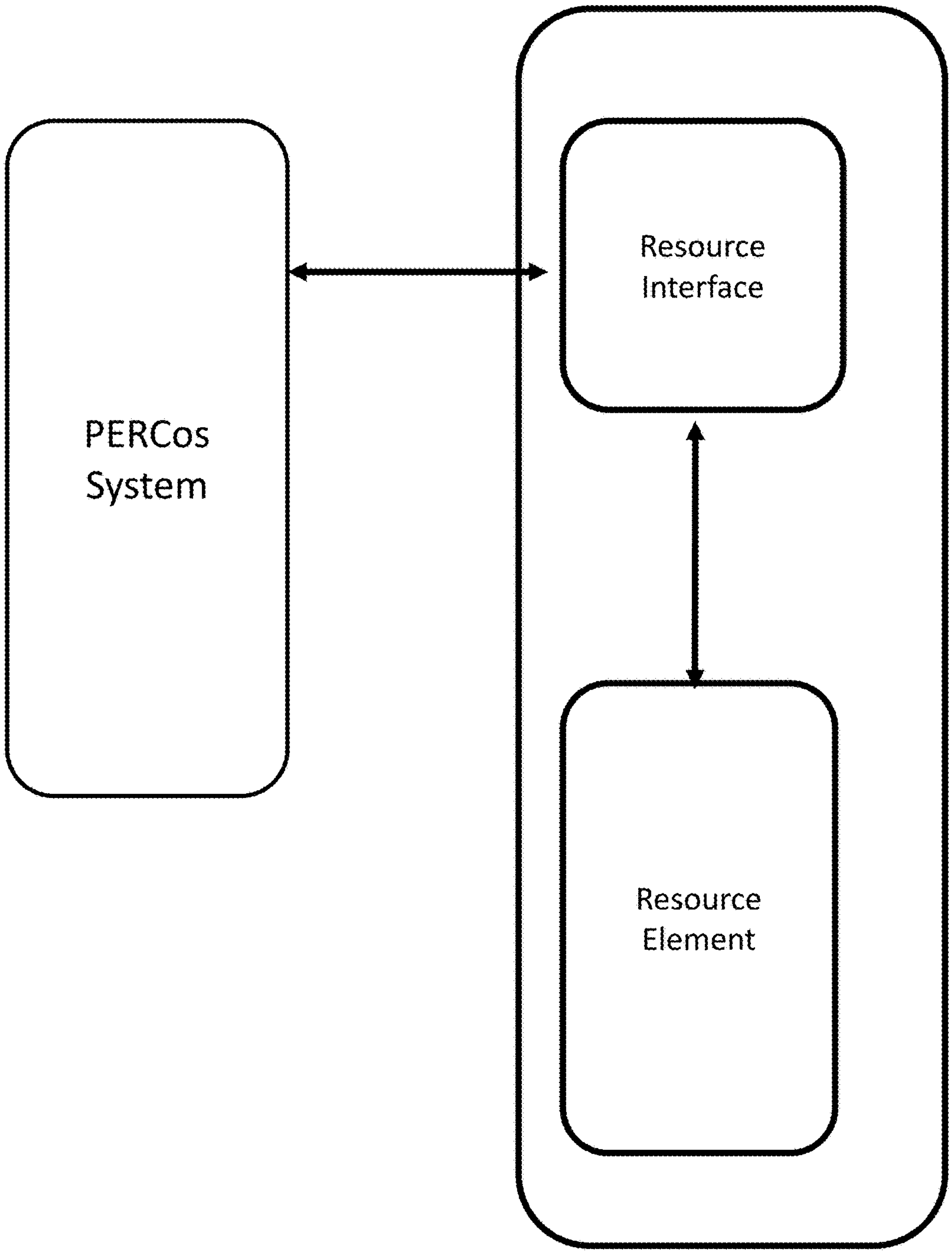

FIG. 4 is an example resource 1 (laptop computer).

Figure 5:
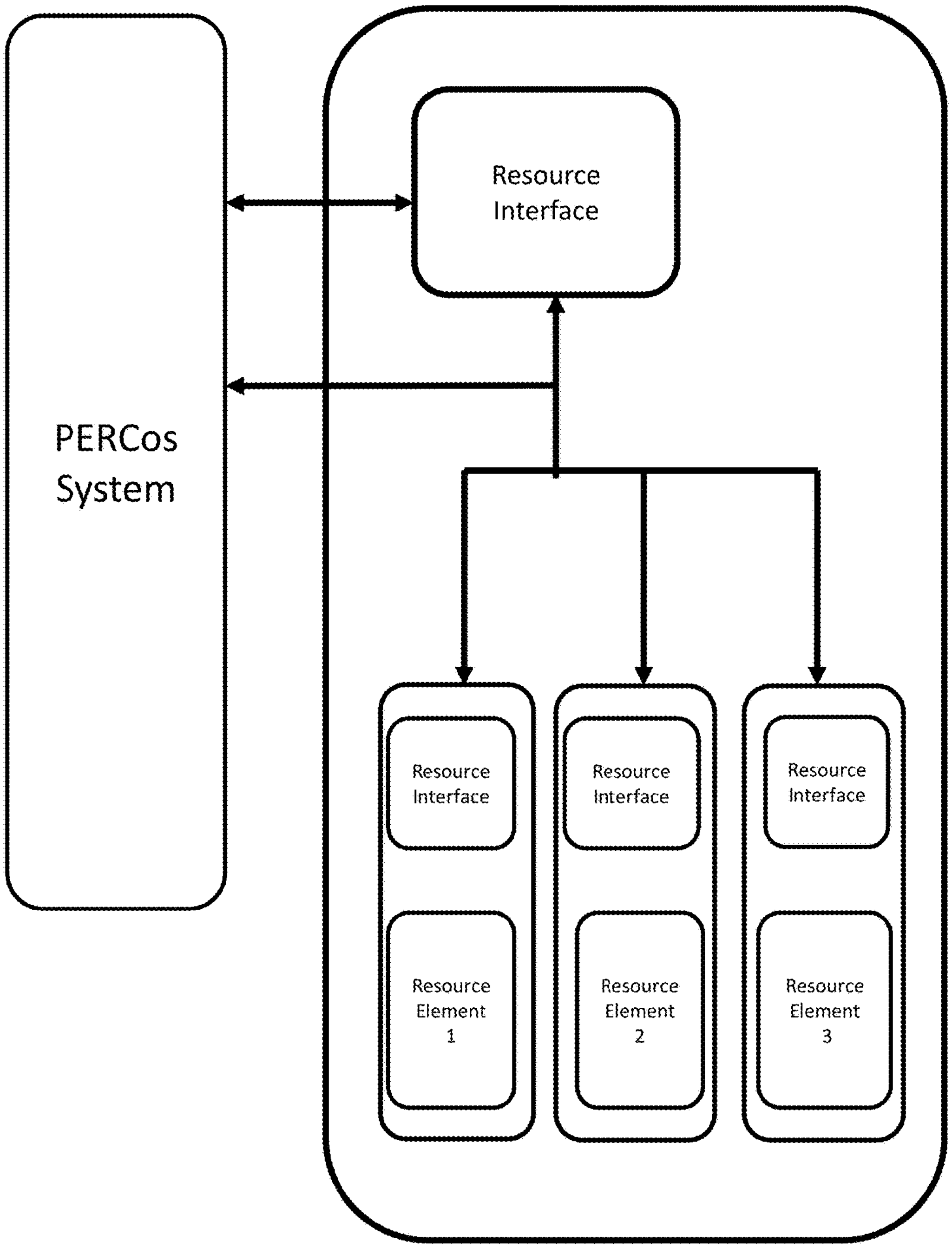

FIG. 5 is an example resource 2 (transparent resource interface).

Figure 6:
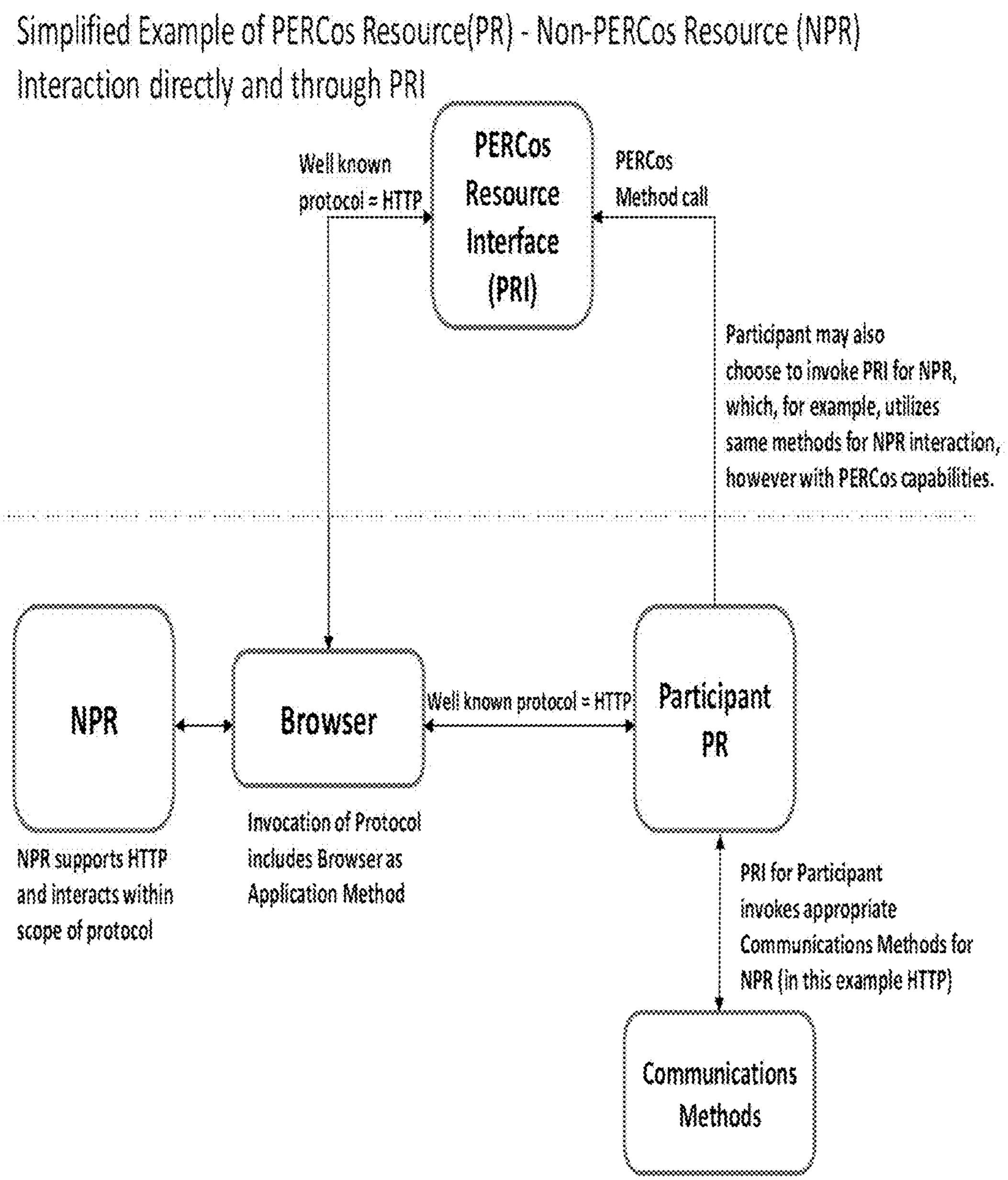

FIG. 6 is an illustrative example of an (NPR) interaction through PERCos resource interface.

Figure 7:
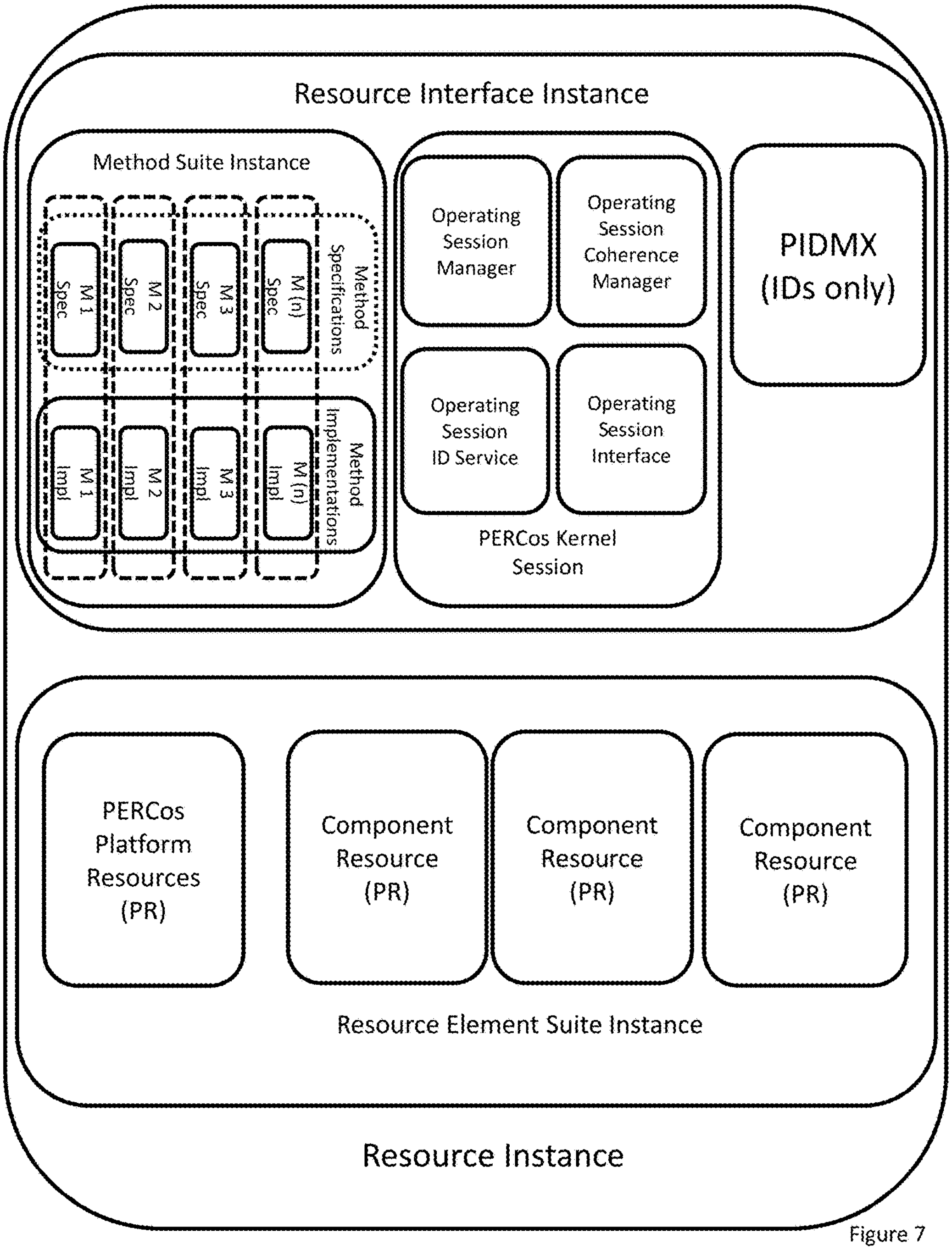

FIG. 7 is an example structure of a resource interface.

Figure 8:
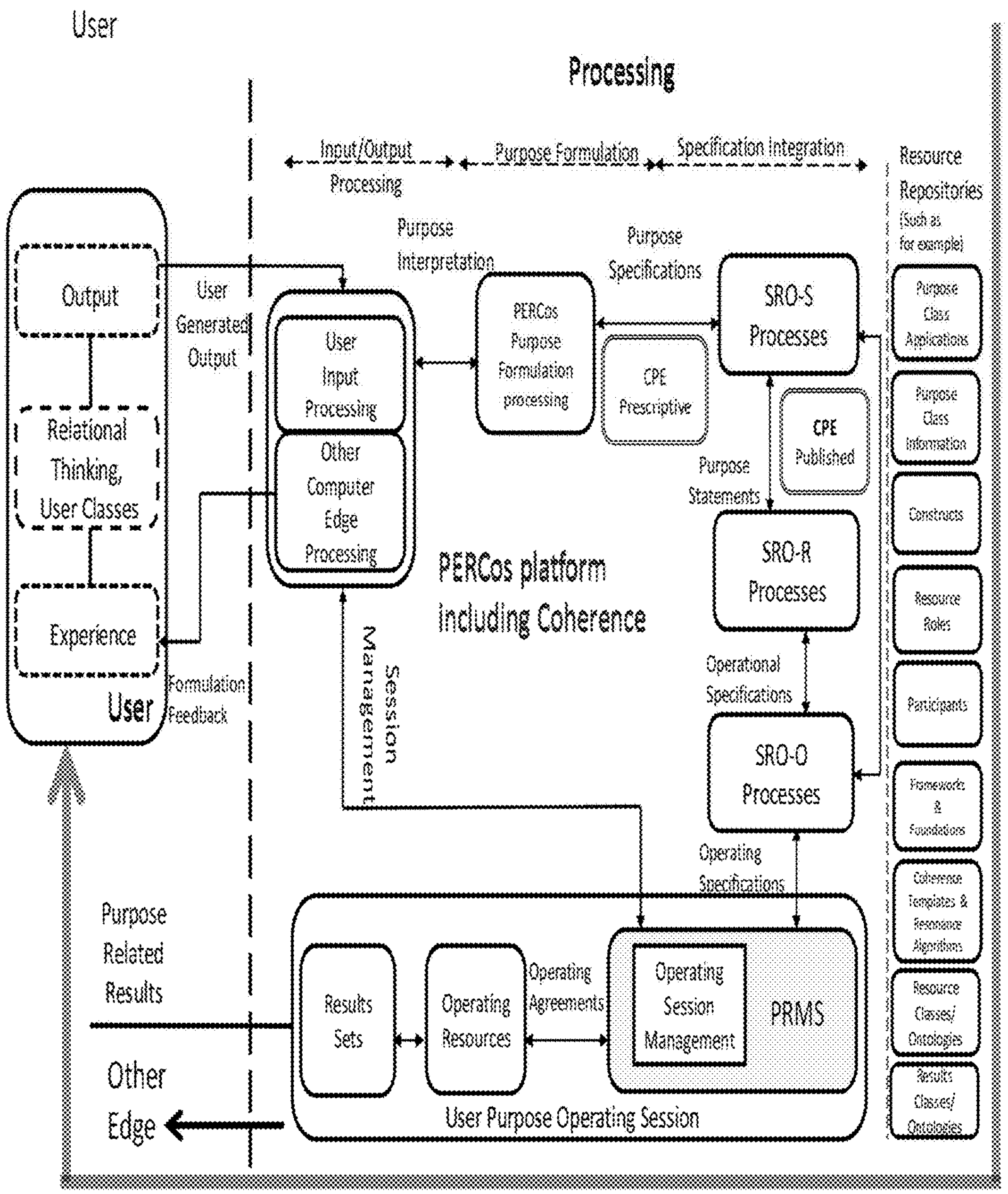

FIG. 8 is an illustrative example of the PERCos purpose cycle.

Figure 9:
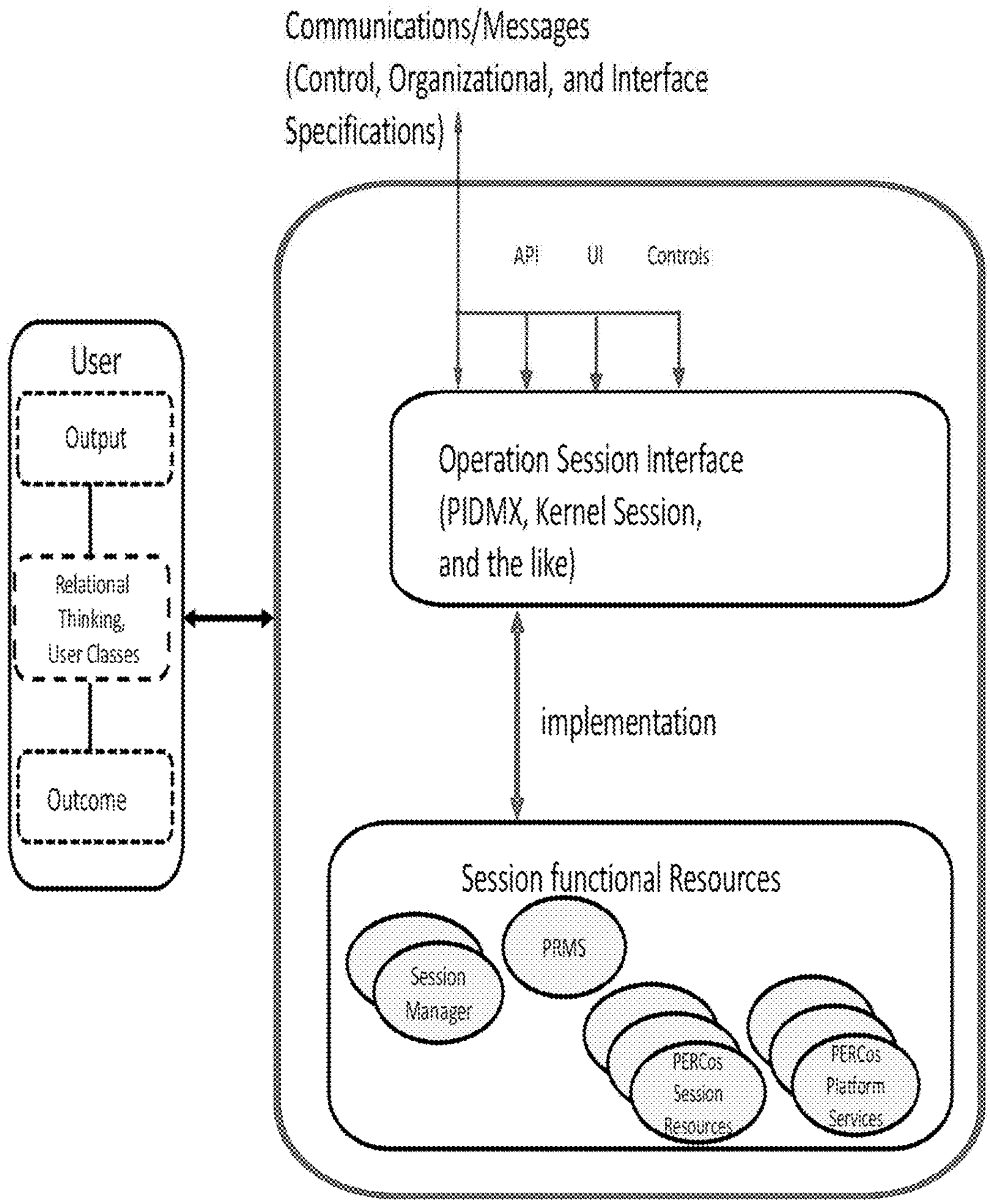

FIG. 9 is an example operating session embodiment.

Figure 10:
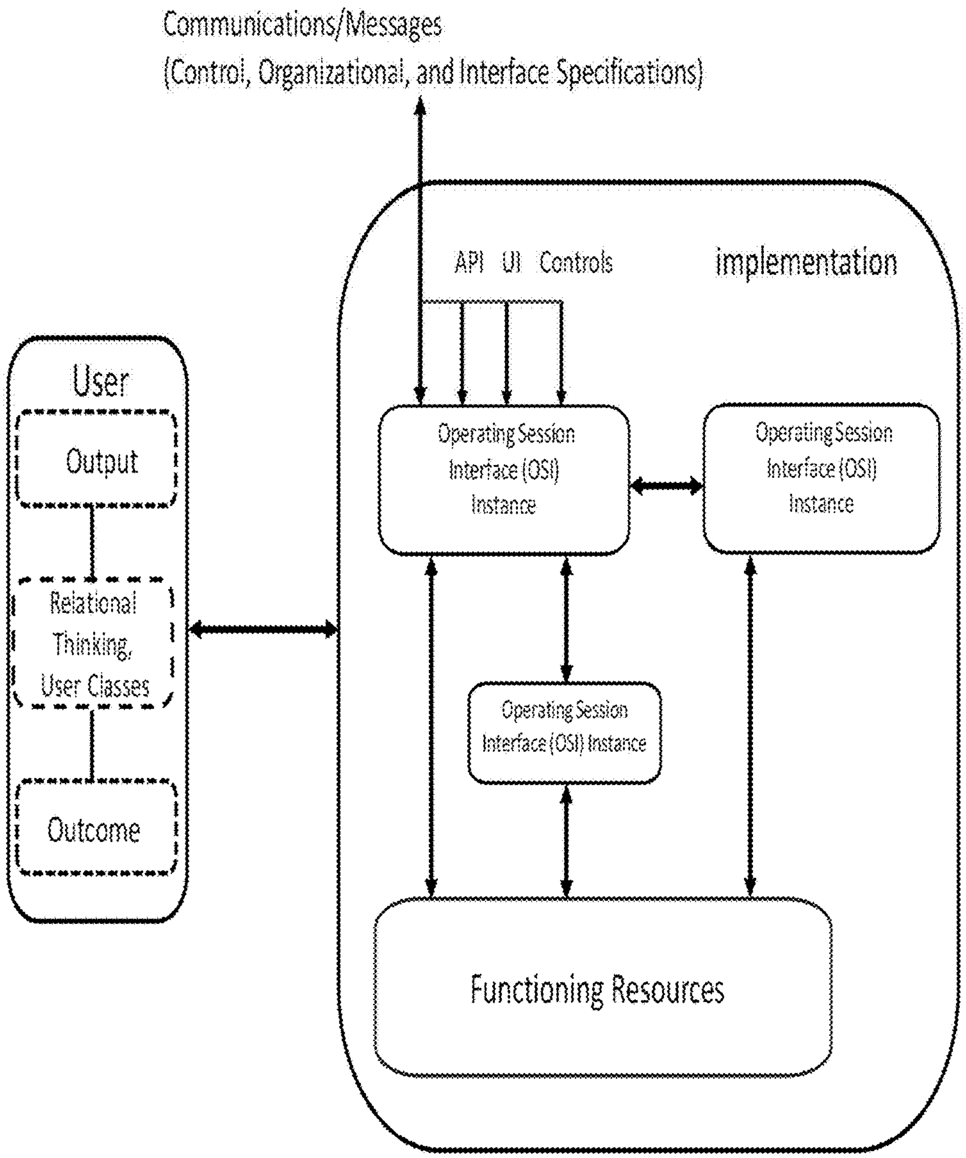

FIG. 10 is an example operating session embodiment.

Figure 11:
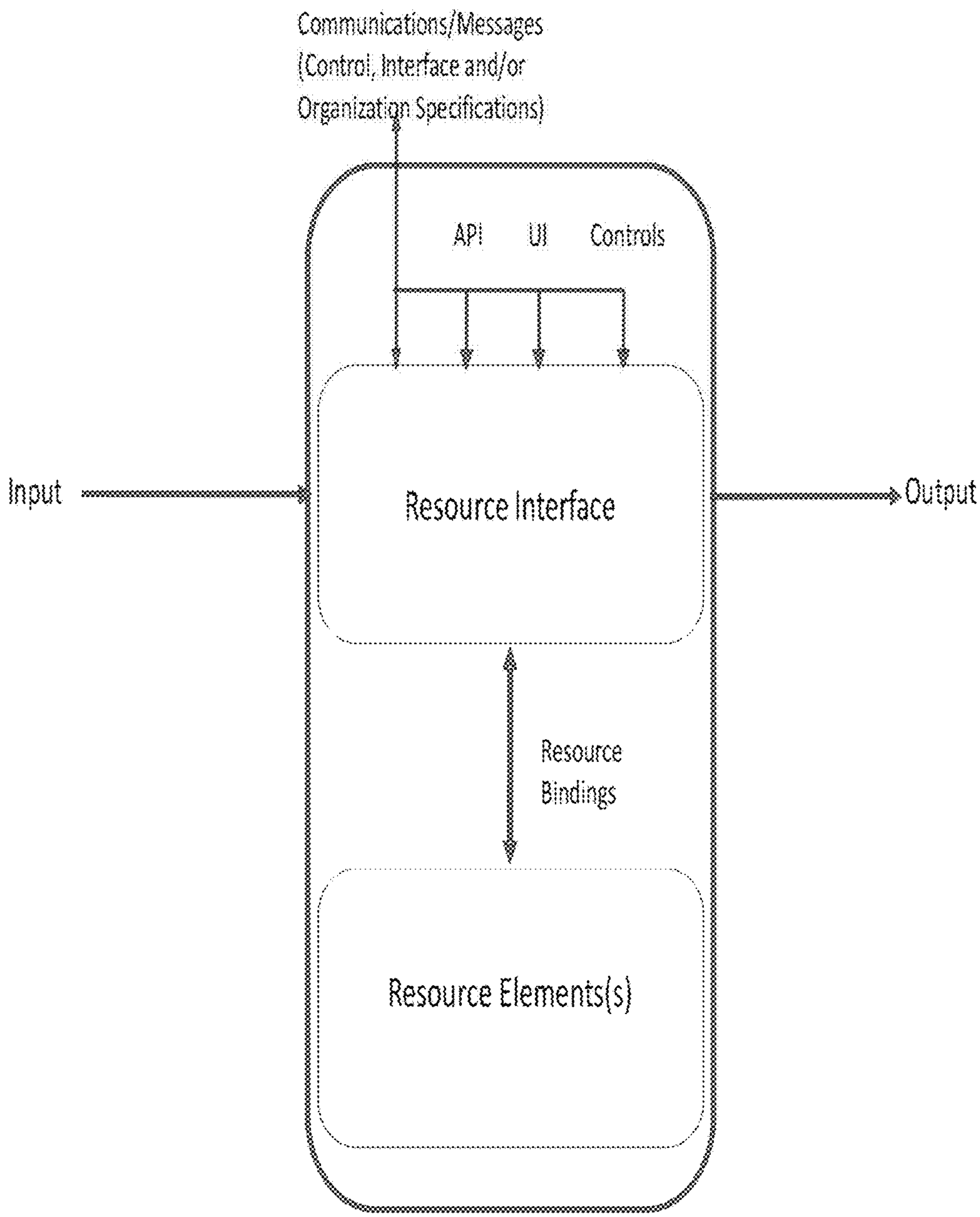

FIG. 11 is an example resource item.

Figure 12:
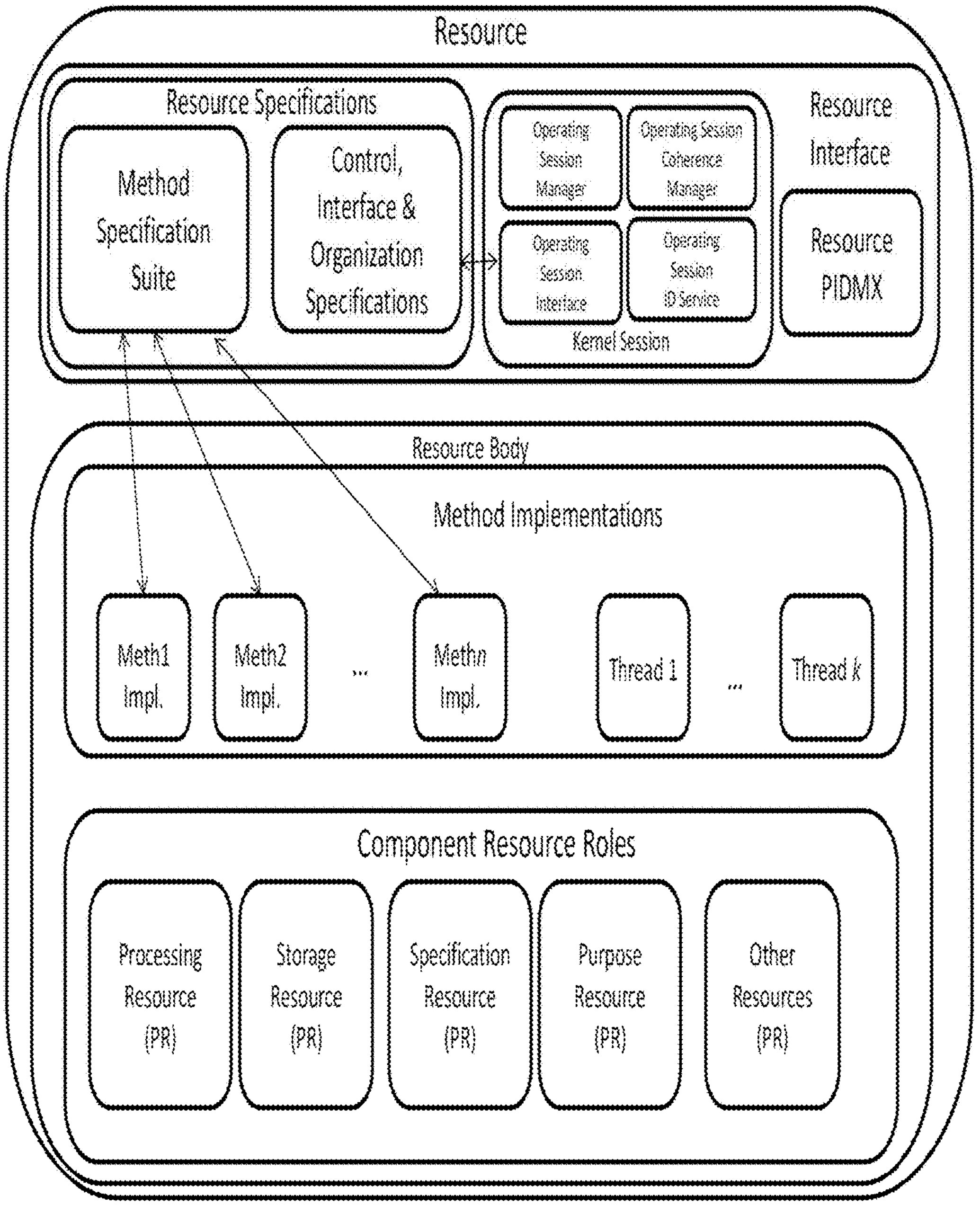

FIG. 12 is an example resource embodiment.

Figure 13:
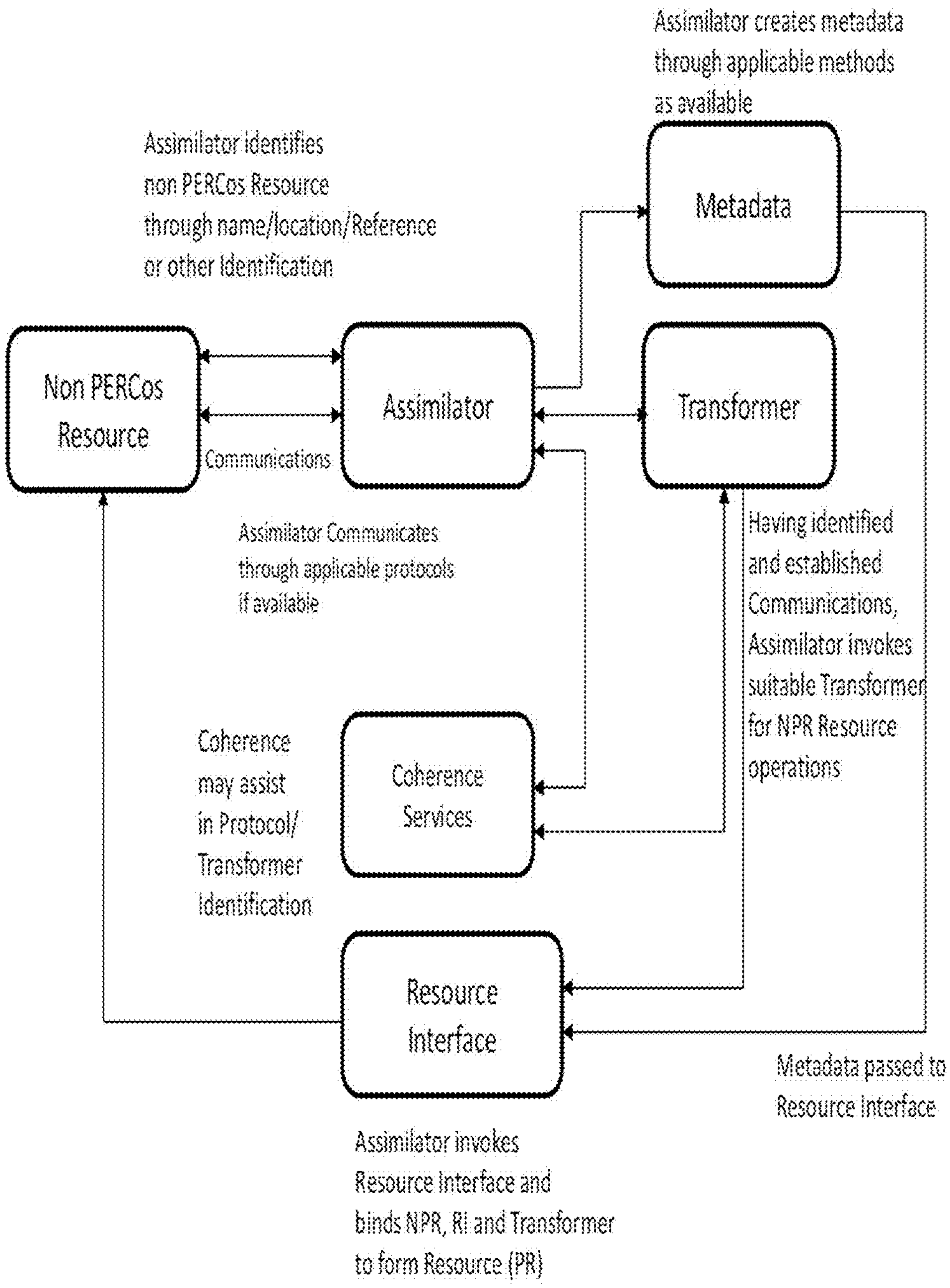

FIG. 13 is an assimilation of non-PERCos resource into PERCos environment.

Figure 14:
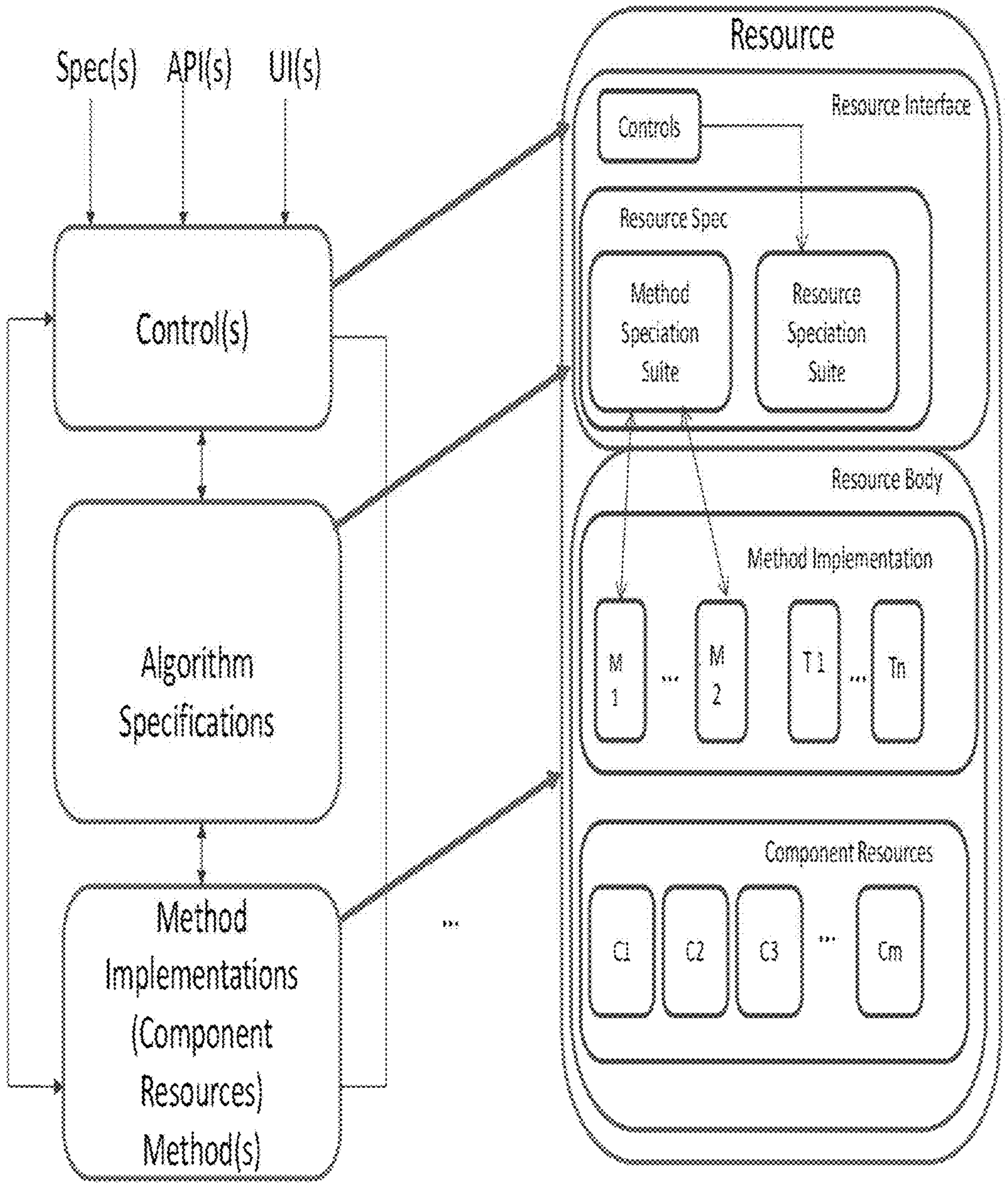

FIG. 14 is part 1 of operating resource creation example 1.

Figure 15:
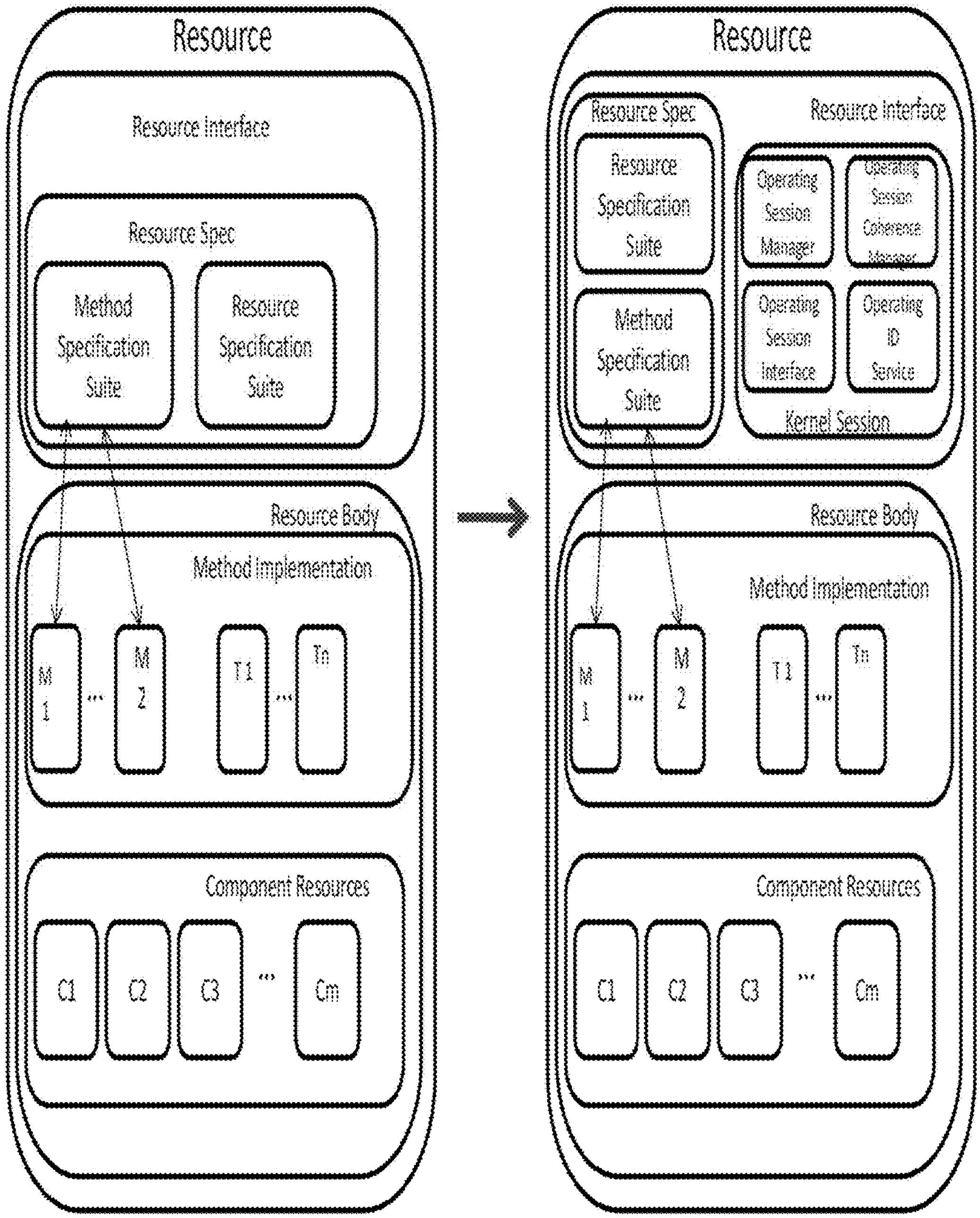

FIG. 15 is part 2 of operating resource creation example 1.

Figure 16:
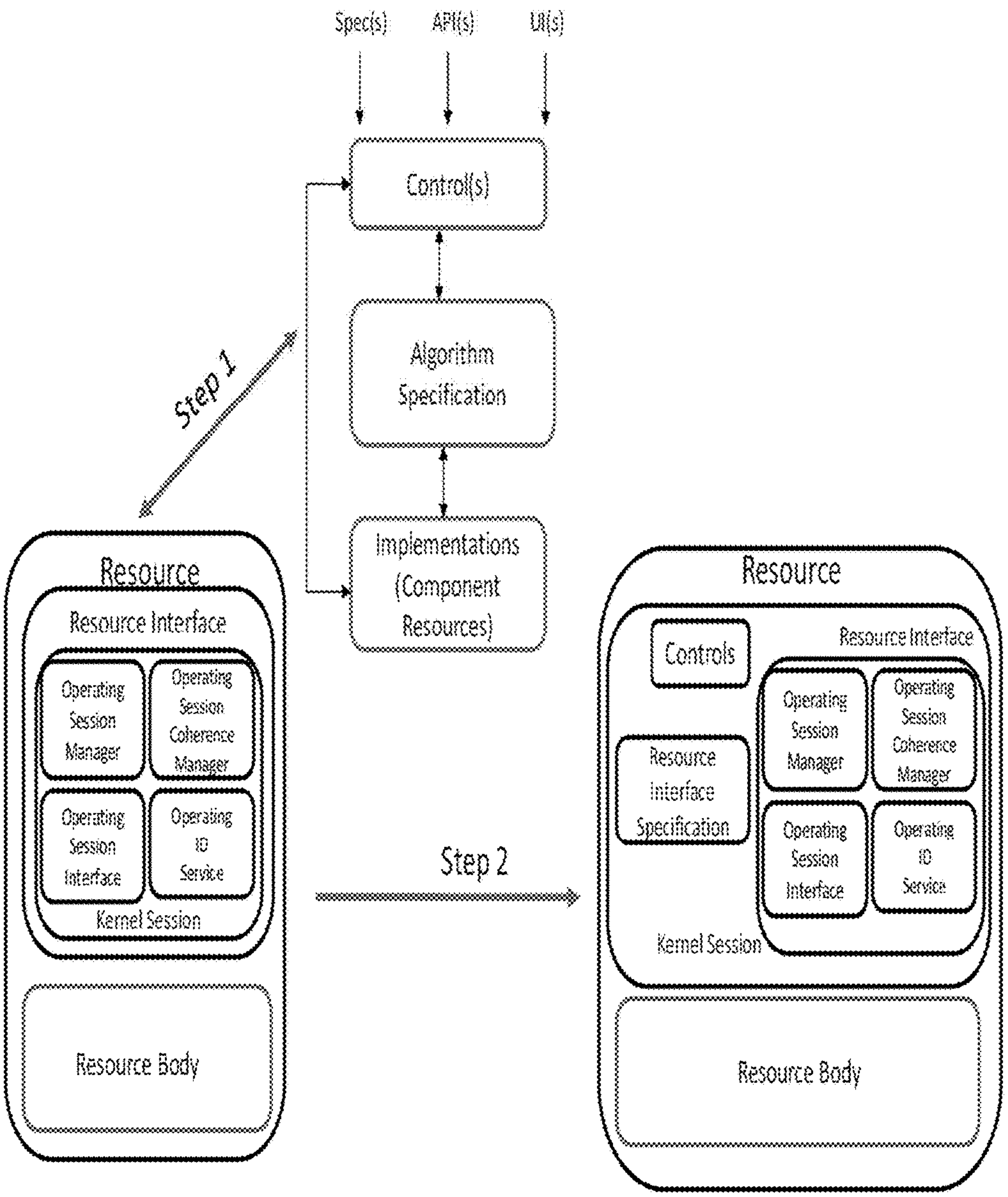

FIG. 16 is part 1 & 2 of operating resource creation example 2.

Figure 17:
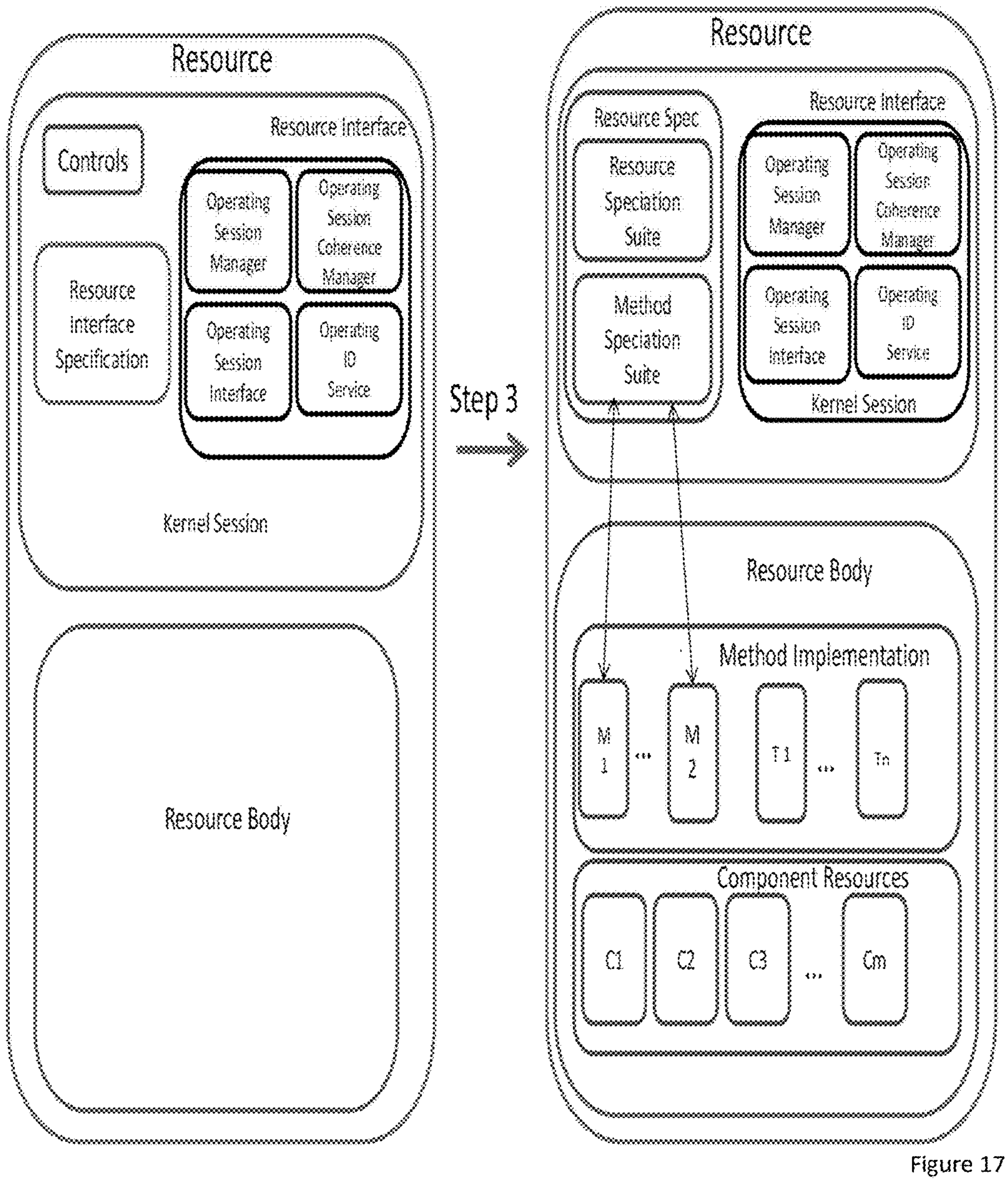

FIG. 17 is part 3 of operating resource creation example 2.

Figure 18:
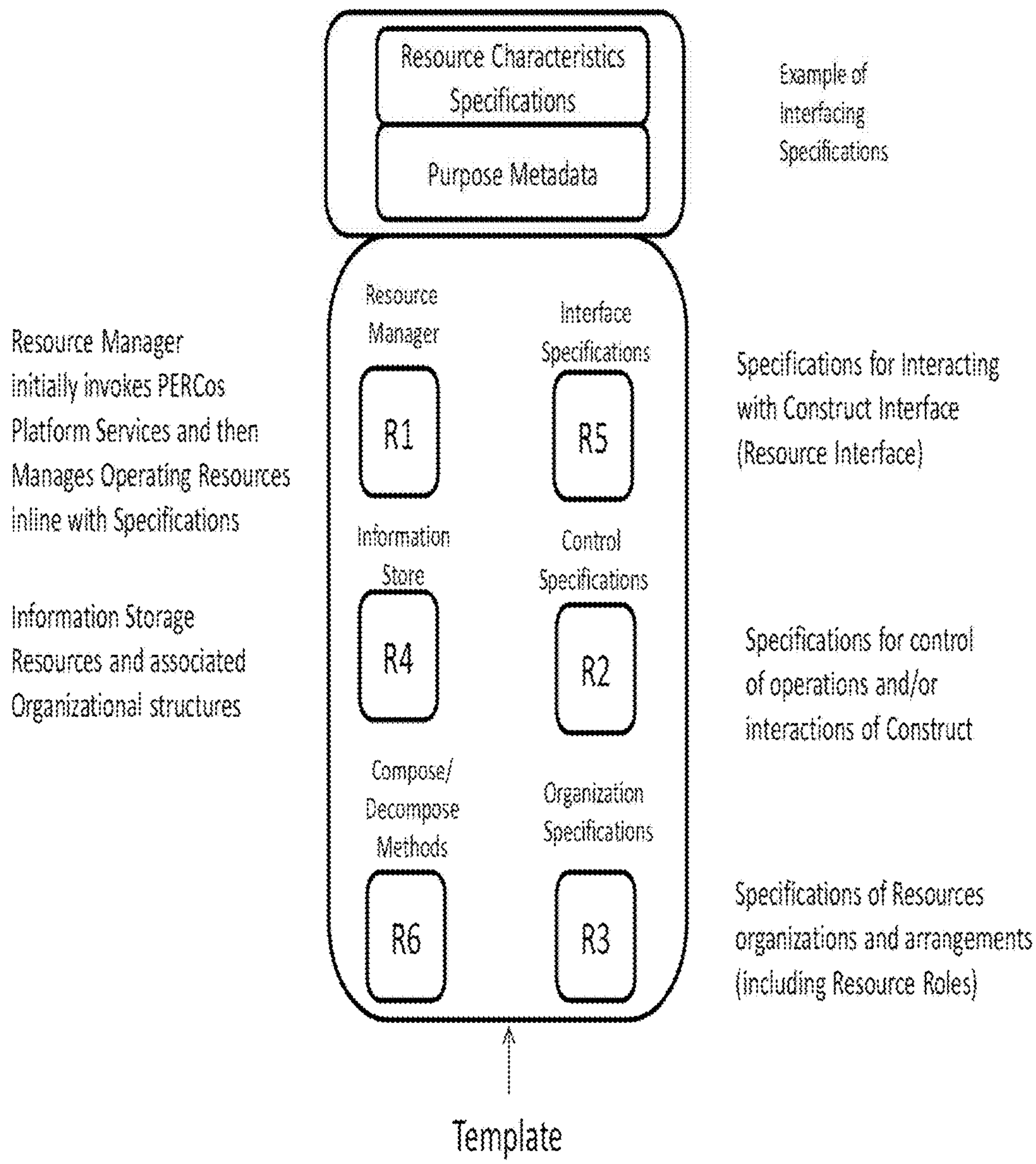

FIG. 18 is an illustrative example of Construct showing example of simplified participant resource.

Figure 19:
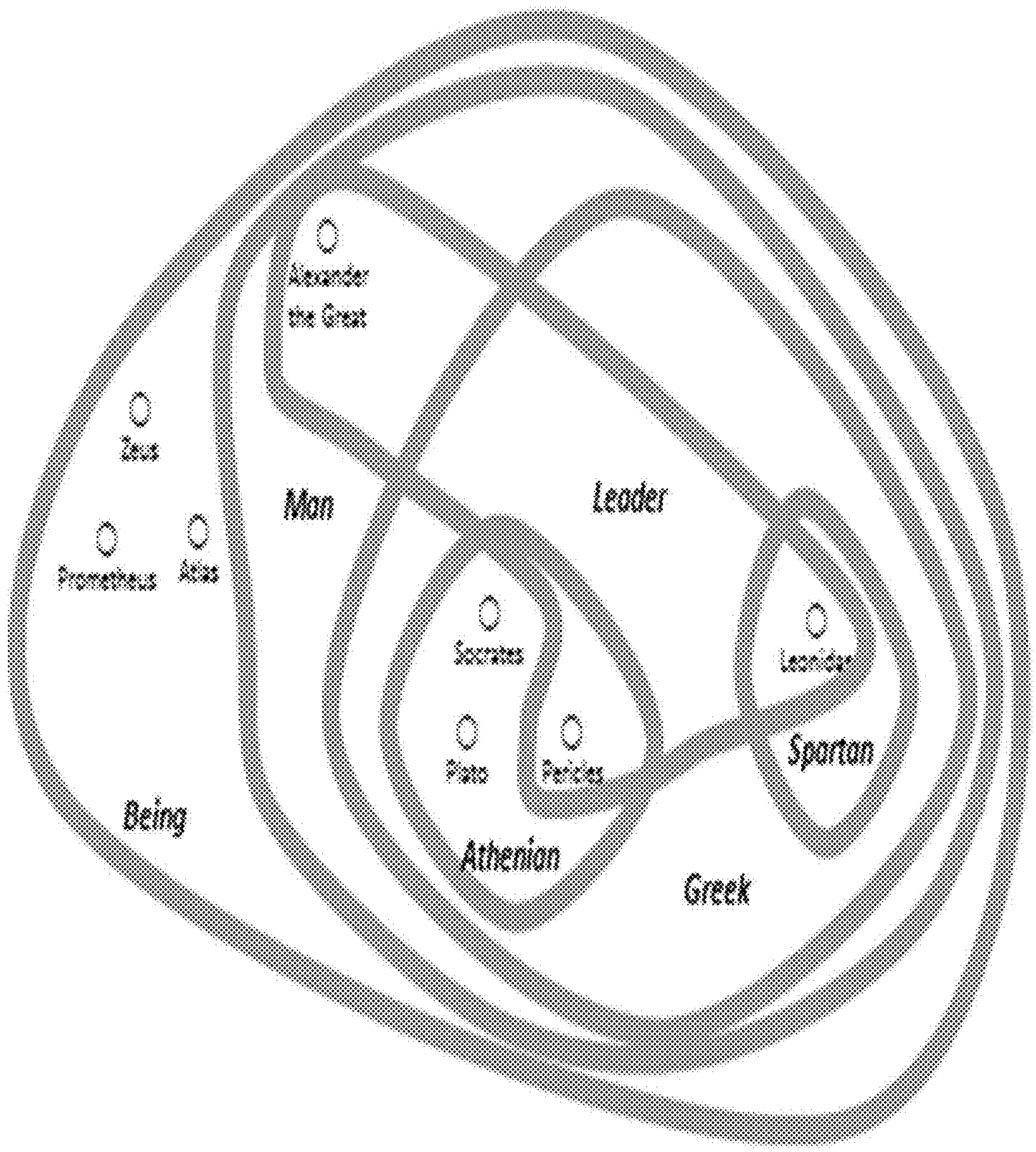

FIG. 19 is an example of a simple class system.

Figure 20:
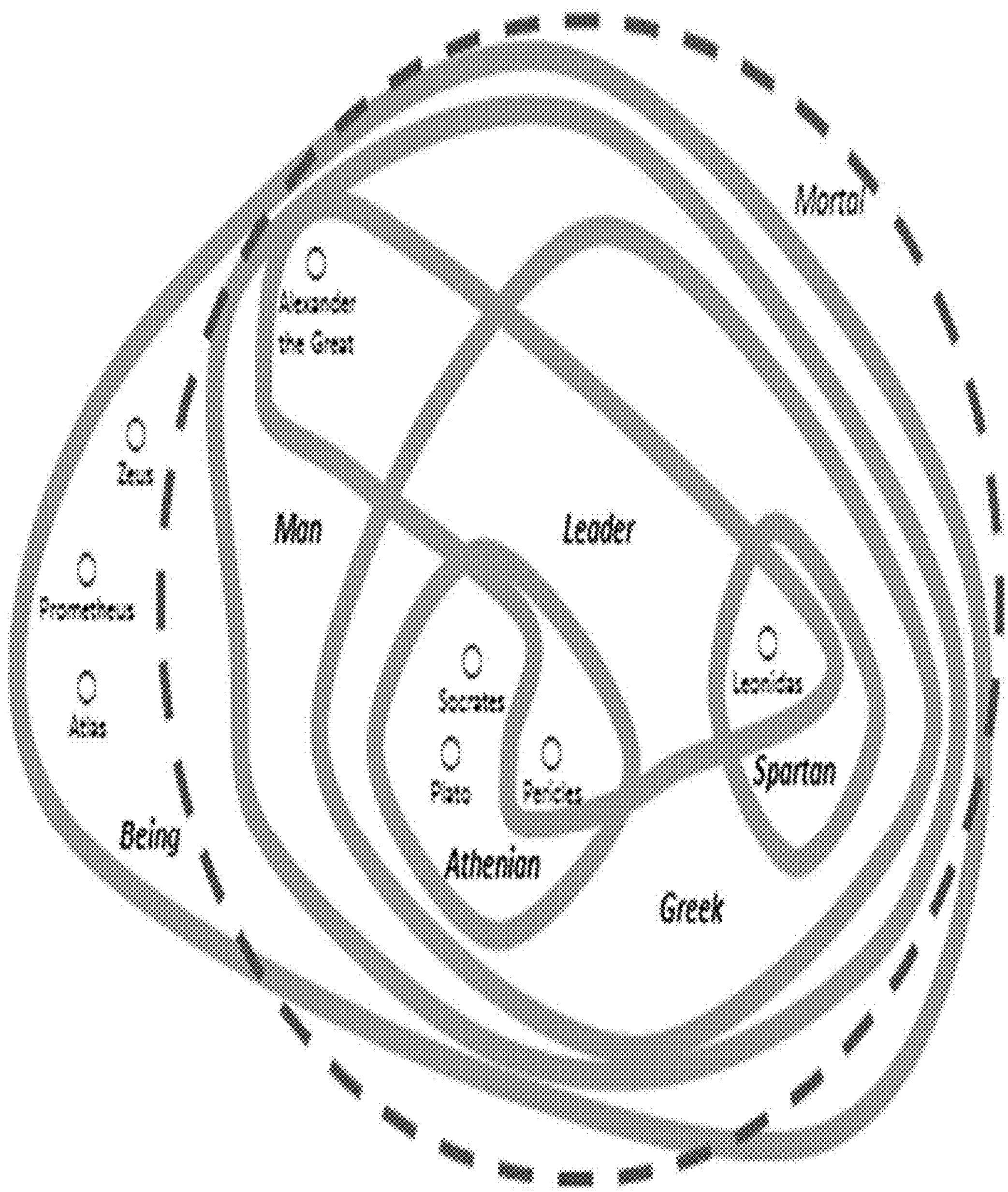

FIG. 20 is an example simple class system, extended with mortal.

Figure 21:
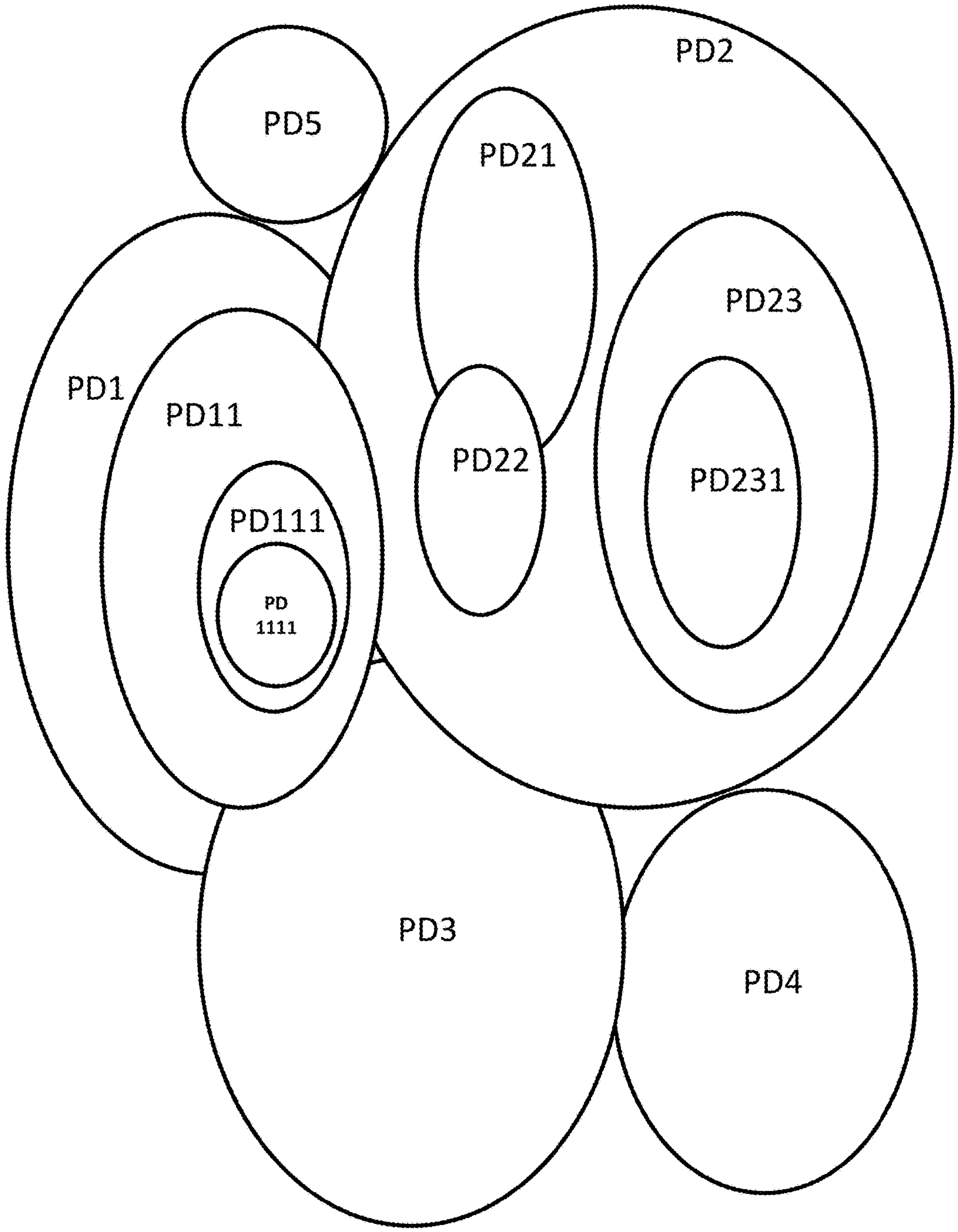

FIG. 21 is an example purpose Domain relationships.

Figure 22:
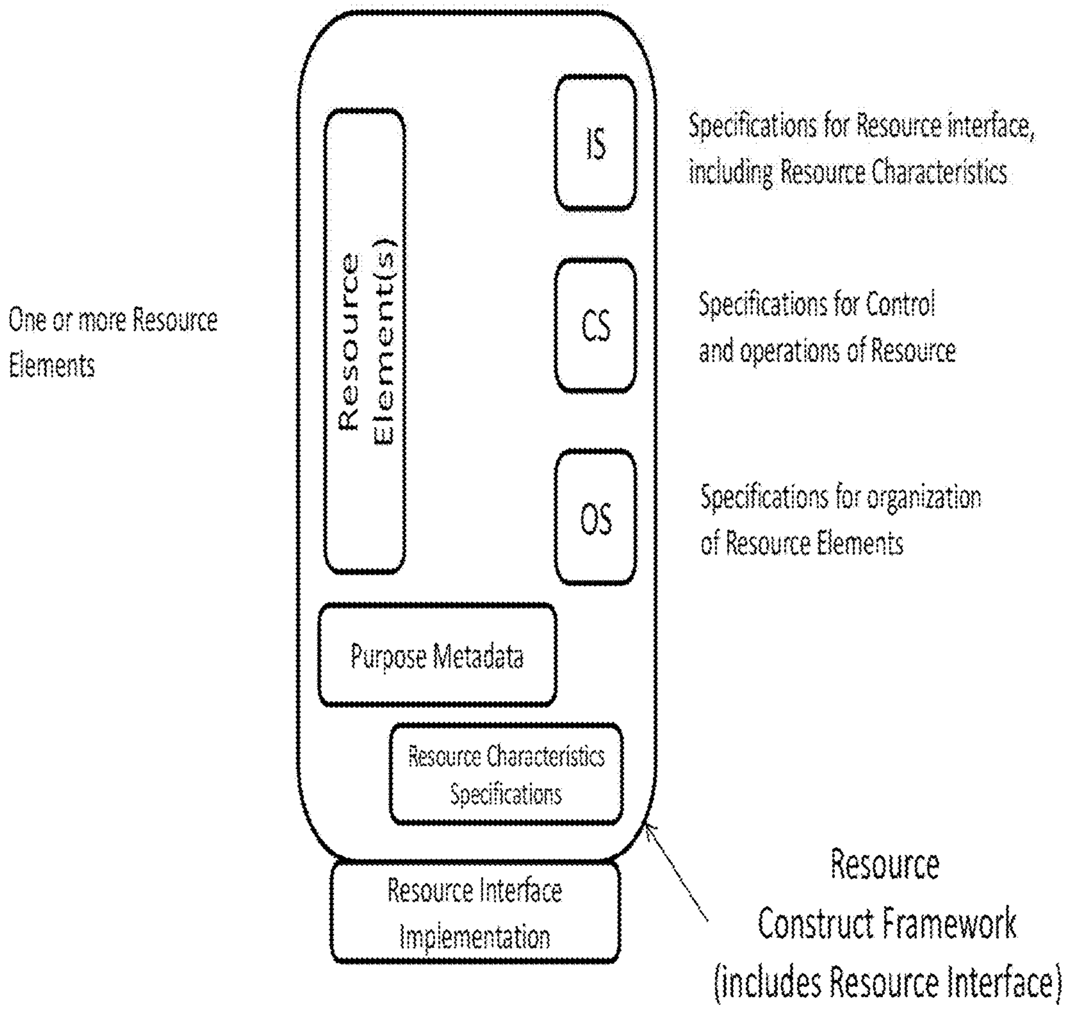

FIG. 22 is an illustrative example of a "generic" resource.

Figure 23:
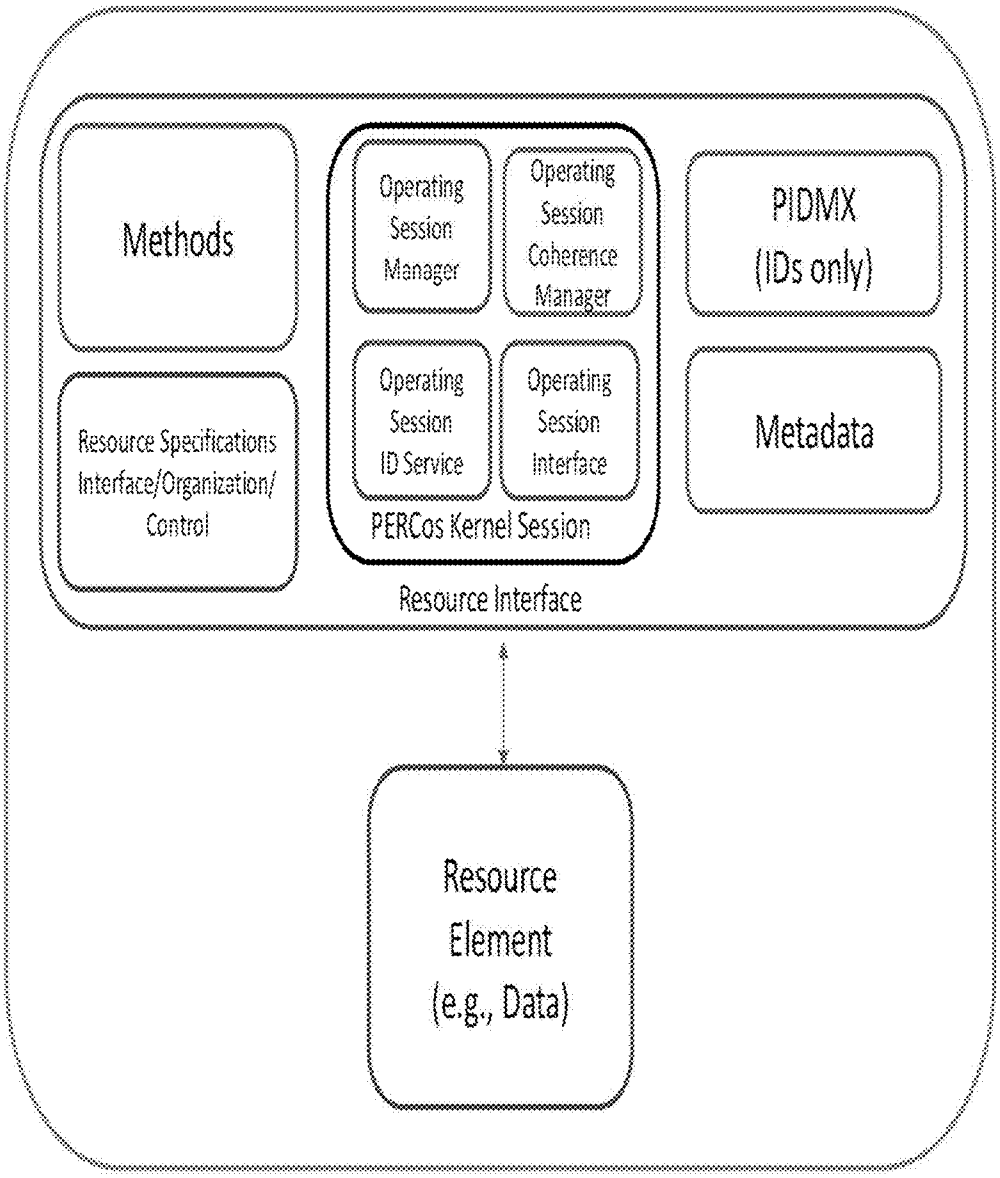

FIG. 23 is an example resource with access through resource interface and a single resource element.

Figure 24:
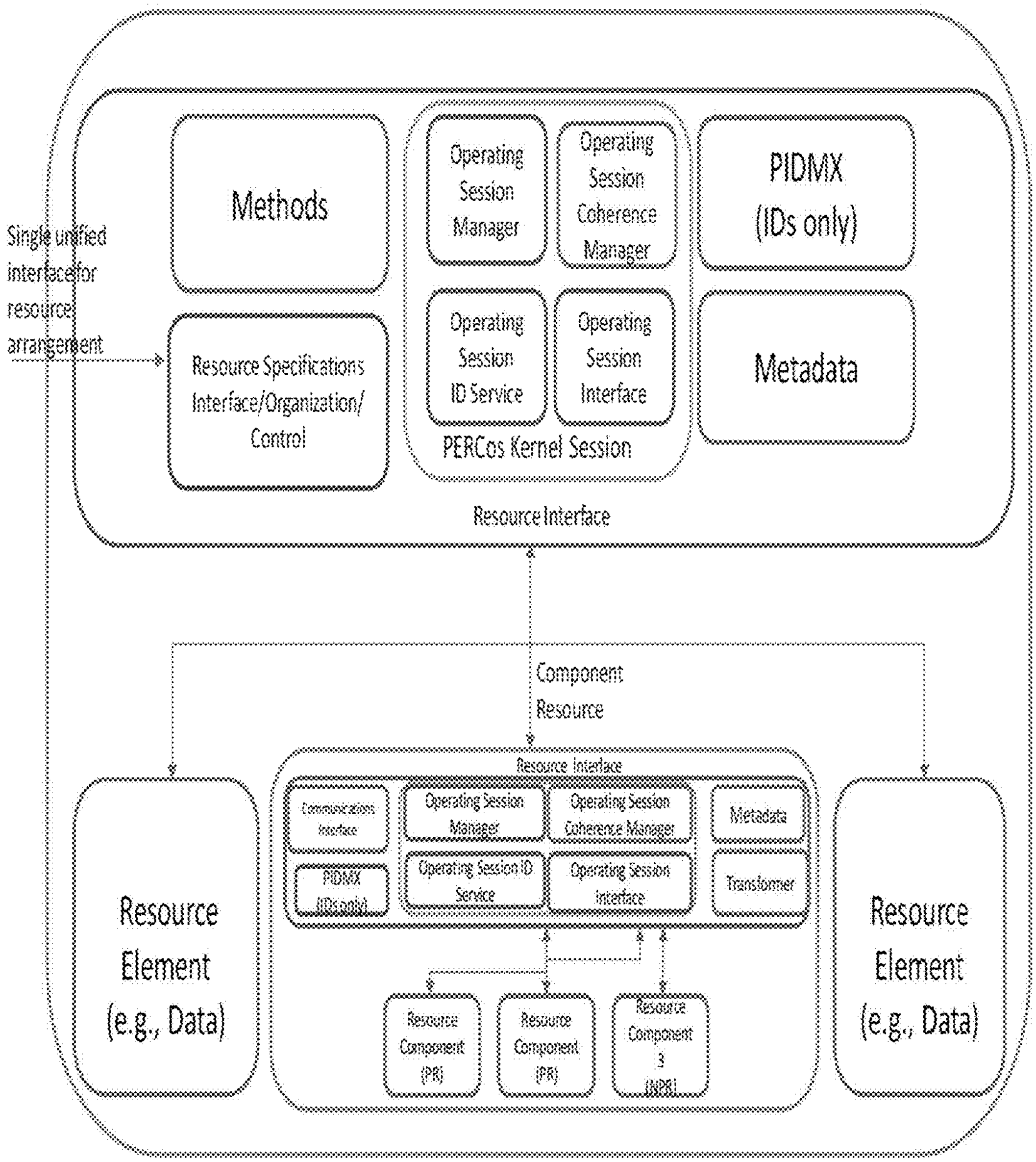

FIG. 24 is an example resource with multiple resource elements, including component resource.

Figure 25:
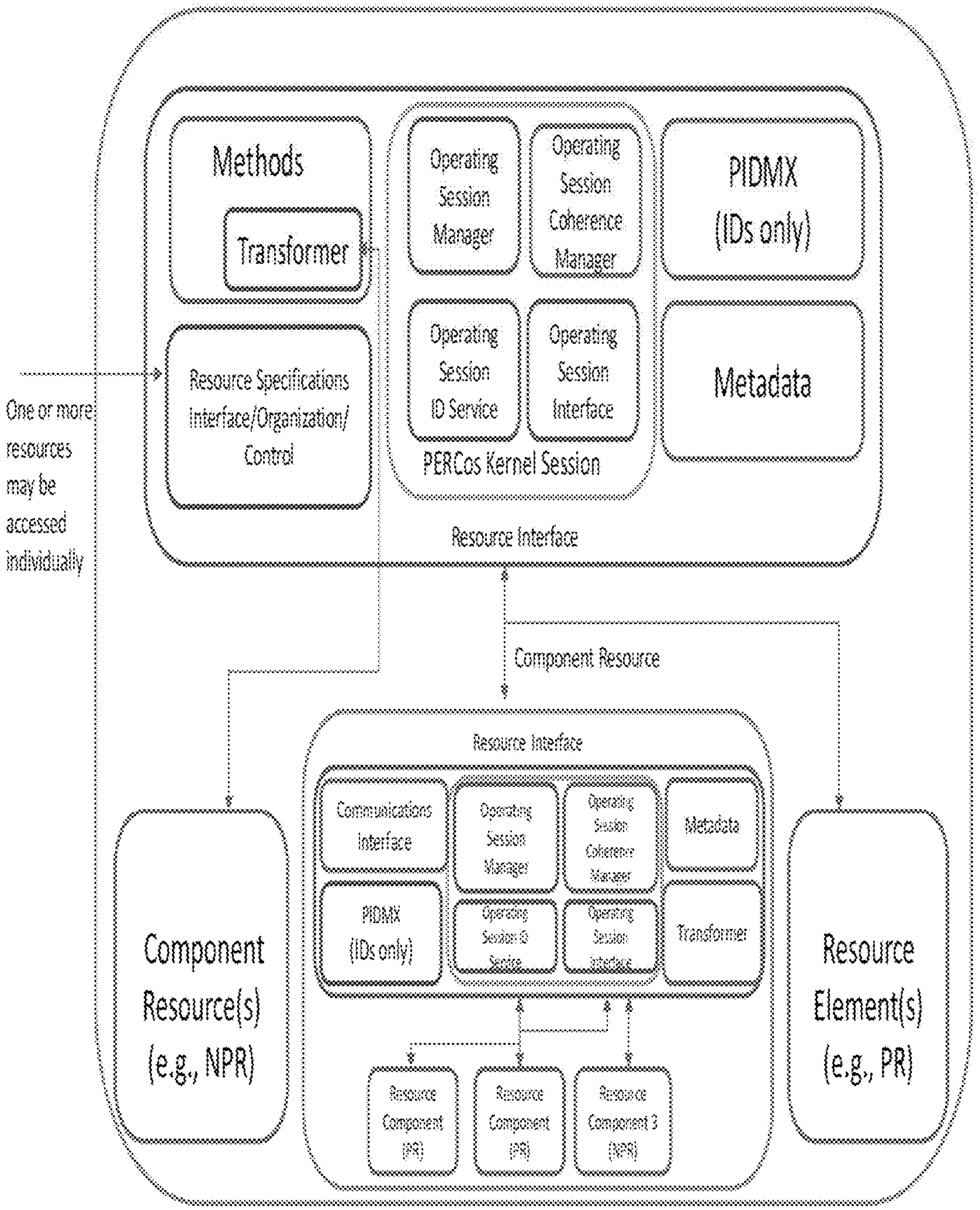

FIG. 25 is an example transparent resource.

Figure 26:
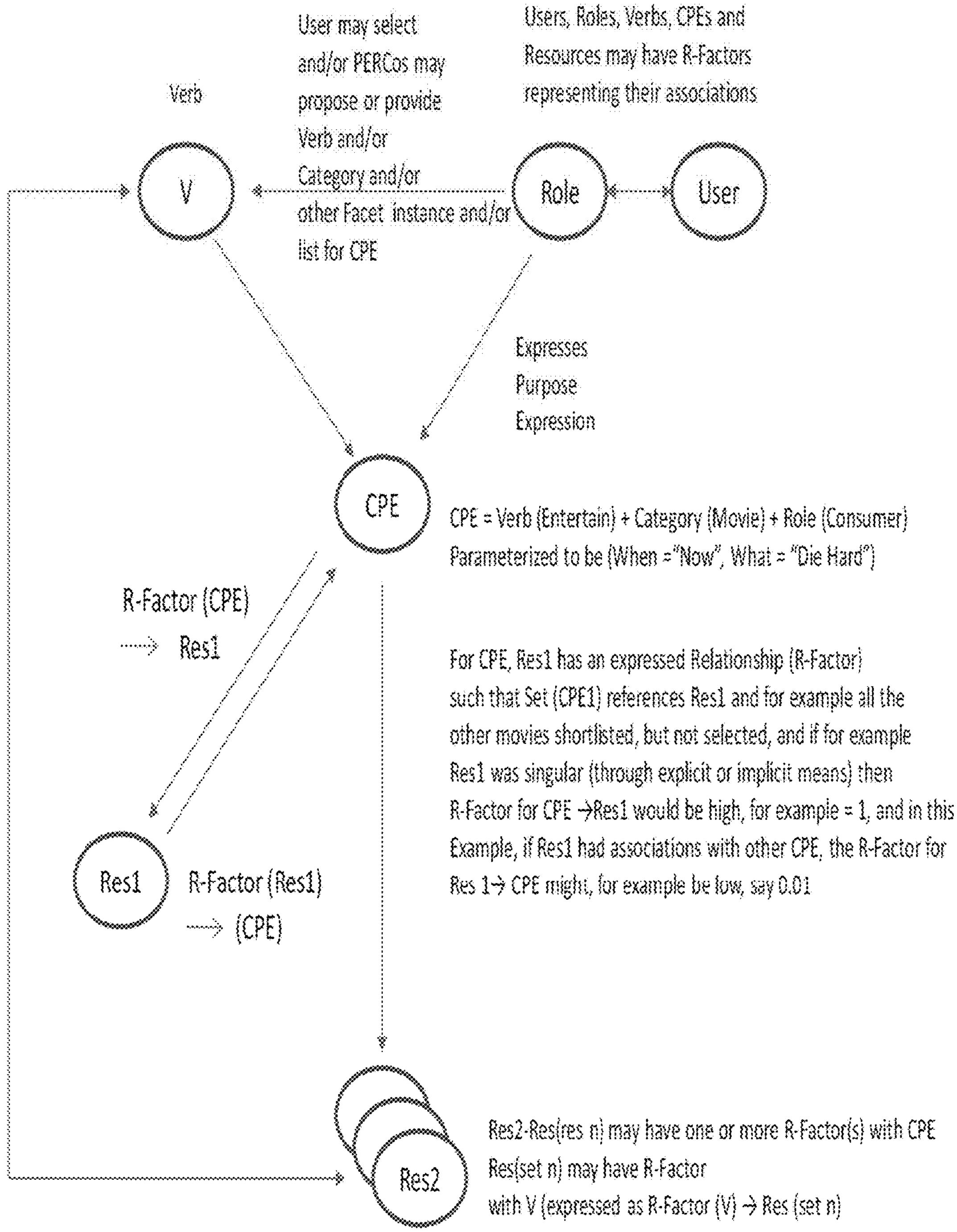

FIG. 26 is an illustrative example of resource relationship embodiments.

Figure 27:
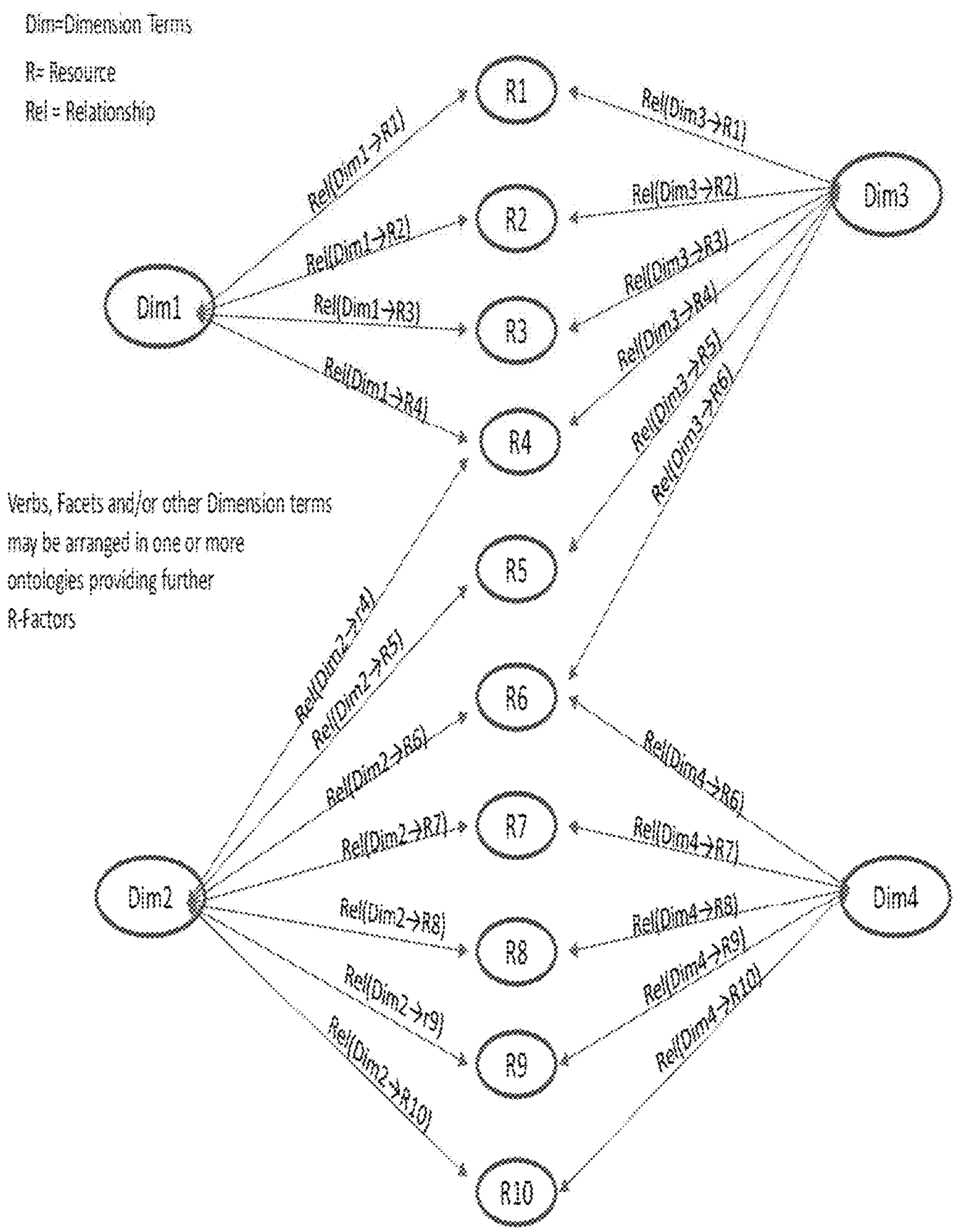

FIG. 27 is an illustrative example of relationships between resources and PERCos Dimension values.

Figure 28:
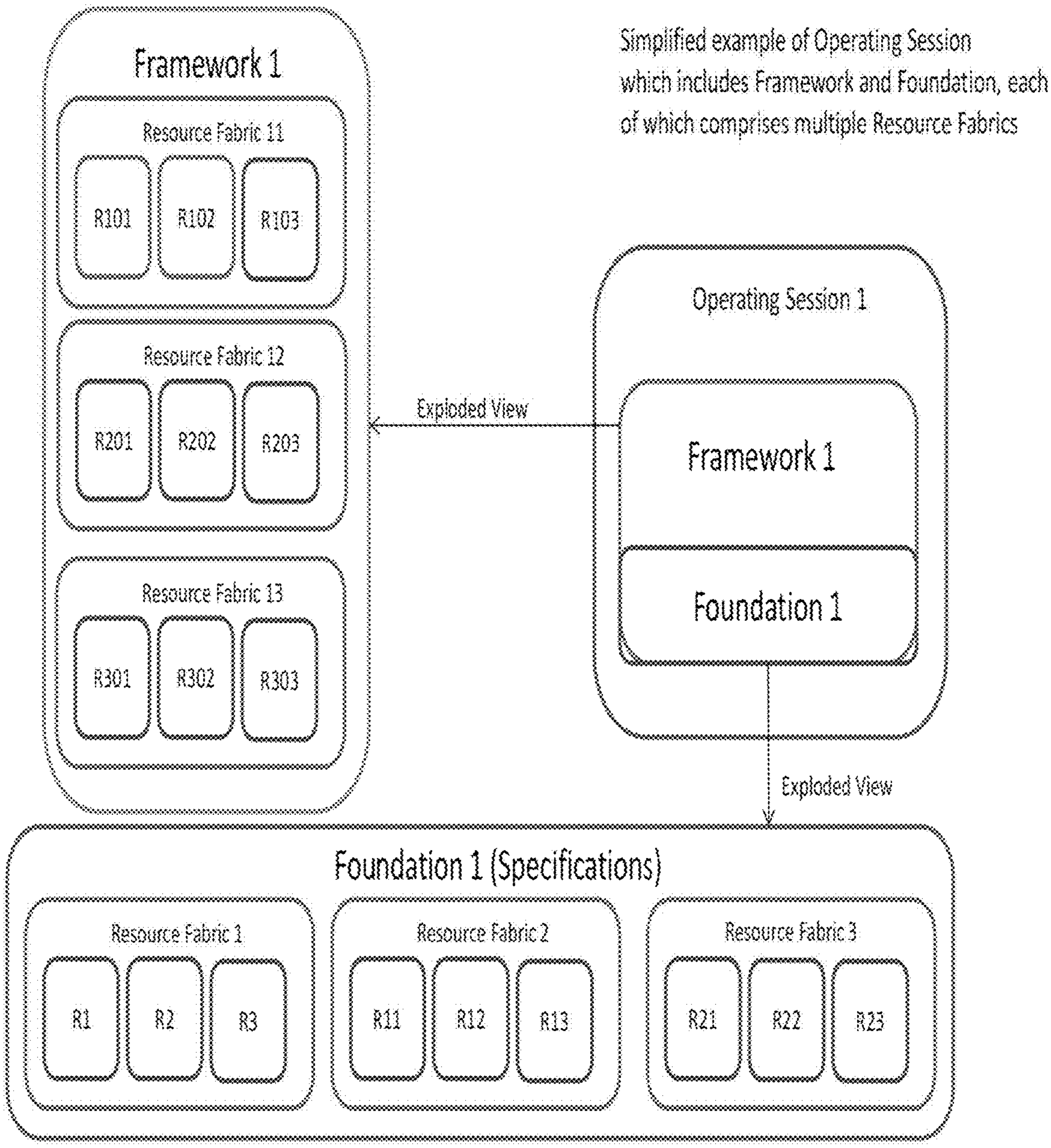

FIG. 28 is an illustrative example of operating session comprising Frameworks and Foundations.

Figure 29:
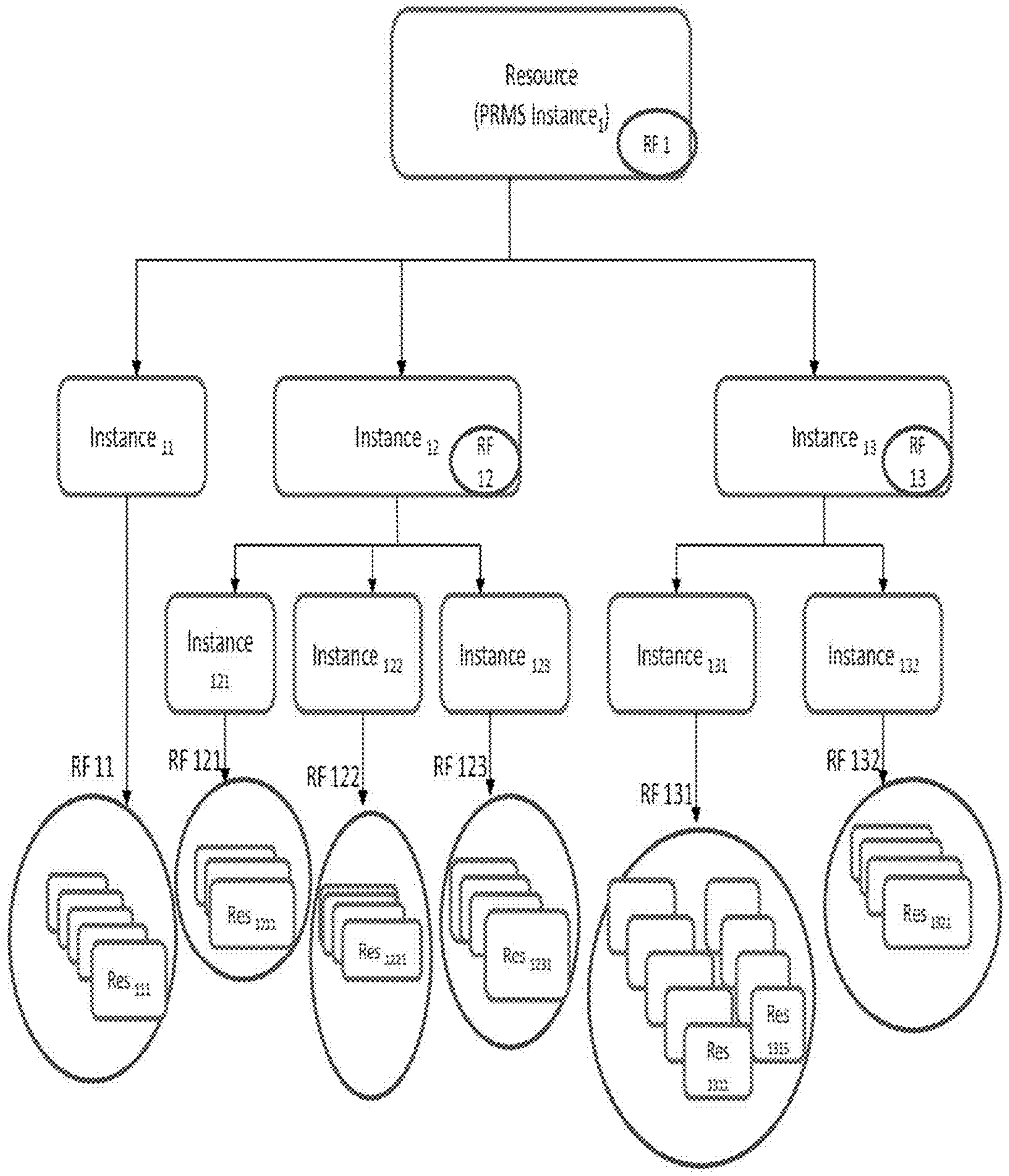

FIG. 29 is an example PRMS instance hierarchy.

Figure 30:
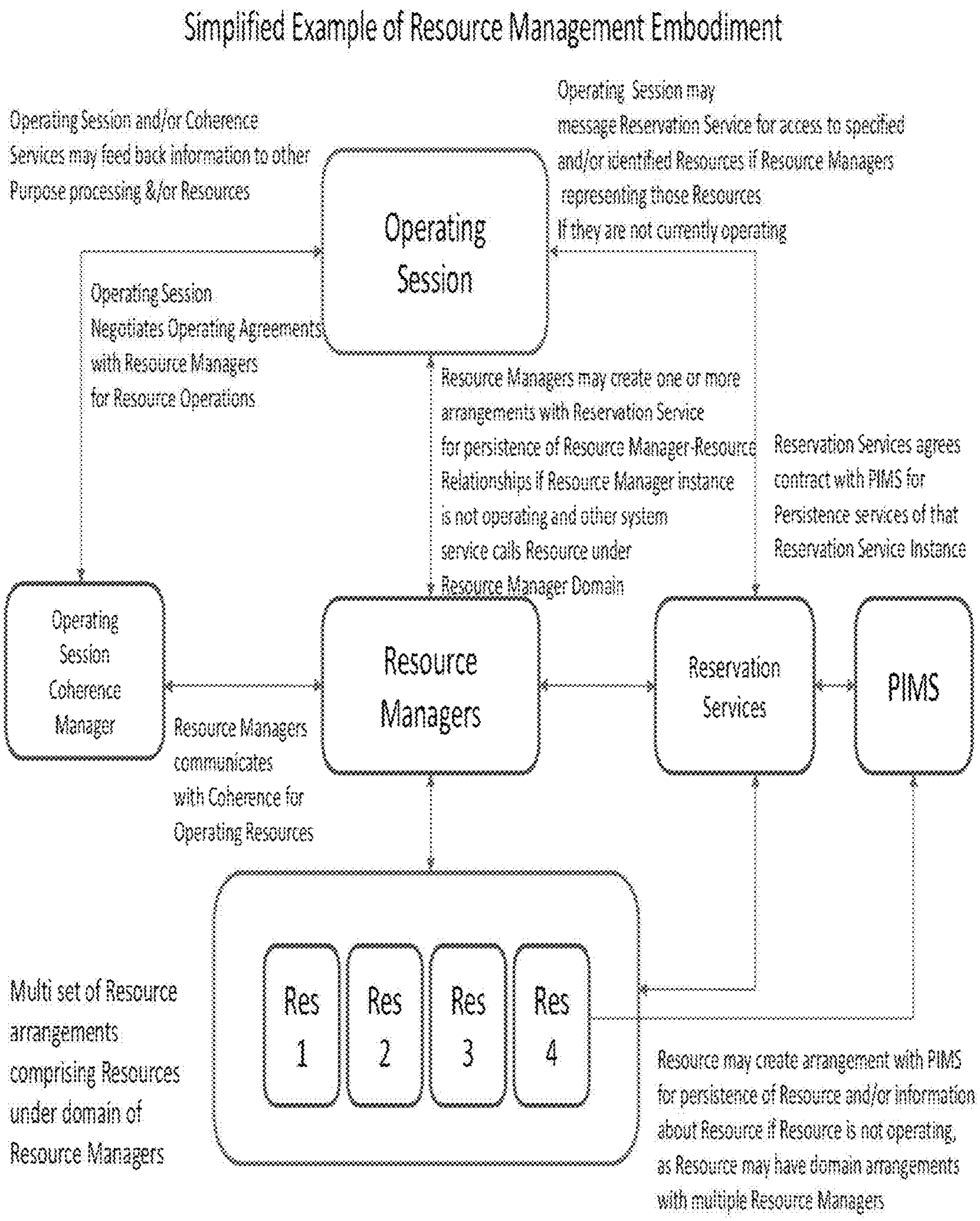

FIG. 30 is an illustrative example of simplified resource management embodiment.

Figure 31:
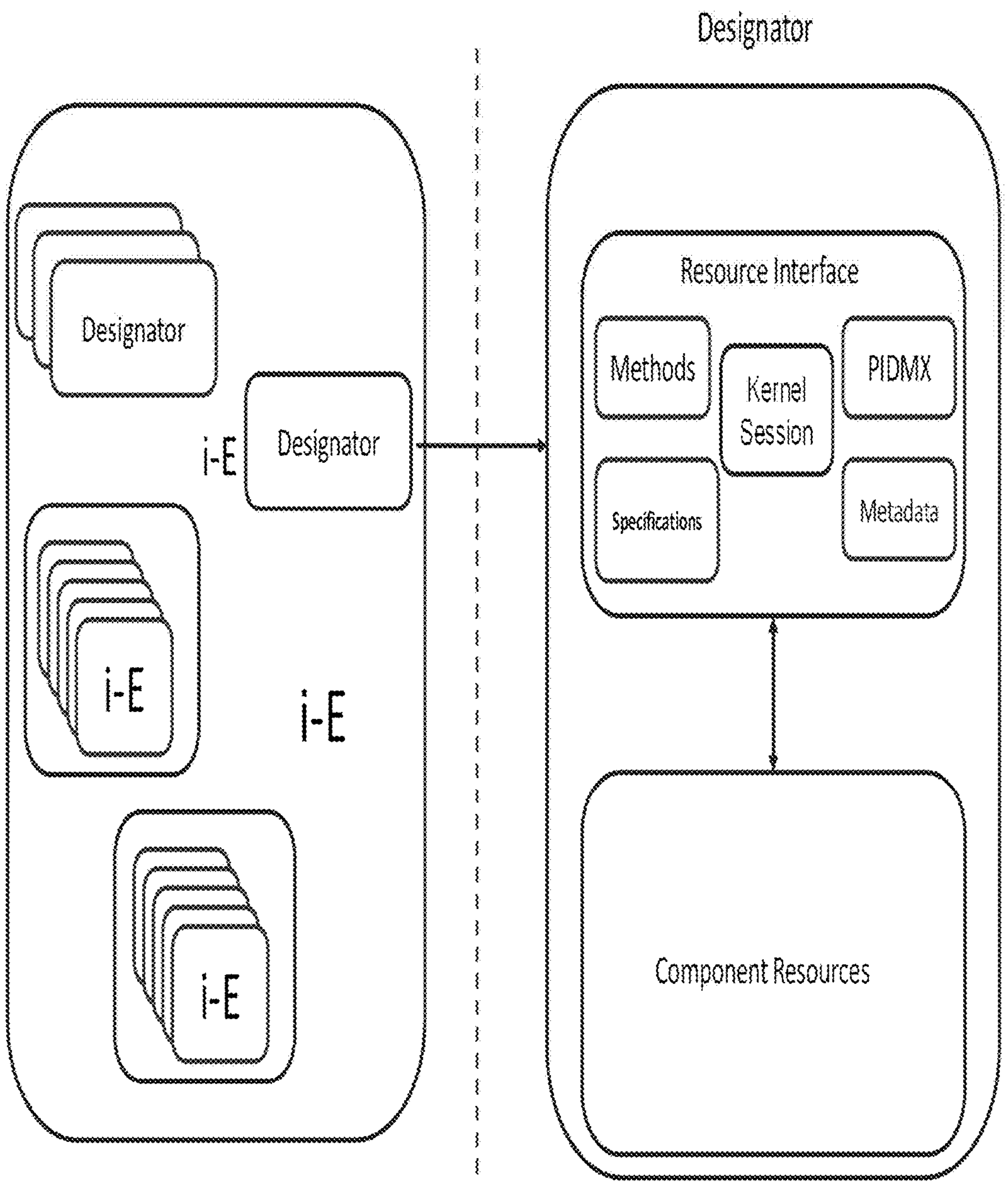

FIG. 31 is an example of the designator usage.

Figure 32:
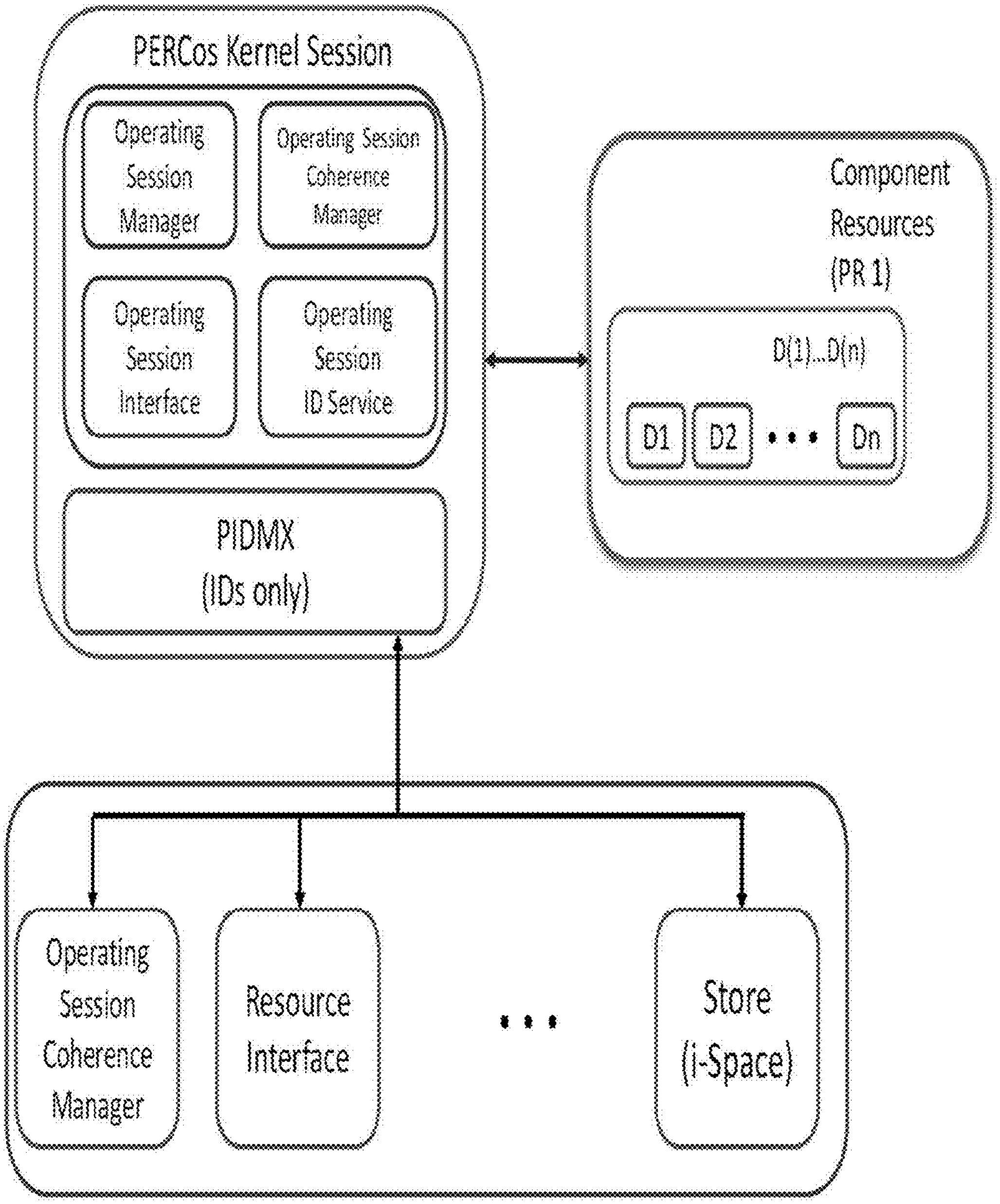

FIG. 32 is an illustrative example of accessing resources using designators.

Figure 33:
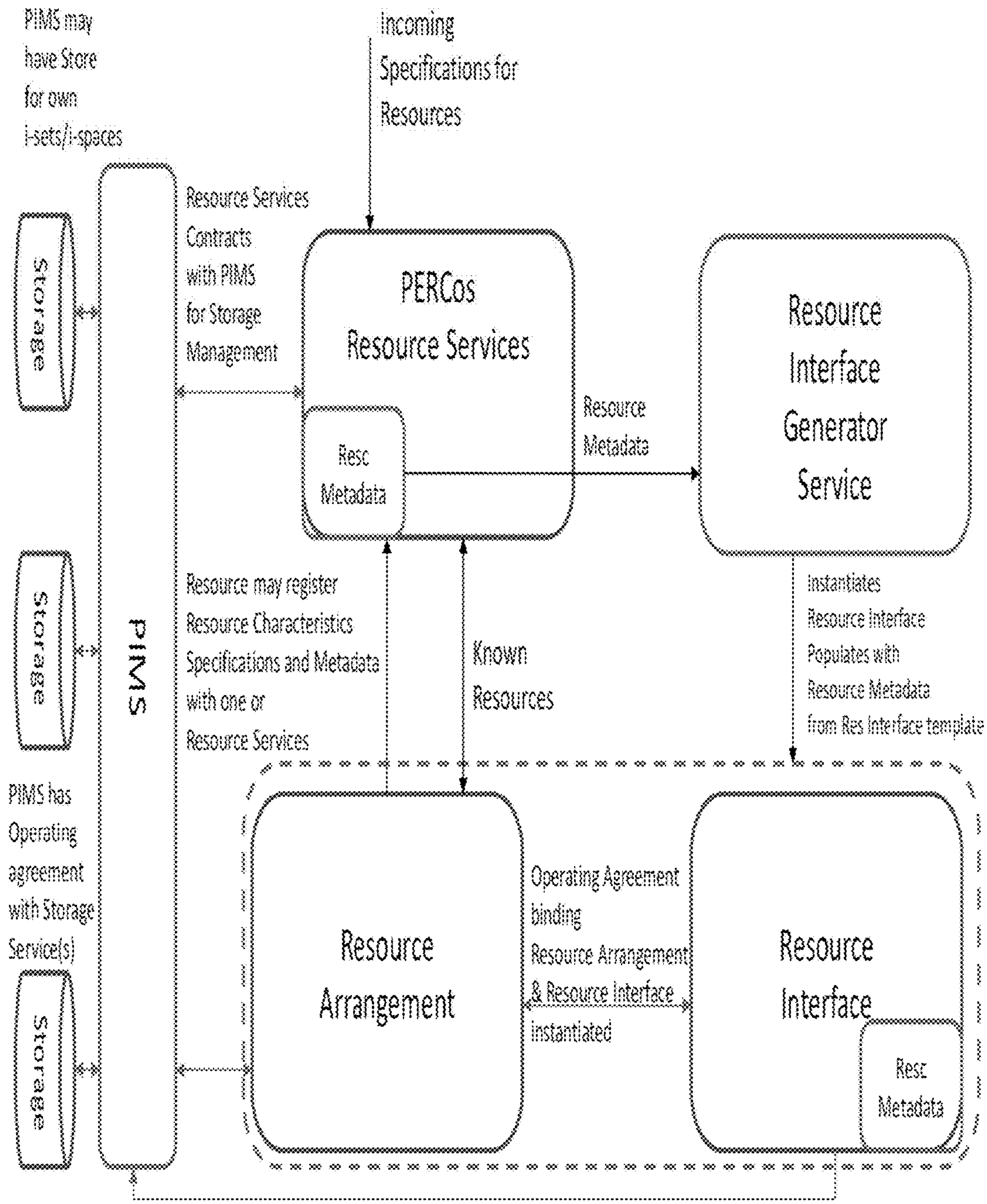

FIG. 33 is an example of interaction between PRMS elements.

Figure 34:
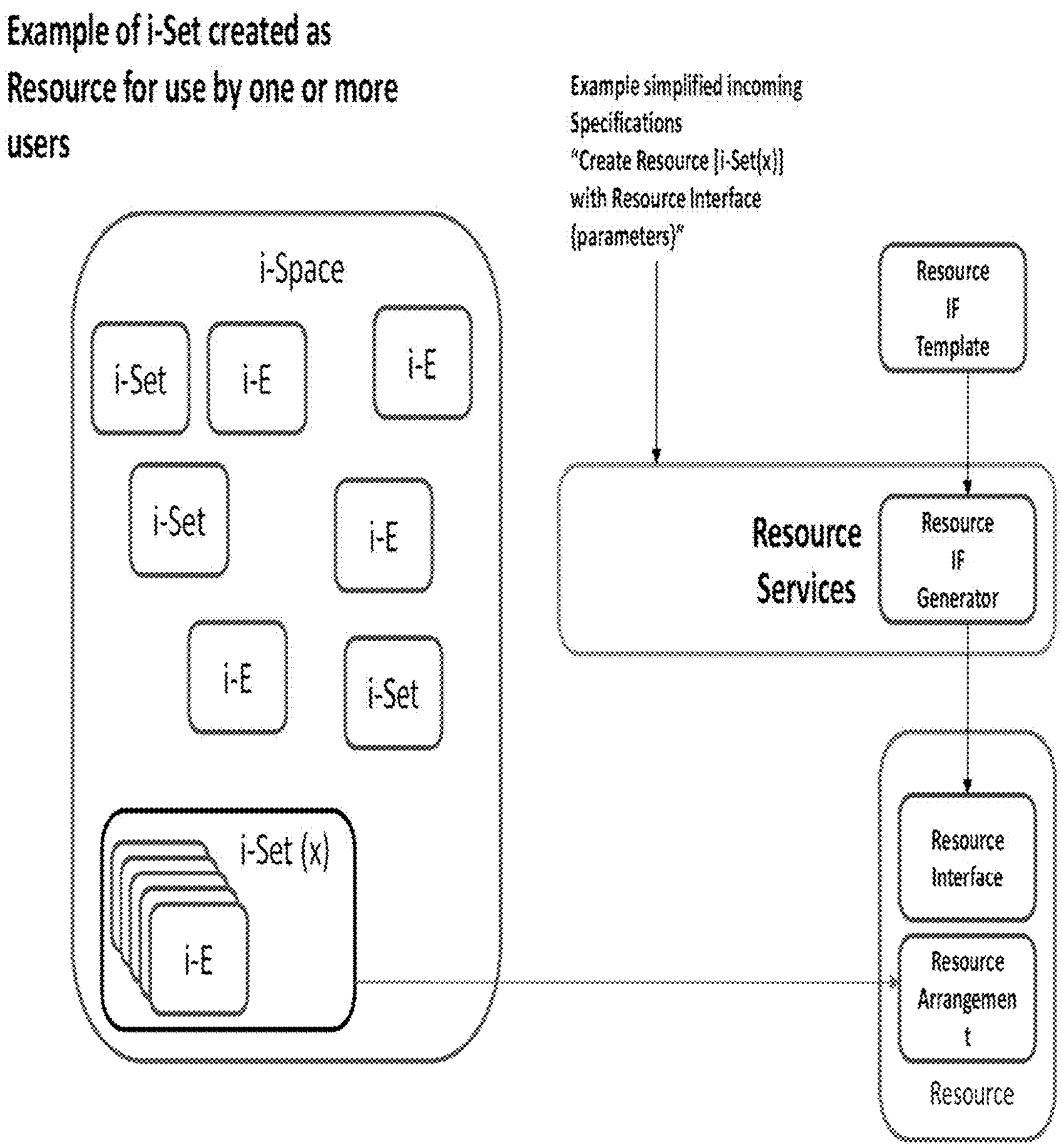

FIG. 34 is an example of i-Set created as resource for use by one or more users.

Figure 35:
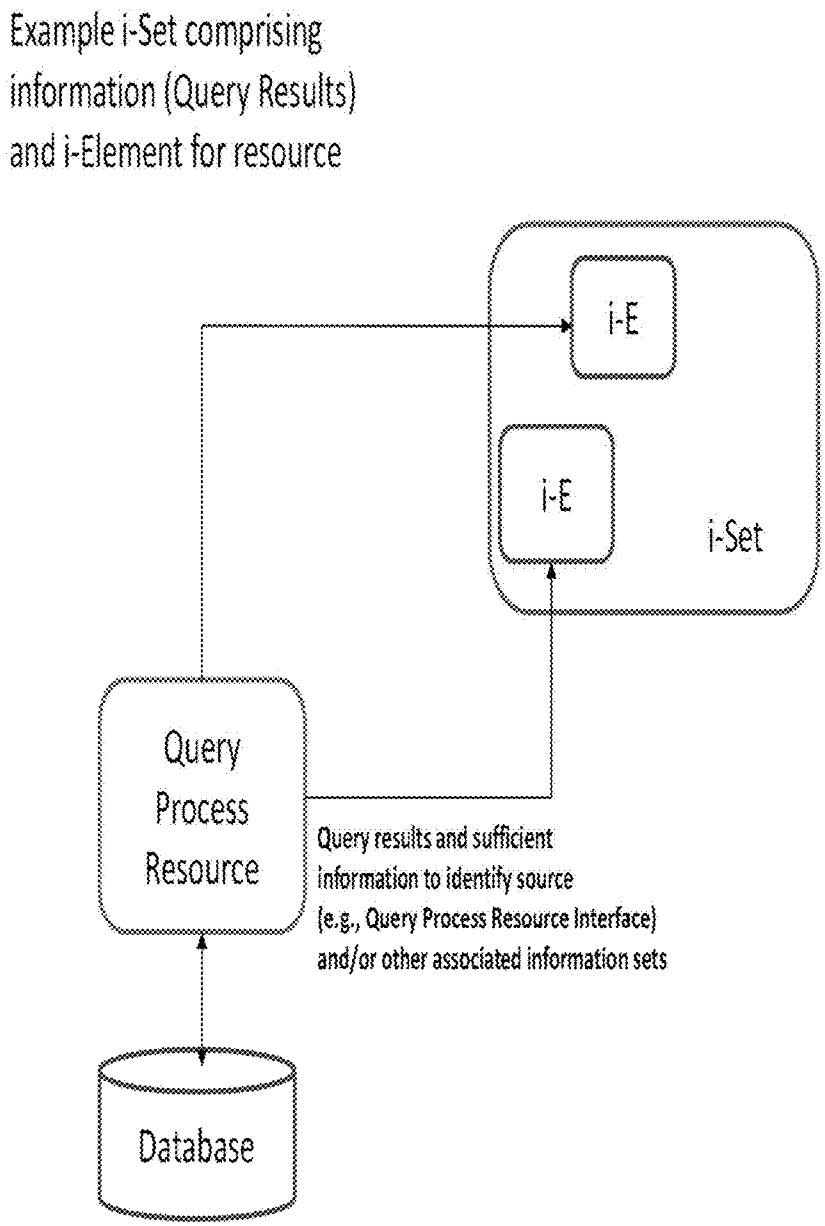

FIG. 35 is an example i-Set comprising Information (query results) and i-Element for resource.

Figure 36:
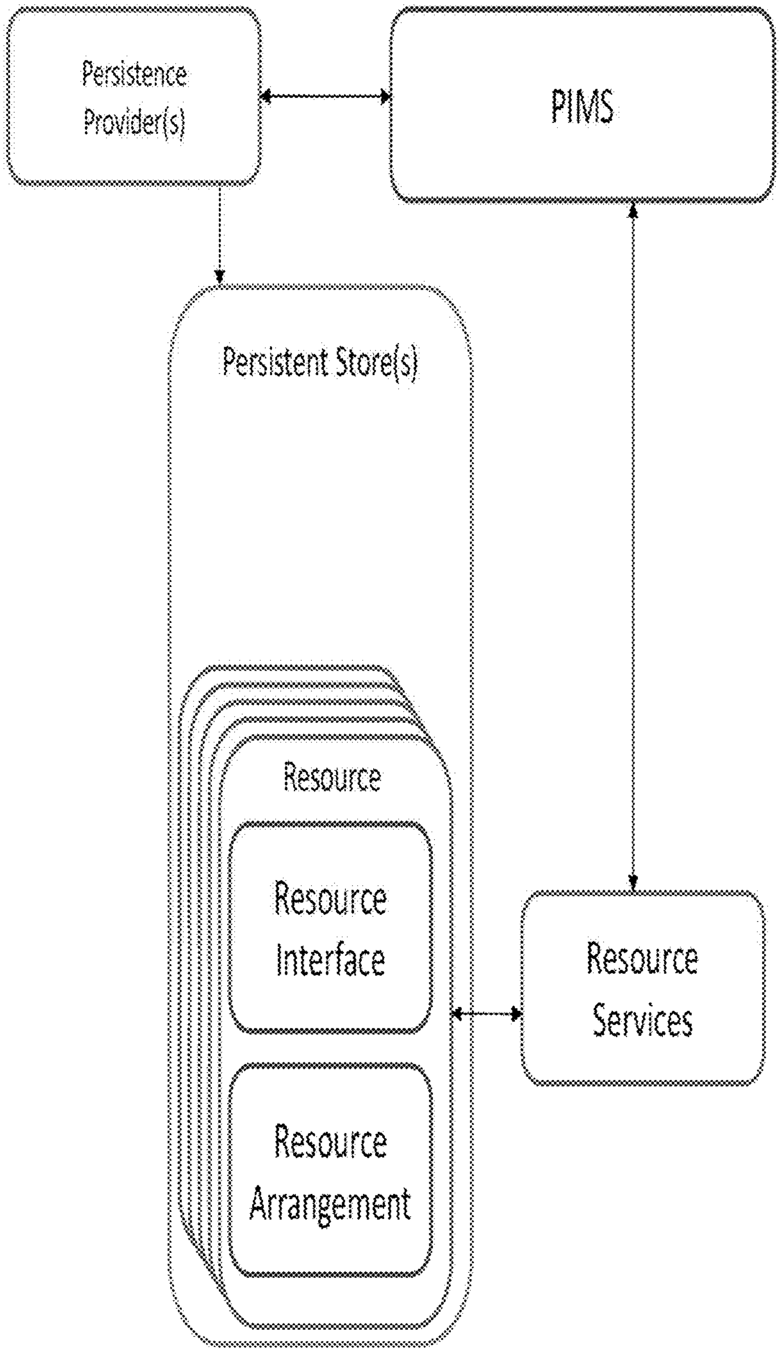

FIG. 36 is an illustration of interaction between PIMS, Resource Services, and Persistence Services.

Figure 37:
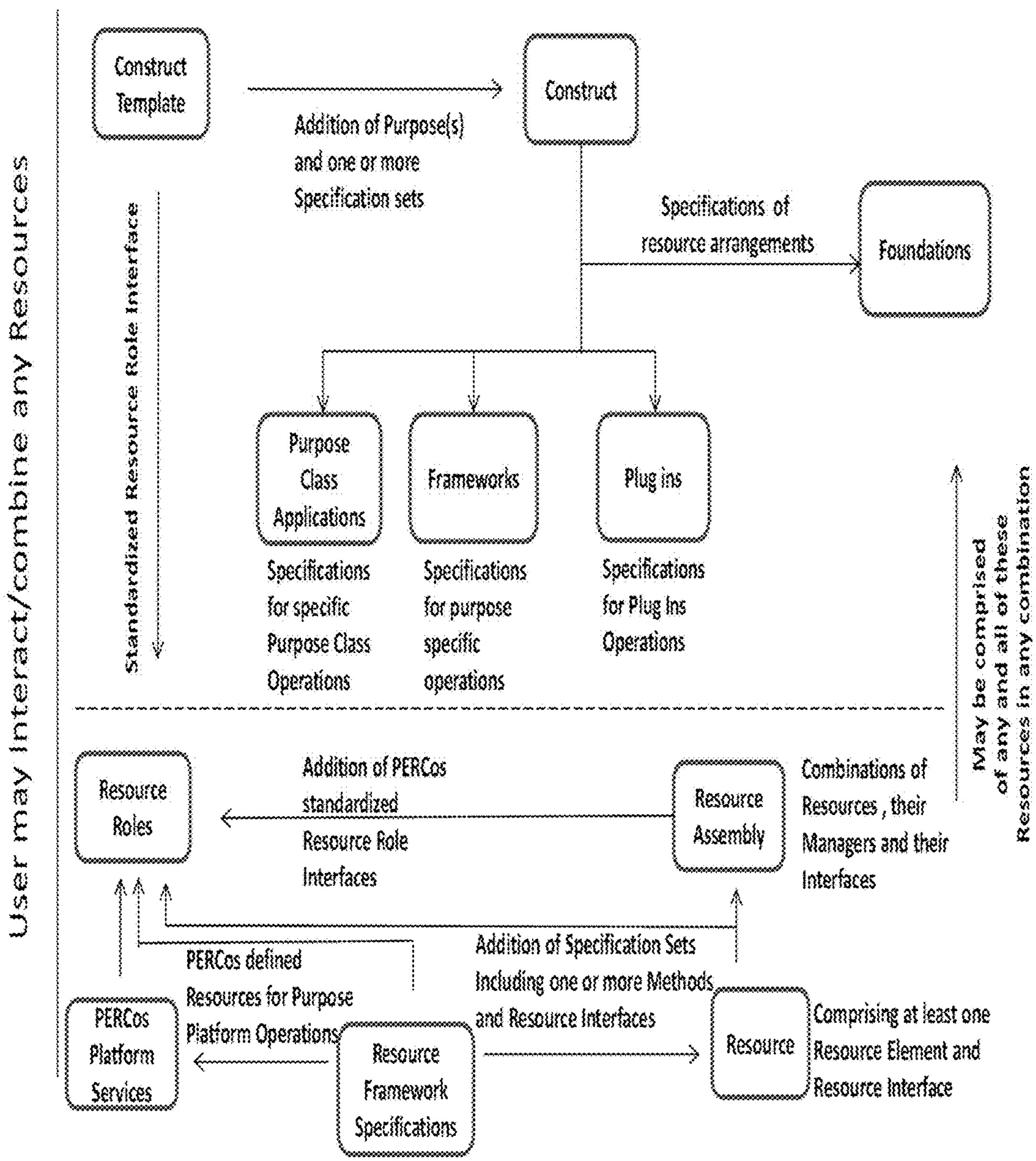

FIG. 37 is an illustrative example of Construct types including comprising resources.

Figure 38:
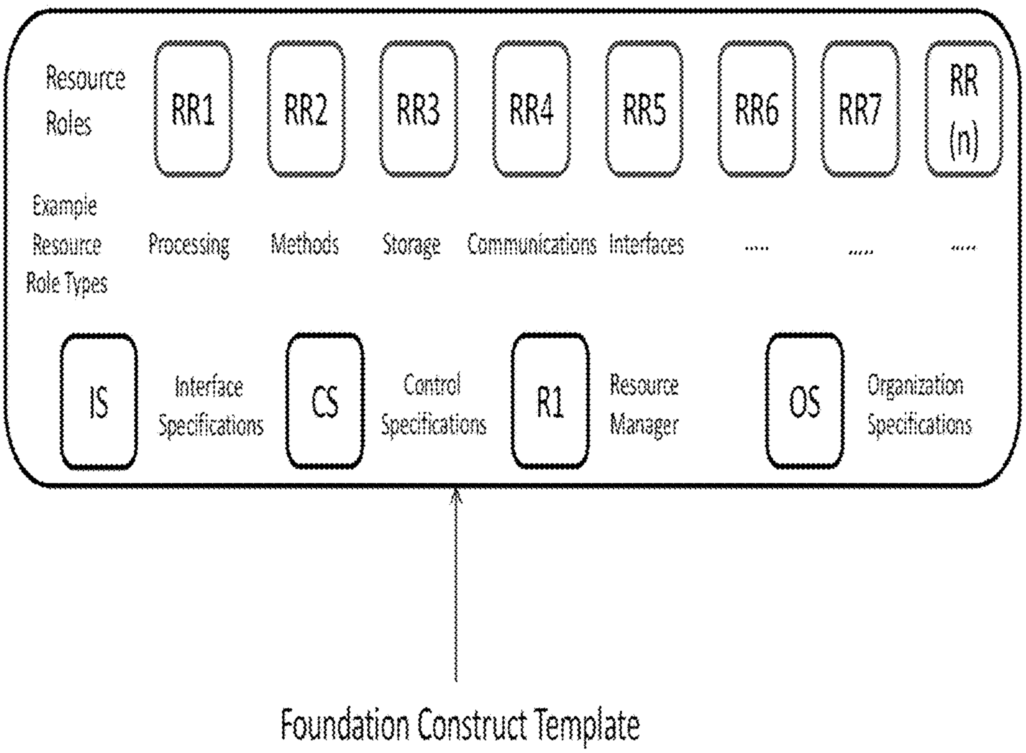

FIG. 38 is an example Foundation Construct template.

Figure 39:
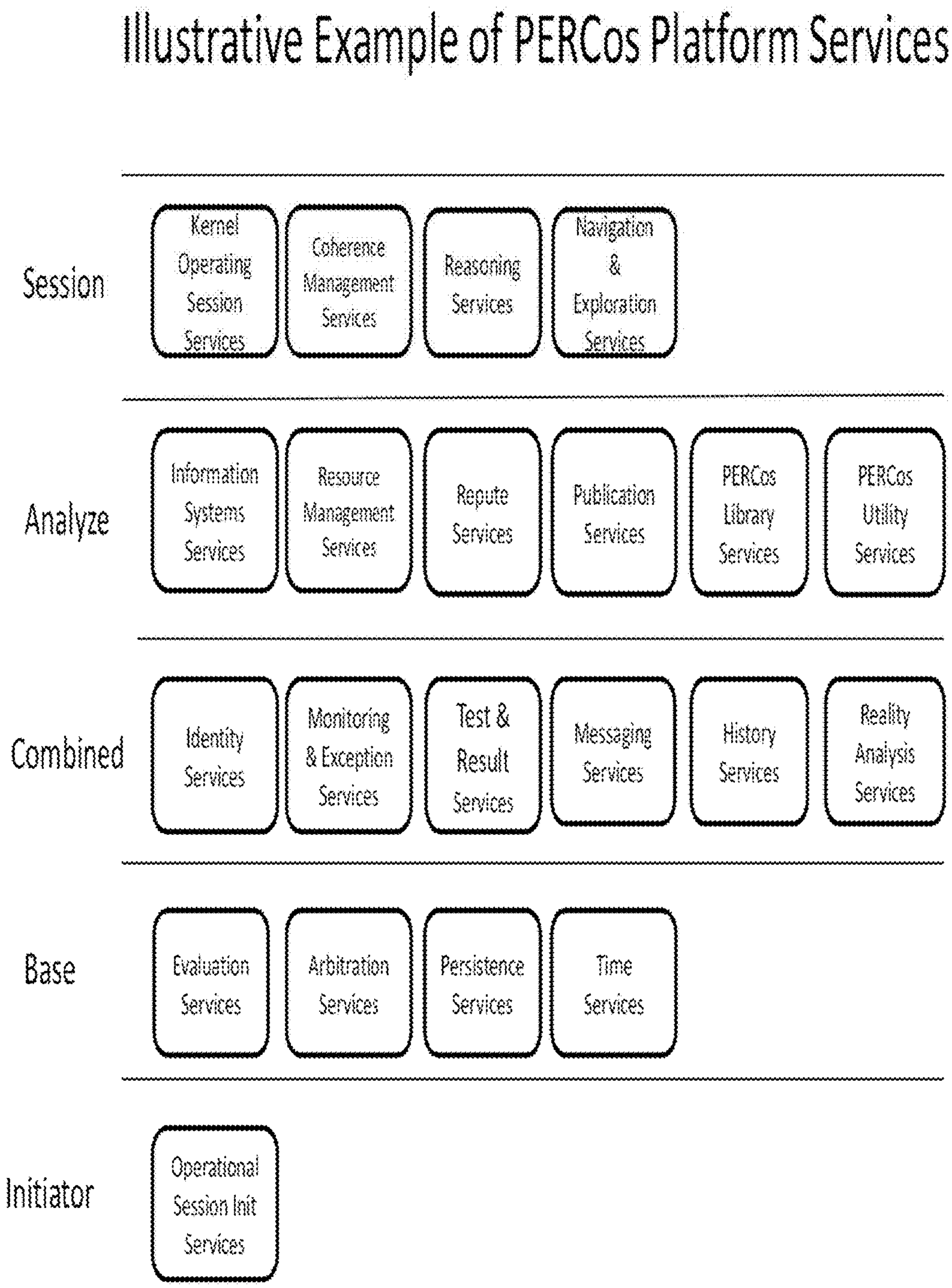

FIG. 39 is an illustrative example of PERCos Platform Services.

Figure 40:
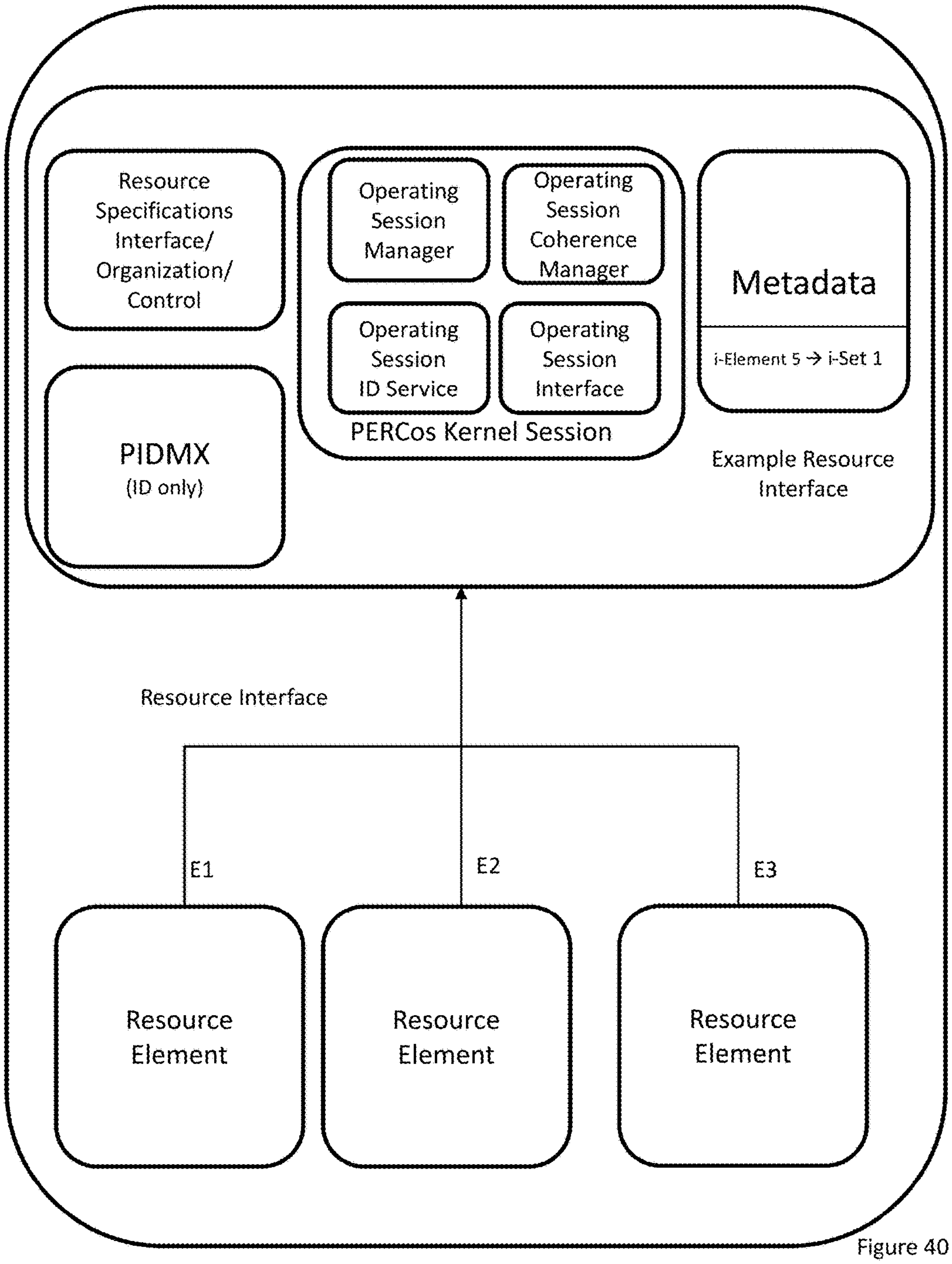

FIG. 40 is an example of PIMS Structure for resource R.

Figure 41:
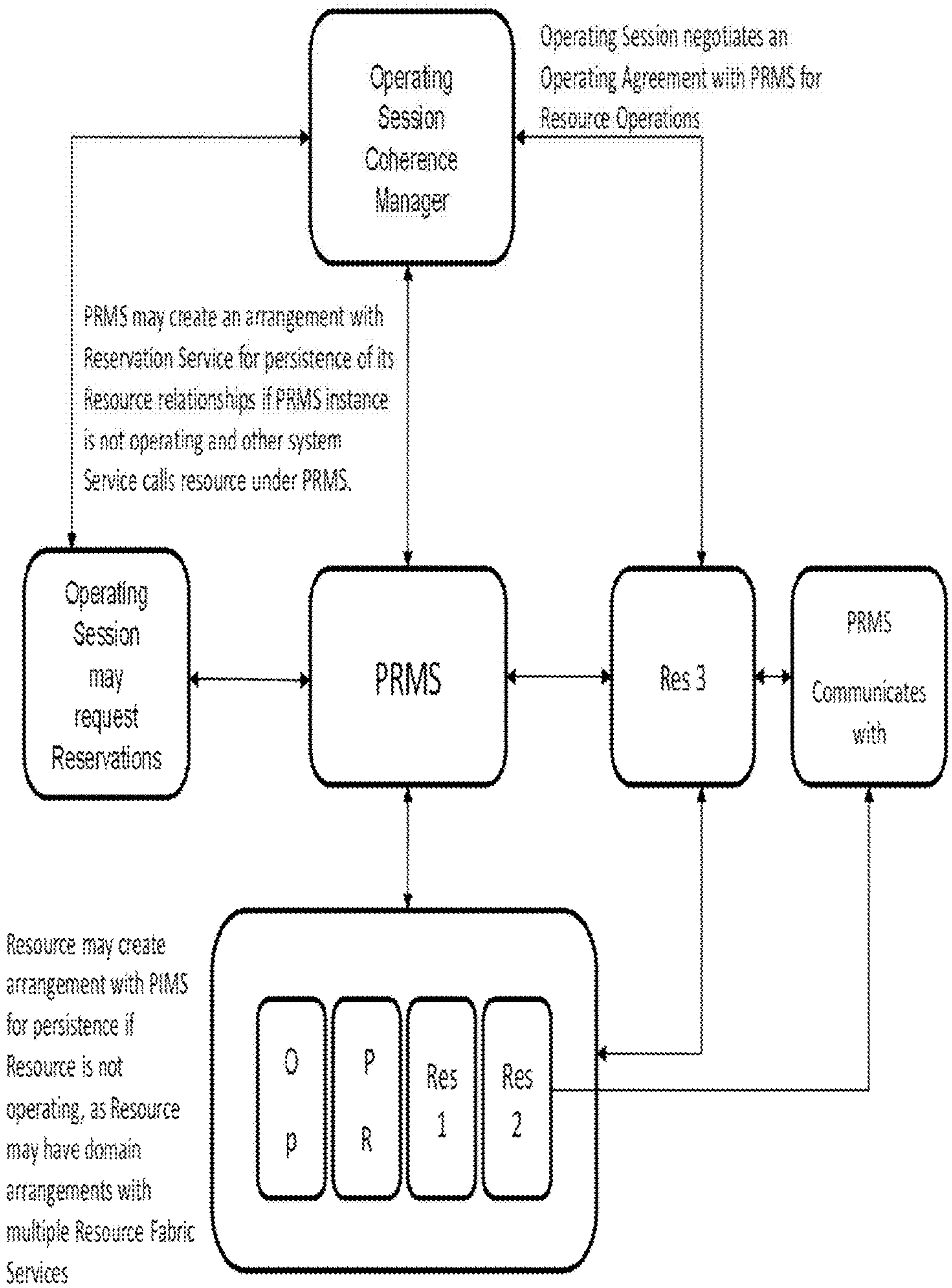

FIG. 41 is an example of PRMS interaction with operation session and Coherence manager.

Figure 42:
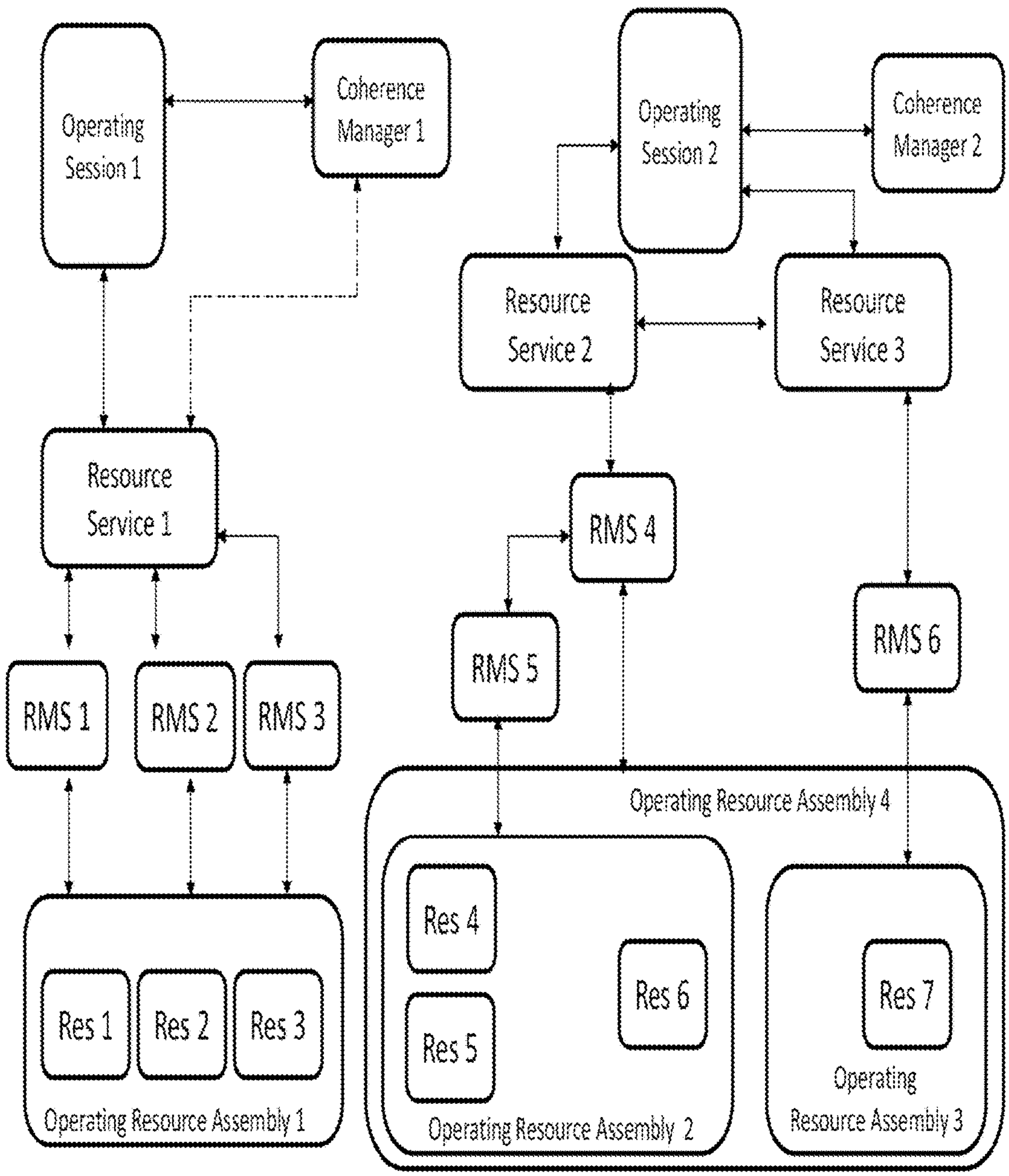

FIG. 42 is an example resource management system.

Figure 43:
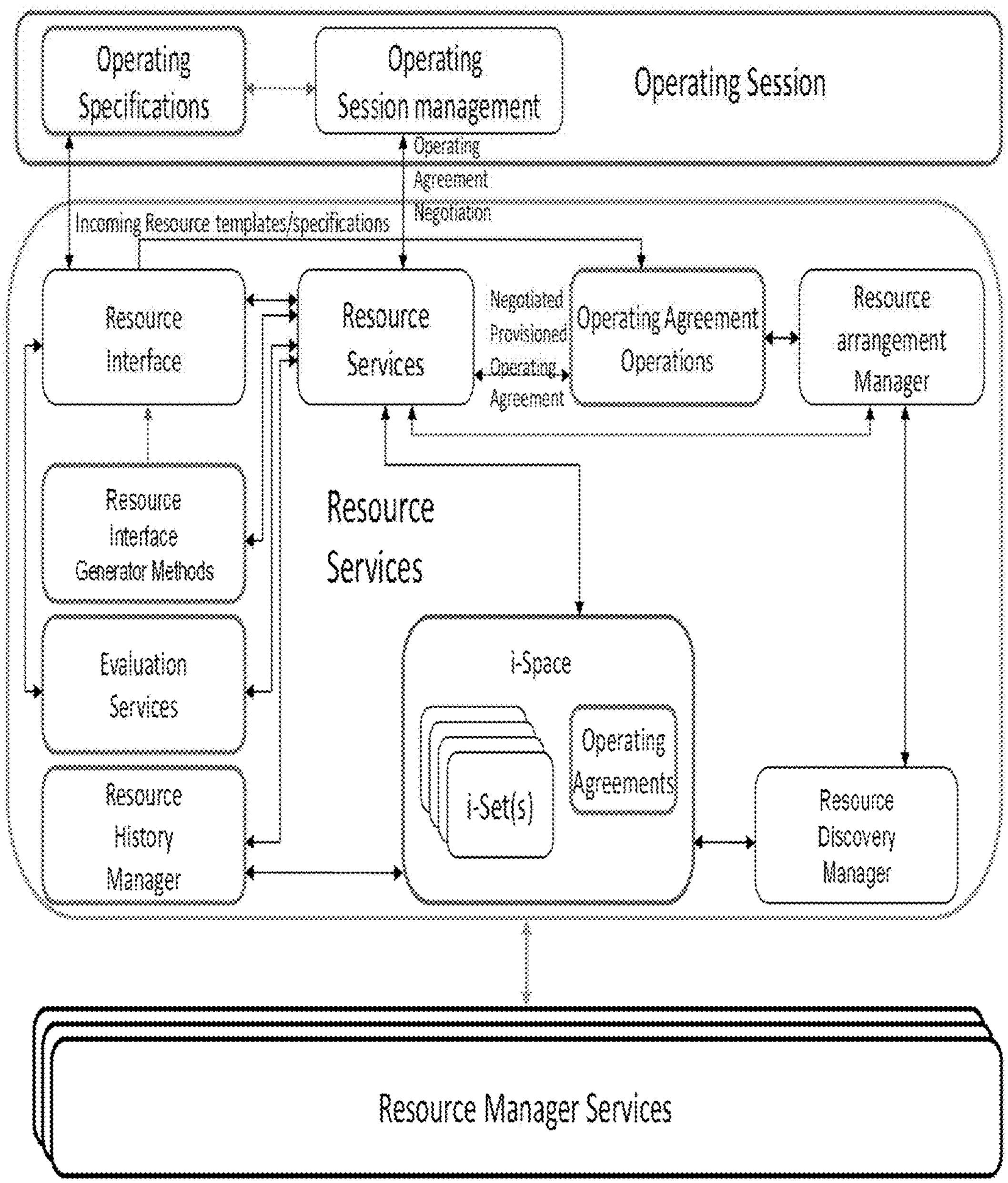

FIG. 43 is an example of resource service interaction.

Figure 44:
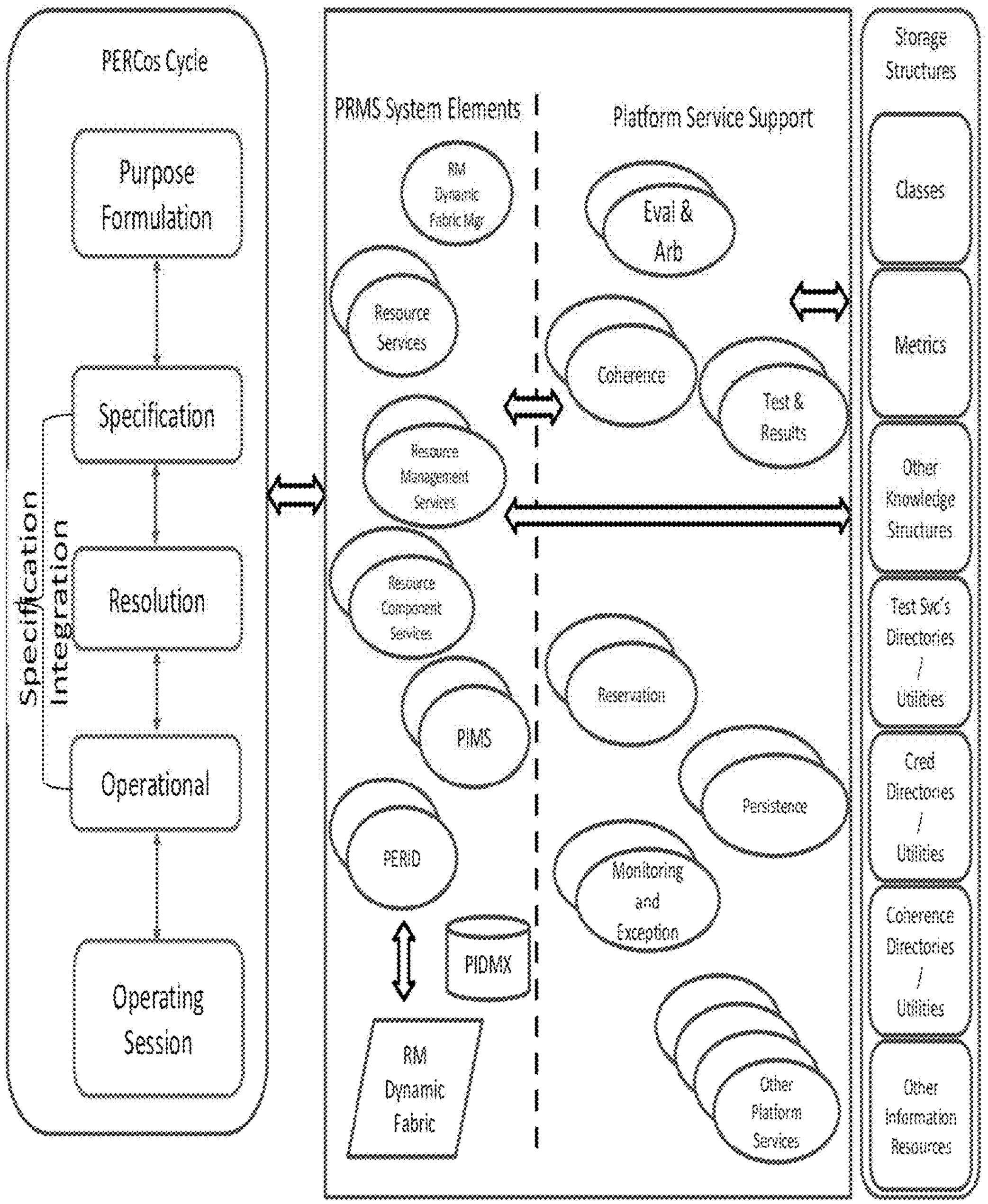

FIG. 44 is an example RMDF configuration.

Figure 45:
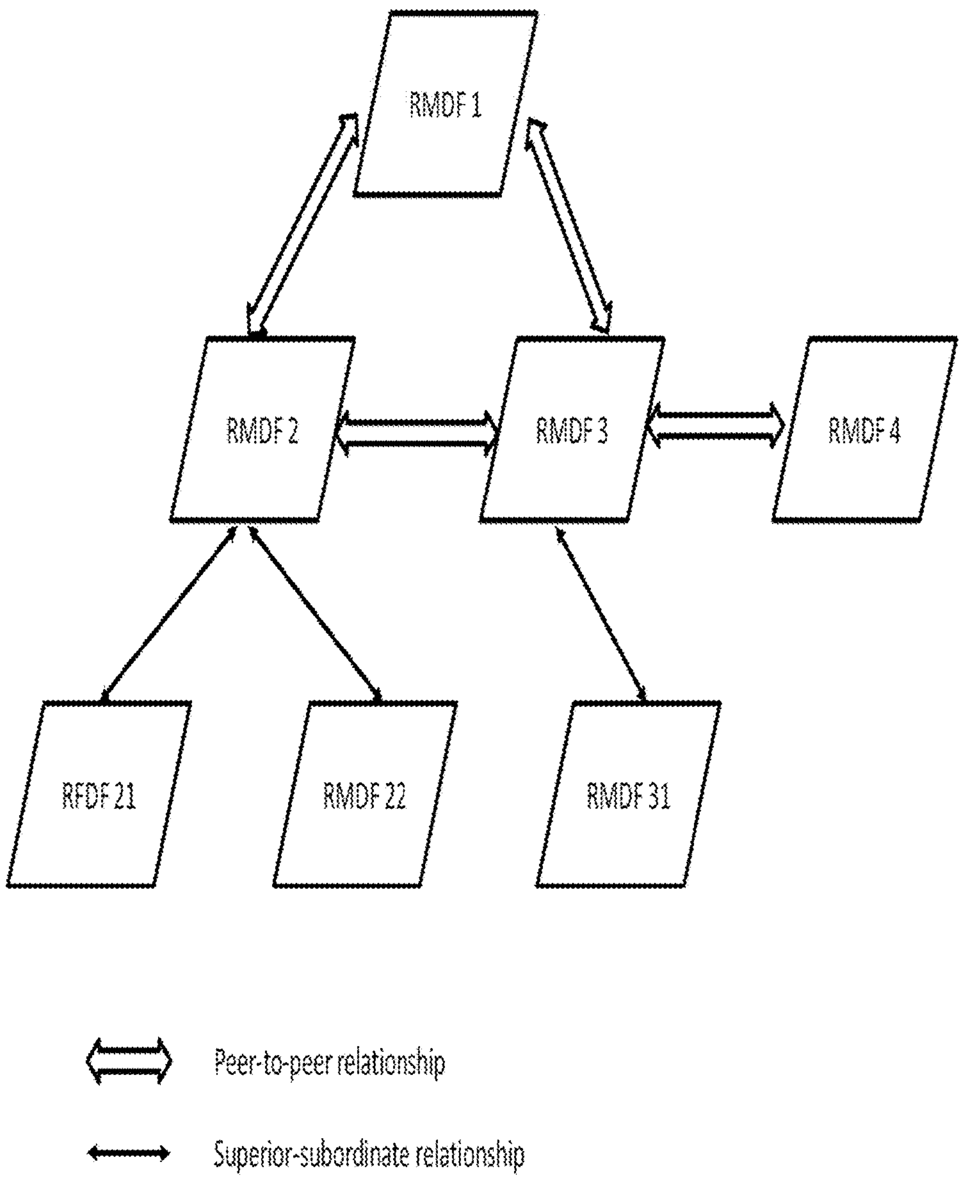

FIG. 45 is an example RMDF relationship.

Figure 46:
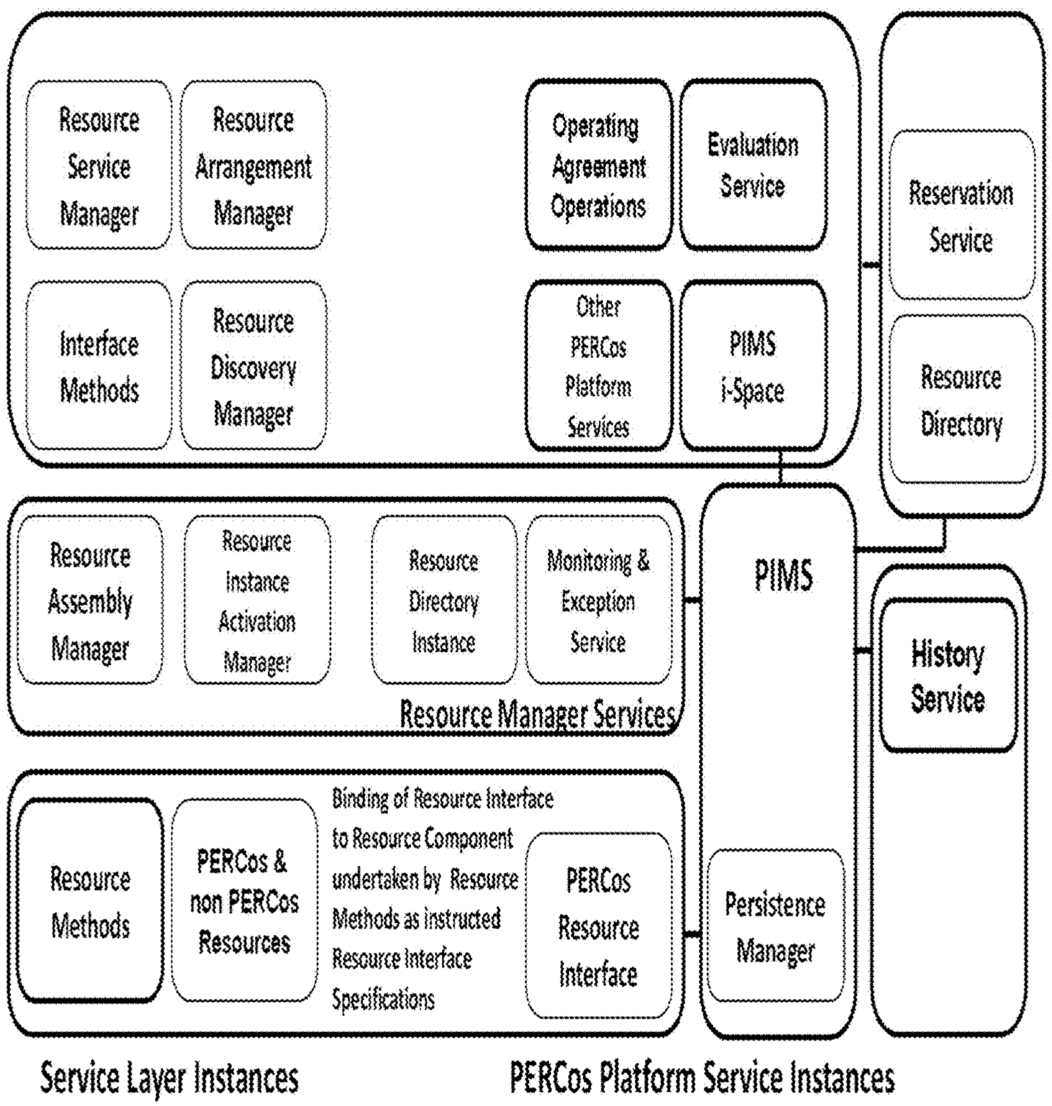

FIG. 46 is a simplified illustrative example of PERCos resource systems and service grouping.

Figure 47:
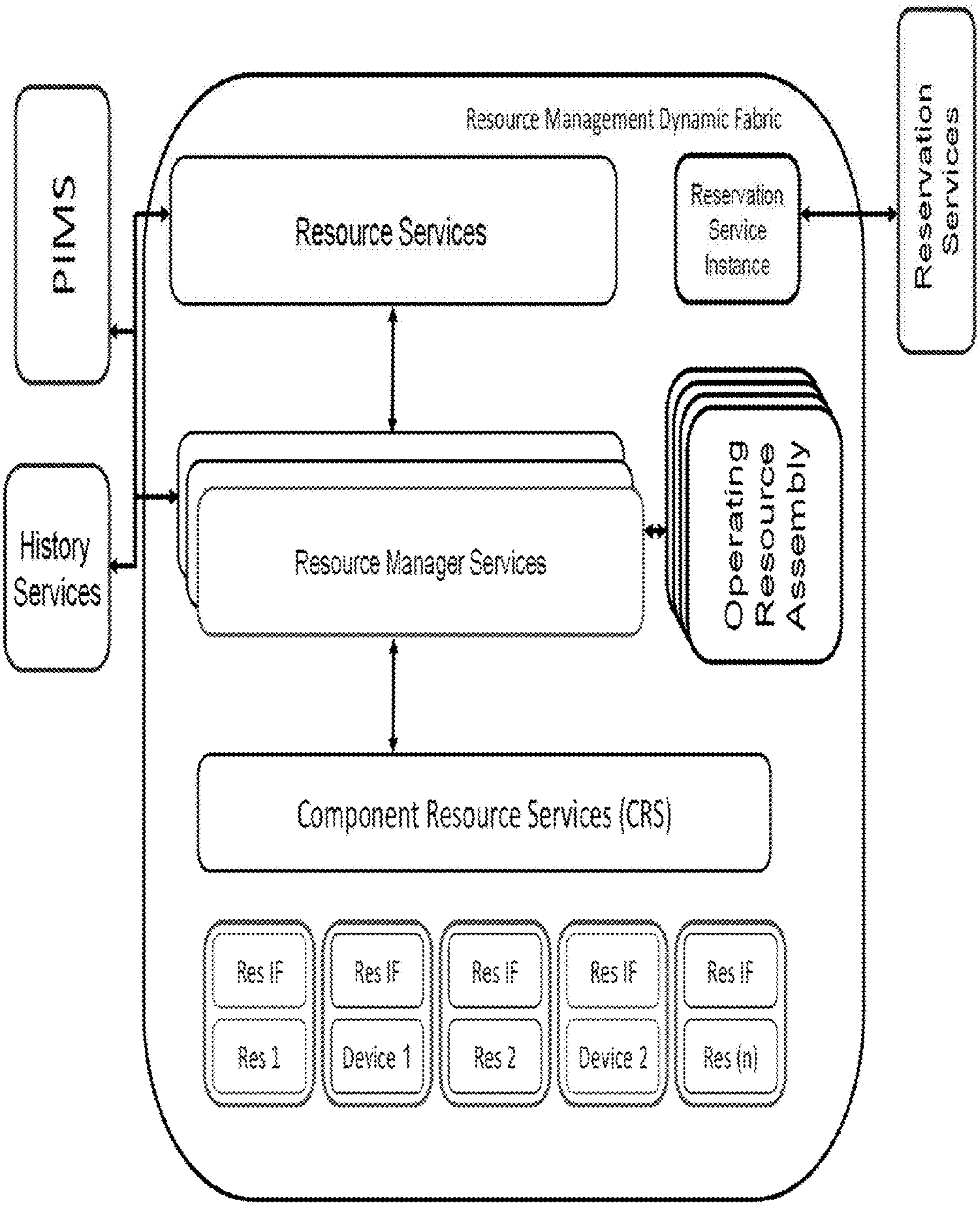

FIG. 47 is an example resource management assembly configuration.

Figure 48:
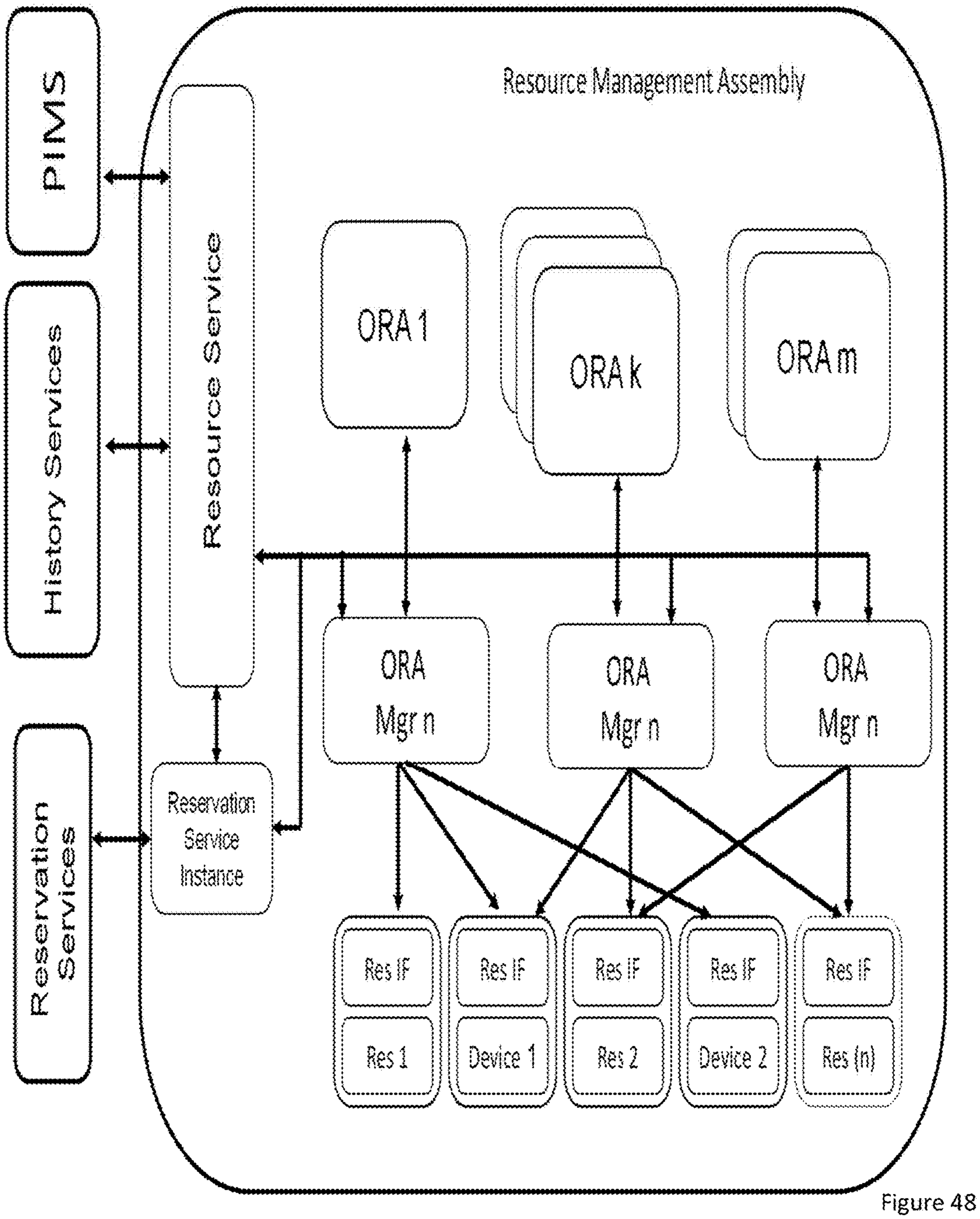

FIG. 48 is an example resource management assembly configuration.

Figure 49:
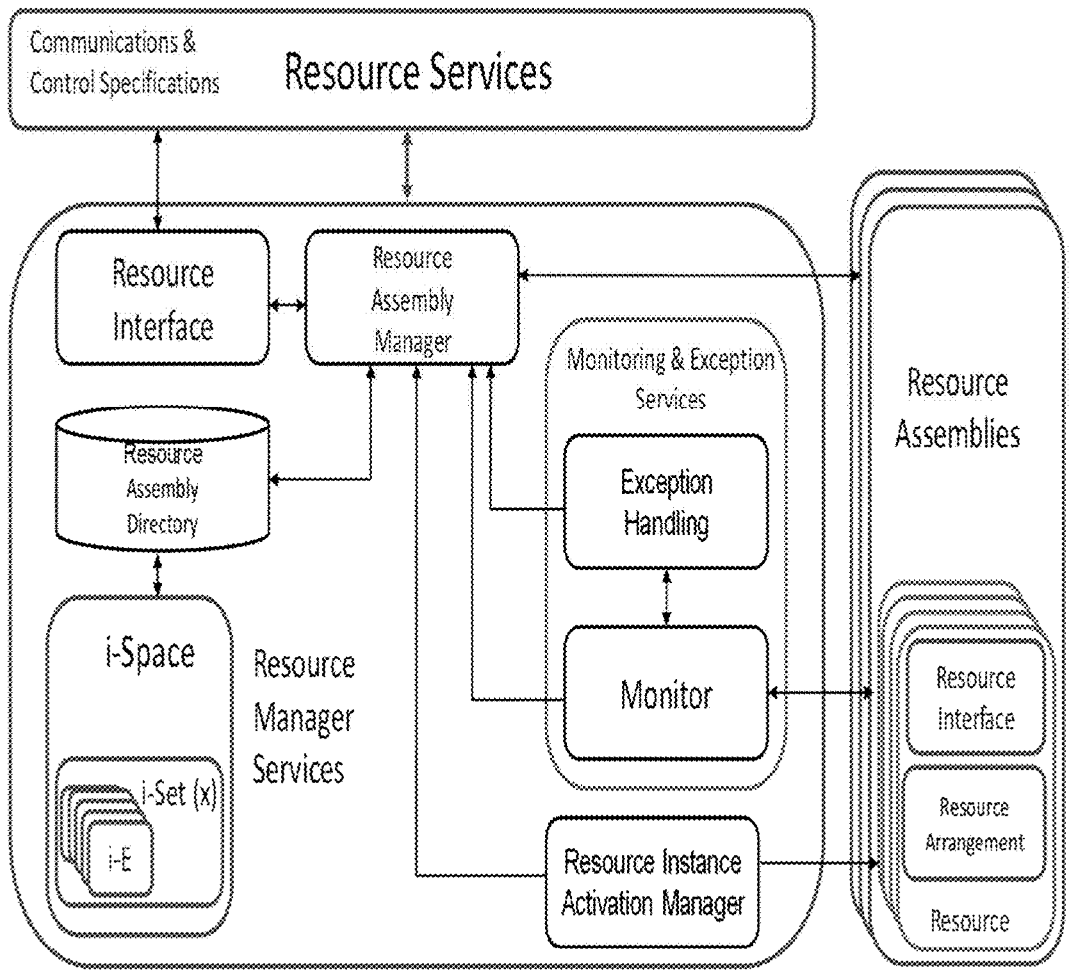

FIG. 49 is an illustrative example of resource assembly.

Figure 50:
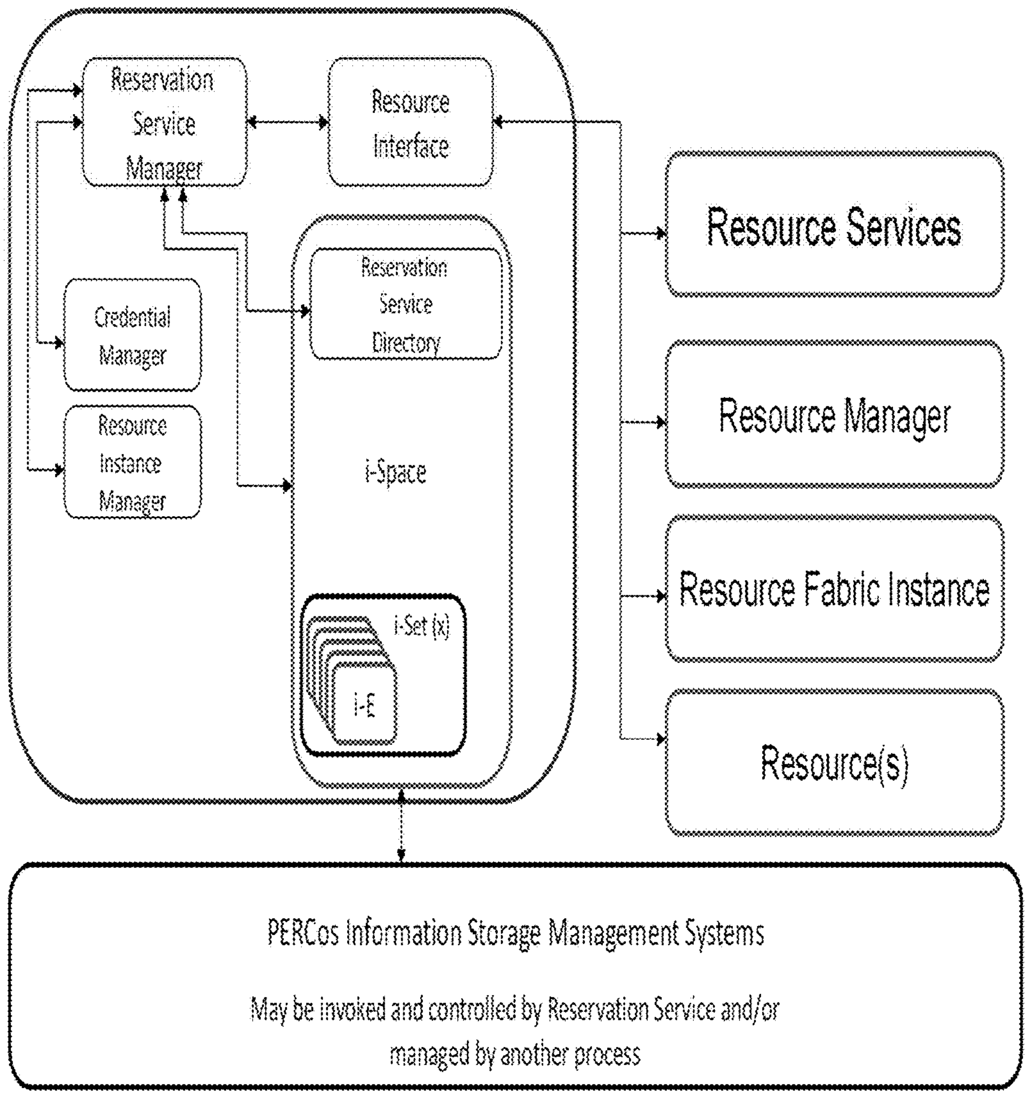

FIG. 50 is a simplified example of reservation service.

Figure 51:
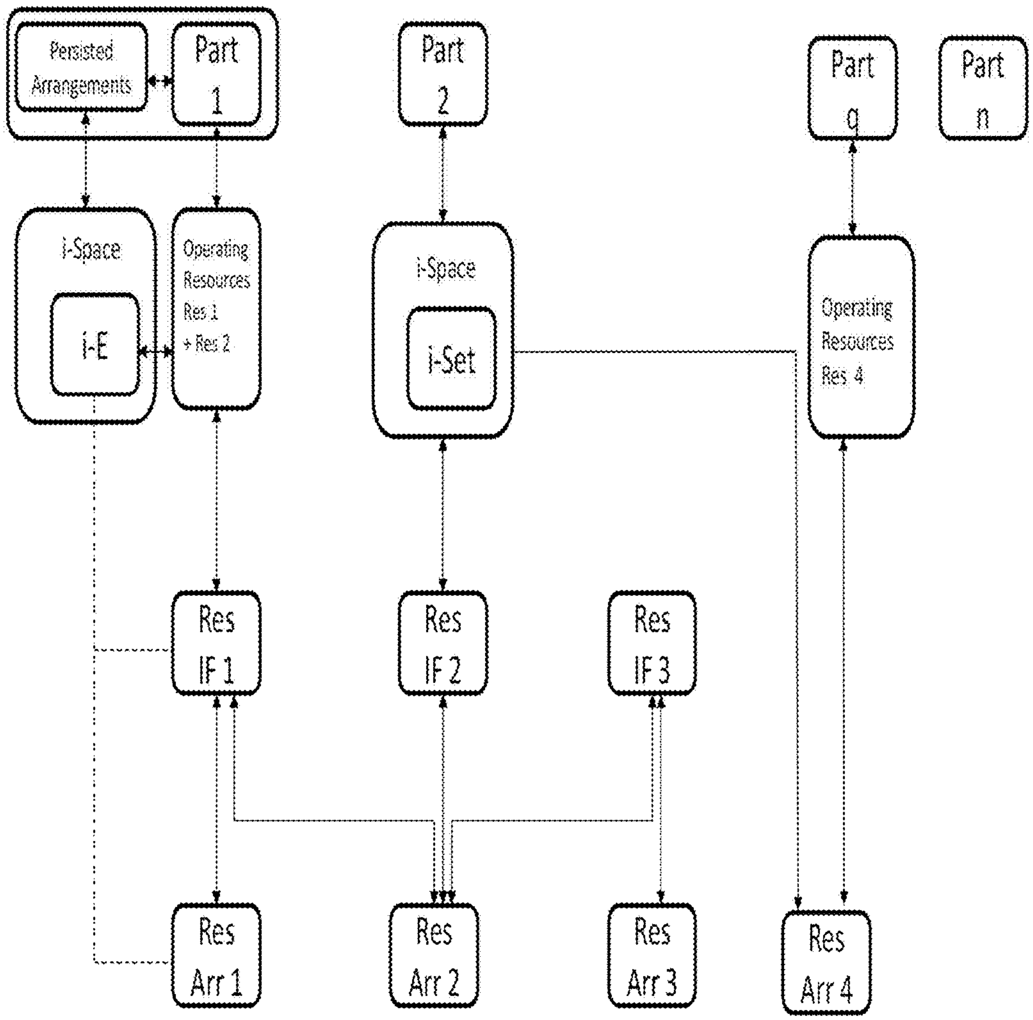

FIG. 51 is an illustrative example of resources and resource interface arrangements.

Figure 52:
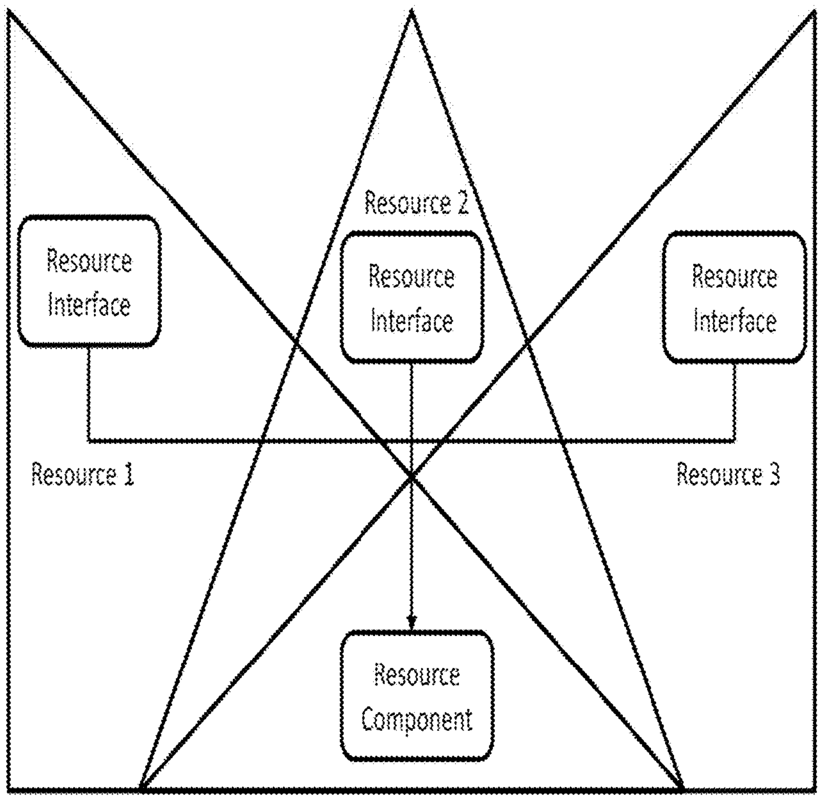

FIG. 52 is a simplified example of resource component with multiple interfaces (e.g., disk/storage system).

Figure 53:
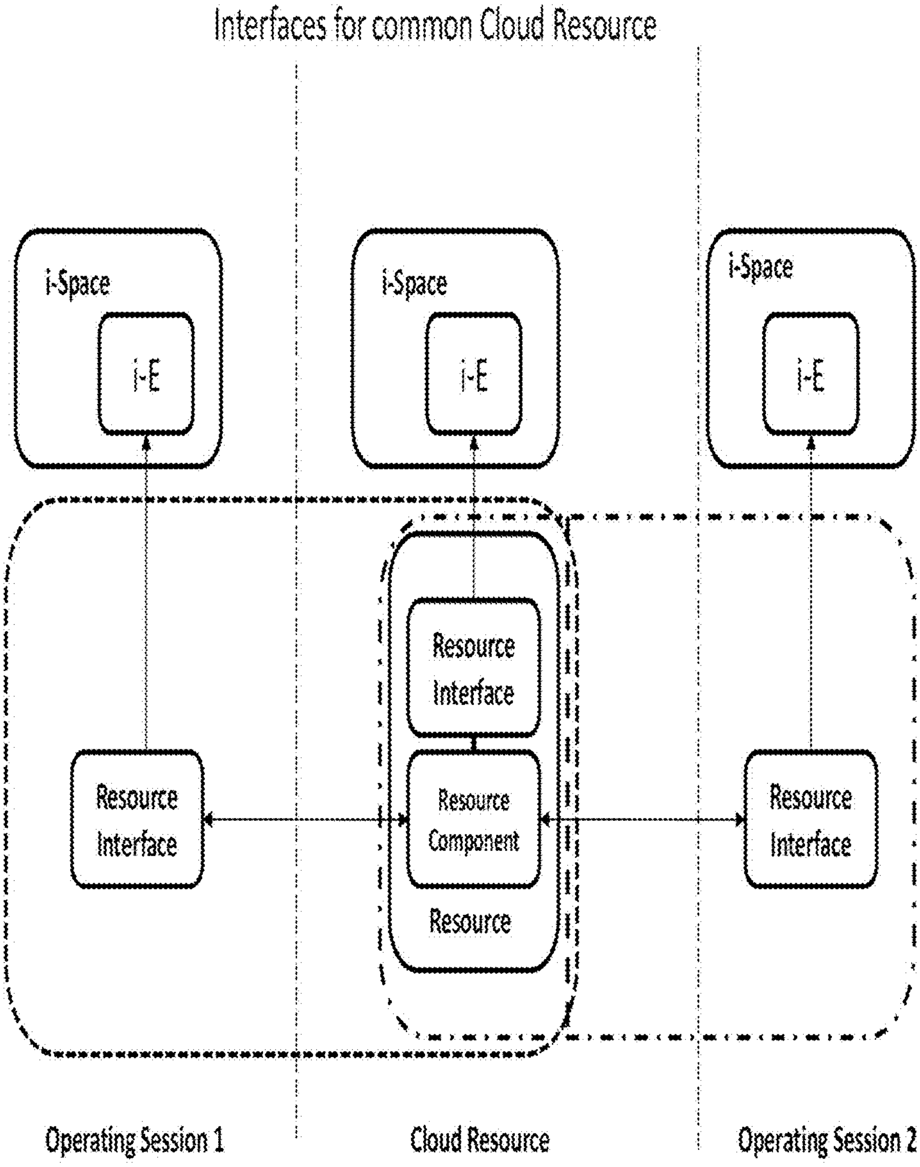

FIG. 53 is a simplified example of shared cloud resource showing separate i-element and multiple resource interfaces for a Common cloud resource.

Figure 54:
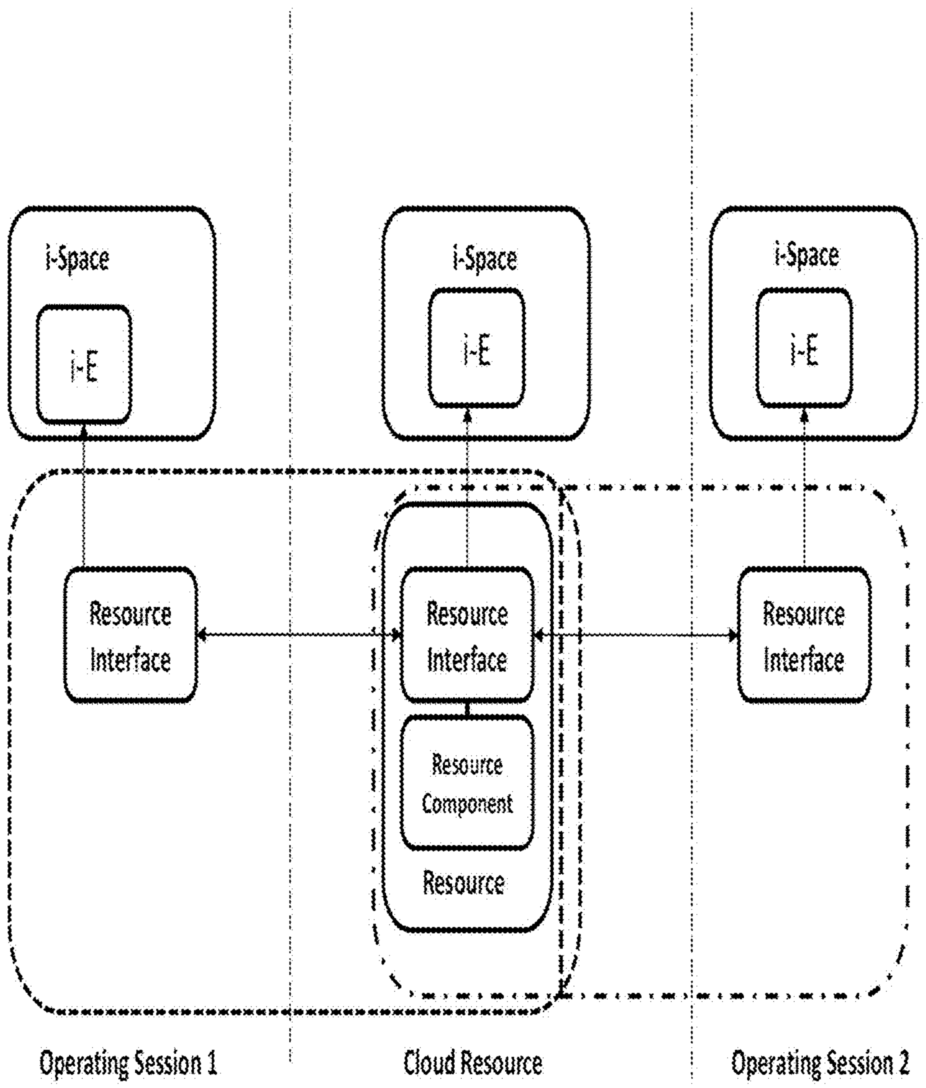

FIG. 54 is a simplified example of shared cloud resource showing separate i-element and single resource interface controlling resource interactions.

Figure 55:
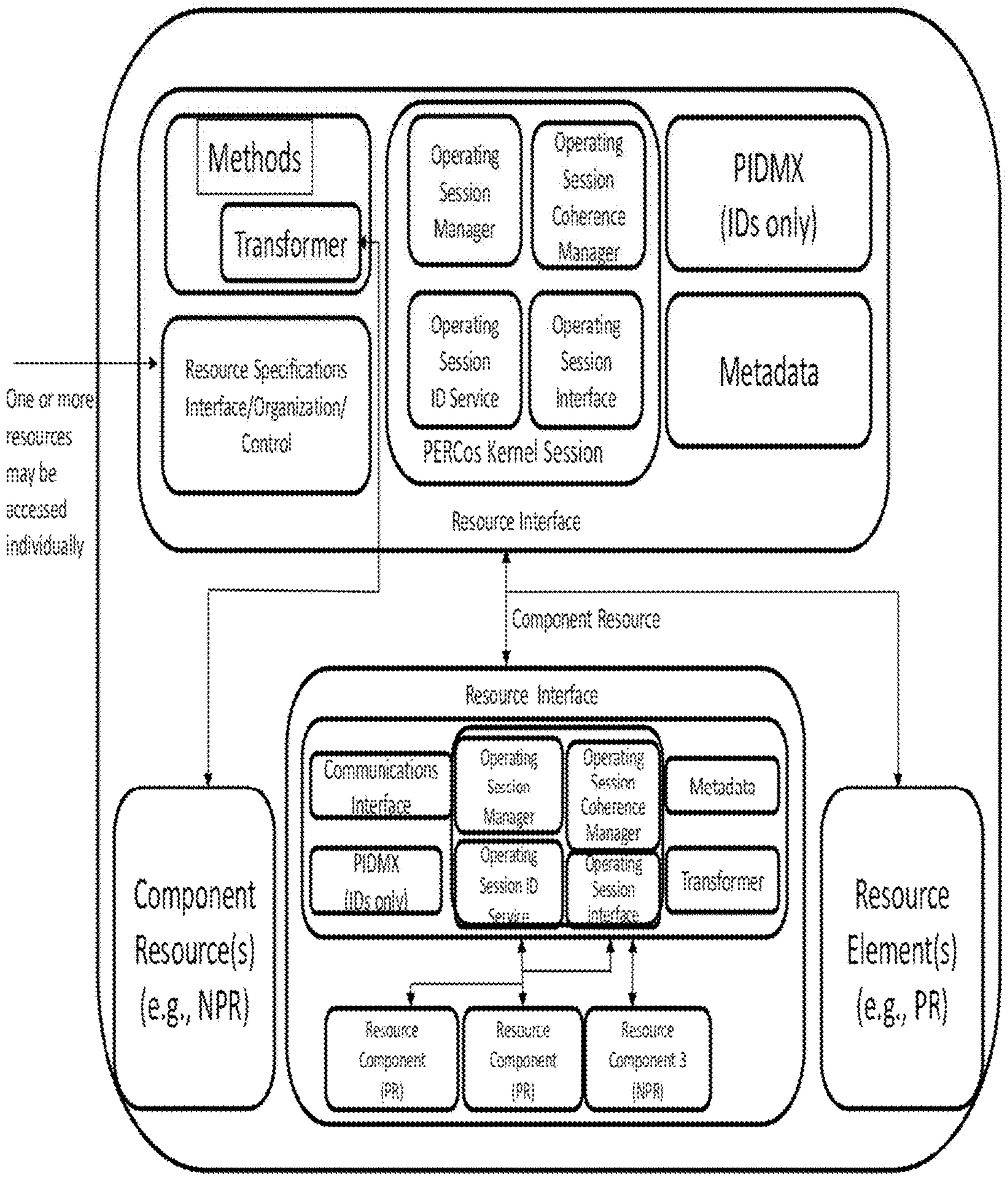

FIG. 55 is an illustrative example of resource comprising multiple types of resource elements.

Figure 56:
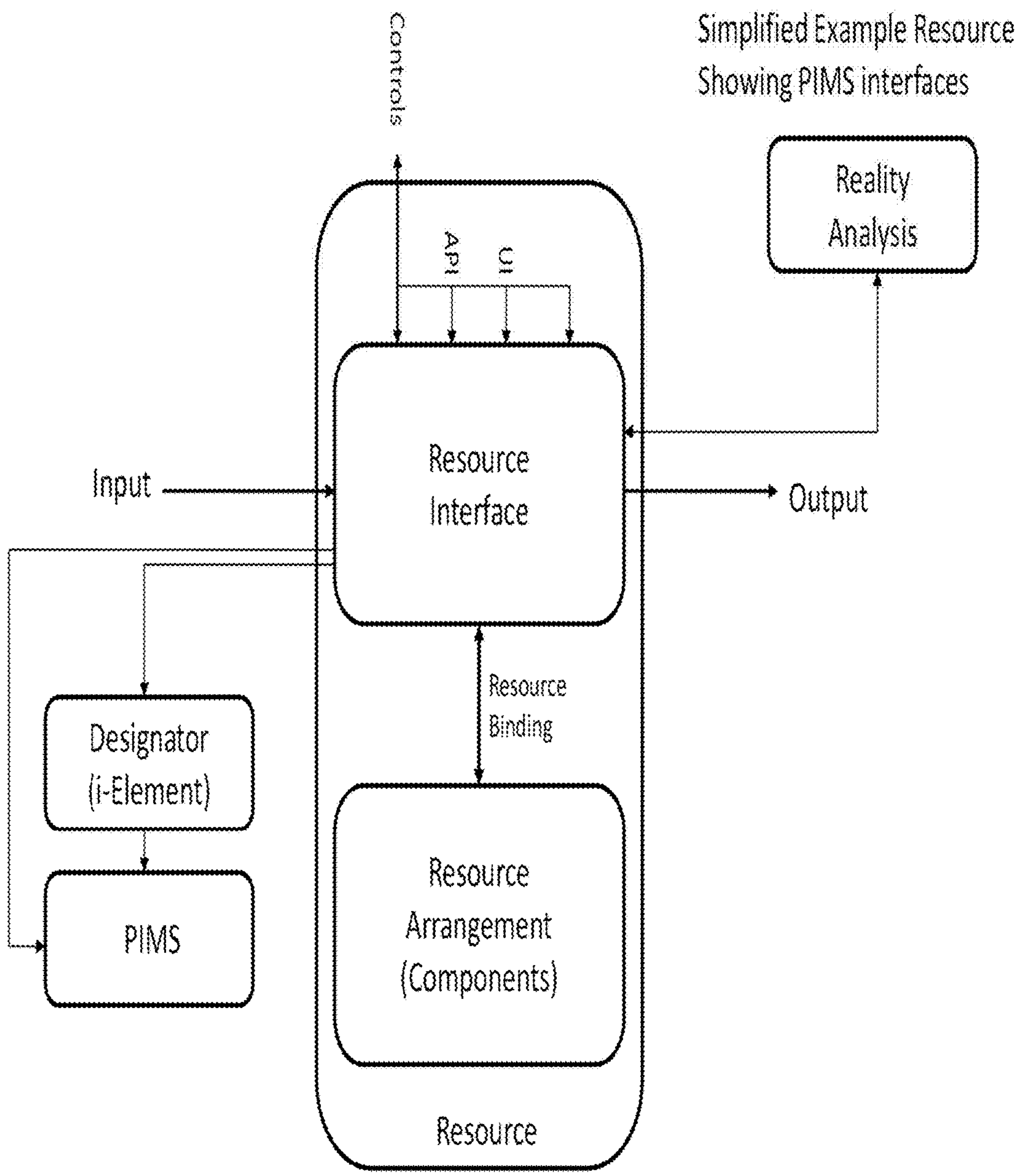

FIG. 56 is an illustrative simplified example resource.

Figure 57:
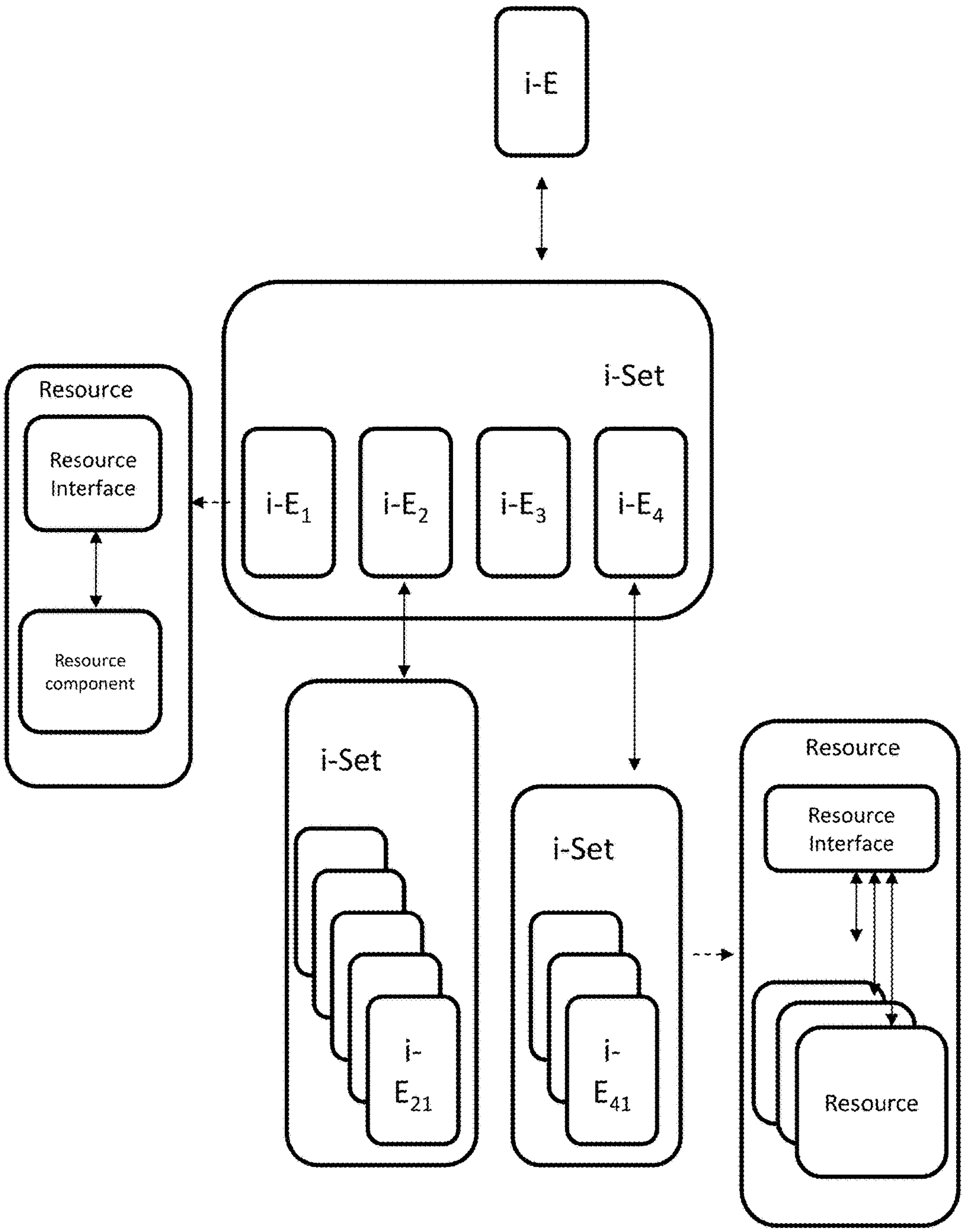

FIG. 57 is an example resource hierarchy.

Figure 58:
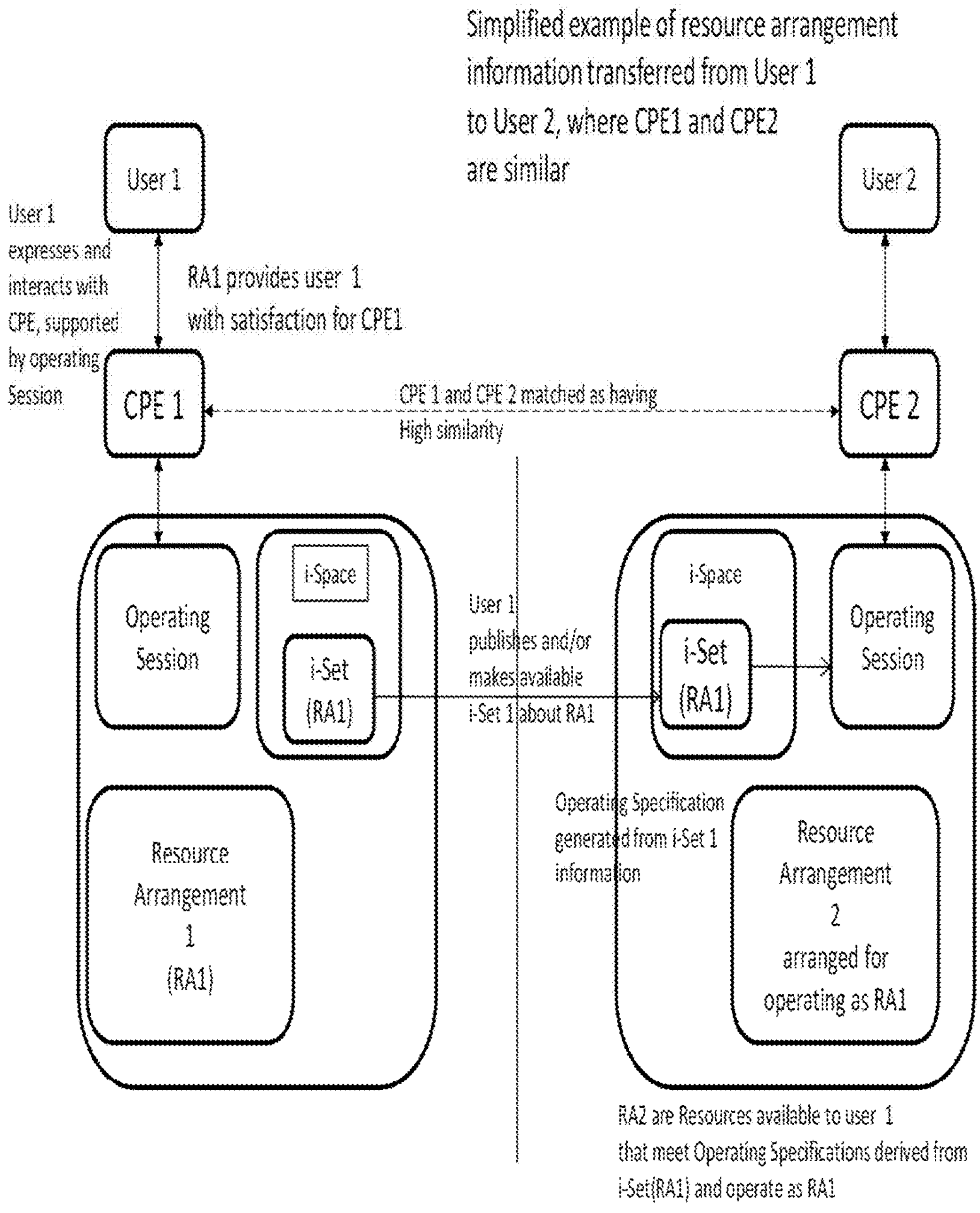

FIG. 58 is an example of sharing resource arrangement Information.

Figure 59:
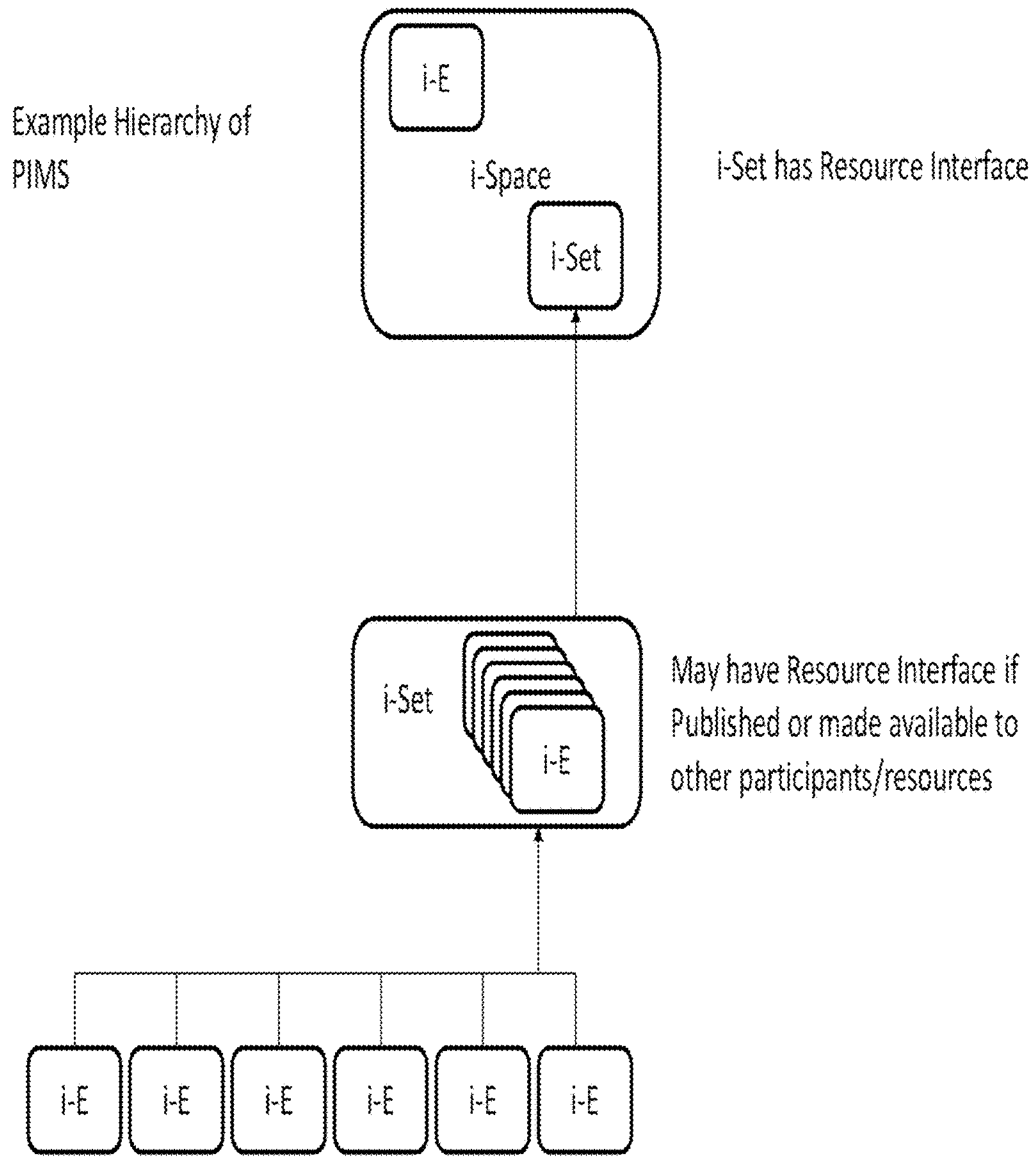

FIG. 59 is an example hierarchy of PIMS.

Figure 60:
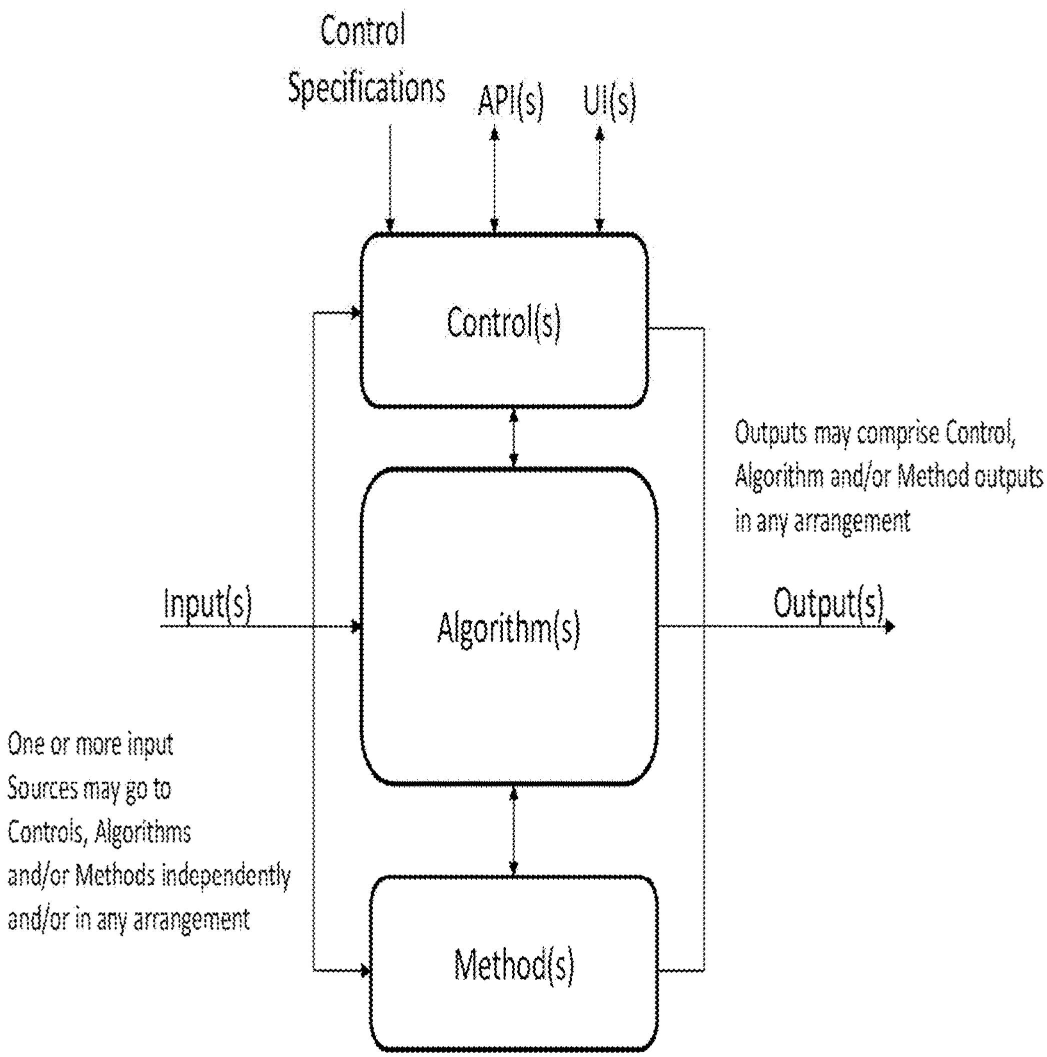

FIG. 60 is an example of "generic" PERCos service structure.

Figure 61:
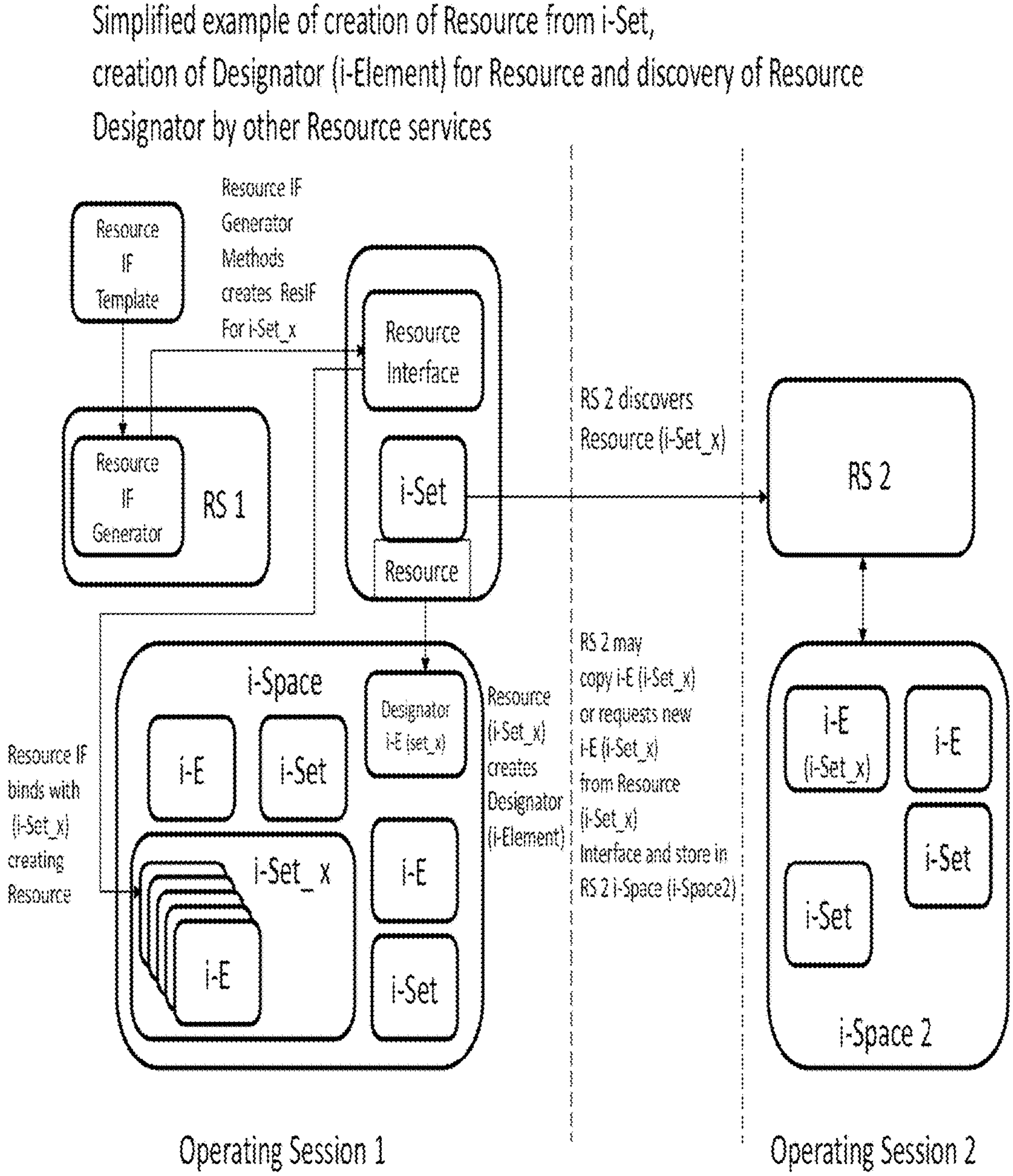

FIG. 61 is a simplified example of creation of resource from i-Set.

Figure 62:
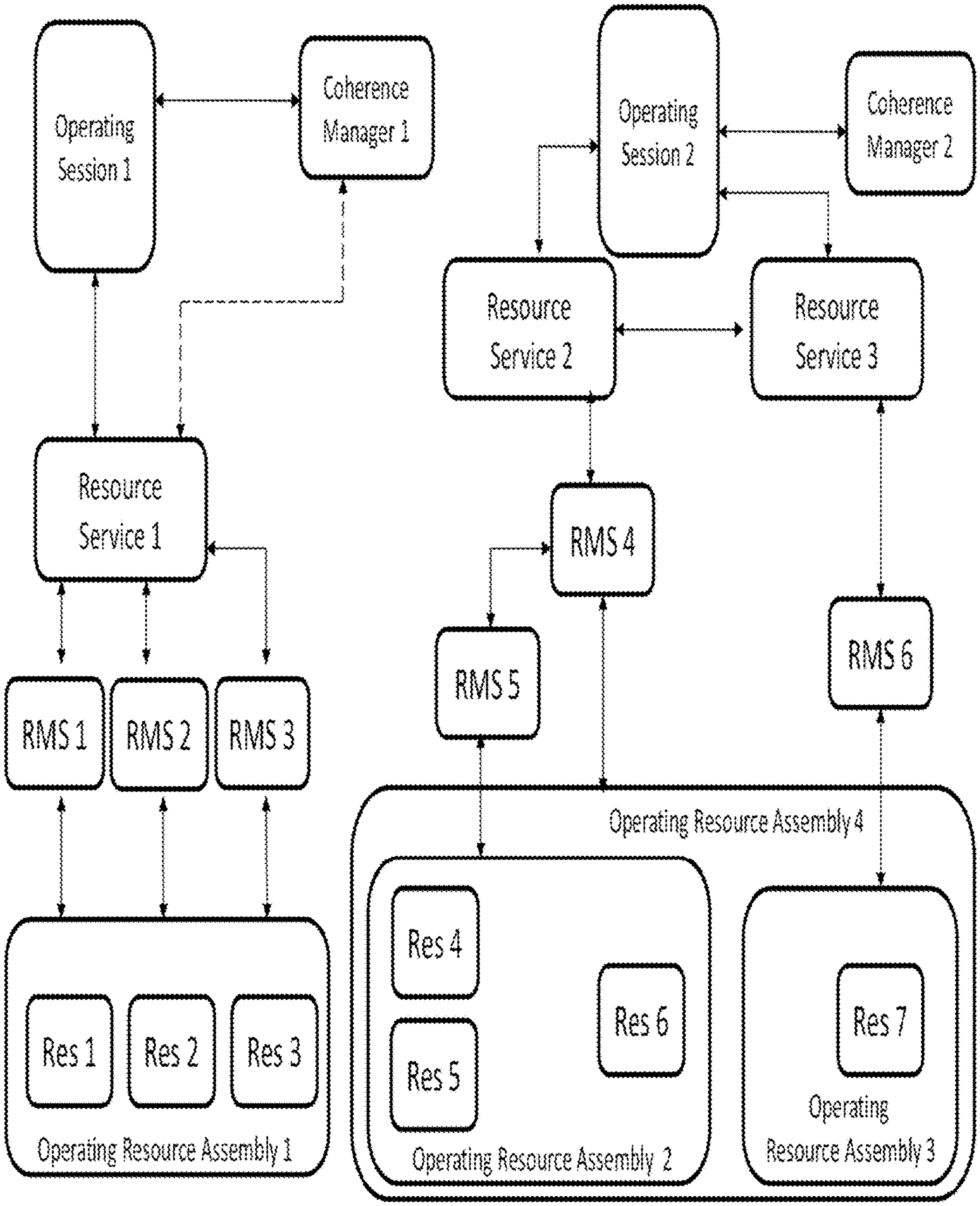

FIG. 62 is an example PRMS component configuration.

Figure 63:
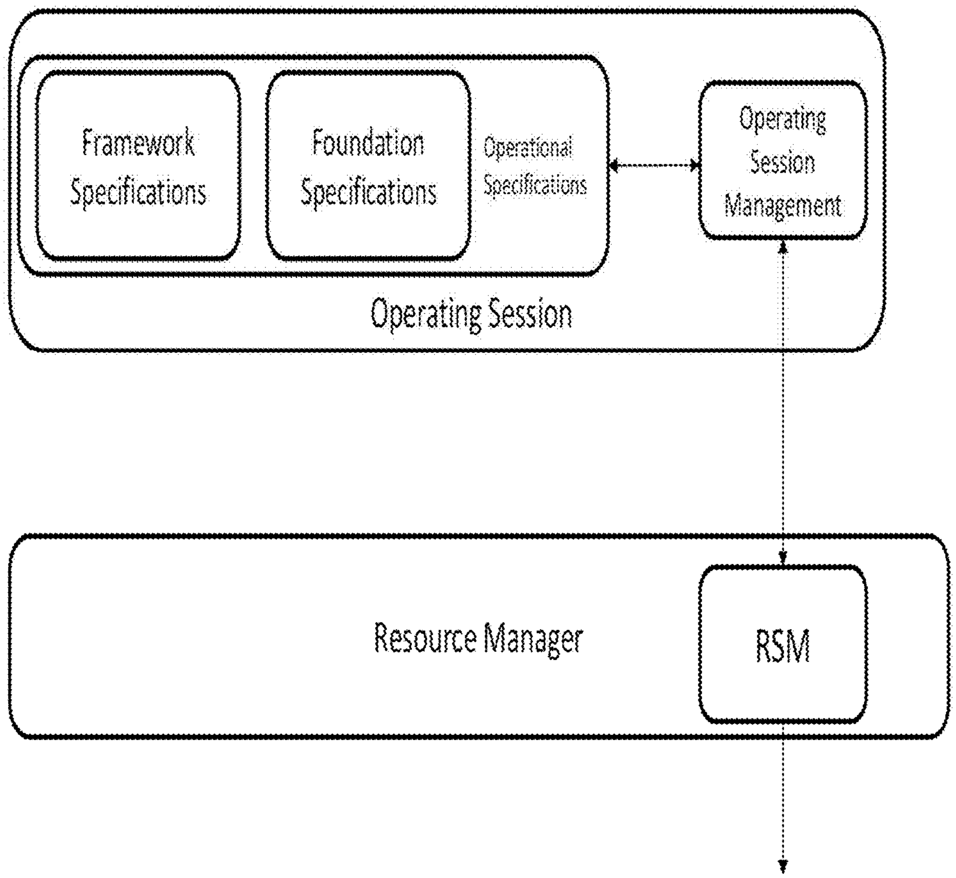

FIG. 63 is an illustrative interaction between operation session and resource manager.

Figure 64:
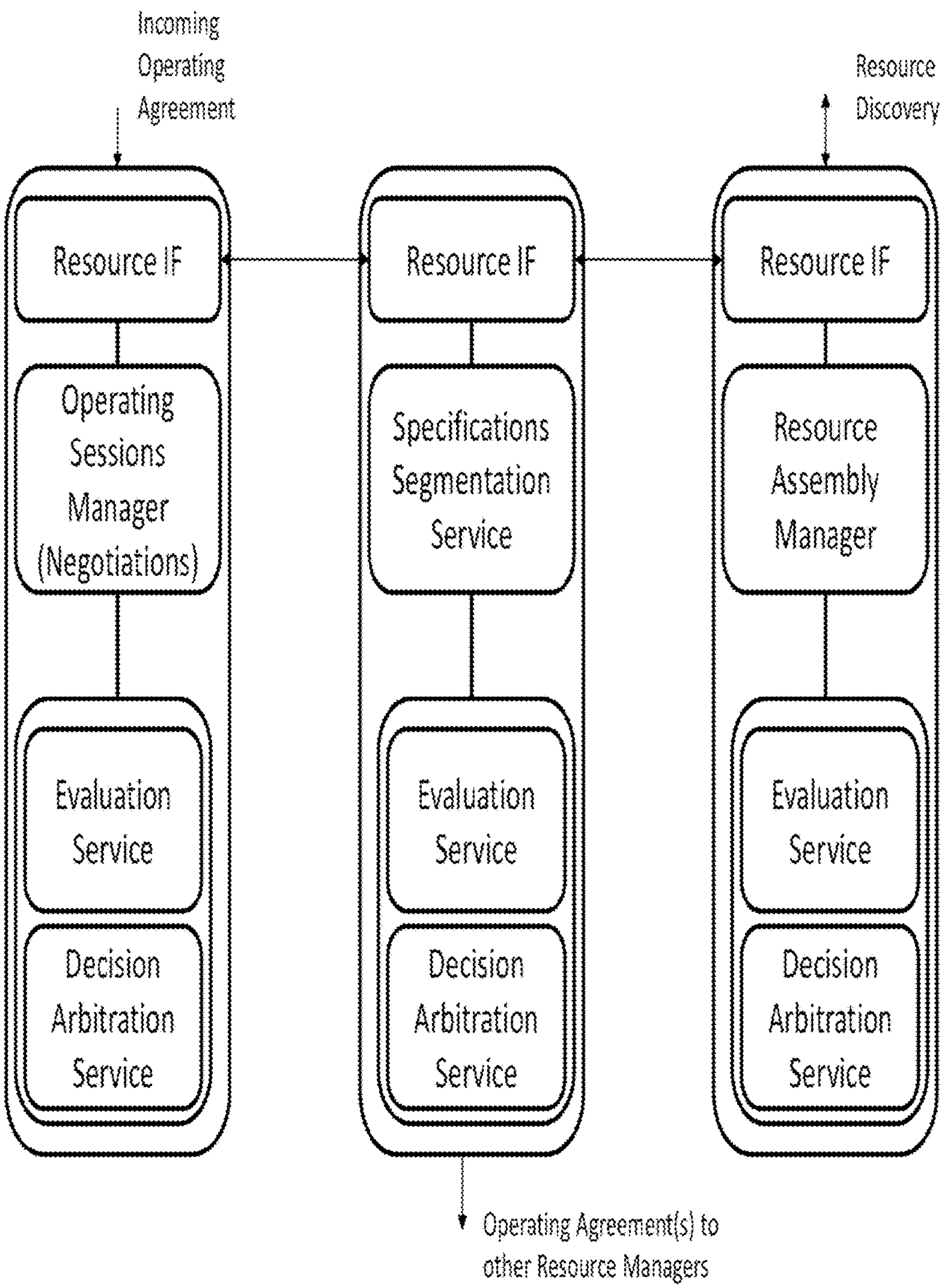

FIG. 64 is a simplified illustrative example of processing of operating agreements.

Figure 65:
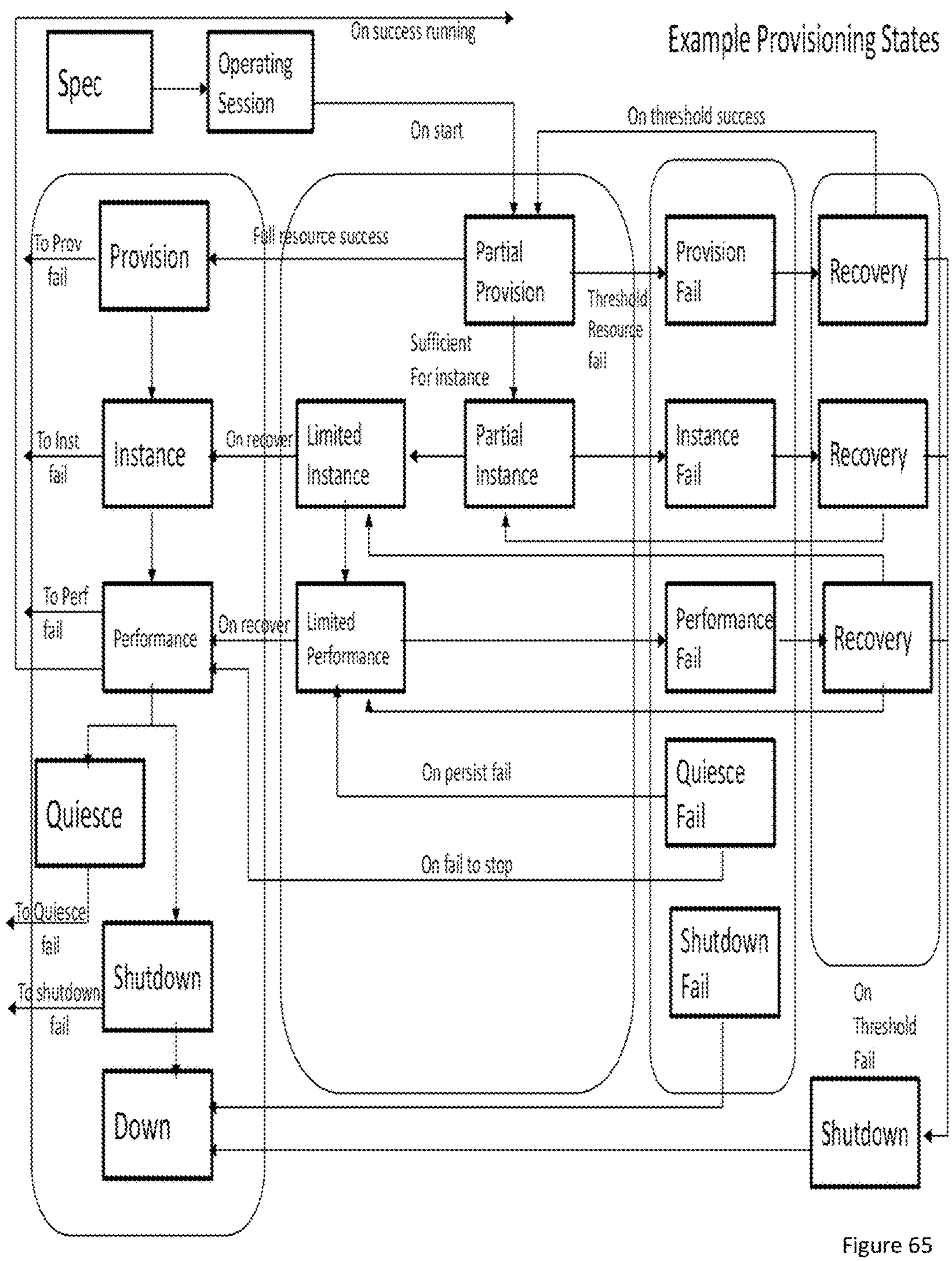

FIG. 65 is an illustrative example of states and state transitions for resource provisioning.

Figure 66:
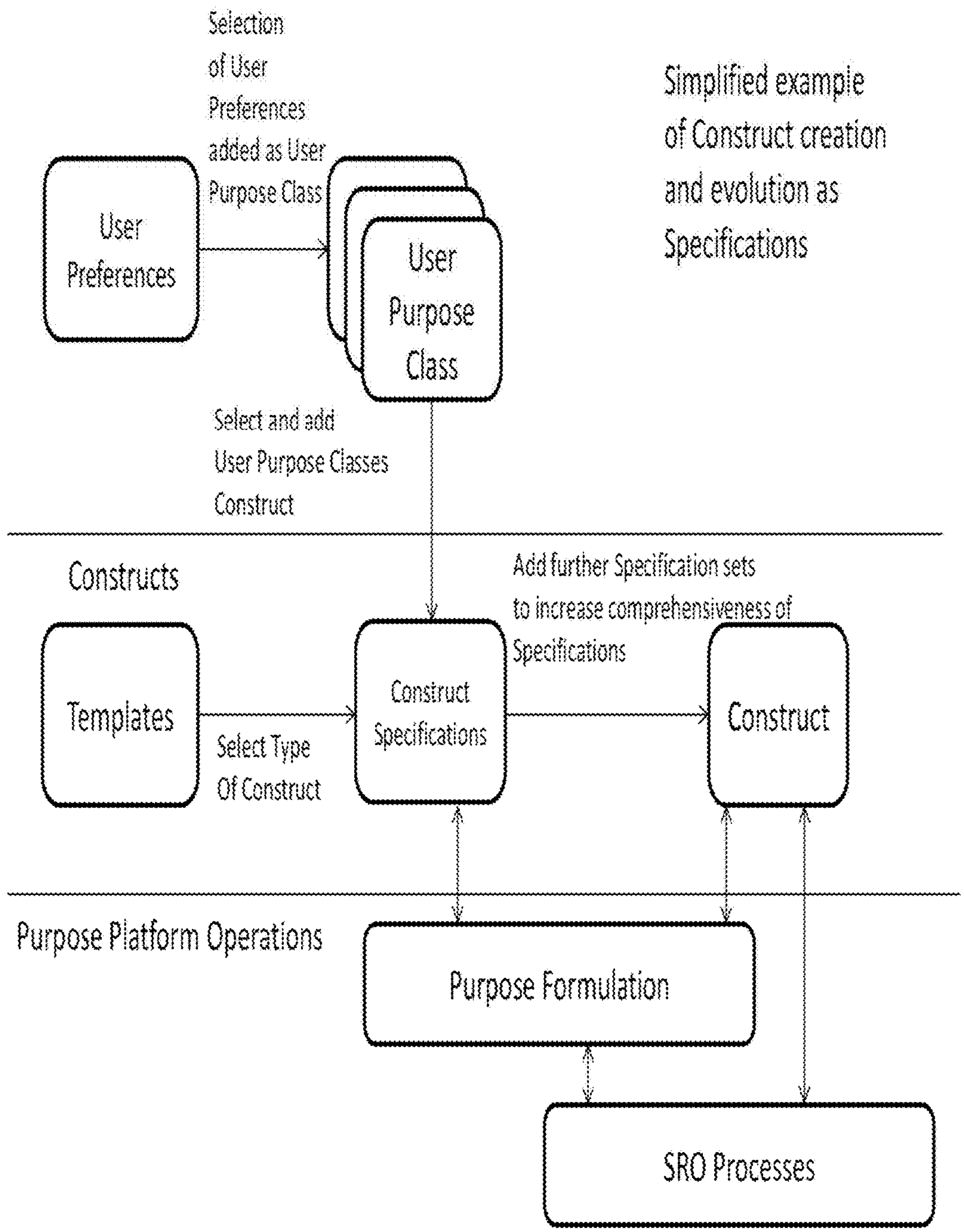

FIG. 66 is an illustrative example of Construct usage.

Figure 67:
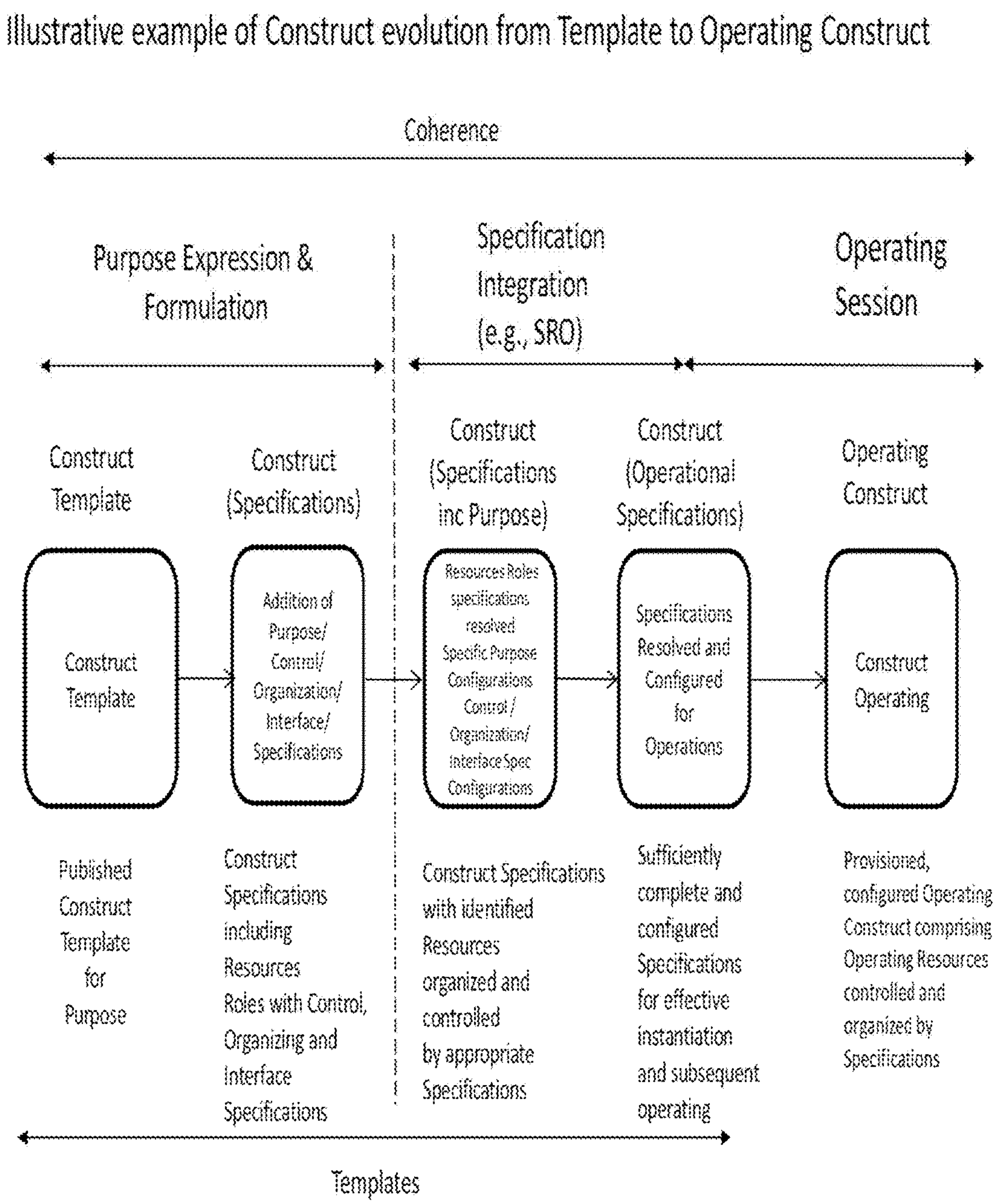

FIG. 67 is an illustrative example of construction evolution from templates to operating Construct.

Figure 68:
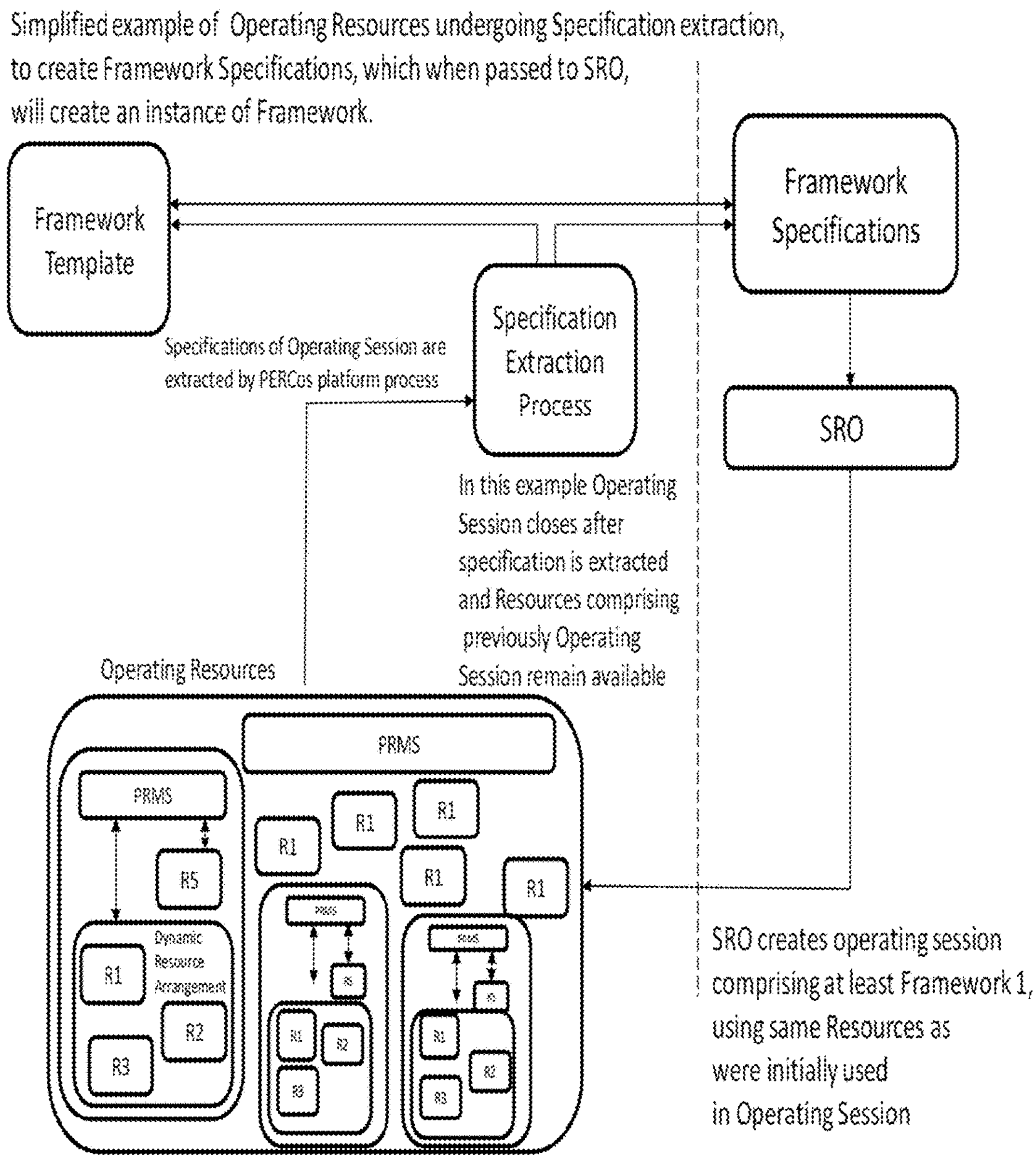

FIG. 68 is a simplified example of operating resources undergoing specification extraction.

Figure 69:
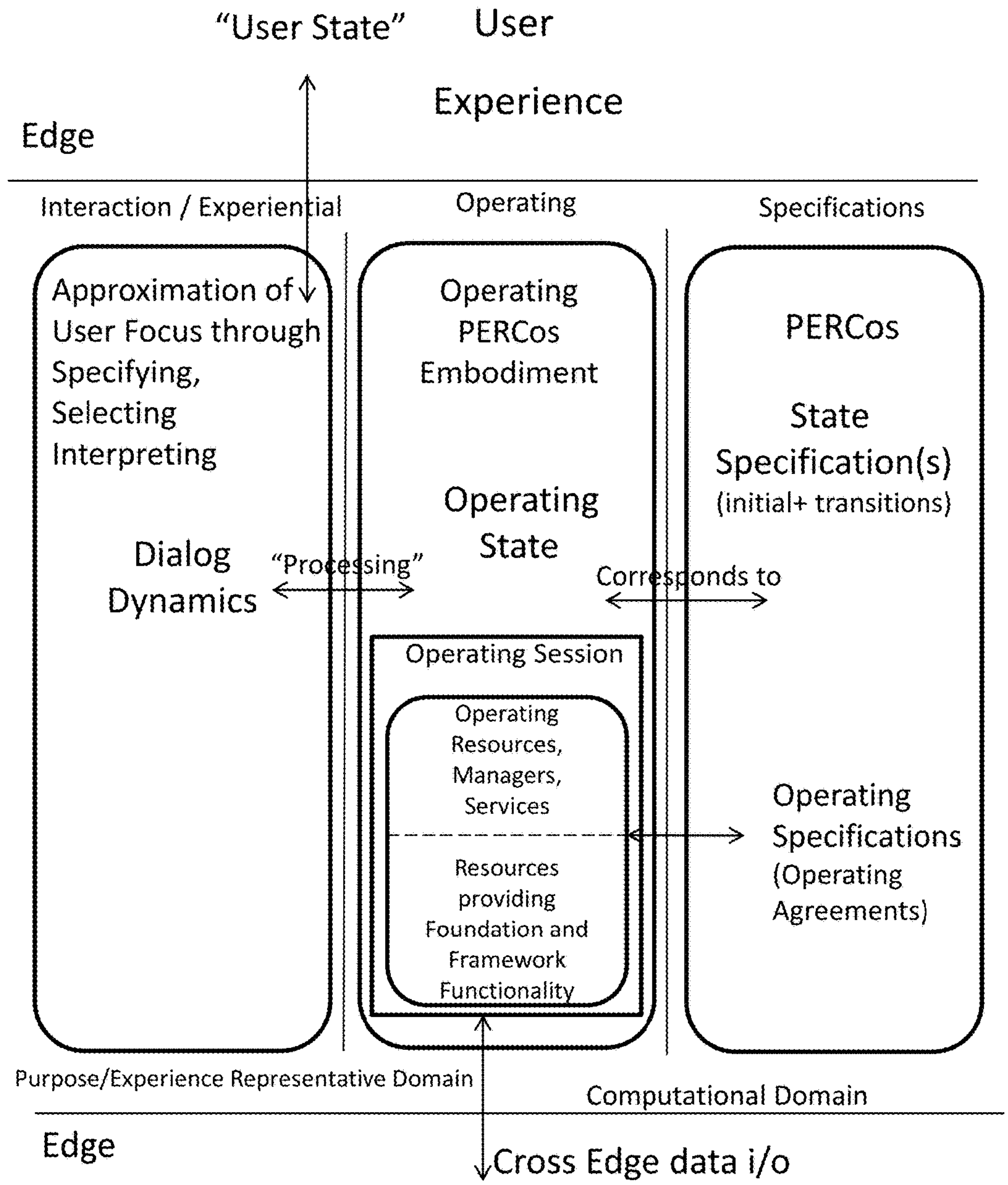

FIG. 69 are operating elements and/or data flow, PERCos and non-PERCos elements.

Figure 70:
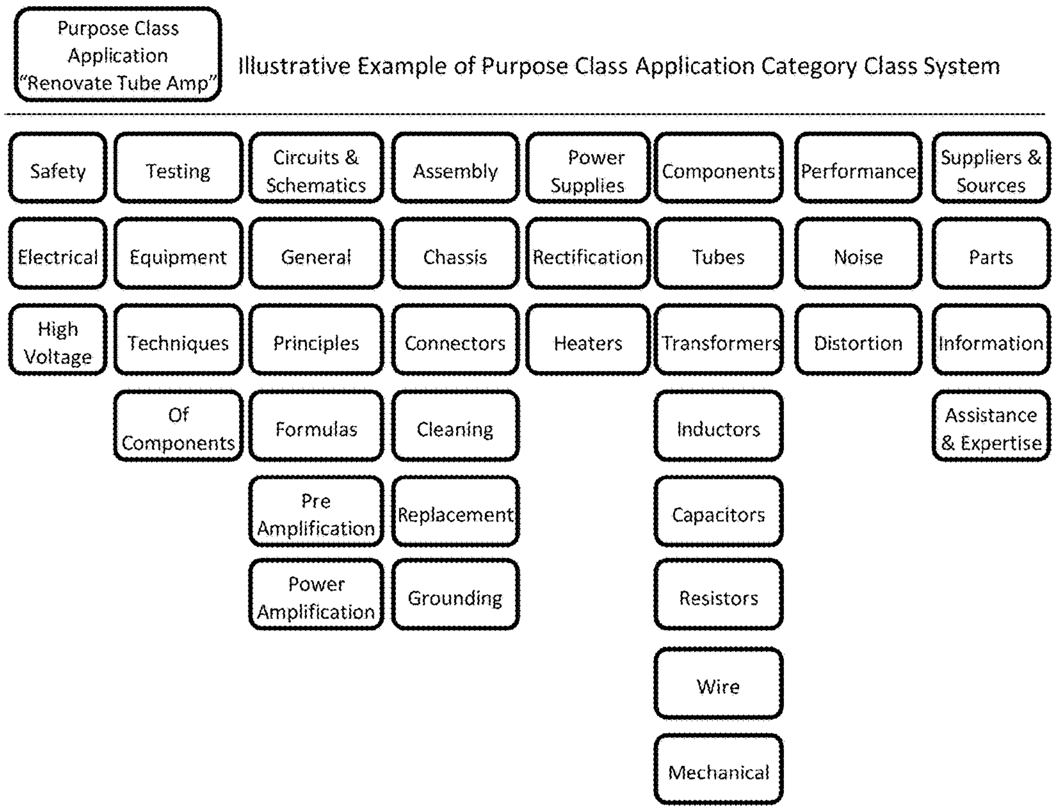

FIG. 70 is an illustrative example of purpose class application class system.

Figure 71:
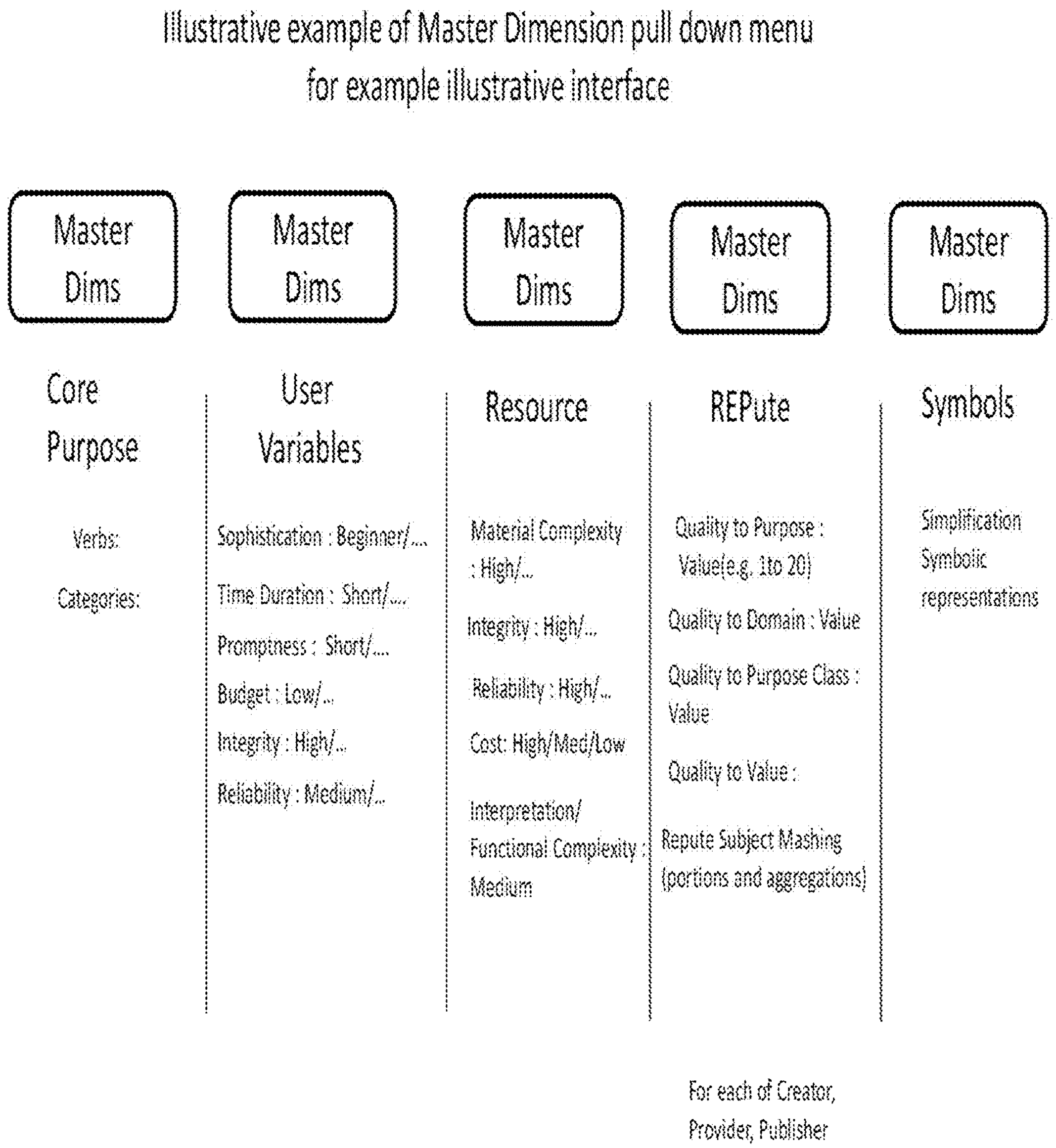

FIG. 71 is an illustrative example of Master Dimension embodiments.

Figure 72:
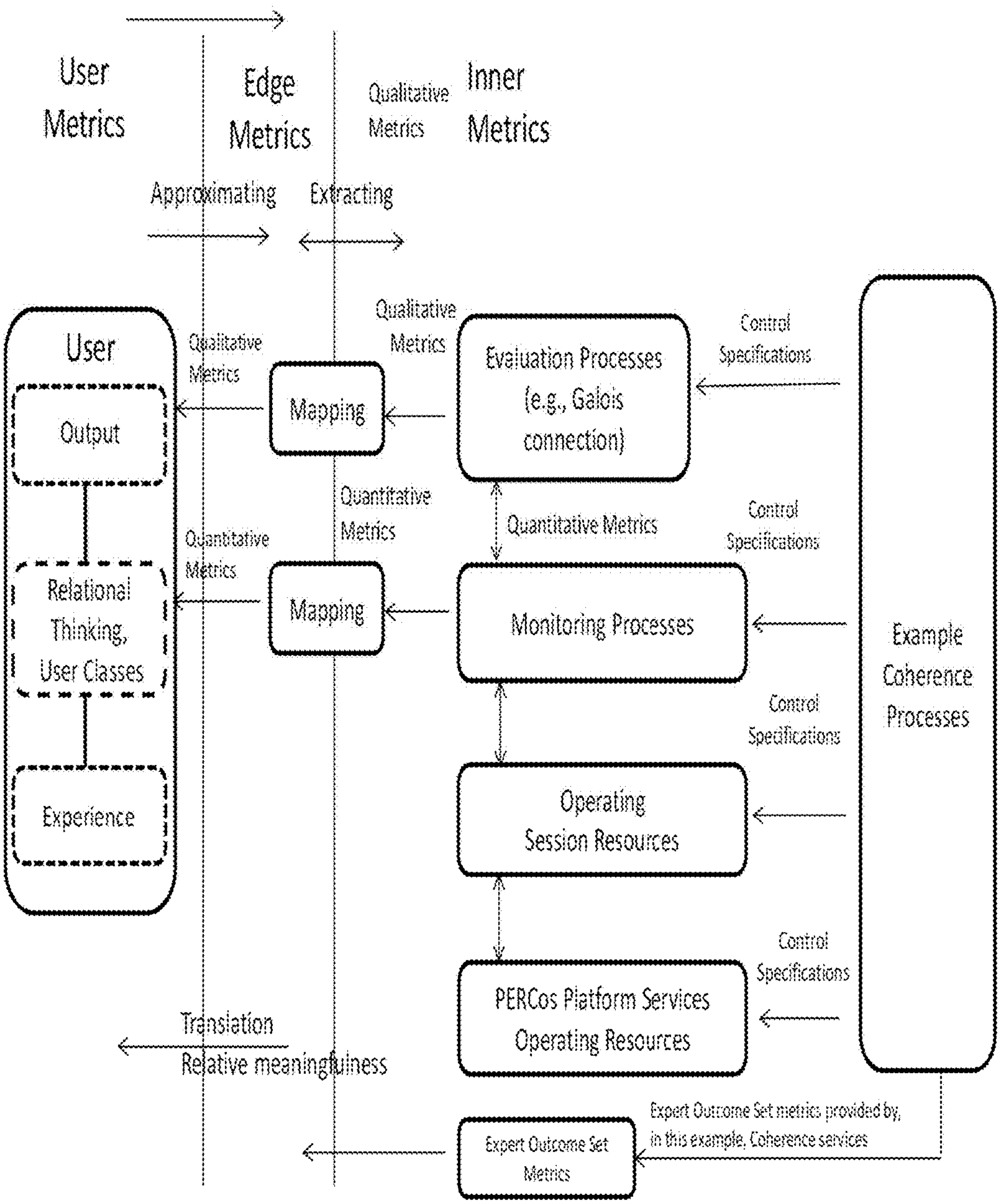

FIG. 72 are example metrics relationships.

Figure 73:
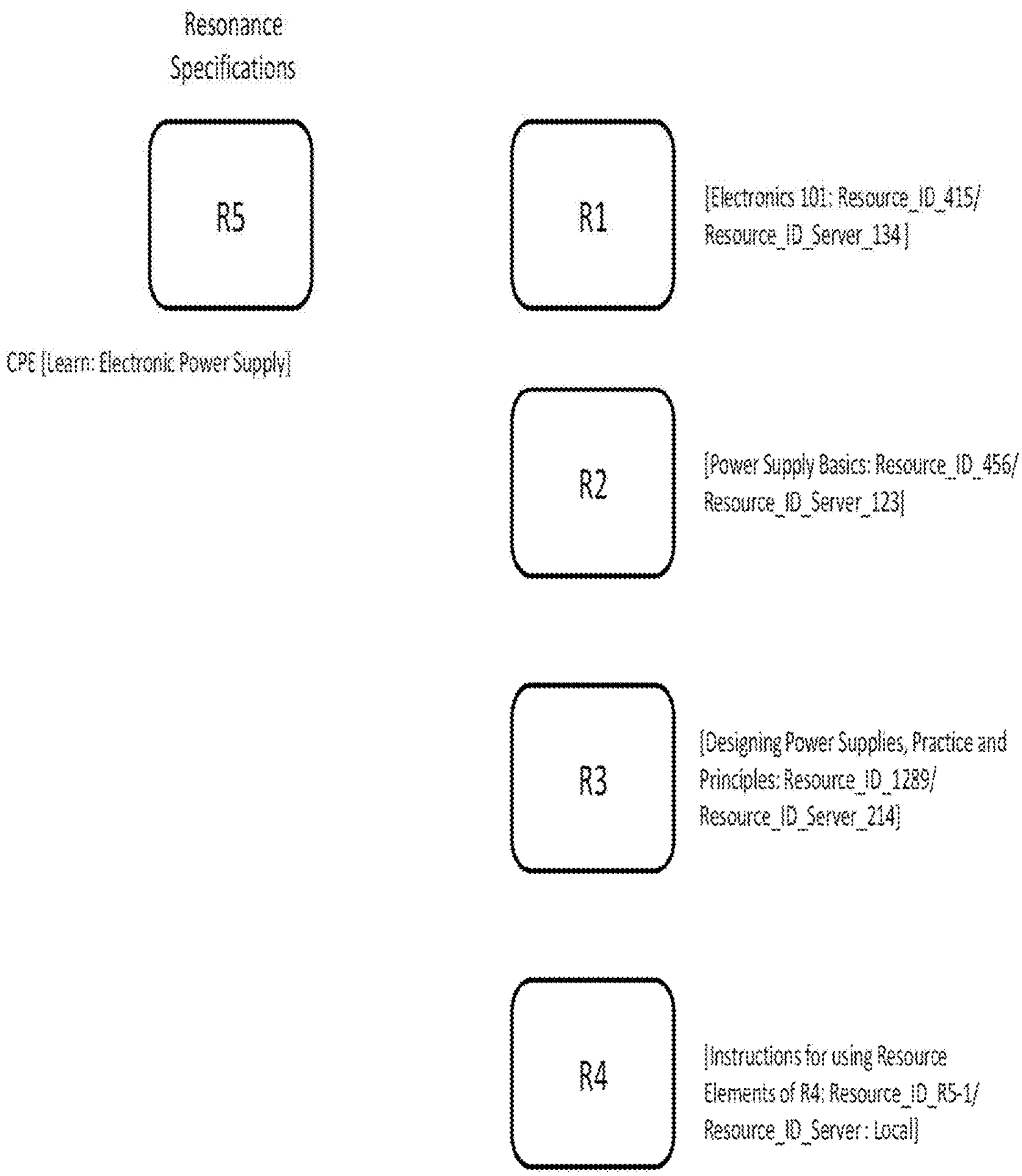

FIG. 73 are example resonance specifications.

Figure 74:
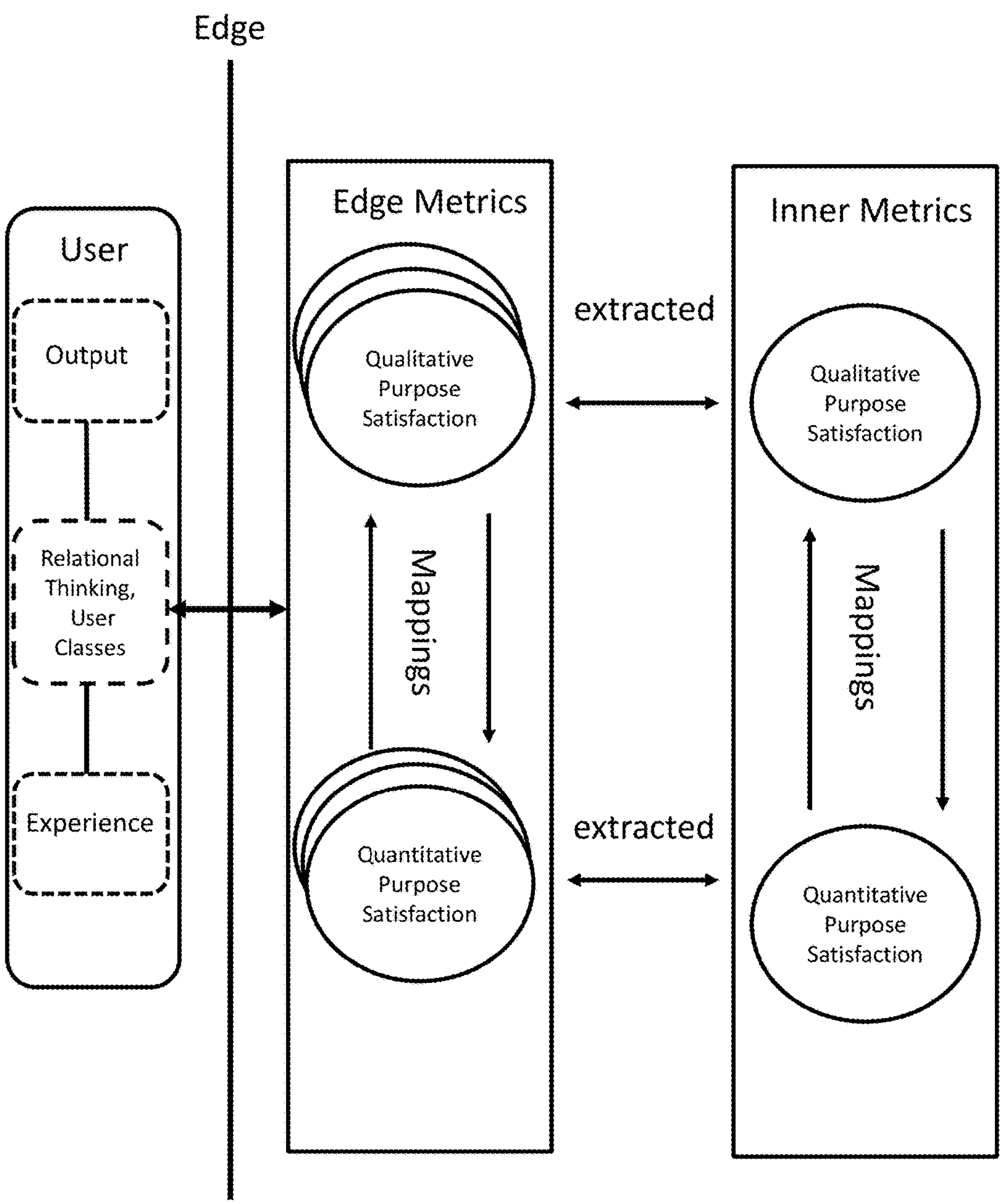

FIG. 74 is a mapping between the four types of purpose satisfaction.

Figure 75:
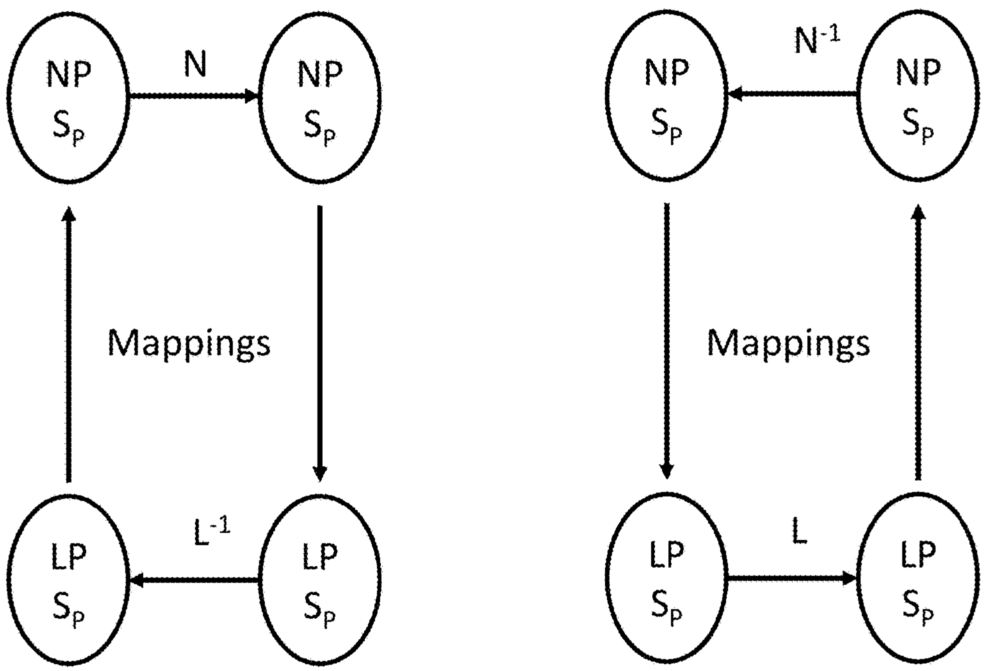

FIG. 75 is an example commutative diagram.

Figure 76:
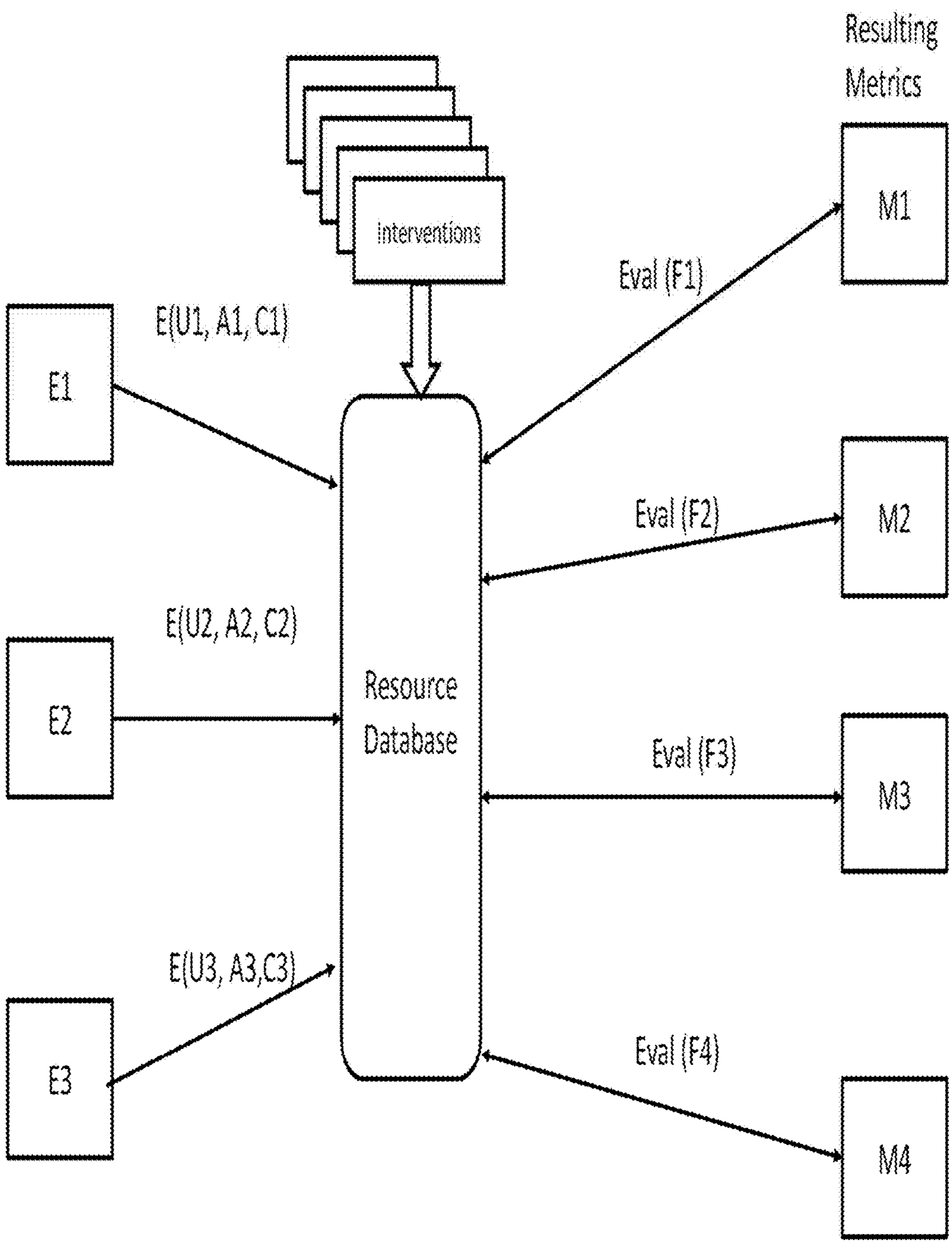

FIG. 76 is an example metrics calculation process.

Figure 77:
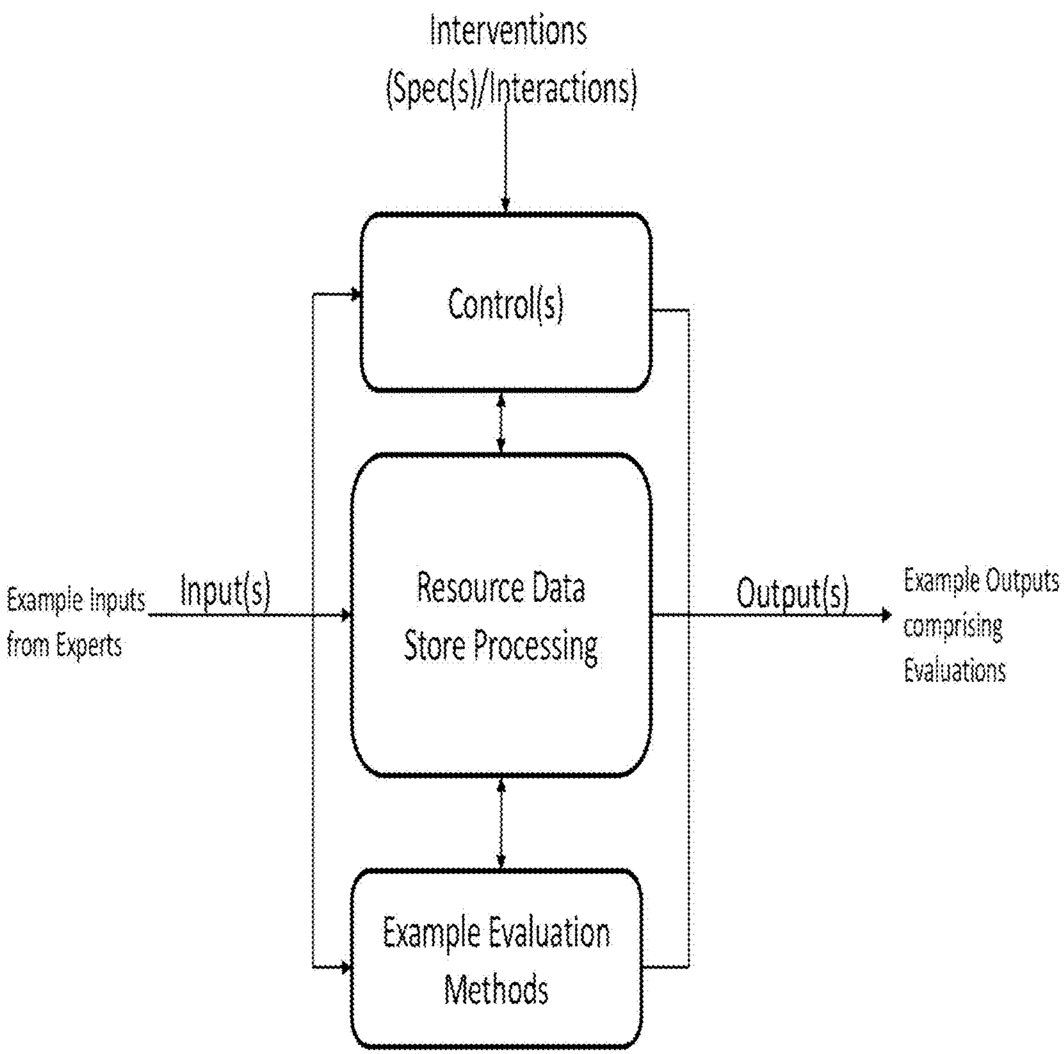

FIG. 77 is an illustrative example of a "generic" resource.

Figure 78:
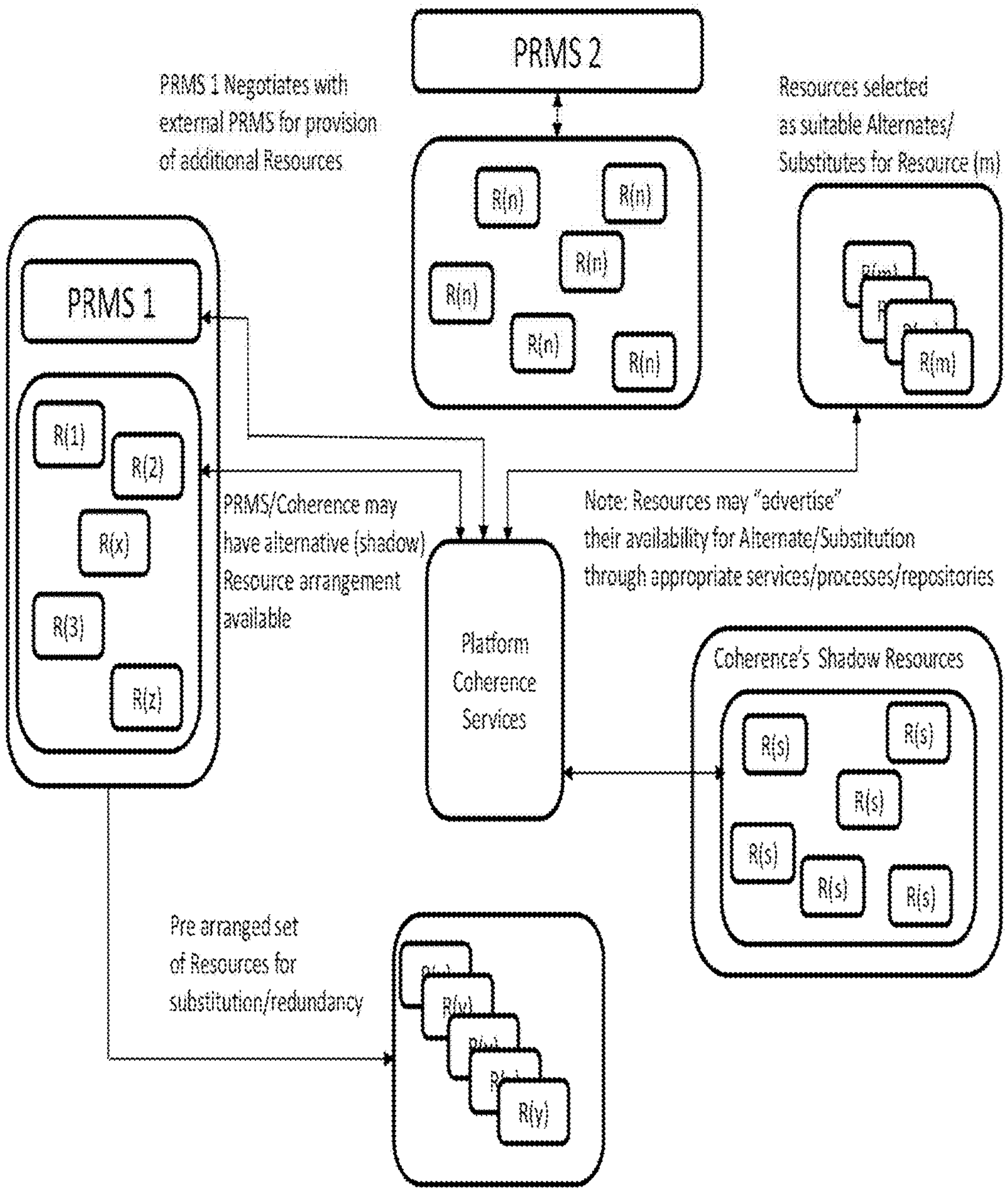

FIG. 78 is an example resource relationship.

Figure 79:
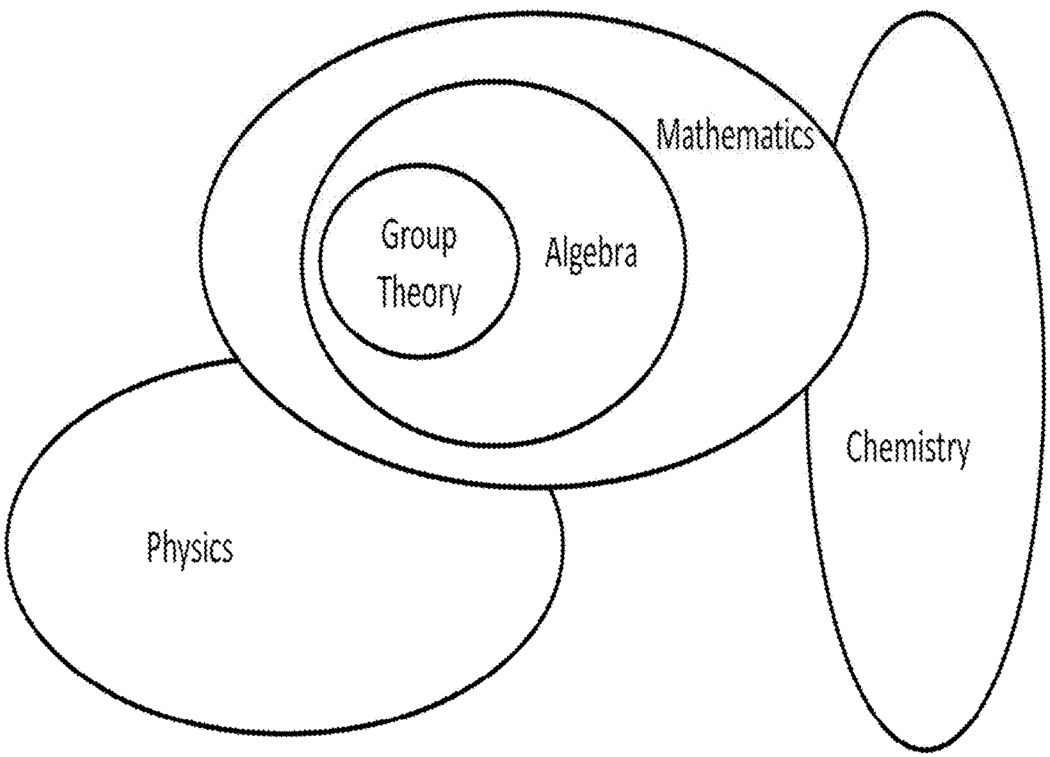

FIG. 79 is a purpose Domain relationship.

Figure 80:
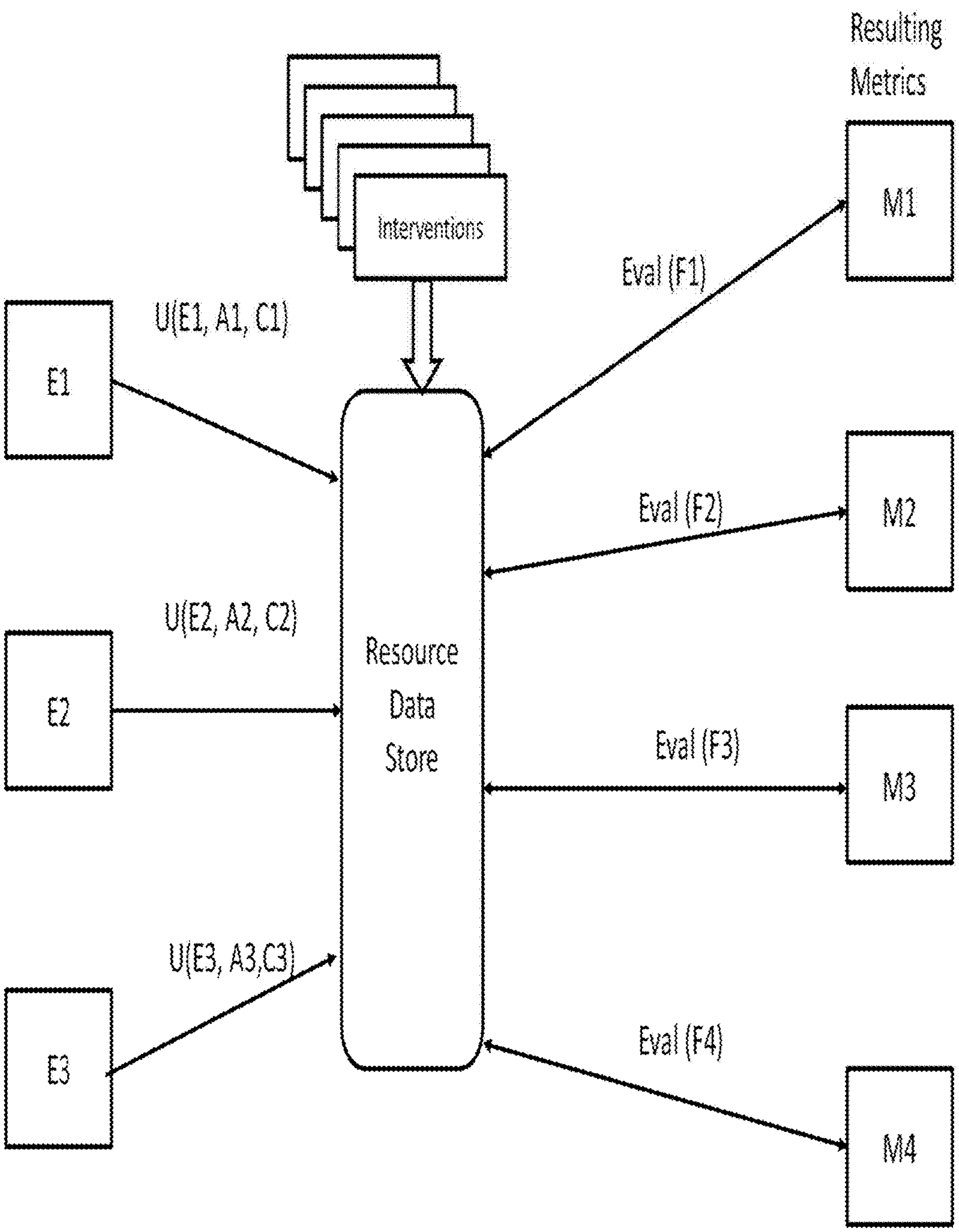

FIG. 80 is an example REPute calculation process.

Figure 81:
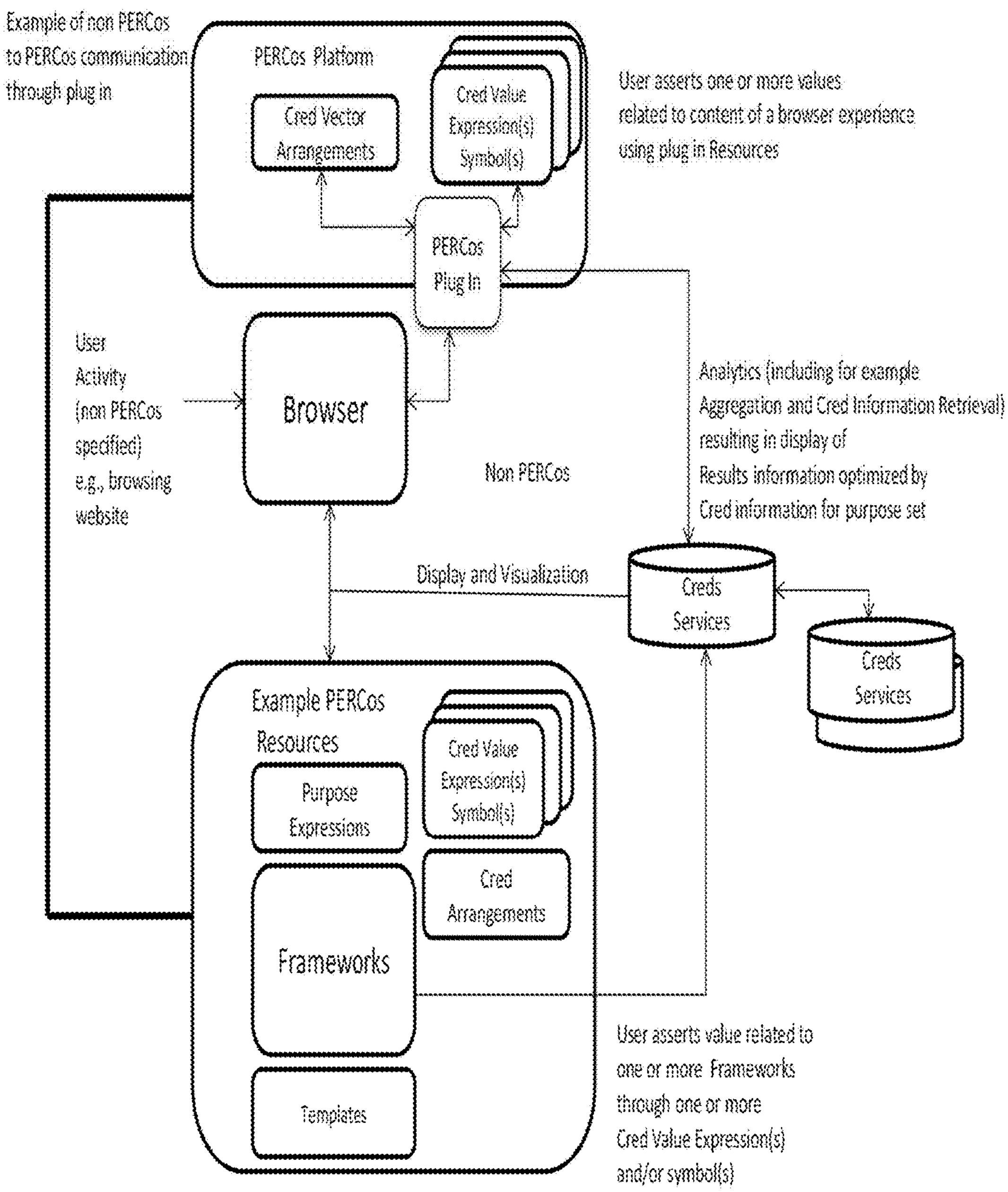

FIG. 81 is an illustrative example of Cred creation process.

Figure 82:
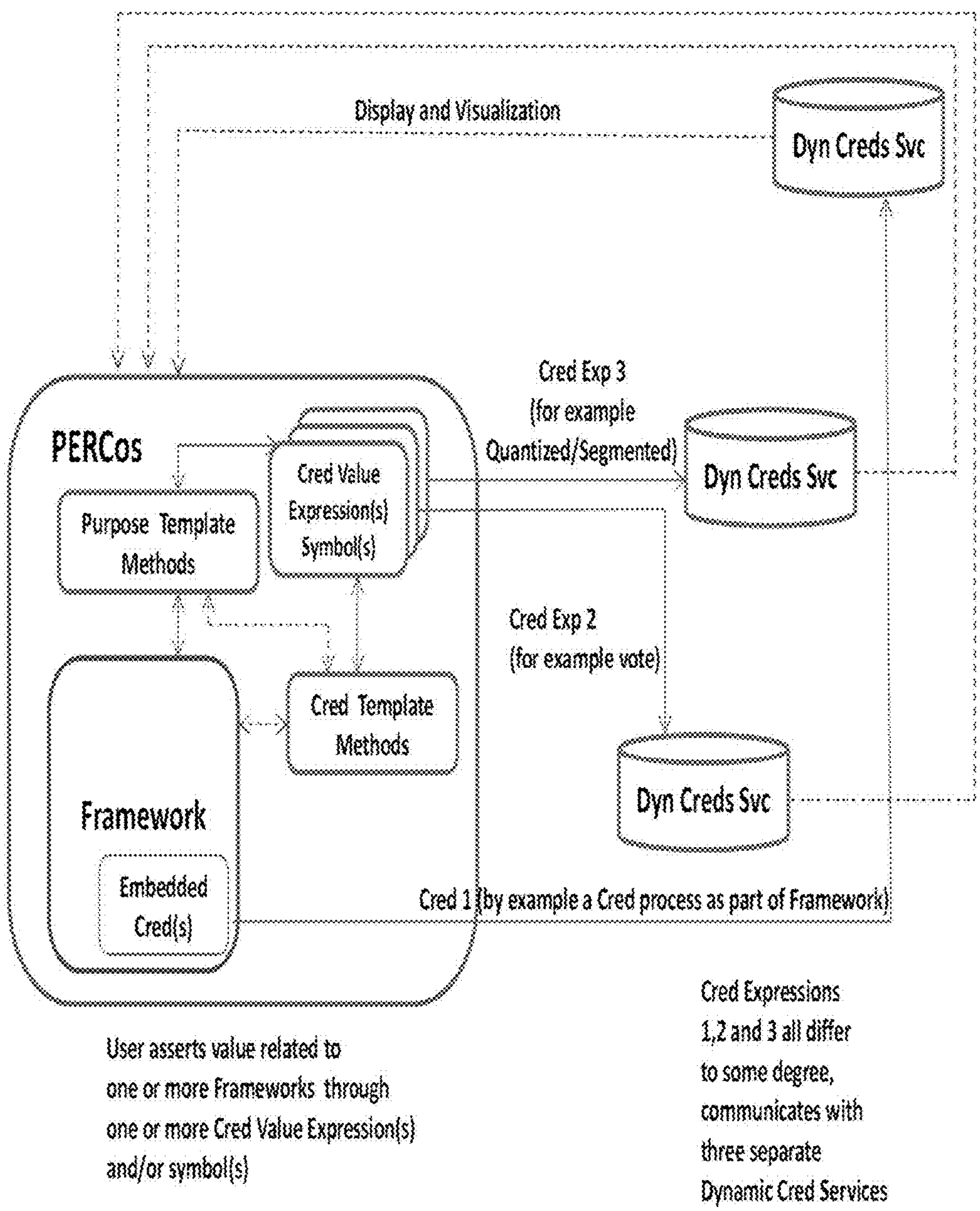

FIG. 82 is an illustrative example of dynamic Cred creation process.

Figure 83:
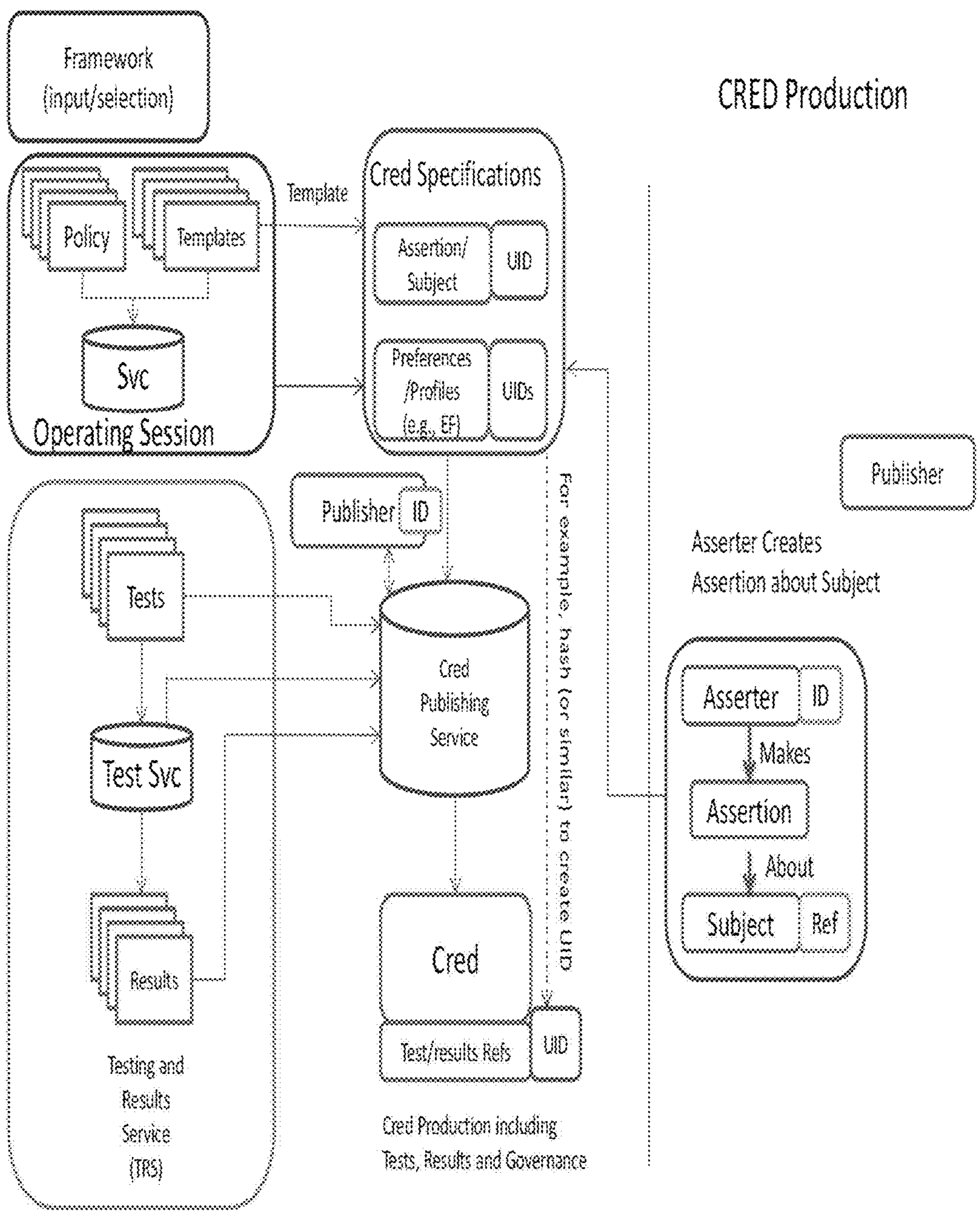

FIG. 83 is an example of Cred elements and composition.

Figure 84:
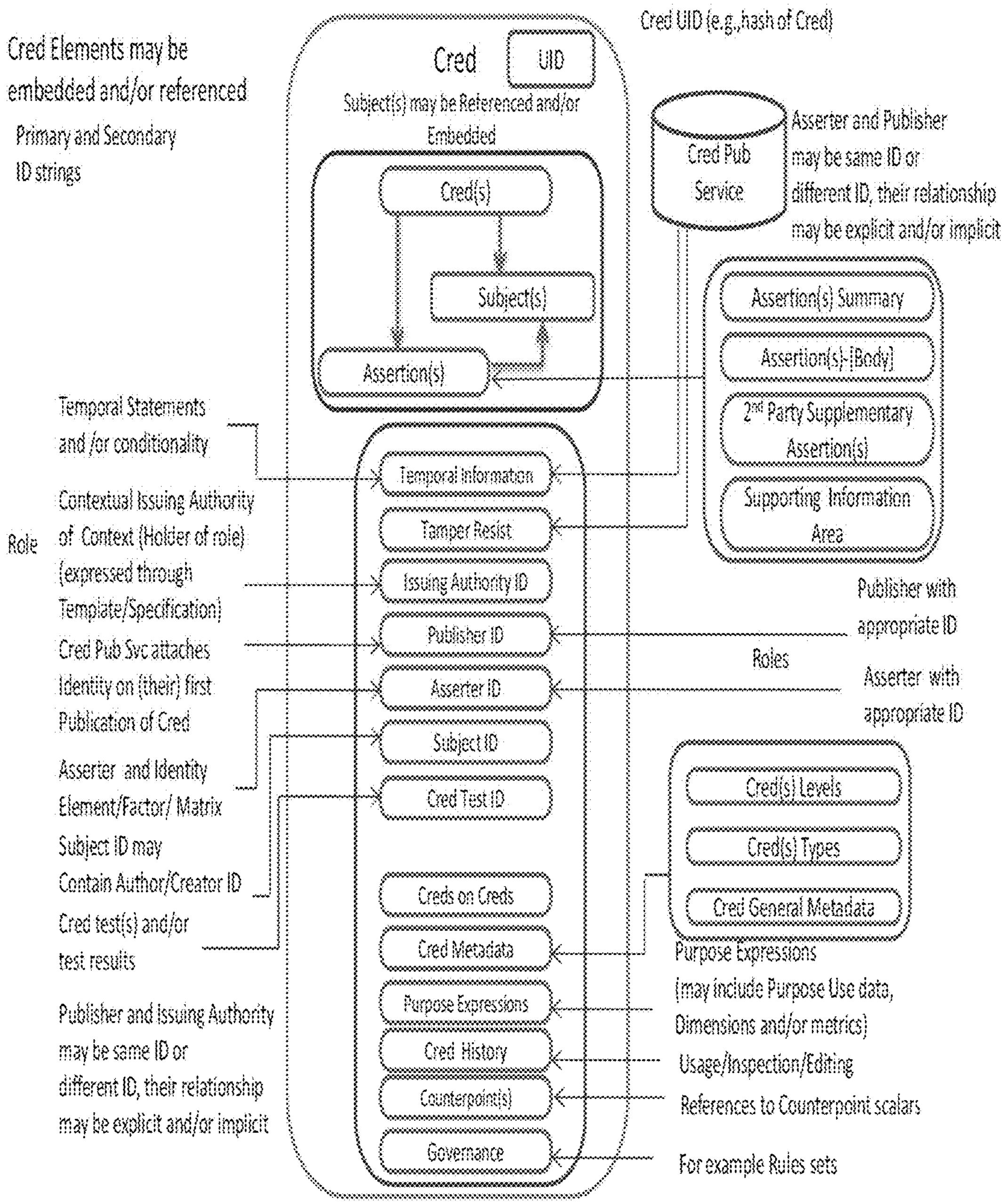

FIG. 84 is an example of Cred elements.

Figure 85:
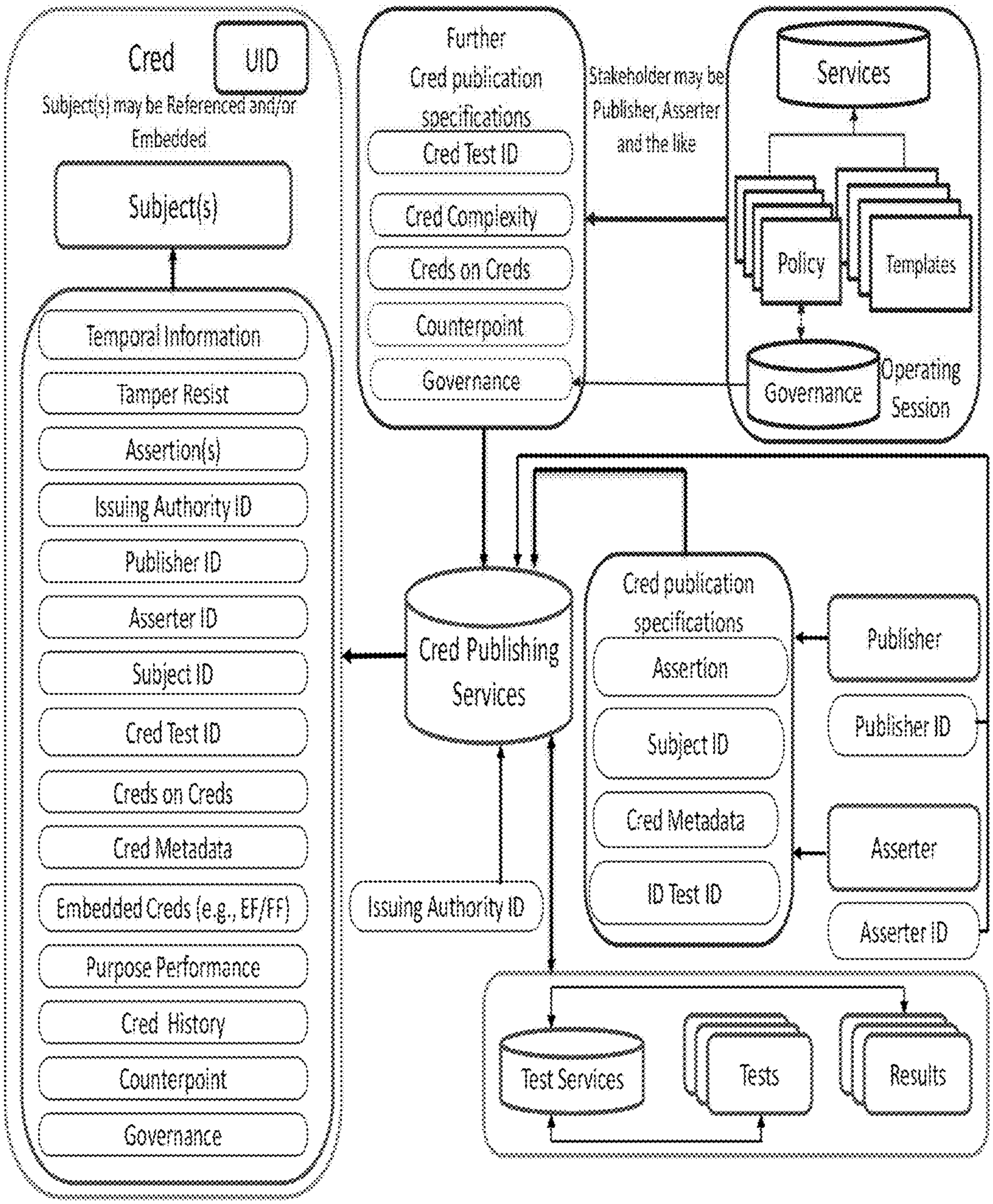

FIG. 85 is an example Cred publishing and associated processing.

Figure 86:
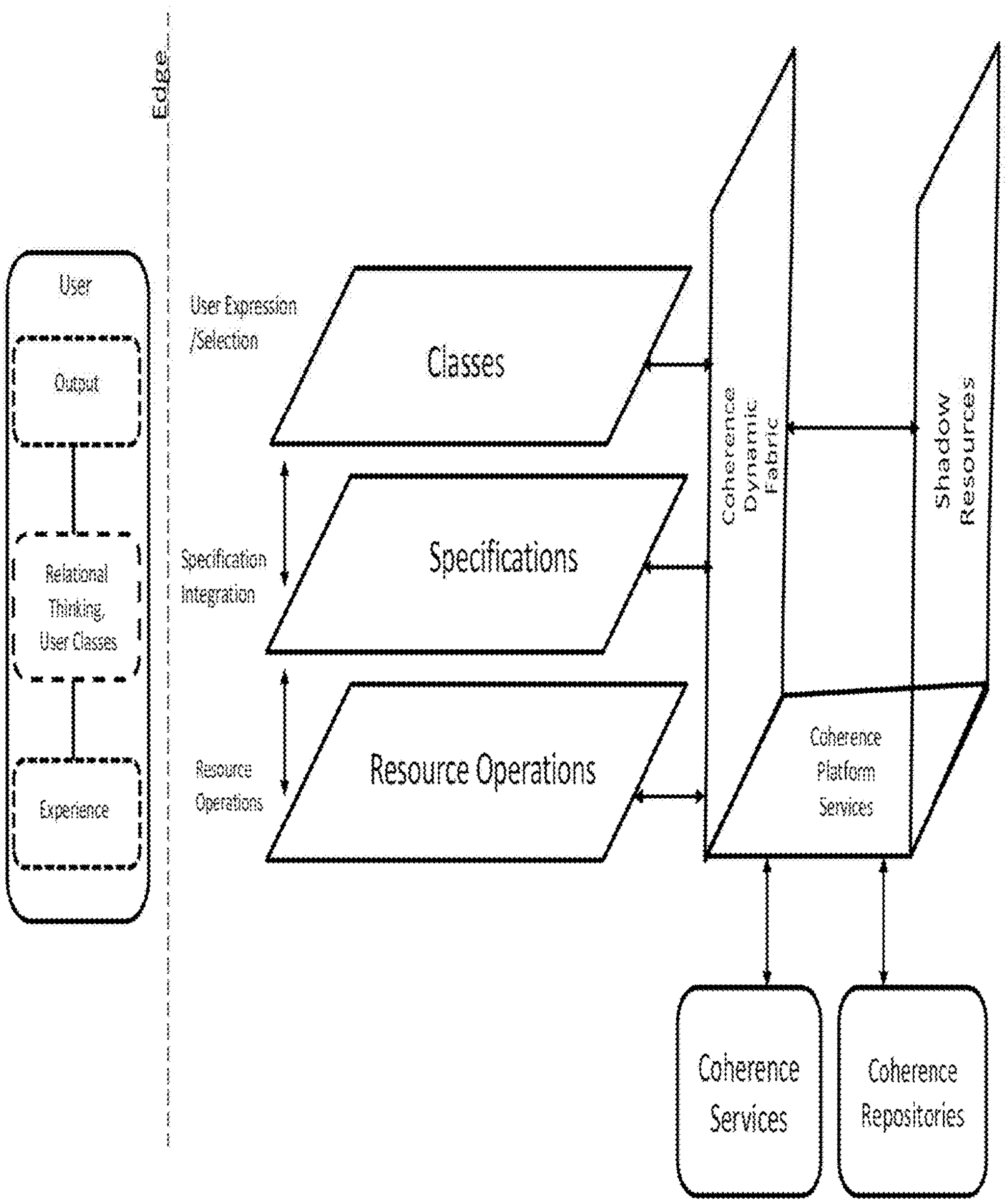

FIG. 86 is an example of three levels of Coherence.

Figure 87:
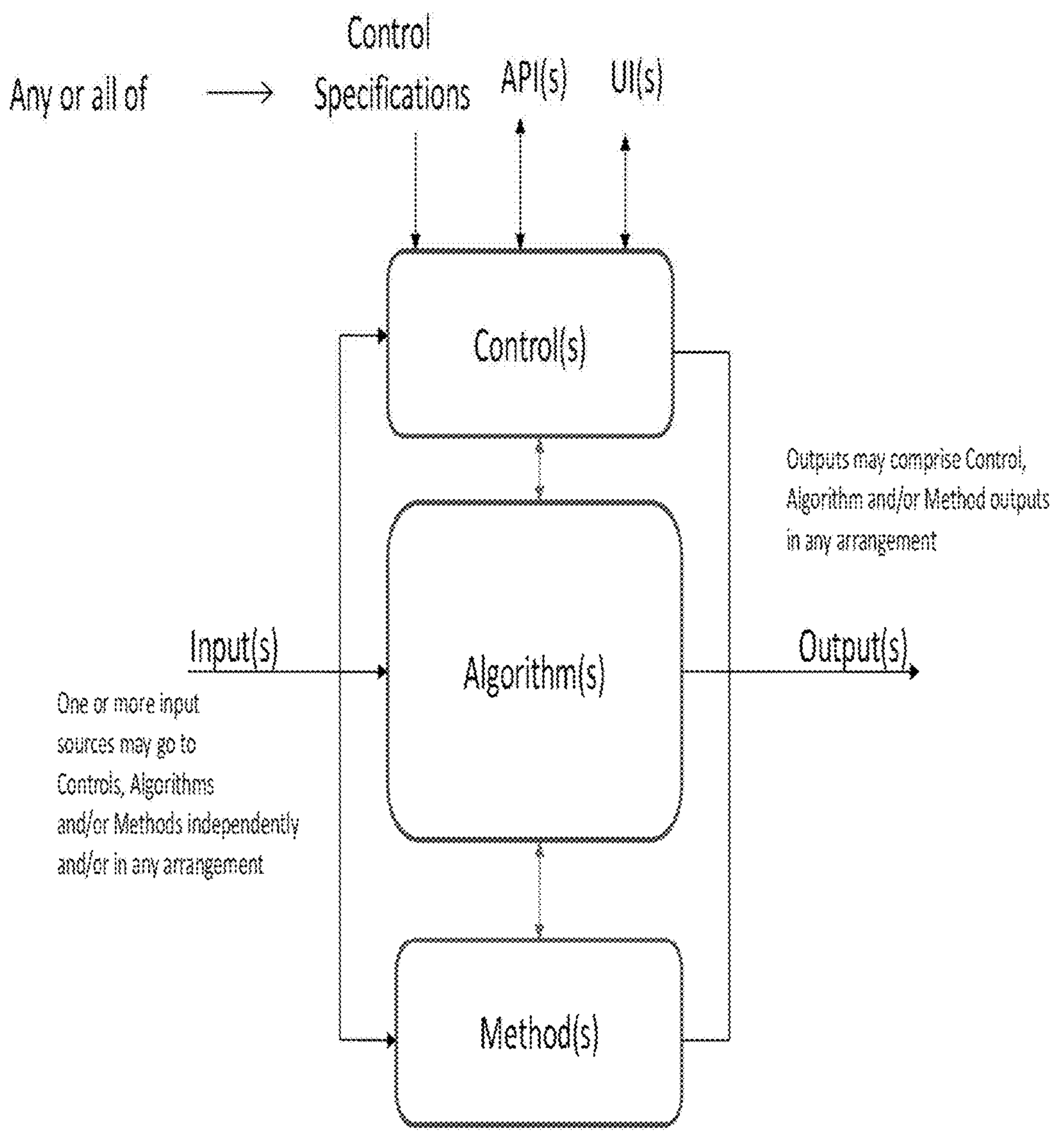

FIG. 87 is an example "generic" service structure.

Figure 88:
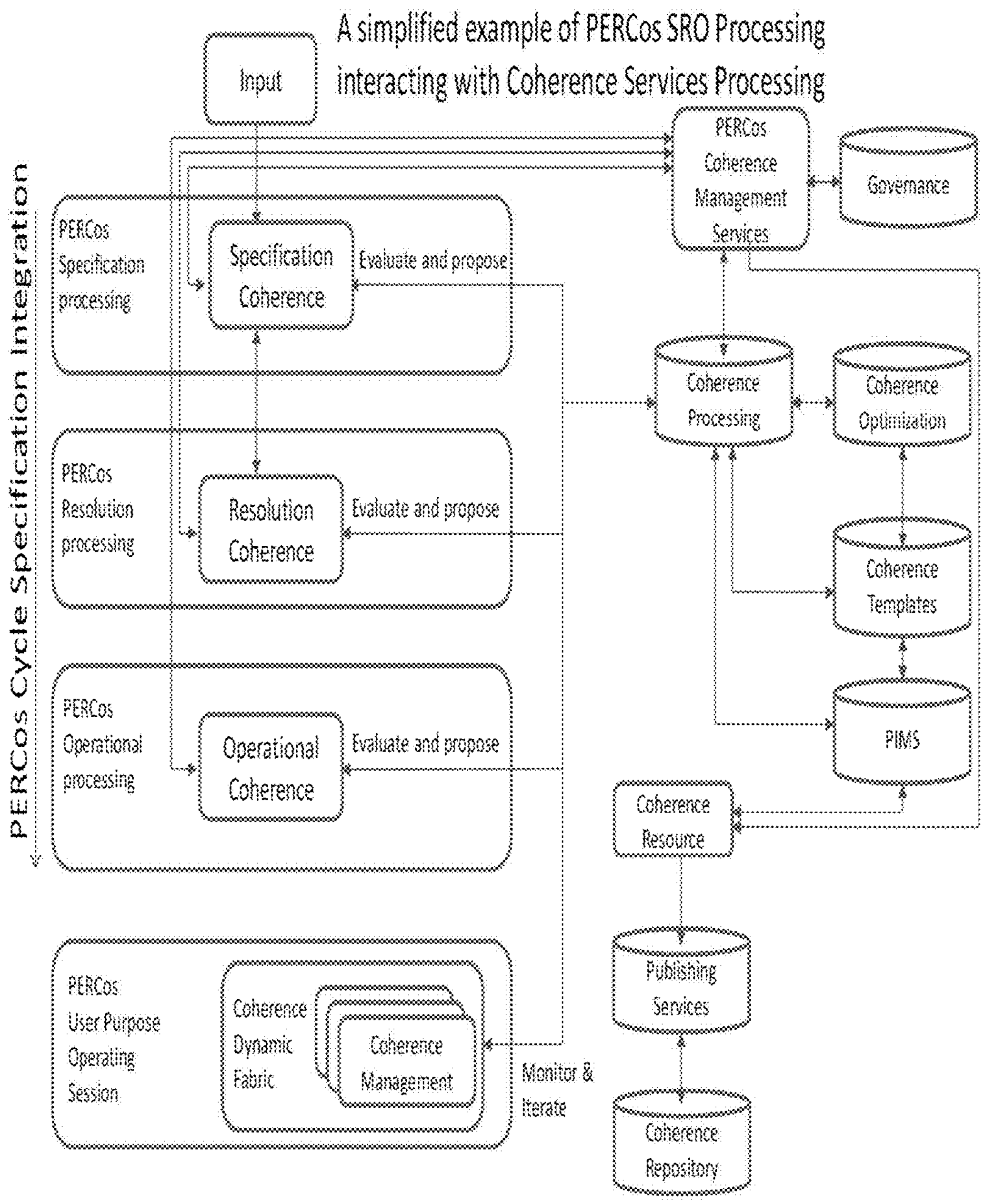

FIG. 88 is an illustrative simplified example of PERCos SRO implementation processing and Coherence services interactions.

Figure 89:
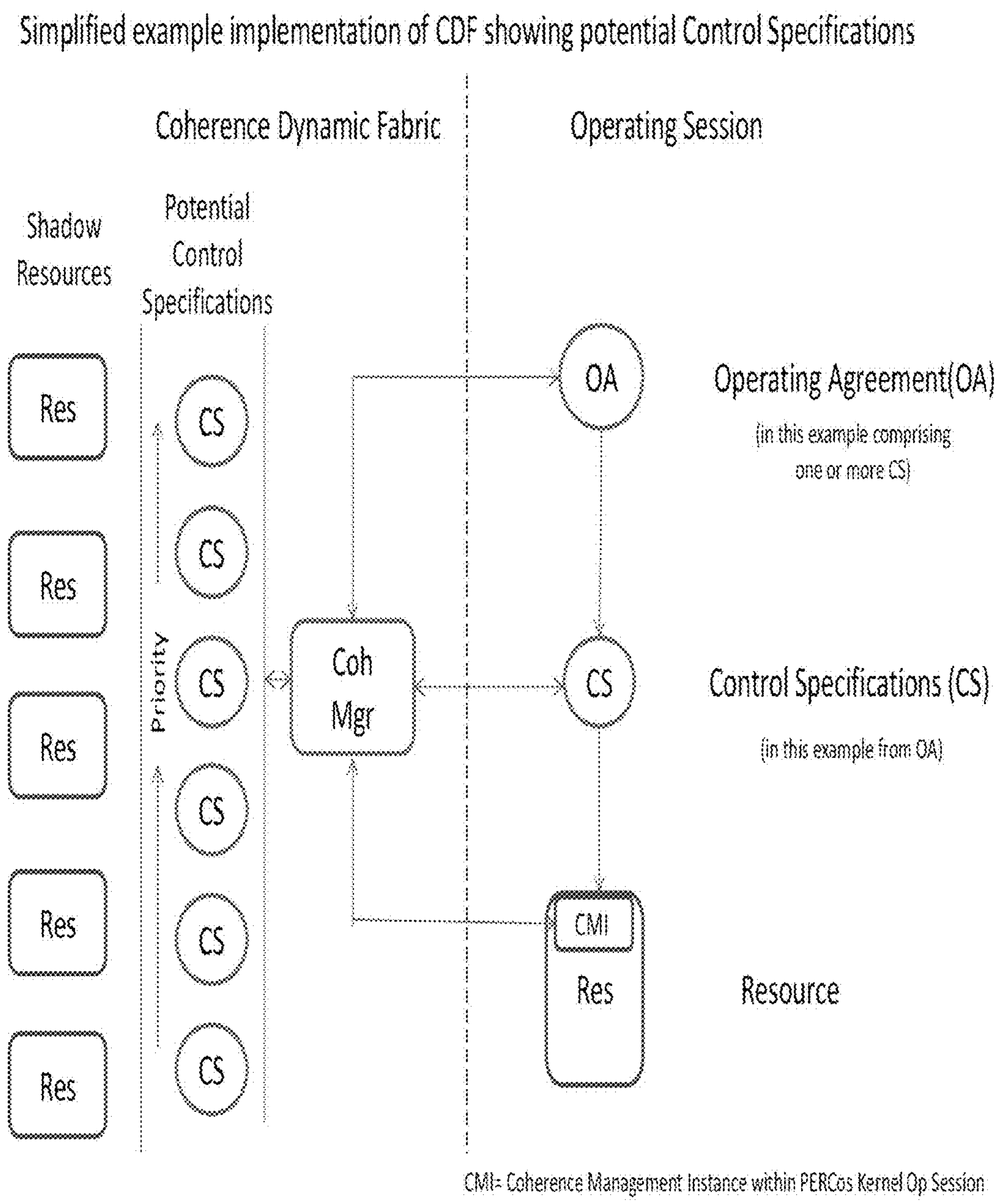

FIG. 89 is an illustrative simplified example of Coherence dynamic Fabric.

Figure 90:
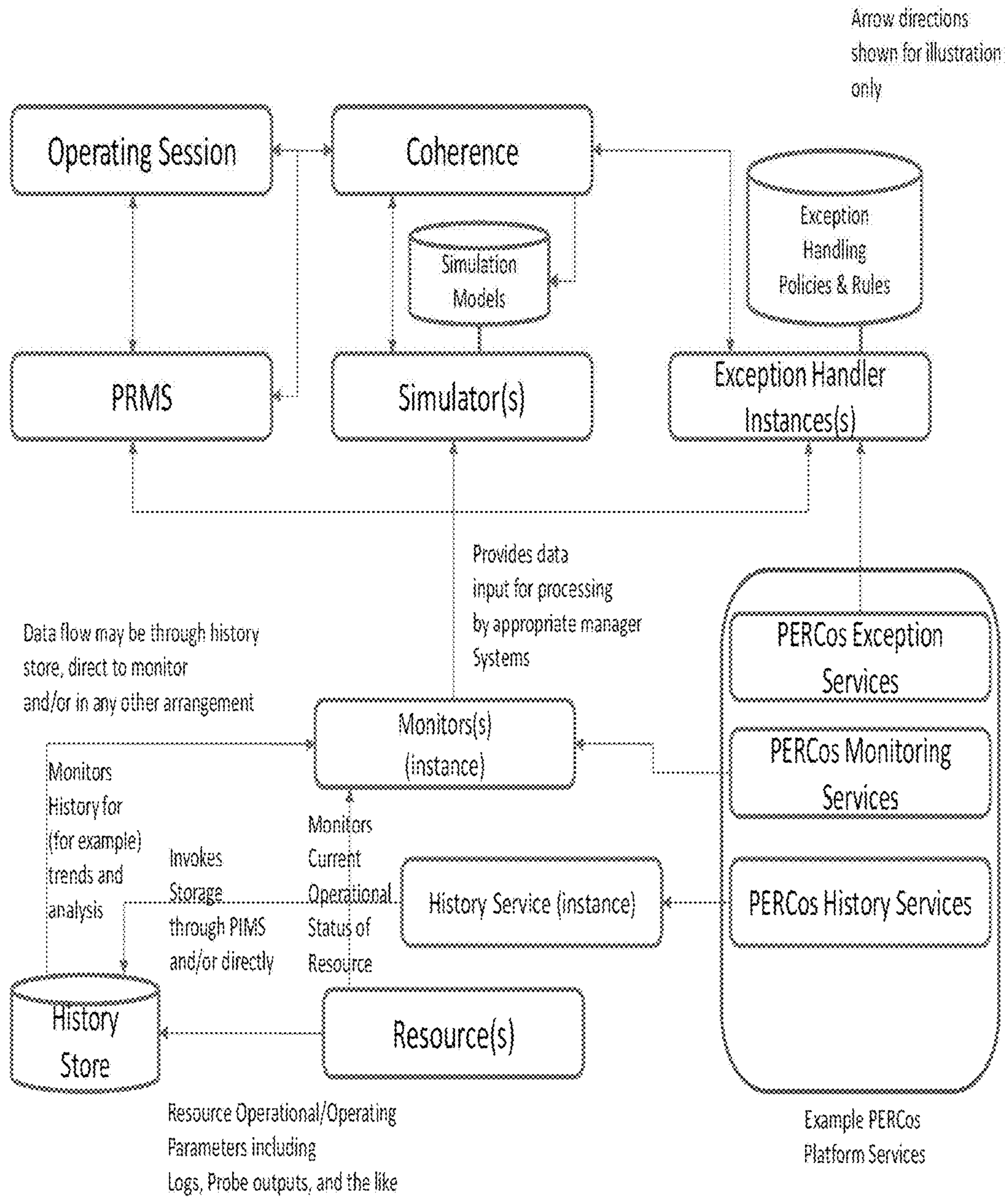

FIG. 90 is an illustrative example of Coherence simulation embodiment.

Figure 91:
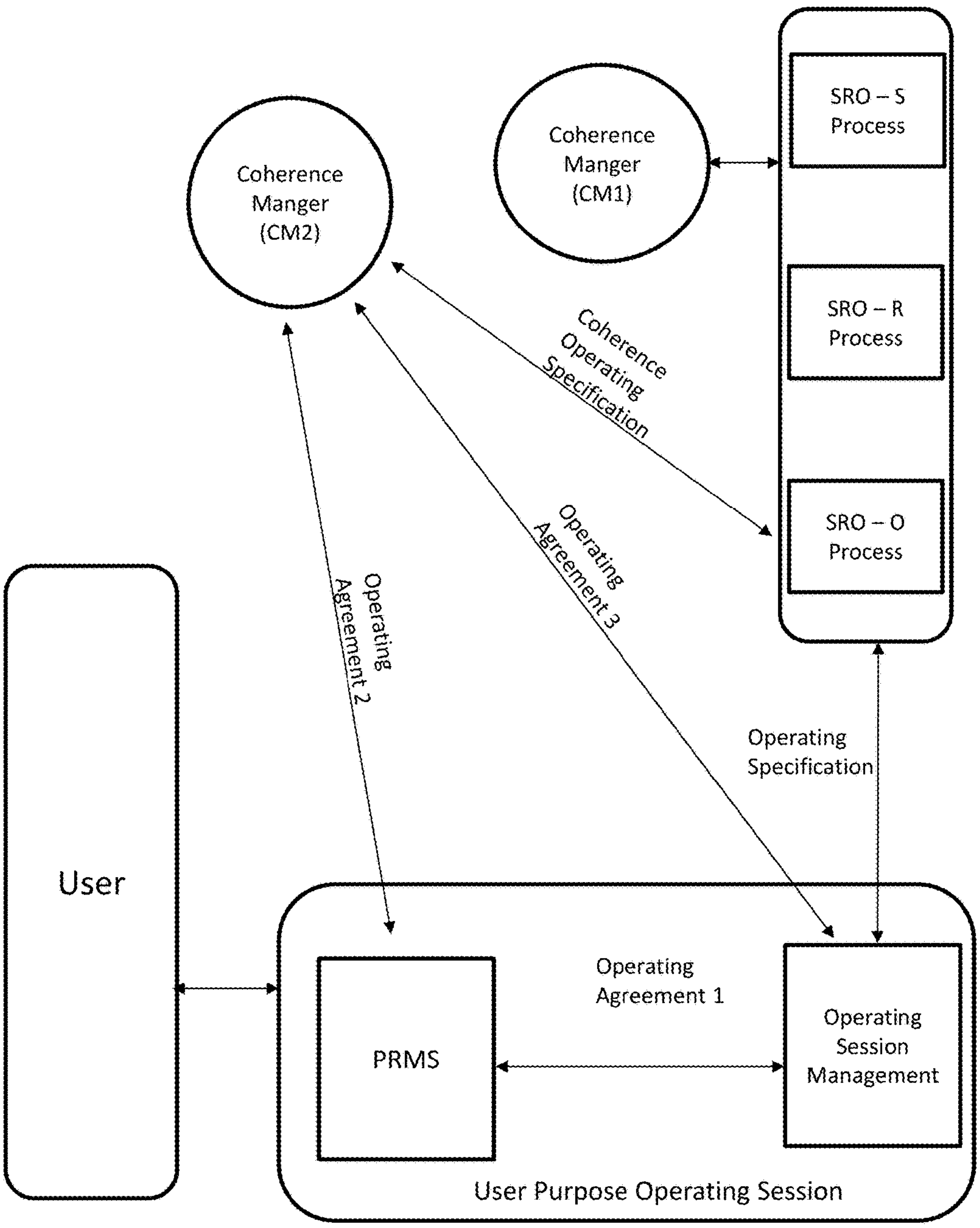

FIG. 91 is an example of Coherence interaction with PERCos services.

Figure 92:
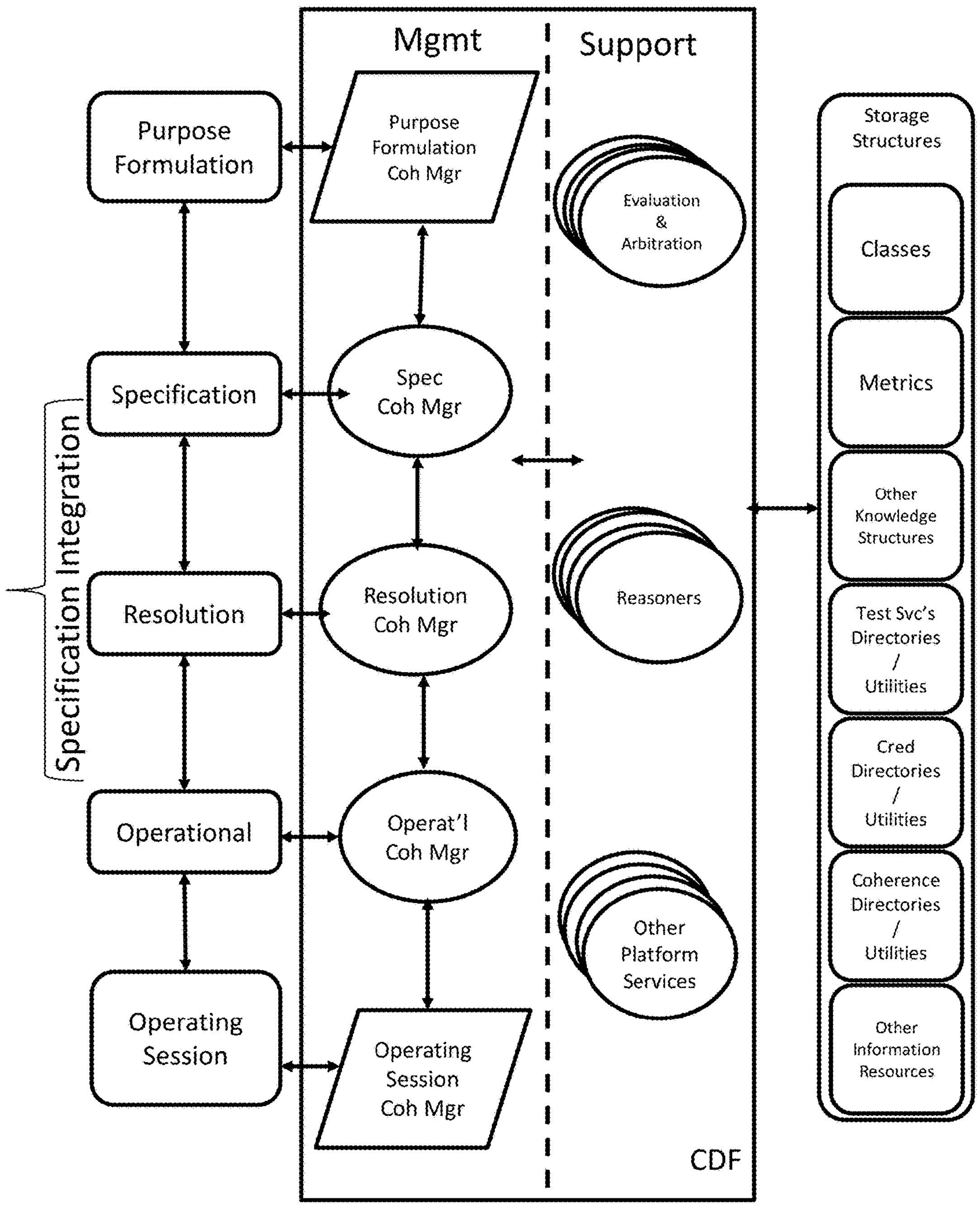

FIG. 92 is an example of Coherence management configuration.

Figure 93:
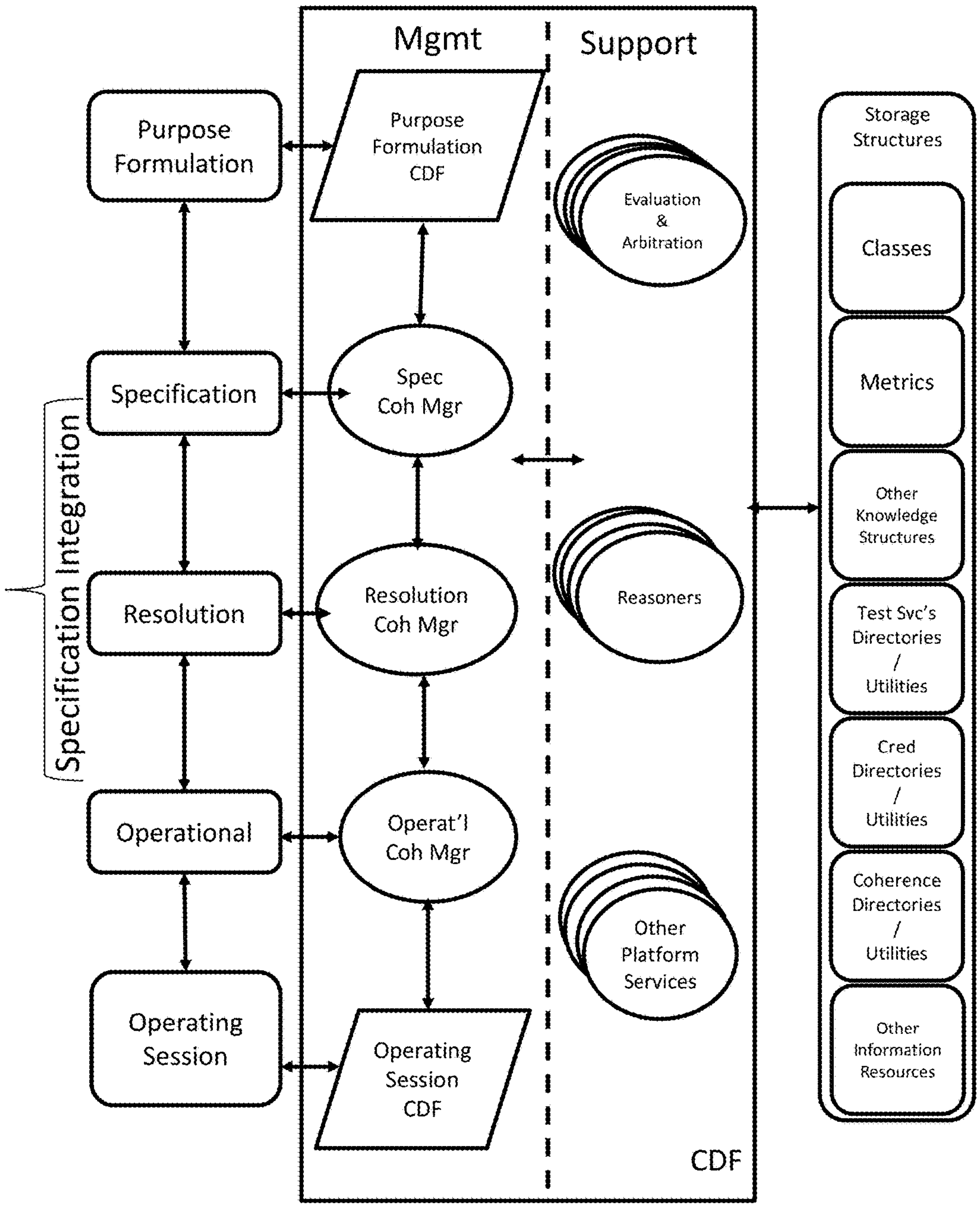

FIG. 93 is an example Coherence management configuration.

Figure 94:
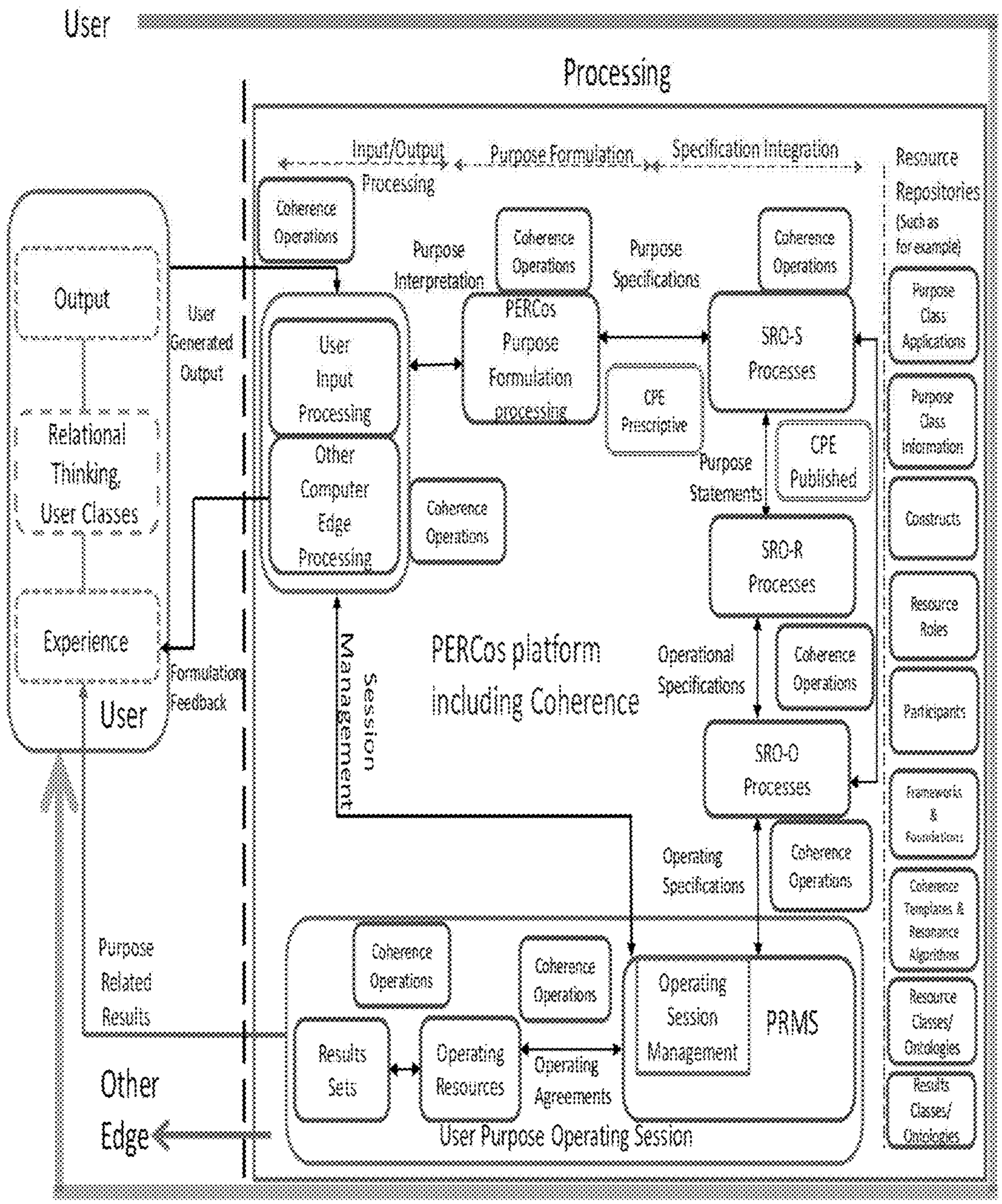

FIG. 94 is an illustrative example of PERCos cycle processing showing example Coherence interactions.

Figure 95:
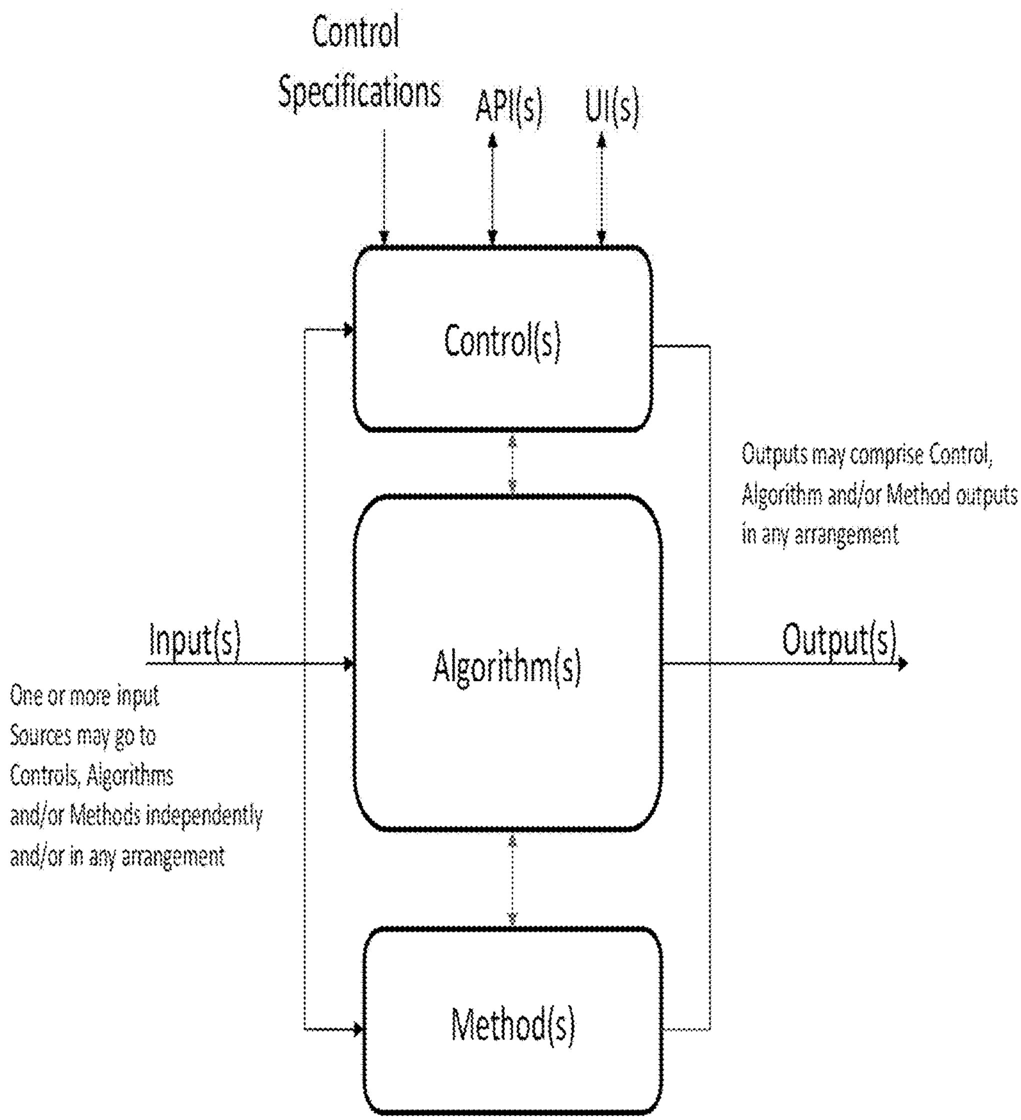

FIG. 95 is an example of PERCos simplified example service component.

Figure 96:
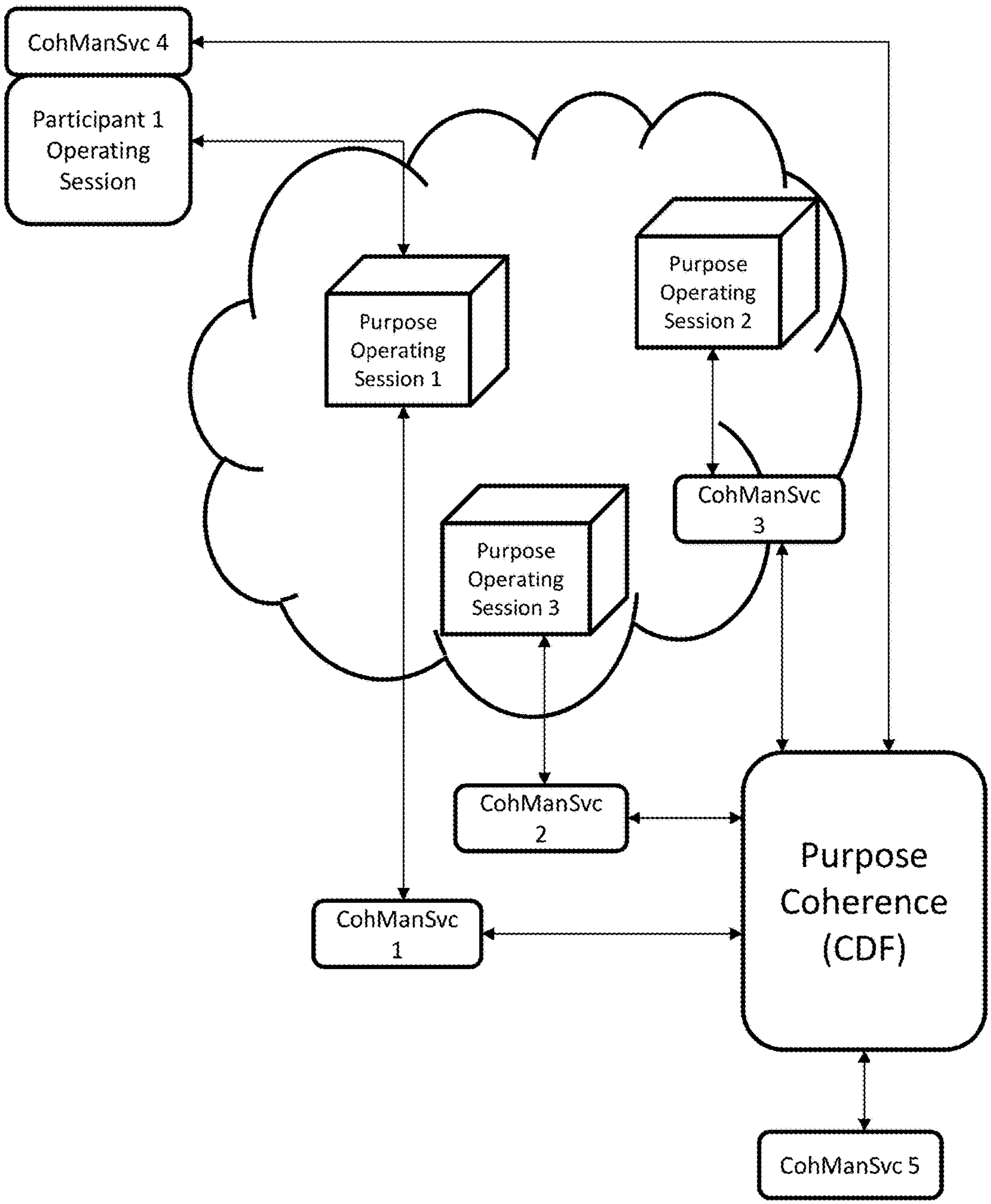

FIG. 96 is a distributed Coherence management example.

Figure 97:
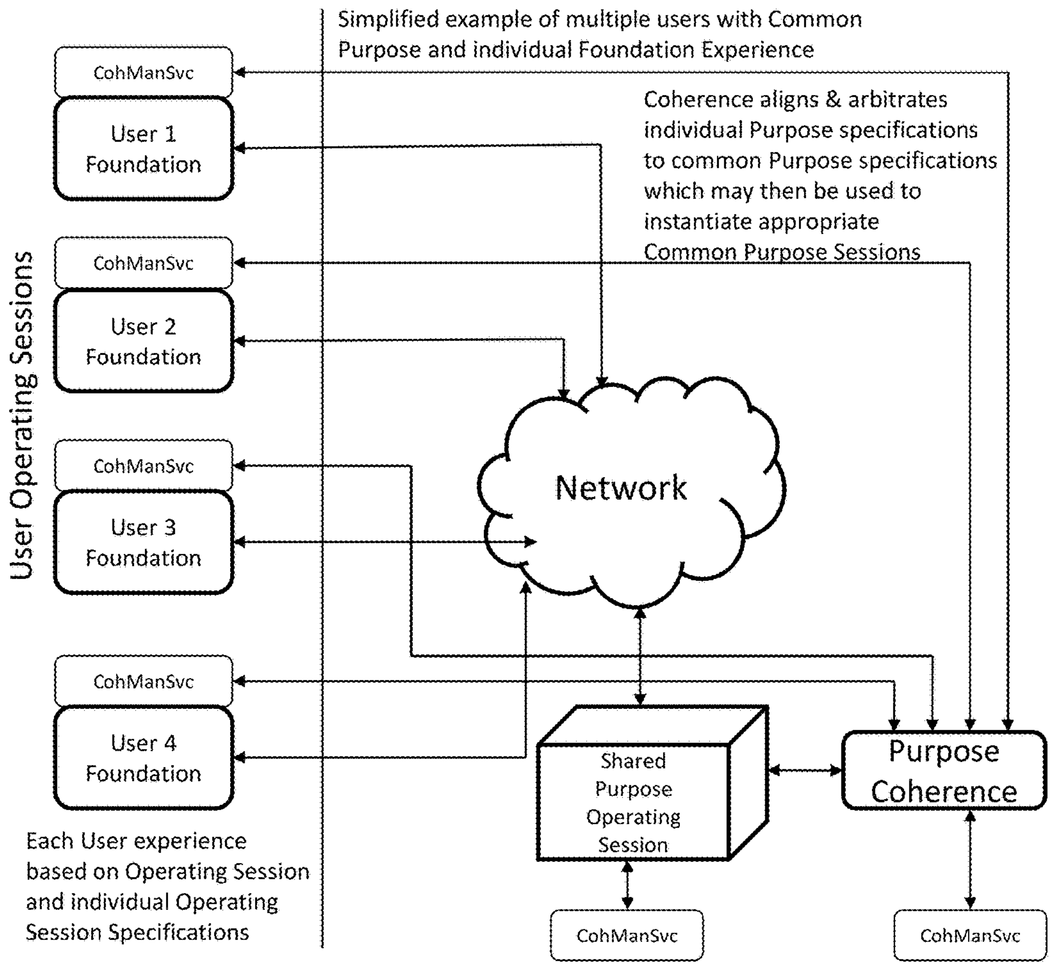

FIG. 97 is multiple users with a shared purpose.

Figure 98:
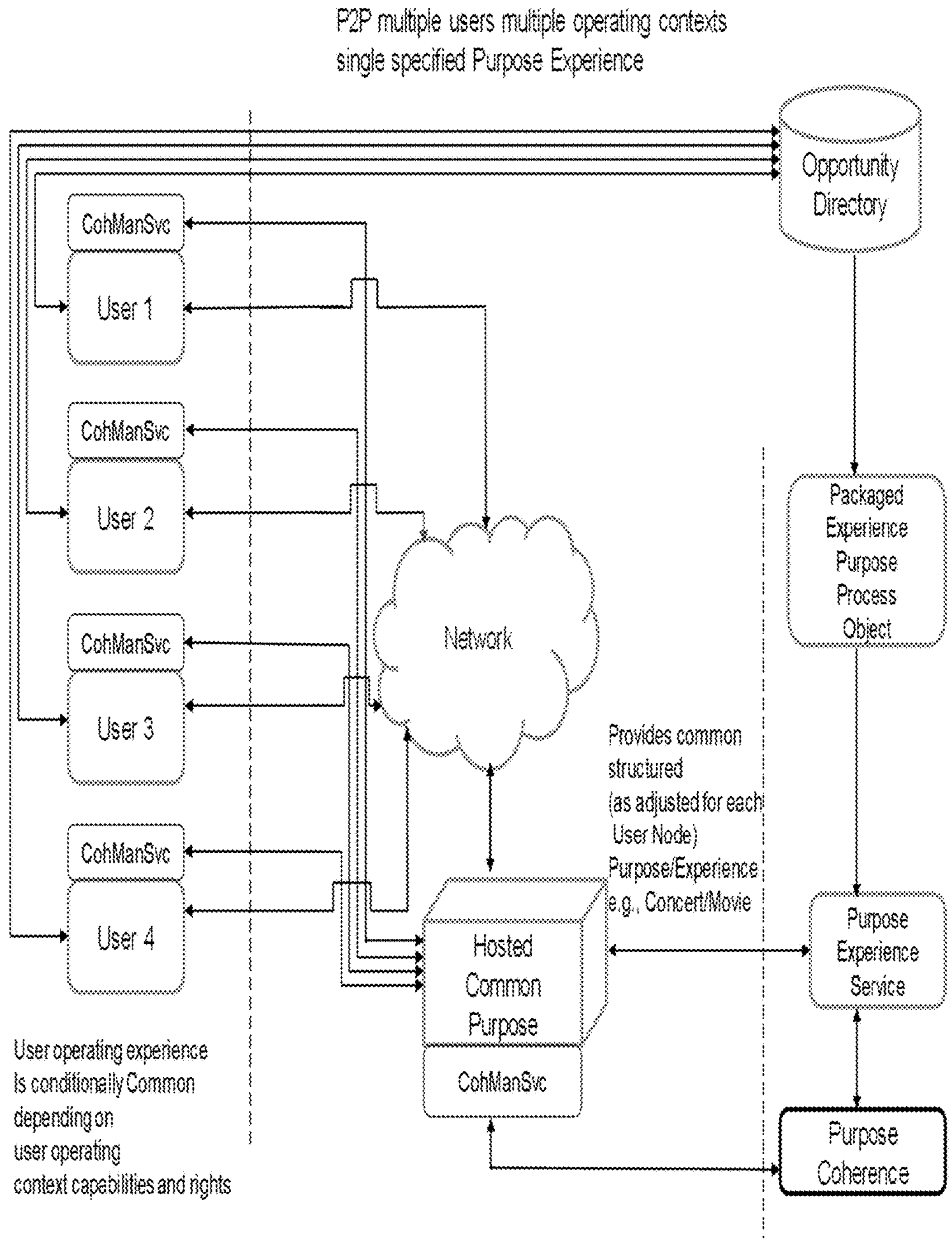

FIG. 98 is multiple users with multiple operating contexts.

Figure 99:
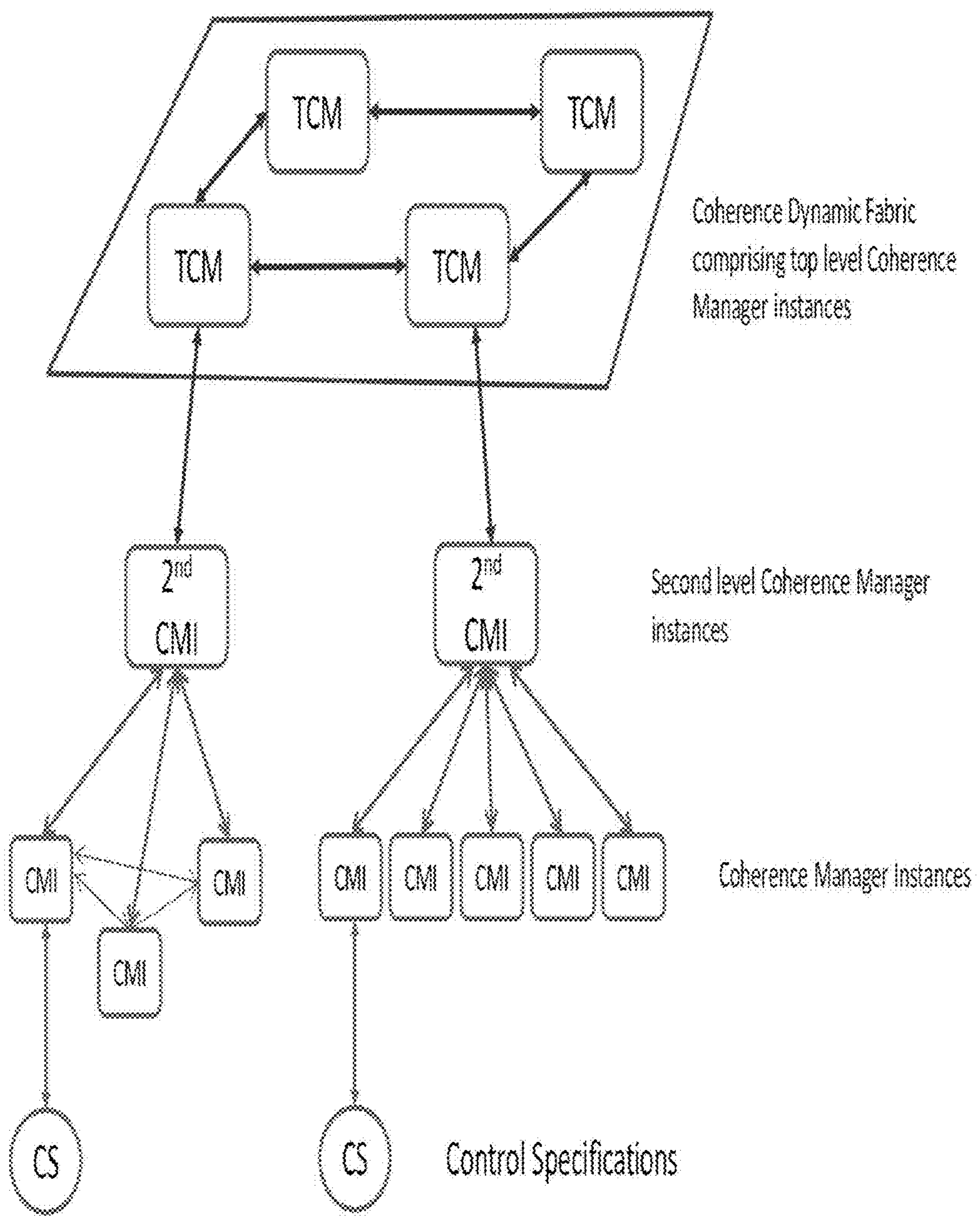

FIG. 99 is an example Coherence management hierarchy.

Figure 100:
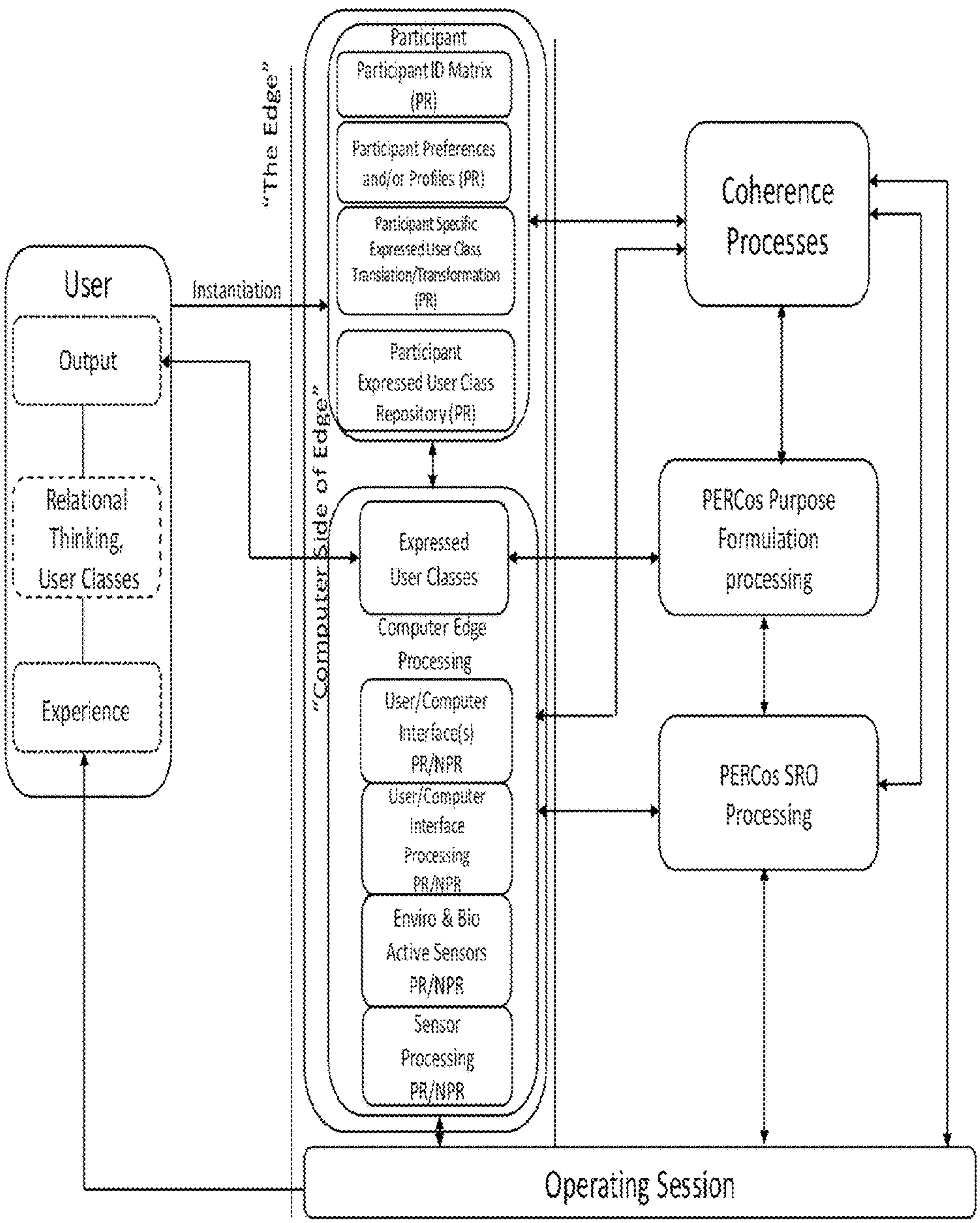

FIG. 100 is an illustrative example of computer Edge processing and Coherence processing.

Figure 101:
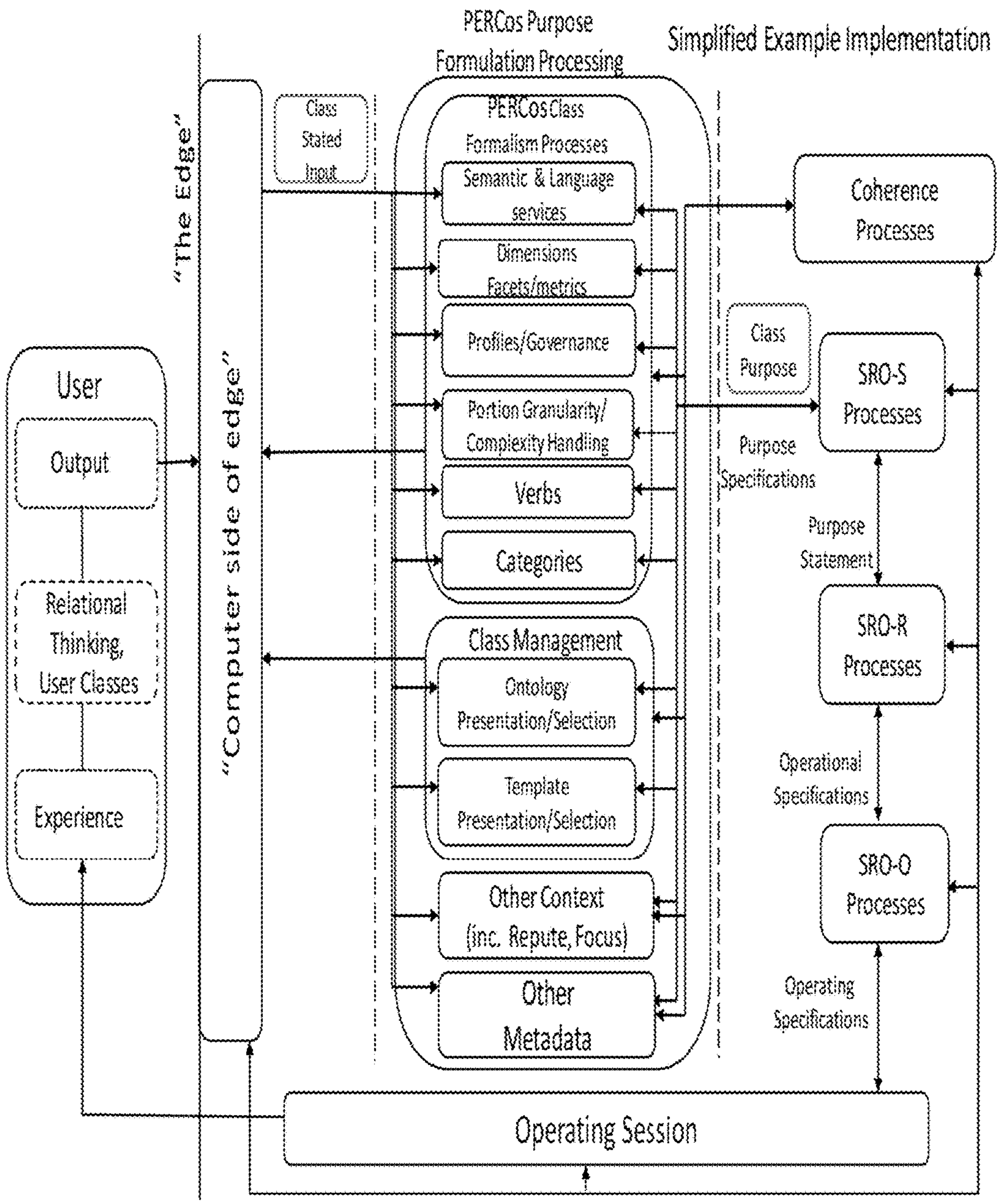

FIG. 101 is an example of Coherence interaction throughout the PERCos cycle.

Figure 102:
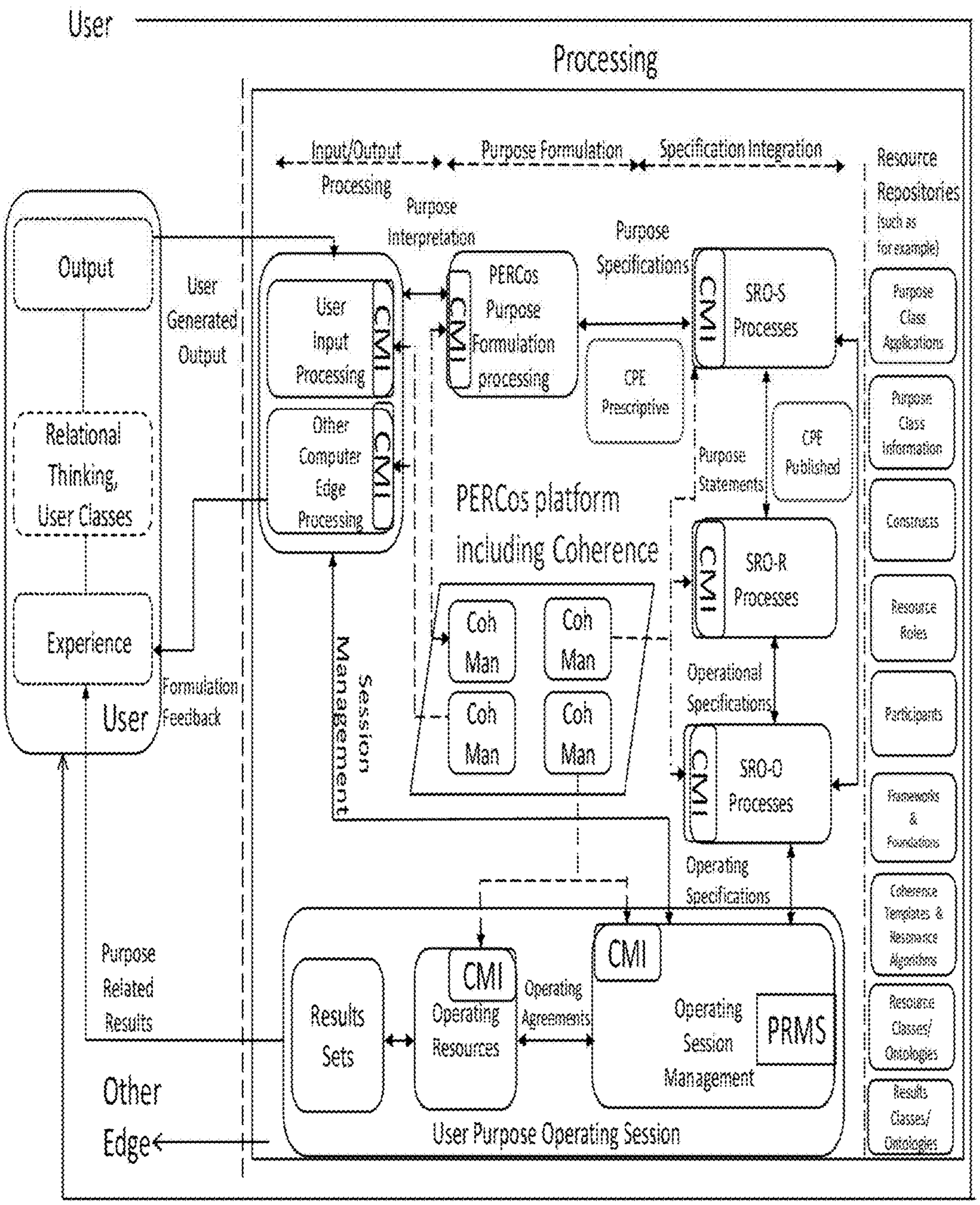

FIG. 102 is a simplified PERCos cycle with Coherence processing.

Figure 103:
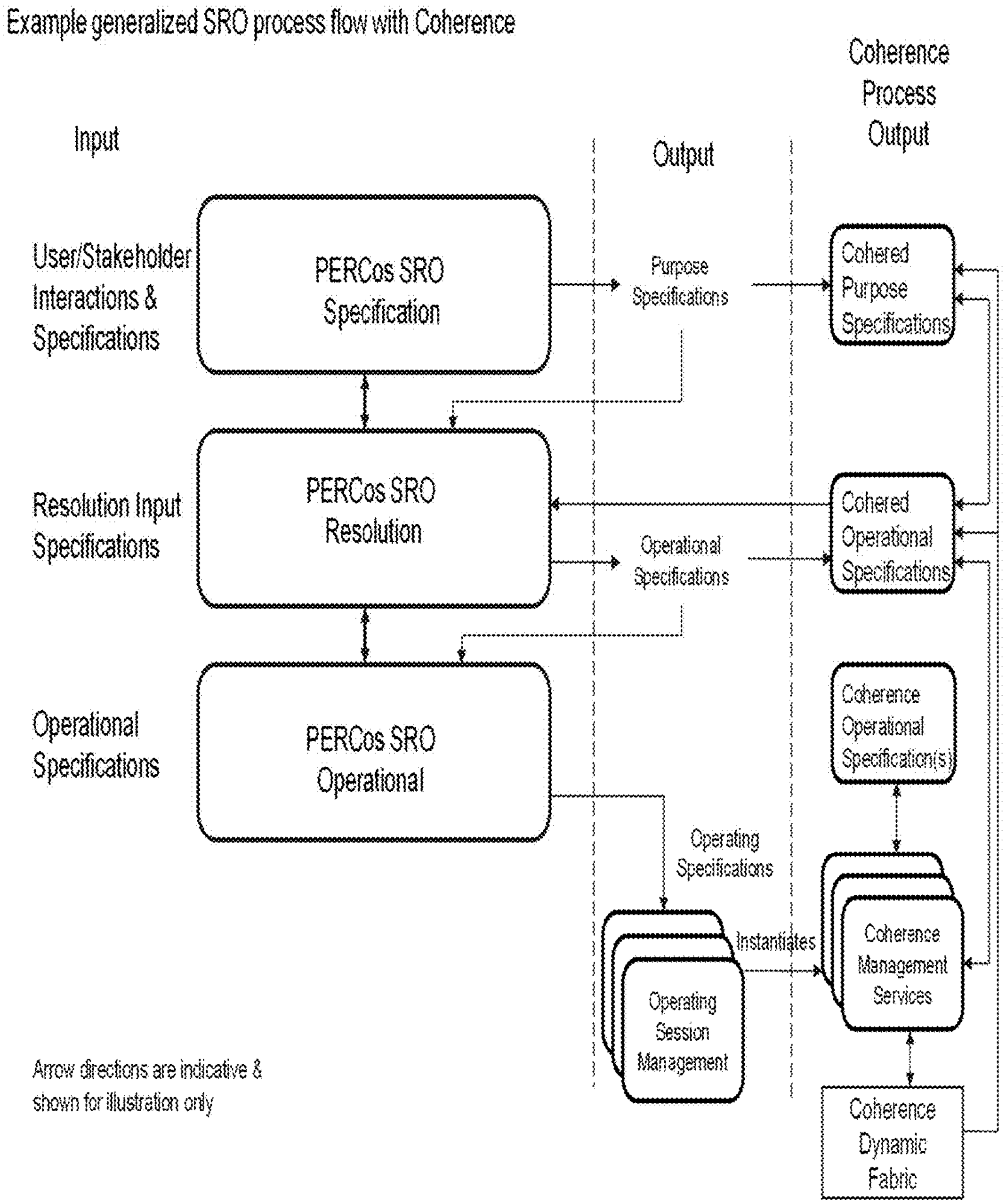

FIG. 103 is an example generalized SRO process flow with Coherence.

Figure 104:
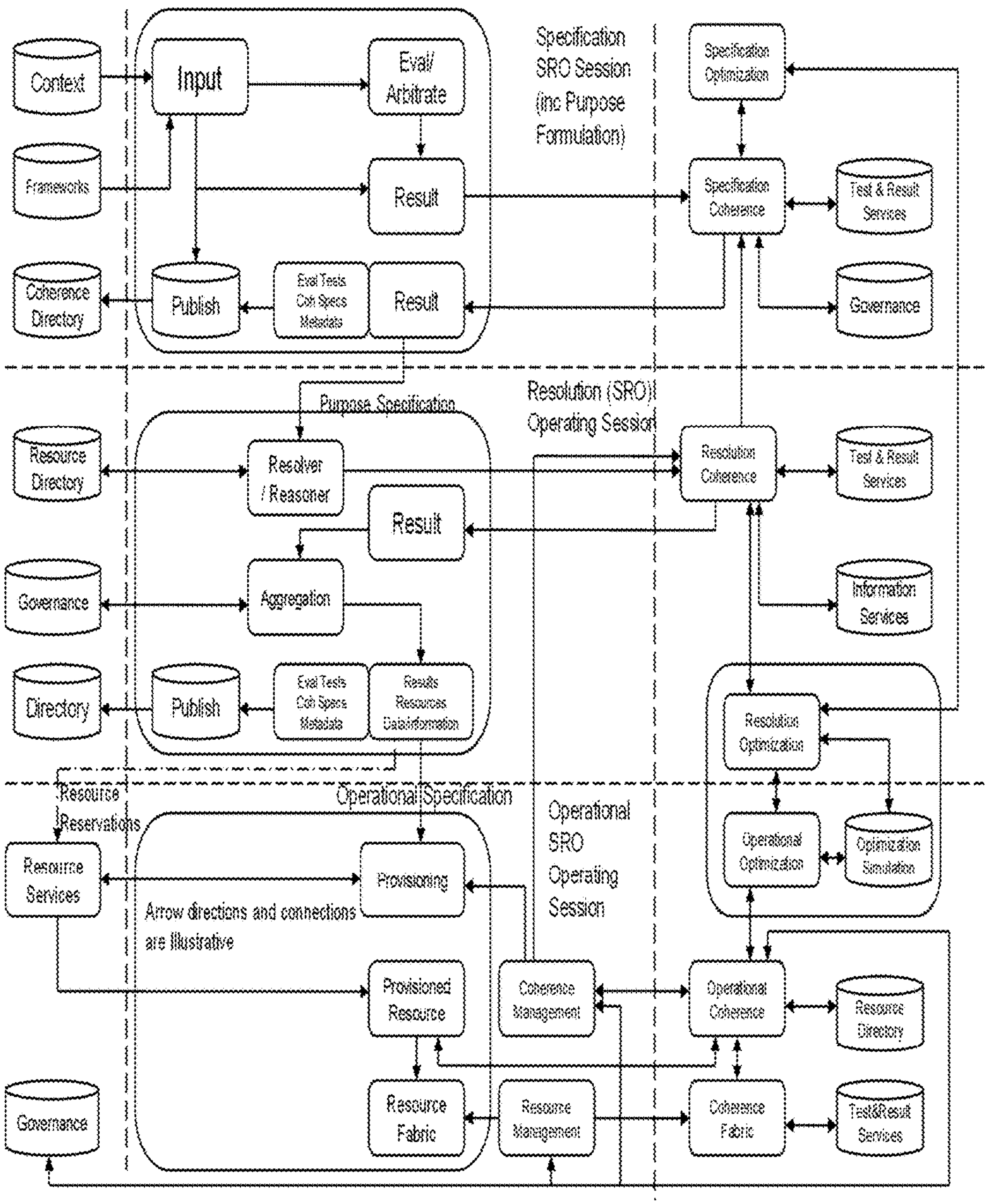

FIG. 104 is an illustrative example of Coherence interactions with SRO processing.

Figure 105:
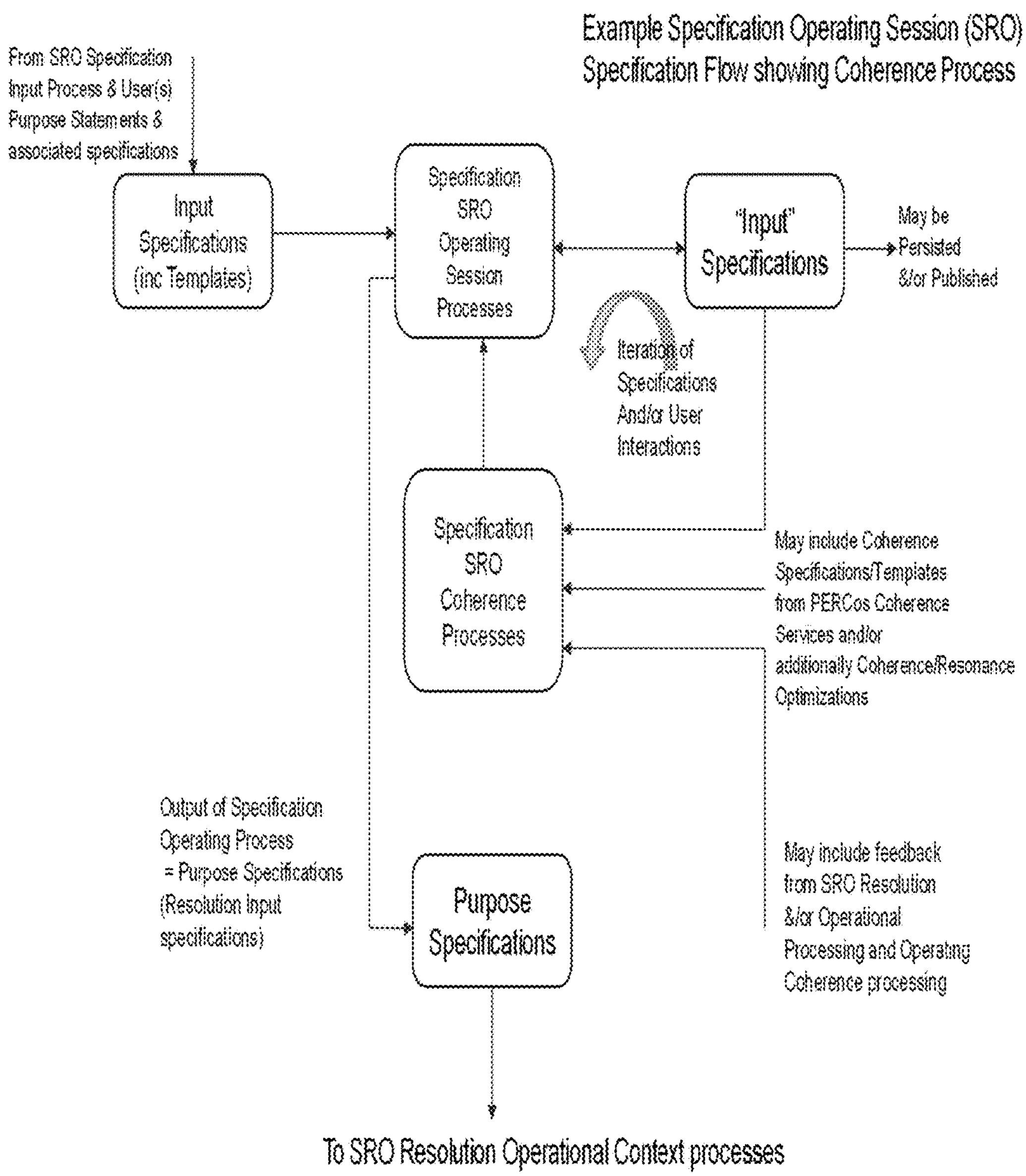

FIG. 105 is an illustrative example of SRO specification processing and Coherence.

Figure 106:
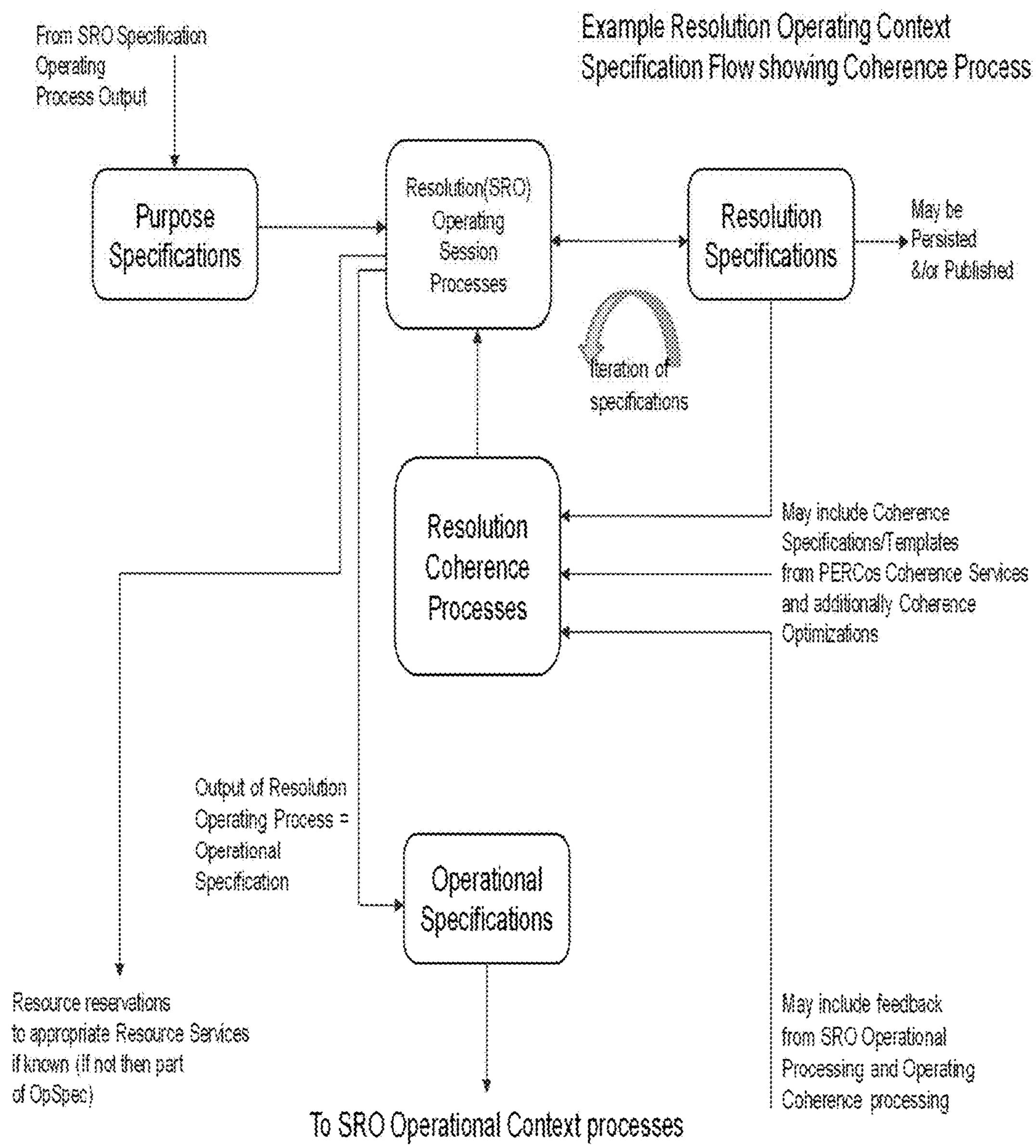

FIG. 106 is an illustrative example of SRO resolution processing and Coherence.

Figure 107:
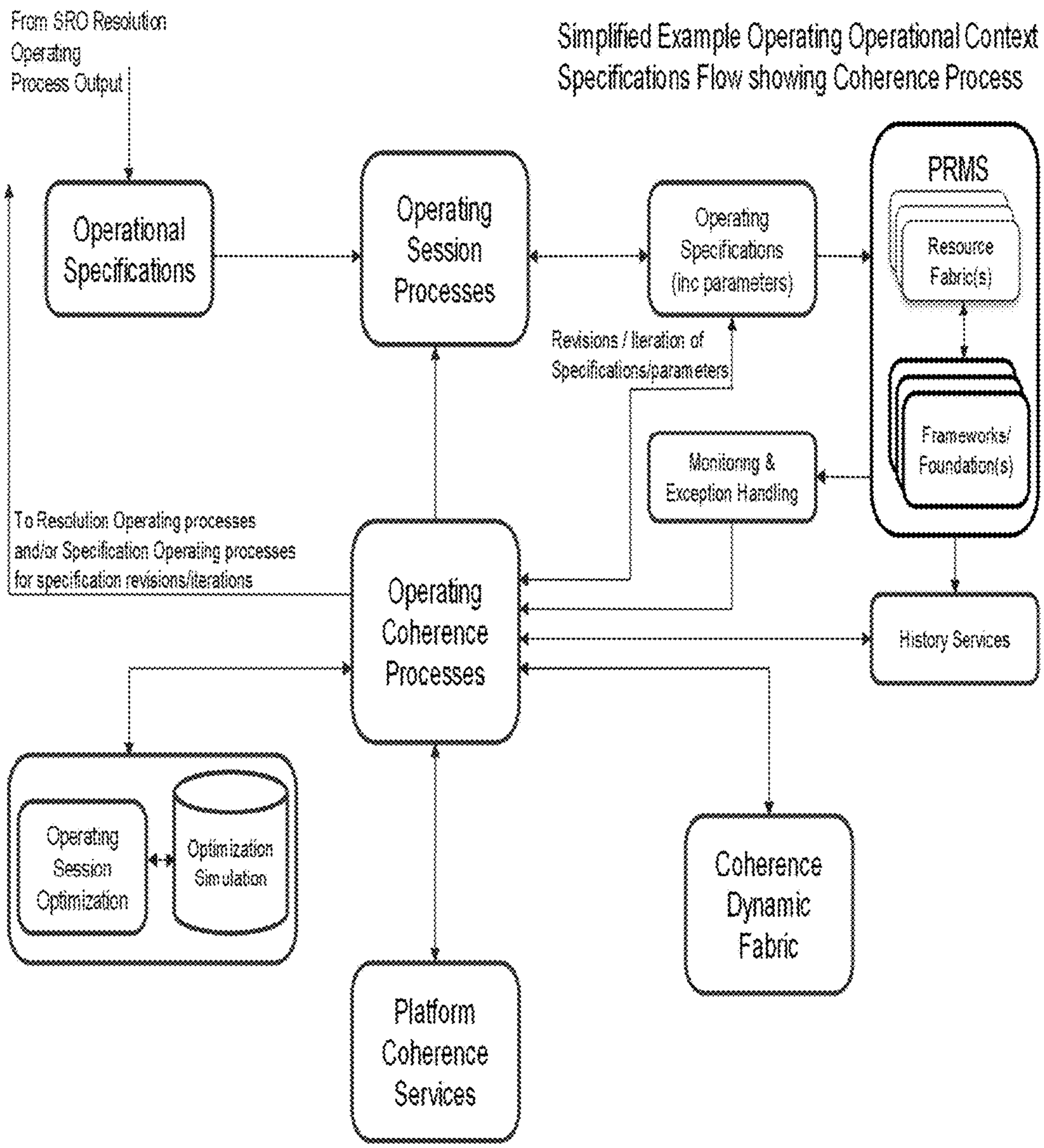

FIG. 107 is an illustrative example of SRO operational processing and Coherence.

Figure 108:
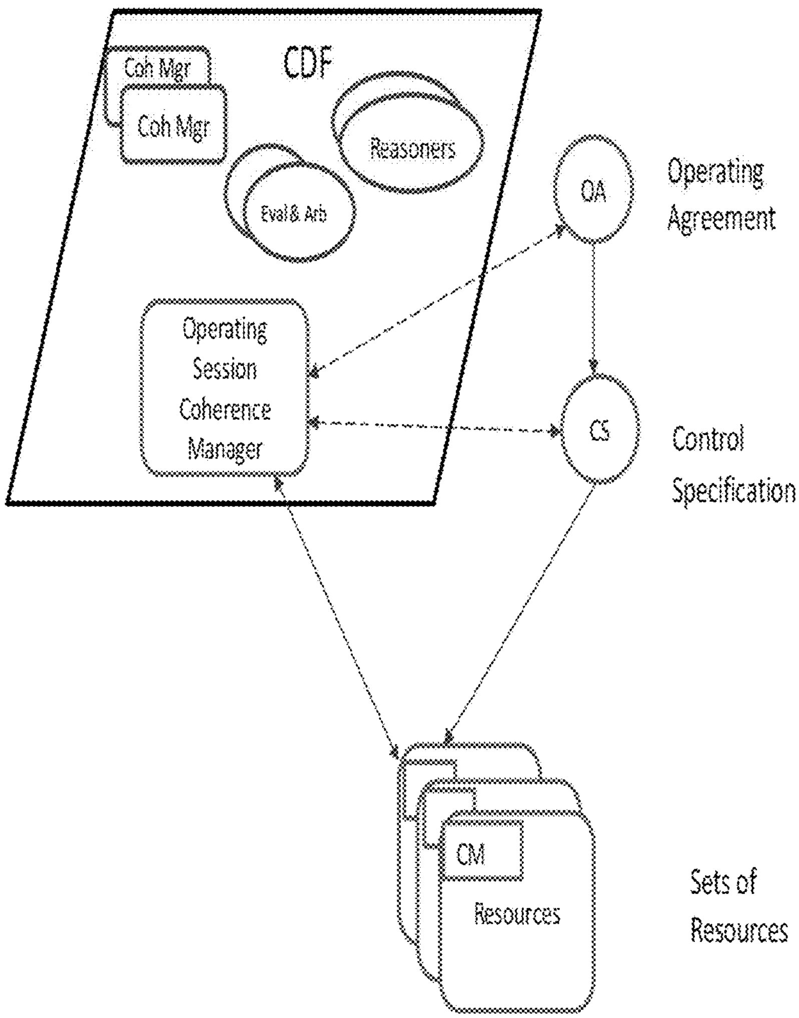

FIG. 108 is an illustrative example of Coherence managers, operating agreements, and operating resources.

Figure 109:
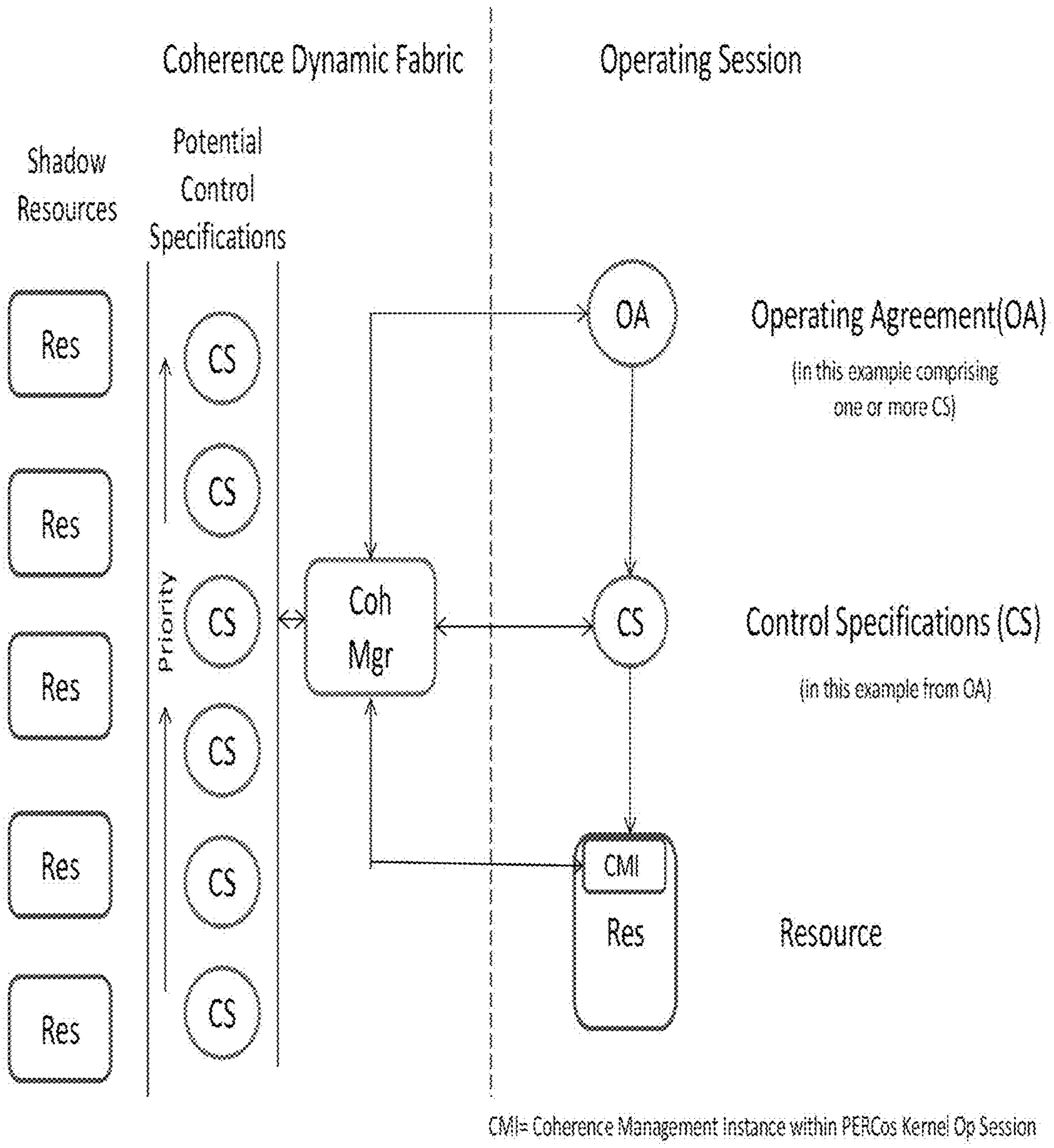

FIG. 109 is Coherence manager, shadow resources, and alternative control specifications.

Figure 110:
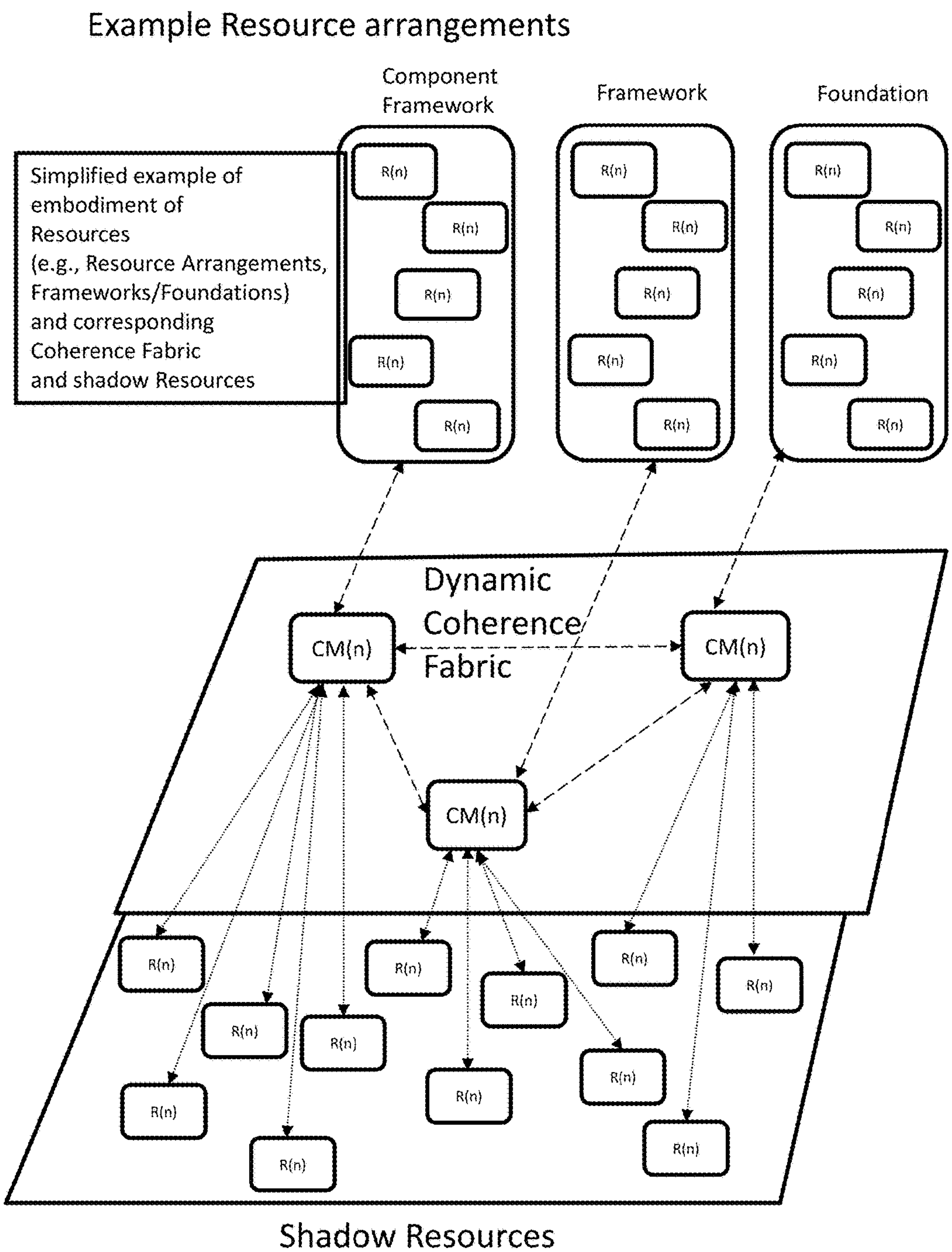

FIG. 110 is a simplified example of an embodiment of resource arrangements.

Figure 111:
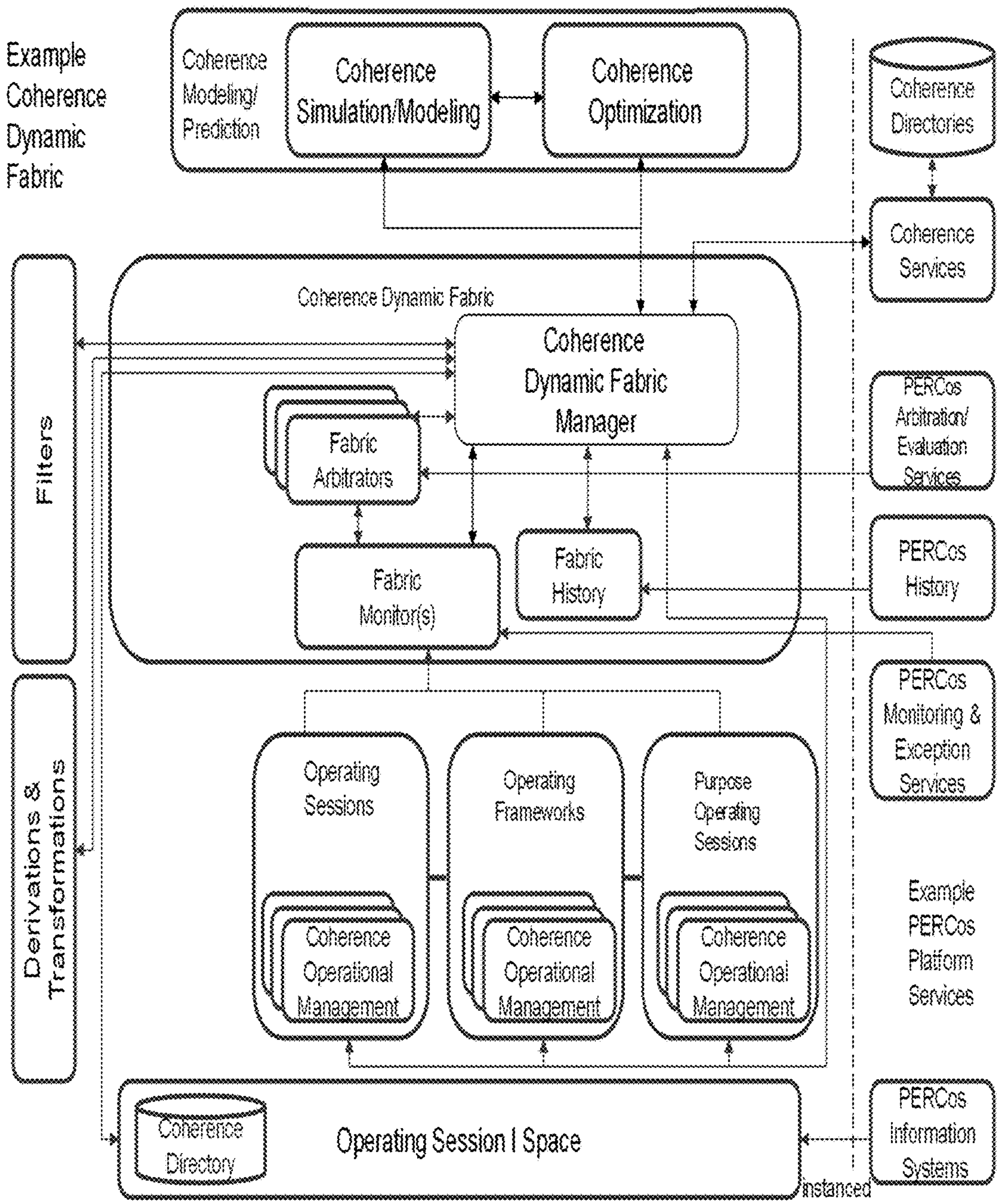

FIG. 111 is an example Coherence dynamic Fabric manager.

Figure 112:
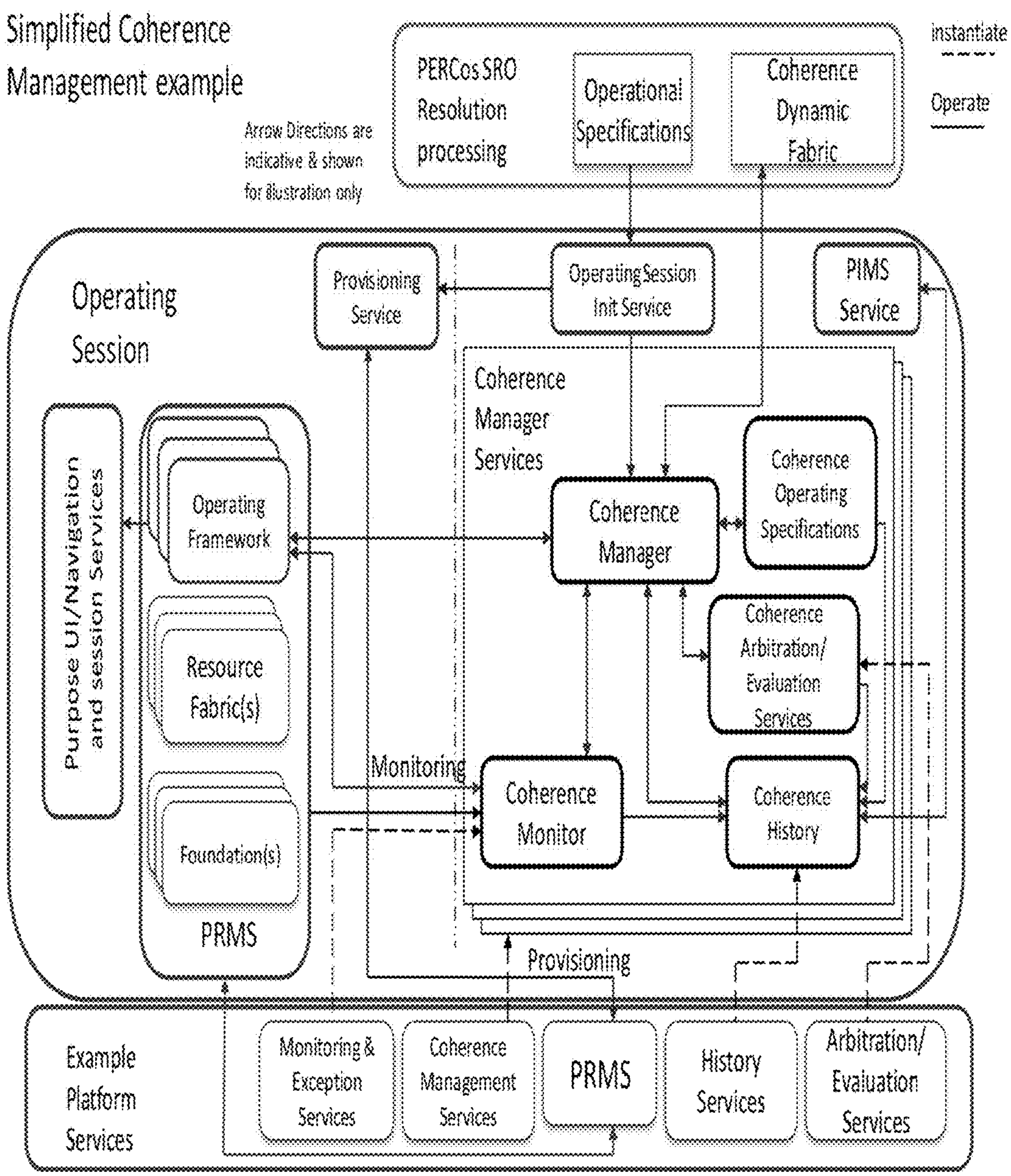

FIG. 112 is an example Coherence manager services embodiment.

FIG. 112*a* is an example of Coherence Components.

Figure 113:
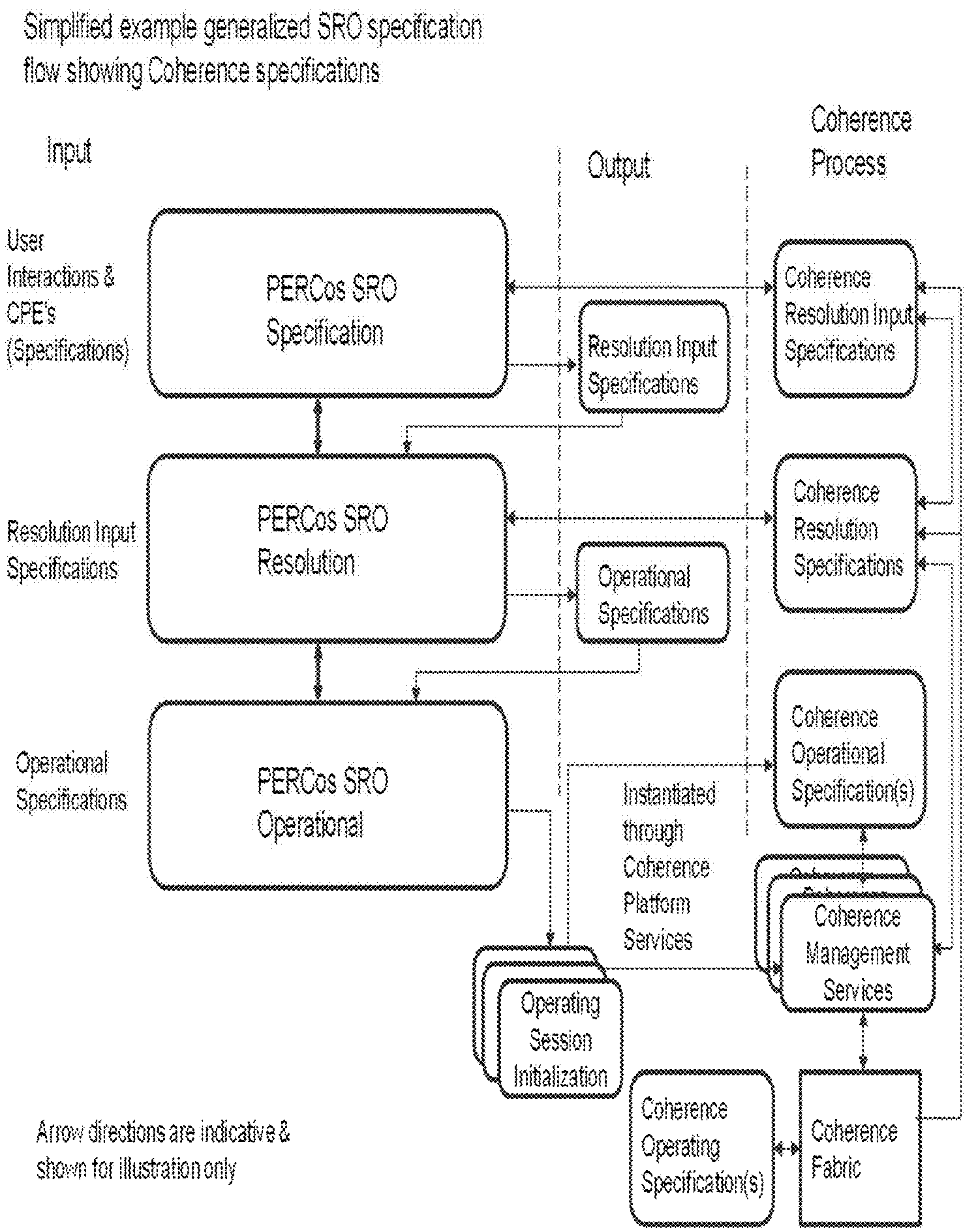

FIG. 113 is an illustrative SRO specification flow with Coherence support.

Figure 114:
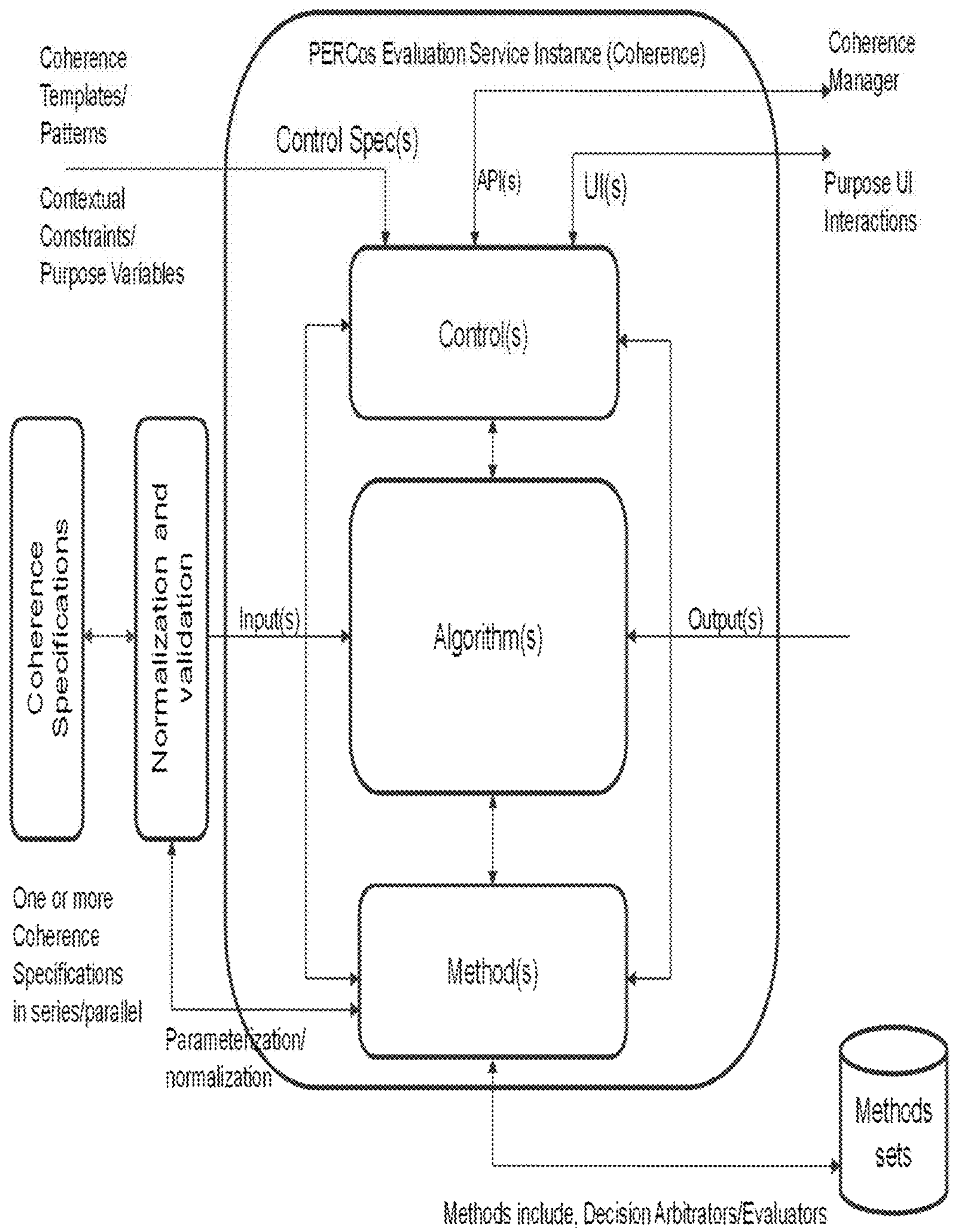

FIG. 114 is an example PERCos evaluation service instance.

Figure 115:
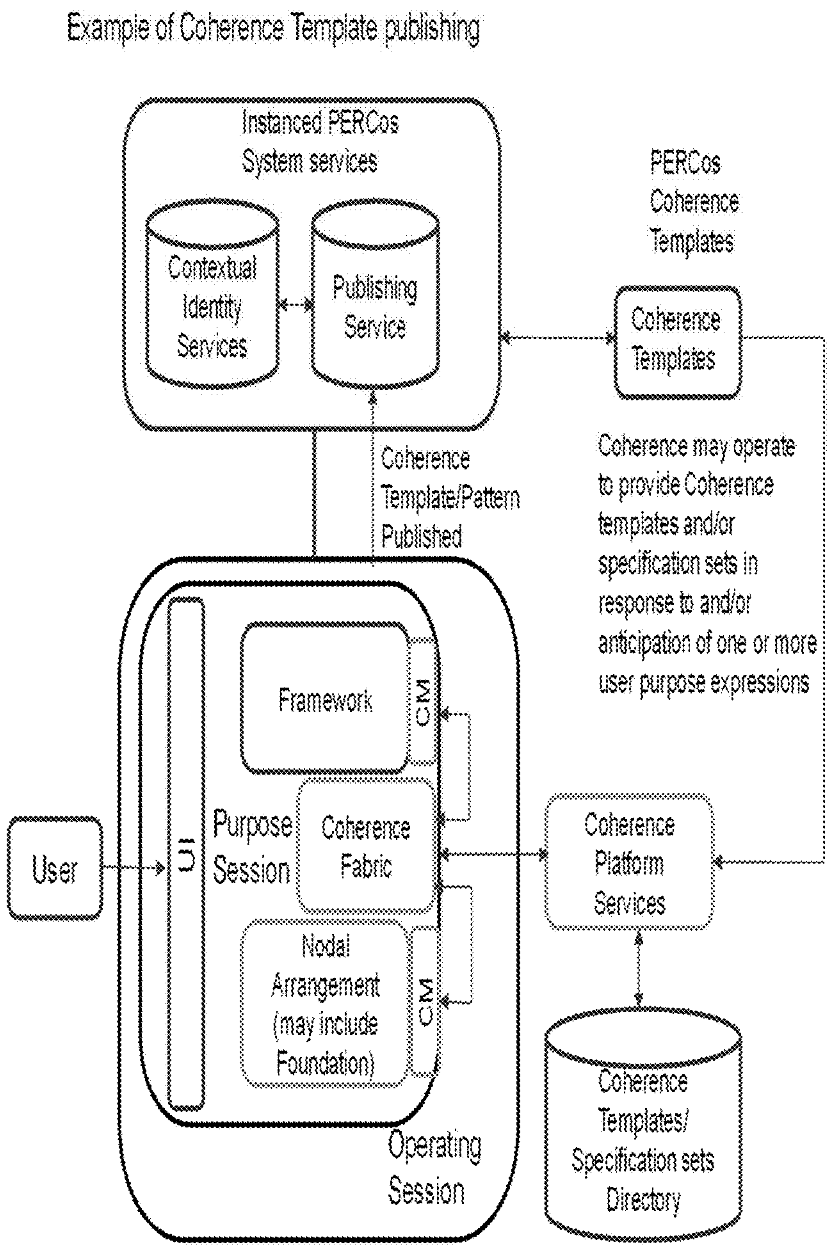

FIG. 115 is an example of Coherence template publishing.

Figure 116:
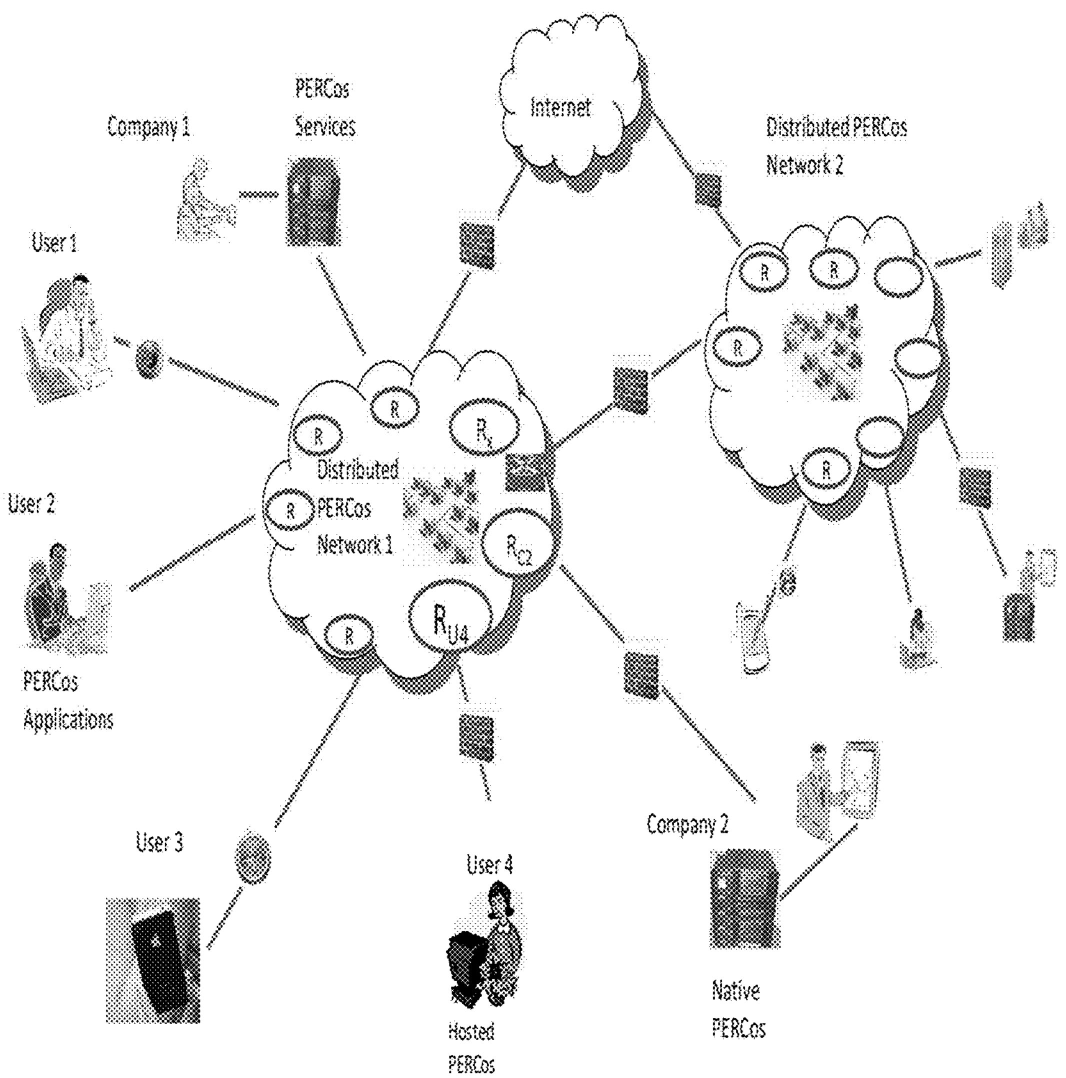

FIG. 116 is an example global purposeful network.

Figure 117:
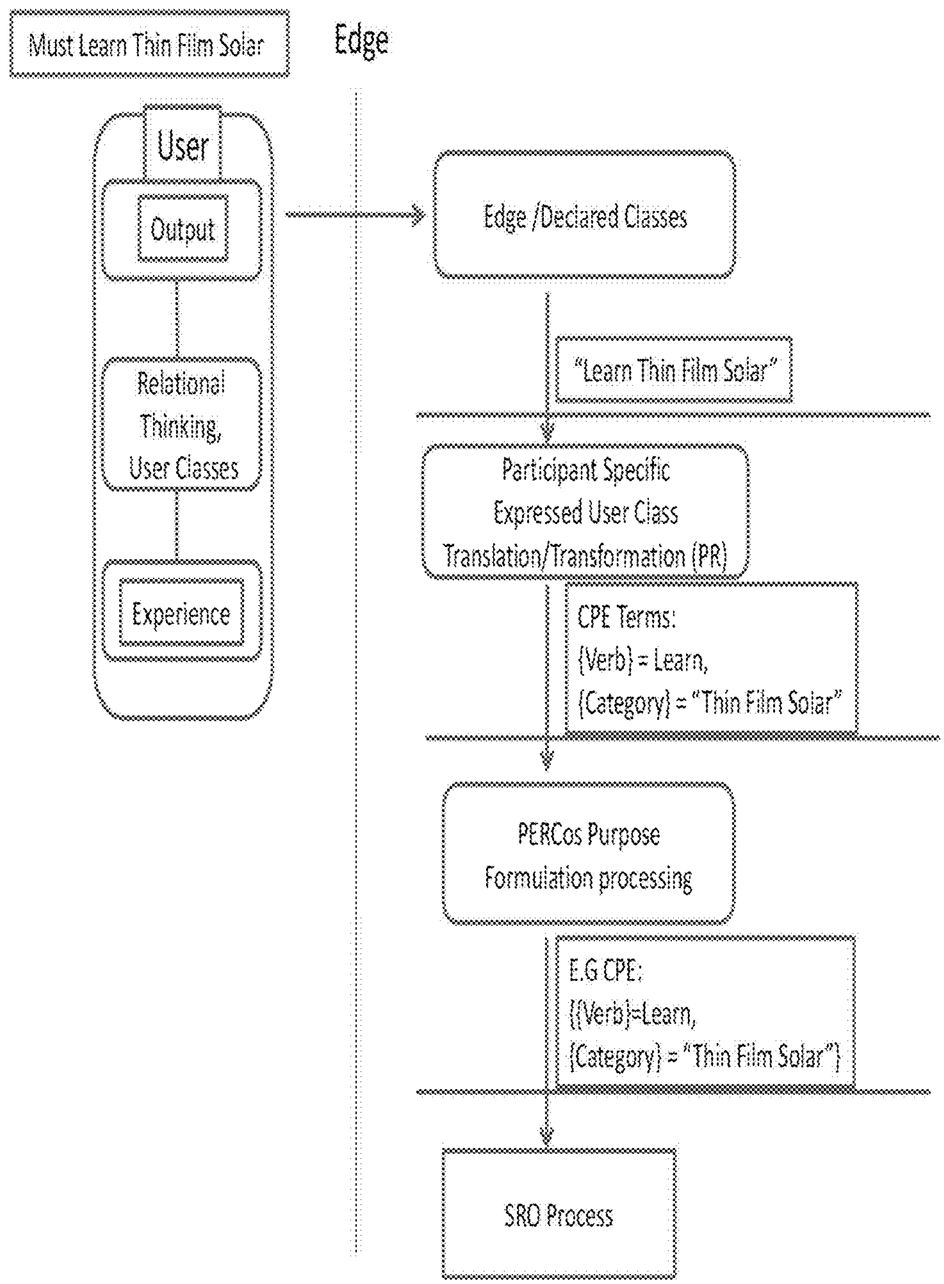

FIG. 117 is an example interpretation/translation process.

Figure 118:
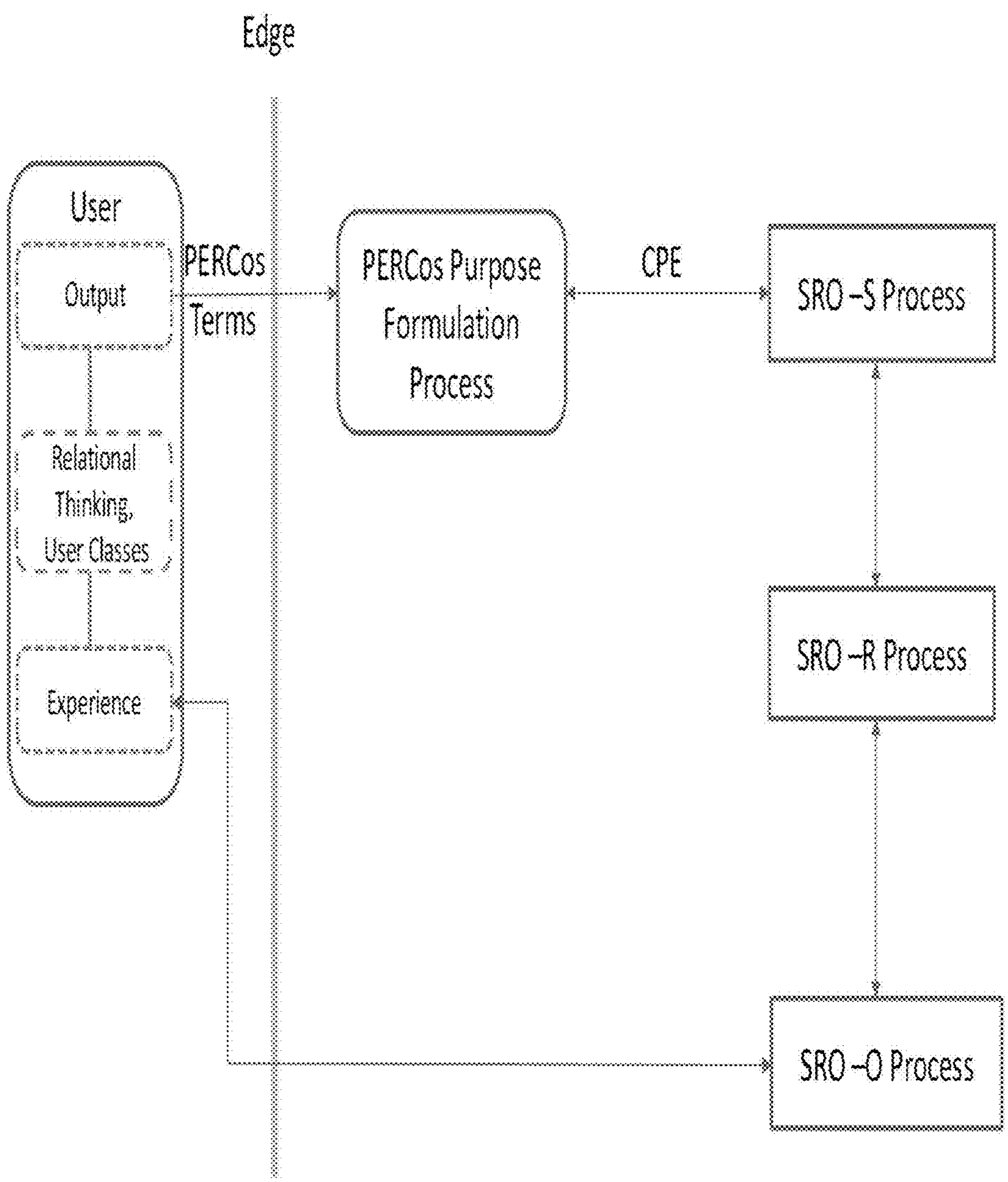

FIG. 118 is an example type 3 purpose expression processing.

Figure 119:
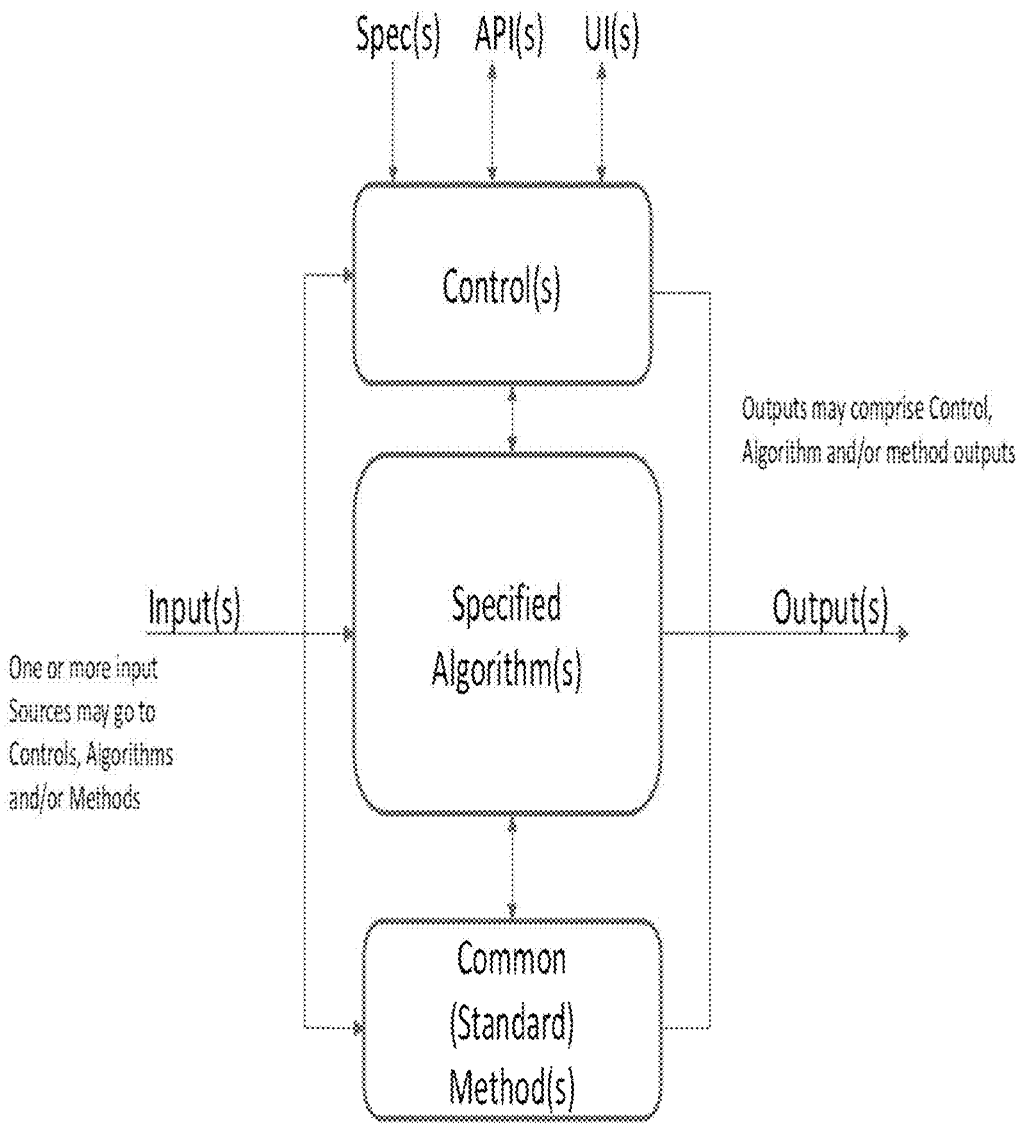

FIG. 119 is an example "generic" PERCos service.

Figure 120:
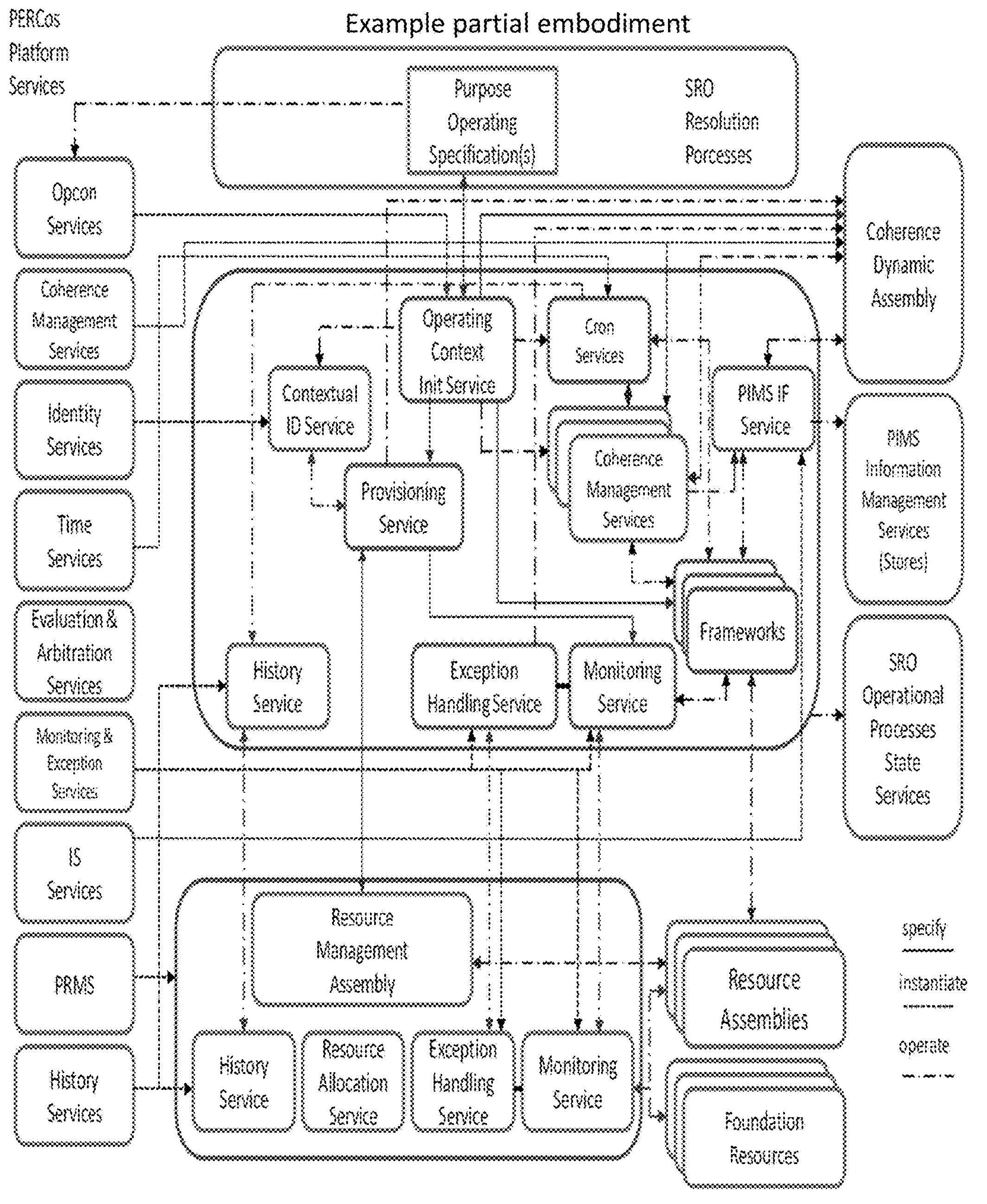

FIG. 120 is an example PERCos operating configuration.

Figure 121:
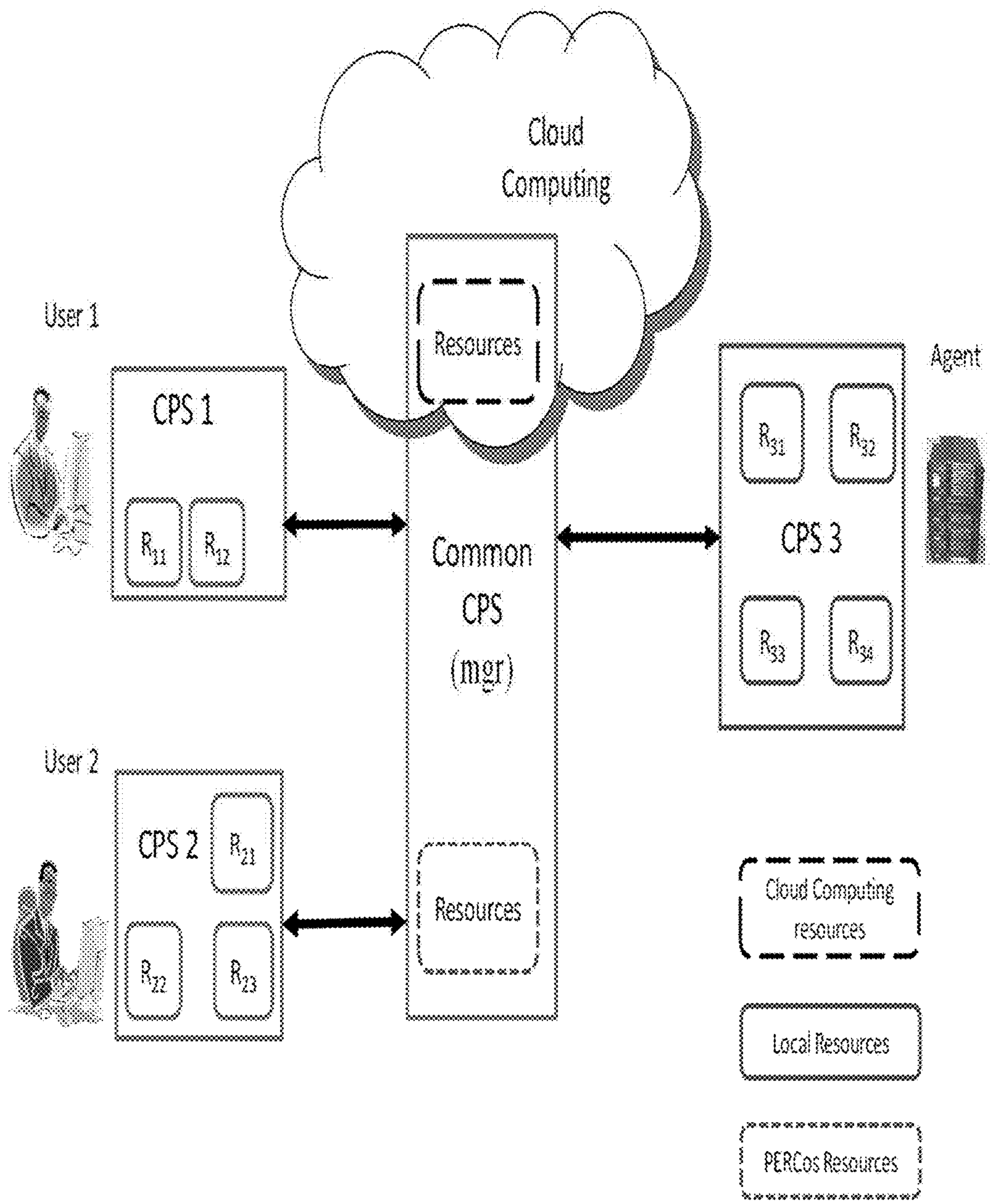

FIG. 121 is an example shared Contextual Purpose Experience session.

Figure 122:
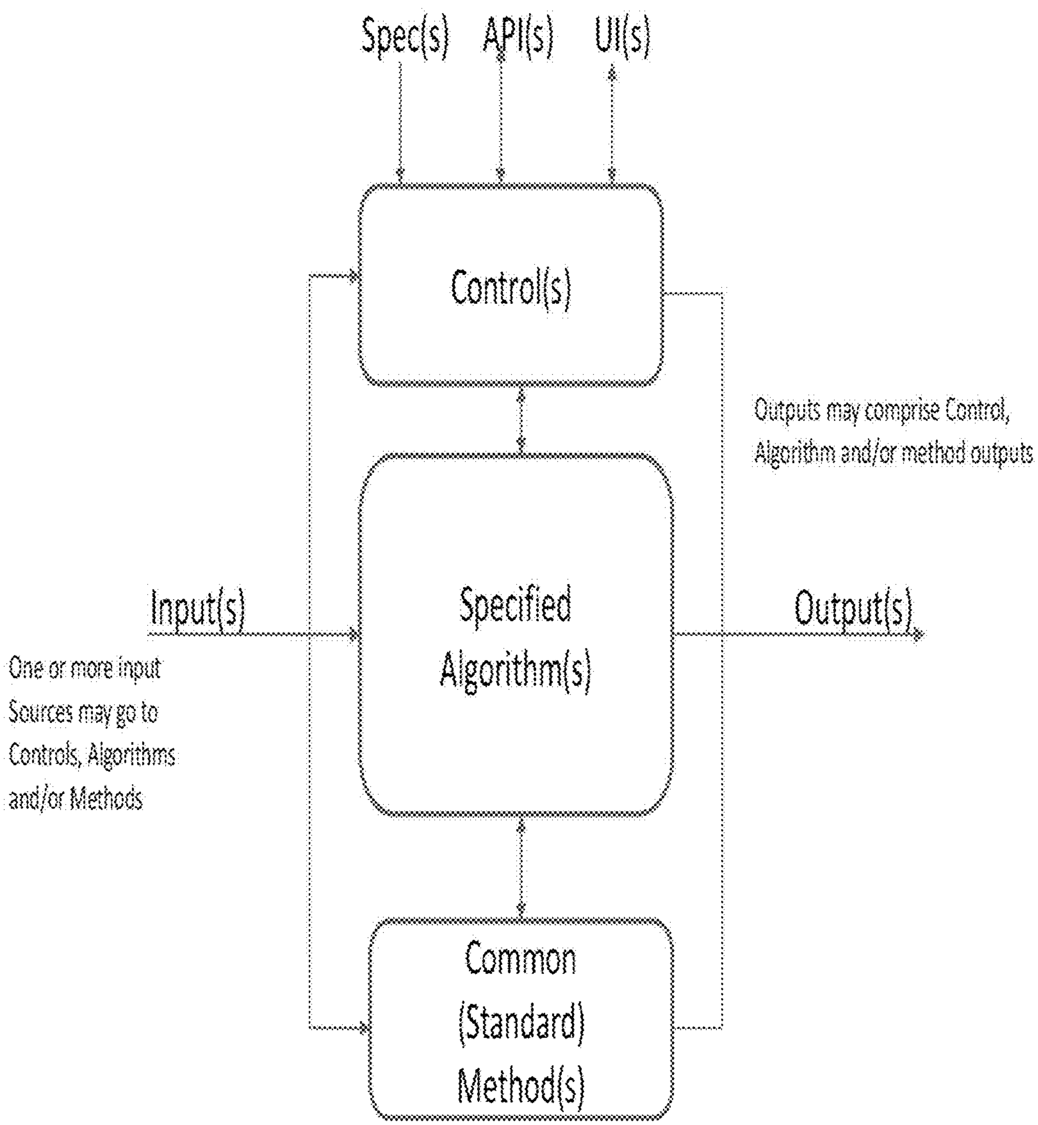

FIG. 122 is an example "generic" PERCos service.

Figure 123:
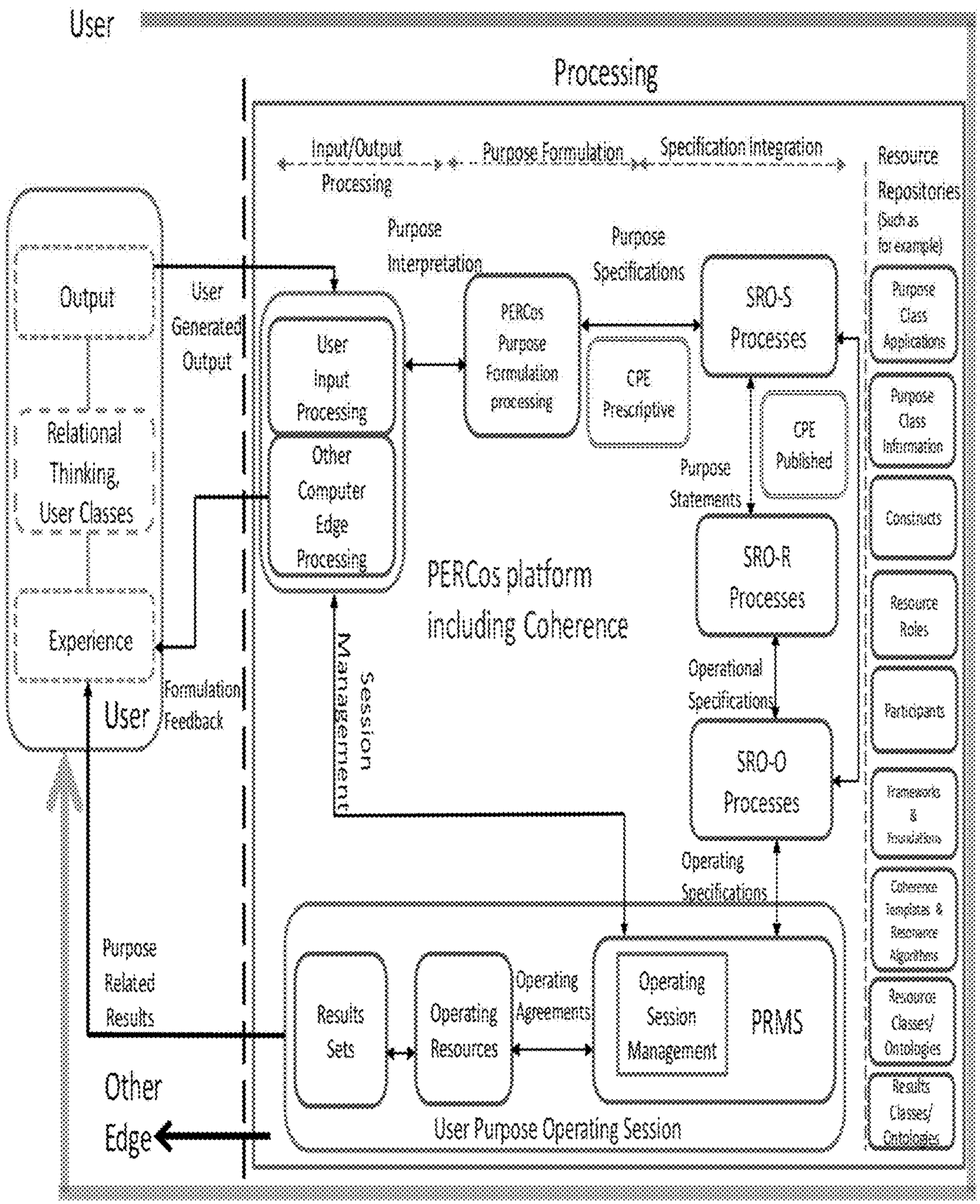

FIG. 123 is an example purpose cycle.

Figure 124:
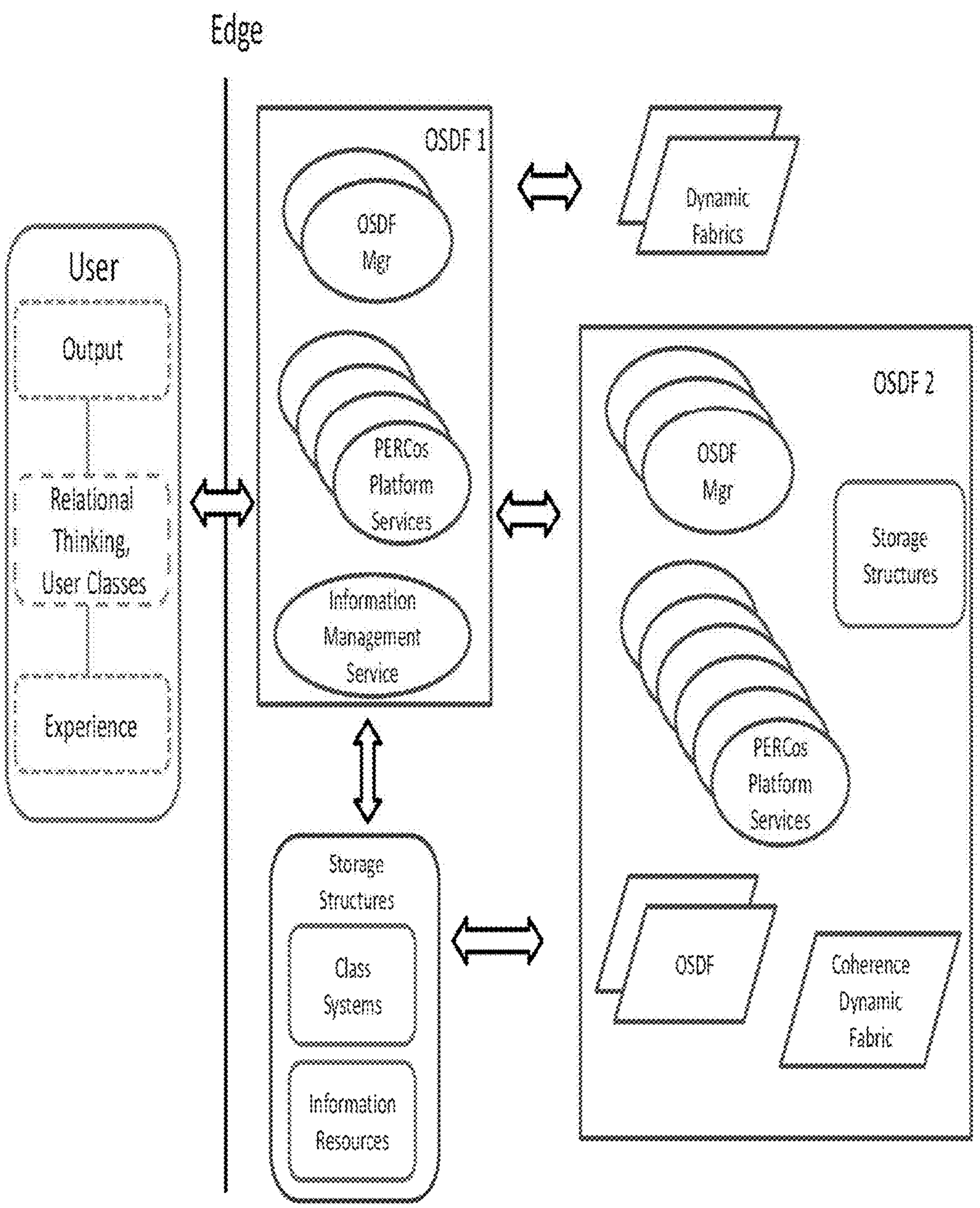

FIG. 124 is an example of operating system dynamic Fabric configuration and interaction.

Figure 125:
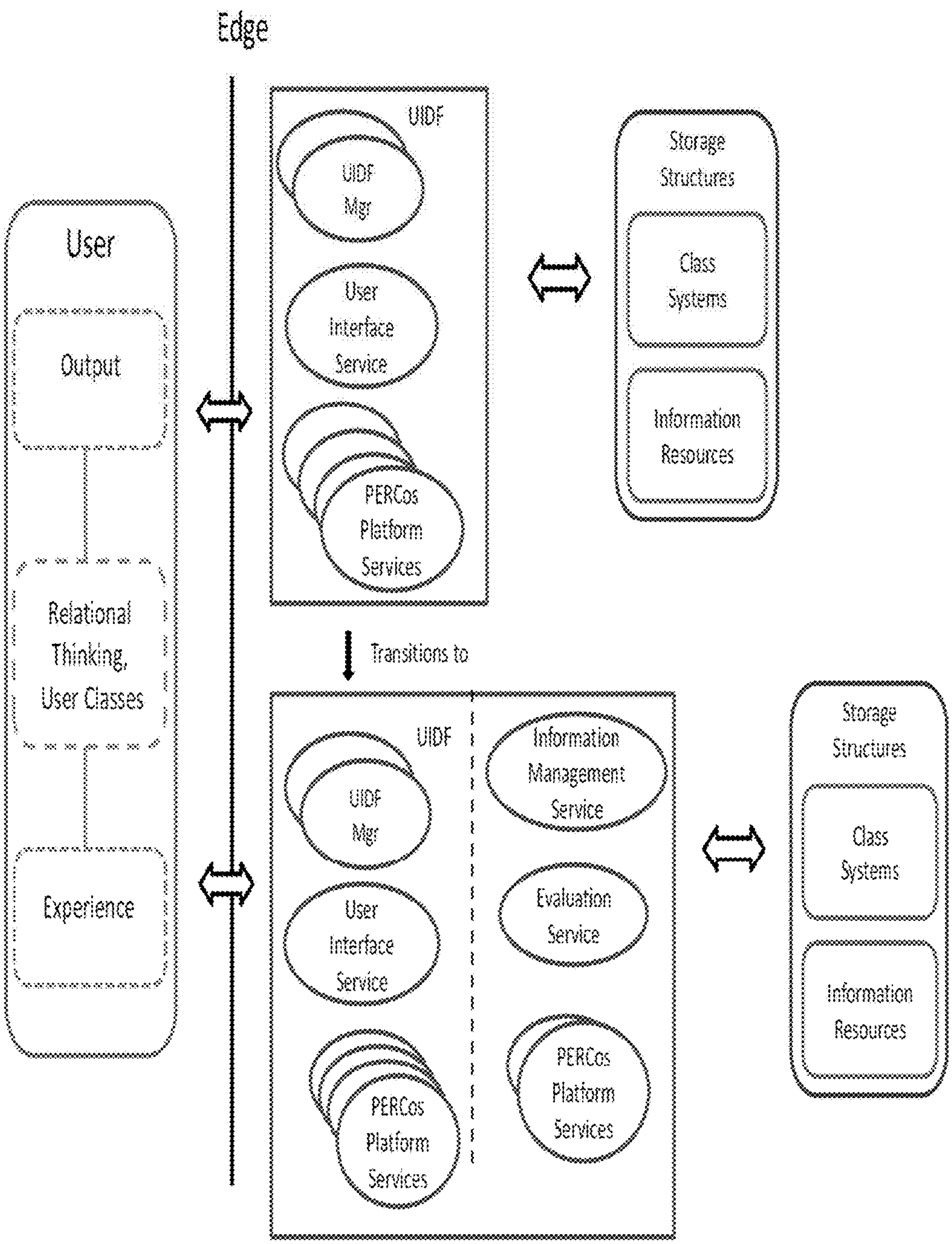

FIG. 125 is an example user-related operating service configuration.

Figure 126:
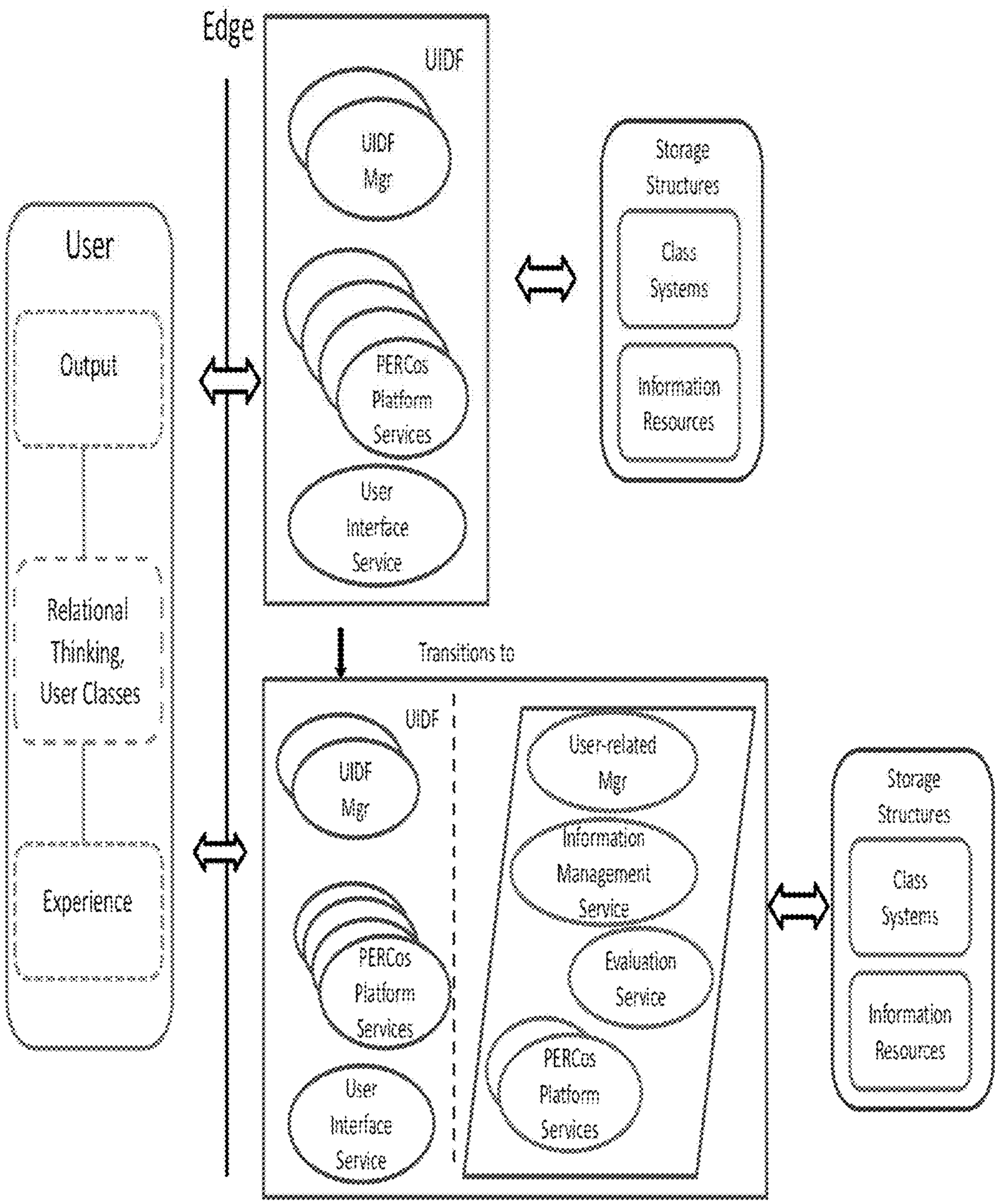

FIG. 126 is an example user-related operating service configuration.

Figure 127:
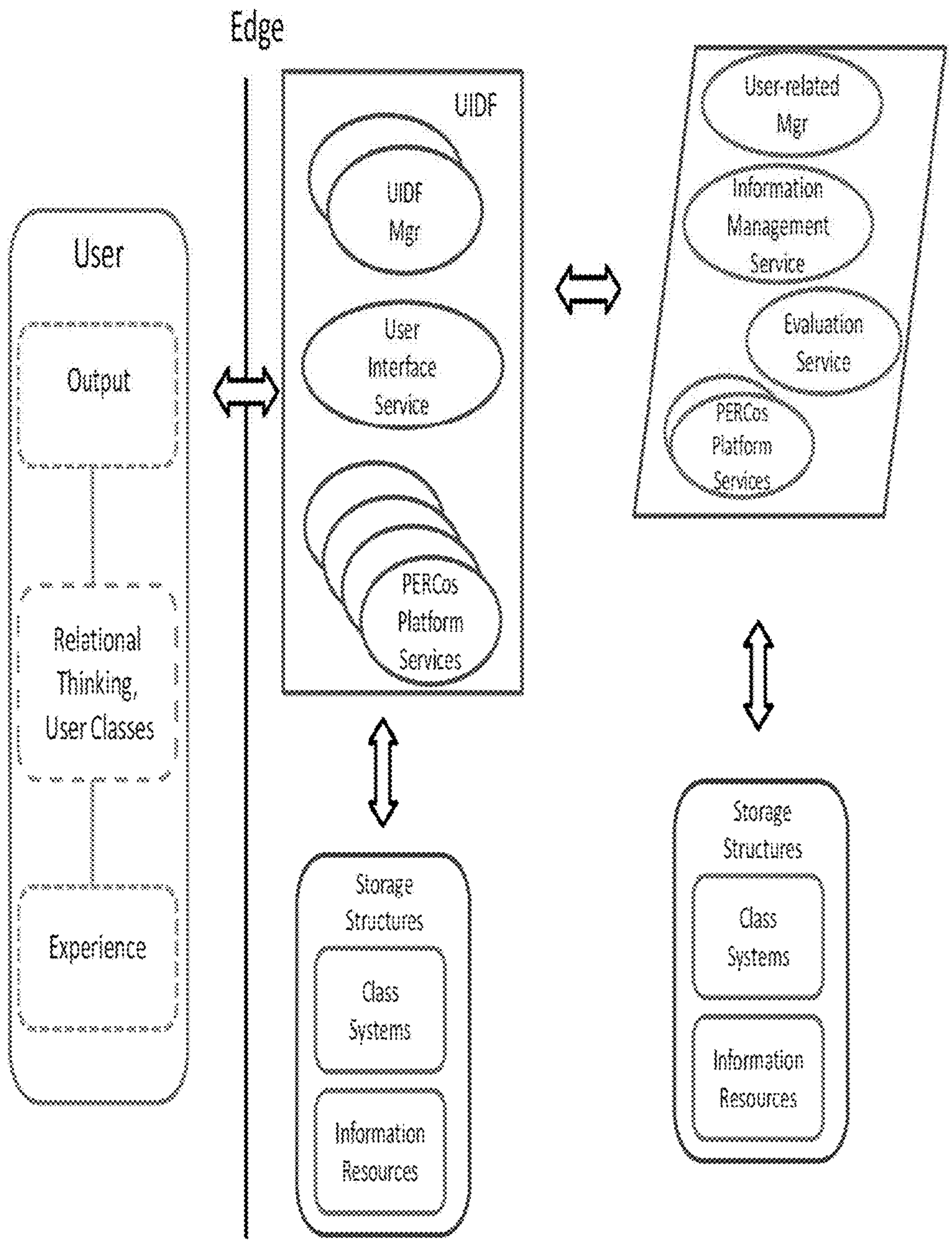

FIG. 127 is an example user-related operating service configuration.

Figure 128:
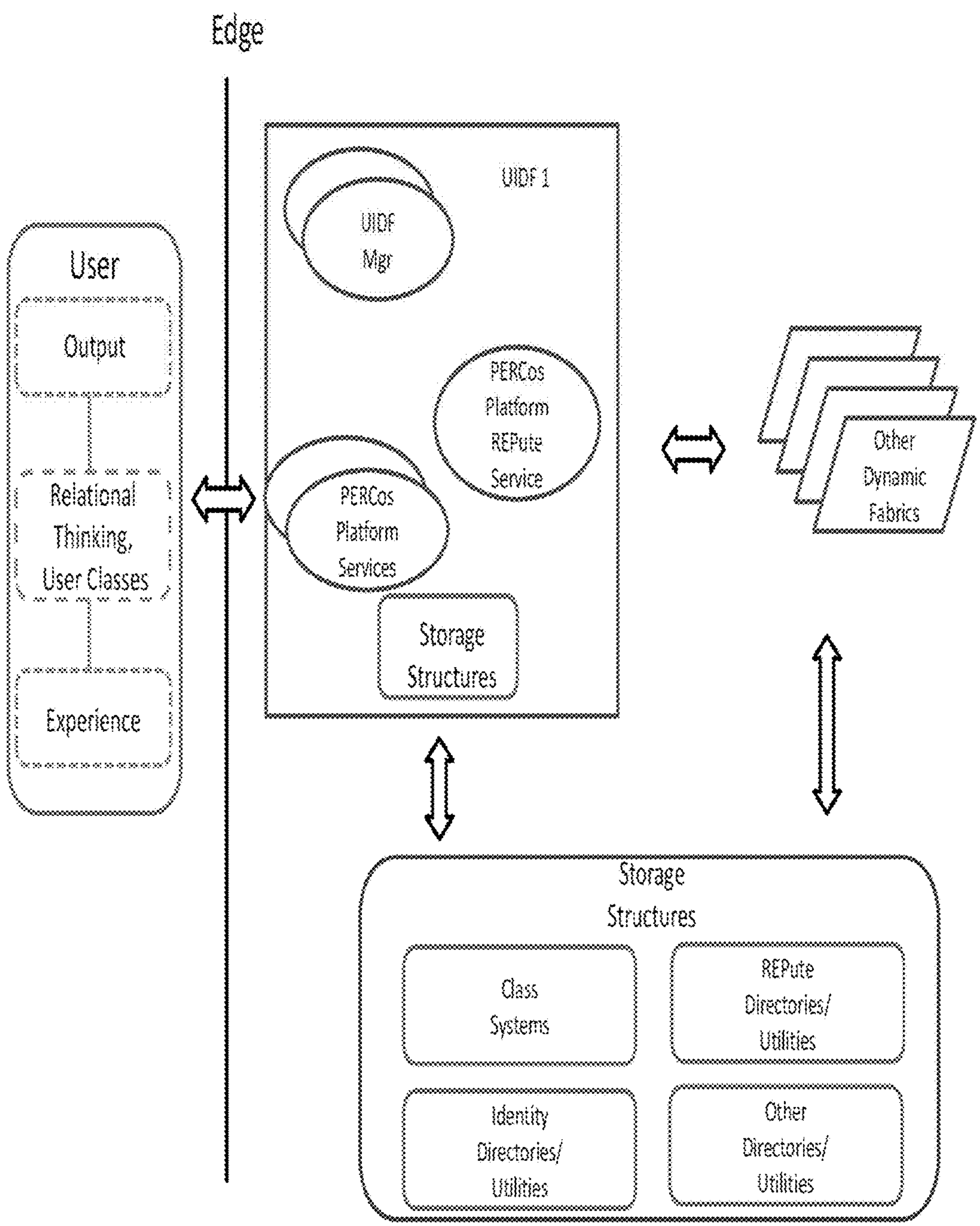

FIG. 128 is an example UIDF and RDF interaction.

Figure 129:
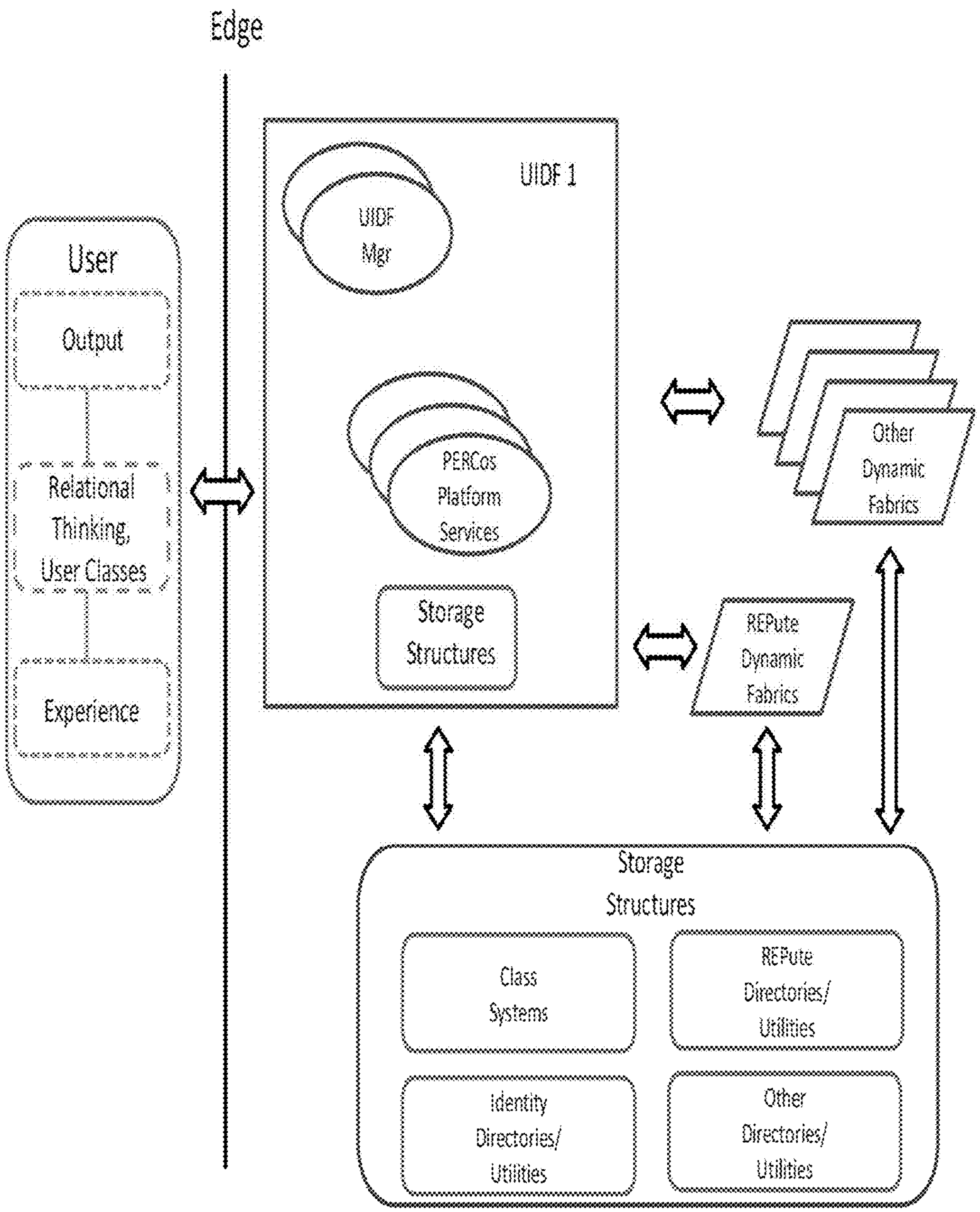

FIG. 129 is an example UIDF and RDF interaction.

Figure 130:
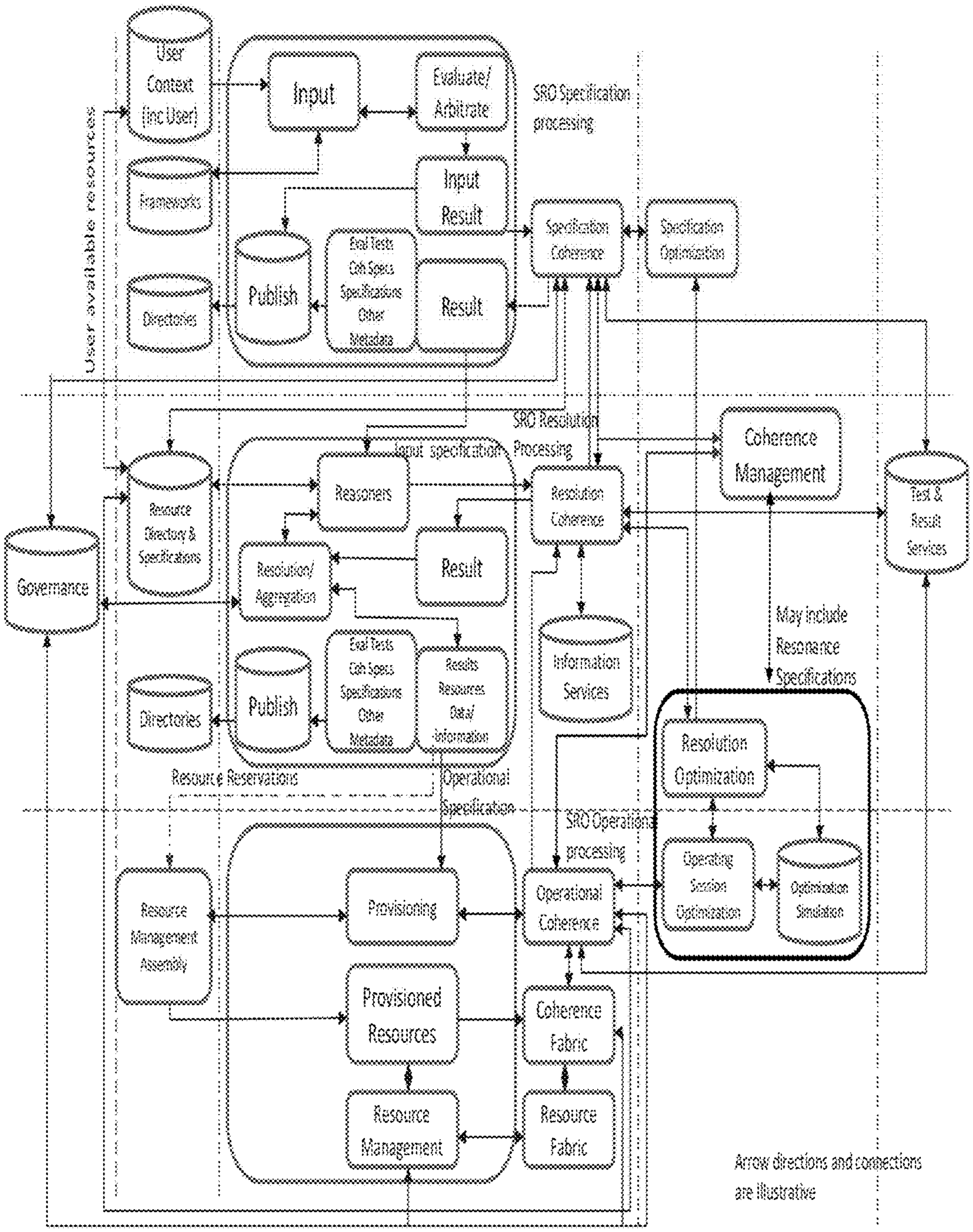

FIG. 130 is an example of detailed view of SRO processing.

Figure 131:
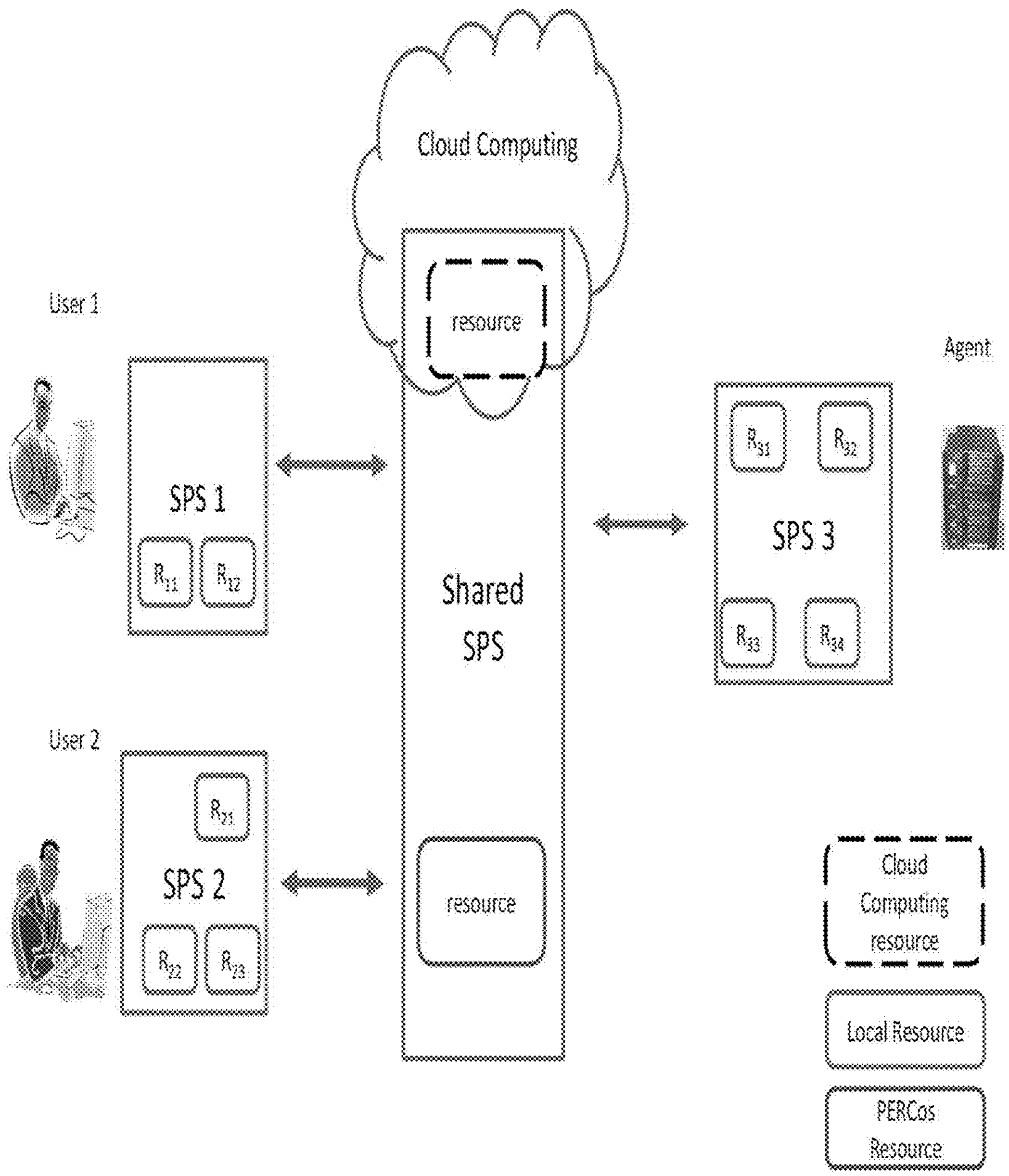

FIG. 131 is an example of resource configuration at time t1.

Figure 132:
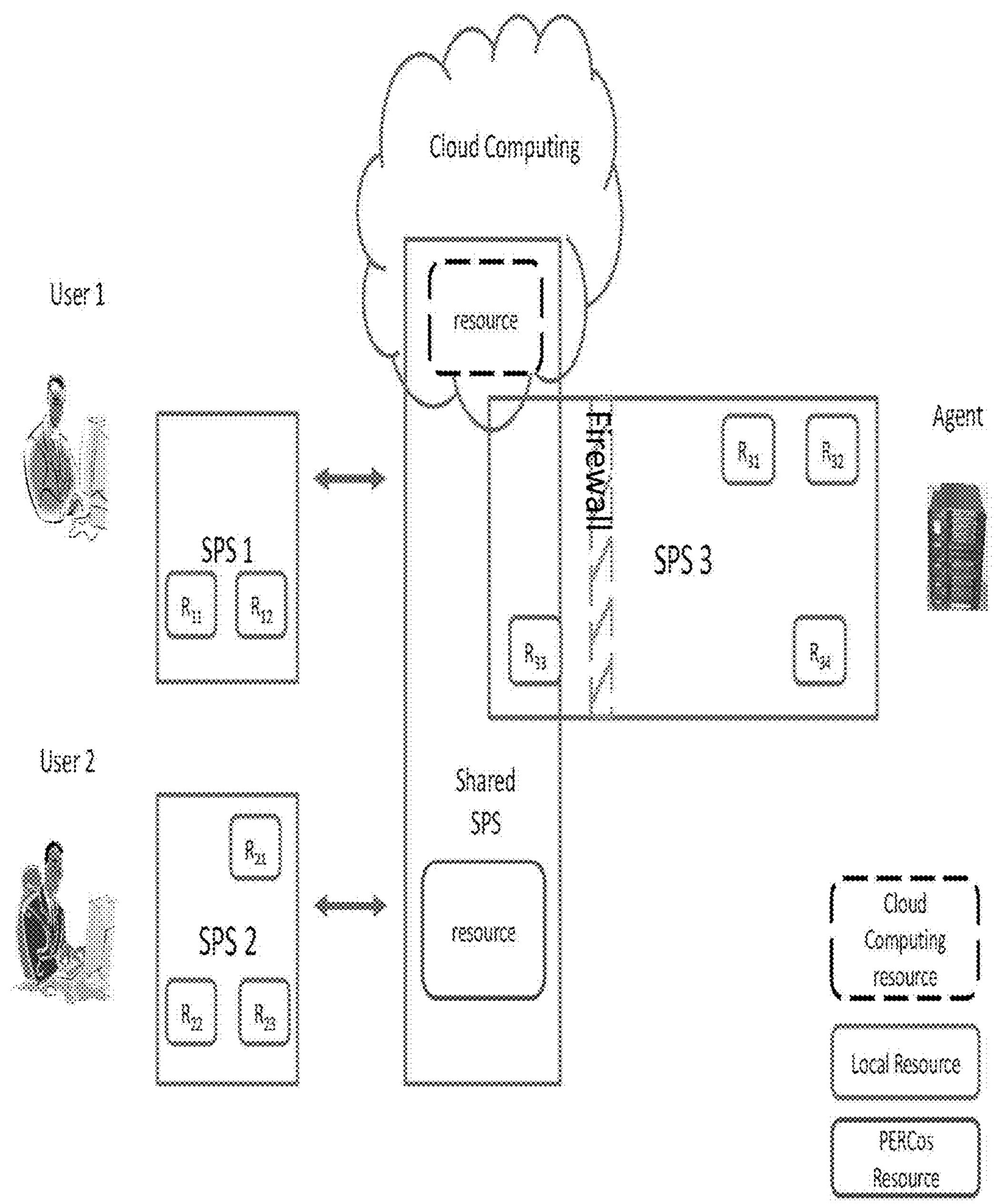

FIG. 132 is an example of resource configuration at time t2.

Figure 133:
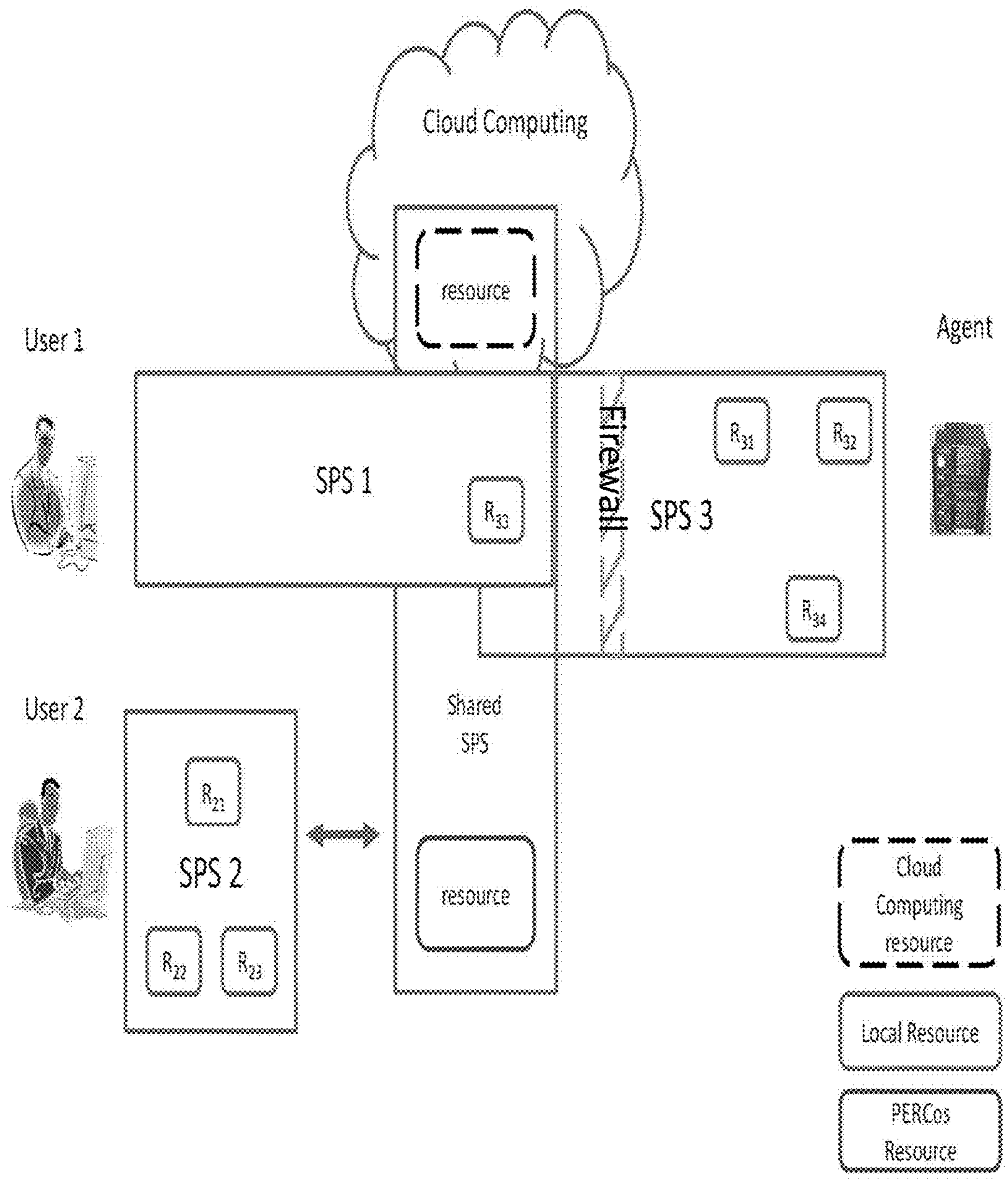

FIG. 133 is an example of resource configuration at time t3.

Figure 134:
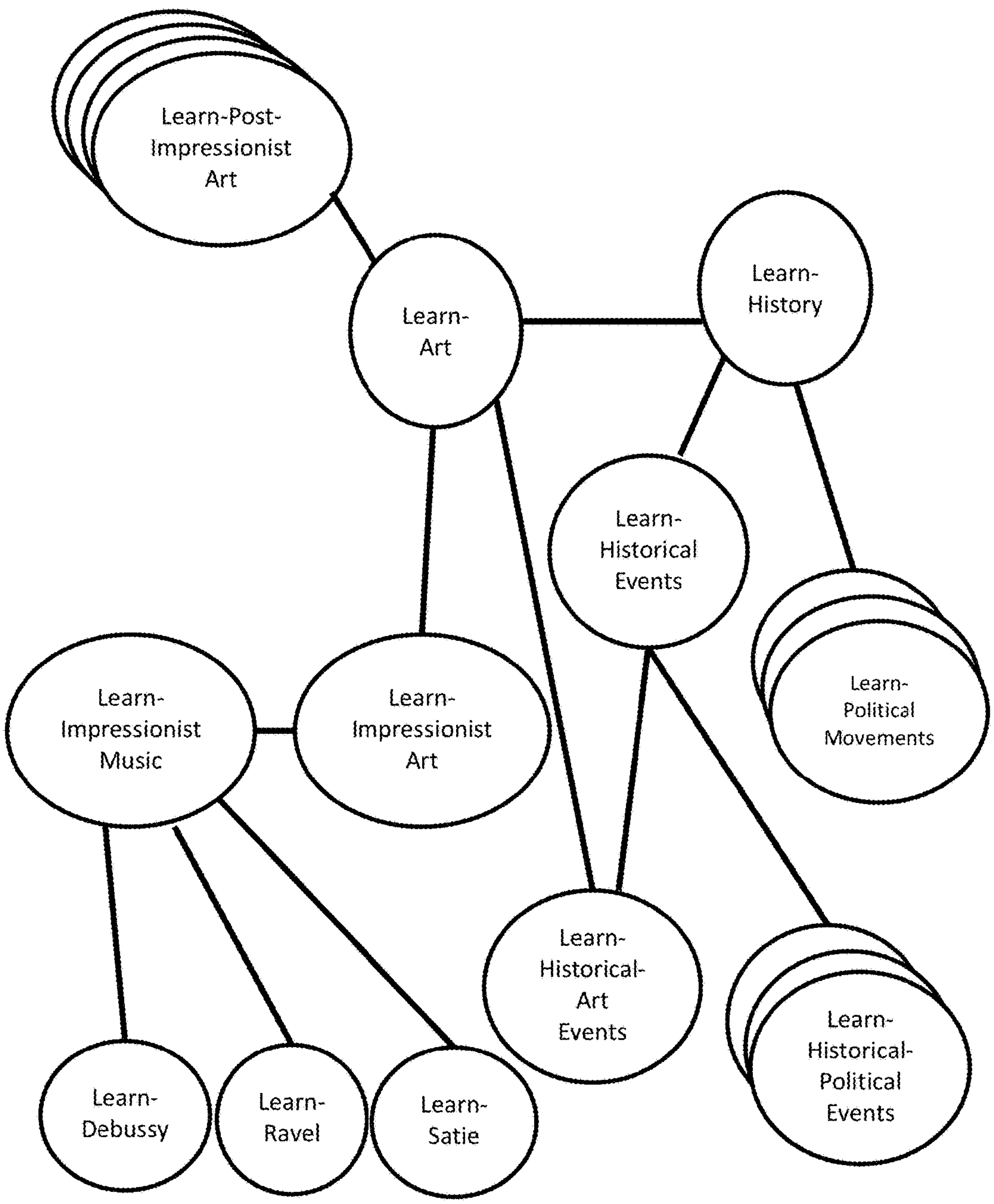

FIG. 134 is a subgraph of an example class system relationship graph.

Figure 135:
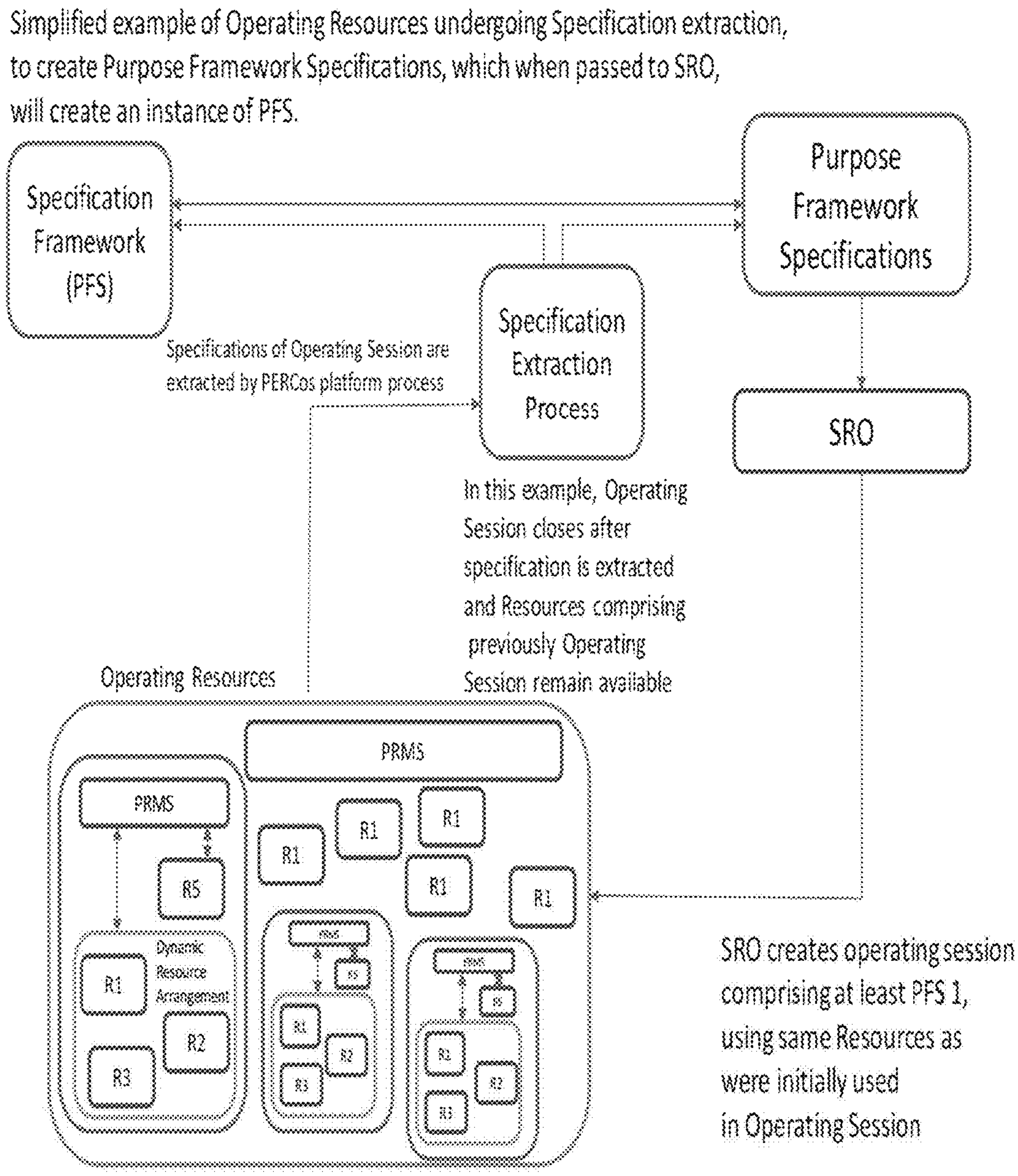

FIG. 135 is an example Knowledge extraction.

Figure 136:
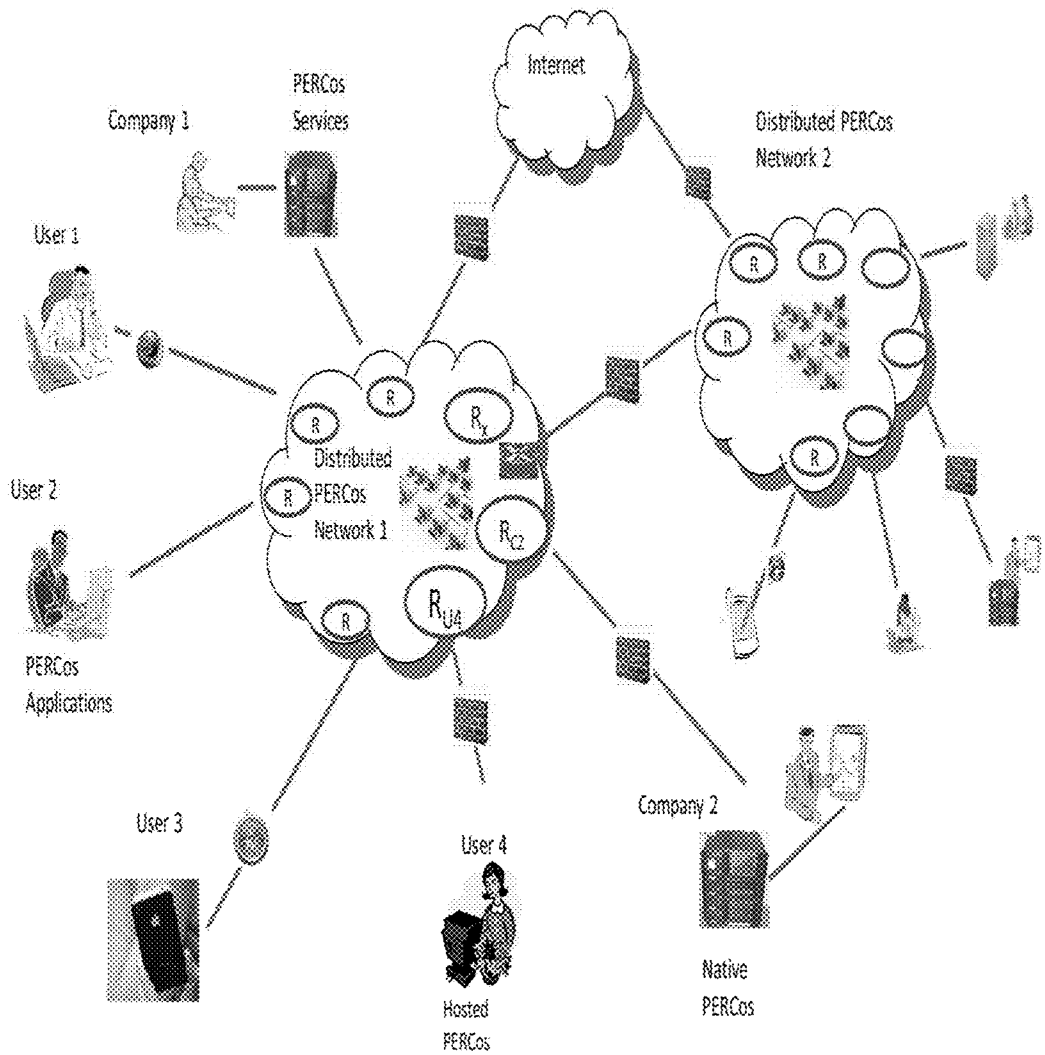

FIG. 136 is an example global purposeful network.

Figure 137:
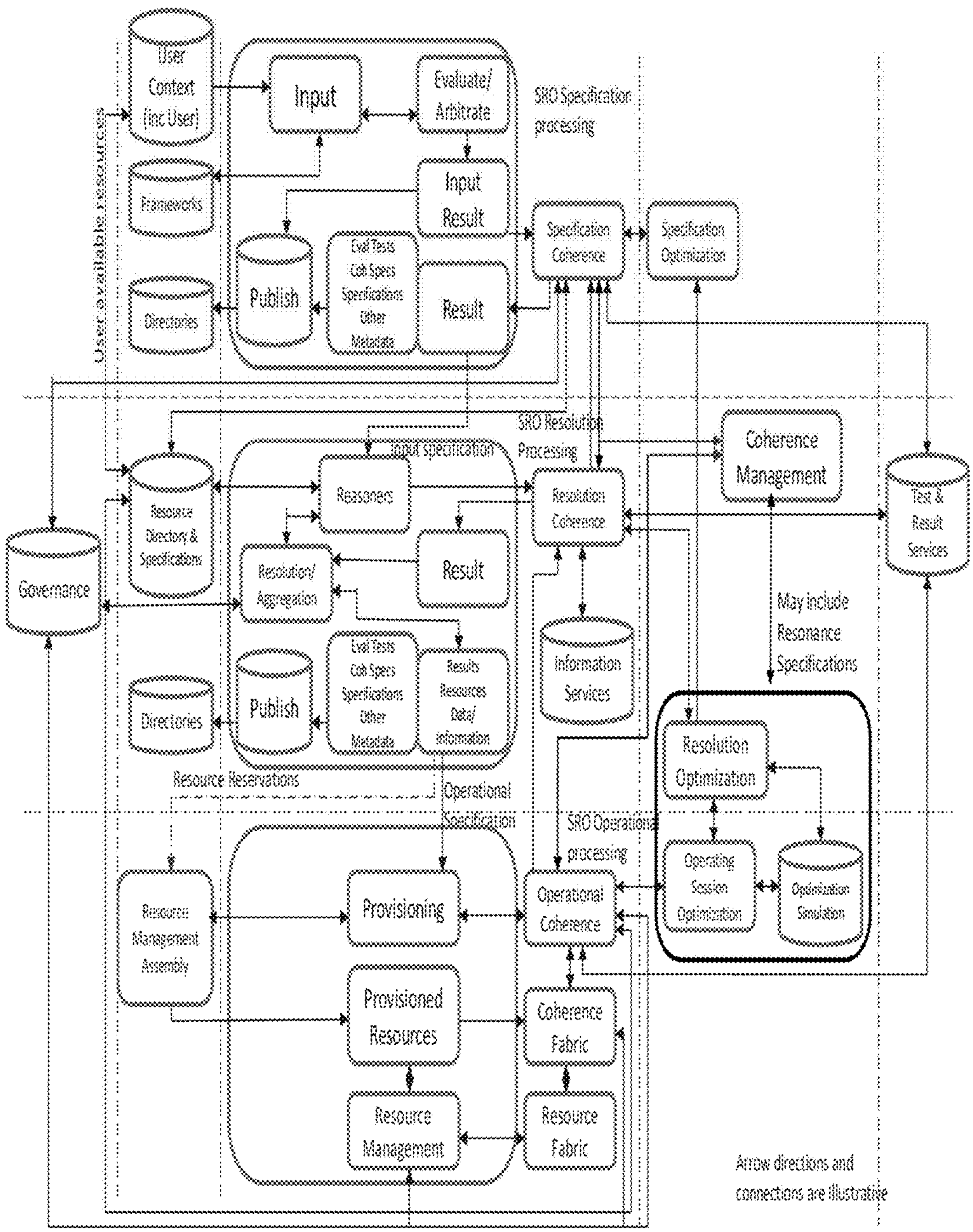

FIG. 137 is an example of detailed view of SRO processing.

Figure 138:
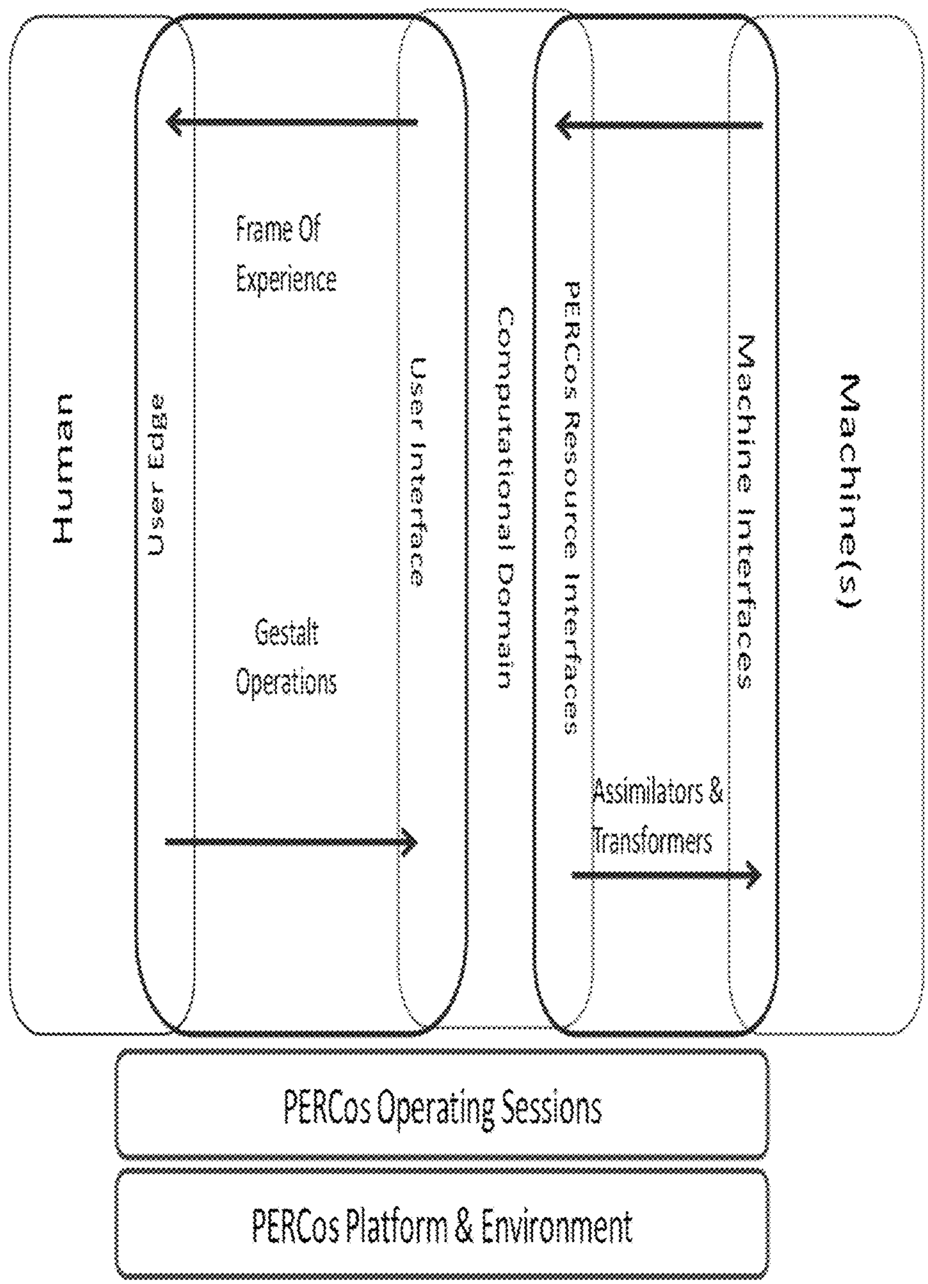

FIG. 138 is an example of human-computer interaction.

Figure 139:
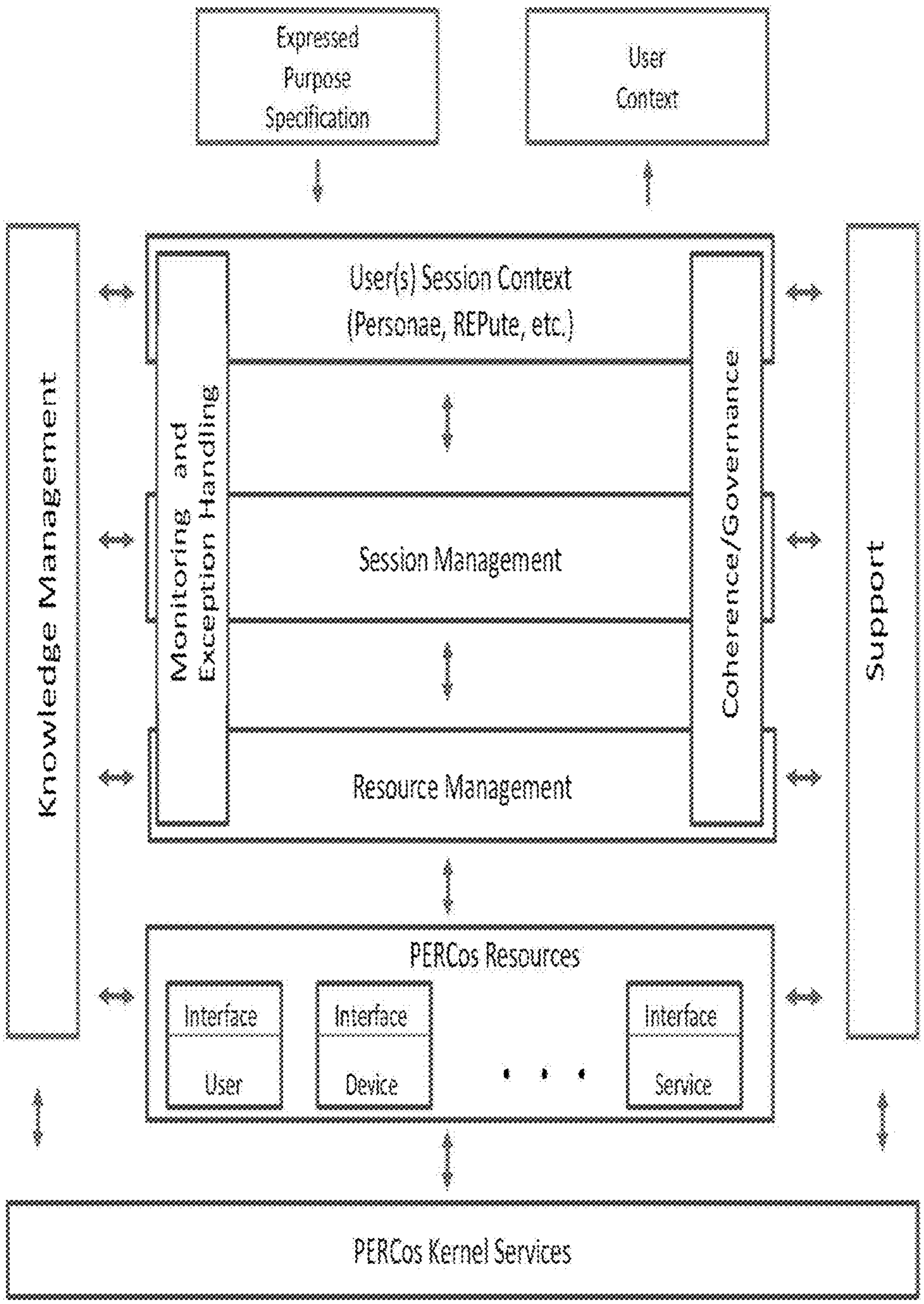

FIG. 139 is an example of a single user session PERCos architecture.

Figure 140:
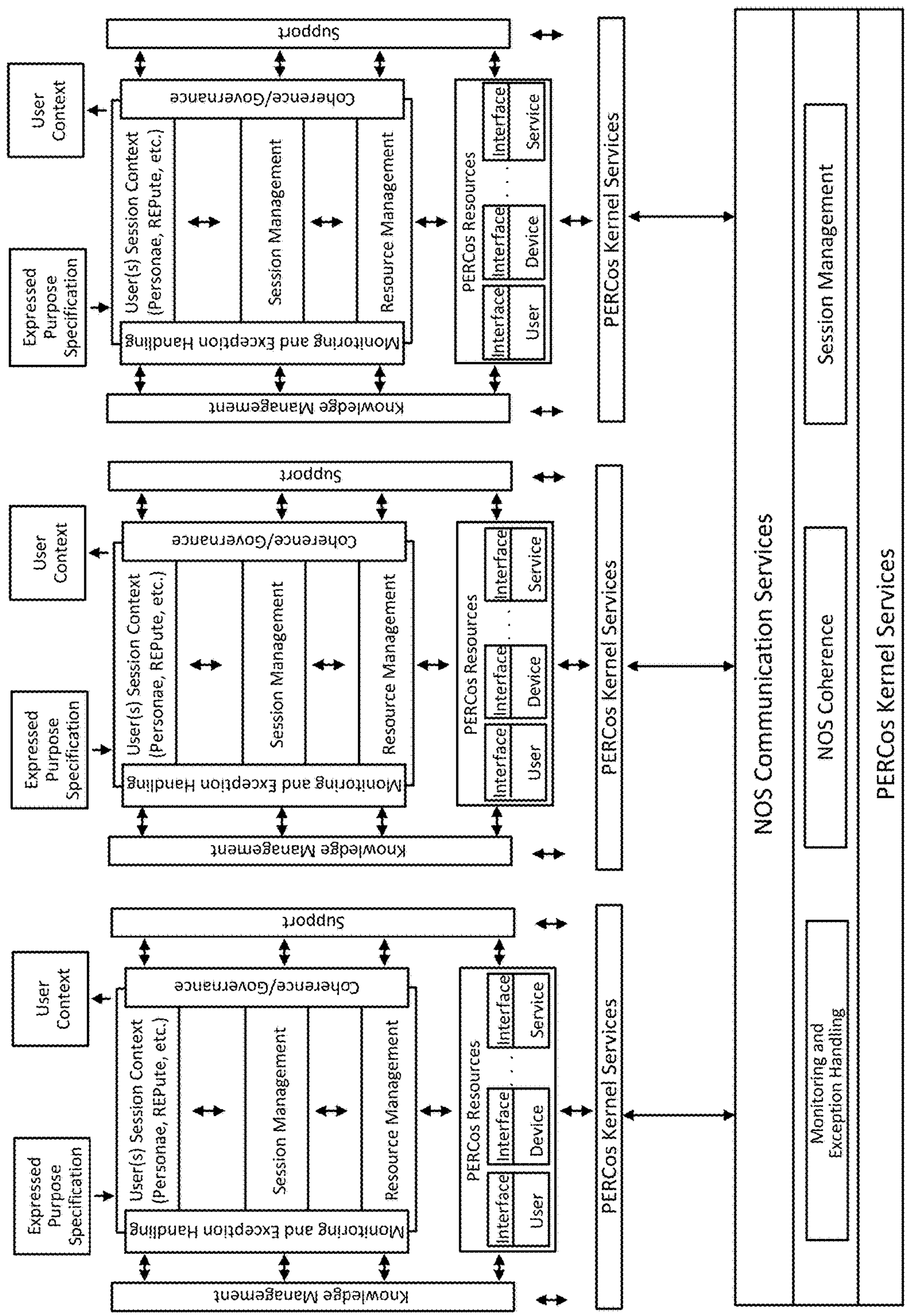

FIG. 140 is an example of shared experience session PERCos architecture.

FIG. 140*a* is an example of a User selecting Purpose Facets.

FIG. 140*b* is an example of a User selecting Purpose Facets.

FIG. 140*c* is an example of a User selecting Purpose Facets.

Figure 141:
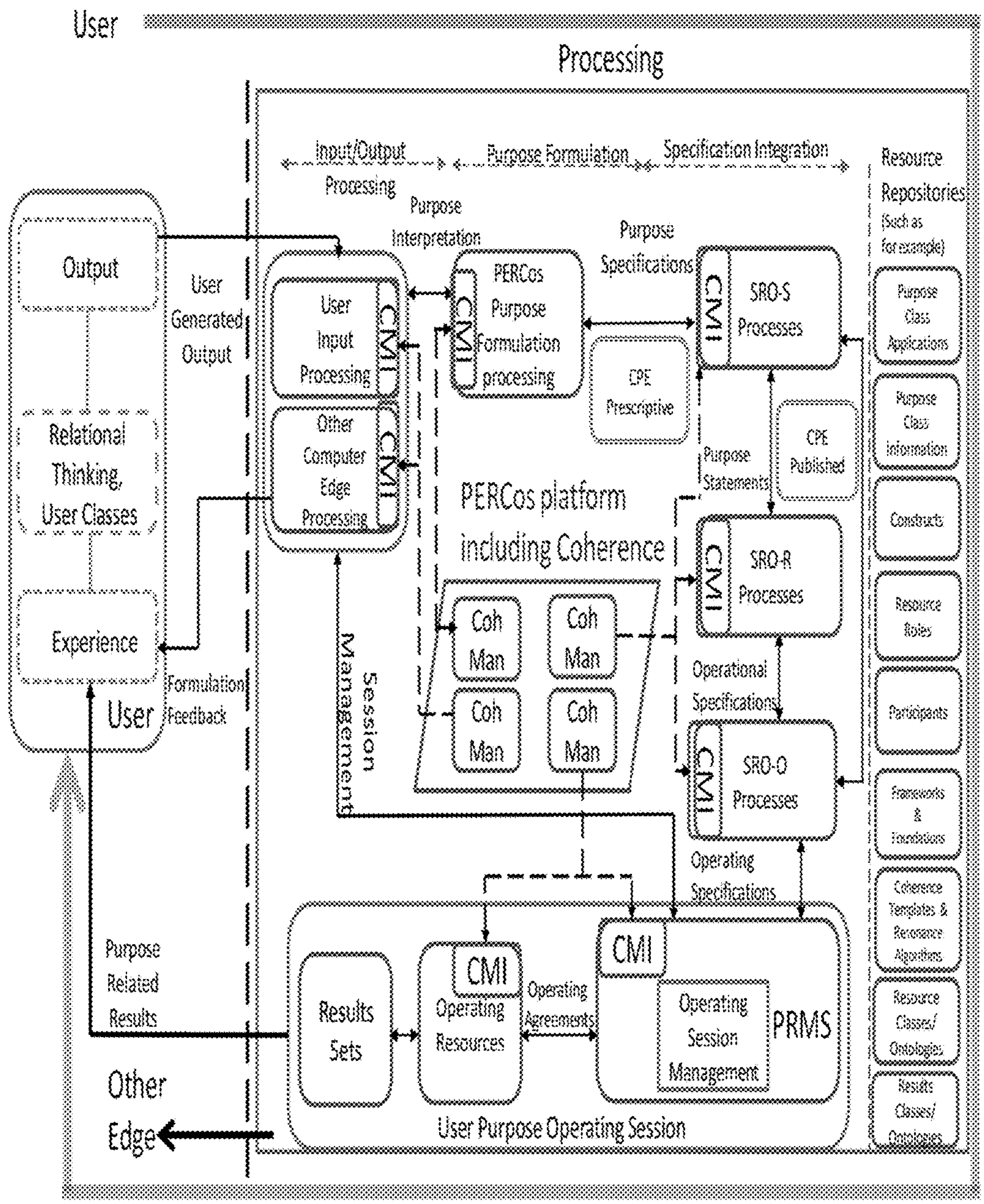

FIG. 141 is an example purpose cycle.

Figure 142:
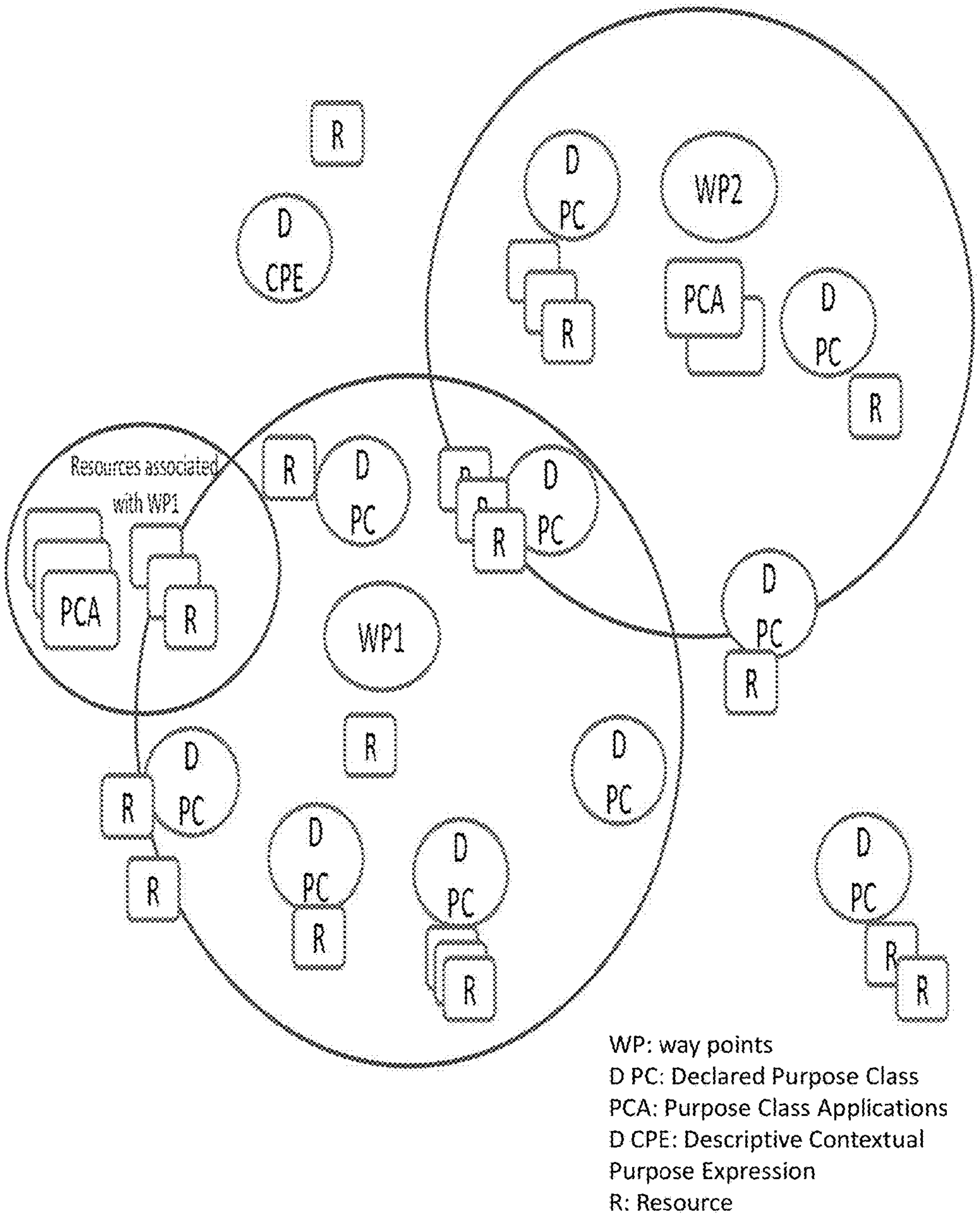

FIG. 142 is an illustration of waypoints, resources, and descriptive CPEs.

Figure 143:
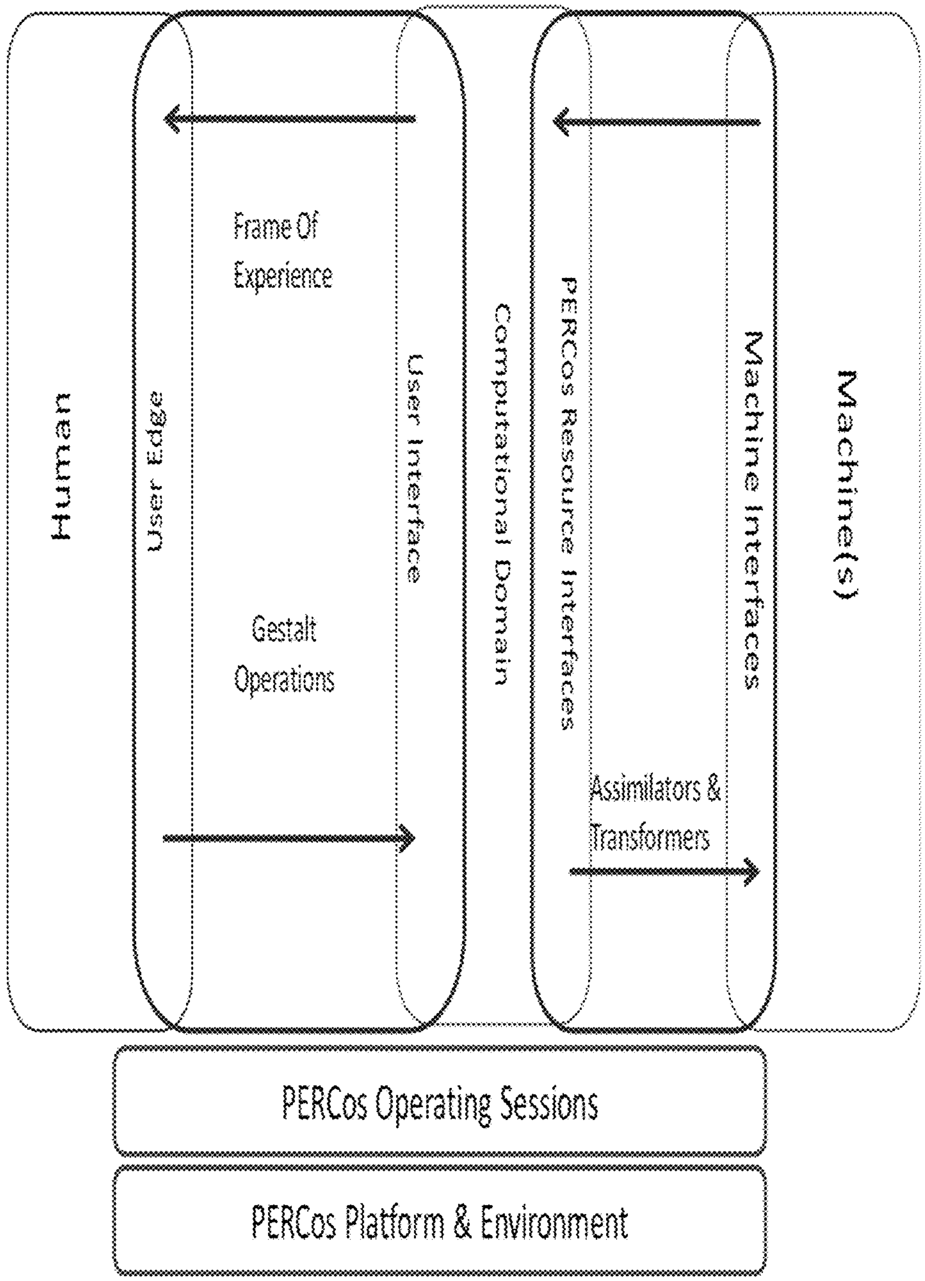

FIG. 143 is an example of human-computer interaction.

Figure 144:
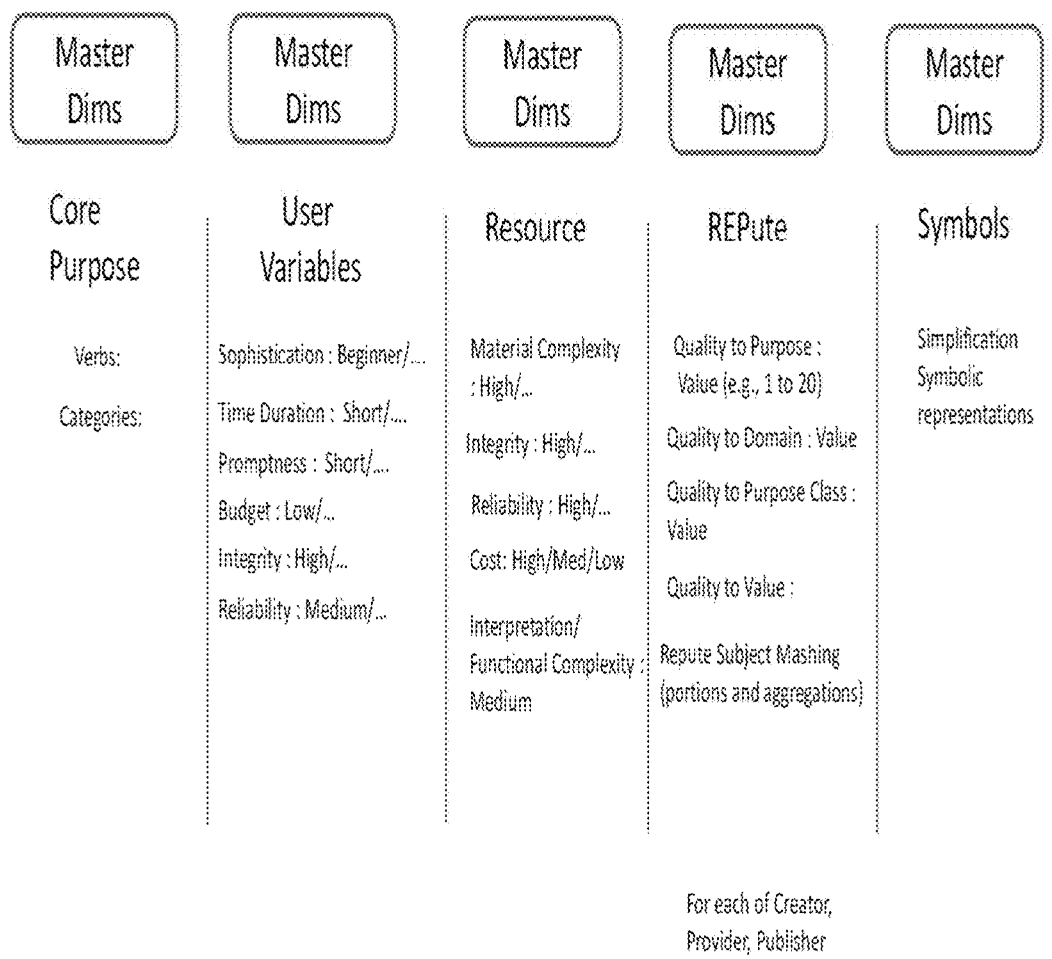

FIG. 144 is an illustrative example of Master Dimension embodiments.

Figure 145:
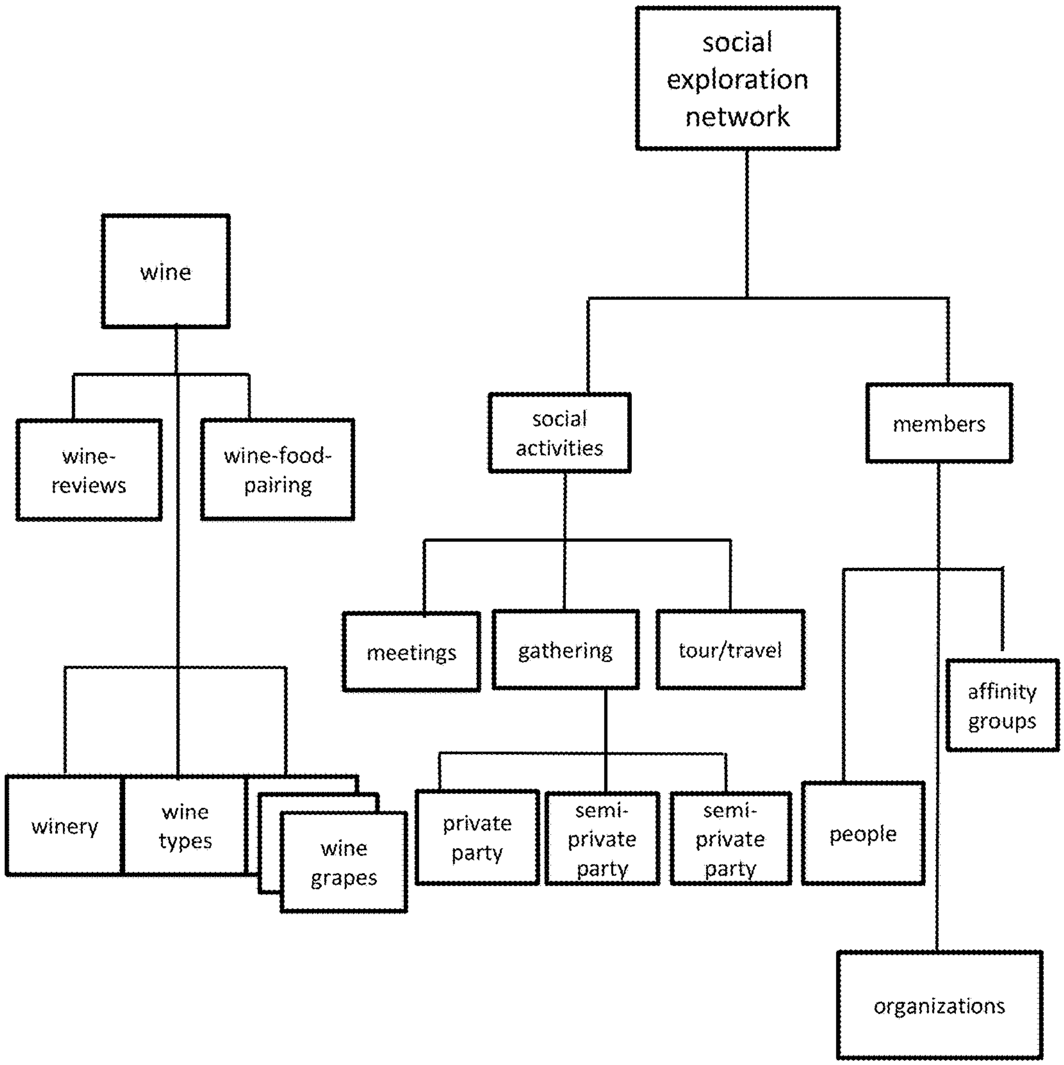

FIG. 145 are examples of universal class system.

Figure 146:
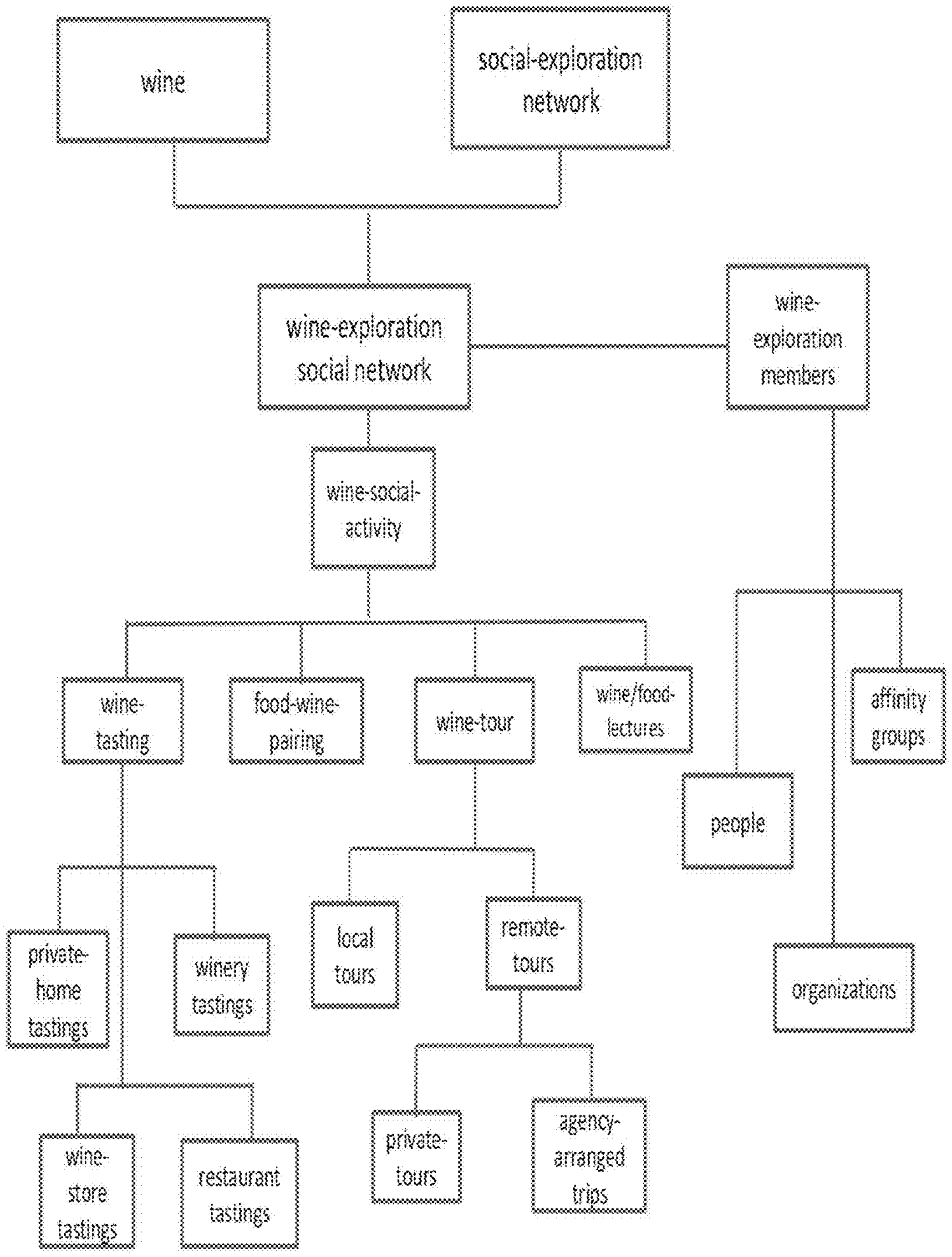

FIG. 146 is an example auxiliary category class system (WESN).

Figure 147:
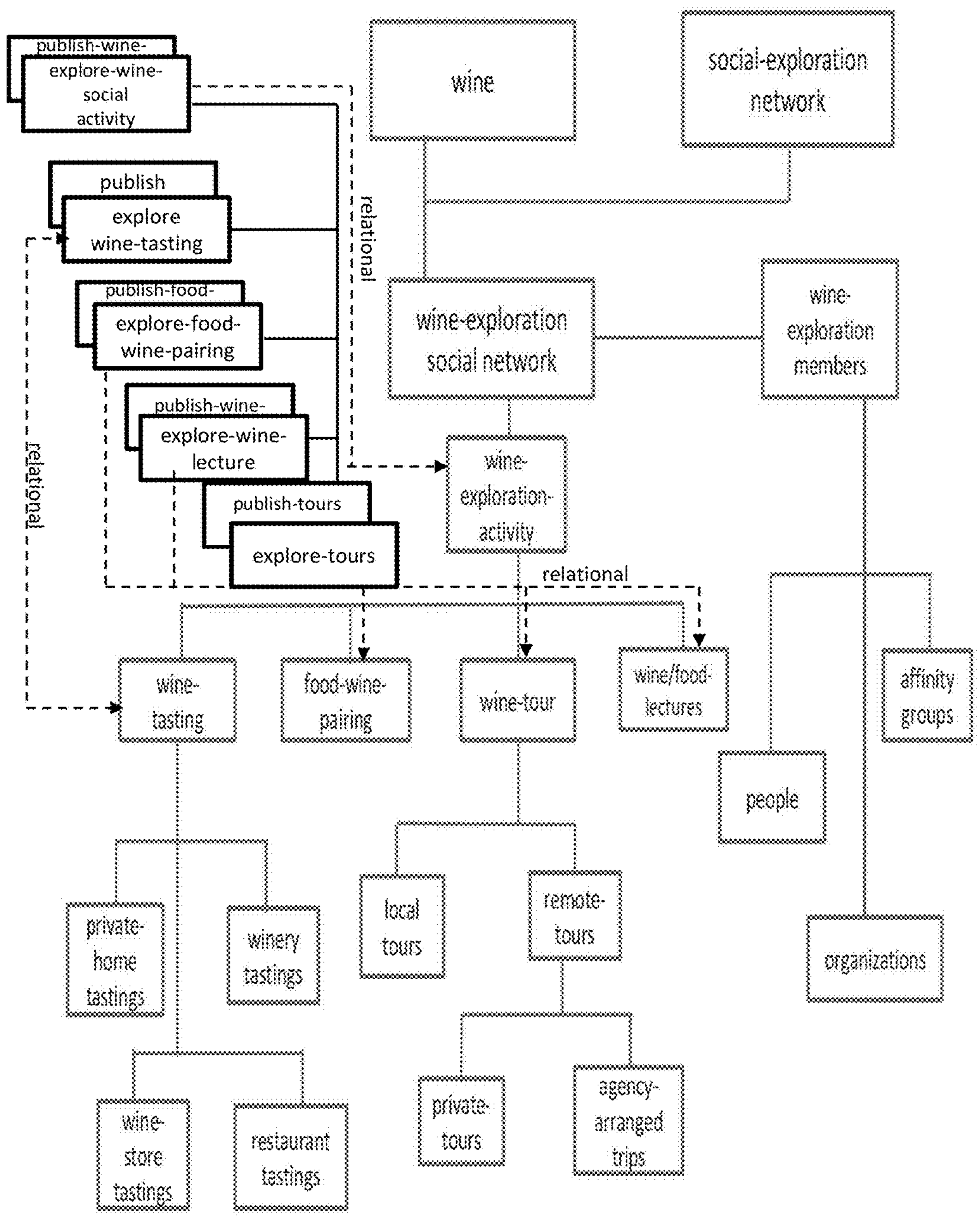

FIG. 147 is an example auxiliary purpose class system (PWSA).

Figure 148:
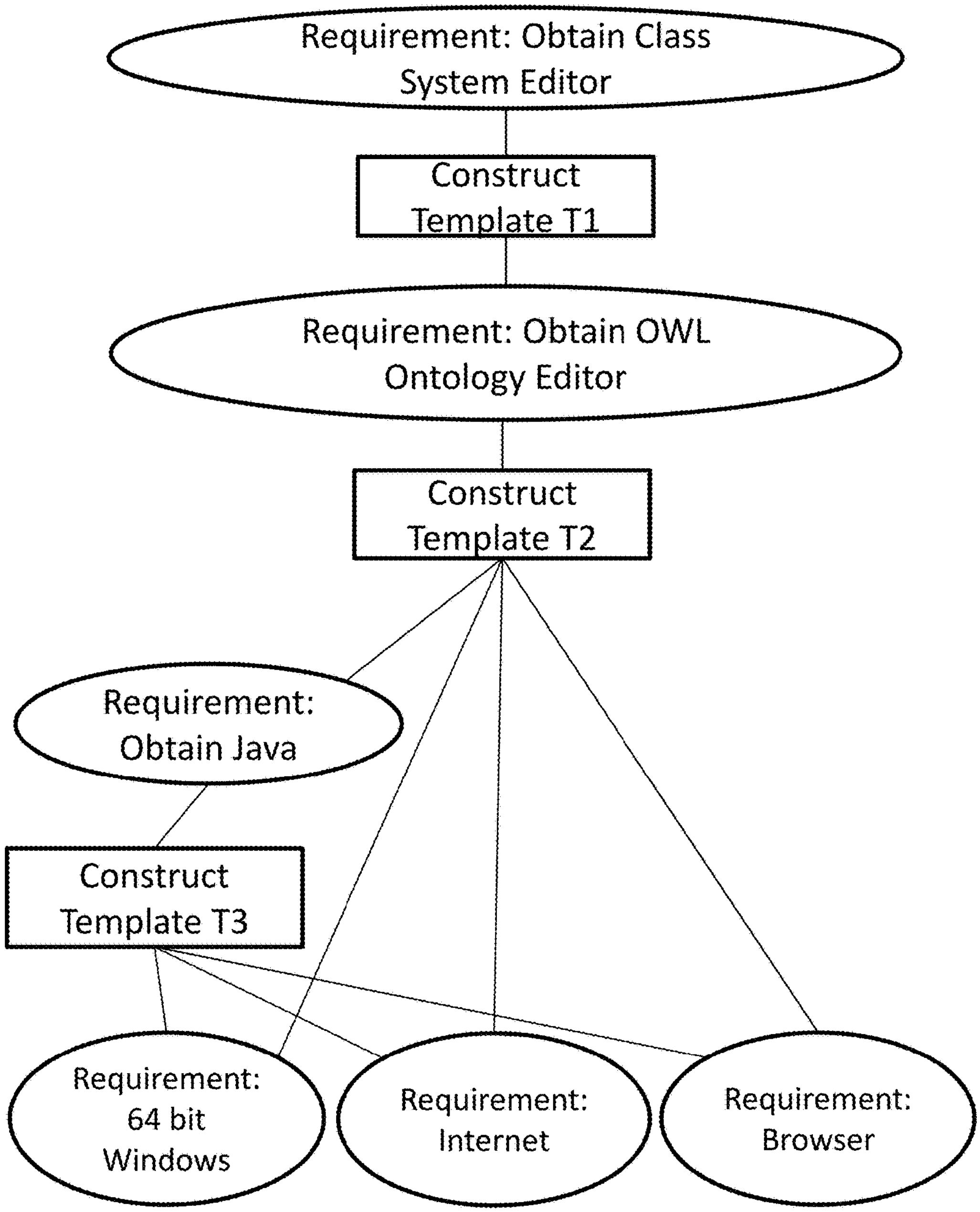

FIG. 148 are example Construct templates for a class system editor.

Figure 149:
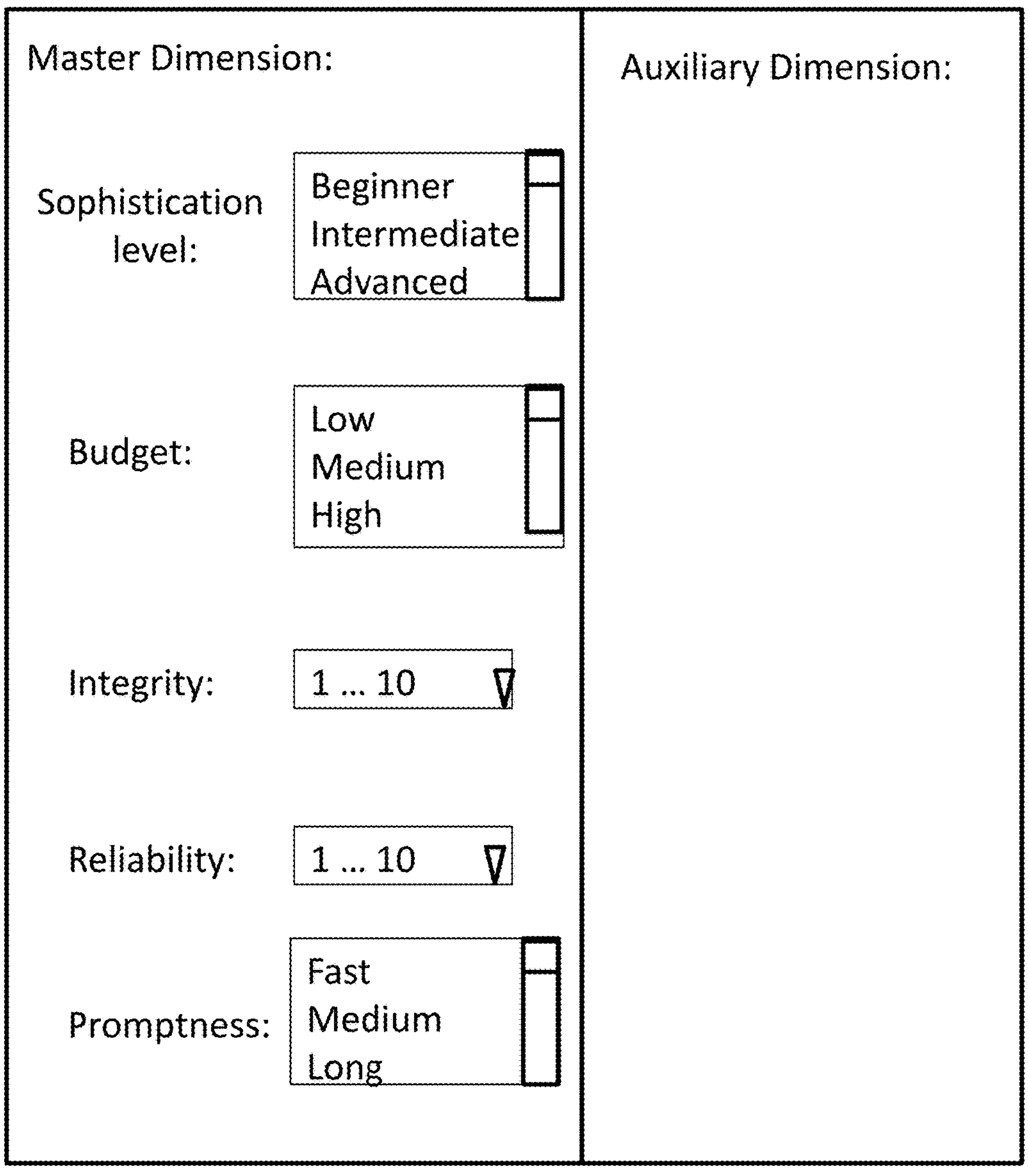

FIG. 149 is an example user characteristic faceting list.

Figure 150:
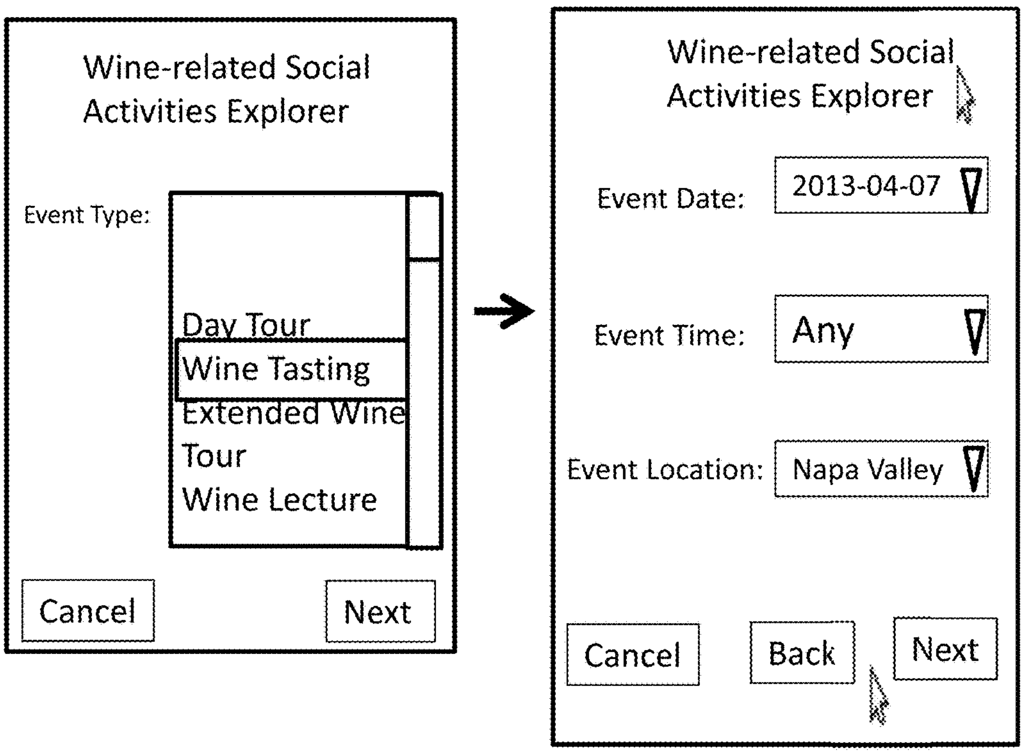

FIG. 150 is an example faceting purpose class application.

Figure 151:
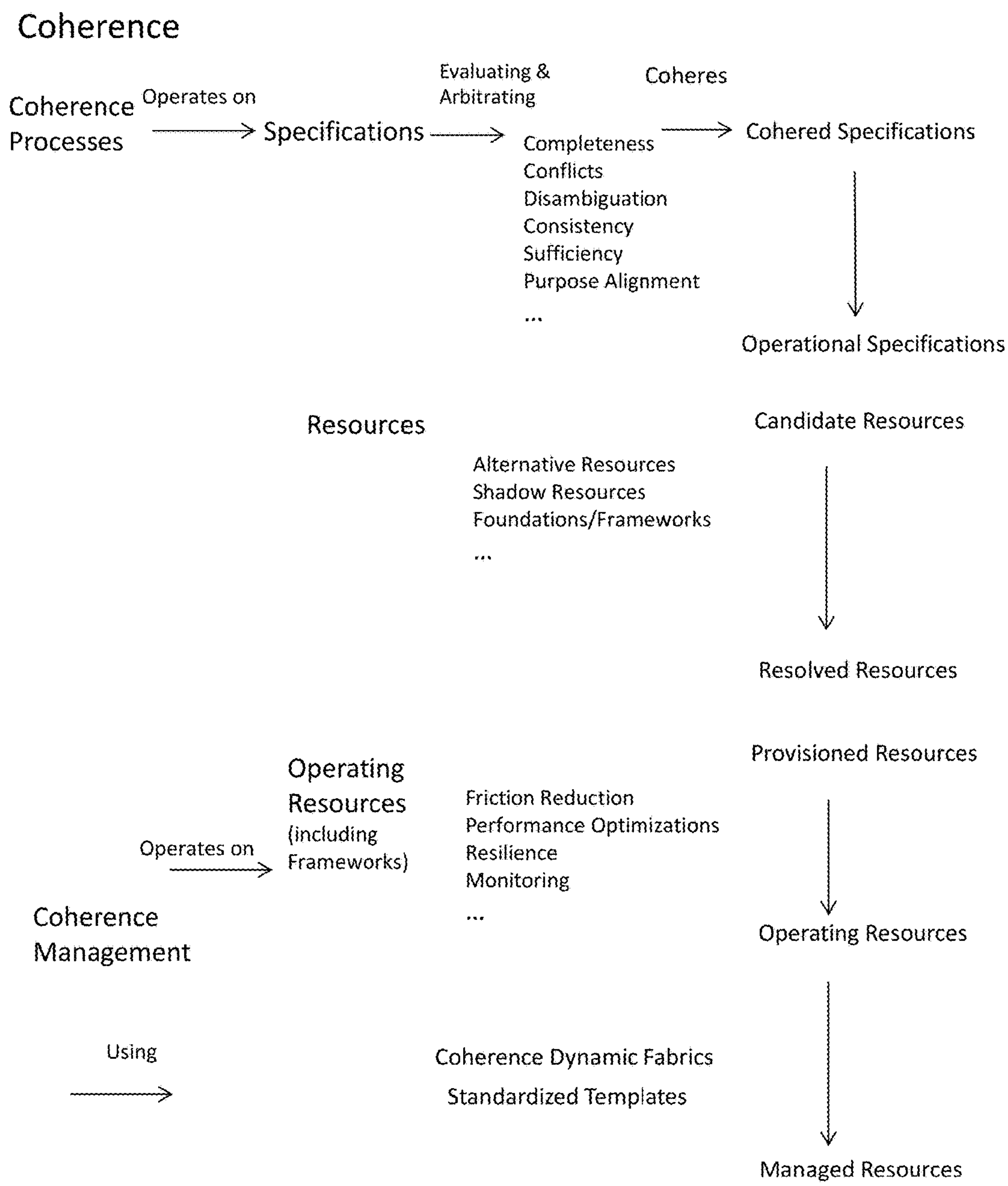

FIG. 151 is an example Coherence process.

Figure 152:
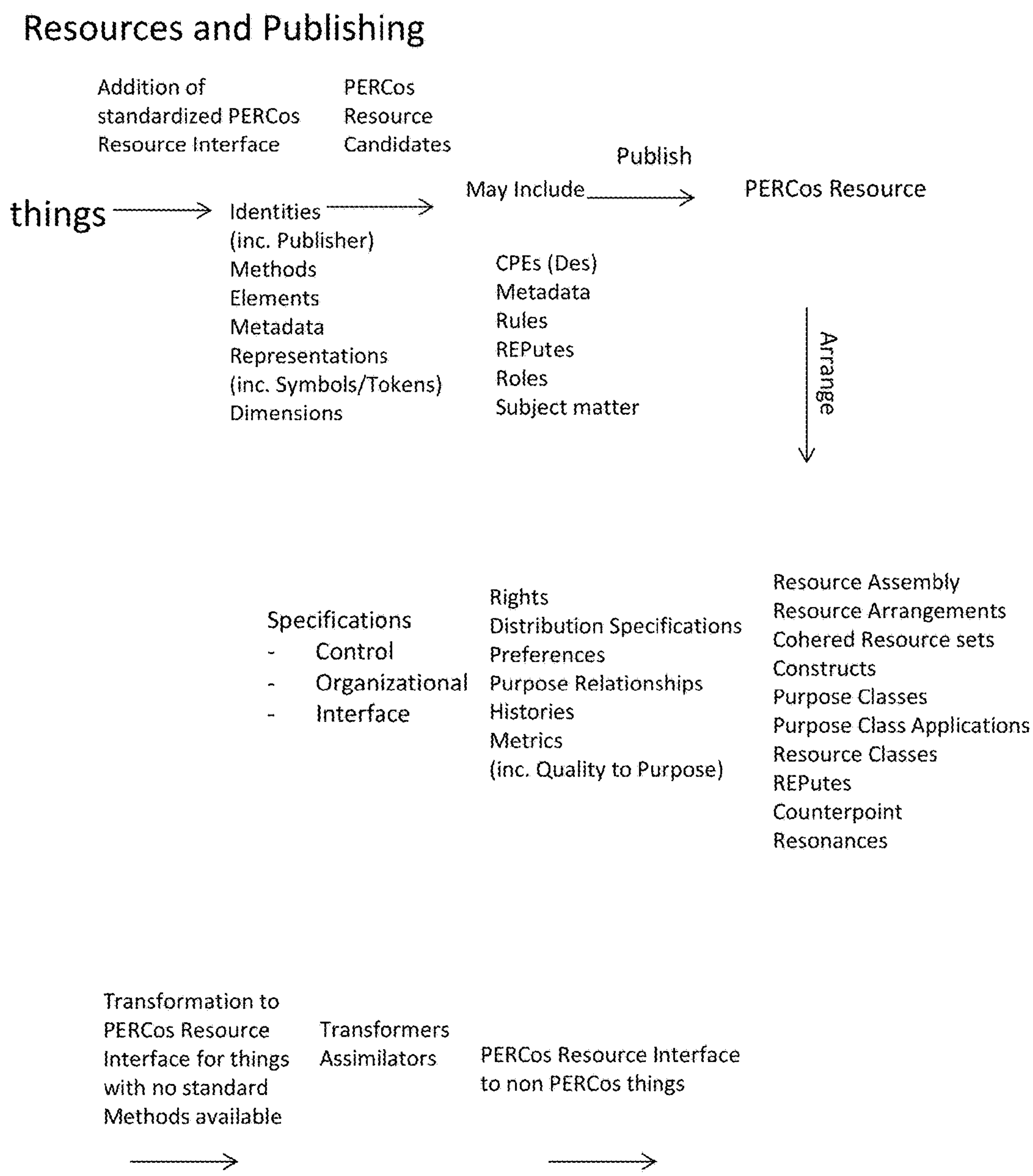

FIG. 152 is an example Resource and publishing process.

Figure 153:
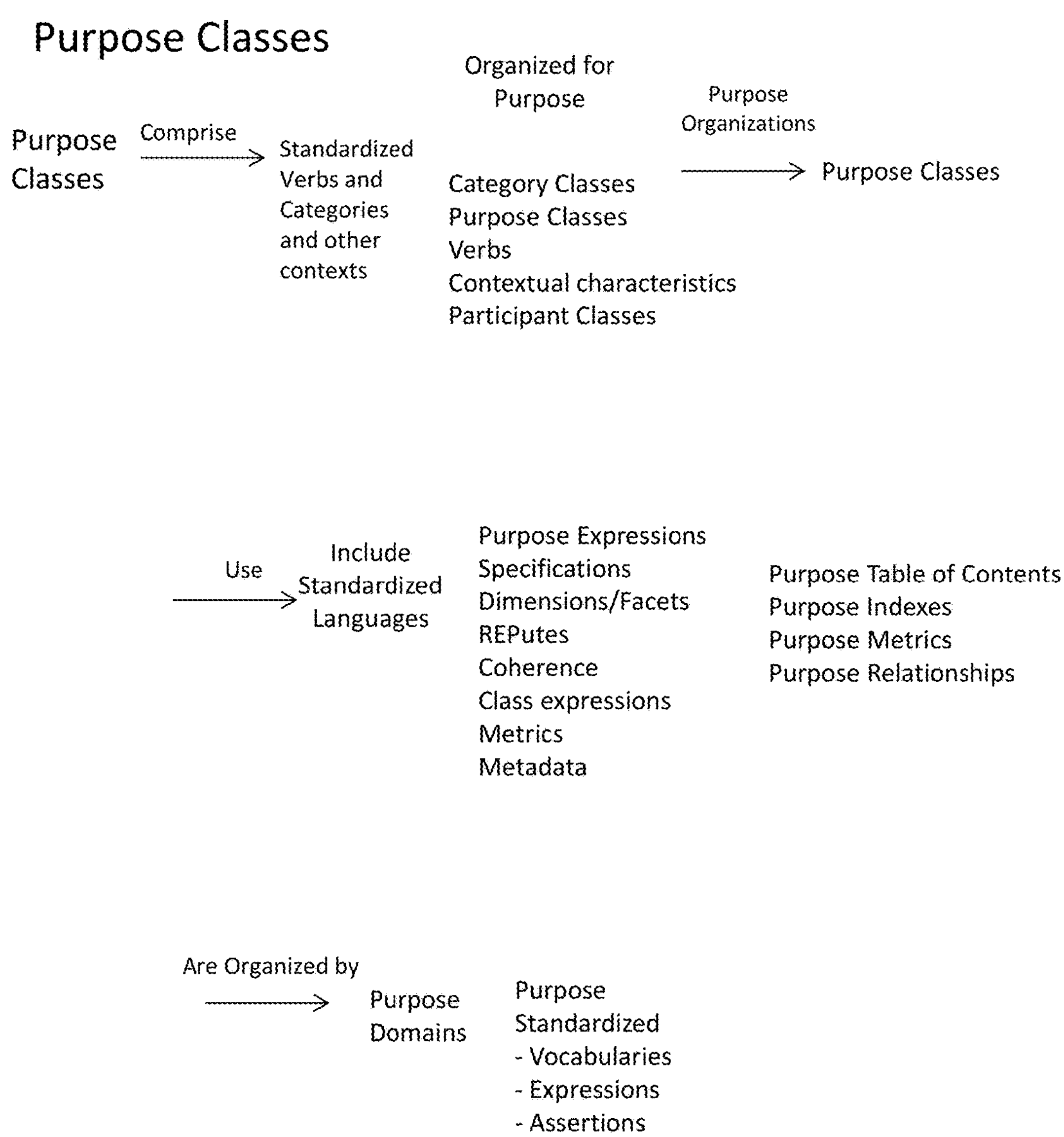

FIG. 153 is an example purpose class process.

Figure 154:
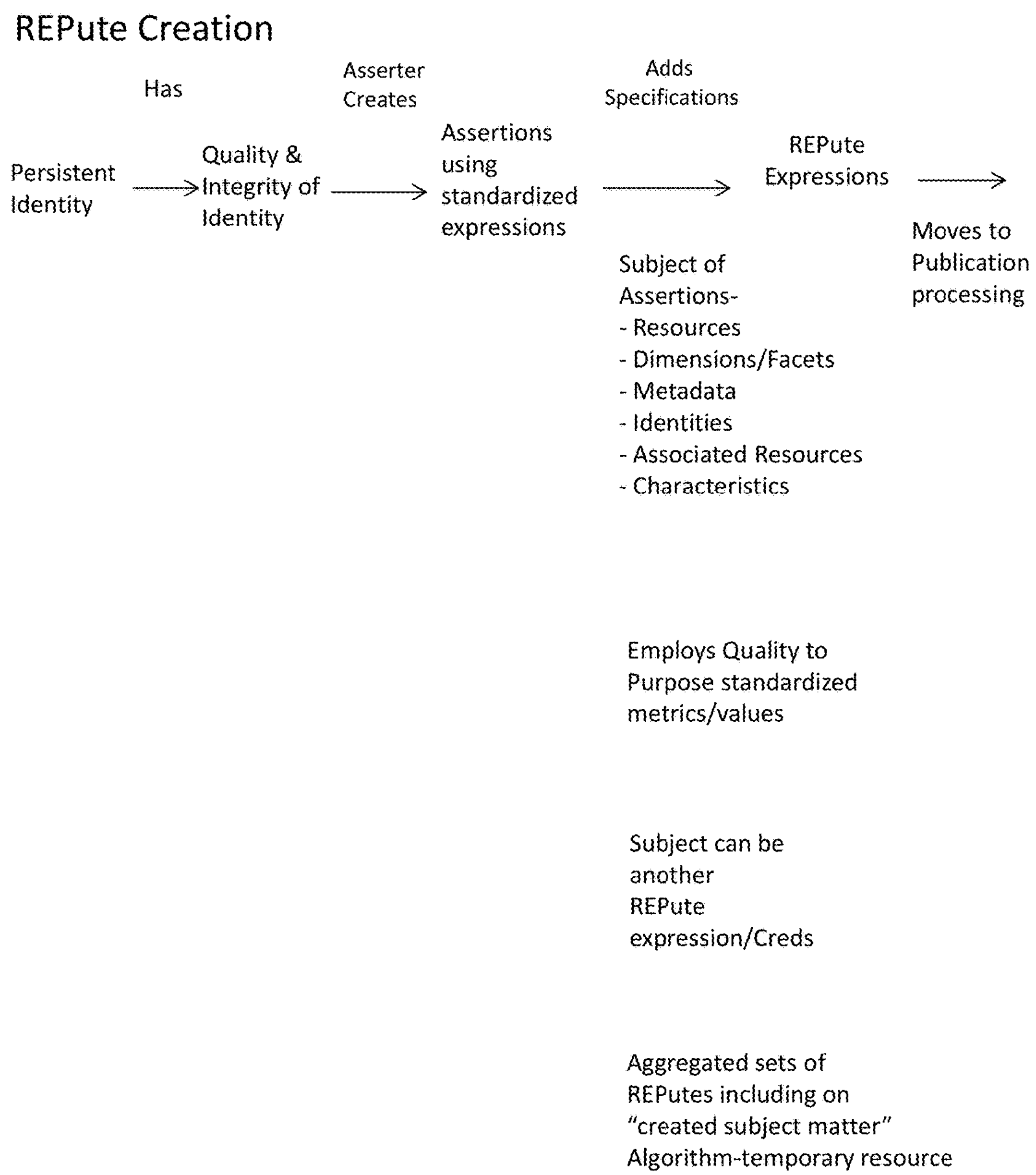

FIG. 154 is an example Repute creation process.

FIG. 155 is an example of publication phase of Repute creation process.

FIG. 156 is an example of information infrastructure process.

Figure 157:
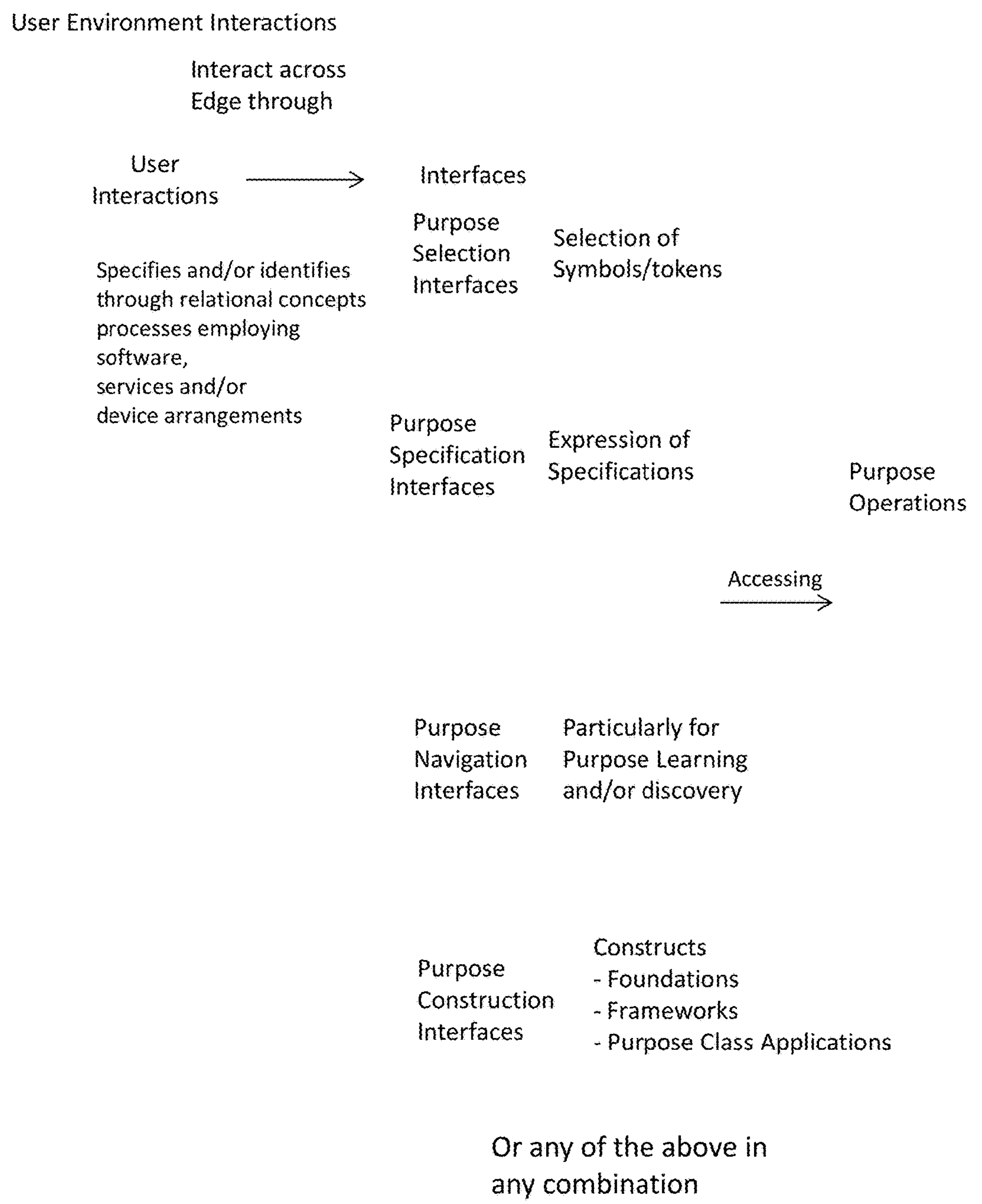

FIG. 157 is an example of user environment process.

Figure 158:
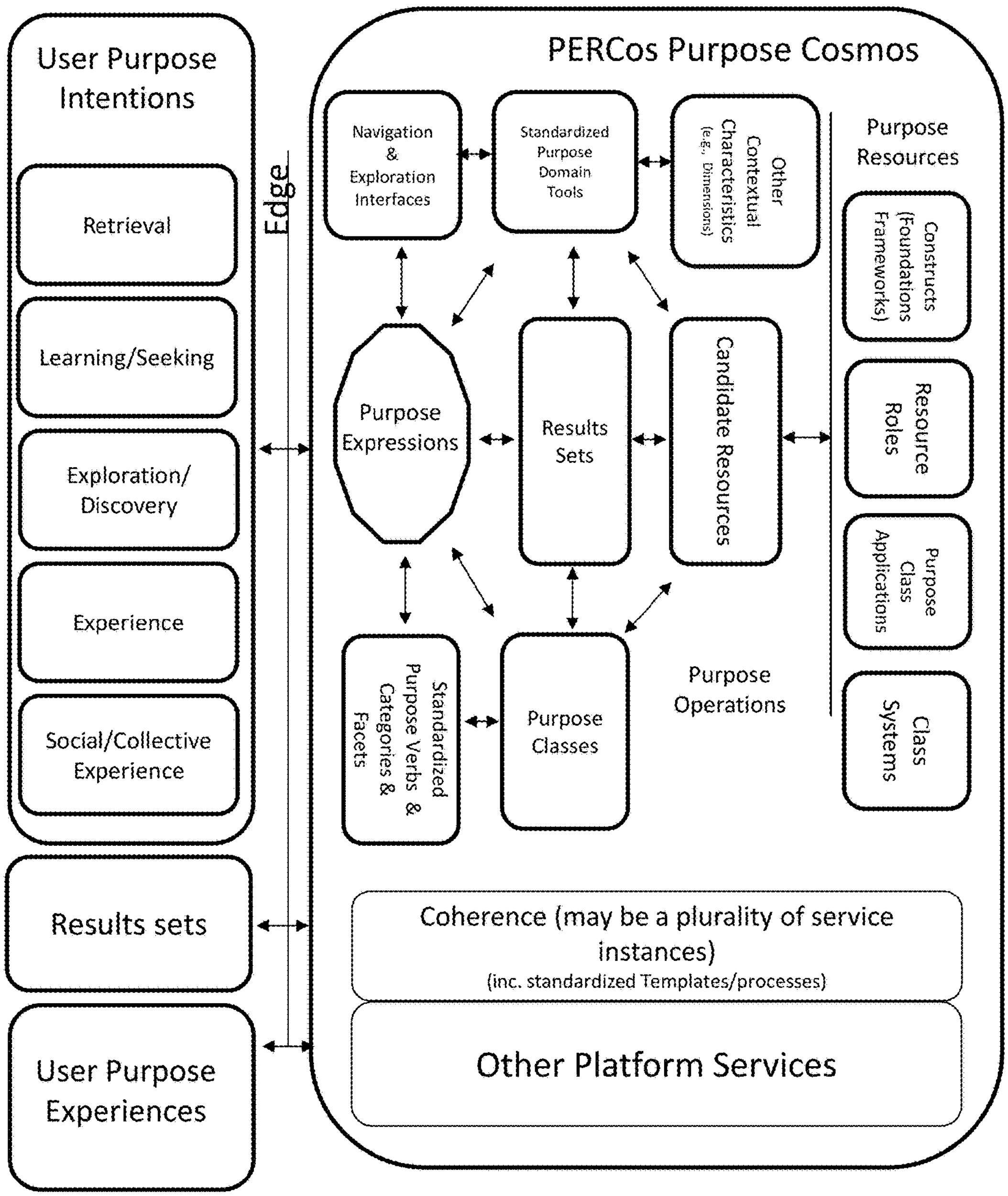

FIG. 158 is an example of purpose cosmos.

Figure 159:
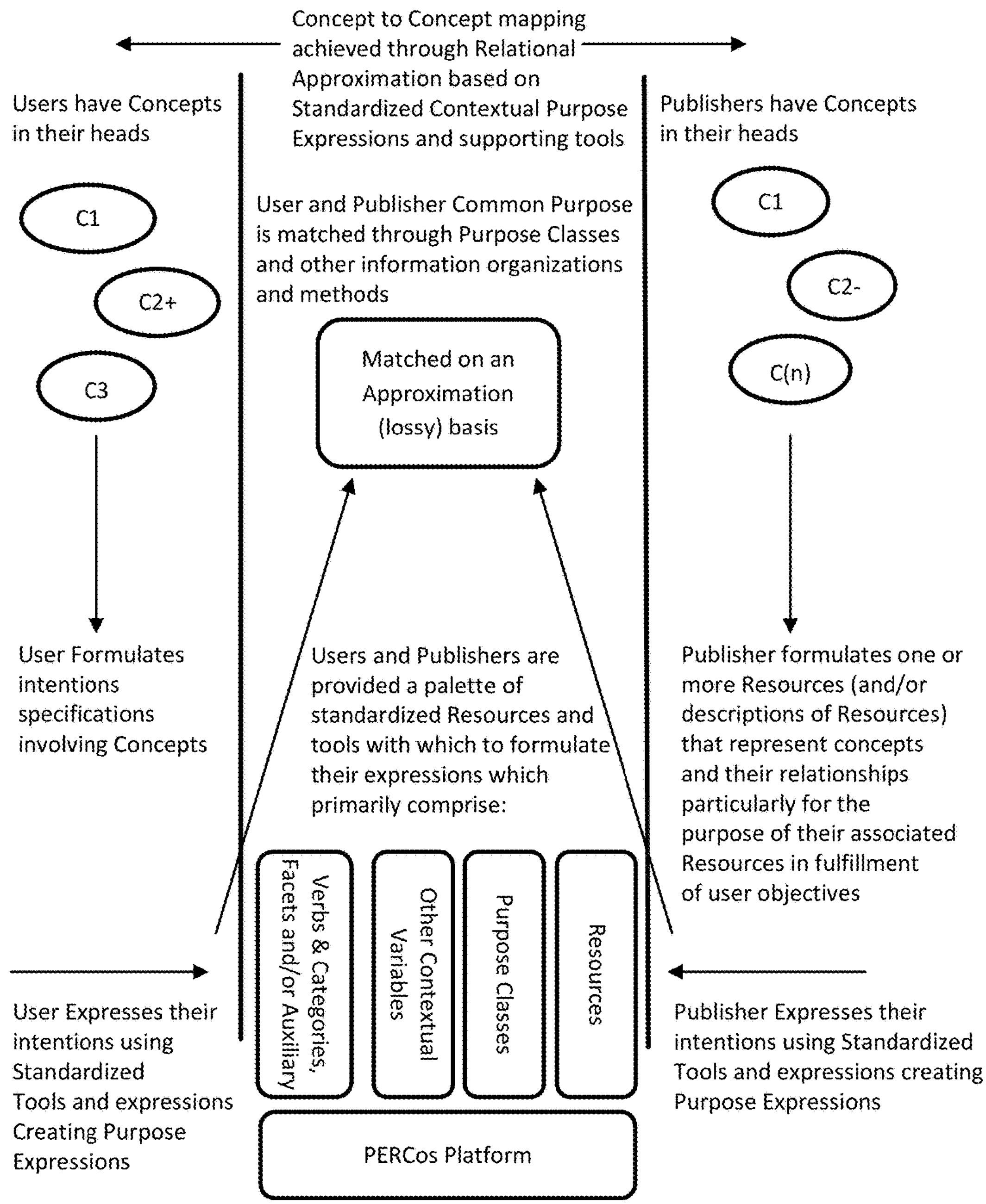

FIG. 159 is an example of concept mapping achieved through approximation.

Figure 160:
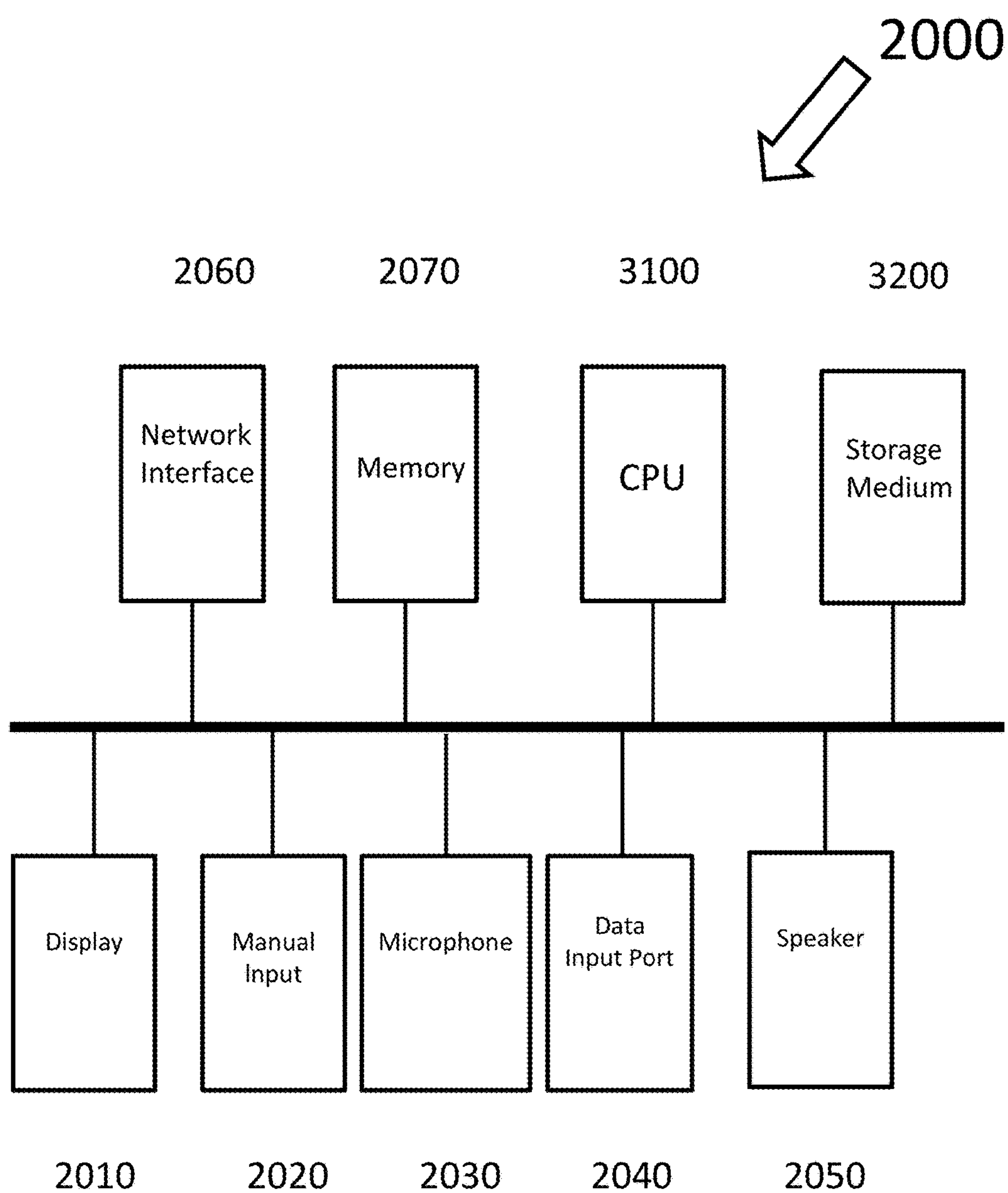

FIG. 160 is a simplified block diagram of an exemplary embodiment of a PERCos environment.

DETAILED DESCRIPTION

A Purpose Experience Resource Contextual Operating System/Environment (PERCos) is in part about computing arrangement users connecting to a universal purpose structured resource "network," a self-organizing grid infused with expertise and enabled by a universe of others, with all their respective nuances of expertise, capabilities, and knowledge and any associated tools and support services. This cosmos, this grid, is a purpose structured network for resource access and provisioning, for identifying and supporting specific purpose related and optimized resource instances, including, for example, very specific purpose application environments and services, and for at least some embodiments furthering or alternatively supporting users gaining at least a portion of the expertise, capability, and/or knowledge inherent in such identified and deployed resources, as well as for applying at least one or more portions of such expertise, capability, and/or knowledge to user purpose related processes.

PERCos environments fundamentally differ from both current web technologies employing key word searching/retrieving for acquiring items and from semantically structured information stores. PERCos can rationalize, for example through the use of Coherence services sets, essentially incoherent/disordered distributed information and associated resource stores and instantiations, for example those comprising "big data", as well as a universe of computing users, user groups, other Stakeholder parties, and enabling resources such as hardware, software, and services, collectively herein called Big Resource. No current technologies, including for example implementations of semantically organized information stores, provide efficient, comprehensive, purpose matching resource identification and provisioning. Generally, current web technologies operate on descriptive information stored and associated generally within an item. Other than recommender information, such as Amazon's or Yelp's general rating systems, these systems generally characterize direct attributes of items, rather than provide organized insights into their one or more contexts of use by users. PERCos embodiments can "insightfully" map efficient, standardized expressions of user situational specific purpose related objectives described at least in part by prescriptive user Contextual Purpose Expressions to, for example, relatively corresponding contextual purpose characterizing, quality to purpose filtered, Stakeholder published descriptive Contextual Purpose Expressions, which such prescriptive and descriptive expressions may be transmuted through use of complementary profile, crowd history information, and/or other metadata. The contrast between existing technologies and PERCos is the difference between a not organized to user priorities, optionally disparately tagged, inchoate distributed information mass of nearly boundless dimensions and diversity, to an efficiently structured, substantially standardized, and explicitly user purpose responsive, global information and related resources cosmos.

The human community is now entering an age where a form of pervasive connectedness is emerging. PERCos provides a deeply embeddable systematic way to harness such connectedness so as to be able to match our circumstances, as may be reflected by our purpose and contemporaneous context, with learning, knowledge, and discovery opportunities and methodologies. As in some PERCos embodiments, user and Stakeholder Contextual Purpose Expression of purpose approximations, when, for example, combined with purpose class arrangements, Repute quality to purpose and value infrastructure, PERCos Constructs, and Coherence services can readily connect users to resource opportunities that, by unfolding user inspection and evaluation and/or through the use of purpose neighborhoods and class and/or other grouping ontological and taxonomic arrangements, provides a setting for user learning and discovery and/or the like that enhances experience opportunities and general user productivity. By providing a systematized environment supporting a purpose related cosmos, PERCos allows users to adjust to the approximate level of knowledge they have related to their purpose and navigate according to their awareness of purpose and their unfolding passage through any interim results to Outcomes.

Often people are aware that they need to learn, or discover, in order to achieve optimally practical satisfaction of a given purpose objective. Unfortunately, frequently people are unaware of the value of learning and discovery as relates to optimal fulfilling of their purposes. Further, if people seek optimal resources and environments for purpose fulfillment, they will frequently find that tools to identify best specific to purpose resources are not available—they are unable to associate and assess resources as they relate to very their specific current, personal purposes, though such best resources may be obscurely residing somewhere in the vastness of the internet. No general resource ecosphere exists for discerning specific purpose fulfillment contributing resources, and as such, no system invites parties to, in a systematic way, tailor resource sets to specific user purposes, that is align resources to the specific context and nature of user computing session or cross session specific objectives.

Many PERCos embodiments are designed to integrate purpose, experience, resources, and context into human-computer interactive operating environments, applications, devices, and/or the like, which are optimized to support Outcomes and interim processes that are directly responsive to user purpose specifications and associated contextual input. These operating environments may be provided in the form of software operating systems/environments, software applications, device design, and/or the like which integrate into their design capabilities for user purpose responsive evaluation, management, and provisioning of resources and where such may be achieved through unified product design and/or through PERCos integration by use of APIs, plug-ins, and/or the like.

We live now live in a connected universe of billions of people and other resource items, and other than expense, efficiency, and accessibility, the only limitations in our deploying best available resources to satisfy a current purpose is sufficient knowledge or understanding of such possible, practical resources. While we are members of a vast population of connected parties and we have digital pathways to connect to nearly boundless resources, we are frequently applying far less than the optimal available resources to any given specific purpose than would be possible if we were better informed, that is had knowledge about, and practical access to, relevant, current purpose specific "best" resources.

Our processes in understanding and using resources towards a purpose satisfying outcome, whether social, entertainment, knowledge oriented, and/or commercial, are hampered by our absence, in any given instance, of, for most of our areas of activity, commanding expertise regarding the availability of resources, the arrangement of resources to our specific purposes, and, when applicable, the unfolding of a developing understanding related to our purposes, relevant resources and knowledge. If users could access any and all types and practical arrangements of resources in service of their differing, specific computing session purposes, if they could employ optimal selections of such resources and have access to expertise regarding such resources and/or their content and/or potential/capabilities, users could generally perform at much higher levels and have more satisfying results from their computing conduct. Computing users would find themselves far less frequently making do with a low quality of resources for a given purpose than a fully informed individual, and they would far less frequently find themselves trying to "reinvent the wheel." Human activity choices and our knowledge of possibilities related to such opportunities now seem to be at a crossroads, where now, at times a boundless array of resources that may be utilized to satisfy purpose. Unfortunately, this relatively recent transformation from lives of relatively simple, basic activities, to lives where we can choose and manipulate resources to provide ourselves with better, quite specific results that are not simply tied to basic-short term survival has not been matched with a general tool set systematizing and supporting human interface with purposeful possibilities regarding what we wish to accomplish at any given moment. Generally speaking, now that much human activity is funneled through computing arrangement interfaces, this unshackling of humans from a basic survival set of tasks to a vast set of human activity types and corresponding purposes has emerged without any systematization integrating the exploding number of possibilities and accordant resources. No formalized, interoperable frameworks for interfacing our purposes with optimum enabling resources and resource portions have arisen.

In part, this absence of focus on human resource and resource choice selection and provision systems may be due to the fact that the history of mankind has been mostly characterized by environments of relatively few and inherently relatively simple choices, whose complexity does not normally involve choices concerning resource selection from a significant number of possibilities, much less vast, disordered stores. But the human community is now experiencing a profound resource explosion and the need for a highly systematized, standardized choice assistance and knowledge enhancement system has rapidly arisen and PERCos inventions implement the first such set of embodiments enabled, in part by various embodiments supporting standardized purpose expression including, for example, Core Purpose and other Master Dimensions and Facets, purpose classes and neighborhoods, Repute purpose related Cred assertions and Effective Facts (EFs), purpose provisioning Constructs, and coherence evaluation and resolution, and/or the like. PERCos technologies can provide an integrated environment for choice and purpose unfolding, assisting users in the identification, evaluation, and use of resources from vast diverse store and producing optimum purpose responsive results.

Human choice should be based upon user purpose and relevant related context, further enhanced as desired by Quality to Purpose and related quality assertions as well as by combinatorial arrangements of resources that are responsive to specific user purpose computing environments (which may be arranged for ad hoc and/or persistent use). Such a general system for web based Purpose management and fulfillment can substantially benefit from both an expertise based Quality to Purpose and related assertions architecture (Repute).

A purpose choice computing system can be optimized by purpose expression standardization for interoperable interpretation and efficiency, where such standardization is based at least in part upon higher level simplification principals, such as PERCos Master Dimensions and Facets, that support user ease in capturing/characterizing their purpose and related relevant context. The foregoing is important in reliable, efficient similarity matching between user purpose and resource store items, as well as to facilitate purpose responsive appropriate approximation results, such as purpose class(es) and/or other purpose neighborhoods and waypoints and/or sets of their members, which may be prioritized and otherwise evaluated based upon such purpose expressions, related context, and/or other metadata, and/or Boolean and/or other mixed or non-standardized user purpose expression components such as auxiliary Dimension elements. In managing a user's relationship to what appears to be boundless and often obscure resource opportunities, such purpose Dimension/Facet simplifications and other PERCos capabilities can bring users to purpose class/neighborhoods for inspection and assessment and further filtering and evaluation, transforming, particularly in conjunction with Repute capabilities, a chaotic set of possibilities into a relatively informed set of candidates supporting an unfolding purpose development environment leading to more productive, valuable, and/or satisfying Outcomes.

The possible potential dimensions and nuances of resources are now highly varied, and can take a vast number of forms, and may, as they are pursued, branch and unfold in many differing ways. Both during free time and while working, many people could now enjoy or otherwise use a cosmos of resources, and users awareness of such resources may unfold over time, and collectively users and other Stakeholders could self-organize resources and store or otherwise publish standardized and interoperable tools for Contextual Purpose Expression, resource profiling, purpose Coherence, resource prioritization, resonance purpose optimization, resource provisioning, resource class applications/Frameworks, and/or the like, all the foregoing supporting connecting users to a nearly boundless cosmos of other participants and resources for experience and other results fulfillment. Humans use computers to assist in realizing objectives. PERCos formalizes the human/computer arrangement relationship as a partnership between human and machines, whereby users provide input specifically and in a formal manner, to direct machine operations towards supporting purpose Outcomes.

PERCos—Purpose Experience Resource Contextual Operating System/Environment

In some embodiments, a PERCos system is, in part, a network and/or local operating system, system layer, and/or cooperative one or more applications and/or services for purposeful computing. PERCos in part, extends traditional operating system capabilities for resource management by enabling user expression of purpose for selection of, and/or matching to, optimally useful purpose satisfying resources. PERCos in part employs means and methods for comparing Contextual Purpose Expressions (CPEs) prescribed by users to comparable Stakeholder published CPEs associated with resources, resource portions, and/or resource and/or purpose class published information. Such Stakeholder CPE information anticipates possible user purposes and related contextual information. PERCos resources, depending on embodiment, may be available locally and/or through/on one or more available networks, including for example, Cloud services.

With certain embodiments of PERCos users can interact with a global "purposeful network," and such network may, for example, encompass Big Data, users and user related groups, machines and devices, applications and other software, and local and cloud services, the foregoing comprising "Big Resource." PERCos resource elements, individually and/or in combination, represent resource sets that can be made available and/or otherwise proffered specifically in response to user expressed Contextual Purpose Expressions.

A PERCos system provides a network management platform for one-to-boundless computing. That is, a user can potentially benefit from resources located anywhere, made available by anyone and in any simple to complex combination. For example, published materials, associated machines, devices, computer software, expert consultants, social networking companions, and/or other arrangements, including cloud services, might be used by anyone and/or any group, anywhere, in any allowable and/or operable user-selected combinations (subject to publisher and/or other Stakeholder restrictions and logical operational considerations). PERCos views computer operations as the interaction between users and their purpose related specifications and actions with computing arrangements, for example, for identifying, configuring, provisioning, and/or managing computer processing resources in a manner responsive to user purposes, that is PERCos employs an architecture that responds to user specifications and other purpose related input to effectuate purpose fulfillment processes. In the evaluation and/or provisioning of purpose fulfillment related resources, PERCos, through the use of its evaluation, monitoring, conflict resolving, completion, and other capabilities, synthesizes operating specifications through, as applicable, the use of user and applicable Stakeholder purpose expressions and related specified and/or otherwise allowed further input information such as, for example, resource metadata information, user profile information, and exogenous societal regulations or other considerations.

Human-computer interaction involves a set of human experiences that unfold during sessions that are generated using specified and/or selected resources: computing hardware, software, data (for example, permutations of Big Data), sensors, machines and related processes, and/or possibly other users, altogether known in PERCos as Big Resource. Purpose specifications and/or comparable user actions normally provide the initial, interim, and/or Outcome input for PERCos sessions, and involve at minimum users providing initiating purposes. Further, PERCos system, PERCos purpose specification, purpose class applications, purpose plug-ins, and/or similar arrangements, can guide both an evolving identification, selection, provisioning, and/or use of desired resources though interim purposeful user actions.

PERCos systems support both user ephemeral and Stakeholder declared purpose specifications, and, in various embodiments, associated purpose and resource related taxonomic and ontological arrangements. These purpose related, published or ephemerally declared arrangements are employed by users and PERCos for providing purpose satisfying outcomes, that is, purpose fulfilling computing session interim and/or culminating consequences. Publishers publish resource arrangements and related, declared purpose specifications, which may take the form of one or more purpose class applications and/or declaration of purpose class memberships. PERCos operating systems and/or layers alone and/or in conjunction with purpose class applications, application plug-ins, and/or API implementations and/or the like, can support user/computing arrangements that can then filter, identify, and prioritize, including qualitatively evaluate and provision, appropriate purpose fulfillment resource arrangements. Provisioned PERCos resources and/or a PERCos implementation can operate and manage user/computing domain cross-Edge communications in support of unfolding resource/user interactions.

In particular, PERCos is by design a cross-Edge user/computing arrangement architecture that supports, assists, and transforms human approximate and relational specific purpose concepts into computing resource parsing, provisioning, and processing capabilities. In response to such relational thinking and at least in part to user specifications/selections, PERCos can seek and/or provision from Big Resource particularly applicable purpose satisfying resource sets as purpose and/or purpose class specific user/computer purpose session user outcome fulfillment tools. Users rely on their inherent relational computing nature, the patterns people recognize through their foundation of experience, context, and memory. Computers employ a different class of operations: precise digital processes, processing arrangements, stored data, and any associated input/output. As applicable, PERCos capabilities, with or without direct user direction, can manage, filter, evaluate, organize, and/or provision computing arrangement resources into focused user purpose specific class applications, platforms, and/or other purpose fulfillment means that may operate on PERCos operating system and/or layer implementations, as well as on compatible computer applications which accept, for example, PERCos plug-ins and/or API code additions. Further, PERCos can employ Constructs associated with purpose expressions, such as Frameworks, Foundations, resonance specifications, and/or the like, the foregoing having been formulated and adapted at least in part to facilitate optimal adjustment of various resources synthesized to an optimally purpose compliant operating specification set balance. Such Constructs may specify "approximate" potential purpose associated PERCos session building blocks that contribute to the cohering of an optimally balanced purpose fulfillment operating specification set.

In some embodiments, PERCos systems support deploying resources in accordance with Contextual Purpose Expressions (CPEs), including for example Core Purpose specifications, augmented when applicable by Master Dimension and/or auxiliary specification information. Such CPEs can enable:

(a) users to, for example, provide Contextual Purpose Expression and other input to identify, initiate, experience, provision, store, and/or publish computer sessions and session resources that provide the best fit for realizing specific user purpose Outcomes. This might include supporting user unfolding purpose expressions and system response processes, and when desired, specifying contextual simplification Dimension Facets. Such Dimension Facets might be in an example, such as user is a beginner related to a specified purpose, unsophisticated related to the related purpose domain, wishes limited complexity relative to user sophistication, has a certain resource budget relative to one or more specified purposes and/or purpose classes within, for example, a time frame, and/or needs a purpose process not to approximately exceed 30 minutes.

(b) Stakeholders to, for example, publish information regarding resources, including associated Stakeholder declared descriptive CPEs, purpose class membership, and/or any related specifications, (e.g. specifications which may be similarity matched to user purpose specifications, where such Stakeholder specifications identify user purpose "sufficiently" corresponding, prioritized, and/or otherwise evaluated/filtered resource sets). Stakeholder may make Contextual Purpose Expressions including, in some embodiments, Dimension Facets specifying that a resource is intended for and/or may be related to one or more specified purposes, for example, designed for use by a sophisticated user, has a certain level of complexity relative to user sophistication level, and the like. Stakeholders may further make Stakeholder commercial and/or affinity group interest declarations declaring, for example cost to use, license rights, claimed quality of resource to specified one or more purposes, as well as sovereign government and/or other affinity group interests related to resources;

The foregoing may be complemented by any other information that in the used PERCos embodiment may be declared by Stakeholders and/or users.

PERCos, through its user/computer arrangement cross-Edge features and its various purpose support capabilities, helps resolve a primary current web resource usage challenge: user's inability to experience quality Outcomes to their underlying purposes, and in particular, user's inability to identify quality and optimally productive user purpose fulfilling resource sets when such users lack a reasonable ability/knowledge base to frame their needs and characterize any associated requests. It is self-evident that such reasonable ability may be absent until developed and/or the user is otherwise supported. PERCos provides the innovative, supportive basis for such user framing, particularly in domains where users lack substantial command/experience/expertise. As a result, PERCos innovatively helps answer this current conundrum, the inability of users to reasonably frame requests for, and/or interact with, resources without sufficient relevant purpose domain related expertise. In such circumstances, users may lack necessary domain knowledge to effectively characterize their input and resource requests and they may be better served by a process approach where uses are presented with an approximate, purpose related resource neighborhood having resources that may be especially designed to support purpose knowledge enhancement and purpose related resource utilization and where such neighborhood resources may be identified, evaluated, filtered, prioritized, selected, and/or provisioned in a manner reflecting contextual purpose variable set matching and assessment processes. This challenge, the absence of user reasonable expertise (and which absence can include many variables such as information specifics, knowledge command over domain information, and user knowledge and command relating to the type, availability, and/or use of resources) is largely unresolved by currently available technologies that are unable to provide general systems for users' contextual realities and specific purpose orientation—these systems fail to systematize resource availability and provisioning based upon purpose considerations, and they further fail to both practically convey effective expertise support adapted to specific current user purpose(s) and to support the knowledge and opportunity development processes idiosyncratically specific to differing user purposes. In the face of the opportunities of Big Data and Big Resource, PERCos provides a broad based, practical, user ecumenical system for supporting user learning, discovery, resource provisioning, and resource use, including during session and/or cross session progressions that can leads to quality purpose fulfillment outcomes.

In most directed human activities, one or more explicit, articulable purposes underlie human actions and employment of resources. Satisfaction for participants in such activities normally results from either a perceived fulfillment of their initiating, underlying purposes, or the experiencing of sufficiently satisfying purpose related refinements, results, and/or associated experiences that evolve from such initiating purposes and processes. It seems evident that most individuals will experience or otherwise enjoy particularly satisfying computing session outcomes if their session specific computing resources are explicitly in alignment with their session computing activity purposes, and, in particular, if the "best of breed" applicable resources can be easily applied to fulfill the differing user purposes that occur at different times. Clearly, the capacity to identify and provision resources that are specifically aligned to one's current purpose, and, particularly the capacity to apply the most productive and applicable of such possible/available resources, would have great value since such purpose-aligned resources, and in particular, those consistent with user purpose related context, would be most likely to produce optimal outcomes and optimal user satisfaction.

But, as computer users and their computing arrangements are now inhabitants within a nearly boundless web of Internet and intranet resources (including other users and their computing arrangements), the challenges in identifying optimal, specifically purpose matching resources and resource sets is a great unmet dilemma that requires new technology approaches. Since the most powerful computing arrangement would be one that is most responsive/satisfying of a user's current purpose, it would seem that this might be a priority of current computing architecture. But, in fact, there are no general-purpose purpose fulfillment architectures. This is likely due to the vastness of type and location of web resources and the inherent complexity in determining the simplifying organizing purpose related conceptual dimensions that might be employed to replace a chaotic resource universe with a coherent and efficiently operating resource cosmos.

The complexity in identifying purpose fulfilling web based resources and resource combinations, given today's nearly boundless array of internet resource opportunities, types, locations, and qualities, is in part revealed by the clear absence of any formal system that enables consistent, straightforward, efficient, and reliable identification, categorization, evaluation, arrangement, provisioning, and support of user purpose resource sets. No current technologies enable the standardized specification and communication, relational approximation, identification, prioritization, cohering, and provisioning of specifically purpose aligned, purpose satisfying component resources. Further, no current system provides a sufficiently broad and unified view of both the nature of computing resources and the contextual perspectives necessary to optimally align resources to user intent.

Absent a well implemented general operating system, environment, layer and/or application means to associate resources with context specific, explicitly current, human purposes, identifying and applying web based resources to human purposes will remain fragmented, haphazard, and inefficient, that is often dysfunctional for many purposes. This is particularly applicable where a users' expertise in identifying, assessing, combining, and/or provisioning resources are any less than highly expert. This absence of a general, formal means for identifying "unknown to user" resource opportunities in a manner specifically responsive to, and optimized for, user current purposes, means the rich, deep, diverse possibilities of web based resources are obscured behind a veil of seemingly boundless, largely undifferentiated as regards to purpose, objects and services. At least for the foreseeable future, crowd behavior and semantic web, as well as fragmented topic based expert systems and related tools that try to deconstruct existing web information into useful indicators of user behavior and relevance will not have the adaptive particularity and comprehensive reach provided by the contextual purpose inventions provided by PERCos implementations and described herein. Further, search and retrieval technologies such as Google and Bing search environments and/or the like will perform consistently/adequately only in circumstances where users can sufficiently, and explicitly, describe the information, information resource, or such sufficient portion of key information resource characteristics that prove adequate to the material to be retrieved and satisfy such a limited purpose context. That is why these environments are often characterized as search and retrieval environments—the user normally needs to know enough to specify what to retrieve, or at minimum to give a sufficiently relevant search specification to result in a drop-down suggestion that the user is sufficiently informed so as to select. While information resource management systems such as knowledge graph, clustering, and domain specific expert systems can provide users with some useful capabilities and guide posts when pursuing knowledge and discovery activities. These systems tend to be relatively inefficient and impractical and insufficiently adaptable to specific user contexts and user objectives as regards users fulfilling their active purpose set.

As the developed and developing world increasingly participates in, and connects through, an electronic web having associated vast, seemingly boundless quantities of information, software, services, and human and group inhabitants, existing resource access, search, classification, identification, evaluation, and provisioning tools are unable to, in an integrated, efficient, and optimizing manner, support users and user group resource requirements. Users inherently want to use resources for the most satisfying Outcome, that is those resources that would "best" satisfy their current purpose(s). But current systems are not effectively responsive to individual and group current purpose needs since they lack any reasonable methods for user purpose specification enabling users to "outline" their objectives in a manner that efficiently leads to computing session specific resource sets, including supporting specific, specified purpose fulfillment "environments," where such systems are responsive to user purposes, that is user specific, current needs and objectives.

In particular, there are no general purpose technologies providing reasonable methods to correspond user specifications of specific, current user purposes with possible resources, including performing quality to specific user purpose prioritization, and/or provision of optimal quality to purpose resource sets. Rather, existing technologies constitute a balkanized array of tools, such as characterization and retrieval search engines, recommender systems, clustering and knowledge representation (e.g. graphing) tools, classifiers, encyclopedias, expert systems, and other piece meal products and services.

People interface with the world around them through their senses. Such interfacing involves interacting with "resources," including, for example, relating to other people, using tools to fulfill tasks, and experiencing the modification or enhancement of knowledge through observation, evaluation, and/or absorption of information. For most of the history of mankind, users interacted with resources that were in the immediate proximity of some or all of the participating individuals. Indeed, until recently, physical realities limited the volume and diversity of resources that could, or would, be physically present for any individual or group of individuals at any given point in time, and resource users normally needed to be either physically proximate to resources, or use human "agents" who were physically proximate to such resources. Given this historical physical proximity limitation regarding the practical use of most resources, information systems for organizing, identifying, evaluating, prioritizing, provisioning, and using resources have generally reflected such physical proximity limitation solutions, they were primarily systematized based on categorization of the direct attributes of each constituent member, and such members were placed in organizational hierarchies, such as class systems, that could "hold" such members in consistent and normally non redundant places, such as stacks in a library.

Historically, normally, a library member, for example, was physically positioned in only one place in the system, and the quality of a member resource to a given purpose, and differing arrays of purposes, was not codified. Users, and/or a librarian or like agent, would physically access desired such resources by retrieving them from a specific library storage location. Such general purpose systems for such large scale library information resource organization, such as Dewey Decimal Classification or Library of Congress Classification, inherently lack the capacity for efficient identification and deployment of members in variety of different places that might correspond to respective differing use purposes, and they further fail to supply "reshuffable" purpose related combinatorial resource arrangements (for example, effectively mashable) that can supply user specific purpose (and/or purpose supporting) and/or purpose class fulfilling environments. As a result, such classical classification systems share, for example, deficiencies with search and retrieval systems. For example, they generally require a level of knowledge/expertise regarding the nature of potential resources in order to reasonably efficiently support a user's quest for purpose specific best available, or even applicable, specific resources. And such systems do not provide specific purpose adapted combinations of different resources where such resources are responsible for complementary/different/differing contributing resource subsystems that support a given purpose fulfillment environment, and where such resource subsystems can, for example, contribute to at least in part standardized, published purpose Frameworks where such resources fulfill, for example, differing specified operative roles.

As with such library classification systems, current computing technology does little to assist users in efficiently identifying and provisioning resource sets that are aligned to a specific user purpose current at a given time. Generally resource providers have a somewhat similar challenge. They have no systematized capacity to identify and provision potential users where their resources might be particularly useful in contributing to specific user purpose Objectives. Such providers have no standardized, broadly interoperable arrangement by which to specify the appropriateness of their resources as tools that would contribute to optimal deployment and/or use of such resources for satisfying specific user computing session objectives.

Given substantial expertise relative to a current purpose, users may have the capacity to selectively identify, that is describe or point to, desired resources which they may then be able to retrieve and/or utilize. But regardless of whether any such user identified resources are functional for a given purpose, even with substantial expertise, users may indicate resources that are far less than optimal, given the massive resource diversity, including type, location, provider, timeliness of version, and explicit fit to specific purpose, that are now potentially available through web based computing. Further, for most objectives and topic areas, users have limited expertise—generally an individual's true mastery of most subject areas is quite limited, and often far more limited than they realize. In the absence of expertise, resource retrieval technologies and resources are still utilized in attempted satisfaction of user purposes related to such areas, and most people quickly learn to live with the readily available and may treat such resources as adequate or otherwise serviceable. It is normally not clear to individuals—in the absence of an understanding of available superior resources and PERCos new forms of (e.g. mashable) contributing component resource organization means—how profoundly many user purposes are under served by available computer tools. In fact such recognition would likely be, particularly for the average user, unproductive and unsettlingly frustrating since the journey to optimal resource identification and provisioning (when possible), can be too long and difficult a process using existing technologies.

Generally, in satisfying purposes through the use of resources materially involving learning and/or discovery processes, users need to be presented with appropriate resource environments and/or "evolving" differing resource set sequences versus "answers" or answer lists or knowledge graphs, such as available with search engines. Such learning and related environments enable user development of sufficiently meaningful representations of their specific desired purposes as they evolve their understanding towards a purpose fulfillment culmination or stopping point. Unfortunately, generally speaking, no architecture, no cosmos of technology and resource administration exists enabling the corresponding of computing resource sets and resource combinations to the often approximate nature of user usage purposes and their relevant contextual variables. Importantly, in pursuit of satisfaction of current purposes, users are frequently not seeking, or yet qualified to identify, specific purpose satisfying end results. How do users, for example, efficiently search, if they are not sufficiently knowledgeable to identify that which they wish to retrieve? Instead, users need resources that are appropriate and tailored to their user circumstances and purpose needs and this can be only be effectively, consistently achieved through a user purpose specifications process that is matched with one or more corresponding resource associated purpose specifications. Such a technology arrangement should support purposeful processes that unfold to results, either interim or final.

Given the nature of such unfolding user processes where users are developing and identifying purpose related results, users will often need to both declare and employ lossy approximating concepts such as specified by PERCos user purpose expressions, and employ PERCos and/or related application processes supporting a cross user/computing arrangement Edge where user experience reflects a progression of human relational thinking processes in response to an unfolding of resource supplied inputs that enable developing human knowledge/perspective. It should be noted that these processes normally, when users are in an at least in part learning mode, function most effectively when purpose class relational approximate information sets are employed, versus "precise" specific answers search engines, result lists, and/or, for example, knowledge graph and/or clustering groupings. While these tools might, under some circumstances, make a system seem responsive, they frequently provide the learning user with confusing, insufficiently informative, and/or damaging to user results. Generally, the foregoing results, particularly in many learning and discovery contexts, in less than optimal efficiency, costs, relationships with resources (including other possible participants), levels of complexity, and reduction in confusion; they provide far less than efficient time use and productivity outcomes, and can fail to provide optimally enjoyable networking environments and experiences.

With PERCos, resource supplied learning/discovery inputs—which in some embodiments can take the form of purpose neighborhoods for inspection/learning/evaluation processes by users—can be made available through identifying user purpose specific resource sets or at least in part purpose resource set application environments, that can, in cross "Edge" communication with users, present coherent purpose responsive results and/or purpose specific user interfaces and resource interaction supporting further purposeful steps that develop towards purpose fulfillment or closure.

In certain embodiments, two significant resource features supported by PERCos systems are:

1. Their ability to treat all types of PERCos deployable and published processing related information representing any computing session specifiable and interpretable capabilities as specifiable discrete resources, resource portions, and resource sets, which may or may not be further combinable. The foregoing includes, without limitation, devices through their data interfaces and specifications, network services, computational processes, specifications serving as interface information for humans and groups, for example as participant representations and associated data that may be operatively associated with cross-Edge interfacing, as well as communication channels, knowledge information sets, and any other type of processable data representing any type of information and/or "real-word" processing related capability, all the foregoing providing elements contributing information and/or processing and/or storage and/or communication for a PERCos session operations (including, for example control algorithms, and usage related information for machines and devices), such resources for example, including published information regarding and/or representing any resources external to PERCos which are treated as cross-Edge elements that communicate with, and/or receive communication from, PERCos, such as memories, microprocessors, databases, software, networks, cloud services, participant and Stakeholder representations, and the like.
2. Their ability to treat all such resources uniformly in accordance with purpose and any associated control specifications.

PERCos systems are substantially purposeful, user and Stakeholder specification-driven environments. Applicable specifications, received from user and/or machine input, support the two primary groupings of PERCos platform activities, (1) identifying, evaluating, selecting, and/or provisioning of resource sets, and (2) use of resources in service of expressed user purpose(s). PERCos can employ its operating platform components in combination with purpose related local and/or remote PERCos compliant resources and user instructions in preparation for, and/or provisioning of, purpose fulfillment platform/resource combinations.

Stores of PERCos compliant resources are partially or entirely purpose specification arranged (and may, for example, be complemented by traditional category classification) with the organizational objective of best satisfying user purpose(s) given possible and/or practical available resources. Users relate to resource information through their tendering and/or provisioning. PERCos resource information management is specifically adapted through the use of standardized and interoperable purpose expression capabilities, and in some embodiments, purpose class and/or other ontological and/or taxonomic capabilities, to provide specification tools to organize and identify purpose related resources that are specially adapted and/or useful for specific purpose fulfillment objectives. Resources may be assessed through such purpose related specifications, and, for example, through the use of coherence processes, and PERCos may process any resource set, at least in part in response to at least a portion of such purpose specifications, for example, PERCos resolves collective applicable specifications in a manner optimally consistent with user and/or published Stakeholder purpose specifications, including identifying and resolving coherence managed conflicts and/or deficiencies among resources and/or between, for example, user and Stakeholder specifications, and any other applicable specifications, so as to produce a co-adapted and consonant resource set.

As referenced earlier, PERCos employs Contextual Purpose Expressions as specifications declared by users to, at least in part, represent their purpose(s) for a given computing activity set. Contextual Purpose Expressions are also employed by Stakeholders as purpose specifications associated with resources and resource and purpose classification groupings. CPEs normally describe human purpose concepts in the form of lossy, relationally approximate, notional representations. Such representations are operatively used to identify resources that relatively align with user purpose fulfillment objectives, either generally/comprehensively and/or in the form of a component that can contribute to a given purpose fulfillment process. PERCos uses CPEs both to represent user and Stakeholder purpose related conditions/objectives, but also to characterize one or more purpose classes instances that are associated with such purpose specifications, so as to operatively organize and optimize resource identification efficiency, particularly when dealing with vast data stores, such as Big Data or more encompassing Big Resource. In such circumstances, purpose classes may contain resource sets as members whose membership, in certain embodiments hereunder, are declared by Stakeholders, with such membership being associated with any such resource and therefor such resource being associated with the one or more of the purpose classes associated Contextual Purpose Expressions. In these circumstances, any given purpose class can constitute a purpose "neighborhood" populated by such Stakeholder declared members (and/or by members specified as such as a result of historical usage associations and/or class attribute inheritance and/or other algorithm calculations). The declaration of resource sets as members of one or more purpose classes can support a two or more step process involving the generalization of bringing users to one or more purpose neighborhoods comprised of resource members, where such member resources, for example, can be further ranked, examined, filtered, selected from, organized into groups, and the like. This can profoundly simplify managing Big Data or Big Resource usage by inspecting, for example, an index for purpose expressions for, for example, tens of thousands of purpose classes to derive appropriate one or more approximation neighborhoods, and then, for example, if desired further processing neighborhood member associated purpose related specification information. This provides an alternative to examining, for example, an index for all resources, which might comprise billions, and ultimately trillions or more of resource items and their corresponding huge one or more indexes and/or other information manager tools. For example, in certain embodiments, PERCos user prescriptive purpose specifications can be similarity matched either directly against information store arrangements for published purpose expressions (with or without other purpose related information) associated with resources sets, or can be similarity matched against purpose class CPEs (with or without further examination or other use of purpose class metadata). More detailed filtering may take place in evaluating purpose class members by using, for example, resource metadata, PERCos value to purpose Repute system input (including Cred quality assertions, effective facts (EF), and faith facts (FF)), and/or associated user purpose expression secondary information (information specified or acquired at least in part for such further member based filtering).

PERCos combining of inherently lossy "approximate" purpose specifications prepared by both users and resource Stakeholders (e.g. providers, creators, Cred asserters, and/or other Stakeholders) can enable users to enter into learning, discovery, and/or experiencing processes that correspond to their inherently generalized purposes and at least in part support user passage through such learning, discovery, and/or experiencing processes to session or other process sequence culmination or termination. As discussed, PERCos means can also support users using, in combination with their Contextual Purpose Expressions, similarly approximate and lossy purpose cosmos organizing purpose classes, enabling vast and massively diverse resource sets to function as practical purpose resource stores that are optimized for user purpose fulfillment related user evaluation, interaction, and/or provisioning. Elements from such resource stores can be practically matched and filtered and/or otherwise selected or filtered for their purpose fulfillment qualities. The efficiency and effectiveness of such purpose similarity matching processes can be potentiated in quality of Outcome through the use of Quality to Purpose Cred Repute processes that may further evaluate, prioritize, and/or provision resources, including performing such processes on resources specified as members of one or more appropriate purpose classes. Further, such resource stores can provide resources as building blocks for resource environments and other purpose frameworks, including purpose class applications, the foregoing in support of unfolding user purpose development and/or fulfillment processes.

PERCos provides a purpose expression architecture that operatively interacts with PERCos purpose related resource organization and resource provisioning (e.g. Coherence and PERCos Constructs). Such PERCos purpose specifications involve standardized and/or otherwise interpretable descriptions of user objectives and related, particularly relevant conditions that provide information informing PERCos processes of user purpose, for example: focus, context, and quality to purpose facets, the foregoing for calculating and/or otherwise identifying degree of match, and value of, resource sets to user purposes. In particular, PERCos purpose specification can employ combinations of one or more verbs and one or more categories and/or subcategories that together represent user Core Purposes that approximately correspond to the central focus set for user activity. Such one or more Core Purposes may be combined with particularly relevant user standardized or otherwise inter-operatively interpretable contextual variables such as: available PERCos Master Dimensions including specific budget(s); available time duration and/or specific time; user expertise relative to Core Purpose focus; desired complexity and/or "length" of resource material sets and/or portions thereof; complexity and/or arrangement of interfaces; quality of experience variables; and any one or more characteristics regarding any expert and/or crowd and/or historical resource set(s), including any Repute assertions and/or derived values relevant to such resources and/or resource classes and/or the like. The foregoing may further take into account the association of PERCos processes and results with "external" cross-Edge computing arrangements for input, control, and/or other management purposes internally for PERCos and/or externally for any applicable portion of such external computing arrangement; and the like.

PERCos processes resource use results in session consequences that are responsive, at least in part, to user purpose specifications, including purpose related user experiences and/or other results, such as, for example, information acquisition, modification, and/or storage; social networking interactions; user entertainment activities; and/or purpose related communications regarding computing and/or other device arrangement performing tasks and/or producing results, such as results from PERCos cross-Edge purpose influenced manufacturing process control, process and real world (e.g. traffic) flow management, scheduling, and the like. An inherent aspect of PERCos resource usage are sets of unfolding interactive processes driven in part by user input responsive to cross-Edge computer to user communicated information and ensuing user interface functions.

Some embodiments of PERCos systems incorporate purpose class applications and other Framework Constructs that assist users in progressively expressing and/or satisfying purpose related user understanding as it evolves during and/or across one or more sessions. This includes user purpose related understanding improvement, refinement, and/or alteration resulting from changes in user knowledge during the course of one or more such PERCos purposeful sessions. PERCos can enhance this knowledge/perception progression by providing user purpose-supporting results development environments that enable capabilities not found in traditional "search engines," "information retrieval" tools, and/or "knowledge management" systems. Such traditional tools do not support the specifically evaluative and purpose-directed aspects of PERCos standardized contextual purpose expression environments. For example, PERCos users can employ such domain specific purpose related environments for Big Resource identification, evaluation, prioritization, management and utilization and/or purpose results development. These environments can both optimally relate to PERCos Big Resource organization and further provide specialized user/computer purpose related tools for navigation, knowledge enhancement, and exploration.

The nature of identifying productive resource tools for characterizing purpose satisfaction, and often the quality of user use of such tools, normally differs in correspondence to a user's relative command over the pertinent subject matter. This differing usefulness of tools, and manner of tool use, is due to a user's relative purpose class and/or category expertise level as well as the nature of the specific user purpose at a given point-in-time. PERCos levels described below generally correspond to decreasing user specific subject knowledge and/or clarity of purpose and/or decreasing comprehension regarding relevant candidate and/or actual tool usage considerations.

It seems self-evident that the less one knows about issues relevant to the area of interest central to a set of purpose processes, the less informed one is regarding relevant criteria for successfully furthering such processes. Generally, this view of user relevant knowledge levels and resource gathering/usage strategies can be simplified into the following three groupings which correspond generally to differing "levels" of information gathering considerations, from acquiring highly specific information items to knowledge discovery in unfamiliar Domains. These relative Levels are:

1. With purpose level 1, users knowledgeably, with sufficient expertise, pursue purpose with such users retrieving, organizing, evaluating, and/or employing resources, and such users can reliably describe, locate, and/or interpret (e.g. evaluate contents) appropriate one or more resource sets. Such users, under such circumstances, generally understand the implications of, relative usage values related to, and usage control parameters germane to, relevant resource sets and their components. Normally these user abilities reflect the user's knowledge command over relevant Domain and/or sub-Domains and/or related categories. This domain related command enables users, for their respective objectives, to provide effective resource identities, e.g. resource names, web locations, explicit descriptive characteristics, and the like, to access, select, and/or use such desired one or more resources and further to interact with such resources with such reasonable proficiency as to result in "sufficient" purpose satisfaction. A simple example is a user searching in the Open Table reservations Cloud Service on the name Three Seasons restaurant in Palo Alto, Calif. to reserve a table at a specific time for a given night or a user entering Apple Computer, or USPTO, into a Google search box because they want to "go" to Apple's main website or to the U.S. Patent Office homepage.
2. With purpose level 2, users wanting to learn about domain information set who have relative clarity regarding their desired purpose Outcomes, but less clarity regarding identifying and/or using optimal resources. Users identifying, evaluating, evaluating, and/or provisioning such resource sets generally have "sufficient" awareness of their specific end-purpose objectives and related relevant one or more Domains and/or specific Domain portions and/or related categories to formulate CPEs and respond to resource opportunities in a generally informed manner. But with purpose Level 2, user information command and/or understanding of any such Domain and/or Domain portion and/or category is limited and there is an absence of explicit clarity regarding optimal resources and/or purpose processes. Such users normally desire a set of unfolding processes reflecting their knowledge accumulation/progression that leads to user purpose results/experiences and potentially to "sufficient" purpose satisfaction, an Outcome set.
3. Purpose level 3 involves users exploring within one or more Domains and/or sub-Domains and/or other categories about which they have very limited and/or incomplete knowledge and where much of their learning has elements of a discovery process and where user purpose(s) is a developing, unfolding knowledge and/or experience set resulting from such learning progression.

These usage categories may overlap and further involve one or both of the following:

1. Purpose level 4 users objective includes experiencing as a purpose or purpose thread, where such experiencing, e.g. is listening to music, laughing at experiential input, enjoying a multi-user gaming session, participating in a chat session or teleconferencing get together, and where such experience, versus the acquisition of knowledge and/or the taking of some action, is a purpose objective set,
2. Purpose level 5 users objective includes sharing and/or other cooperative interaction, where the objective is a cooperative interchange between users, and where such cooperative interchange is a purpose objective set, such as collectively working on a document, exchanging communication, and/or undergoing a shared learning session.

PERCos can play a key role in enhancing purpose level 1 activities, for example, providing a resource set that enhances user understanding/sophistication related to a purpose set, and therefore revealing to a user the value in reframing purpose level 1 expressions to realize the enhanced value of a more knowledgeable/sophisticated perspective. But PERCos is particularly focused on purpose level 2 and/or 3, as well as any associated level 4 and/or 5 activities. In such cases, purpose is primarily about the identification, evaluation, prioritization, acquisition and/or provisioning of one or more resource sets best in alignment with users initiating, interim, and/or Outcome purposes. Generally speaking, PERCos isn't in most embodiments primarily about providing an "answer" to a retrieval request, such as search and retrieval products do. Rather, for example, PERCos is about resource related processes that provide a user set with best "fitting" resources and/or resource capabilities/portions for realizing a desired Outcome. For example, the use of PERCos identified resources provides an environment, information, and/or the like that "answers," and/or provides process support leading to answers, to user questions versus. In such an instance, PERCos is not providing a specific answer, but rather the tools that a user employs to realize objectives, such as answers.

In some embodiments, PERCos is an architecture for identifying, managing, and/or enhancing the benefits resulting from, purpose fulfilling resources. For example, PERCos may identify a resource set that may best serve user purpose, and further PERCos and/or a PERCos plug-in and/or API may provision capabilities within such a resource set that may provide a responsive environment tailored to developing and/or achieving a class of purpose of user desired Outcomes, and where, for example, the use of such resource application and/or other resource set of capabilities may provide an "answer" desired by a user set, in contrast to PERCos itself providing such an answer.

PERCos provides means to organize Big Resource, including Big Data, and provides further means to identify, evaluate, prioritize, provision, and/or use user desirable purpose fulfilling resource sets and/or capabilities Defining this new partnership between humans and their computing arrangements, the marriage of the differing context, circumstances and capabilities of differing people and computing resources, requires a new architecture for human-computer interaction that supports eliciting, interpreting, specifying, and/or otherwise identifying and/or initiating human purpose-satisfying Outcomes. Even for the less demanding simpler end of the usage spectrum where the user is better informed regarding the domain of their purposeful activities, this new broad architecture approach can provide significant benefits to many users.

Broadly speaking, with some embodiments, there are at least four major uses of PERCos systems:

1. Purpose-responsive Big Resource navigation, exploration, evaluation, retrieval, and/or provisioning.
2. Purpose-responsive organization and management of resources, including for example, information, applications, participants, local and cloud services, CPEs, frameworks, and foundations,
3. Provision of purposeful input into processes, applications, and/or automation sets (both new and legacy), such as word processors, presentation software, spreadsheets, conferencing (including teleconferencing) applications and services, recommender services, search engines, manufacturing and/or value chain automation systems, communication networks, messaging systems, and other productivity and workplace applications such as analysis, modeling, and decision making programs, and the like, the foregoing through, for example, data communication, application layers, or other modifications, including plug-ins, and
4. Invoking and/or developing specific purposeful activity set environments and/or other Constructs, including, for example, tool sets that may, take the form of purpose class applications that may be comprised, at least in part, of a variety of complementary resources that provide a user with a synergistic, purpose or purpose class specific, user intent fulfillment computing environment.

With some embodiments, each of these categories and/or any category combination and/or overlap and/or any purpose class and/or domain and/or class subset arrangement, including any associated member, may be supported by one or more special purpose "interface modes" that optimize and simplify user interactions for one or more purpose classes and/or CPE types. Such interface modes may suggest and/or implement maximization of resonance to improve effectiveness for purpose, and where such interface modes may optimize resonance through algorithmic strategies employed by Coherence processes, local to the user, in the network, and/or at cloud service locations, the foregoing in preparation for operating Purpose Statements, in similarity matching, in further filtering or evaluation and/or prioritization and/or other PERCos resource organization and/or user interface activities. The foregoing can be employed, for example, as users' purpose activities and PERCos processes unfold and evolve during and/or across sessions. Such interface modes may further employ intelligent user assistance by incorporating expert system tools, such as faceting engines, semantic information databases, and/or expert database capabilities, as well as, for example, other user selection and information visualization features.

Some embodiments may explicitly provide one or more purpose navigation interfaces and/or functionally similar means to minimize the effort for a user to visualize, understand, and/or reveal purpose relevant and/or otherwise interesting and/or useful aspects of, and/or otherwise control representations of, at least one or more portions of one or more major purpose-related Dimensions (or any portions thereof) and/or purpose related metadata. This includes user response in evaluation of and/or selection of resources and/or relevant identification and/or evaluation variables, including resource relationships and/or combinations, where the foregoing may be used to support the managing of resources for purpose satisfaction including, for example, user knowledge development. For example and without limitation, a purpose navigation may provide means to examine, control, and/or modify the "expression" and/or organization of a current interface mode, Master Dimensions, Facet, other Dimension information, purpose expressions, resource conditions/parameters, including, for example, conditions related to resource provisioning and/or use, user characteristics and preferences and/or other important contextual elements and/or sets not included or specified in a Dimension, and/or any portions and/or combinations of any of the foregoing.

PERCos, in some embodiments, treats all processable, published elements as resources in an unbiased, specification managed manner. This includes purpose fulfillment contributing elements that are represented by specifications with which PERCos may directly or indirectly interface and provide control contributing input. PERCos embodiments can provide specialized purpose fulfillment resource organization schemas employing, for example, purpose and resource class organizations with resources as class members, as well as in the form of related purpose Ontology groupings, such as at least in part relational ontologies having resources associated with ontological positions, and purpose indexes that include, at least in part, purpose Dimension variables for efficient and easy parsing/filtering of vast resources stores into purpose responsive resource candidate sets.

In many embodiments, a key to PERCos performance is its unique organization/management of resource stores and its further, associated tools for interrogating such store arrangements, for example, PERCos tools that enable interrogation of Big Resource for similarity matching to user Contextual Purpose Expressions. In certain embodiments, resource publishers and/or creators and/or other Stakeholders declare descriptive CPEs and may further associate one or more other purpose related specifications, wherein such Stakeholder declared specifications may be descriptive of resource usage purpose information, including, for example, in the form of Core Purposes and purpose germane contextual information. Such Stakeholders may further declare any such resources as members of one or more purpose related classes, where such purpose classes and/or purpose class structures may have been declared by Domain experts for structuring purpose class resource neighborhoods to support relational approximation association with user purpose expressions associated with such classes. Authorities, including experts and/or utilities and/or standards bodies, associations, and/or the like, may declare such purpose class arrangements for their respective one or more associated Domains to enable resource management and administration of resources. Such declarations may include associated CPEs and/or other purpose expression specifications declaring purpose associations for such purpose classes and, as a result, for their declared resources that function as their class members. Such purpose class arrangements, when for example declared/specified by one or more Domain experts, for example functioning as an effective domain class committee, may identify purpose classes that, in their judgment, correspond to conceptual neighborhoods so as to allow purpose supporting resources to be organized according to their pertinence to fulfilling user purpose concepts. This may prove useful where a user CPE is sufficiently similar to a purpose class CPE, or some subset thereof. In some embodiments, resources may be declared as members of a plurality of such classes, which may be associated with any logical taxonomic and/or ontological arrangements.

Certain, or any, third party Stakeholders may, in some embodiments, also declare CPEs or other purpose metadata specifications as associated with, or function as members in, any one or more resource sets, purpose classes, and/or resource portions/capabilities to enhance resource and/or purpose class member user purpose matching, including filtering, identification, evaluation, prioritization, provisioning, and/or use. This declaration of, for example, resource CPES and purpose classes, by resource creators, providers, and/or other Stakeholders, provides, along with other PERCos capabilities, highly efficient scaffolding for bringing users, based on their purpose expressions and any associated input, into an appropriate resource "neighborhood," and provide a basis for users to proceed with fulfilling, in particular purpose Level 2, Level 3 objectives, and which may further involve Level 1, 4, and/or 5 objectives.

Many users prefer to deal with standardized and/or familiar interfaces and conceptual models, and don't want to learn a new interface or new model for each new purposeful interaction. Most users prefer simplicity over complexity and it's an important priority of PERCos to enable easy, efficient purpose expressions means. The vast range and variety of nuances of possible purposes and experiences can, in the absence of consistency, standardization, and expression bounding (filtering), exceed the complexity that most users are comfortable dealing with most of the time. One standardizing and conceptually simplifying PERCos technology set is organizing contextual variable expression, and associated values, in simplified Dimensions and, where applicable, sub-Dimensions. Dimensions represent conceptually logical groupings of differing contextual perspectives and each Master Dimension has a limited number of standardized, easily interoperable and interpretable Facets. Dimensions in certain embodiments comprise a small set of conceptual familiar to user groupings, enabling users to easily "relate" to user purpose enhancing key Dimension characteristics. In one embodiment, PERCos supports five primary Dimensions, including Core Purposes, for example, and user, resource, Repute (assertions, et al.) and symbols.

Dimensions beyond Core Purpose may be used to great effect, for example, in Contextual Purpose Expressions as further specification of user purpose(s) beyond that initially specified by one or more Core Purposes. Dimensions have a wide and flexible applicability, and can help reduce user expression and navigation complexities by providing logical grouping values for similarity/matching, prioritization, and navigation and normally providing approximate contextual summary attributes that contribute to PERCos relational computing and help users relate and translate user classes and concepts to computing declared classes. These features are widely applicable and can serve both to orient users within a PERCos Cosmos and to assist them in retrieval, learning and edification, and navigation and exploration.

A Dimension is a PERCos expression structure representing an organizational subset of purpose expression contextual specification and approximation. In some embodiments, Dimensions may have standardized, interoperable expression Facets (such as Master Dimensions) for efficiency, understandability, interpretability, and/or inter-operational consistency. Such Facet set and selectable options may be limited to a set that has been pre-defined for the embodiment by a Utility and/or other standards body set, and might in some embodiments be augmented, for example, by any that have been declared and published by experts or others independent of the standards body set, such as parties associated with an affinity group, such as a professional association.

In some embodiments, additional Dimensions, either Domain-specific or Cross-Domain, may be declared by Domain set specific acknowledged experts, standards setting one or more bodies, and/or by Participants for their own use. However, unstandardized personal Dimensions may not be interoperable and those declared by a group may only interoperate within that group.

A declared context is a set of resource and/or system selected Dimensions Facets, any associated Values, and any other, such as auxiliary Dimension information, specified as a component set for purpose expression, and constraining purpose Outcomes to reflect user objectives that in some embodiments complement Core Purpose Expressions and/or other broader CPEs, and may be employed as locally stored and/or as published building block components available for user and/or Stakeholder use.

In some embodiments, a relatively small number of Dimensions representing basic general forms of PERCos specification groupings will be distinguished as Master Dimensions, which are logical major groupings of characteristics that may significantly influence, for example, user resource identification, similarity assessment, prioritization and/or other organization, navigation, filtering, provisioning, and evaluation. These basic PERCos specification types can function as key simplification concepts for user purpose expression understanding and organization, facilitating user and Stakeholder input and comprising basic high level computer types of PERCos specification user and Stakeholder input. In some embodiments, PERCos enabled interfaces will provide easy access to, and control of, Master Dimensions as general specification and resource navigational tools. Master Dimensions, as a simplification organization of contextual attribute types, functions as a means for assisting user understanding and expression of contextual priorities and may help enable Coherence and/or other PERCos process sets to efficiently manage and functionalize the combination of various contextual dimensional input to be employed in similarity matching, purpose class assessment, resource provisioning, and the like. Given the standardization and interoperable features of such Dimension specifications, and in some circumstances, information derived at least in part from such specifications, Dimension information or such related information can be employed efficiently in approximation similarity matching to purpose class and/or other resource purpose specifications to simplify processes and constrain large resource sets. Some PERCos embodiments provide interfaces that provide easy access to, and control of, the balance among such Dimensions and their Facets and any values, as general navigational tools.

PERCos employs quality to purpose assertions of experts in the form of Repute elements employing standardized and structured assertion one or more facets, which may have associated values, and/or other standardized evaluation representations. Such evaluation representations represent the quality of a given resource, resource set, and/or resource class to satisfying a purpose, or contributing, along with other one or more resources to, a purpose, purpose class, resource, certain other PERCos Constructs, and/or one to or more associated resource quality of usefulness and/or reliability parameters. The foregoing may be standardized for interoperability, ease of use, and/or to represent an approximate class for a resource characteristic grouping employed as a filtering and/or evaluation vector.

Additionally, PERCos purpose fulfillment can employ other PERCos Constructs such as, for example, purpose class applications, purpose Frameworks, purpose user Foundations, resonances, purpose plug-ins, and the like, all the foregoing providing building blocks for creating purpose fulfillment environments and supporting complementary, efficient evaluation, management, and/or provisioning of resources in satisfaction of specific user purpose expressions specification one or more sets. Such PERCos Constructs, where applicable, are used in conjunction with direct user interface input, purpose/resource matching and similarity, and Coherence construction and management of operating Purpose Statement specifications, for resolving optimized resource identification, prioritization, provisioning, testing, and session monitoring and management.

A PERCos unified architecture of purpose specification and purpose responsive resource Constructs helps ensure, in a broad variety of cases, that human purposeful computing activities are optimally realized, both in quality and efficiency of outcome and subject to relevant contextual considerations. Such a unified cosmos of purpose specifications, declared by users and published by Stakeholders associated with resources, coupled with associated Reputes, Creds, FF, and EF filtering input, Constructs, and Coherence monitoring, analysis, and resolution and other PERCos local, cloud and network services, optimizes the identification, evaluation, and provisioning of resource sets to enhance user purpose fulfillment when user purpose focus extends beyond areas of user expertise and ability to reliably identify optimal resource sets.

The PERCos combination of purpose related specifications and Constructs, purpose and other class information stores, Coherence Services and other PERCos services, both local, network, and distributed, allows the full breadth of possible contributing resources to be integrated as a single environment supporting a purpose, experience, resource, Context operating system and/or services environment. This described matrix of complementary technology domains rationalizes the nearly boundless resources of the web into a practical, accessible, and responsive operating context and supports best general overall performance. In sum, the PERCos technology domains, through their complementary performance, enable identification and alignment of potentially best for purpose resources from diverse, vast distributed resources arrangements. This cooperative coordination of differing specifications, technology operations, and process steps supports alignment of resources opportunities that are optimally focused on supporting purpose fulfillment processes with the best possible resources sets consistent with user context and purpose(s).

PERCos implementations may employ PERCos Coherence mechanisms to resolve incomplete and aggregated purpose related specifications and associated stored information into practical purpose optimized operating Purpose Statements. Coherence Services with some embodiments can manage the provisioning of operating specification process instructions through the interpretation, integration, completion, and/or conflict resolution of purpose processing input. Coherence processes may take place at any one or combination of local, network, and/or cloud service locations, that may respectively contribute to resource evaluation, proffering, and/or provisioning, including pre resource combinatorial and/or contextual testing, and session processes including PERCos session process monitoring, testing, and/or collecting/storing session states, information, and/or process flows, the foregoing being at least in part performed based on session related rules and/or control algorithms (such as included in CPEs, purpose Statements, profile information, resonances, Foundations, Frameworks, class applications, purpose class and other purpose Plug-ins, and the like.).

PERCos in some embodiments, including, for example, in some PERCos PSNS embodiments, may support, for example, Participant, including Stakeholder simplification types, for testable and/or reliably certified Participant characteristics specification in user CPEs, where such types may be used in standardized and interoperable manner for contributing to the filtering of candidate resources. Such processes may, for example, provide a limiting, specific characteristic set for matching with Repute Creds, EF effective facts, and/or FF faith facts for finding corresponding appropriate asserters (and/or Cred role performers) having the appropriate characteristics so as to help ensure optimum expert input in managing large resource sets into prioritized, constrained sets. Such characterization simplifications, as applied for similarity matching to Repute publisher, creator, and/or provider characteristics, can help constrain, for example, the set of all Creds expressing Quality to Purpose value sets regarding a resource set (or a portion set thereof) to one or more expert types who have appropriate relevant, for example, reputations and/or credentials, as demonstrated by Creds and EFs on them. This enables a user to employ for assertions and/or factual claims regarding a resource set, a filtering process on the characteristics of, for example, Cred asserters, that is parties with points-of-view, and only, for example, those asserters satisfying such user required characteristics who have made assertions regarding a best resource for a purpose or on a specific resource's quality might then be used as input towards identifying, evaluating, prioritizing, selecting, and/or provision a resource set.

Cred, EF, and FF characteristics may be in some embodiments associated with one or more of Reputes Creds, EFs, or FF publisher, provider, editor, and/or creator, and or the like. These characteristics are descriptive attributes, and may in some embodiments comprise, for example, an adaptable constrained available subset of such characteristics, where such available choices for user specification are limited to subset characteristic types that are logically related, for example of some particular value, to a given user Contextual Purpose Expression and/or associated purpose class. In order to identify Creds and EFs created, published, and/or provided by parties having sufficient desired qualities (and/or in some cases not having one or more certain specified qualities), user sets may select from a list of such categories proffered, for example, in response to user specified Core Purpose or the like, and where after a user set selects any one or more categories, such user set may then review, for example with a faceting interface, a list of options associated with each respective category, for example, where such options that are available were selected by, or otherwise identified through processing that produces a constrained list. Such a constrained list may have been provided as a result of some expert set and/or administering authority determining an optimum or logical set providing desirable user selectable characteristics. Such expert, consulting, authority or the like set might publish their lists, at least a portion thereof being associated with a specific current purpose expression, or may be a member of or otherwise associated with in a purpose class, resource class, Domain category class and/or any other relevant taxonomically and/or ontologically related grouping. For example, a choice set in response to a user Core Purpose 'Learn' 'earthquake risk' an expert set might provide as a recommended faceting option for selecting experts with graduate degrees, experts who've published peer-review articles in the area of the Core Purpose, and experts with professorship positions in earth sciences or geology or the like from us national universities, or from "top" 10 universities, and/or from top 100 global universities and research institutes in the earth sciences domain, and/or from government scientists, and the like It may be significant in some embodiments in support of crowd and/or specified group discussions and user set learning, discovery, and experience processes, that not only resource items have unique identification, as resources have as a consequence of their publishing and registration processes and/or as are elsewise interpretable in a reliable manner by PERCos related processes and/or parties, and that subjects of such resources that are other resource instances have by extension (and therefore may have directly associated with them associated unique identity sets), but that non resource abstract concepts also have explicit identifications, where they allow declared classes, members, and/or other subject instances to be individually organized and identified in ontologies and taxonomies. Such at least in part abstract subject matters may, in some embodiments, be at least in part published as resource instances and/or instance sets by general and/or Domain Experts and/or authorities so as to provide one or more taxonomy and/or ontology arrangements, such as groupings, for subject and/or subject approximation class/neighborhood consistency, the foregoing being employed and providing for, at least in part, subject associated identity services. Such pre-setting of subject, for example, popular, timely, and/or important such subject approximations, may facilitate, in some embodiments, user ease of use and might employ, for example, faceting interfaces or the like in a manner as discussed elsewhere herein for selection of approximation/neighborhood included items such as class member instances.

Further or instead, such PERCos expert, utility and/or other standards setting set arrangement(s), may, in some PERCos embodiments, support Domain specific and/or universal, that is PERCos cosmos wide, naming and identification structures that support both resources types, that is explicitly published items, and abstractions, such as concepts, labels, and/or the like. At least in part abstractions/generalizations naming and identification structures, such as one or more taxonomies and/or ontologies, can provide an at least in part, prepared scaffolding for the issuance of specific subject IDs, such as upon request of a user or Stakeholder, or as may be automatically requested by a PERCos service as a result of some evaluation and/or aggregating process. An integrated PERCos universal and/or Domain set taxonomy and ontology arrangement can provide the means for the automated issuance of unique IDs, for example, (a) in response to parsing of such subject abstract concept specifications, by identifying Core Purposes and/or Domain categories and/or associated declared classes and/or the like and placing a user or Stakeholder and/or other party submitted subject concept description into one or more appropriate taxonomical nodes and/or ontological "positions" along with issuing a specific or approximation/generalization corresponding group, such as a resource class, identity, and/or (b) employ at least in part a standards body (association, corporations, other organization, and/or other like group) agent arrangement for human agent inspection and at least in part determination, with the aid of such ontological and/or taxonomical tools, of appropriate classification positioning and associated unique or group identity set, for example, and/or the like. For example, classification may, in some embodiments, in addition or alternatively assign a concept representative identity to a submitted concept, whereby an identity represents a plurality of differing but closely related concepts in a concept approximation structure established, for example in some embodiments, to support consistent and/or aggregated and/or co-provisioning of such approximations while, for example, allowing certain flexibility in specifications for practical user approximation and resource management purposes.

In some PERCos embodiments, subject concept specification may employ (for example in resource information arrangements and in CPE specification arrangements) certain PERCos Master Dimension interface technology types, such as standardized logical grouping specification Facets, which may employ verb, category, adjective, adverb, preposition and/or the like where specifications options may constrain to logically appropriate and/or likely choice sets as a user or Stakeholder specification process unfolds, for example, when progressively selecting a category, a subcategory, an adjective, a verb, and/or the like in any logical order.

Concepts representing abstract, generalizing notions that approximately frame a Domain area can also be published individually or in some logical grouping as resources, wherein the subject of the resource is an abstract, generalized subject, e.g. Wild Salmon, Ceramic-on-Ceramic hip prostheses, Global Warming, Wahhabi Islam, Greek Orthodox Church, and/or the like. Such resources could then include or otherwise have associated purpose expressions that may correspond to prescriptive CPEs of users. This would enable users to identify, in a purpose oriented, contextual manner, standardized subject matters and if stored with the subject matters, their identities, including such abstract concepts. For example in some embodiments, if a user wanted to locate resources for asserting on, or reviewing Creds on, global warming, they could create a CPE 'Assertion' 'Global Warming' and through processes discussed herein, identify purpose class and/or domain category set (e.g. a domain category called "Global Warming" whose member resources (and/or resource portions) could be prioritized by similarity matching and which, at least materially in part had members that may correspond to user purpose expressions and which are identified through inspection of such resources information sets. This could be, for example, be followed by a second step PERCos process of examining such members, for example, review Creds by Ph.D. scientists in Environmental Sciences (and/or the like) regarding Global Warming which express in the aggregate, for example, a Reliability Facet Values of above 7 on a scale of 1 to 10 (or, for example, a 3 on a scale of −10 to +20). In some instances the Cred resource might include other information associated with included subject matter instance or instances or groups and/or Facet assertion values, where such other information complements the information set in the subject of such member resource set. Such complementing information may include for example, in some embodiments, numbers of reported use of a resource instance, or the resource's subject matter or group, Creds on a subject matter or group (such as which subject matter instance might be recommended using various Cred (and/or EF and/or FF)

techniques discussed herein as the most useful to user purpose, that is most popular and/or most used by participants with certain characteristics, and/or the like. Further information might be provided or referenced by such resource where such information is a complementary information set, such as, for example, an information set from another party that complements and/or supports at least a portion of the assertion set of a Cred or in some manner supports and/or complements and/or provides counterpoint information (e.g. as provided by aggregate Cred sets) contrary to resource subject matter.

Cred subject matters may be uniquely identified through user and/or Stakeholder explicit referencing of one or more, for example, recognized, at least in part, topic matter directories, databases, reference materials, and/or the like subject matter provided by one or more authorities, such as web services. Such, authorities, such as Wikipedia, have unique identities, e.g. web page addresses to specific topics, which can be automatically interpreted or extracted through the use of a PERCos compatible interface. But while there are some ontology services that can provide an identity at least in some domains, today there is no service that assists, that is assigns and administers a member cosmos of unique identities to user subject instances, so as to support such resources, and their subject identities, in a global, systematic, intraoperative resource cosmos. Such service could, for example, also provide various characteristic descriptors associated with a taxonomic and/or ontological group to which such subject is assigned, such as leading purpose expression classes, CPEs and/or other purpose expressions, Creds and/or information derived from them and/or the like, and/or other items with relationships to such group and/or group member sets.

Some PERCos embodiments may provide identifier standards of expression to enable such interoperability interfacing. In some embodiments, such advantageous capabilities support Cred assertions regarding topics that are, at least to some degree abstract, (e.g. Wild Salmon, Fast Cars, Stone Wool Insulation, Portable Music Player) versus a subject that represents an explicit real-word resource having an operatively unique identity, and for example, associated unique name (e.g. Hilary Clinton, Republican Party, Ford, Safeway, Sony Corporation, Oxford Shorter Dictionary, Merriam-Webster's Unabridged Dictionary for iOS 3.29). Such standardization can be provided by one or more PERCos environment resource Domain or general coverage subject descriptor utility, standards body, and/or other provider set, such as a for profit corporation cloud service. The foregoing can enable consistent description of non-resource subject matters by assigning explicit identities to, for example, topical abstractions in a form interpretable, and in some embodiments, provided by, a root standardization authority/standards body for a PERCos embodiment, by Domain specific such bodies, and/or for other environments. This standardization and web based services (and/or local or network based information stores) can support subject matter disambiguation by offering specific subject matter instance suggestions, and their associated unambiguous identity (e.g. an explicit alpha and/or numeric code) in response to an apparently ambiguous subject matter specification, for example by employing semantic analysis and/or look-ups to suggested synonyms, alternatives, and/or the like, and/or by support user interface expert interfaces, such as faceting interfaces, providing users with logical choices to select from for disambiguation, which may then be followed by assignment to an existing identity or the issuance of a new, operatively unique identity.

Abstract Creds, in some embodiments, can employ an abstract Cred Master Dimension, for specifying simplification and approximation and Cred information management purposes. For example, an abstract Cred can be associated with a purpose expression where a Quality to Purpose may be expressed regarding the value of an abstraction in serving user purpose fulfillment. For example, an Abstract Cred may have a subject "Wild Salmon," or "Wild Alaskan Sockeye Salmon." A Cred publisher can specify for a Cred an abstract purpose "Good Health" or "Good for Living Healthy" or the like. The Cred publisher can in some embodiments, for example, associate such a purpose expression with one of the described salmon subjects and provide a value 8 out of 10 on a Quality to Purpose (e.g. Good for Living Healthy) on scale of 1 to 10. In certain embodiments, abstract (and/or other) Creds may employ a Core Focus set as an alternative to, or in combination with, a Core Purpose set, so, for example, a Core Focus might be expressed as "Good Health" where in any embodiments this is considered sufficient and where a purpose verb or the functional equivalent, for example, may be logically assumed, where, for example, the Core Focus may be comprised of an adjective and noun pairing. User interface modes described herein for faceting for Core Purpose and Facet specification and where logical, constrained set options are provided through user interface selection may be used in a corresponding manner with Core Focus arrangements, such as offering logical adjective choice list for initially selected category as may have been determined by experts with a standards organization, such as associating "good" or "bad" or "delicate" adjectives with "health", but not offering "red" or "loud" or "tasty" as adjectives with "health."

With PERCos technology, user and Stakeholder computer interaction can involve, for example, in some embodiments, users and Stakeholders at least in part providing standardized purpose characterizing input in combination with one or more of: associated sets of other purpose relevant Specifications; purpose related specification Coherence resolution, including, for example, some set of specification inspection, identification, evaluation, conflict resolution, completion, multi-resource amalgamation assessment (for example including user purpose related provisioning assessment), and/or the like; provisioning of resources for PERCos session set at least in part associated with such processes and specifications; associated initiating and unfolding of user experiences and/or other Outcomes, including, for example, support for at least in part recursive or otherwise unfolding user evolving processes leading to purpose Outcomes and/or interim results.

The foregoing can contribute, for example, to a user/computing arrangement purpose fulfillment operations set with purpose results generated using purposefully selected and/or assembled resources. This may involve in some embodiments, PERCos users and/or computing arrangement sets using resources that have not been published as a PERCos resource, but which may be provisioned by PERCos to satisfy specific purpose related specification(s), such as using a well-known word processor in a certain manner, for example performing word processing functions as a component within a PERCos Framework. In some embodiments, such a resource instance, for example, Microsoft Word, might not have been published as PERCos resource, but, for example, one or more Stakeholders, an authority, expert, user, Repute publisher, and/or the like set may have declared that Microsoft Word is an acceptable resource, desirable to use in fulfilling word processing Roles. For example, Word may be provisioned within a Framework identified by a user and/or PERCos computing arrangement set as a Framework of choice and having a component function (which may include interface interactions and locations) Role for word processing that may contribute to certain purpose Fulfillment related activities. In such instance, for example, Repute, and/or other services may declare a traditionally published resource as a PERCos informal resource (or such may be inferred as a result of such a Repute assertion set, For example, a recognized expert or expert group may identify and publish an "informal" resource having a CPE set associated with a subject set comprising at least in part Microsoft Word, and which is associated with sufficiently reliable resource subject identity information, and where such expert Stakeholder can be specified as the "informal" publisher/creator of such a new PERCos informal resource, which resource may, for example, have associated with it (e.g. provided by such recognized expert set and/or organization) such other information as creator, original publisher, and/or provider resource (e.g. word processor related) information, including names, rights and/or one or more sets specifying other information regarding such resource, as may be necessary for use of such word processor.

PERCos resources may be provided in some embodiments, for example, in several different forms, for example: Formal resources, Implied resources, Ephemeral resources, and Compound resources (multiple of these forms may apply to a given resource instance and/or resource class, either as to one or more parts and/or as to the whole):

A Formal resource is, at minimum, comprised of (a) a persistent, operatively unique, identity (e.g. should not be ephemeral or intentionally temporary and unreliable as an identity, along with any enforcement of this criteria depending upon the embodiment), (b) a subject matter that is the processing and/or processable material (including, for example, a human Participant descriptive information, and which may, for example, include how to initiate contact, or use, of the Participant, for example, as a resource), (c) a formal publisher set (named, or otherwise identified as may satisfy a rule set, including having a persistent, operatively unique, identity, for example, as above) for such resource, and (d) at least one associated and context providing purpose expression such as a CPE, except in embodiments employing at least in part Core Focus instead of a purpose expression set. Such resources are interpretable by at least one or more PERCos embodiments, and their subject matter may or may not be useable, depending on the presence or absence of necessary other resources and/or conditions. Such formal resources may contain or otherwise reference other descriptive metadata, such as author, provider, language, interface, user and/or other participant set usage history (for example generally and/or as associated to one or more purpose expression, participant, association with other resources/resources, sets), and/or any Repute information as described as a capability of a PERCos embodiment, or, for example of publisher, creator, provider and/or the like sets, for example, including associated use of EF and/or FF sets.

An Informal resource is, at minimum, comprised of (a) a persistent, operatively unique, identity (e.g. should not be ephemeral or intentionally temporary and unreliable as an identity), (b) a subject matter that is the processing and/or proces sable substance of the resource (including, for example, a Word Processor such as Microsoft Word, that can be employed in creating and editing documents), (c) an implied resource publisher—this may be an interpreted or otherwise inferred originating publisher of such resource, or this may be, for example, a different Stakeholder type such as a Participant provided and caused to be stored preference information indicating choice of Microsoft Word as word processor, or when a Repute Cred asserter—or if sufficient information exists—a Repute EF declarer stipulates that Microsoft Word is a word processor) or when a user stipulates, or a user PERCos Foundation has been employing, a local version of Microsoft Word as a word processor, and (d) at least one purpose expression associated with such subject matter as specified by such implied resource publisher either directly by such publisher, and/or indirectly by a resource Creator and/or other Stakeholder set. Such informal resources may contain or otherwise reference other descriptive metadata, such as author, provider, language, interface, user and/or other participant set usage history (for example generally and/or as associated to one or more purpose expression, participant, association with other resources/resources, sets), and/or any Repute information as described as a capability of a PERCos embodiment, or, for example of publisher, creator, provider and/or the like sets, for example, including associated use of EF and/or FF sets.

An Ephemeral resource can be, at minimum, comprised of a non-persistent subject matter that is a separately identifiable processing and/or processable substance arrangement that is dynamically produced, provisioned, and then no longer maintained, or not maintained beyond a short, session operatively appropriate time frame.

Compound resources have all the characteristics of Formal and/or Informal resources, but are further comprised of a plurality of Formal and/or Informal resources. Compound resources may also, respectively, be Formal (if all compounding resources are Formal, or Informal, if not all compounding resources are Formal.

PERCos embodiments are particularly adapted to support user identification, evaluation, and provisioning of web and intranet located resources where PERCos treats such resources as population instances of a resource Cosmos organized to support optimized "one-to-boundless" purpose fulfillment computing. PERCos is, in part, a technology set uniquely supporting user use of contextually best suitable resources located anywhere, made available by anyone, and individually or in combination, and as may be best responsive to user purpose objectives. As such, PERCos embodiments distinctively support both conventional and uniquely enhanced user relationships with computing resources in support of user computing Objectives. With PERCos, user relationships with computing resources can be at least in part be realized through user computing objective specification using a PERCos schema that is specifically designed to describe significant user intent generalizations through direct specification and/or inference of one or more verb generalizations combined with directly specified and/or inferred category denotations. These specification compositions, PERCos Core Purposes (when inferences are settled), may be used with a further contextual framing set, and may describe user objectives that reflect, for example, one or more of the following broad user intent categories:

1 Retrieve—Traditionally, users search and retrieve through the use of succinct expressions employing terms that may be matched to indexes and/or other information organizations, that is searching for terms and associated web pages having a "sufficient" correspondence to such expression term sets. Such retrieval techniques are being used, for example, by Google/Bing for their search and retrieval services, which, at times may be enhanced by directory arrangements, knowledge graph visualization, semantic analysis, and/or other tools. PERCos can extend such traditional technologies by, for example, providing Core Purpose and/or other PERCos Dimension standardized and auxiliary and/or other embodiment contextual simplification specification capabilities that may substantially enhance and/or extend explicit search term operations through the use of PERCos purpose approximation computing (PAC). PAC can improve conventional retrieval learning and discovery with, for example, enhanced information sets regarding resources and/or portions thereof by providing perspective/knowledge enhancing knowledge/information/experience purpose related neighborhoods and/or neighborhood information and/or by providing Coherence specification resolution services and/or Repute identification/evaluation/prioritization services, which foregoing may be enhanced or otherwise facilitated by relevant associated purpose class application tools and interfaces and/or the like.

2 Learn/Seek—users are partially able to express purposes, that is users can frame general objectives, but do not have sufficient domain expertise and/or purpose specific knowledge to sufficiently specify retrieval requests for user known and desired specific one or more resource items and/or related processes, but rather users wish to initiate one or more learning process sets with the objective of improving user understanding regarding one or more specific information and/or experience issue sets.

3 Explore/Discover—users wish to obtain knowledge resulting from one or more process sets that include investigating information issue sets so as to identify one or more such information sets as user developing or developed focus, including identifying and employing investigation enhancing resource sets for acquiring information related to such initial and/or evolving issue sets.

4 Experience for users—users seek experiences for themselves, for example entertainment, games, movies, music, and/or the like.

5 Social and/or collective experience—users seek social experience that substantially involves interactions with other users, including shared, collaborative, and/or similar participation.

6 Tangible/Instantiate—users seek outcomes involving commercial and/or physical world processes such as transaction results, value chain process management, manufacturing automation and output, digital package transmitting, and/or the like.

PERCos embodiments can uniquely support the CPE framing of user resource utilization objectives and related purpose Outcomes through its standardized implementations of user purpose expression capabilities. For example, in some embodiments, PERCos can support one or more standardized parameterizations of Core Purpose intent and other contextually appropriate criteria enabling consistent and efficient interoperable user and Stakeholder purpose characterizations. Such CPE framing optimizes user purpose fulfillment processes by, for example, enabling both generalized contextual user and Stakeholder purpose approximations and associated matching, and supporting Outcome sets as derived at least in part from purposeful utilization of optimum resource sets specifically responsive to such framing. Such resource utilization is a consequence of user and PERCos system and/or application expression and selection processes identifying, evaluating, prioritizing, selecting, combining, and/or provisioning one or more resource sets. In some embodiments, such sets are evaluated at least substantially in part regarding their responsiveness to user specification of standardized Core Purpose and/or broader Contextual Purpose Expressions associated with user and/or user computing arrangement related contextual variables, including in some embodiments, for example, standardized contextual Master Dimension Facets and any associated values, auxiliary Dimension information, user profiles, preferences, historical crowd behavior, and/or the like.

PERCos can identify resource store information elements that correspond to CPE and/or related purpose formulation elements for matching and similarity determination processes that may, for example, evaluate and/or identify and/or select and/or prioritize and/or provision candidate resources at least in part as a result of calculating the correspondence and/or other relevance of candidate resource sets available through such information store(s) to user related purpose expressions such as CPEs and purpose statements, as may be supplemented by other purpose related information. A PERCos based system may also employ inference determinations in support of the specification of, and/or related to the processing of, CPEs and/or purpose statements and/or other purpose expression formulations such as expression verb constraining or identifying categories and/or the like, for use in resource selection, and/or resource utilization evaluation, and/or other PERCos operations, the foregoing in support of user purpose calculations to identify, evaluate, select, prioritize, combine, provision, and/or use resources for initiating, interim, and/or Outcome purpose fulfillment.

A Resource Cosmos for Purpose Fulfillment, Including Associated Learning, Discovery, Cooperation, Experience Support, and Outcome Automation A PERCos arrangement of resources and users may unfold over time and in part, in conjunction with PERCos standardization arrangements such as purpose expressions and their associated Master Dimensions and purpose classes, self-organize as a systematized purpose constituted resource cosmos. In some embodiments, this cosmos evolves primarily through the efforts of Stakeholders as they declare descriptive Contextual Purpose Expressions for respective resources, including for example, for Reputes assessing one or more other of such resource sets or elements thereof, and for which they may then, in some embodiments, declare one or more resource sets as members respectively of one or more purpose classes and/or other purpose neighborhoods. This purpose cosmos may employ such purpose expression, purpose membership, and/or Repute declarations associated with resources with, for example, user and/or crowd metadata such as, for example, related usage derived information associated with specific one or more purpose expressions, purpose classes, user classes, and/or the like. The result is an evolving cosmos of purpose related knowledge, experience, assessment, and actualization resources, known in PERCos as Big Resource. With PERCos, one or more "general" common purpose effectuating cosmos may be built substantially upon tools and standards for interoperable Contextual purpose expression, purpose related Repute resource assessment, purpose Coherence resolving and optimizing including, for example, resource evaluation, combination, and/or prioritization, and supporting human/computer edge purpose fulfillment interface technologies and processes (such as Foundations and Frameworks). Some embodiments of the foregoing may, for example, support purpose class resource organization, Repute resource appraisal, and resource provisioning Constructs such as purpose class applications and other Frameworks, user computing arrangement Foundations, and purpose facilitation resonances. Implementations of PERCos interfaces and applications may support adaptations for both discrete purpose fulfillment Outcomes and dynamic experience continuums, the latter involving unfolding user/computer/resource arrangements and associated cross Edge interactions such as iterative user purpose expressions through specification and/or resource selection and/or resource portion usage, where the foregoing may be specifically supported by related interface purpose support processes such as purpose expression element faceting interfaces. Such user cross Edge PERCos activities may include multi-user common purpose sessions and over time multi-user purpose collaboration, for example involving multi-user collaborative document creation, cooperative web surfing, and shared entertainment experience (music, movies, game playing, and/or the like).

A principal aspect of PERCos purpose architecture is a "partnership" or otherwise cooperative and/or collaborative process occurring between users and machines, users and other users, and users and Stakeholders, whereby one or more humans at least in part guide machine operations towards satisfying their individual or shared purposes, initially and/or in an evolving process set involving the maturation of, for example, human perspective, knowledge, orientation, experience continuum, and/or priorities and/or the like. Through this interactive partnership, at least some embodiments of PERCos user/computer arrangement(s) can employ local and/or remote PERCos services and other resources that serve as portals to human knowledge, expertise, experience opportunities, and process opportunity, management, and Outcome control. Such embodiments can provide, for example, process management and other capability support of PERCos user/computer arrangement purpose Outcomes through, in part, the association of purpose expressions with respective resources, and, for example, through event management, including, for example, consequences resulting at least in part from purpose related programmatic instructions. As such, a primary role for general PERCos embodiments is the support of, including, for example, seeking to actualize, purposeful results, whether personal, interpersonal, commercial, and/or the like, and such support may, in some embodiments, include the gamut of user computing purpose objectives, from experiencing entertainment to social networking to user and/or group productivity to information learning and/or discovery to realizing commercial transaction fulfillment and/or or business process automation and/or the like and including any logical combination of the foregoing.

At any given time, users have certain objectives/desires whether explicitly understood or involving an evolving user perspective. To one extent or another, users undergo experience reflecting informational, experiential, tangible, and/or emotional/spiritual factors. To satisfy human purposes, PERCos transforms human perception of purpose into purpose expressions that orient PERCos computing resources to "best" attempt at supporting user purpose fulfillment computing processes. PERCos capabilities can extends into a computer context user purpose fulfillment perceptions by identifying, evaluating, selecting, combining, prioritizing, and/or provisioning resources and/or resource portions as purpose fulfillment tools and/or environments in response to user CPEs such as prescriptive Contextual Purpose Expression instructions, which may unfold as a result of a sequence of purpose related user/computing arrangement interactions, and which may reflect enhanced user knowledge, understanding, and/or experience satisfaction and/or other experience development. As a result, PERCos can supplant today's task oriented and silo computing arrangements with purpose specific support arrangements that may be influenced by expertise and framed for learning/discovering and/or other experience and/or results producing Outcomes. PERCos may specifically focus on satisfying "active" user purposes (or scheduled, time based, and/or event wise triggered and/or specified purpose specifications) by identifying one or more resource sets, including resource frameworks such as purpose class applications, that users can employ to provide satisfying and practically optimized purpose fulfillment results, and/or otherwise contribute to apparent to user set progress towards such fulfillment through unfolding PERCos and/or associated purpose application assisted processes.

The challenges of users relating to the inchoate masses of web (or other) resources stores, and the demands underlying properly exploiting available resources for learning, discovery, and/or setting the stage for "most" satisfying experience unfolding, provide basic catalyzing underpinnings for the PERCos purpose centric architecture. However well or poorly understood by its human actors, human activity at any given point in time has at its core a Purpose set. Modern humans in the developed world—in very sharp contrast to their ancestors—may invest their time in many varied ways. Most people in the developed world are no longer shackled to the pursuit of food, whether in endless dawn to dusk agricultural, shepherding, and/or hunting tasks, as well providing shelter and protecting one's group from predators and other humans. With the advent of advancing technology and increasing knowledge, and in part due to division of labor and emergence of elaborate and often quite abstract activity types, human time, both commercial and leisure may now, in sharp contrast to even recent human history, be devoted to any of a vast set of activity types and content. These activity types can be placed into three categories, and these three categories often overlap, depending on the activity purpose and context. These three activity categories are:

1. Experiencing things,
2. Making things happen in the real world (e.g. growing food, building and maintaining shelter, earning money, producing goods, and/or the like, that is generally striving for productivity), and
3. Learning things which may inform each of the above, which is itself a form of experiencing.

What we may need or want to learn at any given time is a result of both the purpose we may be consciously or unconsciously be pursuing, given the context in which such pursuit is unfolding. This context includes how much we know and may further include how much we know about how much we know. In order to improve on the results of our activities, to better our condition and improve the quality of our experiences, it would serve users well to be in the best reasonable position to know what others know as and when it would be useful, and further to be able to apply such knowledge in an optimally productive manner.

The advent of the connected digital world has brought about a quantum leap in diversity of human activity resources and associated pursuit types, focus, and context. While generally, the human community has some sense of the enormous possibilities of being connected to such a seemingly boundless miscellany, no current technology set intelligently associates resource possibilities to one's explicit, current purpose. While knowledge graphs, other clustering, and/or the like can provide some guidance when generally exploring a domain, they are roughly drawn generalizing mediums largely structured according to the characteristics of things rather than the purpose of potential resource users. Generally such technologies fail to provide means that organize resources according to user purpose and, as a consequence, these technologies are unable to responsively identify and/or provision resources in a manner responsive to such user purposes. Further, since such current technologies are normally blind to user purpose, at least in any formal sense, they can't support capabilities that provide the assessment of resources regarding their quality in contributing to optimally satisfying a user specific purpose set, such as those provided by PERCos Repute technologies.

In some embodiments of PERCos, learning, discovery, and/or experience ("LDE") may be deeply embedded into cloud services, such as, for example, PERCos LDE supporting capabilities related to PERCos Social, Knowledge, Commercial Networking Services ("PSKCNS(s)"). These PERCos capabilities provide innovative features that may transform the character of traditional social, knowledge, and commercial networking. With PERCos, by supporting users viewing other Participants as resources and potential common purpose users and by employing participant related specifications in user CPE specifications, and further by universally viewing other direct, specifiable elements that may contribute to a PERCos session as candidate resources, users can learn about and/or discover, that is identify, evaluate, and employ a "best" set of other participants in PSKCNS context, and more broadly, an optimized set of resources for any given purpose.

Many modern computer users now share an awareness of the presence of a seemingly boundless array of resources that might seem useful generally, particularly for certain well known tasks—Yelp may be useful in gathering information concerning crowd member reactions to, and aggregate ratings of, services such as neighborhood restaurants; similarly Amazon reviews can be useful in assessing reactions to products; and Netflix can inform regarding the crowd reactions to video entertainment; while IMDb is useful in obtaining expert movie reviewers views and scores for specific films and television shows; Healthgrades and Vitals in assessing hospitals and doctors; and eHow, Answers.com, WebMD, and Wikipedia, can responsively supply limited information responses on certain things. One major concern regarding these systems is that these services are not generally adaptive; they normally provide static characterizations of things (including services) with generally a highly specific focus on a preset category item. While these systems can provide useful information regarding certain limited categories of things, unlike PERCos mechanisms, they don't provide any significant ability to identify, or adjust, combine, and/or evaluate a resource to be responsive to a user's current specific purpose.

There are one or more services, for example 43 things (www.43things.com), which provide simple mechanisms for sharing what its users characterize as goals, but such a system does not provide means to significantly systematize and/or evaluate purpose, but rather allows anyone to chat about anyone else's natural language expressed goal and has means to generally associate different goal expressions to support some grouping. This often leads to a cacophony of comments, which may motivate some people regarding a goal because it seems shared with others, but is not about any formalized system for resource management, identification, evaluation, prioritization, selection, composition, provisioning, and/or usage support in a manner responsive to user purpose, that is to enable common purpose computing, including sharing and/or the like. For the above services, when a computing arrangement user ventures beyond the assertions of the crowd, and/or in more limited circumstances the assertions of experts for branded products, services, and entertainment, that is when one wishes to launch a learning process leading towards an Outcome about an issue whose specific nature is defined by a user's purpose and not a category—the foregoing given one's individual constraints, interests, priorities, and/or state of knowledge and/or the like—current technologies are not oriented towards providing the facilitating layer(s) that bring one to "best" candidate one or more resource sets such as facilitating an Outcome related to, for example, a technology, a perspective on certain scientific research, a manufacturing technique, how to fix something specific, a social or commercial networking objective, and/or the like.

Current social networking, for example through services such as Facebook, Google+, Twitter, MySpace, Instagram, and/or the like, primarily involve interacting with parties a user knows, may know, or has "friends" or other acquaintances in common. Those social networking services may also involve identifying or establishing threads or groups that share some stipulated interest, and one such service, 43 Things, is substantially focused on shared interest around a user natural language declared topic. But these networks are not general resource identification environments and are not structured as interface environments to, for example, Big Data and Big Resource. Generally, they do not provide a standardized contextual structure for purpose expression but rather support streams of comments from members associated with topics, where such comments generally speaking provide a smattering of disparate remarks and not a contextual purpose responsive resource array. These services are not designed around the principal of optimized user purpose satisfaction through identifying and provisioning desirable resources to support unfolding purpose satisfaction processes.

In certain PERCos embodiments, purpose class applications are particularly useful in supporting learning, discovery, and experience enhancement. In an emerging purpose based computing cosmos, people anywhere, of any inclination and ability and knowledge level, can, with some PERCos embodiments, publish resources such as purpose class applications, which are meant to support the learning, discovery, experience, and/or Outcome objectives associated with such applications associated CPEs. Such applications can function as specific purpose class (such as CPE) specific fulfillment environments and may be specified to support such purpose expression sets as narrowly and/or as broadly as may be specified by their design decisions and their concepts associated with such relevant CPEs. Such applications may incorporate any number and variety of purpose fulfillment subclasses, which may be formally declared as subclasses of such purpose class applications.

Over time and given sufficient participation, as well as sufficient evolution of Repute resources as filtering and prioritizing input, in some PERCos embodiments, users should be able to connect to a PERCos cosmos arrangement and be in the neighborhood of the best available resources and/or resource portions. Best purpose class applications may, for example, provide Domain specific guidance through interface and application capabilities that in a Domain specific manner support further learning, discovery, and/or experiencing options and processes that have been tailored by the talent and skill of such application publishers and/or their associated experts and/or based on user input such that learning, discovery, and/or unfolding experiences have been formulated by those having specific domain expertise, experience, and/or sufficient associated talent. Certain of such purpose class applications may to be considered to be, according to Repute resources responsive to user specification, the "best of breed" given user concerns and other contextual conditions (for example, Quality to Purpose, Quality to Value, user budget, user sophistication, available time, availability/affordability of Role contributing application sub-resources, and/or the like).

In some embodiments, PERCos purpose class applications, as learning, discovery, and/or experience unfolding environments, can be oriented towards any set of purpose fulfillment processes and activities, from narrow to broad. These may involve relatively uniform types of activity sets to compound activity sets and such architectures may involve senior and more subordinate purpose class foci, as well as provide purpose, for example, class oriented, user navigation tools. For example, a purpose class application might be created for the moderately knowledgeable in the Domain of Physics, this application taking the form of a knowledge pursuit/imparting environment comprised of both more general tools and more specific tools, such as an expert system interface arrangement guiding users through their respective interest focuses, such as learning about specific issues involving the intersect of molecular and nuclear physics information.

For example, in some embodiments, a user might specify a CPE as:

"Learn+Physics+Nuclear&Molecular+ModerateExpertise+<$200.00+Purpose ClassApp" ("+" adding an element and "&" being a horizontal connecting operator and "<" standing for less than), which might be purpose identified and in part prioritized by an aggregate of Repute representation of Repute Creds published by Ph.D.s in Physics. Alternatively and/or in addition (by, for example, weighting variation, that is, for example, providing more weighting for) tenured Physics professors, may be specified by user set for their CPE Creds use, wherein such professors who published relevant Creds that, for example, have sufficiently similarity matched Creds CPE(s) as purpose expressions for Repute Creds and EFs, and/or as purpose expressions for the subject matter of such Repute items (and/or sufficiently similar Creds subject(s) if so specified), and who are employed at "major" globally ranked universities (e.g. ranked by US News and World Report) might be employed for aggregate Creds calculation, all the foregoing contributing to the PERCos determination (e.g. by Coherence Services), for example in some embodiments, of a prioritized list of similarity matching of purpose class members based at least in part on such professors aggregated asserted views of sufficiently matching resources and/or portions thereof. Such purpose class member neighborhoods may be similarity matched and/or otherwise filtered, for example, for published purpose class applications that are members of the desired neighborhood set that are sufficiently corresponding to user CPE and/or components thereof. Such results may be, for example, provided in the form of a priority ranking reflecting the asserted assessment of the specified Repute input arrangement, such as such professors as discussed, who are in, or otherwise associated with, a CPE corresponding purpose class and/or Domain/category set, and who are employed at such globally significant universities. Some of such matching neighborhood, for example purpose class, identified members might be providers of "master" purpose class applications that also provide portion sets focusing on both astro and bio physics, and wherein such subclass arrangement set is of sufficient apparent quality that Repute asserters consistently declare such a given such resource set, and/or resource portion set thereof, as "best of breed" or otherwise highly ranked for the user set for matching the user set CPE (make sure definition of user purpose and purpose, includes purpose set).

PERCos learning, discovery, and experience enhancement can take various forms, without limitation a few examples of which are:

1. A user set may specify a Prescriptive purpose expression and then initiate a PERCos similarity matching process set evaluating resource store information to, for example, identify a purpose class application. Such purpose class application may then provide an interim result set (which interim result set may or may not be made available to such user) and where such interim result set has been derived from CPE similarity matching against resource information stores to identify a purpose class set. PERCos processes then may, for example, identify resource member and/or member portions of such purpose class set and may filter and prioritize such members and/or portions in accordance to further similarity matching analysis against respective CPE information of such member set and, if specified, other metadata, for example characterizing and/or contextually important to such members such as member Repute filtering/prioritization in accordance with user CPE specification, and employing, for example, any auxiliary Dimension information, as specified. A user may then, for example and in some embodiments, select one resource of such members such as a specific purpose class application, and then a further PERCos assisted process set may occur involving user interaction with such selected application purpose class application capabilities. Such further assisted step set may include, for example, further purpose expression specifications by such user using such purpose class applications general and/or Domain and/or more specific tools, which such process set may lead to further information sets that are acquired, for example, one or more applications and/or information sets, for use by user, such information sets being offered as candidate and/or provisioned resources (within and/or associated with the processes of such purpose class application) where such further information sets may identify and/or provision external to such application resource one or more resource sets and/or portions thereof.
2. Alternatively, a user may in some embodiments select a symbol representing a purpose class application wherein such application symbol is, for example, among a set of symbols, such as a plurality of symbols representing different purpose class applications which such user and/or user group (such as such user's corporate and/or divisional and/or department administrator and/or IT manager specified) to populate such user's general, or a purpose class specific computing desktop or window or taskbar or the like. After such selection and associated provisioning, in some embodiments, for example, a PERCos enabled purpose class application may apply PERCos capabilities and processes to support user further purpose specifications and associated resource and/or resource portion selection and associated knowledge learning, discovery, provisioning, user related experiencing, and/or the like.

3. Alternatively, in some embodiments, a user may specify a CPE, wherein a PERCos process set conducts similarity matching against one or more resource characteristic indexes (representing descriptive CPE, any germane metadata, and/the like) to match, for example, against Master Dimension information, with or without auxiliary Dimension information and/or the like, so as to directly, without the aid of a purpose class arrangement, identify, and for example, prioritize (or otherwise list and/or display) resource set and/or resource portion arrangement set information, for example, for user inspection, evaluation, selection, and/or initiating further PERCos processes to reorder and/or recompile and/or modify criteria for candidate one or more resource and/or resource portion sets.

As discussed, PERCos capabilities in some embodiments can be applied or otherwise integrated into, if desired, computing arrangements in such a manner that PERCos capabilities can be applied to any specifiable purpose type. For example, in such embodiments, a moderately experienced off road bicyclist can employ PERCos to learn about moderate difficulty, not remote, not steep, moderately trafficked, biking trails near the user's new employee location; or a user interested could learn more about differing arguments regarding global warming and associated political action groups and their activities; or a user could learn about avoidance of repetitive wrist injuries when working as a software engineer or about the comparative efficiency of large versus multiple computer displays when working with multiple, large scale documents; or about the relationship between, availability, durability, cost, and shedding of wool v-neck sweater brands; or about contributing to the overall value of the comparative cost of travel, time spent in stores, cost of item, cost related to service and repair and support, for large appliance purchases; or about the technical progress and challenges in using stem cells in treating kidney disease; or about the challenges concerning, and available information regarding, near earth asteroids/comets and human community protective measures; or identifying the six most likely people with whom you could synergistically enjoy listing to classical blues music, or watch and discuss a series of documentaries across multiple session employing at least in part use of shared common purpose resources, and wherein PERCos capabilities are supportive of documentary resources identification, prioritization, and selection processes and further chat, video conferencing, and/or other forms of shared, common interest virtual presence and common participation.

In some embodiments, purpose class applications can employ, for example, array and provision resources in support of class related user purposes and can maintain Frameworks populated by purpose class specific resources such as references, videos, games, music, experts, and/or the like, available as managed resource opportunities supported by PERCos operating system, environment, and/or application resource management capabilities. As such, a purpose or more specifically a PSKCNS class on Sport Car Maintenances and Mechanics might have various auto manual and repair handbooks, videos, and other reference resources as well as lists (with or without their Creds as associated with list instances) of Participant Experts associated with the overall CPE set for the class and/or with contributing CPEs associated with class resource instances and/or portions thereof. Also, as such, an environment can be maintained, for example by an affinity group such as a club administrator arrangement and/or commercial and/or nonprofit service wherein a CPE arrangement specific resource rich purpose fulfillment environment is available to participants, and, for example in some embodiments, wherein membership/user of a PSKCNS purpose class application may have requirements such as speaking a certain language, a given degree level generally or in a certain academic area, being an alumnus of a given school or school type such as a nationally ranked university, having a specific or generally having union membership, being a licensed contractor, belonging to a national professional association, being of a certain age, being credential by a reputable credentialing authority, and/or any other logical, and in some embodiments or cases in particular, testable criteria where objective and/or verifiable/testable lists are maintained by, for example, reputable authority entities. This PSKCNS purpose class application "qualifying" criteria may be proffered by applying participants through PERCos PSKCNS compliant application forms, and wherein such specific proffered information instances, such as membership in an engineering organization, could be automatically checked against such information stored as information within a PERCos cosmos resource, such as by, for example, PERCos Test and Results Service, and wherein a PERCos form has sufficient field resource related information and associated capabilities such that a response in standardized format to a form question or list, such as membership in the ACLU or NRA or AFLCIO, could be automatically verified as, or flagged as not, true as an EF. Such organizations, including corporations, educational institutions, colleges, clubs, societies, publications, and the like, could provide such characterizing "list" information in a PERCos embodiment compliant or integrated form supporting such automatic identifying and/or validating and/or testing functions. An expanding PERCos resource cosmos would assist in such systemization and normalization of web based networking relationships by enabling use of EFs and Creds to provide users and Stakeholders with sufficient information, similar but in some ways enhanced over, traditional face to face human interactions.

PERCos, for example in some embodiments, can support a coherently ordered social networking arrangement structured at least in part for use with resources and Big Resource environments and enabling groups of people to mutually participate in common purpose computing sessions and/or like interactions with an optimized access to, evaluation of, and/or provisioning of, specific session purpose supporting resource sets, including, for example, participant sets, prioritized, alphabetical, or otherwise organized and particularly suited to a user set CPE specification. Further, PERCos learning and discovery capabilities should substantially enhance social, knowledge, and commercial networking for many people by providing capabilities for users to learn and discover information regarding resources thereby enlarging user understanding of possible resources, including resource portions, and/or enhancing processes related to such resources.

PERCos can, in some embodiments, help users identify and structure synergistic multi-user arrangements specifically responsive to consonant respective purpose expressions, capabilities, other characteristics, and/or the like so as to form a commonly satisfying purpose fulfillment networking groups suitable for constructive, purpose fulfillment interactivity. PERCos can extend synergism evaluation and cohering processing to optimize matching among both users with other resources supportive of their mutual and/or consonant objectives, including the evaluation and cohering processing of non-Participant resource types in order to provide an optimum environment for shared purpose fulfilling processes. For example, a user set could specify a Contextual Purpose Expression regarding their purpose set (using, for example, Master Dimension specification, with or without auxiliary Dimensions) and PERCos could perform a similarity assessment of declared purpose classes, including, for example, PSKCNS oriented purpose classes or the like, which are, for example, defined/situated in ontology and/or taxonomic structures by Domain experts and/or other Stakeholders for PERCos purposes on behalf of a standards organization such as a PERCos purpose or specifically PSKCNS utility. In some embodiments, such class declarations could, for example, declare that one or more user prescriptive CPEs representative of PSKCNS purposes are associated with, for example, one or more purpose classes, and such expression sets can be used to, at least in part, identify one or more PSKCNS classes.

In some embodiments, such similarity matching of user CPEs to purpose class CPEs, other ontology neighborhoods, and/or resource instance CPEs, PERCos may use resonance resource instance sets, and such sets in some embodiments may, for example, employ purpose optimizing synergizing instructions. PERCos synergizing instructions can represent specifications of resource instance combinations and/or portions thereof where a plurality of resources perform, or may perform, a contributory purposeful one or more functions, for example contribute one or more characteristics strengths as may be specified by their associated CPEs and/or metadata, where such resources may be associated in CPE purpose fulfillment as mutually complementary and/or otherwise advantageous, from a combinatorial standpoint, in realizing, or attempting to realize, a specified purpose Outcome or interim process and/or result.

In some embodiments, PERCOs synergizing to purpose, for example, employs building blocks in the form of resources and/or resource portions, including, for example Constructs, knowledge information, Participants, devices, services, and/or the like, the foregoing representing families of different resource types that may be combined in some manner to optimally assist users in achieving their Outcome objectives by forming particularly productive arrangements for fulfilling, or otherwise attempting to fulfill, one or more CPEs. For example, resource items having differing characteristics might, for example, be useful in the specification of the following CPE: “learn thin film solar cell materials science and fabrication.”

In some PERCos embodiments, a publishing or synergizing set specification arrangement may be presented in a format that represents, for example, separate simultaneously displayed, vertical resource type prioritized (in order) characteristic instance choice lists. Such lists may be prioritized by resource instances being processed through Coherence Services evaluation, such as similarity matching against user and/or related purpose expression sets and/or filtering and/or evaluation based upon Repute Cred assertions and/or EF effective facts and/or other information such as group administrator governance information. For example, in some embodiments, an example list display might comprise, a first column displaying general topic textual-audio-and/or visual reference materials as a category area, a second column representing consulting domain experts (e.g. names) with teaching/tutoring/skills, a third column representing expert domain researchers that may be available to consult, including doing collaborative work, in the area, a fourth column representing expert manufacturing implementers (practical manufacturing engineers) with applied experience in the domain, a fifth column representing market analysts who have knowledge and experience concerning market interests and considerations, and whereby a user set can evaluate and/or select and/or proceed with further evaluation, discussion, information supplementation, and/or item selection. Such listed information may be complemented by supplementary information where, for example, such specific instance information may be complemented by further, more detailed characteristic related information by a user moving a cursor over a candidate list instance and with instance specific details appearing in an adjacent, well organized “balloon” temporary sub-window, toggled to alternative supplementary window, and/or the like. In this example and embodiment set, selecting instances from such lists of resources, includes, for example, potential Participants having synergistically complementing characteristics who can form a synergistic user group for what a user set, as assisted by their PERCos arrangement, perceives as an optimum Participant candidate synergistic resource combination which may “best” serve as CPE fulfillment interim and/or Outcome complementary users/contributors. Such tools may also be used with non-participant synergistic resource selection, for example, in the specification of elements of a purpose class application environment where such resources might at least in part be used to populate, for example, a PERCos Framework associated with the user set CPE set (including, for example, a collective, resolved PSNS group Purpose Statement) such as, when building a purpose class application light note writing, presenting a synergy arranged faceting list to select a productivity application that that would fill a Framework Role of word processor.

PERCos Repute resources may be particularly useful, in some embodiments and circumstances, in optimally identifying, filtering, and prioritizing candidate and/or to be provisioned resources for PSKCNS. Such Repute resources may, for example, employ EFs that were published as self-describing systematized profile/CV by participants, where, for example, a participant might declare that she is an MIT tenured Associate Professor in Biophysics, aged 53, with x specific and/or number of peer-reviewed authored publications, that she lives in the Boston Metro area, that she is available for online and/or in-person research and development consulting and/or knowledging session participation as PSKCNS group Participant, and that she expects and/or requires a fee of y dollars per hour of session participation and/or consulting. Creds on such professor by other tenured professors in Biophysics may, for example, be used in combination with the professor declared EF and CV information, such that the combination of such EF and other declared CV information might be used to determine that such professor could be helpful in a given PSKCNS session as a consultant, and such information, along with such Cred assertion information on such professor for such consulting purpose could elevate or downgrade its list ranking position relative to other candidate consulting professors. Further, in some embodiments, such self-describing systematized profile/CV may include personal information that may in part, or in whole, be included in Creds, including information regarding avocation, such as surfing, mountain climbing, astronomy, car racing and/or the like; hobbies, such as football, baseball, soccer, rugby, and/or the like; marital status, married, single, divorced; family status: number of children and age and sexual orientation, such as straight, gay, lesbian and/or the like; health status including material medical conditions such as diabetes, arthritis, and/or the like. In some embodiments, such personal information may be in part or all encrypted and rules controlled to contribute to personal policy enforcement regarding privacy of information and with whom any set of such information may be shared. Further, for example, in some embodiments such Creds may store portions of such characteristics information as Cred EF information, where such information is externally testable and/or verified, for example by a certificate provided by a trusted authority and/or a test procedure set operated with an authority that maintains a PERCos compliant information verification arrangement. For example, a corporate publisher of a Cred may describe their identity in a form which satisfies EF reliability/testability requirements and may be described in the form of an EF where such publisher lists, for example, in a web accessible corporate database in a manner satisfying EF testing, including for example certificates, rules that affirms that the corporation is the publisher of such Cred, encryption techniques, administrative controls, and/or the like. For another example, a Cred published by a given Participant may contain, or reference, an EF regarding such participant being an employee of Boeing, where such individual is listed as an employee on a publicly accessible information listing on a Boeing website in a form compatible with a PERCos EF testing procedures.

In some embodiments, registered or otherwise declared resource members can be stored as accessible information elements within an overall metadata arrangement, where such information elements are, for example, classified as participant members of one or more category types derived at least in part from their employment with or by users, Stakeholders, other resources, and/or the like under one or more specified conditions. For example, a resource may be declared, or by historical usage association be identified as, a resource member of a purpose class, such as, for example, a synthetic biology "DNA reference Library of Functional Units" being used for, and a declared and/or being a historically derived resource member of, the purpose class of "create DNA preparations for tissue replacement" as identified and defined by an authorized Domain experts team for biosciences, while the same purpose class may also have the "Synthetic Biology Institute" at UC Berkeley as a declared and/or historical information derived participant grouping member of such same purpose class, and further, for example, EF verified or verifiable researchers at such Institute may also be stored as participant members of such class, along with, for example, with their self-assertions and Creds by other parties on their Quality to Purpose for such purpose class. Such metadata information elements can, for example, be associated with resource instances, groups, and/or PSKCNS classes for PSKCNS purposes.

Participant sets may, in some embodiments for example, declare themselves as resource member participant type instances belonging to one or more purpose classes and/or associated with any one or more purpose class applications as historical users and/or Stakeholders, along, for example in some embodiments, with storing such member instance declarations of their self-assertions and/or third party EF and/or Cred declarations or assertions regarding their expertise level (e.g. beginner, moderate, expert), knowledge level (e.g. modest, medium, highly), trustability level (e.g. low, medium, high), experience level with, for example, a purpose class application, and/or the like. In some embodiments, for such declarations to be effective may require satisfaction of certain Expert set, utility set and/or other governing body set, rules, which may include tests for verification purposes, where such as one or more characteristics of participant set correspond to EF and/or Cred criteria, such as a requirement for being a member of a given affinity group, and for example, may include the declaring participant set being comprised of one or more tenured history professors at the University of Maryland, and might further require in certain instances, requiring for example that certificates associated with one or more EF elements and/or tests that validates the EF requirements, such as looking up a list published by University of Maryland of its tenured history professors and confirming such EF as sufficiently reliable as defined by PERCos arrangement related specifications. The latter may, in some embodiments, might require that the publisher of such be the University of Maryland and that University of Maryland publish such list in a form compatible with one or more PERCos embodiments such that such list can be securely evaluated, queried, and or otherwise tested and/or inspected. Further one or more such embodiments may, for example, require that such test be a sufficiently secure system arrangement in accordance with specifications for communication, testing, and/or security system features attributes (for example, for specified security level and/or other attributes) and whereby, for example, communication protocols, authentication procedures, encryption processes and specifications, information store and/or user access controls, and/or the like meet sufficient standards for a given security level to maintain overall sufficient system authenticity/reliability. Such trusted EF related information may, for example in some embodiments, be used in PERCos identification, evaluation, filtering, prioritization, and/or the like processes.

PERCos classes may, in some embodiments, have resource participant member arrangements wherein participant individuals and/or groups and/or other resource instances and/or groups, associated with one or more resources, such as purpose class applications, could both be available in the form of prioritized lists of such member types, based for example on Repute input, as may be managed, for example, at least in part by a cloud utility and/or an administering expert set. For example, in some embodiments such resource sets may be prioritized and/or otherwise evaluated in relationship, for example, to a participant history related to any given CPE use and/or through the use of Stakeholders Repute Cred third party assertions as related to such Participant Quality to Purpose, Quality to Value, Quality to Contribution to Purpose, and/or the like use of any given CPE and/or associated purpose class applications and/or as associated with purpose classes and/or interactions with other participants and/or Stakeholders, for example, as may be associated with foregoing. For example, such evaluation may reflect such participant performance as a user regarding such user's Quality of Contribution to purpose in one or more common purpose computing sessions, and/or the like, and where Quality of Contribution to Purpose Cred information may be aggregated across various similar purposes to represent a Quality to Purpose rating for a higher order (such as a superclass) purpose class or purpose neighborhood. In some embodiments, such evaluation and information use may be applied, as applicable, to any resource instance and/or group in relationship to any other resource instance and/or group, that is for example, a given information resource may be evaluated as to Quality of Contribution to purpose if the resource serves as a contributing component in a CPE fulfillment process.

PERCos purpose class members could be, for example in some embodiments, at least in part be comprised of a list, subclass, or other grouping sets of resource members in accordance with their types, such as participants, information reference resources, purpose class applications, Informal resources, cloud services, devices, computing platforms, Frameworks, Foundations, CPEs, and/or the like, along with their associated Creds, EFs, and/or any other associated metadata. Such class type members might further and/or alternatively comprise, in some embodiments, for example, Constructs, participants, tangible resources, and/or published CPE instances and/or sets, and/or the like. In some embodiments these class members can be organized and manipulated by type and by type combinations, for example, generally by resource, by participant, and/or by purpose class other associations of an instance or type. The foregoing may be manipulatable both separately and in combination to, for example, enable users and/or PERCos arrangements to, at least in part, assess resources for their historical associations and/or their Repute Quality to Purpose or Quality to Contribution to Purpose performance and/or relationship (expressed, for example as Creds), and/or the like. This assessment may be performed, at least in part by, for example, evaluating Creds and/or EFs, and/or by evaluating Outcomes resulting at least in part from the use of certain resource sets as contributing components to other resources sets such as by being contributing participants, CPEs, Constructs, and/or the like, and, for example as operating in purpose class applications or other Framework roles. Such evaluation information facilitates the evaluation by user, Stakeholders, and/or PERCos arrangements regarding the conditions and characteristics of working with different resource sets.

With some PERCos embodiments, users can identify, evaluate, filter, prioritize, and/or select member resource combinations that may respectively define resource networking component "spaces", such as Hilbert spaces and/or the like. Much like PERCos Dimension CPE spaces, some PERCos embodiments enable users and PERCos computing arrangements to adjust such resource spaces to provide differing views into resource and resource portion sets so as to facilitate user and/or PERCos arrangement evaluation for purpose fulfillment options. By supporting user sets using, administrating, and/or manipulating PERCos information resources, including EFs and Quality to Purpose and/or, for example, other "Quality" Repute factors related to participants, published CPEs, and/or other resources and/or resource portions, for example in some embodiments, user sets may direct PERCos capabilities, through, for example, Master and/or auxiliary Dimension PERCos specifications, to produce viewable and manipulatable sets of candidate participants and/or other support resources for PERCos session purpose fulfillment. For example, this ability to view and manipulate purpose fulfillment resource spaces can inform users regarding the relationships between a resource set characteristics and various purpose expressions such as Core Purposes, CPEs, and purpose statements and their desirable (or undesirable) characteristics. This can facilitate user assessment from historical, Repute information, and/or the like perspectives, regarding working with specific resource set(s). In some embodiments, by viewing Quality to Purpose, Quality to Value, Quality to Contribution to Purpose, and/or other Cred Repute assessments and EF considerations in combination with underlying purpose expression(s), one can calculate corresponding spaces that may then be used for assessing resource instance and/or resource combinations as to their differing relationships to such different purpose expressions and their possible relationship to such purpose expressions respective fulfillment, that is, such spaces may be assessed as to how they may correspond to desired Outcomes.

In some embodiments, PERCos session historical information may be stored where such information, for example, may be associated with resources, such as purpose class applications and/or participants and/or CPEs and/or other resource instances and/or purpose classes and/or other ontological groupings and/or the like, associating for example, chat, texting, blog, comment, edit, video conferencing, and/or the like activity types. Such information may be stored, for example, for use in any combination at some later time in association with, for example, such later current user purpose and/or Core Focus expression related PERCos activities. Such information type(s) may be associated with any specific and/or combination of such PERCos class member types, for example, where such member sets are members of PERCos class type that may be similarity matched with current user CPE set. Such historical information may, for example, be published in the form of a resource set as individual instances of associations with a specified purpose class, where such resource set may be "reused" as a social, commercial, and/or knowledge information asset set, for example, during, aiding, and/or otherwise being made available during, a PERCos session and/or other employed for commercial and/or social reasons, such as for information aggregation and advertising/promotional information marketing and use. For example, a multi-media video of a physics teaching session may be published as a resource associated with a CPE set and where, for example, such resource includes a table of contents and a contents index, and further where users in a PERCos enabled session may employ during such session a portion of such resource as may have been published associated with a CPE set for such portion as a result of previous usage (or Stakeholder declaration) of such portion for such purpose, and where any given portion associated CPE may be a subclass of a CPE, or a CPE set, for such multi-media video. Such resource information, that is the association of a portion set of a resource with a CPE set may be published in the form of their respective resource types, subtypes, aggregations, and/or any other logical information forms and/or combinations, where such information is associated with a specific given resource, resource combination, and/or portion, so as to be available for evaluation and/or processing purposes at some one or more later times.

In some embodiments, Repute is a core PERCos capability set providing powerful purpose computing tools for filtering through huge candidate resource sets based on reputation and relevancy related attributes and assertions. Repute can be used to evaluate, and/or, for example, to filter, sort, prioritize, and/or otherwise aid in the arrangement of candidate resources identified among large resource arrays to produce usefulness optimized and/or otherwise prioritized candidate results. These results can be based, at least in part, upon Repute attributes as they may relate to the apparent contextually related "qualities" of such resources—that is resource sets may be measured, at least in part, by quality of performance/usefulness and/or other germane indicators interpreted through the use of related contextually significant attributes, providing assessments of resource reputation as related to user purpose sets.

Repute results are produced by augmenting prescriptive and descriptive CPEs or Core Focuses with attributes and any associated values that are descriptive of the "quality" variables to be used in the relative assessment of, and frequently, comparative relative usefulness, of purpose fulfillment resources, and where such quality variables are informing regarding the possible relative potential usefulness of the subject matter of resources and/or resource portions, calculated employing such reputational relevant fact and/or assertion stipulations. Such stipulations can be expressed, for example, through (a) the expression of CPEs, (b) stipulated by non-CPE Metadata, (c) otherwise expressed through one or more preferences and/or profile settings including any governance sets, and/or otherwise historically, rules based, published, and/or contextually derived information. Such Repute resource organizing calculations may, for example, contribute to the filtering and/or in some other manner order one or more useful or possibly useful resources using assertions and/or facts that have been expressed employing and/or translated into standardized characteristic elements along with any applicable corresponding values.

Repute has three main specification groupings, Effective Facts, EFs, Faith Facts, and Creds. EF specifications contain "ascertained" and/or otherwise contributed factual assertions regarding a subject, such as the date a person was born or an institution's assertion that an individual is an employee and, for example, holds a certain position and/or title. Faith Facts are based upon spiritual beliefs and not subject to the testing and/or trusted authority rigor of Effective Facts, but may involve testing and/or validation/certification by a spiritual authority associated with the FF associated spiritual belief group. By contrast Creds contain and represent assertions, rather than settled or settable facts, such assertions are made by one or more parties that have respectively, at least one persistent, operatively unique identity, and where such assertions do not rise to the level of a factual attribute set that was stipulated by a reliable, recognized unbiased fact related "authority" of sufficient reliability as to the fact, as least under certain conditions. All EFs, FFs, and Creds have an identified subject matter characterization set. In some embodiments EFs, FFs, and Creds may require that certain information related to any one or more such subject matter characteristics sets or portions thereof, such as a persistent one or more identities to be associated to any of subject matter publisher(s), creator(s), provider(s), as well as in some embodiments providing one or more of: location(s), time(s), date(s), authoring and/or publishing id(s) and/or any other identifiable and inter-operably interpretable associated other characteristics desired or required by an embodiment, and where any one or more of such subject matter characteristics may be required to be reliably known (e.g. certified) and/or were otherwise testable, that is as Repute information related characterizing the Subject's topic matter and/or any one or more other Repute related characteristic(s) related thereto. By contrast with EFs and FFs, in some embodiments, Cred subject matter may either not have a persistent one or more identities as generally meant herein regarding asserter identities, that is Cred subject matter may correspond to a user resource class, some affinity group, or some other logical grouping that, for example, may provide an group identity, or the subject matter may be explicitly identified through the use of a user resource and its associated UID, and/or otherwise may be a topic, such as a generalization, which, for example, is provided by a Cred publisher with a operatively, or sufficiently as may be prescribed under the circumstances, distinctive to unique ID, such as a web page address, or a taxonomic id created by such publisher/asserter. Persistent subject and/or publisher, creator, provider, and/or asserter identity(s) may contribute to a Creds trust and/or integrity level, and/or other characteristic representation(s), of Cred applicability, authority, and/or reliability.

Some PERCos embodiments will treat an expression of a Subject characteristic as a fact, not an assertion, when such expression was made by a party having specific and convincing authority to declare a fact, such as an EF or FF, regarding a Subject. Such interpretation of specific and convincing authority may be contextually dependent, for example, as related to topic and/or other assertion characteristic(s). By contrast, Creds represent assertions that may be generally recognized, or for example, disputed, and are expressed opinions regarding Subjects and such assertions are not demonstrable as facts by reasonable testing. EFs, FFs, and Creds may be deployed according to reliability levels. Reliability levels can inform user(s) and/or associated computing resources (such as an operating PERCos session) as to whether a given degree of specified reliability satisfies either preset and/or current session rules and/or other criteria as to specified reliability. For example, in some embodiments, a user may be presented with the option to select from levels 1-10 reflecting the underlying level of EF or FF fact testing, such as related security procedures and/or the representing assessed (for example by a PERCos utility or other administering body) authorities reliability in authenticating such facts.

EFs, FFs, and Creds can form, for example, filtering "vectors" that complement PERCos Core Purpose and other purpose expressions. They provide further, and in certain embodiments and/or circumstances primary, filtering and/or prioritizing input. In part as a result of the use of standardized purpose Repute expression specifications and related values reflecting factual and/or assertion characteristics of Repute subjects, Repute variables provide input for the calculation of results that can most closely correspond to, and/or otherwise implement and/or optimize, results related to the objectives of CPEs and any associated preferences, rules, historical information contributions, and/or the like. In use, EFs, FFs, and Creds may be used in combination, either with their own type (e.g. EFs with EFs) and/or in combination with the other type (e.g. EFs with Creds), and Creds, singularly, or in some combination, may be in some embodiments aggregated and/or otherwise algorithmically interpreted and associated as inter-operably interpretable values with any resource by, in part, the association of Repute information with the subject matter of such resource, and/or by association with any one or more resource characteristics, such as with one or more resource publishers, providers and/or creators and/or, for example, as associated with a performance characteristic of the subject matter, such as the reliability of a certain type of hardware memory for a certain type of fault tolerant application class. In such an instance, a purpose class CPE for employing fault tolerant hardware memory that contained fault tolerance as an expression subset might, in a given application, be employed in matching with resources and/or resource portions in a manner where the fault tolerance expression was matched against the stored information regarding asserted fault tolerance quality(ies) of a given resource set in a manner whereby resources were prioritized, at least in part, in accordance with the assertion by certain qualified experts. Such experts may be determined according, for example, to user(s) specification, and/or, for example, third party authority organizations such as certifying authorities and/or, for further example, by known generally assumed to be useful asserters, such as senior faculty members at institutions who are accepted as Domain experts, and/or as asserted by qualified asserter for the purpose such as an associated society or other Affinity Groups.

Some PERCos Cred embodiments may be organized as:

1. A Cred may have one primary operatively unique, identified subject matter regarding which an asserter is making an assertion, such as "Oxford Shorter English Dictionary" "Microsoft PowerPoint" "Wild Caught Salmon" or "President Bill Clinton". The first two can readily be identified by providing a unique naming identity for specific resource product, or for example, a PERCos disambiguation web service, for example, could provide assistance to a user set, such as providing a drop down suggestion list or other faceting list interface providing context specific appropriate specific options and/or clarifying category instances for users to select, for example, Microsoft PowerPoint 2010, with the service providing the explicit Microsoft (or other party) unique identity for such specific product by inserting it into an appropriate Cred item information space in, for example, a PERCos compliant form.

2. A Cred has one asserter, an aggregate Cred has a plurality of asserters, a compound Cred has a plurality of Creds (at least information wise, but may not be stored as discrete, individual items) and may or may not have a plurality of asserters. An asserter may be an individual person, a group of persons acting as a named group such as a club, or another form of organization such as a corporation, government, or the like.
3. A Cred or aggregate Cred or compound Cred may have a publisher set as well as an asserter, but in some embodiments if publisher set is the same as the asserter set, it may not need to be separately stored or indicated as such.

A Cred or aggregate or compound Cred may have a provider set as well as an asserter set and a publisher set, but in some embodiments if the provider set is the same as the publisher set or asserter set, it may not need to be separately stored or indicated as such 1. A Cred has as its subject a resource section including at least one identified resource, and further it has a resource set associated CPE and at minimum, at least one Quality to Purpose, Quality to Value, or like standardized assertion type, with the association of a user selectable value, for example a 17 on a scale of 1 to 20. For convenience, in some embodiments a Cred may have multiple resources as subject contents, but only one CPE by which each resource is assessed as to its Quality to (that) Purpose. Plural Creds may be published in a compound Cred, which may be organized by a purpose class arrangement and/or other ontology set.
2. A Cred may have one or more validation rule sets validating that such assertion was made by such asserter set, such validation rule set employed to perform a Cred information validation unless, under some circumstances and embodiments the Cred has a trust certificate issued by such asserter and/or asserter set for each assertion and/or for each aggregation of such assertions, and/or such Cred has a certificate issued by a trusted party, all the foregoing in accordance with Cred rules for the embodiment and/or circumstance of embodiment use. Such same validation sets may be, in some circumstances and/or embodiments, applied to Cred publishers, providers, and/or other associated parties. Such use may include, for example, the selection by user and/or Stakeholder sets of a trust level associated with such Cred type and/or circumstance of use in PERCos processes, such as a Cred type level 5, in a 1-5 schema where 5 is the highest level of trust, and where such schemas may require either or both of a secure, encrypted hash certificate set for such Cred stipulation information issued by such publisher set and/or asserter set and/or provider set supporting a secured fact test procedure employing, for example, encrypted communications between a user PERCos arrangement and a trusted server operated by such respective one or more members of publisher, asserter, and/or provider set, whereby such fact or fact set and/or related information may be securely confirmed by such one or more Cred value chain participants.
3. A counterpoint Cred may include and/or reference a Cred where such counterpoint Cred was specifically formulated to correspond to such referenced Cred, wherein both such counterpoint Cred and such referenced Cred have said same subject matter set, either directly or approximately and where such counterpoint Cred employs the CPE set, either directly or approximately, of such referenced Cred, and further provides differing one or more assertions comprising a differing assertion set, and further providing information directly indicating, including some form of referencing, that such counterpoint Cred provides an alternative assessment of such referenced Cred. For example, in some embodiments, a counterpoint Cred will employ the same assertion Facet set, such as Quality to Purpose, but with a different associated ranking value, such as 2 out of 10 versus, in such an embodiment, a more positive 8 out of 10. Plural counterpoint Creds satisfying the conditions of an aggregated may be provided in counterpoint aggregated Cred form. Counterpoint Creds may be combined with their associated Creds in compound Creds.
4. A Compound Cred is comprised of multiple asserters collectively providing their assertions regarding the same Cred subject matter, but employing, for at least in part for a subset of such assertions, differing Facet sets and/or the same Facet sets but differing assertion sets regarding such assessment sets.
5. An Aggregate Cred provides one or more aggregate values for shared Repute Facets values such as sharing assert ratings for Quality to Purpose Facet for 'Learning' 'General Reference Encyclopedia'" for Wikipedia, or for a hypothetical purpose class application for a recent quarterly publication "Online Update for Applied Synthetic Biology" article on Skin Tissue Replacement located through a PERCos learning Big Resource query.
6. A Cred may reference and/or include one or more other Creds that employ such Cred and/or such Cred's asserter, publisher set, and/or provider set is the subject matter of such other Creds. Further, a Cred may reference and/or include one or more EFs and/or FFs that are employed in such Cred regarding such Cred's asserter, publisher set, and/or provider set, where the foregoing are the fact subject matters, wherein a characteristic of such one or more characteristics (such as the identity and profession of the Cred asserter) is stipulated to be true or false.

Some PERCos EF embodiments may be organized as:

1. An EF may have one primary operatively unique identified subject matter that is stated as true or false based on whether it is stipulated to be a settled fact e.g. John Doe is a tenured professor at MIT.
2. An EF may have plural subsidiary operatively unique identified subject matters that are individually stated as true or false based on whether each, respectively, is stipulated as a settled fact, but each such subject matter shall be a subclass of the primary subject matter.
3. An EF may have one or plural, individually identified stipulators, but such stipulator set shall be the same for each and every subject matter stipulation. A stipulator may be an individual person, a group of persons acting as a named group such as a club, or another form of organization such as a corporation, government, or the like.

4. An EF has a publisher set, which in some embodiments may not need to be separately stored or indicated if the same as the stipulator set or not otherwise required.
5. An EF has a provider set, which in some embodiments may not need to be separately stored or indicated if the same as the stipulator or publisher set(s) or not otherwise required.
6. An EF may have one or more validation rule sets validating that such assertion was made by such stipulator set, such validation rule set employed to perform an EF information validation unless, under some circumstances and embodiments the EF has a trust certificate issued by such stipulator and/or stipulator set for each assertion and/or for each aggregation of such assertions, and/or such Cred has a certificate issued by a trusted party, all the foregoing in accordance with EF rules for the embodiment and/or circumstance of embodiment use. Such use may include, for example, the selection by user and/or Stakeholder sets of a trust level associated with such EF type and/or circumstance of use in PERCos processes, such as an EF type level 5, in a 1-5 schema where 5 is the highest level of trust, and where such schemas may require, for example, a secure, encrypted hash certificate set for such EF stipulation information issued by such validator and/or publisher set and/or a trusted agent and/or stipulator set and/or provider set supporting a secured fact test procedure employing, for example and as may be required in an embodiment, encrypted communications between a user PERCos arrangement and a trusted server operated by such respective one or more members of publisher, stipulator, provider, and/or associated agent set, whereby such fact or fact set and/or related information may be securely confirmed by such one or more EF value chain participants and/or an authorized, trusted agent.

Some PERCos FF embodiments may be organized as:

1. An FF may have one primary operatively unique identified subject matter that is stated as true or false based on whether it is declared to be a settled faith fact e.g. Jesus Christ is the son of God.
2. An FF may have plural subsidiary operatively unique identified subject matters that are individually stated as true or false based on whether each, respectively, is stipulated as a settled faith fact, but each such subject matter shall be a subclass of the primary subject matter.
3. An FF may have one or plural individually identified declarers, but such declarer set shall be the same for each and every subject matter declaration. An FF shall have a referenced spiritual group, e.g. the Catholic Church, that proclaims such faith fact to be true and such spiritual group shall be at least one of such one or plural declarers.
4. An FF may have one or plural, individually identified publishers and/or providers.
5. An FF may have a provider set, which in some embodiments may not need to be separately stored or indicated if the same as the stipulator or publisher set(s) or not otherwise required.
6. An FF may have a referenced set of operatively identified spiritual source set, such as the King James Bible.
7. An FF may require, and use, any combination of the validation techniques described for EFs.

EFs and Creds and associated PERCos processing arrangements, in some embodiments, employ security tamper resistance technology, such as encryption encoding, secure digital rights management for secure rules governance, hardware tamper resistant processing and memory space for decryption and/or rules processing, and/or the like, the foregoing to help ensure that their respective fact verification and assertion information reliably represents their original published states.

Cred and EF subject matter, in some embodiments, have unique identities. Such identities can be important in ensuring that assertions and fact declarations are associated with the proper locater subject identities in order to facilitate proper, explicit, unique identification of a subject matter instance so that Cred assertions and EF fact declarations can be appropriately organized, aggregated, analyzed, and are properly associated, as may be desired for example, with CPE, purpose, Domain category, and/or resource, instances and/or classes and/or the like. Such unique identities help ensure that parties may, as desired, comment reliably on the intended subject matter and that it appropriately corresponds to the subject matter specification of the corresponding Repute Cred or EF.

Such identities may be associated with specific PERCOs Repute Facet standardized and interoperable characteristic approximations, for example, in some embodiments, Facets such as Quality to Purpose, Cost Value as to Purpose, and Reliability to Purpose (including, for example correctness of subject's content, when applicable, or reliability of a device, when applicable, and/or the like), and/or Integrity as to Purpose.

In some embodiments, Repute variables such as Quality to Purpose values as associated with experts, and resources, may be specified as to be applied to an associated specified purpose class set for similarity matching, filtering, prioritization, and/or evaluation processes, when performed. Further Repute specifications may be applied during a user specified PERCos session, where such may be incorporated into Frameworks, Foundations, resonances, and/or other applicable resource purpose specifications, and/or may, for example, be referenced as and operate as underlying preference variables that may be automatically associated with purpose expressions and/or class sets for employment in sifting through and/or prioritizing resources and/or the like.

Repute may provide a resource management set of capabilities and specifications. Such PERCos technologies can provide specifications for resources that describe relevant attributes of resources in the form of standardized categories and any associated values, such information for "assessing" and "valuing" resources as resource candidates for fulfillment of purpose expressions where such details are, at least in part in some embodiments based upon:

(a) known and/or knowable facts, declared by one or more fact determining source and/or by fact verification testing (e.g. checking with a determining source or determining by reading, for example, and verifying author, employer, publisher, file size, page length, location, language employed, watermarks/fingerprints, and/or the like) and/or other assessing that such fact source has been certified as a fact, and/or the like, and where any such EF facts may have an estimated degree of accuracy, for example, expressed as a machine and/or user interpretable value—for example the author of a resource is stipulated as a senior tenured professor at MIT in a domain relevant to satisfaction of a purpose instruction set where such stipulation is through MIT publishing and/or certifying such stipulation and/or where such stipulation is "located" on an MIT administrative website and/or otherwise tested, and where such testing and/or certification may be for example, performed by an authority/fact integrity cloud service testing, which may test for example, the certificates, fingerprints/watermarks, length (pages, bytes) complexity, subject matter correspondence, security (e.g. absence of malware), author, publisher, and/or the like characteristics associated with candidate resources.

(b) interoperably assessable assertions by any one or more parties (e.g. as by parties who have a persistent, testable ID) regarding one or more resources and/or their providers, creators, publishers, and/or other related Stakeholders), for example asserted by senior tenured same Domain colleagues at Stanford, Princeton, Harvard, and Cal Tech that have, for example, rated the resource as highly useful for an expressed user purpose, one or more similar expressed purposes, and/or one or more associated/related purpose classes and/or have rated the author/professor as highly capable associated with the expressed purpose(s). Such assertions, for example, may alternatively or also include in some embodiments assertions by other parties, for example by a broader body of generally acknowledged (specified by type characteristics) Domain experts, including expressing individually and/or through simple and/or more complex algorithmic aggregations of values associated with a specified degree of value/expertise that are, for example, associated with expressed purpose(s) as associated with resource sets and/or creators and/or publishers and/or the like.

Repute resources further support, and in some embodiments may include applications, services, plug-in capabilities and the like that enable real-time human interaction between disparately located people, in particular providing evaluation and/or specialized monitoring capabilities regarding participant candidates and/or active participants with whom a user has little or no familiarity, but who offers to others (and/or between each other and/or is a candidate for) knowledge, expertise, instructional ability, companionship, entertainment interaction, friendship/companionship, and/or commercial opportunity, and where Repute can help users to determine whether such interaction involves participants who meet and/or exceed pre-set and/or currently selected user set and/or other user associated criteria (e.g. user employer and/or association parameters), including specific, relative, and/or otherwise algorithmically and/or historically influenced criteria. These capabilities may, for example, operate substantially based on stored information provided by web one or more services and/or may at least in part be extracted from effectively real-time biometric related evaluation of session participant behavior, as may be further evaluated through Repute information. These applications and services can greatly facilitate user and/or system identification, filtering, and/or prioritization of at least in part unfamiliar one or more candidate(s) for session participation and/or otherwise initiate and/or monitor a session employing one or more such candidates, participants, or PERCos session users).

Information and algorithmic resources supporting such PERCos capabilities, such as Creds assertion and assessment infrastructure, can, in some embodiments, provide a global system for standardized categories and value expressions stipulated by persistently identifiable asserters as descriptive evaluations of any subject matter, either as general assertions and/or as assertions associated with one or more instances and/or classes of purpose expressions, activities, tasks, groups, and/or other individual and/or ontologically and/or taxonomically organized items, and where such Creds themselves may be organized in ontologies and/or taxonomies and/or other organizing systems such as indexed and relational databases and/or the like. Creds subjects may include specific Creds or classes or other reliably identifiable groupings of Creds, that is any asserter may make one or more assertions about any subject matter, including Creds sets, creating Creds on Creds, that is Creds expressing aggregates of assertions and associated values reflecting asserters' views of the qualities of one or more, such as a group, of Creds asserted, by, for example, a particular individual, organization, collection of parties, and/or the like, as to a particular subject matter area. With Creds, an asserter may, for example, use selected standardized variables, for example asserting relative values, either employing positive, or positive, neutral, and negative, values. Combined with other aspects of Repute, such as EF characteristics and values reflecting claims relevant to the importance, relevance, and/or usefulness of individuals or groups based upon facts and/or apparent facts associated such individuals or groups, Repute provides an unprecedented capacity to identify and organize resource possibilities from Big Data and Big Resource.

In some embodiments Cred asserters, may be evaluated by other Cred asserters regarding, for example, their professional credentials, schooling background, credit worthiness, age, location, affiliations, associations (including with individuals), historical behavior, for example as associated with any purpose or activity instance and/or group set. In some embodiments, PERCos services can calculate and display, and/or employ specific and/or aggregate, values for standardized characteristics and/or standardized aggregation of characteristics, by, for example, displaying one or more values (e.g. a value or a value range) associated with each characteristic and/or aggregation, and wherein any such characteristic and/or aggregation may be associated with a task, historical activity, resource and/or purpose expression, instance, and/or class and/or the like. This allows users, for example, based on pre-set preferences and/or at least in part historically based actions and/or related results, to evaluate individuals and/or groups of individuals having, and/or who are otherwise associated with, any such characteristics and values.

PERCos can, in some embodiments, through its Cred, EF, and/or FF capabilities (as appropriate), evaluate candidate participants as to their satisfaction of user and/or user's group criteria regarding participation in a given context/computing scenario. Standardized characteristics, can include such variables as might be found in a curriculum vitae such as educational related background (including study and/or degree related details such as type, field(s), historical timing including dates and duration such as for employment, schooling (e.g. years at a college), language(s) spoken, work background (including job title(s), salary(ies), associated dates and durations, employment locations(s) related associated facts such as associated accomplishments, e.g. meeting a dollar amount for sales, profitability, revenue, number of people managed, details related to areas of responsibility such as product and/or services categories, specific instances, and/or related info such as innovations), family background such as childhood family including relatives names, information related to such relatives), military and/or other public service background (such as rank(s), time(s) and dates and duration(s), posting locations, and/or the like. Such Repute variable characteristics and/or values, including any Cred characteristics and/or values (for example values as may associated with a given CPE or other purpose expression for example, as value associated with having been a military general in a given military service as associated to a CPE related to military strategy determination, may be algorithmically processed and/or combined with any Cred characteristics and values to produce relative measures of appropriateness/usefulness/adequateness.

Social, commercial, and knowledge networking services are tools for users and as such they may best perform when they are structured to be specifically responsive to user purpose and have the capability to support such specification. This enables such a service to provide experience/results that are relevant and productive in contrast to simply occupying time. Enabling individuals to constructively and systematically reach beyond their milieu may enable, on the whole, a substantial improvement in the nature of social networking. Towards this end, the role of purpose domain experts and/or administrators may be key to attenuating or eliminating the stream of often marginally thoughtful and/or relevant communications provided by parties participating in chat and other group, topically oriented environments. PERCos Repute capabilities can contribute considerable advantages to participants in social networking activities, particularly in group contexts. The use of EF filtering as to facts related to an individual—that the individual is a certified plumber, an officer in the US Navy, a mathematics teacher, a physician, a theoretical physicist—can matter a great deal in how their participation affects the quality of, and whether in a given instance they should participate in, social, knowledge, and/or commercial interactions.

Repute EFs, FFs, and Cred assertions provide input information regarding individual and/or a group sets concerning how and/or whether such individual and/or group sets should participate in common purpose computing session sets, that is the quality, relevance, usefulness, and/or the like of such participation. These capabilities can significantly influence how satisfying and productive such common purpose interaction may be. By organizing participants as resources associated with purpose classes, by being able to filter individuals based on their characteristics including EF and Creds, by having purpose administrators and/or collective group management arrangements and/or the like, through which rules of conduct can be enforced, such as the nature and/or quality of communications by a participant set, so as to ensure, in a manner not dissimilar to human traditional physical interaction scenarios, that who participates is evaluated and often understood, that participant conduct may be managed when necessary, and that social, commercial, and knowledge networking is satisfying, appealing, productive, and/or enhancing, as considered appropriate. For example, a licensed veterinarian who is EF declared as a veterinarian and has received high marks through Cred assertions regarding skills in treating behavioral problems in cats is likely to be more useful in participating in a think session responsive to a CPE 'learn' (or 'treat') 'housecat behavior problems'" than a licensed taxi driver who is more interested in discussing traffic difficulties in a big city or action movies and how they may affect people's conduct when they leave the theater and take a cab.

In some embodiments, PERCos may manage a resource type as published participant resources, such as self-Creds that include self-characterizations by, for example, a veterinarian and/or connected-Creds by such veterinarian's clinic/employer/administrator, and/or unconnected (no or minimal conflict of interest) Creds by such veterinarian's veterinary school that he/she is licensed and, for example, has further credentialed graduate work specialty training in treating behavior problems in cats and dogs. Further, Creds may be supplied regarding the veterinarian providing assertions by other EF "verified" veterinarians and/or veterinarian associated groups, and/or by asserting client cat owners and/or their, for example, EF verified cat owning clubs and/or associations and/or the like. Such Creds may be, for example, in the form of differing aggregate ratings of assertions by asserting type such that, for example, a veterinarian is rated a 7 out of possible 10 for the purpose of treating cat behavioral problems by other veterinarians, 9 out of 10 by clients, 8 out of 10 by several professors of veterinary medicine at US accredited by the AVMA (American Veterinary Medical Association), all the former, for example in some embodiments, stored and available for Coherence processing in aggregate and/or individual instance form for each set of asserting type so that a user set can review at least in part their (the Creds) respective evaluative assertion by type characteristics of as serter.

In some embodiments, exclusion, inclusion, prioritization, and/or other evaluation of possible and/or otherwise candidate resources may be performed depending on whether one or more integrity levels for reliability of information of respective and/or groupings or all of EF types specified in a CPE set are satisfied, such that user and/or Stakeholder sets instructions (including EF types for Cred asserters, providers, publishers, and/or the like), may be performed as may be required by such user and/or Stakeholder set CPE sets, user stored preferences, user group administrator governance sets, sovereign government instruction sets, and/or the like contributing specifications. In some embodiments, such types may be declared and established as a standard, when specified by Domain and/or general experts, for example, as employed by and/or consulting to a PERCos authority/utility set and/or by one or more Domain associations (such as the AVMA) and/or the like.

Tests may be available to, and/or certificates may be provided by one or more authorities, such as a PERCos one or more utilities, and/or other cloud services, to specifically support the assuring of a user and/or Stakeholder that they may trust, that is find sufficiently reliable for a given purpose class or overall, for example, an EF type declared attribute, such as being a graduate of a given University in a given academic area having a certain degree granted on a specific date in time or the like, however single or multi-faceted. Certain of such type information, such as having a EE bachelor degree, may be standardized, whereas the naming of a subspecialty to a degree may, in some embodiments, be stored as metadata but not be standardized as a subcategory for PERCos approximation efficiency and/or other PERCos embodiment reasons. A user may have, for example, specified in their CPE set or associated purpose statement to use all primary expert defined types by averaging all specified type category scores, by averaging and processing some but separately processing one or more others as distinct input, by associating one or more weights with any of these type values, and where the types, for example, provide, for example through a standards body or utility or commercial cloud service set, one or more specific forms of associated authenticating certificates and/or other validation for their respective types, as they may be governed in differing manners.

For example, in some embodiments, a user set may wish a breadth of applicable expert input regarding an economics related learning purpose. Such user set may then provide their specification of associated EF participant asserters as professors of international economics at accredited north American universities, staff columnists at major economics related publications (e.g. *Economist, NY Times, Wall Street Journal*, and/or the like), federal government economics officials, and economists at major economic think tanks and consulting firms, and/or economists at certain significant corporations, and where one or more of the foregoing subtypes may be certified for authentication by an association, such as the AEA. The AEA itself, may for example, publish resources comprising such type arrangements to enable users to input into purpose similarity matching standardized Repute attributes for optimizing the level of expert input into an economics related purpose fulfillment process. As with the AEA, other affinity groups, standards authorities, and/or other Stakeholders may publish, for example, purpose class specific expertise type and subtype arrangements, including any differing one or more weightings for such subtypes, for example, as may be related to a purpose class or expression instance. As a result, affinity groups may, for example, publish standards employing Domain or general expert characterizations that are organized in simplified, constrained choice, standardized form in support of interoperability, ease of use, and approximation computing processes. In some embodiments, these standardized type and subtype arrangements may represent implementations by experts and/or authorities of constrained category types associated with Core Purpose, other CPEs, and/or purpose classes and/or other logical taxonomic and/or ontological groupings. These constrained choice sets may, for example, function as Repute (EF & Cred) and/or other resource related characteristics employed for evaluation, filtering, prioritizing and/or other ranking of candidate resources, for example, within a specified purpose class set or other neighborhood set.

The foregoing Repute formulations may be used as contributing (or as may be edited or otherwise transformed) specification information, for example, to user sets prescriptive CPE formulation and/or to Coherence processing (and/or otherwise to user and/or Stakeholder evaluation), with such information being processed as input along with any other specified Cred and/or Aggregate Cred instances and any other CPE expression elements.

Such types can be provided, for example in certain embodiments, by a faceting interface listing the constrained number of type options which may be selected to be used individually and/or in any collective arrangement, and which such user may be selecting from during CPE specification arrangement and/or may have been selected by a previous preference selection process associated with a purpose class and/or CPE set and/or resource set and which may have been stored as part of a user set preference set. Domain and/or general purpose PERCos specific experts may identify, based on Core Purpose, on Domain category (including subcategory) and/or on other combinations of CPE elements, what types may be logically, or with such reasonable frequency, or as sufficient as a generalizing approximation, to be available for user selection, for example from a faceting prompt, and/or for user typed entry, and/or the like. For example, in a situation where the category is, for example, newspaper reporter or college professor, an expert group can declare x number of subtypes, such as a constrained number (e.g. 5, 12, 18, 30, or the like) different categories, wherein such subcategories may serve as sufficient generalizations/simplifications representing coverage of differing variety of associated real world types. For example, a category for Professor of Wildlife Science for EF specification purposes might include when used such real world department names of Wildlife Science, Wildlife Ecology, Environmental Biology Management, and/or the like. Such type value arrangements systematize important PERCos related characteristics enabling efficient, for example, filtering, ease of user understanding and use and their effects, and appropriate to user purpose (such as constrained type sets as determined by experts and/or authorities regarding different Core purpose or Core Focus specifications, and/or the like). The foregoing helps ensure the reliability and responsive of PERCos processes and results as relates to user CPEs, including the reliability and responsiveness of PERCos, identification, filtering, evaluation, prioritization, and/or selections processes. Such reliability, and in some embodiments, for example, supported by some PERCos embodiments as selectable of trust assurance levels (e.g. 1-5 or the like) regarding EF testing and Cred quality helps insure that the Stakeholder involved in supplying knowledge and/or experience assisting users in identifying, evaluating, and/or selecting one or more resources is sufficiently reliable for the current active purpose, such as providing a user set and a PERCos (or like) arrangement with sufficient information to enable them to, and/or have others provide, as in the cat behavior example herein, sufficient expert information regarding diagnosing and/or treating of the user set's cat so as to have an optimum Outcome regarding rectifying the cat's behavioral problem.

In another PERCos example that can, for example, be supported in some embodiments, a user may decide to initiate a relationship set where a small group of approximately a dozen users may get together to discuss near-term planet/human ecological issues focusing initially on threatened species, circumstances related to such wildlife species status, and what generally member individuals collectively and individually may be able to do help preserve certain species. PERCos embodiments, might, for example, be used in differing ways to establish such a group.

For example, the initiating user ("IU") could define differing characteristics that may provide synergistic, complementary contributors to the group function. For example, the IU may wish to have several individuals as members who have at least MS degrees in the academic area of Wildlife Science, Wildlife Management, Environmental Science, and/or the like. Further, the IU may wish these individuals to have good communication skills. Further, the IU wants such individuals, to have a particular interest in understanding and working towards the preservation of threatened mammal species. The IU further wants several individuals who are skilled, accomplished, and financially substantial business men and women, who have the same interests as above, and have a minimum bachelor's degree from an accredited college, but no requirement that the degree be in an ecological management or science area. Lastly, the IU wants several individuals who have a minimum bachelor's degree, and substantial experience and success in working with one or more non-profit groups and achieving notable success. The IU may specify a CPE for examining specific and/or general cosmos PERCos participant resources stores using specification criteria stipulated herein.

In another example supported in some embodiments, a user set decides to initiate a small movie co-viewing club comprised of approximately 20 individuals where the focus is collaborative researching, identifying, selecting, co-attending, discussion and co-blogging about adventure movies and dramas. The group is intended to function as a collective intelligence/knowledge, evaluation, experiencing, and publishing (blogs) movie club.

In another PSNS example supported in some embodiments, a researcher decides to put-together a collective research discussion, analysis, and mutual assistance group focusing on synthetic biology as relates to human liver regenesis and/or replacement. To provide users with evaluative and purpose-directed resource identification, understanding, prioritization, and utilization in the face of boundless varieties and opportunities of Big Resources, PERCos provides PERCos cosmos, which is an at least in part administered space comprising a set of resource objects (and may further include resource portions) and related PERCos information management systems. PERCos cosmos may be further organized according to a set of purpose characterizing, simplification structures, called Dimensions and any associated Facets. Each Dimension and Facet comprises a set of values, which in some cases, may be ordered.

PERCos cosmos, in some embodiments, utilizes a variety of standardized and inter-operable Dimensions, including PERCos Master Dimensions and associated Facets. In one or more PERCos embodiments Master Dimensions and/or their associated Facets can be used to generate subspaces of a PERCos cosmos, each of which can have its own set of structures as well as the structures it inherits from its parent space.

For example, Dimension subspaces can be defined by using one or more Facets Dimensions. Each cosmos subspace, being a space, can also have its own Dimensions. For example, a Master Dimension subspace may have further standardized and interoperable information sets, such as for example, Core Purpose characteristics, user characteristics, resource characteristics, Reputes, and/or the like.

Just as a nautical chart has dimensions, such as depths, heights, coordinates, and/or the like, to characterize depths of water, heights of land, and/or the like, PERCos embodiments Dimensions and Facets can be used to characterize resources according to their Dimensional values. For example, in some embodiments, resource Dimensions may characterize resources according to certain concept approximation properties, such as for example, but not limited to, their Complexity (Material and Functional), Integrity, Reliability, Location, Sophistication/Associated Expertise, language, Quality to Purpose, Value to Purpose, Popularity to Purpose, and/or the like. These Dimensions may be complimented by other resource characteristics, such as Role, efficiency, location, budget, time, and other metrics. Dimensions may organize such descriptive characterizations of resources so to assist in their identification, discovery, evaluation, selection, combination, prioritization, provisioning, and/or usage. They may be used to analyze for similarity and related matching, and/or the like Like nautical chart dimensions enable users to identify different points of Atlantic Ocean and compare their relative depths and other attributes, PERCos embodiments Dimensions and Facets enable users/Stakeholders and/or PERCos embodiment processes to identify and compare resources according to Dimensional values.

In some embodiments, Master Dimension Facets are particularly useful for specifying purpose class CPEs. Facets support PERCos approximation matching where the standardized and approximating nature of Facets used in user prescriptive purpose expressions can be matched against resource descriptive purpose expressions to identify one or more purpose classes who have member resources supported by information structures which may be subject to further PERCos purpose assessment and/or selection processes. For example, user characteristics as may be expressed using Facets from user Dimensions, may enable PERCos to employ assertions of user sophistication/expertise relative to any Domain and/or purpose class set in identifying/similarity matching/assessing/prioritizing/selecting/provisioning and/or using resource sets.

In certain embodiments, PERCos embodiment capabilities are meant to be, at least in part, ubiquitously available. In such cases, PERCos embodiments contextual purpose related features can form basal capabilities of a PERCos based operating environment. These embodiments can transform the nature of operating systems by establishing a new form of relationship between users and resources and their possible use, and may fundamentally alter the nature of a broad spectrum of computing activities. In these PERCos embodiments, contextual purpose features can be deeply interwoven with operating system and other operating environment resource management capabilities and services. This can enable users to have uniquely unified, relevant, and purpose-optimized views into session relevant candidate resource sets. These capabilities are particularly valuable when users are attempting to identify/employ resources outside their personal areas of particular expertise and command, and/or when users are extracting resources from web Big Data/Big Resource arrays.

With current technology, resources are generally segregated as different, separate things. While, for example, tags and/or full text abstracts may be used to indicate attributes of possible resource items, and clustering, semantic search information, and classification ontologies give certain user fields of view into resource subsets, there is no unified system, in particular Big Data system, that treats resources as atomic elements that are operatively responsive, as one or more resource sets, to at least substantially standardized, contextualized situation/instance-specific user purpose specifications. PERCos's unified system contextual purpose based view into candidate resource sets—complemented by certain key inventive PERCos attributes and attribute combinations, e.g. without limitation Repute, purpose class and other neighborhood ontology and taxonomic groupings and Domains, standardized purpose contextual Dimensions and Facets, and aggregate common purpose computing resolving such as performed by Coherence services—optimizes the efficiency and purpose appropriateness of a user's insight into resource and resource portion availability. It further optimizes resource provisioning and usage management through PERCos user purpose/resource expressions and resource and resource portion organization, matching, filtering, prioritization, cohering, combination, provisioning, and usage management. As a result of these capabilities, PERCos can transform and expand the disordered array of Big Data into a component area of Big Resource, comprised of ordered, purpose systematized, user current purpose responsive, component sets of PERCos operating environment arrangements.

PERCos in some embodiments supports a triality of (a) users, (b) resource value chain members, and (c) Repute asserters and fact declarers, the foregoing declaring their respective, operatively intersecting Contextual Purpose Expressions—which CPEs are in such embodiments comprised of at minimum, a duality of verbs (and/or inferred verbs) and categories, and which expression arrangement support a powerful triality of verbs, categories, and other Contextual Dimension information, including Facet simplifications/approximations. This provides an effective purpose process resource framing and user cross-edge approximation computing capability set. For example, PERCos employs in some embodiments, at least in part key user purpose specification standardized and interoperable Core Purpose approximation simplification and approximation capabilities, further standardized approximation Dimensions and Facets, purpose class memberships and applications, resource relational neighborhoods, Repute evaluation/filtering/and prioritization, and common purpose computing Coherence resolution, provisioning, and usage management.

These capabilities can be complemented by cross Edge user/computing arrangement dialogue capabilities for purpose expression—including resource selection—and/or resource utilization for session specific purpose fulfillment such as user purpose related knowledge enhancement and/or experience unfolding, including initiating and/or interim and/or Outcome purpose processes. This dialog can take the form of use of, for example, proffered resource instances and/or session specific resource Frameworks that provide user/computing arrangement purpose fulfillment scaffolding in the form of specific to purpose arrangement of resources, explicitly, by Role, and/or the like, and, for example, provisioned as a user purpose fulfillment environment set.

Through, at least in part, the standardized purpose expressions of the triality of users, resource value chain members, and Cred asserters, PERCos parties, combined, for example, a duality or triality of purpose expressions, enables far more effective and informed presentation of candidate purpose fulfillment arrangements compared with current technologies, particularly when drawing results from web based Big Data, or PERCos Big Resource or when involving resource instances that belong to domains with which users have limited or uneven expertise, that is having a limited capacity to point at (search and retrieve) truly optimal resource sets. PERCos, as such, provides unique, practical Big Data management and resource utilization solutions—though in some embodiments extended beyond Big Data to Big Resource—for example, as when using PERCos resource to provide purpose related computing environments, such as when using Frameworks involving disparately published, complementary resources, such as people, services, applications, information sets, devices, and the like.

Using user prescriptive interoperable Contextual Purpose Expressions as specifications to be matched against published resource descriptive Contextual Purpose Expression specifications (both direct CPE specifications for resources and referential Repute assertion, effective fact, and faith fact CPE specifications), PERCos can transform the nature of user relationships with Big Data as well as enlarging it to relationships with Big Resource, fundamentally altering the productivity of resource usage under many circumstances.

PERCos purpose matching with resources occurs directly and/or through intermediate use of one or more PERCos Purpose class ontologies and/or other information organizations. With PERCos, users relate to Big Resource by framing their needs in simple to more descriptive prescriptive purpose compositions, followed (as appropriate) by unfolding cross user/computing arrangement dialogs that orient Big Data and other Big Resource resource inspection through the relating of commonality of purpose (and optionally, other context/descriptive information, related to one or more users (and/or user group(s)). This integration changes the relationship between users and candidate computing arrangement resources. In some embodiments, PERCos supports the assessment and deployment of a new, much broader and more flexible concept of the nature of, and user relationship with, computing related resources, by organizing large, distributed and highly diverse data, services, software, participants, and/or physical resources into functional purpose fulfilling groups.

By providing means to optimally match potential resources to current user purposes, that is the one or more purposes contemporaneous with a current computing arrangement session, computing environments will be enable users to acquire, and/or shape, computing resources so as to specifically reflect and support their user purpose fulfillment. Rather than a user having, for example, nebulous relationships with possible resources, where resources are returned in response to key words rather in response to the actual, intended purpose of the resource set use, candidate resources are evaluated as to their capacity to optimally satisfy a user learning, discovery, and/or experience process set, that is the returned resources are considered a domain of user activity rather than an explicit one or more items to be retrieved. As a result, the nature of the user relationships to potential resources, including the full spectrum of resources that could be practically employed, may be fundamentally altered and improved, in particular when the user is not specifically pointing to, that is, specifically requesting/identifying, an explicit one or more particular resources, or if so performing a search and retrieval, when the user's request is insufficiently informed to best fulfill the user's underlying purpose(s).

Through tools that employ contextual purpose standardized and interoperable expressions, including for example purpose related resource set identification, filtering, selection, combination, prioritization, provisioning, and/or usage process management, user resource assessment and user/resource interaction can be inherently influenced, that is directed or otherwise at least in part guided, by such purpose expressions, which may be further combined with related contextual input as well as with user history and crowd behavior and related data and/or events.

With PERCos, resources can represent more than data that is executable by a computing system in the form of applications and/or associated information. In some embodiments, PERCos resources and PERCos operating systems and other environments represent a highly flexible, considerably broadened notion of resource management, identification, evaluation, and utilization where resources may—but are not required to—comprise the entire universe of possible, proces sable information types, including information that stands for, that is acts as descriptive, interface, and/or control proxies for resource items that reside in the physical world, including, for example, other people, and including interface control information for physical devices that can be directly or indirectly at least in part controlled by users through PERCos purpose fulfillment influenced or controlled processes. In fact, through PERCos, as in everyday life, purpose fulfillment and resources are ultimately, frequently inseparable in the human mind. Following this principal, users, rather than being contained within silo configurations of current task execution applications and cloud services such as Word, PowerPoint, Google, Yahoo, Wikipedia, or Acrobat—can characterize their dynamic purpose (that is their current purpose) with an expectation that responsive resource sets in any reasonable combination, for example published as sets, will be identified, filtered, evaluated, selected, prioritized, combined, provisioned, otherwise organized, and/or used, in a manner responsive to satisfying user purpose(s), that is helping users determine and/or computing arrangements calculate "best" available resources as individual items, or as sets, for example in the form of purpose class application environments. PERCos, in some embodiments, can present an at least in part digital environment for user specific purpose quest unfolding and/or enhancement and/or fulfillment. PERCos, in some embodiments, can function, for example, as a portal to any and all PERCos compliant and/or otherwise interpretable resources, including PERCos resource items that have operatively (that is sufficiently or fully) unique one or more identities and associated one or more purpose expressions, purpose classes, and/or other meta data including broader context data use/purpose pertinent information.

Some important PERCos methods sets supporting PERCos exploration and/or discovery, for purpose refinement, and/or unfolding resource exploration, are for example, associated respectively with one or more of: purpose resource publishing, certification, authentication, other integrity processes, Repute purpose value rating, and purpose expression including other meta data specification, including, for example, purpose class specification, governance value chain features (subscription, advertising, societal and other Stakeholder governance, other rights management associated with prescriptive and/or descriptive purpose(s)) and/or PERCos resource Instances), and/or the like. These PERCos capabilities provide specification instances supporting, for example, purpose matching/identifying, filtering, selecting, prioritizing, combining, cohering, and/or the like, of multi-party purpose attributes/requirements—both user and Stakeholder, and form key capabilities in the formation, and evolving, at least in part in some embodiments, of self-organization of a purpose cosmos comprising a PERCos web arrangement.

For example, PERCos embodiment compliant resource sets, may, so long as such sets are cohere able where there are combinations, be activated, and further controlled over time, in a manner responsive to applicable, cohered, purpose expressions functioning as a common purpose set of operations, for further example, as such purpose expressions may represent an evolving sequence of unfolding user knowledge enhancement, discovery, experience processes, and/or results observation (whether direct or indirect).

In some PERCos embodiments, there may be several kinds of expressions that may be combined (along with any relevant other contextual, relevant information such as metadata) to provide a composite expression of user purpose. These may include for example:

Common Purpose Expressions

Instances of one or more users and any germane Stakeholder standardized and interoperable and other interpretable sets of purpose and related specifications (for example purpose expressions) which are amalgamated to form a resolved (including when applicable, arbitrated or otherwise determined) consolidation of the specified and/or inferred, interests and/or priorities and/or requirements, of all relevant specifying parties related to resource identification, evaluation, provisioning, usage, consequences, and/or the like for respective purpose satisfaction agreement of such parties.

Common Purpose Sharing

One or more users with certain purposes that may be commonly served by mutual participation and shared interest as regards to one or more PERCos sessions exchange or otherwise have supplied their purpose expressions and any germane other related specifications, and where the foregoing is resolved into provisioned or published operating specifications for shared PERCos activity. Such shared activity involves sharing to common and/or complementary objectives through the use of one or more resource sets.

And any combinations of the foregoing.

In some embodiments, during any of the foregoing operations, one or more new resources (including for example specifications) may be created, through for example one or more instruction based processes, including for example instruction sets resulting from the use of purpose class applications, where user PERCos purposeful activity portions, extracted information, and/or derived information may be combined with any instruction set arrangement, with the results published, or otherwise retained, as a PERCos resource, which may be associated with purpose expression, purpose class, resource and/or resource lass (including for example any participant and/or participant class), Domain/category class, external to PERCos one or more classes, affinity groups, crowd groups, and/or the like.

Some PERCos embodiments may include sets of intelligent tools for purpose operations which may, for example, include:

- Tools for, and/or assisting users in, the initial formulation and/or enhancement of purpose expressions
- Tools for resource organization responsive to purpose, including tools reflective of expertise, for example, tools supporting the creation, editing, and/or modification of purpose class and/or purpose based resource (including, for example, participant) ontologies and/or taxonomies (including, for example, participant ontologies and the like), and, for example may also or alternatively include one or more of, tools establishing and/or assisting in identifying and/or employing relationships among resource sets and/or portions and/or resource classes and/or purpose classes and/or purpose expression sets
- Tools and/or other capabilities (embeddable technologies) for optimal framing of purpose expressions resulting from expertise-framed interface contexts—such as the use of faceting interfaces and/or purpose organized resource and/or other knowledge related graphing, including clustering, tools supporting resource selection
- Tools for managing massive resource sets where perspective dimensions, such as those graphed using Dimension Facets sets, are organized as conceptual simplifications and perspectives in a manner optimally structured to support expertise-framed contexts, including, for example, representations of spaces resulting from combination of certain or all specified Dimension Facets, which may be complemented by other metadata specifications and where the foregoing may be manipulated, for example, by altering Facet values and/or selections, for evaluation of alternative results, and/or the like
- Tools for preferences and/or other profile Specifications, in general and/or as specifically associated with one or more purpose classes, participant classes, Domain classes, resource classes, resource neighborhoods, and/or the like, where such preferences and/or other profile information are cohered with the current user one or more CPEs and/or purpose statements and/or Foundations and/or intended Frameworks (including, for example, purpose class applications), for example, as respectively associated with specific purpose class sets, to influence and/or control the identification and/or selection of resources and/or the preparation of session operating specifications
- Tools for the manipulation and/or editing of purpose class applications, Frameworks, user and/or computing arrangement Foundations, and/or the like
- Tools for publishing and/or administering resources, PERCos cosmos and/or Domain registration and ontological and/or taxonomic associations, identification formulation, purpose value chain management, for both user set and other group purpose administration, and/or the like
- Tools and related infrastructure for purpose network managing, including purpose related caching, by for example, storing frequently used purpose related associations, and/or resources, as described herein, so as to improve network operating efficiency and/or reliability and/or security, where such information, for example, may be maintained at various network caching locations in general and/or as may be desirable locally and/or regionally as a result of differing purpose related usage patterns and/or as specified by network manager sets Tools for users, Participants, and/or resource integrity supervision, administration, and/or enforcement, including associating differing security policies/levels/requirements with one or more or differing purpose classes, resource classes, Participant classes, PERCos computing arrangements (and/or classes thereof), and/or one or more affinity groups and/or affinity group classes Tools for resource related specification for navigation and inspection, for example, tools assisting users in the inspection and evaluation of candidate resources through, for example, relational database manipulation/filtering/weighting of purpose related attributes such as Master Dimension Facets and/or auxiliary Dimensions information to view responsive resource lists, which may be ranked and/or displayed with at least a portion of such attribute conditions and/or with non-specified attributes Tools for purpose language specification, annotation (to, for example, assist programmers and/or user's in use of language elements) and/or tools for associating Symbolization with Constructs, such as with one or more purpose class applications, other Frameworks, Foundations, CPEs, affinity groups, Participants and/or Participant classes, purpose classes, and/or Domains/categories, and where such tools may be used by users, standards groups, purpose environment utilities, affinity groups, governments, and/or the like Tools for managing stored "active" and/or historical sessions and/or session information, whether user specific, affinity group, and/or crowd behavior class or other grouping and supporting further cross-edge unfolding of user purpose and/or results evolution through filtering, prioritizing, and/or presenting information based, for example, on Dimension Facets, including, for example, Repute Dimension Facets such as Quality to Purpose, Value to Purpose, Value Contributing to Purpose, and/or the like, and/or user Dimension Facets such as user sophistication as related to purpose or purpose class, and/or other Dimension and/or metadata and/or the like Tools for the creating, editing/manipulating, and/or managing of Constructs and related resources. including, for example, Frameworks, Foundations, resonances, participants, and/or other resources for users and Stakeholders, including tools for associating such items with purpose expressions and/or resources, for example, through association with one or more CPEs and/or purpose classes, participants and/or Participant classes, resource or resource classes, Domain categories and/or other groupings, and/or the like.

Human purpose expressed across the Edge can take the form of an unfolding process where user output to computer (computer input) and output from computer to user (input to user) are dynamically interlinked and encompass a cross-time dialog and/or set of observations, an interactive flow of input involving both users and their PERCos computing arrangements (and any PERCos and/or otherwise complementary services) functioning as session interacting "actors." For Example, such interactions may occur during purpose unfolding for purpose fulfillment, including purpose related learning, exploration, discovery, and/or event and/or user observed based interim results.

These cross-Edge interactions may span one or more sessions, that is the user/computer arrangement PERCos dialog may be paused/interrupted, and may be continued at a later time and/or at different PERCos node one or more locations.

Within such PERCos sessions, computer domain operations may include computer side PERCos supported processes that, based on historical user information, expert system operations, and/or artificial intelligence and/or the like, at least in part anticipate user/computer priorities as may be associated with user(s), purpose(s) and/or may include support for user/system interactions complemented by, and initiated at least in part by, artificial intelligence interpretation of user purpose related actions such as CPE specification and/or purpose class application user interface input, and where such AI and/or the like processes may further interpret information regarding user stored profile (including, for example, preferences) and/or historical use in general and/or as associated with one or more purpose classes and/or user specified CPE, as well as input related to one or more purpose classes and/or CPE set and/or in general derived from crowd, participant class, affinity group, profile and/or preferences, and/or other like input.

In some PERCos embodiments, one or more resources may assist purpose operations through recognition of informational, sequential, and/or temporal patterns involving user and/or user group input(s), and/or reading and interpreting user and/or at least an additional portion of a user group biometric information such as facial expressions, breathing patterns, voice amplitude, cadence, and/or frequency information, orientation and/or other physical positioning information between/among session participants and/or visual and/or other recognition of objects in a user computing arrangement and/or at least a portion of any change to such computing environment. Such information may also include provision of notices, reminders and/or other information in advance of one or more deadlines and/or other sequential and/or temporal events.

In some embodiments, a shared purpose expression is a specification of purpose agreed to by a group of users. shared purpose expressions may be used in one or more shared purpose sessions (for example including the session in which the shared purpose expression was created and maintained), they may be published for later use by said same group, and/or they be publicly published for use by one or more specified affinity groups, participant classes, associated with and/or as a member of a purpose class set, and/or the like. shared purpose expressions may be created by one or more parties and then published to an affinity group set, participant class set, or universally, whereby it may attract other prospective users to shared purpose, common purpose computing session, or to a shared purpose distributed/aggregate session set where parties participate in such PERCos sessions (or parts thereof) independent of some or all other participants, but where one or more aspects, including for example results, are at least in part shared and comprise a shared Outcome, optionally with shared interim results. Shared purpose expressions may occur in a shared PERCos session set as shared purpose expression portion sets that specify differing roles for each participant set. Such shared purpose expressions and any associated shared purpose expression portion sets, may be memorialized at least in part in a legal agreement set that may stipulate sharing rights of participants sets to Outcome and/or interim results, including financial compensation for time invested, resources contributes, or the like, in respective participant/User set work related to such Outcome and/or interim results, creation rights, publishing rights, and/or value of at least certain aspects of Outcome produced.

In some embodiments, PERCos shared purpose sessions may comprise resources and users with standardized, interoperable purpose expressions which are resolved so that users may learn about and/or discover resource sets and/or resource portion sets and interact with other users having the same or sufficiently similar (by specification) shared purpose, and/or interact with other users and/or Stakeholders having an interest in such resulting resource and/or resource portion set. Because of users' varying contexts, and/or because of the approximation computing nature of user CPEs and the secondary differences that may exist between users employing the same CPE, different user sets results sets may differ leading to differing user experiences and/or other Outcomes.

In some embodiments, PERCos enables groups of users to declare and/or discover shared purposes. For example, a user may wish to declare their interest in a purpose, for example, fishing, home digital audio distribution, cooking Cajun food, and/or the like, and wish to interact in some fashion with other participants, perhaps unknown to an IU, regarding this common purpose, such as viewing and commenting on a movie together, sharing music with one or more people, and/or the like. For example, someone who has more expertise than the IU may be a desirable PERCos session companion (for example, along with using, for example, purpose class application tools supporting such sharing, for example, simulcast video and audio conferencing, texting, chatting, and the like.). This may include, for example, identifying someone to help an IU set with a task such as a chemistry experiment, collective writing of one or more blog articles, replacing a hard drive in a notebook computer, singing in a music chorus, and/or playing in a band with the participants physically distant but sharing a common purpose computing session, and/or the like.

In some embodiments, shared purpose sessions may be interactive, for example with users interacting with at least a portion of the same resources associated with shared purpose expressions for the session. In some embodiments, this may involve one or more publishers who have published resources for shared purpose sessions (individually and/or in groups). Users may elect to create resources that are specifically for one or more shared purposes and thereby act as publishers. Shared purpose class applications may be published as environments for users/participants to pursue shared purposes.

For example, in some PERCos embodiments, one aspect of shared purpose is social interactions and potential bonding through expressions of shared purpose and/or through sharing experiences during a common purpose computing activity. One or more users may dynamically undertake purpose operations within, for example, a shared purpose session, and may be subject to other user set preferences, for example, regarding interactions with other users and/or resources. Such dynamic activity may spawn event messages to other candidate one or more session users (and/or automatically provision a user set) and/or users, individually or collectively through, for example polling, may decide to share at least a portion of their unfolding experiences in the form of a user set joining an in progress PERCos session, and/or recording, for example, and publishing as a resource, for a further user set session activity and/or results and providing such information to a user set. In such an example, as with earlier examples in this section, users may benefit not only from those resources associated with a purpose class and/or being sufficiently similarity matched with a user Purpose Statement and/or CPE, which, for example, might be augmented by other contextual information such as shared (and/or complementary) preferences, profiles, PERCos history information, and the like, but additionally benefit from other users' and/or Participants perspective, interactions, commentary and/or narrative associated with operations within that shared purpose session.

During and after such operations one or more users may establish relationships with other users, such as for example forming bonds associated with one or more purpose classes, resource classes (for example, participant classes), which may lead to further common benefit, social integration, and/or purpose satisfaction/fulfillment. For example, in some embodiments, one or more users may wish to create an affinity groups, such as, for example, a modern jazz appreciation group comprised of individuals who have moderate experience with modern jazz and enjoy it greatly and, who have graduate degrees in sociology or also enjoy Cajun cooking, and such participants, as users, may use PERCos Repute tools, PERCos identified other resources, and each other, to collaboratively, collectively help learn about and discover Modern Jazz and Cajun cooking, infused with an understanding and/or study of, for example, related sociology theory and related culture, such as cultural background for Jazz in Louisiana. In some embodiments, affinity groups may be based on shared purpose expressions such as shared purpose classes which may involve synergy complementary elements, forming potentially complex relationships of users and/or groups with resources—including participants who may become involved as users—the foregoing which may be associated with an expressed shared purpose specification set.

PERCos purpose expressions specification arrangements in different embodiments may take differing forms. Consistent among these embodiments are the principles of simplification of expression, where such expression may take the form of an approximation of such user purpose to facilitate efficiency of processes and the learning, experiencing, and/or discovery processes that may unfold responsive to such expression specifications.

PERCos operating environment/system may provide for the specification (and/or inferring) of verb and category sets, which may be interpreted in combination as Core Purpose Expressions. Some of these embodiments may be support the use of certain grammatical, clarifying elements such as prepositions and adverbs (particularly as constrained in variety as logically applicable to specific Core Purpose or other CPE sets), and may further support the specification of additional clarifying elements, including various situational and other contextual characteristics, such as in the form of other Master Dimension Facets and/or auxiliary Dimensions and/or the like. For simplicity of operation as well as standardization/interoperability management, options available in each grouping of characteristics or characteristic/subcharacteristics may be in constrained to limited list option sets, where such limited set of characteristic options facilitates easy of choice by users of logical and/or frequently applicable choices for purpose approximation representations and/or metadata matching. In some embodiments, synonym sets associated with specific such constrained list members may be user viewable for some or all of such members to inform user understanding and/or guide user characteristic selection for PERCos purpose expression, and/or usage of any of such synonyms may be automatically or with user approval, translated to the operative synonym terminology.

PERCos embodiments may employ differing expression approximation simplification schemas. For example, PERCos embodiments may provide for the separate specification of verbs and Domain categories (where categories, for example, may be organized in a manner comparable to DMOZ categorization hierarchical arrangement). Such embodiments might, for example, first, or simultaneously with category selection, present a faceting verb selection interface (or vice versa a Domain category faceting selection interface then a verb faceting interface). In such embodiments, for example, a user might select one or more categories and/or subcategories from an unrestricted, or restricted to logically consistent/appropriate, choice set. After completing such verb and Domain category selection, with or without additional selection or other entry of prepositions, adverbs, and/or the like, in such embodiments, the user would have specified a Core Purpose set employing standardized, interoperably interpretable expression elements and combinations and representing a Purpose approximation.

In PERCos embodiments, various Core Purpose supplementing approaches can be adopted where such approaches employ similar but differing purpose expression concept simplification schemas.

In one embodiment set, for example, Core Purposes are supplemented with other principle simplification characterizations provided through a Master Dimension/Facet arrangement, which may be further or alternatively use an auxiliary Dimension approach. In this embodiment set, Master Dimensions are comprised of standardized characterizations complementing Core purposes (which can also be defined, for example, as Master Dimension characterizations). These further Master Dimensions are grouped in principal, logical simplification, vector characterizing groupings.

Master Dimensions are comprised of Facets and any associated specified values. In some embodiments, these Core Purpose logically complementing Master Dimension groupings may be comprised of, for example, the categories of users; resources; Reputes knowledge/expertise/opinions assertions and Effective and Faith Facts regarding resources; and special Facets (e.g. icons and/or other symbolic or short-hand notions representing any Master Dimension and associated values expression set). Such Master Dimension Core Purpose and Dimension Facets are used to express purpose approximation components that, when combined with Core Purpose specifications, can be used for identifying, evaluating, determining, prioritizing, combining, and/or provisioning resource instances and/or neighborhoods and/or their members, such as, for example, identifying and provisioning for user inspection, for example through similarity matching and prioritizing, most relevant one or more purpose classes, resource members sets, and/or resource instances (when not calculated after determination of class, neighborhood, or other grouping membership).

Supplementing these types of Master Dimension approximation embodiments, further or alternative specification in some embodiments may be made in support of further identification, evaluation, determination, prioritization, combination, and/or provisionment of class member resources and/or resource portions of resource neighborhoods, such as purpose classes sets, identified, for example, through use of Master Dimensions and Facets. In this embodiment or use case set, users and Stakeholders may specify auxiliary Dimensions. Auxiliary Dimension represent interpretable specifications which are not based primarily on standardized, interoperable lists of component elements used in defining purpose approximation neighborhoods, but which groupings may each represent open arrangements of interpretable element sets that may, for example, be used in similarity matching and filtering of purpose class or other neighborhood members and/or portions thereof. Auxiliary Dimension open specification instances may be inefficient and/or inappropriately specific when applied, under certain circumstances, for example, to identifying and/or evaluating items within Big Resource or Big Data to determine candidate groupings of resources, but auxiliary Dimensions may provide purpose specifications that are more appropriate under some embodiments or circumstances when applied to purpose approximation class or other group member sets to resolve in accordance with more specific user or Stakeholder specified criteria to specific resource instance results. Such auxiliary Dimensions of open specification arrangements of interpretable elements are organized in some embodiments in logical groupings and may be further organized with certain simplification subsets, the foregoing for assisting users and Stakeholders in understanding, selecting, and/or organizing such criteria representing contextual and process optimizing user and Stakeholder selecting/filtering/evaluating parameters.

Auxiliary Dimensions may be, in some embodiments, arranged in user logical understanding simplification groupings, such as for:

1. process specifications for:
   a. affinity, societal, and/or commercial and/or the like instructions, such as rights and/or obligations rules governance specifications, and which may include, for example, related event based triggers, controls, and process flow management;
   b. resonance specifications, which are instructions sets associated with at least one purpose expression, and which can specify condition sets under which such conditions presence and/or absence (individually, in subsets, and/or as a whole) may facilitate and/or detract from, as specified, user purpose fulfillment optimization, and which may include synergy instructions regarding complementary contributing resources sets;
   c. process automation instructions that provide, and/or provide control information for, for example, software, services, and/or hardware instructions that may facilitate identifying, processing, and/or filtering based upon such instructions in order to optimize user purpose fulfillment results, and which may include, related, event based triggers, controls, and process flow management.
2. general data items, such as, for example, information stored in profiles, preferences, user PERCos usage history stores, and/or as generally published "crowd" usage history related information such as inferred crowd preferences and history information as related to purpose, resource, and/or other useful classes and/or instances.
3. PERCos Constructs such as any information arrangement employed as purpose related session building and/or evaluation blocks such as Frameworks, Foundations, CPEs, and/or the like.
4. Free form parameterization such as Boolean expressions, metadata lists (e.g. tags, structured information arrangements), and/or the like.

In some PERCos embodiments, CPE specification interfaces may employ supplementing and/or alternative Master Dimensions arranged as groupings of controlled vocabulary choices where such Dimension groupings directly contain alternative user choices, versus representing Master Facet types (Core Purpose, user, resource, Repute, special symbol). For example, some embodiments in such expression simplification arrangements may provide controlled vocabulary instances representing choices available under certain specific Dimension types, such as, for example some set of data characteristics; Roles; relationships among or between; tests and routines; resource items; quality of experience; modalities; and/or the like. One or more of these choice sets may itself have its options organized by class and/or other category structures to enable easier user navigation and choice if the choice set is sufficiently large. These choice sets may be organized in a manner comparable, for example, to the organization management that may be applied to Domain category choices. As with some other embodiments of PERCos, these embodiments may use user faceting interfaces to allow choices, based upon prior specification elements and/or user and/or crowd behavior patterns/history where faceting choices in any given selection column may be constrained by that set which is logically sensible and/or significantly likely as, for example, selected by one or more general and/or Domain expert and/or authority sets. Such a user interface can allow, as also may be supported in with choices within some Master Dimension embodiments, the toggle selection between a logically constrained set of choices derived as a subset of the full constrained vocabulary list for a given Dimension, and the full constrained or alternatively constrained vocabulary to allow users and Stakeholders to alter the logically available choices in other one or more Dimensions so as to evaluate the impact on user choices and to, for example, allow user choice between simple, versus more choice selection variety, such as choice between simple, moderate, and extended faceting list choice complexity arrangements. Custom constrained vocabulary sets may be specified by Participant sets, including, for example, affinity group sets. Such alternative controlled vocabulary arrangements may also, in some embodiments, be used for portions, or in some embodiments for all, for example, of auxiliary Dimensions user purpose expression specification interfaces.

Such a more elaborated category oriented design might be used in arrangements, for example, having fairly extensive choice selections under some or all of the Dimension category types, and can offer a differing perspective on user simplification specification sets for purpose approximation. This kind of arrangement may provide for more extensive, standardized resource characterization flexibility and may, under some circumstances, be more responsive and efficient for users than embodiments using free form parameterization to identify specific, purpose responsive resources, though these embodiments may be less effective in characterizing purpose approximation for identifying purpose neighborhoods. These embodiments may have, for certain examples, usefulness in arrangements, or circumstances, where direct similarity is evaluated against resource instances, but given quality of experience, modalities, and/or certain other variables, may be less efficient and beneficial in use for similarity matching with purpose approximation sets such as purpose classes.

In another PERCos embodiment set, CPE specification may employ Core Purpose specification through the use of standardized, constrained lists of verbs characterizing an intent perspective regarding activity type, and category arrangements, for example structured in a manner comparable, or otherwise similar to, DMOZ. In this embodiment set, Master Dimension simplifications might be organized as verbs, categories, characteristics, focus, perspectives, tests, and Reputes. Other, further Master Dimensions might be employed representing “interactions” and/or “governance and rules” given the importance of interactive relationships and processes in the emerging connected world (or this Dimension might be a part of, for example, “perspectives”) and given the importance of automating processes and enforcing governmental/societal/affinity group rules and results/consequences (or this Dimension might be part of, for example, “characteristics”). As with the other described embodiment examples, these Dimensions are meant to comprise a logical groupings set that users can readily relate to as conceptually related organizational purpose specification simplification arrangements and where such Dimension choice structures, in some embodiments, are comprised of constrained sets of options to ensure reasonable simplicity of operation and where such constrained sets may, at any given point in a sequence set, may be limited number of logically related choices, including, for example, limited value selections, as determined by general and/r Domain experts and/or authority sets and to be appropriate for simplification, approximation, and/or efficiency reasons.

In some PERCos embodiments the notion of Concept Description Schema (CDS) is employed through, in part, the use of Dimension, Facets, and their instances and any associated values. CDSs are multi-dimensional spaces used for organizing concepts, for representing their similarities, differences, clustering, graphing, nearness analysis, and otherwise for providing elements for communications and evaluation. Its primary role is providing expression elements for PERCos environment participants to articulate purpose orientation characterizations—CPEs—for framing the foundation for a PERCos session and for making associations with resources that can contribute to PERCos sessions interim results and/or Outcomes. These structures support the identification, evaluation, prioritization (as used herein including, for example, ranking), selection, combination, and/or provisioning of resource sets and/or portions thereof, and associated user purpose orientations through the matching analysis and/or other association of CPEs (framing purpose expressions and/or purpose statements) with resource sets. All of this may involve generated, constructed, and/or identified elements matching and/or contributing to an appropriate user purpose fulfillment processes, including, for example, CDS facilitated information retrieval, unfolding multi-media entertainment, business productivity purpose class applications and other Frameworks, human interaction contexts, and/or the like.

Both for intellectual control, logical relational processing, and for implementation efficiency, in some embodiments, CDSs may be grouped into Dimensions (as with Master Dimensions described herein), which in certain embodiments may consist of a cluster of Facets that are conceptually more closely related to each other than to other Facets; in some embodiments, Facets may themselves be further structured into subfacets (and subsub . . . ).

The specific structures described herein represent logical, and in some instances, compelling simplifications for purpose approximation. They facilitate functional and/or purpose optimization (of both users and Stakeholders); while these structures are not specifically, uniquely determined by the structure of the universe, by the natural language used, or by the way the human brain works, they are informed to one or another degree by each of these considerations, and normally are particularly informed by the nature of modern human behavioral and conceptual proclivities. In particular, the number of levels of subdomains within a domain involves two trade-offs: breadth vs. depth (more terms per level vs. more levels) and generality vs. specificity (a few broad classifications vs. many very specific ones).

There is significant correlation between terms employed by Facets in the exemplary Dimensions, and PERCos uses of grammatical parts of speech (in English): verbs and verb equivalents (as well as inferred verbs) typically involve verbs or verb like phrases or comparable actions; Categories, nouns or noun phrases; Characteristics, Focuses, and Perspectives, may, in some embodiments, employ adverbs, adjectives, and/or adjective-like constructions; Tests, verbs or verb phrases; Reputes, standardized PERCos qualitative representations and associated information. However, this is in a matter of choice, as Master Dimensions employ verbs, categories, users, resources, Reputes, and Symbols, and other embodiments may employ other simplification strategies.

For purpose approximation, in some embodiments, most of the benefit to a user from a specification standpoint comes from relatively coarse, approximating classifications, rather than highly-detailed schemes developed for information professionals, such as the Library of Congress Classifications, though certain CDS implementations, particularly certain use focused implementations, may have further levels of sub-domains.

The simplification groupings and other features of these embodiments may be in part or whole combined, that is their purpose simplification Dimensions and any associated features may be employed, as perspective specification tools, in any desired combination, using the same, or operatively similar, conceptual groupings.

In some PERCos embodiments there are one or more languages for purpose expressions. For efficiency and/or interoperability, such languages may have formal syntax and semantics and be supported by associated resources, tools and/or supporting environments. For example PERCos embodiments Platform Services and environment(s) may provide such support. Such languages may take the form of:

1. High level, user, Stakeholder, and administrator languages, which may be entirely and/or substantially use symbolic and/or named elements, with or without syntactic Constructs and may employ differing icons as representative of different expression elements, such as, for example differing icons for each respective and/or groups and/or category representatives for standardized verbs, Domains and/or Facets, and/or Constructs, for example, representing one or a group of purpose class applications, Frameworks, Foundations, resonances, Repute classes, purpose classes, CPEs, Purpose Statements and/or the like; and/or
2. Lower level programming environments supporting basic PERCos environment process and internal resource control functions for providing instruction level code and moderate level semantic and syntactic elements, for example, as corresponds to verbs, Domains, Dimensions, Facets, Values, Constructs, Repute classes, resonances, and/or the like, that when specified in a logical manner form computer processing instruction sets.

PERCos compliant computer applications, such as purpose class and purpose class applications and non-PERCos resource applications employing a PERCos plug-in set and/or employing integrated capabilities made available through, for example, an API, may incorporate purpose language expression and interpretation capabilities for use by one or more users and/or Stakeholders and/or their computing arrangement(s) to specify and/or interpret a purpose expression or statement set in a manner consistent with context, purpose focus, interim results, Outcomes, and/or user experience set associated with the associated underlying purpose application design.

Purpose expression languages may have one or more vocabularies, which for example, may be segmented and/or combined to provide context appropriate purpose expressions and associated vocabularies to users and/or Stakeholders.

Purpose expression languages may include capabilities for interaction of users with "real world" tangible processes and resources, for example physical transport, autonomous and semi-autonomous machinery, existing and legacy automation systems and/or other real world physical resources such as real world capabilities employed in manufacturing and/or services (e.g. production line provisioning and/or control, electricity provisioning and/or generation control, water provisioning and/or storage management, temperature control, knowledge/help and/or administration activities, and/or the like). purpose expression languages may include terms that reflect the real world, and provide support in some PERCos embodiments, for example, to interact with real world environments such as communicating with computing arrangements involved in electrical grid transformers and electric transmission systems, enabling real world physical resources to become part of, or be otherwise influenced and/or controlled by, a purposeful system such as found in the form of PERCos embodiments.

In some embodiments, PERCos purpose expressions include Core Purpose expressions, which comprise verb and category sets. Core Purpose Expression instances support effective, efficient and interoperable interactions of users across the Edge for purpose formulation, resolution, and/or results. Such Core Purpose Expressions can form a first order simplification that represents user objectives sets stated in a simple, high level form, and comprising of one or more verbs representing an action perspective set, and one or more categories representing a subject set. For example, the verb Learn might be combined with the Domain Science/Physics/Astronomical, or Perform Vehicle/Engine/Repair & Maintenance, or Consume Food/Chinese, as high level Outcome purposes, where resources such as corresponding purpose class applications appropriate to these desired purposes may be arrayed for user evaluation, selection, provisioning, and usage, and where such purpose class application interfaces may guide users to satisfying Outcomes, including, for example, specifying Consume Food/Chinese might use the users request and prompt, for example with a faceting engine, for contextual information orienting to a more specific Outcome type such as healthy (e.g. low fat), whether at home or as a guest or at a restaurant, physical location, price, spiciness, regional type, ambience, parking, hours of operation, length of time in business, and/or Repute variables, and/or the like. In such instances Core Purpose Expressions may result in a user being presented with purpose class applications, where such one or more applications specialize in supporting, or are flexibly adaptive and can specifically support, the user sets specific Outcome type. A Core Purpose Expression may be represented by, for example, a standardized symbol that corresponds to its purpose. Purpose class applications may use such a Core Purpose symbol as part of a symbol representing a publisher's or other Stakeholder's specific instance of such an application, assisting the use in making a logical association to a purpose class application a simpler, more intuitive process.

Verbs and verb equivalents may function as key elements in the specification of purpose, since they express intent generalizations that can be associated with "things," such as PERCos Domain categories. In some embodiments verbs may be organized into lexicons to provide users/Stakeholders with means to effectively identify and/or express their purpose approximation. In some embodiments, such lexicons may be significantly limited in quantity to comprise, for example some tens of verbs such as approximately forty, or eighty, one hundred twenty; in some other embodiments, verbs may be limited to hundreds of verbs as a constrained verb vocabulary. This limitation of available verbs may be implemented in support of approximation learning, standardization, interoperability, efficiency of operation, and/or ease of use of user of at least a portion of a PERCos embodiment interface and/or ease of user understanding and/or use of and/or relating to verb specification options. Such limiting of verb choice variety to, for example, optimize standardization, interoperability, simplification, and/or purpose expression approximation may be presented for specification purposes, for example, as a capability of a faceting interface, whereby for example, a finite list of verbs is presented to a user or user group as a faceting scrollable option list, and for example, where such finite list may be visually expanded by for example cursor movement over a given verb to display a list of its operative synonyms, which such synonym list may form a verb purpose class perspective simplification associated with such given verb. From such a faceting constrained list, for example, a user may, for example, select one or more verbs and associate these, for example, by then using other aspects of such a faceting interface to view Domain category list(s), including any subsequent category refinement lists, for noun selection. Since learning and discovery are often concerned with arriving in resource neighborhood comprising suitable or best practically available resources to support user purposes, constrained verb lists may provide highly effective approximate conceptual perspective positioning when conjoined with Domain category information.

In some embodiments, such sets of verbs may be presented to users and/or Stakeholders in lexicons, such as for example simple, medium, advanced and/or these lexicons may be specific to one or more purpose classes and/or Domains categories and/or resource classes and where such lexicon variety may be a user interface and/or programmatic choice for users and/or Stakeholders. Lexicons may include, for example, automatic scaling, ordering, priority and/or other organizing principles, which may be, for example, resource class sets such as purpose class, Participant class, Domain class, Repute class, resonance class, and/or context specific set associated.

In some embodiments, verb set lexicons may comprise verbs that have associated classes with members comprising other associated verbs, for example verb class "Learn" may comprise members "Understand, Train, Educate, Absorb, Study, Master, Familiarize" and/or the like, which may comprise purpose approximation simplification conceptual perspective synonyms. These verb classes may be extensible and/or ordering of verb members may determine priority and/or other metrics. Affinity Groups and standards bodies such as purpose class, Domain class, standards, and/or utility institutions and/or the like, including, for example, Domain society groups (e.g. ACM, IEEE, NSF, and/or the like), for profit corporations (like credentialing and security companies such as Symantec Corporation), or public utilities (such as publicly owned electricity utilities), governments, and/or the like, may manage and standardize verb lists for PERCos embodiment purpose approximation and Core Purpose Expression.

In some embodiments, PERCos categories may reference one or more verb lexicons, which for example may comprise verbs constrained by verb-Category pairs that are in widespread use. For example verb "Eat" may not be generally associated with category "Motorcycles" but may be associated with category "Fish". Faceting "intelligent" user interfaces in some embodiments may organize choices as may be appropriate for approximation computing, and for example, a Domain category and any further subcategories may be first selected followed by a constrained list of standardized verbs that are logically appropriate for the category (similar pair associated verb/category lexicons may be employed in embodiments when the system and/or users first identifies a PERCos category set, including for example a Domain category set, and where only logically appropriate one or more verbs from a PERCos verb lexicon are made available for evaluation and/or selection). In some embodiments, there may be an "override" capability allowing users and/or administrators and/or some other authority to enable the use of an expanded, or unrestricted, verb list and/or direct entry, of one or more verbs by a user, this functioning as a less or unstandardized verb expression capability set that may complement general standardized lexicons, including constrained lists as described. These expanded or unrestricted verb expression capabilities may be less efficient, and have functional limitations from an interoperability standpoint, but when used with well-designed synonym lists, may allow for more natural user expression and may provide adequate matching capability to the classes and/or individual instance sets of resources, purpose expressions, CPEs, purpose statements, participants, and/or the like.

In certain embodiments, PERCos verb one or more lexicons are at least in part determined by general knowledge, Domain category, and/or purpose class experts. Such lexicon determinations may supplement a standardized, general, common purpose base lexicon (and/or base expertise level such as a base medium sophistication level for a given purpose class and/or Domain category class set). Such experts may be employed as consultants and/or employees by such affinity group and/or standards groups and/or web service companies as and/or may be contributors to the standards activities and/or knowledge base sets of such groups. Such experts attempt to, given their insight into the nature of use of verbs in their Domain and/or purpose classes, define a constrained, standardized list and/or relational arrangement, which can be used, for example, in support of user and/or Stakeholder Core Purpose Expression and/or other CPE specification activity in PERCos purpose approximation and approximation related learning for similarity matching and other shared and common purpose computing functions.

In some embodiments, user histories, historical crowd behavior in general, and/or as associated with a PERCos class set, may influence and/or constrain lexicons and/or the ordering of verb alternatives, such that users may be presented with a more effective, constrained and/or ordered verb (and/or respectively, Domain category) selection interface. In some embodiments, instances and/or classes of participants, affinity groups, Stakeholders, societal/governmental groups, and/or the like may create for their own use, for example for parties for which they have a responsibility (such as employees, citizens, members and/or the like)

and/or for wider publishing, lexicons that they have modified from a PERCos standard lexicon and/or which they have originated. PERCos standards bodies and/or other governing organizations may constrain who may create lexicons and/or associate rules of governance with any such lexicon so as to have a sufficiently ordered and/or interoperable and/or efficient PERCos cosmos, or set of cosmos purpose, Domain category, participant, broader or differently oriented resource, Repute, and/or the like embodiment classes or other ontological groupings.

In some embodiments, PERCos provides one or more Domain category and/or global category arrangements and/or combinations of the foregoing for purpose specification and operations. In some embodiments, category class structures like those described by Dmoz may be employed, such category organizations being presented to users, for example, by faceting interface arrangements that allow easy access to specific subcategories, such as selecting Science/Physics/Nuclear/Theoretical. Higher order categories may be represented by symbols, for example, where any such icon could be selected to bring an individual to a specification point in a category/subcategory sequence. For example, the symbol for Nuclear might be a small impression of a molecule while baking might show an icon image of a cake or pie. Such icons could be available for quick access and organized by users to reflect their interests and areas of focus. A user or Stakeholder selecting an icon could, for example, insert it into a CPE and/or open a faceting interface where the users could then select one or more subcategories for use in a CPE, or, for example, employ a stepped, further refined selection process.

Domain category selection supports user and Stakeholder expression of interoperable, interpretable, standardized Core Purpose and other CPE specification processes, as well as in some embodiments supporting similarity matching operations between user purpose expressions associated with any Domain category specification set which may be absent verb sets, that is absent Core Purpose set specification, and where, for example, verb sets are inferred from other context, history of like category user activities, and/or the like, for example, someone who owns home that is already landscape and has been using a landscape service, might, with some embodiments, default to landscape service when landscape or landscaping category is selected, since the property is already landscaped give the systems knowledge of the user.

As discussed, with some embodiments, expert arranged user interfaces provide choice and/or recommendation opportunities for navigating through and selecting action by user and/or Stakeholder sets. This may be supported, for example, in the form of faceting interfaces providing, for example, a classification structure for one or more Domain categories or as general purpose category arrangements that users and/or Stakeholders may use to associate one or more category sets with one or more PERCos verbs for specifying a Core Purpose set.

In various embodiments, Core Purpose specification capability through combining one or more verbs and one or more Domain Categories is particularly useful in purpose approximation for similarity matching with Big Resource purpose classes, resource classes, and/or Big Resource resource instances and/or portions thereof. Users and Stakeholders use such Domain category specifications to focus on one or more verb and/or verb equivalent abstractions, such as learn, teach, purchase, sell, purchase, travel, consume, feel, want to swim, want to play, need to study (and other want to and need to permutations and/or the like), work, design, share, collaborate, communicate, and/or the like, with an operatively appropriate Domain category set, such physics, plano, chair, Chinese food, and/or the like. Such Domain Category specification can be supported by generally known and accepted category organization information arrangements such as Domain category classes, whether inherited and/or relational and/or some combination thereof, and/or alternative information structures such as another ontology design or Lexicon set. Such system sets with some embodiments represent expert (and/or authority, such as standards body) logically structured category information structures available for user and/or Stakeholder evaluation and/or selection, such as when proffered as a choice set by a faceting interface for specification of a Core Purpose and/or CPE.

Category faceting can with some embodiments rely on classical Aristotelian approaches, in which category items are mutually exclusive and in the aggregate complete as to a general system, or for example, to a high level Domain within a system. Users can use, for example, an interface such as a faceting list to select a category, then, for example, a subcategory. A faceting interface may allow plural categories to be identified and conjoined, either in sequential faceting steps or collectively presented on screen (multiple faceting selection columns). Faceting selections could be made such as "chemistry"+"material science"+"silicon"+"solar" with the verb "learn" to form a Core Purpose having a compound category set. The foregoing, if specified on a command line, might use an operator such as "+" to combine the categories, and the categories might be respectively weighted for contribution to processing if desired, for example associating values 1 through 10 to a given category selection through a right mouse button pop-up selection, with categories defaulting at 5 if no selection is made (or using other values as an application might provide). Similarly, multiple verbs might be conjoined using a verb faceting choice array. Further, a faceting interface might default to displaying next to a faceting list selection, a second level faceting list of "members" of the first list, with subsequent level lists available as desired. With some embodiments, frequently used Core Purposes, and/or Domain category and/or other CPE sets, may be saved and published for local and/or distributed/published use, as desired, along, if desired with symbolic icon representation of each such Item, for quick access as a PERCos Construct. PERCos Domain categories may employ prepositions as operators as faceting list choices, for example, activated by a right mouse click and drop down menu choice and/or by selection of a Desktop item for prepositions represented by a symbol/icon and/or test label and/or the like. Alternatively, a faceting arrangement may, for example, present a choice list where "to play" may be adjacent to the category base word "play" for the Core Purpose "learn to play music" involving the verb "learn" and preposition "to" and the conjoined categories "to play+music."

In various PERCos embodiments, Domain categories and subcategories function as the "base" focus of Core Purpose specification, with one or more verbs functioning as the user set activity perspective, with, for example, adpositions functioning as relational clarifiers. Whether or not used, for example, in combination with PERCos other Master Dimension Facets and/or resources and/or resource classes (including Constructs and/or Construct class sets), the intent of these capabilities in many PERCos embodiments is to, for example, constrain choices to practical standardized approximation operators that as a set and in combination maximize ease of use, including simplicity of choice and operation; maximize interoperability, consistency, and reliability; and/or support practical efficient Big Data and Big Resource approximation computing through purpose approximation and associated resolving to purpose neighborhood results for user/computing arrangement adaptive, unfolding processes to optimal interim results and/or Outcome.

In certain embodiments, PERCos category one or more information arrangements, whether in the form of lexicon, class, and/or ontology arrangements, are at least in part determined by Domain category and/or purpose class experts and/or standardization authorities. Such information arrangement determinations may supplement a standardized, general, common purpose base PERCos lexicon (and/or base expertise level lexicon such as corresponding to a base medium sophistication level for a given Purpose class and/or Domain category class set). Such experts may, for example, be employed as consultants and/or employees by one or more of affinity groups and/or standards groups and/or commercial group and/or the like as described above and/or may be contributors to the standards activities of any such groups. With some embodiments, such experts attempt to, given their insight into the nature of use of verbs in their domains, define a constrained, and therefore simplifying standardized list or relational arrangements, which can be used, for example, in user and/or Stakeholder Core Purpose Expression or other CPE specification activity in PERCos purpose approximation for similarity matching and other shared and common purpose computing functions.

With some embodiments, input other than verbs and/or Domain categories may provide a basis for specifying Core Purpose input, such as user historical, crowd behavior, biometric signals, and/or the like derived information. The foregoing may provide a contributing or determining basis for inferred verbs, Domain categories, and/or combinations thereof. For example, it may be visually recorded that each time a user listens to a certain type of music, he may be enjoying the experience—this may be visually interpreted by analysis of user expression, body language, spoken voice tones/frequencies and/or cadence, spoken words in conversations with other people present, and/or the like. This association of reaction to a resource set may be inferred and stored individually associated with a portion or all of the then current resource set and/or stored in the aggregate with one or more resource classes and/or purpose classes and/or similar logical groupings, with such resource set and/or class and/or other type characterizations being available to match with subsequent user purpose expressions, including using such information with AI processes to evaluate potentially most satisfying resource sets, portions thereof, and/or how user interface functions with resource sets.

Contextual Purpose Expressions ("CPE"s) are specifications representing respectively user and Stakeholder purpose concept approximations. In some embodiments, these approximations are specified to approximate user perceptions, user intent, and/or user classes. In certain PERCos embodiments, CPEs have, at minimum, at least one verb or verb equivalent representing user activity perspective and at least one category representing the subject upon which at least one or more verbs is conjoined, the set representing a Core Purpose specification. Such Core Purpose CPEs may be augmented by various other information sets. For example, in some embodiments, Core Purpose's may be augmented by Master Dimension Facet conceptual approximation perspectives and/or by auxiliary Dimension information. In some embodiments, CPEs may be particularly useful in characterizing purpose approximations relationships of resources and in identifying purpose responsive resource neighborhoods that may optimally support user learning, discovery, and/or experience purposeful processes and Outcomes.

CPEs may be prescriptive, specified by users as a characterization of, as well as any specified pertinent conditions regarding, a user set computing arrangement objective set, or they may be published as descriptive CPEs, specifying qualities related to a given resource set that may correspond, at least to a degree, to user CPEs, that is correspond to user purposes and specified other concomitant contextual considerations. Prescriptive CPEs are specified by users to characterize their purpose approximation concept set; they are ephemeral unless published by a user as a resource, or otherwise saved. Descriptive CPEs are published as the subject of, or are published in association as descriptive of, a resource set, including individual one or more resources and/or resource classes.

For example, resources may have one or more CPEs which describe Stakeholder purpose set one or more characterizations they declare as associated with a resource set, including, for example, a resource class set. These characterizations may, for example, portray a resource publisher or other Stakeholder set's perception of anticipated user CPE specifications and/or associated useful information for use in user and/or PERCos Coherence evaluation of a resource sets suitability—which may include, for example, relative suitability in relationship to a plurality of resources—for user purpose fulfillment, including for use in correspondence matching between resource associated descriptive CPEs and user CPEs representing user purpose approximation input. Descriptive Contextual Purpose Statements may also frame publisher and/or other Stakeholder governance, commercial, value chain function, automation, process automation, event triggers to any of the foregoing, and/or any other administrating, constraining, and/or other regulating variables related to such Stakeholder interests, including, for example, rights management, financial budget and/or other information to usage, and/or the like. For example, these Stakeholder specifications may be included in a CPE set framing any such Stakeholder interests as related conditions for, and/or instructions regarding use of, a resource set. As such, some embodiments of PERCos will support the specification of, for example, affinity group or commercial organization process automation instructions that are specialized Constructs that may, for example, within a corporation, or within an industry group such as a trade group or association, or with a club, or as specified by a government within its sovereign area of control, state that, for example, if a then b or any degree of complex derivation thereof. This allows for event based process control functions to be embedded in CPEs and/or Stakeholder Purpose Statements. In some embodiments, such embedded instruction set may be associated with one or more Core Purposes, other CPEs, purpose statements, and/or PERCos Dimension information, such as Facet information and/or any auxiliary Dimension information, including to a purpose expression set associated descriptive CPE and/or purpose statement set that may be used in similarity matching and/or user evaluation of their associated resource sets, to help ensure that the consequences of such embedded instruction set are consistent with, and/or otherwise contribute appropriately to, user purpose fulfillment considerations.

A published descriptive CPE is published, at least in part, in anticipation of its potential usefulness in supporting users in determining correspondence to, or otherwise determining sufficiently similar relationship with, potential users' prescriptive CPEs and/or purpose statements, thus enabling PERCos Coherence (and/or other) matching, either in the form of complete matches or otherwise in the form of, in accordance with associated specifications, relative degree of similarity matching. Such correspondence and matching processes may be applied uniformly between CPEs and/or purpose statements, and/or may, in some embodiments, be evaluated according to rules comparing subsets of such prescriptive and candidate descriptive CPEs in differing manners.

PERCos Master Dimension Facet variables represent conceptual simplifications that supply contextual information in a standardized, interoperable form. Such Dimension information adds conceptual perspective characterization to CPEs, and/or may add such characterization to Constructs such as resonances, Foundations, Frameworks, and/or the like through their associated purpose expressions. Master Dimension Facet specifications enhance insight into the purpose approximation objectives of users and similarly provide additional framing parameters for descriptive Contextual Purpose Expression specifications by Stakeholders.

PERCos Dimensions can provide broad logical groupings of contextual variables for simplification, ease of use, and/or standardization in the formulation of user CPE contextual perspectives as well as the creation of operative purpose statements. They are relationally relevant simplification groups for providing purpose concept approximating values. They may be used to portray orienting user approximating Dimension Facets so as to purposefully direct human/computing arrangement activity. PERCos Master Dimensions and Facets, as well as auxiliary Dimensions, can be used to form more contextually rich Contextual Purpose Expression approximation specifications identifying conceptual neighborhood sets for relevant resource and/or resource portion similarity matching in support of user set learning, discovery, process automation, and/or experience unfolding.

In some embodiments, such contextual Dimension variables may be in part or whole "ignored" in the response to rules and/or in the absence of pertinent corresponding prescriptive CPE user purpose expression information—that is, for example, PERCos matching may be in part based on the presence of certain Dimension and/or Dimension Facet specification indicated in a CPE and when or if some of such specific or comparable Dimension or Dimension Facet information is absent from a prescriptive purpose expression (including, for example, a purpose statement) but present in a descriptive resource purpose expression, its presence in the descriptive expression may be ignored in similarity matching or such non-corresponding descriptive expression portions contribution to similarity computation may be attenuated by application of desired instruction information to producing results based upon such instructions to ignore, attenuate, and/or otherwise transform such expression portion(s) set's contribution to a result set. Further, in some embodiments, PERCos may support selective differing processing of instructions for different purpose expression portions. That is, such instruction information may be collectively applied to a CPE as a whole, or the whole or any portion set of any such instruction set may be applied to one or more subsets of such descriptive purpose expression subsets missing from prescriptive expression values and such applications may apply variably in differing one or more manners to different one or more subsets of such non-corresponding CPE information. This ability to ignore, attenuate, and/or transform the input of such "missing" from prescriptive expression comparable or relatively corresponding expression portions, and the ability to process such items in a selectively differing manners, allows for expression subsets in resource descriptive purpose expressions that may not be consistently germane to overall, for example, current session, specific user purpose considerations for similarity matching to user purpose expressions and therefore are processed in some instruction managed manner so as not to interfere with relevant, that is in some circumstances more significant, similarity matching to subsets and/or subset combinations that may populate user purpose expressions.

PERCos Master Dimensions, through Facet and any associated value set specification, and as may be augmented by auxiliary Dimensions, provide PERCos processes with specifications reflecting the nature of user purposes, that is factors to be considered in producing PERCos processes and Outcomes that support users' respective purpose session sets. In certain PERCos embodiments, these factors may be specified at least substantially through the use of Dimension members called Facets, and any associated Facet values, describe generalizing principal features of a user sets' purpose focus and specified context conveyed in a standardized interoperably interpretable manner. These features reflect user conceptual approximation of their objective set as a basis, for example, for learning and/or discovery and/or experience unfolding, where at least material portions of such purpose characterization specified by a user set is performed by PERCos providing logical grouping of characterization considerations. These logical groupings may in some embodiments, for example, and as organized by standardized Facets, be selected, for example, from a Faceting or comparable selection list of respective Facet choices, and where such list may be constrained in some embodiments to provide only such standardized constrained choices as logically reasonable for such approximation and simplification purposes.

For example, in some embodiments, Core Purpose, or Core Purpose and one or more supplementing Master Dimension Facets and values—which either of the foregoing may be augmented by auxiliary Dimension information and/or any complementary input, such as stored profile information, preferences, usage history, crowd behavior history, resonance set, including synergy instructions, and/or the like—may form the basis for calculating approximation spaces that may be determined to hold, or otherwise correspond to, pertinent resource class and/or instance sets. These information intersections may be represented by corresponding spaces that may be populated by candidate resources, and where such spaces may be operatively represented by one or more most closely, similarity matched purpose classes or calculated purpose neighborhoods determined through correspondence analysis between prescriptive and descriptive purpose expressions such as their respective CPEs and/or Purpose Statements, and, when desired, with augmenting information.

PERCos, in some embodiments, thus can enable users to represent user classes through concept focus and context integration through prescriptive CPE specification. Such specifications may then be used in similarity matching with similar purpose expressions associated with purpose, resource, and/or participant class sets and/or instances and/or combinations thereof. This process may, in some embodiments, contribute to identifying, evaluating, prioritizing, selecting, combining, and/or provisioning one or more such classes and/or instance sets, resource members and/or member portions of which may then be prioritized and/or filtered according to at least a portion of the associated user purpose statement set so as to provide displayed, otherwise managed, and/or provisioned resource member and/or portion sets.

Such resource member and/or member portion sets may represent sets associated with their respective parent classes or may be integrated, from multiple such class sets so as to produce a user purpose, purpose statement responsive neighborhood member set.

PERCos similarity matching processes may in some embodiments support two or more stage similarity matching sequences, where, for example, one or more purpose class and/or other purpose neighborhood sets are first identified, then another similarity matching sequence is started automatically or on instruction of a user set. For example, when PERCos Master Dimension Facets are used by users as a conceptual basis for selecting, and/or for specifying a CPE set which is then intended to be used in a multi-step matching operation sequence, Master Dimension Facets information can, for example, first be used for similarity (including for example, directly) matching with purpose class sets and/or other calculated neighborhoods containing resources declared as members by Stakeholders such as publishers and/or Repute Cred assertions. In some embodiments, this may be followed by further identification, prioritization, evaluation, selection, combination, and/or provisioning applied to all, or a selected germane subset of, members of such identified purpose class and/or neighborhood set. For example, further purpose expression and/or related information, for example from auxiliary Dimension and/or other embodiment Dimension information and/or from user, user group, and/or crowd related purpose expression related profile, preference, historical behavior, and/or the like information, may be employed so as to identify, filter, prioritize, evaluate, compound, and/or otherwise process all or a portion of information regarding members of a purpose class and/or neighborhood set, where such second or more stage similarity matching involves matching against metadata and/or constituent data of such resources, for example in the form of indexed and/or relational database stored information. The foregoing may, in some embodiments, enable users to perform more detailed and/or nuanced characterization of their purpose set which may be performed efficiently on the constrained set of resources comprised of, for example, first stage purpose class and/or other neighborhood results. This means that such auxiliary Dimension information employed with user purpose expressions may provide, for example with some PERCos embodiments and under some circumstances, unstructured, non-standardized Dimension information that would be impractical or inefficient to employ with Big Resource (or other large, distributed information stores), but with the highly constrained interim result set following determining a purpose class or other neighborhood set, would now provide practical, efficient further parameters for use in evaluating, for example, meta-data indexes and/or the like, to arrive at a more precise, less approximate, results. Such two (or more) phase processing may be performed in a manner transparent to users, but provide users with the powerful benefits of purpose related standardized approximation processing followed by further evaluation using unstandardized (that is not PERCos standardized expression elements) and/or partially standardized, for example, auxiliary Dimension information. That is, some PERCos embodiments, for example, may employ a segmentation of user set CPE and/or purpose statement, for example, a set of Master Dimension information, for a first matching set, followed by, auxiliary Dimension and/or related information (such as preferences, profiles, crowd, and/or history related) for a second matching process (and which second set matching in some embodiments may be augmented by Master Dimension information in contributing to calculating the evaluation, such as for a prioritization, of a member set that may result, at least in part, from such first matching process). In such embodiments, this further matching, when using, for example, auxiliary Dimension information, may employ non-standardized elements, but since the group of resources to be analyzed is now a greatly constrained set resulting from, for example, a first matching process, in contrast to Big Resource or other large, diverse information stores, such further matching process, for example involving Boolean open text expression, can now be practical and efficient since the focus is on a specific resource neighborhood set calculated to appropriately correspond to a user set purpose approximation specification set.

Users may, in some embodiments, be able to review, for example be presented with, purpose class and/or other neighborhood members, evaluated and prioritized for example in accordance with standardized Master Dimension information, including for example, Core Purpose information, as well, for example for comparison purposes, be presented with the results of further second stage processing using at least in part auxiliary Dimension information, which when both result sets are provided to a user set, such user set may identify opportunities to enhance and/or modify their auxiliary Dimension information to reflect an unfolding, knowledge enhancement, and/or experience preference development. PERCos may also provide, in response to a single common, or two related user input processes, the results of "traditional" search and retrieval technologies along with PERCos resource and/or resource portion identification, evaluation, prioritization, selection, combination, and/or provisioning as described herein, allowing for differing views into response sets resulting from purpose managed information systems and traditional, distributed web pages and/or other information resources. For example, a user might be exposed to a split user interface window, or separate windows, with for example, each modality occupying separate windows or window portions. Alternatively, a PERCos environment or traditional environment running a PERCos purpose class application, may support toggling between a search and retrieval modality (e.g. Google, Bing, and/or the like) and a purpose based modality using techniques and interfaces described herein. Such an approach might provide user flexibility between performance optimized retrieval modes and learning, discovering, and/or experiencing enhancing purpose related PERCos modes. For these purposes, PERCos might transform a user CPE into traditional, Boolean unstructured text expression for use by such search and retrieval mode or may support a user set providing for example, unstructured, Boolean input. Boolean open text expression can now be practical and efficient since the focus is on a specific resource neighborhood set calculated to appropriately correspond to a user set purpose approximation specification set.

Core Purpose and Dimension Facet generalizing features may function, for example, as concept simplification vectors or axes corresponding to human conceptual purpose factors, such as, in an example, a verb representing a dynamic orienting user perspective factor such as "learn", a category representing a thing, type, and/or place such as "biochemistry", a user characteristic relative to a Core Purpose or Contextual Purpose describing user expertise/sophistication, such as "moderate" (versus beginner or expert), and a resource characteristic relative to the Core Purpose or Contextual Purpose describing a resource, for example, as "complex" (versus simple or medium, and for example, describing the complexity of material relative to a sophistication level). Together, these approximation simplifications may be treated as axes used for similarity matching with, for example, comparable purpose expression information associated with purpose expressions and/or class index sets, resource sets and/or resource class index sets, and/or the like.

These PERCos tools discussed herein in some embodiments may be combined with various web information management related tools, such as search and retrieval, semantic web, knowledge graphs and clustering, expert systems, and/or the like. Such tools without the use of a PERCos technology set, may fail to provide reasonably appropriate resources, much less optimum resources, and optimum resources may seem to, and practically be, unattainable, given the nature of such web information management technologies, at least in practical timeframes and with sensible amounts of effort. PERCos technology can, for an example, combine the operative perspective of a verb set from one or more constrained verb lists, combined with focusing domain category one or more sets, and complemented by suitable user, resource, and/or Repute one or more Dimension Facets such as described herein, and when, as appropriate, augmented by similarity matching with purpose class one or more arrangements, can transform Big Resource, and what may appear to be boundless information diversity, location, and attributes, to manageable, very useful user purpose related sets, which can be further narrowed according to further processes involving subsequent similarity matching, Repute recommendation, fit to history, fit to crowd, AI support, and/or incorporation of user nature and priorities related information.

In some embodiments, purpose expressions, in the form of Contextual Purpose Expressions, include Core Purpose Expressions, which may be further combined with Master Dimension Facet and/or any other PERCos compatible associated specification one or more sets (for example auxiliary Dimension information) provided, as specified by users or Stakeholders and/or their PERCos computing arrangements, for the formulation of their CPEs and/or Purpose Statements. The foregoing specification information may optionally, for example, include specifically identified resource items such as participant, Construct, symbol, one or more instances and/or type resource classes, and/or, for example, may include instructions for facilitating resonance purpose optimization, process automation, societal/affinity rules events, thresholds, and management, and/or the like. Such expressions may optionally in some embodiments use, for example, conjoining operators such a "+" "−" "and" "not", specification instance contribution weights and/or other instructions, and/or clarifying/narrowing adverbs, adjectives, prepositions, and/or the like. Descriptive adjectives may, in some embodiments be limited to, and/or particularly adapted for use with, auxiliary Dimension expression elements such as with Constructs, resonances, process automation, and/or the like. Further, constrained, preposition, adverb, and adjective lists may be employed and such lists may be constrained, at least in part, according to appropriate usage in a given Domain by an expert set and/or other authority/utility/standards set and such may be in some embodiments standardized such that, for example, one adverb, adjective, and/or the like may, as with categories, function as an approximation where the use of other similar terms or phrases would be treated as synonymous, as for example, as defined by experts and/or one or more standards bodies and/or the like. Flexibility of use, or the absence of use, of adjectives, adverbs, prepositions and/or the like may be determined by experts and/or one or more standards bodies based upon their ease of use, simplification, standardization, and/or approximation priorities. For example, as may be considered appropriate in some embodiments, prepositions and/or adverbs may be available for user choice, for example as may be logically appropriate as associated with a Core Purpose set, but no, or a very constrained list of, adjectives would be available, or would only be available for use, for example, in auxiliary Dimension expression to reduce complexity and serve approximation objectives. In some embodiments, such constraint of available prepositions, adverbs, and/or adjectives, as discussed herein, may alternatively and/or in addition be Core Purpose, verb, and/or domain type and/or domain category specific constrained, that is constrained to options/choices normally and/or logically associated with such element, such as, for example, might be presented by a faceting interface context specific choice set for user selection. For example, the adverbs "softly" and "daringly" would make very little or no sense combine with a Core Purpose "learn nuclear physics," while the adverbs "quickly" or "visually" could be informing clarification. For example, in some embodiments, domain experts can readily identify highly constrained adverb lists for use with very specific verb sets, making simplifications for faceting and/or comparable user interface modalities easy and efficient for users and Stakeholders alike, this facilitating PERCos simplification and concept specification. Similarly, adjectives (for languages that have adjectives) can be identified in a constrained manner for specific and/or classes of Core Purpose. For example, many types of adjectives may be inappropriate for use in PERCos purpose concept approximation with Core Purpose sets, or, for example, with Core Purposes as might be complemented with Master Dimensions Facet information, though such adjective use might be expert determined to be appropriate when used with auxiliary Dimension expression components. For example, in some embodiments, adjectives such as "rich" or "fastidious" may be decided to be inappropriate simplification choices for "learn nuclear physics" or "evaluate+purchase Italian car," but for example "fast" and "affordable" are logically appropriate options. As with prepositions, language experts and/or applicable Domain Category experts (such as experts in Science (or, for example more specifically physics), Cooking, Plumbing, Auto Mechanics, and/or the like) can readily screen and limit adverb and adjective and/or the like to practical, quite limited choice lists for easy user approximation specification selection, and such limitation may be determined to be appropriate when applied generally to CPE expressions, domain category specific, or purpose expression type specific (Core Purpose, Core Purpose plus Dimension information, Core Purpose plus Master Dimension Facet information, and/or the like in any reasonable combination). In some embodiments, this capability may be particularly useful for users and Stakeholder ease of use and approximation specification using PERCos simplification techniques for choice selection respective to specific Core Purpose and/or CPE sets, such as those association with a CPE associated purpose class, including for example, when specifically adapted to specific one or more purpose class application given their anticipated user profile information and/or purpose expression specifications.

In some embodiments, such choice management of verb, category, facet, and other list types, can be constrained and/or otherwise organized as reflective of the sophistication of a user in a given purpose context. For example, if a user is unsophisticated, for example, in the area of global economics, the set of category terms, for example in purpose related to such area, may be simplified and constrained when relating to some PERCos embodiment interfaces for activities for category related purpose fulfillment. Such constraining and/or shift in organization presentation, can be based upon such user's purpose and/or domain specific characteristics, that is which each purpose or category domain shift, a different "level" may be employed in use interface operations.

PERCos embodiments may, as associated to such a level of specified or assumed expertise/sophistication/knowledge and/or the like, and provide for user Facet and or other choice selections that are automatically or by user selection provisioned, and where such choice option proffering or automatic provisioning may be associated with at least a portion of such user's characteristic set. For example, such a dynamically adjusting framing of choices option may be selected by a user, or by a user employer corporation or by other organization types, such as an affinity group or association. Such adjusting choice options may be in accordance with specified or presumed user "levels" as associated with a purpose or Core Focus set and an information structure may store such associations with sets for user (and/or user groups).

Such purpose or category adjusting level option arrangement may, for example, be defined and/or organized as a web service by domain or general experts, such as ontology and taxonomic academics and corporate professionals. Such capabilities can be embedded in purpose class applications, plug-ins, operating systems and environments, and the like, which may inspect user information, such as user profile and/or user preference information (such as a request to use contextual adjusting such levels) and/or history of PERCos embodiment usage. In some embodiments, the level may, for example, be at least in part determined by an analysis of estimated relevant user characteristics from some or all such information, and/or the like.

In some embodiments, users may select a characterized resource set by selecting an icon or some other symbolic representation of such resource set where such symbol was published by such Stakeholder, e.g. a resource publisher, as a branding, purpose characterizing, and/or other identifying representation. Users may also publish for their own use (and/or may publish as Stakeholders) Frameworks, purpose class applications, Foundations, resonances, CPEs, and/or other Constructs and associate any one or more of such Constructs with representative symbols for simplification of use, for example, when wishing to associate a group of symbols with a purpose class or other neighborhood. For example, purpose class applications and/or other Constructs by their type and/or collectively, may organized by visually similar symbols, such as using the same symbol in differing colors, for all Participant set, including Participant class, Construct use in association with a specific CPE or associated purpose class or the like. A user be specify one or more Core Purpose and/or CPE combinations and associate a symbol with such specification whereby resources employing such specification may automatically have such symbol associated with them, and where such symbol may be varied in some manner, such as font used for descriptive name, color, size, display orientation (e.g. off axis by a consistent amount per usage association distinction). The use of any symbols representing Constructs herein, may in certain embodiments, produce, that is extract from or otherwise transform such symbol to, its associated purpose specification, enabling such symbols to be inserted as shorthand into purpose expression specification and/or the like, and where such symbol may provide its corresponding specification information as input to other user purpose operations.

In some embodiments, Purpose Statements represent transformations of user CPE specifications where such transformations are effected at least in part as a result of processing input regarding user, user group, and/or user affinity group or other association preferences, profiles, PERCos usage history, PERCos and/or other crowd behavior information, user biometric input, Intelligent Tool input such as AI, and/or any other PERCos Purpose Statement input specification. Both CPEs and Purpose Statements may be employed in similarity matching to descriptive Contextual Purpose Expressions and/or descriptive Purpose Statements, depending upon the operational specifications. Similarly, Stakeholder CPEs may be transformed, at least in part, into Purpose Statements through the provisioning of Stakeholder profile and/or preferences information and/or one or more input types as described above (excepting user biometric information would instead be Stakeholder biometric information). Such preferences and/or other information types described above for users and Stakeholders, individually and/or as sets, may be associated with, for example, resource set, including resource class and/or resource portion sets, including for example CPEs and/or purpose class sets, Participant and/or Participant class sets, Constructs and/or Construct classes, and may include instruction information sets that are resource sets or, as may be employed, are directly provisioned, are non-published, and/or non-PERCos published. Such instruction sets may include, for example, resonance specifications, process automation information, such as commercial process automation event based instructions for Stakeholders interests, privacy right and/or security instructions, and/or financial budget management event based triggers and instructions for users, and/or the like.

In some PERCos embodiments, Master Dimensions provide key logical groupings of Facets and any associated values simplifications assisting users and Stakeholders in representing their purpose approximations. PERCos supports various embodiments of Master Dimension and Facets, with an exemplary embodiment detailed below.

A primary objective of Master Dimensions and Facets is to provide a simple means for users and Stakeholders to specify CPEs as practical approximations of purpose fulfilling resource sets and/or of resource portion sets. Resources, in some embodiments, may be more a more prevalent objective when learning and/or discovering those resource sets whose usage may lead to fulfilling specific user purpose Outcomes, the latter, resources portions (including information derived at least from such resource portions—see definition), may be of particular interest when working with a resource, such as a purpose class application, in order to realize a specific Outcome, that is user purpose process end result, and where the resource portion may be specific information one or more instances provided by the purpose application as specific to user purpose knowledge/information enhancing and/or evaluation.

Master Dimension logical groupings may comprise, for example as an embodiment and without limitation:

1. Core Purpose Expressions, including verb and Domain Category groupings to approximately characterize key focus for core user and/or Stakeholder Core Purpose objective area(s), and where such verb list may, in some embodiments, be a substantially constrained list of verbs representing a practical and manageable array for user selection, and where in some embodiments verb sets are arranged as approximate synonyms, and where such approximate synonyms may operably correspond to a consistent operative "representative" (which may or may not have a user interpretable form). In some embodiments, verb choices may be limited, or further limited, based upon prior user history information regarding PERCos use and/or based, at least in part, on a category selection made during a prior purpose related PERCos step set to such verb selection, where such constraining of verb selection choice was, or is being made in a consultative manner, formulated by intelligent analysis of the association of such verbs with such category options, made by general and/or domain experts, and/or by other one or more authorities, and/or the like, and such curbing of selection options is based upon at least one of user and/or Stakeholder ease of use, simplification, logical framing, approximation efficiency and/or value, and/or the like considerations. Similarly, if a verb is selected first during a PERCos CPE specification process, category options that may be available may, for example, in some embodiments, be limited to such categories that may be based upon at least one of user and/or Stakeholder ease of use, simplification, logical framing, approximation efficiency and/or value, and/or the like considerations, and such category curbing determinations may be made by general and/or domain experts, and/or by other one or more authorities, and/or the like.

2. User Characteristics, for specifying principal user characteristic considerations as evaluative and/or filtering variables as contributing input for identifying purpose class sets (which may be publishers as PERCos resources) and/or other neighborhoods and/or resource instance sets. Such Facets may comprise, for example, sophistication level specification related to user purpose, such as beginner/moderate, advanced; user age such as ranges (20-30, specific year) or textually name age periods such as senior, middle age, young adult, teenager, and/or the like; user language, such as English, French and/or the like; time or time range (e.g. time budget available for usage and/or for resource publication payment related fee(s) and/or the like); financial budget (dollar amount available to be applied, desired amount to applied; education degree level (e.g. BS); education degree category (e.g. chemistry) and/or the like, which may be specified in one or more ranges); breadth of approximation results, that is for example, use higher order rather than lower order super or relational class one or more sets for selecting and/or prioritizing member resource sets, for example, candidate PERCos process results resource candidates, where the foregoing may be user specified by selecting from, for example, "broad, medium, or narrow" as to the size and flexibility extent of the Coherence and/or other PERCos Services (and/or or published) net results for candidate resources in response to a user purpose fulfillment process set. This provides the option for more or less generalization and broader set of resource candidates as may be circumstantially specified as appropriate; and/or the like and where one or more such simplification Facet categories are standardized for interoperability, approximation computing, and Stakeholder and/or user and/or other party ease of use and which, for example, may rely on Facet constrained user and Stakeholder choice selection sets and/or numerical value input.

3. Resource Characteristics, including, for example, length (e.g. short, medium, long, very long); size (e.g. pages, megabytes, time to play, as, for example, numeric values); availability (immediate, time period (e.g. range, estimate, in days); cost (e.g. price individually, in volume, to specific groups); complexity (e.g. simple, moderate, substantial); sophistication to purpose (beginner, moderate, advanced); Quality to Purpose (for example, from certain Aggregate Cred ratings overall, to quality type, to one or more author, publisher, and/or provider set (such as 9 out of 10 from expert EF characteristic qualified domain specific reviewers for Cred assertion type); Role of resource, such as standardized constrained list of types such as Contributing Word Processor, Domain specific encyclopedia, and/or the like); Compound resource, indicating whether a resource is comprised of contributing component resources (single or has multiple providers, publishers, authors, and/or the like); has rights and governance, indicating a resource is copy protected, open/unprotected, uses advertising, collects user information generally and/or selectively (as per contributing resource); and/or the like and in such embodiment such simplification Facet categories are entirely or in other simplification supporting embodiments primarily standardized for interoperability, approximation computing, and/or Stakeholder and/or user and/or other party ease of use and which, for example, may employ constrained, that is limited and standardized Facet sets for user and Stakeholder choice selection sets and/or numerical value input.

4. Reputes Repute Creds provide for standardized, interoperable approximation assessments of resources, resources portions, and facts and/or non-resource items, all the foregoing treated as subjects of Creds as they are evaluated in relationship to specification and/or derived context, and in some embodiments where such context specification may be limited to purpose expression sets. Reputes are, in some embodiments, a form of resource and employ resource elements, but are listed in some embodiments as a separate Dimension because of the nature of the logically related functional distinctions of Repute use including certain distinctive qualities in specification, including Facet types, the foregoing for the evaluation of other resources. In some embodiments Reputes may be particularly useful when Repute Creds, EFs, and/or FFs are employed in PERCos processing, such as Coherence and/or other PERCos Services functions, related to resource sets and/or resource portion sets, and where such resource items may be evaluated, prioritized, selected, provisioned, combined/or used with other resources, including provisioning evaluation and/or decision applied resource and/or non-resource use for one or more Roles in Frameworks (including class applications), and, for example, where such is at least in part based upon such Repute information. In some embodiments, Repute Creds, for example, carry information describing assertions made by a Cred publisher set (themselves and/or on behalf of a creator set) regarding a subject matter's, e.g. a reference book's, software application's, Participant's (e.g. human individual or group), hardware arrangement, computing environment, specialized device, and/or the like's, Quality to Purpose, Value to Purpose, Quality to Contribution to Purpose, Quality of Publisher to Purpose—or in general, Quality of Creator to purpose—or in general, Quality of Provider to Purpose—or in general, Integrity of Creator, Integrity of Publisher, Integrity of Provider, Reliability, in general context and/or to purpose (e.g. level of relative fault tolerance and/or consistent reliable operation), and/or any combination and/or the like, and where one or more such simplification Facet categories are standardized for interoperability, approximation computing, and Stakeholder and/or user and/or other party ease of use, and which, for example, at least a portion of such Facet categories may rely on Facet constrained user and Stakeholder choice selection sets and/or numerical value input, such as choosing "level 7" or inferring such numeric value for Quality to Purpose from a choice variety of levels 1 to 10, and/or the like. An EF is based upon subject matter being stipulated to, and be testable and/or has been tested to demonstrate, and/or has been issued by some trusted authority in some form that demonstrates that, the subject matter is factual, that is true or false.

EF is declared an axiom that is a testable, assertion treated as fact. FF is based upon a spiritually based belief and treated as an axiom. EFs, and in some embodiments and circumstances, FFs, may be employed with Creds as assertions regarding one or more characteristics of a Cred publisher, creator, provider, and/or subject matter. In some embodiments, Creds types may be selectable, where Cred type may be selected from a faceting engine interface, for example, as individual Creds, aggregate Creds, or compound Creds, as well as in the form of Cred on Cred, aggregate Creds on Cred, and compound Creds on Cred. Creds in some embodiments may also take the form of derived Creds where assertion information in Creds is interpreted according to some rule set and transformed into an at least in part a derived form based on such rule set, which may include transformation of aggregate Cred information, and/or the compounding of differing but substantially similar Cred subject assertions to form an approximate aggregate Cred regarding a "higher level" subject matter inclusive of the subjects of such underlying Creds, for example employing a Cred using representing a broader taxonomic and/or ontological specification for its Cred subject, which may, for example, comprise a category superclass of the respective Cred subjects, which Cred assertions may be associated therewith. For example, Cred sets on Italian Sports Cars, French Sports Cars, British Sports Cars, and German Sports Cars (e.g. fast, fun, and well handling vehicles) as to their Repute Facets Quality to Purpose and Reliability to purpose may be aggregated to a derived aggregate Cred that forms an information resource published, in some embodiments, by a Stakeholder and/or by PERCos service, such as a cloud service or utility and/or the like, with the foregoing deriving such information automatically (and/or on user instruction) based on interpreting the subject matter of such certain Creds to be subject subclasses of European Sports Cars. Such derived aggregate Cred set might be useful, for example, in response to a user purpose 'Learn' 'Sports Cars' where sports cars form a category conjoined with learn to form a Core Purpose, such derived Cred information could be employed to input prioritization information regarding European versus Japanese sports cars, for example, if it specified a derived aggregate Quality to Purpose value or a reliability in general value, for example, if a user set specified such Facets in their purpose expression information as information to be used in similarity matching and/or other evaluation processes. For Reputes, various embodiments may support differing levels of Facet choice selection options and/or value ranges in order to support shaping of user interface complexity to user priorities, experience, expertise as to Domain and/or purpose, and/or the like. As with other PERCos resources, generally speaking a less controlled, that is less constrained and more broadly flexible vocabulary may allow for more expression variability, for example in purpose expression, but may require, in some embodiments, synonym analysis and/or more extensive semantic analysis. Such tools may also be used if differing Cred purpose expressions and/or subject descriptions are to be interpreted for integration. PERCos embodiments, where resource subjects have unique identifiers, may be interpreted within the context of their taxonomical and/or ontological higher order grouping sets, for example using super classes having the applicable Cred subject classes as members and but were such Creds share Facet type assertions on their subject.

5. Special Facets represented, for example, by corresponding symbols and/or alphanumeric text whereby selection/entry of a special operator may, for example, include relevant preference, profile, crowd behavior (as, for example, related and relevant to a specific CPE and/or Purpose Statement—for example as associated with a purpose class that such CPE is a purpose expression member, and/or as related to a CPE and/or Purpose Statement component expression set such as one or more included CPE Core Purposes). A PERCos arrangement may include a constrained number of such symbols, which may in part be organized, for example, under Dimension simplification groupings such as one or more for each of the auxiliary Dimensions identified below, such as a set for Master Dimensions and/or Facets and/or respectively for more granular logical simplification groupings such as specific instances, classes, and/or other ontological groupings of any resources, which may include resource or any non-resource (if applicable to the item and when not specifically published as a PERCos resource) forms of Constructs, such as Frameworks, purpose class applications, Foundations, and/or the like; Reputes such as, for example, aggregate Creds (which may be through background processes automatically updated); resonances; profile information; preference information; administrative programs and/or information; process automation operations; specific societal/affinity group associated purposes; and/or the like; and where such symbolized items represent may be PERCos resources, including for example, purpose class application or application groupings. For example, a side viewing abstract image of a face might represent "insert relevant profile information." A constrained number of such symbols, for example as symbol for "insert expert recommend resonance information" might be a general, expert system managed provisioning of resonance instruction information, and any associated data, for optimizing a CPE, and, for example, contributing to the formation of a related, optimized for user purpose operative purpose statement. Special Facet symbols/alphanumerics may represent and be consistently used as any user specific and/or Affinity group formulation (whereby, for example, such respective users and/or Affinity groups PERCos arrangement may translate any such Facet into one or both of PERCos interpretable and interoperable standardized PERCos expression information), and/or free form parameterization, which may then, as appropriate, be employed interoperably with other "external" PERCos arrangements.

Relational operators may, in some embodiments, be used in Dimension expression specification to clarify/enhance contextual simplification (prepositions e.g. "under, with, to" and/or the like, positions and/or durations in time or location, and/or adjectives including colors, size (big, medium, small, short, moderate, long), emotional attributes (happy, sad, exciting, unexciting, stimulating, challenging, thought provoking, counter-pointal).

While various embodiments may provide differing sets of PERCos purpose Dimensions with different logical organizations and simplification characterizations, including various ways of representing and/or modifying them, for example, within PNIs, the contextual organizational and expression simplifications can in some embodiments primarily derive from separation in certain logically related groupings, such as groupings of user descriptive information as that which most significantly reflects the general and/or purpose specific characteristics of one or more users, the characteristics which are associated with published resources, the characteristics associated with Repute, the qualities of context reflected by Core Purpose specification, and the use of special symbols/descriptive representations, all the foregoing allowing for, in some embodiments, standardized, interoperable, purpose expressions. Other embodiments that provide certain or all of the PERCos expression capabilities may support inferring of purpose from context, such as (a) inferring verb and/or prompting for verb selection, and/or other characteristic set, from a at least in part inferred, logically appropriate choice list, (b) use of synonym such as word and phrase thesauri, (c) semantic analysis, user and/or crowd behavior related to resource, purpose expression, and/or purpose class and/or neighborhood and/or the like.

These Dimension groups and Facets assist users and Stakeholders in easy logical specification processes; they may first identify what in many circumstances and embodiments may be a first user purpose expression activity, identifying a Core Purpose such as "learn Ford auto mechanics," which may then be followed by specification of certain Dimension specific characteristics, including the use of logically related Dimension Facet types, for example, within user characteristics Dimension Facets characteristics such as "medium sophistication/experience," and "time<100 hours" and "budget<$200, which all the foregoing may be associated with the Core Purpose, followed by a user specifying, for example, resource characteristic, 'moderate' resource complexity'" and further specifying Repute Cred "Quality to Purpose" (levels "4" out of a 1-5 choice set), then specifying a further Repute Dimension using a publishing category Faceting list associated with the Core Purpose with the selection of "major automotive publication" and "national/regional newspaper" as respective EF characteristics of Repute Cred resource publishers.

As an example under an embodiment of a PERCos resource learning/discovery user CPE where a user set specifies using both Core Purpose and user and resource Dimension Facets:

"Core Purpose: ('Learning'+'Applied Synthetic Biology Research Skin Tissue Replacement')+user Facet: Beginner to Purpose+user Facet: Education, College BS+resource Facet: Time Frame P (for publication timing)>twelve months+resource Facet: Time Frame T (timeliness of underlying work) within 48 months; Repute Facet: Tenured Professors (in synthetic biology) Value to Purpose." In one embodiment, for example, a purpose class 'Learning Synthetic Biology" and a Category class "Synthetic Biology" are identified through similarity matching to the Core Purpose 'Learning'+'Applied Synthetic Biology Skin Tissue Replacement' as the closest, in such embodiment, classes having members covering the Core Purpose focus area. For example, the members of both classes can then be matched against an index for each of the classes matched against a purpose expression for the Core Purpose and standardized Facet values. An article in the hypothetical journal "Online Applied Synthetic Biology Updates," is a resource member of both classes, and is rated by such Domain tenured professors as the most valuable article for the less sophisticated, that is beginners, in learning about recent developments related to the Core Purpose. Interestingly, for the hypothetical example, the professors rate this particular article highly for the moderate and sophisticated, because it well serves the purpose of all Core Purpose interested parties, since it is very well written, has a concise overview in the beginning, and for the more sophisticated, has an extended section of more technical information. In this embodiment and with this hypothetical example, the second most highly rated resource through such same similarity matching for beginners with a college science education is a publication entitled "Introduction to Applied Synthetic Biology," Chapter 6, Skin Therapy.

As discussed, user purpose expressions may in some embodiments include, and/or may otherwise be transformed by (as, for example, in generation of Purpose Statements), non-standardized input such as, historical input, and/or auxiliary Dimension information and/or the like. Such auxiliary Dimensions, for example, do not employ simplification Facets since by nature they may take an unlimited or available in large numbers of possible forms. In some embodiments, information under these Dimensions are PERCos interpretable and employ standardized commands, syntax, and/or other language elements and which be supported and/or otherwise at least in part managed by one or more standards managing arrangements such as society, association, club, and/or utility sets. Some embodiments make employ resource, participant, Stakeholder, user node, and/or associated forms of meta-data and/or other information that may be in non-standardized form as contributing input into user or Stakeholder Purpose Statement or other purpose expression formulation, where such input is interpreted, at least in part, by some PERCos embodiments processes with the aid of semantic, expert system, and/or other tools and associated information stores.

Auxiliary Dimensions that contribute to contextual purpose specification augmentation may be embodied, for example, according to the following categories and/or the like combinations, for user and/or Stakeholder interface and concept simplification and expression purposes. Instances of such Dimensions and/or portion thereof may, in some embodiments may, employed as PERCos resources. An auxiliary Dimension example embodiment can take the form of:

1. Process Specifications: Published as resources, for example, as resonance purpose optimization facilitators, Process Automation instruction sets, Societal/Affinity instruction sets, auxiliary purpose expression building blocks, and/or the like, including, for example,
   a. Affinity/Societal instructions, including, for example, corporate, trade, club, political, nationality and/or the like related grouping characteristics (e.g. involving groups as to their conduct and/or interaction, (e.g. sub-Dimensions policies/rules/laws, cultural mores or preferences, roles and/or hierarchies, and/or sharing, collaborative, participatory, and the like.)
   b. Process automation instructions, for example, instruction sets that in consequence to the use of one or more resource sets, provide input information to processes that influence non-PERCos same purpose session sequence processes in order to support realizing one or more results flowing at least in part from such instructions input and one or more associated processes. Such processes may be external to the PERCos cosmos, crossing the 3rd Edge (1st Edge with users, 2nd Edge within PERCos cosmos such as inter PERCos digital communications).

c. Resonance specification instances, including synergy specifications, for purpose optimization, for example, computer software instructions for example, specifying one or more characteristics and any associated weighting and/or transformations used in Coherence purpose evaluation processes, where the presence of any resource associated characteristic set, including any associated values and/or weighting, may contribute to user purpose satisfaction and may be used to filter and/or otherwise positively prioritize a related resource set or class set, and where any specified other characteristics that may be considered to negatively affect user purpose satisfaction in a manner specified can be reduce in the matching priority of a given associated resource set or class and where any such resonance specification may be associated with specific purpose expressions and/or purpose classes and/or resources associated with such purpose expressions and/or classes and/or purpose class applications and/or with Affinity/Societal, Participant, and/or other resource instances and/or classes.

2. General Data Items and any associated instructions which may be employed generally and/or associated with any given specific resource set such as purpose, Participant, Construct, PERCos computing arrangement, and/or other resource items and/or classes. These data items may in various embodiments include published local and/or remote contextual resources, and/or data items. Such resources and/or data items which may be generated on demand from any such information, where such data items may be employed for PERCos computing arrangement internal usage, for example as may be the case with information extracted from user computing arrangement profiles, preferences, user usage history and/or related behavior, and/or the like information, and/or as more generally published, again as profiles, preferences, user history, crowd history, expert input, the forgoing provided in a form interpretable by, or transformable to be interpretable by, PERCos services such as Coherence. Data items may be represented by corresponding, user interpretable and usable expression symbols and/or alphanumeric representations whereby, for example, profile information or preferences information may be incorporated in purpose expressions through the selection of a corresponding symbol, such as an icon for user preferences associated with a user class and/or resource class.
3. PERCos Constructs: Published as resources as Foundations, CPEs (including Core Purposes), Frameworks, (perhaps we should allow frameworks to be embedded in other frameworks rather than using the terminology of stages, if that not how its characterized, saying some frameworks are satellite frameworks (not stand-alone, but for example plug-ins, while others are used as the overall frame or in both roles), and/or the like.
4. Free form parameterization: for example, as may be specified in Boolean expressions, and which may be published as resources, and/or may be data entered ephemeral information sets, where such may be processed as a separate set of purpose expression conditions and/or may be modifying one or more other Dimension sets, Facet sets, and/or other syntactically logical portion sets of CPEs and/or Purpose Statements Biometric inferred information indicating using camera and/or audio and/or spoken word analysis to provide mood and/or reaction input.

PERCos may, in some embodiments, organize Dimension simplification and logical groupings around, for example, Core Purpose Dimension combined with process/outcome Dimension. Such process/outcome Dimensions might take the form of:

Process/Outcome Dimensions:

1 Intellectual/Abstract (e.g., Dimensions thinking, knowledge/information acquisition, relational perspective enhancement/modification, logical processing), 2 Experiential (i.e., the experience, per se, such as Dimensions satisfying, happy, stimulating, long, short and/or specific time based, hot, cold).

3 Actional (the primary focus of a session is to take an action, that is Dimensions commercial, group, and/or personal purchase, publish, output a result, communicate, initiate a remote process)

Other Process/Outcome Dimensions

1. Social/Interactive (e.g. Dimensions sharing, collaborating, co-participating, friending, communicating, supporting, engaging (e.g. a new friend), and the like.)
2. Acquiring/Evaluating/Developing (e.g., Information/Knowledge, and the like.)
3. Entertainment (e.g. Dimensions listening to music, having fun, observing (such as a sporting event), watching (such as a movie), and the like.)
4. Transactional (e.g., Dimensions include commercial, for example acquisition of goods and/or services, and the like.)
5. Affinity/Societal Group (e.g. involving groups as to their conduct), for example Dimensions policies/rules/laws, cultural mores or preferences, roles and/or hierarchies, and the like.)
6. Tangible (e.g., Involves instruction sets that in consequence to the use of one or more resource sets, provides input information to processes that influence non-PERCos purpose related processes in order to support realizing one or more results external to PERCos flowing at least in part from such instruction set and one or more associated PERCos processes, and the like.).

Dimensions, with some embodiments, not only may provide logical scaffolding assisting users in outlining their purposes, but also may function as weighting and/or algorithmic expression groupings reflecting a user's composite purpose focus and simplifying and improving efficiency of PERCos processes and results, and in particular when used with huge to "internet boundless" resource opportunities. In certain ways, such Dimensions may at least in part comprise a "Basic Level" common orientation, simplification means as commonly understood by users in a manner conceptually similar to Basic Levels in Postulate Theory. In some embodiments, such Dimensions, such as Master Dimensions, which are represented by one or more standardized Dimension Facets, can be expressed in any logical combination, and may comprise Master Dimension and their Facets and/or Dimensions purpose expression sets which may be augmented by one or more Dimensions attributes/values. In some embodiments, the foregoing may be supplemented in PERCos processing, at least in part, by otherwise normally interpretable natural and/or Boolean language expressions, with or without associated values. Dimensions and and/or their specified constituent standardized components may, with some embodiments, be expressed, for example, with associated weighting algorithms. For example, Dimensions may have user conceived weighting groups (e.g. with associated contribution values), for example a combination of Dimensions, comprising a Core Purpose arrangement plus, for example, Dimensions weighting of 90% Social and 10% Intellectual, or 25% Intellectual, 70% Transactional, and 5% Experiential, or 50% Intellectual and 50% Societal. Such Dimension attribute values may be employed in matching and similarity, prioritization, provisioning, and the like. as may at least in part relatively, or absolutely, correspond with comparable Dimension attribute values associated with resources, for example published by Stakeholders as germane descriptive information as expression components of CPEs.

For example, a user with a Core Purpose of Buy Camera might be primarily focused on the Intellectual (e.g., evaluative such as what are the important features? brands? models? specifications? comparative pricing), and on the Transactional (e.g., actual venues for purchase and their requirements), or on the Social (e.g., acquiring, through communication with friends, their perspectives on candidate cameras), or on Sharing the transaction activity, such as buying together with a friend, and the like.). Similarly, if one wanted to go to a pop music concert and was evaluating options, one might emphasize Intellectual, degree of emphasis placed on evaluating options, Social, co-participating with certain friends, experiential, partying and dancing, and Transactional, how much and where to purchase and set priorities of 50% for Experiential, 20% for Intellectual, 30% for Social (right friends co-participating), and such input could then in some embodiments be combined, for example, with Repute input, CPEs, any stored profile, crowd behavior, and/or affinity/Societal information, and with any other Dimension input, to provide input to formulating an operating Purpose Statement for purpose class selection, matching and similarity, Participant (to become active users) selection, and/or provisioning, and/or the like. Such Dimensions specification may as above weight the Dimensions, and/or weight Dimensions Facets or attributes, such as Experiential/dynamic dancing 15%, Social, with friends 45%.

In some embodiments, the relative weighting of Dimensions can influence, in part, the treatment of various resources (for example, how Intelligent Tools, such as expert system faceting systems and/or at least in part Postulate Theory and/or related Conceptual System based class or other ontological systems, constrain and prioritize the offering of selections, and/or presentation of, verbs, categories, purpose Facets, and/or divisions) and/or how such Intelligent Tools support user identification, evaluation, prioritization, expression formulation and/or selection processes.

Specified combinations and/or other algorithmic expressions of Dimensions can be published and employed as resonance instruction sets associated generally with a purpose class. For example, high weighting in a social dimension might lead to increased weight being given to certain resources (including, for example, other participants) related to high resonance factors, e.g. going to a concert/dance with a Participant off a certain friend list, or having a Participant with certain personal characteristics indicating they were good dancers and good to party with, and where such resource characteristics would be responsive to resonance instructions.

A PERCos matching and similarity web service that can be supported in some embodiments is provided by one or more utilities, associations, and/or corporations, and functions as a rating service arrangement that, for example, for resource publishers and/or the like and/or web advertisers and/or participant information aggregators, create purpose relating information systems that associate resource instances and/or resources groups, including, for example, ontological and/or taxonomic and/or organization sets of resources, including any resource type, such as participants, with any type of purpose expressions and/or classes and/or other neighborhood groupings, where such association information may be augmented by other resource and/or purpose related data such as user and/or crowd related historical behavior system usage information, preferences, profiles and/or the like. For example, such processes may evaluate a Participant, when active as a user, related to a participant self-published Cred(s), related Cred EFs, third party Creds on the participant, and/or participant profiles, preferences, and/or use history, such as the participant has a Ph.D. degree in biochemistry, an avocation in near earth objects, and frequently learns about astronomy issues using Popular Science and some advanced science publications, wherein such participant as an active user specifies a PERCos CPE of 'Learn' 'astrophysics near earth objects' 'user Facet: Sophistication 7' (on a scale of 1-20)".

Such a web service can manage methods that will process purpose expressions, including, for example, Core Purpose and such associated Dimension Facet and/or other available participant related information, including, for example, Dimension Facets and/or auxiliary Dimensions and/or the like and/or preferences, profiles, history and/or the like and similarity and/or other processes and evaluate such information against descriptive CPE and/or purpose statements and/or resource metadata, to identify most practical purpose fulfillment match, and/or, for example, priority ranking of candidate resources and/or resource portions, for that specific Participant as an active user expressing such a CPE and/or having such user's PERCos arrangement specific operative Purpose Statement.

Core Purposes are comprised of verb and category combinations, which verbs may be in some embodiments, at least at times inferred. Such Core Purposes may be augmented by the contextual Dimension Facets described in the following sections. Core Purpose conjoined verbs and categories, in some embodiments comprised of constrain verb options that are associated with category descriptions, such as physics/molecular, may be employed in some embodiments with prepositions and/or adverbs and/or other informing grammar terms, for example, selected from option lists through the use of, for example, faceting interface arrangements, and where the available grammar options are logically relevant, given the Core Purpose, and may be constrained in variety, for example most useful terms of a grammar type, so as to support the simplification and approximation capabilities of PERCos arrangements. Similarly, for example, Domain category options may be constrained to those logically sensible given a user chosen verb set. Correspondingly, verb options may alternatively or also be constrained to those logically sensible given a given category specification, and/or in some embodiments may be inferred from a category, which may be presented as a short, e.g. "beef steak" which might in some embodiments have the verb options of "purchase, cook, eat," while the conjoined categories or sub category "health" "beef steak" or "health beef steak" might have verb options of "learn, teach, communicate". For example, it may make sense to "learn" or "teach physics," but it likely doesn't make sense to "purchase physics". Similarly, while it may be appropriate to "research physics," or to "purchase physics textbooks," it may make no sense to "travel physics" or to "meet physics textbooks." Language and/or Domain experts can, normally, readily identify logically appropriate verb sets for category and/or category sets for a verb set that are logically likely and/or sensible options, and similarly through such an arrangement, some embodiments may interpret and provide constrained options of adverbs, prepositions, and/or adjectives, given specified categories, verbs, and/or Core Purpose and/or other purpose expression sets.

In some embodiments Master Dimension Facets describe primary purpose properties normally used as approximate characterizations which, when used in combination with Core Purpose, may substantially illuminate the context of a specified or inferred prescriptive, and similarly inform descriptive, Core Purpose Expression. The following are Master Dimension Facets as may appear in some embodiments using some or all of the faceting options discussed herein:

User Facets may include, for example:

a. user sophistication/expertise related to Core Purpose, such as beginner/middling/advanced/expert;
b. user Role, such as member/participant/administrator/executive/head/decision maker/student/teacher/relative/spouse/sibling;
c. user focus, such as simple/middling/complex/narrow/medium/broad/local regional/global/universal/small/moderate/large/Quality to Purpose/Quality to Value/Quality of Publisher/Quality of Creator/Quality of Provider/Point-Counterpoint;
d. user viewpoint, for example, negative/neutral/positive/unassertive/neutral/as sertive/uncertain/inquisitive/certain/concerned/unconcerned/cheap/reasonable/expensive (relative to subject);
e. user experience (subjective feeling), such as stimulating/exciting/tranquil/happy/calm/unemotional/sad/challenging/und emanding/funny/irritating/

Resource Facets: In some embodiments describe characteristics of published resource instances and Classes, the foregoing for approximation expression purposes:

a. short/medium/long;
b. inexpensive/normal/expensive;
c. simple/intermediate/complex;
d. singular/compound;
e. current/recent/in between/old/ancient;
f. audio/video/printed/direct human;
g. electronic/mechanical;
information/process/software/hardware/firmware/service; and/or the like.

Repute Facets, which may be associated, singularly, or where appropriate in aggregate or combination, with any Cred type Repute, may include (where "or generally" different, not mutually exclusive, separate Facet), for example:

a. Quality to Purpose—e.g. numeric value −10 to +10
b. Quality to Value
c. Quality to Contribution to Purpose
d. Quality of Publisher to Purpose (or generally)
e. Quality of Creator to Purpose (or generally)
f. Quality of Provider (e.g. reseller) to purpose (or generally)
g. Integrity of Creator (general or to purpose)
h. Integrity of Publisher (general or to purpose)
i. Integrity of Provider (general or to purpose)
j. Reliability to Purpose (general or to purpose)

In some embodiments, the foregoing Facet examples might be available in any combination, with or without variations in labeling or type. Such Facets may be organized as generalization approximation characterizations of key user/Participant concept sets, such as organized in a standardized expression and interpretation manner and may be further organized in focal logical groupings corresponding to human general and/or Domain general, key attributes, and employed in specification to, for example, provide input into identification, filtering, evaluation, prioritization, selection, provisioning and usage of resource and resource portion sets.

In some embodiments, PERCos published resource items may have four basic information types, resource identifier, publisher (which may have a unique identifier), subject matter, and at least one purpose expression, and may further have complementary types, such as creator, provider, contributor, ontological and/or complementary taxonomic information, and/or the like, as may be specified in some embodiments and/or specified by affinity groups, corporations, societal organizations, standards bodies, and/or the like.

In some embodiments, purpose expression specifications may use, for example, Domain category instances that may be used with, for example, clarifying prepositions, including adposition sets, positions and/or durations in time or location, and/or adjectives such as colors, size, emotional attributes, and/or the like as various embodiments may provide. Standardized Master Dimension Facet and/or other Dimension lexicons may be further constrained in some embodiments by selected verb, Domain category, and/or Core Purpose sets specified or otherwise selected by user set and/or user computing arrangement as a constrained set offering the logically associated optional contextual simplification variables for a given selection set (e.g. one or more previous selections). Users may define their own simplification sets that may employ their own choice list synonym, relational association, word/phrase, and/or like lists for customizing their own, or groups, purposes.

In some embodiments, one or more verbs can be associated with one or more Domain categories as descriptive Core Purposes in CPEs declared as descriptive of purpose class applications (and/or other resources) by one or more Stakeholders. Users may select such a characterized resource set by selecting an icon or some other symbolic representation of such resource set where a symbol, for example, was published by a Stakeholder, e.g., a resource publisher, or by a user set, as a branding, purpose characterizing, and/or other identifying representation. Users may also publish for their own use (and/or may publish as Stakeholders) Frameworks, purpose applications, Foundations, resonances, CPEs, and/or other Constructs and associate any one or more of such Constructs with representative symbols. By selecting such resource set, a user may be specifying one or more Core Purpose and/or CPE combinations, which such selection may produce, that is extract or otherwise transform to a purpose specification set that may be derived from other PERCos environment information and employed as input to other user purpose operations.

In some embodiments users may arrange information of their choosing (subject to context and any associated rights) into purpose expression organizations, for example as classes, ontologies, taxonomies, and/or the like. Should a user wish to publish such organizations there may be one or more formalisms that are applied during publication to ensure standardization and/or interoperability for the wider and/or intended audience.

Experts may use standardized and/or interoperable purpose expression organizations for their information, such that they for example, conform to the specifications agreed with a domain of expertise, interoperate with one or more purpose applications, may be appropriately interpreted by one or more intended users, and/or in other manners provide an effective and efficient organization for purpose operations.

A user purpose expression represents "the tip of an iceberg", the visible portion of complex set of human behavioral and thought processes. The orientation of purpose may evolve during purpose processing and may occur across portions of one or more PERCos sessions. User understanding of purpose is often constrained by the degree of expertise a user has relative to their purpose expression (and the Domain set of that purpose). During one or more sessions, a user's purpose may increasingly be represented by, due to the unfolding set of processes, an increasingly optimized purpose expression that is a more accurate or more satisfying, evolving representation of users' intent development.

An external resource service, such as a PERCos embodiments synonym service, may be invoked by other PERCos embodiments resources, such as Coherence, and may provide options and/optimizations to users, such as for example when CPE comprises "booking" (verb) and "Travel" (category), PERCos embodiments may prompt "Purchase" to user in substitution of "Booking".

In some PERCos embodiments, lexicons can comprise the terms most commonly used in the identification of purpose experiences, and in common with other PERCos embodiments languages, provide standardized and interoperable means for users to manage, discover, select, and/or otherwise manipulate and/or inspect for later use, appropriate experiences and their resource (e.g. Participant, content instance, and/or the like), purpose expression, nodal arrangement information such as location, computing resources, and/or the like.

Purpose class applications, in some embodiments, provide significant capabilities for users to realize their purposes. Purpose class applications are resources that comprise a resource set that has been specifically arranged to provide a user computing environment for a specific, logically related set of purpose Outcomes. Users may employ a purpose class application with the specific understanding that they were constructed to provide specifically targeted (to one or more purpose expressions) sets of capabilities that may have particular, expert and/or otherwise fashioned features, such as software application interface (such as faceting engine), display, communications (for example, cross-Edge), expert system and AI support capabilities, all in a mutually complementary, multi-featured milieu specific to one or more class, hierarchical, ontological, and/or other logical and/or relational (for example human associated) based organization of capabilities as specified in the context of a purpose expression set.

Purpose class applications may, in some embodiments, be used to populate user computing environment "desktops" with symbols corresponding to, and, in some embodiments, in part or whole incorporating, branding, purpose class, publisher name, Outcome one or more facets, and/or the like so that initiating user computing arrangement purpose fulfillment activities brings the user directly into a resource environment for the corresponding purpose fulfillment specified class arrangement. PERCos capabilities may then be, in some embodiments, infused into the capabilities of the purpose class application, providing information resource and/or resource portion assistance, for example, for more granular, targeted, knowledge enhancement, and associated learning and discovery. With some embodiments, over time, and with the evolution of a PERCos Domain set specific or general cosmos, much of user activity may be "funneled" by the user through purpose class applications, with PERCos capabilities serving the user in a more specific information, user purpose knowledge enhancement and/or decision making manner. For example, a purpose class application might comprise a "learning and practicing auto mechanics" environment populated, in part, with a spectrum of brand and/or model specific mechanics electronic manuals provided by experts and/or the respective manufacturing companies and/or associations thereof and/or the like, supported by logical, expert framed faceting capabilities for diagnosing problems and/or for choosing remedies, and further supporting a body of consulting experts available, for example, on request, and/or currently online, and/or, for example, further providing information regarding any associated consulting fees and/or other considerations, where such one or more consultants (e.g. contingent on availability, scheduling, and the like) may, for example, be called upon at a given point in a learning, diagnosing, and/or repair process, all the foregoing, in such example, may be supported by graphics capabilities that can "walk" a user set through diagnosing and/or servicing a vehicle mechanical problem, including learning support capabilities such as reference and diagnosis specialty information that may be contextual (at a process point) available, and/or graphical and/or video close-ups, for example on user request. These and other capabilities can create very powerful application sets populated by contributing resources (which may include in some embodiments one or more other resources not meeting the definition of a PERCos published resource), that may be evaluated and/or, custom employed, for example, in using a purpose class application allowing for selectable resources to perform one or more Roles contributing to the applications resource array. Users may further "build" purpose class applications, for example, by working with a Framework that is associated with the user purpose "learning and practicing auto mechanics" which may provide a scaffolding, including, for example, a portion of useful resources (which may include in some embodiments one or more other resources not meeting the definition of a resource).

In some embodiments, purpose profiles may be used by both users/Stakeholder to store those characteristics they wish to associate with one or more purpose(s) and/or purpose ontological and/or taxonomic groups, including, for example, purpose classes. For example an expert who has multiple domains of expertise, potentially with differing skills levels in each, may develop a purpose profile associated with one or more Domains. In addition, one or more users/Stakeholders may also have purpose profiles that are optimized to their own specific stored purposes (as, for example, CPEs).

A PERCos web service arrangement may maintain participant characteristics, e.g. profile information, as associated with any purpose ontological and/or taxonomic arrangements, such that based on one or more characteristics associated with a specified purpose set, e.g. a purpose expression, associated one or more parties could be identified and prioritized, for example, as further assessed according to Creds on their characteristic qualities/capabilities (as well, for example, on EFs, such as descriptive participant professional attributes).

In some embodiments, such purpose profile formulations may be associated with and/or potentially be part of preferences, and may in part or in whole form the context for the intended and subsequent purpose operations.

In some embodiments, users may for example, choose a purpose profile from one or more Experts, Stakeholders, other users and/or social networks with which to undertake, for example, collaborate and/or share, their purpose fulfillment operations.

A Few Further Examples

For example a user group may be trying to repair a bicycle, car, electronic device and/or the like. As they undertake their purpose operations, for example as they try to diagnose the problem, users may experience an evolving of understanding of the components and related issues that make up the devices and the match of symptoms to problems, for example, through the direct and/or indirect assistance of others who have experienced these issues and/or have material issues related expertise. This may lead for example to an expert and their published resources and/or online, real-time assistance, which may provide an informing context leading to appropriate remedial actions that satisfy a user purpose set.

For example, in some embodiments, user (U1) may express (PE1) which through use of class systems and PERCos embodiment processing, may result in a set of resources (RS1) comprising some classes with a significant and/or sufficient correlation/relevance to PE1. For example RS1 may comprise classes C1, C2 and C3. Each of these classes may have as members resources, expressed as C1(r11 . . . rn1), C2(r21, . . . , rn2), and C3(r31, . . . , rn3), respectively.

In this example, user U1 has experience of RS1 and selects member of RS1, R(x), to be part of their iterated purpose expression. In some examples this may lead to creation of a new purpose expression, PE2, where none of the terms of PE1 are retained in PE2 or a revised PE, where some of the terms and/or expression combinations of PE1, for example designated as PE1(a), are retained. For example if PE1 comprised CPE(Learn, Solar Cells), then PE2 may comprise, for example CPE(Purchase, Solar Panels) or PE1 (a) may comprise CPE(Learn, Solar Panels).

In this example U1 may elect to retain each PE and associated result set, so that they may traverse their "tree of understanding", enabling them to consider differing selections and digressions as they, through experience of considerations and evaluations of RS develop further understanding of their purpose Domain.

This may include retention (through, for example, one or more storage means) by U1 and/or those resources associated with U1 purpose operations, the relationship information and/or result set, including the selections and decision trees of U1.

In some examples classes of a purpose Domain may have some members in common and where evaluation of classes has previously taken place, such relationships may have been enumerated and retained by classes and/or resources as members thereof, for example through PIDMX and/or other retention methods. For example, in FIG. 1, PD21 and PD 22 may have resources/members in common.

In other examples, classes of a purpose Domain may be disjoint. For example, PD2, PD4, and PD5 are disjoint where each purpose Domain may contain classes specifying a set of resources associated with "Java" having differing and disjoint resource sets, for example PD2 has resources for computer programming, PD4 contains resources associated with coffee and PD5 for an island of Indonesia.

When a user expresses a purpose expression for which PERCos does not have sufficient information, PERCos may evaluate the purpose expression to find a set of purpose expressions that are as "near" as possible. Consider FIG. 1. Some purpose Domains share some common purposes, whereas other purpose Domains do not share any common purpose. A user may specify a purpose expression that generalizes to a purpose class in purpose Domain PD3. Further suppose that there is no descriptive CPE associated with a PD3. In such a case, PERCos may consider PD1 and PD2.

Figure 1:
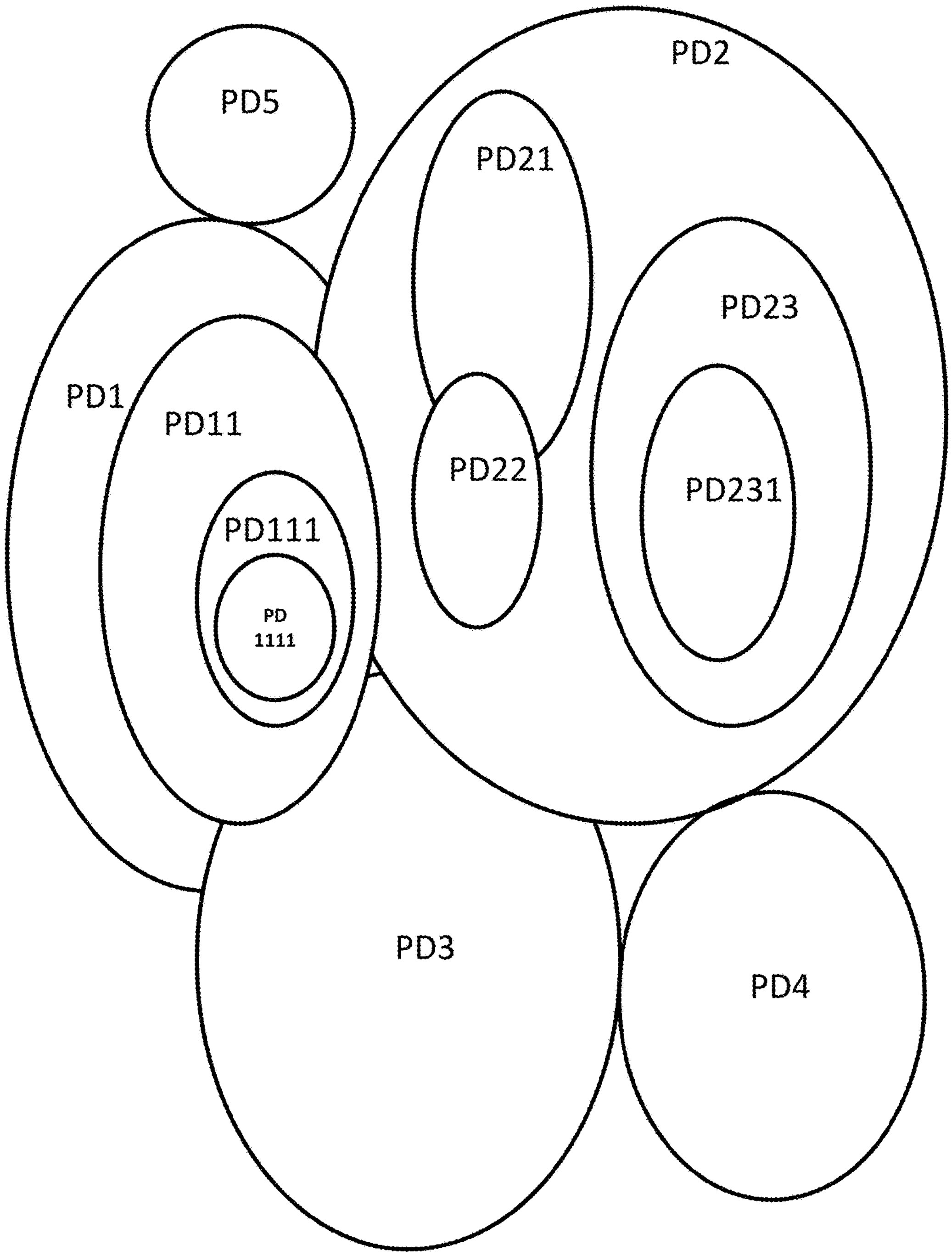
FIG. 1 is an example of purpose Domains with common members.

Illustrative Example of Purpose Domains with Common Members is Shown in FIG. 1: An Example of Purpose Domains with Common Members In some embodiments, purpose Domains are a special type of class that are focused on purposes.

In some embodiments, purpose Domains nomenclature may be standardized and may be aligned with one or more class systems. Such standardization may include for example descriptive CPEs which may be associated with purpose Domains.

In some embodiments, there may be associated tables comprising one or more purpose expressions, such as verbs and categories, which represent associations of one or more purpose Domains with other resources and/or resource portions, including purpose Domains. For example this may include verbs, categories, CPE and/or other purpose expressions and/or metrics (such as for example weightings) indicating the relative strength, closeness, nearness, co-occurrence, frequency of occurrence and/or any other metrics.

In some embodiments such tables and the values they comprise may be used by PERCos embodiments purpose operations to determine relative utility of those resources.

In some embodiments there may be additional purpose expressions associated with purpose Domains, for example in some embodiments, this may include PIDMX which comprise all the purpose expressions with which purpose Domain has been associated and the relationships between purpose Domain (as a resource) and other purpose Domains (as resources).

For example PD1 may have associated descriptive CPE [Learn Math] as this PD is a resource for learning general math. In some embodiments, PD1 may often be used by multiple users in conjunction with PD2 which has descriptive CPE [Learn Physics] and consequently, for example, each PD PIDMX may have this relationship enumerated so that PD1 and PD2 may, in some evaluations be determined to be close/near.

Figure 2:
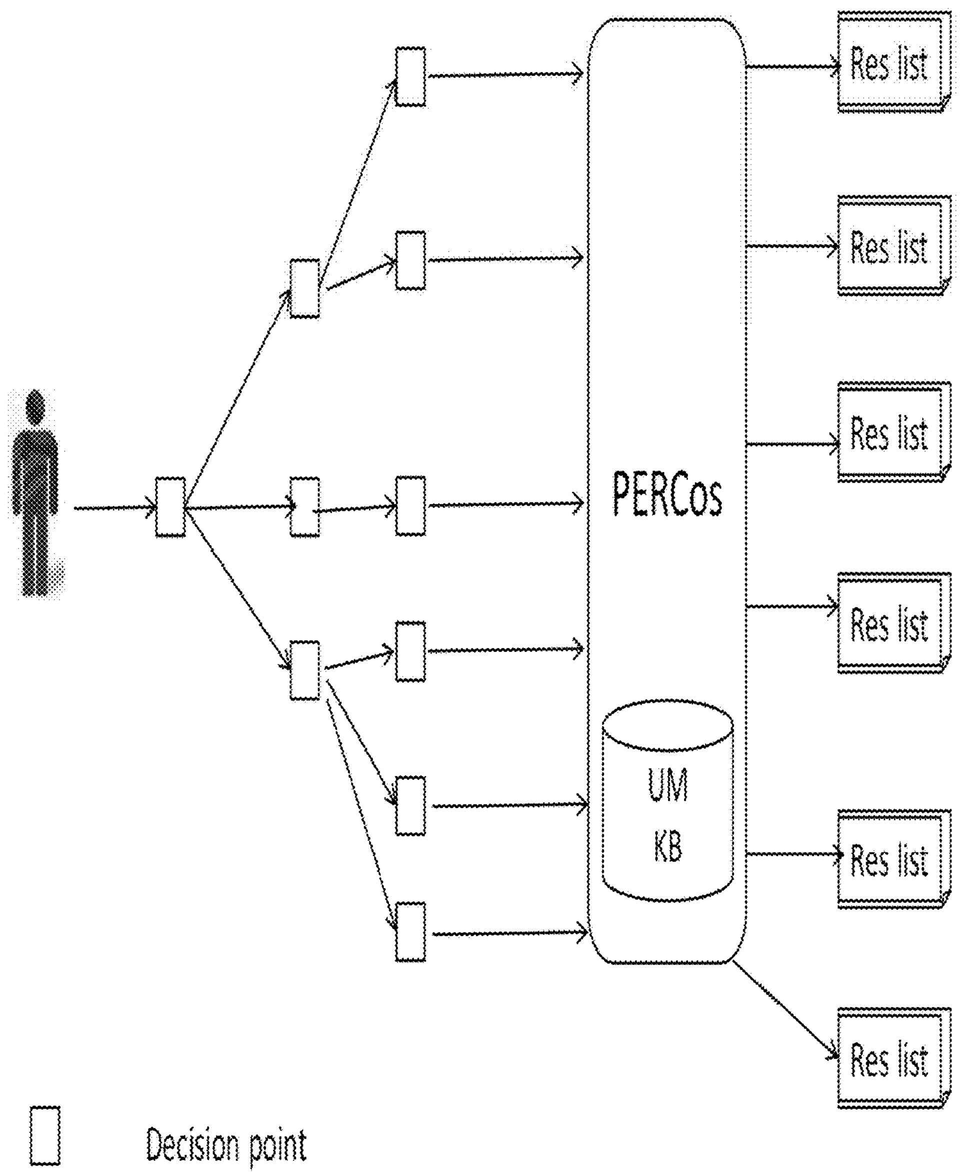
FIG. 2 is an example of a user's resource selection.

In some embodiments, provisioning of a user purpose may take into account factors such as for example, the user's postulates, one or more stored profiles, preferences, contexts, such as the user's expertise in the purpose domain, and/or the like. For example, suppose a user is interested in exploring investment strategies. FIG. 2 illustrates the user having three sets of decision points. First decision point may be to specify the user's "what if Postulates," such as the user supposing what happens if Greece will default and the stock market will go down as a result. The second column of decision points may be the user exploring the user's expertise level, such as supposing the user is an expert investor, knowledgeable investor, beginning investor, and/or the like. The third column of decision points may be to explore different types of investment strategies. Based on the cumulative decisions, PERCos can, for example, interact with one or more resource Knowledge Bases to generate a list of resources employed to fulfill user's purpose.

Illustrative example of a user's resource selection is shown in FIG. 2: An Example of a User's Resource Selection In some embodiments, users may have interactions involving their beliefs, for example as expressed as user specified constraints on purpose operations and/or as constraints included in their evaluation operations on results sets created through purpose operations.

In some PERCos embodiments, user experience and discovery are reflected in user horizons as they adjust over time and process events, including interaction and experience events during their pursuit of purpose.

Unfolding management, in some PERCos embodiments, comprises cross Edge management where user outputs direct the potential results sets that may satisfy their dynamically unfolding purpose operations during one or more iterations of purpose expressions.

Users may also have multiple iterative purpose expressions reflecting users developing understanding within their purpose operations.

For example a user may be trying to repair a bicycle, car, electronic device and/or the like. As users undertake these purposeful operations, (for example as they try to diagnose the problems), they may gain a fuller understanding of the components that make up the devices. For example they may match the symptoms of their problems with those of other users/participants who have experienced these same or similar issues. This may lead for example to an expert and their published resources which may comprise the appropriate remedial actions to satisfy their purpose.

For example user (U1) may create a purpose expression (PE1) which through matching to one or more class systems may lead to the creation of a Result Set (RS1), comprising those classes with a significant and/or sufficient correlation/relevance to PE1. For example RS1 may comprise classes C1, C2 and C3. Each of these classes may have as members resources, expressed as C1(r11 . . . rn1), C2(r21, . . . , rn2), and C3(r31, . . . , rn3), respectively.

In this example, user U1 may interact with RS1 and select members of RS1, R(x), to be a further part of their iterated purpose expression. In some examples this may lead to creation of a new purpose expression, PE2, where none of the terms of PE1 are retained in PE2 or a revised PE, where some of the terms of PE1, for example designated as PE1(a) are retained. For example if PE1 comprised CPE(Learn, Solar Cells), then PE2 may comprise, for example CPE (Purchase, Solar Panels) or PE1(a) may comprise CPE (Learn, Solar Panels).

In this example U1 may elect to retain each PE and associated result set, so that they may traverse their "tree of understanding", enabling them to consider differing selections and digressions as they, through experience of considerations and evaluations of RS develop further understanding of their purpose domain.

This may include retention by U1 and/or those resources and/or resource portions associated with U1 purpose operations, the relationship information and/or result set, including the selections and decision trees of U1.

In some examples classes of a purpose domain may have some members in common and where evaluation of classes has previously taken place, such relationships may have been enumerated and retained by classes (including any ontological groupings) and/or resources as members thereof, for example through PIDMX and/or other retention methods. For example, in FIG. 1, PD21 and PD 22 may have resources/members in common. Such information may also, or alternatively, be retained associated with user and/or user groups, associated Participant information set.

In other examples, classes of a purpose Domain may be disjoint. For example, PD2, PD4, and PD5 are disjoint where each purpose Domain may contain classes specify a set of resources associated with "Java" though with differing and disjoint resource sets, for example PD2 has resources for computer programming, PD4 contains resources associated with coffee and PD5 for an island of Indonesia.

In some embodiments, purpose expressions may be processed, in whole or in part, through PERCos embodiment processes. These processes may include operations and/or processing of purpose expressions that for example, include:

- Delayed processing of purpose expressions—Where for example, users and/or other process input may invoke one or more various delays in purpose processing, to for example take advantage of differing resources, match processing to resource availability, synchronize with other users, conform to specifications (for example rules) determining the time periods for such operations and/or the like.
- Intensive processing (using multiple resources including for example Cloud based resources)—where for example the use of more powerful, capable and/or sophisticated resources may compliment and/or further enhance user resources for further/additional processing capabilities
- Specialist Processing—where for example, use of specialist processing tools, such as computational linguistic, semantic and/or other analysis tools, which may be operated within users resource pool and/or in cloud.
- Simple/Quick/Instant processing/responses—where for example pre calculated and/or indexed purpose results sets where expedience is the priority
- Quantization of processing (delivery of results in "chunks", including accretive/iterative)—where for example, purpose results sets are provided in quantized "chunks", for example results from one category, results from one resource, results that satisfy a specification and/or the like.
- Collaborative processing—where for example a set of users utilize their specific resources in pursuit of their common purpose.

In some embodiments, these arrangements of resources may be made persistent and/or published, often in line with PERCos embodiments Constructs as PFS, Foundations, Frameworks, and/or the like.

In some embodiments, user's initial purpose expression(s) may be processed and subsequently retained over time for further periodic processing. This may include processing and purpose results sets that are built up over time, which for example may include the creation and/or iteration of associated classes and/or other organizational structures.

Such contiguous, sequential, periodic and/or other temporal purpose expression processing may include specification of purpose expression lifespan, for example quantized by user/Stakeholders based on metrics that may include for example, utility/time/cost/sufficiency/group dynamics and/or the like.

Users may elect to have their purpose operations produce results sets in any time frame (and/or series thereof). For example user may elect to have purpose operations deliver results sets immediately, as for example they may need such results to respond to a query at that point in time. However, users may also elect to have that results sets extended, expanded and/or modified over a time period, which for example may be set by user/Stakeholder over time, where further results may be composited into results sets for user.

Provisioning a user purpose takes into account factors such as for example, the user's postulates, preferences, contexts, such as the user's expertise in the purpose domain, and/or the like. For example, suppose a user is interested in exploring investment strategies. FIG. 2 illustrates the user having three sets of decision points. First decision point may be to specify the user's "what if postulates," such as the user supposing what happens if the Greek government will default on its debt and the stock market will go down as a result. The second column of decision points may be the user exploring the user's expertise level, such as supposing the user is an expert investor, knowledgeable investor, beginning investor, and/or the like. The third column of decision points may be to explore different types of investment strategies. Based on the cumulative decisions, PERCos interacts with its uncertainty knowledge base to generate a list of resources to fulfill user's purpose.

In some embodiments, users purpose operations may include the utilization of one or more autonomous or semi-autonomous agents as resources that may represent users in the intranets, extranets, and/or the web and user purpose seeking agents may trawls resource space for appropriate resources selected by user as expressed in a purpose expression such as a CPE or Purpose Statement.

In some embodiments these resources may provide functionality that for example enables users to retrieve identify, select and/or retrieve resources for users controlling the agents. There may also be agent resources that represent the users (in whole or in part) and may provide interactive capabilities for other users (and or their resources). In some embodiments, a user set may select one or more PERCos Repute categories from a list arrangement. Such category selecting, for example, may use a faceting interface. For example, a user may select as a desired attribute for a Cred set to be applied as associated with a user's Core Purpose, 'learn' 'molecular physics developments'" select logically presented options of expert types in physics, such as for selecting, selecting a desired authority certifying type for administering a certification and/or other validation of a claim of a professional positions: licensing authority, board certifications, fellowship completions, and/or the like; academic/technical/professional degree types, such as an AA, BA or BS, Ph.D. and/or the like; memberships, such as ACM, IEEE, NRA, ACLU, and/or the like; employment position types, such assistant professor, public middle school teacher, vice president, fireman, manager, director (title or board based), lieutenant, and/or the like; employment institution types such as university, college, corporation, non-profit, religious, consulting firm, government, and/or the like; employment institution ranking types such as nationally recognized, internationally recognized, regional, local, and/or the like; region of location such as global, specific hemisphere, continent, subcontinent (middle east, central America), nation, state/province, city; asset status types of categories, and subcategories of available categories as practical and circumstantially appropriate. An IU can, in particular employ such category types when specifying Repute EFs and Creds for creating an expertise and/or otherwise appropriate informed and prioritized list of resource candidates for further evaluation and/or selection of and/or interaction with.

Non-Limiting Sample Embodiment of a General Purpose, Extended, Constrained Verb Set Variations on this embodiment may involve combining certain separate verbs as approximation

| | | |
|---|---|---|
| Describe | Assert | Commit |
| Explain | Open | Undo |

-continued

| | | |
|---|---|---|
| Instruct | Store | Enlarge |
| Teach | Influence | Observe |
| Learn | Persuade | Solve |
| Study | Argue/Dispute | Enhance/Supplement/Add |
| Research | Annoy/Irritate | Give |
| Ask | Avoid | Receive |
| Refuse | Disrupt | Withhold/Keep |
| Analyze | Locate | Plan/Design |
| Explore | Publish | Forgive |
| Discuss | Acquire/Get | Remodel |
| Entertain | Compare | Reply |
| experience | Place/Put | Send |
| Contemplate | Attack/Fight | Remonstrate/Disapprove |
| Criticize | Enjoy | Operate |
| Contribute | Ignore | Execute/Process |
| Create | Support | Restore |
| Debate | Defend | Move |
| Purchase | Make/Assemble/Produce | Sense (touch, smell, taste, hear, feel) (multiple) |
| Administer | Fix/Repair | |
| Share | Grow | Want (To Enjoy, To Move, To feel, To Play, to Pursue and the like) |
| Communicate | Complete | |
| Socialize | Inspect | |
| Meet | Reduce/attenuate | Play |
| Compete | Influence | Pray |
| Resolve | Travel | Possible Negatives such as lie, confuse, misdirect, harass, |
| Interact | Consume | |
| Negotiate | Employ | Gift |
| Combine | Observe | Yearn |
| Select/Choose | Participate/Attend | Delete/Remove/Eliminate |
| Close | Belong/Join | Grow |
| Modify | Contest | Manufacture |
| Complain | Oppose | Maintain |
| | Sell | Stop |
| | Disable | Dismantle |

Dimensions and Associated Metrics Introduction

1. Overview

Human language is used for communications between people (and more recently for recording information) and much of important communication is about human needs and sources of resources that can satisfy such needs. Users who express their desires (PERCos users) can use descriptive language that is substantially both a product of and constrained by their expertise and understanding within any given domain. Publishers often believe that they are experts in the domain of their resources—they describe their resources so as to attract their intended constituents/audience/market and convey sufficient information about what the resource is/does.

Using unstructured descriptive language by both users and publishers, particularly in contexts that are not systematized, often leads to significant inefficiencies and inconsistencies when users attempt to marry their needs with possible published resources. As a result, effective communications between users and publishers, except for examples where there is knowledgeable use of relatively controlled corresponding expressions (e.g. flights from San Francisco to Phoenix), may be ineffective and misleading. Even hypertext, which enables any text, document, web location and/or other *ephemera* to link to any other, does not provide a manageable and effective systemization and ordering system when used with very large and distributed resource stores.

PERCos embodiments at least in part address this limitation by systematizing interactions between user expressions and resource publisher descriptions through standardized expressions including Dimension specifications and PERCos metrics and associated values, which among other attributes, provide defined relationally approximate terms and scalars for simplified generalizations describing key Facets of user purpose and corresponding resource associated capabilities/characteristics—both users and publishers may employ such Dimensions to create descriptive 'spaces' that approximately characterize both resource and user purpose essential axis. These Dimensions provide salient overall resource/purpose characterizations that compliment users and publishers purpose expressions (including prescriptive and descriptive CPEs) enabling efficient handling of the 'boundless' and Big resource, and adding valuable filtering data management capabilities that can lead users to resource purpose class approximation neighborhoods—that is matching and similarity, focus, navigation and other purpose and related processing that are enhanced by these Dimensions so as to better satisfy both user and publisher needs.

In some PERCos embodiments, user Core Purpose Expressions are augmented by other standardized expressions, such as PERCos Master Dimensions and associated Master Dimension Facets and values, Auxiliary Dimensions, PERCos metrics and/or the like. These standardized expressions can, for example, provide purpose expression building block simplifications and approximations for users to efficiently resolve to an understanding and/or ordering and/or provisioning related to the vast potential arrays of opportunities available in Big resource, which may result in practical purpose fulfilling interim and/or Outcome results. Such results may then be evaluated and considered by users in pursuit of their purpose set where such processes may comprise one or more iterative unfolding sequences.

Leveraging such standardized and interoperable expressions enables both users and Stakeholders to communicate and operatively correspond effectively through such simplifications and approximations. Such expressions can support meaningful purpose evaluation, matching and fulfillment through the identification of relevant corresponding common purpose and any associated information.

In some embodiments, user-interpretable PERCos Dimension expressions enable communication of essential operating considerations through Master Dimension and associated Facet purpose expressions. Such Dimensions provide user-interpretable standardized simplification categories that assist users in navigating what may be seemingly boundless resource opportunities to optimal Outcomes, including resources or resource portion candidate neighborhoods.

Additional optionally-employed standardized and interoperable expressions and PERCos metrics may support user-interpretable Dimensions, and, for example, in some embodiments, Facets. They may be used in PERCos embodiments to convey and communicate nuances of characterizations of Domains, resource classes, Participant classes, Repute classes, purpose classes, and/or affinity groups and/or the like (any and all of the foregoing may be supported as subclasses of resource Classes) in the form of standardized simplifications. PERCos Platform Services embodiments can provide one or more sets of these standardized metrics to enable such enhanced users purpose operations.

Both Dimensions and metrics may have associated text, symbols, icons, pictographs and/or other interface indicia which support user-efficient recognition and intuitive grasping of the purposeful implication of Dimensions (including Facets thereof) and/or metrics to their associated purpose set. For example, Quality to Purpose metrics for one or more resources may be shown as a Venn diagram indicating the degree of overlap of the resources to users' expressed purpose set, purpose statements, selected purpose classes, and/or other resources and the like. These representations may be useful to users, as well as when appropriate, to computer arrangements that involve interpretation of text, images, visual qualities and/or dynamics. Symbols and the like may be employed to represent Constructs, specifications and user actions, using, for example, colors, icons, tokens, movements and gestures, biometrics, and/or the like.

PERCos platforms may provide both the standardized expressions and the methods employed in determining the values associated with expressions of Dimensions and metrics, thereby enabling effective and transparent evaluation of expressions ensuring global interoperability across PERCos embodiments. Affinity groups may customize and/or extend the PERCos-provided sets of Dimensions and metrics. In such cases, interoperability of customized/extended Dimensions and metrics may require customized/extended methods for evaluation of expressions and/or associated values.

This standardized combination of expressions and methods supports user classes, declared classes, internal classes, and approximation computing and enables users to effectively, reliably and efficiently manage resources and resource opportunities in pursuit of their purposes.

In some PERCos embodiments, Dimensions and the terms and scalars comprising them, complimented by purpose metrics, provide information quantization, reducing vast descriptive complexities relating to interfacing users with Big resource to a standardized, comprehensible lexicon intended for effective communication of intended purposes of users, resource providers and other Stakeholders. PERCos embodiments may provide one or more intelligent tool sets that provide both users and publishers thematically simple interfaces and associated expression languages for, for example, purposes, purpose classes, purpose plugins, and PERCos processes and services. Such tool sets may be extended and expanded (for example through linking with such resources as Wordnet, when allowed) to provide a highly diverse set of expressions linked through a minimal common relationally approximate expression set. For example one such simplified interface, from the perspective of both user and publisher, comprises a Dimensional set of characteristics, represented as a quad of the Dimensions of difficulties, qualities, costs and quantities, each of which has associated scalars and quantized term sets.

An illustrative example of Dimension embodiments is shown in FIG. 2*a*: An Example of Dimension Embodiments.

Publishers and/or users may opt in some embodiments to include these Dimensions as part of their purpose expressions when offering or seeking resources. This may include some or all of these Dimension types with any associated values and/or scalar terms. Dimension Sets may be created by publishers and users as part of their profiles (or other stored characteristics) and may include one or more sets of values associated with those Dimensions, which may or may not be associated with one or more purpose classes and/or purpose expressions and/or the like. For example, this may include default Dimensions sets which are created and stored in users/publishers profiles and may contain one or more sets of default Dimensions and associated values, which may be associated with one or more specifications.

For example, a publisher may offer a resource, such as for example, book, e-book, other information arrangement, on power supplies for electronic equipment. In this example the publisher may declare the following Dimension set for the resource: Example user Dimension Set:

Costs
Cost: Medium
Quantities

Time: Long (6)
Difficulty
Sophistication: (5)
Material Complexity: (7)
Interpretation/Functional Complexity: (5)
Qualities
Integrity: (7)

Each of these Dimensions as well as a Stakeholder such as, a publisher or author, may have one or more Reputes associated with them as Participants, asserting or otherwise declaring (or otherwise specifying one or more values) of characterizations of declared Dimensions of a resource as associated with a purpose or purpose class.

In this example a publisher may have specified the following Dimension profile as related to one or more purposes, purpose classes, purpose Domains, and/or general purposes in nature (or these Dimensions might have been specified in a user-selected resonance specifications): Example publisher Dimension set Costs
Budget: Medium (may provide a dollar price or range or some weighting as to cost or event trigger (such as a message to user to assess cost/budget) versus value.
Difficulty
Sophistication: (5)
Material Complexity: (7)
Qualities
Reliability (5)

Operatively in this example, both Dimension sets are associated with the purpose expression [Learn: Electronics: (Device) Power Supply, Small Appliance].

In this example the Dimensions used by user and/or publisher may be used for similarity matching, purpose class and/or other resource matching, filtering, evaluation and/or other Coherence, and/or other PERCos processes, consequently enabling efficient use of Big Data and other Big resource.

There may be further purpose metrics associated with the resource, such as dependency metrics, in the form for example of:

Dependency Metric
Predicate: [Electronics 101: resource_ID_415/resource_ID_Server 134]
Suggested: [Power Supply Basics: resource_ID_456/resource_ID_Server 123]

Where the provider of the dependency metric, in this example, the publisher, has declared that the resource [Electronics 101: resource_ID_415/resource_ID_Server 134] is a predicate, and the resource [Power Supply Basics: resource_ID_456/resource_ID_Server 123] is suggested. These dependencies may have event triggers associated with them, such that the user is presented with a suggested order (as determined in this example by the publisher) of the books. Dependencies may also have associated governance and/or enforcement mechanisms, for example in a structured learning environment, game or other sequential processing.

Such metrics may additionally have one or more Reputes associated with them.

This combination of Dimensions and metrics may be evaluated by users, directly through interaction and/or through instances of PERCos systems and processes PERCos embodiments may provide standardized and interoperable Dimensions and metrics sets to support users and publishers to communicate and interact in one-to-boundless. This may include Dimension and/or metric sets created by experts and associated with one or more purpose classes.

In some embodiments, PERCos environments can include one or more sets of standardized Dimensions. These Dimension sets may comprise for example PERCos Master Dimensions (described herein) and/or specified arrangements of these, for example as summaries that enable users to quickly evaluate potential resource arrangements (including Frameworks, Foundations, purpose class applications and the like). In some embodiments, such summary Dimension sets may include "knowledge" or "experience," where the former describes the general attributes of the resources as those predominately for knowledge and the latter for resources intended predominately for experiences.

In some embodiments, a relatively small number of generally applicable clusters of Dimension sets may be distinguished as Master Dimensional clusters, which are major groupings of characteristics that significantly influence user navigation and exploration. Some Purpose Navigation Interfaces (PNI) may provide access to, and control of, Master Dimensions as an overarching navigational tool.

In some embodiments, Master Dimensions comprise standardized sets of Dimension variables that are used by users and publishers to describe the contextual characteristics of user and Stakeholder purposes. Stakeholder purpose Dimensions are associated with resources and/or purpose classes and are employed in correspondence determination, for example, with user purpose expressions and/or purpose statements. FIG. 71: Illustrative Example of Master Dimension embodiments.

All Dimension variables may be used within any Dimension set. For example, user variables may include further any Dimension Facets, such as for example Quality to Purpose or sophistication, complexity and the like. These combinations of Dimension Facets, along with Core Purposes, provide methods of evaluating matching and similarity between user purpose and purpose related characteristics associated with resources and purpose classes. They can play a fundamentally important role in resource identification, prioritization, cohering and provisioning.

All Dimension Facets may have associated standardized weightings and values that for example are considered in evaluations. Such associations may also include specifications, such as if Budget is (X) and Sophistication>(N), then time allotted is range form (P to Q). A further example may be if Sophistication=Beginner then Complexity nor more than "Medium".

Core Purpose comprises at least one verb and category which are selected by users.

Core Purpose Master Dimensions include verbs and Domain category groupings. This may include one or more limited contextual sets of verbs and/or categories that may be employed in response to one or more user purpose operations.

User variables Master Dimensions Facets expressed by users to assist in identification, selection and/or filtering of results sets and/or candidate resources and for example include:

Sophistication—expression of degrees of user sophistication as related to current session Core Purpose Expression. For example, may be a term with value from standardized scalar (e.g. Beginner=2 out of 10) or may have other value selected and declared (e.g. 3 out of 10).

Time Duration—Duration period for which user and/or publisher have asserted as a for example, mean time of anticipated and/or desired resource usage as related to demand on time. For example resources that have short times for usage associated with them may include, for example, a summary, single page, short list, short video and the like.

Promptness—Period of time desired for purpose session operations for returning purpose Outcome. For example, may have associated values in absolute time (for example seconds, minutes, hours) and/or repeat periods and the like.

Absolute or Relative Point-In-Time—A specific time specified in terms of a time reference, such as GMT.

Budget—Transactional budget for resources, for example, expressed in some form of currency, information exchange or other transactional variables.

Integrity—Standardized value expression, for example 1 through 10 representing minimum desired or required integrity threshold as for example derived from Repute.

Reliability—Standardized value expression, for example 1 through 10 representing minimum desired or required reliability threshold as for example derived from Repute.

Role—Standardized PERCos denotations of significant context specific user Roles, such as for example, student, teacher, administrator, physician, employee, trainer, executive, researcher, engineer, inventor, evaluator, consumer and the like.

Privacy—For example, standardized value expressions and associated scalars, and/or any other mutually interpretable specifications for users and Stakeholders to align and coordinate privacy policies, for one or more resource and/or element sets.

Resource Master Dimension Facets associated with resources, which are, in general, created by value chain Stakeholders for resources and for example include the following:

Material Complexity—Degree of complexity of resource to purpose, sophistication value and/or generalized and ascribed to a given resource set.

Interpretation/Functional complexity—Interface and functional complexity for interacting with resource set.

Integrity—Standardized value expression of integrity for example 1 through 10 representing integrity of resources as expressed by Stakeholders (e.g. asserter/publisher) as Reputes associated with resource.

Reliability—Standardized value expression, for example 1 through 10 representing reliability as expressed by one or more Reputes, and/or for example standardized tested metrics, for example, resource reliability metrics.

Language—Standardized denotations for one or more languages

Costs—Costs and terms of transactions for resource (e.g. high/medium/low) Repute Master Dimension Facets which include standardized Repute metrics associated with resources, including for example reliably identifiable resource portion set and/or other information, which may include:

Quality to Purpose—Overall standardized Repute metric value expressing the quality of resource to a specified purpose set.

Quality to Domain—Overall standardized Repute metric value expressing the quality of resource to one or more specified PERCos Domains—Quality to Purpose class—Overall standardized Repute metric value expressing the quality of resource to a specified purpose class set.

Quality to Purpose of Stakeholder—Overall standardized Repute metric value expressing the quality of any Stakeholder set including for example publisher, Creator, Distributor and the like.

Quality to Role—Overall standardized Repute metric value expressing the quality of resource to one or more Role set.

Quality to Value—one or more specifications employed for the evaluation of Reputes associated with results sets and candidate resources.

Repute Subject Mashing—Reputes associated with portions of and aggregations of Subjects which are associated with user session purpose expressions, results sets and/or candidate resources. For example a portion may be a chapter within a book, where the chapter has one or more Reputes and the book one or more Reputes that may be different from the chapter's Repute Symbol Master Dimensions, which in some embodiments are special Facets, may include one or more symbol sets that are representations of resources and/or resource arrangements, such as Constructs (including Frameworks, purpose class applications and the like), preferences, crowd behavior and the like. These symbols may, for example, be created by users/Stakeholders to represent set of Dimensions, Facets and associated values.

User profiles are expression arrangements with associated symbolic representations that may in combination represent a set of Master Dimension Facets and any associated operators that users may wish to use in their purpose operations. In some embodiments, users may wish to store/persist their profiles, including any modifications and usage thereof, and associate them with a symbol.

Some PERCos embodiments may provide auxiliary Dimensions to further refine purpose operations, often after processing Master Dimension Facets to determine one or more purpose neighborhoods/purpose classes that approximate user purpose intent. Auxiliary Dimensions, in some embodiments, provide purpose neighborhood/class specific contributing optimizations, filtering, representation, navigation and/or exploration processing and/or interfaces, information sets, alternative lexicons and vocabularies, one or more Constructs, resources (including specifications and arrangements thereof) and/or other contributing information, processes (including events), resources and/or other PERCos elements.

In some embodiments, these auxiliary Dimensions may include one or more PERCos standardized interpretable interfaces, which may be associated with one or more of the categories of auxiliary Dimensions so as to contribute to contextual purpose operations. These auxiliary Dimensions may be published as resources and as such may contribute, in part or in whole, to one or more user interface and user concept simplification purposes and instances.

Auxiliary Dimensions may be arranged as a set of options that are presented to users/Stakeholders and these may not have any Facets, presenting the user with a flat hierarchy of potential purpose opportunities, often after their purpose expressions and Master Dimensions are used to get into the neighborhood of their purpose.

Auxiliary Dimensions that contribute to contextual purpose augmentation may be embodied, for example, according to the following categories, and such Dimensions may be published as PERCos resources:

1. Specifications: published as resources, for example, as resonance purpose optimization facilitators, process automation specifications, societal/affinity specifications, auxiliary purpose expression building blocks, and the like, including, for example, a) Affinity/societal specifications including, for example, corporate, trade, club, political, nationality and the like related grouping characteristics (e.g. involving groups as to their conduct and/or interaction, (e.g. sub-Dimensions policies/rules/laws, cultural mores or preferences (such as religious, ethnic, social, political and/or other affiliations) roles and/or hierarchies, and/or sharing, collaborative, participatory and the like)

b. Process automation specifications, for example, specifications that in consequence to the use of one or more resource sets, provide input information to processes that influence non-PERCos same purpose session sequence processes in order to support realizing one or more results flowing at least in part from such specification input and one or more associated processes. Such processes may be external to the PERCos cosmos, crossing the 3rd Edge (1st Edge with users, 2nd Edge within PERCos cosmos such as inter PERCos digital communications).

c. Resonance specification instances for purpose, including for example purpose class process optimization, for example, as associated with specific CPEs and/or other purpose expressions, purpose class applications, and/or purpose class sets, and/or with affinity/societal, Participant, resource, instances and/or classes.

1. General data items, including any associated interfaces and/or methods employed generally and/or associated with given specific types. These data items may in various embodiments include published local and/or remote contextual resources, and/or data items that can be generated on demand from any such information. Such data items may be employed, for example, for PERCos computing arrangement internal usage (for example, as may occur with stored interface information which processes any such information, such as for example using one or more methods associated with one or more resource interfaces), as may be the case with profiles, preferences, user history, and the like information, and/or as more generally published, again as profiles, preferences, user history, crowd history, expert input, the forgoing provided in a form interpretable by, or transformable to be interpretable by, PERCos services such as, for example, Coherence Services. Data items may be represented by corresponding, user interpretable and usable expression symbols and/or alphanumeric representations whereby, for example, profile information and/or preference information may be incorporated in purpose expressions. In some embodiments such general data items, including for example one or more information sets, may comprise and/or be managed by PERCos PIMS.

2. PERCos Constructs: published as resources, as Foundations, CPEs (including Core Purposes), Frameworks (including component Frameworks thereof), plug-ins, resource arrangements and the like.

3. Free-form parameterization: user activity being undertaken during prescriptive CPE formulations, including for example, as may be specified in Boolean and/or other expressions (for example logic expressions), and which may be published as resources, and/or may be data entered ephemeral information sets, where such may be processed as a separate set of purpose expression conditions and/or may be modifying one or more other Dimension sets, Facet sets, and/or other syntactically logical portion sets of CPEs and/or purpose statements.

4. Locations: which may be geographic locations (Country, Region, City, State or Provence, GPS and the like), corporate (Department, division) and/or network, web, cloud and the like based location 5. Budget—Transactional costs and any related values, expressed in currency, information, rights and/or other values (including ranges using standardized scalars), and including for example subscription particulars required for usage.

Auxiliary Dimensions may provide, through the utilization of PERCos standardized interpretable interfaces, one or more methods for users/Stakeholders to further refine and/or operate upon their purpose expressions and associated processes in pursuit of their purposes.

Boolean and other operators may be used in any combination with master and auxiliary Dimensions.

Much of the operations of Boolean and other operators may be employed as methods for filtering and/or other manipulations used as secondary steps following identification of one or more purpose statements corresponding purpose classes and/or other neighborhoods and/or other results sets, where Boolean information may be employed as search variables against non-standardized metadata indexes corresponding to such classes, neighborhoods and/or other results sets.

PERCos may provide one or more standardized and interoperable sets of Boolean and other operators for expressing correspondence and/or relation, such as for example, without limitation "and," "not," "or," "near," among resources and/or purposes. For example, two resources or purposes may be "near" each other. For example, "learning astrophysics" and "learning "astronomy" are "near" each other.

Such operations may refine purpose matching and similarity analysis without substantially impacting system efficiency by combining the benefits of approximation Dimensional simplifications employed with Big resource subsequently enhanced by the flexibility and specific matching resulting from indexed or similar searching which may be optimized by thesaurus mechanisms and/or other intelligent tools.

PERCos embodiments provide one or more sets of standardized and interoperable metrics assisting users and/or computing arrangements in resource evaluating and/or managing including manipulating, prioritizing, provisioning and/or the like to meaningfully pursue optimized purpose Outcomes. These metrics cover a wide range of user and/or resource characteristics and may include both qualitative and/or quantitative values. They provide an interoperable basis for the evaluation, correlation, selection, prioritization and/or management and/or other manipulation of one or more resources for purpose operations. The metrics may combine with, in whole or in part, Dimensions Facets and may provide users/Stakeholders with accessible high level standardized metricized Dimensions with which to filter and select resources from the boundless for their purpose.

In some embodiments, PERCos metrics are one or more context-dependent values that have been declared and/or calculated, where a value is anything representable within PERCos, whether locally known or unknown. For example, consider Repute metrics of a physics professor at a well-known university. There may be one or more methods/instructions associated with the professor's Repute metrics that can be used to calculate the value depending on the context, such as for purpose of learning physics, the value may be 70, but for the purpose of collaborating on a research problem, the value may be 95 on the scale of 100. In this sense, PERCos metrics extends the traditional notion of quantitative "metrics," which is a system or standard of measurement. PERCos metrics may be associated with and/or comprise in whole or in part PERCos resources including portions thereof.

In some embodiments, PERCos may provide one or more purpose contextualized packages, which are combinations of one or more metric instruction sets and/or one or more purpose instruction sets. The use of such metric instruction sets is contextually framed and therefore process influenced by associated purpose instruction sets. These instruction sets may be constructed using at least in part standardized expression elements populating two different systems of instruction sets and where the employed expression elements may at least in part be used as elements of expression in each system. In some embodiments, the rules managing the composition and/or interpretation for each of the differing instruction sets systems may differ in a material manner.

For example, Purpose satisfaction metrics for a resource Set may include an instruction set that includes the following rules:

User purpose [Learn Physics]

User purpose satisfaction [User Declared] {value=90}

Quality to purpose [Learn Physics] {value=92}

Purpose Domain satisfaction [Average (Total {values}/ Number of {values}{value 65}

The calculation of these metric values may be influenced, in part, by an instruction set that, for example, includes resource purpose metrics where for example:

resource Set [Purpose={Learn Physics}]

resource Purpose Metric value {91}

Such that the calculated Purpose satisfaction metric, for example for this resource set as a member of a purpose class is calculated as:

(User Purpose satisfaction {90}+Purpose Domain satisfaction {65}+resource Purpose metric value {91}/3

Purpose Class resource satisfaction metric=[value={81.6}]

PERCos metrics combine the specifications of metrics, either qualitative and/or quantitative, into those results of the evaluated methods of metrics (either calculated or declared) and combines this with purpose expressions that are pertinent to metrics to form standardized metrics expressions that impact the Outcomes.

In some PERCos embodiments, there may be one or more Stakeholders, resources (such as published methods, published purpose statements, CPEs, and/or other Constructs) and/or other environment variables that may be associated with a PERCos metric, for example through resource arrangement/persistence/format/semantics and the like. PERCos metrics may be declared by one or more Stakeholders, such as publishers, users and/or Roles (such as for example administrators). PERCos metrics may be calculated by associated methods.

In some embodiments, PERCos metrics can support purpose operations and calculations. There are many aspects of purpose operations that may have associated PERCos metrics. Some PERCos metrics are formalized with appropriate schemas and/or organizations that support standardization and/or interoperability, enabling users pursuit and optimization of purpose. This may include, for example use of one or more XML data schemas, such as is illustrated by the examples in this disclosure. In particular for example, PERCos metrics may be used in the expression of assertions and effective facts as part of Repute expressions.

In some embodiments, PERCos environments may provide such standardized metrics for efficiency and/or interoperability of resource identification and/or selection by users/ Stakeholders for their purposes. Standardized metrics, including those that are parts of standardized Dimensions, may be published as and/or associated with resources, Repute expressions, purpose expressions and the like, and may be system wide and for example, specific to one or more purpose classes and/or Domains, associated with one or more users/Stakeholders (including named crowds, ad hoc assemblies, affinity groups and/or the like) and/or in other ways organized, and/or arranged for efficiency of purpose operations.

Some PERCos embodiments may standardize and otherwise administer metrics in a manner comparable to Dimensions and Dimension Facets.

In some embodiments, Dimensions, including both master and auxiliary Dimensions, may have values that are calculated at least in part using one or more metrics. In the example of Repute Dimensions these values include, for example purpose values (Pvalues) of the standardized Repute metrics, such as Quality to Purpose. Auxiliary Dimensions may also have one or more sets of metrics associated with them, for example, those associated with societal/affinity specifications.

Dimensions are intended to provide users and Stakeholders with effective and efficient methods for expressing user and resource characteristics, and interface metaphors that can employ well-known menus, promptings, and interface techniques supported by expert- and/or AI systems, such as pull down menus, faceting arrays, pop ups and/or the like. Some metrics may be used internally within PERCos embodiments by one or more PERCos processes, such evaluation, filtering, relationship processing, provisioning and/or usage.

A key type of metrics is those metrics that express the values associated with one or more purposes by resources, elements and/or other processes which are expressed as at least in part Pvalues of that association.

In many PERCos embodiments, approximation computing is, in part, enabled and supported through standardized Dimensions and/or metrics and their associated Pvalues. These standardized expressions and values are organized and/or made available so as to optimize efficiency and effectiveness of purpose operations, through Coherence, resonance, Repute and/or other purpose instantiations, performing for example processes such as similarity matching and purpose class identification and evaluation.

In some PERCos embodiments, there may be one or more authorized Utility services which may standardize and otherwise administer/manage Dimensions, Facets and/or metrics in a manner suitable for purpose operations.

This disclosure describes both Dimensions and metrics providing embodiments of each.

In some PERCos embodiments, to support one-to-boundless computing, metrics may be either assertions or effective facts, both of which may be used, for example in Repute expressions. For example in some PERCos embodiments, those metrics that are qualitative in nature are generally assertions. For example "Excellent," "Good, "Average" may be used in one or more standardized metrics as expressions as to the quality, utility, abstract value or other characteristics of a resource. These may also have associated values and scalars.

Those metrics that are quantitative in nature, for example measurements and the like, are generally effective facts, where the method for the calculation is transparently expressed or commonly accepted. For example time and distance measurements are universally accepted, whereas frequency of use may be calculated by measuring every use or may be extrapolated by one or more statistical methods.

Any quantitative metrics, either individually and/or collectively (a set of results) may be associated with an assertion regarding those metrics, for example, the set comprising "12345" may be asserted to be "High" by user/Stakeholder/process #1 in circumstances A, whereas user/Stakeholder/process #2 may assert this set to be "Medium" in the same/similar circumstances. Such assertions may form part of a Repute expression.

In some embodiments, PERCos metrics that are expressed as effective facts may have associated methods that support their status as effective facts. These may include for example:

- Certification—One or more PERCos Platform certified independent entities, including for example sovereign governments, provides evidentiary certification of the underlying statement;
- Declaration—One or more cites of declarations that are and/or have been made by one or more institutions and/or other resources; or
- Specification—One or more sets of specifications that may be used in one or more tests and results services that when the specifications are processed by such services, may return the result that confirms the statement.

All effective facts are contextual and their context is associated with each effective fact.

Effective facts require that there be a suitably authorized user/stakeholder with associated apparatus and methods for validating their authority.

In some PERCos embodiments, metrics provide standardized expressions for the relationships between one or more resources and the purposes with which they interact. These purpose metrics are expressed as purpose Quality metrics and are used as part of Repute expressions to form Dimensions Facets.

Purpose metrics may be generated from methods that operate upon resource metrics, where for example the anticipated quality to purpose metrics for a resource set may be inferred from the operations of the resources for a similar purpose. For example, resource sets for the identification of electronic components may operate equally as well in identification of sub sets (and in some cases, sub classes) of those components.

resources may also have relationships with other resources, which may have one or more purposes associated with them. PERCos embodiments may provide a set of standardized metrics with which to express the relationships. For example, when operating with resource arrangement (N)—for example comprising processing, storage, communications and interface resources), resource A (for example an information resource) may provide a purpose Quality metric value N (e.g. 85) for purpose (1) and may provide a differing Quality to Purpose metric value M (e.g. 65) for purpose 2. For example this may be the case if purpose 1 was "Find Capacitors" and purpose 2 was "Find Electrolytic Capacitors," as the further sub class (Capacitors-Electrolytic Capacitors) reduced the Quality to Purpose of the resource (which in this example may be a more general information store about all capacitors, rather than the specific type electrolytic).

Resource metrics may, in some PERCos embodiments, include measurements produced whilst monitoring operating resources, some of which may be general to all operating instances of the resources, whilst others may be specific to operations for one or more specific purposes.

Resource metrics may include, for example:

- Purpose resource metrics: express values sets as specifications representing the nature of the association of a purpose expression to non-purpose expression resource sets,
- resource metrics: express values sets as specifications representing the nature of the association of a resource set to one or more other resource sets, which in some embodiments may include:
  - Correlation metrics—those metrics associated with similarity and matching and/or other correlations, including for example purpose and resources and the like,
  - Metrics of operations—those metrics associated with PERCos operations and/or processes associated with purpose, resources and/or users/Stakeholders,
  - Participant/Stakeholder metrics—those metrics declared by and/or associated with user/stakeholders and their Participant representations.

A fuller description of resource metrics is outlined herein.

resource purpose metrics provide value sets representing the association of one or more resources with one or more purposes expressed as specifications representing the nature of the association of a purpose expression to a non-purpose expression resource set. In some embodiments, these relationships between resources and purposes may be part of PERCos resource PIDMX.

An illustrative example of resource purpose metrics is shown below for the resource described as "Physics for Novices," which has the illustrative example ID of resource 123:

resource purpose metrics
  resource_ID
  [resource123 . . . /Physics for Novices learners by intermediate teachers]
  Purpose_sets
  [Purpose: Learn Physics
  [Material Complexity: [Sophistication [value=60]]]]
  [Purpose: Teach Physics
  [Material Complexity: [Sophistication [value=85]]]]
  [Purpose class: Learn_Physics [value=80]]
  [Purpose class Application: [value=85]]
  Method
  [Algorithm] [For each purpose {Quality to purpose (value)}
  method=Weighted Average]
    resource Purpose Metric
      [value=80]

This resource Purpose metric provides metrics for differing contexts. It provides the following information about the resource:

- Its material complexity for the purpose of learning physics is fairly low (60/100), which may make the resource ideal for novice users;
- Its material complexity for the purpose of teaching physics is fairly high, so that it should be used by experienced teachers;
- Its value for fulfilling its purpose class is above average;
- Its value as a purpose class application is quite good (85/100); and
- Its overall value, as calculated by the use of a weighted average method is quite good (80/100). The weighted average may assign higher weight to one purpose or purpose class in comparison to another purpose or purpose class.

PERCos embodiments may use a variety of statistical methods for calculating such resource purpose metrics (RPM), such as weighted methods, arithmetic methods and the like. For example, consider material complexity component of the RPM, which has a value of 60. This value may have been computed by performing stratified sampling of users. In particular, for example, users may be partitioned into groups based on their sophistication level. Users can be partitioned into 5 groups, where group 1 would comprise those users whose sophistication level is above 90; group 2 would comprise those users whose sophistication level is between 80 and 90; group 3 would comprise those users whose sophistication level is between 70 and 80; group 4 would comprise those users whose sophistication level is between 60 and 70; and group 5 would comprise those users whose sophistication level is below 60. Values can then be obtained for each group by using methods such as simple random sampling, systematic sampling and the like. The aggregated value can then be found by performing, such as calculation, a weighted average of all groups.

RPMs may also calculate the resource's contributions toward other goals, such as for example, purpose satisfaction, resource dependency and the like. For example, some PERCos embodiment may calculate a resources RPM based on Purpose satisfaction metrics.

resource_ID

[resource123 . . . /Physics for Novices learners by intermediate teachers]

purpose_sets

[purpose: Learn Physics

[Material Complexity: [Sophistication [value=60]]]

[Frequency of Use [value=70]]

[purpose: Teach Physics

[Material Complexity: [Sophistication [value=85]]]

[Frequency of Use [value=70]]

[purpose class: Learn_Physics [value=80]]

[purpose class Application: [value=85]]

Frequency of Use

[value=70]

Method

[Method=purpose satisfaction Scores/Average]

[Algorithm] [Average/Distribution: Scalar 100]

[Total Scores=111/Distribution+80=92/Negative −20=5}

[value=73]

resource purpose metric value

[value=73]

In this example, Frequency of Use measures how often the resource is used by users whose purposes are to Learn and/or Teach physics.

In some PERCos embodiments, methods employed may have symbols, abbreviations, references and/or other indicia for users to consider the methods employed for the calculations of such metrics.

resource relationship metrics express metric value sets representing the relationships of one or more resources (and/or arrangements thereof) with one or more other sets of resources and/or relationships thereof, through specifications representing the nature of the association of resource set to one or more other resource sets. In some embodiments, these metrics may in whole or in part be included in PIDMX of resources.

Example of resource relationship metrics resource_ID

[Resourc123 . . . /Physics for Novices]

Relationships

[resource 234 . . . /class Learn Physics] [Frequency=123/RPM=79]

[resource 678 . . . /purpose class Application (Physics for Novices)][Frequency=1456/RPM=91]

[resource 891 . . . /user123/Foundation2][Frequency=25/user purpose satisfaction=87] Example of calculating values of resource relationship metrics resource

[class Learn: Physics]

[Number of associations=201]

[Alignment=94/100]

Alignment

[resource=class Learn: Physics]

[value=purpose satisfaction {distribution by Reputes (Scalar=10)}=94/100]

For example, the Stakeholder of tax preparation software, resource123, may state the following dependency metrics:

resource_ID

[resource123/a tax preparation software]

Purpose_sets

[purpose: file taxes-by-mail

[Situational: [Sovereign: USA] [State: All]]

[Relationships: [Windows-8-OS [value=True] ]

[network-connection [value=60]]

[purpose: file taxes-on-line]

[Situational [Sovereign [value=USA]] [State [value=All]] ]

[Relationships [Windows-8-OS [value=True] ]

[network-connection [value=100]]]]

In this example, a Stakeholder, for example the publisher, distributor or reseller states that the resource (R123) has dependencies on two further resources: a Windows 8 operating system and access to networks. It states that R's dependency to Windows 8 operating system is essential, that is, it must be "True" for resource to operate. However for network access there is a scalar of dependency (in this example a 100 point scale), if a user is filing taxes using US postal service as R's dependency is not essential and the value of "60" reflects that, although not required, there may still be some dependency, such as for example receiving updates to the resource. In contrast, network access is essential for filing on-line and thus the value is "100."

Metrics for a set of resources (e.g., <R1, R2, R3>) for a purpose (x), may be expressed as a formula expressed in terms of metrics of each constituent resource. The coefficients for such formula may be expressed as (aR1, bR2, cR3) for a purpose, where a, b, c are coefficients of each resource's relation to the purpose. For example, for some metrics, the coefficients may be relative contribution of each resource towards the purpose (for example, a=50%, b=40%, c=10%).

In some PERCos embodiments, PERCos metrics may be classified into three groups: user, Edge, and inner metrics. This classification parallels the classification of classes: user, Edge, and inner classes. Each of these three groups of metrics is further described herein.

User metrics of a user are a representation the user's perception and intent mind at a given time, and may or may not correspond with precision to any external (e.g. written or spoken) form or the user metrics of any other user- or even those of the same person at a different time.

Edge metrics are a representation for expressing metrics that can be interpreted by both users and computers. Edge metrics may have several Dimensions, including one or more user preferences. For example, purpose satisfaction metrics in general may specify the metrics for measuring the quality of the Outcomes as well as efficiency and cost of obtaining such results. However, a user may also customize the user's Edge purpose satisfaction metrics to include one or more metrics to measure the quality of graphical presentation.

Inner metrics are representations of metrics that are intended for one or more PERCos computational operations and may be used by one or more PERCos services to perform their respective services efficiently. PERCos may generalize Edge metrics to serve a wide number of users and purposes. In some embodiments PERCos inner metrics may be standardized for interoperability in support of purpose operations FIG. 72 illustrates the relationships between user, Edge and inner metrics embodiments.

Illustrative example of Metrics relationships FIG. 72: An Example Metrics Relationships In some PERCos embodiments, many of the metrics involved in purpose operations may be derived from, in whole or in part, one or more histories of resources and/or operations and relationships thereof.

Some examples of metrics derived from analysis of history include:

Purpose activities over time,

Purpose user behavior patterns,

Historical patterns, resource relationships, resource utilization and associated purpose satisfaction metrics, and Co-occurrence.

2 Contextual Expressions Resolution

In some PERCos embodiments, Dimensions and/or metrics may form part of contextual purpose statements that are used as specifications for user purpose operations. This may involve the interactions of other PERCos systems and services, including:

Purpose expressions,

Resonance Algorithms,

Coherence Services, and/or

Reputes.

Each of these is considered as related to Dimensions and metrics herein.

In some embodiments, PERCos purpose expressions may initially be expressed as Core Purpose Expressions, comprising at least one verb and category, for example [Learn: Physics]. These expressions may then be expanded, extended, refined and/or varied by the inclusion of one or more sets of contextual information. This may include users/Stakeholders persisted profiles and/or preference information associated with the expressed purpose, user/Stakeholder Dimensions, such as Master Dimensions and Dimension Facets which may include one or more metrics, Repute expressions and/or other standardized and/or interoperable information sets.

Incorporated in these processes associated with the formulation of users/Stakeholders purpose expressions may be resonance algorithms and Coherence processing, which singularly and/or in combination may provide optimization of users/Stakeholders purpose expressions.

Resonance specifications, Coherence Services, and Repute Master Dimensions are considered herein as they relate to users purpose expressions and addressing Big resource.

PERCos resonance specifications provide purpose operative strategies for users, for example, to apply to Big resource in support of users purpose expressions, to supports process input for optimizing Outcomes.

Resonance specifications may have one or more associated Master Dimensions (including Facets) associated with them, and may include both Dimension Facets and metrics.

For example, a resonance specification associated with a set of resources illustrated in the example below where the CPE is [Learn: Electronic Power Supply]. This example involves a resonance specification (R5) which specifies a set of resources (R1, R2, R3) and instructions as to how to utilize this resource Set (R4). Each of the resources (R1, R2, R3) has, in this example, two resource Master Dimension Facets associated with them:

Material Complexity

Interpretation/Functional Complexity

And each resource has the following values for these Dimension Facets

R1

[Material Complexity] {value=60}

[Interpretation/Functional complexity] {value=40}

R2

[Material Complexity] {value=20}

[Interpretation/Functional complexity] {value=20}

R3

[Material Complexity] {value=90}

[Interpretation/Functional complexity] {value=90}

R4 comprises the specifications for the arrangement, management and subsequent utilization of these resources in response to the control specifications that resonance algorithm (R5) may generate in response to users purpose expression.

For example R5 may include the following specifications:

If user variables Master Dimension [Sophistication] {value>50} then resource Master Dimension [Material Complexity] {Threshold value=50} resource Master Dimension [Interpretation/Functional complexity] {Threshold=40}

If user variables Master Dimension [Sophistication] {value<50} then resource Master Dimension [Material Complexity] {Threshold value=20} resource Master Dimension [Interpretation/Functional complexity] {Threshold=20}

If user variables Master Dimension [Sophistication] {value>90} then resource Master Dimension [Material Complexity] {Threshold value=90} resource Master Dimension [Interpretation/Functional complexity] {Threshold=90}

These specifications may then be passed to R4, as for example, control specifications, which when executed by appropriate resource management and/or processing may arrange configuration and management of the resources (i.e., R1, R2, R3) for user purpose operations.

Illustrative Example of Resonance Specifications FIG. 73 Example Resonance Specifications Resonance specifications may include one or more CPEs or portions thereof such as Dimension Facets and one or more associated optimizing specifications. For example if user=Beginner, then look to resources from, for example "Cliff Notes" or similar synopsis.

In some embodiments, the usage of resonance specifications may be in operative response to a CPE resonance specification and: a) offers an arrangement of candidate purpose similar, but for example more elaborated, and offering nuanced differing expressions, CPEs and/or purpose statements, for selection or other evaluation by a user, and/or b) offers additional Dimension Facets, Core Purposes, resource classes, purpose classes, Dimension weighting values and/or specific resources along with any associated, further specification information for selection and/or evaluation by user and/or for automatic inclusion or input into a purpose Statement resulting from an associated purpose expression.

Such usage also supports purpose associated information bases that may enable the dynamic building of resonance input resulting from evaluation of one or more CPEs and/or purpose statements and the assembling of relevant facilitating further input. For example, in a manufacturing process there may be a vast number of choices as to where and how to undertake that process. If a user wishes to understand how to manufacture for a product (for example Y), some aspects such as, for example, "what is required," "where is the supporting supply chain," "what transport infrastructure exists," "is there a ready supply of raw materials," and the like may be considered.

A resonance specification might contain and/or reference information sets that address these requirements, coupled with further specifications that optimize the combinations, which may include constraint sets and/or other specifications and/or Dimensions Facets that may impact the optimization.

A further resonance specification might comprise key criteria for such evaluation with ranges of possible weightings, user input, selection criteria, and the like.

Coherence services may in some embodiments use Dimensions (and Facets thereof) and/or metrics in the evaluation, prioritization, selection and/or management of one or more sets of resources (including specifications) for cohering including for example optimization, rationalization, friction reduction and/or other purpose beneficial processing for one or more user/Stakeholder purpose operations.

Coherence Services may use Dimensions (and Facets thereof), and the values associated with them, for evaluating potential resources (including specifications) for users/Stakeholders purpose operations.

For example Coherence Services may use Master Dimensions as part of the selection and filtering of candidate resources for users. Coherence Services may also use the Master Dimension Facets, to calculate order, prioritize, determine suitability and/or other resource characteristics, for use with other resources and/or use for purpose.

In some embodiments, Coherence Services may use and/or generate one or more sets of PERCos metrics. These metrics may be by one or more Coherence processes for evaluation, prioritization, management, monitoring, variation, specification and/or other manipulations of resources and/or processes in pursuit of purpose.

In some embodiments, Coherence Services may generate metrics associated with one or more Coherence processes, for example, resource correlation metrics (for example expressing the degree of correlation between the deployments of two or more resources for a given purpose where the purpose satisfaction metrics are above a threshold), resource relationship metrics, Quality to Purpose metrics, and the like.

Coherence Services may provide and utilize both quantitative and qualitative metrics. For example, Coherence Services may provide and/or utilize quantitative Purpose satisfaction metrics (for example those specified by users, measured through monitoring and/or computationally derived) to measure and analyze an operating session's performance in fulfilling users purpose expressions. Coherence Services may then, for example, map these quantitative Purpose satisfaction metrics, through one or more specifications, into Quality to Purpose metrics, which may then form the basis, for example in real time, of determination for selection of appropriate courses of action. For example, suppose a Quality to Purpose metric is below a threshold, then Coherence Services may attempt to determine the source of poor performance and perform appropriate actions (for example substituting a resource, for example replacing a resource with a higher performance version). Similarly, allocating and provisioning operating sessions, Coherence Services may use qualitative resource metrics. For example, it may recommend resources whose metrics values are in excess of one or more thresholds and/or other specifications (for example those in a resonance algorithm), and may then use these metrics as part of the control specifications for one or monitoring systems (for example PERCos Platform Monitoring Services) to monitor the operating resource(s).

In some embodiments, Coherence Services may generate and use one or more mappings between different metrics. These metrics may include PERCos Platform standardized and interoperable metrics as well as those generated during Coherence processing. For example FIG. 74 illustrates mappings between:

Edge Quantitative Purpose satisfaction metrics,
Edge Qualitative Purpose satisfaction metrics,
Inner Quantitative Purpose satisfaction metrics, and
Inner Qualitative Purpose satisfaction metrics.

FIG. 74 shows how Coherence Processing may use up and down mappings to map between qualitative and quantitative metrics. It also shows the mapping between edge and inner metrics. If the domain of a quantitative metrics is a lattice, then up and down mappings form a Galois connection between the qualified and quantified metrics.

We illustrate this relationship using an example Purpose satisfaction metrics. Suppose there are two users who have expressed a purpose (P). For example, one user (U1) expresses a PERCos standardized Purpose satisfaction metric $PS_{U1}$ that includes, for example the following attributes (which may include one or more Dimension Facets):

[Outcome Quality] {value}—user expressed value as to the overall quality of the Outcome to their purpose.

[Budget] {value} Master Dimension Facet—may be expressed, for example, as absolute value, relative value or ratio of user Master Dimension budget Facet to resource Master Dimension Facet.

[Presentation] {value}—for example user expressed attribute describing the relationship of user variable Master Dimension Facet [sophistication] to resource Master Dimension Facet [interpretation/functional complexity], often expressed as a ratio or percentage.

In this example, user U1 included [Presentation] attribute to express their ease of understandability of the results.

The second user (U2) creates a Purpose satisfaction metric, $PS_{U2}$ that has the following attributes:

[Outcome quality]

[Budget]

[Ease of use] user expressed attribute describing the relationship of user variable Master Dimension Facet [sophistication] to resource Master Dimension Facet [material complexity], often expressed as a ratio or percentage Coherence processing may, in some embodiments, unify and harmonize these user attributes, for example, [ease of use] and [presentation] to as to provide a single simplification, for example Outcome quality.

Illustrative Example of Metric Mappings FIG. 74: Mapping Between the Four Types of Purpose Satisfaction $NPS_P=(NPS_P, \leq)$ is a lattice representing the domain of the purpose satisfaction metrics, where $NPS_P$ is a set of tuples <NR, NC> where R is the quantitative result and C is quantitative ease of utilizing R.

For NP1=<NR1, NC1> and NP2=<NR2, NC2> in PSP,

NP1≤NP2 if NR1≤NR2 and NC1≤(NC2+M), where M is some scalar (constant).

For example, NR1 is a car that cost $23K, NC1 is the ease of obtaining NR1; and

NR2 is a car that cost $25K; and NC2 is the ease of obtaining NR2. Then NP1 is more satisfactory if it is a little more difficult to obtain than NP2. For example, NR1 is available within 30 miles whereas NR2 is available 50 miles away. In this case, users may consider R1 a better result than R2.

Although in this example, NC is the ease of utilization, it could also be the cost. For example, some purposes may require their users to obtain resources at some cost, such as obtaining licenses, service fee, and/or usage fee (e.g., storage, bandwidth and the like).

Moreover, purpose satisfaction may have additional attributes than results and cost.

$LPS_P=(LPS_P, \leq)$ is a lattice representing the domain of the purpose satisfaction metrics, where $NPS_P$ is a set of tuples <LR,LC> where R is the qualitative Result and C is qualitative ease of utilizing R.

LR ∈{bargain, good-deal, reasonable, little expensive, expensive}

LC ∈{easy, ok, hard, difficult}

We can define Galois connection between $LPS_P$ and $NPS_P$ $\varphi$: $LPS_P \rightarrow NPS_P$ and $\xi$: $NPS_P \rightarrow LPS_P$ such that $\varphi(lsp) \leq nsp$ if only if $lsp \leq \xi(nsp)$ and there are mappings N: $NPS_P \rightarrow NPS_I$, $N^{-1}$: $NPS_I \rightarrow NPS_P$, L: $LPS_P \rightarrow LPS_I$, and $L^{-1}$: $LPS_P \rightarrow LPS_I$ N, $N^{-1}$, L, and $L^{-1}$ are lossy.

FIG. 75 illustrates commutative diagrams that illustrate this mapping.

FIG. 75: Example Commutative Diagram

Resources may have multiple relations with other resources, which may include one or more metrics (for example expressed as values) associated with those relationships. Coherence Services, in some embodiments, may use these metrics during evaluation of resource applicability, suitability, providence, preference and/or other forms of evaluation of resources for one or more purposes.

Coherence Service may evaluate resource metrics that include the following:

Complexity,

Availability,

Reliability,

Costs

Efficiency,

Operating Parameters,

Dependencies,

Reporting,

Relationships,

Sophistication, and/or State(s).

Coherence Services may, in some embodiments, apply one or more metrics to one or more resources, which may then be stored by resources, other resources and/or Coherence Services. In this manner Coherence Services may build an operating profile for one or more resources for one or more purposes in one or more contexts.

PERCos Reputes embodiments may include one or more standardized metrics with associated values. These Repute metrics may be part of one or more Master Dimensions and Facets, such as Repute Master Dimensions and/or be used as metrics, by Coherence Services and/or other PERCos Platform processes.

Repute metrics provide standardized and interoperable effective and efficient methods for one or more users/Stakeholders to express, publish and/or evaluate standardized characteristics associated with resources, including their application and utility for purpose.

In some embodiments, Repute expressions may include the following standardized Repute metrics:

Quality to purpose,

Quality to Domain,

Quality to purpose class,

Quality to purpose of Stakeholder, and/or

Quality to Role.

Each of these is described more fully herein.

In some embodiments, each of these Repute metrics may form, in part or in whole, a Facet of a Repute Master Dimension.

Reputes which include one or more standardized Repute metric expressions may form Facets of Repute Master Dimension which may be used by users to select, filter, evaluate, manage and/or otherwise manipulate one or more candidate resources.

These Reputes may be considered as three broad groupings:

- Those created by and/or associated with resource publisher;
- Those created and published by one or more recognized experts for that purpose, purpose Domain and/or purpose class; or
- Those created by users who have interacted with resource (individually, in affinity group sets, crowds and the like).

Additionally there may be Reputes that are created and potentially used by PERCos Platform services such as Coherence Services, where for example purpose satisfaction metrics and/or other history is used by Coherence Services to calculate metrics suitable for inclusion in and assertion by Reputes. For example Coherence Services may create Reputes (which may for example only be available to Coherence Services and/or specific Coherence Service instances) that may include Quality to purpose and/or other standardized metrics. These are known as PERCos system Reputes.

An illustrative example of a user Dimension Set for CPE [Learn: Physics], which comprises two Master Dimensions:

Sophistication

[purpose Domain=Physics]

[value=Novice (3)]

Reputes

[Quality to purpose {value>90}]

Additionally the user has elected to include form their Participant Profile their own Repute sets for the CPE.

user Reputes sets

[purpose Domain=Physics]

[Repute_Server/user1/file.127.rep]-users Profile Repute information

[Aggregate Repute value=65]—note this is value user has selected/calculated as the minimum acceptable for resources An illustrative example of Reputes associated with a resource (the book "Physics for Novices" with example ISBN number "555" and illustrative PERCos resource Identifier (resource ID 123 . . . ) that may be a candidate resource to satisfy the user CPE [Learn: Physics] may include:

Author Reputes

[Subject=Physics for Novices/ISBN 555 . . . ]

[Assertion=Physics textbook for Novices]

[Assertion_value=Excellent(8)]

[Author_ID=Professor Smith/Res_ID345 . . . ]

[Author Reputes=Repute_Server_7/Professor_Smith/REPset2345 . . . ]

[Aggregate Repute value=56/100]

Publisher Reputes

[Subject=Physics for Novices/ISBN 555 . . . ]

[Assertion=Excellent Physics textbook for Novices]

[Author_ID=Professor Smith/Res_ID345 . . . ]

[Author Reputes=Repute_Server_7/Professor_Smith/REPset2345 . . . ]

[publisher_ID=Scientific Publishing.com]

[publisher Reputes=Scientific Publishing.com/Reputes/Physics for Novices]

[Aggregate Repute value=72/100]

Subject Reputes

[Subject_ID=Physics for Novices/ISBN 555]

[Quality to purpose value=91/100]

These Repute sets may be evaluated to determine the suitability of the example resource for the user's purpose. In this embodiment, the resource Quality to Purpose metrics value for the subject, which matches the users CPE, exceeds the threshold the user set in their Dimensions set.

In addition to Master Dimensions such as for example Reputes, there may be additional metrics associated with resources that may be evaluated. These include the following examples.

In some embodiments assertions may have standardized interoperable expressions, such that they form the value component of metric tuples and in so doing may convey one or more values, in association with one or more scalars, which may be a PERCos embodiment, purpose domain, user (including groups thereof), resource and/or other context specific.

For example "excellent," "bad," "good," "adequate" and the like may be associated with differing scalars for use in differing contexts. In some embodiments these assertion values may be associated, through for example tables and/or schemas with specific values (and/or ranges of values) on one or more scalars, and such scalars may be associated with one or more purposes and/or resources. For example "adequate" may be enumerated to value 5 out of a 10 point scale for a streaming connection, whereas in a restraint review context such a term may represent, for example, 2.5 out of a 10 point scale. These expressions and scalars may form part of PERCos standardized metrics.

In some embodiments, there may be standardized sets of these scalars associated with one or more metrics which may be used in one or more purpose Domains. This may include standardized sets that are specific to a purpose Domain. In some embodiments, there may be assertion look up and comparison tables for multiple purpose Domain scalars.

3 Dimensions

PERCos standardized Dimensions use the notions of information standardization, quantization and systemization as enablers for users and publishers to express characteristics for one or more resources that can be effectively and efficiently resolved through, for example, matching and similarity.

In some embodiments, PERCos includes one or more sets of standardized Dimensions. These Dimension sets may comprise, for example PERCos Master Dimensions and auxiliary Dimensions and/or specified arrangements of these, for example as simplifications that enable users to quickly evaluate potential resource arrangements (including Frameworks, Foundations, purpose class applications and the like).

Dimensions provide convenient and effective methods for users and publishers to provide sufficient information about resources such that a familiar conceptual model and associated interfaces may be used to engage with the vast range and variety of nuances of possible purposes and experiences that may occur for each new purposeful interaction. Dimensions sets serve both to orient users and publishers within a PERCos cosmos and to assist them in navigating and exploring it.

Master Dimensions are those designated and provided by PERCos embodiments for describing resource characteristics and in some embodiments comprise those sets covering four aspects (costs, quantities, qualities and difficulty), however there may be additional sets and aspects published by one or more publishers and/or utilities.

For example, additional Dimensions, either Domain-specific or cross-Domain, may be declared by authorized publishers, such as PERCos utilities and/or acknowledged Domain experts, in the relevant Domain(s) and/or by users/Stakeholders for their own use. In this case, the benefits provided by standardized and interoperable Dimensions are traded for finer granularity of resource description. Generally, users and publishers provide at least one set of PERCos Dimensions and may opt to provide additional further more specialized Dimensions with references to their definitions. Non-standardized personal or group Dimensions can only be interoperable within the user and group constraints, and consequently may have little benefit in addressing Big resource.

In some embodiments, a small number of generally applicable clusters of Dimension Sets may be distinguished as Master Dimensional clusters, which are major groupings of characteristics significantly influence user navigation and exploration. Some purpose navigation interfaces may provide easy access to, and control of, Master Dimensions as an overarching navigational tool.

Users may in some embodiments, elect to store one or more Dimension sets associated with one or more purposes. For example, a user whose hobby is stamp, wine, book or other such collecting, may elect to store such Dimensions as their Sophistication, Budget, Reputes, Locations and other user variables associated with their hobby as part of their profile. For example, such a profile may specify what is required of resources with which they may interact, such as integrity, reliability and the like.

These Dimension sets may be stored as part of users profile and may in some embodiments, for example be organized as a class system for each specified purpose.

Many users prefer to deal with standardized and/or familiar interfaces and conceptual models, and do not want to learn a new interface or a new model for each new purposeful interaction. The vast range and variety of nuances of possible purposes and experiences probably exceeds the complexity that most users are comfortable dealing with most of the time. Some PERCos embodiments provide features, called Dimensions that are widely applicable and serve both to orient users within a PERCos cosmos and to assist them in navigating and exploring it.

The characteristics of available and/or candidate resources largely determine the extent to which user purposes can be satisfied in a particular context. resources, in some embodiments, are generally associated with one or more Roles, constituting descriptive CPEs and descriptions of their interfaces and possible behaviors in those Roles. User Purpose satisfaction, Quality to Purpose and other standardized metrics may depend, at least in part, on the Role in which a resource is used.

For example and without limitation, a Role might specify the amount, type, and/or cost of available:

1. computing power and storage,
2. I/O capabilities,
3. information repositories (e.g., databases, websites),
4. software and other specifications (e.g., rule sets), and/or
5. expertise (codified in the system and/or available as real-time consultation)

These characteristics may set bounds on which experiences are available (and when) and meet other criteria, such as for example if they are affordable. Other elements of a Role might specify a resource interface.

User characteristics are normally represented internally as properties of Participants, which are resources representing users. As with other resources, Participants may have one or more Roles. Participant Roles may specify, for example and without limitation:

1. relevant purpose Domains,
2. capabilities (authorizations and/or other representations of allowed access to, modification of, and/or creation of resources), and/or
3. responsibilities, obligations, dependencies and/or other constraints.

In some embodiments, there may be further standardized expressions, methods, resources and/or processes that are affiliated with one or more Master Dimensions and can augment, manipulate and/or alter a Dimension simplification set by elevating certain one or more key Facets as an additional Dimension simplification grouping, for example, the abstraction related to experience type such as sad, joyful, relaxing, harmonious, surprising, exciting and the like might be provided as a logical grouping easily interpreted by and efficiently used by users. Similarly interactions (for example, Sharing, Commercial, Communications, Systems Control and the like) might in some systems be an easy to use Dimension as an abstraction of relationship processes between users and Stakeholders.

The following table provides an example set of Dimensions that may be used coupled with example scalars. These sets may be extensible with a wide variety of terms expressed with an associated scalar, such that one or processes may effectively evaluate these sets. This extensibility and subtlety need to be balanced against users' and publishers' relative expertise and time and effort considerations. To this end there may be simplifications provided as user interface expressions for both parties. For example a Dimension, Material Complexity, which describes the innate complexity of the material comprising a resource (for example the amount of detail, depth, density and the like) might be represented by a symbol, an alphanumeric (e.g. Com9), an arrow pointing upwards and/or other user interface representations.

| Dimension | Description | Example Scalar | Example Terms | Relationships to metrics |
|---|---|---|---|---|
| Material Complexity | Complexity of Material comprising resource | Scalar (1-10) | Basic (1)<br>Simple (2)<br>Professional (7)<br>Expert (10) | |
| Interpretation or Functional Complexity | Degree of complexity involved in interpretation of material and/or functionality of interaction | Scalar (1-10) | | |
| Time | Estimated time period for interaction with resource | Scalar (1-10) | Terms: Flash:<br>Quick: Short:<br>Medium: Long: | |
| Sophistication | Degree of user expertise in Domain, purpose class and/or specific purpose expression | Scalar (1-10) | Basic:<br>Simple:<br>Expert: | |
| Size | Size of resource | Scalar (1-10) | Tiny:<br>Small:<br>Medium:<br>Large | |
| Integrity | Quality of Integrity of resource | Scalar (1-10) | Unknown (0):<br>Low:<br>Medium:<br>High:<br>Trusted | |
| Reliability | Reliability of resource for purpose operations (may include common service reliability scalars based on five nines (99.999%) and the like) | Scalar (1-10) | Unknown (0):<br>low:<br>Below average:<br>average:<br>above average:<br>high: five 9's | |

-continued

| Dimension | Description | Example Scalar | Example Terms | Relationships to metrics |
|---|---|---|---|---|
| Risk | Degree of risk in use or resource | Scalar (1-10) | | |
| Budget | Specification of quantity of commercial or other costs | Relative to purpose Domain | | |
| Cost | Specification of Cost of resource for Transactions | relative to purpose Domain | Financial Range (hi-Med-Lo) | |
| Offensiveness | Degree of sexual or other material likely to offend significant audiences | | Adult | |

Metrics

Most often, current systems use metrics as measures of those features of such systems that are immediately measurable. Often such measurements are of what can be measured as opposed to what measurements may best assist users in achieving, in part, their purpose. These current measurements are often of low utility, especially to users. For example, consider metrics associated with resources. There are metrics that often comprise measurements of their characteristics, such as the date of creation, last access, size, location and the like. However, there are no metrics currently available that measures the utility of a resource for one or more purposes. One aspect of current metrics, generally, is that they are developed to be total, context-independent functions. For example, metrics currently do not return "unknown" as their values. And yet, in pursuing purposes, metrics that provide their quality for a given purpose is critical. For example, consider a resource that provides instructions on how to repot orchids. Users who grow orchids would find such resource extremely valuable, whereas they may not find a resource that provides information on quantum mechanics equally valuable.

PERCos embodiments address this inadequacy by providing one or more sets of standardized, interoperable, context-dependent metrics, which may be total or partial functions, that users/Stakeholders can for example use to manipulate, prioritize, provision and/or meaningfully optimize their purpose Outcomes. By allowing metrics to be partial functions, where their values may not be known for some elements in their domain space, PERCos embodiments enable users/Stakeholders to simplify Big resource to those that are important for their purposes. For example, consider resource relationship metrics, RRM, defined as $$RRM: R \times P \rightarrow [1,100]$$

where R is the resource arrangement Space and P is purpose Space.

RRM, in this case, is a partial function. For example, let R be a resource arrangement comprising a laptop and a network connection and P be a purpose "file taxes on-line." For this tuple, a Stakeholder declared (R, P)'s value to be 100. But for another purpose, say Q, "repot orchids," the value may be "unknown."

In some PERCos embodiments, metrics can be expressed as the enumeration of relationships between resources, users/Stakeholders and their expressed purpose(s). These metrics may be independent, symmetrical and/or asymmetrical.

For example a resource (R1) may be used in purpose operations with PE1. When considered from the perspective of PE1 (that is expressed by user/Stakeholder and/or other processes associated with PE1, including user/Stakeholder Participant representations), R1 may have been utilized successfully leading to a user (U1 the generator of PE1), declaring a "high" purpose satisfaction metric for R1 for their PE1. In this example PE1 (potentially also being a resource) may have an associated metric for R1.

In this example, from the perspective of R1, however, PE1 was for example, a purpose rarely associated with R1 (where in this example R1 had retained other PEs and/or purposes associated with R1—for example as resource purpose metrics), and consequently R1 may retain a low value metric for PE1. All of these individual metrics may be considered in one or more evaluations involving R1, PE and potentially U1.

In some PERCos embodiments each resource may have associated one or more metrics relating to the relationships with other resources, where such metrics may be in the form of R (the resource retaining the metric), R(o)—the other resource and M1 being the relationship between R and R(o) as valued by R (and/or processes associated with R) and M2 being the relationship metric for R(o) as valued by R(o). There may be multiple metrics (and or sets thereof) representing these relationships between and amongst resources.

In some embodiments, such metrics and any associated information may be retained in a store, for example PIDMX.

With the emergence of the internet and the emergence of Big resource, the human community can be brought together through PERCos, with its highly efficient and organized capability of expressing and resolving "nearness" of people, information, expertise, entertainment, and the like.

PERCos provides an almost unbounded potential for staging personal interaction and information access—a nearly limitless platform for the expression of the world's divergent arrays of human community/affinity groups, individuals, and information resources through visual representations supported, in part, by specialized database arrangements, presentation apparatus and method embodiments, governance and security attributes, and unique implementations of user management of time and timing, space and positioning, and contextual "nearness" of information and people.

The quality and nature of communications between people may be transformed as they are armed with the ability to stage and articulate their messages, personalities, and business and learning contexts—this may lead to optimized teaching and information opportunities, entertainment, commercial activities, and social interaction.

In some embodiments, some metrics may include the degree to which one or more resources is “near”, in one or more Dimensions, one or more other resources, including for example user Representations, purpose expressions, experts and/or other resources (and/or arrangements thereof). In some embodiments, such metrics may be utilized, so as to assist in the selection and/or provision of resources that may benefit and potentially optimize purpose operations.

Nearness, in some embodiments, may be determined by such techniques as logical “closeness,” physical “closeness,” and/or combinations thereof, for example as topology that includes both of these.

Nearness metrics may involve one or more categorization, valuation and/or other quantization schemas, such as for example class systems, which may be applied dynamically. Such metrics may be standardized and/or interoperable and/or may be localized and/or context dependent.

In some embodiments, nearness may be calculated and/or declared, and may involve one or more of the following attributes.

In some embodiments, nearness may include logical and/or semantic metric expressions and/or relationships as part of nearness. Nearness for concepts, attributes, and instances expresses the degree of their semantic nearness. For example, consider “car,” “truck,” “train,” and “airplane.” Conceptually, “car” is nearer to “truck” than to “train” or “airplane.” BMW 5-series models are nearer to Mercedes “E” models than to Toyota “Prius” models.

In some embodiments an aspect of nearness may be the location of one or more resources, where location may be physical proximity or virtual proximity. For example, although two resources are co-located, so that they are close to each other “physically,” if they cannot communicate with each other because they are, for example, on different networks, then they are said to be “far” virtually. For example, consider a company that has two facilities, F1 and F2. At each facility, the company has multiple servers, some for performing company proprietary work and others to interact with the company’s customers. To ensure security, the company may have the servers used for proprietary work on an internal network. In this example, there may be two metrics of nearness: physical and virtual.

In some embodiments nearness may evaluate and/or include one or more metrics and/or attributes of organization of resources.

For example nearness metrics may be expressed in terms of quanta—based in whole or in part on such values as frequency of use, semantic separation, number of “hops”, language characteristics (semantics/syntax/grammar and the like) and/or other measures/values (for example the more steps the further “out”, potentially expressed as one step=1, 2 steps=1/2 and the like). Nearness may often be applied in purpose operations circumstances where the number of resources may grow exponentially. This may be, for example managed through calculations and/or combinations (for example numbers of steps, degrees of complexity and the like) and/or purpose expressions (for example CPE/purpose statements/purpose metadata), where for example purpose is defined within the Ontology of class associated with such purpose.

In this manner the scale of resources that may be available to meet a purpose can be calculated and arranged in foreground as that set of resources that have been instanced (resolved resources) and may comprise the resource arrangement that is available and/or operational, and in background as a set of shadow resources, that have the potential to be available (the degree of such availability may also be expressed by conditionality and/or nearness).

The dynamic nature of PERCos and actions/operations of Coherence and/or other processes provides the methods to vary resources (availability/parameters/operations) in either foreground/background, in response to user interactions.

In some embodiments, nearness calculations may include one or more sets of rules, representing user/Stakeholder, resource and process interaction perspectives. In some embodiments, these may include:

User/Stakeholder rules
Group/Affinity rules
Governances rules
Preferences
Profile rules
Content rules
Process rules
Activity rules
Nodal
Network
Foundation & Framework rules
Nearness Triggers and Equations (aggregate nearness perspective(s))

In some embodiments PERCos services, such as Coherence Services may be invoked to evaluate these rules in pursuit of purpose operations. In some embodiments, the focus of an operating session may involve a range of specifications and associated values that have varying Foundation, Framework and/or nearness implications. For example, the rights of users/Stakeholders related to any interaction process and/or resource may vary based at least in part on specific session related Roles, relationships, and/or objectives.

Nearness and staging, through for example Frameworks, purpose class applications, PNI and/or other user interaction representations may determine positioning and/or display attributes for one or more of avatars, users, and displayed objects which may vary according to activity/session purposes and/or Participant/group relationships with purpose, including any one or more Roles served in the context of such purpose operations.

Purpose specifications, including preferences and rules selection, related to an activity or a specific session may be available generally through a purpose management user interface arrangement where purposes and/or sessions can be related to (a) people/group(s) and their Roles, rights, and staging and nearness disposition; (b) the staging and nearness of resources (including content) and associated rules; and (c) the relationship of component Frameworks within and/or in association with other Frameworks.

In some embodiments, PERCos systems may include one or more sets of metrics for nearness, in addition to PERCos metrics. These may include the following:

Statistical, grammatical, linguistic, geographic, heuristic, temporal, formulaic,
Associations/relationships
Generally agreed classifications and their inverse
Concept dictionaries
Identification of independent and dependent resource (variables)
Groups and their formal properties In some embodiments, there may be one or more equivalent methods (including look up tables) for evaluating and/or calculating metrics. For example there may be two methods, one method calculates the value 18 out of 20 and the other method calculates 88 out of 100. These two methods are considered to be equivalent.

Some PERCos embodiments may transform one set of PERCos or non-PERCos metrics to another set of PERCos or non-PERCos metrics. In cases where transformation is between non-standardized metrics and one or more PERCos standardized metrics, PERCos systems may require and/or invoke one or more specifications (for example control specifications) that provide the mapping.

However, if, for example, transformation is between two standardized metrics, then PERCos embodiment may evaluate the specifications of each of such metrics to perform the transformation. For example, suppose there are two differing ranking systems to rate wines. One ranking system may be concerned more with the return for value, whereas another ranking system may consider only the quality of the wine. In such cases, PERCos embodiment may decompose the specifications of each type of rankings to perform the transformation. For example, the ranking that provides return for value may have quality of wine component and cost component. In such an embodiment, the transformation may "drop" the cost component of the ranking to transform the return for value to quality of wine ranking. Similarly, for the transformation from quality of wine ranking to return for value ranking, a PERCos embodiment may add the cost factor to perform the transformation.

In some PERCos embodiments, there may one or more sets of metrics associated with temporal processing, for example these may include, intensity of processing (defined for example by depth/number of processing cycles/number of processing units and/or other metrics), results versus timeline (for example this, may include estimated and projected for a specified results output and may include alternatives result sets options, for example, expert provided (may have commercial aspect) versus "ground up/user determined").

Temporal purpose processing metrics may be used to limit and constrain the "halting problem," through determination of when purpose expression processing is sufficient/acceptable/optimum and the like, which may be determined by users and/or other processes (including specifications). This may include metrics of sufficiency/value/purposefulness and the like.

4 Weighting Functions

PERCos embodiments may include one or more weighting functions, expressed by users and/or processes. In some PERCos embodiments, a weighting function's value may depend on the relative importance and/or frequency or probability of occurrence of the item, and/or the item's tightness of coupling, importance, similarity, nearness, matching and/or other measure, relative to one or more given items, resources (including classes), and/or other contextual elements. Some weighting functions may depend, at least in part, on context.

The value returned by a weighting function does not have to be a number. It can be any type that makes comparing weights meaningful. For example, weights could be derived in part from attribute values. In some embodiments, they could be more discriminative expressions, for example, representing uncertainty (see for example those discussed in [Halpern] and [PEARL]). Suitable weighting functions may provide considerable efficiencies in pruning, matching, and/or evaluation operations, for classes. Weighting functions may also enable comparisons for a variety of purposes, especially in purpose matching and Coherence processes.

Weighting functions may, in some embodiments, be defined by one or more weighting description languages, which may provide various operators for specifying them. For example, weighting description languages may enable expression of "bias," where bias is preference at the expense of, possibly equally valid, alternatives in reference to resource arrangements. For example, some people have preferences of Apple Inc. products, such as a MacBook Air over PCs.

Weighting description languages may also enable the use of differing weighting functions, such as for example, Gaussian weighting function, which assigns weights to resources that are "near" the optimal resources. Some weighting functions may also favor Core Purpose, over other expression elements in purpose calculations.

Weighting functions may be also used to approximate user purpose. For example, suppose a user expresses a prescriptive CPE for which there is no "optimal" descriptive CPE. In other words, there are no resources whose associated descriptive CPE that satisfies the prescriptive CPE. In such a case, a PERCos embodiment Matching and Similarity Analysis Services may use weighting functions to find descriptive CPEs that are as "near" optimal as possible. For example, suppose a user expresses a prescriptive CPE, [explore: audax], where "audax" is a cycling sport in which participants attempt to cycle long distances within a predefined time limit. Further suppose that there are no resources that satisfy it. In such a case, PERCos embodiments may use weighting functions to find a descriptive CPE, [explore: sportive], where sportive cycling is a short to long distance, organized, mass-participation cycling event, typically held annually.

PERCos embodiments may also represent weightings in class relationships in ontologies. Traditionally, relationships between classes and other entities in ontologies based on description logics or other formal systems, such as RDFS and OWL, have been restricted to Boolean relationships. For example, a class in the ontology either is or is not a subset of another class in the ontology. However weightings can be used to represent uncertainties in ontologies. For example, weightings can be used to express the degree of overlap between two classes by specifying the probability that a member of one class is also a member of the other class. Two approaches for providing such weightings are:

1. Integrating Bayesian networks into a standard ontology language such as OWL and
2. Extending the traditional description logic semantics of OWL to allow it to a range of probabilities in its semantics.

In some embodiments, weighting functions and threshold classes allow further generalization. A threshold class contains as members only items whose value, according to a specific weighting function, exceeds a given threshold value.

The value of a weighting function applied to an item or class (its weight) may be determined in accordance with a formula involving classes, attributes, members, and/or other context. For example, a weight might be attached to each of a set of base class expressions; an item's weight could be the sum of the base weights of the base class expressions of which it is a member. If the base weights are all the same, this is equivalent to a combinatorial class expression that simplifies the expression of classes that are most easily described informally using words like "or" and "and/or."

For a given k and n, a combinatorial class expression's interpretation is a class whose members are members of the interpretations of at least k out of a set of n base class expressions. For example, a combinatorial class expression might declare that its interpretation's members are members of the interpretations of at least six out of a set of ten base class expressions. This is somewhat analogous to the way medical diagnostic manuals may define a syndrome by saying that patients have the syndrome if they exhibit at least six out of ten listed symptoms.

For example, let k=2 and n=4, and the base class expressions be {A, B, C, D}. Then the combinatorial class's interpretation is a class whose members are those that are members of the interpretations of A and B, A and C, A and D, B and C, B and D, and/or C and D. When k and/or n are large, the notational compactness of combinatorial class expressions can supply significant advantages in conciseness, clarity, and efficiency.

When k=1, a combinatorial class expression is called a union class expression—its Interpretation is a class consisting of all members of the interpretations of any of the base class expressions. Some class expression languages may provide special syntax for this useful case. An example would be specifying the interpretation of Major Party members to comprise members of the interpretation of at least one out of the two base class expressions, Democratic Party, and Republican Party. Note that this is a more restrictive specification than specifying that Democratic Party and Republican Party are both Subclasses of Major Party, which would allow the possibility of there being other members of Major Party.

When k=n, a combinatorial class expression's interpretation is a subclass of each of its base class expressions. However, when k<n, a combinatorial class expression does not necessarily specify a subclass of the interpretation of any of its base class expressions.

In different situations, it may be helpful to use weights in differing ways, for example, and without limitation:

1. Downward comparisons use the weights of subclasses of a particular parent class.
2. Upward comparisons use the weights of superclasses of a particular child class.

As a simple example of a downward comparison, Sport.Baseball and Sport.Football, each with weight 10, Sport.Bowling, with weight 1, and Sport.Jai Alai, with a weight of 0.1, might all be declared as subclasses of Sport (along with many others). Then, when searching or filtering within Sport, Sport.Baseball and/or Sport.Football in a descriptive CPE could be treated as more relevant than Sport.Bowling and/or Sport.Jai Alai.

As a simple example of an upward comparison, there might be a class K279 Engel that was a declared to be a subclass of each of Composer.Mozart, Form. "Piano Sonata", Artist. "Karl Engel", Label.Teldec, and Medium.CD, with respective weights 10, 8, 5, 4, and 1. When looking for "neighboring" or "similar" classes, Composer.Mozart and/or Form. "Piano Sonata" could be treated as more important than Label.Teldec and/or Medium.CD.

Some embodiments may use weighting functions for both downward comparisons and upward comparisons. In some embodiments, the same weighting function may be used for both downward and upward comparisons. In some embodiments, weighting functions may be used for side comparisons between related classes.

When there is more than one declared level of subclassing, some embodiments may combine the weighting functions from successive levels according to a context-determined rule. For example, weights obtained at the various levels could be added, multiplied, or combined using, for example, any of the methods discussed in [Halpern].

Threshold classes may provide additional perspectives on relationships among class expressions, classes, attributes, and/or members, which may be general or domain-specific, and hierarchical or non-hierarchical. For example, and without limitation, a weighting function may indicate:

1. the relative importance of an item or class,
2. the (cumulative) significance of one or more relationships between items and/or classes, and/or
3. the "closeness" of attributes, members, and/or to each other.

In some embodiments, metrics may have associated weighting functions, which may include dynamically associated interactions and/or Preference derived weightings. Coherence Services and/or other processes, in some embodiments, may use such metrics to resolve interactions, make selections and/or options. Users may include such metrics in their preferences to be utilized by such processes.

Metrics may involve probabilistic processes and/or other calculations to determine their use, values and/or other contributions to weighting or other applications of metrics. Coherence Services may use methods, such as for example, cumulative prospect theory, to optimize metric values, such as purpose satisfaction metric value, relative to the reference point using probabilistic weighting functions. For example, suppose most optimal resource arrangement is not available. In such a case, Coherence Services may use cumulative prospect theory to find alternate resource arrangements that are as close to the reference point, which, in this example, may be Purpose satisfaction metric value for the optimal resource arrangement.

5 Evaluation/Calculation of Dimensions and Metrics

In some PERCos embodiments, PERCos Evaluation Service instances may use hybrid approaches comprising reasoning services, statistical analysis, testing and the like. The reasoning services, in some embodiments, may use multiple theories and logic systems, for example including Dempster Shafer theory, Bayesian theory of subjective probability, description logic, modal logic including epistemic logic, and the like.

Halpern for example, provides considerable discussion of the strength and weaknesses of various techniques. For example, Dempster Shafer theory is useful in combining assertions, such as Repute assertions, from different sources to generate a metric that represents a degree of belief (represented by a belief function). The theory is especially useful when there are multiple assertions for the same Subject.

In some cases, PERCos may determine/assess/evaluate metrics, such as, for example, degrees of belief, confidence, trust, and the like, on the probabilities for related assertions. However, these metrics may or may not have the mathematical properties of probabilities. In particular, metrics may represent epistemic plausibilities, but their evaluation can yield answers that may be incomparable to those arrived at using probability theory. For example, consider a professor at a prestigious university. Its credibility metrics is implied and meaningful only in the context of evaluation. In the context of mathematical purpose, the professor presents high credibility, given his work at the university. However, in the context of interior designing, his credibility is lower, given lack of the evidence of his interior designing skills.

In some embodiments, Repute Framework may allow users/Stakeholders to specify evaluation factors, such as the usage of a statistical model, rules, preferences, beliefs and the like to generate uncertainty metrics. For example, suppose a user is interested in red wines from Russian River Valley. The user may evaluate Expert opinions based on the user's own preferences, expertise, and belief. For example, the user is partial to Pinot Noir and would prefer to purchase moderately priced wine. Consequently, even though experts may rate Donum Russian River Valley Pinot Noir 2007 higher, the user's own evaluation criteria may rank it lower than Benziger Russian River Valley Pinot Noir 2008.

PERCos may collect all inputs from experts, interventions and the like into a multi-Dimensional data store (for example database/knowledge base). For example, if movie reviewer A (expert a) likes movie N, and user also likes Movie N, then a user may be inclined to accept experts' assertions regarding other movies. In some embodiments this approach would be suited to use in evaluation.

Some PERCos embodiments may use a wide variety of calculations to evaluate and/or calculate metrics. For example, consider purpose satisfaction metrics associated with resource arrangements. As illustrated in FIG. 76 this metric may use methods for calculating/evaluating their values that consider factors such as for example, evidential, causality, and explaining away methods.

Evidential factors may include one or more declarations, measurements and/or observations. For example in PERCos embodiments, a declaration may be a statement, which may be an assertion or effective fact. For example, in FIG. 76, users (Us) may make evidentiary assertions of the form E(U, A, C), such as asserting (As) that they found a particular resource arrangement is highly satisfactory for a given purpose and provide their Reputes (Cs), which are often credentials. For example, some users may provide their Reputes that assert their expertise in networking.

Experts may also provide evidential statements by making statements that are observations. For example, a physics professor of highly regarded university may opinionate that a new textbook may be very useful in learning physics. A weather forecaster may assert that the roads will be slippery tomorrow due to snow. These statements are stored in one or more resource data structures.

FIG. 76: An Example Metrics Calculation Process

To support one-to-boundless computing, where there may be vast number of potential individual evidentiary statements, some PERCos embodiments may use a variety of methods to aggregate statements to associate values with metrics. For example, consider a metric for rating a widely popular restaurant. There may be many customers who have provided evidentiary assertions stating their experience. Some PERCos embodiments may aggregate them by using a variety of sampling techniques, such as without limitation, Monte Carlo methods, stratified sampling, uncertainty sampling, cluster sampling, random sampling, experience sampling method, calibrated probability assessments, Poisson sampling and the like. For example, consider a restaurant. Some PERCos embodiments may use stratified sampling of its clients, such as restaurant critics, business diners, family diners and the like. They may then provide the metrics for each group, which can then be combined using differing weights based on contexts and/or purposes.

Some PERCos embodiments may use a hybrid approach, such as augmenting a stratified sampling with using other sampling approach for those groups for which there are a lot of variances in evidential statements. For example, suppose there is a lot of variance in the opinions of restaurant critics. PERCos embodiments may then perform calibrated probability assessments to rank critics to derive a value for the group.

PERCos embodiments may also generate multiple values to represent diverse point-counterpoint opinions. For example, vegetarians may have different opinions of a steak house than a meat lover.

Intervention in a causal network is an explicit act to influence uncertainty measures. Some example causality factors that can influence/intervene uncertainty measures are as follows:

- Users/Stakeholders, (including publishers) may provide rules of governance, such as controlling access to and/or operations of resources. For example, US International Traffic in Arms Regulations (ITAR) licensing regime imposes stringent controls on commercial encryption products, with a limited few exceptions.
- Users/Stakeholders modify, direct, edit, and/or delete users' dynamic Creds according to direct intervention, user rules and/or by other processes authorized to do so. For example, consider a professional athlete caught doping. The athlete's Cred would be discredited by the anti-doping agency. Similarly, State Bar Associations and Medical Associations may respectively revoke bar membership of lawyers and board certifications of doctors accused of misconduct.
- Experts provide postulates, assertions and the like about resources, such as their effectiveness in fulfilling purposes. For example, experts may provide resonance specifications that optimize purpose fulfillment.
- Users/Stakeholders performing actions that invalidate the preconditions of evidential statements. For example, consider an evidential statement asserting the quality of video streaming. If the quality of streaming videos is highly dependent of the network condition, then the resources (and organizations thereof) that provide the network connectivity can intervene to modify the quality of video streaming.

Evidential statements can also be intervened by other factors. For example, consider slipperiness of roads. A weather forecaster may assert that because of snow, streets may get extremely icy and slippery. However, the city may spray salt on the roads to intervene the weather forecaster's evidential statement, expressing that roads may get slippery.

Users express their opinions/assertions about the usefulness of Reputes. For example, by users increasing utilization of a specific Repute set or expression is an example of intervention, where their intervention may be reflected in a more positive overall expression of those Reputes, and conversely, absence of user utilization may negatively reflect the uncertainty measure.

In some embodiments, as illustrated in 77, intervention statements are control specifications that specify how to modify evidential statements from, for example, experts.

FIG. 77: Illustrative Example of a "Generic" resource

Example of user directed intervention. User 1 has assertion (x) from other user 2. User 1 then presents user 2 with an assertion they know to be an Effective Fact (EF1), and evaluate original assertion of user 2 based on user 2's response to user 1 assertion of EF1.

Stakeholders may also provide intervention rules. For example, an executive for an organization can make evidential statements that comment about the organization's views and provides a Repute/Cred expressing the executive's position in the organization. However, the organization may have provided intervention rules that state that any evidentiary statements made by its employees are their own and do not reflect the opinions of the organization, except explicitly authorized. In such a case, the executive's Repute associated with the executive's evidential statements is invalidated.

In some embodiments, for example, differing cultural perspectives may be represented by postulates, such as multiple perspectives on a common data set. For example, economists from differing disciplines have differing interpretations on reasons for unemployment, ranging from excessive regulations, companies outsourcing to foreign countries, poor education systems and the like.

In some cases, interventions can be associated with the subject matter of an evidential statement as a pre-condition. For example, highly regarded universities, such as for example, Stanford, Caltech, MIT, Harvard, Yale, U of Chicago and the like are believed to be excellent institutions for obtaining an education. These universities may have a governance rule that states that the user has to be registered as a student at their university. In such a case, a precondition, "a user must be a registered student at the university" is associated with the evidential statement, "Stanford is an excellent resource for the purpose [obtain: Education].

Some PERCos embodiments may use assessment techniques, such calibrated probability assessments that are subjective probability assigned by experts trained to assess probabilities in a way that historically represents their uncertainty. For example, Domain experts may assert their predictions about satisfiability of resource arrangements with a certain level of confidence. PERCos may use a calibrated probability assessment that uses historical data to periodically associate a "weight" to recalibrate the asserted confidence levels of experts.

In some embodiments, users can select one or more sets of specifications, including Master Dimensions and Facets, PERCos metrics, user profile information sets and/or preferences and/or any other appropriate contextual information, that may be grouped (and potentially published, creating a resource) that may form a "lens" for one or more purpose operations. These "lenses" may comprise one or more sets of statements expressed as assertions and/or specifications (both of which may have associated metrics) that provide one or more constraints sets to be applied during purpose formulations for their expressed purpose. These "lenses" may be provided by users, either themselves and/or other users (their Postulates codified as specification and/or metrics), one or more experts, publishers, and/or other user groups/Stakeholders.

These lenses may be expressed in the form of PERCos Constructs and may include, through reference and/or embedding sufficient resources to enable their instantiation for and use by one or more users.

Some Postulate sets may be purpose Domain specific, Role specific, user/stakeholder and/or user group specific. In some embodiments these may also be applied to all users purpose Domains.

Postulates may be considered, in some embodiments as preconditions represented by specifications that may be required to be satisfied and/or resolved prior to purpose formulation processing.

In some embodiments, users may have one or more preconditions reflecting their current perspective on their intended purpose. For example this may include postulates, preferences and/or other contextual information (such as temporal, location, computational resource and/or other aspects affecting their purpose expressions).

Users may initially express their purpose, using for example a CPE which is in whole or in part affected by those preconditions user(s) has associated with the expression(s). This may then start an unfolding experience where PERCos computational resources may be invoked, for example purpose formulations, which may cause through interaction with user, variations, manipulations and/or selections as a user gains further understanding of purpose and context of their expression(s) in relation to one or more purposes. In this manner a user may be experiencing a PERCos unfolding experience.

In some embodiments, for example, an expert $E_1$ in purpose Domain PD may make an assertion $A_1$. Such an expert may have Repute metrics (Creds) of value N in PD (expressed as RV). (E1 RV=$C_1$ for PD). A second expert $E_2$ may make an assertion ($A_2$) also in $PD_1$, and for example, if $E_2$ makes $A_2$ in PD and $E_2$ also has Creds of value that is less than N in PD, then $A_1$ may be ranked higher than $A_1$ in PD.

Suppose user 1 ($U_1$) creates a purpose expression in PD (PExp of PD), then $A_1$ and $A_1$ may be of some interest to $U_1$, if they have some correlation with PExp.

In some embodiments, if $A_1$ and $A_1$ were sufficiently relevant to PExp, then both would be included in Result Set 1 ($RS_1$) for PExp. The following are some illustration of example determination of sufficiency of relevance performed by matching and similarity processing:

- If $U_1$ expressed a postulate (as for example a statement) that can be used to determine that $E_1$ and $U_1$ are not in the same affinity group. For example, $E_1$ and $U_1$ may have differing political, religious, cultural and the like groups, such that $E_1$'s beliefs are inconsistent with $U_1$'s beliefs. In such a case, (represented by postulate, for example $Pol_1$) then $A_1$ may be excluded from $RS_1$.
- If $U_1$ selected as a preference that RV must be N or greater, in which case $A_2$ would not appear in RS1
- If $Pol_1$ expressed contradiction with $A_1$ and that RV must be N or greater, then neither $A_1$ nor $A_2$ would be included in RS1

In another example $U_1$ has expressed in $Pol_2$ "that X is 100% true for them in PD," where X is an assertion that $U_1$ wishes to consider as a "fact" for PD.

If $E_1$ in PD expresses an assertion $A_3$ "that X is 100% false for $E_1$ in PD," then $U_1$ when undertaking purpose operations may opt to exclude $A_3$ from their results sets R52, revise their $Pol_2$ in light of $A_3$ (for example $Pol_2$ may be modified, for example, such that "X is 80% true for $U_1$ in PD" where assumption/belief is expressed as a weighting (%) or potentially $U_1$ may restate $Pol_2$ As "X is false for thin PD" with associated reference to $E_1$ and $A_3$ (and any associated metrics and/or Creds).

In another example $U_1$ may have undertaken PExp and have experienced $RS_1$, which may have included resources Eland $E_2$, being two different experts in PD with differing assertions regarding PD (for example E1 asserts "C=0" whereas $E_2$ asserts "C=100").

$U_1$ may use PERCos Point-Counterpoint and/or similar methods to reflect the differences in assertions of $E_1$ and $E_1$ in PD, which may include the arrangement of resources associated with $E_1$ and $E_2$. In some embodiments this may involve resources which are common to both $E_1$ and $E_2$, though the assertions associated with the resources may differ.

This may be reflected, for example by the common resources associated with both $E_1$ and their assertion $A_1$ and $E_2$ and their assertion $A_2$ (for example simplified as R(x)), as now being part of a common Result set ($RS_1$ in PD) in response to $U_1$ purpose operations of PExp, that consequently R(x) may have an associated PIDMX that includes the relationship of $E_1$ ($A_1$) and $E_2$ ($A_2$) in PD. In this example the PIDMX reflects the relationships between the resources (where $E_1$ and $E_2$ are considered as resources) and not the evaluation of $A_1$ and/or $A_2$ by $U_1$.

However $U_1$ may utilize one or more evaluation processes to evaluate $A_1$ and $A_2$, which may include application by $U_1$ of their postulates (expressed as for example $Pol_1$) on $RS_1$ which includes $A_1$ and $A_2$.

$U_1$ may further evaluate $A_1$ and $A_2$ through Repute values (Creds) for $E_1$ and $E_2$ in PD.

In some embodiments, $U_1$ may opt to select “lenses” offered by one or more experts and/or publishers with which to undertake purpose operations. These “lenses” may include pre-configured arrangements of resources (including, for example, sets of statements that may include postulates, assertions and/or effective facts) that experts and/or publishers have organized for a given purpose domain, so as to provide $U_1$ with an efficient and effective methods and method embodiments of satisfying their expressed purpose. In some PERCos embodiments these may be presented as Frameworks, and/or other Constructs, including for example purpose applications, purpose class applications.

In some embodiments, such Constructs and applications may comprise one or more postulates, expressed implicitly and/or explicitly.

Explaining away methods are presentations of differing explanation, such as presenting counter points. In PERCos embodiments this may involve multiple statements, which present differing perspectives on the same subject matter. For example, for vegetarians, a thanksgiving dinner menu around a roasted turkey is of low value, whereas for a traditionalist, it may be of high value. Explaining away methods may factor the views of the providers of the evidential statements in using the provided metric value.

One type of metric expression that may be used in some PERCos embodiments is the Uncertainty Measures. For example, let PC be PERCos cosmos R be set of resource arrangements associated with a P(D), a purpose Domain. $P(D)\subseteq PC$.

Exp be set of experts in P(D) where an expert, Exp, may have an expertise degree, $exp\leq 1$, in P(D)

U be users who make evidential statements, $A_1$, about $R \varepsilon R$

S be users/Stakeholders/experts who intervene.

D be degree of beliefs users and experts can make their evidential statements, which may be assertions or effective facts on subject matters, which are the substance that can be operated upon and/or perform PERCos operations, such as, for example, resource arrangements, associated with P(D), with a degree of belief $d_{i1}$, $d_{i2}$, $d_{i3}$, . . . , respectively In some embodiments, an uncertainty measure, UM can be defined using three partial functions: Observation function, O, Intervention function, do, and Evaluation function, Eval: where O: $P(D)\times(U \cup Exp)\times A\times C\times D\rightarrow DB$ (data associated with one or more resources)

do: $P(D)\times S\times R\times DB\rightarrow DB$

Eval: DB×user×“Lenses”x . . . →UM

For example, O is a function from tuples comprising factors, purpose Domain, user's assertions or Expert's observations on a subject matter, Reputes, and degree of belief, such as the confidence level of the user/Expert. For example, consider a textbook on physics. Students may make evidential statements asserting the textbook's usefulness in learning physics. They may also specify their degree of confidence. Professors, in this case, are experts, may also make observation about the usefulness of learning physics. They make observations, because in some cases, they may not have experienced the actual experience of learning physics using the textbook. Instead, they rely on their expertise to observe that the textbook would be effective in learning physics.

An intervention function, do, is a function from tuples comprising factors such as for example, purpose Experience, Stakeholders, resource arrangements and the like into DB. For example, experts may change their degree of belief in their postulates, and/or users using their assertions may affect the metrics of their postulates. One or more stakeholders may also intervene. For example, stakeholders may specify a control rule for accessing Expert's beliefs.

Generally, UM is an uncertainty measures used in some PERCos embodiments as a metric measure. Some embodiments may define UM without making use of DB. For example, when evidential statements are highly dynamic with very little interventions, then it may be more optimal to compute UM directly without making use of DB. However, in cases where there are vast number of evidential statements and/or a non-trivial set of interventions to be processed, having DB enables PERCos embodiments evaluate uncertainty measure more efficiently by having DB that processes interventions on evidential statements at the time of assertion/observation, rather than waiting until the time of evaluation.

An evaluation function, eval, is a partial function that evaluates intervened evidential statements in the context (“Lens”) of an evaluator, such as for example, a user. “Lens” or context can comprise multiple factors, including the evaluator's Master Dimensions and Master Dimension Facets, augmented Dimensions and the like. For example, consider a vegetarian whose purpose is to dine at a restaurant. For such a user, evidential statements, such as “xxx is a great steakhouse” is of very little value.

6 Example Metrics

In some embodiments, PERCos purpose metrics include those metrics directly associated with purpose, from user/Stakeholder expression through purpose operations to purpose results sets.

Some examples of such purpose metrics are outlined below.

Purpose metrics may be pre-arranged to form composites that are accessible to one or more users, for example in the form of classes.

Quality to Purpose (QtP) metrics describe the degree to which one or more resources fulfills one or more purposes. These metrics are standardized and may be included in Repute expressions. They may, in some embodiments, be, in whole or in part, declared and/or calculated and may reference one or more methods used for their creation.

For example QtP when used as part of a Repute expression may be an asserted value declared by a user. For example QtP

[purpose] [Learn Physics]

[method] {user declaration} {user=user 123/Reference Server 47/user_Reputes}

{value=90}

In some embodiments, these metrics may be declared by users during and/or at the conclusion of their purpose operations, and may include for example Repute assertions, standardized purpose metrics and/or any other form of expression.

In some embodiments, quality to purpose metrics may be associated with the perceived quality of the overall experience for the user/stakeholder in pursuit of their purpose. This may include the experiences of the users during purpose unfolding, which may be independent of the satisfaction of user for results sets.

This metric embodies the degree to which one or more users/Stakeholders satisfaction regarding their expressed purpose. The values expression as with other PERCos expression tools will in many embodiments, employ at least substantially in part standardized, simplification characterizations as satisfaction Dimension Facets and any associated values.

In some embodiments this may be declared by one or more users as an expression of such purpose satisfaction and/or may be evaluated, calculated, and/or inferred. In some embodiments, such metrics may be combinations of both, for example resource X may have a number of declared purpose satisfaction metrics and further calculated metrics, which may be presented as a set of such metrics and/or as a combined calculated metric.

Satisfaction may have emotional and/or logical basis of determination. Satisfaction is not necessarily comparable to optimal Outcomes. Optimal Outcomes is based at least in part on employing best suited resources and/or resource portions to produce a result. For this process to be performed meaningfully, requires contextually specific efficient user knowledge/expertise in support of such optimized Outcome assessment. Users may frequently experience a degree of satisfaction in realizing a result that is substantially less than an optimal Outcome.

In one example, Purpose satisfaction may be:

Expressed directly by user (and/or on their behalf),

Inferred from user behavior (at one or more time periods),

Based on decisions of user, including their own resource arrangements,

Calculated from user utilization metrics, such as frequency of use, combinations with other resources, purpose utilizations and the like.

Shared purpose expression metrics are metrics for the associations of one or more users with shared purpose (a group of users with a collective/common purpose that includes the users' interactions including their real time, delayed and/or virtual interactions).

These metrics include both collective and individual metrics reflecting the interactions and such aspects as:

Individual and aggregate users' metric expressions, including purpose satisfaction and the like.

Resource purpose metrics can reflect the degree of "usefulness" of one or more resources (and or arrangements thereof) for one or more purposes, where attributes of "usefulness" may include:

Utility,

Purpose satisfaction,

Purpose alignment,

Purpose results, and the like.

Moreover, each usefulness attribute may be multi-Dimensional. For example utility attribute of resource purpose metrics may include expressed and/or implied tangible/intangible benefit, efficiency, completeness and/or other enumerations and may be expressed as a single and/or multi part variable—for example Utility>(X), Utility=(Utility [Efficiency, Y, * Completeness]>V etc. . . . ).

Utility may be declared and/or calculated:

of resources for CPEs and/or the degree of satisfaction of purpose performance by resources for the users May be calculated of their purposeful results for the stated purpose expression May be calculated of purposeful results for user expressions of their purpose intent Can be user expressed Purpose satisfaction metrics may also have multiple Dimensions, such as the completeness, accuracy, efficiency and the like.

Resource purpose metrics may be derived for classes and their attributes when used as specification elements. Resource purpose metrics may have associated Creds, which may be on/about metrics and/or methods of metric expression.

PERCos resources may have one or more metrics associated with them which may be used by one or more PERCos processes for purpose operations. These metrics may include expressions of relationships, for example— to purpose expressions and associated operations, to other resources (including user/Stakeholder representations), to processes, to stores and to other metrics.

In some embodiments these metrics and their associated values may be used in one or more Dimensions (including Facets).

Some examples of such resource metrics are considered below.

PERCos systems may include one or more standardized complexity metrics, including those in Master Dimensions, such as for example resource material complexity.

There may be multiple types of resource complexity metrics, including for example the following.

Degree of complexity of the resource to which it applied. This metric may be "high" for a complex resource made up of many resource components, independent of the functionality of those components. For example there may be purpose application that undertakes financial option evaluations, comprising multiple sets of inter connected resources, where as a "Low" complexity metric may be applied to a resource that provides a translation, via a few other component resources, from English to French.

Degree of complexity to integrate a resource with other resources, which may have parameters such as, number of API calls, numbers of messages for a single cycle of resource operations and the like.

Resource complexity metrics may also be considered by such processes as Coherence Services when evaluating the degree to which computations may need to be undertaken to achieve a specified Outcome or meet one or more specifications and/or criteria. Coherence process operations may consider complexity in calculations of resource suitability for one or more purpose.

Some of the types of difficulties and complexities that may be considered within resource Complexity metrics may include type, size and/or number of conditions within a specification, available resources, computational complexity, number of rights and/or rules, results sets, management and/or other expressions of difficulty.

For example complexity metric (CM) may be calculated as:

CM=Steps x Conditions or

CM=Step 1 [Condition Set 1]+Step 2 [Condition Set 2]+Step N [Condition set N]

where for example Condition Set may be, for example:

The number of members in the set,

A calculated value for the set (where for example each Condition has a further metric on a scalar, for example from low complexity (1) to high complexity (100)), A specification that is processed by a further process to provide a value.

The method for the calculation of the metric may be associated with the metric or the value of the metric may be available.

Resource complexity metrics may be associated with PERCos resources and/or Participants (representing users) and/or Stakeholders. For example in one embodiment, a resource may have associated resource complexity metrics, where factors such as the number and/or types of conditions that may need to be satisfied (in whole or in part) for a resource to become able to be used may be expressed.

A further example may be the expression of complexity metrics by the user/Stakeholder, so as to, for example, express their preference for more or less complexity in the results set for their purpose, and/or to only use resources who are have a minimal resource material complexity (for example as expressed in Master Dimensions) in their being available.

Coherence may use complexity metrics in any arrangement, for example through evaluations in determining resource selection and/or utilization as well as for other complexity metrics, such as those examples described below.

In some embodiments, resource complexity metrics of an expression can comprise the degree to which one or more computational processes are may be required to be undertaken to achieve/meet one or more stated criteria/specifications.

Resource complexity metrics may be expressed in computational terms and/or be expressed by user to reflect the perceived complexity of their generated output and/or desired results set.

Resource complexity metrics may include one or more sets of conditions, for example triggers, thresholds, dependencies, resource relationships, Repute expressions and/or other specifications which have requirements that need to be satisfied. Resource complexity metrics may also, in some embodiments, express the type and number of computational activities which may be required to achieve a specified Outcome. Resource complexity metrics, for example, may include without limitation:

One or more sets of conditions (specifications),

Time/temporal values,

Computational processes (including enumeration of quantity, types and/or purpose operations), Costs, Delimiters/guards/constraints, or Entropy modeling.

Coherence Services may utilize complexity metrics in deciding which resources may be best suited to a given set of circumstances. Resources may have associated complexity metrics for their operations.

This set of metrics pertains to the resources availability and may for example include:

various time values (for example time to start, time period of availability, time required before start and the like), predicates (dependencies—for example Foundations, other resources and the like), Conditions (for example specifications of costs, reporting obligations, input/output requirements and the like), and/or other specifications that detail the degree of availability of resource(s), which may be used by Coherence Services in the selection, substitution, prioritization and/or provisioning of resources for purpose operations.

Reliability metrics encompass the degree of reliability of resource for one or more purpose operations. This may include metric values as to the operating Reliability of resource in one or more operating session and associated contexts.

An arrangement and/or group of resources may have a degree of reliability. For example, reliability metrics for using a dedicated land line phone may be higher than those of a cell phone, Skype call and the like.

In some embodiments, one resource may be considered to have higher reliability metrics values with respect to a resource arrangement when, for example that resource performs more reliably when it is part of resource arrangement A rather than resource arrangement B. These metrics may also comprise specifications detailing the purpose operations, processing and/or other operations which comprised the context for these evaluations, which may involve Coherence Management in, for example, issuing such metrics and/or using such metrics.

Resource relationship metrics comprise those metrics that reflect the relationships of one or more resources with other resources and/or resource arrangements. These resource relationships may be expressing differing types and/or values of relationships between and amongst resources. For example, in some embodiments, these may include:

Enumerated conditions,

Purpose associations,

Dependency, or

Resource arrangement relationships including for example classes.

Resource relationship metrics may be standardized and/or interoperable expressions. For example a resource that is often successfully used with another resource, such as a Foundation, may have a metric expressing this satisfactory relationship.

These conditions may be used to express one or more relationships between a resource and other resources and/or arrangements thereof. In some embodiments, these relationships may comprise part of resource PIDMX, which subject to resource interface specifications may be made available to Coherence (and/or other resources processes) for evaluation and/or selection of resources for one or more purpose operations.

In some embodiments, these resource relationship metrics may be used to express, including for example through use of Tests and Results Services and/or other processing, the overall utility (which in turn may be expressed in the form of other metrics, such as for example, reliability, efficiency, complexity and the like) of a resource and/or arrangements thereof (for example resource) in performing one or more purpose operations. This provides Coherence with specifications that may greatly simplify the resource evaluation process.

Examples of such metrics may in one or more embodiments include:

resources uses for purpose,

Relationships with classes,

Relationships with other resources, or

Relationships with resource arrangements (Frameworks/Foundations and the like).

Examples of expressions of such metrics may include:

Performance—expressed as degree of potential and the like,

Utilization—who, how often, for what, when, time periods,

Availability—degree over time,

Organization—what, relationship, internal assignations,

Dependency—with what other resources and/or sets thereof, or

Risks.

Risk metrics may also include:

User interaction, resource interaction,

Purpose interactions,

Platform interactions, or

Rule/history/preferences.

In some embodiments classes may be considered as resources, though they may have metrics that are specifically aligned with classes as resources.

For example in some embodiments, classes may be represented as graphs, where nodes are classes and edge may be super/sub class relationship or relations between classes.

These graphs may also be used to convey the weighted relationships between classes and/or the weighted relationships between members of classes.

In some embodiments, resources may have one or more relationships with other resources. Often these relationships are created through these resources having been part of one or more common results sets, used by one more process together and/or other calculated, declared and/or use based relationships.

resource relationship metrics may, in some PERCos embodiments be expressed as discrete conditions and/or be combined to form a conditionality set.

Conditionality is a term for the expression of one or more conditional relationships between a resource and other resources and/or arrangements thereof.

A condition is an expression of a premise describing what may be required for an event/action associated with a resource to take place. In one embodiment, there may be one or more conditions associated with resources and/or arrangements thereof.

Some examples of conditionality metrics include:

Degrees of conditionality, including values,

Conditionality testing, including frequency of testing, testing certification(s), Scale and scope of control expressed in condition (e.g. may be types/levels/quantized and the like, such as for example administrator/user/novice and the like), and/or Degree of delegation expressing to what degree can control be delegated and to whom on what terms and when with what third party agreements and the like.

For example, if a resource (R1) is part of a resource arrangement (for example part of resource RA101-(which for example comprises R1, R2 and R3 with resource manager RM1), then all the resources comprising that arrangement will have resource relationship metrics expressing that arrangement.

Conversely one or more resources that do not comprise RA1 (for example R4 and R5) and which are in some way associated with RA1 (for example by being part of the same context or set of resources—for example part of the set of available resources) may have resource relationship metrics expressing that situation, and potentially enumerating the degree to which they could be used in RA1.

In either case, such metrics may comprise the number and types of conditions which may be required for resources to satisfy, to for example operate efficiently as RA1, which may be determined by the specifications of RA1 and/or the control and/or management specifications of RM1.

In some embodiments, resource relationship metrics and associated values may form lattices with a partial ordering operator, called, for example, "more-critical." In particular, for any given resource arrangement RA, metrics values for resources comprising that RA, with respect to RA form a lattice, $IL_{RA}$.

Suppose resources R1 and R2$\epsilon IL_{RA}$, then

R1 is said to be "more-critical" than R2 w.r.t. RA if, for example, purpose satisfaction metrics (RA-R1) is less than purpose satisfaction metrics (RA-R2).

In other words, R1 is said to be more critical if its omission from RA leads to a lower purpose satisfaction metrics value than the omission of R2 from RA. Note, if a resource is not in RA, then its omission will not affect the purpose satisfaction metrics value.

For those resources associated with but not part of RA1, metrics values form lattices with a partial ordering operator, called "nearer." In particular, for any given resource arrangement RA, "metrics" values for resources that are not part of RA1 but associated with RA1 ("Outside RA1") with respect to RA form a lattice, $OL_{RA}$.

Suppose resources R1 and R2$\epsilon OL_{RA}$, then

R1 is said to be "nearer" than R2 w.r.t. RA if R1's conditionality satisfies R2's conditionality.

Conditionality may be dependent on resource and/or resource arrangement state.

Conditionality may comprise any set of one or more conditions that may be required and/or noted by inspection using specifications, which for example, may include the probability of satisfying conditions.

FIG. 78 illustrates an example of resources as possible alternates for resources in its arrangement (i.e., R(1), R(2), R(x), R(3), R(z)):

resources that are in PRMS1's resource resources that have been pre-arranged to be available (R(y)s);

resources that Coherence Services is managing as part of its shadow resources (R(s)s));

resources that PRMS 1 needs to negotiate with an external PRMS (e.g., PRMS 2);

resources that Coherence Services has identified and selected as suitable alternates;

Each group may have differing conditionality as well as metrics values. For example, resources that are pre-arranged to be available may have "higher" metrics values, since they already satisfy the conditions for being available. The group of resources that have next high values may be shadow resources that Coherence is managing. There may some resources that may not have a metrics value, such as the resources Coherence has identified as suitable since for conditions for their availability may not be known and need to be determined.

Moreover, resources within a group may also have differing metric values.

Illustrative Example of Resource Relationships is Shown in FIG. 78: An Example Resource Relationship Cost metrics may have one or more values and associated scalars, including financial cost, computational costs, costs expressed in terms of other metrics such as for example complexity cost—i.e. the degree to which resource requires other actions to be undertaken to be operating and/or dependency cost—degree to which resource requires other resources for operations.

In some PERCos embodiments, efficiency metrics express the ratio of performance of resource (in one or more purposes) in its performance to the functions specified by its interface. In some embodiments this may reference the potential of that resource (as specified) to current operating efficiency (for example operating at 80%), reference to one or more purposes, operating sessions, resource arrangements, Construct or other contexts in which resource is operating. Efficiency metrics may also be associated with Roles.

These metrics comprise those parameters made available by resource through its interface which are available to other resources/processes, such as Coherence Services, and enable such other resources/processes to monitor and/or evaluate performance of operating resource. This may include, throughput (kb/sec, Frames/sec), temperature (X deg), events (actions/time period) and the like, and will largely be dependent on resource functionality.

These metrics express the degree of dependence of resources on one or more other resources. This may include expressions such as for example, partial, total, X %, under condition Y (expressed for example as specifications, potentially control specifications), during Time N and/or any other expression of degree of dependency, including in terms of other metrics.

In some embodiments, Coherence Services may use such a metric to evaluate which resources are appropriate for operations based on one or more Foundations being available.

resources may have transitive dependencies, such as for example a keyboard may require a mouse to form a consistent user interface. Such dependencies are in some embodiments, declared by the resource as part of the resource specifications.

In one example embodiment, such a declaration may be used by other processes, such as Coherence Services and/or resource management to discover suitable resources that meet the dependency requirements.

In another example such dependencies may for parts of the conditions of (those resources that are not yet part of resource arrangements and for (those resources that are part of a resource arrangement) resource utilization, which may further be contextual in nature. For example in one resource arrangement R1 may require R2 and R3 and in another context require only R4 and the like.

Dependencies may be absolute, partial, necessary, mandatory, optional and the like.

Reporting metrics may include expressions of the type and specifications of any reporting that resource may require. This may, in some embodiments, include specifications of resource publisher, for example, to report certain information regarding resources operating conditions, throughputs, usage and/or other parameters.

In some embodiments Coherence Services may use such metrics in determining which resources to select based on the reporting requirements.

State metrics comprise those expressions regarding the state of resources, including for example, stored, dormant, operating, open, closed, and the like. These metrics may be expressed in terms of other metrics.

In the boundless world comprising an ever increasing number of resources, the degree to which any set of resources is connected to any other becomes an important aspect for effective utilization of those resources.

In one or more PERCos embodiments, those relationships are retained for utilization by the resources and/or other processes, such that connecting resource sets becomes efficient and effective. For example, if R1 and R2 have been connected previously, such as in association with CPE (X), then that relationship, and consequently R1 and R2, may then be utilized in further PERCos operations associated with CPE(X).

This does not imply that all operations associated with CPE (X) will always include R1 and R2, rather that R1 and R2 have a probability of association with CPE (X) that may be used by processes, such as Coherence Services, in determining an appropriate purpose result set for association with CPE (X).

In a further example, R1 may be used by an Expert 1 in Framework 1, which is primarily associated with CPE(X), whereas R2 may be used by Expert 2 in Framework 2, which has an association with CPE (X), where in this example CPE (X) is part of a set of CPE with which Framework 2 is associated.

Connectedness of Constructs and the resources comprising such Constructs may in some embodiments be expressed in mathematical terms, such as topological spaces and may include such expressions of connectedness based on, in whole or in part, Graph Theory, Galois Connections, Manifolds, Lie Groups and other relationship expressions. These expressions may be included, by embedding and/or reference as part of the specifications of Constructs, such as for example if a specified resource is part of a Construct and has relationships with further resources not part of that Construct, that form, for example a topological manifold.

There may be any number of types of connection between resources, and these may include sets of metrics expressing such relationships.

resources may be connected, and in some embodiments, such connectedness may be expressed as a scalar ranging from −1 through 0 to +1, where for example, 0 expresses that the resources involved (e.g. R1 and R2 have a connectedness scalar=0), have no connection(s), which would be the default for any resource in relation to any other.

resources that have a connectedness scalar of +1 have a connection (e.g. R1 and R2 have a connectedness scalar=+1), and consequently will have an associated positive metric expressing the type of connection (for example as part of a Result set, as part of a Foundation and the like).

resources that have a connectedness scalar of −1 have a connection that expresses that the two resources are opposites in some manner (e.g. R1 and R2 have a connectedness scalar=−1), and consequently will have an associated negative metric (e.g. R1 and R2 cannot exist in the same Result set, R1 and R2 claim exclusive use of the same other resources (e.g. memory), R1 and R2 combine to create a security flaw and the like).

In some PERCos embodiments, modal language and associated logic may be used to describe the possibility and/or necessity of one or more relationships between resources (including relationships to, for example, purpose Domains, experts and the like) and/or arrangements thereof. In some embodiments such modal language expression may take the form of possible worlds, which may be considered as equivalent to users contexts.

In some embodiments, assertions and/or metrics may include expression through one or more modal languages. Such modal expressions may incorporate contextual information.

For example an asserters confidence in their assertion (for example "at first glance, this appears to be true") may be expressed through associated metrics for that assertion (for example—60% confidence in assertion being true), and/or may also be expressed through one or more modal logics and associated languages.

resource Purpose metrics can reflect the degree of utility of one or more resources (and or arrangements thereof) for one or more purposes. Utility may be multi-Dimensional.

For example utility may include expressed and/or implied tangible/intangible benefit, efficiency, sufficiency/completeness and/or other enumerations and may be expressed as a single and/or multi part variable—for example Utility>(X), Utility=(Utility [Efficiency, Y, * Sufficiency]>V and the like).

For example without limitation, utility may be declared and/or calculated:

of resources for CPEs and/or the degree of satisfaction of purpose performance by resources for the users May be calculated of their purposeful results for the stated purpose expression May be calculated of purposeful results for user expressions of their purpose intent Can be user expressed In some embodiments, resource utility may be expressed as Pvalue(U), where utility to purpose, which may be associated with the quality to function, is expressed.

In some PERCos embodiments, multiple sets of metrics, in any relationship, may be utilized with resources and/or purpose to create aggregate metrics that may be communicated across the Edge to users. An example of such a combinatorial metric is focus, which may represent the degree to which user is engaged with purpose and/or resources, reflecting their user experience for those communications across the Edge into the digital domain.

For example, metrics including nearness may be used, in combination with Coherence and/or other processes to "focus" selected and/or potential/prospective resources choices, (including foreground and/or background resources) to user purpose expressions and/or other selections and/or operational criteria. For example a user may wish to instruct one or more processes to narrow the focus on foreground and background resources, based on their purpose expressions, costs, performance, quality and/or any other metrics.

In some embodiments there may be metrics associated directly with users represented as Participants and/or Stakeholders across the Edge. Although in some embodiments, Participants may be considered and treated as resources, in some embodiments some metrics may be specific to Participants.

For example these may include, number and types of Roles associated with Participant, combinations of other purpose and resource metrics expressed in temporal form, societal and/or other relationships.

Participant/Stakeholder Purpose Activity metrics may include measurements of the numbers, types, frequency of activities associated with purpose operations that have been undertaken by Participant/Stakeholder over one or more time periods.

Participant/Stakeholder societal metrics are associated with Participant/Stakeholder reflecting their social relationships, including family associations, corporate associations and the like. These metrics may include relationships with one or more Roles.

Participant information orientation metrics are associated with one or more Participant information orientations, such as Participant class systems organizations compared to one or more expert organizations within the same purpose Domain.

Participant Return On Investigation (ROI) metrics are metrics associated with the degree to which Participant has undertaken purpose operations related to one or more purposes. For example, if Participant has undertaken a large number of purpose operating sessions for a specific purpose, and in so doing has created a significant body of classes and/or other knowledge organizations associated with that purpose.

For example, this may include time, resources, relationships with other users/Stakeholders and/or other contributions that user, through their Participant representations, has made to the unfolding purpose operations and their Outcomes.

For example, if a user has undertaken significant efforts to organize resources and/or results sets for their purpose operations, then metrics may reflect the user's investment in such operations.

In some embodiments the degree of expertise that an expert may have with one or more purpose Domains, purpose classes, categories and/or other information organizations, may be expressed as degree of expertise metrics. For example this may in the form of a multiDimensional array.

Illustrative example of purpose Domains in FIG. 79: Purpose Domain Relationship User/Stakeholder Return on information metrics indicate the degree to which users provide information for one or more resources, users and/or publishers provide results sets. Such metrics may include quantity and quality.

In some embodiments, PERCos operating sessions may include one or more sets of standardized metrics that represent the operating performances of the resources comprising that session, individually and in any arrangement.

Adaption suitability metrics are the specified degree to which one or more resources can be adapted to operate in place of and/or in collaboration with one or more other resources for a given purpose.

For example, adaption suitability metrics may, in some embodiments, be knowledge organization manipulations, which includes the identification of suitable knowledge representation organizations for users/Stakeholders (individually/collectively/affinity groups and the like), that efficiently provide sufficient utility for user, and potentially coupled with ability for user to share such knowledge representations with a wider (boundless) audience.

Another example of adaption suitability metrics may involve Coherence Services selecting the appropriate optimizations for resources, such as for example a network. In this example Coherence Services may vary the network router configurations to meet the purpose of high quality video distribution, through sending each resource (e.g. network routers) the appropriate control specifications to optimize these purpose operations.

Coherence Services may, also use adaption suitability metrics for one or more resources when determining alternates and/or substitutions. In one embodiment this may include determining which of a set of available devices is most easily adapted to a specific purpose, and/or would provide an optimized Foundation.

Ambiguity metrics indicate the degree to which any specifications, for example user purpose expressions include ambiguity, for example "Java," may have associated ambiguity metrics. These may be based on, for example, relationships between specifications and one or more classes and/or associated purpose domains. For example user purpose expression "learn Java", may be associated with multiple purpose domains including for example computer language, geography and/or coffee and as such value of ambiguity metrics may reflect these multiple alternatives.

Ambiguity metrics may be context and/or purpose Domain dependent, where for example user declares their purpose Domain and/or their context.

In some embodiments, ambiguity metrics may use modal logics, including dynamic modal logics to determine the one or more degrees an expression, including CPE, may be ambiguous within any specified purpose Domain.

Number of mappings for a specific term that is a member of a class

Reality integrity metrics express the degree of a reality being asserted is real, where asserted is real, where reality quotient may a Bayesian calculation based on:

Assumption/expectation of reality that is presented,

Percentage chance that what is presented is not real, and/or

Percentage chance of what is presented is real.

Calculating a reality quotient as to the probability that what is experience is what is real. This reality quotient may be iteratively updated depending on the type and number of biometric and other techniques that are applied to the user interactions.

In some embodiments, there may be one or more resources and/or processes that provide one or more levels of certification, validation and/or authentication both statically and dynamically as to the reality of the user interactions.

Validated and/or certified reality assurance:

i.e. Certificates attached to indicate RA authenticity "Reality Quotient"

Distributed reality assurance directory may enable participant(s) access to PERCos capabilities at location(s), time(s) and/or other variable commensurate with applicable governance policies In some embodiments, PERCos processes, such as for example Coherence Services, may attempt to evaluate computational and/or other associated overheads (including for example, monetary, time and the like) involved in the provisioning and deployment of one or more resources for one or more purposes. This may lead to estimations of for example, the Quality to Purpose metrics of the use of such a resource, which may determine whether this resource is deployed. For example Coherence operations may include calculations and/or estimations of computational, transactional, financial or other overheads, such as at what point does potential benefits of Coherence processing for the deployment of a specific resource outweigh the additional overheads of that resource deployment. In some embodiments, such considerations may be expressed as metrics, potentially including Master Dimensions, auxiliary Dimensions and/or other measures and estimated benefits (statistical modeling of probability of improved purpose satisfaction through, for example resource purpose metrics). Such calculations may apply to Coherence operations, specifications and/or resources under Coherence management.

7 Metrics Organizations

In some PERCos embodiments, PERCos systems may incorporate one or more standardization and classification schemas of metric expressions. For example, numerical (1-20, 1-100), expertise (novice, amateur, competent, professional, expert and the like), color (white, yellow, orange, purple and the like), qualification (BA, MA, Ph.D, MD, board certified and the like) and/or any other schema. These schemas may be extensible and may operate on a system wide, purpose Domain and/or other contextual basis. Metrics may be organized as classes, ontologies, taxonomies and the like.

In some embodiments, PERCos metrics comprise a class with attributes such as numeric value, Boolean, unit and the like. This class may be sub classed for one or more specialized metrics.

For example in some embodiments, metrics may constitute, tuples, which in some examples my include names, values (which may include multiple values including sequences and ranges), and units (of value-such as for example Kg and/or scalars e.g. 5 out of 10). In some embodiments, metric may comprise name value pairs. In some embodiments, metrics comprise those expressions that may be enumerated as values associated with one or more resources and/or the operations thereon and/or thereof.

PERCos metric classes may include weightings, assertions, values, references and/or any other expressions that may be evaluated by one or more methods, including for example PERCos Platform Evaluation Service.

PERCos system metric schemas may include any of the metric schemas defined within one or more PERCos instantiations. In some embodiments, these may include specific schemas for expertise, resources, purpose expressions, results sets, PERCos Constructs, Repute expressions and/or any other metrics enabling the effective operation of PERCos.

PERCos system metrics may include one or more equivalence relationships, which in some embodiments may be part of PERCos platform services.

PERCos Repute Conceptual Overview Introduction

1 Overview

The explosion of new mobile computing platforms, high-bandwidth communication networks, content provisioning infrastructures, cloud computing resources, and the like has created boundless resources, applications, content materials, web services, participants, points of access, and the like. Given the massive expansion of resource types and instances and a similar expansion in the types of use of computing devices, locating resources that best fit user objectives, a difficult challenge historically, and an increasing challenge that leaves vast purpose satisfaction possibilities unexplored and unrealized.

This challenge is compounded by the fact that interoperability and information sharing require users with different backgrounds, expertise, requirements, expectations, and the like to provide, use, share and/or work together.

PERCos embodiments provide Repute services that address this challenge, enabling users to assess whether and how they may rely on each other and on resources.

PERCos embodiments address this challenge in part by providing Reputes, which comprise Repute expressions and supporting frameworks that enable users/Stakeholders from diverse locations, backgrounds, experience and educational contexts, and the like, ways and methods to ascertain the quality to purpose, integrity, reputation, credibility, and the like, of boundless possibilities of resource sets. In participating in web computing, as well as with large intranet environments, ascertaining/evaluating the quality, reputation, performance and/or other assertions regarding resources for a user's purpose can be essential if such resources are to be employed to successfully realize optimum Outcomes.

Repute is an important PERCos capability set providing key purpose computing tools for filtering through huge candidate resource sets based on reputation, quality, and relevancy related attributes and assertions. Repute can be used to filter, sort, evaluate, and/or otherwise aid in the analysis of, candidate resources identified among large resource sets to produce usefulness optimized and/or otherwise prioritized candidate results. These results can be based, at least in part, upon Repute attributes as they may relate to the apparent contextually related "quality" of such resources—that is resource sets may be measured, at least in part, by quality of performance/usefulness/value and/or other considerations asserting, for example, standardized Facet approximations. Such Facets may be further interpreted through the use of contextually related significant purpose/resource attributes, providing assessments as related to users one or more purposes.

Repute results may be employed in augmenting prescriptive and/or descriptive Core Purpose Expressions (CPEs). Reputes are expressed using attribute generalizations and any associated values that are descriptive of, for example, "quality" variables that may be used in the assessment of, and frequently, comparative relative usefulness of, purpose fulfillment resources and related variables, such as parties related to such resources. Such quality variables can be informing regarding the possible relative potential usefulness of the subject matter of resources for a current purpose (and/or resource role contributing towards such purpose fulfillment), calculated employing Repute relevant fact and/or assertion stipulations. Such stipulations can be expressed in some embodiments, for example, through (a) the expression of CPEs including CPEs as associated with purpose classes, (b) stipulated by non-CPE metadata, (c) otherwise expressed through one or more preferences settings, and/or otherwise user and/or crowd historically, algorithmically, rules based, and/or contextually derived, and/or employed in any context in which Repute capabilities are useful. Such Repute resource organizing calculations filter and/or in some other manner, for example, order and/or otherwise contribute to the evaluation and/or provisioning of one or more useful or possibly useful resources using values and facts that have been expressed employing and/or translated into standardized characteristic facets along with any applicable corresponding values.

These may include users/Stakeholders and Participant representations, processes, and/or other PERCos and non-PERCos resources. In many situations the integrity, reputation and/or credibility of a resource or element thereof can be a major factor in choosing whether to interact with that resource or element.

In some embodiments, a PERCos Repute may be a resource comprising a comment set that is explicitly associated with an operatively uniquely identified item set wherein such a comment substantially employs at least one PERCos standardized expression (for example Dimension Facet and/or PERCos standardized metric) and value. In some embodiments, Reputes can be also expressively associated with one or more Contextual Purpose Expressions (CPEs) and/or purpose algorithms.

Reputes in some embodiments can provide users/Stakeholders of PERCos systems with a comprehensive standardized and interoperable feedback arrangement cosmos for quality and related value, performance, and/or the like, to purpose (and/or in some instances, to other context variables). Reputes provide sets of methods that provide capabilities for transferring the operative qualities of domain and purpose specific expertise of respected parties to managing filtering, identifying, evaluating, prioritizing provisioning and/or using Big resource resources.

Under most circumstances an individual user's degree of expert command over a given domain is normally quite limited. This is true even when the user is an expert in a closely aligned domain and is knowledgeable about the purpose related domain. As a result, if users can easily integrate as appropriate the expertise of others into their own resource identification and usage, each respective user during any specific purpose related activity may have the opportunity to substantially, even profoundly, improve their purpose related outcome and performance.

Reputes may be used, in some embodiments, by users/Stakeholders to evaluate positive, negative, and/or other characteristics of information sets pertaining to opportunities, implications, benefits and/or risks of one or more resources for purpose operations. For example, Reputes may in some embodiments be used to provide information that mitigates statements made by other Stakeholders (including for example Participants including publishers). For example if a Stakeholder associates a CPE set with a resource, that may be considered at least in part inaccurate, then such a resource may have associated Reputes that express negative and/or low value assertions (and associated PERCos Repute metrics, such as Quality to Purpose). Conversely if a Stakeholder's resource is particularly useful, well liked and/or is viewed as positive by users/Stakeholders, then Reputes reflecting this perspective may be associated with such resources, using for example positive assertions and/or PERCos Repute metrics, such as quality to purpose.

To the extent that informed and purpose-specific expertise of others is useful, and under some circumstances compelling and/or highly productive, given the nature of the evolving globally-connected community and contexts regarding web based resources, many parties may devote time and effort to communicate expertise for use by others for financial, social networking, promotional and/or other reasons. Repute provides the basis for a global, generalized, standardized, efficient, and interoperable set of capabilities whose use provides a framework for a self-organizing, shared knowledge common purpose computing cosmos.

Reputes may dynamically provide users/Stakeholders and resource related PERCos processes (including for example PERCos processes, such as Coherence services, that may be, for example, evaluating resource opportunities) with a self-regulating feedback mechanism. This mechanism may be used for evaluation, selection and utilization of one or more resource sets through evaluation of standardized and interoperable Reputes associated with resources.

A further aspect of Repute feedback mechanisms, are reds on Creds, and various forms of aggregated and/or compound Reputes, which may, in some embodiments, for example provide methods for identification of Reputes, such as Creds, that have, for example, self-interest and/or other distorting factors that some users/Stakeholders may wish to associate with resources. For example, if a resource publisher has his associates create Creds about that resource that are favorable and such favorable perspective is not warranted, through for example resource performance, then other user/Stakeholders may create Creds on Creds that identify this inconsistency, which may have a negative impact on the evaluation of those specific Creds and their associated Stakeholders.

PERCos Repute Frameworks provide methods through which any Participant in the role of a Stakeholder may comment on any one or more aspects of a resource set, including for example, one or more resource subject matters, creators, publishers, providers, users, and associated purpose expressions and/or associated Purpose Statements as to their value, performance and/or quality, and particularly, for example as related to purpose. With such Repute publishing Stakeholders are contributing what may be key expertise/ knowledge perspective to the PERCos cosmos knowledge base or to some one or more portions thereof.

The utilization of these Reputes for effective and efficient purpose operations may in some embodiments involve management systems, such as PERCos resource Management System PRMS, such that when Reputes are published as PERCos resources they may provide appropriate capabilities, as with all PERCos resources, to at least in part assist users in their purpose operations.

Reputes describe relevant attributes of resources in the form of standardized categories and any associated values, such information for "assessing" and "valuing" resources as resource candidates for fulfillment of purpose expressions where such details are based upon either or both:

(a) known and/or knowable facts, declared by one or more fact determining source and/or by fact verification testing (e.g. checking with a determining source or determining by reading, for example, file size, page length, location, language employed, author, publisher, and/or authority/expert verification, and the like), and, for example, where such facts may have an estimated degree of accuracy/reliability/authenticity—for example the author of a resource is stipulated as a senior tenured professor at the Massachusetts Institute of Technology (MIT) in a domain relevant to satisfaction of a purpose where such stipulation of such professorship is through MIT publishing and/or certifying such stipulation and/or where such stipulation is "observed" on an MIT administrative website and/or otherwise tested. Such testing and/or certification can be performed by an authority/fact integrity cloud service testing, where such tested information may indicate, for example, the reliability and/or relevance of authors, publishers, providers, given testable facts (e.g. no history of commercial lawsuits, is employed as a domain expert, etc.) and may, for example test length (pages, bytes), complexity, subject matter correspondence, security (e.g. absence of malware) of candidate resources.

(b) interoperably assessable/interpretable assertions by any one or more parties (e.g. as by parties who have a persistent, testable ID in contrast to Effective Facts (EF) certifiers, and the like) regarding one or more resources (e.g. their subjects) and/or their providers, creators, publishers, and/or other related stakeholders. For example, senior tenured professors in one or more relevant academic domains at Stanford, Princeton, Harvard, and Caltech may have asserted ratings individually and/or in the aggregate (as, for example, calculated to an average rating) regarding a resource indicating it is highly useful for an expressed user purpose, one or more similar expressed purposes, and/or one or more associated/related purpose classes, and/or they may have rated one or more authors as purpose relevant, for example as domain experts, and as highly capable (or as not capable as the case may be). The foregoing can be associated as quality to purpose and/or purpose characteristic for any expressed purpose(s). Such assertions can be made related to plural differing purpose specifications associated with a resource set, and such assertions may differ in regards to any specific such purpose specification. Such assertions may, if allowed, be made by any party, but generally are meant to capture relevant expertise (whether professional or amateur regarding resource set and/or resource set facet relative usefulness and appropriateness for a purpose set. In sum, PERCos Repute provides standardized and interpretable assertion materials published by knowledgeable parties—for example tenured professors, professional experts (e.g. plumbers, surgeons, engineers, firemen) and/or other class(es) of authorities and/or holders of expertise in one or more relevant domains that have useful expertise—enabling individual and/or collective and/or other algorithmic expressions of quality of resource to specific purpose(s) and/or regarding relevant purpose fulfillment characteristic(s) (e.g. integrity, complexity, compatibility) that may be employed by users and/or PERCos resource management mechanisms as a consideration in filtering/selection/evaluation/use of candidate resources for purpose where such assertions express individually and/or through simple and/or more complex algorithmic aggregations values for quality to user purpose and/or operating purpose Statement.

Repute capabilities can further support and include applications, services, plug-in capabilities and the like that assist real-time human interaction between disparately located people, in particular providing evaluation and/or specialized monitoring capabilities regarding participant candidates and/or active participants with whom a user has little or no familiarity, but who offer to others (and/or between each other) knowledge, expertise, instructional ability, companionship, entertainment interaction, friendship/companionship, and/or commercial opportunity, and where users can determine whether such interaction involves participants who meet and/or exceed pre-set and/or currently selected criteria, including specific, relative, and/or otherwise algorithmically and/or historically influenced criteria relevant to quality to user purpose.

These applications and services can greatly facilitate user and/or system identification, filtering, and/or prioritization of one or more candidate(s) for session participation and/or otherwise initiate and/or monitor a session employing one or more such candidates. Information and algorithmic resources supporting such application and services include the Creds assertion and assessment infrastructure. This can comprise in some embodiments a global system for standardized categories and value expressions stipulated by persistently identifiable asserters as descriptive evaluations of any subject matter, either as general assertions and/or as assertions associated with one or more classes of CPEs, activities, tasks, groups, and/or other individual and/or ontologically organized items, and where such Creds themselves may be organized in ontologies and/or other organizing systems such as directories, indexed and relational databases, and the like. Creds subjects may include specific Creds and/or classes of Creds, that is any asserter may make one or more assertions about any subject matter, including Creds sets, effectively creating Creds on Creds, that is Creds expressing aggregates of assertions and associated values reflecting asserters' views of the qualities of one or more, such as a group, of Creds asserted, by, for example, a particular individual or organization, or a collection of parties, in a particular subject matter area. With Creds, an asserter may, for example, use selected standardized Cred facets, for example asserting relative values associated with any such facet or facet group, either employing positive, or positive, neutral, and negative, values. Combined with other aspects of Repute, such as characteristics and values reflecting the importance and/or usefulness of individuals or groups based upon EFs associated such individuals or groups, Cred asserters, may be evaluated by other Cred asserters regarding, for example, their professional credentials, schooling background, credit worthiness, age, location, affiliations, associations (including with individuals), and historical behavior, and the like.

Repute can calculate and display, and/or employ specific and/or aggregate, values for standardized facets (characteristic type abstractions) and/or standardized aggregation of such facets. This can include, for example displaying one or more values (e.g. a value or a value range) associated with each facet and/or assertion facet aggregation, and wherein any such characteristic and/or aggregation may be associated with a task, activity, abstract concept, and/or CPE and/or the like. This may include standardized Repute languages that may provide constrained simplifications enabling communications and/or correspondence between and amongst users/Stakeholders. These may include user/Stakeholder expressed standardized sets of conditions and/or characterizations. ("USCs" for user Standardized Characteristics). This allows users and/or one or more remote services (for example, based on pre-set preferences and/or at least in part historically based actions and/or results) to evaluate individuals and/or groups of individuals having, and/or who are otherwise associated with, any such facets and values. An association with one or more active USCs provides one or more abilities for PERCos, through its Cred capabilities, to evaluate candidate Participants as to their satisfaction of user and/or user's group criteria regarding participation in a given context/computing scenario. Standardized characteristics, particularly, when assessed in relationship to one or more USCs, may include such variables as might be found in a curriculum vitae such as educational related background (including study and/or degree related details such as type, field(s), historical timing including dates and duration, language(s) spoken, work background (including job title(s), salary(ies), dates and duration, employment locations(s) related associated facts such as associated accomplishments, e.g. meeting a dollar amount for sales, profitability, revenue, number of people managed, details related to areas of responsibility such as product and/or services categories, relevant litigation history information, and/or specific instances, and related info such as innovations, family background such as childhood family including relatives names, information related to such relatives, military and/or other public service background such as rank(s), time(s) and dates and duration(s), posting locations, and the like. Such Repute variable characteristics and/or values, including any Cred characteristics and/or values (for example values as may associated with a given CPE or other USC, such as value associated with having been a military general in a given military service as associated to a CPE related to military strategy determination), may be algorithmically processed and/or combined with any Cred characteristics and values to produce relative measures of appropriateness/usefulness/adequateness.

In some embodiments, Repute expressions may be one of the main mechanisms for filtering potential and/or returned purpose result sets, by for example, constraining those sets by the type and/or quality of the Repute expression. For example, a user may have set their preferences and/or other interactions to restrict results sets to only those resources with positive Repute expressions asserted by professors at the world's top 50 universities.

Repute expressions and purpose expressions may have multiple relationships, and such relationships may be created by one or more users (including groups thereof) and/or other processes, such as Coherence Services. In this embodiment, such multiple relationships may be expressed in the form of a "space" based on, for example, the subject of the Repute expression and including multiple expressions, with differing elements, such as Identity of creator, purpose association, metrics, resource relationships and/or other information. In further embodiments, such "spaces" may be arranged around a purpose (or set thereof), such that, the range of subjects and their purpose relationships is enumerated. Further examples of such relationships include, purpose(s) for which expression was created, purpose(s) for which purpose was evaluated, purpose(s) which users/Stakeholders may associate with Repute expression. Purpose relationships may include common purpose relationships and/or specific purpose and/or Repute domains of use.

Repute expressions may offer differing perspectives to differing users/Stakeholders. For example, if a user/Stakeholder has some specific expressed expertise, for example they are an expert, then the Repute expressions may be aligned so as to reflect that expertise. In some embodiments this may include the use of extensible vocabularies for expressions and/or the terms contained within them, for example assertions, subjects and the like.

In some embodiments one or more CPEs, both prescriptive and descriptive, may have one or more Repute expressions associated with them. These Repute expressions may have been associated with these CPE by one or more users/Stakeholders, including a CPE creator, publisher and/or other users/Stakeholders.

In some embodiments, Repute expressions may be associated with elements within a CPE, for example category (as Repute subject). There may also be Repute expressions associated with uses of CPE, which may also include other purpose expressions.

In some embodiments, users may wish to identify all the Repute expressions associated with a CPE, so as to inform their evaluation of that CPE, elements of CPE and/or other resources (Including Stakeholders) that are associated with CPE.

Descriptive CPE associated with one or more published Repute expressions may be a contributing factor in satisfying a prescriptive CPE. For example, suppose a prescriptive CPE is to obtain a college degree. In some embodiments, such a prescriptive CPE may be decomposed into multiple descriptive CPEs that collectively may fulfill it. For example this may include use of PERCos templates.

Efficient and effective users/Stakeholders evaluation of the plethora of opportunities presented by Big Resource calls for Repute expressions associated with those resources to employ, at least in part, standardization so as to enable efficient, interoperable filtering, evaluation, prioritization and other management of resources for users/Stakeholders purposes.

Given the nearly boundless arrays and diversity of resource items, and given the interpretability problems in the absence of standardized facets and associated values, well-chosen standardized generalizations regarding principal operative simplifications key to characterizing, evaluating and filtering resources as to best fit to user purpose can require the quality to purpose facet types provided by embodiments of PERCos technology.

PERCos Repute systems may include one or more sets of standardized Repute expression elements that for example provide an effective and efficient method for declaration and/or evaluation of common simplifications. This simplification may be represented in one or more user Interfaces. For example user qualifications (such as college degrees, Masters, PhD's and the like), organization rankings (for example by independent third parties and/or expert groups), may be for example be combined to provide, in some embodiments, a Cred Type.

For example this could be Cred Type [Education] which is formed by the pair of [user Qualifications:Organization], for example [PhD:Stanford], which may then be further combined in a tuple, such as for example [PhD:Stanford: Computer Languages]. These Cred Types may be arranged in classes, including ontologies and taxonomies. These organizations may then be used for evaluation and/or navigation when assessing Reputes (including Creds).

For example a result set may comprise a set of resources from multiple publishers and comprising multiple source types (for example, purpose class applications, other frameworks, resonances, expert Participants, colleagues, friends, cloud services, hardware arrangements, application plug ins, and the like). In such circumstances, users may wish to identify, rank, filter and prioritize to generate one or more results sets and/or manipulate and/or otherwise manage one or more sets to provide an optimized interim and/or outcome responsive to user purpose objectives.

In some embodiments, Coherence services may process a disparate array of Repute Cred assertions as to relevant purpose Performance variables, resolving to an algorithmic input for the filtering and prioritization of candidate resources. Such Coherence services may rely on standardized expression evaluative perspectives and values, including PERCos standardized Dimension facets and/or metrics, such as, quality to purpose, material complexity, sophistication, length characterizations, contextual cost value, and/or other attributes of creators and/or publishers and/or providers and the like. In some embodiments, the foregoing may be representative standardized simplification facets.

Standardized Repute expressions (and associated values) provide the interoperability which may be required for evaluation (for example using PERCos embodiment Platform Services Evaluation Services) of disparate Reputes for resources through using standardized Repute expressions.

PERCos includes one or more sets of standardized Repute metrics which enable effective, efficient and interoperable evaluation of Repute sets. These Repute metrics are used, often as part of or in association with one or more Dimensions to enable users to effectively select one or more resources for their purpose, often in the situation where they do not have sufficient expertise with that purpose to make effective evaluation choices.

These standardized expressions include the Reputes themselves, such that the format and specifications conform to PERCos embodiments standards. Within these standardized Repute expressions there may also be other standardized and interoperable elements, such as for example PERCos metrics.

In addition to these PERCos standardized expressions and metrics, there may be further metadata that is standardized amongst one or more affinity groups, stakeholders and/or utilities supporting PERCos.

Since most assertions represent subjective opinions of their creators, some standardization needs to be imposed in order for them to be useful to others. For example, suppose ten creators created ten assertions regarding the same car model. In this example the ratings are uniformly distributed between 1 and 10 (i.e., creator 1 rated it 1, creator 2 rated it 2, and the like) and are provided without any further explanations. Such ratings are not very useful since a user has no way of determining the contextual criteria used by creators for their ratings.

Unfortunately, although this example is an extreme case, it illustrates the problem with current rating systems. Affinity groups, such as associations, sovereign bodies standards organizations, consumer reports, wine industry, motion picture industry, automobile industry, and the like use a form of standards to rate their respective products and/or elements, though generally without any contextual information and/or transparency as to the methods (if any) associated with the assertions. Unfortunately, many organizations use informal opaque criteria. For example, many organizations and/or consumers rate automobiles using their own subjective criteria and consequently consumers of these ratings may manually compare them to formulate their own opinions.

Moreover, currently, standardizations often are for commercial products to encourage their purchases and/or consumption. There are often no standards for other types of information that organizations, associations and the like may create or generate which are assertions that are purported to be facts. For example, organizations generate a lot of assertions about their subjective facts and opinions, such as strategies for managing investments, improving US economy, solving world hunger, and the like. For example, there are many charitable organizations that solicit funds for their projects, such as feeding the homeless. It is very difficult for people to determine the effectiveness of these organizations in achieving their advertised goals.

PERCos Repute expressions and systems may in some embodiments, address some of these limitations and inadequacies by extending standards used by many organizations. It may motivate Domain experts to create unified standardization for their respective domains. For example, consider the purpose of exploring reverse mortgages for tapping into people's home equity. A loan broker specializing in reverse mortgage may provide Repute expressions on organizations, institutions, and/or banks that offer such programs to find the program that would offer them the most benefit. Such Repute expressions may provide consumers with the ability to effectively evaluate, compare, and validate criteria, if any, used by affinity groups.

Experts may also provide a common set of criteria that unifies criteria used by different organizations. For example, Edmonds.com uses one criteria to rate automobiles. Consumer Reports use slightly different criteria. An expert may consolidate/unify these two criteria to facilitate consumers to compare the two rating systems, for example in the form of PERCos standardized Repute expressions, assertions, metrics and values.

A Repute system may also encourage users/consumers to create Repute expressions that represent their own experience. For example, consumers can express the usefulness/effectiveness of Edmonds.com's ratings.

In some embodiments, PERCos Repute systems, for example may provide a suite of Cred metrics that users/Stakeholders can systematically organize the Repute expressions for one or more subjects and/or purposes and allow users/Stakeholders to compare, rank, aggregate, evaluate, and the like them, including comparing them against the user's/Stakeholders own Repute Master Dimensions and/or Repute expressions. For example, most organizations and/or consumers use generic criteria, such as gasoline mileage, comfort level, and the like to rate cars. It is not possible for a user to compare the provided ratings against the user's own preferences. Suppose a user is willing to accept lower gasoline mileage to obtain a car that provides a lot of leg room. Currently, users cannot use the rating systems to search for such cars.

A Repute system, in some embodiments, addresses this limitation by allowing users to evaluate and rank Repute expressions based on a user's own preferences. For example, instead of assigning equal weighting to each category of the rating criteria, it may allow users to assign their own weightings.

In some embodiments, there are three types of Reputes, assertions, Effective Facts and Faith Facts.

Assertions comprise statements made by asserter using PERCos standardized, interoperable and/or interpretable expressions about and including Repute subjects.

Effective Facts (EF) comprise statements (including measurements) which are considered generally and universally as factual by relevant domain experts. A further type of Repute is a Faith Fact (FF). A Faith Fact is an assertion treated as an Effective Fact by at least one identifiable affinity group whereupon the factual basis of such assertion is maintained as a tenet of spiritual faith.

In some embodiments, assertions, Effective Facts and Faith Facts may have associated methods that may be used in their evaluation. In some embodiments Effective Facts may implicitly reference methods, such as Mathematic formulas, scientific statements (such as Physics, Chemistry, Biology), Sovereign laws and the like.

In some embodiments there may be declared methods which are available (implicitly or explicitly) for one or more contexts, for either assertions or EFs. In the case of assertions such methods may be referenced by Repute expressions and as such that evaluators may invoke such methods, using for example PERCos tests and results services to satisfy themselves as to the integrity of the assertions. In the case of EFs methods may not be available as the fact is of universal acceptance for example 2+2=4, or be so tightly bound to the context that they are indivisible.

In some embodiments, Reputes expressions that are assertions may be implemented by PERCos Cred architecture and implementation.

In some PERCos embodiments, Repute expressions may form Repute Master Dimensions and facets thereof, which can be used by users/Stakeholders to identify, filter, prioritize and/or in other manners manipulate resources associated with those Reputes.

Repute Master Dimensions provide users with an effective and efficient method for differentiating resources, and or portions thereof based on their applicability as to purpose. The facets of Repute Master Dimensions include standardized quality to purpose metrics as well as associated algorithms for the evaluation of these and/or other Repute metrics. PERCos Master Dimensions are complimented by auxiliary Dimensions which may also be used in the creation and evaluation of Reputes.

Repute expressions, in common with other PERCos systems and resources, may have associated metrics. These metrics may be any combination of quantitative and/or qualitative metrics. Repute metrics may apply to any and all of the Repute expression elements singularly and in any combination.

Repute expressions, in some embodiments, may have associated metrics and/or be metrics in and of themselves. For example, Repute expressions form a type of qualitative metric that may be evaluated by one or more users/Stakeholders and/or processes in determining the suitability of one or more resources for one or more purposes.

In some embodiments, for example, metrics may include values and/or expressions determined through the use and/or evaluation of the metrics, such as for example, quality, reliability, popularity, importance (to one or more purpose), relevance and the like.

Some metrics are implied and meaningful only when they are evaluated based on the evaluator's purposes and/or preferences. For example, consider a Repute of David Wales, asserting his professorship at Caltech. Its metrics is implied and meaningful only in the context of evaluation.

In some embodiments, standardized Repute expressions may have differing metrics of quality based upon several factors, some of which are as follows:

- Quality (to purpose) of the assertion itself,
- Reputes of Stakeholders,
- Quality of the identity of Stakeholders,
- Relationship between the evaluator and Repute creators and other directly associated Stakeholders,
- Purpose(s) of evaluators
- Any associated metrics (e.g. the values/weights given to one or more assertions), or
- Other associated Repute expressions, purpose expressions, and/or any other metadata.

An assertion that is well-formed using standardized and interoperable PERCos assertion terms may have more qualitative impact than one using colloquialisms. For example, consider the following two assertions associated with a book on group theory.

- This book is cool
- This book provides an excellent coverage of elementary group theory While a teacher whose purpose is to find a text book for an undergraduate group theory class may be heartened by knowing that the candidate book is cool, but he/she probably would have higher appreciation from its second assertion, i.e., that it provides an excellent coverage of the topic.

The credentials/qualifications of their asserter and/or other Stakeholder may be a factor in evaluating the quality of Repute expressions. If an asserter or a publisher is highly qualified in the subject, such as known to be an expert in the domain, then their assertions would likely be evaluated to have higher importance than assertions made by a novice in the domain. For example, a review assertion of a restaurant by a well-known chef, such as Bobby Flay, may have a higher quality than a review by a random unknown individual.

The inherent quality of the identity of Repute expression Stakeholders may also be a contributing factor for evaluating the quality of Repute expressions. A weak and/or anonymous identity provides evaluators with very little ability to evaluate the credentials/qualifications of the asserter. In contrast a "strong" identity provides an evaluator with a basis for evaluating the quality of a Repute expression based on an understanding of the perspective of the expression asserter. For example, suppose the identity of the review asserter of a group theory book is David Wales. Without any further information, an evaluator may have a difficult time determining the credibility of the review assertion. However, if David Wales were to assert that he is an Emeritus Professor of Caltech, then the evaluator has the perspective of possible reasoning behind the Repute expression. In other words, the evaluator may be able to assume that Professor David Wales provided his assertion based on his extensive experience reading group theory books. Consequently, Professor David Wales' assertion may be considered to have more importance in evaluating the quality/suitability of the book than one given by a general reader interested in group theory. PERCos Platform Identity service enables asserters/publishes with the ability to provide identities of differing strengths.

In some embodiments, the relationships between the evaluator who is evaluating the Repute expression, the asserter and/or publisher of the expression may determine the relative and/or contextual valuation of the quality of Repute expressions. For example, an algebraic mathematician may value Professor Wales's Repute expression more highly than a general reader's assertion. In contrast, a general reader, who is interested in reading more generally about group theory, may value other general readers' Repute expressions more.

Purposes of evaluators may also be a factor in evaluating the quality of Repute expressions. For example, a student who is interested in learning about car mechanics may evaluate a Repute expression differently from someone who wants a car repair.

One aspect of PERCos Repute systems, in some embodiments, is that the more users/Stakeholders utilize one or more Repute sets and/or expressions, the more those expressions and sets thereof, may have their Repute metrics varied to, for example, reflect such usage. For example, if there is an increase in utilization of a specific Repute sets or expressions, then this may be reflected in a more positive overall evaluation of those Reputes, and conversely, this may be negative if utilization is decreased. In all cases this may include one or more time scales, for example instantaneous and/or time series dependent.

For example:

Repute expression 1 (RE1): Robert is good.

If a lot of users use RE1, Robert is good→(may) Robert is excellent.

Repute Expresion 2 (RE2), that asserts that Repute expression 1 is popular. One or more PERCos intelligent tools, such as an inference engine, can use this information (RE2) to infer that RE1 is useful.

In an ideal world, users and information would be uniformly reliable, honest and trustworthy. However, PERCos users/Stakeholders cannot assume such an ideal world. PERCos embodiments provide methods for credibility assertion expression and analysis. These include standardized and interoperable specifications (including metrics and statements). PERCos environments provide these methods so as to enable users/Stakeholders with the capability to recognize those other users/Stakeholders in the digital world who are reliable, honest and/or trustworthy and those who are less so.

In a one to boundless world the veracity, provenance, history, relationships and/or other characteristics influencing these reputational characteristics of resources is essential for users/Stakeholders and/or PERCos processing to effectively evaluate, select, interact with and/or use those resources in pursuit of one or more purpose operations.

Across the Edge in the realm of Big resource, having such transparent information as to the purpose reputational characteristics of these resources is essential if users/Stakeholders are to understand, evaluate and use these resources for their expressed purposes. In the current analog world such reputations have considerable contextual, legal and observable characteristics that enable users to make their determinations. A key aspect of this is the ability of the user to physically interact with, for example, other people, retailers, brands (such as cars, technology, food or any other products or services) and other physical material properties.

In the boundless digital domain, there is significantly less opportunity to undertake similar evaluations, and as such users may rely on those characteristics of the digital representations that comprise the reputation.

Essential to establishing and maintaining reputations in the digital domain is the establishment of persistent, consistent, reliable and trustworthy identification. Consequently some PERCos embodiments are able to identify and authenticate publishers, creators and/or asserters to ensure the integrity of persistent and consistent identities, which supports effective Repute operations. For example biometric mechanisms can be used for such authentication.

In some PERCos embodiments, Repute Frameworks provide Counterpoints to enable users with differing perspectives to express their point of views, where perspectives may be due to religion, politics, culture, social, economics, or any other perspective point of view. Counterpoints may support one or more methods and/or method embodiments for two or more Repute expressions expressing contrasting assertions and assertion values to be evaluated based on the bias. This may include the expression of one or more Dimensions and Facets with differing values, such Dimensions (such as PERCos Master Dimensions) providing the axis for the expression of the countervailing perspectives on a common subject. For example, if a Dimension was time, then each Repute expression could be represented along that time line. However, in many PERCos embodiments, such Dimensions may be derived from the assertions, subjects and/or associated purpose expressions of the Repute expressions, for example, the Dimension may be formed by evaluating a range of assertions on a common subject, i.e. a simplified example might be ranging from "X is Good" to "X is Bad".

In some embodiments, Repute counterpoints enable Repute expressions that represent the perspective of multiple views, for example, over time and/or opinions/assertions, and may comprise one or more subjects, where for example such subjects are related. For example, consider a reputation of a store. Its Repute expressions may be organized into multiple Dimensions, such as a Dimension comprising Repute expressions that assert the store quality over time, a Dimension on cost, a Dimension on the store's services, a Dimension on the quality of the store's products and selections or other Dimension. For each Dimension, there may be differing groups of opinions. On cost, one group may assert that the store is unduly expensive, whereas another group may assert that the store is quite reasonable. On service, one group may assert that the store provides poor service because users cannot get prompt service, whereas the other group may assert that the store provides excellent service because sales people are discrete and do not hover.

Repute Counterpoint, in some embodiments, provides methods and method embodiments for user/Stakeholder to evaluate the relative relationships between two or more Repute expressions on one or more Dimensions. These relationships may then be expressed as further Repute expressions.

In many PERCos embodiments, such axis may be derived from the assertions, subjects and/or associated purpose expressions of the Repute expressions, for example, the axis may be formed by evaluating a range of assertions on a common subject, i.e. a simplified example might be ranging from "Beer is Good" to "Beer is Bad".

In some embodiments, experts may use Counterpoint to express their perspective across multiple Repute expressions, presenting their perspective on the subject(s)/assertions. Multiple experts may have differing perspectives, which may, using Counterpoint, be compared by one or more user/Stakeholders to evaluate the range of perspectives of such experts.

Users may select their favored perspective, and may then choose to create a Repute expression reflecting this perspective, which they may then, for example, choose to publish. Such expressions may then retain their relationship to the original Counterpoint Repute set and may provide additional perspective on such set.

Some assertions for a subject and/or purpose may express widely disparate views. The variation may especially prominent where asserters and assertions have political and/or economical biases. For example, Reputes on reports for dealing with US national debt may be widely divergent based on the perspective of their creator.

For example, consider the Patient Protection and Affordable Care Act (PPACA). While there are a wide range of assertions and opinions, some frequent views are as follows, 1. The Act will enable all American citizens to have access to medical coverage, regardless of pre-existing conditions, or illness;
2. The Act is unconstitutional because it imposes an "individual mandate"
3. The Act will increase the overall cost of health care as well as reduce the quality of care.
4. The Act will make the American economy more competitive.

The creators of assertions 1 and 4 may believe in the benefits of the Act and would like to see the Act retained, whereas the creators of assertions 2 and 3 may believe that the Act should be repealed. Combinations of the above assertions can be used and associated with an overall assertion of act is good, act is bad, act is questionable, or other assertion. An assertion may be made in part, of sub-assertions.

In this example, assertions 1-4 represent widely differing viewpoints. Within each assertion, there are differing views. For example, a majority US Supreme Court Justices chose to uphold the act, whereas a minority US Supreme Court Justices did not.

A Repute system, in some embodiments, may support users whose purpose is to, for example, "understand PPACA" by providing them with information on the quality of assertions and/or the Repute expressions of the creators for each assertion. Implicit in this understanding is the ability of user/Stakeholder to know the identity of the creator of each assertion. For example, a Repute system may associate Reputes of Democratic members of the Congress who have voted for PPACA. It may also associate Reputes of President Obama. A Repute system may associate members of Association of American Physicians and Surgeons with assertion 3. A Repute system may associate a federal judge with assertion 2.

Suppose a user has a purpose to "Understand PPACA". If the user does not specify any additional preferences, then a Repute system may provide the assertions according to a default rank (based on some pre-defined Rule set) or as array across one or more Point-Counterpoint Axis. However, if the user specifies that the user is a Republican, then it may use a Republican-based ranking in presenting the assertion.

The representation of Point-Counterpoint and the assertions related to one or more axes of this representation may include for example, any graphical, textual and/or spatial representations.

8 Repute Concepts

In some PERCos embodiments Reputes may be expressed through the use of standardized, interoperable and/or PERCos interpretable expressions known as Repute expressions.

In some embodiments, Repute expressions can comprise at least one assertion and at least one subject of that assertion, one or more purpose(s) associated with expression (which may include undetermined purpose), and the attributable identity of the expression creator. One or more user/Stakeholder, groups, and/or crowds of users/stakeholders can create Repute expressions.

Repute expressions, generally in PERCos embodiments, are standardized, and include standardized assertion expressions with associated values and scalars and commensurate structures and/or organizations to support interoperable evaluation and/or utilization. In some PERCos embodiments such expressions may be evaluated, manipulated and/or utilized by other PERCos processes in support of purpose operations. Repute expressions may also include assertions that have associated methods, scalars and values that may be interpreted sufficiently for effective evaluation and use. For example the assertion "Good mineral tones" may have an associated value of "91" and an associated method of wine evaluation on a 100 point scalar. Evaluation of this Repute may be based on the value with the assertion considered as metadata, enabling for example the effective comparison of this Repute with another where the assertion is "Good Length" with a value of "89" and the same method and 100 point scalar. These Reputes and assertions may in some embodiments undergo one or more processes to further formalize and/or standardize them so that further purpose operations may be undertaken.

Repute expressions may have specific values, and in some embodiments may be represented, in one or more axis, for example, in the form of "Point-Counterpoint", where those Repute expressions that are in agreement with each other, are grouped together, and those with a substantially differing/opposing perspective can also be presented together, giving a user/stakeholder a perspective as to the context and/or range of those assertions/expressions.

Time may be included in and/or associated with Repute expressions, for example including time assertion made, time assertion evaluated, time assertion is about, time range for which assertion is valid and the like. In one embodiment, Repute expressions may utilize "leases" specifying their validity before requiring reaccreditation.

In yet other embodiments, Repute expressions, like other PERCos resources may be for example, stored, published, evaluated, tested, and/or cohered.

In some embodiments, Repute expressions value to one or more user/Stakeholders, may in part be determined by the composition of the assertion, which may be subject to one or more rule sets and/or language formalisms. Such formalisms may also apply to other Repute expression elements, for example, subjects where one or more classification and/or categorization schemas may be employed (for example purpose categories and associated class systems).

Reputes on Reputes (REP on REP) are Repute expressions that have as their subject another Repute expression.

A Repute system provides users/Stakeholders, resources and/or other PERCos processes, with the ability to associate Repute expressions on Repute expressions. A Repute system may provide a Repute expression that represents the reputations and credibility of the creators of a Repute expression. For example, suppose a pharmaceutical company creates a Repute expression that asserts one of their drugs is effective in treating cancer. As physicians use the drug, they can generate Repute expressions representing their own experience. In doing so, the drug can accumulate Repute expressions that represent the drug's effectiveness, side-effects, costs, etc. that physicians can use to assess the drug's viability for their patients.

Moreover, Repute expressions can associate Repute expressions on the Repute expressions generated by users of the drug. For example, suppose a well-known medical journal creates a Repute expression (REP 1) asserting a drug's effectiveness does not mitigate its harmful side-effects. In such a case, a Repute expression may associate a high-valued Repute expression with REP 1.

A Repute expression may evaluate the quality of Repute expressions and associate Repute expressions that represent the quality. For example, consider a book, Topics in Algebra, by Herstein, for the purpose of learning abstract algebra. One creator, creator 1, creates a Repute expression, REP 1, that the book is "hard to read," and another creator, creator 2, creates a Repute expression, REP 2, that asserts that the book provides an excellent introduction to abstract algebra and recommends it highly as a text book for the college level abstract algebra class. A user evaluation of these may associate a higher value Repute expression to REP 2 than REP 1 where for example, users purpose is "Find:Text Book/Algebra/College/Abstract".

Reputes on Reputes may, in some embodiments, include formal logics, such as First-Order Logic and/or incorporate organizational arrangements, such as class systems. These formalisms may provide for inheritance, binary logic and set theory to be applied to Repute on Repute expressions and their included and/or associated Repute expressions.

In some embodiments, these may form chains of expressions. For example a user Repute expression may be "Coffee is good for you", to which another user, for example a medical expert, may associate a Repute on Repute to that Repute expression, for example stating "Coffee is good for you only in moderation".

In some embodiments, Reputes may be created by one or more user/Stakeholders that represent, at least in part, the collective perspective of a crowd. In some embodiments this may include for example:

- assertions regarding crowd behaviors
- Aggregations of individual crowd members assertions
- Evaluations and/or algorithmic manipulations of information sets pertaining to and/or generated by crowds or
- Reputes on Reputes on crowd Repute sets These Reputes may be created by one or more users/Stakeholders and may be represented as assertions on behalf of the crowd, commentary on the crowd, metrics associated with the crowd and/or any other assertions.

In some embodiments, these reputation characteristics are managed with PERCos Platform Repute management systems, which are described herein.

PERCos Repute management system embodiments may include the following:

- Standardized, interoperable and PERCos interpretable Repute expressions
- Standardized assertions
- Standardized Repute Master Dimensions and Facets thereof
- Standardized Repute evaluation methods
- Effective Facts and Faith Facts
- Sufficiently unforgeable Repute expressions
- Standardized Repute metrics
- Repute weighting criteria and/or
- Reputes on Reputes In some embodiments PERCos may provide one or more methods to ensure that Repute expressions and their evaluations may not be forged and/or manipulated so as to compromise their integrity. For example, PERCos embodiments may include one or more methods that may protect Repute expressions to minimize unauthorized modification and/or impersonation.

PERCos Repute services may interact with any number and type of processes and/or other resources encountered in one-to-boundless. Repute services may standardize representations and/or methods to achieve interoperability.

Repute services enable PERCos users to assert Effective Facts and/or Faith Facts. Effective Facts are Repute expressions containing assertions that can be objectively validated. Faith Facts are Repute expressions containing assertions that can are accepted by some particular groups.

PERCos Repute services may use any combination of quantitative and/or qualitative metrics to evaluate, compare and/or otherwise manipulate Repute expressions. Repute metrics may apply to any and all Repute expression elements, singularly and/or in any combination.

Repute Services may apply weights to metrics of Repute expressions and/or their constituent elements. These weights (for example including general quality rating, importance, relevance, difficulty and the like) may be supplied by, users, user preferences, contextual processing and/or other PERCos operations.

Reputes on Reputes are Repute expressions that have as their subjects other Repute expressions, which may provide additional evidence on the integrity of the subject Repute.

In some embodiments, evaluation of one or more Repute expressions can be undertaken by users/Stakeholders and/or PERCos processing to provide information sets that may influence and direct their purpose operations.

PERCos Repute frameworks enable users/Stakeholders to evaluate Repute expressions including their elements (for example assertions, subjects), their associated identities (for example creator, publisher, provider) and any associated values (for example PERCos metrics, weights) so as to evaluate one or more characteristics (including those of portions of Reputes) which can assist them in evaluating their suitability for assisting in fulfilling user's purposes.

The Repute framework may in some embodiments leverage a particular logic system's inference paradigms. For example, in many logic systems, an argument requires a set of declarative sentences known as the premises along with another declarative sentence known as the conclusion. For example, consider evaluating the following statement:

Plato said that all men are mortal,
Socrates is a man,
therefore Socrates is mortal.

In this statement, the first two expressions are premises and the fact that Socrates is mortal is the conclusion. The logic system evaluates Plato's assertion that all men are mortal are highly credible and then uses the premise that Socrates is a man to infer that he is mortal. The Repute of Plato may for this purpose may affect significantly affect the evaluation of the first premise.

The value of the same Repute expressions may differ based on the evaluator's perspective, context and/or purposes. For example, consider the Repute assertion, "Kobe beef steaks at Restaurant X tastes absolutely wonderful." A user who is a vegetarian may assign a low value to this Repute expression, whereas a user who loves steaks may assign a high value to this Repute expression. In particular, vegetarians are known to not like meats.

The value of Repute expression may depend on the context and/or purpose. For example, a user who is interested in obtaining a quick overview of group theory may not value a monumental standard text in the theory of finite groups, Endliche Gruppe, by Bertram Huppert. In contrast, a graduate student working on finite group theory problems would deem the book to be extremely valuable.

Such evaluations may utilize one or more PERCos Platform Services, such as Evaluation and Arbitration Services, Test and results Services, Reasoning Services and the like. Repute Evaluation can derive results using such factors as for example, the PERCos metrics (for example Quality to purpose), Reputes associated with assertions, (for example Repute on Repute on the assertion), Reputes of the Stakeholders associated with Repute expression, duration or other time based factors of Repute expressions and/or any pertinent associated metadata. These evaluations may also include one or more sets of specifications (including for example preferences, profiles, Dimensions, facets and/or other information sets) of the evaluator including for example purpose specific specifications.

Repute evaluations may use hybrid approaches comprising for example, reasoning systems, statistical analysis, testing, etc. The reasoning systems, in some embodiments, may use multiple theories and logic systems, for example including Dempster Shafer theory, Bayesian theory of subjective probability, description logic, modal logic including epistemic logic, and the like.

Halpern provides considerable discussion of the strength and weaknesses of various techniques. For example, Dempster Shafer theory allows one to combine evidence from different sources and arrive at a degree of belief (represented by a belief function) that takes into account all the available evidence. This is especially useful when there are multiple Repute assertions for the same subject. Its belief functions base degrees of belief (or confidence, or trust) for Repute on the probabilities for a related Repute. These degrees of belief may or may not have the mathematical properties of probabilities; how much they differ depends on how closely the two Reputes are related. Put another way, it is a way of representing epistemic plausibilities but it can yield answers that may be incomparable to those arrived at using probability theory.

Results of Repute evaluation may or may not be a predicate, but may express one or more values, weights, metrics, and the like.

Repute Master Dimensions may include algorithms as a Dimension Facet which are tuned to evaluation of one or more Reputes for one or more purposes. In some embodiments, Repute frameworks may enable users/Stakeholders to specify, for example in their profiles and/or preferences one or more algorithms for Repute evaluation processing, such as specifying the use of a particular statistical model, and the like.

If some of the elements of a Repute expression are non-standardized metadata, then the results of this evaluation may also include non-standardized metadata.

Evaluation of Repute expressions may have differing levels based upon, the identity of associated Stakeholders, (for example including creator and/or publisher), the assertion itself, any associated metric (e.g. the weight given to the assertion), other associated Repute expressions, purpose expressions, and/or any other metadata.

In some embodiments, PERCos Repute management systems may in some way include one or more resources and/or processes, including Intelligent Tools and Services (including Utility Services) to identify and authenticate Identities associated with one or more Repute expressions. For example this may include the creator, asserter, publisher, distributor, subject and/or any other associated identity (including CPEs, which as published resources have their own identifications). In some embodiments, the strength of identification and authentication (I&A) may range, for example, from strong to limited. For example, well-known institutions, organizations, and/or organizations such as, National Institute of Health, Washington Post, New York Times, and the like, will be able to use strong I&A mechanisms, such as, certificated based I&A. There may be creators who may be able to use biometric-based I&A. However, there may be creators who may identify and authenticate themselves using a weak mechanism, such as password-based I&A.

A Repute system, in some embodiments, may associate a Repute expression on a Repute expression (REP 1) that provides users with the degree of credibility of REP 1 based on the strength of I&A. For example, suppose a Repute expression, REP 1, is created by a creator using a strong I&A procedure. A Repute system may generate a Repute expression, REP2 that asserts with high level credibility that REP 1's creators made REP 1's assertions. For example, suppose Robert Parker of Wine Advocate asserts that the 2007 vintage of Opus One is one of Napa's finest and is rated 96 points. Further suppose that Robert Parker had identified and authenticated himself using a very strong I & A procedure (e.g., biometric-based I & A). In such a case, a Repute system may associate a Repute expression that asserts the non-repudiability of Parker's Repute expression.

For example an assertion that is well formed using potentially standardized and interoperable terms may have more qualitative impact than one using colloquialisms.

Users/evaluators of Repute expressions may also affect the credibility of any given Repute expression. For example, suppose a Professor at MIT makes an assertion in a Repute expression, REP 1, regarding a Physics Text book. A Physics teacher may place higher credibility to REP 1 than a general reader, who may prefer a general and less technical treatment of Physics.

In some embodiments, in such example cases the relationship between user/Stakeholder who is evaluating the Repute expression, the creator of the Repute expression and their associated purposes, can determine the relative and/or contextual valuation of the expressions.

In some embodiments, there may be one or more resources, including processes, such as, dictionaries, thesauri and/or other equivalence, synonym and/or definitional resources which enable standardization and interoperability of Repute expressions evaluations, management and/or manipulation.

For example, Repute assertion expressions "great", "brilliant", "superb" and the like, may have associated standardized synonyms providing equivalence to, "excellent", or an algorithmic process, where the terms are related to one or more scalars, such as, equating to 5 out of 5, and/or $95^{th}$ percentile and above.

For example "Excellent" may be a defined term in a specific scalar, involving bad, poor, satisfactory, average, good, and excellent. These defined terms may also have mappings to other defined terms, for example "excellent" may be equivalent to "above expectations" in the example scalar "poor, below expectations, satisfactory, above expectations" and/or may be mapped to quantitative scalars, such a 100 point scale.

In some embodiments, there may be one or more mappings of one set of Repute expression scalars to others. For example temperature from Celsius to Fahrenheit, wine scored on a 20 pt wine evaluation scale to 100 pt evaluation scale.

In some embodiments, such algorithms and reference stores they are associated with may comprise a Facet of the Repute Master Dimensions and/or auxiliary Dimensions.

In some embodiments, PERCos provides standardized Repute expression languages which include for example, templates, specifications, repositories and/or associated methods. In this manner a user who wishes to evaluate a Repute expression may identify the appropriate methods associated with the evaluation of that Repute expression, for example those supplied by one or more recognized experts, and provide these methods (which for example may be in the form of PERCos control specifications) to their one or more Evaluation processes, such as PERCos Platform Service Evaluation Service instance.

In some embodiments, such methods to enable such evaluations may associate methods and/or metadata indicating the scale of Reputes with the associated minimum and maximum values. This may also include the function of the scalar, for example logarithmic, exponential, linear and the like. For example a wine Repute scalar may be 100 points and use a logarithmic function.

Repute services may need to interact with any number and type of resources and/or processes that are encountered in one-to-boundless. As illustrated by Figure xxx, Repute services achieve interoperability by standardizing. Standardization may include without limitation, the following:

Interoperable, standardized Reputes expressions and Repute expression elements

A suite of Repute expression languages for expressing and/or asserting Repute expressions. The languages, in some embodiments may use or extend standard languages, such as XML, OWL and the like that support interoperability and/or reasoning.

One or more evaluation services for evaluating Reputes.

One or more evaluation languages for expressing evaluation criteria, such as preferences, weights, and/or other contexts.

One or more Dimensions and metrics sets for comparing and/or manipulating Reputes.

In some embodiments, Repute services separate the creation/origination of Repute expressions from their evaluations. This separation enables evaluators of Repute expressions to provide their own preferences, contexts, weights, and the like to determine relevant credibility information to support their contextual purpose operations.

Repute systems also provide users/stakeholders with one or more specification languages to control the use of Repute expressions. For example, suppose a product company has solicited reviews of one of their upcoming products, but wants to keep the reviews confidential and accessible to only authorized personnel. The company may express a control specification that defines, for example, access, utilization, distribution and/or other control aspects of the Repute expressions for the upcoming products. After the release of the product, the company may change such control policies and allow public to access the reviews.

Repute systems in some embodiments may transform user/stakeholder expressed/published Repute expressions into one or more internal representations to provide consistent evaluation of Reputes for consistent and/or efficient reasoning.

Repute systems may provide standardized interoperable interfaces for all Repute expression related operations, regardless of the choice of expression language used. For example, suppose one user uses OWL to express the user's Repute expressions and another uses XML. Repute systems may provide both users with the same interface for originating their Repute expressions. Similarly resources would be provided the same interface for evaluating Repute expressions.

For example illustrated in FIG. 80: An Example REPute Calculation Process The range of assertions and/or associated opinions related to one or more subjects and/or purposes may be multi-Dimensional both in value, which may be implicit, and in the form of the representation. Repute System may provide Repute expression languages that may range from precise (e.g., logic based) to colloquial as well as range from structured to unstructured. Different creators of Repute expressions on the same subject may use different languages. For example, a restaurant critic for a newspaper may use a more precise language to express his Repute expressions on a restaurant. The critic may express his Repute expressions using terms such as stars awarded, quality of the restaurant's menu, quality of its wine selection, the credentials of its chefs' credentials and the like. In contrast, average diners may use a more colloquial language to describe the tastiness of its food, and the like.

A Repute system unifies and standardizes these varied Repute expressions so that users of Repute expressions can use them effectively. A Repute system enables users, Participants, and/or other Stakeholders with the ability to understand and manipulate Repute expressions, such as evaluate, compare, rank, or other form of Repute expression processing.

A Repute system also enables computational resources to process Repute expressions. For example, PERCos systems need to evaluate and rank Repute of resources to fulfill a purpose with optimal set of resources.

A Repute system satisfies these requirements by providing one or more internal representations to support standardization and interoperability Reputes. In particular, it may translate/interpret Repute expressions stated in external expression languages into such internal representations to support Repute operations, such as evaluations, validations, testing, comparisons, and the like.

Repute systems may match, equate, normalize, quantize, and/or otherwise transform Reputes based on contextual information, purpose domains, resource sets, Repute expressions, and/or Repute subject matter, in any combination. In some cases, Repute systems may need to quantize the qualitative expression based on the subject matter and context. For example, expression, "reasonably priced," has differing meanings based on the context and subject matter. For connoisseurs, "reasonably priced" red wines may mean wines that cost between $25 and $60. For users who are more budget conscience, it may mean wines that cost between $10 and $30. Qualitative expressions may also have differing semantics based on the subject matter. For example, a reasonably priced car for a high school student may be a car that cost under $10,000, whereas for an investment banker, a reasonably priced may be a car that cost between $35,000 and $60,000.

In some cases, Repute management processes may identify Reputes that are equivalent semantically, using operators, such as "near." For example, some users may rate hotels as "nice," whereas other users may rate them as "comfortable." In such a case, Repute management process may equate "nice" and "comfortable" to be semantically equivalent under a "near" operator.

Some creators of Reputes may use differing rating scheme than other creators. For example, some creators use a 5 point system to rate a subject matter, whereas others may use a 20 point system to rate the same subject matter. In that case, PERCos may normalize the ratings, either by transforming 20 point Reputes to 5 point Reputes or transforming 5 point Reputes to 20 point Reputes, depending on the context.

In some embodiments, Repute management processes may invoke, PERCos Platform Matching and Similarity Services (potentially under the direction of Coherence) to identify and evaluate Reputes that are equivalent semantically.

In some embodiments, Repute frameworks may evaluate contextual information to identify, interpret, determine and the like to prioritize attributes of Repute expressions in performing matching process. For example, suppose an undergraduate student has a purpose of finding a group theory book and specifies a Repute expression, "comprehensive overview that is easy to learn from." If there is no book that has Repute expressions stating both "comprehensive overview" and "easy to learn from," but there is a book that provides "comprehensive" and another that is "easy learn from".

In such a case, Repute expression may prioritize "comprehensive overview" over "easy to learn."

Creds is an embodiment of formalized Repute expressions for utilization in one or more PERCos embodiments. As such, Creds have all the properties and attributes of Repute expressions, such as Creds can have as their subject another Cred, evaluated based on contextual information, prioritize based on Cred metrics, and the like.

Cred Evaluation Service is an instance of PERCos Platform Evaluation Services with control and operational specifications that enable the evaluation of Creds input to service.

Creds may be published like any PERCos resource. Creds System provides Cred Publication Services, which are instances of PERCos Platform Publishing Services with control and management specifications that enable and provide for the publishing of Creds.

In some PERCos embodiments, Repute expressions are formed using one or more specifications within standardized and/or interoperable PERCos Repute expression formats and/or languages. For example a Repute expression may comprise assertions to be associated one or more subjects and one or more purposes, which may be implicit. Subjects can be referenced by an identifier or described as a concept in the body of Repute expression, for example, using a natural language.

In some embodiments one or more CPEs, both prescriptive and descriptive, may have one or more Repute expressions associated with them. These Repute expressions may have been associated with these CPEs by one or more users, including for example CPE creator, publisher and/or other Stakeholders.

In some embodiments, Repute expressions may be associated with elements within a CPE, for example PERCos category (such as Repute subject). There may also be Repute expressions associated with uses of CPE, which may also include other purpose expressions.

In some embodiments, users may wish to identify all the Repute expressions associated with a CPE, so as to inform their evaluation of that CPE, elements of the CPE and/or other resources (including users/Stakeholders) that are associated with that CPE.

A descriptive CPE associated with one or more published Repute expressions may be a contributing factor in satisfying a prescriptive CPE. For example, suppose a prescriptive CPE is to obtain a college degree. This prescriptive CPE can be decomposed into multiple descriptive CPEs that collectively may fulfill it. This may involve, in some embodiments use of PERCos Constructs such as templates.

In some embodiments, PERCos Repute expressions may employ standardized formats, languages and expressions. These provide an interoperable and standardized devices and methods for evaluation of Repute expressions by differing Stakeholders on differing subjects, such that other Stakeholders may form a collective view based on these standardized expressions.

In some embodiments, normally, assertions and subjects are paired. In particular, assertions provide information about their associated subjects. Repute expressions may also have other information, such as context, effective date interval, time of creation, metadata, and the like.

PERCos Platform Repute Services in some embodiments may provide a suite of tools (including intelligent tools), some of which may be third party tools that Stakeholders can use to express their Reputes. Repute services may process creator-specified Repute expressions and transform them into internal formats, which in some embodiments may be based on some standard language, such as XML, OWL and the like that support interoperability and/or reasoning.

In some embodiments, Repute expressions involve at least one assertion, at least one subject for each assertion, one or more purpose(s) associated with expression (which may include undetermined purpose), and the attributable identities of the Stakeholders associated with the expression. A Single user/Stakeholder, groups, and/or crowds of users/Stakeholders can create Repute expressions.

Multiple Repute expressions may be aggregated into a single Repute expression. For example, many users may have created Reputes for the latest operating system from Microsoft. PERCos systems may enable, for the sake of performance and simplicity, the aggregation of them into a smaller number of Repute expressions. In such a case, PERCos, in some embodiments, may maintain and store records of the individual contributing Repute expressions so that they can be retrieved as appropriate.

Such expressions may be formalized, with appropriate structures and organization to enable, for example, standardization and interoperability. In some PERCos embodiments these formalized expressions may be evaluated, manipulated and utilized by other PERCos processes in support of purpose operations. Informal non standardized assertions may also be utilized, for user/Stakeholder interaction and in some embodiments, treated as, metadata and/or undergo one or more processes to formalize them so that further purpose operations may be undertaken.

In some embodiments, the value of one or more Repute expressions to one or more users/Stakeholders, may in part be determined by the composition of the assertion, which may be subject to one or more Rule sets and/or language formalisms. Such formalisms may also apply to other Repute expression elements, subjects where one or more classification and/or categorization schemas may be employed (for example purpose categories, category classes and/or associated class systems).

In some embodiments, Repute expressions, in common with other PERCos resources may be, stored, published, evaluated, tested, and/or Cohered.

Repute expressions are comprised of Repute expression elements. Based on context and purposes, Repute expressions may range from a minimal set of expression elements to a full complement. Moreover, some embodiments may choose to use a Repute expression representation that has fine granularity, where each type is represented by its own expression element type, where as other embodiments may choose to use a representation that has coarser granularity, where multiple information types are aggregated into a composite expression element. For example, some embodiments may choose to have an assertion and subjects of the assertion as a single composite expression element, whereas other embodiments may choose to represent them as separate expression elements.

Some Repute expression elements may include the following:

One or more assertions

One or more subjects

One or more purpose associations

Persistent identification of Repute expression Stakeholders including creator/originator, publisher, provider and the like One or more time expressions One or more sets of metadata A Repute assertion asserts a certain premise about a subject. PERCos assertions may comprise one or more purpose specific standardized expressions, for example quality to purpose with an associated value. Asserters may make assertions that they perceive range from what they express as factual statements, such as a subject, David Wales, an emeritus professor at Caltech, to opinions, such as a restaurant, Greens in San Francisco, is excellent. For example, <excellent-overview(algebra, INHerstein), INHerstein> is an assertion element that asserts that a group theory book, *Topics in Algebra*, by I. N. Herstein provides an excellent overview of algebra.

Users in an affinity group, an organization and the like may aggregate Repute assertions of its members to express the group's Repute assertions. For example, Sierra Club may aggregate its members' opinions on an issue to express the Club's Repute on the issue.

Assertions may be derived from sets of assertions that share a common scalar, with associated weights. For example a user may select "Excellent" as the assertion term (which may have an associated value of 8 on a scalar of 10) and a weight of 6, which may be used in evaluation of this assertion.

A Repute subject is a PERCos value set about which one or more PERCos assertions have been made. Repute subjects may be anything that may be described: digital or analog, concrete or abstract, specific or general, or any combination thereof. For example, subjects may be other subjects, assertions, Reputes, and/or content and the like. Inter alia, Repute subjects may be any one or more resources, and/or any identifiable portion thereof. A Repute subject itself may or may not have a unique identifier, but might contain one or more identifiers that can be interpreted.

Each subject can be uniquely denoted by a unique identifier.

A Repute subject may be any uniquely identified entity, including PERCos resources.

Given a DI whose subject is available, a user with appropriate permissions can unambiguously retrieve the subject's Reputes, and/or other data, through the subject's interface. Conversely, a PERCos system may generally assign the same DI to the same subject. However, this cannot always be guaranteed—differing descriptions of the same subject may sometimes be assigned differing DIs. In some embodiments, subjects may be arranged in one or more information structures, such as category classes, purpose classes, resource classes and/or other information stores.

In some PERCos embodiments, Reputes may be associated with portions of and aggregations of subjects which are associated with user session purpose expressions, results sets and/or candidate resources. For example a portion may be a chapter within a book, where the chapter has one or more Reputes and the book another one or more Reputes which may differ. In some embodiments, subject may comprise a single item and/or a class expression.

A purpose element expresses the purpose associated with a Repute expression. For example, purpose elements for a Repute expression may be "teach algebra," "learn algebra," depending on the user's perspective. For example, professors interested in choosing a text book for a college course in algebra may have purposes to "teach algebra." In contrast, a mathematician who needs a reference book on algebra may have a purpose to "learn algebra."

Each Repute expression may have one or more stakeholders. For example a self-published Repute may have one stakeholder who is fulfills all the roles and processes associated with the Repute. Alternatively, for example there may be one or more other Stakeholders associated with each Role and/or process in any combination.

A creator has at least one persistent identity, for example an identification element, which is a unique descriptive identifier/characterizer and may comprise identification data which has some degree of persistence, such as, including, email address, physical address, government issued ID, credential affinity group membership, biometric information, brand, DOI, URI, URL, reputational and/or expertise information, purpose association, serial number, and/or MAC address.

In some embodiments, creators may use PERCos Identity Services (PERID) to create creator identification indicia. Using PERCos Identity Services has advantages, such as, being able to associate assertions and/or methods to express the strength of their identification. For example, suppose a creator n is David Wales. If he chooses, he can assert that he is an emeritus professor at Caltech. He also has the option of associating a method for verifying the assertion.

In some embodiments, PERCos publishers may provide services for the publication of Repute expressions where the publisher is not the creator of the Repute expression. For example a publisher may offer a service to creator for the publication of their Repute expressions.

In some embodiments, there may be circumstances where publisher and the creator may be the same, but wish to use separate identifications for those processes. There may also be circumstances where the publisher and the creator are the same and wish to use a single identification, which may be either that of publisher, creator or combined as publisher/creator.

Repute assertion providers are Stakeholders who have provided Repute expressions to another Stakeholder.

A time element may express a range of time related elements, such as for example, the time interface for which Repute expression and/or assertion is valid. For example, Repute expressions may utilize "leases" specifying their validity before requiring reaccreditation. Some time elements may also specify the creation time of Repute expression. For example this may include effective dates, creation date and the like.

Repute expressions may have differing scope of metadata information. Repute Framework enables creators of Reputes with flexibility of deciding how much of metadata information should be described as a metadata element and how much may be factored into their own separate expression elements. For example, time may be included in and/or associated with Repute expressions either as its own time element or as part of metadata element. Metadata may also include comments.

Efficient and effective evaluation of resource sets by humans, involves clear and concise sets of easily understandable metrics (values and attributes) so as to enable the relative values and importance of these Reputes to be well understood. In some embodiments, these include the following metrics In some embodiments, Quality to Purpose is an expression of the overall quality of Repute subject to the purpose.

Quality to Purpose may be calculated by algorithms, such as the weighted average of all Reputes where the subject and/or purpose expression associated with Repute is exactly equal to or is a close approximation of, the purpose expression provided by the user to which the quality to purpose is to be calculated. For example if the user expressed purpose is Learn Physics (expressed as a CPE [Learn: Physics]), and there are a set of Reputes (for example a set formed by those Reputes associated with the members of the purpose class Learn Physics), then the quality to purpose of those resources (those referenced by the Reputes) may be determined by one or more algorithms. For example this may include weighted averages and the like. These weightings may include values associated with the publisher, asserters, Stakeholders, subjects and/or other metadata associated with these Reputes. This may also include other purpose metrics such as purpose satisfaction.

In some embodiments, Quality to Domain is an expression of the overall quality of Repute subject to one or more purpose domains. For example this metric may comprise the overall quality, as expressed by and through Reputes, of one or more resources to a specified purpose Domain.

Quality to Domain may be calculated by methods including the weighted average of all Reputes where the subject (in this example a resource which is a Physics text book) is included in a specified purpose Domain (for example purpose Domain=Physics), such that if this resource had 100 Reputes, and they had been weighted by the Reputes of the asserter (for example Reputes by MIT would have higher weights than those of Bournemouth College of further education and training), such that an aggregate value for this resource for this purpose Domain is created.

In some embodiments, Quality to purpose class is an expression of overall quality of Repute subject to one or more purpose classes.

In some embodiments, Quality to purpose of Stakeholders is the expression of the overall quality of Stakeholder to one or more purposes.

Quality of Purposes of Roles is an expression of the quality of one or more resources in serving a Role contributing to serving the purpose.

In some embodiments PERCos resources may have associated Roles, and consequently these Roles may form, in part or in whole, a set of resources that satisfy one or more purposes.

In one embodiment Integrity Quality Indices are derived calculations for the total integrity of all the Stakeholders referenced with a Repute (or set thereof).

Methods may include directly referenced stakeholders and/or indirectly referenced stakeholders. Direct stakeholders may include the asserter and subject and publisher where asserter is publisher. Indirect may include contributing characteristics including integrity (including of publisher), variables related to value chain participants, commercial values, rights and the like.

Quality of Contributor to Purpose is the expression of one or more users/Stakeholders, including Roles, contributions to one or more purposes. This may include their contributions to one or more sessions for that purpose and may include time variables.

9 Repute Operating Environment

In some PERCos embodiments, Repute expressions and supporting tools and processes enables one or more users/Stakeholders to evaluate resources (including user representations) which they may wish to interact with for their purpose(s).

In some embodiments, Repute expressions and associated processes and tools utilize PERCos platforms services instances, such as PERCos Evaluation and Arbitration Services, which may with appropriate control specifications, provide users/Stakeholders with appropriate Repute expression evaluation methods. For example in some embodiments, there may be standardized sets of control specifications for evaluation of Repute expressions, where there are a large number of such expressions (such as with crowd behavior), where there may be highly divergent perspectives (such as in economics, philosophy or scientific debate—e.g. climate change) and the like In the real world, people selecting services, making purchases, choosing entertainment options and the like often go through decision process using factors such as their own preferences, license, certifications, brand name, referrals, recommendations, reviews, cost and the like. For example, travelers selecting lodging may rely on brand name, such as Ritz Carlton, Sheraton, Holiday Inn, Best Western and the like. Travelers, who want luxurious accommodation without considering cost, may choose Ritz Carlton. Those wishing for comfortable lodging at reasonable price may choose Best Western. Unfortunately, current decision making processes are often manual intensive and ad-hoc based on inadequate and inconsistent information.

PERCos Environments provide users with a systematic and integrated set of devices and methods to assist them in making their decisions and/or selections amongst available resources. This includes a dynamic, integrated Repute expression Framework that extends and systematizes reputation-based decision making processes.

For example a Repute expression Framework can significantly enhance this process to include all possible available resources for fulfilling user purposes. It systematizes the process by providing a rigorous framework comprising two parts. In some embodiments, such a Framework may comprise processes concerned with creating, collecting, organizing, publishing, validating and the like Repute expressions. The other part is concerned with evaluating, comparing, ranking, testing and the like of Repute expressions in the context of fulfilling user purpose expressions. It may provide these two parts by providing the following capabilities:

1. Repute expression for expressing facts and assertions about resources in a standardized manner.
2. One or more Repute expression languages for expressing Repute expressions.
3. Standardized rating schemes and values developed by domain experts that creators can use to generate their Repute expressions.
4. One or more utilities for manipulating Repute expressions, such as, without limitation, creating, collecting, aggregating, arranging, organizing, publishing, storing, interpreting, transforming, and standardizing Repute expressions.
5. One or more utilities for dynamically updating Repute expressions and maintaining relationships with other Repute expressions.
6. One or more mechanisms for ensuring the authenticity, reliability, integrity, privacy and the like of Repute expressions.
7. One or more utilities for evaluating, validating, comparing, ranking, testing and the like Repute expressions based on the context, including user purpose.
8. One or more utilities for fulfilling CPEs with resources that have desired level of Reputes.
9. One or more metrics associated with Repute expressions to support evaluation, ranking, comparison and the like.

Any or all of the foregoing may be used in any combination.

Repute expression Framework can provide one or more Repute expression languages for expressing facts and assertions about resources in a standardized manner. Repute expression languages may range from precise (e.g., logic based) to colloquial as well as range from structured to unstructured. Users, organizations and the like may use a Repute expression language that is most appropriate for their domains. For example, language for expressing opinions about financial advisors may be different than languages used to express reputations of hotels. Even within a single domain, users may use different languages to express their opinions. For example, a professor of mathematics may use a precise language to expression his/her opinion on a calculus textbook, whereas a student may use a colloquial terms to express his/her opinion.

Repute expression languages can be used for express both facts and opinions about all types of resources, including those resources that currently do not have any reviews/reputations explicitly associated with them. For example an Effective Fact is an assertion whose truth is assumed by can be either agreed by all users and/or validated by all users. For example, the statement, "French Laundry in Yountville, Calif., has been awarded 3 Michelin stars," is an Effective Fact, as is the statement "Napa Valley grows Cabernet Sauvignon grapes," and the like.

Users can also express opinions. For example, a wine critic may express his opinion on Bordeaux wines by asserting that they are over rated. Repute expressions can be also associated with other Repute expressions. For example, a creator, knowing that the wine critic is partial towards domestic US wines may create a Repute expression, asserting that the wine critics Repute expression may not be objective.

A Repute expression can be either declared or derived. A declared Repute expression is one that is explicitly stated by a user/Stakeholder and/or other resource. A derived Repute expression is one that is created through one or more methods being applied to one or more Repute expressions. For example, suppose a resource has an attribute that is associated with one or more Repute expressions. In such a case, a Repute system can generate a derived Repute assertion based on the attribute's Repute expressions. For example, suppose a book is published by a publisher, such as, University of Chicago Press, which has associated with it a Repute expression that asserts it to publish excellent technical books. In such a case, a Repute system may create a derived Repute expression asserting that the book is an excellent technical book.

A Repute expression framework may provide one or more internal representations to support standardization of Repute expressions. A Repute system may translate, interpret and/or transform Repute expressions, expressed in multiple languages into a single internal representation to support Repute operations, such as comparison, ranking, evaluations, validations, testing and the like.

A Repute expression framework may provide a systematic ability to collect, aggregate, arrange, and organize ratings from multiple organizations, associations and the like. For example, consider two organizations that review hotels. One organization, A1, may use the criteria comprising amenities, room cleanliness, hotel staff, room comfort, location, and cost, to generate an overall value rating. Another organization, A2, may use the criteria based on purpose of the trip, such as romance, business, family vacation and the like. Travelers currently must go to each organization to obtain factors used for its respective ratings and then manually compare each rating criteria against the other organization's rating criteria. A Repute system may provide utilities for collecting, aggregating, and standardizing these two reviews so that travelers can compare and rank reviews from both organizations.

A Repute expression framework may encourage experts to provide standardized rating schemes and values that creators of Repute expressions can use to generate their assertions. For example, consider automobile rating industry. There are several organizations, such as *Edmunds, Consumer Reports* and the like. For each organization, the person has to understand the criteria used to generate its respective reviews. For example, Edmunds asserts that a particular vehicle performs superbly and provides "an intriguing alternative to more common sports cars and performance coupes." Unfortunately, most prospective buyers have no idea what Edmunds meant by "an intriguing alternative." Repute expression framework may encourage a standardized rating scheme so that buyers can use ratings in an informed manner.

For a user to create a Repute expression, a Repute system may provide users to ensure non-repudiation of creators of Repute expressions with one or more Identification and Authentication (I&A) mechanisms that creators may use. A Repute system may associate with each Repute expression the strength of I&A. For example, organizations, such as FDA, that used strong I&A mechanisms would be assigned highest strength level. In contrast, an individual using a weak I&A mechanism would be assigned a lower strength level.

A Repute expression framework may provide one or more mechanisms to ensure non-repudiation, reliability, integrity, and/or privacy of Repute expressions. Whenever possible a Repute system can utilize existing mechanisms.

Repute expression framework may provide a systematic ability to evaluate resources based on the context of their purpose. For example, people interested in finding an investment advisor may ask friends for referrals. And yet, the person may have differing needs than their friends. A Repute system may provide the person to specify their purpose and then evaluate the suitability of the referred advisors based on the context of the purpose. To support this capability, Repute expression Framework enables Repute expressions to be associated with purposes. For example, consider a financial advisor. The advisor may have a Repute expression that asserts that they are an above average advisor. The Repute expression may also have a purpose associated with it, where the purpose is "to grow capital with minimal risks."

A Repute system may provide dynamic up-to date ability to evaluate resources. For example, as users use a resource to fulfill their purpose experiences, they may associate Repute expressions asserting their opinions of the resource, such as, their satisfaction level with the resource.

A Repute system provides users with methods to validate a Repute expression, REP 1, based on the context of their purpose by evaluating Repute expressions associated with REP 1. Consider for example, *Finite Groups* by Huppert et. al. Prof. J. Alperin asserted a review of the book, which was published by *Bulletin of the American Mathematical Society*. Suppose readers of Bulletin American Mathematical Society posted their comments on Alperin's review. A user who is interested in doing research in finite groups may validate Prof. Alperin's opinion of the book by evaluating readers' comments.

A Repute system may also enable users to validate a Repute expression by evaluating Repute expressions associated with its attributes, such as its creator. For example, a mathematics student may evaluate Prof. Alperin's reviews by evaluating Prof. Alperin's credentials. In particular, Prof. Alperin is a full professor of mathematics, specializing in group theory.

A Repute system may also enable users to associate metrics with Repute expressions in the evaluation process. For example, suppose there are two Repute expressions associated with a purpose. One Repute expression, (REP1), is created by a group of Keynesian economists and asserts that a mixed economy, predominantly private sector, but with a significant role of government and public sector, is the solution. The second Repute expression, (REP2), is created by a group of classic economists who believe in Say's Law that asserts that that supply creates its own demand. REP2 asserts that adjustments in prices would automatically make demand tend towards full employment level.

A user who is a follower of the Keynesian economic theory may place higher value to the Repute expressions of the creators of REP1 than the Repute expressions of the creators of REP1. As a result, the user may place higher value to REP2 than REP1. For another example, Repute system may enable a Repute expression to be associated with Robert Parker's Repute expression that reflects Parker's preferences for US domestic wines.

Repute system in some embodiments may provide theories and/or algorithms that enable users, processes, and/or PERCos system itself to infer Reputes of resources. For example, suppose Apple introduced a new iPod. Given Apple's Reputes for producing reliable products and the reliability of previous versions of iPods, Repute system may tentatively associate a "high" Repute value with the newly released iPod Repute system may also use historical information to dynamically associate Reputes metrics to resources.

Repute system may also infer a user's Repute on a particular domain by evaluating the user's assertions. For example, a user asserts that Debussy composed Clair de Lune, which is part of Suite bergamasque using his own music language comprising whole-note scales, parallel chords and the like to create a sense of floating, ethereal harmony. A Repute system may evaluate the accuracy of the user's assertions, such as possibly comparing them against other "known" expert's Repute assertions, if available. And based on the evaluation, Repute system may "associate" an appropriate Repute metrics with the user and/or user's assertions.

In some embodiments, PERCos Repute frameworks may include the following capabilities:

- Scalable, interoperable, extendable, and distributed framework for originating, publishing, distributing and/or organizing Reputes including, for example, tools for creating, discovering, modifying, capturing, publishing, resolving, integrating, organizing, aggregating, discovering, sharing, storing, and/or other operations for manipulating Reputes
- Evaluation systems and methods (including for example PERCos Platform Services Evaluation services) for efficient and effective evaluation of Reputes to support, in part purpose optimizations
- Ensure integrity and reliability of Repute expressions and Repute expression elements and/or evaluations thereof
- Standardized and interoperable Repute metrics including for example Quality to purpose Repute variables
- Standardized interoperable formatted expressions, called Repute expressions, for associating quality/integrity/reputation/credibility with resources (including, user/Stakeholders representations as Participants), processes, and/or other PERCos and non-PERCos elements;
- Standardized Repute expression specifications sets (which may in some embodiments be PERCos Constructs) for associating quality/integrity/reputation/credibility assertions with subjects. This may include for example, resources (including Participants), processes, and/or other PERCos and non-PERCos elements.
- A suite of standardized and interoperable languages, including PERCos standardized Repute expressions, for expressing and/or asserting Reputes, including their elements such as assertions, subjects, identity characteristics (for example through PERCos PIDMX), purpose associations and/or metadata.
- Interoperable/standardized Reputes expressions and Repute expression elements.
- Standardized expressions for Effective Facts (EF) and/or Faith Facts (FF)
- Standardized and interoperable evaluation specification sets for evaluation of Repute expressions, including aggregations and arrangements (for example Point-Counterpoint) of such expressions standardized sets of specifications for Evaluation, Arbitration and/or other processing of Reputes metrics, including standardized sets, for expressing and evaluating the quality of Reputes.
- Provide systems, devices and methods for optimizing the integrity and reliability of Reputes.
- Tools, algorithms and/or methods for creating, discovering, modifying, capturing, evaluating, publishing, resolving, integrating, organizing, sharing, storing, and/or other operations for manipulating Reputes.
- Tools, algorithms, processes and/or methods for creating aggregated Reputes and expressions thereof
- One or more PERCos authorized utility services for extending and/or expanding standardized and interoperable Repute languages, metrics, expressions, evaluation specifications and/or other associated elements so as to be interoperable across PERCos systems, in part or in whole.
- Storage and retrieval methods, for example using PERCos PIMS, classes and/or other information structures, for Repute expressions
- A suite of additional PERCos Platform Services, such as, Coherence Services, Publication Services, Evaluation and Arbitration Services, Reasoning Services, Test and Result Services, History Services and the like that users may use for resolving, integrating, organizing, discovering, sharing, storing, publishing, and/or other operations for manipulating Reputes.

Repute frameworks, in some embodiments, may provide users/Stakeholders with expressive and flexible methods to associate one or more Reputes with one or more resource sets. Such frameworks may enable users/Stakeholders to use a wide range of languages and/or representations to formulate their Reputes. For example, users/Stakeholders may use structured and/or formal languages, such as XML, OWL and the like.

In some embodiments Repute frameworks may translate, interpret, and/or process user/Stakeholder provided Repute expressions into one or more formats suitable for computational operations, such as for example, XML, OWL, etc. For example, a user may, use an editor to specify the following Repute expression:

Assertion: excellent-overview of Algebra
Subject: Topics in Algebra by I.N. Herstein
Purpose: Learn Advanced Algebra
Purpose: Teach College Algebra
Creator: Marshall Hall, Professor of Caltech
. . . Publisher Caltech
. . . Repute Dimension: Quality to Purpose {90}
. . . Repute Dimension: Quality to Purpose of Stakeholder (Creator{90})
. . . Repute Dimension: Quality to Role (Publisher{85})

An example PERCos embodiment Repute framework may translate this Repute expression into an internal representation using, for example, XML format as follows:

```
<Repute-expression>
    <Assertion>excellent-overview(Algebra, ID-INH-Algebra)
    </Assertion>
    <Subject>
      <ID>ID-INH-Algebra</ID>
        <Name>Topics in Algebra by I. N. Herstein</Name>
        <Assertion>Professor (mathematics, U of Chicago,
        ID-INH-Algebra)
      </Assertion>
    </Subject>
    <purpose-set>
      <purpose>
        <Verb>Learn</Verb>
          <Category>Advanced Algebra</Category>
      </purpose>
      <purpose>
        <Verb>Teach</Verb>
        <Category>College Algebra</Category>
      </purpose>
    </purpose-set>
    <Creator>
    <ID>ID-MHall</ID>
          <Name>Marshall Hall</Name>
    <Assertion>Professor(mathematics, Caltech, ID-MHall)
    </Assertion>
      </Creator>
</Repute-expression>
```

where

Excellent-overview(<Identity>) is an assertion that maps Identity to an evaluation list. In this case, it asserts that the book is an excellent overview of Algebra, which is an identifier for the algebra category.

Professor(<mathematics>, <school>, <identity>) asserts that Identity is a professor of mathematics at school.

Another creator may also generate a Repute expression, such as:

Assertion: hard-to-read
Subject="Topics in Algebra by I. N. Herstein
purpose=Learn Algebra
Comment=is dense
Creator=James McDuff Both Hall and McDuff created Repute expressions for the same subject. However, Hall's Repute expression may have differing impact depending on purpose and/or preferences of evaluators (including the expertise of the evaluator in regard of their purpose). For example, for mathematicians, Hall's Repute expression may have higher impact. Group theory researchers may quickly determine that the book is too elementary for their purposes, whereas university professors interested in selecting an undergraduate algebra course text book may find the book totally suitable for their needs. But for a general reader, McDuff's may carry more weight.

Time may be included in and/or associated with Repute expressions, including time assertion made, time assertion evaluated, time assertion is about, time range for which assertion is valid. For Example, Repute expressions may utilize "leases" specifying their validity before requiring reaccreditation.

Repute frameworks may provide users with the ability to repudiate their Reputes. For example, suppose a user discovers that a Repute expression was forged using his/her identity. In such a case, the user can use repudiation features to repudiate the forged Repute.

Repute frameworks may enable evaluators to specify "filtering" criteria, such as provide subjects that have certain properties. For example, an evaluator may be interested in elements generated by creators who provided reliable Reputes. In another example, an evaluator may be interested in a list of products that are reviewed by Consumer Reports. In doing so, evaluators may avoid exposure to spurious Repute expressions.

Repute frameworks may associate one or more metrics with Repute expressions. These metrics may be any combination of quantitative and/or qualitative metrics. In some embodiments, Repute frameworks may use historical data to dynamically modify metrics to reflect the empirical quality of Repute expressions.

Repute frameworks may provide weighting of Repute expressions and/or their constituent elements. For example, it may assign smaller weights to those Reputes that express outlying values. Suppose over 100 creators have created Reputes for a restaurant, X. Majority of the Reputes state that the restaurant is good to excellent. However, there are a small number that stated that the restaurant is abominable and should be avoided at all cost. Repute framework provides Counterpoint (point-Counterpoint) analysis that enable evaluators to determine possible collusion of Repute expressions.

If an evaluator requests, Repute frameworks may use evaluation strategies, such as those recommended by Halpern, to combine Repute evidences that minimize the outlying Repute expressions to generate an aggregated Repute that expresses majority opinions/reviews. For example, a set of Reputes with a common subject, may be aggregated into a single Repute on that subject with an algorithmically calculated aggregation on the assertions of the evaluated Reputes, with the single Repute assertion comprising, a combination of those assertions, using such theory as Dempster Shafer.

Repute frameworks enable categorization of Repute expressions. For example, a user's academic credentials or membership to organizations can be considered to be Effective Facts since they can be independently verified/validated by "well-accepted" methods. Repute frameworks also enable creators of Reputes to provide their own Reputes, thereby enabling evaluators of Reputes to validate the reliability of the creator provided Reputes. For example, suppose Robert Parker creates a Repute expression that expresses his review of a wine vintage. Parker can provide a Repute that asserts his reputation/credentials, thereby enabling evaluators to assess the reliability/credibility of the review.

To support boundless computing, a Repute system is designed to be extensible and operate in a distributed manner. A group of Repute expressions for the same subject and/or purpose can be aggregated, summarized and/or otherwise transformed into a single Repute expression. For example, a Repute system may aggregate multiple Repute expressions that have the same subject into a single Repute expression that comprises multiple assertions from multiple creators.

A Repute system may perform statistical analysis of Repute expressions. For example, consider the reliability of some storage device. A Repute system may analyze the Repute expressions associated with the storage device to generate a Repute expression that asserts the device's reliability. As it obtains additional Repute expressions, it may dynamically update the device's Repute expressions.

A Repute system may summarize multiple Repute expressions. In some embodiments, a Repute system may provide a set of standards that users and processes can use to create their Repute expressions. A Repute system may use this standardization to summarize equivalent Repute expressions into a single Repute expression. For example, while many wine magazines use their own criteria to rate wines, almost all of them use 100 point scales, where a wine rated 96-100 is considered extraordinary wine of profound and complex character; a wine rated 90-95 is considered outstanding; a wine rated 80-89 is a very good wine that has no noticeable flaws and the like. Repute system may use this standard to aggregate Repute expressions of a wine that score the wine very similarly (i.e., very close rating score). Suppose Wine Spectator and Wine Enthusiast rate a bottle of wine 89 and 87 respectively, then a Repute system may aggregate the two Repute expressions created by Wine Spectator and Wine Enthusiast into a single Repute expression that has two creators, namely Wine Spectator and Wine Enthusiast.

This type of aggregations, summarization, and/or arrangement enables creation and use of Repute expressions at any chosen level of granularity so that users, processes, and other Stakeholders may create, organize, store, and/or publish Repute expressions that provide the best fit to their purpose.

The rapid expansion of network-available data and services essentially guarantees that between the time a PERCos system is deployed and the time it is used, new data, new devices, new services, and/or new systems may have become available. A PERCos system generally may not know which hardware, which operating systems, and/or which services may provide resources it may use. Conversely, the publisher of a resource generally may not know all of the hardware, operating systems, services, purposes, contexts and the like that may constitute the environment of any given use of a resource—unless they are specified and/or constrained in a consequential manner.

A Repute system may be able to provide its services regardless of its operating environment, including hardware, operating system and the like it may be running on. For example, for a resource comprising a limited device, a Repute system may be a light weight process that outsources most of its processing to another Repute system.

A Repute system uses a range of security mechanisms to ensure integrity of Repute expressions. For example, in some embodiments, a Repute system may use cryptographically based digital signature and time stamp schemes to provide non-repudiation by creators of Repute expressions.

A Repute system may also use fault tolerance techniques to ensure robustness of Repute expressions. For example, a Repute system may use Byzantine Algorithm to replicate Repute expressions to ensure their availability to users.

A Repute system itself may operate in distributed manner so that even when a local Repute system is not available, a user can access a remote Repute system that provides the user with the same functionality as the user's local Repute system.

Repute expressions, in some embodiments, can be dynamic, in that their use, metrics, relationships, evaluations, assertions and/or other processing may vary over time, and these dynamic variations may impact their perceived and/or calculated values, including for example, importance and/or relevance.

In some embodiments, Repute expressions can be made at a point in time, in specific circumstances and as such may be considered as "fixed"/invariant to that time. In some example embodiments, a user/Stakeholder may create a Repute expression at time T1 and another at a later time T2, and may choose to either, keep both expressions, replace the earlier with the later, combine the two and/or undertake any other processing they are entitled to undertake.

In one example, a Repute expression is created at Time 1, and is invariant, in that over time this Repute expression itself does not change, however the Repute of the creator, in this example, has changed, which may impact evaluation of invariant Repute expression.

In some embodiments, such manipulations may be either opaque or transparent to another user/Stakeholder concurrently evaluating such expressions, depending on the associated and/or prevailing rules. For example PERCos History Services may retain the event history. However, access to such history may be governed by rules.

Repute expressions may be associated with a set of Repute expressions that is dynamically changing. For example, consider for example a cancer drug. It may have the original assertions describing the drug's efficacy, side-effects, treatment procedures and the like published by the US Food and Drug Administration. Medical research groups may perform additional research studies and publish their findings in journals, such as New England Journal of Medicine. Prospective users of the drug may want to review these subsequent findings in addition to the original assertion. A Repute system supports this dynamic set by maintaining the relationship between the original Repute expression with its associated Repute expression using a PERCos Identification Matrix (PIDMX).

For example, suppose REP 1 is the original Repute expression on the drug. Further suppose a medical research group publishes a Repute expression, REP 2, asserting its efficacy and side effects. A Repute system may use PIDMX to establish relationship between REP 1 and REP 2 so that any user interested in using the drug can evaluate both REP 1 and REP 2.

In some embodiments, there may be one or more resources that undertake Repute evaluation and processing tasks as background operations (including those using cache type approaches). For example if there is a multitude of Reputes with a common subject, a movie, these may be processed into a single aggregated Repute representing the aggregate Repute expressions. These may further be complimented, by other processes that add further Reputes, in the form of "trends" moving the overall aggregate Repute expression to reflect the changing circumstances.

The performance of Repute framework, in part, depends on several factors, such as, the requested operations requested, the perceived quality of the results, qualities of Repute expressions, availability of information and the like. For example, suppose an evaluator requests for the most accurate and precise analysis of the reputation/credibility of a reference book. Further the book has a large number of Repute expressions, created by a large group of users. Providing the requested quality of results may take arbitrary amount of processing. For example, Repute Framework may need to process every creator's Reputes, if any, to ensure the quality/credibility/reliability of the creator's Reputes. In some cases, Repute assertions may express a wide range of opinions. In such a case, Repute Framework may need to perform further analysis, such as analyzing possible relationships, if any between creators.

Repute frameworks, in some embodiments, may provide users with a suite of tools for creating, discovering, modifying, capturing, evaluating, publishing, resolving, integrating, organizing, discovering, sharing, storing, and/or other operations for manipulating Reputes. The suite of tools may utilize/leverage third party tools. For example, for users who are interested in creating precise and structured Repute expressions, Repute Framework may provide an editor/tool that leverages, for example, an OWL editor such as Protégé. In such a case, the Framework editor may "wrap" the editor/tool to generate outputs that are PERCos compatible.

Repute frameworks embodiments provide a suite of tools that evaluators may use to evaluate Repute expressions. Such tools may utilize PERCos Platform Services, such as Coherence Services, Publication Service, Evaluation and Arbitration Services, Reasoning Services, Test and Result Services, History Services and the like.

In some embodiments, there may be trust aspects in Cred evaluation processing. For example, Creds may be evaluated in trusted, partially trusted or untrusted context(s), with, multiple levels of Trust employed in evaluation and results sets, such as, None/Partial and/or complex. In some embodiments, results sets may provide trust mechanisms, such as signed result with published dictionary, certified, credentialed, certificates and the like. This may be utilized, where Creds are to be used in a trusted manner by other users/Stakeholder and/or processes, such that a trusted chain of handling and control is maintained.

Trust may also, be used in evaluation processing, such as that the specifications for evaluation have been executed in a trusted manner. Evaluation processing may include visibility, audit, test results and/or standardized tests.

Repute has three main specification groupings, Effective Facts (EFs) and Faith Facts (FFs) and Creds. EFs comprise "ascertained" and/or otherwise contributed factual assertions regarding a subject, such as the date a person was born or an institution's assertion that an individual is an employee and, for example, holds a certain position and/or title. By contrast, Creds comprise and represent assertions, where such Cred assertions are made by one or more parties that have respectively, at least one persistent, functionally unique identifier, and where such assertions do not rise to the level of a factual attribute set that was stipulated by a reliable, recognized unbiased fact related "authority". All EFs, FFs and Creds have an identified subject matter characterization set, such as an explicit identifier of a resource such as a web address, brand name and, for example, model, name of an individual with, associated other identifying information, such as a professor at MIT. Either EFs, FFs or Creds may use certain information related to any one or more such subject matter characteristics sets or portions thereof be present, such as a persistent one or more identities or persistent identities, and/or associated to such subject matter identifier(s), location(s), time(s) and/or date(s), authoring and/or publishing id(s) and/or method(s), and/or any other identifiable and inter-operably interpretable associated other identifying characteristics, where such subject matter characteristics are reliably known (e.g. certified) and/or were otherwise testable as related to the subject's topic matter. By contrast with EFs, Cred subject matter may either not have a persistent one or more identifiers as generally meant herein regarding asserter identifiers; Cred subject matter may correspond to a user resource class and/or other abstraction, or the subject matter may be explicitly identified through the use of a user resource and its associated UID. Persistent subject identifier(s) may contribute to a Creds level, or other characteristic representation(s), of Cred applicability, authority, and/or reliability, such as, for example, a Level 7 reliability if the asserting party is a Stanford, or top twenty ranked university tenured professor related (for example, as specified) to a user Core Purpose category regarding the category subject matter.

Generally speaking, Repute systems embodiments consider an expression of a subject characteristic as a fact, not an assertion, when such expression was made by a party having specific and convincing authority to declare a fact regarding a subject, such as may be declared by a related affinity group and/or an operating standards utility. Such interpretation of specific and convincing authority may be contextually dependent, for example, as related to topic and/or other assertion characteristic(s). By contrast, Creds represent assertions generally recognized as expressed opinions regarding subjects. Both EFs and Creds may be deployed according to reliability levels. Reliability levels can inform user(s) and/or associated computing resources (such as an operating PERCos session) as to whether a given degree of specified reliability satisfies either preset and/or current session rules and/or other criteria as to degree of reliability (such as a user reaction to such information) either as to reliability level and/or as to the apparent level of reliability of the assertion of such reliability level.

EFs, FFs and Creds embodiments form filtering "vectors" that complement PERCos Core Purpose and other contextual expressions. They provide further, and in certain circumstances primary, filtering and/or prioritizing elements. In part as a result of the use of standardized purpose Repute expression specifications and related values reflecting factual and/or assertion characteristics of subjects, Repute variables provide input for the calculation of results, particularly from large candidate resource store(s), that can most closely correspond to, and/or otherwise implement and/or optimize results related to the objectives of CPEs and any associated preferences, rules, and/or historical information contributions. In use, EFs and Creds may be used in combination, either with their own type (e.g. EFs with EFs) and/or in combination with the other type (e.g. EFs with Creds). EFs and Creds, singularly, or in some combination, may be aggregated and/or otherwise algorithmically interpreted and associated as inter-operably interpretable values associated with any resource or resource combination by; this is accomplished by in part, the association of Repute information with the subject matter of such resource and/or a portion thereof, such a resource set for a contributing role for purpose fulfillment, and/or by association with any one or more other resource characteristics. These resource characteristics may include one or more resource providers and/or creators and/or, as associated with a performance characteristic of the subject matter, such as the reliability of a certain type of hardware memory for a certain type of fault tolerant application class. In this instance, a purpose class CPE for employing fault tolerant hardware memory that contained fault tolerance as an expression subset might, in a given application, be employed in matching with resources in a manner where the fault tolerance expression was matched against the stored information regarding asserted fault tolerance quality(ies) of a given resource set whereby resources were prioritized, at least in part, in accordance with the assertion by certain qualified (according to user(s) and/or, for example, other Stakeholders such as third party authority organizations such as certifying authorities, one or more utilities and/or affinity groups and the like. This may include asserters that are generally known to be useful, such as senior faculty members at institutions who by preferences set by accepted experts and/or directly by users and/or affinity groups, are to be weighted significantly as useful and used in evaluating/filtering resources.

Such Repute variables complement Core Purpose expressions, and other contextual elements, when added as components to purpose expressions, powerfully enhance the capacity of PERCos to filter huge resource sets to relatively optimal candidate and/or provisioned resource sets.

As discussed, such Repute variables may be user/Stakeholder specified during a PERCos session setup, may be incorporated into PERCos Constructs, such as Frameworks, Foundations, resonances, and/or other resource purpose specification Constructs. Repute variables may operate as underlying preference variables such as profile specified variables (as resource general and/or purpose class associated contextual purpose variables) that may be automatically associated with purpose expressions for employment in sifting through, provisioning, and/or prioritizing resources, generally, or as associated with a purpose class or specific purpose. Purpose expressions formulated in a system where Repute variables may be further employed in determining and/or prioritizing candidate resources are known as Contextual Purpose Expressions (CPEs), regardless of the actual use of any Repute variables.

Repute expressions, in some embodiments, may be dynamic, in that their use, metrics, relationships, evaluations, assertions and/or other processing may vary over time, and these dynamic variations may impact their perceived and/or calculated values, including, importance and/or relevance.

In some embodiments, Repute expressions can be made at a point in time, in specific circumstances and as such may be considered as “fixed”/invariant to that time. In some embodiments, a user/Stakeholder may create a Repute expression at time T1 and another at a later time T2, and may choose to either: keep both expressions, replace the earlier with the later, combine the two and/or undertake any other processing they are entitled to undertake.

In one example, a Repute expression is created at Time 1, and is invariant, in that over time this Repute expression itself does not change, however the Repute of the creator, in this example, has changed, which may impact evaluation of invariant Repute expression.

In some embodiments, such manipulations may be either opaque or transparent to another user/Stakeholder concurrently evaluating such expressions, depending on the associated and/or prevailing rules. For example PERCos History Services may retain the event history. However, access to such history may be governed by rules.

Repute expressions and sets thereof may be further complemented by other Repute expressions made upon the original expression or set. This is termed Repute on Repute and may involve arbitrarily long chains of Repute expressions, which in turn may be organized to form Repute sets in any arrangement.

In many circumstances as the ability to manipulate video, images, audio, text and the like and other existing content and/or materials increases, the ability to differentiate that which is authentic, may involve Repute expressions of one or more experts, and potentially parties so authorized, to provide one or more appropriate Repute expressions.

For example recordings of major events, the moon landing video, images from major catastrophes and the like may have associated Repute expressions asserting their authenticity.

In some embodiments, such Repute expressions attesting to the authenticity and/or factual nature of recordings of events may be associated, for example in a secure manner, with such recordings. This association may provide for subsequent interactions by other users/stakeholders with these recordings to have such Repute expressions available, and consequently confirm the “authentic/factual” status of recordings.

In some embodiments, these Repute expressions may support event recordings which may be expressed as Effective Facts.

Repute expression languages may include those that formalize such expressions, in whole or in part. Such Repute expression languages may, enable standardization and interoperability for creation, publishing, evaluation, manipulation and/or use of Repute expressions.

In some embodiments, Repute expression languages (RELs), may specify, for example, the syntax and semantics of Repute expressions. For example this may include specification rules determining the elements of the Repute expression (asserter, subject, purpose expressions and the like), their priority, order, status (mandatory/optional) and/or other characteristics.

RELs may use one or more formalisms, through reference and/or embedding, such as purpose and/or domain specific lexicons, vocabularies, dictionaries and other similar resources. RELs may additionally include, by reference and/or embedding, further languages, including lexicons, semantics, syntax and other attributes, in regard to the elements that constitute the Repute expression.

In some embodiments, these languages and/or formalisms may include sub formalisms that are specialized for assertions, subjects, Evaluations and/or other directly or indirectly associated elements and/or processes. This may include one or more constrained vocabularies that are purpose, user, Stakeholder, context, resource and/or process specific.

In some embodiments, these language formalizations may be based on, a categorization schema derived from other purpose related languages, such as Repute expression subjects being equivalent to purpose expression language categories. There may be for example a subject expression language.

In some embodiments, in addition to leveraging PERCos purpose expression languages, a Repute system may provide other languages and/or formalisms. For example, there is a plethora of knowledge representation languages and organizational structures, which may be used and accommodated within some PERCos embodiments, including by incorporation within fact assertion expression languages. However PERCos utilization of such existing representations and/or structures is qualitatively different because of the interaction with the other elements of Repute and/or other PERCos processing.

In some embodiments, assertions and opinions may be expressed in one or more PERCos Repute expression assertion languages. For example, assertions may comprise standardized sets of terms including adjectives/adverbs, values, organizations, and/or other characteristics that enable interoperable values for assertions.

These assertion expression languages provide one or more methods for interoperable and standardized evaluation (including comparison and/or equivalence) of assertions. In some embodiments, assertions may comprise two types, those that are stated as fact and those that are stated as opinion.

Opinion assertion expressions provide methods for interoperable and standardized evaluation and/or consideration of assertions, through use of one or more language structures, which may include semantics, syntax, lexicon, vocabularies, dictionaries and the like. For example opinions may include those assertions expressing a recommendation, such as "X takes great photos", "Y is an excellent chef" which may be evaluated differently depending on the identity of the Stakeholders associated with the assertions. In one example "Y is an excellent chef", may be a self-endorsement, which in many circumstances would not be weighted as highly as if the assertion were made by multiple independent users/Stakeholders or a respected expert and publisher (e.g. Michelin Guide).

Such assertion languages may be domain, user/Stakeholder/group, purpose or context dependent, such that, specific lexicons may be utilized in the evaluation of Repute expressions in a given context.

In some embodiments, Repute assertion expressions languages include formalisms for declaring assertions to be facts, in addition to the PERCos Effective and Faith Facts. These fact assertion expression formalisms may include one or more methods for expressing (for example by declaration) the degree to which an assertion is based in fact. These factual degrees may range from those believed by a single user/Stakeholder to those believed by crowds of users/Stakeholders. Within the system there may be a formal languages for stated "factoids", evaluation and analysis may be undertaken within the system to, for example deduce further "factoids" that have not been explicitly stated.

For example assertion formalism terms may include statements expressed as facts, which through such standardization and interoperability denotes that they may correspond to other such assertions, also expressing such statement of fact.

In some embodiments, where such assertions are deemed to be factual, and supported Stakeholders with strong identities, the Repute expression may be declared as an "Effective Fact" (EF). Effective Facts include, for example assertions that can be validated with recognized strong identities, such as governments, large corporations, those entities registered with governments and the like.

For example, the expression of such generally accepted truisms, such as "the world is round" may involve the use of formal expression languages, which may include one or more Fact assertion expression languages, including for example some embodiments of PERCos purpose expression language and/or use natural language expression. In many cases the use of declared formalisms for such assertions may create declarations that can be subsequently evaluated by one or more users/Stakeholders and/or processes, for example in a standardized and interoperable manner.

Subject expression languages and formalisms may include organizations and/or structures for subject classification and/or categorization. In some embodiments, such a language may utilize the PERCos class systems (including internal, category classes, purpose classes, "classic" and/or referential classes and/or other class Systems) to form the basis of such arrangements.

Such subject expression languages may include other semantics, syntax and/or other language attributes, such as segmentation of subjects into components, where subject comprises multiple elements. There may also be associated vocabularies, which may include one or more sets of synonyms.

Publication languages may comprise those specifications that control and manage the Publication processes, using for example PERCos Publication Services instance.

Identity expression languages may include those characteristics that present the type, quality, veracity, reliability, auditability and/or other identity characteristics. For example in some PERCos embodiments, PERCos Identity Systems, including PERCos Identity Matrix (PIDMX) provides such functionality.

In some PERCos embodiments there may be types of Repute expressions which include:

Aggregate expressions

Abstract expressions

Composite expressions and/or

Fact expressions

Each of these types may be implemented by differing systems, for example in some PERCos embodiments, as Creds systems. Each of these types may be created statically and/or dynamically and may provide efficient and effective methods to evaluate and/or use Repute expressions in one to boundless. These types may be extended in some PERCos embodiments, through generally in some PERCos embodiments this would likely be the minimum set of such types.

Aggregate Repute expressions, in some embodiments, comprise one or more sets of Repute expressions that have been aggregated by one or more users/Stakeholders and/or processes for one or more purpose.

In some embodiments, such aggregations would be based on one or more elements of the Repute expressions, such as subject, asserter, assertion, associated purpose expressions and/or other elements. For example the aggregated Repute expression may comprise a set of Repute expressions, that have a common subject, such as "Neutron Stars", and the aggregate Repute expression may comprise multiple assertions from multiple asserters about the subject. In another example the aggregate Cred may comprise subject and associated purpose expressions, for example subject "Neutron Star" and associated purpose expressions "Astronomy".

In some embodiments, Reputes may be made upon abstractions from classes and/or other information sources, such as where a group of experts make assertions regarding, another expert's perspective and the like.

Repute computational expressions comprise one or more sets of Repute expressions that have undergone one or more computational processes, based upon one or more Repute expression elements, such as assertions, subjects, publishers, time and the like to create a Repute computational expression that represents the outcome of such computational processes.

For example these Repute computational expressions may be based on Repute expressions where there is one or more common element, such as Repute expressions made at a specific time and involving a set of subjects.

In some embodiments, Repute expressions enable users to assert Effective Facts and/or Faith Facts. Effective Facts are Repute expressions containing assertions that can be objectively validated. For example, a Repute expression that contains assertion "Barack Obama is 44$^{th}$ President of the United States of America" is an Effective Fact.

In another example a Repute expression that "X has Y issued by Z", where X is a person and Y is a qualification issued by an institution Z, may also be considered as an Effective Fact, when sufficient validation of the assertion has taken place, for example by checking the records of Z. For example, an assertion, "Jim Horning has a Ph.D. issued by Stanford University," is an Effective Fact since the assertion can be validated by checking with Stanford University.

In some embodiments, creators, asserters and/or publishers of Effective Facts may provide one or more methods for validating them. These methods can range from those that evaluators of Repute expressions can test, to audit trails that demonstrate the processes undertaken by a publisher to validate them.

Faith Facts are Repute expressions containing assertions that can be accepted by some particular groups. For example, one group believes in string theory as basis for all physics. Another group may believe in superiority of Harley Davidson motor cycles. Repute expressions that contain string theory assertions or Harley Davidson assertions would be examples of Faith Facts.

In some embodiments, the degree of belief may be utilized in such mechanisms as Counterpoint. For example, in some embodiments, quantization's of beliefs may be related to multiple and potentially orthogonal assertions such as, "the Earth is round" and "the Earth is flat", where Repute expressions may be represented as a continuum between these opposing assertions. In some embodiments, such representations may be extremely useful in assisting users in understanding the scale and diversity of expressed assertions, such as in the area of climate change, economics, physics and the like, where assertions are not necessarily orthogonal, but still reflect significant divergence.

Repute expressions may be organized, through for example categorization, into informational patterns and structures. For example in some PERCos embodiments, this may include purpose classes and/or resource classes as the organizing principle. Such categorization and organizational methods may be employed from Cred creation, Publication through Usage and/or during and/or as a part of any processes.

In some embodiments, Repute, in common with other PERCos resources, may utilize and leverage the resource class structure provided by PERCos.

In some embodiments, there may be "domains of expertise", which may have associated Repute domains associated with them. Repute domains may include arrangements of Repute templates that have common Repute expressions, Repute expressions that have common Repute expression elements and/or other attributes that are associated with domain.

In some embodiments purpose and Repute domains may be coterminous, arranged in, for example, a class structure, potentially employing multiple class Systems. For example in one PERCos embodiment, such an organization may comprise a "classic" class System, for purpose, coupled with a relative class System for Repute.

Repute expressions may also be organized within such domains, including by for example use of ontologies and/or taxonomies, which may be related to other domain organizations, such as purpose classes. Repute expressions may also employ classes as organizational methods, and may associate these Repute classes with purpose classes.

In some embodiments, domains (of expertise) may have one or more ontologies for representing Repute, which may include structured and categorized through to unstructured and uncategorized. For example in some embodiments, "reviews" may generally be the latter, though often these are coupled with structured ratings (e.g. 3 out of 5).

Repute domains may also include vocabularies, dictionaries and/or Lexicons, that support in whole or in part Repute expressions. For example this may include assertion terms and/or associated thesauri that enable interoperable Repute expression assertion evaluation within a domain. There may also be, for example, cross domain thesauri.

In some embodiments, Repute expressions and sets thereof, may provide one or more perspective on elements comprising and the Stakeholders associated with those expressions. In presenting perspectives, in addition to Point-Counterpoint in some embodiments, PERCos may include the following approaches to enabling users to meaningfully evaluate Repute expressions within the context of their purpose Operations.

Reputes may, in some embodiments, comprise a set of distinct Repute expressions, including assertions that are grouped into a contiguous Repute set. In such embodiments, a Repute set may have a single subject, whilst other Repute sets may have multiple subjects. Repute expressions within a Repute set may be organized in any manner. Repute sets may vary over time, as the Repute expressions comprising sets, through for example, Repute expressions added/varied/removed/expired and the like.

Repute sets, in some embodiments, generally provide a more nuanced perspective on the subjects of that set, in that individual Repute expressions often have limited value in evaluation, as they may not be representative of the overall Repute, but rather represent a single point of view at a specific point in time. Generally Repute sets comprising a number of Repute expressions built up over a timeframe that has significance in regard of the Repute sets subject(s), and as such represents a continuum of Repute expressions, may generally provide a more accurate and reliable perspective.

Repute sets, in some embodiments, may be resources and as such have a variety of purposes associated with them, including, evaluation of Repute may be varied if utilization is determined by users/Stakeholders to not be appropriate to expressed purpose but is appropriate to other purpose(s).

In some embodiments, Repute sets comprise those Repute expressions that match specifications, selection criteria, algorithmic processing and/or other processes. These Repute sets may then undergo further processing and/or evaluation for example to filter, categorize, select and the like.

For example, in Repute set filtering, if a user/Stakeholder and/or process utilizes a specific filter, such as "Only books that have sold more than 1 million copies", then the Repute set associated with those filter operations may provide differing outcomes, depending on the role and relationship of user/Stakeholder and/or process to result set, for example:

If Party A uses filter A then Repute set may differ

If Party A has expertise A then Repute set may align Repute assertions based on that expertise Repute sets and the elements comprising the set, may have one or more metrics associated with them, for example strength measures, such as for example, 1 to 10 in Strength where 10 is highest. For example, another metric may represent multiple Dimensional measures, expressed for example, as range of topics covered and depth/topic.

Repute expressions may, in some embodiments be evaluated from the perspective that the Repute expression elements, including assertions, provide information about the associated Stakeholders as well as the subject. In one example the assertion terms may indicate the depth of expertise of Stakeholders, for example an expert who is the assertion creator, may use the assertion "Omega3 fatty acids found in some fish species are good for you" whereas a novice may use the assertion "Oily fish are good for you."

In other examples an asserter may state, when evaluating wines, a number of assertions for differing wines, that includes a preponderance of the terms "Lemony", "Acidic", "Mineral", which is this example may reflect their palate and tastes rather than the wines about which they are asserting.

In both these examples, other user/Stakeholders may be able to identify users/Stakeholders who use similar expressions in their assertions, which may indicate a common perspective. Another example may indicate the degree to which user/Stakeholder has expertise in a domain, which in some example embodiments, may be used by other user/Stakeholders to evaluate their relative expertise.

For example user/Stakeholder may determine from such analysis, their level of expertise in car repair, and use this to evaluate which expert and/or other user of similar or better expertise level to reference for Repute expressions and/or other information.

In some embodiments, clustering of Repute expressions and/or the elements thereof into multi-Dimensional Repute sets may be undertaken. In such an example the relative closeness of the Repute expressions and/or elements thereof, may be calculated and represented.

For some purposes, Purpose Formulation Processing may use Reputes, in addition to other Master Dimensions and Master Dimension Facets to identify one or more neighborhoods as starting points to perform additional refinement, filtering and the like. For example, suppose a user who does not know very much about car repair has a purpose to explore rebuilding transmissions. PERCos may provide the user with one or more general topics, such as a purpose class that represents a purpose [learn: automobile transmissions].

In some PERCos embodiments, purpose classes may have one or more Reputes associated with them. For example, suppose a user who is a beginner expresses a purpose expression, [Learn: physical-cosmology]. Purpose Formulation Processing may interpret this purpose expression into a purpose class, learn-physical-cosmology, which may have the following associated Repute expression:

```
Repute Exp:
[Assertion: [Reference:
      [Master Dimension
         (user characteristics:
            (sophistication: beginner) )]
      <purpose class: learn-astrophysics>] ]
[purpose: [Learn: physical cosmology]]
    [Subject: ["study large-scale structures
    and dynamics of the
            universe"]
    [Publisher: <Organization: Yale University>]
```

This Repute expression embodiment has an assertion that recommends purpose class learn-astrophysics for beginning users to explore. PERCos Purpose Formulation Processing, in this case, may return resources associated with this purpose class as well as resources associated with purpose class learn-physical-cosmology.

In some embodiments, PERCos Purpose Formulation Processing may rank resources based on the Reputes associated with their associated descriptive purpose expressions. For example, it may evaluate Repute values, where the evaluation may depend on the user context, such as, Master Dimension and Master Dimension Facets, crowd data, historical user data and the like. In the above example, PERCos Purpose Formulation Processing may rank those descriptive purpose expressions that enable beginning users to explore the physical cosmology over those expressions for advanced users to explore it. It may also rank those purpose expressions that enable the user to browse through different aspects of physical cosmology over purpose expressions that would provide deep treatise on some specialized subtopic, such as, thermodynamics of the universe.

In some PERCos embodiments, some PERCos Platform Services, such as, Coherence Services, Matching and Similarity Services and the like may use Reputes for two types of matching and/or similarity analysis:

- Specification matching and/or similarity analysis for determining/identifying one or more descriptive specifications that match and/or similar to a prescriptive Specification, where specifications include purpose expressions.
- Operating resource matching and/or similarity analysis for determining/identifying one or more available resources that match an operating agreement of an operating resource.

PERCos embodiments may determine/identify one or more Repute expressions that are highly correlated to a prescriptive specification, such as either the correlation is between the prescriptive specification and the purpose of the Repute expression or between the prescriptive specification and the subject matter of the Repute expression. For example, consider a prescriptive specification, [learn: physical cosmology]. PERCos embodiments may determine the following two Repute expressions:

```
Repute Exp1:
  Assertion: "[Master Dimension
              (User characteristics:
              (Sophistication:   beginner)
                {refer (PC: learn-astrophysics)}}]
  Purpose: [Learn: physical cosmology]
  Subject matter: ["study large-scale
  structures and dynamics of the
universe"]
```

```
  Repute Exp 2:
    Assertion: ["this lecture series provides
    a free introduction to
astrophysics."]
    Purpose: [Learn: astrophysics]
    Subject matter: ["introduction to astrophysics"]
    Publisher: [<Organization: Yale University>
    <ID: Yalexyz> <Method:
MYale>]
    Creator: [<User: Charles Bailyn> <ID: CBailyn>]
```

In this case, PERCos embodiments identify Repute Exp 1 whose purpose matches the prescriptive specification. It evaluates the Repute Exp 1's assertion to determine that physical cosmology is related to astrophysics. It then identifies Repute Exp 2 to identify purpose classes, "learn astrophysics" and "Learn physical cosmology" as matches for the prescriptive specification.

Matching and Similarity Services may use Reputes in their calculations and/or evaluations.

In some embodiments, an objective of pruning is to perform much of Repute evaluation at the class level, rather than at the level of individual Reputes. Some embodiments may detect an overabundance of suitable resources, and generate less than the full set described above, by truncating search and/or by applying sampling techniques.

Some embodiments may detect a scarcity of suitable resources, and generate additional "closely related" resources, for example, by relaxing criteria.

Repute publishers provide methods of formalizing user/Stakeholder expressions and/or assertions regarding a subject into a PERCos Repute expression, which in some example embodiments may be a Cred. Publishers may publish expressions/assertions into one or more Repute expression formats and/or types, including Creds.

Publishers are PERCos resources and may be instances, in some embodiments, of PERCos Publishing Services, where the control and organizational specifications include PER- Cos identity. The strength of the PERCos identity may, in whole or in part, determine the weighting applied to Repute expressions that have been published by that publisher.

Each publisher may have one or more rule sets and/or other specifications controlling and/or determining the operations of that publisher. This may, include constraints on what types, quality, subject associated, purpose associated and/or other variables of incoming expressions that publisher may accept for Publication.

In some embodiments, if the identity of the asserter is weak (that is hard to validate or resolves to a general email address, such as for example person@gmail.com), then publisher may refuse to publish such assertion and/or add assertion associated information regarding assertion. Publisher may for example, require that asserter has sufficient identity to support a valid audit trail over time.

In some embodiments, publishers may have a form of Repute, which are broad generalizations, based for example on the aggregate of opinions/assertions regarding their products, activities and/or other information pertaining to them. Some examples of this might be, Ford is generally known for good cars, Apple is generally known for quality technology products that include innovation and excellent design, Springer is generally known for quality technical books. Such generalizations may be produced, by one or more algorithmic techniques and be expressed as an aggregated assertion regarding publisher.

Publishers may also have associated purposes, which they may then include in Creds published by them. These purposes may be stated, inferred and/or calculated.

In some embodiments, Repute expressions may be integrated with one or more PERCos Reality Integrity processes, to support and/or enhance those operations. Reality Integrity, in some embodiments, involves the assertion of the degree to which an event (real time and/or past), user/Stakeholder, resource (including specifications, content) and/or any other subject is at it claims to be (asserts).

Repute expressions may comprise one or more assertions and/or other elements, that in whole or in part, form one or more Reality Integrity "Fingerprints" and/or "Patterns". For example these Fingerprints/Patterns may incorporate multiple real time and/or non-real time events and/or elements to create a signature matrix establishing an asserted degree of Reality Integrity.

In many circumstances as the ability to manipulate video, images, audio, text, and the like and other existing content and/or materials increases, the ability to differentiate that which is authentic, may involve Repute expressions of one or more experts, and potentially parties so authorized, to providing appropriate Repute expressions regarding such material comprising these existing events. For example recordings of major events, the moon landing video, images from major catastrophes and the like may have associated Repute expressions asserting their authenticity.

In some embodiments, such Repute expressions attesting to the authenticity and/or factual nature of recordings of events may be associated, for example in a secure manner, with such recordings. This association may provide for subsequent interactions by other users/Stakeholders with these recordings to have such Repute expressions available, and consequently confirm the "Authentic/factual" status of recordings.

In some embodiments, these Repute expressions supporting, for example, event recordings may be expressed as Effective Facts.

Repute expressions and purpose expressions may have multiple relationships, and such relationships may be created by one or more users (including groups thereof) and/or other processes, such as Coherence Services. In this embodiment, such multiple relationships may be expressed in the form of a "space" based on, for example, the subject of the Repute expression and including multiple expressions, with differing elements, such as identity of the creator of Repute expression, purpose association, metrics, resource relationships and/or other information.

In further embodiments, such "spaces" may be arranged around a purpose (or set thereof), such that, the range of subjects and their purpose Relationships is enumerated. Further examples of such relationships include, purpose(s) for which expression was created, purpose(s) for which purpose was evaluated, purpose(s) which users/Stakeholders may associate with Repute expression. Purpose relationships may include Common purpose relationships and/or specific purpose and/or Repute domains of use.

Repute expressions, in some embodiments, may include one or more purpose expressions associated with Repute expression elements, including subject, asserter, publisher and the like. These associations may include purpose(s) for which the Repute expression was created, purpose(s) associated with the subject of Repute expression, purpose(s) of user/Stakeholder as creator and/or utilizer of Repute expression and/or other associated purposes.

In some embodiments, Repute expressions may be one of the main mechanisms for filtering potential and/or returned purpose result sets, by for example, constraining those sets by the type and/or quality of the Repute expression. For example, a user may have set their preferences and/or other interactions to restrict results sets to only those resources with positive Repute expressions asserted by professors at the world's top 50 universities.

Repute expressions and purpose expressions may have multiple relationships, and such relationships may be created by one or more users (including groups thereof) and/or other processes, such as Coherence Services. In this embodiment, such multiple relationships may be expressed in the form of a "space" based on, for example, the subject of the Repute expression and including multiple expressions, with differing elements, such as identity of asserter, purpose association, metrics, resource relationships and/or other information. In further embodiments, such "spaces" may be arranged around a purpose (or set thereof), such that, for example, the range of subjects and their purpose Relationships is enumerated. Further embodiments of such relationships include, purpose(s) for which expression was created, purpose(s) for which purpose was evaluated, purpose(s) which users/Stakeholders may associate with Repute expression. Purpose relationships may include common purpose relationships and/or specific purpose and/or Repute domains of use.

Repute expressions may offer differing perspectives to differing users/Stakeholders. For example, if a user/Stakeholder has some specific expressed expertise, such as he is an expert, then the Repute expressions may be aligned so as to reflect that expertise. In some embodiments this may include the use of extensible vocabularies for expressions and/or the terms contained within them, for example assertions, subjects and the like.

In some PERCos embodiments there may be multiple Utilities and/or independent Repute services which provide validation, verification, evaluation and/or other independent services associated with Reputes.

In some embodiments, Repute Accreditation Bureaus provide users with accreditation for users in one or more purpose Domains, including across domains.

For example if a user has published, for example, reviews in Amazon, Yelp, Corkscore and/or other review sites, RAB may provide user with a “Review Repute” that encompasses their reviews providing one or more values/attributes for evaluation by other users/Stakeholders.

In some embodiments RAB may be operated as independent entities providing independent evaluations and Repute publication services for one or more users/Stakeholders.

In some embodiments, one or more RAB may act as repositories (and where appropriate associated methods may also be supplied), and/or validators of PERCos resources and associated information sets. For example in some embodiments, PERCos Participants may have associated information sets, such as, specific characteristics such as age, profession, degree, location, employer, employment history, credit history, criminal history, marital status, family status, avocations/hobbies, religious and other material affiliations including, for example, their perceived levels of interest/association/attachment to any of the foregoing which may associated methods that can, for example be tested by PERCos Platform Tests and results Services, and subject to those test results be provided by an accreditation by an appropriate RAB.

RAN accreditations may be evaluated by one or more users/Stakeholders, resources and/or processes. In some embodiments, such evaluations may have use accreditations by RAB as equivalent to effective facts and/or such RAB may, with appropriate validations, issue EFs.

In some embodiments there may be standardization of expressions, such as subjects of assertions, purpose Domains, naming conventions for users/Stakeholders, including experts, expert institutions and the like so as to enable the effective evaluation of metrics associated with these entities.

These standardizations may be undertaken by one or more authorized utilities.

In some embodiments there may be institutions, such as Universities that have acknowledged rankings created by independent third parties (for example arwu.org) and/or in one or more resources. These may, for example be evaluated for equivalence to and/or converted to Repute metrics. This may also include associations of the experts of those institutions. These may also be expressed as Creds on Creds in some embodiments.

In some embodiments, such Repute expressions may be, associated with experts who are associated with the institutions, purpose Domains associated with the institutions, resources published by and/or associated with institution.

Institutions may have rules for Repute and/or publishing processes that are intended to restrict such processes so as to maintain the validity of the expressions. This may include, use of cryptographic and/or other techniques that provide validation for authenticity of expressions/assertions being made by or on behalf of the institution.

In some embodiments, there may be one or more authorized utilities that provide services in support of Effective Facts, such as declarations, certifications, tests and results and the like.

In some embodiments, PERCos may use accreditations from existing established organizations to create appropriate EFs for users/Stakeholders with those certifications. For example if a user, who is a plumber, is “Diamond Certified” then this may be stated as an EF. Such certifications may have associated methods that enable the validation of these EFs (for example this may include the certification processes).

PERCos may assimilate these existing certifications and in some embodiments these may be correlated to PERCos Creds and EFs as appropriate. This may include creation and publication of aggregated certifications, such that a user/Stakeholder may have multiple ratings from multiple sources, which are assimilated by PERCos to provide a Repute set that is associated with that user/Stakeholder, which may include weightings associated with each certifier, which in turn may be based on one or more Repute sets.

In some embodiments, users/stakeholders may express statements (including assertions) that incorporate their beliefs, assumptions, opinions, predicates, axioms, preferences and/or other forms of postulates.

For example postulates, may be expressed as statements with one or more metrics expressing confidence of user/stakeholder making an expression as to his belief in the “truth”/correctness of that expression. Expressed postulates may be used as “lens” through which purpose operations can be constrained.

For example, a mathematician who specializes in group theory may assert his postulate on the provability of a proposition, such as the provability of the Burnside problem: For what values of n are all groups of exponent n locally finite? A weather forecaster may postulate, based on the information available to them at the time, that it is going to rain tomorrow.

Postulates with the very high possible degree of confidence expressed by a large number of users and including the preponderance of experts in the purpose Domain, may be described as “facts.” For example, George Washington was the first president of the United States.” On the other hand, just because someone claims that such and such is a fact, does not signify that other users/stakeholders would necessarily agree. For example, suppose wine critic Robert Parker claims that a cabernet from winery X is superb does not signify that user U agrees with him. Moreover, Robert Parker’s postulate, and in this example associated metrics may change someday if confronted by new evidence.

In some embodiments, the strength of postulates can be a numeric value, $0 \leq b \leq 1$, an interval, [n, m] where n is the lower bound and m is the higher bound, or an enumerated type, such as, {<Yes, definitely, it’s a fact>, <It’s quite likely to be so,>, <It’s possible>, <It’s doubtful>, <I do not know>, and the like}. In this example, there are two factors to consider. One is the degree of belief in the subject, which is the provability of the Burnside problem. The other factor is the degree of expertise in the subject. Experts may have high degree of expertise in the subject area. In particular, mathematicians have been chipping away at this problem to show negative solutions for sufficiently large odd exponents, sufficiently large even exponents divisible by a large power of 2, for hyperbolic groups that have sufficiently large exponents and the like. By contrast, when the exponent is small and different from 2, 3, 4 and 6, very little is known. In other words, mathematics specializing in the problem have opined that groups of exponent n have a remote chance of being locally finite, especially for n=5, n=8, n=9, and n=12.

A credible explanation for a postulate helps to make the postulate itself more credible, such as, suppose that the police have a piece of evidence that implies that a person is guilty of a crime. However, offering an alibi provides a credible alternative explanation for the piece of evidence, such as some other person had planted the evidence.

Experts can also limit their assertions to relatively small, circumscribed sets of postulates—i.e., such as, locally coherent set of postulates. For example, educators can make locally coherent assertions about the effectiveness of their respective education policies for their local region. However, when they start to generalize their policies, they may lose credibility. This may be that although educators may be experts, their expertise may be limited to certain context, such as local region or certain time periods.

The opinion of experts, in for example a purpose Domain, when it is unanimous (or overwhelmingly similar), may likely be accepted by non-experts as more likely to be right than the opposite opinion. For example, consider global warming. The Intergovernmental Panel on Climate Change (IPCC), the leading international body for the assessment of climate change has issued possible consequences of and the explanations for its belief. In rendering their opinion about global warming, IPCC reported their analysis of its consequences, such as "increases in global average air and ocean temperature, widespread melting of snow and ice, and rising global average sea level."

10 Creds an Example Repute System Embodiment

Repute expressions assertions may in some embodiments, be implemented as a system, whereby Repute expressions are formalized, using for example defined terms, and undergo such processes as creation, publication, evaluation and use. Repute expression creation, publication, evaluation, use and/or other processing may be governed by Rules. Repute expressions may, in some embodiments, be PERCos resources and consequently share the characteristics of such resources.

In common with other PERCos embodiments, Repute expressions are initially formed as specifications, including for example through the use of templates designed for such expressions. These specifications then undergo one or more processes and iterations, including user/Stakeholder interactions, so that they are formed to the degree which may be required by the specifics of the implementation and/or the intentions/requirements of their creator, which in general would be the user/Stakeholder who is the creator.

These specifications may then undergo publishing processes to create the interoperable Repute expressions that may be used by one or more other users, subject to any associated rules. Repute expressions may then be evaluated for and associated with purpose operations of one or more user constituencies.

Other PERCos Platform services and/or processes, including Test and Result service, History Services, PIMS, Coherence Services and/or any other PERCos Platform Services may operate on and/or with Repute expressions during purpose operations.

An example of such an architecture is described below herein using PERCos Creds systems. PERCos Creds Systems is an implementation of Repute expressions intended to provide one or more PERCos user/Stakeholders with the benefits and functionality of Repute expressions in one to boundless pursuit of purpose.

PERCos Creds systems are embodiments of Repute expressions that include the principles of such expressions, and extend those principles into embodiments designed to interoperate with PERCos systems and resources. Creds Systems provide a powerful, flexible and extensible system of Repute expressions embodiment, which is described herein. They are designed to be extensible to enable embodiment of each of the Repute expression elements, metrics, types, functionality and/or other characteristics of Repute expressions.

In some embodiments, Creds systems may include the following:

1. one or more languages for standardized expression of Creds and/or Cred assertions
2. one or more constrained standardized lexicons and/or vocabularies for expressing Creds and their component elements
3. a suite of tools for manipulating Creds, including tools for performing operations such as without limitation, creating, organizing, discovering, publishing, evaluating, validating, testing and the like.
4. one or more metrics for evaluating, comparing, prioritizing and the like Creds.
5. one or more tools and/or mechanisms, such as, Reality Integrity, cryptographic methods and the like for associating and/or validating Creds to ensure their integrity and the like.

In some embodiments, there may be one or more Cred expression languages intended to provide methods for expressions of Creds and elements thereof, which may include, for example, Cred assertion languages, Cred query/evaluation languages and/or other languages associated with Creds.

In some embodiments, Creds assertions languages, may for example be declarative in nature, for example using such techniques as S-expressions. These languages may include one or more sets of standardized terms sets that for example enable interoperable use of Creds in multiple purpose domains. For example there may be Cred terms sets that are specific to a domain, such as for example those of used in finance (value, return on investment, option, derivative, Exchange Fund and the like), which may be standardized for use in assertions and/or subjects within a Cred.

Languages associated with Creds may have, to some degree, interoperability and/or equivalence with one or more purpose languages. For example Creds may use purpose language expression terms for Cred purpose associations.

Creds may be nested or otherwise organizationally incorporated into one or more "master" Cred.

Creds may be comprised of one or more standardized programmatic language structures, which in some example embodiments, may be based on existing programmatic languages, for example Java, Ruby and the like and/or may comprise one or more specialized Cred languages.

In some embodiments, Cred languages may include for example such features as:

One or more standardized and/or interpretable vocabularies and lexicons for one or more Cred elements One or more Cred elements/parameters/terms may be associated with one or more Rules sets and/or governance processes.

One or more metric expressions may be associated with any one or more Cred elements and/or arrangements thereof One or more elements comprising a Cred may have associated test specifications and test results sets, which may include Reality Testing.

One or more Cred element may include purpose parameterizations, which in some embodiments may include weightings, values and/or other expressions of the relativity of elements to one or more purpose.

Rules and/or specifications for usage and downstream processing of Cred and/or elements thereof. This may include for example, instructions for downstream processing, including for example, auditing.

Structured arrangements for Creds on Creds. For example expression of the relationship of Cred to one or more Cred on Creds, where for example Cred is subject of one or more Creds on Creds.

One or more publishers and/or Cred issuers may, for example, incorporate the ability for one or more Creds to be updated in the field, by one or more users/Stakeholders, using for example distributed, server based and/or referential systems.

Inclusion of one or more time bases, including for example ones of publisher, creator, evaluator and the like.

May include contextual conditional instructions based on for example, purpose, user/Stakeholder, subject domain, events/conditions and/or any other event and/or algorithmically created threshold. For example in circumstances "A" use specifications/instruction set "A1" and in circumstances "B" use specifications/instruction set "B1". A further example may in some embodiments include conditions such as when a user, with for example user Variable Master Dimension Facet [sophistication:novice], evaluates and/or uses Cred, then such user may be supplied with assertion expressions intended for that sophistication level. However, for example if user has declared a user Variable Master Dimension Facet [sophistication:expert] then user may be supplied with assertion expressions intended for their level of sophistication. In this example, Creds may be multi-tiered and multi-focused depending upon user purpose. In some embodiments, the conditional specifications for the Cred may include invocation of one or more supporting Platform service so as to provide the appropriate assertions to the appropriate user.

In some embodiments, programmatic language structures may include purpose association expressions, including for examples metrics and/or rules, Creds, Creds on Creds and/or purpose, subject, creator, publisher and/or other standardized formatting, expressions and/or interoperability methods.

Creds may include and/or be arranged to carry and/or reference Cred on Cred information.

Creds and/or elements thereof may have related specifications for standardized testing and/or evaluation processes, including repositories of test results against which evaluation and testing outcomes may be compared.

Creds can be associated with and/or processed in common with one or more purpose expressions and elements thereof.

In some embodiments, Creds may be arranged so as to be employed in response to purpose expressions. For example, Creds may be bound or otherwise linked to purpose expressions, specifications, parties, content and/or categories Cred may only be visible or able to be used/accessed if specific purpose elements and/or statements are utilized In some embodiments, Creds may be arranged to be interpreted by, for example, flow meters and/or processed by flow management.

Creds may carry their own rules, governance, commercial and/or promotional information and/or may, for example, participate in network and/or transaction based commercial arrangements.

Cred and/or Cred on Cred compositions and/or arrangements may form multiple Cred sources into one or more composite reviews with associated edited assertion expressions.

Creds may be composed and/or arranged, by for example, to produce aggregate Creds.

Cred related arrangements may automatically actively assert Cred related information based upon pre-set calculated and/or dynamically occurring state and/or event information triggers.

Creds can be arranged so as to support flexible governance and trust, and to inherit and/or evolve governance and trust in relationship with aggregate Creds, Cred on Cred operations, and for example, Foundations, Frameworks and/or other PERCos Constructs.

In some embodiments, Participants may create and manage one or more information sets that include both Creds and EFs. This self-registering of information regarding a Participant may be in the form of, for example, standardized EFs and Cred EF like self-assertions that weren't tested or aren't easily testable in a manner (for example through PERCos Tests and Results services) as may be required by, for example a trust authority and therefore are self-Creds (not about apparent facts, but expressions of opinion regarding oneself) and which may, in some embodiments, be called self-Reputes (since for example they may have EF and Cred elements). Such testing may be undertaken if appropriate methods are available and/or provided by Participant. Trust authorities and and/or other organizations and/or utilities may then, for example using PERCos Evaluation services, evaluate these self-declared Creds and Reputes.

A further type of Self-Creds, are in some embodiments, Involved Creds. These Creds are asserted by a party that has a direct declared value chain interest in a resource, that is a creator, publisher, provider and/or other Stakeholder. This is not a Cred about self, but about something the Participant has a direct declared interest in. This is not an arms-length circumstance and the Stakeholders direct value chain self-interest results in a Cred that is about something the Participant has a degree of direct responsibility for such resource's availability.

There is also a further form of Cred that may be published by a party who acknowledges (through for example declaration, persisted information, computational methods and the like—where such acknowledgement is able to be verified), and/or clearly has, a conflict of interest related to the assertion subject matter, which we may categorize as a Conflicted Cred. Clearly, third parties or a subject Participant may declare some other parties Cred to be a Conflicted Cred if the Cred does not so label itself (through action of its publisher, creator, and/or provider).

Any Cred object, such as a Self Cred, can contain and/or reference any type and/or configuration of Cred set, from regular unconnected Creds to Self Creds in any complexity of organization of such Creds, for example in some embodiments, in the form of class arrangements and/or other ontology arrangements. Such Creds and EFs may be, for example, included in, and/or associated with, such any Cred instance, and such supplementing Cred information can be provided for convenience, portability, element information consolidation, ontological input, and/or other information management considerations and such information may be directly included, and/or otherwise directly referenced. In some embodiments unconnected Creds may be numerically the most common form of Cred since they may arguably be the most generally objective.

Creds on resources, including Creds on Creds, may focus on a Participant set as their Cred subjects in context of a resource, where Participants role was, for example, creator, publisher, Provider and/or the like of other one or more resources and where the Cred assess the Participant functioning in any such role. Cred information may be organized in some embodiments where, for example, unconnected Creds comment on a Participant's Quality to purpose as a resource publisher, creator, provider, and/or the like, where such assertion is making a comment as relates to generally and/or a specific set, of resource instances. Similarly, such Creds may comment (make an assertion set) about any resource set as a contributing resource (providing a constructive component for, rather itself than being, a larger resource set). A resource instance, such as a Cred or Participant set, may also include or otherwise directly reference an associated class arrangement or other ontology set information. Such information may describe, and/or otherwise inform regarding, CPEs and/or purpose classes associated with such resource instance, where PERCos supports the ability to look up, manipulate the view into, and/or otherwise evaluate the relationship of such resource, for instance a Cred or Participant or CPE, from an ontological, approximation, and/or simplification perspective, including assisting from a purpose standpoint evaluation of such resource as it relates to Domain category sets, CPE sets, purpose class sets, and/or particular associations with other resources.

In some embodiments Cred languages may include Cred assertion expression languages, associated frameworks and/or lexicons/vocabularies.

For example in some embodiments, there may be Cred assertion language specification frameworks, which may include for example, common standardized/interoperable assertion expressions. For example, such standardized assertion expressions may provide appropriate simplifications, which may be purpose domain specific. For example this may be extensible, through for example the Cred language extensions outlined herein, evaluated by one or more processes and in some embodiments, may for example be contextually specified, such as for identity, Cred metrics and associated values, syntax, semantics, and/or evaluation processing.

Cred assertion languages may provide sets of assertions, such as Repute metrics (e.g. Quality to purpose), Domain specific (e.g. fine/very good/good/minor blemish/average/major blemish/used/damaged—and or other organized terms which may be associated with numerical scalars (such as 1 to 100)—for example for philately) and/or other standardized purpose, user/Stakeholder, resource and/or information sets specific assertion sets.

In some embodiments, assertion expressions languages may include the following features:

- Reliability in differing contexts and/or evaluation processing, through for example utilization of open "global" assertion authority providing utility services to one or more PERCos systems. In some embodiments, the degree of reliability is determined, at least in part, by the Repute of the publisher and/or creator and the circumstances (including for example time) of the assertion creation.
- Interoperability in one or more independent evaluation circumstances through use of standardized assertion expressions that may be evaluated consistently across multiple independent evaluation services.
- Provenance, where for example Cred publisher may provide sufficient audit capability such that the assertion and creator "roots" may be found and evaluated to give a more complete context of assertion.

Assertions may have multiple expressed relationships with subjects, for example, differing assertions may be applied to one or more segments/portions of a subject and/or there may be an overall assertion regarding the subject and individual assertions regarding the subject segments/sections as expressed by the creator.

In some embodiments, information pertaining to the source of the assertion may be associated with Cred. Such information may be used, for example, in evaluation of Cred to establish veracity of assertion, for example where an event is unfolding and news services are attempting to ascertain which Creds assertions are truthful and/or mirror that news sources perspective.

In some embodiments, there may be classifications schema's for assertion sources, and an example of such a schema is outlined herein.

An independent source of an assertion is an asserter that is capable of being identified and/or validated independently of the subject and/or unfolding events. For example, a third party with no association with the events unfolding, for example a witness to a car accident who has no relationship to occupants of either car. In some embodiments there may be expressions of the degree to which the source is independent of the subject and/or unfolding events In many instances the source of an assertion may come from a source that to some degree has (or is) a participant in, and or related to, the subject and/or unfolding events.

For example an assertion may come from a source that known to have a specific bias in relation to subject, assertion and/or creator.

For example in the case of unfolding events, a user may make a recording of the events, which then become the subject of a Cred authored by them. They may assert, for example that the recording is of at an event at a specific time, and may further assert that it is a "true and accurate" record of the event. Such assertions may be further tested and/or validated by Reality Integrity processes, to establish that creator was a Participant, for example, in an unfolding event.

In some embodiments, Reality Integrity sources are those that have, to some degree, Reality Integrity processes associated with creator, assertion, subject, publisher and/or other Cred elements, in whole or in part.

In some embodiments, there may be processes for establishing Creds at and/or during unfolding events and/or experiences. For example, when combined with Reality Integrity processes, these Creds may include assertions and/or subjects that are deemed to be factual, where the unfolding events, recordings, contemporaneous accounts and/or any other associated events are identified as accurate and "real".

In some embodiments, these Creds may be subject to one or more security and tamper resistance processing, with associated validation, auditing, storage and/or management.

In some PERCos embodiments, utilization of PERCos resources, such as Frameworks by one or more users, for example to make, for example, political statements, lectures, presentations may enable other PERCos users to have increased certainty as to the provenance of these expressions, based on the associated Creds, which may include those generated by PERCos resources.

Assertions may be based upon and/or include, in whole or in part, standardized and interoperable categorization and/or classification schemas for one or more assertion term sets. These standardized and interoperable schemas may be one or more purpose specific, associated with one or more purpose classes and/or PERCos system compliant. For example in some Cred assertion languages, for example opinion assertion languages, there may be schemas that include expressions that allow Repute expressions to have enumerated values. For example, some Repute expressions may assume values from a value space comprising, for example, {extra small, small, medium, large, extra-large}, or {Yes, No, Undecided, do not care}, or {do not know, do not care, do not understand} and the like.

In some embodiments, Creds can be defined using one or more extensible Cred language(s), which for example may comprise standardized, mandatory and optional Cred elements. For example, there may be Cred language extensions which are contextual, such as purpose domain and/or class, user/Stakeholder and groups thereof, expertise domain and/or other specialized domains.

In some embodiments, such language extensions may be subject to one or more rules for access, deployment and/or use. These extensions may be made available, through for example PERCos Publishing Services and/or through one or more information repositories.

In some embodiments, published Creds may include references to appropriate Cred language extensions that may be required to effectively evaluate Creds. For example, these extensions may also be associated with purpose classes and/or other PERCos resource arrangements, such as Frameworks, such that Creds associated with these domains may use these Cred language extensions to express more specific and detailed nuance within that domain. In some example embodiments, such extensions may be associated with one or more user/Stakeholder groups and/or organizations, such as a Steam Train Enthusiast user affinity group and/or a corporation that specializes in the sale and manufacture of wooden blinds.

In some embodiments, Cred specifications, when formalized through for example a PERCos Cred format, become Cred statements. Generally Cred specifications/statements may be passed to an appropriate Cred Publishing service for Publication, and may, for example, be retained by user/Stakeholder. In some embodiments, these Cred specifications can be constructed in accordance with Cred templates, which may for example be created by one or more publisher (and/or other user/Stakeholder), such that employing Cred templates provides for and/or requires insertion of Cred assertions, subjects, metrics, values and/or other related metadata by creator and/or packager to meet requirements of publisher.

In some example embodiments, Creds specifications arrangements may include:

- Linear assertions
- Chained assertions (A→B→C)
- Grouped assertions (A→C, B→C)
- Hierarchies and web structures
- Conditional, combinational, differentiated and/or integrated
- Cred organization and operation may at least in part be contingent and/or results from one or more external events In some embodiments, Creds may determine how information and/or resources are routed and/or switched in one or more PERCos systems embodiments in response to one or more specifications. For example certain resources may also accept information having specific Creds and/or may include specified thresholds based, in whole or in part, on one or more Creds.

For example in some embodiments there may be specified relationships between Creds and certain resources associated with switching, routing and/or auditing processes that may, for example, determine where Cred and/or information comprising one or more Creds is distributed.

This may include for example

- Determining by specifications (for example control specifications) which Creds are deployed to what other resources and/or processes
- Determining through evaluation of Creds what resources and/or information sets are made available to other resources and/or processes
- Determining through one or more methods evaluating sets of Creds, and including histories associated with such Creds, what resources and/or information sets are deployed and/or made available to other resources and/or processes.

All the foregoing may include supplying one or more specification sets to one or more resources employed for these tasks, and may include for example specific routing, switching and/or other deployment and distribution specifications. This may include determining appropriate and/or optimum specifications based, at least in part, one or more purpose expressions. In some embodiments, PERCos Platform services may include purpose and/or Cred routing services for these functions.

Creds may be created by a user/Stakeholder in reaction to an experience, such that one or more Creds carry their value expressions, by for example voting and/or ranking, comparing, commenting, asserting, valuing (as, for example, in expressing financial or other value), qualifying (as to the factualness), perspective (fair/biased) and/or other metadata associated with experience.

In some embodiments, Creds, such as those indicated above, may be evaluated by, for example, PERCos Cred Evaluation Service (CES) with results of evaluation consequently displayed, visualized, analyzed or in other manners processed. In this example, CES may then provide feedbacks such as Cred evaluation results to originating users/Stakeholders and/or other appropriate parties, relating to experience and including evaluations and/or assessments. In one example, such Cred evaluations may be linked to segments of experience, directly and/or indirectly as may be required and/or determined for any granularity or analysis. For example Creds may be associated with each song in a multi song concert, with each scene in a movie/TV show and/or other performance.

In some embodiments, these Creds may be created at the time of the experience and/or any time thereafter, and may then, for example, be processed so as to form aggregate Creds representing the totality of the experience.

Creds and/or aggregate Creds may trigger operational changes or may present parties with operational choices within an unfolding experience, such as, segmenting users/Stakeholders into multiple groupings/arrangements with optional differing input(s).

In some embodiments, Creds may express, in real time, an assertion as to the value expression of an experience to one or more users/Stakeholders, which for example may include user/Stakeholders participation in that unfolding experience.

For example, user/Stakeholder may elect to have their expressions in an unfolding experience, such as that involving an operating Framework, presented as Creds to other users/Stakeholders involved in the same experience, such as, through monitoring of their behavior and/or biometric recognition and/or through user/Stakeholder interaction(s).

In some embodiments, such assertions in the form of Creds, may be based, in whole or in part on a repository/library of pre stored assertions/comments and/or values where one or more comments are selected and dispatched as Creds. For example such Creds may at least in part, be based on biometric factors.

The Figures herein illustrate a process by which users may create the Cred expressions that assert their purpose experience. Users may use Cred templates, including transforming results provided by Cred services that may for example, aggregate Creds, retrieve Cred information and the like.

Illustrative Example of Cred Embodiment FIG. 81: Illustrative Example of Cred Creation Process In this example, a Plug-in may include Master Dimension Facets, including Creds, some set of capabilities that might be evidenced in a purpose class applications. It may also provide a selection of verbs and categories. For example, a Plug-in may provide purpose expressions information, for example Core Purpose for document CPE descriptive for, for Word document, and the like. Such Plug-ins may use phrase selection for seed as category, calls and other purpose capabilities and may provide one or more verbs.

Illustrative Example of Dynamic Creds in FIG. 82: Illustrative Example of Dynamic Cred Creation Process In some embodiments, user dynamic Creds may be modified/directed/edited/deleted according to direct user/Stakeholder intervention, user Rules and/or by other processes authorized to do so. For example, user may specify and instruct appropriate process to create user dynamic Cred as an expression of satisfaction/dissatisfaction, such as by creating a representation indicating thumbs up/down, a frown/smile and/or a hand movement to the left or right. In some embodiments, user dynamic Creds may be quantized, structured, morphed, presented as avatars and/or have any other visual, audio and/or other effect(s) applied to or employed to for example, optimize communication(s).

In some embodiments, user dynamic Creds may be used to select from other dynamic Cred value expression libraries one or more dynamic Creds to be distributed to one or more dynamic Cred Evaluation Services and/or user repositories. For example Cred may trigger processes that retrieve related (time, purpose, score or value related and the like) expressions for delivery to and/or use in a Cred influenced process or session.

User dynamic Creds may use one or more pre-processing systems to infer and/or extract Creds from user/Stakeholder input, such as by using biometrics (for example voice stress analysis, breathing, heart rate, blinking, upper mouth muscle tension, pupil dilation and the like).

In some embodiments, there may be Cred related processes for translation between comparable differing Cred expressions, techniques, patterns and/or specific implementations, for example "thumbs up" may be translated to "smile".

Streaming Creds are those that are associated with real time activities and/or events, where for example Creds may be integrated with and/or a part of the packet structure of an information/content stream.

In some embodiments these Creds may provide stream users with information regarding the source, distribution, path and/or representation of the stream. For example this may include Creds provided by resources involved with the provision of the stream(s) and/or Creds associated with the creators/publishers of stream(s).

In some embodiments, streaming Creds may be issued by one or more Cred publishers, which may include one or more resources (including for example devices) that are used in the generation and/or distribution of streams.

In some embodiments, there may be for example, multi-party streams, where each party may provide Creds to stream in some arrangement, the aggregate of which may provide users of these streams with appropriate Cred information. In some cases those generating Creds may be the recipients of Creds generated by others.

For example in a multi-location multi party streamed sessions, for example a teleconference, concert, web seminar and the like, Creds may be generated by and received by parties involved in the sessions. In some embodiments these Creds may form part of the dynamic fabric of the session, with appropriate monitoring, evaluation and/or other PERCos services interacting with them. This may be used, to ensure that each participant is physically present at, for example, a remote location and actively involved, through for example use of PERCos Reality Integrity services that monitor interactions of that session.

In some PERCos embodiments, Creds systems may form an integral part of a PERCos Reality Integrity system. This may involve, dynamic Creds, streaming Creds and Creds issued by one or more creators and associated publishers involved in some real time activities. This may involve for example, Creds for all the materials involved in, for example an event that is occurring in "real time" for at least one user/Stakeholder, such as the users/Participants (and for example their representations across the computational side of the Edge), any visual, audio and/or textual materials that are evident within and/or referenced by the event and/or any other resources, processes and/or object that may constitute an event. In this example, dynamic Creds may be issued for any assertions made by one or more users/Stakeholders as the event unfolds.

In some embodiments, the aggregation of Creds associated with an event may be stored and form part of an audit trail that for example, provides sufficient supporting "evidence" as to the authenticity of the event. For example a recording of an event may involve multiple Creds issued by multiple parties involved and/or associated with event that provides other users/Stakeholders with a means to evaluate that event's authenticity. In some embodiments, this may include the use of composite and/or aggregate Creds to express a summary of the authenticity and veracity of the event.

In some embodiments these Reality Integrity derived assertions may be subject to an Audit process and may further be managed and/or stored as metadata (such by example as databases).

In some embodiments, some or all of Cred operations may be optimized and/or managed by dedicated and/or specialized firmware and/or other hardware arrangements A creator making an assertion on a subject may create a Cred through specification of the Cred which is then processed through Cred Publishing Service.

There may be a number of structured Cred's that are created through processing of other Cred's by appropriate evaluation services, including quantized, Cred, derived, Cred, formulated, which are outlined herein.

Creds are created and published for use by their creators, publisher, and/or other users/Stakeholders in association with their purpose and/or other operations. In some embodiments, the evaluation of Creds may form the basis for the evaluation of the metadata associated directly and/or indirectly with the Creds. This evaluation may also, include further inference as to the qualities of other associations with the Cred, such as resources, users/Stakeholders and/or other associations.

For example a set of Creds, issued by a specific creator and/or publisher, may through evaluation processes, indicate perspective, beliefs and/or other implicit and/or explicit bias in their Creds. In some embodiments, such perspective and/or bias may be reflected in Counterpoint and/or other systems representing disparate opinions, assertions, perspective and/or bias expressed with Creds.

In most embodiments, Cred Evaluation Services, including for example those based upon PERCos Evaluation Services instances, may be position neutral in regard of Creds, however, in this example if the control specifications of the Evaluation Service instance carry a particular bias, then this may be reflected in the evaluation of the Creds processed by the Service instance. In general Cred evaluations may incorporate an audit trail indicating which evaluation service instance undertook the evaluation processing.

In some embodiments, Creds can become a tool for the evaluation of inherent nature of a subject, creator, publisher and/or other Cred and/or elements thereof, including resources, user/Stakeholders and/or other objects and their associated metadata and by inference and/or implication provide mechanisms for evaluating these. In many of these examples, the values associated with such evaluations may be assigned by the users and/or their computational processes, rather than by Creds themselves. These values may then be associated with Creds by users/Stakeholders and/or other processes.

PERCos, in some embodiments, provides an instance of PERCos Evaluation Service, which when supplied with appropriate control, organizational and/or interface specifications that may constitute a Cred Evaluation Service (CES) instance.

For example, Cred Evaluation Service(s) receives, interprets and aggregates Creds and/or chains of Cred aggregations received from users/Stakeholders and/or processes, directly or indirectly, to produce results sets, singularly and/or in combination such that these results sets can be represented as data, visualizations, results and/or other formats and/or control information as may be required.

For example, Cred related data may flow among parties and/or services in accordance with algorithmic control(s) including, threshold and/or other event driven communication among parties related to Cred processes and/or data. In some embodiments, CESs processing and/or communications may be mono directional, bi directional and/or multi directional for input and output.

In some embodiments, for example, CESs may interpret incoming Cred flow and aggregate these incoming Creds to produce further Creds, aggregate Creds, Creds on Creds and/or other results as may be specified and/or user/Stakeholder activated. For example Cred data triggering threshold(s) may cause further Cred aggregation, analysis, filtering, user interaction representation and/or other event-based processes and/or operations.

In some embodiments, CESs may be at least in part controlled by and/or act as a part of one or more purpose operations and/or processing so as to produce results sets consistent with purpose specifications. For example, CESs may be combined for any set of purposes, CESs may at least in part be governed and/or managed by Coherence and/or other managers, CESs may be distributed across multiple operational contexts for efficiency and/or optimization In some embodiments, Cred evaluation is contextual and often purpose derived.

Cred evaluation processes may include such varying aspects as, visibility to user/stakeholder of such evaluation processes, for example, evaluation processes may be, opaque (for example a FICO score), transparent (for example a user/Stakeholder can see how evaluation is undertaken) and/or audited (for example a user/Stakeholder can see how evaluation was done with associated tracing/tracking/tests/test results being made available)

In some embodiments, there may be trust aspects in Cred evaluation processing. For example, Creds may be evaluated in trusted, partially trusted or untrusted context(s), with for example, multiple levels of trust employed in evaluation and results sets, such as, none/partial and/or complex. In some embodiments, results sets may provide trust mechanisms, such as signed result with published dictionary, certified, credentialed, certificates and the like. This may be utilized, for example, where the Creds are to be used in a trusted manner by other users/Stakeholder and/or processes, such that a trusted chain of handling and control is maintained.

Trust may also, be utilized in evaluation processing, such as that the specifications for evaluation have been executed in a trusted manner. This may require such evaluation as aspects as, visibility, audit, test results and/or standardized tests.

In some embodiments, Cred evaluation specifications and methods are extensible and/or publishable, in whole or in part. Published Cred evaluation services specifications, results sets, evaluation methods, Cred expressions from such processes (such as Creds on Creds), vocabularies, lexicons and/or dictionaries of Cred expressions and/or elements thereof (such as assertion expressions) may be used by one or more user/stakeholders and or associated with other PERCos resources, including for example purpose classes.

In some embodiments, Cred Evaluation Services processing may utilize a wide range of specifications and methods to undertake such processing. For example such processing may include:

Evaluation with an operating session, which may include, such PERCos structures as Frameworks and/or Foundations, where differing evaluation processing may be undertaken in a segmented manner, for example within a Framework, and/or in a combinational manner, for example initially within a Component Framework and then within a Framework that includes such Component Framework and/or in an aggregate manner, such as within a Framework (as superior controller in a specific example). In such embodiments, the methods employed by evaluation processing may be defined by each structure (for example Frameworks, Foundations and the like) and generally may be associated with, and in many examples highly aligned with purpose operations.

In some embodiments, such evaluation processing may be based on Cred Evaluation templates, comprising specifications that may be used as control specifications for Cred Evaluation Services instances. In many embodiments, these templates may be associated with purpose classes and/or user/Stakeholder interactions (including repositories of user/Stakeholder) to aid in purpose operations and/or increase effectiveness and efficiency of such operations.

In some embodiments, Cred Evaluation Services processing using, for example, Cred templates and/or standardized Cred methods may produce differing results based on purpose selections, user/Stakeholder preferences and/or other contextual factors.

Cred evaluation Services processing may utilize methods by reference and/or embedding, for example such methods may be invoked from, for example, cloud services to support Cred evaluation processing, as for example when user/stakeholder is operating with a constrained resource set, such as a cell phone.

For example Rules and/or methods for processing Creds may include resolving Cred to the source "home"/issuing context and/or to an authoritative resource/service, which may make representations about Cred and/or provide additional information regarding Cred.

In some embodiments differences in multiple Cred language embodiments, may be resolved through further evaluation and/or auditing of methods employed to generate assertion expressions, such as to, resolve assertion expressions to that of a common understanding, which may involve using specific and/or specialized vocabularies, thesaurus, dictionaries and/or other methods used by creator, including experts, in Cred formulation.

In some embodiments, Cred Evaluation Services control specifications may be formalized as Cred Evaluation expressions, which comprise specifications for evaluation of one or more types of Creds, Creds related to specific purposes, Creds from one or more publishers, creators and/or other users/Stakeholders (including resources and processes associated with and/or controlled by them). For example such expressions may instruct the Cred Evaluation Service to evaluate the Cred and/or the structure of the Cred.

In some embodiments, results sets from Cred evaluation Services processing may be used within the originating context, as transient results in an unfolding experience session, may be made persistent, through for example PERCos Persistence Services, be able to be audited and/or published through appropriate publishing services.

For example in some embodiments, such processing may produce an evaluation result (which may include for example selection by user across Edge), which is then associated with Cred(s) undergoing evaluation, the service instance and specifications thereof and potentially any other identified resources associated with these operations. These results may then be able to be audited and/or undergo verification, validation and/or other processing.

In some embodiments, Creds and their assertions may be quantized so as to provide efficient and effective "shorthand" as to the potential value of the Cred in the operations being undertaken. For example such quantization, may include information flow through Cred issuance based on such factors that may include, business logic, informational metrics (such, N Gb, Y documents, X transactions), time and/or other variables.

In one example embodiment, Creds may be evaluated to create an associated quantized Cred based on, at least in part an equivalence matching algorithm, where for example "Good" as used in the assertion, may equate to three stars, and "Excellent" may equate to 5 stars.

In some embodiments, such quantized information may assist in Reality Integrity processing and services.

Cred feedback enables one or more users/Stakeholders to provide feedback for circumstances where choice and/or substance is insufficient to meet the applicable criteria for Creds on Creds within a given implementation.

In some embodiments, Creds may incorporate and/or reference Cred feedback both actively at the time of Cred Evaluation and/or use and/or after such Cred operations. Cred feedback may be provided in any form, though in some embodiments, feedback may be limited to metadata about a Cred and potentially the utility and/or experience associated with Cred Evaluation and/or use in a specific scenario, for example during purpose operations, such that the totality of such feedback does not include sufficient information to create a Cred on Cred.

For example a Cred may be presented to one or more users involved in a purposeful experience, such as attending a concert, where, for example the Cred may assert the "quality of one of the performers", and the Cred feedback may be expressed by multiple other users as "thumbs up" denoting their agreement with that Cred. In a further example these Cred feedback expressions may be grouped together by a publisher to form an aggregate Cred, which in this example would constitute a Cred on Cred representing the collective feedback expressions.

In some embodiments, such Cred feedback mechanisms may provide lightweight real time mechanisms to express assertions/opinions on Creds without the formalisms of Cred on Creds being applied at the time. These feedback elements may be active in that the Cred feedback is being continuously generated as part of a process/session, for example as part of a quality checking method (e.g. connection is good and the like), and such feedback, may in some embodiments, include control elements and/or constitute one or more points in computational operational process.

In some embodiments, Creds and the elements thereof, may be tested, in part or in whole by one or more processes in single and/or multi-point testing procedures in one or more time periods. In some embodiments, a number of these tests may be part of the Publishing Service instance control specifications and may represent the degree to which a publisher validates the Creds and associated elements. Such testing may involve PERCos Test and Results services and/or other PERCos and non PERCos resources in any arrangement.

Generally Cred testing may be performed, prior to, at the point of, and/or after Publication of Cred. In some embodiments, testing may form part of one more Evaluation processes, including for example as control specifications provided to one or more Evaluation Services. In further example embodiments, processes such as Coherence Services may also undertake Testing independent of any Cred processing and/or lifecycle operations such as Publication and/or Evaluation. For example Coherence Services may undertake testing and potentially additional Evaluation of Cred to determine further specified rigor in evaluations and/or testing, as part of a third-party processing of Creds and/or to determine if any Cred Evaluation Service includes any bias.

In some embodiments, Cred testing may include Cred identity testing which evaluates the identity information expressed within Cred and elements thereof. For example such tests may comprise evaluation through verification and/or validation of identities of Cred elements so as to ascertain and potentially express reliability and veracity of identities.

In some embodiments, this may include having access to sufficient identity information so as to be able to undertake those tests, and may involve one or more methods undertaken in one or more time periods. For example, in some embodiments, Cred Publishing Service may include rules, in the form of control specifications that evaluate Cred element identities, such as, creator ID, subject ID, publisher ID and/or any other pertinent ID comprising and/or referenced by Cred. In some embodiments should such test results not meet the specified thresholds for identity, then a publishing service may opt to refuse to publish Cred from Cred specification provided.

In some embodiments, such testing and/or the results of such testing, may be controlled by Rule sets, and include the use of such technologies tokens/keys/cryptographic ephemera and the like.

In some PERCos embodiments, there may be one or more testing categorizations and/or schemas that are defined by PERCos Platform Cred Services and may be used for interoperability and standardization so as to quantize degree of testing undertaken for efficient and effective handling in one-to-boundless computing. In some embodiments, this may include, for example:

| | |
|---|---|
| Limited | Validation of only identity information |
| Moderate | Limited plus assertion, subject and/or publisher verification and/or validation |

-continued

| |
|---|
| Extended Testing, verification and/or validation of all Cred elements |
| Contextual Testing within specified purpose and/or Repute domains |
| Derivative Testing of associated elements specified by and/or specifying Cred (and/or elements therein) |

There may be further testing criteria and categorization schemas, such as, those that include testing of specified metadata and "identity" (including e.g. biometrics, claimed attributes or characteristics, contextual, specific assertion and/or other Cred element "claims" and the like). In some embodiments the degree of testing may be limited by the availability of methods.

In some embodiments, one or more classification schemas for Creds and/or their elements thereof may be employed. These schemas may then be used in the Creation, Publication, Deployment and/or evaluation of Creds. In some embodiments, Creds and/or Creds on Creds, may also be classified and/or associated with one or more schemas.

For example in some embodiments, Creds may be classified according to the relationship of Cred, through association of purpose expression, with one or more purpose classes. In some embodiments such classifications may be based on, creator, subject, assertion, publisher, evaluation and evaluation results sets, Creds on Creds, Cred feedback and/or any other information pertaining to and/or related to Cred in any combination.

For example in some embodiments, there may be categories employed for subjects, which are expressions of types of assertions and/or categorizations of assertions, subjects and/or the relationships between them.

For example, the following categories of information are inherent expressions of the relationship of the assertion to the subject, as expressed by the creator and potentially by other downstream users/stakeholders and/or processes. This may include categories, Non Fiction and Opinion, where such categories are defined as orthogonal.

In another example, categories that may be applied directly to subjects may include for example, fiction, entertainment, operational/executional/instructions.

In some embodiments, two or more Creds are aggregated into a single aggregated Cred by combining assertions of constituent Creds in a manner determined through, for example, algorithmic computation, user/stakeholder selection and/or chain of Creds. In some example embodiments, aggregated Creds may combine component elements to present a single aggregated Cred value, assertion, metadata and/or other information, which for example may include summarization or Cred and/or elements thereof.

Contributing assertions may, in some example embodiments, be subject to rules and/or governance, for example if publisher of original Cred, from which an assertion may have come has imposed such Rules. For example, these rules may include distribution/usage constraints such a private/semi private/open and the like.

In some embodiments, aggregated Creds may include conditions, such as threshold(s) and/or other rules determining, for example, use, evaluation processing, testing and/or acceptability of one or more contributing assertions that make up that aggregated Cred.

Compound Creds are aggregated Creds that allow decomposition into constituent Creds. For example, consider a book, titled Topics in Algebra, by I.N. Herstein. There may be several reviewers of the book, where some are professors expressing their opinions on its quality as a teaching text book, some are students expressing their opinions on its quality for learning the material, some are mathematicians expressing their opinions of the coverage of the material and the like.

Cred systems may aggregate Creds of different types of reviewers (e.g., professors, students and the like) into either an aggregated Cred or a compound Cred. It may then further aggregate them into a compound Cred so that users, if desired, can drill down to each type of reviewers.

In some embodiments methods and/or other processing, including Rule sets and the processing thereof, may be extracted from Cred, and subject to any prevailing Rules sets, used with other Creds and combinations thereof. For example, expert Rules/methods and/or other Cred element arrangements may be extracted from a Cred, subject to those rules, and be re-applied to other Creds and combinations of Creds in similar purpose operations.

Creds may incorporate and/or be subject to one or more Rule sets. In some embodiments, creator and/or publisher may include, by reference and/or embedding one or more Rule sets governing the deployment, use, evaluation, disassembly, combination, testing and/or other aspects of Cred. In another example, Cred may be subject to rule sets invoked during operations, such as, by Coherence.

In some embodiments, Rules may include:

Combinational

Threshold and/or event initiated

Obligations

Terms of use

Attribution requirements

Visibility

Evaluation or

Consequence (of use and/or access) rules

Creds may undergo a number of processes in their creation, publishing, deployment and use. In some embodiments, these "states of embodiment" of Creds can be described, for example, as the Cred lifecycle.

In some embodiments there may be multiple lifecycles associated with Creds, for example the Creation lifecycle, such as the example outlined above and/or there may be further lifecycles involving evaluation, validation, testing and categorizing of Creds.

For example a testing lifecycle for Creds may involve testing of the Cred specifications, by one or more process, such as Test and Results Service to ascertain the validity of the specifications (for example if Specification includes resource X is asserted to be Y, the existence and availability of resource X may be tested to some degree), and other processes such as Coherence Services, which may suggest that, user assertion "X is quite good" be supplanted by a more standard assertion expression "X is good to level Y".

In further examples, Creds may have lifecycles associated with their Evaluation, which, could be a multi-part process for each of the Cred elements individually and/or in combination, which may be undertaken across multiple time periods, and as such, the Cred may have various associated evaluation "states" encompassing these multi point/multi process evaluation processing.

In some embodiments, Creds may be instantiated from Cred templates, which comprise formatted specifications designed for Cred creation and include methods for composition and decomposition. For example, Cred templates, which in some embodiments may be forms of PERCos templates, comprise format and structure suitable for Cred creation, and potentially for subsequent Cred publishing, through appropriate Cred Publication Service.

In some embodiments, Cred templates may include both mandatory and optional elements, and may include creators, assertions, metrics and associated values, identities, subject, associated purpose expressions, tests and/or results and associated specifications and/or other metadata either by embedding or reference.

In some embodiments, Cred template(s) may include multiple assertions and/or other Cred elements metrics and associated values.

In some embodiments, Cred methods can be used by one or more processes to evaluate, interpret and/or arrange Cred statements so as to, generate another Cred specification or Statement, and/or provide input to further processes.

In some embodiments, templates may include methods enabling the extraction and/or analysis of Cred elements, including, metadata such that one or more users/stakeholders and/or processes may access this information through, for example, event triggers, condition satisfaction, threshholding and/or any other algorithmic methods.

Cred templates, in some embodiments, have types, which may be selected by users/Stakeholders and/or processes to create Creds for one or more purposes. For example Cred template types may include:

- Assembly Cred templates which combine one or more other Cred templates to form an arrangement of Cred templates, which may be specified by further one or more templates, including for example assembly Cred template.
- Expert Cred templates are Cred templates that incorporate specific expertise related assertions, Terms and/or subjects associated with a specific expertise domain, for example Jet Engine Maintenance. These expert Cred templates may be used, to enable an expert in the domain to create expert Cred templates so that the expert and/or any other users can efficiently and effectively create appropriate Creds about subjects and other Creds in that domain.
- Opinion Cred templates are those which incorporate a lexicon of standard opinions, which may be used to form assertions, about subjects. These opinions may include standardized features that enable one or more processes to create standard metrics and values for such Creds enabling interoperable evaluation of such Creds.
- Conditional Cred templates are those which incorporate one or more conditions, in some embodiments selected form a set of standard condition specification elements and/or created by Cred creator.
- Authoritative Cred templates are those that involve one or more recognized user/Stakeholders, such as Government departments, commercial firms, legal officers, where such assertions may include the legal imperative of the creator, publisher and issuing authority.

In some embodiments, Creds are contextually based, such that, each element of Cred (which may include Cred specifications) may have same and/or different context for creation/publishing/evaluation/use. For example user/Stakeholder may determine that Cred may be expressed as valid only within a specific identified context, such as their current purpose operating session, Frame and/or other operating processing.

In some embodiments, Cred specifications and/or templates may be contextually specified, such that, they may include rules as to their utilization and/or evaluation. In some embodiments, the evaluation of Cred may be specified so as to be specific to one or more instance of, for example a PERCos Cred Evaluation Service, with one or more specific control and management specifications controlling such evaluations.

The results of such evaluations, may be, be interpreted within one or more user/Stakeholder defined contexts.

In some embodiments, Creds, as in common with other PERCos resources may be transient, persistent, stored, retrieved and/or managed.

In some embodiments, Cred on Cred persistence relationships may include, that the base Cred is persistent and Cred on Cred may be transient, both base Cred and Cred on Cred may be transient and/or any other persistence and/or management arrangement.

In some embodiments Cred relationships, such as those between Cred and subject (of Cred) may be persisted and/or managed.

In some embodiments, creator, publisher and potentially other users/Stakeholders may wish to express their intentions for the Cred. Such expressions may include multiple metrics, values and/or other parameters and expressions and utilize one or more schemas and/or formalization methods.

Cred Intention may be expressed as a categorization schema, one example of which is outlined herein, and may include:

- Endorsement
  - May be biased(stated or not) but specifically recommended
- Critique
  - Thorough review related to subject matter
- Argument
  - Specifically focusing on single topic or issue and presenting one or more perspectives
- Assessment
  - More general argument and/or critique but with supporting information, for example citations
- Opinion
  - Less rigorous assertion expression
- Critical/Complaint
  - Negative and specific assertion In some PERCos embodiments, Creds may implement Repute Dimensions, expressed in form of a classification schema, such as those providing standardization and interoperability across Cred operations. In some embodiments, these may be described as Cred vectors. For example such Cred vectors may provide a classification schema for the types of Creds and their potential applicability and may include the examples herein.

Cred vectors may include such categorizations as Intent, metric values, Evaluation and/or other applicable schemas. These schemas generally are intended to make the selection, evaluation and use of Creds efficient in the context of one to boundless.

In some embodiments Creds, in common with other PERCos resources may have metrics associated with them, and for example these may include one or more values associated with metrics. For example metric values may be expressed in terms of orientations that include aggregations of these metrics and/or other vectors.

In some embodiments, metrics and their values may be presented in the form of classification schemas, one example of which may include:

Degree of matching to purpose can be expressed, for example, in terms of degree of matching to one or more purposes. These expressions may be in the form of standardized interoperable matching expressions, algorithmic expressions and/or any other value representation.

Importance is the degree of value for one or more purpose indicating the relative value of Cred within a given context. In some embodiments, this can potentially be independent of purpose. In general Importance may be calculated by user/Stakeholder, for example Cred creator, publisher, Evaluator and/or user.

In some embodiments, importance is calculated and expressed in terms of the purpose domains with which it is associated, and may for example, include associations with purpose Classes.

Relevance is an expression of the degree of association and/or utility to one or more purposes and may be expressed by creator, publisher, provider, evaluator and/or user of Cred. In general relevance may comprise, an expression of the degree to which a Cred is associated with one or more purposes, through for example Cred purpose association expressions, PERCos metrics such as quality to purpose and/or the utility of Cred in purpose operations, expressed and/or measured through further metrics, such as degree of importance.

In some embodiments, relevance is calculated and expressed in terms of the purpose domains with which it is associated, and may, include associations with purpose classes.

Reliability is an expression of the degree to which a Cred can and/or has been tested, and potentially involving degree to which testing, ability to test and test results have been and/or are on consistent and/or common agreement. In some embodiments, reliability may include metrics and expressions related to previous Creds with which the Cred of which reliability is being expressed is associated with. For example, if current Cred has antecedents of N other Creds, all of which have been determined to be reliable over time, this may impact the expression of reliability of this Cred (for example by expressing likelihood of this Cred remaining reliable in the future).

In some embodiments, reliability is calculated and expressed in terms of purposes (including Domains, classes, expressions and/or instances) with which it is associated, and may, include one or more associations with one or more purpose classes.

Reach of expression is the degree to which a Cred may be associated with one or more purpose domains, such that for example, the Cred may be of use in such a domain. For example, if the Cred is for Aero Engines, then in the associated purpose domain of Aerospace, the Cred may have some utility and value. In some embodiments, Cred reach may be determined through proxy relationships, such as purpose classes, in determining values.

Quality of expression is an aggregation of metrics, as determined by one or more algorithmic calculations. In some embodiments, Quality may be an aggregation of other metrics, including test results and/or other associated information that gives rise to such an expression.

In some embodiments, quality may be further quantized by one or more processes to establish interoperability and/or standardization, through such methods as equivalence and the like.

In some embodiments, Cred metrics and/or vectors may provide organizing principles for dynamic Cred interaction and/or evaluation. For example one or more categorization schemas may be employed to achieve efficiencies within the context of one to boundless.

For example, one such schema may include:

Group
Commercial
Professional
Family
Entertainment
Reliability
Scope
Relevance
Importance
"Testing metrics"
And/or other metric expressions
Other Schemas and/or
Purpose classes and other class information Cred metrics, in some embodiments, may provide operational frameworks, including specifications, for Cred filtering, use, evaluation, publishing and/or other Cred related operations. Cred metrics may be integrated into or combined with purpose and/or characteristics in any desired arrangement.

In some embodiments, values associated with and/or derived from Cred metrics may be used to, for example, provide recursive dynamic feedback and/or mechanisms associated with Cred operations. For example, this may involve one or more computational and/or algorithmic mechanisms for event, conditional, threshold, evaluations and/or other Cred expressions operations. In some embodiments, such Cred operations may include metric value influenced response(s), outcomes, events and or other algorithmic and/or computational operations.

In some embodiments, Creds may be weighted and/or evaluated at least in part in accordance with specification(s) of Cred attributes, such as, valuation of expert(s) and/or other Stakeholders involved in Cred assertions, Cred publication and the like, including their qualifications (which may comprise further Creds or EFs) and/or other expert group acknowledgement and/or demographic and/or other descriptive attributes.

For example, the Cred of "expert(s)" may be used as analytic "seed" for evaluation and/or framing of dynamic Creds. In some embodiments, group and/or domain commentary may also contribute to Cred evaluation (e.g. weighting(s)).

For example, Reality Testing may be used in conjunction with user/Stakeholder, expert and/or group situational dynamics for Cred evaluations, for example through any Cred attribute(s) being used for evaluation, and/or event triggering of dynamic Cred flows and/or use of Cred(s) specifications including pre-defined sets of Creds.

In some embodiments, Creds may be used throughout Reality Integrity processing, which may include, evaluation of Creds issued, created and/or published as part of Reality Integrity processing, including those of creators, publishers, user/Stakeholders, resources (including sensors and processes), information and/or any other data. For example, evaluation of Creds and/or Cred metadata may be undertaken by Cred evaluation process to create Reality Integrity (RI) index/rating for subject, creator, publisher and/or any other Cred associated information.

In some embodiments, Creds may provide a mechanism for establishing Reality Testing, including:

- Creds may be streamed (and aggregated) from one or more users/Stakeholders, resources, processes and/or other PERCos and non PERCos elements. For example, a Cred stream may be evaluated to trigger one or more events in response to Reality Integrity metrics. For example if RI metrics fall below a threshold, an administrator may be alerted and/or a stream to a specific user may be suspended.
- For example streamed Creds may be on a time base, which may be synchronous or asynchronous, may be uni-, bi- or multi-directional, symmetric and/or asymmetric.

- Creds may be streamed from one or more resources and/or processes, including for example PERCos Platform services and may include:
  - Certificates and/or other cryptographic services
  - Network hardware, video and audio devices
  - Governance rules management
  - Conversations, image recognition and the like
- User validation and authentication using RI techniques, including video, audio, key check and the like to establish the reliability of user as who they claim to be and the reliability of their actions
  - Reliability of identity including previously defined identity characteristics and/or directory for look up of such information
  - Reliability of action—actions are validated such that there can be no reasonable doubt as to the user having undertaken the action/agreement The range of assertions and/or associated opinions related to one or more subjects and/or purposes may be multi-Dimensional both in value, which may be implicit, and in the form of the representation. Some assertions for a subject and/or purpose may express widely disparate views.

In some PERCos embodiments Repute expressions maybe implemented as a system of Creds, which are intended to convey sufficient information regarding Repute of the subject so as to be evaluated by appropriate processes in pursuit of purpose. Creds are Repute expressions comprising, at a minimum, assertions/opinions about one or more subject matters.

In some PERCos embodiments, Creds have a formalism, described below, which may include a wide range of information associated with the Repute expression. For example, Creds, in some embodiments, provide distributable, interoperable, standardized, persistable, authenticatable, machine readable/parsable, tamper resistant and attributable mechanisms for flexibly expressing, evaluating, combining/extracting, processing and/or commercially employing Repute expressions (including for example ranking(s)/valuation(s)/comparison(s)) with digital information.

In some embodiments the formalism of Creds is a PERCos specification and shares the common attributes of such specifications, including specification Constructs, templates, pre-Specs and/or other PERCos specification attributes.

Published Creds, in some embodiments are PERCos resources as are those that conform to PERCos specifications.

Repute expressions that have as their subject another Repute expression, such as a Cred, are known as Creds on Creds.

In current computing systems, there are pre cursors to Creds, named pre Creds which generally come in two forms:

- Informational (PClnfo)
- Cryptographic (PCCrypt)

These pre Creds are issued by a single Issuer or Issuer arrangement, and are meant to establish some degree of undefined Cred about the subject of the pre Cred. These pre Creds have no methods for updating after having been issued, and are, often, time limited and/or require validation with an online service. The pre Cred comprises a single information set, often the key and a signature and the identity of the issuer.

The issue generally offers two validation functions, which are binary in nature.

- Two functions for validation
  - Issuer
  - Modification
  - Both binary Valid/Not valid Information pre Creds comprise information that is, to some degree, attributable and/or has been evaluated. Generally, these are issued by a Single Issuer, though users may aggregate these pre-Creds. Once issues these pre-Creds have no capability for updating, often requiring the author to create another, possibly contradictory pre-Cred.

Generally, inform pre-Creds carry an assertion and/or opinion, in some examples including text and numeric representations, however there is little or no degree of organization and interoperability of these pre-Creds.

In some embodiments, Creds may have associated schemas expressing the level and/or type of Cred, based on one or more classification criteria. For example, these may include in one PERCos embodiment:

- Platform
- Domain
- Affinity group or
- Participant

All of which may include further informational structures and patterns and associated evaluation processing that for example includes:

- Creator/publisher ID profile/level, for example expressed by PERCos identity platform services. This may further include:
  - Affinity groups (formal and/or informal)
  - Affinity group with active testing of ID
  - Organization issued regarding employee or consultant or sub group or degree/certificate/matriculation and the like, and involving administrative processes that serve as active and contextual checks, for example, governmental body issued ID.
- Cred on Creds
- Template and/or Specification of metadata filtering as related to purpose
- Specified metadata field data (including types and values) and valuation vector metrics as applied to data To aid in efficient handling of Creds, in some PERCos embodiments, Creds may be classified according to one or more schemas.

An example of such a schema may include, for example:

- Consumer—which may be split by purpose (Purchasing/Reviewing/Usage of subject/Rant and the like)
- Commercial—which may include Offers/Sales/Purchase/Contracts/and the like
- Government—which may include Name/Authority/Department/Usage/and the like
- Research—which may include purpose/institution/purpose/and the like
- Professional—which may include further classifications such as Medical/Scientific and/or Doctor/Accountant/Lawyer and the like Further any and all of these schemas may further include quantitative and/or qualitative metrics and/or Cred vectors, such as, multiple values (say) 5 levels of Cred types and specific further classifications, such as, in consumer-entertainment, and/or associated Rules for each classification and/or levels. In some embodiments these may be expressed as name/value pairs (where name is a set).

In some embodiments Creds are relativistic in that they optimize processing and use of, in a one to boundless context, knowledge and information resources. In some PERCos embodiments, Cred types may include:

- Creds on Creds
- Stakeholder Creds
- Aggregate Creds or
- Composite Creds

Cred types may, in some embodiments, be a type of Construct, and may follow the lifecycle of PERCos Constructs. All of these Cred types may, in some embodiments, be subject to one or more processes undertaking evaluations, often using context and/or session specific evaluation methods. Creds may assume a wide range of values. One type of values may be Cred metrics (and their evaluations) and may further be utilized in the computation and representation of PERCos Counterpoint.

In one example embodiment, such evaluations may be undertaken using PERCos Evaluation Services instances with control specifications specific to that context/session. These evaluations may produce results sets that are specific to those circumstances, though these may be further evaluated in other contexts/sessions subject to availability and/or governance.

Creds may be employed within any specifications, and in some example embodiments can be included in, for example, PERCos Constructs. Further examples include embedding and/or referencing of Creds in Frameworks and/or Foundations where, for example, Creds may be about the Construct itself, purposes associated with the Construct, resources (and/or arrangements thereof) comprising the Construct and/or any other Cred subject.

Creds may be made, in some embodiments, persistent. In one example PERCos PIMS and/or Persistence services may be invoked by Cred creator, user, Evaluator and/or other processes, such as Coherence to make Cred persistent.

Cred on Cred comprises an assertion by one or more parties on an existing and/or contemporaneous Cred, such as, agreement and/or confirmation and/or comment (positive or negative) on original Cred assertion/subject/creator/publisher/time and/or other Cred elements.

Creds on Creds may include value expressions, in some embodiments as name value pairs, which may be calculated, defined, conditional, event driven and the like.

In some embodiments, Creds on Creds can be structured in a manner similar to Creds comprising similar elements, including for example organizations, classifications and the like.

Cred on Cred relationships to the Creds to which they refer, may be through reference and/or embedding and may be persistent or not. For example user (A) may make a Cred on Cred (CoC) on Cred (x), where Cred (x) has no knowledge of user A's CoC upon it. This example may occur where user (A) has made such CoC for their own benefit and have no intention of this being available to other users. In another example user (B) may create a CoC on Cred (Y) and publish this CoC for use by other users, and in this example, the relationship between Cred (Y) and user (B) CoC may be retained/persisted by and appropriate service, for example PERCos Persistence Services.

Creds on Creds may also have supporting and/or associative links to, for example, originating and/or other Creds including (resources, Domains/contexts), where that association may be persistent and/or transient. These associations with Creds may in some embodiments, comprise references that provide further informative information, including for example commentary, resource relationships and/or other information.

In some embodiments, Creds on Creds may be created through association of Creds with one or more pre-Creds (e.g. certificate and/or credential). Creds on Creds may be used in any specifications, including for example, comprising part of a further Cred assertion/specification. Creds on Creds arrangements can be the same as those for Creds, for example embedded/referenced/as part of a resource, with or without persisted relationships and the like.

Cred on Cred assertions may be used in evaluation of original Cred and/or in evaluation of Cred on Cred through aggregation, summary, calculation, conditions and/or any other algorithmic methods. Creds on Creds may be evaluated in the same manner as Creds.

Processing and/or evaluation of Creds on Creds, may for example include the creation of summaries, aggregations and/or integrations. In many embodiments such operations may be in support of one or more purposes. In some embodiments, Coherence Services may undertake optimization of CoC calculations to determine, for example, an optimal CoC for a specific purpose, which can then be utilized for matching or similar algorithmic operations. In another example, such operations, including aggregations, summaries, optimizations and/or other algorithmic actions may form specialized specifications, in the form of templates and/or other PERCos Constructs.

In some embodiments, Creds may be aggregated by one or more processes, including evaluation, so as to, for example, create further Creds representing an aggregation, based on one or more algorithms, of one or more aspects on the evaluated Creds.

For example, a set of Creds with a common subject, may be aggregated into a single Cred on that subject with an algorithmically calculated aggregation on the assertions of the evaluated Creds, with the single Cred assertion comprising, an average of those assertions.

Aggregate Creds comprise one or more sets of Creds that have been aggregated by one or more users/Stakeholders and/or processes for one or more purposes. For example an aggregate Cred may comprise information derived from a plurality of Creds regarding the same one or more subjects.

Illustrative Example of Cred Publishing and Associated Processes in Shown in FIG. 83: An Example of Cred Publishing.

Calculated/Compound Creds comprise sets of Creds that have sufficient common attributes (for example assertions, subjects, times, publishers, creators and the like) to be presented as a composite Cred representing those common attributes.

In some embodiments, Creds may be created through formulation processes, where Cred metrics and/or purpose associations expressed by creator and/or publisher are common, however user purpose differs, and as such user may vary one or more Cred metrics, values, parameters, assertions and/or other Cred elements so as to use Cred for their purpose.

In some embodiments, Formulated Creds are created through one or more evaluation processes.

In some embodiments, operations on and/or including Cred can be initiated through specifications, events, algorithmic operations and/or any other trigger. For example this may include operations such as, updating, aggregating, matching and/or searching. In some embodiments relevant Creds, returned as a result of these operations, may for example, influence further operations including, updating and/or specification iterations.

In some embodiments, Creds may be evaluated such that a further Cred assertion is produced from those Creds being evaluated and such assertion is in some manner an algorithmic derivation from those assertions comprising the Creds under evaluation.

For example the derived Cred assertion(s) may be a statement comprising a composite formulation of one or more cred assertion(s) derived from a differing body of underlying Creds, where there is sufficient commonality in underlying Creds (e.g. purpose associations, subjects, creators, publishers and the like), that derived Cred and included assertions are representative of underlying evaluated Creds.

As described previously in this disclosure, there are Cred types that represent the relationship of the Cred with one or more user/Stakeholder, these include for example:

1. Creds (general purpose term)
2. Self-Creds
3. Connected Creds
4. Unconnected Creds, both the foregoing being different from unbiased or objective or neutral, since those descriptors cannot be assumed.

Creds, in some embodiments, are PERCos resources. Creds, for example, provide contextually interpretable assertion statement(s) and associated metrification. Creds, in common with other PERCos resources, may be created through specifications, using in some embodiments, a Cred template or other suitably formatted specifications.

In some embodiments, Creds may comprise recommended and/or optional specifying elements. For example, Creds may use Cred Formulation templates which, may include PERCos information, such as purpose characterizations/expressions, Cred types and/or purpose and/or Cred metrics.

In some embodiments, these specifications can be processed by Cred Publication Service (CPS), which may publish a Cred. These Cred specifications may be processed in a one-to-one, one-to-many or other arbitrary arrangements, and any specifying elements may be included by reference and/or embedding.

Creds may be machine and/or human readable, that is may be optimized as human interpretable or machine interpretable An Illustrative Example of a Cred Embodiment FIG. 84: An Example of Cred Elements and Composition In some embodiments Creds may include the following elements, as outlined in Figure VVV and described herein.

Creds comprise at least one temporal information element, being the time of creation, and may comprise further temporal elements, such as time of use, time periods of validity, time of expiry and the like. Temporal information may include specifications and/or event and/or conditionality.

In some embodiments, Creds may use one or more tamper resistance mechanisms to prevent unauthorized users from tampering with them. Tamper resistance mechanisms provide an effective barrier to entry and protects Creds from unauthorized users trying to modify them. Creds present unique security challenges because their creators are placing Creds that may be used by any user, including users who may want to modify them.

In some PERCos embodiments Creds comprise at least one subject, about which the Cred is making an assertion. Subjects may comprise sets of elements, which may include users (as their identity), resources, classes, events, other Creds, Creds on Creds and/or any other information.

Object(s) and metadata about which assertion attests to

May contain Author/creator ID(s)

In some PERCos embodiments, assertions are the statements made about some one or more subjects. Assertions may be singular and/or comprise multiple statements. These statements may in turn be simple and/or complex and may comprise declarative expressions, algorithms, calculations and/or any other information, in human and/or machine readable form. Assertions may include:

Assertion Summary

Assertion statement(s)

Second Party Supplemental assertions and/or

Supporting Information Area

In many PERCos embodiments the identities associated with the Cred may, be the most important for subsequent evaluation of the Cred.

Creds comprise an identity for the Cred and a set of identities associated with the Cred. The Cred identity, Cred ID can be assigned to the Cred at the time of creation. In some embodiments, this may be assigned by a process, such as a PERCos Platform service, and may for example consist of a UID created form a hash of the Cred.

The set of associated IDs may comprise, in some embodiments, Cred issuing authority ID, publisher ID, creator ID and/or subject ID. Examples of each of these are described herein.

A Cred Issuing Authority may provide an ID for the invocation of a Cred Publication Service or similar process. In this example such a process, for example a PERCos Cred Publishing Service Instance, would be assigned an appropriate ID by, the manager of that operating session, or other appropriately entitled resources and/or processes. This ID could then provide chain of handling and control information to one or more subsequent processes. In some embodiments, such an ID may comprise a certificate, credential and/or other form of secure identity.

A publisher ID comprises the identity of the publisher, and in some embodiments, such an identity is sufficiently robust so that the publisher can be uniquely identified, both in the computational domain and across the Edge. The publisher ID may have associated other information, for example, the Creds of the publisher, which may be made available if the publisher ID is evaluated as part of Cred evaluation. In some embodiments, publisher ID may be included in Cred by reference and/or embedding.

The creator ID is the identity of the user/Stakeholder who is making the assertion. The Creator ID may have other associated information, such as the creator's Creds, which may be directly/indirectly linked to the creator ID.

In some embodiments, the subject of the Cred may be identified, such as le a specific resource, purpose class, Construct, user/Stakeholder or other uniquely identified PERCos resource.

Cred test and results information may be included, in some embodiments, by embedding and/or reference in Cred. For example, Cred may include reference to recent and/or appropriate results from an identified Test and Results service instance. This information may be used in, for example Cred evaluation, to ascertain the validity, currency and/or other attributes of the results, including, re-running of the Tests, subject to the availability of the test specifications.

In this manner tests of the Creds may be evaluated so as to ascertain their reliability.

Cred metrics ID comprises that set of metrics that are associated with Cred. For example this may include, complexity, conditionality, aggregation, computed and/or other metrics specifying the characteristics of the Cred. These may be used prior to and/or in evaluation of Cred.

In some embodiments, Creds on Creds identities may also be included, by embedding and/or reference, so that the relationship between the Cred and the Cred on Cred associated with that Cred is able to be considered during Cred evaluation processing.

Cred information ID is the identity of any set of information, including for example metadata, informational patterns and structures and/or any other information that may be utilized in Cred evaluation and/or determined by Cred creator/creator as of having utility through associated with Cred.

In some embodiments Creds, through reference and/or embedding may retain the relationships those Creds have with other PERCos entities, including for example Creds, Creds on Creds, resources, Constructs, users/Stakeholders, publishers.

In some embodiments, Cred metadata may comprise any information associated with Cred and may be represented in a structured and/or unstructured manner.

In some embodiments, such information may comprise Cred types, Cred levels, Cred metrics, Cred history, Cred Counterpoint information and/or any other information associated with Cred.

In some embodiments there may be associated rules and/or governance associated with Creds determining the use and/or processing of Creds.

In some embodiments, categorization schemas for Cred metadata may be employed. For example such categorization schemas may include:

Legal Background
Employment/Position
Income
Credit
Publishers/Peer Reviewed
Affinity
Peers and/or any other metadata, where for example defined terms may be used for standardization and/or interoperability across one or more user constituencies. An illustrative example of Cred publishing and associated processes is shown FIG. 85: A Cred example Publishing and Associated Processing In some embodiments, Creds may be created through specifications, including pre-formatted specifications, such as Cred templates. This process may include one or more users/Stakeholders who are the Cred creators, specifying their assertions on subject(s) of the Cred and may further involve other specification elements, such as, Rules, identities, resources, metadata, metrics and/or other information associated with Cred.

In some embodiments, Cred specifications may be formalized as Cred Statements, where such Statement comprises Cred elements, including creator, assertion, subject, associated purpose expressions and appropriate IDs, combined with any other information, in a format suitable for PERCos Publishing service instance configured to undertake Cred Publication to act upon.

In some embodiments, Cred creation may require two or more simultaneous and/or user/Stakeholder interactions for establishing and implementing specifications, including rules for Cred(s). This may involve one or more processes, including for example Coherence, creating Creds, and may be based, in part on user/Stakeholder preferences and associated policies.

For example Cred creation may involve:

Unitary construction (all in one Cred)
Unitary construction with common references
  E.g. reference common namespaces
Disassembled construction (individual pieces)
Distributed across a set of contexts
Other computational and combinational methods and/or
Including Cred embedding, referencing, aggregating, hierarchical or other Cred arrangements Creds may comprise formatted specifications, including templates, which can include, in some embodiments, the following example sections. In some embodiments, processes such as, PERCos Cred Publishing Service, may have control specifications describing specific sections, order of entry and/or minimum sets which may be required for Publication.

In some embodiments, such a minimum set can comprise, temporal information (for example a minimum of the time Cred created/published), assertion (the Cred assertion about a subject), subject (the object of the assertion), the identity of the creator, the identity of the publisher and one or more sets of purpose expressions (which may be classes and/or may be null).

All Cred elements may have associated metrics, for example weightings, complexity metrics, purpose metrics and/or other metrics that are provided by creator/creator, publisher and/or utilizer of Cred.

In some embodiments, Creds may include significant amounts of information, and as such may not be well suited to efficient evaluation in one to boundless. In such circumstances, Cred evaluation may include priorities and/or ordering of the evaluation of Cred elements so as to efficiently select those of most interest for purpose.

Creds may have levels, determining their intended scope of usage (For example creator for self, for group, for all and/or limited by purpose and the like). Creds may also have types, such as simple (minimal) through to complex, and in some embodiments may incorporate degrees to which they are human and/or machine readable.

This may include any temporal information regarding the Cred. For example this may include the time of creation, the time of publishing, one or more times of evaluation and one or more time periods, such as the period for which a Cred may be valid, the period for which the Cred tests may be valid, the time period for which the Cred may be evaluated and the like.

There is no limit to the types and complexities of temporal information, though in some PERCos embodiments, the temporal information may be formatted to aid standardization and/or interoperability.

In some embodiments, one or more tamper resistance methods may be applied to and/or associated with Creds. These techniques are intended to ensure that those that utilize Creds have sufficient information regarding the veracity of the Cred in their evaluation processes.

In some embodiments, the Cred assertion is mandatory, and may comprise structured and potentially standardized expressions. The assertion may include at least one subject, and may comprise further information, depending on the publishing processes and degree of interoperability which may be required and/or desired.

In some PERCos embodiments, there may be extensible sets of assertion terms that are made available to creators, and such sets may be associated with specific purpose domains, purpose expressions and/or purpose class structures. In another example sets of terms may be associated with users/Stakeholders and/or groups thereof. In both these cases additional assertion information may be provided and/or restricted depending on, for example, the publishing services control specifications.

In some embodiments, specific user/Stakeholder groups may extend and/or specialize assertion Terms, and the conditions of their usage to suit the purposes of those groups.

In some embodiments, assertions may be combined and/or segmented. In some examples, the assertions may be of such complexity, that a summary of the assertion is made available.

In one embodiment, it may that there is a single creator who makes the assertion, whereas in other embodiments, there may be multiple creators who add to the original assertion.

There may, in some embodiments, be additional assertions made by creator and/or publisher that are added to the original assertion. These additional assertions may be designated as secondary or supplemental assertions related to the original (primary) assertion.

In some embodiments, assertions may comprise a set of assertions, which have associated conditions associated with them, such that on the condition being met, that the associated assertion may apply. In some embodiments, the set of assertions may comprise Primary assertion and supplemental assertions which have conditions associated with them, so as when the condition is met, the supplemental assertion may apply. In general Creds comprising these assertion sets have these conditions triggered when evaluated.

Assertions may also have associated information, for example providing background to an assertion, for example "Book X is excellent on subject Y", where additional information may include other books that are also regarded by creator (and or others) as excellent on subject Y. Such information may be referenced and/or embedded.

In some embodiments, Creds may have a subject, about which an assertion is being made. In an interoperable PERCos embodiment, for example, subject may have a UID. For example, subject may be a purpose expression term, such as category, a purpose class (and/or class member), identity (such as user/Stakeholder), resource, other Cred (for Creds on Creds).

In some embodiments, Creds associated with resources may have that relationship retained by Cred (a resource itself when published) and/or resource to which it refers.

Subjects may be singletons and/or sets (which may be open and/or closed), and may be included in Cred by reference and/or embedding.

Subjects may have associated purpose expressions and/or classes, which may be, for example, used in evaluation of Cred.

In some embodiments, Cred subjects may be structured to enable standardization and/or interoperability regarding subjects. As the subject of a Cred may be anything the creator declares, there can be various schemas for subject classification, standardization, interoperability and/or evaluation criteria.

In some embodiments, the following example approaches to subject definition and/or associated subject information may be included.

Subjects may, in some embodiments, comprise any and/or all of the following:

- One or more resources (both PERCos and non PERCos), including for example, specifications, Constructs, published Objects, user/Stakeholders, operating resources, classes and/or members and/or attributes thereof, all of which may be sets, comprising at least one member. In some embodiments, subjects may be contextually defined and/or may be published, through, for example, PERCos publishing service.
- One or more references and/or associations with and/or to resources, including, for example, those mentioned above.
- Purpose and/or class based associations, including for example, users/Stakeholders and groups thereof (both formal and informal), including their identities and expressions of competence in one or more purpose domains and/or fields of expertise.
- Subjects may be for example, algorithmically calculated, be results of and/or input to processes (for example a declared class/CPE (prescriptive or descriptive), comprise results sets derived from other processes, including for example Creds, such as "95% if the people surveyed said X", be an aggregation of other Creds, may be imputed, inferred and/or declared.
- Subjects may be arranged in structured and unstructured subject categorizations
- Information expressed as metadata associate with subject. This may include, methods, metrics, classifications, class relationships and/or any other information, either structured or unstructured.
- Other Cred related information, including other Creds and/or Cred on Creds associated with subject(s). This may also for example, relate to those users/Stakeholders who classified and/or created subjects, and their associated identities and Creds.

A creator has an identity, for example a user/Stakeholder that makes an assertion within a Cred system, for example a PERCos Cred embodiment. In some embodiments, a creator may have a verifiable identity that enables evaluation and/or usage of the Cred such that the creator may be reliably identified as part of that process. A creator may, in some embodiments, be a resource, process, user/Stakeholder and/or other verifiable identity that has the capability and/or rights to make an assertion within a Cred system.

In some embodiments, creator may create within an operating session, a specification for a Cred, which is then passed to a Cred Publishing service, for the Cred Creation. This Cred may then be distributed to one or more other users/Stakeholders, through for example, direct communications to their operating sessions and/or through one or more store and management systems.

In one example embodiment, the creator identity may be held and/or managed by a Contextual Identity Service, which may respond to queries and request regarding the identity of the creator. Such a service may also retain, in one example embodiment, Cred identity information.

In some embodiments, Cred publication involves, for example, an instance of PERCos publishing services receiving a Cred specification as input from Cred creator, and under direction of those control specifications issued to such service instance, creating a PERCos Cred in line with the received specifications. In some embodiments, Cred publication utilization of PERCos Cred Publishing Services, may involve control specifications provided by publisher.

Cred purpose expressions are those expressions that users/Stakeholders have associated with Cred. These purpose expressions may be used, by one or more evaluation processes. Further purpose expressions may be added by those utilizing and/or evaluating Creds, where such additional purpose expressions may include, for example weightings and/or other metrics, reflecting further purpose relationships for Cred.

In some embodiments, Cred creators and/or publishers may opt to provide one or more metrics, including weightings representing their expressions of relationship of Cred to one or more purposes. These purpose expressions, may, include declared, estimated, calculated, conditional and/or otherwise defined values including algorithms for such calculation, expressing at least one value, metric or other expression of relationship between Cred and one or more purposes. In some example embodiments, the degree to which a Cred may be associated with a purpose may be expressed, for example where a creator has expertise in fields associated with purpose, rather than purpose directly.

In some embodiments, Creds may be used in the evaluation of relevance of and for purpose of information associated with and/or comprising Cred. Such evaluations may include history of Cred usage and/or evaluation and/or information comprising and/or associated with Cred. In one example, this may include the historical relationship of Cred to purpose and the usage by evaluators of such history in determining their purpose result sets.

- purpose value(s) as expressed through the use of Cred by users/Stakeholders, evaluators, estimator algorithms and the like
  - May be asserted and/or estimated/calculated value as representation(s)/value(s) in degree to which Cred is useful for a purpose
- purpose Valuation metadata
  - May include purpose Use data and metrics
- Relevance of a Cred is explicitly contingent on purpose In some embodiments, Creds may have associated rules and/or governance associated with them, by reference and/or embedding. For example in one embodiment, Rules and/or Governance may determine which Cred information is made available, under what circumstances to which other resources (including users/Stakeholders and the like), and may include the degree to which such information, including the Rules and/or governance itself, may be opaque/visible/able to be evaluated/able to be distributed/able to be utilized and in what manner that utilization may comprise (for example used by Coherence but no other process).

Cred rules and/or governance may also include restrictions on the assembly of Cred information, for example by which processes was the Cred assembled, and/or the degree to which Cred may be assembled with other information to form, for example, aggregate Cred and/or Cred on Cred. In some embodiments, such controls, rules, constraints and/or restrictions may apply to specifications form which Cred was created, publishing processes associated with that creation and/or any downstream usage of Cred and/or information forming such Cred. This may include, for example Cred templates, which may contain such Rules and/or be governed by them.

Cred rules and/or Governance may include, specifications determining the degree of trusted computational processing which may be required by and for Cred evaluation and/or usage, in part and/or in whole. In one example embodiment, Cred elements may be constrained as to their usage and/or accessibility by one or more enforcement methods, such as flexibly trusted computing methods.

In some example embodiments, PERCos governance may be based in whole and/or in part on Cred systems involving Creds and/or Creds on Creds.

In some embodiments in common with other PERCos resources, Creds may utilize PERCos History Service instances to retain and make available Cred history. Cred history may include such examples as, history of Cred evaluations, including their values, outcomes and/or results sets, history of relationships of Cred to other resources, history of Creds to purposes and/or purpose classes.

In one example embodiment, Cred history may include all the interactions of Cred from initial specification by creator, through publishing and distribution to evaluation and utilization. This may include any modifications and/or variations of Cred by users/Stakeholders.

In some embodiments history may comprise those relationships, and chains thereof, formed by Cred during utilization of Cred.

Creds may, in some embodiments, have differing types and levels. These classifications may then be used in Cred evaluation. In some embodiments such classifications may enable efficient filtering of Creds in one to boundless.

Cred levels classify the degree to which the Cred, as expressed by creator and/or publisher, is intended for purpose operations. In some embodiments, Cred levels may be expressed as Rules, which may, in turn be enforced by one or more enforcement processes. In some embodiments, this may involve the use of one or more cryptographic techniques.

In some embodiments, Cred levels may be specified by creator and/or publisher as part of, for example Cred creation process. In another example Creds may have such type Classification applied at a later time by suitable authorized user/Stakeholder/process.

Cred levels may be applied to one or more specific operating sessions, user/Stakeholder "worlds", purpose operations and/or any other defined constrained operating environment.

In some embodiments the classification schema may comprise for example,

| Cred level | Description |
|---|---|
| User | Creds that are intended to only be used by creator for their own purpose and with the scope of their own operations. For example, user may make an assertion which they wish to keep private for their exclusive use only. |
| General | Creds that are intended to be utilized in any evaluation by any other user/Stakeholder. |
| User/Group Specific | Creds that are intended to be used by specified users and/or groups thereof. For example Creds issued on behalf of affinity groups. Such Creds may be restricted for usage by such group and/or be made available to wider usage. |
| Purpose Specific | Creds that are only intended to be used for one or more specified purpose. This may for example include relationships to purpose class, purpose class applications, purpose lexicons, purpose ontologies and/or any other arrangements of purpose. |
| Certified | Creds that have certification from a recognized third party with authority, for example governmental departments, social organizations (Churches, Fire Departments, Police Departments, Charities and the like), commercial organizations (including globally recognized brands with trademarked identities). |
| Platform | Creds issued by one or more PERCos Platform services which provide interoperable recognized identities. In some embodiments, such Creds may be issued by, for example, Coherence relating to one or more resources (including arrangements thereof). In some example embodiments, such Platform Creds may be restricted so as to only be able to be used by other PERCos Platform Services to, for example, provide a PERCos internal reliability framework. |

In some PERCos embodiments, there may be classifications of Creds by type, including those types described herein.

Cred types may include Creds which are optimized for machine interpretation "Machine Interpretable Creds (MIC)"

- Pre Creds
  - Low level Creds

| Cred Types | Example Description |
|---|---|
| Simple | Simple Creds may, in some embodiments, comprise a minimal set of Cred elements, |

-continued

| Cred Types | Example Description |
|---|---|
| | which may be the all those comprising the Cred or that reduced set from the Cred. In some example embodiments, this may include temporal ID, creator ID, assertion, subject and associated Cred purpose expressions. These may be complimented by one or more Cred metrics, which may be used, in whole or in part, for evaluation, though they may not be required for a simple Cred. In this example the assertion comprises only interoperable Cred expressions. In this manner, sufficient information may be the result of the evaluation process to further guide purpose operations, through the reduction of complexity. |
| Basic | Basic Creds comprise simple Creds and further assertion<br>Simple + assertion statement<br>Include method/template/service and user Creds |
| Complex | Basic Cred and one or more of assertion body, second party assertions, Cred history, Counterpoint and/or pointers to Creds on Creds and further information and/or metadata. May include structures and/or pointers to PERCos objects and/or purposes. |
| Platform | Creds that are issued by one or more PERCos platform services. |
| Low level | Resource issued Creds pertaining to other resources, where resource is not a user/Stakeholder. In some example embodiments, such Creds may be issued by, Coherence Services, pertaining to the operations, assemblies and/or performance of one or more resources or combinations thereof. |
| Abstracted | Creds may be abstracted so as to create general assertions. For example if a large number of individual Creds assert that "Ford is Good", then one or more creators may evaluate such Creds, with one or more algorithms, to create such a general Abstracted assertion. |
| Inferred | Inferred Creds may be determined by, for example in some embodiments, through evaluation of resource (including user/Stakeholder) performance and operations. For example if a large body of users utilizes the expertise of expert 1, such a Cred may be created to reflect this implicit assertion. |

Cred metrics, in some embodiments, express at least in part degrees of alignment, veracity, relationship, value and/or other characteristics of Creds to other resources, processes. In some embodiments, Cred metric expressions may indicate, for example, the degree of applicability of one or more Creds in a set of circumstances.

In some embodiments, Cred metrics may include PERCos standardized metrics and/or Dimension Facets and auxiliary Dimensions. For example this may include, in addition, the following; scope, importance, relevance and reliability.

Scope is the range and matching to purpose, which in some embodiments may be expressed through purpose classes and/or other informational patterns and structures.

Such relationships can include for example, matching, inclusion, exclusion and may include weightings and/or other value expressions. In some embodiments, scope may be expressed within a user (including groups thereof)/Stakeholder domain, with differing expressions, enumerations and/or values being associated/related depending on that domain.

Importance is the importance to one or more expressed purposes, expressed as a value, for example a named value pair, where name may comprise any set of one or more purposes. This expression may indicate, for example, differing specified and/or calculated importance of Cred to purpose(s), which in some embodiments may include further weightings and values. Importance expressions may be qualitative, quantitative and/or combinations of both in nature.

In some embodiments, such expressions may be created by Cred creator (Cred X is very important to purpose Z) and/or Cred Evaluator, Cred user and/or other processes, including for example Coherence. For example, in some embodiments, such metrics may be stored in the form of an array and/or set or other representation that includes, for example, all the various importance metrics for this Cred.

Cred relevance to one or more purposes may be stated and/or calculated. This metric is an expression of the degree to which any Cred may be relevant, and thus potentially useful in any evaluation, for one or more purpose or other subject of Cred. For example, if a user has a criminal record, and this has been expressed as a Cred, then this may have a high relevance in the example where user may be applying for an employment position. In this example, this Cred would need to be an Effective Fact to be evaluated in this manner.

Relevance may be determined by Cred creator and expressed as such, and also may be determined by declaration and/or calculation by Cred evaluators and/or users. There may be, in some embodiments, situations where a Cred has a series of relevance metrics, some of which are orthogonal and/or differ in degree. In this case, for example, these metrics may be used by PERCos Counterpoint to illustrate the differing perspectives associated with this Cred, subject of Cred (including purpose) or any other information associated with the Cred.

Relevance may also be domain user/group/Stakeholder specific, such that for example, in user Domain A the Cred is Highly Relevant, whereas in Domain B, it is circumstantial. Relevance expressions may be qualitative, quantitative and/or combinations of both in nature.

Cred reliability, in some embodiments, may be expressed in terms of metrics associated with Testing and Test results that have been undertaken by one or more processes for one or more purposes and/or other subject and associated information reasons over time.

Cred reliability for one or more purpose and/or subjects may be expressed in one set of circumstances and be stored and presented for use in another. For example, if Professor A creates a Cred in domain P (for example "Teaching Physics") for a specific book, say "Physics Advanced", and this Cred is then widely tested (by for example confirming Professor A bona fides), then this Cred may have a reliability metric encapsulating this associated with it.

This may further, include testing of the assertion regarding "Physics Advanced", such that the publisher and other pertinent information is confirmed, making this Cred have a reliability metric that is, for example high.

Testing of Cred may also involve numerous parties, which for example, in the case of common consistency of outcomes, may result in a wide acceptance of Cred.

Reliability may also pertain to Cred creators, as an aggregate metric of their previous and current Creds, enumerating the degree to which all of their Creds have been Reliable when tested, and as such may represent a further metric for evaluation.

Reliability metrics, in some embodiments, may be used in the identification and/or designation of Effective Facts, for example when multiple consistent tests have been undertaken on Cred by multiple independent and reliable Parties.

Creds and Cred information, including Cred metric/vectors may be used by one or more processes in the calculation and representation of PERCos Counterpoint.

In some embodiments, Counterpoint may include calculated relative relationships between Creds, Cred(s) vectors and/or vector metrics, subject(s) and/or incorporated subject(s) characterization(s) for computational analysis and/or representation(s).

Counterpoint may be calculated form any set of Cred vectors and/or metrics. In some embodiments, Counterpoint may be determined through evaluations of Cred metrics by one or more valuation methods, and results from those evaluations presented individually, collectively and/or in any combination. Theses result sets may undergo, further analysis and evaluation to refine and represent Counterpoint. For example analysis and/or representation of Counterpoint may be algorithmically influenced, such as if delta is "N" for "Y" vector then apply algorithmic transform "X".

Counterpoint determinations may be event driven and/or may influence events.

For example, on event "X" calculate and represent Counterpoint in accordance with "Y" algorithm.

Counterpoint may, in some embodiments, on events including conditions, calculations and/or thresholds and/or other expressions, create further events, such as, if Counterpoint value "Y" then send event notification "X" to process "P". A further example, may be that a Counterpoint value is in the majority binary "No", and as such send Cred query as to "Yes/No" for an alternative Counterpoint may represent aggregate values through algorithmic manipulation of Cred's and Cred vectors to create and represent an aggregate value for Counterpoint. For example this may be expressed as for Creds associated with purpose N, the Counterpoint value is, for example 0, on a scale where −1 indicates high discord/disagreement/divergence and +1 indicates high accord/agreement, and consequently 0 represents a neutral Counterpoint. Counterpoint may include information, such as Cred metrics, subject related information and/or relationships and/or metadata.

In some embodiments, Counterpoint may include further metrics and classifications, for example, Counterpoint may be presented as "Open to Debate" indicating a continuing discourse on the Creds and/or subjects concerned, for example "Global Warming". In one example, the Counterpoint calculations may include, being based on thresholds, such as agreements based on one or more Cred metrics.

A further example may presentation of Counterpoint as "Open/Closed", where for example one or more Government agencies have mandated a specific perspective, such as the banning of some substances. In another example Counterpoint may be expressed as an "aggregate agreement," which may comprise aggregations of common assertions, including sub assertions, where the overall agreement outweighs any minor divergences.

Counterpoint can be calculated using any methods and/or algorithms and be presented to any one or more users in any arrangement. In some user groups/communities, Counterpoint may represent the perspective of those communities, whereas in the overall user community such a position may be a Counterpoint in a wider discourse.

Counterpoint may also include the history of Counterpoint calculations which may then be represented to indicate the types and evolution of the opinions/assertions over time.

Creds may be created through multiple methods, including, through plugins to PERCos resources, including Foundations and/or Frameworks and/or to existing applications such as browsers, social network environments, mobile devices and potentially to non PERCos resources.

For example, in some embodiments, plug-ins may accept inputs in any form including text, symbol(s), video, audio, selection(s), biometrics, sensor outputs. Plugins may, for example access one or more vocabularies of Cred metrics, assertions, expressions, values, subjects and/or other information and utilize these in representations to user/Stakeholders.

Plugins, as in common with other PERCos resources, may in some embodiments, employ matching and/or optimization strategies, so as to provide "best fit" matching for user/Stakeholder input as well as accepting their raw inputs In some example embodiments, plugins may analytically process (including for example quantize) inputs for efficiency, optimization, comparison, connectedness and/or other aspects.

Plugin operations may be at least in part, subject to rules and/or governance and/or otherwise managed by one or more processes, such as, Coherence Services, purpose formulations, operating Frameworks and the like.

In some embodiments, Creds may be created through direct interpretation of one or more users/Stakeholders and/or groups thereof behavior and/or behavioral characteristics. For example in one embodiment, these may be known as user dynamic Creds, as they may often be created as part of an unfolding experience by and/or for the user/stakeholder.

In some embodiment, publishing may for example comprise one or more Stakeholders that publish Creds from templates/specifications through, for example, Cred Publication Service (CPS), which for example may comprise an instance of PERCos Platform Publishing Services with an appropriate control, interface and organizational specifications.

In some embodiments, Cred publishing may include for example:

- A publisher may be uniquely identified
- A publisher may express degree of assertive association with Creds, for example:
  - No affirmation of subject (i.e. no Cred) such as an aggregator that publishes on an "as is" basis making no assertions as to the Creds. For example a publisher of aggregations of Creds of crowds
  - Cred on creator but no Cred/affirmation/comment on subject or assertion, as exemplified such as "Dr. R. V. Jones is a radar expert—where R. V Jones is creator"
  - Cred on assertion/subject but no Cred/Affirmation on creator, for example "The sky is blue"
  - Cred on both creator and assertion, for example "Dr. Niall Ferguson is an academic at Harvard and his book Ascent of Money is excellent"
- A publisher may use internal and/or external sources whose identity is not revealed
- A publisher may be evaluated as creator unless creator is explicitly identified, for example: Michelin Guide, Newspaper story with non-identified sources ("Government Official said")
- A publisher may apply, creator governance and/or rules permitting, further governance and rules on published Cred(s)
- A published Cred may have one or more Tests and results associated with it, for example, a publisher may have a policy that states: "All Creds published on results on an individual test/assembly basis", which may result in the following information being associated with Cred.

Results verifiable

On failed assembly return to invoking method(s)

Results not verifiable

Missing parts of chain(s) (of Creds)

Missing Assembly

Results in exception on assembly-return to invoking method(s)

Not Tested

1 Introduction—Coherence

Users seeking to use information technology are often finding it daunting, and at times impossible, to optimally or even reasonably locate, retrieve and/or deploy resources best responsive to their purpose. As a result, users often experience session activities that are frustrating, impractical, unfriendly, and/or perplexing, as well as at times, such sessions seem to be supported by constraining and inflexible as to purpose silo task application/service/information sets.

It is often difficult for humans to precisely express their purposes and identify resources relevant to their purpose variables. Expressed purposes may be "immature," inaccurate, incomplete, unclear, self-contradictory, too narrow, too broad, may require excessive and/or unavailable resources, or have other similar problems. These considerations are frequently consequences of incomplete knowledge and/or absence of Domain expertise as well as, frequently, the inflexible nature of current, task oriented applications and services.

A PERCos systems embodiment may be a network operating environment for purposeful computing, extending traditional operating system capabilities by enabling user expression of purpose, and further employing hardware, firmware, software encoded on non-transitory computer readable media, and methods for optimally matching user Contextual Purpose Expressions (CPEs)—and any associated profiles, Foundations, user and/or other Stakeholder rules, metadata, and the like—to resources available locally and/or on one or more networks. In some embodiments, a PERCos system is designed to support the deployment of resources to provide user experiences that are responsive to user purposes.

With PERCos embodiments, users may intelligently and efficiently interact with a global, nearly boundless "purposeful network," comprising an immense diversity of possible resources that may be aggregated and/or configured as purpose-responsive arrangements. In contrast to traditional operating systems that supply applications that are suitable for pre-identified general activity tasks (word processing, spread sheet, accounting presentation, email and the like), in some embodiments, PERCos systems are designed to supply experiences corresponding to expressed purpose specifications by providing resource arrangements whose unfolding executions are specifically in response to user/Stakeholder purpose specifications.

Currently there is no general purpose architecture designed to provide unfolding processes and/or results that are meaningfully responsive to user purpose expressions. Deploying such an architecture, given the vast distributed resource possibilities of the Internet and related clouds, may optimally use a complement of certain specific kinds of functional services that are valuable in combination to ascertain and arrange optimal and/or minimal friction ("best") purpose related results.

In order to manage such combinatorial arrangements, PERCos embodiments provide Coherence Services and resonance specifications. Coherence Services and resonance specifications support the provision of user responsive contextual purpose-related purpose framing. For example, in some embodiments, these mechanisms, functions, and components include Repute services, various PERCos resource Management Services (managing as applicable, resources, including resource types such as Constructs—including Frameworks, Foundations, fabrics, information sets and the like) and/or other PERCos platform services.

Some PERCos embodiments include:

Coherence Services configured to reduce friction and optimize Outcome through optimum resource arrangements, performance, resilience, robustness and reliability. Coherence Services may identify candidate resources and select a resource arrangement that minimizes friction when compared to the intended purpose.

Resonance specifications comprising specifications that may be declared by acknowledged Domain experts (ADEs) or other Stakeholders, as well as users for their own use. In some embodiments resonance between Participants may be facilitated by in part recognizing common characteristics that may facilitate user purposes among a user set. Resonance facilitates recognition and specification enhancement, by identifying and employing such commonality of characteristics as components employed and/or emphasized in for example similarity matching and such characteristics and associated computational information may significantly influence achieving multi user and/or participant common purpose Outcomes.

Because Coherence Services and resonance specifications are specification-centric, it is understood by those familiar with the art that coherence services and resonance specifications and their associated specifications and processes may overlap (and/or fail to interface/interact) to varying degrees. Such overlap may depend on implementation strategies and their application in one or more embodiments where they may operate and/or be operated upon, iteratively and recursively through specifications processing and/or subsequent operating session resources operations and associated experiences.

Coherence Services and resonance specifications complement each other and other PERCos capabilities to enhance results responsive to articulated human purposes. PERCos embodiments address the difficulty users have understanding and expressing purpose variables. PERCos Coherence Services and resonance specifications can help users deal with the conundrums, expertise challenges, and organizational difficulties related to purpose expressions, including meaningfully and relevantly organizing the presentation of results with purpose-related intelligent tools and functions.

Coherence Services and resonance specifications may, in some embodiments, provide and/or utilize one or more sets of Dimensions and Facets and/or metrics.

PERCos standardized simplifications such as PERCos Dimensions, Dimension Facets and metrics may be used by Coherence Services and/or be associated with resonance specifications. Dimensions may be used by Coherence processes to, for example filter resource opportunity sets. Resonance specifications may specify one or more Dimension related specifications which have associated methods that when deployed may optimize such Dimensions for one or more purpose operations.

Such Dimensions, Facets and/or metrics may include performance of services and processes, including those of Coherence Services and/or resonance specifications. Example metrics may include: Quality to Purpose, purpose metrics, resource metrics and metrics associated with resonance specifications. There may be, for example, one or more sets of standardized metrics associated with resonance specifications and associated processing, which may include for example Quality of and/or for purpose metrics, metrics associated with one or more resource sets and their relationships and/or other metrics which may become readily apparent to those familiar with the art. For example in some embodiments, resource metrics and resource relationship metrics may be used internally to determine suitability of resources in provisioning user operating sessions.

In some embodiments, PERCos Coherence Services help users deal with the conundrum, expertise challenges, and organizational difficulties related to users expression of purpose. For example, Coherence Services may assist users' successive formulation and refinement of purpose expressions. These embodiments may be configured to provide, for example candidate sets of purpose classes, purpose class applications, declared classes and/or other appropriate specifications that users may use in formulation of expressed purpose(s). Additionally, in some embodiments, Coherence Services may provide information on and/or access to those applicable resonance specifications. Moreover, at any point of such formulation, Coherence Services embodiments may seek opportunities for friction reduction through evaluation and iteration of purpose expressions, including identification of conflicts, gaps, other opportunities, and the like. Coherence Services may then cohere, correct, complete and/or resolve any identified errors, conflicts and/or incompleteness with, if appropriate, help from users and/or other processes. PERCos provides interleaved Platform Services, intelligent tools, utilities, and/or other processes, in support of and including Coherence Services and resonance specifications which may, for example, be directed and/or influenced by one or more user/Stakeholder selections and/or interactive processes. These Platform Services, intelligent tools, utilities, and/or other processes may assist users/Stakeholders, especially, where they have limited expertise in their purpose domain, or have not yet clarified their actual purpose and are exploring opportunities.

In some embodiments, Coherence Services monitor and are responsive to Contextual Purpose Expressions. In such embodiments, Coherence Services harmonize unfolding sequences of Coherence processes as well as produce interim session Coherence specifications. Input to Coherence services by various functional processes may optimize the relationship between purpose expressions, operations, results and associated user experiences.

Coherence Services embodiments generally include one or more contextual purpose integrating/reasoning engines that are configured to evaluate, integrate, harmonize, analyze, and optimize PERCos functions and components in order to derive "best" results responsive to real, underlying human purposes.

In some embodiments, an optimal Coherence implementation does not normally constrain or bias system results based on the source or the form of expression. Coherence Services computationally calculate results based on the totality of specifications, including values, and associated method (including those of resonance specifications) inputs.

This disclosure describes example Coherence Services and resonance specifications embodiments, including some of their processes, operations and supporting components in support of a PERCos architecture.

Some Coherence Service embodiments assist in enabling users to minimize the level of effort that may be required to formulate their purpose expressions by providing them with relevant resources, such as declared classes, Frameworks, Foundations, informational patterns and structures, and the like. Furthermore, Coherence Services embodiments may help users correct errors in their purpose expressions, such as incompleteness and/or inconsistency, and the like. In some embodiments, Coherence Services may also analyze and/or reason about purpose expressions to find alternative templates, Constructs, declared classes, and the like that may be more optimal. Coherence Services embodiments may also contribute to superior experiences through ensuring that the interests of all direct and indirect users and/or other Stakeholders, in response to specified and/or derived purpose expressions, may be appropriately satisfied. In some embodiments, some or all Coherence Services processes may retain a history of changes (additions, deletions, modifications, and the like) that they make. In these embodiments, the history of changes may be organized so as to enable, a user to reliably reverse (undo) the effects of selected elements of a dialog and/or operating session, details of which are described below.

A PERCos system embodiment may also check the availability of the identified resources. For example, the PERCos system may check that a user is authorized to access the resources that may be required, and that the resources are not already allocated to a conflicting use. If appropriate, Coherence Services processes may interact with the user and/or Stakeholders for clarification and/or elaboration. For example, if the user may not be authorized to access some resource, and the Coherence Services cannot find an alternative or substitute resource they may then request the user and/or Stakeholders provide further guidance.

In some embodiments, a PERCos system may use Coherence services to operate upon purpose specifications. A PERCos system may take a resolved and cohered purpose specification, allocate those resources that are available, and request reservations for the rest. It may also generate operational specifications that have sufficient resource specifications and instances to provide an experience corresponding to the purpose specifications. Some purpose specifications may require a given level of performance and reliability; other purpose specifications embodiments may require a high degree of security and/or privacy.

Coherence Services complement other PERCos capabilities to substantially enhance results responsive to articulated human purposes. Coherence Services, within a PERCos embodiment, are a pervasive set of services and/or processes that assist users during and throughout PERCos purpose cycle operations, including, but not limited to: formulating purposes, providing users with appropriate resource selection options, reasoning about and/or matching their inputs, and/or providing them with superior performance for resources operations. For example, Coherence Services embodiments may operate iteratively and/or recursively across Specification processing and/or operating resources.

For shared Purpose operating sessions, Coherence Services embodiments may resolve purpose(s), objective(s), and preferences of each Participant both individually as well as jointly to generate one or more shared purpose expressions. Coherence Services embodiments may detect, arbitrate, resolve, and/or cohere differences and/or incompleteness in the purpose expressions of individual users to produce a "practical" common purpose operating context. Coherence Services embodiments may also invoke, where applicable, Resonance services to provide resonance specifications for the optimization of such shared purpose operations.

One example of a Coherence Service is Coherence specification processing. Coherence specification processing may include, in some embodiments, detecting and/or attempting to rectify a wide range of limitations, imperfections, and/or exceptions, including, for example and without limitation, inaccuracy, lack of clarity, ambiguity, incompleteness, inconsistency, inefficiency, suboptimal selections, and/or requests for unavailable resources. Coherence Services embodiments may process specifications by, for example, checking for problems and/or harmonizing, optimizing, and/or integrating one or more sets of resources, including specifications. Coherence Services embodiments may also provide alternatives, constraints, extensions, operational variations and/or substitutions for operational efficiencies, expansions, contractions, interpretations, optimizations, simulations, facilitations and/or other operational process enhancements.

Coherence Services embodiments may harmonize user purposes with potentially available resources. For example, Coherence Services may arbitrate, integrate, complete, resolve, optimize and/or apply other Coherence directed processing in response to purpose priorities, environment governance, and/or any chain-of-handling and control requirements, as well as user-interface arrangements comprising PERCos session Foundations and/or Frameworks. These Coherence Services processing embodiments contribute to compatibility, completeness, and viability of operating conditions, and optimally employed, may enable the combination of resources to match and/or optimize the fulfillment of common purpose expressions.

Coherence Services embodiments may support a PERCos resource Management Service, which may dynamically manage operating resource Fabrics. For example, Coherence Services may check and/or monitor whether an operating resource Fabric is complying with its operating agreement(s). If not, Coherence Services might replace and/or rearrange its component resources. In some cases, Coherence Services may need to escalate and rearrange the resources of the operating session that contains the resource Fabric and/or negotiate a new operating agreement(s).

Coherence Services may utilize resources, including specifications and processes, to resolve conflicts, ambiguities, constraints, combinations, prioritizations and/or incompleteness within, for example, specifications, resource allocations, provisioning, monitoring and/or managing resource fabrics, during PERCos purpose cycle and/or other operations. Coherence Services may involve optimization methods, logical reasoners, ad hoc heuristics, and/or other AI techniques, such as expert systems, machine learning, and/or problem solvers. Coherence Services may invoke Platform Services, such as Evaluation and Arbitration, reasoners, Test and Result, and/or other PERCos services and utilities.

Coherence Services may be invoked during any PERCos operation. Coherence Services processes may be iterative, recursive, and/or concurrent. They may use information from various sources, for example, user dialogs, stored user and/or other Stakeholder preferences, published and/or actively provided expertise, and/or information derived at least in part from other session histories.

Any number of Coherence processes may be invoked within a PERCos embodiments session by different elements of the system at different times and/or places. Coherence processes within a session may be iterative, recursive, and/or concurrent. Coherence processes may use information from various sources, for example, user/Stakeholder interactions, stored user and/or other Stakeholder preferences, published and/or actively provided expertise, and/or information derived at least in part from other session histories. These processes may involve optimization algorithms, logical reasoners, ad hoc heuristics, and/or other AI techniques, such as expert systems, machine learning, and/or problem solvers.

Coherence Services may, in some embodiments, create a Coherence dynamic fabric (CDF), a dynamically aggregated arrangement of services and processes for providing Coherence activities associated with a user's purpose operating session. In particular, a CDF within PERCos is a pervasive set of services and/or processes that act to provide users with appropriate resource selection options matching their inputs and then provide superior performance for those resources operations in pursuit of users expressed purpose. As mentioned above, Coherence Services operate iteratively and/or recursively across both specifications and operating resources.

Coherence Services may provide a reasoning infrastructure for deploying a wide range of reasoning systems, including, for example, a system that composes, integrates and/or aggregates the results of reasoners. In some embodiments, Coherence Services base their decisions on knowledge structures that organize information/knowledge obtained internally as well as externally.

Users, especially those that do not have expertise in a particular purpose Domain, may have difficulty formulating purpose expressions that match their intent. Moreover, they may have difficulty identifying optimal sets of resources to fulfill their purpose. Resonance may provide users with experiences and/or Results that resonate with them by utilizing resonance specifications, which are methods associated with one or more purposes for enhancing resonance (i.e., reducing friction) of the results. Resonance specifications are generally created and published by acknowledged Domain experts and/or knowledgeable users with significant domain expertise. For example, an acknowledged Domain expert may create an optimal arrangement of resources listening to classical music. The expert may categorize user profiles into groups based on their knowledge level, interest, and listening environment. He/she may then create a resonance specification that would provide optimal resources for each group. For example, a resonance specification for novice users may identify resources, such as classical radio stations, that provide popular classical music. For mobile users, a resonance specification may identify "cloud" storage services for the convenient access to their music.

Resonance specifications are PERCos resources, and like other PERCos resources, they may have the following properties:

- Reputes that assert properties about them, such as their credentials/validity
- One or more descriptive CPEs, expressing their purposes
- Control, organizational, and interface specifications
- Other information, such as for example, metrics, metadata, one or more user/Stakeholder profile characteristics, and the like.

When a user expresses a purpose, resonance may evaluate the user's current context to check if there is a resonance specification that may be used to optimize user experience. Optimization may range from updating the user's current context by specifying processing variables/values sets that are specifically arranged to facilitate an optimally responsive result to such one or more purpose expressions to identifying optimal set of resources to fulfill the user purpose.

In some PERCos embodiments, resonance specifications may be categorized into two groups: resonance experience specifications and resonance results specifications. Resonance experience specifications may be published specifications for providing optimization of the quality of unfolding process, such as for example purpose operations, and the like. For example, suppose a user is interested in listening to a piece of music. There may be many ways (purpose experiences) for the user to hear the same piece of music. A resonance experience specification may provide strategies for the user to obtain an optimal experience, where such optimization may comprise the ease of obtaining listening experience, the medium for providing the music, and the like.

There may be a variety of resonance experience specifications. There may be some that optimize ease of use aspects of purpose experience. For example, there may be some resonance experience specifications that enable users to express their purpose expressions with minimal effort by requiring minimal input from their users. There may be resonance experience specifications for optimizing other ease-of-use aspects, such as for example, the ease of use in obtaining optimal resources. For example, consider a user who is interested in listening to classical music. For users who do not know much about classical music, a resonance experience specification may provide them with easily accessible, widely available media, such as classical radio stations. In contrast, for users who are much more serious about classical music, a resonance experience specification may provide them with customized experiences based on their user profiles, such as for example, their preferences for composers, recording artists, and the like.

Resonance results specifications enable one or more resource arrangements to be efficiently and effectively created, structured, built, and/or organized in pursuit of purpose experiences that focus on optimizing different aspects of purpose Results. There may be a variety of resonance results specifications. For example, there may be resonance results specifications that are created to produce results that commercially resonate with users. For example, suppose a decorator is interested in finding clients for their decoration services. For example a commercial resonance result specification may provide devices, systems, and methods to structure, aggregate, organize, and/or arrange resources for producing a list of potential clients who would most resonate with the decorator. For example, even though there are two clients who want to redecorate their homes, the decorator may resonate more with one client than the other, based on their specified tastes in home decoration. Other types of resonance result specifications may emphasize different aspects of Results, such as for example, organizational, structural, informational, and the like.

In some embodiments, Users may resonate with other users when such a relationship provides sufficient satisfaction for all parties. For example suppose users X and Y collaborate on a project which produces an Outcome that meets and/or exceeds their purpose, they may be said to resonate with each other for this purpose. In situations where each party has associated PERCos embodiments Participant resources for one or more purposes that may be used to enhance purpose satisfaction, then their Participant resources relationships may be declared by all parties to resonate and may include one or more sets of associated metrics.

Resonance specifications optimize specifications to purpose such that users may have an optimized alignment of their purpose and associated experiences. Resonance processes, methods and services assist users through identification and provisioning of one or more sets of specifications, which in some embodiments, may have been declared by acknowledged Domain experts and/or knowledgeable users with significant domain expertise. Resonance specifications may compliment users purpose expressions such that those users may understand and achieve optimized purpose satisfaction through enhancement of their purpose expressions and associated specifications (for example their preferences) leading to a situationally appropriate and responsive purpose experience.

Resonance specifications may reference and/or embed one or more method embodiments that may comprise computational expressions applicable to one or more specific purpose expressions (including for example purpose expressions associated with specific purpose classes) wherein such methods specify processing variables/values sets that are specifically arranged to facilitate an optimally responsive result to such one or more purpose expressions.

For example if a user has created a Contextual Purpose Expression "Learn Brake Wear," there may be Resonance embodiments that provide the resources that enable the user to benefit from, for example, an optimally responsive explanatory context for why and how brakes wear, typical wear rates for a range of vehicles and mileages, factors affecting such wear characteristics and typical repair and replacement techniques and timings.

In this example, Coherence Services and/or other processes may complement resonance specifications by offering a context for the CPE, such as for example providing the user a selectable list which may include: Car, Truck, Airplane, Motorcycle, General Principles, Train and the like—all of which may be linked to one or more purpose class systems and/or resonance specifications, enabling users to efficiently select which context best matches their purpose.

In some embodiments, resonance specifications embodiments generally may have undergone Coherence processing (at least initially by their acknowledged Domain expert creators) to ensure that they are suitable for implementation by other users. This may include undergoing one or more tests with appropriate Foundations and other resource arrangements.

Resonance specifications that are transformed into sets of operating resources may have metrics associated with them that may determine the degree of purpose alignment and satisfaction provided by those resonance specifications. For example this may be expressed as:

Purpose satisfaction metric expressed by users,

Purpose alignment expressed by acknowledged Domain experts (usually the creator of resonance specifications), and Purpose experience efficacy ratio being the relation between purpose satisfaction and purpose alignment.

Such metrics may be used by one or more resources and processes as, at least in part, an objective for purpose operations.

Optimization to user's purpose by expert arranged specifications of resource sets may include computational domain representations of other users.

Resonance specifications are PERCos resource types, and may include one or more algorithmic expressions applicable to specific purpose expressions (including for example purpose expressions associated with specific purpose classes). These methods specify processing variables/values sets that are specifically arranged to facilitate an optimally responsive Outcome to such one or more purpose expressions.

In many conventional computing systems, there are considerable discontinuities in the user experience caused through for example insufficient resources, resource performance variability and availability, incompatibility of resources, services and information, and the like. These discontinuities materially influence the experience of the user in their use of computing arrangements. The discontinuities, for example, may be total (such as loss of network connectivity), partial (such as reduced network connectivity, producing loss of audio and/or video quality), or incompatible (such as one information format not being available).

Traditional systems provide no consistent framework for matching between purposes, contexts, attributes, capabilities and operating resources (data objects, services, participants and computing assets, such as software and hardware), so as to provide optimal satisfaction of the intent of users and resource providers, while resolving issues that evolve from the independent declaration of purpose characteristics by disparate parties in the cloud.

Currently there are no distributed integrated computing environments that determine optimal operating conditions (for system, data, hardware, participants, and parameterizations deployment) so as to create optimal operating contexts reflecting user purposes through the generation of user interface outputs.

Coherence Services embodiments address the issues associated with delivering consistent, efficient and potentially optimized experiences for users across a diverse range of operating environments, within the PERCos architecture.

Coherence Services may act non-deterministically to offer alternate and "best fit" solutions to encountered conditions.

Coherence Services may not have the ability to determine a true best solution, but rather, make "best" approximations for optimization as applicable with user interaction.

Coherence Services are intended to operate in an imperfect world, and through lossy and potentially non-determinative processes, integrate inconsistent and/or incomplete instructions.

2 Coherence Services

Coherence Services embodiments may include hardware, firmware, software encoded on to non-transitory computer-readable media, and/or methods to enhance user purpose experience/Results via the following capabilities:

- A set of services to check, validate, cohere, de-conflict, resolve, integrate, harmonize, and/or reason about specifications (including preferences) for completeness, appropriateness, optimization, consistency, conflict and/or error resolution, and the like. The set of services normally includes evaluators, analyzers, monitors, testers, and reasoners.
- Providing users and/or other Stakeholders, and/or PERCos processes, with relevant information associated with and/or for purpose formulation, such as guiding users through sequences of associated purpose expressions. This may include, for example, providing a candidate set of edge classes that are relevant to a given purpose expression, providing optimized Results and/or other resources for fulfilling users' purpose experience, which may include relational associations, providing general guidance, and the like.
- Resolve purpose(s), and/or preferences of all Participants and other Stakeholders of Shared Purpose sessions. Such a purpose resolution generates a Shared common purpose expression. Coherence Services may detect, arbitrate, resolve, and/or cohere differences and/or incompleteness in Contextual Purpose Expressions of respective users and/or Stakeholders to produce an agreed shared common purpose operating context.
- In some embodiments, some or all Coherence processes retain history, and/or historically related information, by invoking one or more History Services. The History Services embodiments may store information regarding users'/Stakeholders' behavior (such as additions, deletions, modifications, and the like). Users, other Stakeholders and/or PERCos processes may make, organize, manipulate and/or extract such history information. Such processes allow, for example, a user to reliably reverse (undo) the effect of selected elements of a dialog and/or otherwise used as input for users, other Stakeholders, and/or PERCos processes.
- Provide processes to discover, assimilate, analyze, and/or match for similarity of resources in fulfillment of purpose specification.
- Optimize specifications and/or operating performance for:
  - Resources: identification, presentation, performance and operation of resources best complying with harmonized user/Stakeholder purposes. This may include: cost, efficiency, complexity reduction, resilience improvement, usability and interaction management, and/or any other specified consideration that may be readily apparent to those skilled in the art.
  - Resource arrangements: Including Constructs, such as templates, Frameworks, Foundations, resource Assemblies, knowledge organizations, Informational Patterns and the like.
  - Operating sessions: Processes to dynamically and operationally manage operating sessions to ensure that they provide optimal Results for their respective users. In particular, Coherence Services may instruct replacement of a resource with alternate resources that may improve the performance and for example Quality to Purpose and/or other metrics. In some embodiments, Coherence Services may maintain shadow resources so that it may efficiently locate alternate resources.
  - Users and/or other Stakeholders Preferences: Inferring and extracting preferences either directly or indirectly from historical and/or behavior information.
  - Knowledge organizations: Using and/or customizing knowledge organizations such as edge classes, declared classes, purpose classes, ontologies, Informational patterns and/or structures, databases, and the like.
- Provide scalable interoperable, extendable, and distributed management architecture for evaluating, analyzing, cohering, and/or reasoning about specifications, including resources in a consistent and practical manner.
- Capture informational patterns and structures, including, for example, knowledge bases, edge classes, declared classes, internal classes, mappings, and/or other metadata.
- Modularize Coherence processes, including optimization, across one or more resource arrangements such that each module may be processed locally.
- Apply one or more Coherence process across resource arrangement boundaries (interfaces) to achieve optimizations at higher levels.
- Undertake evaluations of resource arrangement boundaries (interfaces) to harmonize and to potentially optimize combinations.
- Provide first meaningful sufficiency of resources and then undertake successive refinements to dynamically optimize.

Coherence Services may use one or more sets of metrics, including those ranging from metrics employed for measuring purpose satisfaction to monitoring operating resources to ensure their compliance with their respective operating agreements. Use of metrics by Coherence Services may also include simulation of current and/or prospective operations and/or performance, optimization of resources and/or their specifications, arrangements, organizations and the like. Coherence Services may also use metrics so as to evaluate and/or provide alternatives.

3 Resonance Aspects

Resonance specifications are PERCos specifications that may be included in hardware, firmware, and software encoded on non-transitory computer-readable media and methods to optimize user purpose Outcome via:

- Resonance frameworks providing specifications and/or rules for analyzing purpose expression related information in order to modify and/or otherwise formulate purpose expressions to a form that may provide optimal user purpose fulfillment.
- One or more tool sets and/or methods to enable acknowledged Domain experts and/or users with domain expertise to create resonance specifications. Such resonance specifications, which when associated with appropriate user CPEs, couple experts' contextual expertise with users' purpose expressions, and assist users in achieving optimal purpose Outcomes and purpose satisfaction. Such methods may achieve their Outcomes by enabling the identification, evaluating, prioritizing, and/or provisioning of optimized sets of resources, including for example, Participants, for one or more purpose. This may include:
  - Identifying other users (in the form of Participants) for social networking, sharing, and/or collaborative work, experiences, Outcomes,
  - Identifying information, cloud services, computing hardware, and/or the like that may serve as best available Big resource purpose fulfillment.
- One or more tool sets and/or methods that publishers may use to publish resonance specifications internally, externally and/or in combination with any specifications (including for example rules). Examples may include specific times of use, timeframes (absolute or relative), authorized or intended parties, locations and/or any other identifiers including any characteristics.

4 Coherence and resonance in Support of Navigation and Exploration

Coherence Services and resonance specifications may help users navigate and explore dynamically evolving, intricate labyrinths of potentially conflicting ways, methods and/or opportunities for fulfilling their purpose experiences. In many cases, there may be multiple, possibly conflicting specifications for fulfilling any given purpose experience. For example, there may be multiple applications for fulfilling a given purpose, such as tax preparation. Determining which application is optimal may often depend on the user's circumstances, characteristics and/or profiles. For example, there are many tax preparation service providers to meet differing user needs. Resonance specifications may incorporate optimal sets of specifications to meet each user's specific needs. For example, for a user who has very simple needs, a resonance Specification may identify a basic tax preparation service provider. Whereas, for a user, who owns extensive stock portfolios, real estate properties, and/or a business, a resonance Specification may identify one or more tax preparation service providers that allows the user with access to tax law experts (e.g., CPAs, tax lawyer).

Coherence Services may complement resonance specifications by enabling users to specify additional attributes, for example Dimensions, Facets and/or metrics, such as Dimensions such as user expertise, resource material complexity and the like. Coherence Services then try to match the provided Dimension values with those of tax preparation service providers to recommend most optimal providers for each user.

Coherence Services may enable users to provision their operating session with optimal resources by managing a boundless universe of resource possibilities, with differing performance availability and/or cost characteristics. Users are often faced with having to deal with a bewildering number of resources, from refrigerators to super computers, car mechanics to professors, landline phones to smart phones, text documents to multi media. Unfortunately, their knowledge of available resources may be limited, or even, in real terms, marginal for their purpose. PERCos Coherence Service supports users in expressing their preferences for provisioning their operating sessions. PERCos enables users to express their preferred purpose experience through one or metrics. For example, some users may prefer quick results whereas others may prefer to wait a while in order to receive more complete, cogent results and/or free results. Based on their expressed preferences, PERCos Coherence Service enables assembly and aggregation of disparate resources into fluid dynamic configurations that provide optimal computing capabilities to fulfill users' purpose expressions.

5 Coherence Reasoning Service

Coherence Reasoning Service may utilize any number and/or type of reasoning systems, such as similarity, constraint based reasoning, heuristics, and the like to ascertain matching between one or more resources, including CPEs. Such Reasoning systems may be made available, for example, to one or more PERCos processes such as Coherence, purpose manipulations and the like. Reasoning services may create and/or interact with PERCos Dimensions and metrics, such as for example, nearness and/or Quality to Purpose.

Whenever possible, PERCos would incorporate and/or augment existing reasoners. For example, PERCos may use Description Logic to reason about classes, class instances and ontologies. In such a case, PERCos may use available Description Logic reasoners, such as Pellet, RacerPro, and the like. For example, Pellet is a tableau-based decision procedure for reasoning about subsumption, satisfiability, classification as well as support retrieval of knowledge elements and conjunctive query answering. Coherence Reasoning Service also may include rule-based systems, such as Jess, Drools, and the like, which infer information or take action based on the interaction of input and the rule base. In particular, in some embodiments, the Control Specification of some Coherence instances may specify that the instances use a set of rules to control its operations, such as which reasoners to use, how to integrate/aggregate Results from its reasoners, and the like.

Coherence Reasoning Service may include reasoning about, for example, the following properties:

- Consistency
- Sufficiency
- Optimization (including for resonance)
- Rights Prioritization
- Matching/Similarity
- Dimensions and metrics
- Purpose expression evaluations Coherence, in some embodiments, undertakes one or more processes to check and consider consistency of resources, including their specifications, operations, performance and/or other attributes. Consistency may comprise any number of processes arranged and undertaken in any order by Coherence, so as to make consistent and/or remove inconsistencies from PERCos resources and/or their operations. Coherence may use such processes as described herein during a purpose cycle and/or other PERCos operations to evaluate, validate, and/or modify such resources so that they are consistent individually, collectively and within themselves.

Consistency may be to the resource itself, such as for example using static typing to ensure a specification contains no contradictions. Consistency may also be within an arrangement of resources, such as for example a Foundation, where each resource needs to be consistent with the others for effective operations of the Foundation. This may for example include static and dynamic typing as well as other processes, such as checking data formats, interfaces and/or methods that are compatible for purpose.

Coherence when processing consistency, may involve information as to the degree of consistency, which may be expressed as consistency metrics, and may further for example, be predictive as well as calculated for any specific instance and/or time period.

Coherence may also undertake validation of consistency, which may have been expressed by other processes, including other Coherence operations, and may be incorporated in and/or referenced by resources.

Coherence may also use metrics such as sufficiency to establish the degree to which resources are consistent with the purpose operations intended to and/or being undertaken by the resource.

In some embodiments, Coherence may attempt to determine the degree of incompleteness of resource, and express this deterministically and/or probabilistically as metrics and/or information for other PERCos processes. This may be undertaken, as with all Coherence operations, in a recursive and iterative manner.

In a one to boundless world, completeness is a misnomer as there may be additional resources created and becoming available on a near continuous basis, such that for any set of specifications and/or results set there may likely always be other specifications and/or resource that may be added.

Coherence includes the notion of sufficiency, such that there are sufficient specifications and/or resources to satisfy the specifications expressing the purpose operations. Sufficiency may be determined through, for example, metrics, methods, calculations, declarations and/or any other form of specification of sufficiency.

In some embodiments, the degree of sufficiency may be used as a threshold or trigger for subsequent events and/or processing. For example specifications created through SRO process may become operational specifications, suitable for instantiation of operating resources, when Coherence Services have determined the sufficiency of these specifications.

In some embodiments, throughout PERCos processes and operations, sufficiency is determined, generally by Coherence, as the threshold for events and/or actions, such as for example including, presentation of results sets to users, transformation of specifications form one state to another (for example from specifications to operational specifications), for initiation, termination, variation and/or other, manipulation of resources and/or processes.

Coherence may operate to reduce operational friction and potentially optimize performance and operations of resources for user/Stakeholder purpose, efficiency (including of costs, financial, computational and/or otherwise), complexity reduction, resilience improvement, usability and interaction considerations and/or other considerations. This may involve further metrics associated with efficiency, which are described more fully elsewhere in this disclosure.

Efficiency metrics, which are those associated with one or more measures of efficiency, such as time, cost, number and/or type of resources, Coherence Services may include operations on specifications, in the form of rights, rules, preferences, and/or other determinative specification expressions. In some embodiments, these specifications may act to constrain and/or restrict the use of resources as defined by the specification creator. For example a publisher may restrict the use a resource they have published to certain users (including groups thereof), holders of specific Reputes, geographic areas, holders of one or more rights (including authorizations, authorities, tokens and the like) and/or any other constraint sets they have the authority to apply.

In some embodiments these rights, rules, and the like may have multiple prioritizations, such that these specifications are passed to an appropriate evaluation and/or arbitration service where the priority of the rights is determined, and consequently processed to ensure compliance with those rights.

This prioritized compliance may then be agreed between the resources and their managers, who for example in some embodiments, may be operating under specifications comprising rights and rules independent and/or in combination with the resources under their management, and the one or more prospective users of resources to which these specifications apply, to form an appropriate operating agreement for these circumstances. This operating agreement may, subject to the appropriate rights and rules, become a resource.

Coherence reasoners may integrate and operate with and as part of PERCos Matching and Similarity Services to reason about one or more resource sets to assess their similarities to some one or more properties.

In some embodiments, control specifications provide suitable specifications for matching and similarity operations to be undertaken on any CPE (both prescriptive and descriptive) this may include, processing, methods, ordering, transformations and/or other methods that may be applied to user purpose expressions (including CPEs).

Some embodiments may include manipulations of sets, for example where the input purpose expression (for example Core Purpose (verb and category) and/or Contextual Purpose Expression (CPE)) is treated as a set, and manipulated as such with one or more control specifications.

In some embodiments, PERCos Matching and Similarity Services may create and/or use token sets associated with users purpose expression, Core Purpose (verb and category) which may be initially matched to resources CPE (Core Purpose) to filter that sets of resources that may be presented as part of a Results set.

For example Coherence reasoners may be used, in some embodiments as part of PERCos Similarity and Matching and may include for example:

- One or more methods, such as for example, Chomsky Hierarchy of languages
- One or more logic structures of purpose expressions (implicit/explicit)
- Associated weights or values for each purpose expressions and any associated logic
- One or more Logic operators
- One or more Ordering functions
- Creation of one or more evaluation expressions (for example these may be control specifications) which produce one or more Result sets In some embodiments, matching and similarity, especially when used to further process and/or filter resource results and/or resource opportunities, through for example use of expert determined constrained auxiliary terms, for example prepositions, adverbs and the like.

In some embodiments, PERCos may provide one or more sets of standardized metrics which may, for example, be used for efficiency and/or interoperability. In some embodiments, such metrics may comprise standardized resources that are system wide, specific to one or more purpose Domains, associated with one or more users/Stakeholders and/or groups thereof and/or in other ways organized, and/or arranged for efficiency and optimization of purpose operations. These metrics and/or sets thereof may be extensible with appropriate processes undertaken to establish and/or publish such metrics.

PERCos may include standardized metrics, such as Quality to Purpose, which may be part of simplification systems, such as Dimensions, that enable efficient and effective evaluation of resource opportunities from a vast array of potentialities.

Coherence may incorporate and/or utilize metrics, characteristics and/or other information to support Coherence processes. Within Coherence operations any sets of metrics may be utilized, including for example including, complexity, consistency, optimization, modeling and/or other sets of metrics.

Coherence processes may utilize, including in for example, monitoring, tracking, manipulating and/or managing metrics across multiple operating sessions. Coherence may use metrics that span multiple operating sessions and/or multiple purpose operations. For example resource R1 may have a metric that is "high" for purpose 1, whereas resource R2 may have a "low" metric for purpose 1.

In some PERCos embodiments, resources may have metrics associated with their intended, current and/or previous operational usage. Resource metrics may be used, for example by Coherence and/or other processes (including purpose manipulations) to evaluate their selection and/or operations. Such evaluations may be undertaken in advance, during and/or after resource operations.

In some embodiments, such resource metrics may comprise two predominant groupings

- Resource purpose metrics
  - Those metrics that include expressions associated with purpose performance—for example may be expressed as "Fitness for purpose"
- Resource relationship metrics
  - Those metrics that reflect the relationships of one or more resources with other resources and/or resource arrangements, for example expressed as Conditionality Metrics may be used individually and/or in combination by Coherence and/or other processes to facilitate user purpose operations, such as for example, descriptive CPE and prescriptive CPE, Matching and Similarity Service and/or other reasoning that for example may be used to derive, purpose alignment and/or providing informational characteristics across the Edge to users.

Coherence services may aggregate and/or persist metrics for future evaluation and operations. In some embodiments, Coherence services may evaluate user outputs in the form of PERCos inputs and determine and/or creates appropriate metrics for further evaluation and operations utilizing available methods (for example through intelligent tools, linguistic manipulations, language formalisms, methods and the like.)

In some embodiments, PERCos provides metrics for operating resources, operating Constructs and/or purpose sessions. These metrics may be used by Coherence to identify, optimize, manipulate, specify and/or in other manners interact with operating resources, Constructs and/or sessions in pursuit of purpose.

This may include for example metrics such as:

- Degree of and for complexity of resources and their arrangements
- Degree of Sophistication of resources and predicates for interactions with such resources
- Degree of ambiguity for specifications, resources and arrangements thereof
- Reality integrity and assurance metrics dealing with reality of want is asserted
- Return on computational investment and overhead metrics for ascertaining efficiency and optimizations
- Adaption suitability metrics for determining the degree of resource and/or specification adaption that may be required for one or more purposes Operating session metrics, in one embodiment, are those generated by resource operations, and in one example may be monitored by PERCos Monitoring and Exception Handling Services.

Some examples may include:

- Resource utilization
- Performance
- Purpose associations
- Capacity
- Frameworks/Foundations associations 6 Coherence in Operation In a boundless universe of resources, from refrigerators to Super Computers, landlines to smart phones, text files to multi media the assembly and congregation of such disparate resources into fluid dynamic configurations that provide computing capabilities to meet users purpose expressions may require that these resource arrangements be harmonized and congruent within the context of those purpose pursuits.

Coherence Services provides the ways and methods for creating a purpose-congruent homogenous dynamically operating environment on the computational side of the Edge in response to and/or in anticipation of user's pursuit of their expressed purpose. Coherence provides correlation for purpose, between and amongst all resources.

Coherence Services attempt to create a balance between these resources, balancing the possible and pragmatic with the intended and ideal in a dynamic manner responsive to user purposes.

Without Coherence to smooth these interactions of resources, the discontinuities, incompatibilities, incompleteness and/or inconsistency in a boundless world are likely to provide experiences that, in common with systems today, often may not effectively provide the user with optimal purpose satisfaction.

Coherence Services may operate throughout PERCos purpose operations, including a PERCos purpose cycle and span all resource types involved in PERCos, including the three main types: classes, specifications and operating resource instances. Coherence Services may utilize Dimensions, metrics, characteristics, metadata and/or operational performance information to ascertain optimal resource arrangements in pursuit of user/Stakeholder purpose operations.

In some embodiments, Coherence Services provides the "intelligence" to PERCos by providing pertinent information that may optimize PERCos performance in providing users the ability to fulfill of their purpose. Coherence Services may operate iteratively and interactively across the entire PERCos purpose cycle, from purpose expression, purpose formulation phase, to Specifications, Resolution and Operations (SRO) phase, to assisting the provisioning and managing of the resources of the user's operating session.

Coherence Services may operate in a distributed and dynamic manner, enabling a PERCos session to adapt to changing external and internal operating conditions. Coherence Services enable PERCos sessions to adapt to external conditions, such as infrastructure failures (e.g., network impairment), external resources, and the like. Coherence Services also enables PERCos to optimize internal conditions created by a dynamic operating environment of PERCos platform services and users pursuit of their purpose objectives.

In some embodiments, Coherence operates at multiple levels each of which is interleaved and iterated into a common Coherence dynamic fabric to provide:

User Input selection and assistance (through for example classes, Dimensions and/or resource selections)

Specification selection, consistency, integration and/or optimization (through for example SRO)

Resource matching and operations (through for example metrics)

For example, as illustrated in FIG. 86, Three Levels of Coherence (example).

For example, during Purpose formulation stage Coherence may interact with expressed purpose to support formulation of a consistent CPE that balances the preferences and requirements of Participants, and the like. It may also arbitrate to remove detected inconsistencies during operating session stage, such as "over-ruling" a given set of specifications with specifications that have senior authority in any given arrangement. (For example distributed contributing contracts and rules from authorities (e.g. a government or administrator rule set) may supersede a Purpose Statement rule or rule set, including such superseding rule sets that may result from aggregated "cooperation" or "integration" of other independent Stakeholder rules established by contracts between nodal arrangements and/or users and third party governance authorities. Coherence may evaluate and create user/nodal session contracts by aggregating, in whole or in part, combinations of resource contracts, with node and/or user and/or purpose class and/or other logical organizations having relevant associated contracts to produce the operating contract arrangement that satisfies, and attempts to optimize in light of, all relevant Contract rules, rules sets, and values.) During SRO stage, Coherence may reason about resources, balancing the possible and pragmatic with the intended and ideal in a dynamic manner responsive to user purposes, and the like.

Coherence may operate across PERCos purpose cycles, and spans the resource types involved in PERCos. Coherence may utilize metrics, characteristics, metadata and/or operational performance information to ascertain the appropriate balance of resources for purpose operations.

Coherence may dynamically instance one or more PERCos and/or other services to create and provide an appropriate infrastructure to provide Coherence capabilities to one or more resources and their operations.

Coherence may utilize any and all PERCos platform services in any arrangement to meet the requirements and objectives of Coherence management. For example, Coherence may instance Monitoring and Exception Services and provide that instance with appropriate specifications for the effective monitoring of resource. In many embodiments these specifications would be part of the control specifications for the resource.

Coherence may utilize PERCos Evaluation and/or Decision Arbitration Services and/or provide those with control specifications so as to be able to manage one or more resources during their operations.

In some embodiments, Coherence management is an integral part of PERCos systems, forming the fabric by which the overall resource relationships are managed to provide an integrated and coherent environment with minimal friction as to purpose.

For example, as illustrated in FIG. 87, An Example "Generic" Service Structure.

In some embodiments, Coherence is a set of PERCos services, each comprising arrangements of Coherence managers and one or more associated resources, where resources may include PERCos Platform Coherence Services, PERCos Platform Reasoning Services and/or other PERCos platform or other services. For example, a Coherence service instance may comprise an arrangement of one or more Coherence manager instances, one or more Coherence processes providing a subset of capabilities, and one or more PERCos platform reasoners. In addition, like any PERCos service, the Coherence managers of a Coherence service instance may negotiate an operating agreement that defines the level of service they would provide.

The Coherence managers may use a set of metrics to evaluate their own performance. Coherence managers may use metrics to monitor and direct services specified by the operating agreement. For example, Coherence manager may detect that a currently operating resource is not meeting the specified operating metrics that may be required, and as such may act to substitute another suitable resource in its place. In some embodiments such substitution may be transparent to user purpose operations.

One or more Coherence services may evaluate user outputs in the form of PERCos inputs and determine and create appropriate metrics for further evaluation and operations utilizing available methods (e.g. linguistic manipulation/interpretation).

In some embodiments, Coherence both leverages the PERCos resource architecture and comprises an essential component thereof. For example, Coherence services receive inputs, evaluate them and instruct and/or communicate with, other processes based on those evaluations. Coherence managers, such as for example, PERCos kernel Coherence manager, invoke appropriate PERCos Platform Services, such as Evaluation Services, Decision Arbitrators, Stores and the like and manage the creation and flow of control specifications to those services so as to manage the "state" of the Coherence of the resources with which that Coherence manager is associated.

Coherence may concurrently be involved with associated PERCos Platform Services, involving user expressions, classes, specifications and/or operating resources and/or arrangements thereof.

Coherence Services may utilize one or more PERCos Platform Services and/or other services in any arrangement to meet the requirements and objectives of Coherence management. For example, Coherence Services may instance Monitoring and Exception Services and provide that instance with appropriate specifications for the effective monitoring of resources. Coherence Services may also include instances for PERCos Evaluation and Arbitration Services and/or provide those with control specifications so as to be able to manage one or more resources during their operations. In many embodiments these specifications would be part of the control specifications for the resource.

In some embodiments, Coherence Management is an integral part of PERCos systems, forming the fabric by which the overall resource relationships are managed to provide an integrated and coherent environment.

A user's initial expressed purpose is their attempt to provide a descriptive summary of their purpose. Generally, however, a user's initial attempts won't completely and precisely capture the user's purpose, especially if they are not an expert in that area. Relevant, and perhaps essential, nuances may be missing. The user may or may not be aware of these gaps. Many gaps may be due to their unconscious and subconscious threads of motivation and/or lack of precision regarding purpose. Coherence Services may enhance a user's ability to develop a better understanding of their purpose, and hence a better expression of it. Iterative Coherence processes may lead to an unfolding of purpose expressions as specifications within a session and to an increasing degree of clarity/focus for the user. In some embodiments, Coherence may provide and/or invoke Constructs and/or resonance specifications for users expressed purpose and may, subject to rules and rights associated with those specifications, combine one or more such specifications to align to user purpose, which may include selection by user form one or more options, enabling the provision to users of an optimal purpose experience.

It is often difficult, and sometimes impossible, for unaided humans to exactly express user purposes and the appropriate resources to satisfy them as complete, precise, machine-interpretable specifications. Expressed purposes may be inaccurate, incomplete, unclear, self-contradictory, too narrow, too broad, may require excessive and/or unavailable resources, and the like. Coherence processes are designed to make the overall experience more satisfying and effective, by easing the task of generating an adequate expressed purpose and/or by assisting in the process of discovering and arranging appropriate resources, including understanding conflicts and/or missing resource components, for that purpose.

In some embodiments, Coherence processes may assist in the translation from one class environment to the other (and perhaps back), guided by correspondence tables, user dialogs, expert systems, direct assistance from other users, and/or automatic methods.

Resources may have elements that come from one or more diverse sources, such as dialogs with users, preferences associated with actors, Participants, groups, purpose classes, contextual information, resource metadata, and/or system history. For example, even if each separate specification contributed by users and/or resources in a given session is clear, sufficient, consistent, and matched to available resources, their combination may not be, due to inconsistencies, antagonisms, and/or gaps involving the different sources. One or more PERCos embodiments may include Coherence processes to resolve such issues.

The resources initially known to be available in a session may not be sufficient to provide an adequate experience because:

- they lack necessary capabilities (e.g., a display, a database, software, and/or a network connection),
- their performance is limited (e.g., slow processor, insufficient memory, and/or excessive network latency), and/or
- they are not available to a sufficient degree (e.g., cost exceeds a monitory budget, access involves unavailable rights).

Some embodiments may include Coherence processes to discover, allocate, provision, and/or reconfigure resources to deal with such problems/requirements.

When appropriate, Coherence Services may use one set of resources to satisfy a Request for another set (e.g., substituting virtual machines for real machines—or vice versa, substituting remote resources for local ones—or vice versa, substituting a database for a computational process—or vice versa, substituting a touchpad for a mouse—or vice versa, substituting actual humans for avatars—or vice versa).

Substitution and/or variation by Coherence Services arrange alternate resources in a manner that satisfies the specifications of the requested resource (i.e., that fulfill its operating agreement). This may include consideration of, for example, whether competing resources may be used together, for example, in the same operating Framework and/or session. Decisions by Coherence may be intertwined with requests for user input and/or decisions that are reflected in an associated dialog.

Coherence Services may also allocate resources according to constraints from other than a user (e.g., a $50.00 content usage limit may be required by a content provider when no such limit was specified by a user; being limited to the use of a specific number of copies of content in a multiparty common purpose session).

Coherence Services is distributed and dynamic, enabling PERCos to adapt to changing external and internal operating conditions. It enables PERCos to adapt to external conditions, such as infrastructure failures (e.g., network impairment), external resources, and the like. It also enables PERCos to optimize internal conditions created by dynamic operating environment of PERCos platform services and users pursuit of their purpose objectives.

In some embodiments, Coherence Services provides the "intelligence" to PERCos by providing pertinent information that would optimize PERCos performance in providing users to fulfilling of their purpose experience. It operates iteratively and interactively across the entire PERCos purpose cycle, from purpose formulation phase, to Specifications, Resolution and Operations (SRO) phase, to assisting the provisioning and managing of the resources of the user's operating session.

Coherence Services, in some embodiments, guide users to formulate their purpose expressions (including CPE, Purpose Statements and/or other purpose and other specifications) by evaluating purpose expressions for possible inaccuracy, incompleteness, lack of clarity, inconsistency as well as check if they are too narrow, too broad, or may require excessive and/or unavailable resources, and the like. Coherence Services may also present alternate and related purpose templates and/or specifications in part or in whole to match a user's input purpose expressions. This process may be iterative and be supported by Coherence providing ways of completing, providing variations and/or alternate purpose options to user(s).

Coherence Services, in some embodiments, resolves specification conflicts, ambiguities, constraints and/or incompleteness between templates, specifications and/or session process operations for Foundations, Participants and/or other PERCos resources so as to enable generation of operating specifications.

Coherence Services for resource instances in some embodiments may flow through the SRO process to produce operational specifications. Operational specifications incorporate resource specifications and may comprise any arrangement of specifications, including specific resource identifications, Specification by class and/or type, specification by operational parameters and/or requirements and/or any other method of resource specifications.

Operational specifications may comprise, for example, specific resource specifications, for example "Hard_Disk=Mac_HD1_ID_2345" and/or by type/class, such as for example "Storage=Hard_disk, min_capacity=1Tb" or may be abstracted, such as for example, "resource Requirement=sufficient storage for process X" and/or may include operational parameters such as for example "resource Available=Storage>1Tb/max 2 hops/TRD<200 ms/Secure Level 6/Shared/Variance=Low", where in such an example resource is not explicitly defined, rather operational metrics and parameters are defined as a series of expressions, such as data storage capability (1 TB), network distance (2 hops), Time to access less than 200 ms, Security level, whether the resource may be shared and to what degree the capabilities may be varied.

For example, as illustrated in FIG. 88, Illustrative Simplified Example of PERCos SRO implementation Processing and Coherence Services interactions.

In some embodiments, Coherence Services may interact with operating session managers, PRMS, and/or other resource managers and/or delegates thereof in the negotiation of an operating agreement that optimize purpose satisfaction. The resulting negotiated operating agreement may comprise a number of control specifications that control the operations of the resources to which they apply, and again Coherence may interact with these specifications, often to set a baseline for resource operations and potentially to designate an appropriate PERCos Monitoring and Exception Handling Service instance to monitor the resource operations, based on the control and/or other specifications.

Coherence Services may in some embodiments create a Coherence dynamic fabric (CDF) to support and assist user(s) to optimally experience purposeful Results derived from their expressed purpose. Towards this end, CDF may attempt to provide alternate resources for one or more resources operating within an operating session. To optimize performance, Coherence Services may maintain and manage a collection of shadow resources and instruct replacement as appropriate. Coherence Services may also attempt to provide alternate control specifications. The control specifications may, in some embodiments, be arranged in the priority, order and/or probability of their being used within the operating session, and may also be associated with other resources and/or shadow resources, that Coherence Services may have arranged as alternates for those currently operating in an operating session.

FIG. 89 below shows a potential simplified implementation of such an arrangement of control specifications and shadow resources.

For example, as illustrated in FIG. 89, Illustrative Simplified Example of Coherence Dynamic Fabric.

Many of the aspects of Coherence Services involve calculation, estimation, probability, priority, availability and/or utility of the potential and current resources and/or their potential optimization for purpose. In some embodiments Coherence Services may attempt to evaluate resource variables so as to predict, simulate, optimize, damage limit, efficiently operate and/or deploy or in other manners to ensure that user purpose pursuit may be effectively undertaken.

Some examples of the types of considerations that Coherence Services may undertake are outlined below.

In some embodiments, Coherence Services may obtain information from a wide variety of sources and may utilize one or more knowledge bases to provide pertinent information in a timely manner to PERCos processes and services, thereby enabling them to optimize their performance. It may obtain information from users, including domain experts and/or Stakeholders, who may provide information, such as resonance specifications, Constructs, including for example purpose class applications, Frameworks, Foundations, classes (for example edge, declared, relational, purpose and the like), metrics, performance characteristics, and the like. Users may provide information directly as input to the PERCos system. Users may also provide information implicitly by publishing their information. Coherence Services may also obtain history information from user purpose operating sessions and/or their manipulations of resources.

In some embodiments, Coherence may utilize some of the following types of internally generated knowledge:

- Edge and declared classes and instances,
- Internal classes and instances,
- Mappings between edge, declared, relational classes and/or internal classes.
- Ontologies and associated lexical knowledge,
- Resource metrics,
- Conditionality,
- Complexity,
- Rules, rights and other specifications that Coherence may use to perform its services, such as disambiguate, de-conflict, resolve, and the like,
- Control, Organization and/or interface specifications,
- Other resource knowledge (e.g., performance characteristics, and the like).

Coherence Services, in some embodiments, may also tap into vast and complex global knowledge bases that are being maintained by external organizations, such as World Wide Web Consortium, whose members are committed to developing protocols and guidelines, thereby enabling collaborators in remote sites to share their knowledge as well as culture.

PERCos supports any form and organization of informational patterns and structures on the computational side of the Edge, including for example, class systems, ontologies, databases, directories, file systems, and/or other repositories. Coherence may interact with these informational patterns and structures to optimize them, within the context of users/Stakeholders purpose expressions, in support of purpose operations.

Coherence Services may, in some embodiments, dynamically, sequentially or in parallel, combine and/or alter informational patterns and structures in response to, and/or anticipation of, user interactions.

Coherence Services may support both PERCos and non-PERCos lexicon(s) and map the tokens of these lexicons to specific information organizations, including for example, ontologies. In some embodiments users may have their own ontologies and/or class systems and have their own lexicons pertaining to the domain of those ontologies and/or class systems.

Coherence Services may support both PERCos and non-PERCos lexicon(s) for encapsulating vocabularies for specific information organizations, including for example, ontologies. In some embodiments, users may have their own ontologies for their class systems and an associated lexicons pertaining to the domain of those ontologies and/or class systems.

Coherence Services may assist in the presentation to users of lexicons associated with one or more class systems (and members thereof).

Coherence Services in some embodiments may need to interact with a wide range of organizational structures such as, for example, databases, class systems, directories, repositories, cloud storage, and/or other virtual storage, unstructured and/or partially structured data and/or other organizational structures. Within PERCos this may include Constructs (including Frameworks and/or Foundations), classes and/or other PERCos and non-PERCos resources.

Many of these structures may, in some embodiments, have been created with one or more purpose's associated with them, and as such, Coherence Services attempts to optimize them for their purpose. Coherence Services may, for example, need to interact and manipulate these structures so as to provide the consistent computer side resource arrangements that enable users/Stakeholder to pursue their purpose.

In many example implementations, this may involve both knowledge structures and knowledge domains, which may have, for example been created by experts and/or other users and Stakeholders for their management of their resources. One example of these knowledge structures is Domain knowledge, where for example, users and/or Stakeholders, in some embodiments, may have a set of resources that are instantiations of their domain knowledge on the computer side of the Edge. In some embodiments, such domain knowledge may comprise that set of resources that the user has interacted with and retained.

For example, users may have arranged and/or expressed their domain knowledge and expertise in one or more knowledge structures (information structures). These structures may, for example comprise an ontology/taxonomy with one or more associated lexicons that may, for example, include attributes of the class structure. These may be shared across a group of users and/or Stakeholders. Within these domains, users may have, for example, specific arrangements of attributes of classes, such that multiple points of view are represented by such attributes (example being two opposing POVs—i.e. oranges are poisonous and oranges are not poisonous).

The ways to express such knowledge may include, for example, further lexicon/class structures declaring such POV (e.g. The Flat Earth Society) and expression of such relationships in terms of weightings (60% for POV A, 40% against POV A).

Coherence may act to provide ways to express such POVs, such that Coherence may align and/or provide resources in arrangements that enable user to consider and/or manipulate multiple POVs within a single knowledge structure in pursuit of their purpose.

In some embodiments, Coherence may undertake to enable the use of reasoners and mapping services that enable users to consider such multiple POVs and potentially use multiple knowledge structures that may have degrees of incompatibility.

For example, one key notion is that of information interchange, such that a term/attribute/class expressed in user domain A may be compared to another term/attribute/class in user Domain B, where user A and user B have no foreknowledge of each other. Such comparison may use reasoning and meta-reasoning systems and services to establish such comparisons, and each information store may, in some examples retain such relationships for further computational operations. Coherence may further store such relationships to assist further in purpose operations.

In one example the class orange in user1 Domain A, with knowledge structure B (e.g. an SQL database, with orange as key and index of attributes), may have, for example, 7 attributes, each of which, for example, may be considered and expressed as a node on a directory structure. When user 1 discovers user 2 in Domain B, with knowledge structure C (e.g. a classified ontology of citrus), and as user 2 may have for example, Creds to support their assertion of being an expert in regard of citrus and class orange, user 1 class orange may be mapped to user 2 class orange, even though the attributes in user1 class orange comprise, for example a subset of user 2 class orange and may additionally include some attributes not included in user 2 class orange (e.g. poisonous).

In this example, user 1, may choose to retain the relationship with user 2, through the class orange relationship, whereby each class may retain, for example as a resource the identity of the other class. Coherence may also retain this relationship for use in future operations involving class orange and/or CPE involving and/or referencing such class.

In the example of user 2, being an expert and for example having a multitude of other users access and utilize their expertise as expressed in their knowledge store, and class structure, may further wish to retain user 1 relationship classes, and expressly identify those attributes that are not in their knowledge structure, presenting them as variable attributes, with a calculated metric expressing, for example, the degree frequency of use, of such attributes, indicating potentially the relative "authority" or percentage of users who believe such an attribute is associated with the class. This may then demonstrate the range of attributes and belief of users to any given attributes of a class that has been defined by one or more users as having equivalence to a greater or lesser degree.

Coherence Services may act to predict and preempt user/Stakeholder and other PERCos operations through modeling, including simulating, resource arrangements, including specifications, operations and/or performance so as to include, for example:

- increase optimization and/or efficiency
- increase and/or decrease Complexity
- vary and/or manage Consistency
- map and/or adapt knowledge structures
- other processing as may be required to support user/Stakeholder pursuit of purpose.

In some embodiments, other processing may include Coherence undertaking simulation, using for example such technologies as N-Cube, to operate one or more potential resource arrangements in anticipation improvement, variance, completeness or other alteration of one or more Coherence specifications and metrics in pursuit of user/Stakeholder purpose.

In some embodiments, Coherence Services may utilize modeling and/or simulation techniques to evaluate proposed and/or anticipated Coherence arrangements, specifications, resource deployments, reconciliations and/or operating specifications. PERCos systems may create and use models, representing, at least in part, one or more aspects of cross Edge behaviors, processes, relationships and/or other representations. PERCos systems, in some embodiments, may use simulation to estimate the performance of various types (and/or arrangements) of resources, such as, user sessions, operating resources, resources that reside outside PERCos.

In addition to current standard simulation techniques, including virtualization, Coherence Services may use previously successful combinations, including substitutions and/or arrangements of specific resources and/or by type or other resource metrics, characteristics and/or categorizations. These, in one example, may be in the form of Coherence templates, Coherence Constructs, Coherence specifications and/or potentially as independent Coherence resources, with appropriate Creds, certifications, authentications, validations and/or governance.

In some embodiments, PERCos may integrate actual operating resources with simulation. For example, PERCos may simulate user behavior, preferences, declared classes and/or other user characteristics so as to develop user-PERCos communication possibilities. Such a case would integrate simulated user inputs and responses with actual PERCos operations.

Coherence Services may, for example, elect and/or be instructed to replay one or more Coherence History(ies) as the basis for another Coherence Services process and/or operations, and act to operationally vary that replayed Coherence History as the experience unfolds.

Proven Coherence combinations and/or arrangements of PERCos resources (including their elements) services, and/or information and their respective specifications, may be stored as PERCos resources for further operations. These may be associated with specific Frameworks, purpose class applications and/or other resource arrangements as well as created as ad hoc relationships for the satisfaction, at least in part, of one or more purposes.

These Coherence Services "sets" may be offered on commercial or other terms to other users and/or process as suitable for purpose and or experience, and may be treated as PERCos resources.

An example implementation of Coherence Simulation is shown below.

For example, as illustrated in FIG. 90, Illustrative Example of Coherence Simulation Embodiment.

Monitoring for Coherence operations, in some example embodiments, involves monitoring the unfolding experience and associated management of operating sessions including any associated resource managers (such as PRMS) for compliance with Coherence operational specifications, purpose expressions and/or any other specifications. Monitoring includes, in one example, alerting and reporting of events, combinations, thresholds and/or other parameters contained within Coherence operating specifications.

Coherence Services is a multi-dimensional PERCos platform service comprising, in some embodiments, PERCos Coherence Platform Services, distributed Coherence managers that, in on example, liaise with PERCos kernel operating sessions that form part of resource interfaces to collaborate and coordinate resources, including their associated classes and specifications and arrangements of such services and managers into Coherence dynamic fabrics that may support purpose operations.

Coherence Services, in some embodiments, operates at three levels, each of which is interleaved and iterated into a common Coherence dynamic fabric User input, interaction, selection and assistance (through for example classes)

Specification integration and optimization (through for example SRO)

Resource Operations (through for example metrics)

In addition there are Coherence processes that operate across all three of these levels and throughout the complete purpose cycle.

Coherence managers may interact with operating agreements. In some embodiments this may include invoking such an operating agreement with one or more resources to provide Coherence Services to those resources within an operating session. In this example, Coherence manager may base such agreement on specifications provided by resource and/or resource manager.

In other examples, Coherence manager may receive operating agreement from session and/or resource managers and then act to provide appropriate control specifications to those resources to enable Coherence operations. In further examples, Coherence manager may become a party to such agreement, combining Coherence manager operations performance with resource specification management and operational monitoring.

In some embodiments, Coherence Services may interact with operating session managers, PERCos resource Management System (PRMS), and/or other resource manager and/or delegates thereof in the negotiation of an operating agreement that for optimization of purpose satisfaction, through for example Coherence metrics. In some embodiments, negotiations may include establishing operating agreements that include providing Coherence Services to those resources within an operating session. Coherence Services may base such agreements on specifications provided by resource and/or resource manager.

FIG. 91 illustrates an example in which Specification, Resolution and Operations processing generates a Coherence operational specification in addition to the operating specification that specifies the resources the user purpose operation session needs to provide to fulfill user purpose expression. Based on the Coherence operational specification, CM2 may negotiate operating agreements with PRMS and operating session management (operating agreements 2 and 3, respectively).

The resulting negotiated operating agreements may describe the operations and services that CM2 would provide to PRMS and operating session management, such as optimizing the resource provisioning, monitoring the performance of the user purpose operating session and recommending replacements as appropriate. In addition, CM2 may support PRMS and operating session management to negotiate operating agreement 1, which may result in a number of control specifications that control the operations of the resources to which they apply. Coherence Services again may interact with these specifications, often to set a baseline for resource operations and potentially to designate an appropriate PERCos Monitoring and Exception Handling Service instance to monitor the resource operations, based on the control and/or other specifications.

For example, as illustrated in FIG. 91, An Example of Coherence Interaction with PERCos Services.

Coherence Services, in some embodiments, may segment operating agreements into their component parts and passing of parts to specified resources and/or those selected by Coherence as potential and/or current alternates to those specified.

In some embodiments, Coherence Services may interact with one or more control specifications for resources. Control specifications may be passed to resources and/or their managers, so as manage resources operations, and in some embodiments may be varied and/or substituted by Coherence Services as part of that resource's operations.

In many implementations, Coherence Services may interact with control specifications, so as to maintain the chain of control that may determine the resource use and operations. Coherence Services may, in one example, not undertake the enforcement of any rules pertaining to resources, but enable the communication of appropriate information to such enforcement mechanisms and may then, if appropriately instructed, undertake the communication of appropriate control specifications to resources.

Coherence Services may also, subject to rules and/or governance, vary and/or substitute control specifications in line with Coherence processes.

Coherence Services comprises a pervasive set of Platform Service instances, including Coherence manager instances that act to provide users/Stakeholders with appropriate resources (e.g. as opportunities and/or for selection) options matching their inputs and then provide superior performance for those resources operations in pursuit of user purpose expressions.

In some cases, as FIG. 92 illustrates, Coherence Services may invoke multiple Coherence manager instances where each Coherence manager instance may be assigned specific tasks. In FIG. 92, Coherence Services invoked five Coherence manager instances to manage purpose formulation, Specification processing, Resolution processing, Operational processing (SRO) and operating session, respectively. Each of these Coherence manager instances may instantiate support processes and services, including additional Coherence manager instances, as appropriate.

For example, the purpose formulation Coherence manager instance may instantiate an Evaluation and Arbitration instance that may disambiguate user's purpose expressions.

For example, as illustrated in FIG. 92, An Example Coherence Management Configuration.

Although the above example organized Coherence Services processes and services into a single Coherence dynamic fabric, a Coherence manager instance, if appropriate, may create its own Coherence dynamic fabric to organize its tasks. In FIG. 93, a Coherence manager instance is tasked with supporting purpose formulation. The Coherence manager instance decides to create its own Coherence dynamic fabric to encapsulate purpose formulation coherence activities. However, the Coherence manager instance may still interact and use the Coherence Services processes and services of its parent Coherence dynamic fabric.

For example, as illustrated in FIG. 93, An Example Coherence Management Configuration.

In some embodiments, Coherence Services comprises PERCos Platform Coherence services and Coherence managers. Coherence managers may, in some PERCos embodiments, be a component of PERCos kernel services, and as such be a part of every resource interface, providing ways for any resource to interact individually and/or collectively with Coherence.

Coherence Management processes may identify and/or propose candidate specifications, templates, resources (including information, Participants, devices, processing, classes, Frameworks, Foundations, resource arrangements and the like) and combine these in a manner to suit purpose operations of one or more users/Stakeholders in pursuit of satisfaction of their purpose expressions.

Coherence Management processes may employ a range of methods and associated processes to ascertain those resources that may utilized for purpose satisfaction. This may include taking input from other PERCos processing, such as for example PERCos resource Management Systems (PRMS) to provide alternate resource within purpose operations.

Coherence Management processes in PERCos may check resources arrangements, including specifications, for problems (including inconsistencies and/or incompleteness) and/or to "harmonize," "optimize," and/or "integrate" one or more sets of such resources, leading to superior experiences/results that integrate the interests of all direct and indirect users/Stakeholders in response to specified and/or derived purpose expressions. In some embodiments, this may involve checking Foundations and/or Frameworks to ascertain and validate appropriate consistency and/or operations of these resource arrangements. Coherence processes may detect and/or attempt to rectify a wide range of limitations, imperfections, and/or exceptions, including, for example, inaccuracy, lack of clarity, ambiguity, incompleteness, inconsistency, inefficiency, suboptimal selections, and/or requests for unavailable resources.

Coherence Services may, for example, also attempt to identify those resources that may be required and/or are missing for a purpose, such as for example a business conference, entertainment experience or similar. These may include both PERCos and non PERCos resources which have been identified specifically and/or by class, or other classification (including for example typing), through the use of specifications (including templates and/or purpose expressions), and/or through methodic analysis and/or other direct specifications.

Coherence Services, in one example, may manage priorities, through evaluation of alternate specifications to produce and/or modify an operating session that is consistent for the purpose (s) of the users/Stakeholders. Resolution of these priorities may be undertaken for one or more users and/or groups (and/or proxies) and may include prioritizations of the interactions, for example, with and between Participants and/or associated resources.

Coherence Services may interact with governance and/or other rules to enable one or more processes to determine the behavior, operations and/or performance of resources.

Coherence Services may dynamically arrange resources, including PERCos Platform Services and other PERCos and/or non PERCos resources to undertake Coherence operations, and in so doing may, for example, may utilize various PERCos Services to achieve their results.

In some embodiments, examples of Coherence processes may include, for example and without limitation:

- Determining, by logical and/or other ways, if a set of specifications is consistent.
- Arbitrating to remove detected inconsistencies. E.g., specifications may be "over-ruled" by specifications that have senior authority in any given arrangement. (For example distributed contributing contract and rules from authorities (e.g. a government or administrator rule set) may supersede a Purpose Statement rule or rule set, including such superseding rule sets that may result from aggregated "cooperation" or "integration" of other independent Stakeholder rules established by contracts between nodal arrangements and/or users and third party governance authorities. Coherence may evaluate and create user/nodal session contracts by aggregating, in whole or in part, combinations of resource contracts, with node and/or user and/or purpose class and/or other logical organizations having relevant associated contracts to produce the operating contract arrangement that satisfies, and attempts to optimize in light of, all relevant contract rules, rules sets, and values.)
- Detecting natural language words and phrases that may be ambiguous or otherwise unclear.
- Mapping declared classes and associated attributes to internal classes and associated attributes from one or more stores.
- Discovering and integrating relevant available purpose classes.

Identifying and resolving assumed, required, available, and discoverable resources, including parameters, variables and values associated with their intended, current and/or previous use.

Determining whether candidate sets of resources are internally compatible as a resource arrangement and consequently may be used together, for example within or comprising Framework, Foundation and/or operating session.

Allocating, resolving, reserving, amalgamating and/or arranging resources.

Analyzing sets of specifications, including classes to evaluate comparative advantages of different sets and/or arrangements and/or otherwise optimizing resource sets and/or arrangements.

Analyzing knowledge structures to evaluate advantageous mappings and correlations.

Identifying and/or creating suitable ways and methods that may ensure a match between a resource's component resources and its provided resource interface.

Interacting with resource Management, for example PRMS, for provisioning operating sessions with suitable resources.

Discovering and arranging further relevant resources to satisfy a specification, and/or otherwise modifying a specification to provide results that are contextually optimized in one or more ways.

Responding as necessary to exception conditions and/or failures, such as detected operating agreement violations, unscheduled unavailability of a resource, hardware crashes, and/or network partitioning.

Discovering, proffering, employing, and/or deploying applicable CPE, Framework, and/or Foundations.

Managing one or more sets of metrics, which may represent current and/or future states of purpose operations. This may include complexity, resource, purpose and other sets of metrics.

Optimizing one or more resource arrangements to meet one or more desired and/or may be required specifications, criteria and/or Outcomes.

Managing one or more sets of alternate resources in anticipation and/or preparation for varying operational states and/or purpose Outcomes, through for example shadow resources.

In some embodiments, Coherence processes may undertake resource substitution, that is, they may use one set of resources to satisfy a request for a different set. For example, they may substitute virtual machines for real machines—or vice versa, substitute remote resources for local ones—or vice versa, substitute a database for a computational process—or vice versa, substitute a touchpad for a mouse—or vice versa, substitute actual humans for avatars—or vice versa. This may require deploying appropriate ways and methods between one or more of the resources components and their specified interfaces.

Some examples of the methods, for example, that one or more Coherence managers might apply when attempting to undertake one or more Coherence processes, may include:

Logical reasoning (e.g., to test consistency)

Sets of transformations and/or other rules (e.g., to map between different standards)

Ontological mappings (e.g. to map between differing ontologies)

Knowledge structure mapping (e.g. to map between different knowledge structures, such as SQL database to ontology)

Table lookup and databases (e.g., to perform systematic substitutions)

Graph and/or tree matching methods (e.g., to find near-matches)

Optimization methods (e.g., to improve resource allocation)

Decision theory (e.g., to limit search)

to interpolate, to arbitrate)

Machine learning (e.g., to discover relations, to predict behavior)

Statistical inference (e.g., to cluster, to adaptively filter)

Expert systems (e.g., to assist in eliciting Expressed purposes)

Heuristics (e.g., to resolve inconsistencies)

Other AI techniques (e.g., to reduce the need for user interaction)

Net and/or local search, possibly including use of an "external" search engine (e.g., to discover relevant resources)

Use of remote Coherence services (e.g., to assist multi-user sessions, including identifying Coherence processes that may harmonize specifications of user purpose and/or optimize user purpose results)

Interaction with one or more users via one or more dialogs (e.g., to clarify unclear words or phrases, to seek further CPE, Framework, and/or Foundation recommendations, possibly with the assistance of one or more of the methods above)

Embodiments may use well-known computing techniques and/or new methods designed for particular purposes and/or problems.

Changes made at least in part by one or more PERCos processes—including, for example, other Coherence processes—may require invocation of one or more Coherence processes at various stages of purpose operations and/or session operations, making overall Coherence an iterative and/or recursive process. During such iterations, issues that cannot be resolved by Coherence and/or other processes such as for example resource management, through use of, for example specifications, rules, governance and/or deployment of one or more PERCos platform services, may be referred back to the user/Stakeholder via a dialog for their interaction.

Coherence processes may operate in a variety of structures, such as, for example, hierarchical, peer-to-peer, client-server, and/or direct invocation by one or more PERCos processes. For example, in some embodiments, SRO processing may include Coherence processes at each of the PERCos SRO Specification, Resolution, and Operating processing levels for each session.

Decisions by Coherence processes may be intertwined with interactions with one or more users and/or other Stakeholders and/or with decisions that are reflected in an associated dialog. Some examples of these interactions may include;

In the translation from declared classes to internal classes, an internal class or attribute may be associated with an ambiguous expression in a declared class and the user may be asked to make a selection, for example from an associated table or list or faceting arrangement, and/or otherwise provide further clarifying input.

One or more specifications may be detectably incomplete and additional information may be requested from one or more users/Stakeholders.

One or more specifications may have inconsistent elements and users may be asked to help by choosing among them, and/or otherwise modifying specifications, to achieve sufficient consistency. Users may be assisted in such selection or modification, for example, by Coherence and/or other system-generated suggestions.

- One or more specifications derived from different users/Stakeholders who are trying to form and/or modify a common purpose session may be inconsistent and one or more users/Stakeholders may be asked if they may accept certain compromises and/or may be asked to provide and/or suggest alternative specification elements.
- Resources may have associated costs (including for example pricing, computational processing, time and the like), which user may be requested to accept.
- Specifications associated with one or more resources may in some manner conflict with current operating specifications and/or specifications associated with one or more users and/or other Stakeholders. Coherence may request user interactions to resolve such a conflict.
- A variety of resources may be available to satisfy a specification and the user may be asked to select a preferred resource and/or arrangement thereof. For example user may have multiple suitable Foundations available and may have to select one.
- Coherence may seek one or more resources satisfying one or more elements of a user specification by providing Providers with "opportunity bids" where Providers may compete to satisfy the requirement. Embodiments may use a variety of methods to decide among satisfactory responses if there is more than one, e.g., first to bid, best offer, Dutch auction and the like.

It is often difficult, and sometimes impossible, for unaided humans to exactly express user purposes and the relevant resources to satisfy them as complete, precise, machine-interpretable specifications. A user's initial attempts, generally, may be inaccurate, incomplete, unclear, self-contradictory, too narrow, too broad, may require excessive and/or unavailable resources, and the like. This is especially true in cases where the user expertise in the purpose Domain is limited and/or the user is undertaking exploration in a purpose Domain. For example, the user may be missing relevant, and perhaps essential, nuances. Some incompleteness and/or imprecision may be due to the user's unconscious and/or subconscious threads of motivation and/or lack of precision regarding purpose.

PERCos embodiments support, assist, and/or guide users in formulation of their purpose specifications by enabling them to iteratively refine their purpose expressions. At each point of the iteration cycle, PERCos embodiments may evaluate the iterated purpose expressions for possible inaccuracy, incompleteness, lack of clarity, inconsistency as well as check if they are too narrow, too broad, or may require excessive and/or unavailable resources, and the like. In the process of purpose specifications manipulations, the PERCos system may enhance a user's ability to develop a better understanding of his/her purpose, and hence a better expression of it.

A PERCos system may interact, evaluate, align, resolve, cohere, and/or refine specifications to ascertain their validity to users expressed purpose. The system embodiment may manipulate one or more sets of purpose specifications and ascertain their validity to identify optimal arrangements of resources whose unfolding execution may provide experiences that correspond to that purpose specifications. Initially candidate specifications may be incomplete and/or describe resources in abstract/general terms and/or contextually.

Coherence Services may enhance the user's ability to develop a better understanding of his/her purpose, and hence a better expression of it. Coherence Services processes may provide overall user purpose experience that is more satisfying and effective, by for example, following:

- Guiding users formulate their purpose expressions, and
- Assisting in the process of discovering and arranging appropriate resources, including understanding conflicts and/or missing resource components.

Coherence Services may provide its operations iteratively which may result in an unfolding of purpose experience in a session. Such iteration may provide an increasing degree of purpose clarity/focus for the user. This may include the integration of resonance specifications in support of those operations.

Coherence Services, in some embodiments, may guide users to formulate their purpose expressions (including CPE, Purpose Statements and/or other purpose and other specifications) by evaluating purpose expressions for possible inaccuracy, incompleteness, lack of clarity, inconsistency, as well as check if they are too narrow, too broad, or may require excessive and/or unavailable resources, and the like. Coherence Services may also present alternate and related resonance specifications, purpose classes, templates, purpose class applications and/or specifications in part or in whole to match a user's input purpose expressions. This process may be iterative and be supported by Coherence providing ways for completing, providing variations and/or alternate purpose options to user(s).

Coherence Services may also contribute to superior experiences by ensuring that the interests of all direct and indirect users and/or other Stakeholders in response to specified and/or derived purpose expressions may be appropriately satisfied.

A user's expressed purpose may involve declared classes and terminology that do not precisely match the internal classes within a PERCos system. In some embodiments, Coherence Services processes may assist in the translation from one class environment to the other (and perhaps back), guided by correspondence tables, user dialogs, expert systems, experts, direct assistance from other users, and/or automatic methods.

Coherence Services, in some embodiments, may assist in discovering and arranging optimal sets of resources in pursuit of user purpose by using factors including for example, Dimensions, Facets, attribute sets and other associated metadata in the valuation and selection of optimal resources for purpose operations.

Coherence Services may resolve specification conflicts, ambiguities, constraints and/or incompleteness between templates, specifications and/or session process operations for Constructs (such as Frameworks, Foundations), Participants and/or other PERCos resources so as to enable generation of operating specifications. Resources may have elements that come from one or more diverse sources, such as dialogs with users, preferences associated with Participants, groups, purpose classes, contextual information, resource metadata, and/or system history. Even if each specification is clear, sufficient, matched to its associated resources, the set of specifications for all the resources in a given operating session may not be, due to inconsistencies, antagonisms, and/or gaps involving the different sources.

Coherence Services may also continue to monitor resources even after their initial selection to ensure that they:

- they have the necessary capabilities (e.g., a display, a database, software, and/or a network connection), their performance is sufficient (e.g., fast processor, memory, and/or good network latency), and/or they are available to a sufficient degree (e.g., cost remains within a monetary budget, access does not involve unavailable rights).

When appropriate, Coherence Services may use one set of resources to satisfy a Request for another set (e.g., substituting virtual machines for real machines, substituting remote resources for local ones, substituting a database for a computational process, substituting a touchpad for a mouse, substituting actual humans for avatars, or vice versa).

The substitution and/or variation by Coherence Services enables alternate resources to be utilized in a manner that satisfies the specifications of the requested resource (i.e., that fulfill its operating agreement). This may include consideration of, for example, whether competing resources may be used together in the same Framework, Foundation, and/or operating session. Decisions by Coherence Services may be intertwined with requests for user interactions and/or decisions that are reflected in an associated dialog. In some examples, this may require inserting a PERCos transformer, assimilator, compatibility layer, and/or other interface conversion mechanism, to enable suitable resources to operate effectively.

Coherence Services may also allocate resources according to constraints from other than a user (e.g., a $50.00 content usage limit may be required by a content provider when no such limit was specified by a user; being limited to the use of a specific number of copies of content in a multiparty shared purpose session).

In some embodiments, Coherence for resource instances may flow through the Specifications, Resolution and Operations process to produce operational specifications. Operational specifications incorporating resource specifications and may comprise any arrangement of specifications, including but not limited to: specific resource identifications, specification by class and/or type, specification by operational parameters and/or requirements and/or any other method of resource specification.

Coherence Services may in some embodiments create a Coherence Dynamic Fabric (CDF) to support and assist user(s) to optimally experience purposeful Results derived from their expressed purpose. Coherence Services may provide the CDF with an operating agreement that specifies the CDF's operations. For example, the operating agreement may specify that the CDF provide alternate resources for one or more resources operating within an operating session. To optimize performance, a CDF may maintain and manage a collection of shadow resources to replace faulting resources as appropriate. Coherence Services may also provide CDFs with control specifications, which in some embodiments may specify priority and/or probability of resources being used within the operating session, and also may be associated with other resources that Coherence Services may have arranged as alternates for those currently operating in an operating session.

The following sections outline how Coherence may interact with PERCos systems.

The PERCos class systems assist users, in a lossy manner, to identify and gather those resources that may satisfy their purpose expressions. Coherence interactions with class systems may operate to provide and/or vary classes for user selection and interaction.

Coherence, in one embodiment, operates across purpose cycle, and in so doing, may for example, interact with internal classes and declared classes in conjunction with, for example, purpose formulation and/or other PERCos resources.

In one example, Coherence Services may invoke similarity and matching methods that utilize the user CPE to identify those resources whose associated Core Purpose expressions are "closest" to the user CPE. These methods may include identification of other CPEs that may be used by users as adjuncts and/or replacements for their own. These CPEs may also have associated sets of resources, including purpose classes that maybe used, in whole or in part to satisfy user purpose. For example a user may select a CPE that has an associated resource comprising a purpose class created by an expert in the purpose Domain of the selected purpose of the user.

In some embodiments, Coherence Services may use one or more storage devices as a repository of class (and members thereof) and purpose expression relationships.

In some embodiments, Coherence Services may include the following approaches and methods:

- Use of directed graphs as history/storage medium for class/sub class selection,
- Use of "selection criteria" as Control specs for specification iteration/resource Operations,
- Use of SVM (Support Vector Machines) for declared class evaluations,
- Use of attribute sets comparisons across multiple Stated classes (e.g. Strawberry ice cream),
- Use of reasoning for cross ontology mapping,
- Use of Correlations between lexicons and classes, and/or
- Use of multiple class systems.

Specifications are utilized throughout PERCos processes and operations, from input and/or selection to output and/or execution. Coherence Services may support PERCos process and operations reduce friction by evaluating, resolving, and cohering specification conflicts, ambiguities, constraints, and/or incompleteness. Coherence Services may operate iteratively, recursively, and/or interactively across all PERCos specification operations. Coherence Services may operate, in some embodiments, throughout PERCos purpose cycle including from initial user input (class user purpose expression) through purpose formulation (class purpose), SRO, operating session and supporting resource management services to provide user experiences.

Coherence Services may generate specifications for use by its Coherence Services processes and/or other processes and/or resources. In some embodiments, Coherence specifications are treated in the same manner as other PERCos specifications. For example, Coherence Services operations may invoke a set of processes that produce a disambiguated specification to which resources may be associated. This may be undertaken, for example, in collaboration with SRO specification process and in aggregate may produce a purpose specification for SRO Resolution input. Coherence operations may include techniques such as: static and dynamic typing coupled with PERCos platform services, such as Arbitration and Evaluation Services, Test and Results Services, and the like, in any combination and/or arrangement.

Coherence specifications interactions may operate, in some embodiments throughout the full purpose cycle including from initial user input (user purpose expression for example CPE) through purpose formulation, SRO, operating session and supporting resource management services to provide user experience.

Specifications are utilized throughout PERCos process and operations, from input, interaction and/or selection to output and/or execution, and as such Coherence may act in an iterative, recursive and/or interactive manner across all PERCos specification operations.

In one example embodiment, Coherence specification operations may involve a set of processes that produce a disambiguated specification to which resources may be associated. This may be undertaken, for example, in collaboration with SRO specification processes and in aggregate may produce a purpose specification for SRO Resolution processes input.

In some PERCos embodiments, there may be multiple sets of specifications that are integrated as part of user purpose operations. These may include user purpose expressions, such as for example CPE, one or more sets of preferences (including those of users and their Participant representations and/or one or more Stakeholders) and/or other specifications that are derived from one or more stores and/or generated during users unfolding purpose. One aspect of Coherence processing is the determination of the order and/or priority of the specifications being processed. For example in some embodiments, Preference may be organized so as to represent one or more sets of Participant and/or Stakeholder rules sets, that may for example be universal, that is applied to all specifications within that stored Preference set and/or may be Stakeholder (for example government, company, group), other Participant and/or purpose specific (including instances, classes and/or other sets).

These preference sets may include one or more CPEs, which may have other associated information sets, such as for example Reputes.

Coherence services upon evaluation of the specifications involved may undertake processing in line with the priority and order determined, at least in part, by the rules sets.

In some embodiments, Coherence specifications operations may be considered within an example purpose cycle operation to comprise:

1. Computer Edge and Participant Processing support
2. Purpose Selection and Input support
3. Purpose Alignment/purpose formulation support
4. Specification Integration, including Specification, Resolution and Operations (SRO) processes
5. Operating session and resource Management support
6. Coherence Platform Services support In some embodiments, each of these broad Coherence operations may combine to form a Coherence dynamic fabric, in which each of these broad Coherence processing and operations, may interact with each other in any arrangement.

One significant advantage of Coherence processes being involved through the purpose cycle, is that decisions and selections made at any stage, often in some embodiment between resources of similar capability, value or other metrics, is the ability of Coherence, within the Coherence dynamic fabric to retain the context of the choices made and as a consequence, be able to suggest alternate choices should user vary their purpose expressions and associated specifications and/or operational necessity demand different selections/choices.

For example, as illustrated in FIG. 94, Illustrative Example of PERCos Cycle Processing Showing Example Coherence Interactions.

In some embodiments, Coherence Services may interact with SRO processes for integration and cohesion of specifications that may be made suitable for expression as operational specifications and subsequent instantiation.

Coherence Services may support and manage alternate resources, including specifications, reserved/allocated and/or reconciled resources and/or operating resources, in anticipation of user/Stakeholder needs, optimization, complexity management, modeling and/or other Coherence processes. For example, such resources may provide redundancy, alternatives, pre-emption and/or optimization choices for Coherence processes in support of purpose pursuit.

Coherence Services may provide processes to manage resources within an operating session providing, for example, such assistance as reliability, robustness, optimization, and the like. Coherence may utilize PERCos Platform services in any arrangement to support Coherence processes, including for example the following.

Within purpose cycle purpose formulation, Coherence Services may act to assist in purpose alignment. Coherence Services may act to assist in selection and specification of appropriate purpose options, including where appropriate resonance specifications and choices in line with user purpose expressions and associated specifications.

In one example embodiment, resource selection specifications may comprise generation of appropriate specifications, as complete as is possible, as an expression of purpose selections and supporting specifications such that resource resolution operations assign appropriate resources.

During operating sessions, Coherence Services maintains, and where appropriate optimizes, PERCos operations.

In some embodiments, Coherence Platform services comprise stores of specifications, templates, knowledge Organizations and other persisted Coherence resources, including specifications and/or operations that may be accessed to provide users alternate Coherence operations, specification, templates and the like for both purpose alignment and resource specifications.

In some embodiments, Coherence specification processes are involved in all aspects of purpose cycle operations, and in one example, may include:

Disambiguation
Contradiction resolution
Conflict resolution
Completion
Prioritization
Purpose Alignment
Shared CPE's
Reasoning Any and all of which may be undertaken in any arrangement, and may be interactive, recursive and/or iterative.

In some embodiments, Coherence processes do not necessarily imply use of formal methods however, Coherence specifications may incorporate precisely defined vocabulary, syntax and semantics, potentially expressed in the form of mathematical notations. This may incorporate Algebraic (LARCH (Guttag, Horning et al 1985, Guttag, Horning et al 1993)) and Model (Z (Spivey 1992), VDM (Jones 1980), Petri Nets (1981)) based or other formal language approaches.

In some embodiments, Coherence Services may not be able to complete any of the Coherence sub-processes and/or processes outlined below, in which case it may return incoming specifications and/or communicate messages to originating processes and/or their delegates.

In all of the following processes, there may be, in one or more example embodiments, a post condition of the process that details what identified problems have may or have been removed and/or resolved and what, if any properties of the process type remain. For example, an Outcome may be that n problems were identified and variations/substitutions/alternates/additions/extensions/constraints were inserted, such that the specification may now be executed, and an associated list of these actions would likely be written to history, which may then by other processes, such as for example TRS, be used to validate such an output.

Where a specification contains one or more specification elements that may have multiple meanings and/or have specifications that have more than one semantic and/or syntactic representation, Coherence process may disambiguate the specification.

Coherence process may produce through substitution and/or variation/modification, specification elements that are unambiguous and have consistent semantic and syntactic representation such that when passed to an appropriate process as defined by the specification, the specification elements may be interpreted in a manner consistent with that defined within the specification and executed accordingly.

The result of processing such specifications may be expressed in a determinative or non-determinative manner, depending on specifications and/or processes, however the specifications may be of sufficient clarity such that the executing process may execute the specifications without generating an exception.

Specifications may contain specification elements that are individually or in aggregate contradictory. Contradiction may include logical incongruity, including logic expressions such as First Order Logic (FOL).

Coherence process may operate to identify contradictory specifications, and attempt to resolve such contradictions or create exceptions to be passed to other processes, for example the process from which the specification was received.

Coherence process may operate to resolve conflicts in specification elements, where such conflicts are not necessarily contradictions, however they may cause instability or failures when executed. For example one specification element may require exclusive use of a resource, whilst another may require partial use of the same resource, a further example may be one specification element requiring resource One use parameter set 1, whilst another specification element may require resource One to use parameter set 2. In this second example Coherence would act to evaluate the parameter sets and identify if there is a common parameter set that may satisfy both requirements.

Coherence process may operate to identify conflicts and where possible resolve them however, such conflictions may be passed to specification originating process and/or user in the case where Coherence process is unable to resolve confliction.

Coherence process may operate to identify insufficient specifications and then where appropriate and possible, undertake processes to augment those specifications. Such augmentation may include determining, directly or for example through inference, the degree to which the specifications may be sufficient, where sufficiency may be an expression of that specification's ability to be processed by other subsequent process. For example if specification is such that resources may be identified for that specification's subsequent provisioning and/or operations.

Sufficiency processing may be on a "best fit" basis and may include one or more alternate specifications that may then be further processed, for by example, SRO Resolution processing.

Completion may be determined by any methods known in the art (such as Logic algorithms (Deville 1990)).

Coherence may identify priorities within specifications and order Coherence process and/or specification elements accordingly, such that the order of specifications is prioritized and/or the order of Coherence operations is prioritized, in a mutual arrangement and/or independently. For example, this may be the case where specifications have implicitly or explicitly expressed pre-conditions for specified operations and/or expressed an order of process operations as expressed by the specifications. Coherence process may also reorder and/or instantiate an order of specification elements in specifications.

Coherence purpose alignment operations provide matching and metric based/derived capabilities to users in the selection, editing and selection of their Purpose Statements and associated specifications.

Coherence specification operations may provide alternate Purpose Statements and/or specifications including parts thereof.

Purpose alignment may utilize all the Coherence process described above, and may include further processes derived, informed and/or subject to one or more sets of metrics, including for example resource Relationship metrics.

Common CPE are those of multiple user/Stakeholders that been combined so as to create a common purpose expression, that is agreed amongst the parties.

Coherence operates, in one example embodiment, to combine and/or reconcile purpose expressions from multiple users/Stakeholders. For example if the specifications of the users are in contradiction, Coherence may act, subject to the rules governing those specifications (for example if one user has administration rights), to create a consensus, through presentation of the choices and options for the specifications to users/Stakeholders.

Such Coherence operations may involve specifications of differing alternate resources that may satisfy the combined CPE, rather than the individual user CPEs that make up the common CPE.

In some embodiments, Coherence may use Reasoning Services to, for example and without limitation,

- detect contradictions in specifications, explain the nature of the contradiction and possibly suggest ways to fix the contradictions,
- identify conflicts between different specifications, provide explanations of the conflicts and suggest ways to fix the conflict,
- find resources that may satisfy a prescriptive specification when replacing faulting or non-compliant resources, and/or
- evaluate the behavior of a resource arrangement to determine if it is suitable for a particular purpose.

These possibilities are all made possible by PERCos embodiments that make use of specifications that are amenable to Reasoning Services to represent resources and resource arrangements. Thus, for example, it is natural to expect that Reasoning Services may be able to detect contradictions in specifications. There have been many attempts to make reasoning tools to explain and fix such contradictions and in recent years research in description logics has made this technology useful. This ability of reasoners to detect, explain and fix contradictions may also be used to detect, explain and fix conflicts.

In some embodiments, reasoning may be used to find resources that meet a particular specification. Thus, for example, an embodiment may use a triple store supporting description logic reasoning to represent resources and their specifications. Finding the resources meeting a given specification then becomes a simple triple store query. This type of capability could then be used by Coherence Services, for example, when replacing a faulting resource in a resource assembly.

In some embodiments, reasoning may be used to predict the behavior of a resource arrangement. In particular, specification templates may utilize Reasoning Services to compose specifications of resource elements into a specification of the containing resource. This type of Reasoning may enable Coherence to dynamically consider and choose alternative arrangements of resources when a resource element in a resource arrangement fails.

In one example embodiment, Coherence Resolution operations may comprise a set of processes that produce specifications that includes resource assignation, allocation and/or reservation suitable to be instanced and bound by further process, which in one PERCos embodiment, is an operating session. This is often undertaken in conjunction within SRO Resolution process and in aggregate produces operational specifications.

In one example embodiment, Coherence Resolution operations processes include:

Resource Availability
Resource Parameterization specifications
Resource Suitability
Resource Prioritization
Resource History Coherence may utilize one or more sets of metrics, which may include for example, complexity, optimization, consistency, modeling and/or other metrics to interact with Resolution processes for the production of specifications, including those that may be instantiated by, for example SRO processes, and those that may be managed as alternates by Coherence processes.

Coherence Resolution operations, in one embodiment, interact with SRO Resolution operating session process on incoming resolution input specifications, named in purpose cycle as purpose specifications, where, for example, PERCos SRO Resolution operating session may attempt to establish the availability and/or suitability of the specified resources in incoming specifications. In some embodiments, Resolution operating session, may be unable to establish and/or validate (reconcile) availability of specified resources (by for example, identity and/or type), and as such Coherence Resolution may, for example, undertake processing to address such situations, such as for example passing an exception to PERCos SRO processing, one or more operating managers, other Coherence managers and/or users/Stakeholders (including their representations) and the like.

Coherence may also act to provide one or more parameterizations and/or operational specifications for reconciled resources. Coherence may check alternate and/or specified resource availability through interaction with one or more resource management systems, such as for example PRMS, which may include resource directories accessible by Coherence management operations. This may include, for example, any resources controlled by and/or available to user/Stakeholder, and may further include Foundations and/or other resource arrangements.

Coherence may also communicate with PERCos platform Coherence management services and/or other Coherence managers to identify any resources and/or sets thereof that, in whole or in part, may be suitable for Resolution specifications. In one example this may be passed to resolution process for inclusion in operations.

Coherence may, during resolution operations create and manage alternate resource specifications, including interacting with resolution operations to resolve such specifications, so as in one example, to provide alternate resources (including arrangements thereof), in case these may be required by Coherence and/or other processes during purpose pursuit.

Coherence resolution process may operate to provide one or more parameter sets for any one or more resources included in resolution specifications. For example, these in turn may be ordered, prioritized and/or made conditional (including combinational) for further operations by appropriate operating sessions. Such parameterizations may be passed to operating resources through, for example PRMS, when an operating session has initiated resource operating conditions.

Coherence Services may manage alternate parameterization sets for use by Coherence and/or other processes.

Coherence Resolution process may make a determination on the suitability of resource, and arrangements thereof, specified in Resolution specifications and may offer and/or prepare alternative resources more suited to purpose operations and/or may prepare and provide alternative and or variations of parameter sets for inclusion in Resolution process output, operational specifications.

In one example embodiment, Coherence may utilize sets of metrics to evaluate and arbitrate which resources are most appropriate to purpose operations, and may prioritize those and alternate resources based on those metrics.

In one example of evaluating resources and/or arrangements thereof, Coherence Resolution operations process may, in one example, instantiate and/or invoke one or more PERCos Test and Results Service instances, so as to test a specified resource and/or access test results associated with that resource, such that determinations by Coherence resolution process, including Decision Arbitrator and/or Evaluation Services may be made as to the applicability/suitability/utility/performance/reliability and/or other characteristics of resource for specified purpose may be determined.

Coherence Services may invoke any PERCos platform services in any combination in an attempt to establish resource suitability and practicality for purpose operations.

Coherence resolution operations process may reorder and/or prioritize specifications and/or their elements. Coherence resolution operations process may also prioritize Coherence processing so as to optimize or in other manners manage Coherence operations within resolution operations.

For example Coherence Services may undertake tests for suitability on resources in an order that minimizes complexity and reduces dependencies, which is different form that in the incoming specifications.

Coherence Services may also, in another example, reorder the priority of specifications and their elements in alternate specifications, which may then be managed by Coherence for potential and/or future operations, including for example, modeling of resource behavior.

Coherence process may retain all Coherence Resolution operational processes. For example Coherence may invoke PERCos History and/or Persistence Services so as to create an appropriate store for such information.

For example Coherence Resolution operations process may interact with PERCos History Services to determine selection of one or more resources based on historical performance of those resources, and/or other information pertaining to those resources. For example, if resource 1 has a 100% reliability and resource 2 has 60% reliability, resource 1 may be selected.

Coherence Services may also, in a further example, retain historical information as to the specifications, including alternate specifications, so as to for example, create and/or manage metrics in relations to the performance of those specifications.

Coherence operating session operations, in one example embodiment, may provide a set of processes that assist in the management, performance and/or operations of operating resources. For example, this may be undertaken by instances of PERCos Coherence management services which are invoked by operating session management process to produce a stable, optimized and effective operating environment for users/Stakeholders in their pursuit of purpose.

In one example embodiment, Coherence Services operating resource operations processes may include:

Resource Operational Parameterizations
Resource Stability
Resource Continuity
Resource Substitution and Alternates
Resource Operating History
Resource Optimizations
Resource Operational Prioritizations Coherence Services may create and/or manage additional operating sessions comprising operating resources as alternatives to purpose operating session operations. For example Coherence Services may select and operate an alternative resource set (for example an alternative Foundation), which may then be supplied with the same incoming specifications/information as the purpose operating session and, in one example embodiment, may be swapped over for user, in a seamless manner so as to optimize user experience.

Coherence Services may interact with operating agreements generated between resources, and including resource managers, such as for example PRMS, and operating session managers. Operating agreements may be provided to appropriate Coherence managers by other PERCos resources and/or processes, such as for example PRMS and/or operating session management.

Coherence interaction with operating agreements may include segmentation of such agreements into their component parts and passing of these to specified resources and/or those selected by Coherence as potential and/or current alternates to those specified.

Coherence Services may further enter into appropriate operating agreements with resource Management and/or operating session management for provision of Coherence processes.

Coherence process may act to vary operational parameters of resources, and/or arrangements thereof, to achieve optimizations, complexity management, consistency, modeling and/or other Outcomes. For example, for a resource representing an audio amplifier, this may include increasing resource dynamic headroom (for example to allow for transient peaks in operational demand). Alternatively this may include increasing resource stability (through for example less throughput), decreasing dependence on one or more resources and/or to achieve other purpose operating session objectives.

Coherence Services may generate and/or store parameterizations in the form of resources (including for example specifications/files/objects/and the like.) that may be communicated to one or more resources, as for example control or other specifications, during resource operations. Coherence Services may further, for example, vary, in whole or in part, individual parameters and/or sets of parameters during resource operations.

Coherence operational process may act to interpret and/or evaluate resource stability through metrics associated with the resources, resource history, resource current operations metrics (from for example resource management such as PRMS) and/or other metrics and/or characteristics associated with resource and its performance, so as to for example, further evaluate resource stability performance within purpose operating sessions.

Coherence resource stability processes may include, for example, manipulation and management of metrics, characteristics, assertions and/or other information about resources, and/or arrangements thereof, operations (including in one example Foundations), such that the stability of the resource arrangement may be expressed, and where appropriate used by other resources, including for example Coherence managers, in their determinations and/or calculations. This may also include stability of, for example, a Foundation and reassessment of that stability when an additional resource is added to, and/or removed.

A further example may include the assessment and expression of the relative stability of two or more resources operating in an operating session in some arrangement, and may further include any other resource operations.

Stability may be dependent, for example, on throughput, input/output, control specifications and a range of other contextual considerations. In some embodiments, for example, these considerations may be quantized such that stability is expressed in levels of certainty of continued stable operations, enabling other resources, including Coherence to efficiently evaluate the impact of variations of resources and/or their contextual circumstances, in an efficient and timely manner.

Coherence process may evaluate the continuity requirements of one or more resources associated with an operating session, such that, for example, those resources that are critical to the operating session, for example communications devices in a teleconference, have suitable alternates and/or hot fail over strategies in place for continued operations. Coherence may assign and/or associate continuity metrics with one or more resources, individually and/or in any arrangements/sets.

Resource continuity may interact, for example, with PERCos history process to evaluate resource continuity and other performance metrics.

Coherence process may substitute/replace of one or more resources by another of similar, suitable and/or greater functionality capable of meeting specifications within, for example, an operating agreement. This may include for example, meeting specification elements including those for, performance, operational capacity, Repute and/or any other metrics, assertions and/or characteristics of the resource being substituted/replaced.

Coherence processes may operate one or more resources (shadow resources in one embodiment) in anticipation (pre roll) of resource substitution/replacement and effect “hot fail over” or “hot replacement” in a manner that is not disruptive to user experience purpose operating session. These alternate resources may be Shadow resources.

Coherence process may also interact with other processes that operate a schedule/listing of alternate resources that may be substituted for an operating resource should that operating resource become unavailable/unstable for any reason. For example a Cloud operator may have make available one or more alternate resources, such as for example Virtual Machines, that Coherence may then substitute in an operating session.

Coherence Services may operate to optimize any resource operations based on any metrics, characteristics and/or other information available to Coherence processes. Coherence processes optimization of resources may, for example include such strategies as;

- Optimization for resource—resource performance variables may be optimized, such as for example, by lowering power consumption, increasing throughput and/or reducing wait states.
- Optimization for user experience—resource parameters may be optimized for user experience, such as for example, increasing data throughput for increased display realism through increased frame rate, providing additional processing power for faster calculation capability (such as using methods on large corpus for topic identification), reduction of alternate resources to reduce user perceived complexity.
- Optimization for purpose—resource alignment, arrangement and/or parameterizations may be managed so as to optimize to purpose expression (e.g. CPE), for example, discovering resources for purpose from boundless, which may compromise optimizations above, such as lowering user experience fidelity (such as frame rates, video resolution and the like) and/or operating processing at or near resource limit, so as to provide maximum effort for meeting purpose expressions and associated specifications.
- Optimizations for efficiency—For example reducing resource operations in scale and/or scope to adapt constraint sets provided, for example, by Foundations of limited capability (e.g. Smart Phone rather than Games PC)
- Optimizations for complexity—For example, utilizing resources so as to reduce Results sets in terms of depth, scale and scope to enhance user experience and/or meet user selection. A further example may be to add additional resources to user purpose operating session so as to increase Results set, in terms of depth, scale and/or scope in response to user selection and/or other operations.

In some embodiments, Coherence Resolution operations may reprioritize operating agreements in response to results from monitoring services that determine that an operating resource arrangement is not performing adequately and/or changes to the operating specification. Thus, for example, in an operating resource where the resource elements are distributed over a network, e.g. perhaps as a client-server arrangement, monitoring services may discover that network communication delays are not the performance bottleneck that was expected. In such a case, Coherence may increase the CPU priority of server processes to improve the performance seen on a client.

Alternatively, changes to the operating specification may result in the need to reprioritize elements of a resource arrangement. For example, if the governance rules for a given arrangement change, Coherence Resolution may need to increase the priority of control specifications and resource Management components that are enforcing a policy on the resource arrangement.

In some embodiments there may be standardized processes that are available to all Coherence operations, such that Coherence managers and/or processes may invoke, communicate and/or interact with any of them as may be required. In this example embodiment, these services are all instances of PERCos platform services.

Coherence may utilize PERCos Platform Reasoning System services to create Coherence Reasoning System services that are particularly suited to Coherence operations.

Such Coherence Reasoning System services may include Matching, Similarity, Temporal Logic, and the like.

Coherence operations may be made persistent through a number of ways, including for example, snapshots, templates and/or specifications.

Coherence snapshots may, for example comprise Coherence operations that are made persistent in a manner similar to that of a VM, whereby all operational activities, resources and their supporting specifications are moved/copied to a storage device, from which they may be recovered at a later time. In some embodiments, this includes the state of the operations.

Coherence templates may, for example, comprise processing Coherence Operations such that state is removed from those operations and the resulting specifications and operational parameterizations are communicated to, for example, PERCos platform template services and/or other template service process for instantiation as PERCos Coherence templates. In one embodiment, these templates may then be published by an appropriate publishing service, for example, PERCos platform publishing services.

Such templates may then be stored in an appropriate storage device, such as for example PERCos Coherence repository, and may be accessed by Coherence and/or other processes to support purpose operations.

Coherence specifications may, for example, involve undertaking processing of Coherence Operations such that Coherence specifications for those operations are extracted and in made persistent, as for example, resources. These resources or other stored specifications, in whole or in part, may, in one embodiment, be available to Coherence Services and/or other process. These specifications may also be published by an appropriate publishing service, for example, PERCos platform publishing services.

In one embodiment, for example, these specifications may be processed so as to be converted to templates by for example, PERCos platform template services and/or other template service process for instantiation as PERCos Coherence templates, which may then be published.

Coherence Services may store any of these Coherence snapshots, templates and/or specifications by the originating operating session in any suitable and/or selected storage device. These persisted Coherence snapshots, templates and/or specifications may, in one example, be made available to other processes, which subject to Governance, may be associated with any other operating session, users/Stakeholders and/or other PERCos and/or non PERCos processes.

In one embodiment, these may also be published to Coherence Platform Services and be stored and managed by those services for the operational use of these resources, by other Coherence processes, for example, in pursuit of Coherence and/or purpose objectives.

In one embodiment, Coherence Snapshots, templates and/or specifications, collectively Coherence CAR (Coherence arrangement resources) "Objects" all have purpose and/or other Metadata associated with them such that PERCos process, including Coherence, may associate, retrieve and utilize these objects in support of Coherence and purpose operations.

In one embodiment, Coherence History may utilize PERCos History platform services to instance History services and/or utilize those instanced History services associated with operating sessions for the storage and management of Coherence specifications, processes and/or operations data and/or other Coherence information.

In one embodiment, Coherence platform services may have one or more repositories of Coherence resources and/or information, arranged such that Coherence processes may efficiently and effectively retrieve and utilize such information during Coherence operations.

| Function | Specification | Resolution | Operations | Platform |
|---|---|---|---|---|
| Disambiguation | Y | Y | Y | |
| Contradiction | Y | Y | Y | |
| Conflict resolution | Y | Y | Y | |
| Completion | Y | Y | Y | |
| Prioritization | Y | Y | Y | |
| purpose Alignment | Y | Y | Y | y |
| resource Availability | | y | Y | |
| resource Parameterization specifications | | Y | Y | |
| resource Suitability | | Y | Y | |
| resource Testing | | Y | Y | |
| resource Prioritization | | Y | Y | |
| resource History | | Y | Y | |
| resource Operational Parameterizations | | | Y | |
| resource Stability | | | Y | |
| resource Continuity | | | Y | |
| resource Substitution and alternates | | | Y | |
| resource Operating History | | | y | |
| resource Optimizations | | | Y | |
| resource Operational Prioritizations | | | Y | |
| Coherence templates and/or specifications | Y | Y | Y | y |
| Coherence publishing | y | y | Y | y |
| Coherence History | y | y | Y | y |

NOTE: The table above illustrates one example embodiment of Coherence processes and their arrangements, however other processes and/or arrangements may be instantiated in pursuit of purpose operations.

In some embodiments, each of these Coherence process, specifications, Resolutions and Operations operate in an iterative manner and may include feedback loops. In one example implementation, for any given instanced Coherence processes there is also the PERCos Platform Coherence management services which provides access to previous Coherence implementations, specifications and operations in, for example, the form of specifications, templates and/or persisted operational sessions, such that similar specifications and/or operations sets may be made available in an efficient and effective manner in pursuit of purpose.

Coherence Platform Services, in some embodiments, provide Coherence services to any arrangement of distributed Coherence management services instances. In some embodiments, Coherence Services processes may invoke, instantiate, and/or utilize PERCos Platform Services to support their operations. Such services may include for example:

- Coherence resource arrangement sets
- Coherence Platform processing services
- Coherence Platform Directories/Stores
- Coherence Platform specification ingestion
- Coherence Platform specification purpose alignment
- Coherence Message Service
- Repositories/Directories of Coherence specifications/templates,
- Repositories/Directories of Cohered resource arrangements,
- Repositories/Directories of purpose resource Coherence metrics,
- Distributed Coherence Services processing services,
- Coherence communications services,
- Coherence network arrangements,
- Coherence purpose resource relationships, and/or
- Any other organization of Coherence Services related resources, information and/or characteristics.

Coherence specifications, templates and snapshots, collectively Cohered resource arrangements, may be managed, evaluated, tested, published and/or stored by Coherence managers to provide suitable tested, validated and proven resource arrangements to support Coherence and/or purpose operations. In some embodiments, these may be, for example, Foundations and/or components thereof. In one embodiment, such arrangements may be evaluated for consideration as potential alternate Coherence/resource specification sets for Coherence Operations.

These arrangements, may, in some embodiments, be published as resources (for example as a resource arrangement), and as such made available as published "resource sets", and may include, for example, Foundations and/or Frameworks, potentially in the form of a marketplace or other commercial and/or non-commercial transaction/offering mechanisms.

In some embodiments, resources, in the form of, Coherence processing services may offer to Coherence managers and/or other processes to process Coherence specifications and/or Cohered resource arrangements. These resources may take the form of, for example, distributed/"cloud" services and/or operations, such that complex and computationally intense Coherence processing may be undertaken in a distributed manner. For example a particularly complex Coherence specification, including Modeling, may be passed from a Coherence Repository or other source to a Cloud based Coherence processing service, by a much less capable system, such as a Smartphone, where such processing of specifications may then return a result set suitable for that platform (Foundation).

These Coherence processing/services may be offered on a bureau basis including, commercial models, offering (significant) computational resources and/or expertise for specification processing and/or extended resource availability/operations.

Coherence stores, including for example, directories and/or repositories provide, in one example embodiment, ways for management, storage and retrieval of Coherence resources, including specifications, and/or other Coherence-related resources in a manner suitable for retrieval by Coherence Services or other process for Coherence and/or purpose operations.

Coherence Services may utilize any knowledge structures, including in one embodiment, class structures in such repositories.

In one embodiment, Coherence specifications may be accepted into Coherence Platform Services, such that they for example, may then be used and potentially relied upon by other Coherence Services. These specifications may undergo validation and testing through, for example, Coherence and/or other process including PERCos Evaluation and Arbitration, Test and Results, Creds and/or any other PERCos and non PERCos services so as to ascertain the validity of specifications for one or more purpose(s) with which they are associated.

These specification validations may, in one example, be issued in the form of Creds and/or other validation methods, including cryptographic methods and/or PERCos capabilities.

Coherence Services may create and/or utilize templates for one or more arrangements of resources and/or other Coherence information, such as resource and purpose relationships and associated metrics. The Coherence specification arrangements may be stored by Coherence Services as Coherence specifications and/or templates, which may then be employed, where similar or same purpose is expressed by one or more user/Stakeholders, subject to any constraints (for example rules and/or governance) applied by the originating expert.

Coherence Services may interact with Frameworks through specifications and/or Resolutions, such that Coherence Services may, for example, vary Framework specifications to meet variable resources in an operating session and/or Nodal arrangement differing from that in which the Framework may have been originally created. Frameworks may include specifications and/or templates for Coherence management and/or associated specifications.

For example, Coherence management may interact with one or more Frameworks through interactions with component Frameworks, resources, Participants and/or dynamic Framework operations. Operating sessions may comprise one or more Coherence dynamic fabrics, which incorporate one or more Coherence manager(s), such that an arrangement of Coherence managers may provide Coherence services to Framework operations and supporting specifications.

Coherence dynamic fabric (CDF) is a dynamically aggregated arrangement of resources, services and/or processes for providing Coherence activities associated with a user's purpose operating session. A CDF within PERCos may comprise a set of services and/or processes that act to provide users with appropriate resource selection options matching their inputs and then provide superior performance for those resources operations in pursuit of users expressed purpose.

Nearness, in some embodiments, may be used to arrange sets of resources, processes, Information, Parties and/or other PERCos objects that may be utilized by users in purpose Operations. These arrangements may have structure, such as hierarchy ("Level one") which may, on a methodic basis may be defined as closely matching user purpose to the user and where Level three may be defined as less close.

Nearness may be used to match such resources, Services, Information, Parties and other PERCos Objects sets based on the purpose unfolding of purpose Operations to provide users with suitable alternatives and extensions to the resource, Service, Information and Object sets that are instanced in the Coherence dynamic fabric supporting their purpose Operations.

Nearness may operate in conjunction with Coherence Simulation and/or Modeling in the process of definition of which resources, Services, Information, Parties and/or other PERCos Objects are deemed as relevant to purpose Operations and/or users.

Coherence Services, in some embodiments, may create a Coherence dynamic fabric (CDF), a dynamically aggregated arrangement of resources, managers and/or processes for providing Coherence activities associated with a user's purpose operating session. To support its interaction with user(s) purpose expression, Coherence Services may create a CDF to support and assist user(s) to optimally experience purposeful Results derived from their Expressed purpose. In particular, Coherence Service may create a CDF to comprise a pervasive set of resources and/or processes that act to provide users with appropriate resource selection options matching their inputs and then provide superior performance for those resources operations in pursuit of user purpose expressions.

A CDF may be a made into a resource, and may be composed with other Coherence Services and processes to form a new Composite CDF. CDFs may have states and retain states across multiple purpose sessions.

7 Resonance in Operation

A resonance process identifies optimal resonance specifications that match both user purpose as well as user characteristics. For example, consider a high school student who expresses a purpose of learning about the Theory of Relativity. Resonance needs to find a resonance specification that may provide Results that resonate with the student. If resonance may find only those resonance specifications that provide Results that the student cannot understand, then such Results would not resonate with the student.

Before incorporating optimal resources specified by a resonance specification, a resonance process may need to perform the following operations, in some cases:

Calculate quality to purpose

Check consistency with Foundation

Analyze risks

Control sharing

Resonance specifications may have metrics associated with them that express the degree of purpose alignment and satisfaction provided by those resonance specifications. PERCos may use a variety of methods to associate metrics with resonance specifications. In some embodiments, PERCos may use Reputes generated by the users of the methods. For example, consider a resonance specification that enables users to explore General Relativity. Users may create Reputes asserting their opinion on the effectiveness of the method. PERCos may analyze, evaluate, and/or aggregate these user generated Reputes to associate one or more Metric values with the method.

In some embodiments, PERCos may perform comparison analysis. For example, PERCos may provide users with two simultaneous sessions, one using the resonance specification and another without. PERCos may then request users for their levels of purpose satisfaction.

In order to support acknowledged Domain experts and/or users with expert knowledge who wish to create resonance specifications, some embodiments may provide PERCos Platform Services to evaluate, test, and/or validate resources specified by resonance specifications. For example, resonance Services may invoke Coherence Services to check that the resources are both internally consistent and consistent with target Foundation resources. For example, suppose a resonance specification is created to enable users to perform three Dimensional video modeling and photorealistic rendering. The resonance specification may specify some software, such as for example, Autodesk 3D max that is 64-bit version. Resonance Service may invoke Coherence Services to check that such software is compatible with target Foundation resources.

Reputes enable resonance specifications, like all other resources, to be used safely. At the time of their creation, publishers may associate Reputes with them. Users may specify Reputes values for resources used to fulfill their purpose experiences. For example, users may specify that they would like resources of highest Reputes to fulfill their purposes. In such a case, PERCos evaluates every resource, including resource specifications, before it uses to provide user experience.

In some cases, some publishers of resonance specifications may wish to collect user information, such as user profiles, feedbacks, and the like, to improve their methods. PERCos may enable users to control how much of their information they are willing to share with other users. One such embodiment may allow users to create resources containing information they wish to share and publish. Part of publication may include providing one or more control specifications that specify access to user resources.

8 Architectural Considerations

In some PERCos embodiments, there are a number of architectural considerations for implementation of Coherence services which include those below.

There are various points in PERCos embodiments sessions where it may be necessary or otherwise helpful to harmonize/optimize/integrate resources, including specifications, and/or assign or otherwise arrange resources and/or resource description sets. For example, during a session, Coherence processes may be invoked to check the consistency of one or more such sets of resources, and/or to refine them.

A user's initial Expressed purpose is an attempt to provide a descriptive summary of their purpose. Generally, however, first attempts won't completely and precisely capture the user's purpose, especially if they are not an expert in that area. Relevant, and perhaps essential, nuances may be missing. The user may or may not be aware of these gaps. Many may be due to his/her unconscious and subconscious threads of motivation and/or lack of precision regarding purpose. Coherence may enhance a user's ability to develop a better understanding of their purpose, and hence a better expression of it. Iterative Coherence processes may lead to an unfolding of specifications within a session and to an increasing degree of clarity/focus for the user.

It is often difficult, and sometimes impossible, for unaided humans to exactly express user purposes and relevant resources to satisfy them as complete, precise, machine-interpretable specifications. Expressed purposes may be inaccurate, incomplete, unclear, self-contradictory, too narrow, too broad, may require excessive and/or unavailable resources, and the like. Coherence processes are designed to make the overall experience more satisfying and effective, by easing the task of generating an adequate Expressed purpose and/or by assisting in the process of discovering and arranging appropriate resources, including understanding conflicts and/or missing resource components, for that purpose.

A user's Expressed purpose may involve user classes and terminology that do not precisely match the internal classes within PERCos embodiments. In some embodiments, Coherence processes may assist in the translation from one class environment to the other (and perhaps back), guided by correspondence tables, user dialogs, expert systems, direct assistance from other users, and/or automatic algorithms.

Resources may have elements that come from one or more diverse sources, such as dialogs with users, preferences associated with actors, Participants, groups, purpose classes, contextual information, resource Metadata, and/or system history. For example, even if each separate specification contributed by users and/or resources in a given session is clear, sufficient, consistent, and matched to available resources, their combination may not be, due to inconsistencies, antagonisms, and/or gaps involving the different sources. An embodiment may include Coherence processes to resolve such issues.

The resources initially known to be available in a session may not be sufficient to provide an adequate experience because, for example:

- they lack necessary capabilities (e.g., a display, a database, software, and/or a network connection),
- their performance is limited (e.g., slow processor, insufficient memory, and/or excessive network latency), and/or
- they are not available to a sufficient degree (e.g., cost exceeds a monitory budget, access involves unavailable rights).

Some embodiments may include Coherence processes to discover, allocate, provision, and/or reconfigure resources to deal with such problems/requirements.

When appropriate, Coherence may use one set of resources to satisfy a Request for another set (e.g., substituting virtual machines for real machines—or vice versa, substituting remote resources for local ones—or vice versa, substituting a database for a computational process—or vice versa, substituting a touchpad for a mouse—or vice versa, substituting actual humans for avatars—or vice versa).

The goal in substitution and/or variation by Coherence is to arrange alternate resources in a manner that satisfies the specifications of the requested resource (i.e., that fulfill its Contract). This may include consideration of, for example, whether competing resources may be used together in the same Framework, Foundation and/or session. Decisions by Coherence may be intertwined with requests for user input and/or decisions that are reflected in an associated dialog. This may require inserting an "impedance matcher," Transformer, veneer, adaptor, compatibility layer, and/or other interface conversion mechanism.

For example, as illustrated in FIG. 95, PERCos Simplified Example Service Component (an Example).

Coherence Architecture supports platform independence by utilizing PERCos unified resource interface framework. In some embodiments, as part of invocation, each Coherence service instance may be provided with appropriate specifications, including for example control specifications, interface specifications and Organization specifications by the invoking resource, process and/or any other methods. The interface specification may also specify one or more sets of methods by which other resources may interact with the Coherence Service instance.

In some embodiments, some Coherence computations may store and retrieve information, which may involve interacting with some physical storage media. Whenever possible, Coherence Services instances may attempt to structure itself such that its Invokers may not know (and may not care) where, when, and to what extent such storage, retrieval, and computation take place.

Coherence architecture embodiments support scalability, enabling a group of Coherence services and processes to be arranged into a Coherence dynamic fabric. In PERCos, Coherence dynamic fabrics comprise resources and their associated managers, and a Coherence dynamic fabric may incorporate additional services and processes as appropriate. Moreover, the Coherence dynamic fabric may be combined with other Coherence services and/or processes to form an even larger Coherence dynamic fabric that may provide even more capabilities.

Consider, for example, a large online concert that is going to be attended by a large number (e.g. millions) of users around the world. On the night of the concert, a large Coherence Services may create a Coherence dynamic fabric, CDF, to manage the relevant resources for the concert. This fabric may have multiple Coherence managers that, in concert with a content delivery company such as Akamai, manage the resources at a regional level throughout the world, to monitor and ensure that sufficient network bandwidth is available, to ensure that the network is not losing too many packets, to check local governance (e.g. is this content suitable for Korea and what constraints on the content delivery that may be required) and the like.

A Coherence manager in CDF may in turn create its own Coherence dynamic fabric, comprising subordinate Coherence managers. These Coherence dynamic fabrics may interoperate with each other in a peer-to-peer relationship, superior-subordinate relationship, and/or combination thereof.

This hierarchy of Coherence managers and Coherence dynamic fabrics may continue, as appropriate, to cover smaller and smaller regions of the world. When networks are not able to keep up with their operating agreements, a Coherence manager may adjust the operating agreements, routing and/or redundancy to handle the increased load. At a local level, when a user decides that she wants to join in to this concert, a Coherence manager examining the user's CPE may join the Coherence dynamic fabric to coordinate the cohering of the user's CPE, to check Governance (e.g. to determine if the user has paid to watch the concert) and to report new anticipated bandwidth needs to the Coherence manager for the controlling region.

In some instances, a Coherence manager instance may find itself with a set of operations that it cannot service sufficiently, for example due to the size of the operations. In such an instance, a Coherence manager may split such operations into groups of smaller operations (including tasks). Coherence manager may then create groups of lower level Coherence manager instances and assign such operations (including subtasks and/or sets thereof) to each lower level Coherence manager instance. This may be particularly appropriate when dealing with distributed computing arrangements involving multiple operating sessions.

For example, as illustrated in FIG. 96, Distributed Coherence Management Example.

For example, FIG. 96 illustrates a Coherence Services management of a distributed operating session. In this example, an operating session comprises operating session 1, operating session 2, operating session 3 and Participant 1 operating session. A CDF, called purpose Coherence Services, creates lower level Coherence Management Service instances, CohManSvc 1, CohManSvc 2, and CohManSvc 3 to manage purpose operating session 1, purpose operating session 2, and purpose operating session 3, respectively. In addition, it creates CohManSvc 4 to support Participant 1 operating session. These lower level Coherence Management Service instances are responsible for providing Coherence Services of their respective resources. In this example, the CDF has chosen to use master-slave paradigm. As a result, these lower level Coherence Management instances interact with purpose Coherence to receive their directions (via a control specification). However, in other embodiments, CDF could have chosen to use peer-to-peer paradigm. In such a case, the lower level Coherence Management Service instances may interact with each other using the peer-to-peer paradigm.

Since a Coherence Services process instance is a resource, and may be accessed by its resource interface, PERCos resource Management Services (PRMS) may associate functional specifications and control specifications with the instance. The PERCos resource architecture provides a uniform mechanism for substituting for missing components, responding to a wide variety of component failures, dynamically adding or removing components, incorporating legacy components, optimizing component selection, and the like. For example, if a Coherence Service instance fails to comply with its functional specification, PRMS may provide the ability to replace the failing Service (or an element thereof) with a suitable alternate.

In a boundless world Coherence Services may find management of the multiple variables that may be required to provide a Coherent experience to users/Stakeholders, extremely complex and involving substantial numbers of resources. In some embodiments, Coherence Services manage such complexity through one or more sets of simplifications, such as for example Master and auxiliary Dimensions complimented by one or more sets of metrics. This approach of filtering potential resource opportunities through multi stage evaluation of, for example:

- purpose direction simplifications, such as for example Master Dimensions and Facets
- Repute Master Dimensions, such as for example, Quality to purpose metrics enabling effective selection of candidate resources
- Resonance specifications, for example providing expert pre-selected resources and/or processing for optimum user purpose Outcomes
- Resource Characteristics specifications for example for selection of one or more resource attribute sets that reduce overall resource arrangement complexity
- Constructs selections, for example selection of pre-existing resource arrangements that have associated purpose expressions which match and/or are similar to user purpose expressions
- Resource arrangements and assemblies, for example where such arrangements and assemblies are known to operate effectively, independently and in combination, which be expressed, for example though one or more metrics All of the foregoing may be evaluated in any order, priority, arrangement and/or combination so as to ascertain the degree to which one or more resources may, for example, be available, to operate in an effective, efficient and at least to some degree, frictionless manner, with one or more other resources in support of purpose operations.

These Coherence services operations may, in some embodiments, reduce, at least in part, the degree of complexity of resource combination arrangements. This may include, for example processing by Coherence Services to simplify options and/or interaction choices that may be presented to one or more users/Stakeholders. This processing, in some embodiments, may act initially to assist users with formulation of their purpose specifications, which in some embodiments, may include multiple sets of specifications (such as user and/or multiple Stakeholder preference sets and multiple resource opportunities.

In many embodiments, Coherence Services may undertake processing to minimize friction across resource specifications, operations, utilization management and/or manipulations. Coherence metrics, associated with resources, may be, in on example used extensively to enable Coherence managers to effectively implement consistency among resources.

Coherence Services processes for minimizing friction may include reasoning about specifications to ensure that there are no explicit contradictions monitor operating resources to identify potential consistent operation of that resource in relation to that resources operating agreement and/or in conjunction with other resources.

In some embodiments, optimization in Coherence Services comprise the relative optimization of one or more resources and their associated methods, attributes and/or parameters so as to create an experience for one or more users/Stakeholders that is well aligned to the purpose expressions and/or user/Stakeholder interactions.

Coherence Services may act to identify and optimize for one or more Participants, experiences, in whole or in part, based on available resources, services, objects and/or information and operating conditions to enhance Coherence stability and/or performance. An example may be the provision of a wider bandwidth communication, if such bandwidth is available and if there are no commercial, technical and/or governance restrictions on this resource, such that operational stability and/or performance is enhanced.

There may also be cases where one or more Participants operating specifications identify more available and/or stable resources and as such Coherence Services may act to utilize these resources in preference to others of similar capability.

Coherence operating specifications may include optimization parameters and potentially, by reference or embedding, methods, such as by example, goal seeking and the like, that Coherence managers may act upon to provide additional stability, efficiency, compactness or other specified optimization characteristics. Typically this would include prioritization data for resolution of potentially conflicting optimizations, which may be expressed declaratively or by algorithmic expressions, such as by example Bayesian, probabilistic and/or other statistical methods.

In some embodiments, there may be a wide range of resource, knowledge and/or data organizational structures that Coherence Services may interact with. These may include, for example, knowledge systems, databases, class systems, directories, repositories, cloud based stores, and/or other virtual storage, unstructured and/or partially structured data and/or other organizational structures. This may include for example resource and information sets that are, for example, interim results sets, that have yet to undergo evaluation and organization.

Within PERCos this may include Constructs, such as Frameworks, Foundations, classes and/or other PERCos and non-PERCos resource arrangements and assemblies. Many of these Constructs may have been created with one or more purposes associated with them, and as such, Coherence Services may attempt to optimize and orient them. Coherence Services may interact with these Constructs so as to provide the consistent computer side resource arrangements that enable users/Stakeholders to optimally pursue their purpose.

In many example implementations, such Coherence interactions may involve purpose Domains, knowledge organizations, and/or one or more Constructs, which may have been created by experts and/or other users and/or Stakeholders for their management of their resources associated with those purpose Domains. One example of these knowledge organizations is Domain knowledge, where users and/or Stakeholders have a set of resources that are instantiations of their purpose Domain knowledge on the computer side of the Edge. In these embodiments, such purpose Domain knowledge may comprise that set of resources with which users/Stakeholders have interacted and have opted to retain. This may include one or more sets of information pertaining to those resource arrangements, for example information sets representing such resources. This information set may then be made available, for example published as a resource, to other users, and at least in part, may be used to represent a profile of that user/Stakeholder in relation to one or more purposes. These resource sets may also then be used for evaluation by one or more other users/Stakeholders, resources and/or processes.

For example, users/Stakeholders may have arranged and/or expressed their purpose Domain knowledge and expertise in one or more knowledge organizations, such as informational patterns and structures. These knowledge organizations may comprise an ontology/taxonomy with an associated lexicon that includes attributes of the class system. These may be shared by a group of users/Stakeholders. Within these purpose Domains, users may have specific arrangements of attributes of classes, such that multiple perspectives/Points Of View (POVs) are represented by such attributes. An example of two opposing POVs is "Oranges are Poisonous" and "Oranges are not Poisonous."

The expressions of such knowledge organizations, may include, for example, further lexicon/class structures declaring such POV (e.g. The Flat Earth Society) and expression of such relationships in terms of weightings (60% for POV A, 40% against POV A). In some embodiments this may be represented using PERCos Counterpoint techniques.

Coherence Services may act to provide expression for such POVs, such that Coherence Services may align and/or provide resources in arrangements that enable user/Stakeholder to consider and/or manipulate multiple POVs within a single knowledge structure in pursuit of their purpose.

In some embodiments, Coherence Services may undertake to enable the use of PERCos Platform Reasoning Services that enable users to consider such multiple POVs and potentially in multiple knowledge organizations that may have degrees of incompatibility.

For example, consider information interchange where a term/attribute/class expressed in user domain A may be compared to another term/attribute/class in user Domain B. User A and user B have no foreknowledge of each other. Such comparisons may use Reasoning and Meta Reasoning systems and services to establish such comparison metrics (including for example equivalence), and each information store may retain such relationships for further computational operations. Coherence Services may further store such relationships to assist further in purpose operations.

Coherence Services may interact with PERCos Constructs during any phase of their operations, including as specifications and/or operating resources.

In some embodiments, Coherence Services may help users create Constructs, such as Frameworks and/or Foundations. The supporting Coherence operations may then be associated with such Constructs as Coherence Services embodiments, including specifications and/or persisted operating resource states (such as a Coherence manager and associated specifications at the start of Framework operations).

In some embodiments, where operating Frameworks fulfill one or more user purposes, Coherence Services operations may be stored as specifications for use in circumstances where user/Stakeholder, purpose and/or Constructs are used at a later time.

In some embodiments, Coherence specifications and Management may also form a PERCos Construct, where the specifications of such Construct, include (by embedding and/or reference) specifications of the associated Constructs and resources to be cohered.

9 Coherence Management

Coherence Services, like other PERCos Platform Services, has capabilities to organize and/or manage all aspects of Coherence Services process activities independent from the processes themselves. In some embodiments, Coherence management may employ PERCos resource Management Services (PRMS) with appropriate Coherence specifications, to implement Coherence Management operations.

When a Coherence manager instance is invoked, it may be provided with control specifications that define the sets of services it needs to provide along with any values/variables, metrics and/or other metadata.

Coherence Services may be involved and integrated throughout PERCos operations throughout all phases of PERCos purpose cycle, including, for example, purpose formulation, specification, Resolution and Operations processing, and operating phases. For example, a purpose formulation phase may involve Coherence Management interacting with initial purpose expressions and specifications as expressed by user/Stakeholder and associated appropriate PERCos processes. This may include other Coherence managers and SRO processes. For the SRO processing phase, Coherence Services may participate in the creation of operational specifications, and in such role, evaluate and validate their consistency, sufficiency, and the like.

In this example, such operational specifications that have undergone Coherence Services processing, may be non-conflicting, unambiguous and conform to any applicable standards (standards may be user defined, affinity/group defined, administrator defined, and/or specification defined) so as to enable those specifications to be instantiated as part of an operating session.

For operating phase, Coherence Services may act upon the incoming operational specifications to initialize Coherence system managers and process that may be required to support the operating specifications. For example, Coherence managers may instance further Coherence managers for Constructs, resource arrangements, Coherence dynamic fabrics and/or PERCos network nodal arrangements. Coherence Manages may provide resource identification, assignation and/or reservation through appropriate PRMS and/or relevant resource reservation services in line with Coherence specifications. Coherence Services may interact with rules and policies expressed by one or more Stakeholders (including users).

Coherence managers may, in some PERCos embodiments, be a component of PERCos kernel services, and as such be a part of every resource interface, enabling any resource to interact individually and/or collectively with Coherence.

Coherence operations may include instances of Coherence dynamic fabrics and associated Coherence managers, with appropriate operating resources and processes.

Coherence managers may be configured for both local (nodal) and distributed operations across one or more resource arrangements (including for example Constructs) and any arrangements of sessions (operating and persisted) involving any resources, processes and/or PERCos platform services.

Some examples of Coherence Management may involve a range of arrangements/configurations, including:

- Individual
  - Optimized for single Coherence manager or set of managers acting independently, each with individual operating specifications and PERCos platform services instances such as, History, Arbitration, and the like.
- Peer-to-Peer set
  - Coherence optimized across a group of local Coherence Mangers to achieve best overall Outcome for the group, involving shared operating specifications with local iteration of non-shared parts of specifications including for example multiple Histories for each Participant and their Foundations and/or Nodal arrangements.
- Master-Slave model
  - A Master Coherence manager manages one or more slave Coherence Manages for optimal Results.
- Network model
  - Wherein local Coherence manager delegates to one or more network Coherence managers for shared Coherence Management including standardized operating experiences, with shared operating specifications and shared History.

These example Coherence Management arrangements may generally be considered as Peer-to-Peer (including Single Peer) and central management. These are outlined below.

For example, as illustrated in FIG. 97, Multiple Users with a Shared Purpose.

Multiple Coherence managers may peer with each other and/or have other arrangements that enable them to communicate their status, specifications and agreed operating agreements such that each Coherence manager instance may instruct those resources for which it is maintaining Coherence to act in accordance with those Coherence managers instructions.

For example, as illustrated in FIG. 98, Multiple Users with Multiple Operating Contexts.

In some embodiments, one or more Coherence managers may operate at the center of an arrangement of Coherence managers, for example within a Coherence dynamic fabric, where specific designated or specified Coherence managers take on the control of the other managers. In such an embodiment, the master Coherence manager may function as the master process, directing the other Coherence managers, through control specifications, such that user experiences have common, cohered Coherence directions.

In some embodiments such common Coherence direction may be utilized, in performance of pre-recorded content (such as a movie), where the individual experience, may be determined by user Foundation modulo Coherence Management direction. In this example individual Foundation Coherence managers may receive Control instructions from the master Coherence manager, so as to affect screen resolution and/or other specifications that the content provider has determined. In many embodiments, such content may be provided in the form of Constructs, such as Frameworks.

Operating Coherence managers, individually and/or in concert may arrange, substitute, initiate, close, vary input from and/or output to, vary one or more operational parameters, allocate and/or de-allocate, reserve and/or release, provision, schedule, simulate, specify, revise, mathematically, vary or in any other manner interact with one or more resources, processes, and/or other information sets in so far as they may be under the control and/or awareness of one or more Coherence managers. In this manner, Coherence operating managers may use one or more techniques, such as, goal seek, optimization, simulation, efficiency, effectiveness and/or other metadata to vary, modify, parameterize operational characteristics of those resources, Services, information and objects under that Coherence manager's control and/or awareness to deliver the experience specified and/or in pursuit of purpose session operations.

For example operating Coherence mangers may instigate an initial Coherence state of an operating session and/or process (including sets thereof) as determined by the Coherence operating specifications. Coherence Services processes may then adapt that current operating session (in part or in whole-including its components, such as Foundations, Frameworks, resources and the like), in line with optimized operating characteristics of the session for the purpose. This may include variations of parameters of operating resources and/or specifications to achieve minimal friction of operations.

For example, operating Coherence managers may always ensure a minimum of voice communication quality, at some specified level, in a video conference process, such that there is always some connection between Participants. Another more complex example, may be that operating Coherence managers ensure that certain specified Participants, for example the Lecturer, always have refreshed real time images from a number of other Participants (e.g. students), and that certain materials are always on display to all Participants (e.g. experimental data), and that the status of each student is always presented to the Lecturer. In this example operating Coherence manager may have a diversity of resources, processes and/or information available so as to maintain a certain level of quality of experience to the Participants.

In some embodiments, operating Coherence managers are instantiated PERCos Platform PRMS instances invoked by one or more other PERCos resources, including for example PERCos Platform Coherence services and/or other processes including for example operating session initializations to provide Coherence management capabilities within a specified one or more operating sessions.

Operating Coherence management may interact with and operate upon resources, processes and/or information including interactions between one or more users/Stakeholder representations as Participants as their purpose sessions unfold.

In some embodiments, operating sessions may comprise multiple operating Coherence managers. For example, a nodal arrangement may comprise a PERCos hardware device and an operating Framework, each of which has an operating Coherence manager supporting these functionalities as users/Stakeholders pursue their purpose. In some embodiments, PERCos Constructs, such as Frameworks, are often likely to have operating Coherence managers responsible for managing Coherence of user interactions with operating Frameworks.

In some embodiments, Coherence managers operating within one or more purpose operating sessions may comprise a Coherence dynamic fabric.

In some embodiments, operating Coherence managers capabilities may include:

- Operating session interactions relevance prioritization
  - For example, in a shared chat session, users 1 through n may make same comment, and Coherence Management may direct user interfaces to only acknowledge first comment and/or may present comment in such a manner so that Participant 1 through n are associated with it, thereby arranging that the comment is not replicated/repeated.
- Operating session interaction collision detection
  - For example, users who are engaged in interactions all speak at the same time, such as on an operating Framework, operating Coherence Management may act to buffer and delay simultaneous inputs and/or provides visual/auditory and/or other cues to inform users of collisions and/or corrective actions.
- Operating session interaction conflict negotiation
  - For example, may involve resolving conflicting specifications and/or interactions from two or more Participants, through for example Coherence Evaluation and Arbitration services and/or other Coherence Services process.
- Creation of and/or selection of one or more sets of resources (including specifications, Constructs and the like) for selection of appropriate shared visual metaphor(s) and/or interface(s) for appropriate information sets, applications, interactions and/or other process/operations, for example selection of a video wall/telepresence UI for video conferencing.
- Management of operating session purpose interactions and their alignment, relevance, orientation, clustering and/or purpose relationships (including one or more sets of metrics) and may include feedback from users. For example this may include:
  - Specification, selection and/or prioritization of shared information and/or information sources for operating sessions and purpose operations
  - Specification, selection and/or prioritization of preferred, selected and/or generated information sets and/or content performance capabilities
  - Interaction of one or more parties, groups or their representatives and/or process in line with operating specifications (including rules).

Operating Coherence Management may manage interactions of parties, through appropriate UI, PNI and/or other interaction services that may include, for example:

- Management of interrupts, disruptions, inconsistencies, conflicts and other discontinuities in multiparty structured and unstructured interactions,
- Setting of hierarchy of interactions and/or Parties, Groups (e.g. speakers in a multi-party conversation) in line with Roles and/or activities within group interactions, either as directed, specified or instructed by rules and/or Coherence dynamic fabric managers. This may include, for example resolving Roles and/or purpose intentions/expressions/specifications, within a Group, so as to express a combined shared purpose and/or associated Roles and partial purpose specifications (or elements thereof),
- Provision of out of band request(s) and confirmation(s) to users and/or groups of order (and priority) of their questions, queries, requests, searches and/or other interactions, including caching of questions/queries/searches and the like and addressing pre-arranged responses such that overall flow of interaction(s) is efficient, effective and potentially optimized through appropriate UI services and systems,
- Passing of control of UI services and systems to and/or from one or more users and/or groups to another, including change of control within a group, including by Roles, rules and/or ID,
- Sharing control, usage and/or management for example, of displays, purpose class applications, content, information, presentations, Results and/or other resources, and/or
- Operating Coherence managers and Coherence dynamic fabric managers may act to generate exceptions to Coherence operations, which may include specifications, templates, reconciliations and/or other operations which may then generate notifications, alerts and/or other events. These may be used in UI interactions with users and/or other process for and by user for intervention and/or interaction.

Additionally these and other interaction examples may be managed through operating Coherence managers and/or Coherence dynamic fabrics.

Operating Coherence managers may provide operating session stability, efficiency, friction reduction, and/or optimization through management of operating session specifications, operating resources and associated conditions including, for example, specification and/or parameter completeness, consistency and complexity, which may be initially based on Coherence operating specifications.

Operating Coherence managers may operate at individual user/Stakeholder, and/or group level, and at larger network and/or operating session level and may involve application of system wide Coherence operating specifications. Coherence Services may also operate in a distributed network manner involving any arrangement of resources, including Foundations and/or Frameworks, operating sessions and/or other operational processes.

Operating Coherence managers may utilize one or more sets of metrics, which are used by one or more such arrangements to vary sets of specifications including parameters utilized by those resources, processes, methods and/or information sets within a purpose session.

As Coherence Services may deal with boundless resources, one implementation approach may include the use of hierarchical arrangements of Coherence managers, utilizing hybrid architecture comprising superior-subordinate and peer-to-peer architecture so as to create a fully distributed and scalable implementation.

As illustrated in FIG. 99, Coherence manager instances may form a hierarchy, where each higher level Coherence manager instance is responsible for one or more lower level subordinate Coherence manager instances and their associated control specifications. Control specifications may specify the organizations of subordinate Coherence manager instances, such as specifying that they form a web of peer-to-peer relationships, be part of one or more CDFs and the like. A subordinate Coherence manager instance may, in turn, direct its own subordinate Coherence manager instances to form a peered relationship between them.

This hierarchical structure enables one superior Coherence manager instance to manage a significant number of Coherence management instances. The highest level Coherence manager instances may also form peer-to-peer relationships, based on their own respective control specifications. This relationship allows individual Coherence manager instances to efficiently communicate with each other regardless of their position in the hierarchy. For example, suppose two lower level Coherence management instances, L1 and L2, in different management chain wish to communicate with each other. L1 may communicate through its own management chain to its top level Coherence manager instance, T1, which then forwards the communication to T2, which is L2's top level Coherence manager instance. T2, in turn, sends down the communication to L2.

There are other management organizations, such as, web infrastructures. Coherence management may balance between efficiency and scale in organizing its manager instances.

For example, as illustrated in FIG. 99, An Example Coherence Management Hierarchy.

The dynamic nature of purpose operations may require that control of the Computer Side processing be undertaken in a highly flexible, distributed, dynamic and yet Cohesive manner.

Coherence Services may, in some embodiments, play a crucial role in ensuring the effective and cohesive operations of these control functions. Such control may be specified, and/or enumerated through control specifications which are passed from resources (including user/Stakeholder instructions/interactions) to other resources (including Coherence) as purpose experiences unfold.

In some embodiments, a resource interface instance may include a Coherence manager instance within resource interface PERCos kernel session, and as each such instance may undertake Coherence operations within and for the resource interface.

10 Coherence Services Operations

Coherence Services may operate across the complete PERCos purpose cycle, and may span the resource types involved in PERCos, including, for example, the three main types, classes, specifications and operating resource instances. Coherence may for example utilize metrics, characteristics, metadata and/or operational performance information to ascertain the appropriate balance of resources for purpose operations.

Coherence may dynamically instantiate one or more PERCos and/or other services to create and provide an appropriate infrastructure to provide Coherence capabilities to one or more resources and their operations.

Coherence may utilize any and all PERCos platform services in any arrangement to meet the requirements and objectives of Coherence management. For example, Coherence may instance Monitoring and Exception Services and provide that instance with appropriate specifications for the effective monitoring of resources. In many embodiments these specifications would be part of the control specifications for a resource.

Coherence may utilize, for example, PERCos Evaluation and/or Decision Arbitration services and/or provide those with control specifications so as to be able to manage one or more resources during their operations.

In some embodiments, Coherence Management is an integral part of PERCos systems, forming the fabric by which the overall resource relationships are managed to provide an integrated and coherent environment.

Coherence may dynamically arrange resources, including PERCos Platform Services and other PERCos and/or non PERCos resources to undertake Coherence operations, and in so doing may, for example, may utilize various PERCos Services to achieve their results.

In some embodiments, examples of Coherence may provide the following;

- Determine, by logical and/or other ways, if a set of specifications is sufficiently consistent and/or complete so as to be instanced.
- Arbitrate to remove detected inconsistencies. E.g., specifications may be "over-ruled" by specifications that have senior authority in any given arrangement. (For example distributed contributing specifications (including operating agreements and/or rules) from authorities (e.g. a government or administrator rule set) may supersede a Purpose Statement rule or rule set, including such superseding rule sets that may result from aggregated "cooperation" or "integration" of other independent Stakeholder rules established by operating agreements between nodal arrangements and/or users and third party governance authorities. Coherence may evaluate and create user/nodal session operating agreements by aggregating, in whole or in part, combinations of resource operating agreements (including specifications thereof), with node and/or user and/or purpose class and/or other logical organizations having relevant associated Operating Agreements to produce the operating agreement arrangement that satisfies, and attempts to optimize in light of, all relevant Contract specifications (including rules and rules sets), and values.)

- Detect natural language words and phrases that may be ambiguous or otherwise unclear.
- Map declared classes and associated attributes to internal classes and associated attributes from one or more stores.
- Discover and integrate relevant available purpose and other classes and systems thereof.
- Identify and resolve assumed, required, available, and discoverable resources, including parameters, variables and values associated with their intended, current and/or previous use.
- Discover and integrate relevant available resonance specifications
- Determine whether candidate sets of resources are internally compatible as a resource arrangement and consequently may effectively operate together, for example within or comprising Frameworks, Foundations and/or other Constructs and/or operating sessions.
- Allocate, resolve, reserve, amalgamate and/or arrange resources.
- Analyze sets of specifications, including classes to evaluate comparative advantages of different sets and/or arrangements and/or otherwise optimizing resource sets and/or arrangements.
- Analyze knowledge Organizations to evaluate advantageous mappings and correlations
- Identify and/or create suitable Transformers that may ensure a match between a resource's component resources and one or more resource interfaces.
- Interact with resource Management, for example PRMS, for provisioning operating sessions with suitable resources to enable instantiation of session States.
- Discover and arrange further resources appropriate to satisfy a specification, and/or otherwise modify a specification to provide results that are superior in one or more ways.
- Respond as necessary to exception conditions and/or failures, such as detected Contract violations, unscheduled unavailability of a resource, hardware crashes, and/or network partitioning.
- Discover, proffer, employ, and/or deploy applicable CPE's, Frameworks, Foundations and/or other Constructs including purpose classes.
- Manage one or more sets of metrics, which may represent current and/or future states of purpose operations. This may include Complexity, resource, purpose and other sets of metrics.
- Optimize one or more resource arrangements to meet one or more desired and/or may be required specifications, criteria and/or Outcomes.
- Manage one or more sets of alternate resources in anticipation and/or preparation for varying operational states and/or purpose Outcomes, through for example Shadow resources.

In some embodiments, Coherence processes may undertake resource substitution, that is, they may use one set of resources to satisfy a request for a different set. For example, they may substitute virtual machines for real machines—or vice versa, substitute remote resources for local ones—or vice versa, substitute a database for a computational process—or vice versa, substitute a touchpad for a mouse—or vice versa, substitute actual humans for avatars—or vice versa. This may require inserting a Transformer ("impedance matcher," veneer, shim, adaptor, compatibility layer, and/or other interface conversion mechanism) between one or more of the resources components and their specified interfaces.

Many of the aspects of Coherence involve calculation, estimation, probability, priority, availability, suitability and/or utility of potential and/or current resources (and arrangements thereof) and/or their potential optimization for purpose. In some embodiments Coherence may attempt to evaluate resource variables so as to predict, simulate, optimize, damage limit, friction reduce, efficiently operate and/or deploy or in other manners to ensure that users pursuit of their purpose may be effectively undertaken.

Some examples of the types of considerations that Coherence may undertake are outlined below, however Coherence may utilize any PERCos metrics.

In some embodiments, Coherence Services may deal with the degree of complexity of identification, sourcing, arrangement, operations and/or other characteristics of resources. In some embodiments, PERCos includes complexity metrics which may be used by Coherence, and/or other PERCos resources and processes, to evaluate the degree of complexity involved.

PERCos complexity metrics may comprise a set of one or more metrics and/or attributes that define the difficulty of doing something, for example expressing the degree to which computations may need to be undertaken to achieve a specified Outcome or meet one or more specifications and/or criteria. Coherence process operations may consider, for example, complexity in calculations of resource suitability for purpose.

Some of the types of difficulty that may be considered within complexity metrics include, size and/or number of conditions within a specification, available computational resources, computational complexity, number of rights and/or rules, results sets, resource management and/or other characteristics.

Complexity may be associated with PERCos resources and/or users/Stakeholders. For example in one embodiment, resources may have associated complexity metrics, where factors such as the number (Steps) and/or types of Conditions that may need to be satisfied (in whole or in part) for a resource to become able to be used may be expressed.

A further example may be the expression of complexity by the user/Stakeholder, so as to, for example, express their preference for more or less Complexity in the Results set for their purpose, and/or to only use resources which have a minimal complexity in their being available.

Coherence may use complexity metrics in any arrangement, for example through evaluations in determining resource selection and/or utilization as well as for other complexity metrics, including for example Adaption Suitability.

In some embodiments, complexity metrics may include, adaption suitability, which is defined as the degree to which one or more resources may be adapted to operate in place of and/or in collaboration with one or more other resources for a given purpose.

Coherence may, for example, use adaption suitability for one or more resources when determining alternates and/or substitutions. In one embodiment this may include determining which of a set of available devices is most easily adapted to a specific purpose, and/or would provide an optimized Foundation.

A further example of adaption suitability may, in one embodiment, be knowledge organization methods. These methods may include the identification of suitable knowledge representation organizations for users/Stakeholders (individually/collectively/affinity groups and the like), that efficiently provide sufficient utility for user. Such knowledge representations and organization methods may be published to a boundless audience.

In some embodiments, there may be a separation of knowledge storage representations from operational knowledge manipulations, such as, for example using internalization and externalization methods to share correspondences across Declared and internal classes. Coherence may interact with these structures, including in the form of ontologies, taxonomies and/or other knowledge representation metaphors and structures.

Coherence may, in one embodiment, utilize further resources when mapping one or more knowledge organizations to one or more others, such as for example mapping SQL databases to directories or vice versa.

Another example of Adaption Suitability may involve Coherence selecting the appropriate optimizations for resources, such as for example a network. In this example Coherence may vary the network Router configurations to meet the purpose of high quality video distribution, through sending each resource (e.g. network routers) the appropriate control specifications to optimize them for these specific purpose operations.

In some embodiments, Coherence may attempt to determine the degree of incompleteness of specifications, and/or the adequacy of resources, and express this deterministically and/or probabilistically as metrics and/or information for other PERCos processes. This may be undertaken, as with all Coherence operations, in a recursive and iterative manner.

Coherence may evaluate specifications for sufficiency, such that the operating and instantiated resources specified may satisfy those specifications.

Coherence may operate to reduce friction of resource interactions and/or operations and to optimize the performance and operations of resources for user/Stakeholder purpose including for example, by optimizing cost efficiency, complexity, resilience, usability and/or interaction and other considerations. In some embodiments, Coherence may act in accordance with resonance specifications to undertake these optimizations.

This may involve further metrics, such as for example, expected return on investment (appropriateness). For example, Coherence operations may include calculations and/or estimations of computational overhead, such as for example, at what point does potential benefits of Coherence processing outweigh additional overheads. In one embodiment, such considerations may be expressed as metrics, potentially encapsulating Complexity measures and estimated benefits (statistical modeling of probability of improved purpose satisfaction through, for example resource purpose metrics). Such Calculations may apply to Coherence operations, specifications and/or resources under Coherence management.

Coherence may also employ one or more efficiency metrics, which are those associated with one or more measures of efficiency, such as time, cost, number and/or type of resources and the like.

Changes made at least in part by PERCos processes—including, for example, other Coherence processes—may require invocation of one or more Coherence processes at various stages of purpose cycle and/or session operations, making overall Coherence an iterative and/or recursive process. During such iterations, issues that cannot be resolved by Coherence and/or other processes such as for example resource Management, through use of, for example specifications, rules, governance and/or deployment of one or more PERCos platform services, may be referred back to users/Stakeholders via a dialog for their interactions.

Decisions by Coherence processes may be intertwined with requests for output/input from one or more users/Stakeholders and/or with decisions that are reflected in an associated dialog. Some examples of the of these interactions may include;

- In the translation from declared classes to internal classes, an internal class or attribute may be associated with an ambiguous expression in a declared class and the user may be asked to make a selection, for example from an associated table or list or faceting arrangement, and/or otherwise provide further clarifying input.
- One or more specifications may be detectably incomplete and additional information about user purpose may be requested.
- One or more specifications may have inconsistent elements and the user may be asked to help by choosing among them, and/or otherwise modifying specifications, to achieve sufficient consistency. The user may be assisted in such selection or modification, for example, by Coherence and/or other system-generated suggestions.
- One or more specifications derived from different users/Stakeholders who are trying to form and/or modify a Shared Purpose session may be inconsistent and one or more users/Stakeholders may be asked if they may accept certain compromises and/or may be asked to provide and/or suggest alternative specification elements.
- Resources may have associated costs (including for example pricing, computational processing, time and the like), which user may be requested to accept.
- Specifications associated with one or more resources may in some manner conflict with user/Stakeholder and/or operating specifications and Coherence may request user selection and/or interaction to resolve such a conflict.
- A variety of resources may be available to satisfy a specification and the user may be asked to select a preferred resource and/or arrangement thereof. For example user may have multiple suitable Foundations available and may select one.
- Coherence may seek one or more resources satisfying one or more elements of a user specification by providing Providers with "opportunity bids" where Providers may compete to satisfy the requirement. Embodiments may use a variety of methods to decide among satisfactory responses if there is more than one, e.g., first to bid, best offer, Dutch auction and the like.

Coherence may assist user, through evaluation of their preferences and review of the current and/or potential resources available to user to support their interactions. This may include determination of current Foundation(s) which are available to the user, and suggestion of alternatives and/or modifications of the users computing arrangement and/or Foundation(s) based on, for example, users preferences.

Coherence may undertake these proposed optimizations at any time during the purpose cycle, so as to, for example vary the Computer Edge processing to better suit users expressed purpose by, for example, providing alternate/additional resources, including for example resonance specifications.

For example, as illustrated in FIG. 100, Illustrative Example of Computer Edge Processing and Coherence Processing.

During purpose selection and input support, Coherence processes may evaluate user purpose expressions, including their declared classes to identify suitable resources that match those purpose expressions and/or identify alternate classes that may be similar to the declared class and/or provide the capability for the user to better express, and/or vary, their intent. This may include the identification and selection of one or more resonance specifications, that may be combined with users purpose expressions.

This may include comparison of user prescriptive CPE with other prescriptive CPE to offer user alternate expressions of their purpose, which in one example, may have resource arrangements associated with such prescriptive CPE. This may also involve and include one or more resonance specifications and/or Constructs, such as for example Frameworks.

Coherence processes may act, during purpose formulation to assist in the selection of both prescriptive CPE resources and descriptive CPE resources, as well as Constructs, resonance specifications and other applicable resource arrangements.

For example, as illustrated in FIG. 101, An Example of Coherence interaction throughout the PERCos Cycle.

One example of Coherence operations in purpose formulation is purpose alignment, where Coherence processes interact with purpose expressions, including for example prescriptive CPE, to assist in further selection/definition of those expressions. For example Coherence may take user/Stakeholder CPE (Pre) and compare this with other prescriptive CPE that share common terms and/or have relationships with classes that may be associated with input prescriptive CPE.

Coherence may also vary Coherence specifications to further align Coherence processes with user/Stakeholder purpose expressions, including for example, alternate sets of correlated prescriptive CPE that may have been, selected and/or managed by Coherence.

Coherence, in some embodiments, may utilize PERCos Reasoning services to undertake, for example inference, when aligning purpose expressions and/or Coherence specifications.

In some embodiments, Coherence specifications may have associations with purpose expressions that are, for example, direct and/or indirect and may include, for example, those specifications associated with classes and ontology's that have explicit relationships with purpose metadata included in such specifications. In some embodiments, purpose alignment may be determined, in whole or in part, by metrics, characteristics and/or other information and may include for example, other metrics, weighting, probability with purpose, purpose classes, Vectors and/or other purpose expressions that are an extension to those included in the originating specification.

Coherence may additionally interact with resource purpose metrics (including, for example purpose satisfaction) and/or expressions that are associated with Coherence specifications and may further weight purpose association, including those purpose expressions included in specifications, based on such metrics and/or expressions.

Coherence may interact with, in some embodiments, SRO processes for integration and cohesion of specifications that may be made suitable for expression as operational specifications and subsequent instancing as operating specifications.

Coherence may support and manage alternate resources, including specifications, reserved/allocated and/or reconciled resources and/or operating resources, in anticipation of user/Stakeholder needs, Optimization, complexity management, modeling and/or other Coherence processes. For example, such resources may provide redundancy, alternatives, pre-emption and/or optimization choices for Coherence processes in support of purpose pursuit.

In some embodiments, a Shared CPE is CPE of multiple users/Stakeholders that have been combined so as to create a shared purpose expression that is agreed amongst the parties.

Coherence operates, in one example embodiment, to combine and/or reconcile purpose expressions from multiple users/Stakeholders. For example if the specifications of the users are in contradiction, Coherence may act, subject to any rules governing those specifications (for example if one user has administration rights), to create a consensus, through presentation of the choices and options for the specifications to users/Stakeholders.

Such Coherence operations may involve specifications of differing alternate resources that may satisfy the combined shared CPE, rather than the individual user CPE's that make up the common CPE.

Coherence may provide processes to manage resources within an operating session providing, for example, such assistance as reliability, robustness, optimization and the like. Such processing may involve, for example, the following:

Operating agreements,
Operational parameterizations,
Resource stability,
Resource continuity,
Resource substitution,
Resource optimizations,
Prioritizations,
Coherence snapshots, templates, and/or specifications,
Coherence history and/or
Coherence repositories.

Coherence may undertake, for example a number of operations when processing specifications. In one example embodiment, such operations may include:

Purpose expression formulation (including identification and application of appropriate resonance specifications)
Purpose specification Resolution
Purpose specification resource provisioning
Operating resource friction management and operating optimization Within purpose cycle purpose formulation, to assist in purpose alignment, Coherence may act to assist in selection and specification of appropriate purpose options and choices in line with user purpose expressions and associated specifications.

In one example embodiment, resource selection specifications may comprise generation of appropriate specifications, as complete as is possible, as an expression of purpose selections and supporting specifications such that resource resolution operations assign appropriate resources.

Coherence Platform services comprise stores of specifications, templates, Patterns and other persisted Coherence resources, including specifications and/or operations that may be accessed to provide users alternate Coherence operations, specification, templates and the like for both purpose alignment and resource specifications.

The Coherence specification processes are involved in all aspects of purpose cycle operations, and in one example, may include:

Disambiguation
Contradiction

Conflict resolution
Completion
Prioritization
purpose Alignment
Common CPE's
Reasoning Any and all of which may be undertaken in any arrangement, and may be interactive, recursive and/or iterative.

Coherence process does not necessarily imply use of formal methods. However, in many embodiments, specifications may incorporate precisely defined vocabulary, syntax and semantics, potentially expressed in the form of mathematical notations. This may incorporate Algebraic (LARCH (Guttag, Horning et al 1985, Guttag, Horning et al 1993)) and Model (Z (Spivey 1992), VDM (Jones1980), Petri Nets (1981)) based or other formal language approaches.

In some embodiments, Coherence may not be able to complete any of the sub-processes and/or processes outlined below, in which case it may return the incoming specification and/or messages to the originating process.

In all of the following processes, there may be, in one or more example embodiments, a post condition of the process that details what identified problems have may or have been removed and/or resolved and what, if any properties of the process type remain. For example, an Outcome may be that N problems were identified and variations/substitutions/alternates/additions/extensions/constraints were inserted, such that the specification may now be executed, and an associated list of these actions would likely be written to History, which may then by other processes, such as for example TRS, be used to validate such an output.

Where a specification contains one or more specification elements that may have multiple meanings and/or have specifications that have more than one semantic and/or syntactic representation, Coherence process may disambiguate the specification.

Coherence process may produce through substitution and/or variation/modification, specification elements, that are unambiguous and have consistent semantic and syntactic representation such that when passed to an appropriate process as defined by the specification, the specification elements may be interpreted in a manner consistent with that defined within the specification and executed accordingly.

The specifications Outcome may be expressed in a deterministic or non-deterministic manner, depending on specifications and/or processes, however the specifications may be of sufficient clarity such that the executing process may execute the specifications without generating an exception.

Specifications may contain specification elements that are individually or in aggregate contradictory. Contradiction may include logical incongruity, including logic expressions such as First Order Logic (FOL).

Coherence process may operate to identify contradictory specifications, and attempt to resolve such contradictions or create exceptions to be passed to other processes, for example the process from which the specification was received. In some embodiments, Coherence may be able to generate explanations of the nature of the inconsistency suitable either for automatic processing or for presentation to a user.

Coherence process may operate to resolve conflicts in specification elements, where such conflicts are not necessarily contradictions, however they may cause instability or failures when executed. For example one specification element may require exclusive use of a resource, whilst another may require partial use of the same resource. This may not generate a contradiction because it is possible that both specification elements may not be provisioned and operating at the same time. However it does create instability in the system as a whole. A further example may be one specification element requiring resource One use parameter set 1, whilst another specification element may require resource One to use parameter set 2. In this second example Coherence would act to evaluate the parameter sets and identify if is there is a common parameter set that may satisfy both requirements.

Coherence process may operate to identify conflicts and where possible resolve those conflicts. However, such conflicts may be passed to specification originating process and/or user in the case where Coherence process is unable to resolve confliction.

Coherence process may operate to identify incomplete specifications and then where appropriate and possible, undertake processes to complete those specifications. Such completion may include determining, directly or for example through inference, the degree to which the specifications may be complete for sufficiency, where sufficiency may be an expression of that specifications ability to be processed by other subsequent process. For example, Coherence may view a specification as complete if the specification is such that resources may be identified for that specifications subsequent provisioning and/or operations.

Completion process may be on a "best fit" basis and may include one or more alternate specifications that may then be further processed, for by example, Resolution specifications.

Completion may be determined by any method such as, for example, Logic Algorithms (Deville 1990).

Coherence Services may identify priorities within specifications and order Coherence process and/or specification elements accordingly, such that the order of specifications is prioritized and/or the order of Coherence operations is prioritized, in a mutual arrangement and/or independently. For Example, this may be the case where specifications have implicitly or explicitly expressed pre-conditions for specified operations and/or expressed an order of process operations as expressed by the specifications. Coherence process may reorder and/or instantiate an order of specification elements in specifications.

Coherence purpose alignment operations may be based, at least in part, on PERCos metrics, such as for example Quality to purpose. Such Coherence service processing may utilize matching and similarity services to support PERCos nearness capabilities for users/Stakeholders in composition, selection, editing and/or iteration of their Purpose Statements and associated specifications.

For example Coherence services may provide alternate purpose specifications, for example one or more resonance specifications and/or other specifications including parts thereof.

In one example embodiment, Coherence Resolution operations may include a set of processes that produce specifications that include resource assignation, allocation and/or reservation suitable to be instanced and bound by further processes, which in one PERCos embodiment, are operating sessions. This is often undertaken in conjunction within SRO Resolution process and in aggregate produces operational specifications.

In one example embodiment, Coherence Resolution operations processes include:

Resource Availability
Resource Parameterization specifications
Resource Suitability
Resource Prioritization
Resource History Coherence Services may utilize one or more sets of metrics, which may include for example, Complexity, Optimization, Consistency, Modeling and/or other metrics to interact with Resolution processes for the production of specifications, including those that may be instantiated by, for example SRO processes, and those that may be managed as alternates by Coherence processes.

Coherence Resolution operations, in one embodiment, interact with SRO Resolution operating session process on incoming resolution input specifications, named in purpose cycle as purpose specifications, where, for example, Resolution operating session may attempt to establish the availability and/or suitability of the specified resources in incoming specifications. In some embodiments, PERCos SRO Resolution operating session, may be unable to establish and/or validate (reconcile) availability of specified resources (by for example, identity and/or type), and as such Coherence Resolution may undertake processing to address such situations.

Coherence Services may also act to provide one or more parameterizations and/or operational specifications for reconciled resources. Coherence Services may check alternate and/or specified resource availability through interaction with one or more resources Management systems, such as for example PRMS, which may include resource directories accessible by Coherence Management operations. This may include, for example, any resources controlled by and/or available to user/Stakeholder, and may further include Foundations and/or other resource arrangements.

Coherence Services may also communicate with PERCos platform Coherence management services and/or other Coherence managers to identify any resources and/or sets thereof that, in whole or in part, may be suitable for Resolution specifications. In one example this may be passed to Resolution process for inclusion in operations.

Coherence Services may, during Resolution operations create and manage specifications for alternate resources, including interacting with Resolution operations to resolve such specifications, so as in one example, to provide alternate resources (including arrangements thereof), should these may be required by Coherence and/or other processes during purpose pursuit.

Coherence Resolution process may operate to provide one or more parameter sets for any one or more resources included in Resolution specifications. For example, these in turn may be ordered, prioritized and/or made conditional for further operations by appropriate operating sessions. Such parameterizations may be passed to operating resources through, for example PRMS, when for example an operating session has initiated resource operating conditions.

Coherence Services may manage alternate parameterization sets for use by Coherence and/or other processes.

Coherence Resolution process may make a determination on the suitability of resource, and arrangements thereof, as specified in Resolution specifications and may offer and/or prepare alternative resources more suited to purpose operations and/or may prepare and provide alternative and or variations of parameter sets for inclusion in Resolution process output, that is, in some embodiments, operational specifications.

In one example embodiment, Coherence Services may utilize sets of metrics to evaluate and arbitrate which resources are most appropriate to purpose operations, and may prioritize those and alternate resources based on those metrics.

In one example, to evaluating resources and/or arrangements thereof, Coherence Resolution operations process may instantiate and/or invoke one or more PERCos Test and Results service instances, so as to test a specified resource and/or access test results associated with that resource, such that determinations by Coherence Resolution process, including Decision arbitrator and/or Evaluation services may be made as to the applicability/suitability/utility/performance/reliability and/or other characteristics of resource for specified purpose may be determined.

Coherence Services may invoke any PERCos platform services in any combination in an attempt to establish resource suitability and practicality for purpose operations.

Coherence Resolution operations process may reorder and/or prioritize specifications and/or their elements. Coherence Resolution operations process may also prioritize Coherence processing so as to optimize or in other manners manage Coherence operations within Resolution operations. For example Coherence Services may undertake tests for suitability on resources in an order that minimizes complexity and reduces dependencies, which is different form that in the incoming specifications.

Coherence Services may also, in another example, reorder the priority of specifications and their elements in alternate specifications, which may then be managed by Coherence for potential and/or future operations, including for example, Modeling of resource behavior.

Coherence process may act to vary operational parameters of resources, and/or arrangements thereof, to achieve optimizations, complexity management, consistency, modeling and/or other Outcomes. For example, for a resource representing an audio amplifier, this may include increasing resource Dynamic Headroom (for example to allow for transient peaks in operational demand). Alternatively this may include increasing resource stability (through for example less throughput), decreasing dependence on one or more resources and/or to achieve other purpose operating session objectives.

Coherence Services may generate and/or store parameterizations in the form of resources (including for example specifications/files/objects/and the like) that may be communicated to one or more resources, as for example Control or other specifications, during resource operations. Coherence Services may further, for example, vary, in whole or in part, individual parameters and/or sets of parameters during resource operations.

A Coherence operational process may act to interpret and/or evaluate resource stability through metrics associated with the resources, resource History, resource current operations metrics (from for example resource management such as PRMS) and/or other metrics and/or characteristics associated with resource and its performance, so as to for example, further evaluate resource Stability performance within purpose operating sessions.

Coherence resource Stability processes may include, for example, evaluation of one or more sets of metrics, characteristics, assertions and/or other information regarding resources, and/or arrangements thereof during their operations (including for example Frameworks and Foundations). These evaluations may include determining the current and/or historical stability of such resource arrangements which may be expressed, for example as further metrics, and where appropriate used by other resources, including for example Coherence managers, in their determinations and/or calculations. This may also include metrics of stability where, for example, the stability of a Construct is reassessed when an additional resource is added to, and/or removed from operating Construct (for example a Framework and Foundation).

A further example may include the assessment and expression of the relative stability of two or more resources operating in an operating session in some arrangement, and may further include any other resource operations.

Stability may be dependent, for example, on throughput, Input/Output, control specifications and a range of other contextual considerations. In some embodiments, for example, these considerations may be quantized such that Stability is expressed in levels of certainty of continued stable operations, enabling other resources, including Coherence to efficiently evaluate the impact of variations of resources and/or their contextual circumstances, in an efficient and timely manner.

Coherence process may evaluate the continuity requirements of one or more resources associated with an operating session, such that, for example, those resources that are critical to the operating session, for example communications devices in a teleconference, have suitable alternates and/or hot fail over strategies in place for continued operations. Coherence may assign and/or associate continuity metrics with one or more resources, individually and/or in any arrangements/sets.

Resource continuity may interact, for example, with PERCos History process to evaluate resource Continuity and other performance metrics.

Coherence process may substitute/replace of one or more resources by another of similar, suitable and/or greater functionality capable of meeting specifications within, for example, an operating agreement. This may include for example, meeting specification elements including those for, performance, operational capacity, Repute and/or any other metrics, assertions and/or characteristics of the resource being substituted/replaced.

Coherence processes may operate one or more resources (Shadow resources in one embodiment) in anticipation (pre roll) of resource substitution/replacement and effect "hot fail over" or "hot replacement" in a manner that is not disruptive to user experience purpose operating session. These alternate resources may be Shadow resources.

Coherence processes may also interact with other processes that operate a schedule/listing of alternate resources that may be substituted for an operating resource should that operating resource become unavailable/unstable for any reason. For example a Cloud operator may make available one or more alternate resources, such as for example Virtual Machines, that Coherence Services may then substitute in an operating session.

Coherence Services may operate to optimize any resource operations based on any metrics, characteristics and/or other information available to Coherence processes. Coherence processes optimization of resources may, for example include such strategies as:

- Optimization for resource—For example, resource performance variables may be optimized, such as for example, by lowering power consumption, increasing throughput and/or reducing wait states.
- Optimization for user experience—For Example, resource parameters may be optimized for user experience, such as for example, increasing data throughput for increased display realism through increased frame rate, providing additional processing power for faster calculation capability (such as using methods on large corpus for topic identification), reduction of alternate resources to reduce user perceived complexity.
- Optimization for purpose expressions—For example, resource alignment, arrangement and/or parameterizations may be managed so as to optimize to purpose expressions (e.g. CPE), for example, discovering resources for purpose from boundless, which may compromise optimizations above, such as lowering user experience fidelity (such as frame rates, video resolution and the like) and/or operating processing at or near resource limit, so as to provide maximum effort for meeting purpose expressions and associated specifications.
- Optimizations for efficiency—For example reducing resource operations in scale and/or scope to adapt constraint sets provided, for example, by Foundations of limited capability (e.g. Smart Phone rather than Games PC).
- Optimizations for Complexity—For example, utilizing resources so as to reduce Results sets in terms of depth, scale and scope to enhance user experience and/or meet user selection. A further example may be to add additional resources to user purpose operating session so as to increase Results set, in terms of depth, scale and/or scope in response to user selection and/or other operations.

Coherence process may act to set operational prioritizations of operating resources such that resource operations are ordered in a manner determined by Coherence to aid purpose session operations.

These processes, in some embodiments, may be used in all Coherence processing, such that Coherence managers and/or processes may invoke, communicate and/or interact with any of them as may be required. These may be in some embodiments, PERCos platform services.

Coherence Services may utilize PERCos Platform Reasoning System services to create Coherence Reasoning System services that are particularly suited to Coherence operations.

Such Coherence Reasoning System services may include, first order logic, description logics, Matching, Temporal Logic, and the like.

Coherence operations may be made persistent through a number of methods, including for example, Snapshots, templates and/or specifications Coherence Snapshots may, for example comprise Coherence operations that are made persistent whereby all operational activities, resources and their supporting specifications are moved/copied to a storage device, from which they may be recovered at a later time. This, in one embodiment, includes the state of the operations.

Coherence templates may, for example, comprise processing Coherence Operations such that state is removed from those operations and the resulting specifications and operational parameterizations are communicated to, for example, PERCos platform template services and/or other template service process for instantiation as PERCos Coherence templates. In one embodiment, these templates may then be published by an appropriate publishing service, for example, PERCos platform publishing services.

Such templates may then be stored in an appropriate storage device, such as for example PERCos Coherence repository, and may be accessed by Coherence and/or other processes to support purpose operations.

Coherence specifications may be obtained, for example, by undertaking processing of Coherence Operations such that Coherence specifications for those operations are extracted and in made persistent, as in, for example, resources. These resources or other stored specifications, in whole or in part, may, in one embodiment, be made available to Coherence and/or other process. These specifications may also be published by an appropriate publishing service, for example, PERCos platform publishing services.

In one embodiment, for example, these specifications may be processed so as to be converted to templates by, for example, PERCos platform template services and/or other template service process for instantiation as PERCos Coherence templates, which may then be published.

Coherence may store any of these Coherence Snapshots, templates and/or specifications by the originating operating session in any suitable and/or selected storage device. These persisted Coherence Snapshots, templates and/or specifications may, in one example, be made available to other processes, which subject to Governance, may be associated with any other operating session, users/Stakeholders and/or other PERCos and/or non PERCos processes.

In one embodiment, these may also be published to Coherence Platform Services and be stored and managed by those services for the operational use of these resources, by other Coherence processes, for example, in pursuit of Coherence and/or purpose objectives.

In one embodiment, Coherence Snapshots, templates and/or specifications, collectively Cohered resource arrangements, may all have one or more purpose expressions and/or other Metadata associated with them, and may be published as PERCos resources such that PERCos process, including Coherence, may associate, retrieve and utilize these resources in support of Coherence and purpose operations.

In some embodiments, Coherence platform Services, in one embodiment, provide Coherence services to any arrangement of distributed Coherence management services instances. Aspects of Coherence platform Services may include:

- Coherence resource Arrangement Sets
- Coherence Platform processing services
- Coherence Platform Directories/Stores
- Coherence Platform specification ingestion In some embodiments, Coherence Processing Services, implemented as, for example, distributed/cloud services, may offer to Coherence managers and/or other processes to process Coherence specifications and/or resources so that complex and computationally intense Coherence processing may be undertaken in a distributed manner. For example a particularly complex Coherence specification, including modeling, may be passed from a Coherence Repository or other source to a Cloud based Coherence processing service, by a much less capable system, such as a Smartphone, where such processing of specifications may then return a result set suitable for that platform.

These Coherence processing/services may be offered on a bureau basis including, commercial models, offering (significant) computational resources and/or expertise for specification processing and/or extended resource availability/operations.

Coherence stores, including for example, directories and/or repositories provide, in one example embodiment, methods for management, storage and retrieval of Coherence resources, including specifications, and/or other Coherence resources in manner suitable for retrieval by Coherence and/or other process for Coherence and/or purpose operations.

Coherence Services may utilize any knowledge structures, including in one embodiment, class systems in such repositories.

In one embodiment, Coherence specifications may be accepted into Coherence Platform Services, such that they for example, may then be used and potentially relied upon by other Coherence Services. These specifications may undergo validation and testing through, for example, Coherence and/or other process including PERCos Evaluation and Arbitration, Test and Results, Creds and/or any other PERCos and non PERCos services so as to ascertain the validity of specifications for one or more purpose(s) with which they are associated.

These specification validations may, in one example, be issued in the form of Creds and/or other validation methods, including cryptographic methods and/or PERCos capabilities.

To support one-to-boundless computing, PERCos needs to be able to interpret, evaluate, resolve, and/or share a wide range of information types, such as Stated classes, ontologies, specifications and the like, formulated in multiple "lexicons." These lexicons may be formulated in diverse languages, such as XML, OWL, Java, HTML, Word, English, French, Chinese, or any other language known in the art.

Coherence Evaluation and Arbitration Services may invoke PERCos Platform Evaluation and Arbitration Service to evaluate, interpret resolve, and/or cohere specifications formulated in differing lexicons into PERCos internal lexicons so that Coherence Reasoning Services may reason about the specifications.

Evaluation and Arbitration Service may leverage existing techniques whenever possible to provide its services. For example, for disambiguation, it may leverage WordNet® (a trademark of Princeton University), which is a large English lexical database. WordNet groups nouns, verbs, adjectives and adverbs into sets of cognitive synonyms (synsets), each expressing a distinct concept. Synsets are interlinked by methods of conceptual-semantic and lexical relations. The resulting network of meaningfully related words and concepts may be navigated with a browser. WordNet's structure makes it a useful tool for computational linguistics and natural language processing.

Services provided through invocation of Evaluation and Arbitration Services by Coherence Services, in some embodiments, may include the following:

- Disambiguation,
- Interpretation/Translation,
- Unification,
- Pattern Analysis,
- Constraint satisfaction, and/or
- Correspondence between Quantitative and Qualitative metrics.

Disambiguation is a process of making explicit the mechanisms humans rely upon intuitively in disambiguating terms and fixing their meanings. The disambiguation process analyzes syntactically equivalent concepts that have non-equivalent semantic concepts and make them syntactically non-equivalent by associating appropriate context.

Where a specification contains one or more elements that may have multiple meanings and/or have specifications that have more than one semantic and/or syntactic representation, Coherence Services process may disambiguate the specification.

Coherence Services process may produce through substitution and/or variation/modification, specification elements that are unambiguous and have consistent semantic and syntactic representation such that when passed to an appropriate process as defined by the specification, the specification elements may be interpreted in a manner consistent with that defined within the specification and executed accordingly.

The specifications Outcome may be expressed in a deterministic or non-deterministic manner, depending on specifications and/or processing; however, the specifications need only to be of sufficient clarity to enable their executing process to execute them without generating an exception.

This may be illustrated by the example: "learn about tanks." The English word "tank," according to a dictionary (Webster-Miriam) has multiple definitions:

1. Dialect: pond, pool, especially one built as a water supply,
2. A usually large receptacle for holding, transporting, or storing liquids (as a water or fuel),
3. An enclosed heavily armed and armored combat vehicle that moves on tracks,
4. A prison cell or enclosure used especially for receiving prisoners,
5. In or into a decline or slump, ex. "the sullen student's grades went into the tank."

When a user expresses a purpose expression, such as "learn about tanks," Evaluation and Arbitration Service analyzes the terms to determine which of the following terms the user is referencing: (tank, pool), (tank, transportation), (tank, military), (tank, prison), (tank, slump).

In some embodiments, Evaluation and Arbitration Services may analyze the context or usage environment of the concepts to perform disambiguation and then associate appropriate context, such as Evaluation and Arbitration may compare the properties of concepts to determine the equivalence of two concepts.

If concepts have associated properties, such as edge/declared classes, then Evaluation and Arbitration Services may analyze the respective properties or attributes to determine the concept equivalence. For example, "car" and "automobile" are more likely to have same properties, whereas, "car" and "airplane" have differing attributes. An airplane has attributes, such as fuselage, wings, stabilizer (or tail plane), rudder, one or more engines, and landing gear. In contrast, cars have attributes such as their makers (Toyota, General Motors, Ford.), body types (Sedan, SUV, station wagon, truck, and the like), estimated mpg (25 miles per gallon), and the like.

However, having differing property types does not mean that two concepts are not equivalent. Rather, it only signifies that the concepts were described from differing perspective. For example, a user may describe "automobile" from ease of maintenance perspective. In contrast, another user may describe "car" from its ease of use, such as how smooth, comfortable, and roomy the ride is, how many passengers the car may accommodate.

Coherence Services, in some embodiments, undertakes one or more processes to check and consider consistency of specifications of resources, including their purpose, operations, performance and/or other attributes. Consistency may comprise any number of processes arranged and undertaken in any order by Coherence Services, so as to make consistent and/or remove inconsistencies from PERCos resources and/or their operations. Coherence Services may use such processes as outlined above during a purpose cycle and/or other PERCos operations to evaluate, validate, and/or modify such resources so that they are consistent.

Consistency may be part of the specification itself, such as using static typing to ensure such a specification contains no contradictions. Consistency may also be within an arrangement of resources, such as a Foundation, where each resource needs to be consistent with the others for effective operations of the Foundation. This may for example include static and dynamic typing as well as other processes, such as checking data formats, interfaces and/or methods for compatibility for purpose.

Coherence when processing consistency, may involve information as to the conditions for consistency, which may be expressed as consistency metrics, and may further for example, be predictive as well as calculated for any specific instance and/or time period. In some embodiments, complexity metrics may be applied to consistency conditions.

Coherence Services may also undertake validation of consistency, which may have been expressed by other processes, including other Coherence operations, and may be incorporated in and/or referenced by resources.

Consistency checking may, in some embodiments work in conjunction with consistency checking. For example, if a user specifies a purpose such as "learn to drive a tank", consistency checking may either rule out such interpretations as "learn to drive a tank (pool)" and "learn to drive a tank (slump)". This process may lead to the interpretation "learn to drive a tank (military)" being the most likely match for disambiguating "tank".

In some embodiments, Evaluation and Arbitration Services may interpret/translate specifications formulated in one lexicon into a specification that formulated in another lexicon. For example, a user may have a customized lexicon to specify purpose expressions. Evaluation Service may interpret a purpose expression stated in its user's lexicon (user's Stated classes) into a purpose expression stated using an internal PERCos lexicon (e.g., internal classes).

In other cases, Evaluation and Arbitration Services may interpret/translate specifications formulated in differing lexicons so that Coherence may cohere and/or resolve them as appropriate.

In some embodiments, before Coherence may resolve specifications, it may unify them. For example, suppose A and B are specifications. Coherence Services may determine if there is any substitution that allows two specifications to be compared, such as equivalence of A and B, or possible implication (i.e., A implies B), and the like. In particular, Evaluation and Arbitration Services may unify and/or normalize A and B so that Coherence may apply resolution reasoning.

If a pair of specifications is not able to be unified and/or normalized, Coherence Services may still try to apply a solution that is as general as possible. Evaluation and Arbitration Services may maintain a directory of unification strategies.

In some embodiments, such unification and/or normalization may involve set operators, such as Union, where each specification is considered as a set of elements that satisfy some properties P, and where possible specifications (and/or elements thereof) are evaluated for equivalence (including using probability based techniques) and then subjected to set operations to form unified and/or normalized specifications. In some embodiments where equivalence may not be possible, further specifications associated with similar resource operations may be used to achieve unification.

There is a wide variety of techniques for pattern analysis, such as searching and matching strings to more complicated patterns (such as trees, regular expressions, graphs, point sets, and arrays) with special focus on coding and data compression, computational biology, data mining, information retrieval, natural language processing, pattern recognition, string methods, string processing in databases, symbolic computing and text searching.

Evaluation Services in some embodiments may use one or more rules sets, such as those for example provided by one or more Stakeholders, to determine the most efficient and applicable technique.

PERCos in some embodiments may perform constraint satisfaction analysis, or constraint optimization.

For example, PERCos processes interact by sending messages that have pre- and post-conditions. A receiving process may check the message's pre-condition to determine whether it may interact with the sender of a message.

Constraint optimization may include finding the optimal possible resource arrangement that provides optimal capability at lowest cost.

Evaluation Service may use pattern-matching, and in other cases it may perform unification techniques to check constraints. For example, if constraints are logical formulae, Evaluation Service may use syntax-transformation rules, such as constraint normalization rules that are semantics-preserving syntax-driven conditional rewrite rules.

In some embodiments, constraint analysis may include the use of users preferences as the basis for undertaking constrain analysis.

Evaluation Service may also need to perform mapping between different types of metrics. For example, an operating specification may have performance requirements specified quantitatively, such as may be required network bandwidth, CPU speed, storage capacity, memory capacity and the like. In some cases, using quantitative metrics to discover available resources may not be as efficient as interpreting the qualitative metrics associated with resources and/or arrangements thereof. This may be the case with Constructs, where associated metrics may be qualitative, derived from, for example, quantitative metrics based on the Constructs' past performances.

Coherence Reasoning Service leverages PERCos Platform Reasoning Services to provide Coherence with automation and intelligence capabilities. In some embodiments, Coherence Reasoning Service may use a wide variety of rules to perform its services. Coherence Reasoning Service may use a set of rules to determine which Platform Reasoning Services would optimally fulfill a user's purpose. For example, one purpose expression may be more optimally fulfilled by using Bayesian inference, other purpose expression may be better served by using knowledge base reasoning, and yet a third purpose expression may be best served by using both knowledge base reasoning and Bayesian inference.

Coherence Reasoning Service may use rules to specify precedence conditions for resolving a set of conflicting specifications. Rules sets, in the form of specifications, may be incorporated into reasoners and Coherence Operations. For example, user/Stakeholder may specify a rules set that governs their interactions, and as such reasoner may use such set in reasoner calculations.

Coherence Reasoning Service may utilize rules that contain statements and conditions about resources, including specifications. In some embodiments, Reasoning Service may use such rules to build graphs of different types of relationships, such as dependency relationships, between resources.

A Coherence Reasoning Service may use a wide range of inference methods, such as deductive, inductive, Bayesian, and/or any other inference method known in the art.

Coherence Services may invoke one or more Inference engines, which in some embodiments may be Cloud-based resources with significant processing capabilities, which may be used to facilitate Coherence activities on resource constrained devices (such as mobile devices).

Coherence Services may also retain such results sets associated with a purpose, and utilize these when other similar and/or related purpose inference results sets that may be required, potentially by differing users/Stakeholders.

Bayesian inference is a method of statistical inference in which results are obtained by estimating the probability of the validity of the hypothesis. In some embodiments, Reasoning Service may use Bayesian inference to reason about resources, such as network connections, devices, peripherals, and the like, based on historical and/or observed data. For example, suppose a resource arrangement has been extremely efficient at fulfilling some purpose, and such information has been stored, for example as by PERCos History services, then one or more Coherence services may use this historical data in future resource provisioning operations.

Coherence Reasoning Services may also use reductive, constructive and/or elimination reasoning.

Reductive reasoning is based on the assumption that a problem may be reduced to an equivalent set of simpler sub-problems (i.e., easier to reason about). For example, ontological reductive reasoning is based on the observation that every perceivable type of item is a sum of types of items at a lower level of complexity.

Constructive reasoning combines existing facts into a possibly more powerful fact. For example, PERCos, a Reasoning Service embodiment may combine resources to generate a resource arrangement that provides more capabilities. For example, suppose resource arrangement RA provides capability X and resource arrangement RB provides capability Y. Reasoning Service may combine RA and RB into resource arrangement RC that provides more capabilities than either X or Y.

Elimination reasoning, also known as "pruning," is analysis of a problem into alternative possibilities followed by the systematic elimination of unacceptable alternatives. One class of method, called conditioning search, splits a problem into sub-problems by instantiating a subset of variables, called a "conditioning set." Typical examples of conditioning search methods are "backtracking" in constraint satisfaction reasoning, and "branch and bound" for combinatorial optimization.

A Coherence Reasoning Service may use one or more knowledge-based reasoning methods. Broadly speaking, knowledge based reasoning may be characterized as discovering new relationships. For example in some embodiments, knowledge may be modeled as a set of (named) relationships between resources. With, for example, "Inference" embodiments, automatic procedures may generate new relationships based on existing data and based, at least in part, on some additional information in the form of a vocabulary, e.g., such as a set of rules.

For example in some embodiments, such methods may create lexicons of inferred verb sets for categories such as profession types, education degree types, and the like. For example for the category mechanical engineer, there may be an inferred verb set (consult, design, research, teach) or physics (learn, teach, apply, consult) their job is to design and/or critique design—or professor of synthetic biology—their job is to teach and/or research and/or consult and/or apply/develop/design—in each case normally a highly constrained set of verb options may be declared and/or inferred and may in some embodiments, include constrained sets that may accommodate a variety of "near" synonyms for approximation purposes.

This newly discovered data may then in turn cause new inferences to become available, leading to yet some more new data to consider. Whether the new relationships are explicitly added to the set of data, or are returned at query time, may vary from embodiment to embodiment. The most common arena for this style of inference is in rule-based inference, where for example one or more experts have declared such rules, which may be stored in one or more ontologies.

An inference engine may utilize a model building approach to inference. Model building inference engines may attempt to prove that a specification is consistent by constructing an example of the object that the specification is describing (e.g., a model for the specification). This is an approach to reasoning that is commonly used in description logics.

The approach to constructing a model is often very constructive. For example, if an ontological specification describes a car as having exactly four wheels, a reasoner for the specification might build a graph consisting of a node for the car connected to four nodes representing the wheels. This graph would be further annotated with indications that the wheels are all distinct and they are the only wheels for the car. The inference method would continue in this manner trying to create a model for all the constraints in the ontology. A slight complicating factor is that some ontologies only have infinite models so the model building method may know how to represent infinite models (as patterns that repeat in an infinite progression). There are results in the description logic community that state that if models are built in the correct manner, that a model may be successfully constructed for a specification exactly when the specification is consistent.

Model building techniques go beyond just checking consistency of specifications. For example, a model building technique could be used to prove that one specification, specification A, implies another specification, specification B. To do this, the inference engine attempts to create a model for the composite specification “A but not B”. If the model is successfully constructed then we know that the implication does not hold. If the model cannot be constructed, and with appropriate completeness theorems, we know that the implication holds.

Coherence Reasoning Services may resolve a set of specifications. Resolving a set of specifications includes detecting potential conflicts. Reasoning service may analyze parts of specifications, including obligation, dependency and/or authorization aspects.

A specification is said to have an obligation aspect if it requires or forbids performance of some action. Some examples of specifications that have obligation aspects are as following:

1. An operating session may store its state every 5 minutes,
2. An operating session may use resource R,
3. An operating session may not use resource R,
4. An operating session may not persist its states,
5. Resource R may use a secure connection to access resource S.

A conflict arises when two or more specifications have aspects that have opposite modality, such as specifications 2 and 3, and specifications 1 and 4 above.

A dependency specification generally has an obligation aspect. For example, resource S may only be activated if it is to run on Foundation F. Such a specification has the obligation aspect of “may run Foundation F.”

Suppose there is another dependency specification, for example, “resource T may only be activated if it does not run on Foundation F.” These two specifications clearly conflict since their obligation aspects have opposite modality.

A specification has an authorization aspect if the specification specifies what actions an invoking resource is authorized or forbidden to invoke on the target resource. For example, Participant P is authorized to access resource R. A conflict could arise, for example, if Participants P and Q are in a shared purpose operating session and Q is not authorized to access resource R. In such a case, the Coherence Services processes involved in managing the shared purpose operating session ensure that R is available to P, but not to the shared purpose operating session, which might enable Participant Q to access R.

Another type of specification conflict arises when one specification may require a resource to perform some action and another specification forbids the action. For example, a specification may require operating session OS to persist its states to resource R, but another specification forbids OS to access R.

In some embodiments, Coherence Services may resolve such conflicts by assigning precedence of specifications, when specifications may be interpreted statically, the Reasoning service may efficiently rewrite the specifications to remove the conflicts, by eliminating those of lower precedence.

However, static rewriting using precedence may be less effective when specifications involve dynamic elements. For example, consider the following specifications:

1. Operating session OS is allowed to access resource arrangement RA;
2. Operating session OS is forbidden to access resource R.

These two specifications are not in conflict as long as R is not part of RA. However, since RA may be dynamically modified to include R, Coherence needs some sort of dynamic check. For example, it could ensure that R is never included as part of RA, or that OS does not gain access to RA if R becomes a member of RA.

Coherence Services may apply ontological reasoning to classes and their properties.

Ontologies may, in some embodiments, provide structured information organizations that are used by Reasoning Services in support of purpose operations. Reasoners may evaluate ontologies for Coherence Services processing and may also use ontologies as information stores for those and other Coherence results.

For example, a Reasoner Service invoked by Coherence Services may interact with source and target ontologies that contain information about classes and their properties. Reasoner Service may examine classes and other resources as possibly related and examine their properties. In particular, this embodiment may use any properties that are identified to “match.” For instance, if classes C1 and C2 both have a “has-parent” property, Reasoner Service may examine the cardinality of the property in each class.

In some embodiments, for example, the specification input to a Reasoner Service may include two ontologies, along with any equivalence statements posited to be true. The Reasoner Service may report whether these statements lead to any contradictions, that is, classes which may have no members.

These kinds of tests may be applied to other aspects of properties, such as whether the properties are functional, reflexive, symmetric, or transitive. Property equivalence may also be tested by simply comparing their respective extensions. Of course, the absence of corresponding matching properties does not guarantee the non-equivalence of two classes. Two classes with different but not inconsistent properties may be equivalent, with the different properties simply reflecting different views or perspectives of the same concept by different Community of Interests (COI).

A Reasoner Service may also determine all of the classes of which an individual is a member. This property is exploited to test conceptual similarity confidence. Suppose we have individuals I1 and I2 in both source and target ontologies. If the reasoner identifies I1 as belonging to a class of which I2 cannot be a member, then I1 and I2 cannot denote the same concept.

A Reasoner Service may decompose large ontologies to a set of smaller ontologies to optimize performance. In such cases, a Reasoner Service may utilize some cross-ontology operators to ensure consistency among the set of ontologies.

Some Reasoner Services may support common ontological operators, such as allValuesFrom, hasValue, someValuesFrom, is-a, Transitive property, symmetric property, functional property (which defines a property that has at most one value for each object, such as age, height), and/or InverseFunctionalProperty (which defines a property for which two different objects cannot have the same value, such as serial number for devices).

Some Reasoner Services may operate assuming an open world, where it does not assume that a statement is true based on the basis of a failure to prove its negation. Some reasoners may operate using a closed world where a statement is true if its negation is proven to be false.

Coherence Services, in some embodiments, may test validity of resource specifications and/or associated assertions. For example, a resource may assert certain performance characteristics, such as a network reliably providing a given level of network bandwidth. Coherence Services may use PERCos Platform Test and Result Services to provide Coherence Test and Results Services to validate such characteristics.

Coherence Test and Results Services may undertake such validations by examining the specifications of previous tests undertaken on and/or by resources, including identification of other resources used in Tests. Further validation may be undertaken by examining the Results of such tests, including comparisons with assertions and/or specifications and conditions under which tests were undertaken and identification of resources involved in such tests.

The resource characteristics may also be further evaluated by examining and potentially testing any Repute assertions associated with them. In some further circumstances, Coherence Test and Results Services may undertake the testing process in full, potentially with the resources specified in the assertions (specifications of the Tests) and/or with differing resources, for example those known to and/or trusted by Coherence manager. For example, some embodiments may associate PERCos identification with methods, known as factors with resources. In such cases, Coherence Services may use PERCos Platform Test and Results Services to test the associated methods to revalidate the resource.

A Repute is a declaration of a degree of confidence in a subject (specified by a descriptive CPE). It may be either an Effective Fact or a Cred. An Effective Fact is a Repute that has a fact set as its subject with a Confidence that indicates the assumed degree of confidence in its subject. A Cred is a Repute with an asserter set and/or a published by set (both actor sets), and an opinion (assertion) about its subject. Coherence Service may validate Reputes to ensure that subject's specified Confidence is justified. Some embodiments may use PERCos identification to represent Reputes. In such a case, Repute may have associated methods to validate them.

Coherence may issue and/or evaluate, in some embodiments through Repute evaluation service, Repute assertions, in the form of Creds and/or effective facts, through utilization of Tests and Results Service, providing the results sets of such as tests as the basis for the Repute associated with one or more resources and/or their operations.

In another case, for example, Coherence Services may use results associated with resources to reason about their usage. This may include any of the Reasoner services available to Coherence and may, for example, include inference and other predictive techniques.

Coherence Services, in some embodiments, may need to test validity of resource specifications and/or associated assertions. For example a resource may assert certain performance characteristics, and in this example Coherence may require resource to operate in close proximity of those characteristics, such as for example in mission critical circumstances, and as such may use Test and Results service to validate those assertions. This validation may be undertaken by examining the specifications of previous tests undertaken on and/or by resources, including, for example, identification of other resources used in tests. Further validation may be undertaken by examination of the Results of such tests, including comparisons with assertions and/or specifications and conditions under which tests were undertaken and identification of resources involved in such tests. These resources involved may also be further evaluated by examining and potentially testing any Repute assertions associated with them. In some further circumstances, Coherence may undertake the testing process in full, potentially with the resources specified in the assertions (specifications of the tests) and/or with differing resources, for example those known to and/or trusted by Coherence manager. For example, some embodiments may associate PERCos identification with methods, known as factors with resources. In such cases, Coherence Service may use Platform Test and Results services to test the associated methods to revalidate the resource.

11 Example Coherence Implementation

The following describes an embodiment of a Coherence Service within a PERCos system, in accordance with an embodiment of the present disclosure.

In some example embodiments, Coherence Services processes and operations may be implemented by a number of Coherence resources, processes and PERCos Platform System elements, which include those described below. As Coherence interacts with many PERCos platform and system elements, these are considered from the perspective of Coherence operations and processes. All of the following descriptions and considerations are examples used to illustrate an embodiment. It is understood by those familiar with the art that this embodiment is for illustrative purposes only, and alternate Coherence Services embodiments may exist.

Coherence Services embodiments may illustrate the utilization of Coherence throughout PERCos purpose cycle. In this example embodiment, Coherence supports purpose cycle through the integration of Coherence manager Instances (CMI) in one or more of resource interfaces for each operating resource and associated processing sets within the purpose cycle. These CMI may undertake Coherence interactions with the Coherence managers that comprise Coherence dynamic fabrics which are integrated into PERCos purpose cycle operations.

In other embodiments, such as the CMI shown in FIG. 102, there may be Coherence managers, with CMI included in PERCos kernel Services within resources involved in the processes interacting with them. These architectural arrangements may be determined at the time of implementation and/or be pre specified, depending on purpose and/or context.

In the example below some processes share Coherence managers, for example a Specification, Resolution and Operations(SRO) process, whilst others such as purpose formulation processes may have, for example, a single Coherence manager. These choices may be specified and/or determined at implementation time, depending on purpose, context and/or operational efficiency.

A Coherence dynamic fabric (CDF) may include the Coherence managers, which are shown as peered however it is understood by those familiar with the art that, they may be any arrangement within the CDF for those managers, including for example, the escalation of one Coherence manager to administrate all the others and be the control manager for that CDF.

For example, as illustrated in FIG. 102, Simplified PERCos Cycle with Coherence Processing.

In some PERCos embodiments, to facilitate efficient and effective operations Coherence Services processes may use one or more specialized communications protocols that have been optimized for that purpose. For example, these may include one or more formats, specific semantics and/or syntaxes optimized for efficient Coherence communications that enables inter and intra Coherence Service communications.

These protocols may include one or more sets of metrics to support Coherence operations, including metrics specifically designed and optimized to enable high efficiency real time Coherence Service operations by providing Coherence services with near instant metrics as to resource operations and/or performance.

In some embodiments, such communications may include Coherence Messaging Services which may process message receptions and transmissions between one or more (often distributed) Coherence managers in an efficient and effective manner. A Coherence Messaging Service may also act to provide responses from Coherence managers and/or resource arrangements operating in conjunction with a Coherence manager, should either of those arrangements become disassociated and/or exhibit full or partial failure. For example if a resource arrangement loses, for whatever reason, the connection to the Coherence manager associated with the resource arrangement, the Coherence message may include sufficient information so as to be able to be received by Coherence Platform services and acted upon accordingly.

In some embodiments, Coherence Messaging Service is an instance of PERCos Platform Messaging Service with appropriate Coherence Messaging protocols, methods and languages.

In some embodiments, PERCos Specification, Resolution and Operations process (SRO) is a set of interlocking operating processes for input of specifications, reconciliation of those specifications to available resources, generation of operational specifications suitable for instantiation and provisioning of resources specified.

Coherence Services interact with SRO processes throughout the creation and utilization of Purpose Statements and associated specifications through management of sufficiency, completeness, applicability, capability, availability and/or suitability of resources applied to, intended for and operating in, support of purpose operations.

In some embodiments, Coherence Services may operate in support of specification, Resolution and Operations processes and may align in one embodiment, with the PERCos SRO process initially to generate Coherence specifications, which may be passed to the relevant operating session processes to instantiate, initiate and/or provide specifying elements to appropriate Coherence managers.

In some embodiments, Coherence Services operates across the three levels of the PERCos SRO process: Specification, Resolution, and Operational. Coherence interacts at these process levels such that as far as is possible the intended and delivered experience may be efficiently and optimally delivered to Participants and their purpose session operations.

During a purpose operating session, Coherence Services operations may, for example, comprise anticipation, selection, and, through appropriate PERCos resources and processes, reservation, scheduling, and/or provisioning of resources and Information sources. This process is interactive, recursive and/or iterative. For example current conditions of a purpose operating session may vary, requiring Coherence Services to respond to these variations, for example, through resource variation/substitution/parameterization and/or other Coherence Services process operations.

As purpose operating sessions unfold through, for example, user/Stakeholder interventions and/or one or more resource and process operations, user purpose may be satisfied and/or concluded, such that user may express their satisfaction, directly or indirectly, and/or through one or more automated process, the degree to which purpose of user(s) has been satisfied in whole or in part. This may be expressed as, for example, Quality to Purpose metrics, user purpose satisfaction metrics, and the like.

User(s) may select and/or one or more process may operate to extract from this unfolding one or more sets of Coherence Operations and/or associated resources, through reference and/or embedding, such that specifications for Coherence templates may be created expressing these relationships, arrangements and/or organizations. This may then be passed to one or more publishing services for publication, including to one or more Coherence directories. This may be undertaken at any point in purpose and/or Coherence unfolding.

The following diagram illustrates the Coherence Services process involved with example inputs and outputs.

For example, as illustrated in FIG. 103, An Example Generalized SRO Process Flow with Coherence.

Coherence Services processes may have "state" in so far as the specifications, Resolutions and operational specifications may have varying degrees of sufficiency and completeness, in whole or in part, as Coherence Services processes unfold towards an operating session and the associated Outcome across the Edge.

Coherence Services, in some embodiments, may utilize PERCos Platform Services, such as, Tests and Results (TRS), Evaluation and Arbitration Services, and the like, in all stages of Coherence operations to evaluate and/or validate the degree to which any given specification/Resolution and/or operational resources (including arrangements thereof), is sufficiently complete and/or able to be instantiated. Tests and Results Services may provide the appropriate validations, metrics, performance indications, specifications and/or other information that may be required for Coherence Services process to efficiently evaluate the suitability of one or more resources, for purpose operations.

During specification integration operations, Coherence Services processes may for example, produce one or more outputs. This may include the specifications upon which Coherence is operating, for example from Specification, Resolution and Operations (SRO) processes and further Coherence specifications associated with that processing. These sets of specifications may then be used, stored, retrieved and/or managed by one or more other process, including further Coherence and/or SRO processing. In some embodiments, these may be combined into specification formulations and potentially published as resources.

Another output from such processing, is additional specifications, where resources, processes, information and/or other PERCos and non PERCos elements are associated with the incoming specifications. This may include, by example, specific named resources being assigned, reserved, allocated, initiated, trained and/or in other manners associated with such specifications. This association may include binding and non-binding relationships, including, but not limited to, cryptographic methods, direct interaction, contracting, referencing, data passing, instantiation or other service, resource and appropriate method invocation. This process may produce complete or partially complete specifications, which is termed operational specifications, and as such are able to be instantiated and operated within an operating session or purpose operations and/or other PERCos experience processing.

For example, as illustrated in FIG. 104, Illustrative Example of Coherence Interactions with SRO Processing.

Both the Specification and Resolution processes Coherence specifications, may be published and/or made persistent, and as such be treated as PERCos resources. Operational Coherence specifications may also be published as templates (for example, excluding state information) and/or made into a "snapshot" and stored.

In some embodiments, primary system elements comprising PERCos Coherence Operations include: Coherence operating managers, Coherence dynamic fabric and PERCos Platform Coherence Services. Coherence managers and Coherence dynamic fabric are instanced from PERCos Coherence management services that utilize the Coherence operating specifications.

Examples of each of these interactions and processes in considered below.

Specification Coherence Services process operates within the specification operating context of Specification, Resolution and Operations (SRO) process and deals with purpose expressions (including prescriptive and descriptive CPEs), specifications, statements, resonance specifications, Constructs, templates, informational patterns, and/or other contextual (and/or potentially nodal arrangements of) resources to produce specifications optimally matched—regarding efficiency, purpose prioritization, collective purpose resolution, and the like—to aggregate purpose and known resource parameters and availability. In some embodiments this may include framing purpose expressions, which comprise prescriptive and descriptive CPE and their Core Purposes.

For example Coherence Services may offer alternate and/or complimentary specifications for user's purpose expressions, such as resonance specifications, differing resources to those specified, and/or propose specific resource sets when a resource type (rather than a specific resource set instance) is specified. Further Coherence Services may provide sets of parameters and/or configurations for one or more resources that may optimize or make those resources operate more efficiently in pursuit of purpose. Coherence Services may, for example, complete and/or make sufficient specifications where resources or other specification elements are incomplete, including accessing other Coherence specifications, Tests and Results services and/or other processes to identify potential completion, substitution and/or parameter variation candidates.

Specifications may include, for example, direct reference to specific resources, such as "Jim's HDD-ID 1234" or similar, which specification Coherence Services may not operate upon and pass directly to Resolution Coherence. Specifications may also include indirect references to resources, such as resource ("Type X"), which may match to an existing class of resource types, or resource ("HDD/7200 rpm/120gb/SATAIII") or similar, where specification Coherence may act to substitute/vary the specification parameters before passing to Resolution Coherence Services, such as where an appropriate local Nodal arrangement may have a resource of "type Y," which offers all the functionality of "type X" (for example a type Y=1 Gigbit pipe, whereas type X=100 Mbit pipe, with no other parameters varying between type X and type Y— including commercial terms).

For example, as illustrated in FIG. 105, Illustrative Example of SRO Specification Processing and Coherence.

Specifications may comprise purpose parameters for session elements, including user (including Roles) and/or collective user Purpose Statements (including groups), resource CPE and other metadata, and resources purpose metrics and/or other associated specifications and other metadata.

Resolution Coherence Services process brings together through assessment and fulfillment, resources available for use in specification, Resolution and Operations operational processing and operating sessions, which may be selected, reserved, scheduled and/or nominated for such use, by integrating, completing, and/or resolving (when and where applicable) the input Resolution specifications. Upon completion of the resolution process, including Coherence interactions, Resolution process generates an operational specification sufficient for SRO operating processes to instantiate appropriate operating sessions. Such specifications may be published through appropriate publishing services.

Resolution Coherence Services may offer alternative resource specifications results or further input possibilities to one or more users/Stakeholders arrangement for user/Stakeholder operations and/or interactions.

For example, as illustrated in FIG. 106, Illustrative Example of SRO Resolution Processing and Coherence Supporting PERCos SRO specification and Resolution processing may involve one or more iterative and recursive Coherence Services processes that as resources and processes may be identified and allocated within Resolution Coherence. Coherence Services may modify, vary, and/or update specifications, including operating specifications. For example, Coherence Services may update specifications by including direct user/Stakeholder inputs, in response to prompting for inputs and/or selections, all the foregoing in order to optimize the satisfaction of users/Stakeholders and/or resource provider session purposes and/or further resolve and/or complete resource operations.

In some embodiments, PERCos SRO operational processes may include Coherence managers that arbitrate uses and applications, in whole or in part, of resources, processes and/or other operational functional delivery, interaction and support mechanisms, such that purpose specifications are optimally represented through purpose operations, given purpose, session, specifications (including rules), resource and Coherence requirements, obligations and constraints in one or more operating sessions.

For example, as illustrated in FIG. 107, Illustrative Example of SRO Operational Processing and Coherence Coherence Dynamic Fabrics (CDFs) may comprise Coherence managers, resources, processes, information and or metadata. Coherence managers may generally operate in concert, instructed through purpose, specifications (including rules) and/or Coherence specifications. For example, a CDF may include information regarding availability and/or operations of the CDF elements.

In some embodiments, Coherence Services may, through for example PERCos Specification, Resolution and Operations (SRO) processing become invoked for processing (including evaluation and arbitration) a number of purpose specifications, potentially from multiple users/Stakeholders. Often the objective may be to reconcile these specifications into a single specification that may, be the authoritative specification for that operating session. In some embodiments, this may involve one or more authoritative specifications (generally control specifications), which may be provided by one or more Stakeholders, where the relative priorities of those specifications need to be arranged, reconciled, and amalgamated to provide a sufficiently cohesive operational specification for instantiation.

Coherence Services process may operate through a series of networked Coherence managers to support one or more specific operating instances (such as Frameworks, operating Contexts, resource fabrics, nodal arrangements, and the like), for one or more Participants, their cumulative operating conditions (such as a group of Participants interacting in a shared purpose manner and/or examples such as video conferencing, resource sharing, structured and unstructured purpose operations), and/or as a platform service in support of multiple Coherence operations for common purpose and individual purpose operations.

In one embodiment, a Coherence manager, such as the operating session Coherence manager, may be party to the operating agreement that the operating session management has negotiated with PERCos resource Management System (PRMS), other resource managers and/or delegates thereof.

In this embodiment, the operating agreement may include a number of control specifications that control the operations of the resources to which they apply. Coherence Services may interact with these control specifications, often to set a baseline for resource Operations and potentially to designate appropriate PERCos Monitoring and Exception handling service instances to monitor the resource operations, based on the control and/or other specifications.

In such an embodiment, the resource also includes a Coherence management instance that is part of the resource interface.

This is shown in FIG. 108, where the Coherence manager is part of a CDF.

For example, as illustrated in FIG. 108, Illustrative Example of Coherence Managers, Operating Agreements, and Operating resources.

Coherence managers may also attempt to provide alternate control specifications and potentially alternate resources for one or more resources operating within an operating session. These control specifications may, in one example embodiment, be arranged in the priority and/or probability of their being used within the operating session, and may also be associated with other resources, shadow resources, that Coherence Services may have arranged as alternates for those currently operating in an operating session.

FIG. 109 illustrates a potential simplified implementation of such an arrangement of control specifications and shadow resources.

For example, as illustrated in FIG. 109, Coherence Manager, Shadow resources, and Alternative Control Specifications.

In some embodiments, Coherence comprises one or more sets of Coherence specifications (including Coherence templates and/or patterns), Coherence managers, other resources, such as, Coherence Evaluation and Arbitration Service, Coherence Test and Result Service, PERCos resource Management System (PRMS), and the like. These Coherence components may be arranged into a cohesive Coherence Dynamic Fabric (CDF).

Coherence specifications may include specification sets for the operations to be undertaken by Coherence and those specifications that control the Coherence managers (for example control specifications).

Coherence dynamic fabric combines Coherence operating managers and other specified resources (including resource fabrics), processes, Information sets into a cohesive arrangement of connected processes in support of those purpose operations that Coherence is currently supporting. This may include sets of Coherence specifications as instanced at any specific point in time. In some embodiments a Coherence dynamic fabric is created by an initial Coherence manager which is invoked by appropriate specifications. This may include for example, the initiating Coherence manager and or the instanced CDF having multiple relationships with other Coherence Mangers and Coherence dynamic fabrics, including network arrangements and distributed operations.

For example, as illustrated in FIG. 110, Simplified Example of an Embodiment of resource Arrangements.

Coherence dynamic fabric may comprise one or more Coherence managers, in any arrangement including Coherence network arrangements (for example distributed processing arrangements, cloud services and the like), and any other PERCos managers (for example PRMS), specifications that may be required to interact with those managers (including control specifications), involved in provision of those instances of PERCos resources, processes, information sets and/or other metadata that is specified in the appropriate Coherence specifications and consequent Coherence operations in support of unfolding purpose operations.

For example, in some embodiments, these components of Coherence dynamic fabric may change, adapt, vary, be substituted, and/or be manipulated in support of Coherence operations as specified and/or managed by Coherence dynamic fabric manager.

Coherence dynamic fabrics may also be made persistent, with the fabric members being included by embedding and/or reference with sufficient detail so that the fabric may be re-instanced by the appropriate services. In this manner, the Coherence dynamic fabric may become a PERCos resource, with either state, in part or in whole, maintained.

Coherence dynamic fabrics may have interactions, communications and/or connections to one or more resource fabrics and their associated managers, for example PRMS. The interactions of these fabrics, combined with Coherence Services process operations comprise may, in some embodiments, enable the operating framework and infrastructure to support user purpose operations. These interactions between fabrics are controlled by appropriate Coherence managers in the response to the totality of specifications in which they operate.

Coherence dynamic fabric manager, in some embodiments, is an instance of a PERCos Platform PRMS manager configured as a Coherence manager that operates within CDF to manage one or more other Coherence managers and the associated resources.

CDFM may operate as PRMS managers, employing and invoking that set of PERCos Platform Services that may be required to undertake their specified management.

For example, CDFM may interact with an instance of the PERCos Platform History service for the operation of CDF History, and with PERCos information systems (for example PIMS) as that may be required for the management of the information within one or more Coherence sessions.

For example, as illustrated in FIG. 111, An Example Coherence Dynamic Fabric Manager.

Example embodiments of PERCos Platform Services operating as instances with CDF are outlined below.

A Coherence dynamic fabric monitor is an instance of PERCos Monitoring and Exception Services.

A CDF monitor observes operations, activities, parameters, metrics and/or other variables/values associated with resources (including Constructs), processes and/or other PERCos Platform services such as PIMS, PRMS and/or other processes.

In one embodiment, a Coherence dynamic fabric manager may interact with monitor instances that are operational within Nodal arrangements, operating sessions or other operating resource arrangements and operational groupings to/from a consolidated Coherence Monitoring function; alternatively, in a further embodiment, a Coherence dynamic fabric Monitor may, subject to appropriate rules and other specifications, interact directly with one or more resources and/or resource fabric's that comprise such arrangements.

CDF Monitors may be instantiated as single or multiple instances dependent on arrangements that may be required for operational efficiency and/or other specified considerations.

CDF Monitors outputs may aggregate resource and/or operational information sets to Coherence dynamic fabric manager and other Coherence Services processes as that may be required and instructed by one or more Coherence managers in pursuit of Coherence operations.

CDF Monitors may also provide input to Coherence Evaluation and Arbitration instances within or as referenced by Coherence dynamic fabric.

CDF Monitors may also provide input to appropriate Coherence History instances as directed and instructed by Coherence managers.

In some embodiments, Coherence dynamic fabric Evaluation and Arbitration services are operational instances of Coherence Evaluation and Arbitration services that provide dynamic operational Evaluation and Arbitration within a Coherence dynamic fabric. These may operate as instructed by one or more sets of control specifications (which may for example include associated parameters) that are adapted by and for Coherence and/or Coherence dynamic fabric operations.

Coherence dynamic fabric Evaluation and Arbitration Service may operate, subject to appropriate specifications (for example control specifications), to: balance differing priorities, resolve incompatible, inconsistent and/or incomplete operations; provide additional alternate resources, processes, specifications and the like; disambiguate specifications/expressions/commands; select from alternates; and in other embodiments employ one or more techniques, including methods, to maintain the integrity of Coherence dynamic operating fabric in line with Coherence dynamic fabric manager operations and Coherence operating specifications.

Evaluation and Arbitration may include the use of templates for incoming specifications/rules, and/or operations which may then be acted upon by Evaluation and Arbitration and/or Coherence operations to produce further templates that include those arbitrated specifications.

Coherence Management, in some embodiments, may for example comprise the combination of resources, processes and functional elements outlined below. The following simplified example diagram illustrates an implementation of Coherence manager services for an operating session embodiment which has been created from an operational specification derived from PERCos SRO processes (which may also have had Coherence managers operating as part of that processing).

For example, as illustrated in FIG. 112, An Example Coherence Manager Services Embodiment.

In some embodiments, Coherence manager services may comprise a set of instanced elements as shown in FIG. 112*a*: An Example of Coherence Components.

In some embodiments, a Coherence Evaluation and Arbitration Service is an instance of PERCos Platform Evaluation and Arbitration Services that has been provided appropriate control specifications.

In some embodiments, Coherence Evaluation and Arbitration Services accept inputs from one or more sources of specifications to produce, at the conclusion of the SRO process, an unambiguous Coherence operating specification which Coherence Mangers may operate upon. Coherence operating specifications comprise those Coherence and operating specifications that are parsed through PERCos SRO processing and associated Coherence Operations. Examples of these operations are outlined in the table below.

| SRO Phase | Coherence E & A Input | Coherence E & A Output |
|---|---|---|
| Specification | One or more Coherence specifications, rules, user/Stakeholder Interactions, purpose expressions, contextual specifications and/or other specifications and/or specifying elements | Coherence Resolution Input specification |
| Resolution | Resolution Input specification(s) and iteration, recursion and feedback from PERCos SRO specification operating sessions and/or Coherence specification managers and/or any Coherence Platform Services interactions | Coherence operational specification |
| Operation | Coherence operational specification(s) | Coherence operating specifications |

Coherence Evaluation and Arbitration instances may operate when an operating session and/or Coherence dynamic fabric is operating to continue to resolve specification/operating ambiguities, contradictions and other Coherence Services process operations under direction of instanced Coherence Management arrangements.

For example, as illustrated in FIG. 113, Illustrative SRO Specification Flow with Coherence Support.

Coherence specifications, including Coherence Resolution Input specifications, Coherence Resolution specifications and/or Coherence operational specifications and Coherence operating specifications may comprise:

- Purpose expressions and associated specifications and/or elements thereof,
- Users/Stakeholders Profiles and context specifications,
- Context and/or resource specifications including Foundation (and/or nodal) arrangements and/or other operating constraints/conditions, Constructs, templates/Patterns and/or other Coherence specification arrangements, and/or Governance and/or other system wide rules.

Specifications sources may comprise users/Stakeholders and their Participant representations and/or arrangements with other Coherence Arbitrators, including Shared Purpose specifications and other associated specifications.

Coherence Services may perform arbitration based on sets of rules, priorities, metrics (including weightings), algorithmic expressions, Profiles and preferences, Statements, specifications, other metadata and/or information expressed in a form suitable for operations by Arbitration services. These may be instanced as Coherence methods and/or PERCos resources and processes.

Evaluation and Arbitration may include the use of templates for incoming specifications, operations by Arbitration on specifications and production of templates that include Arbitrated specifications. The degree of completeness of a template produced by Evaluation and Arbitration may not be limited by the degree of specification within that template.

For example, as illustrated in FIG. 114, An Example PERCos Evaluation Service Instance.

Coherence specifications that are presented may be validated for internal consistency in a manner similar to static typing, to ensure the incoming specifications may be further evaluated by Coherence methods and/or processes. Specifications that do not pass validation may, in part or in whole, may be passed directly to originating process and/or to PERCos exception handling service. Potentially contradictory specifications may be identified as such and may be passed to one or more appropriate methods, process and/or evaluation services. Evaluation Services include user interactions where appropriate, for processing, which may resolve these inconsistencies through other PERCos process and/or referencing alternate Coherence specifications which have successfully reconciled these contradictions, through one or more processes, including reconciliation in a similar manner.

One or more process and/or evaluations may be utilized to resolve specification contradictions in any arrangement of such methods and/or process, including user/Stakeholder interactions.

Contradictions that cannot be resolved may be passed directly to the originating process, users/Stakeholders (including groups thereof) and/or passed to PERCos Platform System Exception handling services. Coherence managers may retain state and/or other information as to the status of such reconciliations for further processing if and/or when may be required.

Coherence methods may include one or more PERCos and/or other methods that may process incoming specifications to create an appropriate output. Coherence methods may expose one or more control interfaces to other Coherence Services and/or PERCos processes including user/Stakeholder interventions and interactions. Coherence methods operations may be subject to rules and/or other governance.

Some example Coherence methods may include:

Table lookup and databases (e.g., to perform systematic substitutions),

Graph and/or tree matching algorithms (e.g., to find near-matches),

Optimization algorithms (e.g., to improve resource allocation),

Decision theory (e.g., to limit search),

Collaborative techniques (e.g., to interpolate, to arbitrate),

Machine learning (e.g., to discover relations, to predict behavior),

Statistical inference (e.g., to cluster, to adaptively filter), and/or

Expert systems.

Coherence specifications include one or more algorithms operating in one or more arrangements that may process Coherence specifications/operations to create an appropriate output. Coherence specifications may expose one or more interfaces to other Coherence and/or PERCos processes including user/Stakeholder interventions and interactions. Coherence specifications operations may be subject to rules and/or other governance.

Coherence Evaluation and Arbitration services in common with other PERCos resources, may create and deploy one or more control specifications for use by other resources, processes and/or Coherence Services operations. These control specifications may invoke one or more interfaces for interactions with users/Stakeholders (and their representations such as Participants) and/or other resources, processes and further specifications.

For example, this may include control specifications that are passed to or invoke interfaces of Coherence managers (including Coherence dynamic fabric managers), further Evaluation and Arbitration services, purpose navigation interfaces, user/Stakeholder interfaces and/or any other resources and their interfaces.

Coherence Evaluation and Arbitration may use one or more Evaluators/Arbitrators in arbitrary arrangements across one or more resource arrangements (including Constructs, class systems, information organizations and the like) and/or operating sessions. Inputs-to and outputs-from individual Arbitration/Evaluation instances may be arranged in series, parallel or any other arrangement and/or configurations, with one or more Coherence Arbitrators/Evaluators acting to control other Coherence Arbitrators/Evaluators in hierarchical or other control structures known in the art.

In some embodiments, Coherence operating specifications may be generated from negotiated Outcomes of one or more Coherence Evaluation/Arbitration arrangements evaluating and arbitrating incoming specifications (for example using PERCos SRO processes), producing a set of operating specifications upon which one or more Coherence managers may act.

Coherence operating specifications may be published as resources (including as templates) and conform to PERCos standardized specifications.

A Coherence monitor embodiment is an instance of the PERCos Platform Monitoring services, which operates to monitor one or more sets of operating resources, processes, Information organizations and/or other PERCos elements, such that the operating characteristics, inputs and/or outputs, associated specifications and/or other attributes may be monitored.

For example, Coherence monitoring may monitor network traffic on a broadband pipe or may involve some more sophisticated management of complete operating systems or the virtualizations thereof.

For example, resources, processes, Information organizations may provide Coherence monitor directly or indirectly, by reference or embedding the appropriate methods and access to enable Coherence monitor to operate. Such access may be specified as a prerequisite for operation of resources and the like by one or more Coherence managers and their associated monitors.

Coherence monitors may receive through appropriate specifications, thresholds, events, combinations and/or conditions from one or more Coherence operating specifications and/or other operating agreements, sufficient information so as to determine performance levels to be monitored within one or more operating sessions.

Coherence monitoring may also provide input to and feedback from one or more purpose operating session dashboards, with appropriate representations of and/or controls over Coherence Operations and Monitoring for user/Stakeholder, Role, resource and/or other process interactions.

In some embodiments, Coherence History is a repository of actions, operations and/or activities associated with one or more Coherence managers. Coherence History utilizes, for example, PERCos History Service instances which provide for appropriate PERCos information systems to be available for the storage, management and/or manipulation of Coherence History information as may be required.

Coherence History may be local and/or distributed and may be arranged in association with one or more Coherence managers, reflecting their arrangements, and/or managed in accordance with further specifications (including rules).

Coherence History may provide the source material that is subject to rules governing that material. Such source materials may be used to recreate one or more previous operating sessions, constrained by material comprising Coherence History. For example this may depend on the degree to which the History is complete and resources available for such operations. Coherence History may be combined with other resources and/or Histories such that complete or partial experiences may be replayed in part or in whole.

In some embodiments, the degree to which such a History may be replayed may in whole or in part be determined by specifications (including rules) and/or other processes that are authorized to undertake such replay operations. For example in a multi-user meeting, only the administrator of the meeting may be able to replay the whole meeting, whereas individual users may be able to replay only their interactions. Another example may be that the Lecturer may be able to replay the complete lecture including all student questions whether asked privately (to the lecturer) or in the lecture, where as a student may only be able to replay the lecture and their own questions. Access to Histories may also be based on Roles, identities and/or other authentication and authorizations.

In some embodiments, Coherence History may be the repository of, at least in part,

- Operational specifications and any other input to Coherence Services processes (including for example Arbitrator/Evaluators),
- Results, outcomes and/or outputs of Coherence Services processes (for example form Coherence Arbitrator in form of Coherence operating specifications),
- Results, outputs and/or specifications of Coherence Monitors (for example as purpose sessions unfold),
- Specifications, Results, outputs and/or outcomes of Coherence manager operations (including for example commands and parameters issued by Coherence manager to one or more other resources and/or processes).

In some embodiments, Coherence History represents the totality of interactions of one or more Coherence managers over one or more time periods. This may include the relationships and/or performances of resources that the Coherence manager has interacted with, including operating sessions and their associated purposes. For example this may include history of the purpose expressions, metrics, Dimensions, Reputes and/or any other purpose related variables and/or values.

In some embodiments, histories may represent the unfolding expressions of user purpose and as such may be navigated by one or more processes to identify alternative resources and Results. For example this unfolding purpose may be instantiated as directed Graphs.

In some embodiments, such histories may be used by Coherence Services processes to undertake modeling such that optimized purpose resource arrangements coupled with appropriate processes, interfaces and/or other specifications and characteristics may be determined. For example such processing may be used by one or more experts in determining and creating resonance specifications.

Coherence History may be used, in part or in whole as the operational specification of further Coherence Services processes, subject to the continued availability and performance of resources, processes and/or information.

In some embodiments, Coherence specifications, such as, templates, may be published. For example such publishing processes may involve the selection of that set of resources (including specifications), processes and/or information represented in a format suitable for publishing as a PERCos template. This may involve user/Stakeholder interventions and/or computational processing. For example the input set may be passed to an instance of PERCos publishing Services that has been configured for publishing of Coherence templates.

In some embodiments, acknowledged Domain experts may publish Coherence templates as expressions of solution strategies for one or more expressed purpose(s) and/or resource sets for one or more purposes. For example these Coherence templates may be included in one or more resonance specifications.

Coherence templates may include purpose session related information of sufficient detail so as to enable Coherence management to establish a purpose session of similar capabilities so as to address the range of purpose expressions associated with the purpose sessions.

In some embodiments, Coherence Services are abstractions of operating sessions, such that the resources, processes and/or information and/or their arrangements/organizations are expressed as part of template, independent of any session operational details.

For example, as illustrated in FIG. 115, An example Coherence Template Publishing.

Operating System Introduction

This section of the disclosure describes an example PERCos purposeful computing environment embodiment configured to support purpose computing. A PERCos purposeful computing environment embodiment may include embodiments of: a PERCos operating system, one or more operating layers, virtual machines, specification frameworks, purpose simplification methods (for example Dimensions), applications, plugins, and structures to identify, access, evaluate, provision, organize, and manage the use of computing arrangement resources. PERCos embodiments may, for example, include, one or more higher level and lower level languages for formulating and creating purpose expressions, standardized Dimensions, metrics, Constructs, Reputes, purpose and resource classes, other ontological and/or taxonomic structures, Resource publishing and organization, and/or resonance specifications, web services, participants, and/or the like. Constructs may include Purpose Class Applications, Frameworks, Foundations, purpose class services and the like.

A traditional definition of an operating system is a software arrangement that controls computer resources and provides certain common services. Operating systems are intended for and designed to support the execution of applications that themselves support one or more classes of tasks, such as activity tasks including for example productivity, entertainment, and information management tasks. Operating systems and associated layers are most frequently general purpose in nature. They provide foundations for activity centric computing tools enabled by software applications. Operating systems and associated layers are bedrock capabilities, they provide general underpinnings for applications to interact with foundation resources such as hardware, directories, and OS level computing services.

In key ways, modern computers represent a new (a few decades old) category of human tool use. From one perspective, computers are a new tool category, not because they are electronic and perform processing and control functions, but because they are an extraordinarily general type of tool that has been incorporated ubiquitously into modern life. Computing tools now enable, operate, and/or administer enormous portions of modern human activity and computers and their operating systems, given the profound generality of their application possibilities, have created a new spectrum of challenges regarding user direction and control of a general resource tool set.

The challenge is to shape and direct computing arrangements of profoundly general set of capability in such a way that most productively and effectively satisfies, as they arise, one or more specific user purpose sets.

PERCos embodiments, functioning as a web wide operating environment, and/or as an operating layer, application, plug-in, and/or other modality, enables computing arrangements to express user purpose and interpret corresponding resources for suitability. PERCos embodiments employ their purpose related technology capabilities to enable one or more best fit resource options to be identified, prioritized, otherwise evaluated, and provisioned from the vast extent of the internet, and complementing intranets. Further PERCos in some embodiments can enhance the resources themselves in optimizing user understanding, learning, discovery, and/experiencing, as the case may by, for example, threading PERCos capabilities into their functions and environments, influencing resource specific resource management and other processes including choice opportunity management and information evaluation and provisioning, As with any tool sets, computing arrangements are apparatus and method embodiments to realize goals. But with computing, the "goal" is like a place that a user reaches, and as with the general purpose tool "vehicle" that takes an occupant to a "place," normally computers are user directed towards "methods or method embodiments" for achieving the at least a reasonable, and desirably best contextually practical and most satisfying outcome.

Given the highly general purpose nature of computers, and of many users/computers combination, some embodiments may employ software, related information and/or portions thereof and related processes that implement user goals and direct computing resources towards purpose fulfillment. Normally this process, given the enormously general purpose nature of computing arrangements, involves software and/or services, computing machinery, and related information and processes, that characterize, select, and provision resources, and in consequence, result in further software and/or related information and processes that then operate on or in conjunction with such user computing arrangements. User directions in this regard should be circumstantially sufficiently informative as to initiate, or otherwise lead to, one or more resource sets that provide the best feasible overall outcome, if computer use is to be efficient and satisfying and produce optimum results. Generally, though, neither computing operating system arrangements nor computing applications are organized to, and do not provide, these purpose characterizations and selection optimization capabilities. Computing environments, and even specialized computer applications, are normally blind to human purpose. Rather than providing a systematized environment for purpose expression and optimum fulfillment, they simply capture and implement user interface actions by initiating task specific, next step operations, with minor and highly vertical exceptions.

By contrast, extensive, standardize tool structures that enable key conceptual user purpose simplifications are made available in some embodiments of PERCos purposeful operating environment. Users may use these intelligent tools and structures for specifying their initiating, interim, and/or outcome purpose approximations. In response to user interactions with these structures, a PERCos computing arrangement embodiment may provide users with contextually relevant one or more outcomes, choices, and understanding and knowledge/decision enhancing surrounding environments, that least to next step interactions. PERCos operating implementation embodiments may respond, under many diverse circumstances, to such user interactions, that through Resource identification, evaluation, organization, provisioning and/or use, as appropriate.

With PERCos purposeful operating environment embodiments, users may, at least in part, communicate their purpose expressions in the form of approximate purpose simplification variables. These variables can be communicated in the form of standardized and readily interpretable representations of key purpose approximation concepts/perspectives, such as, for example, expression of Core Purpose—verb and category combinations—which may be complemented by purpose contextual Dimension Facets. In the end, out of a universe of general purpose possible directions and uses, these intelligent tools enable arrangements of PERCos environment computing embodiments to take and interpret (and where appropriate amalgamate with other information and/or modify) user purpose expressions to form operating PERCos purpose statements enabling purpose expression responsive results. These results may include, for example, resource choices and arrangements, queries to users, and/or provisioning of resources that unfold towards implementing user indications/specifications of user purpose, however well or poorly conceived, however well understood and thoughtfully directed by the user, and however such direction is meant as initiating a process, contributing to interim goals, and/or at least in part identifying an ultimate, desired outcome.

Normally, user directing of a computing arrangement towards an end result—which may comprise a desired specific result and/or an unfolding sequence of interim results and/or experiences leading to an outcome—involves a dialogue between user and computer that traverses the user/computer interface, called in PERCos, the user/computer Edge. The PERCos purposeful operating environment embodiment supports such user/computer communication boundary operations, comprised of both human and computing arrangement processes, which, for example, may be surfaced by specific purpose class applications, and involves their (user's and computing arrangement's) respective discerning of input and their respective forms of interacting with their respective event horizons. These two horizons, user and computer, and their underlying processes and states, represent two very different environments that inherently communicate, compute, and perceive in very different manners. For humans, this is realized as participant experience and underlying psychophysiological processes and for arrangements of PERCos purposeful operating environment embodiments, this participation is realized as specifications, states, and processes that reflect human set input. The sum of this computer session activity is an unfolding sequence of human internal perception, and external communication actions, as well as periodic tangible world results, such as producing a product, and corresponding computer generated responding processes that interpret, and relate and employ resources, to at least in part to fulfill PERCos purpose language (low and/or high level) instructions. How this intersection of human and computer horizons may optimally interplay in the service of human purpose presents perhaps the next great opportunity in computing architecture, defining and implementing a systematized cosmos of resources available to users in a manner selected and fashioned to user purpose. PERCos purposeful operating system environment embodiments and environment embodiment extensions (API code, plug-ins, purpose class applications, services, and the like) comprise a technology domain that resolves many of these challenges.

PERCos system embodiments may comprise one or more network operating environments for purposeful computing and common purpose management. PERCos global purposeful network embodiments extend traditional operating system capabilities and enable formulation of user purpose expressions, employing apparatus and method embodiments for matching Contextual Purpose Expressions (CPEs) and related input to resources and their associated purpose related specifications available locally and/or on one or more networks and/or provided one or more cloud services.

A user is either a human set, and/or entity acting for itself as an organization, group, or other entity. The foregoing may interact with a global purpose cosmos. One aspect of some PERCos system embodiments is their ability to include, when interfaceable and interpretable, all potentially active elements of a session as resources, including, for example, all process contributing elements, including any and all contributing forms of information, software, devices, network resources, services, Participants, and the like, altogether being uniformly treated as resources. Data, memories, devices, microprocessors, databases, software, services, networks, Participants, resonances, Reputes, purpose class applications and services, Foundations, Frameworks, and the like may all be managed as resources by PERCos Resource Management Services.

PERCos environment embodiments are based on the observation that human-computer interaction involves a set of experiences that unfold during sessions that are generated using one or more resources (for example including: computing hardware, software, data, services, and when applicable other (direct or indirect) users/Stakeholders. The articulated purposes of users— at times complemented by preset preferences, session contextual related information, standardized simplifications, historical information, and/or purpose expression (and/or other metadata information related to resources)—normally provide the preliminary specifications for PERCos embodiment sessions, and inform the identification and/or prioritization of appropriate session resources.

Some PERCos environment embodiments enable users to formulate their intent and intent contexts for assembling arrays of optimally matched resources based on their purpose formulations and contexts. In many cases such optimal resources can be sifted from boundless resource stores, with or without assistance of third party expertise, and PERCos embodiments may play the role of local and/or network-based operating system arrangements, managing this new relationship between users and resources and enabling new apparatus and method embodiments for optimally provisioning computing sessions with most appropriate resource capabilities.

The explosion of new mobile computing platforms, high-bandwidth communication networks, content provisioning infrastructures, cloud computing resources, has created relatively boundless resources, such as: applications, content materials, points of access, services, Participants, and the like. Given the massive expansion of resource types, instances, and locations as well as a rapid expansion in the types and configurations of computing devices, locating resources that may best satisfy user goals, a historically difficult challenge, is now an often impenetrable and inchoate resource amalgam populated with unrecognized resource opportunities. Even the most skilled developers often find it challenging to keep track of the idiosyncrasies of various applications, proprietary file systems, and databases. Even in their field of particular expertise, experts frequently have great difficulty in managing and deploying optimal resources corresponding to specific requirements.

PERCos embodiments provide compelling improvements in identification and provisioning of resources through innovative space-based identifying characteristic storage/manipulation techniques. For example, a directed graph representing an array of characteristics of one or more PERCos resources may allow an algorithm operating on the graph to be used as an expression for matching and/or other analysis purposes. A significant distinguishing feature of PERCos embodiments is its very general definition of "resource," and its uniform treatment of resources. For example, memory, processors, databases, computational units, and human Participants may all have Resource interfaces/APIs and be used as resources in the generation of results. This uniform treatment of Resource enables PERCos to be a networked management platform for "one to boundless" computing. That is, a user may benefit from resources located anywhere, made available by any provider, consistent with PERCos standards. For example, published materials and/or provider services might be used by anyone, anywhere, in user-directed and/or otherwise facilitated combinations that may have been unanticipated by their providers.

PERCos embodiments approach computational modeling in a unique fashion. By seamlessly integrating users' local computing operating systems and globally distributed services and resources, PERCos embodiments greatly extend traditional operating system capabilities. PERCos embodiments can enable user Contextual Purpose Expressions and employ apparatus and method embodiments for matching such expressions with descriptive expressions associated with resources, where such resources may be available locally and/or on one or more connected networks. Users may thus connect to a global "contextual purpose network."

In summary, PERCos environment embodiments may include, for example and without limitation, the following functionality:

1. Support standardized expressions of purposes and related contexts, to support the recognition of resources optimally matching purpose expressions, such as those provided by users for sessions and/or Stakeholders for resources.
2. Support an experience management architecture enabling the rendering of resources as experience supporting constructs consistent with user and/or common purpose expressions.
3. Uniquely systematize a global range of possible resources, including, but not limited to: operating system components and services, software, hardware, data, and participant representations of user sets, supporting the identifying, evaluating, and arranging of resources to optimally match purpose expressions, including harmonizing common purpose specifications.
4. Synthesize applicable contributing specifications into optimally balanced and purpose responsive operating specifications including for example, resolving inconsistencies and incompleteness between purpose related specifications to produce appropriate session operating instructions.
5. Enable corresponding of user contextual purpose with purpose associated Resource specifications in order to identify, evaluate, prioritize, filter, provision, and/or manage usage of such resources and/or subsets and/or portions thereof.
6. Enable arrangements of Resource sets/environments that are functionally more capable, such as, for example, more effective, efficient, adaptive, robust, secure, than its underlying resources.
7. Extract specifications regarding user processes to generate enriched contextual user profiles and prospectively use them to assist more efficient generation of contextual purpose statements.
8. Extract specifications to build, for example, PERCos templates, Frameworks, Constructs, and the like from operating sessions for use and/or publishing.
9. Extract contextual purpose-related variables of user-computer interactions to generate enriched Resource usage patterns that may be prospectively used to facilitate more efficient contextual purpose session operations.
10. Support Resource Publishing and associated Resource environment organization where Publishing may include, for example, Resource identity, relevant Stakeholder identity (for example creator, publisher, provider, distributor and the like), contextual purpose specifications, including for example, Contextual Purpose Expressions (CPEs), purpose-related metadata, associations to other resources including purpose class specifications, value chain specifications, and the like.

PERCos purposeful computing environment embodiments may comprise without limitation the following:

- Contextual purpose specification language(s) to enable users to frame a session representing their expressed purpose(s) in meaningful and effective ways that, in part, include "standardized" elements, such as Core Purpose, Dimensions, metrics and/or other PERCos standardized and interoperable specifications. For example this may include such expressions as "learn thin-film solar cell technology," or "listen to 'three tenors' 1990 Rome concert" wherein "learn" and "listen" are PERCos standardized chosen purpose characterizing variables contributing to framing of the purpose context, and which are combined in these examples with categorizing elements.
- A suite of languages for specifying resources, including for example and without limitation, Repute expression languages (to express Reputes), Construct specification languages (to create, extend, update, and/or otherwise manipulate Constructs), messaging languages (for communications), and the like.
- A suite of intelligent tools and services for compiling, evaluating, interpreting, reconciling, completing, debugging, and resolving Contextual Purpose Expressions, including platform Resource variables, into sufficient purpose expressions and specifications that may be combined to create further purpose statements that may supply users with experiences that "best" fulfill such purpose statements as may be modified by stored preferences, experts, expert support systems, Artificial Intelligence, and the like.
- Information storage arrangements that make available resources for one or more PERCos operations. Such arrangements and/or specific resources may have associated purpose expressions and/or other metadata. Such storage arrangements may include resources and/or other information sets in any arrangement.
- Identity management systems that enable PERCos operations through contextual identities.
- A suite of PERCos Platform Services, such as PERCos Resource and Operating Session Management Services (PRMS), Coherence, Evaluation and Arbitration, Test and Results, Similarity and Matching, Publication, Navigation and Exploration, Monitoring and Exception, Information Management and Persistence (PIMS), History, Repute and other supporting services such as for example, Resource Reservation, Reasoner, Time Services and the like that are needed to support purpose fulfillment process.

Users of current computing systems are only too often specified to use pre-formulated programmatic components and libraries that they sometimes modify for their own use and deployment. Such systems require users to express even the most simple of their intentions through the lens of pre-structured applications which encapsulate the user activities. Users of such systems have limited, if any, support for flexibly formulating and fulfilling their purposes.

For many purposes, even if users are able to formulate their purpose explicitly, the users may have a difficulty finding the optimal resources to fulfill it. For example, users who wish to store video in today's general computing environment, have the option of utilizing a specialist software product or customizing standard products to meet their own particular needs. If users choose the latter option, then the users may have to select a storage apparatus and method embodiments (multiple terabytes of disk, for example), storage management (including indexing, such as a database), and sufficient processing to manage video content and sufficient network capability for the transmission to and/or reception from the users' computing arrangement.

Moreover, even in the case where a user is able to "formulate" an instruction set for fulfilling a defined and initiate a purposeful process, it may be very difficult for them to "capture" the instruction set and reuse it at a later time. They certainly have limited apparatus and method embodiments to share their captured knowledge with other users.

One possible reason for these inadequacies is that current operating systems, by definition, are resource managers. They manage resources, such as memory, disk storage space, CPU, network channels, and network applications. But they manage these resources as mostly low level entities, not aware of higher purposes. They are not aware of the semantics of interaction and the characteristics of human intent across human-computer Edge. As a result, the burden of using such systems to fulfill their respective purpose is squarely imposed on a user who normally does not have the background and expertise to characterize and identify purpose fulfilling resources.

Unfortunately, since users generally are not expert in most areas of interest and activity, they lack the apparatus and method embodiments to fully characterize resources to fulfill their purposes.

PERCos system embodiments address these inadequacies by providing innovative global purposeful network embodiments for human computer dialogue. This dialogue elicits formulation of human purposes and supports specifying and otherwise identifying and/or initiating purpose satisfying experiences, processes and/or outcomes. FIG. 122 shows an example global PERCos "purposeful network" embodiment in which users at nodal arrangements employ/utilize distributed PERCos network resources. FIG. 122 illustrates users using differing PERCos arrangements such as a web wide operating environment, and/or as an operating system, operating layer, application, and/or other modality, to interacting in pursuit of their expressed purposes.

Illustrative example of global purposeful network is shown in FIG. 122: An Example Global Purposeful Network.

The PERCos system embodiments enable innovative capabilities to support purpose-directed aspects of identification, understanding, prioritization, and utilization of Big Resource. For example, PERCos system embodiments may provide innovative navigation and exploration capabilities not found in traditional "search engines" and "information retrieval" tools. Broadly speaking, PERCos system embodiments may provide at least four major groups of capabilities:

- Purpose-responsive Big Resource navigating, evaluating, and retrieving,
- Purposefully organizing and managing resources and/or intentions,
- Providing purposeful input into processes, applications, and/or automation sets (both new and legacy), and
- Invoking and/or providing purpose-associated environments, including for example, tool sets, where such environments may take the form of purpose class applications.

PERCos embodiments may enable users to express the following wide spectrum of purposes:

1 Retrieve—Traditionally, users search and retrieve through the use of succinct expressions employing terms that may be matched to indexes and/or other information organizations. That is users search for terms and associated web pages having a "sufficient" correspondence to such expression term sets. Such retrieval techniques are being used, for example, by Google/Bing for their search and retrieval services, which, at times may be enhanced by directory arrangements, knowledge graph visualization, semantic analysis, and/or other tools. PERCos may extend such traditional technologies by, for example, providing Core Purpose and/or other PERCos Dimension standardized contextual simplification specification options that may substantially enhance and/or extend explicit search term operations through the use of PERCos purpose approximation computing (PAC). PAC provides learning and discovery of enhanced information sets for resources and/or portions thereof by providing perspective/knowledge enhancing knowledge/information/experience purpose related neighborhoods and/or neighborhood information and/or by providing Coherence specification resolution services and/or Repute identification/evaluation/prioritization services, which foregoing may be enhanced or otherwise facilitated by relevant associated purpose class application tools and interfaces and/or the like.

2 Learn/Seek—users are partially able to express purposes, that is users may frame general objectives, but do not have sufficient Domain expertise and/or purpose specific knowledge to sufficiently specify retrieval requests for user known and desired specific one or more resource items and/or related processes, but rather users wish to initiate one or more learning process sets with the objective of improving user understanding regarding one or more specific information issue sets.

3 Explore/Discover—users wish to obtain knowledge resulting from one or more process sets that include investigating information issue sets so as to identify one or more such information sets as user focus for acquiring information related thereto.

4 Experience for users—users seek experiences for themselves individually and/or as a group, for example entertainment, games, movies, music, and the like.

5 Social and/or collective experience—users seek social experience that substantially involves interactions with other users, including shared, collaborative, and/or similar participation.

6 Tangible/Instantiate—users seek outcomes involving commercial and/or physical world processes such as transaction results, manufacturing output, digital package transmitting, and/or the like.

In some embodiments, each category and/or category combination may be supported by one or more "interface modes" that optimize and simplify user interactions for that style or style combination of use, while facilitating minimum friction of interaction and maximum effectiveness for purpose as users' purposes may unfold and evolve.

PERCos environments provide characterizations of users' intent and intent contexts for assembling arrays of optimally matched resources based on their purpose characterizations and contexts. In many cases such optimal resources are "sifted" from boundless Resource stores, with or without assistance of third party expertise.

PERCos environments provide compelling improvements in identification and provisioning of resources through innovative space-based identifying characteristic storage/manipulation techniques. Some PERCos embodiments may provide standardized and interoperable Master Dimensions and/or Facets, auxiliary Dimensions, purpose expressions, and the like that support meaningful purpose evaluation, matching and fulfillment through the identification of relevant corresponding common purpose and any associated information.

In some embodiments, user-interpretable PERCos Dimension expressions enable communication of essential operating considerations through Master Dimension and associated Facet purpose expressions. Such Dimensions provide user-interpretable standardized simplification categories that assist user to navigate what may be seemingly boundless Resource opportunities to specific outcomes, including for example, resources or Resource portion candidate neighborhoods.

Additional optionally-employed standardized and interoperable expressions and PERCos metrics may support user-interpretable Dimensions. They may be used in PERCos embodiments to convey and communicate nuances of characterizations of Domains, Resource classes, Participant classes, Repute classes, purpose classes, and/or affinity group and/or the like in the form of standardized simplifications. PERCos platform services embodiments may provide one or more sets of these standardized metrics to enable such enhanced users purpose operations.

By seamlessly integrating users' local computing operating systems and globally distributed services and resources, PERCos environments greatly extend traditional operating system capabilities. PERCos environments enable user Contextual Purpose Expressions and employ apparatus and methods for matching such expressions with descriptive expressions associated with resources, where such resources may be available locally and/or on one or more connected networks. Users may thus connect to a global "contextual purpose network."

1. PERCos Languages

PERCos environment embodiments include sets of standardized and interoperable specifications that assist users with their purposes when engaging with Big Resource. Such standardized PERCos purpose specifications may include for example, Frameworks, purpose expressions, Foundations, Resource specifications, Dimensions, Facets and metrics. In some embodiments, there may also be capabilities for evaluation of natural language statements such that these specifications may be interpreted by PERCos environment embodiments, where for example such interpretation may include semantics and standardized terminology, standardized algorithmic and/or other algorithmic expressions, formats, file types, protocols and the like. These interpretations may then be matched to one or more PERCos class systems in an effort to satisfy, at least in part, user purpose.

PERCos environments embodiments may provide one or more sets of standardized published languages, which may include for example the following classes of languages in support of PERCos operations:

- One or more Contextual Purpose Expression languages for expressing purposes,
- One or more Construct specification languages for specifying, for example Frameworks, Foundations, and the like,
- One or more Resource characteristics description language for describing resources (including arrangements and portions thereof) and/or Resource attributes,
- One or more Repute expression languages for asserting facts and opinions,
- One or more messaging language for inter-process communications.

Human purpose is a person's (or group of persons') perceived intent. It is normally many-Faceted. Present day computing technologies do not provide the apparatus and method embodiments for systematically framing and conveying purpose expression Facets in a manner that produces effective instructions for computers to evaluate, organize, manage, and interpret resources to serve the satisfaction of purpose. Search and information retrieval systems have typically focused just on category information, and ignored many significant aspects of Human purpose.

PERCos system embodiments address these inadequacies by employing digital expressions called Contextual purpose expressions (CPEs) to approximate purposeful intentions and/or orientations. In some embodiments there are two types of CPE, prescriptive and descriptive. In PERCos a CPE is formulated to generate the most appropriate response to a request (from the user or an internal process). This may involve, for example, identifying, filtering, and/or ranking resources by comparing the resources' purpose expressions (descriptive CPE) with the purpose expressions (prescriptive CPE) of the request.

Users may use CPEs to communicate instructions concerning their purpose intent in a form that is both human- and machine-interpretable. A CPE may be,

- Directly formulated by a human, perhaps guided and assisted by PERCos intelligent tools and/or one or more PERCos systems services,
- Inferred from a human's actions,
- Derived by combining human input and stored information, and/or
- Partially generated with the aid of PERCos intelligent tools, Artificial Intelligence (AI) and/or expert system tools.

Humans and organizations who are not PERCos users may contribute to the formulation of CPEs. For example, CPEs may be indirectly supplied by cognizant third parties, such as the user's employers, and/or other Stakeholders.

To support one-to-boundless computing in which the number of CPEs to express the vast number of possible nuances of human purpose may be boundless, PERCos system embodiments may structure the characteristics of CPEs into a small number of groups, each of which emphasizes some of the functionalities that CPEs contribute to PERCos system embodiments and other systems. For example, in some embodiments, the top level groups of CPEs may be organized into for example, Core Purposes, Master Dimensions, preferences, and the like.

A Core Purpose comprises at least one verb (expressing users intended pursuits) and/or one or more categories (expressing the users intended topics, subjects). In the analogy of a sentence, a verb may, for example in some embodiments, supply the activity information in "I want to . . . ", and a category supplies the "about . . . ". For example, [verb: Learn, category: Physics] or [verb: Listen to, category: Music]. Categories and verbs, like all CPE characteristics may, for example in some embodiments, optionally be organized hierarchically. For example, Music could include Rock, and Rock could include Punk.

The primary role of purpose statements in PERCos is to generate the most appropriate response to a request (from the user or an internal process). This may involve identifying, filtering, and ranking resources by comparing their purpose statements with the purpose statement of the request.

Enabling users to express verbs as part of Core Purposes is an essential aspect of PERCos systems. Traditional information retrieval systems have typically focused on category information, and either ignored verbs entirely or given them a marginal role. By using both verb as well as category enables PERCos to allow more suitable approximations accurate of human purposes and generate more appropriate responses than a traditional search engine.

In some embodiments, Master Dimensions and Facets comprise standardized sets of Dimension variables that are used by users/Stakeholders (including for example publishers) to describe the contextual characteristics of user/Stakeholder purposes. Stakeholder purpose Dimensions are associated with resources and/or purpose classes and are employed in correspondence determination, for example, with user purpose expressions and/or purpose statements. The following outlines examples of PERCos standardized Dimensions.

Purpose statement embodiments may similarly appropriately incorporate context along with Core Purpose, i.e., Core Purpose+Other Context. In such an embodiment, other contexts may include, master and auxiliary Dimensions (as well as Master Dimension Facets), focus, Roles, Reputes, resources (local, group, external to the system, assumed, available, possible, private, limited, or public), Participant attributes, filters, predicates, multi-party purpose expressions and reconciliations and/or any other relevant information sets.

Master and auxiliary Dimensions, metrics, stored information sets, Stakeholder inputs and other purpose related metadata and information may be combined with Core Purpose expressions. These associated contextual inputs, in some embodiments, are known as purpose variables reflecting human priorities. These purpose variables are employed to assist in identification of resources, filtering, and other operations to achieve "best" matching to human purpose and represent human translation of purpose variables to practical apparatus and method embodiments for optimizing purpose expression matching, reflecting human perception of context. In some embodiments, PERCos provides contextual purpose expression languages which have a standardized and interoperable syntax and semantics. Such languages enable users to express their purposes through standardized terms complimented by standardized simplifications such as Dimensions which may be complimented by restricted lexicons and vocabularies of natural languages which may be purpose, context, user/Stakeholder and/or information organization specific.

An example of this embodiment, this disclosure discusses the classification of user purpose expression outputs into three types: Type 1, Type 2, and Type 3. However, by those familiar with the art, there are other ways to classify them for other embodiments of PERCos.

In some embodiments, a Type 1 purpose expressions may be those expressed in natural language terms, such as "must learn thin film solar," "find out about three tenors," "want to consult a neurologist specializing in Parkinson's disease," or any other expression using natural language. PERCos environments embodiments may perform several methods to interpret and/or translate the user's output into a PERCos-compliant CPE. One method may be to check if there are any applicable user classes, where user classes may be provided by, for example, users/Stakeholders (for example a Domain expert) in the relevant purpose categories, a natural language expert and the like. For example, a natural language expert may have provided a user class that enables PERCos environments to deduce that "find out" and "learn" are synonymous.

The interpretation and translation process may also require a dialog with the user for clarification in some cases. In such a case, PERCos environments may provide the user with a menu of possible interpretation of his/her purpose Terms. For example, if a user expresses, "listen to the three tenors," the PERCos environment may ask the user if "three tenors" refers to "Pavarotti, Domingo, and Carreras."

In FIG. 123, the user expresses "Must Learn Thin Film Solar." PERCos strips off "Must" as it determines "Must" is not necessary to derive "Learn Thin Film Solar." It then uses Edge/Declared classes, which may have been provided by an English language expert to extract "Learn" as a PERCos-compliant verb and "Thin Film Solar" as a PERCos-compliant purpose category to generate two PERCos-compliant Terms: {verb: Learn} and {category: Thin Film Solar}. These two terms are then processed by PERCos purpose formulation process to generate a PERCos compliant CPE, which may then be further processed by PERCos services, including, for example, PERCos purpose formulation process, to provide the user with expressed experience.

Illustrative example of an interpretation and translation processing embodiment is shown in FIG. 123: An Example Interpretation/Translation Process.

In some embodiments, a Type 2 purpose expression includes both terms expressed in natural languages and PERCos-compliant terms. In particular, it provides enough information so that the specification or part thereof may be transformed and/or interpreted by a PERCos environment. For example, consider a purpose expression: "I want to {verb: learn} solar cell technology." It comprises a verb, "learn," that may have resulted from a process involving the intentional expression of "learn" as a PERCos verb expression parameter that is standardized in at least some permutations of PERCos embodiments. This may be achieved by the user selecting the verb from a PERCos verb list or other recommender mechanisms or the user, filling in the very form instance by expressing the purpose intended standardized term or comparable result means. In this instance, "solar cell technology" is extracted and/or otherwise interpreted as a natural language expression of a purpose category.

A Type 3 purpose expression is an expression comprising PERCos-compliant terms only, thereby enabling, in some embodiments, the specified purpose expression to be directly processed by, for example PERCos purpose formulation processing, as shown in FIG. 124. In particular, some sample PERCos-compliant terms may be: {[verb: Learn], [category: Thin Film Solar Technology] }, {[verb:Provide], [category: Neurology Consulting], [Repute: Credentials] }, where Credentials include education, state board certifications, or the like.

Illustrative example of type 3 purpose processing is shown in FIG. 124: An Example Type 3 Purpose Expression Processing To support one-to-boundless computing, some PERCos embodiments may represent Big resources Cosmos as a multi-Dimensional vector space characterized by, for example, the following standardized and interoperable Dimensions:

- Master Dimensions—these Dimensions may be applied to all resources and be parts of one or more CPEs.
- Auxiliary Dimensions—these Dimensions may be specific to one or more purpose neighborhoods and in some embodiments may for example, include general data sets such as information sets specific to purpose. For example for a purpose involving wines, there may be auxiliary Dimensions, such as the information set comprising variety, maker, color, region, grape variety which may have additional algorithmic associations, for example as weightings.

For example in such a vector space representation, resources may be described as vectors using these Dimensions. For example, a Resource associated with a purpose class P, may be described as $(m_1, \ldots, m_k, a_1, \ldots, a_t)$ where $m_i$s represent Master Dimensions and $a_j$s represent auxiliary Dimensions. In some cases the Master Dimensions and/or the auxiliary Dimensions may be correlated. Moreover, zero or more $m_i$s may be also a vector, $(m_{i1} \ldots, m_{i1})$.

In such embodiments, two resources, R and S in a purpose neighborhood may have a distance in some context, cc, defined by $dst(R, S, cc)=F(dst(Rm_1, Sm_1), \ldots, dst(Rmk, Smk), dst(Ra_1, Sa_1), \ldots, dst(Ra_t, Sa_t), cc)$, where F is some function, depending on the context and the embodiment, such as, for example and without limitation,

- Sum of individual components e.g., F(x1, . . . xk, y1, . . . , yt, cc)=w1(cc) x1+ . . . +wk(cc) xk+wk+1(cc) y1+ . . . +wk+t(cc)yt with weights w1(cc), . . . , wk+t(cc) depending on the context, cc, or
- Maximum of individual components e.g., F(x1, . . . xk, y1, . . . , yt, cc)=max(w1(cc) x1, . . . , wk(cc) xk, wk+1(cc) y1, . . . , wk+t(cc)yt) with weights w1 (cc), . . . , wk+t(cc) depending the context, cc, or
- And the like.

The evaluation of distance may include differing orders, weightings, and the like.

In some embodiments, these distance functions may be used to define a neighborhood of a specification and/or a Resource and these neighborhoods may be used for matching and similarity.

There are many possible representations for CPE instances. A straightforward approach is to treat a CPE as a set of attribute-value pairs, which naturally corresponds to the class and object framework used herein. Values may themselves belong to classes and have further attributes. For interoperability, the meaning of each attribute (or of a selected subset of the attributes) may be reducible to a standardized, shared meaning. In other embodiments, CPEs might be represented by text strings, S-expressions, XML, or other data structures.

For reasons of both clarity and efficient implementation, preferred embodiments of PERCos technologies may impose some structure on the set of attributes. For example a CPE subclass provides a name and a set of possible values for each CPE attribute, plus a class system defining a more easily comprehended number of Dimensional Facets. Any Facet may include attributes and/or be a superclass of other Facets, to form levels of a hierarchy.

A Purpose Statement is always bounded, but the set of resources that may be used to satisfy it is unbounded and various resources may contribute to a PERCos embodiment sessions as the session user interactions, other inputs, specifications, and Coherence operations unfold. Contextual Purpose Expressions permeate PERCos embodiments. Many PERCos embodiments, elements and operations create, translate, modify, and/or otherwise use CPEs. A CPE may be used in many different ways.

PERCos embodiments enhance the human/computer evaluation, organization, management, interpretation, identification, and presentation of available resources in accordance with CPEs representing user purpose. In some embodiments CPEs systematically frame and convey Facets of both user purposes and available resources in forms that may be used to generate computer instructions for such operations. Currently available search and information retrieval systems do not provide such means. Out of the many significant aspects of user purpose, such systems generally focus only on "category" or "classification" indicators and/or on the presence or absence of particular words or phrases ("search terms"). For example, they provide no means for users to specify other structured elements, such as behavioral intent (e.g., verbs), or independent situation-specific contextual elements (e.g., role, complexity, and/or length).

Facets of user purpose beyond "category" and "search terms" contain further significant structures that may be identified, codified, and exploited as organizational and interoperably interpretable intent characterization elements. A PERCos system may use some or all of these structures to substantially improve the use of resources both in characterizing and in responding to a wide range of user purposes. CPEs in PERCos embodiments contribute to the generation of optimized results for requests in many different ways, such as identifying, filtering, prioritizing, combining, and/or otherwise transforming resources.

CPEs enable a PERCos embodiments system to use more flexible and more accurate expressions of user purposes than traditional search engines, and thus to generate responses that are more appropriate, substantially improving both efficiency and user satisfaction. For example, [Watch, Sports.Football. "Super Bowl", Now, HDTV], which involves a verb, a category, a time, and a modality. It could further specify John Smith and Jim Thomas as Participants for sharing, and the sharing verb might, in context with "Now" automatically spawn a contact mode to alert and/or request the physical or virtual presence of John and Jim for the sharing.

In PERCos embodiments systems, CPEs are primarily used in two ways: prescriptive CPEs form requests describing (Facets of) user purpose; and descriptive CPEs are associated with resources to describe (Facets of) described intended uses (to whatever purposes they may in whole or in part be matched). A core tool for matching resources with requests is the ability to evaluate and prioritize the suitability of a collection of resources (as represented by one or more descriptive CPEs and/or associated metadata) for the requirements of a request (as represented by a session's prescriptive CPEs, preferences, administrative rules, and/or associated rights and privileges.

A single CPE may describe multiple PERCos embodiments resources, and a Resource in a PERCos embodiments system may have one or more descriptive CPEs. For example, Participants, sessions, hardware, software, information content, creators, providers, publishers, statements, and PERCos templates may all have multiple associated descriptive CPEs, describing different views into their possible contribution in the satisfaction of a prescriptive purpose statement.

PERCos embodiments may include one or more specification languages for example;

- Purpose expression languages
- Fact expression languages
- Assertion expression languages
- Repute expression languages
- Resource definition expression languages
- Class expression languages
- Purpose Ontology expression languages
- Metric expression languages
- Messaging languages These specification languages may share in whole or in part sets of defined terms, standardized expressions, interoperable expressions and/or other terms as well as standardized, interoperable and/or other common methods.

Such specification languages may have one or more dialects, vocabularies and/or lexicons associated with them. In some embodiments, users/Stakeholders and/or affinity groups, purpose Domains and/or other purpose organizations may have specification languages (including parts thereof, for example extensions to those languages) associated with them. In some embodiments, one or more PERCos embodiments specification languages may be implemented through common Computer programming languages, such as for example Java, Ruby, PERL, Python, C#, C++, and/or any other suitable language.

These languages may be extensible, either formally through publication and/or other formal processes, such as for example those of PERCos embodiments platform services, PERCos embodiments operating environment(s) and/or other PERCos embodiments authorized utilities. They may also be informally extensible by users/Stakeholders (including groups thereof), who may use such extensions within their contexts for operations that do not require interoperability and/or standardization. However such extensions would only be of use when appropriate methods were provided for their evaluation.

PERCos embodiments specifications may include those specifications which are declared as or otherwise expressed as rules. In some embodiments these are structured so as to form rules sets which may be applied to and/or used by, in whole or in part, one or more resources (including other specifications).

In some PERCos embodiments, there may be specifications associated with rules specifications that determine how those rules may be processed. These specifications may be associated through for example, reference and/or embedding and may include control specifications. For example rules specifications may include pre and/or post conditions whereby during rules processing one or more resources are notified of such processing (including for example have options, potentially again determined by rules specifications) for interactions during processing.

In some embodiments, rules may have one or more interpretations, which may be specified by rules through application of one or more methods for such interpretation. For example rules may specify a single identified method instance as the only means of interpretation and/or specify one or more methods that meet a method specification.

In some PERCos embodiments, rules specifications may specify one or more methods for enforcement of rules.

A PERCos system embodiment may provide one or more Repute expression languages for expressing Repute, where a Repute expression involves at least one assertion, at least one subject for each assertion, one or more purpose(s) associated with the Repute expression, the creator and/or publisher of Repute expression. For Repute expressions, the creator and publisher may be the same.

Repute expression languages (REL) may use one or more formalisms, through reference and/or embedding, such as purpose and/or Domain specific lexicons, vocabularies, dictionaries and other similar resources. Repute expression languages (REL) may additionally include, by reference and/or embedding, further languages, including lexicons, semantics, syntax and other attributes, in regard of the elements that constitute the Repute expression. For example, some Repute expression languages (REL) may formalize Repute expressions, in whole or in part, which may include for example, specifying syntax and/or semantics of Repute expressions, including specification rules for determining the elements of the Repute expression (for example asserter, subject, purpose expressions), their priority, order, status (mandatory/optional) and/or other characteristics. Such RELs may enable standardization and interoperability for creation, publishing, evaluation, manipulation and/or use of Repute expressions. PERCos REL may include one or more sets of standardized metrics, such as for example Quality to Purpose. Such standardized metrics may, in whole or in part, form Master Dimension Facets, for example Repute Master Dimensions.

In some embodiments, the formalizations of RELs may leverage PERCos purpose expression languages, or may be based on a categorization schema derived from other purpose related languages. For example, Repute expression subjects may be expressed using purpose expression language categories.

In some PERCos embodiments, these formalized expressions may be evaluated, manipulated and utilized by other PERCos processes in support of purpose operations. Informal Repute expressions may also be utilized, for example, for user interaction and in some embodiments, treated as metadata and/or may undergo one or more processes to formalize them so that further purpose operations may be undertaken.

RELs may support aggregation of multiple Repute expressions into a single Repute expression. For example, many users may create Reputes for an operating system. PERCos environments may for the sake of performance and simplicity, choose to aggregate the many created Reputes into a smaller number of Repute expressions. In such a case, some PERCos environments may maintain the record of the individual Repute expressions so that they may be retrieved as appropriate.

There are a plethora of knowledge representation languages and organizational structures, which may be used and accommodated within some PERCos embodiments, including incorporation within fact assertion expression languages. However PERCos utilization of such existing representations and/or structures is qualitatively distinct because of the interaction with the other elements of Repute and/or other PERCos processing.

Some PERCos embodiments may use a wide range of Resource specification languages ranging, for example and without limitation, from languages that describe resources and/or classes of resources through:

- a description of their attributes or by pointing to them by using an identifier such as a PERCos UID,
- describing the behavior of the implementation of a collection of methods from one of more Resource Interfaces.

Such languages may in part be comprised of programming languages, including scripting languages and visual languages. Many languages for describing resources are a combination of both of the above.

For example, programming interfaces in a programming language, which may be part of some Resource description language, do not describe a behavior but rather describe a set of typing constraints on what types of outputs may be derived from what types of inputs for any given method.

In addition, some embodiments may use specifications, such as PERCos templates or assimilators, that describe how to create resources from other Constructs, resources or non-PERCos resources. These specifications may be resources and may be specified using the same language constructs used to specify other types of resources.

In some embodiments, PERCos environments may provide one or more Resource characteristics description languages for describing resources. One or more specifications may describe a Resource, where each specification may describe and/or reference the Resource's properties, such as its Interface, Roles, associated purposes, associated Reputes, functionality, dependencies, and/or other properties and/or characteristics. For example, consider an encryption appliance that encrypts/decrypts data and provides digital signatures. It may have multiple specifications, where one specification may describe the appliance for use in a closed environment, whereas another specification may provide Resource interfaces for accessing the appliance remotely over the internet. The specifications may also provide its Roles, such as providing privacy, confidentiality, integrity, and the like.

In some PERCos embodiments, Resource characteristic description language may be sufficiently expressive to describe all types of PERCos resources, including hardware, software, devices, services, data, and the like, whereas the expressiveness of other languages may be more limited. Some Resource characteristic description languages may provide templates, syntax, semantics, vocabularies, lexicons, formats, operators and the like to support description of Resource attributes, such as their Roles, types, or other Resource attributes. For example, Repute expressions have attributes assertions, subjects, creators, publishers, and the like. PERCos systems may also provide Constructs to describe Resource arrangements, such as Frameworks, Foundations, and/or other Resource arrangements. Resource characteristic description languages may include for example, one or more PERCos templates, specification sets, syntax, semantics, and/or formats to facilitate formulation of these Constructs.

As PERCos systems evolve, some Resource characteristic description languages may be designed to be extensible. Their standardized vocabularies, structures, syntax/semantics, format and/or other components, may be designed so as to describe new types of resources, such as new types of data, new devices, new services, new appliances, and the like. Resource characteristic description languages may use a variety of strategies to support their evolution. One strategy may be to associate or reference methods with Resource descriptions to enable their interpretation. Another strategy is to base Resource characteristic description languages on self-described markup languages, such as, XML, OWL, and the like. Using such languages enable Resource characteristic description languages to provide explicit specifications and/or rules for interpreting extensions that enable the decentralized extension and versioning of such languages.

Some PERCos embodiments may use a wide variety of languages to define Constructs through their attributes including, for example and without limitation, first order logic, common logic, xml, Resource Interface specification languages and/or ontology languages. As an illustrative example, one embodiment might use the OWL specification language together with a vocabulary provided by a class system developed by acknowledged Domain experts as a high level Construct specification language. The elements of the class system may have a standardized and interoperable meaning across a PERCos embodiment. Thus the class system may include a collection of standardized and interoperable terms/classes, e.g. "File System," to represent types of Constructs. A PERCos embodiment may associate these standardized and interoperable terms with standardized and interoperable Resource Interfaces, allowing the PERCos embodiment to easily process, use and manipulate resources specified in this manner. Thus for example, a "File System" may have a standardized and interoperable file system interface that may allow PERCos to use any Resource of the "File System" type as a storage medium.

An embodiment may use attributes defined in the class system language to further refine such specifications. Thus for example, an embodiment may specify a file system with a certain size, response time and latency using standardized and interoperable attributes representing the file size, response time and latency respectively. By utilizing standardized and interoperable attributes, this embodiment may be able to ensure that a descriptive specification of a Construct developed by one party may match a prescriptive specification of a Construct developed by another party. The OWL language, in particular, allows recursive specifications of a Resource. A Resource, for example, may be characterized in terms of the attributes of the Resource elements of the Resource which in turn may be described in terms of the characteristics of their Resource elements and so forth. Thus, for example, such an embodiment could describe a laptop with a file system with 20 GB of free space and a 30 inch display.

An embodiment may use members defined in the class system as pointers to specific resources. For example, a PERCos embodiment may have a Resource representing a user's laptop and this laptop may have a representation as an individual member of the class system. This member may also be used in class expressions such as "the file system on Timothy's Lenovo laptop". If the member is not already represented in the class system, the language would allow the member to be represented by an expression such as "the laptop with the id 'b2ef50e8-f1b3-4f6f-9555-69a5388a-3e01'."

A PERCos embodiment may use various programming languages as specification languages to describe a Construct in terms of its behavior. One might for example imagine a Construct Template that takes a set of specifications written in HTML-5, PHP, Ruby, Javascript and Java languages and may use these specifications to build a purpose class application represented by a web service. Such a Construct template may be viewed as an interpreter for a Construct specification expressed in traditional programming languages.

In some embodiments, PERCos may provide one or more messaging languages that two or more parties (e.g., services) may use to communicate with each other in any arrangement, including Peer-to-Peer, Unicast, Multicast, synchronous, asynchronous, and/or any other arrangement.

PERCos environment embodiment supported messaging languages, in the context of addressing Big Resource, are intended to be highly flexible, responsive and extensible. For example in some embodiments there may be only two fields every message may provide, such as an envelope and pre-conditions field that allow the receiving party to understand and interpret the message body, which may be expressed in a wide range of languages. The message envelope field is used to express the message encoding information, such as the version of the message language and/or version of the message format as well as any associated methods specified to interpret the message. Acceptance of the message may, for example, imply that the recipient party may understand and process the message body. For example this may include:

| Message Segment | Description |
|---|---|
| Pre-Conditions | Pre-requisites and/or conditions (requirements) for message delivery and subsequent processing. The conditions generally include messaging language version and message format version. |
| Message Body | May be expressed in any viable language (e.g., ASCII Text, XML, HTML, Python, WSDL, OWL, Java, Perl, C++) |

A message body may comprise one or more sets of specifications, contracts, events, alerts, and the like using one or more general and/or specialized computing languages, such as Java, Perl, C++, Python or any other language constructs, which may also include XML, HTML or similar and event and/or alert expressions, such as SNMP, RMON or other protocols such as SMTP, HTTP, or SOAP. For example in some embodiments this may include:

| Message Body Segment | Description |
|---|---|
| Post Conditions | Processes and methods for message interaction closure (including for example any notifications of parties associated with message) |
| Identity | ID Originator (may be one or more), ID counter party (may be one or more) Message ID assigned by appropriate contextual identity services, Message ID-all actors, processes, resources involved with Message |
| Message Elements | May comprise any specifications, contracts, agreements, information, instructions or other data in any format, for example in one embodiment this may comprise for each message element Who (ID), What (Actions, including operations for methods), When (temporal), How (what methods included/specified), Authorities (by which authority(ies)) and may further include any values such as thresholds, parameters, events, triggers and the like and/or may include ordering and priority of specification elements, including control specific-ations, Interface specifications, organization specifications, methods and/orother arrangements |
| Message Notifications | Comprise those notifications to be undertaken by one or more parties interacting with messages, on receipt of or during processing of message(s), such as for example in one PERCos embodiment, events (for example triggers/thresholds/combinations/conditions and the like), actions (rules set to be actionable-may reference methods), Message (any message), Monitoring (monitor process call-parameters), History (service instance) E.g. On threshold 1 > X, then notify (X) with message (Y), where X is any ID and Y is any message |
| Authorizations | Those authorizations (including associated rules and governance specifications) specified for interaction with the message, including who is allowed to receive message and/or any of its parts. |

In some PERCos embodiments, the message elements may be typed, where the type specifies the kind of information contained in the message element:

Authentication and authorization information,
Contracts,
Control specification,
Notifications, and/or
Specifications.

2. Aspects of the Operating System

PERCos embodiments systems are designed to integrate purpose, resources and experience with their associated contexts into a human-computer interactive operating environment.

Human-computer interaction involves a set of experiences that unfold during sessions that are generated using resources, including for example: computing hardware, software, data, and possibly other users and/or Stakeholders. The expressed purposes of users normally provide the initial basis for PERCos embodiments sessions and guide the selection of appropriate session resources.

A PERCos embodiments system provides a networked management platform for one-to-boundless computing. That is, a user may potentially benefit from resources located anywhere, made available by anyone. PERCos embodiments systems support the platform independence specified for a practical one-to-boundless system.

A PERCos embodiments system may not assume knowledge of which hardware, which operating systems, and/or which services may provide resources. Conversely, the publisher of a Resource may generally not know—and should not assume that they know (unless specified, or constrained in a consequential manner)—all of the hardware, operating systems, services, purposes, contexts, and the like, that may constitute the environment of any given use of a Resource.

A PERCos embodiments system supports deploying resources in accordance with CPEs, so that users may experience, store, and/or Publish computer sessions and/or session elements that provide the best fit to the their CPEs. PERCos embodiments systems include processing elements, communication channels, computational processes, specifications, and other information, as resources, which are and uniformly treated.

A PERCos embodiments system provides a substantially specification-driven environment. Rather than merely supplying applications suitable to pre-identified task classes, PERCos embodiments is oriented to providing experiences corresponding to users' expressed purposes, using Resource arrangements and unfolding executions that satisfy those purposes.

A PERCos embodiments system also provides apparatus for the capture, codification, extraction, publication, presentation, and use of digitally-expressed expertise, information and/or knowledge. These apparatus may frequently help users to identify and/or significantly clarify the expression of what they wish to do, improving the quality of the user's interactions, and may allow them to use terminology and/or Resource arrangements that experts suggest.

A PERCos embodiments system provides methods for users/Stakeholders and publishers to express their assertions regarding the credibility, quality, utility and/or other assertions regarding one or more resources. These assertions are expressed in a standardized form enabling other users/stakeholders to effectively evaluate available resources for their purposes. These are known as Repute expressions.

A PERCos embodiments system provides pre-fabricated and/or generated specification and/or Resource arrangements enabling users to effectively utilize these resources in pursuit of their purpose. This may include one or more Constructs, such as for example Foundations and Frameworks and/or purpose applications and plug-ins.

A PERCos environment provides a purposeful computing environment that is unified, efficient, boundless, reliable, trustworthy, and usable. Aspects of a PERCos environment embodiment may include, without limitation, the following:

1. A suite of languages, such as purpose expression languages, ontology languages, Repute expression languages, class definition languages, Resource characteristics languages and the like.
2. A Resource architecture and associated Resource management systems that enable all resources to be treated in uniform manner regardless of their location, size, complexity, distribution, creation, and the like.
3. A Repute infrastructure that enables users to associate one or more assertions and/or comment sets with an operatively uniquely identified subject set.
4. Navigation and exploration services, including PERCos navigation interface and associated tools, which users may use to formulate, refine, cohere, resolve, and the like their purpose expressions, including exploring topics of interest, including their purpose Domains, resources for fulfilling their purposes, and the like.
5. An identification infrastructure, including providing a suite of methods, method embodiments and/or mechanisms to perform context dependent identification and/or verification of resources, including representations of users and/or Stakeholders, such as Participants, Roles, and the like. A suite of methods, method embodiments and/or mechanisms may include, without limitation, using biometric and/or sensor-based identifications, certificate-based identification, and the like.

6. An information and knowledge management infrastructure that may separate information content from its information structure. The information and knowledge management infrastructure enables users to capture, extract, organize, publish, share, discover, (re)use, and/or perform other knowledge management operations, such as capturing and using historical information.
7. A Coherence infrastructure that may disambiguate, evaluate, arbitrate, reason about similarity, and the like to reduce, at least in part friction of purpose operations.
8. A Construct infrastructure for the creation, use, reuse, iteration, publishing and/or deployment of one or more structured specifications sets that are compliant and integrated with PERCos Resource architecture. Constructs may include Frameworks, Foundations, resonance specifications, purpose class applications and/or other, at least in part, purpose beneficial Resource arrangements.
9. A Dimensions infrastructure enabling standardized simplifications to be applied through master and/or auxiliary Dimensions and appropriate Facets.
10 A metrics infrastructure to measure purpose-related performance, such as for example, purpose satisfaction, and the like.
11. Specification, Resolution, and Operation processing (SRO-processing) to transform/evolve user purpose expressions into operating specifications by parsing, evaluating, arbitrating, completing, discovering, resolving, cohering, optimizing, and/or other SRO related operations.
12. One or more apparatus supporting purpose operating sessions provide an efficient and optimal controlling, managing, provisioning, optimizing, adapting, and/or other unfolding, by matching and/or performing similarity analysis between CPEs and resources available locally and/or virtually.
13. A communications infrastructure that enables PERCos processes to interact with each other as well as other non-PERCos entities.
14. A Publishing infrastructure for publishing all PERCos elements, including PERCos resources, and/or
15. Additional services, such as Evaluation, Monitoring and Exception Handling, Test and Results, History, Publication, Information Management, Reasoning, Time Management, Reality Analysis and Management, and the like.

A PERCos environment does not require centralized portals. Instead a PERCos environment may be distributed so that users/Stakeholders (including for example affinity groups) may create their personalized PERCos environment embodiments comprising their own individual knowledge bases. Groups of users, for example, may define rules for their member interactions as well as interactions with external entities, such as users, Stakeholders, non-PERCos services, and the like.

To support one-to-boundless computing, a PERCos environment may provide standardized and inter-operable apparatus and method embodiments to perform purpose-related operations such as for example, creating, manipulating, organizing, discovering, publishing, storing, and/or retrieving, PERCos resources and associated information sets.

In particular, PERCos environments may provide standardized and interoperable apparatus and method embodiments to identify, create, manipulate, interpret, store, retrieve, and/or publish purpose expressions. It may provide a suite of standardized and interoperable languages, organizational structures, and Services for formulating, refining, and/or otherwise manipulating purpose expressions. Purpose expression languages may be based on for example, Facets, purpose classes, ontologies, lexicons, and the like. Organizational structures, in some embodiments may include class systems, knowledge bases, or any other organizational structure known in the art. Services may include PERCos Platform Exploration and Navigation Services that enable users to formulate, discover, refine, modify, and/or otherwise manipulate their purpose expressions. Exploration and Navigation Services may utilize, in some embodiments, Facets, class systems, ontologies, and the like. Exploration and Navigation Services may enable users with the flexibility to express their purpose in one or more lexicons by representing user expressed purpose expressions into standardized internal format.

A PERCos environment may provide standardized and interoperable apparatus and method embodiments to associate, manage, maintain, and/or otherwise manipulate Resource identity information in aggregate, contextually constrained (e.g., in association with purpose), unique identifier forms.

A PERCos environment may provide a Resource architecture and associated Resource management systems that enable all resources to be treated in uniform manner. The Resource architecture may provide standardized and interoperable apparatus and method embodiments to support all resources regardless of their location, how they were created, or may be accessed and/or manipulated. Standardized and inter-operability extends to interaction with non-PERCos resources, including legacy and external services. The Resource architecture may provide standardized and interoperable apparatus and method embodiments for creation, including efficient dynamic creation, of Resource arrangements and associated Resource management mechanisms, including being able to manage any such Resource arrangements as a single Resource, and in combination with any other one or more Resource arrangements. In addition, PERCos Coherence services may harmonize resources, including specifications, to optimally assign, arrange and/or provision such resources for one or more purpose operations. These services may be complemented by PERCos resonance specifications which may assist in the identification, resolving, provisioning, and/or allocation of one or more Resource sets based on user purpose which may have been created by, for example, acknowledged Domain experts.

A PERCos environment may provide one or more Construct and associated computing environments that provide standardized and interoperable apparatus and method embodiments to arrange one or more standardized resources into such Constructs to provide efficient and effective granular modular structures for users/Stakeholders (including for example publishers) to effectively and efficiently undertake their unfolding purpose operations. Constructs may be used to arrange an arbitrary large number of sets of resources of arbitrary complexity. For example, Constructs may be used to arrange a few simple resources, such as a smartphone as well as arrange a large networked distributed system, comprising multiple resources located in multiple locations.

A PERCos environment may provide Repute Services, which may provide standardized and inter-operable apparatus and method embodiments that users may use to explicitly associate a comment set with an operatively uniquely identified item set wherein such a comment set substantially employs at least one PERCos standardized Dimension and value. Repute Services may enable users to state facts that are accepted as truth by everyone. Repute Services may also enable large groups of users, organizations, and the like to express their comments and facts in a standardized and inter-operable manner. Repute Services may enable establishment of Acknowledged experts by providing formally expert established criteria that may be used to identify users whose expertise exceed user and/or group (e.g., PERCos utility) threshold for requirements for Domain expertise.

A PERCos environment may provide standardized and interoperable expressions, Dimensions that enable user/Stakeholders to provide appropriate simplifications as to resources capabilities and/or users purpose variables.

A PERCos environment may provide standardized and inter-operable metrics to measure performance of all purpose-related operations and resources, such as for example quality to purpose, purpose satisfaction, Resource relationships, and the like. In some embodiments, such metrics may comprise standardized resources that are system wide, specific to one or more purpose Domains, associated with one or more users/Stakeholders and/or groups thereof and/or in other ways organized, and/or arranged for efficiency of purpose operations. These metrics and/or sets thereof may be extensible with appropriate processes undertaken to establish and/or publish such metrics.

PERCos environment may provide standardized and inter-operable apparatus and method embodiments to capture, extract, store, discover, and/or otherwise manage knowledge and information. PERCos Platform publication Services may enable users to capture and extract one or more specifications from operating sessions that may be published. Publishing a Resource differs from making a Resource persistent, in that the published Resource comprises information sufficient for another Party to use the Resource; whereas if the Resource is persisted, such as for example in an i-Space, the information set may or may not be sufficient for use by another party and/or may comprise additional information sets that may not be relevant to the use of the Resource by another party.

PERCos Information Management Systems (PIMS) may be configured to manage any type of information set that may be relevant in fulfilling one or more purposes, through for example, provision of one or more organizational constructs for creating and organizing information. In some embodiments, PIMS provides constructs for identifying, containing, organizing, matching, analyzing, and/or other ways of managing units of information for their potential retrieval, sharing and/or reuse at a later time.

A PERCos environment may provide an easy-to-use environment for users to formulate their purpose expressions and use published specifications to undertake their contextual purpose experiences. The PERCos environment provides a wide range of languages that users may use to formulate their specifications, ranging from languages to formulate their purpose expressions to languages to express Frameworks, Foundations, and the like.

A PERCos environment may provide users/Stakeholders with knowledge bases that may contain templates, resonance specifications, rules, purpose specifications, declared classes, Dimensions, Foundations, Frameworks, Reputes and/or other specifications that users may use to minimize the effort specified to express their purpose expressions. PERCos enables users/Stakeholders to maintain both local and global knowledge bases.

A PERCos environment may provide a wide range of apparatus and method embodiments that users/Stakeholders, and/or processes may use to efficiently discover, organize, share, and manage all types of resources regardless of their size, complexity, diversity, location, format and/or methods of their creation. It provides PERCos Information Management System (PIMS) to manage information. PIMS provides apparatus and method embodiments for every aspect of managing any type of information (e.g. document, multimedia, on-line, bio-metrics and the like) that are relevant in fulfilling purposes. PIMS provides constructs for creating and organizing such information. In some embodiments, PIMS provides constructs for, for example, identifying, containing, organizing, matching, analyzing, and/or other ways of managing units of information for their potential retrieval, sharing and/or reuse at a later time.

PERCos environment may provide PERCos Identification System (PERID) that provides users, Participants, other Stakeholders, and processes with constructs for characterizing resources as well as apparatus and method embodiments for describing the strength of each metadata element. Some services provided by PERID include, without limitation, as follows:

- One or more organizational Constructs that invokers and developers may use to dynamically arrange and/or organize metadata elements based on their purpose, such as arranging metadata elements for obtaining optimal resources to fulfill a purpose. For example, Constructs may be used to organize those metadata elements that allow PERCos Platform Services, such as for example, Coherence Services, to reason about Resource relationships.
- One or more services for reasoning about resources, such as their applicability in fulfilling purposes, inter-relationships, performance, efficiencies, security, integrity, and/or other Resource properties.
- One or more services for managing, and manipulating identification information such as creating, persisting, retrieving, publishing, resolving, cohering, and the like.

In one-to-boundless computing, ascertaining/evaluating the reputation of resources is useful if such resources are to be employed successfully for purpose operations. In some embodiments, a PERCos environment provides a Repute Framework that enables users to evaluate Reputes from their own purposes and preferences. For example, a user who likes a light white wine would prefer to obtain recommendations from experts who specialize in white wines. PERCos Repute Framework provides Repute expressions for associating reputation/credibility with user/Stakeholders, Participants, resources, processes, and/or other PERCos and non-PERCos objects. It provides apparatus and method embodiments for creating, discovering, modifying, capturing, evaluating and/or other operations for manipulating Reputes including theories and algorithms for inferring Reputes.

PERCos architecture is designed to be scalable by providing a standardized flexible and extensible Service architecture that separates service's basic functionality with the context for providing the functionality. This separation provides tremendous flexibility. FIG. 125 shows the structure of a standardized PERCos service embodiment. It enables PERCos to adapt to diverse operating environments by instantiating each instance of a PERCos service by providing it with the following:

- Control specifications specify operations of resources that may be used in the control and management of varying, and potentially very large, Resource arrangements.

Organizational specifications specify organization and arrangement of resources Elements that comprise a Resource, Resource assembly and/or Construct and those organizational relationships of that Resource with other resources. For example this may include organizational specifications that may include specifications for one or more purpose organizations.

Interface specifications specify interface characteristics that may be accessed and/or interacted with by other resources, such as Resource Roles. In some embodiments these may be standardized PERCos Resource interfaces with associated interface specification sets, and may include operating agreement specifications, which express and determine interactions between a Construct and other resources and/or interactions among resources comprising the Construct.

Additionally there may be further specifications, including identity and Resource characteristics specifications which are available (in part or in whole) to other resources, subject to agreed terms of interaction between the resources.

A PERCos environment supports one-to-boundless computing by providing a uniquely scalable and extensible Resource architecture. Such a Resource architecture enables PERCos to manage all types of resources, regardless of their size, complexity, diversity, location, format and/or methods of their creation and to uniformly treat them, as atomic elements, and as combinatorial sets, normally independent of situational variables. It provides PERCos processes with the ability to interface with arbitrarily large and distributed groups of resources, as well as to discover available candidate resources regardless of their location. The Resource architecture also supports universally interoperable Resource operation and information interaction. It enables PERCos to uniformly organize and process memories, databases, computational processes, networks, Participants, specifications, and the like, where uniform treatment includes providing common service/resource management interfaces for individual and/or groups of resources in a seamless manner.

The PERCos Service's specifications may specify control elements (PERCos control specifications) that define PERCos service's management and operations as well as provisioning of interfaces to other processes, such as PERCos Resource interfaces (including APIs and/or UIs). Specifications may be expressed as PERCos templates, rules, methods, algorithms, and/or other specifications.

For example, a PERCos Platform Evaluation Service's basic functionality is to evaluate expressions. However, what and how Evaluation Service evaluates depends on the context of its instantiation. For example, during the Specification, Resolution and Operational (SRO) process phase, an Evaluation Service instance may be instantiated to provide, for example, a user interface that enables and/or assists users to express their purpose expressions. The instance's control specifications may specify that the instance, for example, is to evaluate the validity/coherence of the user input. But in an operating session context, an Evaluation Service instance may be instantiated to provide, for example, a user interface that accepts inputs from an operating session's users and evaluates them to be processed by appropriate operating session processes.

Illustrative example of a PERCos service is shown in FIG. 125: An Example "Generic" PERCos Service.

A PERCos environment may monitor, evaluate, and/or assess performance of user operating sessions to try to avoid failures, optimize efficient operations as well as to respond to failures, so as to enable in whole or in part predictive, efficiency optimizing, corrective, recovery and/or regenerative processes. For example, A PERCos environment may dynamically determine/evaluate metrics, such as for example, purpose satisfaction metrics, of operating sessions. In cases where an operating session fails to meet the desired threshold metrics values, the PERCos environment may reconfigure the resources of the operating session. For example, suppose an operating session has an operating Resource that is providing erratic service. In such a case, the PERCos environment may replace the operating Resource with another operating Resource. The PERCos environment may use PERCos Platform Services, such as Monitoring and Exception Handling Services, Coherence Services, and the like.

PERCos environments may provide levels of system performance by using a variety of methods. Some of the methods, for example without limitation, include the following:

1. Using Declared classes to efficiently discover optimal arrangements of resources from resources that may be boundless, diverse, and/or multi-locational,
2. Using Reputes to provide users with optimal resources that at least in part may satisfy the user's preferences,
3. Using contextual information, such as Master Dimensions (including Facets thereof) to efficiently and effectively approximate one or more purpose neighborhoods of interest and then using auxiliary Dimensions to perform further refinement of purpose expressions and to better identify, select, provision and interact with one or more resources for purpose-directed operations;
4. Using knowledge bases to utilize Domain expertise, past experience, and the like to adjust allocation and performance of resources.
5. Using purpose applications that may have been validated (by for example users who have published Creds for them) to expedite the PERCos purpose cycle.
6. Using metrics to optimize system performance.

To manage the vast number of potential purpose expressions, users may formulate PERCos environments provide one or more context-based, comprehensive, representative, standardized sets of purpose classes formulated by Domain experts. Using a class structure enables PERCos environment to capture contextual important characteristics while losing less useful information. For example, consider the purpose of finding group theory books. For the context of performing group theory research, a PERCos environment may provide purpose classes that capture the depth of the coverage of group theory. In contrast, for the context of obtaining general overview of group theory, purpose classes may lose the coverage depth information.

Using classes also provide PERCos with relational flexibility. It enables PERCos to define relationships between classes as well as define the strength of the relationship. For example, for some contexts, there is strong uni-directional relationship from purpose class learn physics to purpose class learn mathematics because learning physics require strong mathematics background. In contrast learning mathematics does not depend on learning physics.

Using representative sets of purpose classes generated by Domain experts to model potential user purpose expressions has several advantages. One aspect is that users exploring a topic, such as thin film solar cell industry may realize their lack of expertise. In such cases, users may utilize the expertise of the topic's Domain experts to guide them explore the topic. For example, consider a user who is interested in exploring group theory. There may be a set of representative purpose classes and related information that may suggest a set of categories the user may want to explore, such as finite groups, discrete groups, combinatorial groups, continuous groups, and the like.

Another aspect is that using representative sets enables PERCos environment to efficiently fulfill user purposes by being able to organize and manage boundless, diverse, and/or multi-locational resources. For example, a PERCos environment may identify one or more purpose classes that are sufficient approximations to a user purpose expression. Having identified target purpose classes enables the PERCos environment to narrow the search of optimal resources by exploiting purpose classes' prescriptive CPEs to efficiently find the optimal resources by using descriptive CPEs associated with prescriptive CPEs.

Using representative sets is inherently lossy, in that they are approximation of user's expression. For example, consider a user who is interested in "comprehending" a subject. PERCos embodiments may approximate this purpose as "learn" a subject, which may lose some of the user's intent. In most cases, there may not be a representative purpose class that identically matches user purpose expression. A PERCos environment may ensure the quality of representative sets by having experts generate them to ensure that in most cases, user expressions may be sufficiently similar to one or more purpose classes.

In some embodiments, a PERCos environment further enhances performance by using drill-down processes to identify prescriptive CPEs. When a user formulates his/her purpose expression, PERCos environment extracts its important characteristics, such as its Core Purpose attributes, and uses them to identify target classes. Focusing on the important parts of purpose expression enables PERCos to efficiently identify those purpose classes that are most pertinent based on the user context.

For example, consider the purpose of finding a group theory book. For mathematicians interested in doing group theory research, the important characteristics may be the book's author.

A mathematician may be interested in finding a book that is authored by a mathematician in the same area of specialization, such as solvable groups, infinite groups, and the like. In contrast, for undergraduate students interested in obtaining general overview, the important characteristics may be the breadth of the coverage.

In addition to enabling users to specify their Repute preferences, the PERCos environment may use Reputes of resources for its own operations. For example, as the PERCos environment uses resources, it may build a history of their reliability, performance characteristics and the like. A PERCos environment may then use a Resource's historical information to guide its future usage. For example, suppose a PERCos environment, for example, determines a particular brand of appliance is highly reliable. It may create one or more Repute expressions that represent this information set. It may then use such Repute information, for future purpose operations and processing, including for example in future fulfillment of purpose expressions.

PERCos environment also may explore relationship between resources for their effectiveness. For example, suppose it determines that an arrangement of resources is particularly effective for some purpose. PERCos environment may record this information and try to utilize the arrangement for the same or similar purpose whenever possible.

A PERCos environment uses its local and global repositories of knowledge bases containing for example and without limitation, templates, Declared classes, Frameworks, Foundations, Resource assemblies, utilities, and the like to enhance its performance throughout its purpose cycle. The PERCos environment may minimize the effort users need to express their purpose expression by providing them with templates, purpose classes, purpose applications and the like.

A PERCos environment may provide standardized and inter-operable metrics to measure performance of all purpose-related operations and resources, such as purpose satisfaction, Resource relationships, and the like. In some embodiments, such metrics may comprise standardized resources that are system wide, specific to one or more purpose Domains, associated with one or more users/stakeholders and/or groups thereof and/or in other ways organized, and/or arranged for efficiency of purpose operations. These metrics and/or sets thereof may be extensible with appropriate processes undertaken to establish and/or publish such metrics Purpose class applications are designed to provide users with convenience of using an arrangement of resources known to fulfill specific purpose classes where purpose classes may range from highly general to very specific. For example, consider a purpose class for learning about physics. A purpose class application for this physics purpose class may be designed to service a wide variety of users, ranging from trained physicists interested in learning latest discoveries in particle physics to high school students interested in obtaining general overview of physics. A purpose class application may allow users to drill down to a particular field of Physics, and then for each field, drill further down to sub-field, such as nuclear physics, quantum physics, etc.

Purpose class applications may include plugins. For example, a physics purpose class application may have multiple plugins, one that showcases research programs of leading physics laboratories, another that explains Newton's three laws of motions, yet a third that provides a tutorial on theory of relativity, and the like. The plugins may also have plugins. For example, the plugin that explains Newton's three laws of motions may have three plugins, one plugin for each of Newton's laws of motion.

Purpose class applications may constrain the operations of plugins. Some examples of its constraining include, for example, without limitation:

Control commercial attributes of a plugin;

Control a plugin's access to platforms;

Manage privacy and integrity attribute of a plugin;

Manage consistency between plugins;

Manage consistency between plugins and platforms;

Ensure cohesiveness of its plugins;

Manage experience elements provided a plugin, including appearances the plugin presents.

A purpose class application may manage complexities, such as it may limit the levels of plugins it may incorporate. A purpose class application may limit the number of plugins that perform the same or similar functions, such as a subclass of a purpose class it implements.

The purpose application may have distinctive control over the types of plugins allowed; for example, a purpose class application may restrict the commercial attributes, platform control, privacy issues, experience elements, appearance elements, consistency between plugins as well as platforms, complexity, including how many levels of plugins, how much population for the same or similar purpose (i.e., limit to some number of the plugins that perform similar functions, such as sub-purpose class), and/or inter-functionality between plugins. Coherence Services may be employed to ensure a cohesive set of plugins is used.

A PERCos environment may provide users/Stakeholders with one or more Frameworks that they may use to specify their policies, rule sets and/or requirements for the use of their resources as well as how they use other resources. They may also provide mechanisms for monitoring and enforcing their policies and requirements. For example, the PERCos environment may provide a variety of security and integrity mechanisms. In such an embodiment, users may require their operating session to use one or more security mechanisms to protect their operation session's operations so that the operations do not inadvertently compromise and/or disclose their sensitive information as well as information belonging to other users/Stakeholders. Users/Stakeholders may require the use of techniques such as digital signature to detect possible tampering of their sensitive information. A PERCos environment may enable users to incorporate algorithms/mechanisms, such as MD2, MD4, MD5, DSA, and the like into their respective operating sessions so that their purposeful operations do not inadvertently compromise and/or disclose their sensitive information. Users may also incorporate security mechanisms such as encapsulation mechanisms, cryptographic algorithms, and the like to protect and insulate their information from unauthorized access.

The PERCos environment may provide/use one or more encapsulation methods to encapsulate resources so that they cannot interface and/or tamper with other resources. For example, a PERCos system may provide users with the ability to provide methods to monitor the proper usage of their resources. The PERCos environment may control the operations of these methods to ensure that they do not interfere and/or tamper with PERCos system operations. If instructed, the PERCos environment may also monitor non-PERCos system resources to detect possible security and/or integrity relevant events and when such events occur, record them as well as perform appropriate actions, such as notifying appropriate processes.

A PERCos system may provide users with the ability to provide mechanisms to monitor the proper usage of their resources. The PERCos environment may control the operations of these mechanisms to ensure that they do not interfere and/or tamper with PERCos system operations. If instructed, PERCos environment may also monitor non-PERCos system resources to detect possible security and/or integrity relevant events and when such events occur, record them as well as perform appropriate actions, such as notifying appropriate processes.

A PERCos environment may control interactions between a non-PERCos Resource and a PERCos Resource. In such an embodiment, the PERCos environment may generate service interface that non-PERCos Resource so that it may access only those operations that it is authorized to access.

PERCos environments may provide reliability of their operations in a variety of ways. They may use metrics, such as reliability metrics in provisioning operating sessions in pursuit of purpose. They may negotiate operating agreements that specify the level of services for each operating Resource and then use PERCos Platform Monitoring and Exception Handling Service to monitor operating resources to check that they comply with their respective operating agreement. Finally, PERCos environments may periodically persist their operating sessions, thereby enabling them to restart at an operating session at previously persisted state in the event of some sort of fault such as a service disconnection.

Illustrative example of PERCos operating environment is shown in FIG. 126: An Example PERCos Operating Configuration.

3. Operating System Architecture

PERCos systems are designed to operate in a diverse operating environment, from platforms that have limited resources and communication capabilities to those platforms that have ample resources and communication capabilities. FIG. 122 in this disclosure illustrates an example global purpose network embodiment, in which users are using a wide range of computing platforms, such as smartphones, browsers, desktops, company mainframes, and the like to pursue their respective contextual purpose experiences. Two or more users may also create shared common purpose experience sessions. Some sessions may be informal sessions, where users may join and leave at their convenience. For example, users may create a session to pursue some common purpose, such as explore political issues, cultural topics, or any other common purpose. Other sessions may be formal sessions that are scheduled in advance. For example, users may join a session to attend remotely some scheduled events, such as sports events, music concerts, lecture series, and the like.

Illustrative example of common purpose experience session is shown in FIG. 127: An Example Shared Contextual Purpose Experience Session.

FIG. 127 also illustrates an example of a shared purpose experience session involving three users. In this example, PERCos systems may create four coordinated sub-sessions, one sub-session for each user and one management sub-session to manage the common contextual purpose experience. The manager sub-session may fulfill each user with the user's customized common purpose experience, such as customizing to satisfy the user's platforms, contexts, profiles and preferences. The manager sub-session may also manage interactions between three Participants that represent their respective users. For example, suppose Participant 1, representing user 1, grants Participant 2, representing user 2, access to some of Participant 1's resources. The manager sub-session may manage interactions between Participant 1 and Participant 2 to check that Participant 2's access only authorized resources.

To accommodate a wide variety of operating platforms and operating modes, PERCos systems may use a service paradigm, to instantiate one or more PERCos system elements and aggregate them into a dynamic operating arrangement, called an operating System Dynamic Fabric (OSDF). PERCos systems may provide an OSDF with a set of control specifications that specify for the OSDF's management, algorithms, methods, interfaces (e.g., APIs and UIs), levels of services, and the like. An OSDF's control specifications may be expressed as templates, rules, methods, algorithms, and/or other specifications.

Illustrative example of PERCos process is shown in FIG. 128: An Example "Generic" PERCos Service.

Operating System Dynamic Fabrics may be embodied by a wide range of services, from browser plugins, to comprehensive PERCos systems that run natively on for example, cloud services, mainframes, server farms to PERCos systems running on distributed computing networks. Plugins may be general PERCos plugins and/or personalized plugins with one or more users'/Stakeholders Participant and/or other stored information, preferences, and the like. A complete PERCos system may provide the full complement of PERCos platform services as well as traditional operating system services, such as for CPU instructions, operations to access memory, disk storage access, or any other operating system service known in the art.

Whether an OSDF is embodied by a single plugin, a complete PERCos system, or a networked distributed system, it may be capable of providing its user with any part or all of PERCos purpose cycle, A PERCos purpose cycle may include interacting with users to support them generate purpose statements, cohere, resolve, and provision resources to fulfill user purpose statements, create, monitor, manage operating sessions whose unfolding provides user contextual purpose experiences. In particular, OSDFs are capable of uniform management of the spectrum of Resource types, their operations, and/or associated information to provide contextual computational environments that users may use to fulfill the six types of user interactions described herein.

Illustrated example of an embodiment of PERCos cycle is shown in FIG. 129: An Example Purpose Cycle.

Operating System Dynamic Fabric enables users and/or other Stakeholders to create contextual interactive computational environments so that they may fulfill, at least in part, their purpose expressions. Operating System Dynamic Fabric enables users and/or Stakeholders to perform the following operations:

1. Purpose expression related operations, such as, to formulate, modify, discover, explore and/or publish, Contextual Purpose Expressions;
2. Operating session context operations, for example,
   a. specifying the degree of user's purpose-related sophistication/expertise (for example with Master Dimensions),
   b. prioritizing input for resources for fulfilling purpose expressions based upon one or more sets of specified Repute metrics,
   c. \operations for experience-related filtering and/or prioritization, including, but not limited to specifying time duration, media type, material complexity, user interface qualities, optimization of Quality to Purpose, and the like
3. Construct specifications operations, such as for example, to create, modify, discover and/or otherwise explore and/or publish, Frameworks, Foundations, Resource assemblies, and the like.
4. Repute expression related operations, such as to create, evaluate, modify, aggregate, discover and/or otherwise explore, publish, Repute expressions.
5. Resource related operations, such as to register external devices, create, manage, update, discover, explore and/or publish specifications.
6. Coherence operations, for example, to cohere, resolve, optimize, disambiguate, match and/or analyze for similarity one or more resources.
7. Knowledge base related operations, such as to create, capture, extract, edit, publish, discover, amalgamate, otherwise explore and/or produce results, so as to integrate, fuse, import, acquire, and/or otherwise enhance knowledge and/or knowledge stores.

However, different OSDFs may provide differing levels of quality of experiences and services, such as performance, integrity, and the like. Light-weight Operating System Dynamic Fabrics are those OSDFs that may have limited processing power (such as for example, a smartphone), and/or limited resources, such as for example, limited storage capability and need to depend on other OSDFs to provide some of their services. For example, a light-weight OSDF may not have access to more powerful Coherence services that a complete OSDF may have. Such a light-weight OSDF may need to depend on other OSDFs to obtain the desired level of coherence processing. In addition, some light-weight OSDF may have limited storage capacity and may need to depend on other OSDF to provide the specified storage capacity.

FIG. 130 illustrates an example Operating System Dynamic Fabric embodiment. In this example, a user may be using a Foundation that may have a limited set of resources and/or prefer a minimal Operating System Dynamic Fabric configuration. For this user, PERCos system may create OSDF 1 that has a minimal set of PERCos Platform Services and outsource other services it needs to other OSDFs. It may also interact directly with other dynamic fabrics, such as Coherence Dynamic Fabrics, Repute dynamic fabric sand the like. OSDF 1 may choose to have a peer-to-peer relationship with OSDF 2. Operating System Dynamic Fabrics may choose to instantiate other OSDFs that have superior-subordinate relationships.

Illustrated example of PERCos embodiment operating system dynamic processes are shown in FIG. 130: An Example of Operating System Dynamic Fabric Configuration and Interaction.

PERCos environment may provide users/Stakeholders with a variety of means to enable them to perform user-related operations including methods of establishing their identification and authentication. For example, some users may provide cryptographic certificates, such as for example X.509, to establish their identity. They may also provide an apparatus or method to identify and authenticate themselves. For example, in some embodiments, PERCos systems may support biometric identification or authentication methods. Users may also create, modify, and/or delete one or more Participants that identify them to PERCos, subject to governance associated with their creation. For example, a user who is a professor of mathematics at an Ivy League University, may want to create two Participants, one for general purpose and another for work-related activities. The user may provide a certificate that establishes the user's credentials as the professor of mathematics and associate it with the Participant for work related activities. Such a certificate may enable the user to perform privileged operations such as for example, connecting to the University's internal network to access sensitive student data.

Users may create and/or modify their list of Roles, where a Role is a subset of the information in a Participant, representing the information chosen to be known relative to a particular role of that Participant.

Users may create and/or modify their list of actors, where an actor is a subset of the information in a Participant, representing the information chosen to be available in one or more PERCos sessions, generally relative to a particular aspect of that Participant, and may contain transient information (e.g., derived from that session's dialog).

Users may create, organize, modify, and/or otherwise manipulate other user-related information, such as adding, deleting, updating values for Master Dimensions, goal Dimensions, user preferences, user Roles, and the like. Users may specify their default characteristics that are to be used, unless explicitly overridden, for all their purpose experiences. Users may specify default Master Dimension values, such as their characteristics, Reputes and the like. Users may also specify default Goal Dimensions, such as the kinds of default results they are generally seeking for their purpose experiences. For example, suppose a user, who lives in Palo Alto, Calif., wishes to establish default values for all his purpose experiences. The user seeks informational outcomes from his purpose experiences, where generated information is for a user with intermediate skill level. Moreover, he wants the outcomes to be pertinent to his home. He also would like the resources used to provision his purpose experiences to be highly reliable and high integrity.

As illustrated, a User Interface Dynamic Fabric (UIDF) of a user may incorporate relevant services into its own Dynamic Fabric (FIG. 131), create a User Interface Dynamic Fabric, which may be included as part of its own Dynamic Fabric (FIG. 132), as a separate entity (FIG. 133), or any combination thereof. The relevant services may include for example, PERCos Platform Information Management Systems, Evaluation and Arbitration Services, and the like. When a user requests to perform user-related operations, PERCos system may create a user-related service manager instance and provides it with the appropriate control, organization and Interface specifications. The user-related service manager instance, in turn, may configure its Services to comply with its specifications.

Illustrative example of user related operation service configuration is shown in FIG. 131: An Example User-related Operating Service Configuration.

Illustrative example of user related operation service configuration is shown in FIG. 132: An Example User-related Operating Service Configuration.

Illustrative example of user related operation service configuration is shown in FIG. 133: An Example User-related Operating Service Configuration.

UIDFs may allow users to provide their Repute expressions, such as their academic credentials, their expertise levels, etc. For example, suppose a user wishes to add a new credential, such as a Ph.D. from the University of California at Berkeley. The user's UIDF, based on its own specification, may perform this request in one of two ways. One way is to instantiate a PERCos Platform Repute Service into its own fabric. In this case, the user's UIDF interacts directly and may create a Repute expression to assert the user's new credential. FIG. 135 illustrates another way for the user's UIDF to perform the request where the UIDF interacts with a standalone, existing Repute Dynamic Fabric (REPDF). In this case, it is the RDF that creates the Repute expression that asserts the user's new credential.

Illustrative example of interactions of UIDF and RDF are shown in FIG. 134: An Example UIDF and RDF Interaction.

Illustrative example of interactions of UIDF and RDF are shown in FIG. 135: An Example UIDF and RDF Interaction.

PERCos environment may enable users to perform resource-related operations. Users may "register" their resources as PERCos resources by providing relevant information, such as for example, PERCos-compliant Resource Interfaces, control specifications, organizational specifications, and/or additional metadata (e.g. one or more descriptive CPEs that their resources fulfill). For example, online digital storage providers may publish their services by providing relevant information, like one or more Resource interfaces for accessing their services. They may provide one or more descriptive CPEs that express purposes their services fulfill, such as "share files with the public with a link," "provide free storage," and the like. They may also provide information such as maximum allowed file size, browsers they support, or other similar information.

A PERCos environment may enable users to perform Resource-related operations, such as manage, aggregate, organize, modify, discover and/or otherwise explore, publish or any other Resource-related operation known in the art. Users may perform operations on Constructs, such as Foundations, purpose class applications, Frameworks, Resource assemblies, and the like. Users may have one or more resources they wish to arrange as one or more Foundations. For example, users may want to create several Foundations, based on their locations. They may create a mobile Foundation, comprising resources, such as their smartphone and tablet. They may further create a home Foundation, comprising their laptops, printers, and other networkable peripherals and devices. They may additionally create a work Foundation, comprising the company's servers, desktops, office printers, and the like. They may also create purpose-oriented Foundations, such as one Foundation to perform their financial transactions and another Foundation to fulfill their recreational-oriented purposes.

Resource-related operations may include but are not limited to, the following:

1. Associating specifications with physical or logical devices;
2. Importing/assimilating non-PERCos resources into PERCos systems;
3. Creating, managing, aggregating, organizing, updating, discovering, exploring, publishing PERCos resources;
4. Creating, unifying, organizing updating, importing, discovering, exploring, publishing Resource Interfaces associated with resources; and
5. Managing, analyzing, discovering, exploring, organizing, publishing Resource Identification information, such as designators that are linked to resources so that other users/processes/resources may use them to access them. resources.

Non-PERCos resources may be imported/assimilated into PERCos systems by providing transformers that provide the properties of a PERCos Resource, such as providing unique identification (value), Resource metadata, Resource interfaces, and the like from within the transformer and/or from some other source. Often, the most substantive element of a transformer is a Resource interface that presents a PERCos interface while accessing the non-PERCos Resource using its "native" interface.

PERCos environment may enable users, Participants, other Stakeholders, resources to create, manage, aggregate, organize, construct, update, extract, discover, explore, publish, PERCos resources. For example, users may discover Framework specifications and modify them in pursuit of their own contextual purpose experiences. They may discover one or more Frameworks and modify them to as, needed, to construct their own Framework specifications for purpose.

Users may also create, unify, organize, update, import, discover, explore, and publish Resource interfaces associated with resources. For example, users may aggregate two or more resources and provide a unified Resource Interface to access the aggregated Resource.

PERCos environments enable users to manage, analyze, discover, explore, and/or organize Identification information associated with resources. For example, suppose a user using a smartphone wishes to learn about thin film solar cell industry. If there are multiple resources that fulfill user's purpose, the user may examine and/or analyze one or more designators to determine the optimal Resource that would accommodate user's limited graphical display space. The user may also examine and/or evaluate the Reputes of resources to optimize their Resource selection.

PERCos environments may create a Resource-related Dynamic Fabric (ResDF), which is an operating Resource assembly comprising instances of PERCos Platform services, such as PERCos Platform Information Management services, Evaluation and Arbitration Services, Coherence Services, and the like to perform resource-related operations. ResDFs may be part of an operating System Dynamic Fabric, or may operate as a separate entity that may support multiple users.

ResDFs may enable users to specify one or more of their Foundations and/or specify one or more resources associated with their Foundations. For example, a user may have one or more Foundations for the user's home office, work office, and mobile environment. In addition, the user may create Foundations for different purposes such as the home office, the user's hobbies and the user's financial transactions.

ResDFs may enable users to associate specifications with physical or logical devices. For example, users may specify the characteristics of their laptops, printers, graphical devices, storage service, and the like, that comprise their respective Foundations.

ResDFs may enable users to modify their arrangement of their Foundations. For example, suppose a user replaced his/her laptop with a different laptop. ResDfs may enable the user to modify those Foundations that have laptop associated with them.

PERCos environments may provide users with a variety of ways to minimize the effort involved to formulate their purpose expressions. Some users would like to seek/pursue purposes for which they do not have sufficient Domain expertise to state precisely. In these cases users may be unsure of the desired results or have little or no knowledge of the Domain, and require guidance and assistance from Domain experts in framing their purposes. Some users may not have sufficient expertise to discover optimal resources in current one-to-boundless computing world that is generating information exponentially.

PERCos systems support users to explore PERCos cosmos efficiently and effectively by providing PERCos Platform navigation and exploration Services. A Purpose Exploration Dynamic Fabric (PEDF), an instance of Platform Navigation and Exploration Services, which enables PERCos to perform context-based navigational operations on purpose Domains, such as, for example, discovering, identifying, drilling down, expanding, pruning, and the like on behalf of a user. A PEDF is created by providing one or more control, Organizational, and Interface specifications that direct its dynamic configuration, which may include any or all of the elements of PERCos embodiments platform services as appropriate.

Some of the elements of PERCos Platform Navigation and Exploration Services may include for example without limitation are as follows:

1. Standardized, controlled vocabulary and well-defined structures for expressing purposes;
2. One or more Faceting service instances for expanding, drilling down, discovering, and identifying purpose Domains.
3. One or more lossy transformation processes for generalizing purpose Domains.
4. One or more class systems for identifying, generalizing, pruning and the like purpose Domains. Class systems may include purpose classes that may represent Domain expertise and provide a degree of Domain completeness.
5. One or more simplification systems, such as for example Master Dimensions and Facets and auxiliary Dimensions for standardized and interoperable descriptions of resources and their characteristics 6. One or more metrics systems for identifying purpose Domains and identifying, prioritizing and the like potential resources
7. One or more Repute systems for filtering, prioritizing and the like potential resources to support desired levels of credibility and Quality to Purpose experience
8. One or more Coherence Dynamic Fabrics (CDFs), which are instances of Coherence Services, for reasoning about purpose Domains, such as determining their consistencies and the like.
9. One or more databases, knowledge bases (e.g., ontologies), and/or other data structures that contain relevant information, including for example without limitation, information representing Domain expertise, semantics, metadata and the like. For example, Facets of purpose Domains may be provided in a knowledge base, database, and/or other data structures.
10. One or more instances of other PERCos Platform Services, such as Evaluation Service, Testing and Result Service, and the like.

PERCos environment enables users to modify and/or manipulate purpose expressions during unfolding of their purpose operations. For example, users may modify and/or aggregate one or more published purpose expressions to formulate their own purpose expressions, which may then be iterated as dynamic purpose operations unfold. For example, suppose a user who doesn't know very much about bicycles is interested in purchasing a bicycle. Given the sophistication level of the user, PERCos environment may provide the user with an interactive session to obtain information such as frequency of usage, the type of riding, such as trail riding or road riding. Based on the information obtained, the user may modify his/her purpose expression to describe the class of bicycle they are interested in.

For example, suppose a graduate mathematics student originally want to learn about Paul Erdős's mathematical works. The student creates an operating session that provides him/her with a brief background of Erdős's research. During the process, the student learns about Erdős number. The student may expand his/her purpose expression to mathematics works performed by Erdős and his close colleagues whose Erdős number is 1.

PERCos environment enables users/Stakeholders to create personalized computational environments that include their own knowledge bases as well as define rules for interacting with other users/Stakeholders, resources and/or services. For example users of affinity groups may utilize PERCos to create and manage such environments optimized for members of such groups. Stakeholders, for example corporations, may also create and manage such environments in accordance with their policies, expressed as rules.

Illustrative example of PERCos embodiment SRO processing is shown in FIG. 136: An Example of Detailed view of SRO Processing A PERCos environment may be a substantially specification-driven, adaptive dynamic environment. Rather than merely supplying applications suitable for pre-identified general activity types (word processing, spread sheet, accounting presentation, and the like), a PERCos environment may be designed to provide experiences corresponding to expressed purposes by providing Resource arrangements and/or unfolding executions specifically in response to expressed purpose specifications and instructions. It provides users with an iterative and interactive service, called the Specification, Resolution and Operational (SRO) service, for specifying CPEs to generate operational specification that users may use to fulfill their contextual purpose experiences.

The rich SRO environment may include knowledge discovery tools that users may use to discover and/or manipulate knowledge captured and published from past experiences by other users, Stakeholders and/or systems. Knowledge may include Core Purpose expressions formulated by other users including experts, declared classes, purpose Framework specifications, Resource arrangements, and the like, that other users/Stakeholders may have used and/or published as effective in fulfilling CPEs. An SRO service may also provide one or more specification languages, services, intelligent tools, and/or utilities. The SRO service may provide constructs such Frameworks, Foundations, purpose classes and/or other classes that users/Stakeholders, resources and/or processes may use to compose and/or build and/or otherwise manipulate to articulate and subsequently identify and/or prioritize rich, nuanced, and highly responsive CPEs/results sets extracted from arbitrarily huge Resource arrays.

An SRO service may also provide utilities and services, such as registration/publishing, Resource information matrix, commercial flow management, and Repute services that allow users and/or system services to refine and/or control their fulfillment of their CPEs.

In some embodiments, an SRO service comprises specification, Resolution, and operational processes.

A specification process enables users to formulate their Core Purpose expressions. It provides users with tools, such as information system tools that they may use to leverage knowledge captured from past experiences to formulate their CPEs. The specification process also enables users to share their CPEs with each other by providing them with the apparatus and method embodiments to store and publish their CPEs, Frameworks and other Constructs and the like. Specification processing may then take user CPEs and generate one or more purpose specifications. Initially, such a candidate specification may possibly be incomplete and/or describe resources in abstract/general terms and/or contextually.

A resolution process takes a candidate operational specification and evaluates, aligns, resolves, and refines to ascertain its validity. It may also check for the availability and/or accessibility of the identified resources. For example, the resolution process may check that a user is authorized to access the specified resources. For example, resolution processes may also interact with coherence processes to validate, at least in part, CPEs.

The resolution process may also interact with users and/or Stakeholders for clarification and/or elaboration. For example, a user may not be authorized to access some Resource and it cannot find an alternative or substitute Resource. It may then request the user and/or Stakeholders for guidance in resolving the conflict. This may, in some cases, require modification and/or re-specification of the Core Purpose Expression itself.

An operational process takes a candidate operational specification that is deemed to have sufficient information to provision sufficient resources to fulfill the Core Purpose Expression and creates an operational session for the user. It negotiates provisioning and activating resources to form a contract to fulfill the CPE. In some embodiments, operational specifications may comprise Resource arrangements, such as Frameworks, Foundations, Resource fabrics, and/or other aggregations of resources that have previously been created and utilized. In particular, such an operational specification may comprise some or all of the following:

- Frameworks, Foundations, Resource specifications, and associated specified levels of services for each Resource, where associated levels of service may specify a range of requirements, such as functionality, performance, quality of service, administration, security, privacy, reliability, and the like.
- Administrative, authorization &authentication, and control information.
- Additional instructions that a PERCos Resource Management Service may use in provisioning and activating specified resources, thereby launching an operational session, comprising the provisioned resources that are waiting to become active into an operating session that may provide users with outcomes.

In some embodiments, an SRO service may use PERCos Coherence processes to check sets of resources, including specifications, for problems and/or to "harmonize," "optimize," and/or "integrate" one or more sets of such resources, leading to superior experiences/results that integrate the interests of all users and/or direct and indirect Stakeholders in response to specified and/or derived purposes. These Coherence processes may detect and/or attempt to rectify a wide range of limitations, imperfections, and/or exceptions, including, for example, inaccuracy, lack of clarity, incompleteness, inconsistency, inefficiency, suboptimal selections, and/or requests for unavailable resources.

Any number of Coherence processes may be invoked within a session by different elements of the system at any point in the session. Coherence activities within a session may be iterative, recursive, and/or concurrent. Coherence processes may use information from various sources, for example, user and/or other stakeholder preferences, published and/or actively provided expertise, and/or information derived at least in part from other session histories. These processes may involve optimization algorithms, logical reasoners, ad hoc heuristics, and/or other AI techniques, such as expert systems, machine learning, and/or problem solvers.

Coherence may detect and/or arbitrate differences in the expressed purposes of users participating in a common experience session.

Generally, a user's purpose may be guided by their context. For example, if a user decides to "learn physics," the context on whether the user is a beginner or a seasoned scientist heavily influences the user's purpose. Consequently, the context of the user's purpose may be considered by a PERCos environment. The PERCos environment may assist a user in formulating an operating session context during the user's purpose formulation, or the user may set the context more generally by updating user-related information. A PERCos embodiment may enable users to perform operating session context related operations. It may enable users to specify the user's level of sophistication/expertise for purpose related knowledge. Based on the user's degree of sophistication and/or Domain expertise for purpose related knowledge, a PERCos environment may adjust a user's operation session context. For example, suppose an undergraduate student is interested in finding a group theory book. The PERCos environment may adjust its search of general group theory books that are appropriate for undergraduate student level by modifying its search criteria, such as from "general group theory books," to "undergraduate group theory books."

It may also provide the student with more guidance in refining his/her purpose expressions, where guidance may range from checking for possible mistakes, suggestions for applicable templates, declared classes, Frameworks, and the like. For example, a PERCos environment may provide a purpose statement that specifies attribute values for desired purpose classes. For example, a purpose statement may be of the form:

[purpose statement:
[purpose class: [learn: group-theory]]
[Sophistication: medium]]]

Students may modify such purpose statement to specify special areas of interest, such as finite groups, infinite groups, and the like. In contrast, if a research mathematician is interested in finding a group theory book, the PERCos environment may provide the mathematician with purpose classes that allow the mathematician to express his/her areas of specialization, such as solvable groups, Lie groups, or other specialized areas.

PERCos systems may provide Repute metrics to be associated with resources. The PERCos environment may enable users to specify Reputes and/or Repute metrics to constrain the choice of resources for fulfilling their purpose expression. For example, suppose a traveler is interested in finding a hotel in a city he/she does not know very much about. The traveler may specify Repute metrics that specify the quality of the hotel. PERCos environment may use the specified Repute metrics to narrow the search of applicable hotels to service the traveler's purpose expression.

The PERCos environment may enable users to express qualifier elements to filter and/or prioritize experience characteristics, such as specification of time duration, media type, complexity, user interface quality, presentation of results, level of desired quality of purpose experience, and the like. For example, a user may be interested in obtaining the results orally, visually, graphically, textually, or any other method of presentation. Users may also specify conditional qualifying elements. For example, if a user is receiving results on his/her smartphone, he/she requests an abbreviated version of the result, whereas if using a powerful laptop, then a verbose version with all the details.

PERCos environment may enable users to specify desired levels of Dimensions, such as for example Quality to Purpose metrics. Users may specify Dimension Facets and/or auxiliary Dimensions, such as desired levels of privacy, reliability, integrity and the like. For example, suppose a user has a purpose of finding disk storage space in the cloud, to ensure that the storage space would be available 24/7, and that the provider provides sufficient reliability, integrity, and privacy. Users may specify a PERCos system to protect their information from unauthorized access. The PERCos environment may provide a framework for users to request using protection mechanisms, such as access control, encrypted storage, encrypted communications, and any other protection mechanisms known to those familiar with the art, to provide the desired level of privacy. Users may also specify other types of quality. Users may specify desired response time. For example, a user may specify a quick response whereas another user may request for complete results.

A PERCos environment may enable users to perform Framework operations by providing one or more structures that users/Stakeholders may use to build their specifications and/or Frameworks. Frameworks may include one or more sets of specifications into which appropriate further specifications may be added, forming a Construct whose type is determined by the Framework. A PERCos environment may provide tools for creating, publishing, capturing, integrating, organizing, discovering, sharing, modifying and/or otherwise utilizing purpose class applications, Foundations, Frameworks and/or other Resource arrangements for fulfilling purpose expressions. In some embodiments, Extraction/Publication xxx can be used to extract and capture relevant information for future use and i-Space and i-Sets can be used to organize FRAMEWORKSs and/or other resources, etc.

The PERCos environment may also provide additional PERCos Platform services, such as, Coherence Services, publication Service, Evaluation and Arbitration Services, and Reasoning Services.

A PERCos environment may provide one or more Repute expression languages for expressing standardized and interoperable Repute expressions that may be dynamically associated with subjects, such as user/Stakeholders, Participants, resources, processes, and/or other PERCos and non-PERCos objects. Repute expression languages may range from precise (e.g., logic based) to colloquial as well as range from structured to unstructured. For example, a well-known wine expert may create a Repute expression that expresses his review of Opus One 2005-2007 vintages. The wine expert may also provide a Repute expression that asserts his reputation/credentials, thereby enabling other users to assess the reliability/credibility of the review.

PERCos environment may provide one or more operations to manipulate Repute expressions, such as without limitation, create, discover, modify, aggregate capture, evaluate, publish, resolve, integrate, organize, discover, share, store, and the like. For example, the wine expert may publish the Repute expression of Opus One on one or more publically available repositories to facilitate wide dissemination.

PERCos environment may enable multiple Repute expressions to be aggregated into a single Repute expression. For example, many users may have created Reputes for the latest operating system from Microsoft. PERCos may for the sake of performance and simplicity, choose to aggregate them into a smaller number of Repute expressions. In such a case, PERCos, in some embodiments, may maintain the record of the individual Repute expressions so that they may be retrieved as appropriate.

A PERCos embodiment may support the invocation of coherence operations, such as for example, to cohere, resolve, optimize, disambiguate, match and/or analyze for similarity one or more resources. For example, in some embodiments, Coherence Services may provide:

- Logical reasoning. Coherence services may use a reasoner to find inconsistencies in a specification and to explain these inconsistencies. The detection of an inconsistent specification may alert Coherence processes that there is some work that needs to be done. In addition, there has been significant recent work, in some specification languages, to calculate explanations of inconsistencies. These explanations may be used either to suggest ways of fixing the inconsistency or possibly the explanation may be cleaned up and returned to a user and/or Stakeholder for guidance.
- Transformations. Coherence Services may apply transformations to map specifications written in one language to specifications written in another language. In some cases these transformations may be precise, for example, a converter from the OWL language to first order logic or a converter from the C language to assembly. In other cases the transformations are generally lossy, such as when transforming a specification written using one ontological language to a specification written in different language where the correspondence between the two ontology languages is approximate.
- Rules. Coherence Services may apply rules to perform the following, for example:
  - Ontological mappings (e.g. to map between differing ontologies)
  - Knowledge Structure mapping (e.g. to map between different knowledge structures, such as SQL Database to Ontology)
  - Table lookup and databases (e.g., to perform systematic substitutions)

Graph and/or tree matching methods (e.g., to find near-matches)

Optimization methods (e.g., to improve Resource allocation)

Decision theory (e.g., to limit search)

Coherence Services, may also include techniques, such as for example:

Collaborative techniques (e.g., to interpolate, to arbitrate)

Machine learning (e.g., to discover relations, to predict behavior)

Statistical inference (e.g., to cluster, to adaptively filter)

Expert systems (e.g., to assist in eliciting expressed purposes)

Heuristics (e.g., to resolve inconsistencies)

Other AI techniques (e.g., to reduce the need for user interaction)

Net and/or local search, possibly including use of an "external" search engine (e.g., to discover relevant resources)

Use of remote Coherence services (e.g., to assist multi-user sessions, including identifying Coherence processes that may harmonize specifications of user purpose and/or optimize user purpose results)

Interaction with one or more users via one or more dialogs (e.g., to clarify unclear words or phrases, to seek further CPE, Framework, and/or Foundation recommendations, possibly with the assistance of one or more of the methods above)

Users and/or Stakeholders may control and/or operate their own contextual mesh comprising those resources associated by and/or with them to one or more purpose and/or operations thereof.

PERCos embodiments users, in their pursuit of purpose, interact with a plethora of resources, which in aggregate form their contextual mesh. Users may have many types of relationships with such resources. In some embodiments this may include one or more Foundations, resources returned as results sets, relationships established with one or more experts, PERCos embodiments platform services and/or any other resources users encounter.

In some PERCos embodiments, users contextual mesh may include one or more other resources that organize the resources they encounter, for example through creation of their own class systems, purpose class applications, arrangement of those resources most frequently used (including de-emphasis of those used once or rarely) and/or arrangement of those associated by purpose (for example purpose applications) into, for example Resource constructs for use by user, publication and/or use by other users, through for example common and/or shared purpose.

Contextual mesh may include one or more PERCos embodiments Constructs, such as for example Frameworks as well as one or more operating Constructs, such as for example operating Frameworks, purpose class applications and the like.

Within a contextual mesh, users/Stakeholders information and/or organizations thereof as well as any and all resources may be arranged in any manner so as to suit one or more user/Stakeholder purposes. For example in some embodiments, user may have pre-determined one or more sets of specifications, for example preferences, that dynamically arrange resources to suit one or more expressed purposes. In this manner user/Stakeholder may direct resources to be aligned to suit their specific purpose operations.

Such arrangement specifications (including for example user/Stakeholder preferences), may be stored and arranged as for example specification Constructs, such as for example Frameworks.

User contextual mesh may include one or more overlays, representing user's information orientation, through for example class systems structures, weightings and other metrics associated with information/resources (including for example Repute expressions). In some embodiments, such orientations may be determined through evaluation of user information organizations and comparisons with one or more expert organizations in the same purpose Domains. This may for example be expressed as a metric, for example in some embodiments information orientation metrics.

Through the ongoing expansion (as users encounter more resources) and their unfolding purpose operations (including both new purpose operations and continuation of previous purpose operations), through their contextual mesh, users may have their purpose horizons expanded.

In some embodiments users may then opt to Publish all or part of their contextual mesh, with associated purpose expressions (for example descriptive CPE), for use by other themselves and/or other users/Stakeholders. This may then, in some embodiments, lead through for example Repute expressions to that user being considered, to some degree as an expert in the purpose Domain of their publication.

In this example embodiment, a PERCos environment is configured to provide a unified purposeful computing environment that is unified, efficient, boundless, reliable, trustworthy, and usable. The PERCos environment may, without limitation, perform the following:

1. Provide comprehensive facilities, including a suite of languages, language constructs, templates, tools, and the like to enable users to discover, formulate, share, publish their purpose expressions;
2. Provide tools for users to explore topics of interest;
3. Support registration of users, resources, and/or resources;
4. Support repositories of resources, including for example, user representations;
5. Provide a Repute infrastructure, including associating Reputes with one or more subjects;
6. Provide an Identification infrastructure, including providing a suite of methods and mechanisms to perform context dependent identification and/or verification of resources, including user and/or Stakeholder representations, such as Participants, actors, and Roles; such methods and mechanisms may include using for example without limitation, biometric and/or sensor-based identifications, certificate-based identification, and the like;
7. Provide a Reality Analysis and Management infrastructure;
8. Provide a Dimensions and metrics infrastructure, including master and auxiliary Dimensions, PERCos standardized metrics, Resource relationship metrics and the like;
   i. Master Dimensions (including Facets thereof) to specify user, Resource and/or Repute (including combinations thereof) characteristics including for example without limitation, complexity, sophistication, performance, result presentation and completeness, time management, efficiency, costs and the like.
   ii. auxiliary Dimensions comprising information sets, algorithms, processes and/or other data that may assist in purpose operations iii. Standardized PERCos metrics, such as for example quality to purpose metrics iv. Resource and other metrics, such as purpose satisfaction, Resource relationship metrics and/or any other metrics that may for example indicate Resource performance, functionality, purpose quality, mean-time-between-failure, processing speed, and the like.

9. Provide platform environment services, such as evaluators, testing and results, including reasoners, such as Monitoring and Exception Handling Service, History, Reasoning, and the like;
10. Provide Coherence infrastructure including disambiguating, evaluating and arbitration, reasoning to harmonize or otherwise resolve user purpose expressions, purpose statements, specifications, and provide Resource selection options and formulations that provide superior performance in pursuit of users purpose expression and/or otherwise create optimal operative conditions for purpose fulfillment operation;
11. Provide specification, Resolution, and operation processing (SRO-processing) to transform/evolve user purpose expressions into operating specification by parsing, evaluating, arbitrating, completing, discovering, resolving, cohering, optimizing, and/or other SRO related operations;
12. Provide efficient and optimal provisioning of purpose operating sessions by matching and/or performing similarity analysis between CPEs and resources available locally and/or virtually;
13. Support controlling, managing, optimizing, adapting, and/or other unfolding operations of operating resources for operating sessions;
14. Provide communications infrastructure;
15. Provide knowledge management infrastructure, including separation of information from its information structure for capturing, organizing, publishing, sharing, discovering, (re)using, and/or other knowledge management operations, such as, without limitation, capturing and using historical information;
16. Provide a publishing infrastructure;
17. Facilitate dynamic growth of groups of users, for example, without limitation, PERCos user affinity groups, social networking groups, industry alliance groups, and/or other grouping of users, by providing distributed PERCos network infrastructure to enable sharing of knowledge and experience across the groups;
18. Enable Domain experts to support non-expert users by providing information sharing infrastructures that include without limitation, Construct specification Framework, on-demand knowledge provisioning, publishing service, PERCos Platform Reservation Services, PERCos Platform History Services and the like.

4. Operating System Considerations

PERCos computing environments may enable users of diverse backgrounds and locations to intelligently and efficiently seek/pursue contextual purpose experiences in a one-to-boundless world that is relentlessly inundated with resources, such as for example and without limitation, Participants, hardware, devices, software, services, networks, video, images, audio, text, and other existing content and/or other types of materials. PERCos computing environments enable users to effectively and efficiently navigate/explore by providing apparatus and methods for flexibly supporting the organization, provisioning, and purpose-related governance of a potentially boundless collection of possible resources, normally with the goal of achieving optimal responses or response candidates to purpose expressions. PERCos computing environments provide a Resource architecture that enables resources to be treated in a uniform manner by through apparatus and methods to generate, represent, store, retrieve, process, present resources.

PERCos computing environments enable users to intelligently and efficiently pursue their contextual purpose by providing them with appropriate guidance. They allow users to formulate their purpose specifications by enabling them to iteratively refine their purpose expressions. At each point of iteration, the PERCos environment may evaluate the iterated purpose expression for possible inaccuracy, incompleteness, lack of clarity, inconsistency as well as check if it is too narrow, too broad, or requires excessive and/or unavailable resources. In the process, the PERCos system may enhance a user's ability to develop a better understanding of their purpose, and hence a better expression of it.

Initially candidate specifications may possibly be incomplete and/or describe resources in abstract/general terms and/or contextually. PERCos systems may resolve/cohere purpose specifications to ascertain their validity and to identify optimal arrangements of resources whose unfolding execution may provide experience that correspond to purpose specification.

PERCos systems may check the availability of the identified resources. For example, a PERCos system may check that a user is authorized to access the specified resources, and that the resources are not already tied up by a conflicting use. If needed, Coherence processes may interact with the user and/or stakeholders for clarification and/or elaboration. For example, the user may not be authorized to access some Resource and Coherence Services cannot find an alternative or substitute Resource. The Coherence Service may then request the user and/or stakeholders for further guidance.

Users may be of diverse backgrounds, from experts to those who seek/pursue purposes for which they do not have sufficient Domain expertise to express precisely what they want or seek. In the latter case, users may unsure of the desired results. PERCos computing environments enable users of diverse background to help each other by providing knowledge bases that capture knowledge obtained from past experiences. PERCos computing environments provide users, such as for example, purpose Domain experts, with apparatus and methods to publish specifications, such as CPEs, purpose classes, Frameworks, Foundations, Resource assemblies, and the like, so that less knowledgeable users may discover these specifications and use them to formulate their own purpose expressions.

The advance in wireless and mobile computing technology is enabling users to progressively use mobile platforms, such as smartphones, tablets, laptops, and the like, which may have differing computing capabilities and resources. PERCos systems provide operating environments that are optimal for each user's operating platforms. For users using mobile platforms that have limited resources, such as a smart phone with limited memory, PERCos systems would provide a minimal operating environment and outsource the rest to external platform arrangements in the virtual cloud. PERCos systems would adapt their processing based on the user's mobile platform, including controlling the dataflow, type of format used to represent results, and the like. For users using platforms that have ample resources, PERCos systems may provide richer set of services, such as presenting users with results in formats that require higher communication bandwidths, using their own platform resources to perform CPU intensive processing, or any other methods to utilize the greater-capabilities of the system.

The explosion of new mobile computing platforms, high-bandwidth communication networks, content provisioning infrastructures, cloud computing resources and the like has created boundless resources, applications, content materials, points of access, and the like, some of which may be of uncertain provenance and quality. PERCos systems provide users with apparatus and methods to ascertain/evaluate the credibility/reputation of resources that are to be employed for their contextual purpose operations. To this purpose, PERCos computing environments provide Repute expressions that users and PERCos may use to assert, discover, evaluate, organize, aggregate, and/or publish facts and/or opinions about resources. For example recordings of major events, such as the moon landing video, images from major catastrophes and the like may have associated Repute expressions asserting their authenticity.

Repute expressions enable PERCos systems and users to "sift" boundless resource stores to optimally provision resources in pursuit of user contextual purpose experiences. PERCos systems use Reputes of resources to provision user operation sessions with those resources that comply with user's expressed preferences. For example, suppose a user requests the use of reliable resources. PERCos systems would sift through resources to provide the user with resources, if possible, that complies with the requested level of reliability. Users may also use Repute expressions to assert facts and opinions about resources. For example, wine experts may publish Repute expressions that assert their expert opinions about wines. A user who likes a light white wine may evaluate published Repute expressions to find a winery and/or vintage that meets the user's purpose.

PERCos computing environment embodiments support platform independence by utilizing PERCos Resource Interfaces and supporting Resource arrangements organizations, such as standardized Constructs, class systems and Operating System Dynamic Fabrics. Operating System Dynamic Fabrics may comprise a set of specifications for one or more operating System elements. Each Operating System Dynamic Fabric is provided with a set of specifications, such as, without limitation, control, organizational, and Interface specifications. Control specifications specify operations of resources that are combined into the Operating System Dynamic Fabric for controlling and managing resources, such as, applications. Organizational specifications specify organization and arrangement of operating System elements. Interface specifications specify interface characteristics that may be accessed and/or interacted with by other resources, for example applications running on top of the Operating System Dynamic Fabrics. In some embodiments these may be standardized PERCos Resource Interfaces with associated Interface specifications, and may include operating agreements, which express and determine interactions between the Operating System Dynamic Fabrics and other resources, interactions among resources and/or processes. Interface specifications may also specify a set of methods by which other resources may interact with the Operating System Dynamic Fabric.

PERCos purposeful computing environment embodiments may operate on a wide range of platforms, from those that have limited resources (e.g., smart phone with limited memory) to high-powered servers with ample resources. They may operate as a web wide operating environment, and/or as an operating system, operating layer, application, and/or other modality, to interacting in pursuit of their expressed purposes. Depending on the embodiment and/or the operational environment, PERCos purposeful computing environment embodiments may be distributed and/or some of their elements may be offloaded to operate on other platforms. For example, a user using a plugin may provide the rest of its operating system functionality to be provided by Operating System elements operating on the cloud.

PERCos purposeful computing environment embodiments provide reliable services by associating one or more managers, such PRMS manager instances, with any arrangement of operating System embodiments and/or parts thereof. In some PERCos embodiments, operating System elements are arranged into Operating System Dynamic Fabrics, which have one or more Operating System management resources to monitor their performances and take appropriate actions as needed. In many PERCos embodiments, this management is undertaken by one or more instances of PERCos Platform Resource managers.

A PERCos operating session is a set of managed functioning resources providing PERCos-related purposeful cross-Edge user interaction. PERCos purposeful computing environment embodiments may support operations on operating sessions, such as, initiation, provisioning, termination, and the like. For example, an operating session starts with the provision of one or more operating specifications for fulfilling an expressed purpose. It unfolds until the satisfaction, termination, and/or other completion of PERCos processes regarding or following such expressed purpose. An operating session may include one or more operating agreements which have been negotiated with one or more PERCos Resource Management System instances that define the levels of services that the resources operating in the operating session may provide. Upon termination of an operating session, PERCos purposeful computing environment embodiments may "release" all resources that had been operating in the operating session and make them available for other operating sessions.

A PERCos metric may be one or more values which have been stated and/or calculated and is context dependent. PERCos purposeful computing environment embodiments use metrics and/or their methods of calculation to measure their performance. Such metric values may be stored as specifications, which may then be evaluated and analyzed to feedbacks for future improvements.

5. PERCos Environment in Operations

PERCos is an operating environment for "purposeful computing," extending traditional operating system capabilities by enabling user expression of purpose, and employing apparatus and method embodiments for matching Participant's prescriptive CPEs to other Participants' and/or Stakeholders' descriptive CPEs of resources available locally and/or on one or more networks. In part, PERCos provides a networked management platform to enable Participants to benefit from resources located anywhere, made available by anyone. For example, published materials and/or provider services, such as expert frameworks or any other enabling resource, might be used by anyone, anywhere, in user-directed combinations.

Anything contributing to a user purpose experience is a Resource. There are two kinds of resources:

- Foundation resources that PERCos may assume to be conditionally available and are normally associated with Participants and/or PERCos sessions and/or purpose expressions, such as, for example, Participants' computing environments, PERCos Platform Services, purpose statements, purpose classes, and the like.

resources that PERCos may need to obtain in support of the fulfillment of CPEs, some of which may need to be obtained externally from global networks.

PERCos seamlessly combines both kinds of resources to fulfill user purpose experiences.

Users may choose from a very wide range of PERCos capabilities in differing installation strategies, from applications and/or services to full operating systems and/or network operating systems and/or cloud operating system configurations. FIG. 137 shows a version of a global PERCos "purposeful network" in which users at nodal arrangements employ distributed PERCos network resources. It illustrates users using differing PERCos arrangements to obtain their respective contextual purpose experiences, such as, Their respective web browsers as portals to PERCos aware services (e.g., user 1 and user 3). In such instances, a PERCos environment is created by the availability and use of distributed PERCos enabled services.

One or more purpose class applications installed on their nodal arrangement resources (user 2).

One or more PERCos Services installed on their nodal arrangement resources (Company 1).

A version of PERCos operating system environment installed on their computers. The installation may be either directly on the computer hardware platform (Company 2), or on top of the computer's resident operating system (user 4), or in some manner running in a virtual machine environment.

Multiple groups of users may also share a purpose experience session. For example, in FIG. 122, user 1, user 2, and Company 1 (represented by three Participants) may be having their own individualized contextual purpose experience session; user 3 and user 4 may be sharing a contextual purpose experience session (represented by two more Participants); and Company 2, that is connected to distributed PERCos Network 1, may be sharing a contextual purpose experience session with users and companies in the distributed PERCos Network 2 (represented by an unspecified number of Participants).

PERCos supports deploying resources in accordance with Contextual Purpose Expressions, any other relevant metadata, any relevant and applied profile information and/or derivatives thereof, such that users may express, experience, retain, publish, deploy, identify, and otherwise work with and exploit (e.g., edit, analyze, replay, extract) PERCos sessions and session elements so as to provide the best fit to the user(s)'s CPEs, so as to optimally satisfy user session related purposes. PERCos is designed to enable computers to intelligently evaluate, organize, manage, interpret, and present available resources so as to optimally satisfy human purposes.

PERCos enables multiple users to share a purpose experience session, although each user may experience differing outcomes because of their differing Foundational resources. It also enables Participants to contribute towards a shared purpose experience and/or to share their respective Foundational resources with each other. FIG. 137, FIG. 138 and FIG. 139 illustrate an example of two users (user 1 and user 2) and an agent representing a third user who are participating in a shared contextual purpose session in which the agent chooses to share some of its Foundational resources with other users.

FIG. 137 illustrates the operating session at some early time (Time T1), which may be the session's initial time. At this time, the three Participants are not sharing any of their foundational arrangement resources. Instead, PERCos provisions each user's individual Shared purpose session (SPS) with only those resources to which the user has access. For example, user1's SPS contains $R_{11}$ and $R_{12}$, user2's SPS contains $R_{21}$, $R_{22}$, and $R_{23}$. user3's SPS contains $R_{31}$, $R_{32}$, $R_{33}$, and $R_{34}$.

Illustrative example of Resource configuration is shown in FIG. 137: An Example of Resource Configuration at Time T1.

FIG. 138 illustrates the session at Time, T2, which is later than Time T1 (i.e., T2>T1). It shows that agent has chosen to contribute one of its Foundational resources, $R_{33}$, so that PERCos may use it to enrich other Participants' respective purpose experience sessions. PERCos may provide Participants with the ability to specify access control rights for any Resource they may wish to share with other participants. For example, agent may specify that it grants user 1 partial access (such as use without modification) to $R_{33}$, but denies user 2 access. Agent also has the option to create a firewall between $R_{33}$ and the rest of agent's resources (to ensure that user 1's use of $R_{33}$ does not compromise the integrity of agent's remaining resources). Having partial access to $R_{33}$ may provide user 1 with a richer experience.

Illustrative example of Resource configuration is shown in FIG. 138: An Example of Resource Configuration at Time T2.

FIG. 139 illustrates the session at still a later time (i.e., T3>T2). It shows agent permitting user 1 to use $R_{33}$ as part of user 1's Foundational arrangements, but still deny user 2 access. Again, PERCos may provide users with the ability to control to such sharing. This type of sharing may provide user 1 with even richer experience. For example, if $R_{33}$ is a document, the sharing permits user 1 to search $R_{33}$ at will instead of being able to view only the part that PERCos permits as part of the shared operating session. PERCos may also provide user 1 with the ability to either accept or refuse the Resource. User 1 may also install a firewall between its own resources and $R_{33}$.

Illustrative example of Resource configuration is shown in FIG. 139: An Example of Resource Configuration at Time T3.

PERCos systems embodiments may enable users and/or other stakeholders to create a contextual interactive computational environment that enables them to fulfill their purpose expressions. PERCos systems embodiments may provide users and/or other Stakeholders with interfaces for performing the following operations, for example and without limitation:

1. Perform navigation and exploration operations in support of the pursuit of purpose experience, including formulating, modifying, discovering, and/or otherwise exploring purpose expressions.
2. Perform operating session context operations, such as to specify:
    a. Master Dimensions, auxiliary Dimensions, and the like.
    b. Additional elements for filtering and/or prioritization, including for example, to specify time duration, media type, complexity, user interface qualities, level of desired Quality to purpose and the like.
3. Perform construction operations, such as for example, to create, modify, discover and/or otherwise explore, publish and the like Constructs, such as Foundations, Frameworks, Resource assemblies, and the like.
4. Perform Specification, Resolution, and Operational Services.

5. Perform Repute expression related operations, such as to create, evaluate, modify, aggregate, discover and/or otherwise explore, and/or publish Repute expressions.
6. Invoke coherence operations, for example, to cohere, resolve, optimize, disambiguate, match and/or analyze for similarity, one or more resources.
7. Perform operating session management operations, such as init, stop, pause, replay, and the like.
8. Perform Resource-related operations, for example, to register external devices, create, manage, update, discover, publish, and/or otherwise explore resources.
9. Perform information management and knowledge base related operations, such as to capture, extract, edit, publish, discover, amalgamate, otherwise explore and/or produce results, so as to integrate, fuse, import, acquire, and/or otherwise enhance knowledge and/or knowledge stores.
10. Persist and/or store information.

Defining a new relationship between humans and their computing arrangements requires a new architecture for human-computer dialogue that supports eliciting, interpreting, specifying, and otherwise identifying and/or initiating human purpose-satisfying experiences, processes, and/or results. Even at the simpler end of the usage spectrum, this new architecture may provide significant benefits to many users.

Some embodiments of PERCos systems may incorporate dynamic frameworks that assist users in expressing and satisfying purposes that may themselves evolve during the course of an interaction. Practical user purpose-supporting environments require capabilities not found in traditional “search engines”, “information retrieval” tools and/or “knowledge management” systems. Such traditional tools do not support evaluative and purpose-directed aspects of Resource identification, evaluation, prioritization, management and utilization in the face of Big Data (and other Big resources). New forms of sophisticated navigation, discovery and exploration techniques are specified.

An important characteristic of PERCos systems is their ability to support innovative exploration and navigation tools based, at least in part, on purpose-related class systems, and/or Facets and divisions. This section includes an introduction to classes, Facets and divisions and their use, as well as examples of tools that could be used to manage and optimize navigation and exploration, and some examples of how they might be used.

PERCos systems may provide users with a various strategies to navigate and explore a PERCos Cosmos in pursuit of their purpose experiences, from formulating and refining their purpose expressions to provisioning their purpose sessions with optimal resources. The navigation and exploration strategies provide users with a variety of means and methods for performing context-based, purpose-oriented operations on purpose Domains—such as identifying, locating, pivoting, drilling down, pruning, generalizing, and/or expanding—on behalf of a user.

The kind of navigational choices to present to a user (if any) may depend, for example, on the context and purpose as well as the number of resources, the stage of purpose refinement, the Domain, and/or explicit or implicit information from a user. For example, if a purpose Domain is small or there are only a few resources, it may be preferable to present them directly, rather than offering means for navigating to a more restricted set; however, if the purpose Domain is large or there are a large number of resources, presenting navigational choices may be a helpful option. These navigation strategies may be interleaved as appropriate. In some embodiments, PERCos systems may provide users with class relationship graphs to navigate and explore classes, where nodes are classes and Edges represent certain relationships between the connected classes. Some embodiments of PERCos class systems may have a wide variety of relationships, such as, for example, “subclass,” “similar-to,” “has-purpose,” “has-dependency,” etc. Users may navigate and explore these graphs to find related classes, super classes, etc.

Users may use a Faceting interface to navigate and explore different Facets (and their divisions) of purpose expressions or Resource classes. A PERCos Facet organizes a group of resources, for example, a purpose Domain, into divisions. Users may navigate and explore divisions provided by Facets to refine their purpose expressions and/or to identify optimal resources. For example, a user whose purpose is to learn French language may use a Facet that divides French language into vocabulary, grammar, pronunciation, idiom, etc. The user may then drill down on one or more of these divisions to refine his/her purpose, such as to learn about grammar, which might have a further Facet with divisions such as verb, noun, adjective, etc. The division verb might have a further Facet with divisions conjugation, mood, tense, etc.

A Faceting interface may present users with divisions that may have characteristics in common with those in other Facets. For example, Facet style may organize music into divisions, such as classical, romantic, impressionistic, jazz, blues, etc. A user who is interested in jazz may also be interested in blues since both jazz and blues utilize blue notes. A PERCos system might also present users with related divisions. For Example, a user interested in learning about impressionistic music may also be interested in learning about impressionistic art and/or related historical events.

PERCos systems may provide users with purpose class applications designed to provide users with the convenience of using an arrangement of resources known to fulfill certain purpose classes. Some purpose class applications may enable users to navigate and explore purpose Domains and/or resources. For example, a purpose class application for the purpose of learning French may provide users with the ability to navigate and explore different aspects of learning French, such as its pronunciation, grammar, vocabulary, etc. It may also enable users to explore resources for obtaining the desired purpose experiences, such as resources that may provide users with on-line lessons.

PERCos systems may provide users with the ability to navigate and explore based on Reputes of resources. Users may include Repute expressions within purpose expressions or Resource expressions. Users may specify focus on resources whose Reputes satisfy certain properties, for example, performance, integrity, reliability, security and the like. For example, suppose a user has a purpose to find an interesting non-fiction book. The user may filter using, for example, available Reputes on individual books, on their authors, and/or on book publishers. Or the user may seek advice from resources the user holds in high Repute (e.g., particular book reviewers, best-seller lists, other users, and/or book club selections) and filter using Reputes from them. In either case, the user may request exclusion of already-read books. After reading a book, the user may generate a personal Repute on the book, the author, the publisher, and/or the source of advice. Such Reputes may remain private or be published.

Some embodiments may use hypertext as navigation medium that links purpose Domain elements that are related in some manner. For example, a navigation and exploration interface may present users with a list of topics of interest, where some of the topics may be linked to further topics of interest.

PERCos systems may support users with a variety of services and tools to efficiently and effectively interact with PERCos cosmos, including, for example without limitation:

1. Standardized, controlled lexicons and well-defined structures for expressing purposes;
2. One or more purpose Domain class systems for classification and expressing relationships among purpose classes that represent codified Domain expertise.
3. One or more Facets for navigating purpose classes by dividing, drilling down, and/or pivoting.
4. One or more Dimensions describing characteristics of users, resources and Reputes that may be used in any combination as simplifications for purpose operations
5. One or more metrics indicating strength of relationships among Facets, divisions, classes, and/or other resources and optimizing choices among them.
6. One or more Repute systems for filtering, prioritizing, etc., potential resources to achieve desired levels of credibility.
7. One or more databases, knowledge bases, ontologies, and/or other data structures that contain information relevant to navigation and exploration, for example, representing Domain expertise and/or metadata.

PERCos systems organize the boundless using class systems that represent important relations among sets of purposes and resources in a fashion to allow most searching, matching, and/or reasoning to be performed at the level of classes, instead of at the level of individual members. Often a small amount of class-level reasoning may reduce a candidate set that is to be examined in detail by several orders of magnitude.

User classes are conceptual groupings that exist in the minds of individual users.

PERCos Edge classes are mathematically precise entities intended to correspond closely to user classes and to support user processes, as practical means for:

1. communication among humans,
2. communication across the human-computer Edge,
3. classification of items (incorporating, e.g., taxonomies and/or ontologies),
4. articulation and/or specification of conceptual units,
5. identification, interpretation, interaction, and/or purposeful expression of related items and/or concepts, and/or
6. navigation and exploration of information Domains.

Edge classes are the PERCos classes users generally use in their interactions with PERCos, and are the classes most often discussed in this document.

The central relation in a class system is Subclass. Class A is a Subclass of a class B and B is a Superclass of A, if every member of A is a member of B. The Subclass and Superclass relations between classes may be important tools for controllably managing and exploiting lossiness in PERCos navigation and exploration.

Inclusion in a class allows the possibility that some members have further attributes making them members of one or more Subclasses, to as many levels of detail as are needed.

Inheritance means that each Subclass includes (inherits) all the attributes of each of its Superclasses. Inheritance is an important property of the Subclass relation. It leads to much of the conciseness and power of Object-Oriented Programming, and provides similar advantages in the description of purposes and resources.

PERCos embraces and employs the inherent lossiness of classes and super-classes as a means to practically optimize both the quality of results and the efficiency of obtaining them, by exploiting relations among classes as a means to navigate and explore resources that may be large (at times enormous), diverse, and/or multi-locational. These capabilities may provide profound improvements over existing search, retrieval, and semantic tools in the identification and deployment of optimally purpose-satisfying resources.

A class system comprises a set of classes and a set of relations on those classes, including at least Subclass.

In some embodiments, a PERCos system may generate one or more class system relational graphs, where nodes are classes and edges represent certain useful relationships between the connected classes. Some embodiments of PERCos class systems may have a wide variety of relationships, such as, for example, "Subclass," "Paraclass," "similar to," "has purpose," "has dependency," and the like. Edges might be directed or undirected. Some relational graphs might be dynamic and/or context-dependent, if the relations on which they are based are.

A PERCos system may use relational graphs to guide users who do not have appropriate expertise as they navigate and explore classes in their purpose Domains. For example, suppose a user selects purpose Facets verb:Learn and category:Debussy music. As illustrated in FIG. 140 a PERCos system may, for example, perform the following operations and graph traversals. It may identify the "closest" declared purpose class as Learn Impressionistic Music. A PERCos system may guide the user to learn about historical/cultural events that may have influenced Debussy in composing his music. In this example a PERCos system might present the navigation option to traverse from class Learn Impressionistic Music to the "nearby" class Learn Impressionist Art, and then to generalize to Learn Art, a Superclass of Learn Impressionist Art. Then it might present the Learn Art Facet Learn Art Historical Events, which may comprise events relevant to the rise of art movements. It might offer to generalize Learn Art Historical Events to Learn Historical Events, and then to Learn History, thereby guiding the user to learn about general culture and history around the time of Impressionism, including possibly the period of the history leading up to the development of the Impressionistic movement, historical political environment, etc. For example, Emperor Napoleon III's decree to allow the public to judge art exhibits emboldened a group of artists who were more interested in painting landscapes and contemporary life than in recreating historical scenes to organize salons to exhibit their works.

Navigation may interleave pruning and generalization. A user might be guided to take a combination of one or more subclasses and generalize the combination. For example, class Learn Art has, inter alia, the Subclasses: Learn Impressionist Art and Learn Art Historical Events. A PERCos system may enable a user to prune Learn Art to Learn Art Historical Events and then to explore other super-classes of Learn Art Historical Events, for example Learn Historical Events. This is an example of a style of pivoting.

Illustrative example of a subgraph as an example of a class system relational graph is shown in FIG. 140: A Subgraph of an Example Class System Relationship Graph.

The general idea of "Faceting" for information retrieval is well-established. PERCos provides a systematic approach to Faceting that provides significant advantages for purpose navigation and exploration.

A Facet associated with a class of resources is an organization of those resources into named divisions, which may or may not overlap (have members in common). Normally, each of the resources in the set may be included in one or more of the divisions. In some embodiments, a context-dependent default name, such as Other, None of the Above, or Shell, may be used to name a division comprising resources of the set that have not been otherwise included in a division.

Facets may be used in various ways within PERCos, for example, in initial purpose formulation, purpose refinement, exploration and navigation, and similarity and usefulness calculations. A class may have multiple associated Facets, and a Facet may be associated with multiple classes. Facets and divisions are resources, and may have associated metadata, including descriptions and/or Reputes and/or other metrics (such as one or more weights). Divisions are sets of resources, and may themselves be further Faceted.

For example, Travel might have Facet components, with divisions named Flight, Hotel, Ground Transportation, and the like. The Hotel division might have Facets such as Chain, Stars, Location, Price, and Dates. Chain might have divisions such as Hyatt, Marriott, Sheraton, and the like. The Hyatt Division might have a Brand Facet, with divisions such as Andaz, Grand Hyatt, Hyatt Resort, Hyatt Place, and Park Hyatt. Each of these divisions could have still further associated Facets.

Facets need not be static. They may be context-dependent and/or dynamically created during user interactions, and may be particularly reflective of current user purpose(s) and goal Dimensions.

In some embodiments, Facets may be associated with classes, and divisions may be Subclasses of the associated classes, specified by class expressions. Some embodiments or subsystems of embodiments may alternatively or additionally use one or more functionally equivalent internal representations of Facets that do not explicitly involve classes or class expressions (e.g., a relational database or an index). For interoperability, such embodiments may supply class-oriented interfaces.

In a class-oriented view, a Facet associated with a class comprises a set of subclasses of the class (generally specified by class expressions) whose union includes the entire class, with a name, and possibly other expressions (e.g., weights), associated with each. A class associated with one or more Facets is sometimes called a Faceted class. The name associated with a division (Subclass) within a Facet may be different from names associated with that Subclass in other contexts, including Subclass Declarations. Some divisions may be empty (contain no members).

Since many of the uses of Facets involve interaction with users, the classes and Subclasses involved are normally elements of an Edge class system (and may be declared classes), and the names used are normally Ref/Senses (which may be expressed as tokens, such as words or icons.

In some embodiments, a Facet associated with a class may also be automatically associated with (inherited by) each of its subclasses. Such inheritance may be a source of operationally empty divisions within a Facet associated with a Subclass.

The members of class purpose are specifications of purpose. Facets associated with purpose are ways of dividing all purposes, and are called purpose Facets. Some embodiments may supply standardized purpose Facets, for example without limitation, verb, category, expertise, Time, Size, and Location. In some embodiments, the name of each of these purpose Facets may also name an attribute, and its divisions may comprise the Subclasses of purpose that have an attribute with that name and a particular value, which may Name a division. For example, the verb Facet may have divisions for each value of attribute: verb, such as Buy (i.e., Attribute:verb=Buy), Learn, Teach, experience, Evaluate, Drink, Eat, Listen, and Visit.

In some embodiments, Core Purpose Facets may comprise verb and category. The remaining Facets are called auxiliary purpose Facets. A Core Purpose expression generally specifies a division or subdivision of verb and a division or subdivision of category.

Standardization of purpose Facets is a key to effective interoperation of PERCos subsystems, and some embodiments may enforce such standards. Some embodiments may allow users, acknowledged Domain experts, and/or other stakeholders to declare additional purpose Facets that may be added to such a pre-defined set. Normally, such added purpose Facets may be based on standardized attribute names and attribute values, to allow interoperability using the added purpose Facets.

Facets are used in various PERCos processes, such as purpose formulation, Specification, Resolution, Operation, (collectively SRO) Coherence, pruning, matching, similarity analysis, and the like, to select optimal resources for purpose fulfillment. This section discusses some of the ways that Facets may be used within PERCos purpose cycles to assist users in defining and satisfying their purposes.

A user's initial expression of purpose may be performed using Facets as a guide. In a boundary case, a user may start fresh, without any purpose expression, and initially be presented with just the navigation option purpose Facet, which would allow the user to, for example, decide to start by selecting, say, the verb division and a member of verb, say Buy, and then, perhaps, to proceed by selecting the category division and a member of category, say Wine, to complete a simple Core Purpose expression. Thus Facets, optionally in combination with other capabilities, may support a completely menu-driven interface for purpose expressions, avoiding the need for users to type purpose expressions, or even to know in advance which tokens correspond to standardized and interoperable Ref/Senses. This may also promote clarification and illumination of user intent.

Alternatively, a user could enter one or more purpose Facets as purpose expressions, and be guided by PERCos tools in the selection of further purpose Facets.

In this example, as shown in FIGS. 140*a*, 140*b*, and 140*c*: An Example of A User Selecting Purpose Facets, a user starts out without a purpose expression, and builds one by selecting Facets, the purpose Facet verb, and the purpose Facet category (FIG. 140*a*). Next, the user selects the verb Facet Learn, and the category Facet Wine (FIG. 140*b*). And then the user selects the Wine Facet Fruit, a menu pops up with the divisions of the Fruit Facet, and user selects Plum (FIG. 140*c*).

A user may find that a purpose expression is too broad, and wish to refine it by any of a variety of criteria. These could, in principle, be entered as additional elements of a purpose expression, but in many circumstances, a user may prefer to pick a relevant Facet and select from a list of its divisions. For example, Wine might be refined by a Color Facet, a Sweetness Facet, a Country Facet, a Fruit Facet, an Acidity Facet, a Fruitiness Facet, and/or a Fizziness Facet. Or Buy might be refined by a Seller Facet, a Store Type Facet, and/or an Offline/Online Facet. Selections may be made using multiple Facets of a single class, e.g., Wine: Color=Red and Wine:Country=France.

A purpose may also be refined using one or more auxiliary purpose Facets, such as expertise and/or Size.

Each Facet provides a viewpoint on a purpose or other class—they may sometimes be thought of as "perspectives" or "Dimensions" of the class. In addition to their use in refining classes, they may be used to explore a "space" or Domain of classes. A user might not initially have the right vocabulary of standardized terms to develop an adequate purpose expression for a still-unformed purpose.

For example, the Branch Facet of Mathematics might include divisions such as Survey, Arithmetic, Algebra, Geometry, Trigonometry, Differential Calculus, Integral Calculus, Group Theory, and Topology. metadata associated with divisions could assist a user in determining, for example, that Geometry was the Branch of Mathematics most likely of interest in the evolving and deepening purpose, and a Dimension Facet of Geometry might include divisions such as Plane Geometry, Solid Geometry, and Higher-Dimensional Geometry, while a Kind Facet might contain divisions such as Euclidean Geometry and Riemannian Geometry, and an Approach Facet another might contain divisions such as Differential Geometry and Algebraic Geometry.

As an additional example, suppose a user wants a repair for squealing brakes on an automobile, but doesn't know much about automobile repairs. A PERCos system might provide several relevant Facets. For example, Automobile Brake might be associated with Facets, including:

1. Car brand: BMW, Buick, Cadillac, Ford, Lexus, Mercedes Benz, etc.,
2. Brake type: drum, disk,
3. Brake location: front, rear,
4. Brake part: pad, rotor, drum, cylinder, ABS,
5. Car Model year.

Brake Repair Shop might also be associated with Facets, including:

1. Car brand: Divided based on the types of car they service, such as BMW, Buick, Cadillac, Ford, Lexus, Mercedes Benz, etc.,
2 Shop location: Divided based on location (either absolute, or relative to user's current location),
3 Shop reputation: Divided based on their Reputes.

Divisions of Facets may themselves have Facets that allow further subdivisions. For example, some divisions of brake part could have a Facet Condition that further divides them. For example, pad could have Condition divisions such as, fine, acceptable, badly worn, worn through. divisions of Facet Shop reputation may also have a Facet Cost that divides repair shops based on their typical charges for repairs, relative to other shops with equivalent reputations.

These Facets may assist a user in finding an appropriate repair shop and/or in evaluating the reasonableness of an estimate for a particular repair, given the car, the location, and the part(s) involved.

PERCos navigation tools may also use Facets when looking for alternative resources with common or similar characteristics. For example, suppose a user has a purpose to repair automobile brakes, but the user's customary repair shop cannot offer an appointment for the dates/times of interest. A tool may examine the Facets of Brake Repair Shops to find shops that closely match the user's repair shop. The list could be prioritized based on Facets in which they match, or are similar; the weighting assigned to various matches might be Context-dependent (e.g., based on a Participant preference for Car brand and Shop reputation over Shop location).

In some embodiments, the number of members of a division may, in part, affect their presentation. For example, divisions of a Facet that are known to be empty in a context may be presented differently (e.g., grayed out) or completely omitted. Some of the other factors that might affect the presentation include their Reputes, their historical frequency (based on statistics from a user or from a larger population), Participant preferences (including conventions, such as "please alphabetize" or "please present popular/recent choices first"), and/or Facet metadata. Aspects of the presentation that could be systematically varied to enhance user recognition include, for example, order, size, font, color, highlighting, orientation, icon, and/or audible tone.

Metadata associated with Facets may influence the selection of purpose class apps to be presented to the user. Other relevant Context, such as the Edge class, Participant preferences, goal balance, and/or historical usage patterns may also influence this selection.

Some Facets may be used to emphasize the "essential" or "most important" members and/or Subclasses of a class, particularly as related to purpose. This is especially useful in combination with pivoting, to discover other classes that are particularly relevant to a particular purpose class. For example, the Checklist Facet of Start Business might contain divisions such as Articulate Business Plan, Secure Financing, Acquire resources, Recruit Personnel, etc. The Elements Facet of Vacation Trip might contain divisions such as Flights, Hotels, Ground Transportation, and Event Tickets, indicating that anyone wishing to plan a vacation trip should probably at various time pivot to superclasses such as Airlines, Lodging, Vehicles, and Entertainment. A California user interested in Buy Home might be guided to pivot to classes such as Mortgage, Title Insurance, Escrow, and Termite Inspection, none of which would be found as Subclasses of Buy Home, but which each intersect with it.

For many topics, there are a variety of "schools of thought," even among experts. One use of Facets is to enable users to quickly, easily, and systematically explore various schools of thought and/or to pick a particular school as the basis for further refinement. Counterpoint Facets provide alternatives without necessarily imposing a value judgment, unlike Reputes.

For example, class:Medicine might have a Counterpoint Facet with divisions such as Orthodox Western, Homeopathic, Chiropractic, Traditional Asian, etc.; Treatment of Mental Illness might have divisions such as Talk, Medicate, Behavioral Feedback, and Other; architecture might have divisions such as Functional, Structural, Decorative, etc.; Science might have divisions Theoretical and Experimental; Economics might have (partially overlapping) divisions Macroeconomics, Microeconomics, Mathematical Economics, Econometrics, Behavioral Economics, Experimental Economics, and Heterodox Economics.

While users may use a variety of apparatus and method embodiments to formulate purpose expressions, such as for example, text processing services, PERCos Navigation Interface (PNI) may be a preferred apparatus and method embodiments for users to discover, formulate, refine, resolve, cohere, iterate and/or evolve their purpose expressions. In some embodiments, PNI may provide processes, such as pruning, refinement, generalization, and/or pivoting to refine purpose expressions.

PNI pruning processes may use PERCos class systems, Facets, contextual information, and the like, to narrow the scope of exploration by, at the class level, eliminating from consideration entire purpose classes that are irrelevant, without ever determining or evaluating their Resource members. For example, suppose the user expresses a purpose to learn about bicycle chain repair. The PERCos class system could enable PERCos to narrow the scope of exploration by eliminating purpose classes in a PERCos cosmos that have been declared to be disjoint (have no members in common) with Learn and/or Bicycle Repair.

Efficient pruning is a consideration in efficiently and effectively addressing Big Resource. Each Core Purpose represents a tiny fraction of the resources available in a PERCos Cosmos, and the more narrowly a user's purpose is expressed, the more that may safely be ignored, which may improve efficiency enormously.

PNI refinement processes may assist users in refining their purpose expressions by adding criteria that narrow the set of relevant classes, for example, by selecting divisions within a Facet, or Declared Subclasses within a class. For example, suppose a user selects the purpose Facets Learn and Music theory. A PERCos system might determine that this is equivalent to the declared purpose class Learn music theory, which has a Facet, Theory type, with divisions harmonization, rhythm, and the like, and another Facet Background, with divisions such as None, Novice, Intermediate, Skilled, and Professional. The user could select one or more divisions of Theory type and/or Background to refine the purpose expression.

Refinement may sometimes lead to overly narrow purpose expressions that exclude the resources most appropriate to users' real, but not accurately expressed, purposes. It may also sometimes happen that there are no suitable resources that exactly match an accurately expressed purpose, and that the optimal thing to do is to generalize to a superclass that may contain resources that are sufficiently similar to be useful.

PNI generalization processes may assist users in applying lossy transformations to their purpose expressions, for example, to identify one or more superclasses that are relevant to their purposes, allowing more resources to be considered. Other lossy transformations include, for example, replacing quantitative metrics by appropriate qualitative metrics, expanding division selections to include similar divisions, and replacing Subclass Names with paraclass names.

PNI pivoting process may assist users by exploring alternative classifications of resources. Pivoting is a common group of specialization-generalization techniques that are especially useful in exploration. It involves navigating to a class, and then changing or relaxing one or more of the constraints used in the navigation to reach a class that is "similar," but may offer differing navigational options (e.g., differing superclasses, subclasses, and/or Facets).

For example, the Source Facet of Video might contain divisions Movie, Concert, Sport, Television Show, Home Movie, and the like. The Genre Facet of Movie might contain Comedy, Romance, Adventure, and Western, or other known genres. The Actor Facet of Western might contain John Wayne, Jimmy Stewart, Kevin Costner, *Julia* Roberts, or any other actor. An appropriate metric might indicate that there was a significant overlap between the John Wayne division of the Actor Facet and the John Ford division of the Director Facet of Western. A user who had navigated to John Wayne Western might be interested in this relationship, and pivot to the class of John Ford-directed Westerns (i.e., replace the constraint Actor=John Wayne with the constraint Director=John Ford), or even to John Ford-directed Movies, to find possibly interesting Video resources within Movie that the user did not previously know about.

In some embodiments, PNI may enable users to create personalized computational environment to include their own internal knowledge bases as well as define rules for interacting with other users, services, and the like. For example, users may specify their respective their user characteristics. PNI may use this information as well as other a relatively small number of other information. For example, PNI may use information sets, known as Master Dimensions, to significantly influence its navigation and exploration, where Master Dimension may include for example, and without limitation, the following:

1. User characteristics,
2. Resource characteristics,
3. Purposes,
4. Reputes, and/or
5. Domains.

Users may establish their operating session Context by specifying aspects of Master Dimensions and/or other preferences. Users may specify values for Master Dimensions. For example, suppose a user wishes to explore books that the user may use to learn about history of western music. The user may specify Repute levels of the book authors, such as the user wishes to find books that are authored by professors of well-known universities.

User may specify Dimensional values that help to organize and/or classify the kind of results users are seeking. Dimensions may influence, in part, the treatment of various resources (e.g., selection or presentation of verbs, categories, contextual purpose Facets, and/or divisions). Some Facets or divisions may be more closely associated with one of these Dimensions than with the others, although there may also be substantial overlap in some cases.

In some embodiments, the relative weighting of these Dimensions may influence, in part, the treatment of various resources (e.g., selection or presentation of verbs, categories, contextual purpose Facets, and/or divisions).

For example, in some PERCos embodiments, "user variables" are a Master Dimension Facet. Suppose a user characterizes themselves as an undergraduate student is interested in finding a group theory book. PERCos environment may adjust its search of general group theory books to those books that are appropriate for undergraduate student level. It may also provide the student with more guidance in refining his/her purpose expressions, where guidance may range from checking for possible mistakes, suggestions for applicable templates, declared classes, Frameworks, and the like. For example, PERCos environment may provide purpose classes that are designed for users with a medium level expertise/knowledge. Such purpose class may allow the student to specify special areas of interest, such as finite groups, infinite groups, or other area of interest. In contrast, if a research mathematician is interested in finding a group theory book, PERCos environment provide the mathematician with purpose classes that allow the mathematician to express his/her areas of specialization, such as solvable groups, Lie groups, or other specialized area.

A PERCos environment may also enable users to specify Reputes and/or Repute metrics to constrain the choice of resources for fulfilling their purpose expression. For example, suppose a traveler is interested in finding a hotel in a city he/she doesn't know very much about. The traveler may specify Repute metrics that specify the quality of the hotel. PERCos environment may use the specified Repute metrics to narrow the search of applicable hotels to service the traveler's purpose expression.

While a PERCos environment may provide a variety of ways for enabling users to specify their operating session context, some embodiments may explicitly provide "purpose dashboards" and/or similar apparatus and method embodiments that minimizes the effort and optimizes Resource management for a user to visualize, understand, and/or control major purpose-related master and/or auxiliary Dimensions, including user response evaluation of and/or selection of resources. For example, a session may involve an interface mode, Core Purpose Expression, Resource conditions and parameters, Reputes, user characteristics and preferences, and other important contexts.

A PERCos environment may enable users to express qualifier elements to filter and/or prioritize experience characteristics, such as specification of time duration, media type, complexity, user interface quality, presentation of results, level of desired quality of purpose experience, and the like. For example, a user may be interested in obtaining the results orally, visually, graphically, textually, or by some other method of obtaining results known in the art. Users may also specify conditional qualifying elements. For example, if users are receiving results on their smartphone, they may request an abbreviated version of the result, whereas if using a powerful laptop, then a verbose version with all the details.

The PERCos environment may enable users to specify desired levels of quality of purpose expressions. Users may specify properties such as the desired levels of privacy, reliability, integrity, or any other desired property. For example, suppose a user has a purpose of finding disk storage space in the cloud and to ensure that the storage space would be available 24/7 and that the provider provides sufficient reliability, integrity, and privacy. Users may specify a PERCos system to protect their information from unauthorized access. The PERCos environment may use appropriate protection mechanisms to provide the desired level of privacy. Users may also specify other types of quality. Users may specify desired response time. For example, a user may specify a quick response whereas another user may request for complete results.

A PERCos environment may provide users with an extensible and interoperable Construct environment comprising, for example, the following:

- Standardized, unified, and interoperable apparatus and method embodiments to describe and organize resources and/or information about resources for unbounded sets and types of both PERCos-enabled and non-PERCos resources (e.g., legacy and external services).
- An extensible and interoperable Construct environment with Constructs, Construct templates, and associated tool sets to arrange, quantize, and/or transform Constructs into more specialized and capable Constructs for efficient and effective fulfillment of user purposes.
- Standardized Resource Roles to treat, utilize, operate, manage, and monitor operating resources. Resource Roles may comprise standardized and interoperable Resource Interfaces, when provisioned by appropriate resources operate in the manner described by the Resource Role interface.

In some embodiments, a PERCos system may provide a dynamic, flexible, distributed, and scalable PERCos Information Management System (PIMS) for systematic and inter-operable management of information units (e.g., such document, multimedia, on-line, bio-metrics, data) that are relevant for fulfilling purposes. PIMS provides standardized and inter-operable constructs for creating, identifying, organizing, matching, manipulating, discovering, analyzing, and/or other ways of managing units of information for their potential retrieval, sharing and/or reuse at a later time. In further embodiments, PIMS may also utilize PERCos platform services to provide a suite of services, such as, for storing, retrieving, publishing, distributing, and/or other information manipulating operations. In particular, PIMS provides management and persistence of resources through their Resource Interfaces specified by their respective negotiated operating agreements.

PIMS may provide one or more apparatus and method embodiments to allow users to store their information structures and associated contents in multiple arrangements, including for example in combination and/or separately. In particular, PIMS may enable users to dynamically organize their often used units of information based on their purposes.

Illustrative example of knowledge extortion is shown in FIG. 141: An Example Knowledge Extraction.

PERCos environment provides apparatus and method embodiments for every aspect of managing any type of knowledge/information (e.g. document, multimedia, on-line, bio-metrics) that are relevant in fulfilling purposes. It provides constructs for creating and organizing such information. In some embodiments, it may provide constructs to identify, contain, organize, match, analyze, and/or otherwise manage units of information for their potential retrieval, sharing and/or reuse at a later time. In some embodiments, it may also utilize PERCos Platform services to provide a suite of services, such as, storing, retrieving, publishing, distributing, discovering and/or other information manipulating operations. In particular, it provides management and persistence of resources through their Resource Interfaces specified by their respective negotiated operating agreements. Although any identifiable unit of information may be made into a Resource, for reasons of efficiency, it need not be.

A PERCos environment also provides users with the ability to extract knowledge from operating sessions. As illustrated in FIG. 141, after termination of an operating session that fulfilled some purpose expression users may extract a purpose Framework specification as well as resources that fulfilled their purpose expression. The extracted purpose Framework specification may be then published so that it may be reused at a later time.

When a Framework is deployed at a later time, a PERCos environment may use PERCos Specification, Resolution and Operational (SRO) processes to ensure its viability, such as ensuring the availability of specified resources.

6. Operating an Example PERCos Environment

A PERCos system may support a wide range of operating environments, ranging from simple embodiments (such as for example a plugin to a browser) to highly complex and/or distributed global purpose networks. For example a simple embodiment may comprise a cloud-based layer of PERCos aware resources operating as remotely usable services. A complex and distributed global purpose networks may be one where every node on the network is running a full version of a PERCos environment either natively or on top of the computer's resident operating system.

PERCos embodiments may operate either connected to internet or operate offline.

A PERCos embodiment may be accessed, for example and without limitation, in one or more of the following ways:

1. Accessing PERCos services through use of one or more browsers;
2. Accessing PERCos services through use of purpose applications running on user controlled nodal arrangements;
3. Accessing PERCos services through use of purpose aware plugins, where a plugin may be invoked by a purpose application or a non-purpose application;

4. Maintaining the user's PERCos data on the user's nodal arrangement(s);
5. Operating PERCos applications on user controlled arrangement(s);
6. Operating a subset of PERCos Services on user controlled arrangement(s);
7. Hosting a version of PERCos platform on user controlled hardware platforms;
8. Hosting a version of PERCos platform on group/organization controlled hardware platforms;
9. Operating a version of PERCos platform natively on user controlled hardware platforms;
10. Operating a version of PERCos platform natively on group/organization controlled hardware platforms; and,
11. Operating a version of PERCos LAN in which every hardware platform in the LAN is operating a version of PERCos platform, either natively or on top of the platform's resident operating system.

Illustrative example of users and global purpose network is shown in FIG. 142: An Example Global Purposeful Network Users (e.g., user 3 in FIG. 142) who would like to obtain contextual purpose experiences transparently may simply subscribe to an on-line service provider that offers a PERCos service. For example, a thin film solar cell manufacturing company may incorporate some PERCos services to make it easier for its clients to learn about its products. Clients may use their web browser to access the company's website to obtain contextual purpose experience, such as learning about the efficiency of its products. In this usage, users may not be aware that they are using PERCos services.

Users (e.g., user 1 in FIG. 142) may also store some of their PERCos data on their local arrangements. The user may then supply the locally stored data to obtain their contextual purpose experience. The locally stored data may range from the user's Creds and preferences to templates that they would like to use to express their purpose. In this usage, users do not have to install any of PERCos services software on their local arrangements.

Users (e.g., user 2 in FIG. 142) also have the option of storing PERCos applications on their local computing resources. When a user invokes to one of these PERCos applications, the application may transparently connect to an appropriate PERCos server to provide the user with the contextual purpose experience specified by the application. In this usage, users do not have to install any of PERCos service software on their local computing resources.

PERCos may also provide users (e.g., Company 1 in FIG. 142) with the option of installing a subset of PERCos services on their local computing arrangements. Users may be provided with the option of how they may install the selected services (e.g., plug-in for their browsers, standalone services). For example, users may choose services that allow them to specify their particular preferences for using PERCos or to reserve some persistent resources.

PERCos environments may provide users/Stakeholders with the option of hosting PERCos environments to operate on top of their computer's resident operating system (user 4 in FIG. 142) and/or running PERCos natively by installing a PERCos system directly on their hardware platforms (Company 2 in FIG. 142). In such cases, PERCos embodiments may be designed to run both PERCos applications and non-PERCos applications Non-PERCos applications are traditional applications that are developed to run on the resident operating system. An appropriate version of PERCos environment setup software may scan the user's local computing resources. Then based on the user's intended purposes, it may determine resource requirements to provide the user with desired contextual experience.

Regardless of the user's choice of accessing PERCos embodiment services, PERCos may provide users/Stakeholders with one or more sets of options for using PERCos. Some example options, without limitation, may include:

1. User identification and authorization systems and information,
2. User/Stakeholder preferences,
3. Specifications, resolutions, allocations and/or arrangements of resources,
4. Reputes and/or
5. Governance and/or Credentials.

Some users who have several local computing resources may wish to create multiple Foundations, where each Foundation comprises different combinations of the user's computing resources. For each Foundation, the PERCos environment may identify suitable resources to perform its services. The resources may range from local storage on the user's computing devices to procedures for establishing appropriate communication links. The user may also be provided with a wide range of options. One option may allow users to specify that the PERCos environment explicitly requests permission before it establishes any external communication links. Another option is for dealing with inadequate local resources. Users may specify that if their respective current Foundation does not have sufficient computing resources (e.g., a cell phone Resource), the PERCos environment may provide them with options for off-loading the remaining specified resources to other PERCos service providers, such as some cloud service or users' other Foundation resources. For example, when users are using Foundation that has limited resources, such as their smartphones, they have the option to specify the use of their other computing resources, such as their home computing systems to supplement their current Foundation resources.

In some embodiments PERCos may provide one or more registration services, such as for example, as utility services, which enable users/Stakeholders to register resources and associated information sets with such utilities.

Registering users may include establishing an identification and authentication process to provide Repute information and/or credentials that the users would like to obtain their contextual purpose experiences For example, a professor of a well-known university may want to establish a Repute to teach some technology, such as thin-film solar cell manufacturing technology and wish to establish his or her credentials for this purpose. Users who wish to learn about the solar cell technology may then validate the professor's Reputes. Suppose the professor also likes to do on-line banking. For this purpose, he needs to establish a different credential acceptable to the user's banks. PERCos may maintain the user's Repute information in a secure location so that they are available as needed by the user. The user may also provide Repute information on needed-basis.

A PERCos environment may enable users to perform user-related operations, such as to register new users, modify user information sets, and the like. Users may register themselves to PERCos systems and/or utilities authorized by such PERCos systems, so as to provide information, such as their identification and authentication information, profiles, credentials, and the like.

Users may also create, modify and/or delete Participants associated and controlled by them. A Participant is a PERCos Resource that represents information about a user within a PERCos system. The Participant is the Edge representation in the computational Domain of the behavior of a human user, group, or organization that is itself outside the computational Domain.

A PERCos environment may enable users/Stakeholders to perform Resource-related operations, to allow users/Stakeholders to manage, aggregate, organize, update, discover and/or otherwise explore, and/or publish resources. Resource-related operations may include without limitation, the following:

1. Associating specifications with one or more physical or logical devices;
2. Importing non-PERCos resources into PERCos systems;
3. Creating, managing, aggregating, organizing, updating, discovering, exploring and/or publishing PERCos resources;
4. Creating, unifying, organizing, updating, importing, discovering, exploring and/or publishing Resource interfaces associated with resources; and
5. Managing, analyzing, discovering, organizing and/or otherwise exploring Identification information associated with resources.

The PERCos environment may allow users to associate specifications with physical or logical devices. For example, users may specify physical/logical devices, such as their laptops, printers, graphical devices, storage service, and the like comprise their respective Foundations.

Non-PERCos resources may be imported into PERCos systems by providing transformers that enable them to provide the properties of a PERCos Resource, such as providing information to identify a unique element (value) and associated Resource metadata, including one or more associated Resource interfaces—from within the transformer and/or from some other source. Often, the most substantive element of a transformer is a Resource interface that presents a PERCos interface while accessing the non-PERCos Resource using its “native” interface.

A PERCos environment may enable users, Participants, Stakeholders, and resources to create, manage, aggregate, organize, construct, update, extract, discover and/or otherwise explore, or publish PERCos resources. For example, users may discover one or more Frameworks in the cloud and modify them to as to construct a purpose Framework specification.

Users may also create, unify, organize, update, import, discover and/or otherwise explore, or publish Resource interfaces associated with resources. For example, users may aggregate two or more resources and provide a unified Resource interface to access the aggregated Resource.

A PERCos environment enables users to manage, analyze, discover and/or otherwise explore, organize, identification information, such as, designators that are linked to resources in such a way that users/processes may use the identification information to access resources. For example, suppose a user using a smartphone wishes to learn about thin film solar cell industry. If there are multiple resources that provide fulfill user’s purpose, the user may examine and/or analyze one or more designators to determine the optimal Resource that would accommodate user’s limited graphical display space.

In some embodiments, users/Stakeholders, processes, and/or other resources may register a Resource by, for example, using a Resource characteristics language to provide one or more specifications that describe the Resource’s interface, functionality, and/or other characteristics. For example, users/Stakeholders may register their own computing resources, such as their laptops, smartphones, and the like. Organizations, such as manufacturers, service organizations, companies, or any other groups may register their products and/or services.

For example, an organization that offers cloud storage service may register its services by providing Resource interfaces that users/Stakeholders processes and/or other resources may use to store and retrieve their information.

A PERCos system enhances human/computer evaluation, organization, management, interpretation, and presentation of available resources so as to optimally satisfy Human purposes. In doing so, the PERCos environment systematically frames and conveys Facets of Human purposes in forms that may be used to generate operational specifications for such operations. Currently commercially available search and information retrieval systems do not provide such means. Of the many aspects of human purpose, such systems generally focus only on category or classification indicators and/or on the presence or absence of particular words or phrases (search terms), and ignored verbs as structured elements specified by users.

Illustrative example of PERCos embodiment SRO processes as shown in FIG. 143: An Example of Detailed view of SRO Processing.

PERCos environment embodiments are specification-driven, adaptive and dynamic. Rather than merely supplying applications suitable for pre-identified general activity types, such as word processing, spreadsheet, accounting, presentation, a PERCos environment is designed to provide experiences corresponding to expressed purposes by providing Resource arrangements and unfolding executions specifically in response to expressed purpose specifications and instructions. The PERCos environment provides users with an iterative and interactive service, called a Specification, Resolution and Operational (SRO) service, for specifying CPEs to generate operational specification that users may use to fulfill their contextual purpose experiences.

An SRO service provides a rich environment designed to minimize the level of effort for users may have to expend to obtain optimal contextual purpose experiences. The rich environment may include knowledge discovery tools that users may use to discover and/or manipulate knowledge captured and published from past experiences by other users, Stakeholders and/or systems. Knowledge may include CPEs formulated by other users including experts, declared classes, Frameworks, Resource arrangements, and the like that other users and/or Stakeholders may have used and/or published as effective in fulfilling CPEs. An SRO service also provides specification languages, services, tools, and/or utilities. The Specification, Resolution and Operational (SRO) service provides constructs such as CPEs, Frameworks, Foundations, purpose classes and/or other classes that users/Stakeholders, resources and/or processes may use to compose and/or build and/or otherwise manipulate to articulate and subsequently identify and/or prioritize rich, nuanced, and highly responsive CPEs/results extracted from arbitrarily huge Resource arrays.

An SRO service may also provide utilities and services, such as registration/publishing, Resource information matrix, commercial flow management, and Repute services that allow users and/or system services to refine and/or control their fulfillment of their CPEs.

In some embodiments, a PERCos SRO service comprises Specification, Resolution, and Operational processes. A Specification process enables users to formulate their CPEs. It provides users with tools, such as Information System (IS) tools that they may use to leverage knowledge captured from past experiences to formulate their CPEs. The specification process also enables users to share their CPEs with each other by providing them with the ability to store and publish their CPEs, Frameworks, and the like. The specification process then takes their CPE and generates a purpose specification. Initially, a candidate operational specification may possibly be incomplete and/or describe resources in abstract/general terms and/or contextually.

A PERCos SRO resolution may process takes a candidate operational specification and evaluates, aligns, resolves, and refines it to ascertain its validity. It may also check for the availability and/or accessibility of the identified resources, for example, it may check that a user is authorized to access the specified resources. If needed, the Resolution process also may interact with Coherence processes to validate CPEs.

The resolution process may also interact with users and/or Stakeholders for clarification and/or elaboration. For example, a user may not be authorized to access some Resource and it cannot find an alternative or substitute Resource. It may then request the user and/or Stakeholders for guidance in resolving the conflict. This may, in some cases, require modification and/or re-specification of the CPE itself.

An operational process may take a candidate operational specification that is deemed to have sufficient information to provision resources to fulfill a CPE and creates an operational session for the user. It negotiates provisioning and activating resources to form an operating agreement to fulfill the CPE. In some embodiments, operational specifications comprise Resource arrangements, such as Frameworks, Foundations, Resource arrangements and/or other aggregations of resources that have previously been created and utilized. In particular, such an operational specification may comprise one or more of the following:

- Frameworks, Foundations, Resource sets specifications, and associated specified levels of services for each Resource, where associated levels of service may specify a range of requirements, such as functionality, performance, quality of service, administration, security, privacy, reliability, and the like,
- Administrative, authorization &authentication, and appropriate control specifications and/or associated information sets, and
- Additional instructions, such actions that PERCos Resource Management Service may need in provisioning and activating specified resources, thereby enabling the transition from an operational session into an operating session.

In some embodiments, an SRO service may use PERCos Coherence processes to check sets of resources, including specifications, for problems and/or to "harmonize," "optimize," "friction reduce" and/or "integrate" one or more sets of such resources, leading to superior experiences/results that integrate the interests of all direct and indirect users/ Stakeholders in response to one or more specified and/or derived purposes. These Coherence processes may detect and/or attempt to rectify a wide range of limitations, imperfections, and/or exceptions, including, for example, inaccuracy, lack of clarity, incompleteness, inconsistency, inefficiency, suboptimal selections, and/or requests for unavailable resources.

A PERCos system may provide users with a wide range of ways to invoke a purpose operating session. One way to invoke an operating session is to use one or more PERCos tools, such as for example a PERCos specification editor which may provide the user with templates, patterns, specifications and/or applications that closely match their contextual purpose. Users may then make modifications, if needed, such as instantiating resources and then narrowing or widening their contextual focus. PERCos templates may enable users to specify new or modify existing CPEs, declared classes, Frameworks, purpose applications, and the like. Users may use a PERCos editor to write CPEs from scratch in a CPE language.

Whether a user writes CPEs from scratch, adapts/modifies existing CPEs, declared classes, Frameworks, or uses any other method, PERCos environments may assist users by checking for errors and inconsistencies, resolving conflicts cohering resources or the like. For example, PERCos system embodiment may help the user express the user's CPE and then try to match it with its purpose class repository to refine and/or complete Core Purpose into a CPE. Suppose a user is interested in travel planning. A PERCos system may interact with the user to request the destination location, dates of travel, weather information, lists of items to pack, suggested itineraries, or any other aspects of travel planning.

In some embodiments, Frameworks and/or other information sets may assist user refine his Contextual purpose expressions. Depending on the complexity of the user's purpose, this interaction may require several iterations (and/ or recursive operations). For example if there is a Framework that closely matches the user's Core Purpose, then PERCos environments may instantiate the Framework for the user's Foundation and use it to provide further assistance in refining the user's purpose expression.

A PERCos environment may provide users with a variety of ways to formulate their purpose expressions. Users may formulate their purpose expressions from scratch by specifying their Core Purpose comprising one or more verbs and one or more categories, and then refining it in an iterative manner. Users may modify or refine existing purpose expressions, thereby leveraging purpose expressions formulated by Domain experts as well as minimizing the amount of explicit instruction users need to provide. For example, consider a user who may be interested in exploring financial investment. Rather than expressing the purpose expression from scratch, the user could find a purpose expression that is closest to the user's intent, such as a purpose expression that explores different types of investments, ranging from fixed investment, a growth investment, and target-date retirement funds, and the like.

While there may be a variety of ways to formulate purpose expressions, for example one way may be to utilize PERCos Navigation Interface (PNI), which may provide users with graphical, easy-to-use interface to explore Dimensions, Facets, tokens, purpose classes, Constructs (e g., Frameworks, purpose class applications), templates, information sets, patterns, and the like, that closely approximate user's intent.

PNI may enable users to iteratively formulate their purpose expressions by adding, modifying, and/or otherwise manipulating results it provides to them. The PNI may suggest prescriptive CPEs that closely match the user's intent that they may be used without any modifications. In such a case, there may be one or more descriptive CPEs that closely match the identified prescriptive CPE. However, there may be cases where users are exploring Domains of which they may have insufficient knowledge to formulate their purpose expression. For example, suppose a user who knows very little about physics wish to learn more about "matter," but does not know the appropriate lexicon to formulate his/her purpose. In such a case, the user may invoke PNI to drill down to a particular field of physics, and then for each field, drill further down to sub-field, such as nuclear physics, quantum physics, string theory and the like.

A PERCos Navigation Interface may support users by allowing them to narrow and generalize their searches. For example, suppose a user finds a general topic, which is represented by a purpose class, P. A user may narrow the search by going down to P's subclasses. It may then choose one of the subclasses, S, and widen the search by going up to S's other super-classes, say Q.

Users may use PERCos Platform Navigation and Exploration Services (PNES) to navigate purpose Domains to formulate and/or refine their purpose expressions. PNES may provide users with a variety of options, such as using Facets, class relationship of purpose Domains, purpose class applications, PERCos metrics, Reputes, or other options. Users may specify which of their Participants they wish to participate in the purpose experience. In a PERCos environment, users may also specify other contexts, such as their experience levels, the desired levels of experience, and/or other preferences.

Users may formulate their purpose expressions from scratch, adapt/modify existing CPEs and/or declared classes, evolve Frameworks, or formulate purpose expressions in any other manner, the PERCos environment may perform services to assist users formulate their purpose expression that approximate their intent as closely as possible. PNI may interact with PERCos Platform Services, such as for example, Coherence Services, Information Management Systems, and the like to provide potentially relevant information, check for errors and inconsistencies, optimize resonance and reduce friction.

Once the users have formulated their purpose expressions, PERCos may evolve, resolve, cohere, and/or otherwise transform them in operational specifications. PERCos may then create an operating session and provision it with the optimal set of resources to provide the user with the experience that fulfills the user purpose expression.

If multiple users are to share a purpose expression session, then PERCos may create individual operation session for each user as well as create an operating session to manage the inter-user communication.

PERCos environments may set up an interactive purpose formulation session that is customized for the user, including for example, the user's contexts, which may in turn include applicable jargon for formulating purpose expressions. For example, suppose a user is interested in exploring financial investment and specifies his/her financial Participant. In such a case, the PERCos environment may provide the user with a financially-oriented jargon so that when the user expresses an interest in exploring dogs, the PERCos environment translates dogs to "dogs of the DOW" stocks (underperforming stocks of the Dow Jones Industrial Index) rather than animals.

In a PERCos environment, users may iteratively formulate purpose expressions. They may iteratively provide more information, such as specifying a preference for completeness of Result sets over the speed of the response time. They may also respond to possible errors, ambiguities, inconsistencies, or other problems reported by a PERCos purpose formulation session. For example, suppose a user specifies a purpose to learn about Java. The user's purpose formulation session may request for elaboration of the user's intent, such as Java as in a type of coffee, computer programming language, or an island.

A PERCos Construct Framework is a Framework for formulating purpose-related specifications, which may be embodied as Frameworks, Foundations, Resource Assemblies, and/or other purpose-related specifications sets. Users may invoke a Construct Framework to create, adapt and/or modify purpose-related specifications sets. A Framework is a complete or incomplete specification, representing one or more users' and/or value chain (Stakeholders) Participants' scaffolding for instantiating an experience and/or result set corresponding to one or more purpose specifications. A user may examine the CPEs associated with a Framework and adapt and/or modify the Framework to meet the user's own intent. For example, suppose a Framework is designed to enable users to learn all aspects of thin film solar industry, such as the thin film solar technology, manufacturing, marketing, or other aspect. A user interested in learning only about the manufacturing of the thin film solar technology may modify such Framework to narrow its focus.

Once the user adapts or modifies a Framework, PERCos environment processing may update Framework to create an operating session and provision it with an optimal set of resources to provide the user with the experience that fulfills the CPEs associated with the updated Framework.

In some embodiments, a purpose class application is a specification and/or operating Resource that, when installed on a user's Foundation resources, provides the user with purpose experiences and/or Result sets corresponding to one or more purpose expressions. Purpose class applications may support a wide range of users, from those who have precise knowledge to retrieve information, to those who don't know how to describe their purpose with sufficient precision for retrieval, to those users who may want to discover new, interesting, and/or useful experiences and/or resources in Domains that they don't fully understand.

Purpose class applications may range from highly general purpose applications that are designed to fulfill one or more purpose classes, to those that provide a fixed set of purpose experiences and/or result sets, such as for example, TurboTax, Word, and Excel. Highly general purpose class applications, in addition to supporting multiple purpose classes, may also enable users to navigate and explore purpose Domains to formulate and refine purpose expressions as well as provide the apparatus and methods to fulfill their formulated purpose expressions.

Some purpose class applications may enable users to navigate and explore their purpose Domains. They may use PERCos system's navigation and exploration elements, such as PERCos Facets, class relationship graphs, Reputes, metrics and the like to provide their services. For example, consider a purpose class application that enables users to learn French. The purpose class application may use Facets such as for example, grammar to organize French grammar into verbs, pronouns, nouns, adverbs, adjectives, negations, direct objects, propositions, and interjections. It may provide further organization by using a Facet, such as, tenses and moods, to further organize grammar.verbs into conjugations, tenses, moods, commands, participles, pronomials, and the like In this manner the purpose class application may enable users, such as a beginner, to navigate and explore French grammar to formulate their purpose expression, such as for example, "learn grammar.verbs.conditionals."

Purpose class applications are specifications of Resource arrangements. When installed/implemented on a user's Foundation resources, purpose class applications provide users with purpose experiences and/or Result sets corresponding to one or more purpose expressions.

Purpose class applications may be plugins that provide some PERCos capabilities or they may run on top of the host's operating system (i.e., threaded into the application). PERCos capabilities may be a plugin that may be incorporated into the application and/or host's operating system and/or accessing some cloud capabilities.

Purpose class applications may also integrate/incorporate plugins to further enrich user purpose experience. For example, a French purpose class application may have multiple plugins, one that enable users to learn about grammar, another that enable users to work on their pronunciation, yet a third that connects users to various podcasts, and other French purpose class applications.

Purpose class applications may support hierarchical plugin architecture. In particular, plug ins may also have plugins. Purpose applications may constrain and/or control plugin operations. For example, they may control access to underlying hardware platforms, control visual representation of results provided by plugins, ensure inter-functionality of plugins, such as ensuring their consistency and coherence. Purpose class applications may also address privacy issues, complexity, including the levels of plugin they may support. They may also limit the number of plugins they may support for the same or similar purpose expression.

In some embodiments, PERCos purpose applications may be invoked by non-PERCos applications. In such instances, PERCos may be operating locally and/or remotely. For example, a non-PERCos application may spawn a PERCos session or PERCos may be threaded into the services of the application's host operating system.

Users may operate a PERCos operating session either explicitly or implicitly. They may operate it explicitly if they either have a PERCos system running on their hardware Platform or access a PERCos system running virtually in "the cloud." For example, an organization may provide a web service that runs PERCos systems on the organizations computing environment. Users may access such services to create a PERCos operating session.

Users may implicitly operate a PERCos operating session by running, for example, a purpose class application, which may be installed either on their own hardware Platform or in the cloud. In such a case, the purpose class application may interact with a PERCos system to invoke a PERCos operating session. For example, suppose a user invokes travel planning software. The user may not know that the software is a purpose class application. The purpose class application, when invoked, interacts with a PERCos system to provide the user with the desired experience.

Most PERCos operating sessions, when activated/invoked, may provide users with an instance of a PERCos user interface. Such an interface may provide users with a variety of ways for fulfilling their respective CPEs. Depending on the operating session, the instantiated PERCos UI may enable users to access to other PERCos services, such as a PERCos Navigation Interface (PNI) to express their purpose expressions, invoke purpose class applications, manage their operation sessions, for example, pause, stop, resume, or other management functions.

Illustrative example of human computer interaction is shown in FIG. 144: An Example of Human-Computer Interaction.

A PERCos UI may also provide users with the ability to managing the user's session: play, pause, resume, replay, end, or any other management function known in the art. If a PERCos operating session involves multiple Participants, then the PERCos environment may establish the necessary communication connection for each Participant and cohere the set of purpose specifications associated with the Participants.

Some examples, without limitation, of types of PERCos operating sessions are as follows:

Private CPE session for a single Participant;

Shared CPE for multiple Participants;

Joining a CPE session in which users may join and leave at may.

Activating a suspended private user session

While there may be a variety of ways to invoke a PERCos operation session directly, the two most common ways are: i) formulating a PERCos purpose expression; and ii) utilizing Users may initiate/launch a PERCos operating session by using a Construct. A Construct provides users with the convenience of using an arrangement of resources known to fulfill specific purposes. While Constructs of any type may be specified in varying degree of completeness, some Constructs may be sufficiently complete so that when users bind them with their Foundation resources, they provide users with desired purpose experiences. For example, purpose class applications are, in general, sufficiently complete as well as cohered so that they may be bound to a user's Foundation resources without further processing. For example, consider a purpose class application associated with a purpose class, "learn Physics." It may be sufficiently complete and cohered so that users may install it on their Foundation resources to drill down to a particular field of Physics, and then for each field, drill further down to sub-field, such as nuclear physics, quantum physics, astrophysics, or any other field of physics.

However, there may be other Constructs that provide scaffolding only. For those Constructs, users may need to evolve and/or transform them into operating Constructs by providing additional information. For example, consider a Framework that is only partially specified to fulfill its associated purposes. Depending on the complexity of user purpose and the completeness of the Framework, users may need to provide information, such as their goal Dimensions, specify Resource characteristics, such as their Reputes, or other parameters.

Some purpose class applications may create new purpose classes to satisfy users' CPEs. For example, suppose there is a purpose class application that allows user to explore price points for the various types of solar cells. Further suppose a user is interested in reducing his/her monthly power bill by performing cost benefit analysis for various price points. If the purpose class application does not have subclasses that correspond to the price points specified by the user, then it may generate new purpose classes with the support of PERCos Platform Reasoning Services.

A single Participant session is a session that PERCos system provides to users who wish to pursue their purpose experiences without having to coordinate their purpose expressions. For example, a user may invoke a single Participant session to explore red wines. PERCos systems may create a single operating session and provision it with resources, such as resources that provide information about types of red wines, wineries that produce red wines, vendors who sell red wines, and the like.

Users may specify preferences, such as for example, Reputes, performance characteristics, security properties, cost or other preferences, for resources that PERCos may use to provision their sessions. For example, suppose a user wishes to keep his/her purpose experience private, such as the user does not want to disclose his/her potential interests in particular red wines. The user may specify preferences that filter resources to ensure the user's privacy. User may also specify Reputes, such as for example, the user is interested on red wines whose ratings by Wine Spectator is at least 80.

In some embodiments, PERCos systems may enable users to suspend their operating sessions and then resume them later by having the relevant states of their operating sessions persisted. At a later time, when the user requests to resume his/her operating session, PERCos system may restore the persisted states. However, the resumed operating session may need to re-provision its resources. For example, some resources that had been provisioned for the operating session prior to suspension may no longer be available. For example, suppose a user has a purpose to learn about investment strategies. Depending on the elapsed time between the suspending and resumption, some of the resources, such as the user's subscriptions to news services may have expired. In such a case, PERCos system may try to replace those resources with other resources that are as equivalent in functionality and performance as possible.

PERCos systems may enable users to save their purpose experience sessions and replay them at a later time. During the replay, users may extract relevant information and publish them either for their own use or to be shared with other users.

PERCos may enable multiple Participants who have the same purpose to share a purpose experience session, where each Participant obtains the Participant-specific purpose experience. For example, suppose two users have the same purpose to learn about investment strategies. Even though both are sharing a purpose experience, users may have access to differing resources. For example, one user (user 1) may have subscriptions financial magazines and newspapers, such as Barron's, Investor's Business Daily, whereas the other user (user 2) has access to paid financial research reports generated by research firms, such as Plunkett Research Ltd., or Thomson Reuters Stock Reports. While a PERCos system may provide each user/Participant with resources that the user is authorized to access, the two users obtain a richer experience by pooling their gained knowledge, such as user 1 communicating information he/she gained from Barron's to user 2 and user 2 communicating information he/she gained from Thomson Reuters Stock Reports to user 1.

In some embodiments, PERCos systems may create individual operating session for each Participant in order to protect the privacy of each Participant. PERCos systems may also create an operation session to facilitate the common experience. For example two users and an agent are sharing a purpose experience. For this example, a PERCos system created four operating sessions, one for each Participant, and another one to facilitate the sharing of the experience.

PERCos systems may enable users to join an on-going multiple-Participant purpose experience. When a user requests to join such a purpose experience, PERCos systems may create a Participant-specific operating session (O1) and connect it to the operating session that is responsible for managing the multiple-Participant purpose experience.

Some sessions may record the unfolding of the purpose experience, thereby enabling users to replay the part of the purpose experience they missed by joining late. For example, suppose a user wishes to attend a live event, such as, for example, a concert or sport game, after the event has started. The organizers/Stakeholders of the event (e.g., sponsor) may specify the purpose experience to be recorded and made available to users to catch up with the part they missed.

A PERCos environment provides users with the ability to specify backup or alternate resources to obtain continuous contextual purpose experience even in the face of Resource variations including for example failures. For example, the user may specify his desktop and laptop as alternative resources. In such a case, the user may specify the preference order, such as specifying the desktop as primary and laptop as a backup. If for whatever reason the desktop becomes unavailable, PERCos may seamlessly redirect all subsequent communication to the laptop.

An example of this feature is when a mobile device is made available as part of a nodal arrangement, but operates disconnected from communication with other devices for periods of time. The ability to access, store, forward, or augment features of this mobile device, such as resource scheduling, while it is disconnected provides significant functionality to the PERCos environment operating System. In other words, if a user "registers" some Resource as part of the user's nodal arrangement, PERCos Resource Management (for example PRMS) may then create an appropriate Resource Interface as a representation of this Resource and maintain its state. So that when the Resource is available, PRMS may push through its state via its Resource interface. Other examples include on-demand resources that are made available "just-in-time," failover resources that operate in "cold spare" mode, where the Resource is provisioned but not started until needed.

PERCos environments may provide users with the ability to reconfigure their Foundation resources. For example, PERCos may support mobile computing by enabling users who anticipate moving from one location to another, such as from their office to their car, to seamlessly continue their operating session by enabling them to request dynamic rearrangement of their Foundation resources. In a further example, suppose a user had been using a laptop to interact with PERCos operating session. The user may request transfer the interaction point to the user's mobile device or tablet computer.

A PERCos environment embodiment may provide users with the ability to reconfigure their Foundations. A user may want to reconfigure their Foundations so as to specify sets of resources that are available at differing, times, locations and/or in differing contexts. For example users may wish to have differing Foundations available at work, home and when travelling. A PERCos environment embodiment may then provide one or more intelligent tools to support automatically switching user's foundation and/or their current resources.

PERCos environments provide PERCos Platform Publication Services (PPS) that enable users to share their resources with a wide-variety of groups, from small groups comprising close friends and family members, to members of special interests, to members of organizations, to the general public, or other groups. PPS enables users to prepare their resources for publication by specifying the context of their usage. If a Resource is to be shared among a group of users who share the user's contextual information, then the preparation may be minimal. Such a user group may share a common vocabulary whose semantics are well understood. For example, suppose a user creates a Framework for car maintenance. If the user wishes to share it with the user's local friends who have the same model, then the user may not have to generalize the context. Instead, the user may specify a context that is very similar to the user's own context, such as, the types of spare parts, frequency of repairs, repair shops, and the like. However, if the user is interested in sharing the Framework with a wider audience, who have different models and/or different locations, then the user may need to specify a more general context. For example, instead of specifying a local repair shop near to the user, the Framework may specify the type of repair shop, such as tire shop, local garage, local authorized dealer, or other repair shop.

PERCos embodiments Publishing Services enables users/Stakeholders to make resources available to themselves and/or others using standardized information organizations that support purpose operations, such as for example descriptive CPEs, Dimensions, metadata, Resource characteristics and the like. Such publishing may enable publication of one or more resources (including arrangements thereof) for use in variable and/or unknown usage contexts.

Many publishers may have insufficient information to anticipate all the circumstances that their publications (that is the resources they have published) may confront in a one to boundless world. In many circumstances published resources may be used in manners not considered by publisher.

In some embodiments, PERCos embodiments may include one or more PERCos embodiments Platform Publishing Services, which in common with other PERCos embodiments resources may receive an appropriate control specification that determines the operations of a publishing service instance.

PERCos embodiments publishing services may be instantiated by any user/Stakeholder who is able and entitled to do so, for example by using their control specifications, they may configure PERCos publishing services so as to publish their selected resources. PERCos embodiments published resources may have further specifications associated with published resources that, for example, determine the use, distribution, associations, relationships and/or any other information.

Users may publish for any audience, including themselves. This may include adding elements to Resource characteristics specifications that determine the degree of distribution, use and/or other access to the published Resource. The degree of specifications associated with published resources may be unlimited, however there may be sufficient for purpose interoperability as a PERCos Resource.

PERCos embodiments leverage the use of standardized expressions to address Big Resource. This involves the publisher and potential user of resources to use this scaffolding to reach a common purpose for the resources involved. Achieving this requires the adoption of conventions for the publication of resources, such that users may benefit from the resources.

In some embodiments, there may be PERCos templates to assist one or more users/Stakeholders in the association of the appropriate information sets with the resources to be published. This may include for example templates for specific purpose operations that have been created by experts and/or templates that conform to one or more standardization formats and/or information schema's that may be used by groups of users (for example an affinity group) to ensure interoperability within the group.

Templates may include specifications that vary the Resource set comprising a published Resource according to the context of use. For example a published Resource may have differing specifications determining the arrangement and use of the resources comprising the published Resource depending on whether the context is, for example, learn, teach, explore and the like. In this example 80% of the resources comprising the published Resource may be common to all the contexts, whereas the further 20% may be unique to each of the specific contexts. The specifications may also differ in how the resources are used in context.

Publishers may publish PERCos embodiments Constructs (including for example purpose class applications) as resources, which may for example include specifications (and potentially publication and/or distribution) of Foundations specified for Constructs as well as the Constructs themselves. This may include any combination of specifications and operating resources in any arrangement.

Published resources may have one or more sets of specifications that identify which other resources are specified for effective operations with Resource for one or more purposes. These may conform to PERCos Resource relationship specifications enabling one or more PERCos processes to evaluate, optimize and manipulate such specifications to optimize purpose outcomes.

In some embodiments, one or more users/Stakeholders (including Roles), may invoke and/or use PERCos embodiments publishing services. These may for example, include: In some embodiments, PERCos users may invoke PERCos Publishing Services to publish materials (including resources) for their purposes. This may include for example, publication for their own use, the use of specified other users/Stakeholders and/or use by any users/Stakeholders. For example, users may create and/or use control specifications for publishing services which determines the identity, description and/or characteristics of the published resources.

Stakeholders may also publish resources and/or may be associated with users and/or those operating publishing services to serve one or more constituency. For example this may include:

- Corporations—who publish on behalf of their users (employees, customers, suppliers and the like)
- Situational Affinity—Those Stakeholders who have an interest in or control (in whole or in part) of the publication of resources.
- And the like Experts who publish resources may include one or more standardization schemas and resources. Experts may, in common with other PERCos embodiments users publish for themselves and/or other users (including other experts)

In some embodiments, experts (or groups thereof) may determine the appropriate lexicon, information organizations and/or preferred resources for one or more purpose. Such experts may then create appropriate purpose organizations, for example class systems, which may comprise resources as members. They may also associate one or more methods with such organizations, such that relationships between resources may be presented so as to optimize the purpose outcomes.

For example experts may determine that in a specific context (for example with CPE (Learn White Wine) that, for example Resource 1 (Jancis Robinson), and Resource 2 (Andrew Jefford) are equivalent as they both write for the same journal (Financial Times) and as such they may be substituted as resources for this purpose.

Some experts may use the efforts of other experts, for example in the form of class applications that combine the organizations, methods and lexicon provided by a first expert to create, for example purpose applications that build upon those first expert provided resources, to for example satisfy another or more specific purpose.

Curators are those users/Stakeholders, who although not fully perceived and/or recognized as experts, though skilled in the purpose Domain that are able to aggregate a set of resources in such a manner that the combined resources provide an efficient and effective purpose experience.

In some PERCos embodiments, there may a number of publisher Types, some examples of which are outlined below.

Specialists—who publish a specific purpose specialty, for example Educational resources, Technical resources and the like.

Generalists—who publish for any purpose

Users—who may Publish for themselves and/or other users

Stakeholders—who may Publish for their constituents

Experts—who publish in their Domains of expertise as recognized in those Domains Curators—who arrange resources to provide purpose experiences Groups—who publish for their constituent members Each of these types of publisher may also provide distribution capabilities for the resources published and/or provide one or more repositories of such published resources for one or more purpose operations.

7. Example of a PERCos Run-Time Architecture

PERCos is an operating environment for "purposeful computing," extending traditional operating system capabilities by enabling formulation of purpose expressions and employing apparatus and methods of matching a Participant's purpose expressions to other Participants' and/or purpose descriptions of resources available locally and/or on one or more networks. In part, some PERCos embodiments provide a networked management platform to enable Participants to benefit from resources located anywhere, made available by anyone. For example, published materials and/or provider services, such as expert frameworks or any other enabling resource, might be used by anyone, anywhere, in user-directed combinations.

Anything contributing to a PERCos process is a Resource. There are two major bodies of resources: those inherent in Foundations and those that may be acquired in order to create an operating arrangement of resources. Foundation resources are comprised of resources that are assumed to be conditionally available and are normally associated with Participants and/or PERCos sessions and/or purpose expressions, for example, purpose statements and/or purpose classes. In order to create an operating Resource arrangement, PERCos may additionally acquire those resources that are needed to provision the operating resources arrangement but are not found in the Foundation. PERCos environments seamlessly integrate these two types of resources.

FIG. 122 shows a version of a global PERCos "purposeful network" in which users at nodal arrangements employ distributed PERCos network resources. It illustrates users using differing PERCos arrangements to obtain their respective contextual purpose experiences. For example, some users may obtain their experiences transparently (e.g., user 1 and user 3) by using their respective web browsers as portals to PERCos aware services. In such instances, a PERCos environment is created by the availability and use of distributed PERCos enabled services. A simple form of PERCos environment is a cloud based layer of PERCos aware resources operating as remotely usable services, wherein PERCos functionality may be in part or wholly not apparent to users.

Users may choose from a very wide range of PERCos capabilities in differing installation strategies, from applications and/or services to full operating systems and/or network operating Systems/and/or cloud operating system configurations. For example, there are users (e.g., user 2) who may choose to store some PERCos empowered and/or general purpose applications on their nodal arrangement resources and others (e.g., Company 1) who may choose to install a set of PERCos services on their nodal arrangement resources and/or have mixed installations. Finally, there may be users who wish to install a version of PERCos operating system on the computers and run PERCos and/or PERCos aware applications, as well as running applications normally supported by traditional operating systems. The installation may be either directly on the computer hardware platform (Company 2), or on top of the computer's resident operating system (user 4), or in some manner running in a virtual machine environment.

Multiple groups of users may also participate in common purpose computing sessions. For example, in FIG. 142 user 1, user 2, and Company 1 (represented by three Participants) may be having a separate common contextual purpose experience session; user 3 and user 4 may be participating in a common contextual purpose experience session (represented by two Participants); and Company 2, that is connected to distributed PERCos Network 1, is having a third common contextual purpose experience session with users and companies in the distributed PERCos Network 2 (represented by an unspecified number of Participants).

PERCos environments support deploying resources in accordance with Contextual Purpose Expressions, any other relevant metadata, any relevant and applied profile information and/or derivatives thereof, such that users may express, experience, retain, publish, deploy, identify, and otherwise work with and exploit (e.g., edit, analyze, replay, extract) PERCos sessions and session elements so as to provide the best fit to the user(s)'s CPEs, so as to optimally satisfy user session related purposes. PERCos embodiments enable computers to intelligently evaluate, organize, manage, interpret, and present available resources so as to optimally satisfy human purposes.

PERCos embodiments provide Participants with the ability to contribute towards common purpose experience and/or to share their own nodal arrangement resources with other Participants in accordance with the controlling specifications. For example, we provide an illustration of a common contextual purpose session in which a Participant chooses to grant another Participant progressively more access to, and/or control of, some of the Participant's nodal arrangement resources during a common contextual purpose session.

Embodiments of a PERCos system may operate with a different layering of services, with a completely different set of services, or without using any layering at all.

For illustrative purposes only, the disclosure presents some core services of this example PERCos architecture as structured in four layers: resources, Resource management, session management, and Participant(s) session context. In addition, Knowledge Management and Support Services are used by some core PERCos services to provide their own services.

Illustrative example of a single user session in a PERCos embodiment is shown in FIG. 145: An Example of a Single User Session PERCos Architecture.

As shown in FIG. 145, PERCos Core Services may be layered. The highest layer services comprise of those services that establish and manage the users/Stakeholders session context. These services identify and authenticate users/Stakeholders. They also allow users/Stakeholders to specify which of their credentials they wish to use for their contextual purpose session. Once they validate the specified credentials, they associate appropriate "capability" to all the services that operate on behalf of the user/Stakeholder.

In addition to these core services, there are two groups of services that may span all layers of a run-time suite of PERCos core services:

Monitoring and Exception Services;
Coherence/Governance Services;
Operating session Context Services;
Resource Management Service;
Repute Service;
Persistence Service; and
Reservation Service.

Illustrative example of shared experience session in an example PERCos embodiment is shown in FIG. 146: An Example of shared Experience Session PERCos Architecture.

In some embodiments, Matching and Similarity Services may perform contextual matching and similarity analysis on resources, and/or Resource elements, including specifications (and portions thereof). Matching and Similarity Services may provide methods, such as matching, filtering, rating, analyzing for similarity, and the like. In some PERCos system embodiments, resources, including specifications and/or portions thereof may be described using standardized specifications. Matching and Similarity Services may perform their services by utilizing this standardization to compare two resources to determine their degree of matching or similarity.

In some embodiments, Matching and Similarity Services may provide one or more "lenses" that invokers may use to narrow and widen their focus as well as zoom in and out on "best" resources and/or Resource components. They may enable invokers to specify context for the matching and similarity analysis. For example, how well two resources match with each other may depend on the context. Consider for example, two chocolate bars, one made by Valrhona and another made by Scharffen Berger. For some users who are not particular about their chocolates, they may interchangeably satisfy the same purpose, but to a professional pastry chef, there may be some purposes for which they cannot be used interchangeably. For another example, for a beginning user a purpose expression such as [learn: physical cosmology] is almost the same as a purpose expression, [learn: astrophysics], whereas for a researcher who is interested in a specialized aspect of astrophysics, two purpose expressions are quite different.

In some embodiments, Matching and Similarity Services may provide the following methods:

Matching
Filtering
Rating
Similarity

In some embodiments, Matching and Similarity Service may iteratively invoke the above methods in any combination thereof while varying their contextual specifications as appropriate. For example, Matching and Similarity Services may iteratively invoke one or more filtering methods to reduce the number of resources and then one or more rating method to rate the filtered set of resources. They may then invoke matching methods to find the "best" available set of resources, including specifications.

In some embodiments, PERCos methods, include matching methods instances which may be provided with control, organizational, and interface specifications that specify their operations. Their control specifications may specify a variety of contextual matching criteria. For example, some criteria may specify that for a given context, two specifications may have the same Core Purpose to match, whereas other criteria may specify weights to be used to determine the degree of matching, such as for example, weighing some Master Dimension Facets over others. Control specifications may also specify the type of matching algorithms, such as for example, without limitation, the following:

rule-based
Vector-based
Graph-based
Lexical-string-based
Pattern-based
Prototype-based
and the like In rule-based matching, matching methods may be provided with a set of contextual rules to use to perform matching. In some embodiments, such rules may have preconditions that express context. Matching methods evaluate the context of the matching against the rule context to apply the rule that is most applicable. A rule may have precondition that specifies some context, such as some Master Dimension Facets values, including the users' sophistication level or budget, Reputes, and the like. For example, a rule may specify that for beginning users, matching methods should use metrics, such as quality to purpose metrics value for a given purpose to perform the matching.

In some cases, the contextual rules may also specify the operator, such as "equal or greater," "membership," "approximate," "related," and the like to be used for matching. For example, two resources, $R_1$ and $R_2$ may have the same characteristics, except for their Reputes. If the operator specified is "equal or greater" for Repute characteristics, then the degree of matching depends on their respective Repute values. If $R_1$'s Repute value is "equal or greater" than $R_2$'s then, they are said to match exactly, whereas if $R_1$'s Repute value is "less" than $R_2$'s, then the degree of matching/similarity is less.

Matching methods may perform vector-based matching by representing resources as vectors of a vector space comprising Core Purpose, Master Dimension Facets, and auxiliary Dimensions. They then may use a vector space contextual distance function to determine the degree of contextual matching, such as weighing some Dimensions more than other Dimensions. For example, the verb Dimension may be weighed the most, then the category Dimension, etc.

In graph-based matching, matching methods may map resources to their associated classes and use a class relationship graph to determine the degree of separation between them. For example, suppose resources $R_1$ and $R_2$ are associated with classes $C_1$ and $C_2$, respectively. Matching methods may use the graph distance between $C_1$ and $C_2$ to determine the degree of matching, where graph distance is the smallest number of nodes between $C_1$ and $C_2$. If $C_1$ and $C_2$ are the same and their respective attribute values are the same, then $R_1$ and $R_2$ is said to match identically, whereas, if the smallest number of nodes between $C_1$ and $C_2$ is large, then the degree of matching is small.

Matching methods may perform lexical/string matching in some cases. For example, matching methods may use lexical/string matching to compare two purpose expressions, such as for example, "want to learn to cook," and "want to learn to bake." For another example, some resources may have metadata that provides additional descriptions. Such metadata may be described using non-standardized terms. In some cases, matching methods may perform lexical/string matching to determine the degree of matching.

Matching methods may perform pattern matching to check a sequence of tokens for patterns. For example, consider a purpose expression, “want to learn.” In this example, tokens, “want” and “to learn” form a pattern. Users who are interested in wanting to learn may care more about learning aspect more than the subject matter. For example, “want to learn to bake” and “want to learn to cook,” may be a close match for some users, whereas for others, baking and cooking are not the same.

Matching methods may perform prototype-based matching in some cases. Matching methods may use prototype value asserted by Reputes associated with the Resource to determine the degree of matching. For example, consider a beginning user who is interested in learning physical cosmology. Further suppose that a purpose statement, purposeStmt-ID1, has a prototype value, 80/100, asserted by its associated Repute. The degree of matching, in this example, is 80/100.

```
[purpose statement
  [Identity: purposeStmt-ID1]
  [purpose: [learn: astrophysics]]
  [Attributes:
    [Sophistication: beginner]
    [Repute: 70]
    [Foundation: Javascript-enabled browser]
    [Topics: {Big Bang Theory, Solar System,
    Black Holes, Stellar
    Evolution, Super
          Nova, General Relativity}]]
          [Repute: ReputeID100]]
[Repute expression:
  [Identity: ReputeID200]
  [Assertion: [Prototype:
      <specification: purposeStmtID1>
        <purpose class: learn-astrophysics>
      <[Degree: 80/100] ]
  [purpose: [learn: astrophysics]]
  [subject: <specification: purposeStmtID1>]
  [creator: <organization: Yale University>]]
```

In one-to-boundless computing, some PERCos embodiments may need to in some instances match a specification against potentially vast number of resources to determine “best” available resources. Like all other PERCos methods, filtering method instances may be provided with control, organizational, and interface specifications that specify their operations. In some embodiments, filtering methods may filter/prune a set of resources based on specified contextual specification, where specification may specify the type of filtering to be performed, such as for example, without limitation:

- class-based
- expression-based, such as for example, Core Purpose-based
- metrics-based
- attribute-based
- and the like Filtering methods may filter resources and Resource components, including specifications and specification components, based on specified contextual class expression, where a contextual expression may specify class-subclass relationships, class memberships, related-class relationships, and/or combination thereof. For example, a contextual expression may specify filtering of resources based on their membership to both class $C_1$ and class $C_2$. For another example, contextual expression may specify a Core Purpose class and filter resources based of their membership to the specified Core Purpose class.

Filtering methods may perform expression-based filtering, such as, for example, Repute expressions. For example, consider a set of resources, such as for example, on-line courses Filtering methods may filter these resources based on specified Repute expressions, such as Repute expressions that assert opinions about sponsoring organizations. In this example, filtering methods may filter on-line courses to those that are associated with specified Repute expressions.

Filtering methods may perform metrics-based filtering, such as for example, Quality to Purpose metrics. For example, some contextual filtering specification may specify that resources be pruned based on the metrics value, such as for example, prune those resources whose Quality to Purpose metrics is below some level, such as 70/100.

Filtering methods may filter resources attribute-based filtering by evaluating attributes of resources. For example, some contextual matching specification may specify to filter car models based on their engine size.

In some embodiments, ranking methods may rank a group of resources based on specified contextual specifications, where such specifications may specify a prescriptive specification as well as the type of ranking to be performed, such as for example, without limitation:

- Matching-degree-based
- Metrics-based
- Prototype-based
- Vector-distance-based
- and the like Ranking methods may rank a group of resources based on the degree of matching to the specified prescriptive specification. For each Resource, they may invoke matching methods to obtain its matching degree. Ranking methods then rank the resources based on the obtained matching degree.

PERCos resources, in some embodiments may have one or more metrics associated with them, such as for example, Quality to Purpose metrics. Ranking methods may rank a group of resources based on the metrics specified by the contextual specifications, such as for example, Quality to Purpose metrics.

PERCos resources, in some embodiments, may have prototype values asserted by their associate Reputes. For example, consider a set of purpose statements. These purpose statements may have prototype value to a purpose expression, [learn: astrophysics]. Prototype-value-based ranking methods evaluate the prototype value of each purpose statements to return an ordered list.

Vector-distance-based ranking methods may represent resources as vectors in a vector space consisting of Core Purpose, Master Dimension Facets, and auxiliary Dimensions. For each Resource, they calculate the contextual distance between the Resource and the prescriptive specification and distance function specified by the contextual specification. Vector-distance-based ranking methods may then return a list of resources based on the contextual distance value. For example, consider a user whose purpose is to find an auto repair shop for the user’s Mercedes E350. Vector-distance-based ranking methods may represent user purpose as a vector. They may also represent repair shops also as vectors. Vector-distance-based ranking methods may then calculate the weighted distance, based on the contextual specification, such as for example, weights for Dimensions, such as the cost, the proximity of the repair shop to the user’s home, etc.

Since a human’s view of the world is rarely precise, users generally do not express their purpose intent precisely, especially for purposes for which they do not have sufficient expertise. Some PERCos embodiments may use techniques such as, for example, approximate Bayesian computation to interpret user's intent into one or more Edge classes. The interpretation is "best" approximation, but, in general, cannot exactly match user's intent.

Moreover, even if all subsequent PERCos operations, such as, for example, cohering, resolving, provisioning, matching, filtering, and rating, and the like are performed precisely, the resulting outcome may only be "sufficiently close" approximations to the optimal results. Given this forced imprecision, there may be situations where PERCos embodiments may introduce further approximations to improve computational efficiency without significantly reducing the quality of the generated resources. For example, there are situations where PERCos embodiments may have to detect an overabundance or scarcity of suitable resources. In such situations, similarity analysis methods may adjust the number of suitable resources by applying appropriate techniques, such as truncating the search, applying sampling techniques, relaxing the searching criteria, and the like.

Similarity Analysis methods may perform the following types of approximation based on specified contextual specification:

Approximate Bayesian computation
Narrowing approximation
Widening approximation
Nearness approximation
and the like Approximate Bayesian computation is a feedback estimator in the presence of "noise." It uses a probability distribution, such as, for example, Gaussian distribution, to provide an "estimate" to compensate for the noise. It then uses actual observation to improve the estimation by comparing the actual result against the estimated result and adjusting the "estimate" as needed. For example, some users may use "java," to mean "coffee." Approximate Bayesian computation may first estimate Java computer language, but then improve the approximation by subsequent purpose Satisfaction metrics to improve the interpretation.

Similarity analysis methods may use approximate Bayesian computation in other situations where it may need to compensate for "noise," such as for example, when it cannot accurately the state of resources, such as communication network that may be impaired.

For cases where there are a vast number of potentially suitable resources, Similarity Analysis methods may approximate by narrowing the selection criteria. Similarity analysis methods may approximate the selection criteria as a class expression, thereby performing similarity analysis on class characteristics, rather than individual resources. Based on the analysis, similarity analysis methods may traverse to subclasses of candidate classes to reduce the number of candidate resources.

Similarity analysis methods may also use sampling techniques to reduce the size of potentially suitable resources. For example, it may stratify resources based on their characteristics. For each stratum, it may sample resources for their suitability to eliminate those strata that are least suitable.

For cases where there is a scarcity of potentially suitable resources, Similarity analysis methods may approximate by relaxing the selection criteria. Similarity analysis methods may approximate the selection criteria as a class expression to identify one or more suitable classes, and then examine their respective superclasses, if needed. For example, suppose a user is interested in learning about "single cell solar panel manufacturing in Alabama." In such a case, Similarity analysis method may examine a purpose class, [learn: "manufacture solar panels"] for potential resources to fulfill the user purpose.

Similarity analysis methods may also analyze related classes. For example, for a user interested in learning about learning about "blue music," Similarity analysis methods may also examine purpose classes, such as for example, [learn: jazz].

Monitoring Services provide for 1. the observation (monitoring) of resources,
2. evaluation of those operations with control specifications comprising contracted operating parameters, and,
3. subsequent generation of messages where such evaluation determines how the incoming monitoring information (input specifications) may have varied from the parameters as defined by those parameters.

Exception Services provide for 4. receipt of incoming messages from Monitoring Services, and,
5. arbitration of the outcomes specified from these messages based on control specifications provided by and/or derived from Resource Contracts and/or other PERCos processes, such as Coherence.

Monitoring and Exception Services may interact with other PERCos services such as Coherence and History.

In some embodiments, PERCos Coherence Services may operate ubiquitously throughout PERCos operations and may be part of PERCos Kernel Services. Instantiations of Coherence Services, in some embodiments, may comprise of two operating Resource arrangements:

1. The Coherence Management System, which may operate as part of PERCos Kernel Services
2. The arrangement comprising the remaining Coherence elements that operates as part of core services.

The motivation for such decomposition is to off load heavier, higher power Coherence components to other computing platforms, if needed, and make the arrangement comprising Coherence manager system that monitors and takes corrective actions as needed as light weight as possible.

Whenever an instance of Coherence Service is invoked, the instance is provided with control, organizational, and interface specifications. The control specifications in some embodiments may specify creation of Coherence Dynamic Fabrics (CDFs) comprising one or more Coherence manager instances and
one or more Coherence operating Resource assemblies comprising those Coherence elements specified by the Coherence operations to be performed.

Coherence Services may perform a wide range of operations, such as helping users deal with the conundrums, expertise challenges and organizational difficulties related to purpose expressions. This includes meaningfully and relevantly organizing the presentation of results. users may have difficulty understanding and expressing purpose variables, due to lack of tools for, and the user understanding of, purpose related tools, functions, and issues. The Coherence Dynamic Fabric helps remedy this difficulty.

Coherence Services may assist users' successive formulation and refinement of purpose expressions. They may provide users with ref-senses that approximate user intent. They may also provide candidate sets of declared classes that users may use in formulation of expressed purpose(s). Moreover, at any point of such formulation, a Coherence Service may evaluate iterated purpose expression for possible conflicts and gaps. A Coherence Service may then cohere, correct, complete and/or resolve any identified errors, conflicts and/or incompleteness with, if needed, help from users and/or other processes.

Coherence Services, in some PERCos embodiments, may interact with specifications, resources and processes that resolve conflicts, ambiguities, constraints, combinations, prioritizations and/or incompleteness within specifications, resource allocations and/or provisioning, as applicable during PERCos operations. Coherence Services may provide alternatives, constraints, extensions, operational variations and/or substitutions for operational efficiencies, expansions, contractions, interpretations, optimizations, simulations, facilitations and/or other operational process enhancements.

Within the PERCos environment, Coherence Services may integrate and interoperate to reduce, at least in part, friction within specifications and to optimize set of resources and processes that may fulfill users purpose expressions.

In some embodiments, PERCos operating sessions may include one or more managers, for example instances of PRMS that are responsible for establishing and managing the operating session. In some embodiments, when an operating session is launched, the operating session manager is responsible for integrating all relevant resources, specifications and/or processes for that sessions operations in response to the initiating specifications (for example PERCos operating specifications).

For example, suppose a user may be an employee of an organization that has company proprietary resources. When the user initiates an operating session, operating session managers may evaluate the company's governance rules and regulations in establishing such a session.

Operating session managers may also monitor operating sessions to adjust their operating contexts as appropriate. For example, a user might have started an operating session with a purpose of "learn astrophysics" and may have specified his sophistication Master Dimension as expert. Upon finding that this assessment of his capabilities led PERCos to assume that he understood the intricacies of the quantum field theory of neutron stars, he revised his self-assessment to have a sophistication Master Dimension of moderate. In some embodiments, the operating session managers may then 1. adjust the operating session specifications to indicate a sophistication of moderate, and,
2. invoke Coherence processing to determine which operating resources in the operating session are still appropriate with the new Dimension value and to initiate reconfiguration and/or replacement of those operating resources that are no longer appropriate.

PERCos Resource Management Services provide and manage arrangements of Resource sets in accordance with control specifications which are generated, at least in part, from one or more purpose expressions and/or user/Stakeholder interactions and associated resources and/or processes. For example in some embodiments, this may include CPE and other PERCos information arrangements such that users may experience, store, and/or publish computer sessions and session elements that provide the best fit to the their purpose statements.

In some embodiments, PRMS receives an operational specification from an operating session management instance. In such an example embodiment, an operational specification may request a set of resources as well as associated levels of services and operations for each Resource. PRMS may interact with one or more PERCos Platform Services, such as Coherence Services, Governance Services, Tests and Results Services, and the like to assess its ability to satisfy the incoming specifications. Based on the assessment, PRMS may negotiate operating agreements that define the levels of services and operations that PRMS is capable in these circumstances of providing. The negotiated levels of service and operations may have been explicitly specified by one or more sets of operational specification and/or implicitly derived from one or more purpose statements. Moreover, they may specify performance and functional requirements as well as Quality of Service (QoS), reliability, redundancy, confidentiality, integrity, and the like.

PRMS manages and monitors the performance of resources to ensure their compliance with their respective negotiated operating agreements. In the event a Resource fails to perform, PRMS may take appropriate course of actions, ranging from executing corrective measures to notifying appropriate processes specified by the operating agreement.

PERCos Repute Services enable users of diverse locations and background to ascertain reputation/credibility of an element, where elements include Participants representing users/Stakeholders, resources, processes, and/or other PERCos and non-PERCos objects. Repute Services enables evaluation of the reputation of elements and associated resources for a user's purpose. It provides services to standardize Reputes to facilitate their interoperability.

Repute Services provide metrics for evaluating the quality of Reputes. It provides the capability for creating, discovering, modifying, capturing, evaluating and/or other operations for manipulating Reputes including theories and algorithms for inferring Reputes.

Persistence Services enable an invoker on behalf of a party, such as for example, one or more users/Stakeholders, operating sessions, processes, resources, and the like, to persist the states of a Resource in a manner so that one or more parties may use them at a later date. For example, a user/Stakeholder may persist an operating session before suspending it. Such user/Stakeholder may then resume such operating session using the persisted states of the operating session. Persistence of a Resource differs from Publishing in that the persisted contents may not be sufficient for use by other Parties and/or may comprise additional information not relevant to the use of the Resource by other Party.

PERCos systems may use Persistence Service to provide robustness. The control specification of each instance of PERCos service may specify that the service instance persist its states on a regular basis. If the service instance fails for whatever reason, PERCos systems may recover the service using its latest persisted states.

A Reservation Service enables PERCos processes to request reservation of resources regardless of their availability at the time of the request. Many PERCos resources utilize aspects that are persistent, in that one or more features or functional ability of the PERCos resource need remain persistently available even if the resource itself is not immediately available. An example of this feature is when a mobile device is made available as part of a Foundation, but operates disconnected from communications for periods of time. The ability to access, store, forward and otherwise access features of this mobile device, such as resource scheduling, while it is disconnected provides functionality to PERCos. Other examples include on-demand resources that are made available "just-in-time", and failover resources that operate in "cold spare" mode, where the resource is provisioned but not started until needed.

In some embodiments, PERCos Knowledge Management Services may be responsible for acquisition, adaptation, organization, management, sharing and transformation of information resources. PERCos knowledge Management Services enable the use and/or reuse of aggregated, organized, curated, standardized, collected and/or optimized knowledge. Such knowledge may be provided by one or more experts in particular subject matter or for example, from data mining the history of previous user sessions (i.e., past experience).

resources throughout a PERCos environment may be associated with metadata, which may describe such things as tests that may be performed to check the integrity of the Resource. It is understood by those familiar with the art that a PERCos Knowledge Management Services may include one or more of the following:

- Publication Services,
- Template Services,
- History Services
- Information Systems Services, and/or
- Faceting Services.

A PERCos publication service may be invoked to publish resources. In some PERCos embodiments, publishers are anticipated to have undertaken processes of sufficient rigor to ensure the sufficiency of the material for the use for which it is intended. For example, consider publication of Constructs, such as for example Frameworks, Foundations, purpose class applications, or resonance specifications. A user, who publishes, for example a Framework, may publish it for use by other users who may not have complete knowledge of its use and/or requirements of resources. publication Services may use PERCos Platform Services to perform tests, validations, Reputes, utility registration and/or other methods of ascertaining the Foundation requirements to successfully operate the published objects. Publication may provision the relevant specification information in the specification for publishing.

Publishing differs from persistence of a Resource. Persistence of a Resource by one Party (where a Party may be Participant, process, and the like) involves storing the relevant contents of the Resource in such a manner that it may be used by the same Party. Stored contents may not be sufficient for use by other Parties and/or may comprise additional information not relevant to the use of the Resource by other Party.

In some embodiments, PERCos includes specification templates which may provide standardized and interoperable method arrangements by which, for example, Constructs and/or other Resource arrangements may be dynamically arranged. For example, through the use of specification templates, a Construct may develop from a possibly incomplete set of specifications to an operating Resource. PERCos environments may provide a wide variety of templates that users may use to minimize the effort specified to perform their activities, such as for example, registering users and resources, to creating Constructs, expressing Resource characteristics, user profiles, and the like.

In some embodiments, specification templates may comprise specifications of one or more Resource sets that, for example, may be combined and/or used dynamically in an arrangement to satisfy one or more prescriptive specifications. In some embodiments, these specification templates may be used, for example, to decompose a prescriptive specification into one or more finer grained prescriptive specifications. In such an example, PERCos processes, such as for example, Coherence may find resources that satisfy these finer grained prescriptive specifications. A specification template may then assemble these resources into a suitable Resource arrangement that, in whole or in part, satisfies the initial prescriptive specification.

For example, suppose a user wants to develop a plan for offering online courses. Such a user may express their purpose, [plan: online courses]. A PERCos embodiment may find one or more Framework templates that may guide the user to fulfill their purpose. For example, a user has published a Framework template, FT that provides the following:

- Decompose method that decomposes the purpose expression, PS, into a set of specifications, $FT_1, FT_2, \ldots, F_n$.
- Compose method that composes smaller specifications, $F_1$s into a bigger, more capable specification, which in this example is a Framework, F.
- Assemble method: one or more methods that assemble resources arrangements $RA_1$s that satisfy $FT_1$s, respectively, into one Resource arrangement, RA, with one or more Resource Interfaces that satisfy F. RI may enable users to learn about classes, register for them, and attend the registered classes.

In particular, FT's decompose method decomposes purpose expression, PS, into the following sub-specifications, where each sub-specification, $FT_i$ specifies one or more Resource sets for the following:

- $FT_1$: enable students to learn about offered courses, such as, for example, topics covered by each course, prerequisites, instructors, costs, and the like
- $FT_2$: manage course material, such as, for example, instructional videos and the like
- $FT_3$: manage student information, such as checking that student meet the prerequisites for the offered course list, registering students, issuing appropriate certificates upon course completion, and the like
- $FT_4$: manage finances, such as fees for currently offered courses, expenses, interacting with banks, and the like
- $FT_5$: manage performance, such as for example, reliability, security, privacy, and the like
- $FT_6$: manage online course sessions to all registered students, such as for example, enabling students to attend the course, pausing the session and resuming them, and the like
- and the like Each sub-specification, $FT_i$ may have one or more Resource arrangements that satisfy it. But suppose there is a sub-specification, $FT_i$ that does not have any Resource arrangement that satisfies it. In such a case, Template Services may check if there is one or more specification templates that decompose $FT_i$, into $FT_{i1}, FT_{i2}, \ldots, FT_{in}$, for which there are one or more Resource arrangements that satisfy them. For example, managing online course, $FT_6$, may be further decomposed into $OS_1$ and $OS_2$, where

- $OS_1$ may specify resources associated with the requested course and registered student information on a server, such as for example,
- $OS_2$ may specify Foundation resources that the registered student may provide, including ensuring that the student's computer has the needed software to take the course and the right information to access and authenticate to the server.

However, there may be some $FT_i$s that do not have any Resource arrangement that satisfies them. In such a case, the user may need to provide the additional specifications.

In this manner, FT utilizes specification templates that have been published by users, including possibly this user, to generate a Framework, F, that may enable the user to plan for offering online courses. The user may then use F as a scaffold to additional information, such as the user's online courses, fees, Foundation resources, where Foundation resources may include databases, providing databases and the like to support the conversion of the Framework into a sufficiently completely specification that may be provisioned. Once provisioned, students may launch one or more operating sessions, as needed.

Once the user is satisfied, the user may extract the pertinent information to create and publish a purpose class application that other users may use it.

In some embodiments, a PERCos History Service may interact with other instantiated operating context resources and/or services to provide a "living" history of that operating context, and a persistent record of the operating context after the contexts conclusion. History Services may be accessed to provide a re-creation, extension, evolution or other extension to the operating context, should that context be specified at some point in the future.

History Service instances may be active for the duration of the operating context, or as instructed by the specifications of that operating context, and such history may be made persistent for the period determined by those specifications. Such persistent history may be stored by history services, in one or more history stores, using for example PERCos PIMS.

For example, if an operating context comprises a lecture involving lecturers and students, there may be differing requirements for the time for which the History store may be specified to be persistent, subject to the University policy and governance (for example a university may mandate that a history may be kept for an academic year), the lecturer's policy and governance (the history may be kept for multiple academic years, so as to provide a teaching resource) and the student policy and/or governance (the history may be kept until the overall-multi academic years—course is complete).

In this example situation there are multiple stakeholders expressing multiple rights on the persistence, and subsequent access, to the history. History services may accept these, potentially contradictory, policies and requirements and overlay these across the history store contents so as to be able to respond to future access requests and requirements. Where history services are unable to resolve the contradictory policies, Coherence services may be invoked through, for example, PERCos systems calls and/or through operating context calls, to determine, as far as possible appropriate responses.

PERCos systems may provide users with various strategies to navigate and explore PERCos cosmos in pursuit of their purpose experiences, from formulating and refining their purpose expressions to provisioning their purpose sessions with optimal resources. The navigation and exploration strategies provide users with a variety of apparatus and methods for performing context-based, purpose-oriented operations on purpose Domains—such as identifying, locating, pivoting, drilling down, pruning, generalizing, and/or expanding—on behalf of a user.

The kind of navigational choices to present to a user (if any) may depend, for example, on the context and purpose as well as the number of resources, the stage of purpose refinement, and/or explicit or implicit information from a user. For example, if a purpose Domain is small or there are only a few resources, it may be preferable to present them directly, rather than offering means for navigating elsewhere; however, if the purpose Domain is large or there are a large number of resources, presenting navigational choices may be a helpful option. These navigation strategies may be interleaved as appropriate.

Users may use PERCos Platform Faceting services to navigate and explore different Facets of their purpose expressions or Resource types. A PERCos Facet organizes a group of resources, such as purpose Domains into divisions. Users may navigate and explore divisions provided by Facets to refine their purpose expressions or identify optimal resources. For example, a user whose purpose is to learn French language may use a Facet that divides French language into its vocabulary, grammar, pronunciation, idioms, and the like. The user may then drill down each of these divisions to refine his/her purpose, such as learn about verbs, such as their conjugation, mood and tenses, and the like.

Faceting services may present users with divisions that may have characteristics in common either in the same Facet or in different Facets. For example, Facet style may organize music into divisions, such as classic music, romantic music, impressionistic music, jazz, blues, or other musical genres or categories. A user who is interested in jazz may also be interested in blues since both jazz and blues utilize blue notes. Faceting services may also present users with related divisions, such as for a user interested in learning about impressionistic music may also be interested in learning about impressionistic art and/or related historical events.

In some embodiments, PERCos systems may provide users with class relationship graphs to navigate and explore classes, where nodes are classes and edges represent certain relationships between the connected classes. Some embodiments of PERCos class systems may have a wide variety of relationships, such as, "subclass," "similar-to," "has-purpose," "has-dependency," or other relationship. Users may navigate and explore these graphs to find related classes, super classes, or subclasses.

PERCos systems may provide users with purpose class applications, where purpose class applications are designed to provide users with convenience of using an arrangement of resources known to fulfill specific purpose classes. Some purpose class applications may enable users to navigate and explore purpose Domains and/or resources. For example, a purpose class application for the purpose of learning French may provide users with the ability to navigate and explore different aspects of learning French, such as its pronunciation grammar, vocabulary, and the like. The purpose class application may also enable users to explore resources for obtaining the desired purpose experiences, such as organizations that may provide users with on-line lessons to obtain desired purpose experiences.

PERCos systems may provide users with the ability to navigate and explore based on Reputes of resources. Users may include Repute expressions within purpose expressions or Resource expressions. Users may specify focus on resources whose Reputes satisfy certain properties, for example, performance, integrity, reliability, security and the like. For example, suppose a user has a purpose to find an interesting non-fiction book. The user may filter using, for example, available Reputes on individual books, on their authors, and/or on book publishers. Or the user may seek advice from resources the user holds in high Repute (e.g., particular book reviewers, best-seller lists, other users, and/or book club selections) and filter using Reputes from them. In either case, the user may request exclusion of already-read books. After reading a book, the user may generate a personal Repute on the book, the author, the publisher, and/or the source of advice. Such Reputes may remain private or be published.

PERCos systems may provide users formulate and/or refine their purpose statements or provision their operating sessions by navigating and exploring purpose Domains and resources based on their metrics. For example, whenever the interpretation of a user's purpose expression is not named, PERCos systems may use metrics to identify Declared classes that are "nearest" to the interpretation.

PERCos systems in some embodiments may use hypertext as navigation medium that links purpose Domain topics that are related to each other in some manner. For example, a navigation and exploration interface may present users with a list of topics of interest, where some of the topics may be linked to other topics of interest.

PERCos systems may support users with a variety of services and tools to efficiently and effectively interact with PERCos cosmos. The variety of services and tools may for example, without limitation:

1. Standardized, controlled vocabulary and well-defined structures for expressing purposes;
2. One or more purpose Domain class systems for classification and expressing relationships among classes, including purpose classes, expressive of Domain expertise;
3. One or more Facets for navigating purpose Domains by dividing, drilling down, and/or pivoting;
4. One or more metrics for relating Facets, divisions, classes, and potential resources and optimizing choices among them;
5. One or more Repute systems for filtering, prioritizing, or otherwise acting upon potential resources to achieve desired levels of credibility;
6. One or more databases, knowledge bases, and/or other data structures (e.g., ontologies) that contain information relevant to navigation and exploration, for example, representing Domain expertise, taxonomies, and/or metadata.
7. One or more Coherence dynamic fabrics (CDFs), which are instances of Coherence services, for reasoning about purpose Domains, such as determining their consistencies, filling in necessary contextual data, and the like.
8. One or more instances of other PERCos Platform Services, such as Evaluation Service, Testing and Result Service, and the like.

PERCos Information Management System (PIMS) provides apparatus and method embodiments for every aspect of managing any type of information (e.g. document, multimedia, on-line, bio-metrics) that are relevant in fulfilling purposes. PIMS may provide constructs for creating and organizing such information. In some embodiments, PIMS may provide one or more constructs for identifying, containing, organizing, matching, analyzing, and/or other ways of managing sets of information for their potential retrieval, sharing and/or reuse at a later time. In some embodiments, PIMS may also utilize PERCos Platform services to provide a suite of services, such as: storing, retrieving, publishing, distributing, discovering and/or other information manipulating operations. In particular, PIMS provides management and persistence of resources through their Resource Interfaces specified by their respective negotiated operating agreements. Although any identifiable unit of information may be made into a Resource, for reasons of efficiency, it may not be.

In one-to-boundless, the lifetime of any data, by its very nature, may be limited, in that writing information to a storage medium in no way assures the writer that the information may be available to them in the future as there is currently no guarantee that digital storage media may provide sufficient permanence of storage/persistence.

Design aspects of PIMS include the following:

- Provide a system that is dynamic, flexible, and scalable to support one-to-boundless computing;
- Efficiently identify, store, organize, retrieve, and support reasoning about information units;
- Provide users with the ability to dynamically arrange and/or organize information units. For example, users may organize their often used resources based on their purposes;
- Provide one or more apparatus or methods to allow users to store their information structures and associated contents in multiple arrangements, including for example in combination and/or separately.

PERCos environments may utilize a variety of support services to assist, operate on, control, create, or modify specifications. These PERCos support services may include, but are not limited to, the following:

- Evaluation Services,
- Arbitration Service,
- Test and Result Services,
- Reasoning Service, and
- Time Services.

It is understood by those familiar with the art that a PERCos environment embodiment may include some or all of these services.

Evaluation Services, in some PERCos embodiments, may enable PERCos processes to parse, evaluate, interpret, and/or transform specifications coming from one or more parties with potentially conflicting and/or orthogonal instructions that need to be rationalized before or during operations. Evaluation Service instances, like other PERCos Services, can be provided with control, organizational, and interface specifications that define their operations. Evaluation Service instance may be instantiated throughout PERCos purpose cycle, from cross Edge processing.

For example, suppose a user expresses a purpose expression, "discover: wine tours to Loire Valley", an Evaluation Service instance may parse this expression into, tokens, "discover," "wine tours," "to Loire Valley." It then identifies one or more Ref/Senses for these tokens. For example, it may determine that the token "discover," is in the same Ref/Sense as [verb: explore]. The Evaluation Service instance may interpret tokens, [verb: explore] and [category: wine tours] into a Core Purpose, [learn: wine tours], which may then be mapped into an Edge class, learn-wine-tours. It also represents token "to Loire Valley," as a modifier to be used for further refinement, such as for example, matching them against the attributes of a purpose class, such as purpose class, "explore-wine-tours."

In some cases, Evaluation Services may map Core Purposes to one or more purpose neighborhoods, which may be either purpose classes, and/or widely-used, possibly ephemeral "terms," that may represent current event of wide interest, for example, "learn sequestration," "Hurricane Sandy," and the like. For example, purpose neighborhood "learn sequestration" may enable users to explore relevant purpose classes and issues to learn about potential impact on economy, political fallouts for both political parties, and the like.

Some Evaluation Service instances may enable processes to evaluate and translate inter-process communications, which may be expressed in differing standardized messaging languages (e.g., XML, SOAP). For example, communication a PERCos process communicate between a non-PERCos process may use a standardized messaging protocol, such as for example, SOAP. In such a case, the PERCos process may invoke an Evaluation Service instance to interpret and translate messages to internal representation.

In some PERCos embodiments, Arbitration Services may make context-dependent decisions regarding specifications detailing resources, the apparatus and method embodiments, operations, process and/or other actions. For example, Arbitration Services may be instantiated by purpose formulation processing to arbitrate between ambiguous interpretations of tokens, such as token "java," as a programming language, or as an information term for coffee, based on the user's stored profile information, including Master Dimension Facets, auxiliary Dimension values, user historical data, and the like.

Arbitration Services may support PERCos operations throughout PERCos purpose cycle. Arbitration Service instances, like PERCos service instances, are provided with control, organizational, and interface specifications. Such specifications may include arbitration rules, methods, and/or other processes to undertake operations on incoming specifications produced through selection, calculation, conditions, evaluation, inference and/or other algorithmic apparatus and method embodiments an outcome, expressed in the form of a specification.

Arbitration Services may support Resource selections. resources, in some embodiments may be described as multi-Dimension vectors. Arbitration services may be invoked to arbitrate between resources that may have the same metric values, such as for example Quality to Purpose. In such a case, Arbitration Services may use context-dependent, rule-based multivariate analysis to make their selection decisions.

For example, consider a purpose, [learn: physical cosmology on-line]. An Arbitration Service instance may be provided with a control specification that specifies an arbitration rule that prioritizes Reputes over the service offerings. Such rules may balance between competency, location, the scope of offerings, cost and the like. In such a case, whenever the instance is requested to arbitration among resources that have the same metric value, it evaluates the Repute values of resources and chooses the one with the higher Repute value over those with lower values. For example, consider two resources, $R_1$ and $R_2$ that have the following metric values:

- $R_1$ has a higher Repute value (90/100), but the value of service offering is (80/100)
- $R_2$'s Repute value is 80/100, but the value of service offering is (90/100)

and all other metric values are the same, including for example, Quality to purpose metric values (85/100). In this example, the Arbitration Service instance may choose $R_1$ over $R_2$.

Arbitration services may also support SRO-S processing by arbitrating among multiple purpose statements, where each purpose statement may provide slightly differing purpose experience. Arbitration services may arbitrate among purpose statements that best match the user's purpose intent. Again, an arbitration service instance may be provided with a set of arbitration rules to determine the purpose statement that would provide the user with optimal outcome.

Arbitration rules may also specify governance rules. For example, in cases where specifications conflict, such as for example, a conflict between the user's interest and the interest of the Stakeholder of a Resource, the Arbitration rules may specify a process to resolve the conflict. For example, suppose specifications, $S_1$ and $S_2$, that specify Resource arrangements $RA_1$ and $RA_2$, respectively, are in conflict. In such a case, arbitration services may invoke Coherence to decompose $S_1$ and $S_2$ into $S_{11}$, $S_{12}$, $S_{13}$ and $S_{21}$, $S_{22}$, $S_{23}$, respectively, where

- $S_{11}$ and $S_{21}$ are consistent,
- $S_{13}$ and $S_{23}$ are consistent, and
- $S_{12}$ and $S_{22}$ are in conflict Arbitration services may then decide between $S_{12}$ and $S_{22}$ depending on their respective arbitration rules. For example, S1 and $S_2$ may specify Resource arrangements. In such a case, arbitration services may decide between resources specified by $S_{12}$ and $S_{22}$.

PERCos Test and Result Services (TRS) provide a service instance that may test incoming specifications so as to provide results that may validate statements and assertions made within the incoming specifications. In many situations, assertions as to a Resource and/or an aspect of a Resource is made by Resource publisher, provider and/or a third party attesting to one or more aspects of that Resource and/or its features, functions, performance, provenance, trustworthiness, security and/or other attributes, and may conform to PERCos Creds standards.

In some embodiments, these assertions may be parts of Creds or may be included in Resource characteristics specifications. TRS provided for the testing of both, subject to available methods. Such testing and validation may be expressed within the form of the assertions, where specific performance and/or metrics are described, and such test methods for evaluating such metrics are available. Other testing and validation may such that tests may simply not be able to be undertaken as there are no suitable methods that may be invoked and as such the assertions may not be confirmed or denied. Assertions, which are not part of PERCos Creds infrastructure, (e.g., the relative quality of a Resource such as "best", "fastest", "secure") may be of such a general nature that their assessment and testing is simply not possible. In such a case, they may be identified as such. TRS may also be used, with appropriate methods to validate Creds, master and auxiliary Dimensions as well as PERCos standardized metrics.

TRS embodiments may interact with many other PERCos processes, including Reputes, Identity, authentication and/or other processes where the incoming specification may, for example be in a standardized PERCos compliant format that enables specified tests to be under taken.

PERCos Reasoning Services may provide a collection of reasoners to support specifications, assertions, predicates, Effective Facts, and the like. The PERCos Reasoning Services may be expressed in a variety of languages, from those expressed in formal logic-based languages (such as First Order Logic and Description Logic (DL)) to those that are expressed in semi-formal (procedural and/or semi-declarative languages), to informal assertions. PERCos Reasoning Services may provide may use one or more Description Logic (DL) languages to represent knowledge as a set of concepts and the relationships among those concepts. DL languages have mature reasoners, such as JFaCT, FaCT++, RACER, DLP, or Pellet.

PERCos Reasoning Services may also use one or more extended/hybrid languages, such as Courteous Logic languages, that provide additional constructs such as negations, prioritization between assertions, and the like. Courteous Logic languages enable their reasoners to resolve possible conflicts that may arise, such as assertions A and ~A, by enabling expression of prioritization of assertions. For example, in case of A and ~A, a Courteous Logic language may enable prioritization of which has higher priority, such as A.

PERCos Reasoning Services may include inference engines, such as CLIPS, Jess, Drools, and the like, to reason about rules, facts, priorities, mutual exclusions, preconditions, and/or other functions. Both Jess and Drools use the Rete algorithm, which is an efficient pattern matching algorithm for reasoning about productions expressed in form, P→Q. PERCos Reasoning Services may also provide reasoners for additional types, such as modal, deontic, temporal logics. These reasoners may support a variety of procedural and/or semi-declarative techniques in order to model different reasoning strategies.

PERCos Reasoning Services may also provide reasoners for reasoning under uncertainty. These reasoners may use certainty factors, probabilistic methods, such as Bayesian inference or Dempster-Shafer theory, Pearl's causation theory, and the like.

PERCos Time Services keep local internal system time to provide a precise time references. It may provide services, such as time conversion, such as converting local system time to calendar time, make the internal time available to remote systems, and the like.

In some embodiments, Time Services may enable processes to request the time they have been running as well as how much CPU time they have consumed.

Time Services may also enable adjust local time to match an external source, by adjusting its local clocks immediately or adjust it slowly over a period of time. For example, a Time Service may adopt the time from a mobile phone Resource, or an atomic clock Resource.

In some embodiments, PERCos Platform services may include Interaction Support Services, generally in the form of interaction managers that may support one or more user interactions through one or more purpose operating sessions.

Interaction Support Services managers may provide methods for manipulating audio, video, and textual details of users experiences, including differing management, as appropriate, of differing interaction session types. This for example may include maintaining coherent context specific visual and auditory communications, through for example interactions with one or more Coherence managers, by controlling Participant (as a user representation) and operating session activity in a manner consistent with optimizing the specific purpose of such session.

In some embodiments, such an interaction support manager may employ the video and audio management capacity of computers to optimize attention, conduct of interaction, and/or productive stimulation of information receptivity, while minimizing visual and auditory distraction and visual and/or audio information overload and stress. For example, interaction support managers may actively manage those communication variables, both visual and auditory, that may substantially contribute to and/or detract from optimal human interaction and communication dynamics, control, and information receptivity.

In some embodiments, interaction support managers may enable stabilization, morphing, and other modifications of human interaction variables such as body movement, image detail, perspective orientation and related factors such as eye contact, facial and body communication cues, voice volume and timbre, and participant speaker order and "impression" (volume and talk-over). This management, may for example, enables the dynamic management of behaviorally impactful variables of interpersonal communication through the manipulation of visual and auditory attributes of reality avatars (size, position, order, perspective, emphasis, volume and the like) and through the use of emphasis tools such as border and/or outline enhances, and specialty coloring and lighting.

In some embodiments for example, interaction support managers may attempt to offset the loss of cues, including human interactive and field of vision attributes, that are inherent with in-person communication. This may include for example:

- Storage and/or management of sets of preferences and/or purpose related rules supporting template based and active calculated management of interaction dynamics
- Simplified methods for users to adjust important interaction dynamics variables through, for example use of slider controls
- Interaction variable management that may be based at least in part on user biometric and auditory monitoring, adjusting such variables in response to user dynamics such that behavioral cues and response dynamics are circumstance appropriate and maximized for the interaction purposes In some embodiments, users behavior may be influenced by behavior management reinforcement and penalties, for example with a given Participant's Role and/or communications content, improper content or conduct may result in muting Participants audio, modifying or cloaking Participants video, charging the participant a monetary penalty or otherwise imposing a penalty, including indicating demerits, repositioning and the like.

In some embodiments, such Interaction Support manager rules may enable users (including groups thereof) to employ automated functions, all with the intent of managing and optimizing Participant behavioral responses consistent with the purpose of specific interactions The PERCos Kernel Services may comprise some or all of the following services:

1. Initialization Services
2. session Management Services
3. Coherence Management Services
4. session Identification Services
5. operating session Interface Services
6. Transport Services PERCos Initialization services may, in some embodiments, be used to activate one or more provisioned resources. For example, the Initialization Services may activate those resources specified by an operational specification, as operating resources, to form, at least in part, an operating session. Initialization services may provide specified Resource instances with appropriate initialization specifications (including for example to portions thereof). Initialization services may operate in accordance with one or more sets of specifications, such as control, organizational, and interface specifications. Such specifications may also include one or more rules sets that may include governance requirements.

In some embodiments for example resources that had been persisted from previous activations, may be invoked using Initialization services which have specifications that are based, at least in part, on previous state information.

In some embodiments resources may be activated on demand or at some specified time, for example Initialization Services may monitor the current/local time (through for example PERCos Time services) and at the appropriate time, "awaken" and/or start specified Resource instances.

In some embodiments, Initialization Services may validate, through for example, PERCos Platform Tests and results services to ensure that the Resource is operational. It may then notify appropriate controlling and/or designated resources, the status of activation as well as other relevant information, such as the state of the specified Resource instances. For example, if a Resource is unable to operate effectively then one or more failure state schema, and associated apparatus and/or processes, may be invoked by one or more managing resources, including Initialization Services, which may then initiate remedial action, and/or notifies the appropriate exception mechanisms.

In some embodiments, when a Resource is no longer specified to be operational, Initialization Services and/or other controlling resources may cause operational resources to be shut down. For example, if resources require persistence services, for example to persist state, Initialization Services may invoke appropriate Persistence Services, such as PERCos Platform Persistence services.

A PERCos Session Management Service is responsible for managing operating sessions, such as initiating a session and providing it with its control specifications and/or other specifications, persisting, suspending, resuming, terminating and the like an operating session if appropriate. In some embodiments, it may also provide persistence service.

To support one to boundless computing, PERCos Session Management Services may provide a wide variety of interfaces. Some operating sessions are created for single user to provide short results to a single query. Some operating sessions are of long durations, including those operation sessions where users may join and leave them as appropriate.

To support this wide range of operating session types by providing each operation session Management Services instance is provided with an interface specification (as well as control and organizational specifications). In such a case, PERCos Operating Session Management Services provides the interface specified Interface specification.

PERCos Coherence Management Systems are responsible for managing Coherence operating Resource assemblies, comprising Coherence elements specified to perform coherence operations. Coherence Management Systems are uniquely specification-centric. In some embodiments, Coherence managers are the entry point of all Coherence operations. Coherence managers may interact with PERCos specifications, resources, user and/or Participant inputs, PERCos Platform Services and/or any other processes and/or information, individually or in any arrangement, so as to support purpose operations.

An optimal Coherence Management System does not normally constrain or bias the composition of Coherence operating Resource assemblies. Instead, a Coherence Management System instance algorithmically calculates the composition of Coherence operating Resource assemblies under its management based on specifications, including values, associated algorithm inputs, and the like. Such a flexible architecture accommodates a broad array of differing synergistic Coherence operating Resource assemblies.

PERCos Coherence Management Systems interact with various functional processes to optimize the relationship between purpose orientation, purpose precision, and results. It may direct its Coherence elements to support purpose operations, including supporting allocation and provisioning of operating sessions with optimal resources to fulfill purpose satisfaction. Coherence operations may include identifying and/or proposing candidate specifications, templates, resources (including, for example, information, Participants, devices, processing, classes, Frameworks, Foundations, Resource assemblies, and the like) and combine these in a manner to suit purpose cycle operations of one or more Participants in pursuit of satisfaction of their purpose expressions. Supporting purpose operations may involve a PERCos Coherence Management Service instance interacting with for example PERCos Resource Management Systems to provide alternate Resource within purpose operations Coherence Management Systems may check resources arrangements, including specifications, for problems (including inconsistencies and/or incompleteness) and/or to "harmonize," "optimize," and/or "integrate" one or more sets of such resources, leading to superior experiences/results that integrate the interests of all direct and indirect users/Stakeholders in response to specified and/or derived purpose expressions. In some embodiments, this may involve checking Foundations/Frameworks to ascertain and validate appropriate consistency and/or operations of these Resource arrangements. Coherence processes may detect and/or attempt to rectify a wide range of limitations, imperfections, and/or exceptions, including, for example, inaccuracy, lack of clarity, ambiguity, incompleteness, inconsistency, inefficiency, suboptimal selections, and/or requests for unavailable resources.

Coherence Management Systems may, for example, also attempt to identify those resources that may be specified and/or are missing for a purpose, such as for example a business conference, entertainment experience or similar. These may include both PERCos and non PERCos resources which have been identified specifically and/or by class, or other typing, through the use of specifications (including templates and/or purpose expressions), and/or through algorithmic analysis and/or other direct specifications.

In some embodiments, Coherence Management Systems may manage priorities, through evaluation of alternate specifications to produce and/or modify an operating session that is consistent for the purpose (s) of the users/Stakeholders. Resolution of these priorities may be undertaken for one or more users and/or groups (and/or proxies) and may include prioritizations of the interactions, for example, with and between Participants and/or associated resources.

Coherence Management Systems may interact with governance and/or other rules to enable one or more processes to determine the behavior, operations and/or performance of resources.

PERCos Coherence Management System is responsible for managing Coherence Dynamic Assemblies (CDA), comprising Coherence elements specified to perform coherence operations. Coherence Management System is uniquely specification-centric. An optimal Coherence Management System does not normally constrain or bias the composition of CDA. Instead, a Coherence Management System instance algorithmically calculates the composition of CDAs under its management based on specifications, including values, associated algorithm inputs, and the like. Such a bias-free architecture accommodates a broad array of differing synergistic functional subsystems.

A CDA may perform a wide range of operations, such as helping users deal with the conundrum, expertise challenges and organizational difficulties related to purpose expressions, including meaningfully and relevantly organizing the presentation of results. Users frequently have difficulty understanding and expressing purpose variables, due to lack of tools for, and the user understanding of, purpose related tools, functions, and issues.

A CDA may assist users' successive formulation and refinement of purpose expressions. It may provide, as desired, candidate sets of declared classes that users may use in formulation of expressed purpose(s). Moreover, at any step of such formulation, a CDA may evaluate iterated purpose expression for possible conflicts and gaps. A CDA may then cohere, correct, complete and/or resolve any identified errors, conflicts and/or incompleteness with, if needed, help from users and/or other processes.

PERCos Coherence Management System interacts with various functional processes to optimize the relationship between purpose Orientation, purpose Precision, and results. It may direct its Coherence elements to support purpose operations, including supporting allocation and provisioning of operating sessions with optimal resources to fulfill purpose satisfaction. Coherence operations may include identifying and/or proposing candidate specifications, templates, resources (including, for example, information, Participants, devices, processing, classes, Frameworks, Foundations, Resource assemblies, and the like) and combine these in a manner to suit purpose cycle operations of one or more Participants in pursuit of satisfaction of their purpose expressions. Supporting purpose operations may involve a PERCos Coherence Management Service instance interacting with for example PERCos Resource Management Systems to provide alternate Resource within purpose operations PERCos Coherence Management Systems may interact with PERCos specifications, resources, user and/or Participant inputs, PERCos Platform Services and/or any other processes and/or information, individually or in any arrangement, so as to support purpose operations.

PERCos environments may check resources arrangements, including specifications, for problems (including inconsistencies and/or incompleteness) and/or to "harmonize," "optimize," and/or "integrate" one or more sets of such resources, leading to superior experiences/results that integrate the interests of all direct and indirect users/Stakeholders in response to specified and/or derived purpose expressions. In some embodiments, this may involve checking Foundations/Frames to ascertain and validate appropriate consistency and/or operations of these Resource arrangements. Coherence processes may detect and/or attempt to rectify a wide range of limitations, imperfections, and/or exceptions, including, for example, inaccuracy, lack of clarity, ambiguity, incompleteness, inconsistency, inefficiency, suboptimal selections, and/or requests for unavailable resources.

Coherence Management Systems may, for example, also attempt to identify those resources that may be specified and/or are missing for a purpose, such as for example a business conference, entertainment experience or similar. These may include both PERCos and non PERCos resources which have been identified specifically and/or by class, or other typing, through the use of specifications (including templates and/or purpose expressions), and/or through algorithmic analysis and/or other direct specifications.

In some embodiments, Coherence Management Systems may manage priorities, through evaluation of alternate specifications to produce and/or modify an operating session that is consistent for the purpose(s) of the users/Stakeholders. Resolution of these priorities may be undertaken for one or more users and/or groups (and/or proxies) and may include prioritizations of the interactions, for example, with and between Participants and/or associated resources.

Coherence Management Systems may interact with Governance and/or other rules to enable one or more processes to determine the behavior, operations and/or performance of resources.

A PERCos session Identification Service manages identification information for operating sessions. Each session Identification Service instance is provided with a control specification that defines the instance's operations, including generating identifications for resources created and/or introduced into by the processes operating in the operating session instance, managing relationship between resources, translating local identification information into global identification information.

An important function of the session Identification Services is the determination and management of the provenance and integrity of the operating Resource in the operating session. For example, suppose that an operating Resource in an operating session has been obtained by provisioning a purpose class application. If during the course of interacting with the operating session, the user desires to write a Repute based on his experiences, it is useful for the user to be able to determine what purpose class application he is using and how it has been provisioned and/or modified for his use.

A session Identification Service embodiment may also associate the identities of the operating resources being used in an operating session with their control specifications, operating agreements, governance and the like. This information may be used by PRMS or Coherence Management Services to help them manage the operating resources in the operating session.

To support one to boundless computing, PERCos Operating Session Interface Service provides a wide variety of interfaces. Some operating sessions are created for single users to provide short results to a single query. Some operating sessions are of long durations, including those operation sessions where users may join and leave them as appropriate.

PERCos operating session Interface Service embodiments support this wide range of operating sessions by providing each operation session instance with the interface it needs to fulfill its purpose experience. For example, consider a high school senior whose purpose is to find one or more colleges the student may apply to major in engineering. The student has dual purposes: one purpose is to explore engineering fields, such as for example, nuclear engineering, electrical engineer, chemical engineering, and the like; and the other purpose of finding an optimal college for him/her. The operating session may comprise two purpose class applications, one purpose class application for exploring engineering fields and another purpose class application for exploring engineering colleges. An operating session interface service may integrate the Resource interfaces of these two purpose class applications to provide a unified Resource interface that enables the student to explore both Engineering fields by allowing them to drill down to engineering fields; and Engineering colleges, such as for example, local colleges, colleges known for having outstanding engineering department.

In some embodiments, an operating session instance is launched by a sufficiently cohered and resolved Framework. In such a case, PERCos Operating Session Interface Service may interpret the Framework in order to generate the Interface for the operating session instance. In other cases, PERCos operating session Interface Service instance may be provided with one or more control specifications that define its operations.

To manage operating sessions, the PERCos session Management Service may use, manage, or otherwise take advantage of PERCos Platform Services, such as PERCos Platform Service, PERCos Evaluation Service, or other services.

PERCos Transport Services may use a wide variety of communication services to proactively support for example, differing nodal arrangements, message contents, contexts of the services, the type and the receivers of the communication, and the like. Based on the message, information specified, potentially contained within in the message, and/or other specifications, PERCos Transport Services may arrange a suitable distribution arrangement for the message. PERCos Transport Services may accept a message and apply the message, or other information embedded and/or referenced by the message (such as specifications, contracts, metadata and/or other information).

Like any other PERCos services, each instance of a PERCos Transport Service is defined by its control specifications. Based on the state of network connection and/or message recipient, the control specifications may specify which protocols and/or protocol settings a PERCos Transport Service instance is to use satisfy the message's requirements. For example, if the message is to be sent with high level security, the control specifications may specify that a PERCos Transport Service instance use Transport Layer Security (TLS) to transmit messages. The control specifications may also specify the strength of encrypt and/or digital signature mechanisms to be applied.

In some embodiments, PERCos Transport Services uses PERCos Platform Services, such as PERCos Platform Messaging Services, PERCos Platform Evaluation Services, PERCos Platform Test and Results Services, PERCos Platform Identification Services, and the like.

For example, a message may include by reference and/or embed a PERCos Identification Matrix (PIDMX) that contains identification information. PERCos Transport Services may evaluate the identification information and if needed, transform from the message's local context to global context. It may also distribute the message as specified either by the transport's control specification and/or explicitly specified by the message. In some embodiments, PERCos Transport Services may use message routing service, which may take single and/or multi part messages and act as intermediaries for the distribution and/or receipt of messages, including in one example embodiment storing the state, distribution information, acknowledgements, responses (including pre and post conditions where appropriate), receipt or other attributes of the messages.

Examples Introduction

1. Social Networking Example

This disclosure describes an example PERCos embodiment that supports social networking through exploring and participating in wine-related activities, such as wine tastings, winery tours, travels to wine regions, food-wine pairings, lectures on wines and food, and the like. It is understood by those familiar with the art that this example embodiment is used for illustrative purposes only, to enable one of ordinary skill to implement other embodiments.

This wine exploration social networking embodiment has members comprising people, wine stores, wineries, wine reviewers and experts, restaurants, travel agencies, and other organizations that provide wine-related activities. This social networking embodiment enables members to find other members who they may resonate with (i.e., similar taste, preferences, and the like) "safely," by checking their reputations or credibility as well as other relevant characteristics. It enables members to specify their preferences, such as their privacy, integrity, risk tolerance, and the like.

This social networking embodiment also enables organizations, such as, wine stores, restaurants, wineries, wine experts, travel agencies, and the like. to effectively promote their offerings by sponsoring wine-related activities that target members who may best resonate with their offerings. For example, a winery may hold a private wine tasting for members to promote their wine selections.

Such a PERCos social network embodiment may comprise, for example, the following:

1. Publishing resources, such as, auxiliary class systems, auxiliary classes, purpose class applications, activities and events, resources, and the like. For example, a publisher may have web robots ("bots") that explore the cloud to find applicable activities and publish them. Wineries may also publish their own offerings, such as wine tastings, open houses, and the like.
2. Preparing resources, such as auxiliary class systems, auxiliary classes, purpose class applications, REPutes, affinity groups, social activities and events, and the like.
3. Preparation includes transforming/assimilating external resources into PERCos cosmos.
4. Discovering, exploring, learning, evaluating, and/or participating in one or more activities and events (e.g., sponsored trips, private trips, and the like) that users may optimally resonate with by evaluating resource characteristics, such as attendee list, REPutes, and the like.
5. Creating, evaluating and joining in affinity groups. Affinity groups may have policies for joining their groups. For example, wineries may have policies requiring that members agree to purchase "n" number of bottles of wine per year. Private groups may have policies and rules sets, such as, of having to have explicit permission from the group's administrator. Users can find other users based on various attributes, such as, members can decide whether or not they want to join a group based on the group's membership. Members can provide and/or specify various filters and attributes, such as, REPutes, purposes, and the like. Members may have options for specifying privacy policies regarding sharing their information.
6. Creating, discovering, exploring, learning, and evaluating REPutes to make resource selection. For example, a Stakeholder may select a Framework over a purpose class application because of the Framework's excellent REPutes.

In this disclosure, these use cases do not illustrate every aspect of PERCos processing. Instead, each use case illustrates some aspects of PERCos. For example, some use cases illustrate formulation of descriptive purpose expressions to be associated with resources. Others may illustrate discovery of relevant non-PERCos resources to incorporate them into PERCos cosmos, and the like.

PERCos embodiments may enable people, wine stores, restaurants, wineries, travel agencies, and the like. to organize, publish, announce, learn, discover, explore, and/or attend wine-tastings, wine-food-pairing, trips, lectures, and the like. For example, Cakebread Winery can announce/publish its annual open house event to its members. It can also announce/publish to public its daily wine-tastings, appointment-only tastings, and the like. Wine stores, such as Beltramos, in Menlo Park, Calif., may also publish/announce wine tastings, tasting flights (a selection of wines, usually between three and eight glasses, but sometimes as many as fifty, presented for the purpose of sampling and comparison), and the like.

Providers, such as, wineries, stores, restaurants, travel agencies, and the like, can create their resources for example their offerings) and publish these offerings and events by associating one or more descriptive purpose expressions with them. For example, a publisher may associate a wine-food pairing event with two purposes. One purpose is to learn pairing between food and wine. The second purpose is to attract potential clients by providing opportunities for users to meet other users they may resonate with. The publisher may use questionnaires published by an expert social planner that users can fill out to express their tastes, preferences, and the like. Based on the filled out questionnaires, the publisher may use resonance specification to arrange events. Users attending such events may generate REPute expressions on how well they resonated with other attendees. Users may also generate REPute expressions on the publisher, the wineries, the wines, the social planner, the location and the like.

Publishers can also provide relevant REPutes/Creds. In addition to providing their own REPutes/Creds, they may also provide other REPutes published by other users. For example, Cakebread Cellars Winery in addition to providing their own REPute, such as an Effective Fact that they have been producing wine since 1973, can provide REPutes published by, for example, wine magazines, customers, and the like.

Normally, a user's instruction of a computing arrangement towards an end result—which may comprise a desired specific result and/or an unfolding sequence of interim results and/or experiences leading to an outcome—involves a dialogue between user and computer that traverses the user/computer interface, in PERCos described as the user/computer Edge. In this dialogue, users may interact with PERCos computing environments to express their Core Purposes, master dimension Facets, and/or other operators initially. PERCos embodiments may incorporate system general contextual variables, such as, user profiles, user history information, crowd behavior, resonance, Foundation, affinity governance, and the like. They may then cohere and resolve to generate one or more purpose expressions that can be used to approximate one or more purpose classes that can be used to discover resources that may provide users with interim results, such as, Frameworks, purpose class applications, and the like, that can further unfold to provide users with "best" outcomes.

2. Assumptions

PERCos system embodiments may provide users one or more rich standardized and interoperable prescriptive purpose expression languages to express their respective purposes. Users interactively and iteratively interact with PERCos embodiments to formulate Purpose Statements that are sufficiently complete, resolved, and cohered to enable PERCos embodiments to identify, allocate, and provision optimal resources for fulfilling their respective purposes.

To support efficient and effective methods to identify, retrieve and allocate optimal resources, PERCos may constrain publishers to utilize one or more standardized interoperable master dimension Facets and auxiliary dimensions to describe their resources. PERCos embodiments also provide publishers with one or more standardized, interoperable universal purpose class systems to organize their resources. In some embodiments, publishers can specify their resources using a format comprising two parts:

One or more descriptive purpose expressions

Metadata

During PERCos publishing processes, a resource publisher may create one or more descriptive purpose expressions that enable PERCos embodiments to associate a resource with one or more members of one or more purpose classes. Towards this end, such a descriptive purpose expression may comprise the following:

One or more purpose classes, neighborhoods, and/or the like

One or more Core Purposes

Values for relevant master dimension resource Facets

Values for auxiliary dimensions

In addition, the following may also be associated with a resource:

One or more REPutes

One or more rules sets, such as, access rules, privacy rules, and the like

One or more resource relationships, such as dependencies, for example, dependency on one or more Foundations For example, suppose a publisher, P1, is a professor at a university, U. P1 may have to comply with U's policies and practices. For example, suppose P1 wishes to publish an online course for learning enology, the science and study of all aspects of wine and wine making, except for vine growing and grape harvesting. The purpose expression for the online course, OC, may have pre-requisites that interested students must comply with. For example, it may require students have certain knowledge of chemistry. In addition, the purpose expression must be consistent with U's policies and practices, such as, requiring the participants for the on-line course must be registered as a student at U. The description of the course as well as its price may also be required to be within the guidelines of U's policies and practices.

For example P1 may interact with PERCos embodiments to generate the following purpose expression, PS1 and PS2 that can be internalized as follows:

```
(Purpose Expression:
(Purpose Class: learn-enology)
(Master dimension:
        (resource:
          (Material complexity: medium)
            (Integrity: 9/10)
            (Reliability: 7/10)
          (Language: English)
    )
  (REPute:
            (Quality-to-Purpose metrics: 85/100)
            (Quality-to-Purpose-Class metrics: 85/100)
    )
)
(Auxiliary dimension
    (location: on-line)
    (cost: $350)
    (course provider: University of California at Berkeley)
)
(REPute: {REPute-ID-101, REPute-ID-102})
(Governance: (registered(student)))
(Dependency: (Foundation {F1, F2, F3, ...}) ),
```

where $F_i$s are Foundation arrangements, such as a browser with microphone, video camera, and the like. There may be other resources that may require only minimal Foundation resources, such as, HTML5.

The rules sets (expressed in this example as governance) specifies that users who want to participate/attend in this online course must be a registered student.

For example, as illustrated in FIG. 141, An Example Purpose Cycle

Another publisher, P2, who wishes to publish a short course for learning physics, may specify a purpose expression that can be mapped internally as follows:

```
(Purpose Class:
(Identity: learn-physics)
 (Attribute experience level: beginner)
```

-continued

```
(Attribute learning-medium: short course)
(Attribute cost: low)
(Attribute provider: Organization O))
```

Both P1 and P2 may provide further descriptions of their resources by using metadata. For example, P may specify that its resource, R1, provides an introduction to physics, whereas P2 may specify that its resource, R2, focuses on mechanics, radiation, heat, electromagnetism, matter, and quantum mechanics. P may further state the R2 enables students to learn the material at their own pace.

Purpose expression can be mapped to one or more members of one or more purpose classes. For example, a purpose expression may be "learn physics for undergraduate student at a high-ranked university," where a highly ranked university is a university that is in top 100 universities in the world.

While Stakeholders may use metadata to express themselves more informally, they are recommended to adopt a standardized format to facilitate discovery of their resources.

The use cases in this disclosure describe an embodiment that makes use of one or more class systems for organizing and describing Big Resources. First amongst these class systems is a universal class system. This class system may be, in some embodiments, created and maintained by a group of acknowledged Domain experts and may be "endorsed/certified" by PERCos embodiments and/or authorized utilities. This universal class system enables PERCos embodiments to organize potentially boundless number of information resources by providing standardized, interoperable structures to organize them so that they can be efficiently and effectively discovered and utilized to fulfill purpose experiences.

To support one-to-boundless computing, user purpose expressions are approximated to one or more classes in one or more universal class systems, thereby restricting focus of analysis/matching to those resources that are contained or nearly contained in the candidate declared purpose classes. PERCos may analyze/evaluate the resources in the candidate classes to identify optimal set of resources to fulfill user purpose.

Although in this example embodiment PERCos systems do not allow arbitrary Stakeholders to modify universal class systems, it can allow Stakeholders to extend and/or refine them in order to organize their resources in a way that meets their needs more optimally. Stakeholders may dynamically create new auxiliary class systems, classes, class definitions, as resources, and associate them with one or more classes in one or more universal class systems. For example, a Stakeholder may desire to create a wine-related social activity class system in order to organize wine exploration social activities based on the event type, provider, location, and the like. The Stakeholder may then publish the created class system as a resource and associate it with one or more classes in one or more universal class systems (e.g., class social activities in FIG. 145). The created class system also, being a resource, provides a resource interface that enables users/processes to access its classes. For example such a resource interface generally may be similar to PERCos Platform Navigation Interfaces for navigating and interacting with PERCos universal class systems. However, Stakeholders may also provide one or more customized resource interfaces that better suit their needs.

The example PERCos embodiment described in these use cases provides a universal class system that includes the following five category class systems:

Wines

Food-Wine Pairing

Lectures

Travel

General Social Networking (includes activities, members)

Some of these categories may have been created by non-PERCos organizations (e.g., Michelin, and/or users) and may not be optimized for PERCos. The system of categories that are used in this example is shown in FIG. 145. In addition to the categories, the acknowledged Domain experts who created this ontology would need to also create vocabulary that would be used to express the assertions in REPutes. Thus for instance, the acknowledged Domain experts for the General Social Networking category could create vocabularies to indicate that a social gathering is "interesting," "fun" or "informative". Similarly the acknowledged Domain experts for the Wine category could create vocabularies that allow them to incorporate the wine rating system used by widely acknowledged wine experts and/or reviewers.

In some embodiments, PERCos may dynamically combine, align, optimize and the like these existing categories to create new categories. For example, PERCos may combine the above five class systems into one class system, or PERCos may leave it to a purpose class application to combine and use them as appropriate to create their dynamic class systems of purpose classes (for example see FIG. 146).

For example, an existing lecture class system may not have a subclass about wine-lectures. But a combined wine-lecture class system may have a subclass, wine-lecture. In particular, since an Edge class is an interpretation of purpose expressions, Edge class systems (e.g., Edge classes) can grow unbounded.

To support one-to-boundless computing, some PERCos embodiments may constrain publishers to use controlled, standardized vocabularies that are subset of vocabularies that users may use to express their purposes. These controlled, standardized vocabularies may be used as basis to define universal PERCos class systems.

In the embodiment described in these use cases, class systems play a central role. Specifically, some of the class systems used by this embodiment will be represented by resources that have resource interfaces that contain direct support for such operations as navigation, matching of prescriptive and descriptive purpose and the association of resources to their descriptive purpose class. In addition, since class systems are resources, they may have control specifications that specify access control policies, such as operations (navigate, read, modify, administer, and the like) permitted to various Participants and processes. The uses cases in this disclosure assume that both universal class systems and auxiliary class systems may provide resource interfaces that may comprise the following:

1. A read-only interface that allows Participants and/or processes to navigate the class system hierarchy and query the class system for members/classes satisfying some predicate. In particular, if the class system includes data about resources—as members of the resource class—and their purposes, this interface allows PERCos to use the class system to find resources that are asserted to have a particular purpose in the class system.
2. A read-write interface that allows authorized Participants and/or processes to add/remove members in the class system, to assert the membership of member in a particular class from the class system, to assert relationships between members in the class system and to assert relationships between members and classes in the class system. Of particular importance to the use cases in this note is the potential that this interface will allow the caller to associate a resource with a purpose expression that uses the vocabulary provided by the class system.

3. An editing capability that allows acknowledged Domain experts to make structural changes to associated ontologies by adding/removing classes, changing class definitions and modifying class to class relationships. In the case of a universal class system, this interface will only be accessible to authorized acknowledged Domain experts and/or authorized processes acting on behalf acknowledged Domain experts.
4. A control interface that, among other things provides access control restricting what Participants and processes are allowed to use a particular interface to the class system.

This embodiment may include resources representing class systems that do not implement any of these resource interfaces. However, this embodiment can make special use of a class system resource that implements one or more of these resource interfaces.

In this embodiment, each of these resource interfaces for the class system resource type provides an important piece of the use cases below. The first two interfaces allow publishers of resources to use a class system as an organizational tool for associating resources with purpose and allowing users and user invoked processes to query this class system for resources that meet a user specified prescriptive purpose. Thus, for example, in use case A.2, a Stakeholder creates a class system that extends a universal class system that has useful purpose classes involving wine and social networking. If the class system supports interface 1 above, then a user who encounters this class system can use PNI to learn more about wines and social networks and perhaps can even find some resources representing events. If the class system supports interface 2, then a publisher of wine tasting resources can associate resources with the declared purpose classes in the class system with the expectation that users will find those resources.

The third interface is used to extend class systems as illustrated in use case A.2. As such it does not play a key role in the use cases below though it is implicitly involved in the use cases involving the creation of a new class system (e.g. use cases A.1 and A.2).

The fourth interface, the control interface, is useful for ensuring that class system complies with its "requirements," such as its integrity, privacy, reliability, consistency, and the like. If, for example, any caller could add and remove classes or class from the class system, then the class system would develop inconsistencies as users with different understandings of wines or social networking introduced their viewpoint into the class system. In contrast, if the creators of the class system restrict the ability to alter classes in the class system to a group of like-minded Stakeholders (effectively the de facto acknowledged experts for this class system instance) who have a common understanding of the goals of the class system, the class system can retain its internal consistency. Similarly, a developer of an auxiliary class system might restrict who could use the class system. These restrictions might be used to ensure that the member resources in the class system are created by Stakeholders with a good REPute who know how their resources should be classified in the class system.

In some PERCos embodiments, a waypoint is declared to provide efficient ways to identify one or more neighborhoods of potential resources that may be further explored to fulfill user purposes. For example, suppose a user has a purpose to explore wine tours with users with whom the user may resonate with. PERCos embodiments may map it to two waypoints: wine exploration waypoint and social-networking waypoint. PERCos embodiments may then use these waypoints to further refine user purpose expressions, such as formulating additional contextual information, such as, the type of wine tours, such as domestic, international, day trips, extended tours, and the like.

A waypoint, generally, represents a purpose class, but could include other commonly used sets of terms. In some embodiments, a set of waypoints may be bounded, by for example experts, and can grow in a managed fashion. For example, the set of waypoints may be managed by a group of acknowledged Domain experts who are may be required to a strict class system editing workflow that includes a review of all additions and deletions. In such a case, there may be a standardized vocabulary and grammar provided by one or more acknowledged Domain experts for creating waypoints.

Waypoints are "declared" by PERCos and "cover" the cosmos—i.e., generally, any purpose expression can be "approximated" to one or more waypoints, from which further matching/similarity analysis can be performed.

In FIG. 142, a user purpose expression is "approximated" to two waypoints, WP1 and WP2. Each waypoint is then further explored to discover optimal sets of resources for fulfilling user purposes. Each waypoint may have, for example, one or more purpose class applications (PCA) and or resources. Depending on the user's stated preferences and/or purpose expressions, PERCos may choose a PCA that may help the user refine his/her purpose expressions.

For example, as illustrated in FIG. 142, Illustration of Waypoints, Resources, and Descriptive CPEs.

People's view of the world is rarely precise. Moreover, they generally do not express their purpose precisely, especially for purposes for which they do not have sufficient expertise. PERCos embodiments may utilize this imprecision to improve computational efficiency without significantly reducing the quality of the generated resources. Some PERCos embodiments may fulfill user purpose by iteratively interacting with users to approximate user purposes to generate a purpose expression that is sufficiently complete to enable purpose expression responsive results such as resource choices and arrangements, queries to users, and/or provisioning of resources that unfold towards implementing, or implements, user indications/specifications of user purpose, however well or poorly conceived, however well understood and thoughtfully directed by the user, and however such direction is meant as initiating a process, contributing to interim goals, and/or at least in part identifies and ultimate, desired outcome.

Towards this end, some PERCos embodiments may, for example, approximate a Contextual Purpose Expression (CPE) by, for example, without limitation:

- Mapping to one or more waypoints using the Core Purpose part of the CPE using such services, such as, PERCos PNI and the like;
- Identifying one or more classes that are "sufficiently" similar to CPE by using PERCos Platform Services, such as, PERCos Matching and Similarity Services and subsequent analysis;
- Using CPE as an index to index into a distributed information store comprising one or more lists of resources, such as, purpose classes, waypoints, purpose class applications, and the like.

In some embodiments, a given purpose expression may:

Precisely match to one or more combinations of waypoints (e.g., learn-wine (WP1) and attend-lecture (WP2)).

Approximate in its entirety to one or more combinations of waypoints. For example, such approximation may include taking the verbs and interpreting them into ref/senses. For example, suppose "learn wine" and "attend lectures" are two waypoints. Consider a purpose expression, "learn wine by taking classes." PERCos may interpret "taking" as "attend."—i.e., take and attend are in the same ref/sense. At this point, attend classes may be interpreted as "attend lectures," and purpose expression can be interpreted as a combination of two waypoints, "attend lecture" and "learn wine."

Partially match/approximate those parts of a CPE to one or more combinations of waypoints, such that that part that is "interpreted" can be subsequently matched to for example, auxiliary dimensions, purpose class application metadata and the like.

In some embodiments, PERCos Platform Matching and Similarity Services may perform contextual matching and similarity analysis on resources and/or resource portions, including specifications and/or specification elements. For example, suppose a user express a purpose to explore white wine tour. However, there may not be a purpose class, white-wine-tour. In such a case, PERCos embodiments may provide the user with either wine-gathering as the best match it can find.

They may provide methods, such as matching, filtering, rating, analyzing for similarity, and the like. In some PERCos system embodiments, resources, including specifications and/or portions thereof may be described using standardized specifications. Matching and Similarity Services may perform their services by utilizing this standardization to compare two resources to determine their degree of matching or similarity.

For example, consider a Stakeholder who wishes to publish an auxiliary class system, Wine Exploration Social Network (WESN). The Stakeholder may express a prescriptive purpose expression, (verb: find category: publishingresources)

In such a case, some PERCos embodiments may use this prescriptive purpose expression as an index to one or more information stores to retrieve one or more resources, including for example, purpose class applications, Frameworks, and the like that can guide the Stakeholder to publish WESN.

Some purpose class applications may create their own auxiliary class systems to organize resources for their purpose. For example, suppose social organization category has a subclass "open house," but did not have a subclass "open house for wine tasting." A purpose class application may create a class system for "open house" and include "open house for wine-tasting" as a subclass of "open house."

These applications can then deploy purpose-aware web robots to rove the Big Resource to find relevant resources and incorporate them into PERCos embodiments, organizing them according to their own class system.

3. Use Case Goals

The use cases in this disclosure illustrate some example PERCos embodiments. In particular, these use cases illustrate that some PERCos embodiments may enable users, Stakeholders, and/or acknowledged Domain experts to perform following operations:

1. Transform existing ontologies into an auxiliary PERCos class system (Use case A.1)
2. Illustrate how users can select appropriate resources to proceed further in the unfolding of their purpose experience, based on REPutes/Creds associated with resources presented to them by PERCos embodiments (Use case A.1)
3. Extend existing class systems to create a new auxiliary PERCos class systems (Use Case A.2)
4. Incorporate external non-PERCos resources into PERCos cosmos. Use Case A.3 illustrate how purpose class applications can systematically explore the internet to find applicable resources and incorporate them into PERCos cosmos (Use case A.3)
5. Create and publish purpose class applications, such as, a purpose class application that allows wineries, wine stores, restaurants, private groups, and the like. to publish their wine tastings. This purpose class application may create a (sub) class system that organizes wine-tastings, such as private wine tasting, semi-private wine tasting, reserved wine tasting, wine flight tasting, and the like. The Stakeholder may also publish the created sub-class system, which can be used by other Stakeholders to allow users to explore wine-tastings.
6. Illustrate how user purpose expressions are mapped to one or more waypoint "neighborhoods" to perform additional refinement (such as use metadata to perform further matching and/or similarity analysis) (Use case B.1)
7. Use purpose class applications to publish resources (such as wine-tasting, wine-lectures, wine-tours, and the like (Use case A.4)
8. Explore wine-related social activities to decide which activities resonate with them. Resonance may depend on the providers, activity, participants, and the like. For example using REPutes, master dimension values, values, and the like (Use cases, B.1, B.2, B.3)
9. Specify one or more dimensions and/or dimension Facets to obtain outcomes/experiences that resonate with users/Stakeholders (Use cases A.1-A.5, B.1-B.3, C.1)
10. Find other users they can interact with in a synergistic and potentially resonate manner, and the like (Use case C.1)

Find non-PERCos objects, transform them into PERCos resources, including possibly their reviews, credentials, and the like, and organize them appropriately so that users can use them to fulfill their purpose. For example, suppose a wine store is newly opened. The owners of the wine store may not know about PERCos. However, the owner may advertise its offerings to some service, such as Yelp. Yelp may also have reviews of the store. A purpose class application could have a bot find these services to incorporate them into PERCos cosmos.

4. Implementation Consideration

A user-PERCos Edge is a boundary across which purposeful communications between a user and a PERCos system embodiment are exchanged—a "surface" where a user and a PERCos system embodiment interface via transitory transformation processes. It involves concurrent interpretation of states and events in both the tangible (human) and computational (system) Domains. A suitable interpretation of a user's tangible behavior may be used to map it to one or more processes in the computational Domain.

Users may communicate using tokens, such as, verbs, categories, adverbs, adjectives, propositions, and the like to express their directions. Although tokens are more limited than free text, they nonetheless provide users with rich expressive lexicons to express their purpose at any given point during unfolding of purpose experience. Moreover, users may use tokens to discover resources that may enable them with one or more expressive vocabularies, if needed.

For example, consider users who are interested in traveling to Loire Valley to tour wineries. PERCos embodiments may enable them to find a purpose class application that the user can interact with to plan their visit.

For example, as illustrated in FIG. 143, An Example of Human-Computer Interaction At any given point during the unfolding of user purpose experience, users may be presented with a choice of one or more resources they may need to choose in order to proceed further. In such cases, users may be presented with one or more REPutes/Creds associated with each resource. Creds in some embodiments are embodiments of REPutes. For example, consider a user whose purpose is to tour wineries in Napa Valley. PERCos embodiments may present the user with a list of wineries as well as associated Creds that the user can evaluate to decide which wineries the user wishes to tour. Evaluation may include for example, validating the publisher and Originator of Creds as well as Creds on Creds, if available. For example, consider wine tastings offered by wineries. Wineries may associate with their wine tastings one or more REPutes/Creds that assert the quality of their wine, where REPutes may be created by their customers. Some REPutes/Creds may state effective facts, such as, asserting that some of their wines have won awards at various wine competitions, such as, International Wine Competition.

Restaurants may also have REPutes/Creds, such as, asserting the receipt of Michelin stars. For example, French Laundry, in Napa Valley, may publish a Cred asserting that it is a three star Michelin restaurant.

Human, as well as computer, behavior always has context. For example, consider a user whose purpose is to explore a subject, such as wine. The fulfillment of such a purpose depends on the context of the exploration, such as the user's sophistication level, the amount of time the user is willing to expand on the exploration, and the like. Some PERCos computing environments may provide standardized expressions, including dimension specifications and PERCos metrics and associated values, to systematically frame and convey Facets of users' purposes in contexts that can be interpreted to generate appropriate operational specifications for such purpose operations in such contexts. These standardized expressions provide relationally approximate terms and scalars for simplified generalizations for describing key Facets of user purpose and corresponding resource associated capabilities/characteristics. Users/Stakeholders employ such dimensions to create descriptive 'spaces' that approximately characterize both resource and user purpose essential axes. Dimension specifications provide salient overall resource/purpose characterizations enabling efficient handling of Big Resource. They also enhance similarity, focus, navigation, and other purpose operations by providing valuable filtering data management capabilities.

In some embodiments, dimension specifications may include for example:

- Master dimension and master dimension Facets that are applicable for some purposes,
- Auxiliary dimensions that are specific to purpose classes, and/or purpose neighborhoods,
- and the like.

In some embodiments, master dimensions comprise standardized sets of dimension variables that are used by users and publishers to describe the contextual characteristics of user and Stakeholder purposes. Stakeholder purpose dimensions are associated with resources and/or purpose classes and are employed in correspondence determination, for example, with user purpose expressions and/or purpose expressions. FIG. 144 illustrates an example PERCos standardized master dimension Facets and values.

For example, as illustrated in FIG. 144, Illustrative Example of Master Dimension Embodiments.

Auxiliary dimensions enable users/Stakeholders to specify expressions that are specific to one or more purpose classes and/or purpose neighborhoods. For example, consider a professor who wishes to describe an online course for learning enology. The professor may use auxiliary dimensions to describe additional information, such as course medium (online), topics covered by the course, such as, different varieties of grapes, and the like.

In some PERCos embodiments, Coherence services may support all purpose operations to reduce friction whenever possible. For example, it may cohere user inputs for possible ambiguities and present possible resolutions. Coherence Services may evaluate requirements of user and Stakeholders, if needed, for consistency. For example, suppose a resource, R, may be optimal to fulfill a user purpose, but the user does not satisfy the resource's Stakeholder's governance requirements. In such a case, Coherence Services may find alternate resources that provide as near functionality as possible to R, which user can use.

In some PERCos embodiments, resonance specifications are published by experts to recommend resources that, in their opinion, would provide "best" outcome for specified purpose expressions. Resources may be resource arrangements, including applications that can be launched. They may be of the form:

```
(Resonance
  (Identity ResonanceId101)
  (Purpose Expression
  {PurposeExp101, ..., PurposeExp104})
  (PreCondition: {Exp1, Exp2,
  (Action {Res101, ..., Res103})
  (Publisher Pub105)
  (REPute {REPuteExp101, ..., REPuteExp107}))
```

In particular, PERCos embodiments may analyze master dimension Facets and auxiliary dimensions of prescriptive purpose expression to find "nearest" resonance specifications. They may then perform additional filtering, such as evaluating REPutes of resonance specifications, REPutes of resources, and the like to find optimal "best" resonance specifications, if available.

The social network may promote experts to develop resonance specifications for the following:

Users:

- Enable users who share similar taste to discover each other. As they participate in various activities, users who resonate with each other can create new groups for various activities.
- Enable users to find wines and activities that resonate with them.
- Enable users to discover new restaurants, stores, wineries, travel agencies that resonate with their taste.

Wine Stores/Restaurants:

Enable restaurants/wine stores to learn about people's changing preferences.

Wineries:

Enable wineries to refine their marketing strategies. For example, wineries offer clubs, such as "classic red wine"

club, "white wine" club, "baker 4" club, and the like. Members of the club receive the wine offerings during the year.

Travel Agencies:

Enable agencies to refine their offerings to attract travelers.

REPutes/Creds provide users/Stakeholders of PERCos system embodiments with a comprehensive standardized and interoperable feedback arrangement for quality and related value and contributions to purpose. REPutes/Creds provide sets of methods that provide capabilities for transferring the operative qualities of Domain and purpose specific expertise of respected parties to managing filtering, identifying, evaluating, prioritizing provisioning and/or using Big Resource resources.

Users/Stakeholders may associate REPutes/Creds with any resources. For example, consider Dr. Hildegarde Heymann, who is a professor of Enologist Department of Viticulture and Enology at University of California at Davis. She may provide Creds asserting her opinions about food-wine pairings. She may also associate with the REPutes she creates with her Creds as Effective Facts.

Users interested in learning about food-wine pairings may use the fact that she is a well-known professor in enology to experience her recommendations.

Wineries, restaurants, stores, travel agencies, and the like can create Creds that assert the quality of their offerings that are essentially self-generated advertisement. For example, wineries can create Creds asserting the greatness of their wine. Users, without knowing the reputation of wineries, may be at a loss to value such Creds. Instead, they often ask people they know for recommendations. PERCos utilizes this observation to enable users/Stakeholders to express Creds on Creds. For example, suppose a wine critic creates a REPute asserting the quality of a winery. By creating a Cred asserting the critic's credentials, the critic provides users with a basis for evaluating the wine critic's assertions. In particular, users, knowing that the critic is fair and knowledgeable, can trust the critic's assertions.

5. Use Cases

This section describes a series of use cases regarding the exploration of wines in a social setting. These use cases illustrate a range of cases, from Stakeholders publishing auxiliary class systems that extend universal class systems for wines and social activities (see FIG. 145) to users exploring and joining affinity groups that they would resonate with, such as sharing similar tastes in wines, and/or other activities.

Universal class systems are designed to provide a simplified structure to classify boundless resources in PERCos cosmos efficiently and effectively. They may have categories that are related to:

- wine that can be used to express purposes involving the exploration of wine; and
- social exploration that can be used to express purposes involving the participation in social activities.

However, they may not provide finer granularity desired for topics of interest by some Stakeholders to organize wine-related social explorations activities and events. For example, universal class systems are at the granularity of social activities, instead of at the level of wine-related social activities. In addition, some Stakeholders, having put considerable level of effort and finances into the development of their respective auxiliary class systems, may want to limit which users and/or processes are allowed to access them. In contrast, all users are permitted to access universal class systems.

PERCos embodiments may enable Stakeholders to transform an external resource and make it into a PERCos resource by associating at least one persistently associated UID, at least one declared and/or inferred party asserting a subject matter's association with at least one purpose, at least one associated purpose expression and associated subject matter, where subject matter is the substance that can be operated upon and/or perform PERCos operations. For example, a purpose class application can browse the internet to find useful resources, such announcements of wine-related activities, and transform them into PERCos resources and associate them with one or more purpose classes, so that they can be available to fulfill user purposes.

The use cases in this section are organized as follows:

- Creating/Developing/Incorporating/Extending/Modifying resource and publishing them. These use cases illustrate
  - resource creation and modification process
  - Formulation of descriptive purpose expressions
  - Formulation of REPute expression
  - Publication of created/modified resource
- Exploring and Participating in activities: these use cases discuss how users wishing to participate in wine-related social activities can express their respective purposes and explore result sets representing possible social activities. These use cases illustrate how Participant information stored in PERCos embodiments can be used to minimize user inputs as well as new formulation of Participant information to be used for future use.
- Social networking: this use case illustrates how users can explore and join affinity groups they can resonate with as well leave such social groups.

For example, as illustrated in FIG. 145, Examples of Universal Class System The use cases illustrate the creation/modification in two parts. The first part comprises a Stakeholder interacting with PERCos to find a resource arrangement suitable for the Stakeholders purpose of publishing the resource. In this part, the Stakeholder's purpose is to find a resource arrangement that can facilitate their final goals, which is to publish their resources. This first part may use factors such as, Stakeholder's profiles, historical data, Foundations, relevant affinity group governance policies and requirements, resonance specifications, and/or crowd information to return one or more resource arrangements, where a resource arrangement may comprise Constructs (e.g., purpose class applications, resource services, Frameworks, and the like), PERCos Platform Services and utilities, and/or other resources. PERCos embodiments may also enable Stakeholders to evaluate REPutes as well as other characteristics of each resource arrangement.

The second part may comprise Stakeholders, whose purpose is to formulate the descriptive purpose expressions, dimensions, Facets, REPutes and/or other associated information sets for publishing resources. Stakeholders may make their selection based on the functionality, REPutes, ease of use, purpose satisfaction metrics, and the like. While each resource arrangement may provide differing levels of service, it may, for the most part, enable the Stakeholder to perform the following:

- Formulate one or more descriptive purpose expressions and associate them with resources to be published.
- Formulate REPute expressions for the resources to be published
- Publish resources.

Some resource arrangements may be purpose class applications. For example, a purpose class application may utilize the following PERCos Platform Services:

PERCos publication services interface (PPSI) to publish resources,

PERCos Navigation interface (PNI) to enable Stakeholders to navigate relevant class systems, such as, to identify pertinent purpose classes in formulating their respective purpose expressions, PERCos Coherence Services to mitigate specification frictions as needed by checking for consistencies, ambiguities, and the like and then resolving them if possible, PERCos Evaluation and Arbitration Services to evaluate and arbitrate specifications, Stakeholder inputs, and the like, PERCos Test and Results Services, to validate resources if needed, PERCos REPute Services to express and evaluate REPute expressions; for example, Stakeholders may want to evaluate REPutes of resources they may want their resources to have relationships with.

Use Case A.1: Creating a Class System Resource from an External Ontology

A Stakeholder, S1, decides to transform an OWL ontology about wine-related social events (see FIG. 146) that they found on the internet into an auxiliary class system that can be used by some PERCos embodiments. S1 is interested in this ontology because it integrates wine-related categories and the social activity categories into a single ontology. This is a contrast with universal ontologies in this embodiment (see FIG. 145) which has separate category systems for wine and social networking. The Stakeholder believes that by utilizing the ontology in their PERCos embodiments they may be able to better organize wine-related social activities and deliver a better capability to the user.

For example, as illustrated in FIG. 146, An Example Auxiliary Category Class System (WESN).

The creation of an auxiliary class system resource based on an external ontology is described in two parts:

the creation of the auxiliary class system, and the Publication of the auxiliary class system.

Phase 1: S1 Expresses a Purpose to Transform an External Ontology into an Auxiliary Class System S1 starts by interacting with a PERCos embodiment to formulate a prescriptive CPE indicating that S1 wants to transform a wine and social network ontology, ontology-1, into a PERCos class system. There are a number of methods that S1 can use to do this. The simplest method would be for S1 to type "convert ontology to PERCos class system budget medium" at a PERCos resource interface. Based on a key word search, a PERCos embodiment may suggest the "Create Class Systems from Ontology" category as a possible category for S1's purpose.

If S1 has interacted with this PERCos embodiment before, it may be able to examine the history of S1's interactions and/or stored profile information about S1 to determine that:

S1 is an experienced PERCos user and

S1 prefers to use high integrity and highly reliable resources as well as outcomes.

In addition, some PERCos embodiments may observe that the user is trying to lean to create PERCos infrastructure to deduce that S1 is probably operating in an "infrastructure builder" role. As a result of this interaction, S1 will have formulated the following purpose expression:

```
(Prescriptive Purpose Expression:
  (Identity: PE101)
  (Core Purpose: (verb: learn)
```

-continued

```
      (category: "Create Class Systems from Ontologies"))
    (Master dimension:
      (User Variables:
        (Sophistication: experienced)
        (Role: Infrastructure builder)
        (Budget: medium)
        (Integrity: 9/10)
        (Reliability: 9/10)
        (Promptness: long))))
```

Alternatively, being an experienced PERCos user, S1 could have created this CPE by finding a saved CPE that S1 used in a previous PERCos session and editing it.

PERCos embodiments may then process this CPE to find matching resources. For example, PERCos embodiments may use one of the three strategies described in herein to find a candidate list of resources. They may then evaluate REPutes/Creds associated with resources in the candidate list to determine which ones match S1's criteria, including S1's master dimension Facets, preferences, profiles, and the like. In particular, PERCos embodiments may try to prune the candidate set of resources to those resources whose associated REPutes assert 90% integrity and reliability, thereby generating a list that may be of more interest to S1. The pruned result set is then returned to S1 along with the REPutes.

The result set may include resources of different types including instructional web pages, purpose class applications, templates, Frameworks and the like.

The result set returned by a PERCos embodiment may include resources such as, the following:

resource 1:

ID: PlatformServices-xx

Type: resource arrangement

Description: Collection of Platform Services that will allow a user to create a class system by a variety of different methods.

REPutes:

```
(REPute:
  (Identity: REPuteID-xy)
    (Subject: PlatformServices-xx)
    (Effective Fact: (Platform-Services:
    PlatformServices-xx)
```

(Publisher: PERCos-Development))

resource 2:

ID: Framework-01

Type: Framework

Description: purpose class application for converting RDFS ontologies (a non-PERCos resource) into a PERCos class system.

REPutes

```
(REPute
  (Identity: REPuteID-xx)
  (Creator: User-xx)
  (Subject: Framework-01)
  (Publisher: User-xx)
  (Purpose Expression
      (Core Purpose
        (verb: learn)
        (category:
          "Creating Class Systems from RDFS ontology"))
```

-continued

```
        (Master dimension:
            (User Variables:
                (Sophistication: Moderate))))
    (Assertion: Excellent(Framework-01)
    (Master dimension:
        (REPute Variables:
            (Quality to Purpose: 7/10)))
(REPute:
    (Identity: REPuteID-xy)
    (Subject: User-xx)
    (Effective Fact: (Member (User-xx, RDFS-WorkingGroup)))
    (Publisher: W3C))
```

resource 3
ID: PCA1
Type: purpose class application
Description:
REPutes

```
(REPute:
    (Identity: REPuteID-xz)
    (Creator: User-xz)
    (Subject: PCA1)
    (Publisher: User-xz)
    (Purpose Expression:
            (Core Purpose
                (verb: learn)
                (category:
                    "Creating Class System from OWL ontology"))
        (Master dimension
            (User Variables
                (Sophistication: Experienced))))
    (Assertion: Excellent(PCA1)
    (Master dimension
        (REPute Variables
            (Quality to Purpose 9/10)))
(REPute
    (Identity: REPuteID-xs)
    (Creator: User-xz)
    (Subject: PCA1)
    (Publisher: User-xz)
    (Purpose Expression
            (Core Purpose
                (verb: learn)
                (category:
                    "Creating Class System from OWL ontology"))
            (Master dimension
                (User Variables
                    (Sophistication: Experienced))))
    (Assertion: Provides(PCA1, {navigation, editing,
                    reasoning, access-control})
    (Master dimension:
        (REPute Variables:
            (Quality to Purpose 9/10)))
(REPute:
    (Identity: REPuteID-xt)
    (Subject: User-xz)
    (Effective Fact: (Member (User-xz, OWL-WorkingGroup)))
    (Publisher: W3C))
```

Phase 2: Selecting a Purpose Class Application to Transform the Ontology

S1 chooses to use a purpose class application, PCA1, based on PCA1's REPutes and specified capabilities, such as, its ability to convert ontology classes into PERCos classes. S1 chooses PCA1 for the following reasons:

- PCA1 has good REPutes that convince S1 that it will be useful.
- PCA1 is able to process OWL ontologies. The ontology that S1 is trying to convert is an OWL ontology.
- PCA1 creates class systems that can support resource interfaces for navigating the class system, reasoning about the class system, adding members to the class system and editing the class system.

- PCA1 creates class systems that accept control specifications specifying granular access control policies. The supported control specifications may indicate which users, Stakeholders and/or processes are allowed to add members, are allowed to modify the class structure and are allowed to apply methods that read the class system structure.
- PCA1 provides support for publishing class systems.

S1 then interacts with PCA1 to create an auxiliary class system, WESN, from the OWL ontology, ontology-1.

S1 now interacts with PCA1 to prepare the newly created auxiliary class system for publication and then publishes it. Preparation includes create an identity, associating a PERCos-compliant resource interface, expressing descriptive CPEs, and the like.

Phase 3: Creating an identity for the newly created auxiliary Class System

S1 interacts with PCA1 to create a PERCos identity, WESN-1, for the newly created auxiliary class system, Wine Exploration Social Network (WESN).

Phase 4: Creating a resource Interface for WESN and associate with it.

- S1 interacts with PCA1 to create resource interfaces, ResInt101, for WESN. These resource interfaces provide the following capabilities:
- Navigation capabilities so that users, Stakeholders, and processes can navigate the class system through PNI services.
- Reasoning capabilities so that users, Stakeholders, and processes can reason about relations in the class system and discover such things as the members of a class expression, the nearest superclass of a class expression and the like.
- Membership creation capabilities so that users, Stakeholders, and processes can add new members to the class system.
- Editing capabilities so that users and Stakeholders can modify class relationships in the class system.

Phase 5: Associate Access Control Policies with WESN.

S5 interacts with PCA5 to associate an access control policy in the form of a governance specification with WESN. The access control policy will be part of a control specification whenever WESN is used by other users. For example, the access policy may be for each method of the resource interface associated with WESN. For example, S5 may specify the following access policies:

- Navigate and explore method: all
- Add members method: reputable-wine-merchants-group
- Specify class relationship method: {authorized (User), S1}
- Modify classes: {authorized (User), S1}

S1 labels the control specification with these parameters WESN-Access-Control-specification.

Phase 6: Using PCA1 to Formulate One or More Descriptive Purpose Expressions:

S1 now interacts with PCA1 to publish the class system. PCA1 may present faceting lists of relevant categories (i.e., the social activities, wine) and guide S1 to navigate the two universal class systems, wine class system, and social class system. S1 may formulate descriptive purpose expressions to be associated with each of the following: category wine and category exploration-social-network.

```
(Descriptive Purpose Expression
    (Identity: PurposeExp101)
```

-continued

```
      (Core Purpose (verb: "verb-set1") (category:
      social-exploration-network))
      (Master dimension:
        (resource Variables:
            (Material Complexity: low)
            (Integrity: 9/10)
            (Reliability: 9/10)
            (Language: English)
            (Budget: free)))
        (Auxiliary dimension:
          (Location: online)
        (ontology-based-on: ontology-1))
      (REPute: REPuteID-105))
    (Descriptive Purpose Expression:
      (Identify: PurposeExp102)
      (Core Purpose (verb: "verb-set2") (category: wine))
      (Master dimension:
        (resource Variable:
            (Material Complexity: low)
            (Integrity: 9/10)
            (Reliability: 9/10)
            (Language: English)
            (Budget: free)))
      (Auxiliary dimension:
        (Location: online)
        (ontology-based-on: ontology-1))
      (REPute: REPuteID-105))
    Verb-set1: {publish, attend, learn, explore}
    Verb-set2: {publish, learn, explore, taste, buy}
```

Such verb sets comprise one or more sets of verbs that are applicable for verb-category pairings which may be algorithmically determined and/or specified by S1. These two purpose expressions have the same REPute, provided by a wine magazine, "Wine Spectator.":

```
(REPute:
  (Identity: REPuteID-105)
  (Creator: Wine-Spectator-ID)
  (Subject: ontology-1)
  (Assertion: Excellent(ontology-1))
  (Publisher: Wine-Spectator-ID))
```

Phase 7: Formulating and Associating REPute Expressions to the WESN

PCA provides S1 with one or more standardized interoperable PERCos REPute expression languages to formulate REPutes to be associated with WESN.

S1 formulates the following REPute expressions:

```
(REPute:
    (Identity: REPuteID-106)
    (Purpose: (provide: Class-infrastructure))
    (Creator: S1-ID)
    (Subject: WESN-1)
    (Assertion: Excellent(WESN-1))
    (Publisher: S1-ID)
    (Comment: /* WESN-1 is a transformation of an ontology,
    ontology-1,
        that has been rated as excellent by Wine Spectator.*/))
```

Phase 8: Publish WESN and provide metadata, if any.

S1 publishes WESN by providing the following information:

-continued

```
  (resource: WESN-1)
  (Publisher: S1-ID)
  (Identity: WESN-1)
  (Subject-Matter: an Auxiliary Class System WESN that converts
ontology-1)
  (Descriptive Purpose Expressions: {PurposeExp101, PurposeExp102})
  (resource-Interface class-navigation-interface class-reasoning-interface
      class-add-member-interface class-edit-interface)
  (Governance-rules: WESN-Access-Control-specification)
```

In some embodiments, based on the Phases above and as part of publishing WESN the following operations occur:

1. One or more identity elements, such as, designators, are created that can be used by others to locate WESN.
2. The WESN resource is associated with the two descriptive CPEs above and the REPute.
3. The WESN resource is associated with resource interfaces provided by S1 as described above for navigating, reasoning, inserting members and editing.
4. The WESN resource is provided with governance rules provided by S1 as described above for controlling who can access the resource.

The WESN resource is given control specifications that control who can access the resource.

Use Case A.2: Extending and Publishing a Class System for Wine-Related Social Activities In this use case, a Stakeholder, S2, connects and extends an existing auxiliary class system, WESN, to create a new auxiliary class system publishing Wine-related Social Activity (PWSA, see FIG. 147). This new class system will contain new purpose classes representing purposes that combine wine-related purposes and social networking-related purposes. As before, this use case is divided into two parts, the creation of the auxiliary class system and publishing the newly created resource.

Phase 1: Formulating a Prescriptive CPE by Modifying a Previously Saved CPE

In some embodiments, S2 may choose to formulate her purpose by using a PERCos editor to edit an existing purpose. S2 chooses to edit the following saved CPE from a previous operating session:

```
(Prescriptive Purpose Expression
(Identity: PPE201)
(Core Purpose (verb: explore) (category: wine, social activity))
(Master dimension
  (User Variables:
    (Sophistication: novice)
    (role: end-user)
    (Budget: free)
    (Integrity: 9/10)
    (Reliability: 9/10)
    (Promptness: long))))
```

S2 modifies this CPE by modifying the Core Purpose and the sophistication, role and budget variables of master dimensions as follows:

```
(Prescriptive Purpose Expression:
  (Identity: PPE201)
  (Core Purpose (verb: learn) (category: extend "PERCos Class System"))
  (Master dimension
    (User Variables:
      (Sophistication: experienced)
      (role: infrastructure builder)
      (Budget: moderate)
      (Integrity: 9/10)
      (Reliability: 9/10)
      (Promptness: long))))
```

A PERCos embodiment may return a list of resources that can help S2 to extend an auxiliary class system, WESN.

S2 evaluates the list of resources in the result set returned to choose a purpose class system Framework, PCSF, over other resources, including purpose class applications because of PCSF's capabilities and REPutes. In particular, one of REPutes associated with PCSF had an Effective Fact Cred that the developer of PCSF is an acknowledged Domain expert in PERCos infrastructure development. PCSF provides the following capabilities:

1. Enable S2 to maintain control over the structure of PWSA to ensure that all structural edits of the ontology are done by Stakeholders that S2 trusts and yet enable users to explore and navigate PWSA as well as add members to PWSA classes.
2. Express descriptive purpose expressions
3. Formulate resource interfaces that enable users to navigate and explore related purpose classes.
4. Formulate and associate REPute expressions.

For example, as illustrated in FIG. 147, An Example Auxiliary Purpose Class System (PWSA).

Phase 2: Obtaining an Operating Resource

PCSF is not sufficiently complete to be provisioned and launched. Instead, S2, invokes PCSF, such as by double-clicking PCSF, PERCos embodiment finds some associated Construct templates that will allow S2 to complete PCSF and execute the class system editor associated with PCSF. S2 chooses one of the Construct templates (T1) that provides a class system editor (see FIG. 148). T1 reduces the problem of creating/extending a class system to the problem of finding an OWL ontology editor. It bases this on the idea that an OWL ontology can be used, in this embodiment, to represent a class system.

Now in order for T1 to create an operational resource it must find or create an OWL ontology editor. One way to achieve this would be to require the user to provide the OWL ontology editor. In this scenario, perhaps T1 would have guidance for the user and propose the following CPE to the user:

```
(Prescriptive Purpose Expression
  (Identity: PE201)
(Core Purpose (verb: revise) (category: OWL Ontology))
(Master dimension:
  (User Variables:
    (Sophistication: moderate)
    (Integrity: 9/10)
    (Reliability: 9/10)
    (Budget: moderate)))
```

Alternatively, T1 might include some possible choices of ontology editors (Protégé, the NeOn toolkit, TopBraid) that S2 can select. For the sake of simplicity, this use case supposes that S2 selects a Construct template (T2) that implements the Protégéeditor. T2 has four requirements that must be met in order for it to create an operational resource:

1. Windows 7 or higher
2. An internet connection (so that it can download the editor),
3. A web browser and
4. A Java Virtual Machine.

In this case, the first three requirements are satisfied by S2's Foundation. However S2 does not have a Java Virtual Machine so this requirement must again be decomposed.

For example, as illustrated in FIG. 148, An Example Construct Templates for a Class System Editor.

Again for the sake of simplicity, T2 includes some suggestions for possible sources of a Java Virtual Machine. T2 suggests the following Construct templates:

Oracle Java 7 (latest version) for Windows 64 bit—recommended

Oracle Java 6 (latest version) for Windows 64 bit

OpenJdk 7 for Windows 64 bit

OpenJdk 6 for Windows 64 bit

All of these Construct templates require a 64-bit version of Windows, internet access and a web browser. These requirements are all met by S2's Foundation so no further decomposition of these requirements is needed. S2 accepts the recommended Oracle Java 7 Construct template.

Since all the requirements of the Construct templates are met, the process for building an operational resource can start. Such a process may start with the Construct template T3 that downloads the latest Oracle Java 7 64-bit Windows release and installs it on S2's machine. Once this phase is complete, the requirements of T2 are satisfied and it can download and install the Protégé ontology editor. This provides everything that T1 needs to finish the job of wrapping the Protégé ontology editor as an editor of a PERCos class system.

Phase 3: Extending the class system

PCSF enables S2 to create a set of purpose classes for enabling Stakeholders to publish their wine-related social activities. Towards this end, S2 creates one or more classes and specify relationships between the created classes with existing classes, such as classes in the Wine Exploration Social Network (see FIG. 146). S2 then declares and defines a set of declared purpose classes:

1. "publish-wine-social-activity" declared class=(verb: publish category: wine-social-activity);
2. "publish-wine-tasting" declared class=(verb: publish category: wine-tasting)
3. "publish-food-wine-pairing" declared class=(verb: publish category: "food-wine-pairing");
4. "publish-wine-tour" declared class=(verb: publish category: "wine-tour"); and
5. "publish-wine-lecture" declared class=(verb: publish category: "wine-lecture").

In a similar manner, S2 creates classes for exploring wine-related social networking activities. S2 also defines a relationship, ⊆, between the wine-exploration-activity, social activities and the exploration of wine:

(verb: * category: wine-exploration-activity) ⊆ (verb: explore category: wine)

Wine-exploration-activity ⊆ social_activities.

Phase 4: Formulate Descriptive Purpose Expressions of PWSA

In some embodiment, S2 may use PERCos Navigation interface (PNI) to formulate descriptive purpose expressions to associate with PWSA. PNI may also provide access to one or more REPute expression languages that S2 may use to formulate the REPute expressions to be associated with WESN.

S2 associates the following descriptive CPE with his class system:

```
(Descriptive Purpose Expression
  (Identity: PE201)
  (Core Purpose (verb: {explore, learn, taste}) (category: Wine))
  (Master dimension:
    (resource Variables:
      (Material Complexity: low)
      (Integrity: 9/10)
```

-continued

```
            (Reliability: 9/10)
            (Language: English)
            (Budget: Free)))
        (Metadata: gathering social networking))
    (Descriptive Purpose Expression:
        (Identity: PE202)
        (Core Purpose: (verb: explore learn participate)
                (category: social activities))
        (Master dimension:
            (resource Variables:
                (Material Complexity: low)
                (Integrity: 9/10)
                (Reliability: 9/10)
                (Language: English)
                (Budget: Free)))
        (Metadata: wine wine-tasting))
```

Phase 5: Publish PWSA

S2 uses PERCos Platform Publication Services Interface (PPSI) to publish PWSA as a resource. S2 associates the resource interface for navigating WESN as the resource interface for PWSA. S2 also specifies the same governance rules as WESN since PWSA uses WESN to provide its services.

```
    (resource
        (Identity: PWSA-101)
        (Publisher: S2-ID)
        (Subject Matter: an Auxiliary Class System that extends WESN)
        (Descriptive Purpose Expressions: {PE201, PE202})
        (resource-Interface: { class-navigation-interface, class-reasoning-
interface,
                class-add-member-interface, class-edit-interface})
        (Governance-rules: WESN-Access-Control-specification))
```

S2 does not associate any REPute associated with this resource. Instead, S2 hopes that as users/Stakeholders use it, they would create REPutes asserting its usefulness.

Use Case A.3: Creating PERCos Representatives for Non-PERCos Entities

This use case describes a way in which non-PERCos entities can be incorporated into PERCos cosmos. A purpose class application, PCA3, searches the internet to look for web pages that describe wine tastings. As it identifies web pages that appear to be about wine tastings it creates PERCos resources to represent the associated wine tasting. For example, it might find such wine tasting information on such web pages as Yelp, winery web pages, restaurants, wine stores, and the like. It processes information associated with the web pages that it finds, such as Yelp reviews for example, to evaluate the quality of the wine tastings that it finds and to use this information to synthesize REPute resources. PCA3 decides to use an auxiliary class system, publishing Wine-related social activity (PWSA, FIG. 147) to describe new resources both as a social activity and an opportunity to learn about wines.

The incorporation of non-PERCos entities into PERCos cosmos is described in two parts:

the discovery of the non-PERCos entities, and the publication of the auxiliary class system.

Phase 1: Searching the Internet

This phase does not really involve PERCos but it is essential to this use case. In fact, this phase may be performed externally outside PERCos, but is included in this use case for the sake of completeness. The REPute of PCA3 will depend on thoroughness and completeness of its search and accuracy of its transformation. PCA3 uses robots to search the internet for indications of wine tastings. In addition, when available, PCA3 gathers information germane to the quality of the wine tastings such as reviews of the wine tasting and information about the quality of the organizations that are providing the wine tasting.

This is a critical phase for PCA3. If it generates noisy data during its search of the internet then it will earn a poor REPute and will gradually become irrelevant. Thus, in order for PCA3 to prove its usefulness to PERCos communities, it must choose reliable sources of information and it must accurately associate the reviews of a wine tasting to synthesize an accurate REPute for the wine tasting as a PERCos resource.

For example, suppose PCA3 found the following information from Cakebread Cellars Winery's webpage PCA3 Data Structure (PCA-Dat-301)

URL: http://www.yelp.com/ . . . /xxrrss.html

Event: wine tasting of Cakebread Cellars 2007 Napa Valley Reserve Chardonnay

Date-Time: "2013-04-01 12:00" to "2013-04-01 14:30"

Location: "Cakebread Cellars Winery, Napa, Calif."

Sponsor: Cakebread Cellars

Wines Discussed: Cabernet, Merlot

Required Wine Knowledge: Beginning level

Fee: Free

Furthermore PCA3 found reviews of Cakebread Cellars Winery's Reserve Chardonnay for other years. In this case, PCA3 may decide that it has enough information to create a resource and it creates a resource as follows:

```
    (resource
        (Identity: Cakebread-wine-tasting-301)
        (Subject Matter: PCA-Dat-301)
        (resource Type: Infrastructure)
        (Publisher: Developer-of-PCA3-ID)
        (Purpose Expression:
            (Descriptive Purpose Expression:
                (Core Purpose Expression:
                    (verb: {participate, attend, learn, explore})
                    (category: Gathering))
                (Core Purpose Expression:
                    (verb: {learn, explore, taste, buy})
                    (category: wine)))))
```

Phase 2: Generating the Descriptive CPEs

For each of the resources created as described above, the PCA3 application may generate some purpose expressions. Two of these purpose expressions will be based on the controlled class system (FIG. 145) to describe a purpose involving a social gathering and a purpose involving learning about wines. These purpose expressions might look something like the following:

```
(Descriptive Purpose Expression:
        (Identity: PE301)
        (Core Purpose: (verb: {participate, attend, learn, explore})
                (category: Gathering))
        (Master dimension:
            (resource Variable:
                (Integrity: 7/10)
                (Reliability: 7/10)
                (Material Complexity: low)
                (Budget: Free)))
        (Auxiliary dimension:
            (event-date-time: "2013-04-01 12:00" to "2013-04-01 14:30")
            (event-location: "Cakebread Cellars Winery, Napa, CA"))
    (metadata: "Cakebread Cellars" cabernet merlot))
(Descriptive Purpose Expression
        (Identity: PE302)
        (Core Purpose: (verb: {learn, explore, taste, buy})
                (category: Wine))
```

```
(Master dimension:
  (resource Variable:
    (Integrity: 7/10)
    (Reliability: 7/10)
    (Material Complexity: low)
    (Budget: Free)))
(Auxiliary dimension:
  (winery: "Cakebread Cellars")
  (wine-type: cabernet, merlot))
(metadata: "2013-04-01 12:00" "2013-04-01 14:30"
      "Cakebread Cellars Winery, Napa, CA" gathering))
```

In these purpose expressions, the data about the event time and location, the winery and wine-types involved are gathered by PCA3's robot. The event-date-time, event-location attributes are taken from the vocabulary of a universal social gathering class system. Similarly, the winery, wine-type attributes are taken from the vocabulary of a universal wine class system.

In addition to the purpose expressions above, the purpose class application may create a purpose expression using the PWSA class system (FIG. 147). The advantage of using this class system is that this class system has sufficient set of attributes that it can express all of the data in the PCA-Dat-301 data structure without resorting to using unstructured metadata. This purpose expression might look something like the following:

```
(Descriptive Purpose Expression
  (Identity: PE303)
  (Core Purpose: (verb: {participate, attend, learn, explore})
      (category: Gathering))
  {Master dimension:
    {resource Variable:
      (Integrity: 7/10)
      (Reliability: 7/10)
      (Material Complexity: low)
      (Budget: Free)))
  (Auxiliary dimension:
    (event-date-time: "2013-04-01 12:00" to "2013-04-01 14:30")
    (event-location: "Cakebread Cellars Winery, Napa, CA")
    (winery: "Cakebread Cellars")
    (wine-type: cabernet, merlot)))
```

Different variations of PCA3 may have different behavior with respect to these three descriptive CPEs. If PCA1 is unaware of the PWSA class system then it will not be able to create the PE303 descriptive CPE. Another variant of the PCA3 application may generate all three purpose expressions and associate all three of these with the Cakebread-wine-tasting-301 resource.

Another interesting case would be a variant of the PCA3 application that creates the PE303 purpose expression and only associates this with the resource Cakebread-wine-tasting-301. The advantage of this would be that the PWSA class system could become a valuable resource and the developer of the PCA3 application could charge a fee to users who wish to access the PWSA class system.

Phase 3: Generating a REPute based on the behavior of the application

In addition, the PCA3 application will create a REPute object to represent the fact that this resource was computed and created by the PCA3 application:

Branding REPute (REP301):

```
(REPute:
  (Creator: Developer-of-PCA3-ID)
  (Publisher: Developer-of-PCA3-ID)
```

```
  (Assertion: (resource-incorporated by PCA3))
  (Purpose: ((verb learn explore) (category: Wine))
      ((verb participate) (category: Gathering)))
  (Subject: Cakebread-wine-tasting-301)))
```

The purpose of this REPute is to brand the resources that are created by PCA3. Users who decide that they like the resources generated by PCA3 will be able to favor resources created by PCA3 based on these REPutes.

Finally, PCA3 will arrange that the resource rl includes interfaces that will retrieve a cached copy of the Web pages that the PCA3 application used as a source for its information.

Phase 4: Synthesizing Amalgamated REPutes from Cloud Sources

In phase 1 of this use case, the PCA3 robots gather both information describing the wine tastings and information about the quality of the wine tastings. Thus for instance, if the PCA3 robots gather information from Yelp pages, the Yelp pages about a wine tasting often include reviews. These reviews include both structured (e.g. the number of stars that various users give to different wineries) and unstructured (e.g. text describing a particular experience or providing additional information about the quality of the winery). In this phase, the PCA3 application attempts to synthesize these reviews into REPutes for the resources published in phase 2.

This use case assumes that the acknowledged Domain experts have developed a REPute language vocabulary for writing REPutes that express the quality of a resource as a single number (e.g. a four star rating out of a possible five stars) and to form amalgamations of such REPutes. Additionally, this use case supposes that the acknowledged Domain experts have developed a REPute language vocabulary for representing unstructured data such as reviews of a resource.

```
(REPute
  (Identity: REP302)
  (Creator: User-PCA3-1)
  (Publisher: User-PCA3-1)
  (Subject: Cakebread-wine-tasting-301)
  (Purpose: ((verb: participate) (category: Gathering))
      ((verb: learn explore) (category: Wine)))
  (Assertion:
    ((star-rating-range [1: 5])
    ((star-rating 5) (aggregated-count 3))
    ((star-rating 4) (aggregated-count 4))
    ((star-rating 3) (aggregated-count 0))
    ((star-rating 2) (aggregated-count 0))
    ((star-rating 1) (aggregated-count 1))
    (source-reputes:
     ((Creator: User-PCA3-1)
      (Subject: Cakebread-wine-tasting-301)
      (Purpose: ((verb: participate) (category: Gathering))
          ((verb: learn explore) (category: Wine)))
      (Assertion
        (star-rating-range 1 5) (star-rating 5)
        (metadata http://www.yelp.com/...)))
    ...
    )
)
```

Note that the creator of the REPutes that are being amalgamated in the above REPute is the PCA3 application. The creator cannot be set to be the internet user because this user may not be adequately specified (e.g., one internet user might take over another users account for the purposes of writing a review) and has no representation in PERCos. Instead, the developer, who is a user, takes accountability for the REPutes generated by PCA3.

Phase 5: Publishing Cakebread-wine-tasting-301

PCA3 publishes Cakebread-wine-tasting-301 by supplying the following information:

```
(resource: Cakebread-wine-tasting-301)
(Publisher: Developer-of-PCA3-ID)
(Identity: Cakebread-wine-tasting-301)
(Subject-Matter: wine tasting at Cakebread Wine Cellars
        http://www.yelp.com/.../xxrrss.html)
(Descriptive Purpose Expressions: {PE301, PE302, PE303})
(REPutes: {REP301, REP302})
```

PCA3 may add Cakebread-wine-tasting-301 as a member of the PWSA ontology and associate that member with the PE303 purpose expression.

PCA3 may provide the resource, Cakebread-wine-tasting-301, with resource interfaces providing functionality such as the following:

- Provide the URL that contained the information that was used to generate the resource (e.g., the Yelp web page). Alternatively, the application might provide a cached version of this page to provide some additional information in the case that the contents of the page changed since the summary data was obtained.
- Provide the information contained in the PCA3Dat data structure.

PCA3 may provide governance rules to control who can access the resource interfaces of Cakebread-wine-tasting-301.

Use Case A.4: Publishing Wine Tastings

In this use case, a Stakeholder, S4, wishes to publish a free lecture on food wine pairing. S4 is an experienced PERCos system user. In particular, S4 knows that PERCos embodiments have purpose class applications that can help S4 with his/her purpose. S4 found two published prescriptive purpose expressions, PE501 and PE502 that S4 decides to use. As before this use case is described in two sections: creation of the resource and then its publication.

Phase 1: The Initial Request

A Stakeholder, S4, desires to represent a wine-related social event as a resource and publish it. The Stakeholder starts with a CPE of the form

```
(Prescriptive Purpose Expression
  (Identity: PE503)
    {(Purpose Expression PE501)
     (Purpose Expression PE502)})
(Prescriptive Purpose Expression
  (Identity: PE501)
  (Core Purpose (verb: learn)
        (category: "Publish Social Activities related resources"))
  (Master dimension
    (User Variables:
      (Sophistication: novice)
      (Role: Stakeholder)
      (Budget: low)
      (Integrity: 9/10)
      (Reliability: 9/10)
      (Promptness: long))))
(Prescriptive Purpose Expression
  (Identity: PE502)
  (Core Purpose (verb: learn)
        (category: "Publish Wine related resources"))
```

-continued

```
  (Master dimension
    (User Variables:
      (Sophistication: moderate)
      (Role: Stakeholder)
      (Budget: low)
      (Integrity: 9/10)
      (Reliability: 9/10)
      (Promptness: long))))
```

This PERCos embodiment finds resources fulfilling this particular purpose expression. Among the resources that PERCos returns, there is a purpose class application, PCA4, that shows up with a high REPute. PCA4 has descriptive purpose expressions with multiple class systems, including universal class systems. In particular, this PERCos embodiment found it in the neighborhoods of learning about publishing social activities and learning about publishing wine-related events.

This PERCos embodiment also determines that PCA4's descriptive purpose expressions satisfied S4's two prescriptive purpose expressions. PCA4 also has associated REPutes asserting that PCA4 associates published resources as a member to classes of both universal class systems as well as auxiliary class systems, such as, PWSA.

Phase 2: PCA4 is Invoked and Gathers Information from S4

S4 selects and invokes PCA4. S4 is presented with a screen that allows S4 to describe S4's social gatherings. PCA4 allows S4 to use a combination of vocabularies from both the controlled vocabularies and from the PWSA Vocabularies. In particular, S4 interacts with PCA4 to express its purpose, which is to "Announce wine-food lecture"

For example, S4 has an event of the form:

Event Type: Wine-Food Lecture

Event Date/Time: "2013-06-01 17:00" to "2013-04-01 17:45"

Event Location: Cakebread Cellars Winery, Napa, Calif.

Wineries: Cakebread Cellars

Wine Types: cabernet, merlot

Target Audience: Novice

Cost: Free

Phase 3: Creating the Resource

PCA4 interacts with S4 to transform this announcement into a PERCos-compliant resource. In particular, it creates a resource, Res-Cakebread-1001, with a default resource interface that enables users, purpose class applications, and other resources to access Res-Cakebread-1001.

Phase 4: Generating the Descriptive Purpose Expressions

Now the PCA4 application uses the information provided by S4 to create and publish a resource representing the social event and to associate the resource with its purpose expression in both a universal class system and in the PSWA auxiliary class system. In a universal class system the purpose expressions look like the following:

```
(Descriptive Purpose Expression
  (Identity: PE401)
  (Core Purpose (verb: {participate attend learn explore})
        (category: {Gathering, Meeting}))
  (Master dimension
    (resource Variables
      (Material Complexity: Low)
      (Budget: Free)))
  (Auxiliary dimension
    (event-date-time: "2013-06-01 17:00" to "2013-04-01 17:45")
    (event-location: "Cakebread Cellars Winery, Napa, CA"))
```

-continued

```
(metadata: "Cakebread Cellars", Cabernet, Merlot, "Wine-Food",
Lecture))
Wine Descriptive Purpose Expression (PE402) =
  (Descriptive Purpose Expression
    (Identity: PE402)
    (Core Purpose (verb: {learn, explore, taste, buy})
        (category: "Wine-Food Pairing"))
    (Master dimension
      (resource Variables
        (Material Complexity: Low)
        (Budget: Free)))
    (Auxiliary dimension
      (winery: "Cakebread Cellars")
      (wine-type: cabernet, merlot))
    (metadata "2013-06-01 17:00" "2013-04-01 17:45", Lecture))
```

These purpose expressions are intended to be interoperable with the PERCos embodiment as a whole; they do not require awareness of the PWSA class system to be understood. For this reason, they are described using the vocabulary of the universal class systems. This vocabulary creates some constraints. For example, when describing purposes related to social activities, as for example in the purpose expression PE401, the relationship between social activities and wines, wine-food pairings and the wines involved cannot be expressed as master or auxiliary dimensions. In our embodiments, the universal class systems do not connect the social activity classes to "wine-food pairings". For this reason, for example, "wine-food pairings" appears as metadata in PE401. Similarly the dates and times for the activity occur as metadata in the purpose expression (PE402) about wine related purposes.

These constraints will make it more difficult for the PERCos embodiment to match a prescriptive purpose with the purpose expressions above. If for example, given a CPE participating in social events in order to learn about food pairings with a cabernet, the PERCos embodiment focuses on the participate in gathering part of the purpose, the PERCos embodiment will have to use the metadata associated with the resources to find the best match for the prescriptive purpose.

Therefore, in addition to associating the resources with the two purpose expressions above, the PCA4 application will also associate the resource with a purpose expression expressed using the PWSA class system:

```
(Descriptive Purpose Expression (PE403)
    (Identity: PE403)
    (Core Purpose (verb: participate) (category "Wine/Food Lectures"))
    (Master dimension
        (resource Variables
            (Material Complexity: Low)
            (Budget: Free)))
    (Auxiliary dimension
        (event-date-time: "2013-06-01 17:00" to "2013-04-01 17:45")
        (event-location: "Cakebread Cellars Winery, Napa, CA")
        (winery: "Cakebread Cellars")
        (wine-type: cabernet, merlot)))
```

Using the PWSA vocabulary enables this single purpose expression to all the attributes of the resource as values of master and auxiliary dimension. This method that any purpose class applications and/or other resources that are aware of the PWSA class system can more easily find the appropriate resources matching a prescriptive purpose expression.

Phase5: Creating REPutes

The REPutes created in this example will essentially identify the Stakeholder (S4) responsible for creating the resource and will then look up REPutes about the creator. Thus Branding REPute (REP401):

```
(REPute
  (Creator: S4-ID)
  (Publisher: Developer-of-PCA4-ID)
  (Assertion: informative(food-wine pairing))
  (Purpose: ((verb learn explore) (category: food-wine-pairing))
     ((verb participate) (category: Gathering)))
  (Subject: Cakebread-food-wine-pairing-lecture))
```

PCA4 then looks up REPutes for S4-ID and may find something like the following:

```
(REPute (REP402):
    (Identity: REP402)
    (Creator: S401-ID)
    (Publisher: "Wine Spectator"-ID)
    (Assertion: (Excellent(S4-ID)))
    (Purpose: (Core Purpose (verb: {learn, explore, taste, buy})
        (category: {wine, wine-food-pairing}))
    (Subject: S4-ID))
```

Phase 6: Publishing the resource

PCA4 publishes the CakeBread-wine-tasting-401 resource by supplying the following information:

```
(resource: Cakebread-wine-tasting-401)
(Publisher: S4-ID)
(Identity: Res-Cakebread-1001)
(Subject Matter: "Cakebread Cellars Winery food-wine pairing
lecture
  2013-04-01 12:00 to 2013-04-01 14:30)
(Descriptive Purpose Expressions: {PE401, PE402, PE403})
(REPutes {REP401, REP402})
```

PCA4 may associate Res-Cakebread-1001 with a member of a class in the PWSA ontology and associate that member with the PE403 purpose expression.

Use Case A.5: A Purpose Class Application for Exploring Wine-Related Social Activities This use case describes the phases that a developer, D5, may take to develop a purpose class application PCA5.

Phase 1: Setting Up a Development Environment

Suppose that D5 uses some development environment such as Eclipse or IntelliJ. In some embodiments, D5 may be able to download and install PERCos support for his development environment by installing plugins for the Eclipse or IntelliJ environment. In some embodiments these plugins may support the development of the purpose class application by providing tools such as

- Documentation tools that help D5 formulate purpose expressions to retrieve or explore aspects of the PERCos infrastructure and the PERCos application programming interface (API).
- Virtual PERCos embodiments which D5 can configure to provide a consistent and predictable environment for testing the application.
- Templates that will simplify the process of transforming the compiled artifacts of a traditional development cycle (executable files, script files, web archives, html files, or ruby or php scripts to run on a web server) into PERCos resources such as purpose class applications.

In addition, D5 may download one or more libraries that provide the developer with high level access to the PERCos Platform Services. In particular, this use case assumes that D5 has access to the resource interfaces of PERCos Platform Services. The development cycle may comprise repeated application of the following phases:

1. Exploring the documentation of the PERCos Platform Services API to determine what PERCos Platform Services are available and how these services can be invoked.
2. Writing the code for the purpose class application. This may include the development of PERCos resources such as descriptive purpose expressions, REPutes, governance rules, resource interfaces and the like for the PERCos application being developed.
3. Building artifacts (e.g. such as versions of the purpose class application) using some combination of traditional development tools and PERCos templates.
4. Testing the application being developed.
5. Publishing the application so that it can be used by a community of users.
6. Continuous build processing that allows the purpose class application to be tested without requiring developer intervention. Continuous build applications may have policies that do builds periodically (e.g., every night), whenever the application is published, as demanded by the developers, when distinct Foundations need to be tested and the like.

These phases in the development process will be described below.

Phase 2: Exploring Documentation of the PERCos API

An important part of any development effort involves learning about APIs and reading the API documentation. The PERCos-aware plugins in D5's development environment may help D5 formulate his prescriptive CPEs to retrieve, learn and/or explore the PERCos Platform services and their APIs. An example of a prescriptive CPE that D5 may use might be as follows:

```
   (Prescriptive Purpose Expression:
     (Identity: PE501)
       {(Purpose Expression PE502)
       (Purpose Expression PE503)})
 (Prescriptive Purpose Expression
     (Identity: PE502)
     (Core Purpose (verb: learn)
           (category: "Java PERCos Application Programming
           Interface"))
     (Master dimension
       (User Variables:
         (Sophistication: moderate)
         (Role: Infrastructure Builder)
         (Budget: Free)
         (Integrity: 9/10)
         (Reliability: 9/10)
         (Promptness: long))))
   (Prescriptive Purpose Expression
     (Identity: PE503)
     (Core Purpose (verb: learn)
           (category: "PERCos Publishing")))
```

In some embodiments, a template purpose expression PE502 may be provided by the development environment so that D5's queries can be performed in a Java development purpose neighborhood. However on other occasions, the developer D5 may not be ready to learn about the developer APIs because she needs to explore the basic concepts. In this case she may use PERCos services to formulate a prescriptive CPE that looks more like the following:

```
     (Prescriptive Purpose Expression
       (Identity: PE504)
```

-continued

```
     (Core Purpose (verb: explore)
           (category: "PERCos Coherence Processing"))
     (Master dimension
       (User Variables:
         (Sophistication: novice)
         (Role: Infrastructure Builder)
         (Budget: Free)
         (Integrity: 9/10)
         (Reliability: 9/10)
         (Promptness: long))))
```

Phase 3: Writing the Application (Including Descriptive Purpose Expressions and the Like)

During this phase, D5 makes use of information learned while reading the PERCos documentation to write the code for the purpose class application. Among the code elements that the developer will have to create are PERCos resources such as descriptive purpose expressions, REPutes, control specifications, governance rules and the like. For example, D5 may develop descriptive purpose expressions for his application:

```
(Descriptive Purpose Expression
  (Identity: PE505)
  (Core Purpose (verb: learn)
        (category: "Publish Social Activities related
resources"))
  (Master dimension
    (resource Variables:
      (Material Complexity: low)
      (Budget: low)
      (Integrity: 9/10)
      (Reliability: 9/10)
      (Promptness: long))))
(Descriptive Purpose Expression:
  (Identity: PE506)
  (Core Purpose: (verb: learn)
        (category: "Publish Wine related resources"))
  (Master dimension:
    (resource Variables:
      (Material Complexity: low)
      (Budget: low)
      (Integrity: 9/10)
      (Reliability: 9/10)
      (Promptness: long))))
```

These descriptive purpose expressions are may be needed when building, testing and publishing the application.

In addition D5 may choose to create REPute templates for the resource:

```
(REPute Template:
  (Identity: REPTemplate501)
  (Creator: $BuilderId)
  (Publisher: $BuilderId)
  (Assertion: (Good $ResId))
  (Purpose: ((verb: {learn, explore, taste, buy}) (category: Wine))
    ((verb {participate, attend, learn, explore})
    (category: Gathering)))
  (Subject: $ResId))
(REPuteTemplate:
  (Identity: REPTemplate502)
  (Creator: $BuilderId)
  (Publisher: $BuilderId)
  (Assertion: (BuiltBy $ResId $BuilderId))
  (Purpose: ((verb: {learn, explore, taste, buy}) (category: Wine))
    ((verb: {participate, attend, learn, explore}) (category: Gathering)))
  (Subject: $ResId))
```

These example REPute templates take a resource and the invoking user as arguments and substitute the identifier of the resource in for the variable $ResId and the identifier of the user for the variable $BuilderId in the REPute expression above. These REPute templates may also require that the user supply some sort of public key or other signing information so that the user is properly authenticated and the REPutes can be properly signed. These REPute expressions will be used in build scripts that build and publish the D5's purpose class application.

Phase 4: Building Artifacts

In this phase, D5 will build a version of the application. Traditional build procedures may create artifacts such as executable files, an arrangement of web pages and/or scripts and other artifacts known to those familiar with the art. When building a PERCos application, these build procedures may be augmented with procedures for building PERCos Constructs. For example, the build environment may contain a purpose class application template (PCAT5) that will assemble a purpose class application from the following inputs:

- A web archive (war) file defining the behavior of a web server.
- A server machine that will host the web service.
- A collection of descriptive purpose expressions.

The resource created by executing PCAT5 may have the following form:

```
(resource:
  (Publisher: D5-ID)
  (Identity: wine-tasting-app-501)
  (Subject Matter: a Purpose Class Application to publish wine-related social
    Activities)
  (Descriptive Purpose Expressions: {PE505, PE506}))
```

Phase 5: Testing the Application

As D5 adds code to his application, he will need to test it to see how the development process is going. Some PERCos embodiments may allow D5 to configure, persist and resume various virtual PERCos environments so that D5 can test his application in a consistent environment. For example, if the application being built depends on a critical resource, D5 may create a virtual PERCos environment where the critical resource is missing to check that his application gracefully fails in such a case.

D5 may perform some tests interactively and may develop other unit and integration tests that are integrated as part of the application and can be performed automatically through some build phase.

Phase 6: Publishing the application

When D5 is ready to publish his application, he runs a build script that handles the creation and publishing of the resource. If the newly created resource has the identity wine-tasting-app-501, then the build scripts will publish the resource by providing the following information to some PERCos embodiment. D5 also associates REPutes with the resource.

```
(resource:
(Identity: wine-tasting-app-501)
(Publisher: D5-ID)
(Subject Matter: a purpose class application to publish wine-related social
  Activities)
(Descriptive Purpose Expressions: {PE505, PE506})
(REPutes REPTemplate501(wine-tasting-app-501)))
```

In addition the build scripts may provide some resource interfaces for the new resource including resource interfaces for the end user of the application and for testing purposes.

Phase 7: Continuous Build

D5 may create some unit and integration tests for her application and may desire that these tests run with some frequency. To do this, D5 will utilize some continuous build server, familiar to those experienced in the art, that will run the unit and integration tests based on some trigger such as:

- Test builds run periodically (e.g., every night).
- Test builds run anytime there is a new commit.
- Test builds run whenever some change occurs to some resource, e.g., a new Foundation is introduced, that may affect the validity of the purpose class application.

In each test run, the continuous build server will construct virtual PERCos embodiments and will test how the purpose class application behaves in those environments.

In addition, if the continuous build server is PERCos-aware, it can provide test services for the PERCos Platform. Thus for instance, if Coherence processing wants to check if the purpose class application may run on a particular Foundation, Coherence Services can contact the continuous build server and request that the continuous build server run the purpose class application tests on an instantiation of that Foundation. Even in the case where the developer D5 has created few or no tests for her application, such a test may prove useful if it can show that the purpose class application can start on the Foundation without errors.

Use Case B.1: Exploring Activities by Using PERCos Navigation Interface

A user, U6, wants to use a reputable travel tour company to discover wine tours to Loire Valley. U6 wants to join a tour where fellow travelers with whom U6 would resonate, such as having for example, similar preferences and taste.

For the sake of simplicity, this use case assumes that U6 has used PERCos embodiments to plan other trips. This history information is stored as Participant U6-Ptrip, which specifies that information such as, user preferences, master dimension Facets, auxiliary dimensions, such as U6 wants to stay 4-5 star hotels and would like travel with other mature travelers, user history, and the like is available from previous purpose experiences.

```
(Participant
  (Identity U6-Ptrip)
    (Core Purpose: (participate travel)
    (Master dimension
      (User Variables:
        (Sophistication: moderate)
        (Role: end-user)
        (Budget: high)
        (Integrity: 9/10)
        (Reliability: 7/10)
        (Promptness: medium))
  (Auxiliary dimension
  (Hotel accommodations: [4..5] stars )
  (Fellow travelers: {mature, professionals}))))
```

U6 has also used PERCos embodiments to learn about wine. The history information characterizes U6 as an experienced wine drinker who prefers Cabernets.

This information is stored as Participant U6-PlearnWine.

```
(Participant
  (Identity U6-PlearnWine)
    (Core Purpose: (learn wine)
```

-continued

```
(Master dimension
  (User Variables:
    (Sophistication: experienced)
    (Role: end-user)
    (Budget: medium)
    (Integrity: 9/10)
    (Reliability: 9/10)
    (Promptness: medium))
(Auxiliary dimension
  (preference: {Cabernet}))))
```

This use case assumes that wine tours to Loire Valley have been published as members of an auxiliary class system, PWSA.

Phase 1: Discover Wine Tours to Loire Valley

U6, being an end user, expresses a purpose to discover on a wine tour to France's Loire Valley wine region in a free text format:

Purpose Expression: "discover wine tour to Loire Valley wine region in June, 2013"

PERCos embodiments may evaluate U6's input as follows:

```
(verb: discover)
(category: wine)
(category: tour))
(date: June, 2013)
```

Additional information: "to Loire Valley wine region"

In this phase, PERCos embodiments may take the tokens in the ref/sense associated with "discover" and compares them with the verb-set associated with the "wine" class to find "learn." Tokens in a Ref/sense are treated in PERCos to approximate the same concept. Similarly, for "discover" for the "tour" class to find "participate."

PERCos embodiments may evaluate may generate a prescriptive CPE (Core Purpose: (verb: {learn, participate}) (category: {wine, tour/travel})

In this PERCos embodiment, Coherence Services may determine that this prescriptive CPE has two categories and decide to split apart in the purpose expression to avoid mixing attributes of one category with the other. For example, U6 is an expert with wines but be a moderately experienced traveler, who travels only for pleasure. For this reason, Coherence Services rewrites the purpose expression as follows:

```
(Purpose Expression:
  (Identity: PurposeExp106-1)
  (Core Purpose: (learn wine))
  (Master dimension
    (User Variables:
      (Sophistication: experienced)
      (Role: end-user)
      (Budget: medium)
      (Integrity: 9/10)
      (Reliability: 9/10)
      (Promptness: medium)))
(Auxiliary dimension
    (preference: {Cabernet}))
(metadata
    {"June, 2013", "to Loire Valley wine region"}))
(Purpose Expression:
(Identity: PurposeExp106-2)
(Core Purpose: (participate travel))
(Master dimension
```

-continued

```
    (User Variables:
      (Sophistication: moderate)
      (Role: end-user)
      (Budget: high)
      (Integrity: 9/10)
      (Reliability: 7/10)
      (Promptness: medium))
  (Auxiliary dimension
    (Hotel accommodations: [4..5] stars )
    (Fellow travelers: {mature, professionals})
    (event-date-time "June, 2013"))
    (metadata: {"wine", "to Loire Valley wine region"}))
```

In addition, PERCos embodiments can further refine this expression by observing that the user-specified keywords of "to Loire Valley wine region" is a good match for the event-location attributes that are associated with the auxiliary class system, PWSA.

PERCos embodiments may further refine the purpose expressions. For example, they may revise PurposeExp106-2 to transform the metadata to an attribute of its auxiliary dimension.

```
(Identity: PurposeExp106-2)
  (Core Purpose: (participate travel))
  (Master dimension
      (User Variables:
        (Sophistication: moderate)
        (Role: end-user)
        (Budget: high)
        (Integrity: 9/10)
        (Reliability: 7/10)
        (Promptness: medium))
    (Auxiliary dimension
      (Hotel accommodations: [4..5] stars )
      (Fellow travelers: {mature, professionals})
        (event-date-time "June, 2013"))
        (event-location: "Loire Valley wine region")))
```

Phase 2: Finding Waypoints

PERCos SRO processing then determines that may then interpret the above prescriptive purpose expressions to identify two waypoints in universal class systems "learn-wine" and "participate-tour/travel" are declared classes in Wine class system and Travel class system, respectively.

PERCos embodiments then process these two declared classes to find those resources, Result-set-1, that are associated with both. They then examine every resource in Result-set-1 to perform matching/similarity analysis to try to match the user's auxiliary dimensions and metadata. In particular, they may try to find resources that enable the moderately experienced traveler to travel in June, 2013 to the Loire Valley wine region to learn wine.

Unfortunately, this PERCos embodiment does not find any resources that match such constraints. As a result, this PERCos embodiment relaxes the search criteria to find a REPute, REPute-Id-10006, associated with both waypoints, that asserts that purpose class application, PCA6, in Result-set-1 may help users plan trips to Loire Valley. REPute-Id-10006 has a REPute that is an Effective Fact that its originator is the Michelin Guide.

This PERCos embodiment presents PCA6 to the user.

Phase 3: Interacting with PCA6 to Plan the Trip

PCA6 may interact with U6 to plan the trip. It may interact with U6 to associate weightings with user's additional preferences, such as U6's wish to travel with mature professionals, desire to stay at 4-5 star hotels. PCA6 may also interact to possibly adjust travel dates to later or earlier dates.

PCA6 may know about an auxiliary class system, PWSA, that organizes wine-related social activities. It may use a resource interface of PWSA to navigate and explore PWSA to find resources that may not be associated with both "learn-wine" and "participate-tour/travel" declared classes. In particular, PCA6 may present U6 with a faceting list that enables U6 to refine his/her purpose expression.

Once U6 selects the tour, PCA6 may make the necessary travel arrangements, including for example, adding U6 to one of the travelers for the selected tour.

PCA6 may also create a new Participant for U6 that combines U6-Ptrip and U6-PlearnWine

```
(Participant
  (Identity U6-PexploreWineTours)
    (Core Purpose: {(learn wine) (participate travel})
    (Master dimension
        (User Variables:
          (Sophistication: experienced)
          (Role: end-user)
          (Budget: medium)
          (Integrity: 9/10)
          (Reliability: 9/10)
          (Promptness: medium))
      (Auxiliary dimension
          (preference: {Cabernet})
        (Hotel accommodations: [4..5] stars )
        (Fellow travelers: {mature, professionals})))
```

Use Case B.2: Exploring Wine Exploration Social Network Activities Using Purpose Class Applications A user, U7, who is an inexperienced traveler who does not know very much about wine, wants to explore wine tours but does not know exactly what is entailed in such a tour. Moreover, U7 is an inexperienced PERCos user. For U7, some PERCos embodiment may help U7 establish the framework for his/her experience, such as, expressing his/her master dimension Facets, auxiliary dimensions, and other preferences and requirements.

Phase 1: Express Purpose

U7, being an end user, invokes PERCos Navigation interface (PNI) and expresses the following:

"Explore wine tours."

PNI fails to find any user information, for U7, such as, U7's master dimension Facets, user historical information, and the like stored. As a result, in this embodiment, PNI starts up a faceting list to prompt U7 for the values for U7's master dimension Facets:

```
(Master dimension
    (User Variables:
        (Sophistication: beginner)
        (Role: end-user)
        (Budget: medium)
        (Integrity: 9/10)
        (Reliability: 6/10)
        (Promptness: medium)))
```

Once PNI interacts with U7 to obtain U7's relevant master dimension Facet value, it performs the following phases:

Phase 1a: evaluate U7's input as follows:

Token Explore, which is in the ref/sense {explore, investigate, enquire, examine, consider, study, probe}

Token Wine, which is in ref/sense {wine, yin, vino}

Token Tour, which is in ref/sense {tour, travel, journey, expedition, trip, jaunt, outing, voyage}

Phase 1b: generate a Core Purpose:

((verb: explore) (category: wine, tour/travel))

Phase 1c: interpret the Core Purpose to identify two purpose neighborhoods:

"explore-wine" and

"investigate-tour/travel"

Phase 1d: find a candidate set of resources that are in the intersection of the two neighborhoods. Some embodiments may filter the candidate resources based on their associated descriptive purpose expressions, REPutes, master dimension Facets, auxiliary dimension and the like. For example, given that U7 is a beginner, a PERCos embodiment may prune those resources that require experienced travelers. The filtered resources, Result-set-B102, may include, for example, PCA107, Res-B109, PCA6, and the like. For example, PCA107 may be of the form:

```
(resource
    (Identity PCA107)
    (resource Type Purpose-Class-Application)
    (Publisher User-B102)
    (Subject Matter (/*a Purpose Class Application to explore wine-related-social-
                networking for inexperienced User*/ PCAexp))
    (Purpose Expression {PurposeExp-B101}))
/* where PurposeExp-B101 is as follows: */
(Purpose Expression
    (Identity PurposeExp-B101)
    (Core Purpose (verb: explore) (category: social-networking))
    (Master dimension
        (resource Variables
          (Material complexity low)
          (Budget free)
          (Integrity 9/10)
          (Reliability 7/10))
      (REPute Variables
          (Quality to Purpose 9/10)))
    (REPute {REPuteID-B102}))
/* where REPuteID-B102 is as follows:*/
  (REPute
      (Identity: REPuteID-B102)
    (Creator: User-B102)
      (Subject: PCA107)
      (Assertion: Excellent(PCA107)
      (Publisher: User-B102)
      (Purpose ((verb: Explore) (category: wine-social-networking))
        (Master dimension
          (REPute Variables
            (Quality to Purpose 9/10)
            (Quality to Purpose Class 8/10))))
/* REPuteID-B103 is a REPute on REPuteID-B102 asserting that User-
    B103 believes that REPuteID-B102 is an excellent REPute */
  (REPute
        (Identity: REPuteID-B103)
      (Creator: User-B103)
      (Subject: REPuteID-B102)
      (Assertion: (Excellent(REPuteID-B102)))
      (Publisher: User-B103))
/*
(resource
    (Identity: Res-B109)
    (resource Type: Website http://www.loirevalleyuncorked.net/)
    (Subject Matter: Information on wine tours to Loire Valley */
    (Publisher: User-B108)
    (Purpose Expression: {PurposeExp-B201}))
```

U7, being presented with a Result-set-B102, chooses PCA107. Although PCA107's associated descriptive purpose expression specifies that PCA107's Core Purpose is to explore social networking, its subject matter specifies that explore wine-related-social-networking for inexperienced user.

Phase 2: Interacting with PCA107 to Plan a Trip

PCA107 may interact with U7 to plan a trip, such as, tour destination, such as Napa Valley, Loire Valley, Mosel, and the like, travel dates, budget, and the like It may interact with U7 to express U7's auxiliary dimension and other information

```
((Auxiliary dimension
 (Hotel accommodations: [1..3] stars )
 (Fellow travelers: {young, fun-loving})
  (event-date-time "June, 2013"))
  (event-location: "Sonoma Valley, Ca")))
```

PCA107 may know about an auxiliary class system, PWSA, that organizes wine-related social activities. It may also know about PCA6 and utilize PCA6 to augment its own findings and or present U7 with a faceting list that enables U7 to refine his/her purpose expression.

Once U7 selects one or more tours, PCA107 may make the necessary travel arrangements, including for example, adding U7 to one of the travelers for the selected tour.

Use Case B.3: Exploring Wine Exploration Social Network Activities Using Purpose Class Applications This use case illustrates the use of resonance specifications and faceting lists. A user, U8, who is an inexperienced traveler and does not know very much about wine, wants to explore wine tours but does not know exactly what is entailed in such a tour. Moreover, U8 is an inexperienced PERCos user. For U8, some PERCos embodiment may help U8 establish the framework for his/her experience, such as, expressing his/her master dimension Facets, auxiliary dimensions, and other preferences and requirements. PERCos embodiments may utilize one or more resonance specifications to assist U8 with the formulation of his/her purpose.

Phase 1: Express Purpose

U8, being an end user, invokes PERCos Navigation interface (PNI) and expresses the following:

"I want to explore wine gathering."

PNI fails to find any user information, for U8, such as, U8's master dimension Facets, user historical information, and the like stored in PERCos embodiments. As a result, in this embodiment, PNI starts up a faceting list to prompt U8 for the values for U7's master dimension user variables:

```
(Master dimension
    (User Variables:
        (Sophistication: beginner)
        (Role: end-user)
        (Budget: medium)
        (Integrity: 9/10)
        (Reliability: 6/10)
        (Promptness: medium)))
```

For example, as illustrated in FIG. 149, An Example User Characteristic Faceting List.

PNI also assumes that U8 is an end user. Note that in FIG. 149, auxiliary dimension is empty. This is because PNI has to process U8's purpose expression to determine purpose neighborhoods (phase 1c) before it can provide auxiliary dimension attributes.

Once PNI interacts with U8 to obtain U8's relevant master dimension Facet value, it performs the following phases:

Phase 1a: evaluate U8's input as follows:

Token Explore, which is in the ref/sense {explore, investigate, enquire, examine, consider, study, probe}

Token Wine, which is in ref/sense {wine, yin, vino}

Token Gathering, which is in ref/sense {gathering, party, social engagement}

PNI may determine that "I want to" as a noise for this purpose, from crowd history.

Phase 1b: generate a Core Purpose:

((verb: explore) (category: wine, gathering))

Phase 1c: interpret the Core Purpose to identify two purpose neighborhoods:

"explore-wine" and

"investigate-gatherings"

Phase 1d: find a candidate set of resources that are in the intersection of the two neighborhoods. Some embodiments may filter the candidate resources based on their associated descriptive purpose expressions, REPutes, master dimension Facets, auxiliary dimension and the like. For example, given that U7 is a beginner, a PERCos embodiment may prune those resources that require experienced travelers. The filtered resources, Result-set-B102, may include, for example, PCA107, Res-B109, PCA6, and the like. For example, PCA107 may be of the form:

```
(Resonance
    (Identity: Resonance-B101)
    (resource: Type Resonance specification)
    (Publisher: User-B102)
    (Purpose Expression: /* Preconditions */
        (Precondition:
            (Purpose Expression:
            (Identity: PurposeExp-B101)
                (Core Purpose: (verb: explore)
                        (category: social-networking
                        and subclasses)))
        (Purpose Expression:
            (Identity: PurposeExp-B102)
            (Core Purpose: (verb: explore)
                    (category: wine)))
        (Action: (Use PCA107))
    (REPute: {REPuteID-B102})))
/* REPuteID-B103 is a REPute on Resonance-B101 that asserts its
        excellence for the purpose of exploring wine-related social
        activities */
    (REPute
        (Identity: REPuteID-B102)
        (Creator: User-B103)
        (Subject: Resonance-B101)
        (Assertion: Excellent(Resonance-B101))
        (Publisher: User-B103)
        (Purpose: {(Core Purpose (verb: Explore)
                    (category: social-activities))
                    (Core Purpose (verb: Explore)
                    (category: wine))}))
/* REPuteID-B103 is a REPute on REPuteID-B102 asserting that
User-B103 believes that REPuteID-B102 is an excellent REPute */
    (REPute
            (Identity: REPuteID-B103)
        (Creator: User-B104)
        (Subject: REPuteID-B102)
        (Assertion: (Excellent(REPuteID-B102)))
            (Publisher: User-B104))
(resource
        (Identity: Res-B109)
        (resource Type:
        Website http://www.loirevalleyuncorked.net/)
        (Subject Matter: Information on wine tours to Loire Valley
        */
        (Publisher: User-B108)
        (Purpose Expression: {PurposeExp-B201}))
```

U8, being presented with a Result-set-B102, chooses PCA107. Although PCA107's associated descriptive purpose expression specifies that PCA107's Core Purpose is to explore social networking, its subject matter specifies that explore wine-related-social-networking for inexperienced user.

Phase 2: Interacting with PCA107 to Plan a Trip

As shown in FIG. 150, PCA107 may provide a faceting list interface to help U8 explore her options for finding a wine-related social activity that may resonate with her. In the first screen shown in FIG. 150, U8 is asked about what type of wine-related social event she would like to be a part of. Depending on her choice, she will be provided with a new set of faceting lists to guide her search. In FIG. 150 U8 chooses to explore wine tastings and the next screen proceeds by asking her the date, time and location of her event. If in the first screen, U8 had instead chosen the extended wine tour, U8 would have been provide with a different set of faceting lists to specify, such as, the start date, end date, location, accommodation and the like.

At every phase during her interaction with PCA107, PCA107 may update a CPE representing U8's current purpose expression. For example when U8 selects "wine tasting" in the first panel of the wizard, PCA107 may generate a CPE, based on the PWSA class system vocabulary, as follows:

```
(Prescriptive Purpose Expression
    (Identity: PPE201)
    (Core Purpose (verb: explore) (category: wine-tasting))
    (Master dimension
        (User Variables:
            (Sophistication: novice)
            (role: end-user)
            (Budget: low)
            (Integrity: 9/10)
            (Reliability: 9/10)
            (Promptness: medium)))).
```

When U8 then completes the next page of the application, the prescriptive purpose expression may be modified as follows:

```
(Prescriptive Purpose Expression
    (Identity: PPE201)
    (Core Purpose (verb: explore) (category: wine-tasting))
    (Master dimension
        (User Variables:
            (Sophistication: novice)
            (role: end-user)
            (Budget: low)
            (Integrity: 9/10)
            (Reliability: 9/10)
            (Promptness: medium)))
    (Auxiliary Variables:
        (event-date-time: 2013-04-07)
        (event-location: Napa Valley)))
```

Each time PCA107 generates one of these purpose expressions, it can apply Coherence Services to check if the purpose expression is still satisfiable. If it is not, PCA107 can suggest alternatives. For example if U8 asks about wine tasting from 4:30 pm onwards, it may that she will not find any candidates of her choice. But if there is a wine-tasting that starts at 4:15 pm, PCA107 may suggest this as a possible relaxation of U8's specifications.

For example, as illustrated in FIG. 150, An Example Faceting Purpose Class Application.

At the end of this interaction, PCA7 will generate a completed purpose expression for U8:

```
(Prescriptive Purpose Expression
    (Identity: PPE201)
    (Core Purpose (verb: explore) (category: wine-tasting))
    (Master dimension
        (User Variables:
            (Sophistication: novice)
            (role: end-user)
            (Budget: low)
            (Integrity: 9/10)
            (Reliability: 9/10)
            (Promptness: long)))
    (Auxiliary Variables:
        (event-date-time: 2013-04-07)
        (event-location: Napa Valley)
        (participants: {young, fun-loving})))
```

PCA7 may then ask PERCos services if there are any resources satisfying this purpose expression and return them along with their REPutes to U8. If U8 then selects a resource representing a wine-tasting (as opposed to another purpose class application, for example) then PCA107 can make sure that any necessary reservations are made for the event and that U8 is provided with all the information (e.g., maps) that she needs to make the trip.

PCA7 may also be able to navigate and explore PWSA and determine directly whether there are any resources that can provision this purpose expression. If so, PCA7 may then use the discovered resources to launch an operating session that enables the user to pursue his/her purpose, which is to make the necessary travel arrangements.

Use Case C.1: Reviewing/Evaluating/Exploring/Joining Social Groups

A user, U16, explore joining a wine-related social networking affinity group that U16 may resonate with, such as share U6's interest in wine, travel, and the like. While U16 can navigate PWSA to find affinity groups directly, U16 would prefer to use a purpose class application that would recommend affinity groups that would resonate with him/her.

Phase 1: U16 express his/her purpose

U6, being an end user, expresses a purpose to explore affinity groups in a free text format:

"explore wine-related social networking affinity groups"

PERCos embodiments determine that U16 has explored other affinity groups previously, such as an affinity group comprising members who are mature professionals who like sports. This history may be stored as Participant information stored in this PERCos embodiment:

```
(Participant
    (Identity U6-PAffinityGroup)
      (Core Purpose: (explore
      sports-related-social-network-affinity-groups)
      (Master dimension
        (User Variables:
            (Sophistication: moderate)
            (Role: end-user)
            (Budget: high)
            (Integrity: 9/10)
            (Reliability: 7/10)
            (Promptness: medium)))
      (Auxiliary dimension
        (members: {mature, professionals, sports})))
```

PERCos embodiments may perform the following phases:

Phase 1a: evaluate U16's free text purpose expression into:

Token "Explore", which is in the ref/sense {explore, investigate, enquire, examine, consider, study, probe}

Token "social network", which is in ref/sense {social-networking}

Token "affinity group", which is in ref/sense {affinity group, group, user group, Organization group}

Token "wine-related" as metadata, since PERCos embodiments did not find a ref/sense that contains "wine-related."

Phase 1b: generate a Core Purpose:

((verb: explore) (category: social networking, affinity group))

Phase 1c: identify that affinity groups is a class of a universal class system, Social-Exploration-Networking class system and revises the Core Purpose ((verb: explore) (category: affinity group))

Phase 1d: generate a purpose expression:

```
(Purpose Expression:
    (Identity: PurposeExp-C101)
    (Core Purpose: (explore social-networking-affinity-groups)
            /*even though Social-exploration-networking class system has
        affinity group,
            its actual name is social-networking-affinity-groups */
      (Master dimension:
        (User Variables:
            (Sophistication: moderate)
            (Role: end-user)
            (Budget: moderate)
            (Integrity: 9/10)
            (Reliability: 7/10)
            (Promptness: medium)))
      (Auxiliary dimension:
        (members: {mature, professionals}))
      (metadata: "wine-related")))
```

Phase 1e: find a candidate set of resources that are in the (social networking) affinity group neighborhood. This PERCos embodiment then filters the candidate resources based on U16's auxiliary dimension values and metadata. In particular, it finds that there is a class, affinity group in PWSA, which matches U16's metadata.

This PERCos embodiment presents to U16 a result set, Result-set-C2, comprising some purpose class applications as well as other resources, such as, affinity groups, resources that describe various affinity groups, and the like.

It also modifies the purpose expression to:

```
(Purpose Expression:
    (Identity: PurposeExp-C101)
    (Core Purpose: (explore social-networking-affinity-groups)
            /*even though Social-exploration-networking class system has
        affinity group,
            its actual name is
            wine-related-social-networking-affinity-groups */
      (Master dimension:
        (User Variables:
            (Sophistication: moderate)
            (Role: end-user)
            (Budget: moderate)
            (Integrity: 9/10)
            (Reliability: 7/10)
            (Promptness: medium)))
      (Auxiliary dimension:
        (members: {mature, professionals})))
```

Notice that the purpose expression no longer needs to carry metadata, since that information is now captured in Core Purpose.

Phase 2: U16 Refines his/her Purpose Expression

U16 evaluates resources in Result-set-$C_2$ to choose a purpose class application, PCA112, based on its REPutes and functional capabilities. PCA112 uses its knowledge of the attributes of the wine-related-social-networking-affinity-group class as well as the nuances of such affinity groups to guide U16 to refine his purpose expression. For example, PCA112 may interact with U16 to obtain that his/her annual budget for joining an affinity group is $1000. It also finds out that U16 likes red wine tastings, domestic tours, and domestic wines. It modifies the purpose expression to reflect these determinations as follows:

```
    (Purpose Expression:
        (Identity: PurposeExp-C101)
        (Core Purpose: (explore social-networking-affinity-groups)
            /*even though Social-exploration-networking class system
has affinity group,
                its actual name is
                wine-related-social-networking-affinity-groups */
          (Master dimension:
            (User Variables:
                (Sophistication: moderate)
                (Role: end-user)
                (Budget: moderate)
                (Integrity: 9/10)
                (Reliability: 7/10)
                (Promptness: medium)))
          (Auxiliary dimension:
            (members: {mature, professionals})
            (annual membership budget: $1000)
            (preferences: {red-wine-tastings, domestic wine, domestic
            wine tours}))
```

PCA112 then performs the following two levels of filtering:

To those affinity groups that meet U16's requirements, such as, it has members who are mature and professionals, the group is willing to abide by U16's privacy requirements, and the like To those groups whose governance rules, if any, can be satisfied by U16.

PCA112 may use PERCos Coherence Services to provide these filterings.

It then presents a list of affinity groups that meet U16's criteria.

Phase 3: U16 Decides to Join an Affinity Group

U16 evaluates the presented affinity groups and selects one to join, by interacting with PCA112.

(join wine-related-social-network-affinity-group-10005B)

PCA112 checks the governance rules, if any, of joining wine-related-social-network-affinity-group-10005B. If there is not, then it submits a request to join the group on behalf of U16. If there are governance rules, PCA112 interacts with U16 to obtain his/her agreement, such as, PCA112 then such agreements, along with the request to join the group.

It is understood by those familiar with the art that the system described herein may be implemented in hardware, firmware, or software encoded on a non-transitory computer-readable storage medium.

FIG. 160 illustrates a computing arrangement/apparatus/device implementation of a PERCos environment in accordance with some embodiments. It is understood by those familiar with the art that such an embodiment may also be used with non-PERCos devices, or used as a PERCos resource, or in conjunction with other PERCos embodiments, and any such embodiment may include, but is not limited to: cloud services, web information stores, people (cross edge), plug-ins, devices, networks, and/or the like and/or any combination thereof, including meta computing arrangements involving diverse independent resource nodes and types (large numbers of "independent" nodes).

PERCos environment 2000 comprises a processor 3100, memory 2070, storage medium 3200, and network interface 2060. PERCos environment 2000 may also contain one or more of the following: display 2010, manual input 2020, microphone 2030, data input port 2040, and speaker 2050.

PERCos environment 2000 may run a multi-tasking PERCos operating system and include at least one processor or central processing unit (CPU) 3100. Processor 3100 may be any central processing unit, microprocessor, micro-controller, computational device or circuit known in the art.

Memory 2070 may be any memory (e.g., random access memory) known in the art.

Display 2010 may be a visual display such as a cathode ray tube (CRT) monitor, a liquid crystal display (LCD) screen, plasma display, projector, light emitting diode (LED) display, organic light emitting diode (OLED) display, touch-sensitive screen, or other monitors as are known in the art for visually displaying images, graphics and/or text to a user.

Manual input device 2020 may be a conventional keyboard, keypad, mouse, trackball, or other input device as is known in the art for the manual input of data.

Data input port 2040 may be any data port as is known in the art for interfacing with a user, such as a telephone, instant messaging, World-Wide-Web, or electronic-mail interface. In some embodiments, data input port 2040 is an external accessory using a data protocol such as RS-232, Universal Serial Bus (USB), or Institute of Electrical and Electronics Engineers (IEEE) Standard No. 1394 ('Firewire').

Network interface 2060 may be any data port as is known in the art for interfacing, communicating or transferring data across a computer network, with examples of such networks including Transmission Control Protocol/Internet Protocol (TCP/IP), Ethernet, Fiber Distributed Data Interface (FDDI), token bus, or token ring networks. Network interface 2060 allows PERCos environment 2000 to communicate with other devices, networks, or cloud computing arrangements.

Computer-readable storage medium 3200 may be a conventional read/write memory such as a magnetic disk drive, floppy disk drive, compact-disk read-only-memory (CD-ROM) drive, digital versatile disk (DVD) drive, high definition digital versatile disk (HD-DVD) drive, Blu-ray drive, magneto-optical drive, optical drive, flash memory, memory stick, non-volatile transistor-based memory or other computer-readable memory device as is known in the art for storing and retrieving data. Significantly, computer-readable storage medium 3200 may be remotely located from processor 3100, and be connected to processor 3100 via a network such as a local area network (LAN), a wide area network (WAN), over a cloud service, or the Internet.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A system for enabling identification and/or evaluation of resources for user computing activity purpose fulfillment, such system comprising:

a hardware and software computing arrangement, comprising at least in part at least one hardware processor, at least one memory, and at least one communications means, for establishing a computing activity, computing resource identification and evaluation platform, such platform comprising, at least in part, specifications and/or resources that enable:

specifying, using hardware and software computing arrangements, at least in part standardized, interoperably interpretable, contextual purpose expressions, such specifying operating in compliance with such platform's specifications, and/or employing at least a portion of such platform's resources, wherein such specifying:

(1) enables users, using their respective computing arrangements, to express and/or select respective computing activity purpose concept approximations, expressed as contextual purpose expressions, that at least in part represent such users' respective user computing activity purposes, and (2) enables resource stakeholders, using their respective computing arrangements, independently to at least one of (a) respectively express and/or select contextual purpose expressions, and (b) respectively select classes and/or other neighborhoods based upon one or more of such classes' and/or other neighborhoods' respective associated one or more contextual purpose expressions, where such contextual purpose expressions respectively describe stakeholders' contextual purpose concept approximations regarding purposeful use of their respective resources, wherein expression of each such contextual purpose expression is performed using, at least in part, one or more verbs selected from one or more constrained verb, contextual purpose lexicons, and one or more domain categories selected from one or more domain category arrangements, wherein such one or more selected verbs and one or more selected domain categories are associated to form a verb and domain combination contextual purpose expression;

organizing, using at least one hardware and software computing arrangement, resources into groups for user and/or user computing arrangement at least one of resource identification, evaluation, and selection, such organizing into groups comprising at least in part grouping resource instances as group members based upon such resources' respective shared contextual purpose expression information, wherein such groups comprise resource purpose classes and/or other purpose neighborhoods, and where class and/or other neighborhood member sets respectively comprise resources sharing, at least in part, one or more operatively same usage purpose concept approximations expressed at least in part through use of respective contextual purpose expressions; and associating, using hardware and software computing arrangements, resources with effective facts, based upon effective facts' respective parties stipulating one or more facts pertaining to such one or more facts' respective resources and/or resource stakeholders, wherein:

(a) such effective facts are resource attribute information sets employed in evaluations of suitability of resources for respective user purposes, (b) such effective facts have respective secure test methods for validating their respective stipulated fact information sets, and (c) one or more portions of such effective facts are processed in respective secure rules governance, hardware tamper resistant, processing spaces.

2. A system for enhancing identification and evaluation of resources, based at least in part on the use of at least in part standardized and interoperably interpretable contextual purpose expressions, such system comprising:

a hardware and software computing arrangement, comprising at least in part at least one hardware processor, at least one memory, and at least one communications means, for providing specifications and/or resources for enhancing computing resource identification and evaluation for user purpose fulfillment, such providing specifications and/or resources enabling:

specifying and/or selecting approximations of users' respective purposes, by users using their respective hardware and software computing arrangements, such users' approximations respectively expressed as user computing activity prescriptive contextual purpose expressions, at least in part to at least one of identify and evaluate one or more computing resources based at least in part on such one or more resources' suitability for users' respective computing arrangement one or more computing activity set purposes, wherein such user computing activity prescriptive contextual purpose expressions are each specified, at least in part, through the use of at least one contextually inferred, or explicitly selected, verb from a standardized, constrained, purposeful computing verb lexicon, and at least one associated standardized domain category instance;

specifying and/or selecting approximations of independent stakeholders' respective purposes, by independent resource stakeholders using their respective hardware and software computing arrangements, such stakeholders' approximations respectively expressed as one or more computing activity descriptive contextual purpose expressions, wherein such descriptive contextual purpose expressions respectively describe stakeholders' one or more attribute representations of user computing activity set purpose fulfillment concept approximations for such stakeholders' respective resources, wherein such stakeholder computer activity descriptive contextual purpose expressions are each specified, at least in part, through the use of at least one contextually inferred, or explicitly selected, verb from such standardized, constrained, purposeful computing verb lexicon, and at least one associated standardized domain category instance; and at least one of identifying and evaluating such stakeholders' respective resources based, at least in part, upon their respective suitabilities for satisfying anticipated user purposes through the use, at least in part, of similarity matching of user and stakeholder contextual purpose expressions, wherein evaluating (a) users' expressed and/or selected prescriptive contextual purpose expressions for their respective computing activities, and (b) descriptive contextual purpose expressions of stakeholders for their respective resources, includes at least in part comparing user prescriptive contextual purpose expressions to respective stakeholder descriptive resource contextual purpose expressions, wherein such evaluating is at least in part performed using a tamper-resistant computing arrangement, and wherein such evaluating includes:

identifying similarities between standardized portions of plural such contextual purpose expressions, identifying inconsistencies between users' respective prescriptive contextual purpose expressions and similarity matched stakeholders' respective descriptive contextual purpose expressions, and enabling providing users' respective computing activity purpose fulfillment resource result sets at least in part based on such evaluation of standardized portions of such plural contextual purpose expressions.

3. A system for enabling a resource stakeholder to enhance identification and evaluation of resources based at least in part on the use of at least in part standardized and interoperably interpretable core purpose contextual purpose expressions, such system comprising:

a hardware and software computing arrangement, comprising at least in part at least one hardware processor, and at least one memory, for at least one of specifying, selecting, and storing, by a stakeholder party for at least one of such stakeholder party's one or more resource sets, a contextual purpose expression representing at least in part a core purpose expression specifying an approximation of an anticipated core purpose usage of such stakeholder party's resource set, wherein such core purpose expression comprises an information set that includes, at least in part, a verb from a constrained verb lexicon, and at least one domain category;

a hardware and software computing arrangement, comprising at least in part at least one hardware processor, and at least one memory, for at least one of specifying, selecting, and storing, by at least one of such resource set's at least one stakeholder party, an effective fact information set, such effective fact information set including a stipulated fact describing at least one of such resource set's at least one of publisher's, author's, creator's, distributor's, and retailer's one or more descriptive attributes, wherein such effective fact information set further includes at least one securely associated computing test method to validate a stipulated fact of such effective fact, and wherein such effective fact at least one of specifying, selecting, and storing is at least in part processed using a hardware tamper resistant processing and memory arrangement; and a hardware and software computing arrangement, comprising at least in part at least one hardware processor, at least one memory, and at least one communications means, for publishing such at least one of specified, selected, and stored such core purpose and effective fact information sets as an at least in part, resource identification information set.

4. A system as in claim 1, wherein such platform enables specifying a user as a human set, and/or an entity acting for itself as an organization, group, or other entity.

5. A system as in claim 2, wherein providing such specifications and/or resources enables at least in part, specifying a user as a human set, and/or an entity acting for itself as an organization, group, or other entity.

6. A system as in claim 1, wherein such platform enables specifying a neighborhood that is a multi-dimensional space whose dimensions are comprised of specified purpose concept parameters, wherein a concept approximation contextual purpose expression is comprised, at least in part, of a verb from a purpose expression, constrained in number of verbs, lexicon and at least one domain category.

7. A system as in claim 1, wherein such platform enables specifying effective fact test methods that are at least in part standardized and interoperable.

8. A system as in claim 3, wherein effective fact test methods are at least in part standardized and interoperable.

9. A system as in claim 1, wherein such platform enables specifying effective fact stipulated facts that are at least in part standardized and interoperable.

10. A system as in claim 3, wherein effective fact stipulated facts are at least in part standardized and interoperable.

11. A system as in claim 1, wherein such platform enables stipulating effective fact stipulated facts, wherein such stipulated facts respectively comprise at least one of expertise credentials and organization memberships information.

12. A system as in claim 3, wherein stipulated facts stipulate respective at least one of expertise credentials and organization memberships.

13. A system as in any one of claims 11 and 12, wherein users are enabled to respectively validate effective fact at least one of expertise credentials and organization memberships as valid stipulated facts, at least in part, through secure communicating with facts' respective at least one of credentialing and membership organizations' web service arrangements, where such organizations maintain one or more web service accessible information sets' stipulated fact validation information, and where such validation information can be accessed using test procedure sets comprising, at least in part, trusted authority rules based web service information verification arrangements.

14. A system as in any one of claims 11 and 12, wherein users can validate effective fact stipulated fact at least one of expertise credentials and organization memberships as valid stipulated fact information, at least in part, through the use of encrypted, secure certificates provided by trusted authorities.

15. A system as in any one of claims 11 and 12, wherein users are enabled to respectively perform effective fact stipulated fact validation of at least one of effective fact expertise credentials and organization memberships, at least in part, through the use of encrypted, secure certificates provided by trusted authorities.

16. A system as in claim 13, wherein users are enabled to respectively perform effective fact stipulated fact validation of at least one of effective fact expertise credentials and organization memberships, at least in part, through the use of encrypted, secure certificates provided by trusted authorities.

17. A system as in claim 11, wherein such platform enables validating an effective fact stipulated fact through use of an encrypted certificate provided by a trusted authority and/or test procedure set operated with an authority that maintains a compliant information verification arrangement.

18. A system as in claim 14, where users may validate an effective fact stipulated fact through use of an encrypted certificate provided by a trusted authority and/or test procedure set operated with an authority that maintains a compliant information verification arrangement.

19. A computing method for enabling identification and/or evaluation of resources for user computing activity purpose fulfillment, such method comprising:

establishing a computing activity, computing resource identification and evaluation platform, using a hardware and software computing arrangement, comprising at least in part at least one hardware processor, at least one memory, and at least one communications means, such platform comprising, at least in part, specifications and/or resources that enable:

specifying, using hardware and software computing arrangements, at least in part standardized, interoperably interpretable, contextual purpose expressions, such specifying operating in compliance with such platform's specifications, and/or employing at least a portion of such platform's resources, wherein such specifying:

(1) enables users, using their respective computing arrangements, to express and/or select respective computing activity purpose concept approximations, expressed as contextual purpose expressions, that at least in part represent such users' respective user computing activity purposes, and (2) enables resource stakeholders, using their respective computing arrangements, independently to at least one of (a) respectively express and/or select contextual purpose expressions, and (b) respectively select classes or other neighborhoods based upon one or more of such classes' and/or other neighborhoods' respective associated one or more contextual purpose expressions, where such contextual purpose expressions respectively describe stakeholders' contextual purpose concept approximations regarding purposeful use of their respective resources, wherein expression of each such contextual purpose expression is performed using, at least in part, one or more verbs selected from one or more constrained verb, contextual purpose lexicons, and one or more domain categories selected from one or more domain category arrangements, wherein such one or more selected verbs and one or more selected domain categories are associated to form a verb and domain combination contextual purpose expression;

organizing, using at least one hardware and software computing arrangement, resources into groups for user and/or user computing arrangement at least one of resource identification, evaluation, and selection, such organizing into groups comprising at least in part grouping resource instances as group members based upon such resources' respective shared contextual purpose expression information, wherein such groups comprise resource purpose classes and/or other purpose neighborhoods, and where class and/or other neighborhood member sets respectively comprise resources sharing, at least in part, one or more operatively same usage purpose concept approximations expressed at least in part through use of respective contextual purpose expressions; and associating, using hardware and software computing arrangements, resources with effective facts, based upon effective facts' respective parties stipulating one or more facts pertaining to such one or more facts' respective resources and/or resource stakeholders, wherein:

(a) such effective facts are resource attribute information sets employed in evaluations of suitability of resources for respective user purposes, (b) such effective facts have respective secure test methods for validating their respective stipulated fact information sets, and (c) one or more portions of such effective facts are processed in respective secure rules governance, hardware tamper resistant, processing spaces.

20. A computing method for enhancing identification and evaluation of resources, based at least in part on the use of at least in part standardized and interoperably interpretable contextual purpose expressions, such method comprising:

providing, using a hardware and software computing arrangement, comprising at least in part at least one hardware processor, at least one memory, and at least one communications means, specifications and/or resources for enhancing computing resource identification and evaluation for user purpose fulfillment, such providing specifications and/or resources enabling:

specifying and/or selecting approximations of users' respective purposes, by users using their respective hardware and software computing arrangements, such users' approximations respectively expressed as, user computing activity prescriptive contextual purpose expressions, at least in part to at least one of identify and evaluate one or more computing resources based at least in part on such one or more resources' suitability for users' respective computing arrangement one or more computing activity set purposes, wherein such user computing activity prescriptive contextual purpose expressions are each specified, at least in part, through the use of at least one contextually inferred, or explicitly selected, verb from a standardized, constrained, purposeful computing verb lexicon, and at least one associated standardized domain category instance;

specifying and/or selecting approximations of independent stakeholders' respective purposes, by independent resource stakeholders using their respective hardware and software computing arrangements, such stakeholders' approximations respectively expressed as one or more computing activity descriptive contextual purpose expressions, wherein such descriptive contextual purpose expressions respectively describe stakeholders' one or more attribute representations of user computing activity set purpose fulfillment concept approximations for such stakeholders' respective resources, wherein such stakeholder computer activity descriptive contextual purpose expressions are each specified, at least in part, through the use of at least one contextually inferred, or explicitly selected, verb from such standardized, constrained, purposeful computing verb lexicon, and at least one associated standardized domain category instance; and at least one of identifying and evaluating such stakeholders' respective resources based, at least in part, upon their respective suitabilities for satisfying anticipated user purposes through the use, at least in part, of similarity matching of user and stakeholder contextual purpose expressions, wherein evaluating (a) users' expressed and/or selected prescriptive contextual purpose expressions for their respective computing activities, and (b) descriptive contextual purpose expressions of stakeholders for their respective resources, includes at least in part comparing user prescriptive contextual purpose expressions to respective stakeholder descriptive resource contextual purpose expressions, wherein such evaluating is at least in part performed using a tamper-resistant computing arrangement, and wherein such evaluating includes:

identifying similarities between standardized portions of plural such contextual purpose expressions, identifying inconsistencies between users' respective prescriptive contextual purpose expressions and similarity matched stakeholders' respective descriptive contextual purpose expressions, and enabling providing users' respective computing activity purpose fulfillment resource result sets at least in part based on such evaluation of standardized portions of such plural contextual purpose expressions.

21. A method for enhancing identification and evaluation of resources by a resource stakeholder based at least in part on the use of at least in part standardized and interoperably interpretable core purpose contextual purpose expressions, such method comprising:

at least one of specifying, selecting, and storing, by a stakeholder party for at least one of such stakeholder party's one or more resource sets, using a hardware and software computing arrangement, comprising at least in part at least one hardware processor, and at least one memory, a contextual purpose expression representing at least in part a core purpose expression specifying an approximation of an anticipated core purpose usage of such stakeholder party's resource set, wherein such core purpose expression comprises an information set that includes, at least in part, a verb from a constrained verb lexicon, and at least one domain category;

at least one of specifying, selecting, and storing, by at least one of such resource set's at least one stakeholder party, using a hardware and software computing arrangement, comprising at least in part at least one hardware processor, and at least one memory, an effective fact information set, such effective fact information set including a stipulated fact describing at least one of such resource set's at least one of publisher's, author's, creator's, distributor's, and retailer's one or more descriptive attributes, wherein such effective fact information set further includes at least one securely associated computing test method to validate a stipulated fact of such effective fact, and wherein such effective fact at least one of specifying, selecting, and storing is at least in part processed using a hardware tamper resistant processing and memory arrangement; and publishing, using a hardware and software computing arrangement, comprising at least in part at least one hardware processor, at least one memory, and at least one communications means, such at least one of specified, selected, and stored such core purpose and effective fact information sets as an at least in part, resource identification information set.

22. A method as in claim 19, wherein such platform enables specifying a user as a human set, and/or an entity acting for itself as an organization, group, or other entity.

23. A method as in claim 20, wherein providing such specifications and/or resources enables at least in part, specifying a user as a human set, and/or an entity acting for itself as an organization, group, or other entity.

24. A method as in claim 19, wherein such platform enables specifying a neighborhood that is a multi-dimensional space whose dimensions are comprised of specified purpose concept parameters, wherein a concept approximation contextual purpose expression is comprised, at least in part, of a verb from a purpose expression, constrained in number of verbs, lexicon and at least one domain category.

25. A method as in claim 19, wherein such platform enables specifying effective fact test methods that are at least in part standardized and interoperable.

26. A method as in claim 21, wherein effective fact test methods are at least in part standardized and interoperable.

27. A method as in claim 19, wherein such platform enables specifying effective fact stipulated facts that are at least in part standardized and interoperable.

28. A method as in claim 21, wherein effective fact stipulated facts are at least in part standardized and interoperable.

29. A method as in claim 19, wherein such platform enables stipulating effective fact stipulated facts, wherein such stipulated facts respectively comprise at least one of expertise credentials and organization memberships information.

30. A method as in claim 21, wherein stipulated facts stipulate respective at least one of expertise credentials and organization memberships.

31. A method as in any one of claims 29 and 30, wherein users are enabled to respectively validate effective fact at least one of expertise credentials and organization memberships as valid stipulated facts, at least in part, through secure communicating with facts' respective at least one of credentialing and membership organizations' web service arrangements, where such organizations maintain one or more web service accessible information sets' stipulated fact validation information, and where such validation information can be accessed using test procedure sets comprising, at least in part, trusted authority rules based web service information verification arrangements.

32. A method as in any one of claims 29 and 30, wherein users can validate effective fact stipulated fact at least one of expertise credentials and organization memberships as valid stipulated fact information, at least in part, through the use of encrypted, secure certificates provided by trusted authorities.

33. A method as in any one of claims 29 and 30, wherein users are enabled to respectively perform effective fact stipulated fact validation of at least one of effective fact expertise credentials and organization memberships, at least in part, through the use of encrypted, secure certificates provided by trusted authorities.

34. A method as in claim 31, wherein users are enabled to respectively perform effective fact stipulated fact validation of at least one of effective fact expertise credentials and organization memberships, at least in part, through the use of encrypted, secure certificates provided by trusted authorities.

35. A method as in claim 29, wherein such platform enables validating an effective fact stipulated fact through use of an encrypted certificate provided by a trusted authority and/or test procedure set operated with an authority that maintains a compliant information verification arrangement.

36. A method as in claim 32, where users may validate an effective fact stipulated fact through use of an encrypted certificate provided by a trusted authority and/or test procedure set operated with an authority that maintains a compliant information verification arrangement.

* * * * *